US007617013B2

(12) United States Patent
Kolenc et al.

(10) Patent No.: US 7,617,013 B2
(45) Date of Patent: Nov. 10, 2009

(54) SYSTEM AND METHOD FOR PROTECTION SYSTEM DESIGN SUPPORT

(75) Inventors: Josh Kolenc, Sherwood Park (CA); H. James Hoover, Edmonton (CA); Anthony G. Olekshy, Edmonton (CA); Paulette Meaux Sanders, Lake Charles, LA (US)

(73) Assignee: Curtiss-Wright Flow Control Corporation, Parsippany, NJ (US)

( * ) Notice: Subject to any disclaimer, the term of this patent is extended or adjusted under 35 U.S.C. 154(b) by 274 days.

(21) Appl. No.: 11/016,001

(22) Filed: Dec. 17, 2004

(65) Prior Publication Data

US 2005/0271132 A1 Dec. 8, 2005

Related U.S. Application Data

(60) Provisional application No. 60/530,724, filed on Dec. 18, 2003.

(51) Int. Cl.
*G06F 19/00* (2006.01)

(52) U.S. Cl. ........................................ 700/97; 702/182

(58) Field of Classification Search .................. 700/97, 700/301; 702/182; 707/102; 710/36; 717/106, 717/162, 110

See application file for complete search history.

(56) References Cited

U.S. PATENT DOCUMENTS

| | | | | |
|---|---|---|---|---|
| 4,745,572 | A * | 5/1988 | Wilburn | 710/36 |
| 5,774,372 | A | 6/1998 | Berwanger | 700/301 |
| 6,049,334 | A * | 4/2000 | Bates et al. | 715/755 |
| 6,385,497 | B1 | 5/2002 | Ogushi et al. | 700/110 |
| 2002/0013635 | A1 | 1/2002 | Gotou et al. | 700/108 |
| 2002/0183880 | A1 | 12/2002 | Arima et al. | 700/110 |
| 2003/0114946 | A1* | 6/2003 | Kitchen | 700/97 |
| 2004/0002990 | A1* | 1/2004 | Sander et al. | 707/102 |
| 2006/0149407 | A1* | 7/2006 | Markham et al. | 700/108 |

OTHER PUBLICATIONS

Edwards, John E., Relief and Blowdown in Batch Processes, European ChemCad Symposium 1999, pp. 1-20.*

International Search Report, dated Nov. 3, 2005.

Hoover, James H., Tony Olekshy, Garry Forelich and Paul Sorenson, "Developing Engineered Product Support Applications." Dept. of computing Science, University of Alberta, Edmonton, Alberta: Avra software Lab Inc., Edmonton, Alberta. Oct. 1988.

* cited by examiner

*Primary Examiner*—Kidest Bahta
(74) *Attorney, Agent, or Firm*—Pearne & Gordon LLP

(57) ABSTRACT

A method and system for examining and safely evaluating process systems, including fluid pressure systems, to aid overpressure design and/or sizing of overpressure equipment. The system includes a server subsystem, a storage subsystem, an assessment subsystem, and optionally a report generation subsystem, including computer hardware and application software for supporting these subsystems.

31 Claims, 32 Drawing Sheets

Fig. 8 I

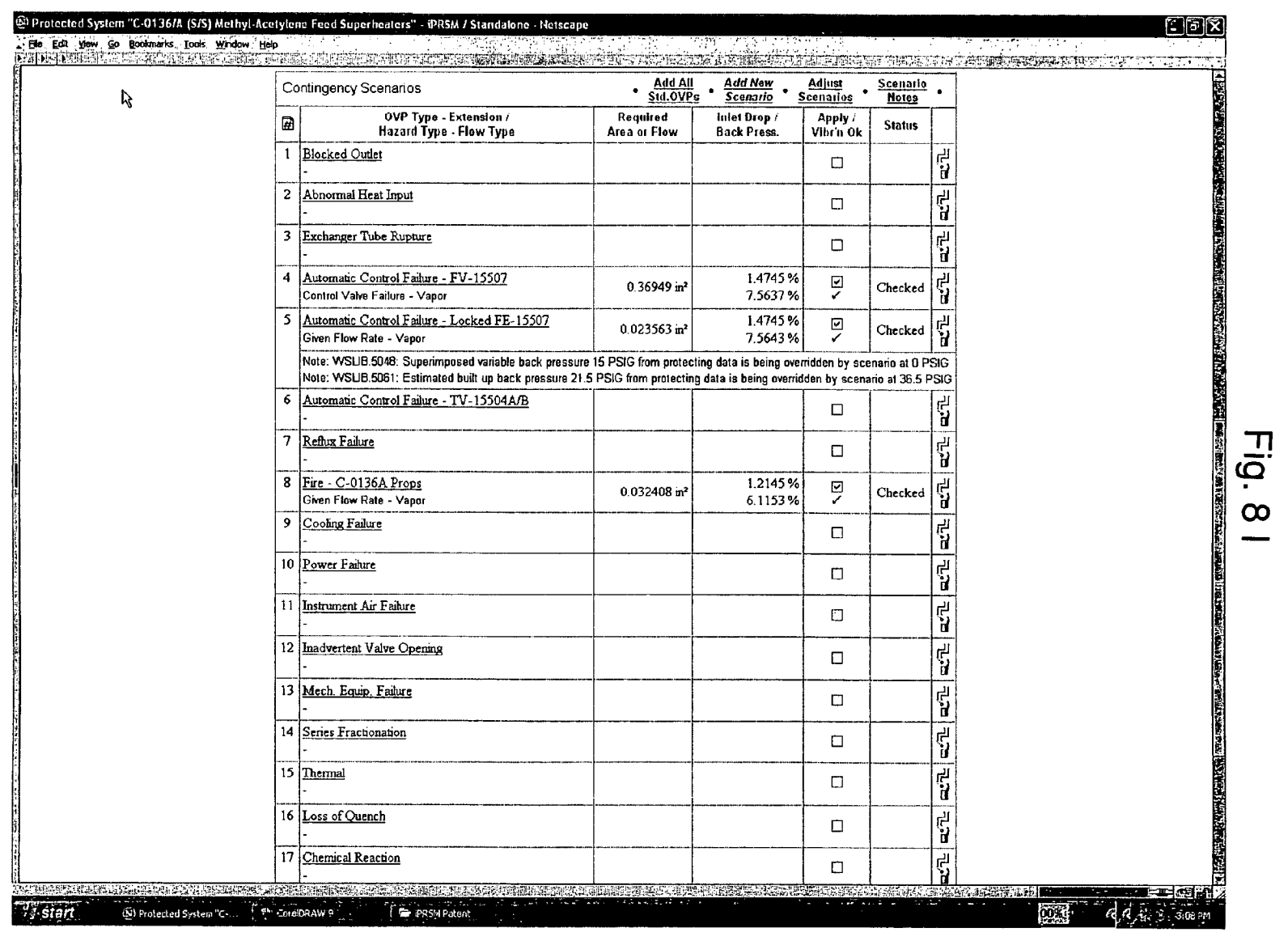

Protected System "C-0136/A (S/S) Methyl-Acetylene Feed Superheaters" - iPRSM / Standalone - Netscape File Edit View Go Bookmarks Tools Window Help Contingency Scenarios • Add All Std.OVPs • Add New Scenario • Adjust Scenarios • Scenario Notes •

| # | OVP Type - Extension / Hazard Type - Flow Type | Required Area or Flow | Inlet Drop / Back Press. | Apply / Vibr'n Ok | Status |
|---|---|---|---|---|---|
| 1 | Blocked Outlet<br>- | | | ☐ | |
| 2 | Abnormal Heat Input<br>- | | | ☐ | |
| 3 | Exchanger Tube Rupture<br>- | | | ☐ | |
| 4 | Automatic Control Failure - FV-15507<br>Control Valve Failure - Vapor | 0.36949 in² | 1.4745 %<br>7.5637 % | ☑ ✓ | Checked |
| 5 | Automatic Control Failure - Locked FE-15507<br>Given Flow Rate - Vapor | 0.023563 in² | 1.4745 %<br>7.5643 % | ☑ ✓ | Checked |
| | Note: WSLIB.5048: Superimposed variable back pressure 15 PSIG from protecting data is being overridden by scenario at 0 PSIG<br>Note: WSLIB.5061: Estimated built up back pressure 21.5 PSIG from protecting data is being overridden by scenario at 36.5 PSIG | | | | |
| 6 | Automatic Control Failure - TV-15504A/B<br>- | | | ☐ | |
| 7 | Reflux Failure<br>- | | | ☐ | |
| 8 | Fire - C-0136A Props<br>Given Flow Rate - Vapor | 0.032408 in² | 1.2145 %<br>6.1153 % | ☑ ✓ | Checked |
| 9 | Cooling Failure<br>- | | | ☐ | |
| 10 | Power Failure<br>- | | | ☐ | |
| 11 | Instrument Air Failure<br>- | | | ☐ | |
| 12 | Inadvertent Valve Opening<br>- | | | ☐ | |
| 13 | Mech. Equip. Failure<br>- | | | ☐ | |
| 14 | Series Fractionation<br>- | | | ☐ | |
| 15 | Thermal<br>- | | | ☐ | |
| 16 | Loss of Quench<br>- | | | ☐ | |
| 17 | Chemical Reaction<br>- | | | ☐ | |

Start | Protected System "C-... | CorelDRAW 9 | iPRSM Patent | 3:08 PM

Fig. 8U

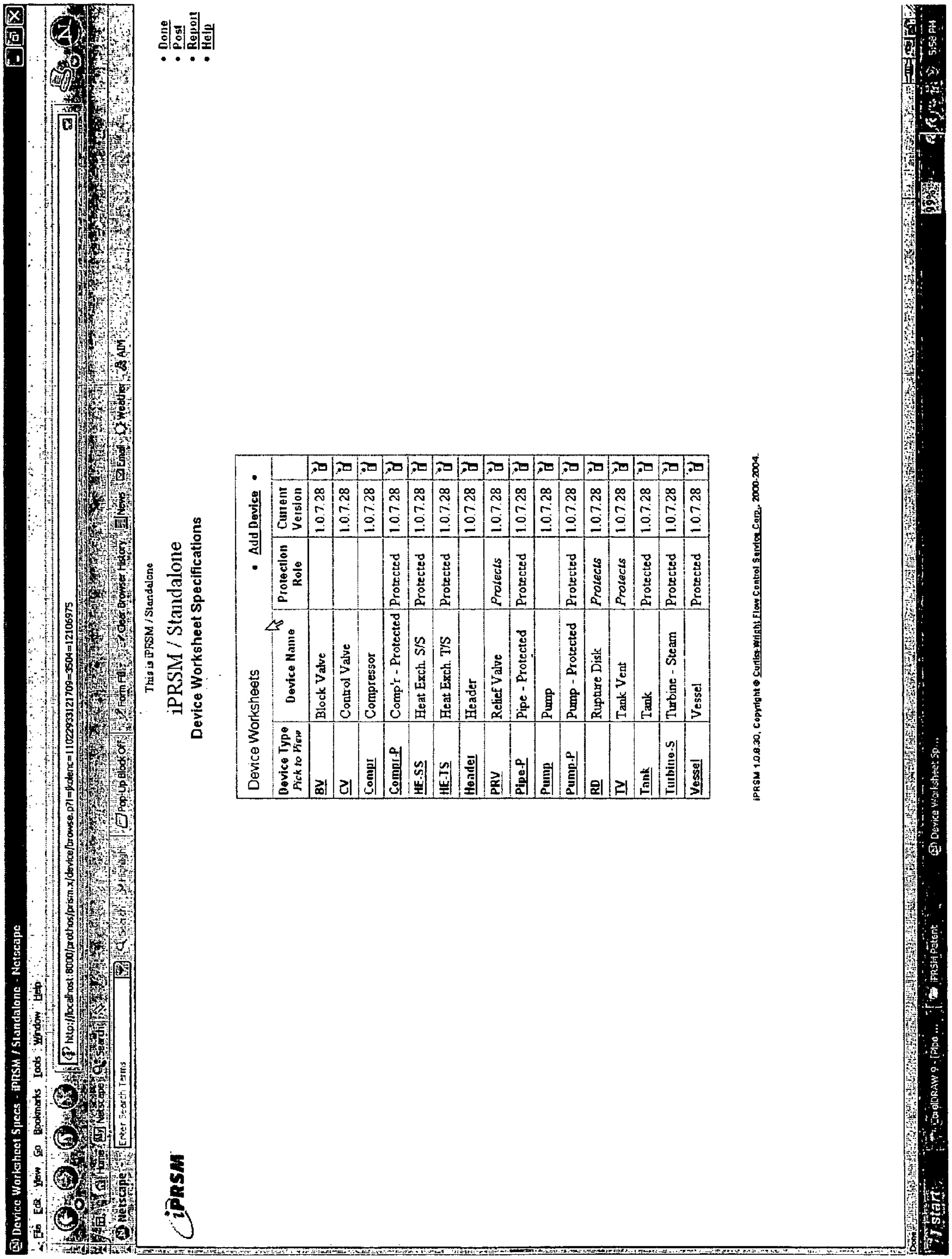

| Device Type Pick to View | Device Name | Protection Role | Current Version |
|---|---|---|---|
| BV | Block Valve | | 1.0.7.28 |
| CV | Control Valve | | 1.0.7.28 |
| Compr | Compressor | | 1.0.7.28 |
| Compr-P | Comp'r - Protected | Protected | 1.0.7.28 |
| HE-SS | Heat Exch. S/S | Protected | 1.0.7.28 |
| HE-TS | Heat Exch. T/S | Protected | 1.0.7.28 |
| Header | Header | | 1.0.7.28 |
| PRV | Relief Valve | *Protects* | 1.0.7.28 |
| Pipe-P | Pipe - Protected | Protected | 1.0.7.28 |
| Pump | Pump | | 1.0.7.28 |
| Pump-P | Pump - Protected | Protected | 1.0.7.28 |
| RD | Rupture Disk | *Protects* | 1.0.7.28 |
| TV | Tank Vent | *Protects* | 1.0.7.28 |
| Tank | Tank | Protected | 1.0.7.28 |
| Turbine-S | Turbine - Steam | Protected | 1.0.7.28 |
| Vessel | Vessel | Protected | 1.0.7.28 |

File Edit View Go Bookmarks Tools Window Help http://www.iprsm.com/iprsm/demo.x/fitting/browse.p?!=jkolenc=11020906847363=791=23271700 iPRSM iPRSM / Demo

Figure 8V:
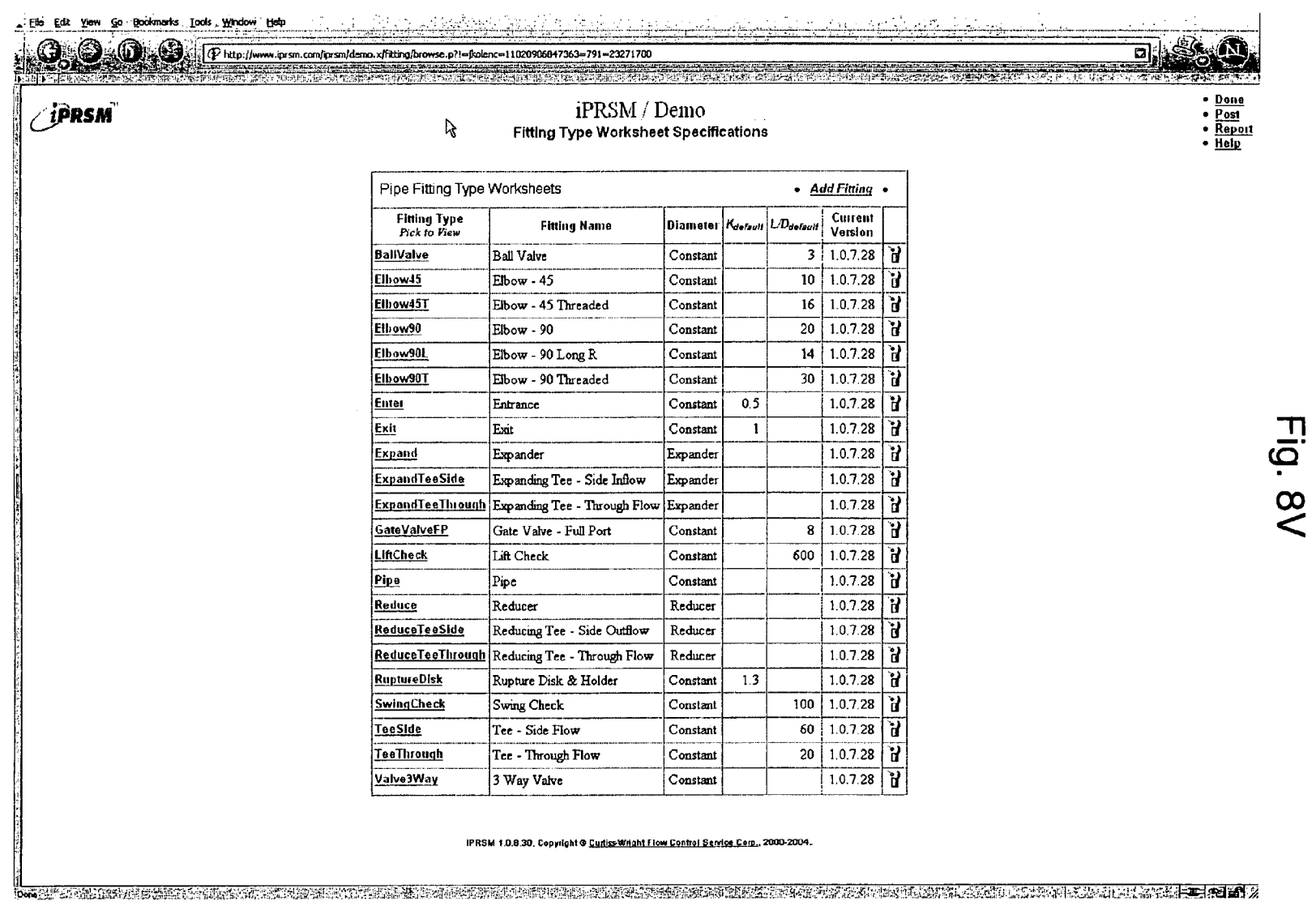

Fitting Type Worksheet Specifications

- Done
- Post
- Report
- Help

Pipe Fitting Type Worksheets • *Add Fitting* •

| Fitting Type *Pick to View* | Fitting Name | Diameter | $K_{default}$ | $L/D_{default}$ | Current Version | |
|---|---|---|---|---|---|---|
| BallValve | Ball Valve | Constant | | 3 | 1.0.7.28 | |
| Elbow45 | Elbow - 45 | Constant | | 10 | 1.0.7.28 | |
| Elbow45T | Elbow - 45 Threaded | Constant | | 16 | 1.0.7.28 | |
| Elbow90 | Elbow - 90 | Constant | | 20 | 1.0.7.28 | |
| Elbow90L | Elbow - 90 Long R | Constant | | 14 | 1.0.7.28 | |
| Elbow90T | Elbow - 90 Threaded | Constant | | 30 | 1.0.7.28 | |
| Enter | Entrance | Constant | 0.5 | | 1.0.7.28 | |
| Exit | Exit | Constant | 1 | | 1.0.7.28 | |
| Expand | Expander | Expander | | | 1.0.7.28 | |
| ExpandTeeSide | Expanding Tee - Side Inflow | Expander | | | 1.0.7.28 | |
| ExpandTeeThrough | Expanding Tee - Through Flow | Expander | | | 1.0.7.28 | |
| GateValveFP | Gate Valve - Full Port | Constant | | 8 | 1.0.7.28 | |
| LiftCheck | Lift Check | Constant | | 600 | 1.0.7.28 | |
| Pipe | Pipe | Constant | | | 1.0.7.28 | |
| Reduce | Reducer | Reducer | | | 1.0.7.28 | |
| ReduceTeeSide | Reducing Tee - Side Outflow | Reducer | | | 1.0.7.28 | |
| ReduceTeeThrough | Reducing Tee - Through Flow | Reducer | | | 1.0.7.28 | |
| RuptureDisk | Rupture Disk & Holder | Constant | 1.3 | | 1.0.7.28 | |
| SwingCheck | Swing Check | Constant | | 100 | 1.0.7.28 | |
| TeeSide | Tee - Side Flow | Constant | | 60 | 1.0.7.28 | |
| TeeThrough | Tee - Through Flow | Constant | | 20 | 1.0.7.28 | |
| Valve3Way | 3 Way Valve | Constant | | | 1.0.7.28 | |

IPRSM 1.0.8.30. Copyright © Curtiss-Wright Flow Control Service Corp., 2000-2004.

Done

File Edit View Go Bookmarks Tools Window Help http://www.iprsm.com/iprsm/demo.x/plant/stdovp/default.p?l=jkolenc=11020906847363=834=30244057 iPRSM iPRSM / Demo

Figure 8W:
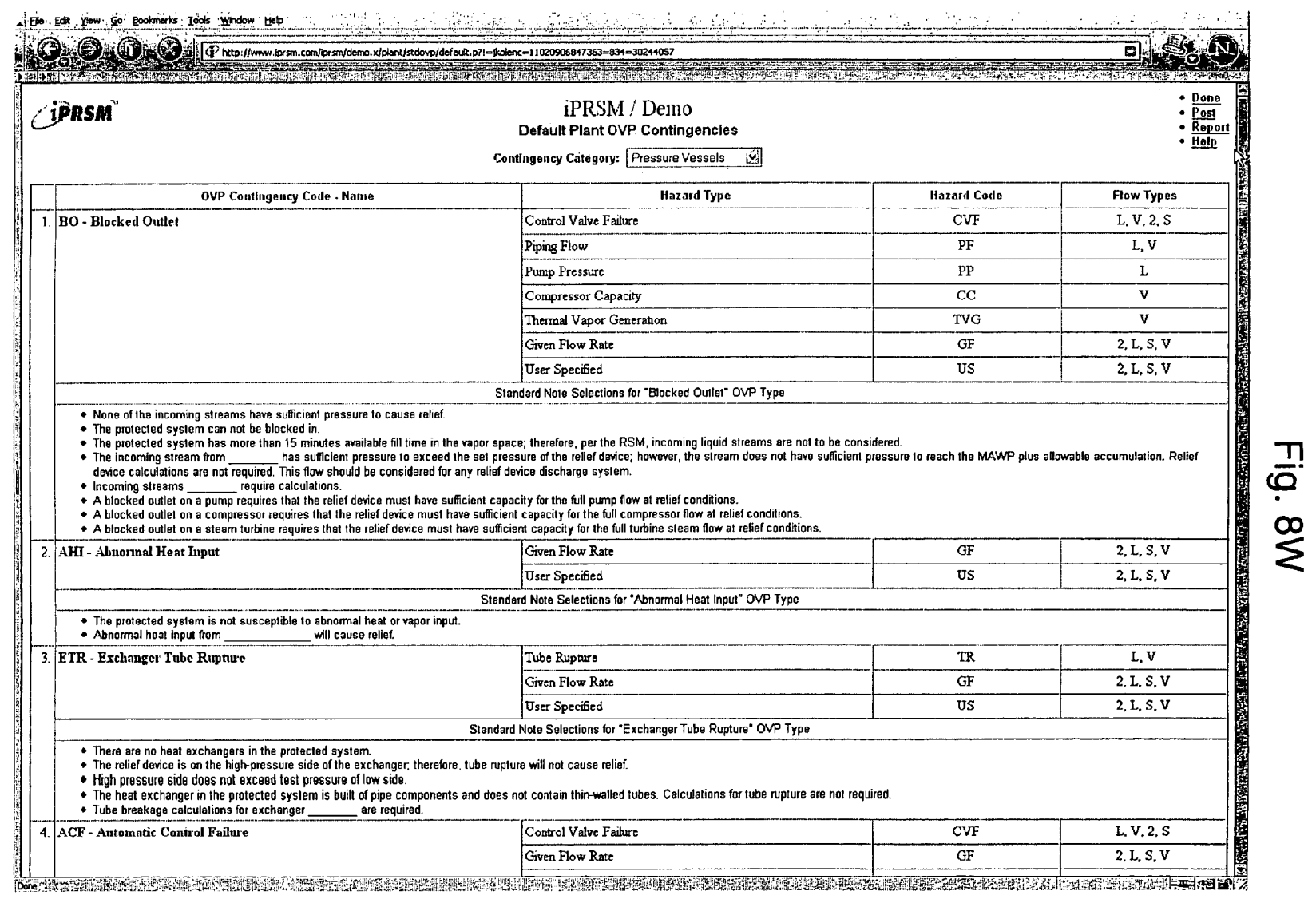

Default Plant OVP Contingencies

- Done
- Post
- Report
- Help

Contingency Category: Pressure Vessels

| | OVP Contingency Code - Name | Hazard Type | Hazard Code | Flow Types |
|---|---|---|---|---|
| 1. | BO - Blocked Outlet | Control Valve Failure | CVF | L, V, 2, S |
| | | Piping Flow | PF | L, V |
| | | Pump Pressure | PP | L |
| | | Compressor Capacity | CC | V |
| | | Thermal Vapor Generation | TVG | V |
| | | Given Flow Rate | GF | 2, L, S, V |
| | | User Specified | US | 2, L, S, V |
| | Standard Note Selections for "Blocked Outlet" OVP Type | | | |
| | • None of the incoming streams have sufficient pressure to cause relief.<br>• The protected system can not be blocked in.<br>• The protected system has more than 15 minutes available fill time in the vapor space; therefore, per the RSM, incoming liquid streams are not to be considered.<br>• The incoming stream from _______ has sufficient pressure to exceed the set pressure of the relief device; however, the stream does not have sufficient pressure to reach the MAWP plus allowable accumulation. Relief device calculations are not required. This flow should be considered for any relief device discharge system.<br>• Incoming streams _______ require calculations.<br>• A blocked outlet on a pump requires that the relief device must have sufficient capacity for the full pump flow at relief conditions.<br>• A blocked outlet on a compressor requires that the relief device must have sufficient capacity for the full compressor flow at relief conditions.<br>• A blocked outlet on a steam turbine requires that the relief device must have sufficient capacity for the full turbine steam flow at relief conditions. | | | |
| 2. | AHI - Abnormal Heat Input | Given Flow Rate | GF | 2, L, S, V |
| | | User Specified | US | 2, L, S, V |
| | Standard Note Selections for "Abnormal Heat Input" OVP Type | | | |
| | • The protected system is not susceptible to abnormal heat or vapor input.<br>• Abnormal heat input from ___________ will cause relief. | | | |
| 3. | ETR - Exchanger Tube Rupture | Tube Rupture | TR | L, V |
| | | Given Flow Rate | GF | 2, L, S, V |
| | | User Specified | US | 2, L, S, V |
| | Standard Note Selections for "Exchanger Tube Rupture" OVP Type | | | |
| | • There are no heat exchangers in the protected system.<br>• The relief device is on the high-pressure side of the exchanger; therefore, tube rupture will not cause relief.<br>• High pressure side does not exceed test pressure of low side.<br>• The heat exchanger in the protected system is built of pipe components and does not contain thin-walled tubes. Calculations for tube rupture are not required.<br>• Tube breakage calculations for exchanger _______ are required. | | | |
| 4. | ACF - Automatic Control Failure | Control Valve Failure | CVF | L, V, 2, S |
| | | Given Flow Rate | GF | 2, L, S, V |

Done

Fig. 8X

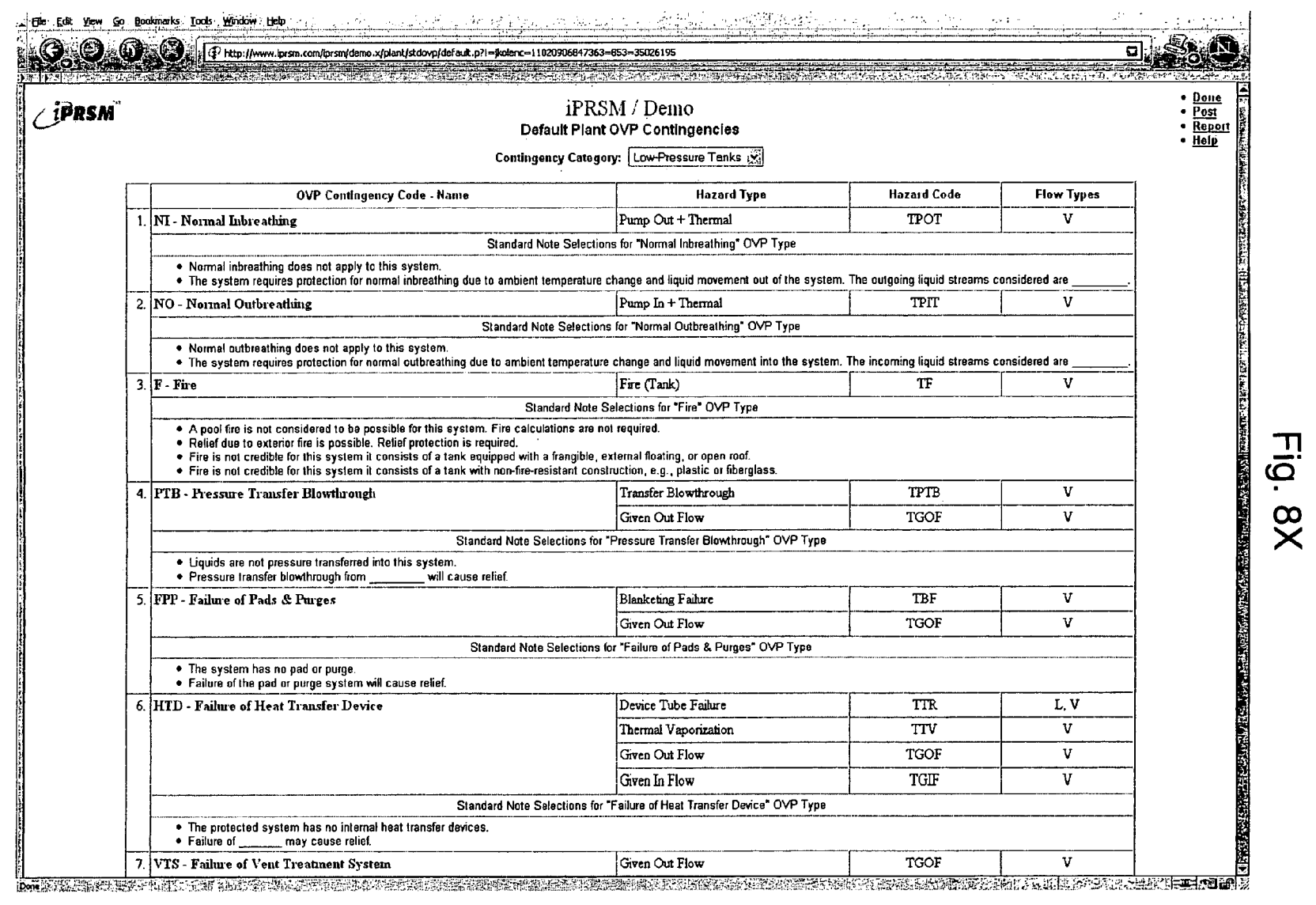

File Edit View Go Bookmarks Tools Window Help http://www.iprsm.com/iprsm/demo.x/plant/stdovp/default.p?l=jkolenc=11020906847363=653=35026195 iPRSM iPRSM / Demo

Default Plant OVP Contingencies

Contingency Category: Low-Pressure Tanks

- Done
- Post
- Report
- Help

| | OVP Contingency Code - Name | Hazard Type | Hazard Code | Flow Types |
|---|---|---|---|---|
| 1. | NI - Normal Inbreathing | Pump Out + Thermal | TPOT | V |
| | Standard Note Selections for "Normal Inbreathing" OVP Type | | | |
| | • Normal inbreathing does not apply to this system.<br>• The system requires protection for normal inbreathing due to ambient temperature change and liquid movement out of the system. The outgoing liquid streams considered are ________. | | | |
| 2. | NO - Normal Outbreathing | Pump In + Thermal | TPIT | V |
| | Standard Note Selections for "Normal Outbreathing" OVP Type | | | |
| | • Normal outbreathing does not apply to this system.<br>• The system requires protection for normal outbreathing due to ambient temperature change and liquid movement into the system. The incoming liquid streams considered are ________. | | | |
| 3. | F - Fire | Fire (Tank) | TF | V |
| | Standard Note Selections for "Fire" OVP Type | | | |
| | • A pool fire is not considered to be possible for this system. Fire calculations are not required.<br>• Relief due to exterior fire is possible. Relief protection is required.<br>• Fire is not credible for this system it consists of a tank equipped with a frangible, external floating, or open roof.<br>• Fire is not credible for this system it consists of a tank with non-fire-resistant construction, e.g., plastic or fiberglass. | | | |
| 4. | PTB - Pressure Transfer Blowthrough | Transfer Blowthrough | TPTB | V |
| | | Given Out Flow | TGOF | V |
| | Standard Note Selections for "Pressure Transfer Blowthrough" OVP Type | | | |
| | • Liquids are not pressure transferred into this system.<br>• Pressure transfer blowthrough from ________ will cause relief. | | | |
| 5. | FPP - Failure of Pads & Purges | Blanketing Failure | TBF | V |
| | | Given Out Flow | TGOF | V |
| | Standard Note Selections for "Failure of Pads & Purges" OVP Type | | | |
| | • The system has no pad or purge.<br>• Failure of the pad or purge system will cause relief. | | | |
| 6. | HTD - Failure of Heat Transfer Device | Device Tube Failure | TTR | L, V |
| | | Thermal Vaporization | TTV | V |
| | | Given Out Flow | TGOF | V |
| | | Given In Flow | TGIF | V |
| | Standard Note Selections for "Failure of Heat Transfer Device" OVP Type | | | |
| | • The protected system has no internal heat transfer devices.<br>• Failure of _______ may cause relief. | | | |
| 7. | VTS - Failure of Vent Treatment System | Given Out Flow | TGOF | V |

Done

SYSTEM AND METHOD FOR PROTECTION SYSTEM DESIGN SUPPORT

CROSS-REFERENCES TO RELATED APPLICATIONS

This application claims the benefit of provisional application Ser. No. 60/530,724, filed on Dec. 18, 2003, incorporated herein by reference in its entirety.

The disclosure of this patent document contains material which is subject to copyright protection. The copyright owner has no objection to the facsimile reproduction by anyone of the patent document or the patent disclosure, as it appears in the Patent and Trademark Office patent file or records, for the limited purposes consistent with the law, but otherwise reserves all copyright rights whatsoever.

REFERENCE TO COMPUTER PROGRAM LISTING

A computer program listing is included as a computer listing appendix to this disclosure in the form of two identical compact discs labeled COPY 1 and COPY 2, respectively, created on Dec. 13, 2004, in MS-DOS and/or MS-Windows format, each containing the computer program modules as listed in Appendix A, attached to this disclosure, said modules in ASCII text format, with sizes and creation dates as listed in Appendix A. The files are readable in Windows, Linux, and Unix operating systems.

FIELD OF THE INVENTION

This application relates generally to a method for examining and/or evaluating pressure systems.

More specifically, this application relates to a method for examining and safely evaluating fluid pressure systems to aid overpressure design and/or sizing of overpressure equipment.

BACKGROUND OF THE INVENTION

Industry utilizing fluids under pressure, especially the hydrocarbon processing industry, have particularly exacting audit requirements (such as OSHA 1910.119, for example), but the current (as of the time of filing) state-of-the-art in the hydrocarbon processing industry tends toward manual paper analysis and archiving and/or antiquated legacy data-processing systems. This combination makes compliance activities very inefficient, even when attempting to meet the minimum OSHA demands.

End users attempt to rectify this situation either by developing in-house software or by contacting outside vendors for help. This can be expensive, and thus may not be economical solutions to the problem.

Further, for the most part, the users are not much better off using the above approaches because such approaches lack the highly specialized engineering and software development knowledge needed to create integrated solutions that do in fact satisfy both OSHA and end-user requirements. Accordingly, the market needs a "Web-enabled" engineering software system that satisfies, OSHA 1910.119 audit requirements for pressure relief systems.

Thus, because the hydrocarbon processing industry has particularly exacting Process Safety Management (PSM) audit requirements, but the "current state of the art" in today's hydrocarbon processing industry tends more to manual paper or antiquated legacy data-processing systems, an improved means for addressing the audit requirements would be beneficial.

In an increasingly competitive environment, software technology must support the ability of operating units to improve process plant productivity, reduce cost and risk, and enhance manufacturing uptime. A new technology for hosting a broad range of new forward thinking approaches and tools that can meet and surpass these challenges is thus desired.

SUMMARY OF THE INVENTION

Provided is an evaluation system for evaluating a process system, said process system comprising a plurality of equipment including a protection device for protecting the process system. The evaluation system comprising: a storage subsystem for storing a computerized equipment database including equipment information representing each of said plurality of equipment; a server for serving content including some portion of said equipment information, via a public communication network, to an application executing on a remotely located user computer; and an assessment subsystem for automatically determining, by utilizing said equipment information, an adequacy of the protection device for protecting the process system, and generating protection assessment information therefrom.

The protection assessment information is also stored in said equipment database or in another database by said storage subsystem, and the content served by the server includes some portion of said protection assessment information.

Also provided is a method for evaluating a process system comprising a plurality of equipment including a protection device for protecting the process system.

The method comprising the steps of: storing equipment information representing each of said plurality of equipment in a computer database; serving content to an application executing on a user computer; automatically determining an adequacy of the protection device for protecting the process system using the stored equipment information; automatically generating protection assessment information using results from the assessment process; and storing some portion of said protection assessment information in said computer database or in another computer database.

The content includes some portion of said protection device information and some portion of said protection assessment information.

Still further provided is a method of performing a PSM assessment of a process system by using the assessment system and/or assessment method described above.

Also provided is a method of performing a PSM assessment of a process system using the above system and/or method.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE PREFERRED EMBODIMENTS

Process Safety Management (PSM) is critical to process plant design and operation. Process safety management includes all aspects of plant safety control. Pressure Relief Systems Management (PRSM) is a key component of process safety management. The management and auditing of pressure relief systems compliance is necessary for the fulfillment of OSHA PSM compliance requirements and industry insurance requirements. Note that throughout this document, the invention is described as the Evaluation System (or System or iPRSM™), whereas the system to be evaluated by the Evaluation System is known as the process system or the process system to be evaluated.

Figure 4:
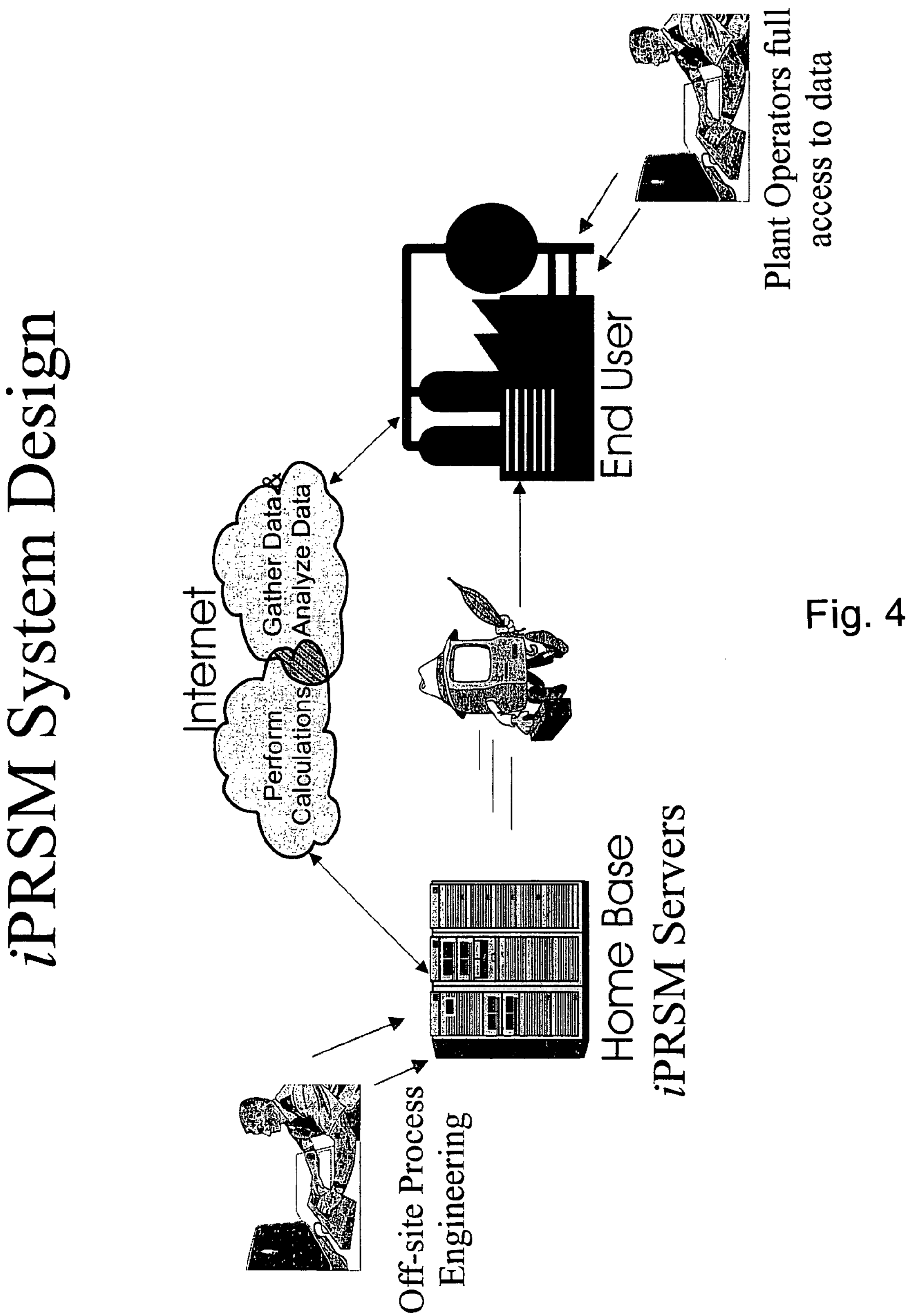
FIG. 4 is a diagram representing a possible implementation and use of the Evaluation System in a commercial embodiment, iPRSM™.

The invention is a method and/or system, including a computer program for running on a computer (hereinafter the "Evaluation System" or the "System"). The Evaluation System is a PRSM software application that can be utilized to help ensure that process plants operate under the protection of safe pressure relief systems at all times. The Evaluation System is used to evaluate and assess the safety and operation of a process system design (e.g., a process plant or subsystem thereof). In a proposed commercially available embodiment, shown in FIG. 4, the Evaluation System is to be called iPRSM™. FIG. 4 shows a top-level view of a preferred embodiment of the system in the context of its commercial use.

The Evaluation System, especially with its Web-centric technology in a preferred embodiment, allows plant personnel, auditors and engineering personnel instantaneous/concurrent access and analysis to data on any pressure relief system, from any location that has web connectivity. These personnel can quickly resolve problems from this ability, while offering the most thorough and systematic approach for the design, analysis, and documentation of new or existing pressure relief systems. From compliance to third party audits, this preferred solution offers an all-inclusive workflow and information management infrastructure that allows operating facilities to develop and maintain comprehensive models of their pressure relief and vapor disposal systems.

The Evaluation System addresses the proactive management of relief systems safety compliance according to best-practices principles, including the management of compliance-related as-operating data the ongoing verification of standards-based compliance and produces tasks for plant management reports for regulatory purposes. The net result can be safer plants and major cost savings due to the elimination of duplication of effort in plant data recording and tracking.

In its preferred embodiment, the System as implemented:

- Fulfills all OSHA CFR 29 1910.119 documentation requirements;
- Provides instantaneous access to real time and reliable data;
- Evaluates any pressure relief device—valves, rupture disks, conversation vents, vacuum breakers, emergency vents, etc.;
- Includes all hydraulic piping calculations;
- Includes engineering and catalog data for all major PRV manufacturers;
- Is integrated to a comprehensive thermo-physical property package;
- Import/Export capabilities to any platform
- Assists the practical needs of plant operators and application engineers; and
- Provides a reduction in cost/time/risk for management pressure relief design systems.

In its preferred embodiment, the Evaluation System allows centralized instant access, analysis and management to live data, at multiple locations, from anywhere in the world. It uses the web standard secure transport protocols (SSL encryptions & HTTPs) as all major financial institutions and secure e-commerce sites. Combined with complete user access controls, the System assures proper transaction management for concurrent users.

The System is Platform/Hardware Independent, and utilizes an Open architecture framework which allows the System to run on virtually any platform—Linux®, Unix®, Windows® or Macintosh®, for example.

The System can be implemented in a Standalone mode, on a LAN (e.g., an intranet), or on a WAN (e.g., the Internet). It can utilize any compliant browser, and can be implemented on any server platform (e.g., Windows, Linux, and Unix).

The system can utilize any commercially available database application or standard, and any hardware that is Windows based, Linux based, or Macintosh based. Furthermore the system will preferably utilize a Multi-user Architecture.

Pressure Relief Safety Management (PRSM) is a collaborative effort which supports concurrent access and Multi-tasking functions. It provides Access Control—who gets to do or see what.

The System is intended to be a tool for support of "Management of Change". Management of Change (MOC) is an activity to document modifications to a process, such as changes in plant equipment and/or design, for example. In most cases, it also refers to the actual document that is used to initiate a change. The Evaluation System preferred solution has an explicit workflow model that automatically provides an ideal "management of change" protocol. The System's MOC is used to initiate all modifications and becomes part of a documented workflow process, which defines the reason for the change, approvals and reviews, schedule or priority, and completion verification. This includes a comprehensive "signoff model" where all changes are digitally signed and recorded. It includes a stand-alone repository for equipment records, queue for management of changes and PHA follow-ups.

The System provides Data Import/Export Capability, which can link to any relational database by plug and play; spreadsheet templates can also be used to import/export data. It is designed to support collaborative work.

Furthermore, the preferred System supports remote auditing of plants by OSHA inspectors. The multi-user interface and web-based system allows multiple users to access information using full or read only access levels. This allows remote audit capability by inspectors or review and collaboration by colleagues.

The System also provides a "Centralized Document Repository" that can be stored in electronic format. In order to properly manage a plant's pressure relief system, engineers need to have access to a wide variety of information about all aspects of the plant itself. As complete a "paper trail" as possible should to be captured in digital format and stored as a component of the pressure relief systems management process. This information can then be provided to system users in both graphical and textual form.

Information tracking and archiving requirements are typically the same for both new and existing installations. The preferred System can support starting with a new installation and keeping complete records from the beginning than to track down or reconstruct this information after the fact. The System document repository will also allow the user to digitize legacy paper data and store the digitized data its corresponding equipment.

To properly manage a plant's Pressure Relief Systems and to ensure the validity of the audit process, the preferred System can capture, track and document all changes that are made to the plant.

The System preferably will capture and record, for example:

design data;
as-built data;
equipment data;
maintenance data;
inspection data; and
historic data.

The preferred System is designed to provide needed "Industry Documents" as required by ASME, API, OSHA, EPA, etc. "Site Reference Documents", including Physical Properties Database, Relief Safety Manuals, etc. will also be supported. Software Documents, such as an interactive user manual, for example, are also provided to aid the user of the preferred System.

The preferred System will also provide "Groupware Tools", which are important for administration and project management. Meetings, deadlines, and milestones which need to be available to broader community are supported.

Further supported by the preferred System are Internal Email Functions for keeping email and notes are part of groupware, useful to keep a historical perspective.

An "Internal Task Queue Manager" can also be provided with a single interface to manage all work on all tasks with other users from within the same program.

An Integration to "Flash Calculation Engine" and "Thermo Physical Properties System" is preferably provided. The preferred System has integrated the VMGThermo thermo physical property system from Virtual Materials Group, Inc., providing a leading position in thermo physical properties. Although the assumption of steady-state conditions proves adequate for most pressure relief system evaluations, the comprehensive flash calculation engine and mixture physical properties also allow accurate and creative solutions involving thermodynamics. The preferred System can also be integrated with any physical properties database via a spreadsheet interface approach.

The System also provides an "Architectural Model" which preferably ensures that all the pieces of equipment in all the protected systems are appropriate for their application, in light of all the failure scenarios including overpressure contingency scenarios that have been attributed for each of the protected systems in a plant.

Furthermore, the System user interface uses a hierarchy approach with these main components: "Plants", "Units", "Protected Systems", "Equipment", and "Overpressure Contingency Scenarios".

Plants are comprised of units and equipment assigned to units. Equipment provides protection, requires protection, both, or neither; and Equipment has fittings: inlet/outlet. Units are comprised of protected systems. Protected Systems are comprised of linked pieces of equipment, with system sketches portraying the protected systems. And Overpressure Contingencies are assigned to protected systems, and describe potential scenarios of concern to be evaluated by the System. Calculation Parameters are linked to specific equipment attributes, and "Associated Documents" are linked to equipment.

The System provides a "Protected System Model" which preferably ensures that all the pieces of equipment in all the protected systems are appropriate for their application. All the overpressure contingency scenarios that have been attributed for each of the protected systems in a plant are calculated and documented.

The preferred System also supports an "Equipment Abstraction Model" for supporting an arbitrary number of equipment types. The basic idea is that any kind of equipment can be linked to a protected system in one of four roles: protected, protecting, overpressure source, or ancillary.

A "Causes of Overpressure Abstraction Model" is also provided in the preferred embodiment, which includes all API "causes of overpressure scenarios" included as failure scenarios. The scenarios are deemed applicable or not, and will indicate which ones have been considered in the final relief study. There are many events which may cause the internal pressures to rise above mechanical design limits of a processing unit. The one common aspect of relief occurrences is that something has caused the balance of mass and energy entering and leaving a system to be disturbed to the point where the imbalance cannot be absorbed without the pressure rising above mechanical limits.

The preferred System will also support a "Maintenance Database" having maintenance records linked directly to equipment records.

The preferred System will further support an "Automated Workflow Model", which is an explicit workflow model which automatically manages the steps the user needs to follow to get the job done. This includes keeping track of who and when took each step (by person login id, for example).

The preferred System also support navigation through P&ID's or System Sketches, whereby a user can navigate to any piece of equipment (which has all associated calculations & documentation) by simply calling up a P&ID image and make a selection with the click of a mouse. Unit drawings and system sketches are directly linked to pieces of equipment.

A "Signoff Model" is a workflow model which includes signoff steps at each and records changes and signoffs as they are made. A "Permissions Model" protects data access and workflow steps and can be controlled by per-user access levels. "Revision Control" provides a History that is automatically managed and archived, with all changes electronically signed to record the user revisions. Closing the revision prohibiting any changes until a new revision is opened locks versions of protected system evaluations. Revision Control is controlled by access restriction to super users.

"Worksheets and Units" maintains computational integrity of the standards-base calculations and units. "Dependency Links" are used to link pieces of information not covered in the standards and workflow that influence decisions but that are not explicitly identified, and provide links to associated documents.

The preferred System supports various "Engineering Functions" as well. "Sizing for Pressure Relief Valves" includes sizing for conventional, bellows, and pilot operated relief valves, and includes ASME Sec I, III, VIII, and Non-Code, and supports Vapors, Gases, Steam, Liquid, 2phase The preferred System supports "On-Line Relief Valve Selection" which provides an on-line automated relief valve model configurator. This on-line configurator will simplify the selection process by selecting the optimum PRV for most ASME code or non-code applications. The preferred System will deliver the basic valve series, orifice, construction, materials (based on temperature and pressure), and inlet/outlet valve configuration. All selections have been generated to ensure all ASME, API and generally good engineering practices have been adhered to.

The preferred System also supports "Sizing for Rupture Disks" which includes all rupture disk devices, and includes rupture disk and holders. "On-Line Rupture Disk Selection" provides an on-line automated rupture model configurator. This on-line configurator will simplify the selection process by selecting the optimum PRV for most ASME code or non-code applications. The System will preferably deliver the basic disk type, size, material, disk holder, and maximum ratings. All selections have been generated to ensure all ASME, API and generally good engineering practices have been adhered to.

The preferred System also supports "Sizing for Atmospheric Conservation Vents", which includes pressure and vacuum vents, and pallet-weight and pilot operated vent breathers. "On-Line Conservation Vent Selection" is also supported, which provides an on-line automated conservation vent model configurator. This on-line configurator will simplify the selection process by selecting the optimum PRV for most ASME code or non-code applications. The System will deliver the basic valve series, orifice, construction, materials (based on temperature and pressure), and inlet/outlet valve configuration. All selections have been generated to ensure all ASME, API and generally good engineering practices have been adhered to.

The preferred System supports "Determination of Relief Requirements", which are conditions for which overpressure protection may be required for pressure vessels and low pressure storage tanks. The System also supports "Relief Load Calculations" which are systematic identification of all potential overpressure scenarios and relief load calculations are determined and associated with each piece of equipment. Specific equipment operating and design attributes or parameters are linked directly to relief scenario calculations ensuring ease of identification of impacts of operation, design, or hardware changes to ensure continuous overpressure protection adequacy.

Further supported are "Fire Vapor Generation" providing relief capacity due to effect of fire of the wetted surface of a liquid filled vessel; "Fire Gas Expansion", providing relief capacity due to effect of fire of the wetted surface of a gas filled vessel; and "Tube Rupture" (Heat Exchanger) providing capacity determination of a high pressure (tube rupture) stream over pressuring equipment on the low-pressure side of a heat exchanger; "Control Valve" providing capacity determination of an automatic control valve failure; "Pump Head Calculations" for determine pump head (capacity) calculation; and "Thermal Expansion" providing liquid/thermal expansion calculations Preferably, Inlet/Outlet Pipe Loss calculations are supported by providing a comprehensive library of inlet and outlet pipe fittings and contains parameters that identify the size and equivalent lengths or K coefficients. These are then used for computing the pressure profile for each section of piping. Force and moment calculations, Acoustical Induction Vibration calculations, and Noise level calculations are all supported. "All Overpressure Scenario Area Calculations" provide required area calculations (per individual OVP scenario) based on ASME/API requirements.

"API Omega Appendix D—2Phase Flow" provides two-phase relief calculations are based upon the Design Institute of Emergency Relief Systems (DIERS) methodologies. The API Omega model has been standardized in the System.

"Multiple Pressure Relief Valve Applications" which are some applications in which more that one relief valve is required to satisfy the required area, is preferably supported. "Layers of Protection Analysis" (LOPA) simplified risk assessment methods are also preferably supported.

Equipment Libraries: The System preferably supports an arbitrary number of equipment (or device) types. These individual pieces of equipment can be classified as" providing protection, requiring protection, or neither. All pieces of equipment can be assigned descriptive data that physically describes model, configuration, and identification. Equipment that is classified as "protected" or "protecting" also has defined variables that provide process data.

Supported equipment Includes: Block Valves; Control Valves; Compressors; Heat Exchangers; Relief Valves; Pumps; Rupture Disks; Tank Vents; Steam Turbines; and Vessels, for example.

"Relief Valve—NB Redbook" which contains information of National Board pressure relief certification data, is supported by the System, which contains a information of National Board pressure relief certification data including manufactures such as Farris, Consolidated, Crosby and Anderson Greenwood.

A "Pipe Fitting Catalog", which contains comprehensive library of inlet and outlet pipe fittings and standard pipe schedules, can also be supported. The forces imposed by external piping often affect pressure relief devices. These forces may be due to dead loads of piping components, loads induced by thermal expansion, and loads induced by momentum forces of fluid flow. The System has a comprehensive library of inlet and outlet pipe fittings and contains parameters that identify the size and equivalent lengths or K coefficients. These are then used for computing the pressure profile for each section of piping.

The preferred System provides a number of "Deliverables" that meet OSHA 29 CFR 1910.119 documentation guidelines. Equipment databases including all relevant parameters are created. The "Repository includes all digital documents, including: P&ID documentation; ISO piping drawings; CAD drawings of all relief devices inlet/outlet piping; CAD drawings of all flare header systems; and Original equipment datasheets, calculations, certifications.

Additional deliverables/results preferably include: Identification of all relief contingencies for all devices; quantification of required relief rates; orifice area calculations for all relief devices; inlet/outlet piping loss calculations for all devices; mechanical evaluation of applicable devices (noise level, reaction forces, acoustical vibration analysis); complete documentation package including all calculations, drawings, spec sheets, etc.; automatic updating of files according to changes in codes; accessibility and standardization of enterprise wide users; and a wide variety of HTML reports, all for aiding in the assessment of the process system being evaluated, and to aid auditing and review processes.

Figure 1:
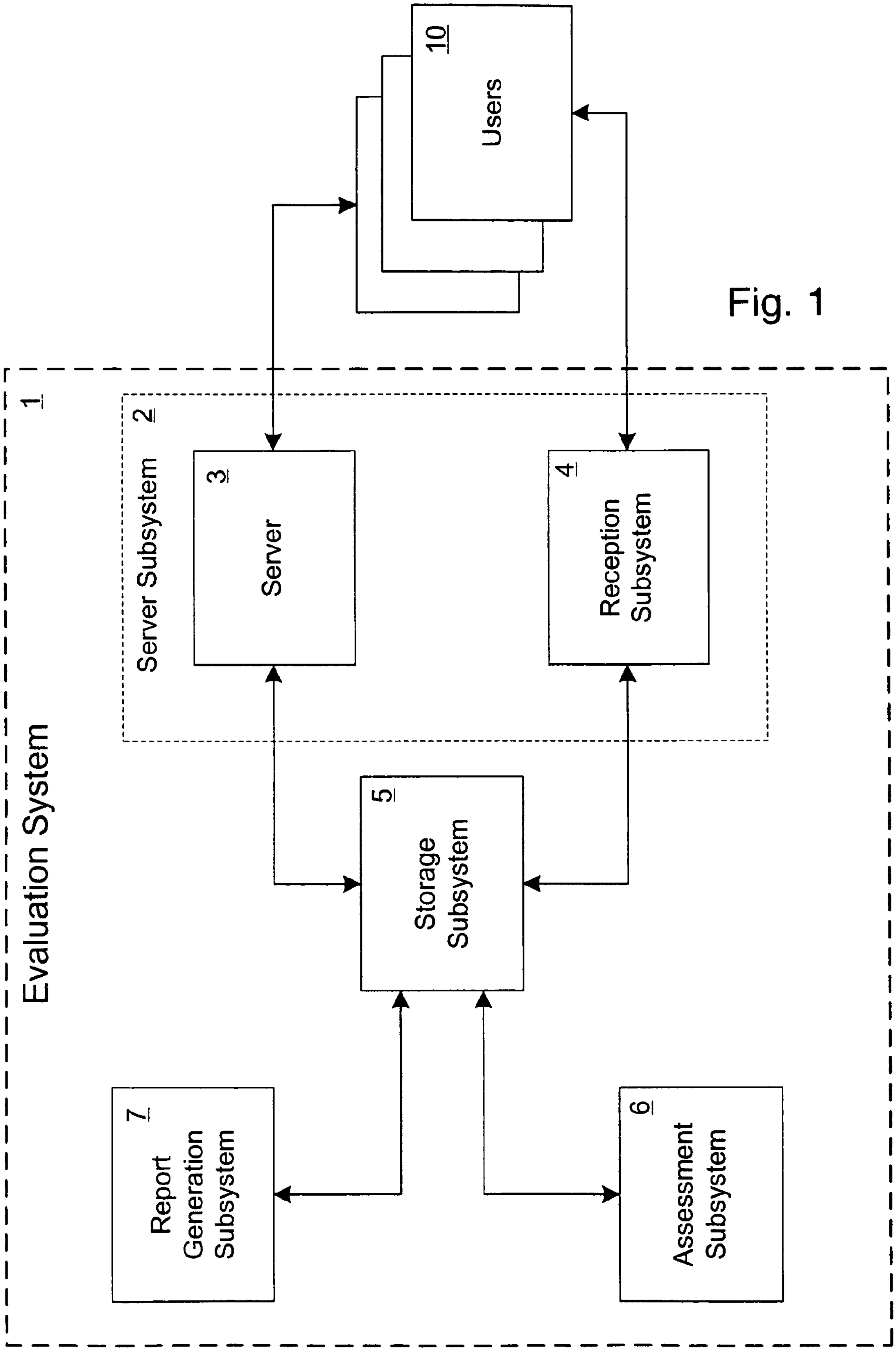
FIG. 1 shows a block diagram representing the Evaluation System.

Evaluation System Architecture:

FIG. 1 is a block diagram showing a simplified view of the Evaluation System 1 in the context of its use environment. In an abstract, generalized description, the System 1 is comprised of a server subsystem 2, which can be implemented, for example, by including a server 3 and a reception subsystem 4, although the server 3 and reception subsystem 4 may be combined into a single server application (running on a single computer, for example), as another example.

The Evaluation System 1 also comprises a storage subsystem 5 for storing data and equipment information described in more detail, both above and below. The storage subsystem can utilize any of a number of computer database applications (e.g., SQL, objected oriented databases, etc.) and storage devices (e.g., RAM, ROM, hard drives, CD ROMs, DVD, etc.)

The equipment information includes diverse information about various process equipment of the process system being assessed. Equipment drawings, maintenance information, manuals, relationships to other equipment, location, etc., examples of which are discussed throughout this disclosure, can all be included in the database(s).

The Evaluation System further comprises an assessment subsystem 6 for performing evaluations of the process system being examined. The assessment subsystem has the computer application code and hardware necessary to evaluate the process system being examined using the equipment information in light of various failure scenarios (many of which may be known for any given type of equipment).

The assessment subsystem will utilize some portion of the equipment database to perform the evaluation/assessment. Obviously, some information relating to the protection equipment being evaluated must be utilized. Furthermore, information about the equipment or subsystems being protected by the protection equipment being evaluated will also likely be utilized in the assessment. However, there may be portions of the process system being evaluated that are not relevant to the particular scenario or equipment being assessed (e.g., too remote, isolated, or no impact), and data related to that irrelevant portion may be ignored.

The Evaluation System 1 may further comprise a report generating subsystem 7 for generating reports useful in evaluating the process system, for performing audits, and for capturing the assessment results.

The Evaluation System 1 interacts with one or more users 10 via the server subsystem 2, which can include a server 3 and a reception subsystem 4. Via the server subsystem 2, the users 10 can receive data and information from the System 1 through the server 3, and provide data and information to the System 1 through the reception subsystem 4.

For example, the sever subsystem 2 may be implemented using a commercially available web server, which can be used to both send (i.e., serve) and receive information from a user. Thus, a single commercial application could be used to implement the server subsystem 2. However, for more complex operations, the various subsystems could be distributed across a number of computers, each running one or more applications to support the allocated subsystem.

Similarly, the report generation subsystem 7 and/or the assessment subsystem 6 could be distributed across multiple computers, implemented on the same computer, or combined with the storage subsystem 5 and server subsystem 2 on a single computer. The software of the Computer Program Listing Appendix contains examples of code for implementing the System, including the report generation subsystem 7 and the assessment subsystem 6.

The storage subsystem 5 can utilize a custom or commercially available database application running on one or more dedicated, or shared, computers. The data can be stored on any of a number of storage device, including disc arrays, disc drives, RAM, ROM, CD ROMs, DVD ROMs, tape, or any other medium appropriate for electronic data storage.

Figure 2:
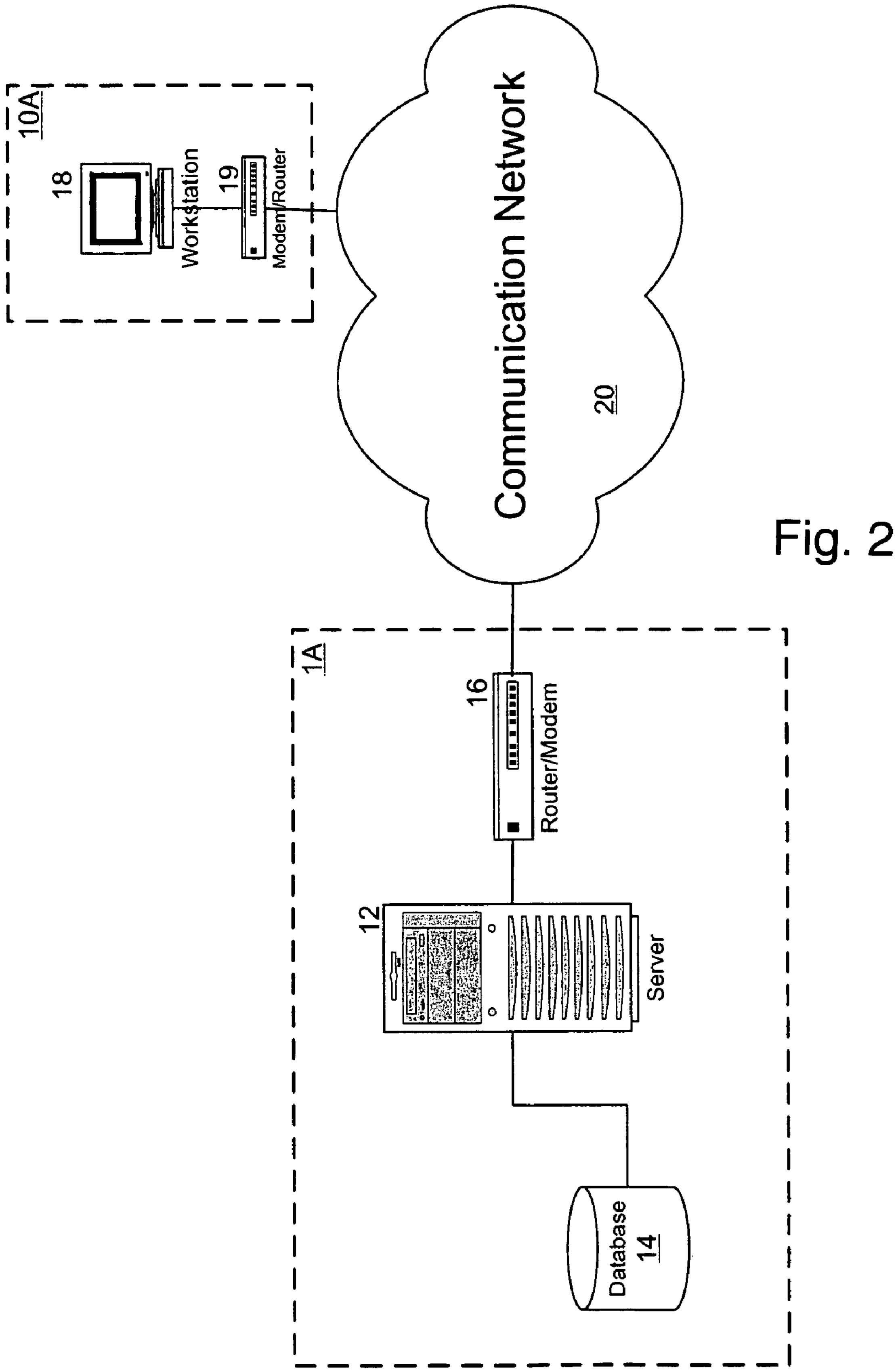
FIG. 2 is a schematic showing a simple embodiment of the Evaluation System.

FIG. 2 shows an example implementation 1A of the Evaluation System 1, in one of its simplest forms. The system 1A comprises a server 12, a database 14, and a router/modem 16 to connect to a public communications network 20. A user 10A, utilizing a workstation 18, is also connected to the communications network via a router/modem 19, for example. In this implementation, the server 12, along with the database 14 and router/modem 16 and the appropriate software, implement all of the subsystem functions of the System 1 by running various application programs on the server 12 hardware, for example. Of course, the system 1A may also support additional users in a manner similar to that shown for user 10A, for example.

The preferred embodiment can utilize the Internet as the public communications network. However, other communications networks could be utilized, such as telephone networks, cellular networks, dedicated networks, cable TV networks, power lines, etc. Because of the ubiquitous nature of the Internet, a solution utilizing that diverse network (which can utilize many individual communications networks) is most appropriate at this time.

Figure 3:
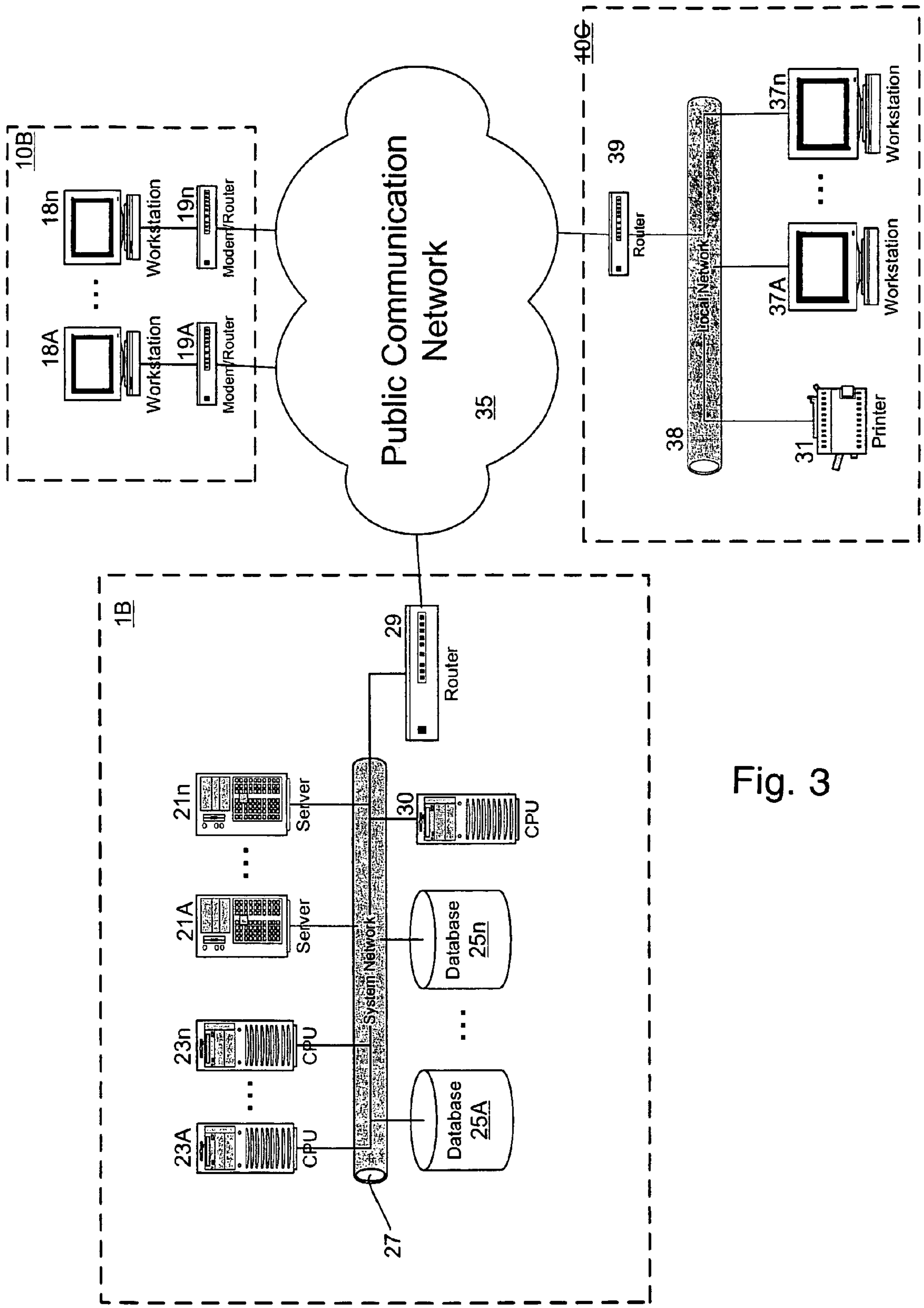
FIG. 3 is another schematic showing a more complex embodiment of the Evaluation System.

FIG. 3 shows a more complex implementation 1B of the system 1. In this system 1B, a plurality of servers 21A-21*n* can be utilized to implement the server subsystem 2 functions of FIG. 1. Further, a plurality of CPUs 23A-23*n* can be utilized to implement the assessment subsystem 6 functions of FIG. 1. A plurality of database storage devices 25A-25*n* can be used to implement the storage subsystem 5 functions of FIG. 1. And a CPU 30 and printer 31 can be used to implement the report generation subsystem 7 functions of FIG. 1, for example. Finally, a router 29 can be used to connect to a Public Communications Network 35 (such as the Internet, for example).

Note that, although FIG. 3 shows multiple servers 21, CPUs 23, and databases 25, any of these might be implemented on one or more computers in various configurations, as desired. As the number of users supported by the system 1C grows, additional hardware can be added to increase the capacity of the system.

Continuing to use FIG. 3 showing the more complex implementation 1B, a plurality of users can be supported in various configurations. For example, a plurality of users 10B operating single workstations 18A-18*n*, individually connected to the public communications network 35, can be supported. Furthermore, complex user networks can also be supported, as represented by the example shown in 10C. Of course, the Evaluation System of FIG. 1 might also be utilized to support users in the manner of 10B and 10C, as well.

Figure 5:
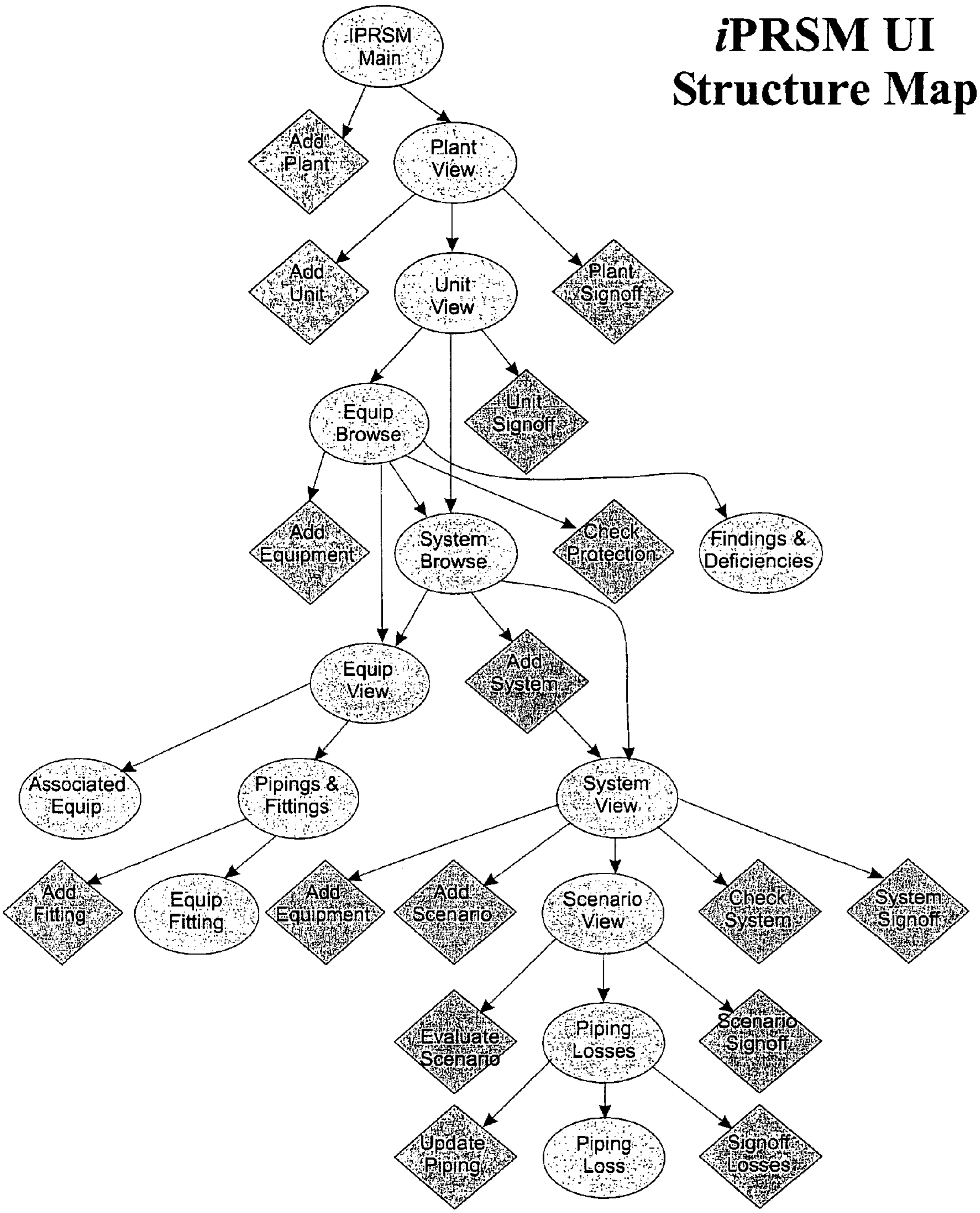
FIG. 5 is a structure map showing a structure of a commercial embodiment of the Evaluation System, iPRSM™.

FIG. 5 shows a structure map of the software design of a commercially contemplated version of the Evaluation System known as iPRSM™. This structure map represents the software contained in the Computer Program Listing Appendix, incorporated herein by reference.

For supporting multiple users, the Evaluation System will serve and receive information related to those users according to the interest and/or access rights of the individual user. Thus, different users may wish to view and/or evaluate different parts of the process system being evaluated. However, as equipment information is updated, any user wishing to view that information will then receive the updated information. Furthermore, assessment results and/or reports generated by one user may be viewable by another user. The different users may well be remotely located from each other.

It is clear that the implementations shown in FIGS. 2 and 3 are merely representative of two example system designs. There are numerous other possible hardware implementations of the system functionality that fall within the scope of the invention and the claims.

The Evaluation System is preferably implemented as a web-based application available over the Internet, using various scripting or dedicated applications to provide added benefit (including assessment capability, for example). The Evaluation System can preferably utilize a commercially available web browser to connect to a database over a LAN or Internet connection. In many ways it acts like most web sites, with web pages that can be opened with hyperlinks ("links") to additional web pages.

The pages that are viewed are composed of data that resides in one or more database storage devices, and is prepared for the user each time the user visits a page. There are special links that perform various operations with that data, which may display a new page, or refresh the view of a current page.

The Evaluation System served data can preferably be used by any industry standards-compliant browser in default configuration having JavaScript, cookies, and popup windows enabled.

The Evaluation System preferably uses JavaScript for its controls, and the Evaluation System uses a temporary cookie to manage user interactions throughout the application. This cookie is not retained when the user closes a browser. The Evaluation System also uses pop-up windows for its transactions with the database, and for various small pages. Any "ad-blocking" software that traps pop-up windows should be disabled for proper operation.

A LAN/Internet connection, preferably a broadband-quality connection, is recommended. Third-party plug-ins may be utilized along with the web browser. Examples of such plug-ins are Microsoft Word, Excel, and Adobe Acrobat.

The Evaluation System in a preferred embodiment can be used to manage sensitive data that should adhere to strict standards for correctness and completeness. It is designed to safely and securely use a public medium: web pages over the Internet or over a LAN. To deliver a secured database system over a public medium the Evaluation System utilizes best practices security features, including Login access, requiring a Login Id and Password distributed by a system Administrator. Without a valid ID and password, visitors to the Evaluation System will be able to view only the Login page and several purely informational pages.

Figure 6A:
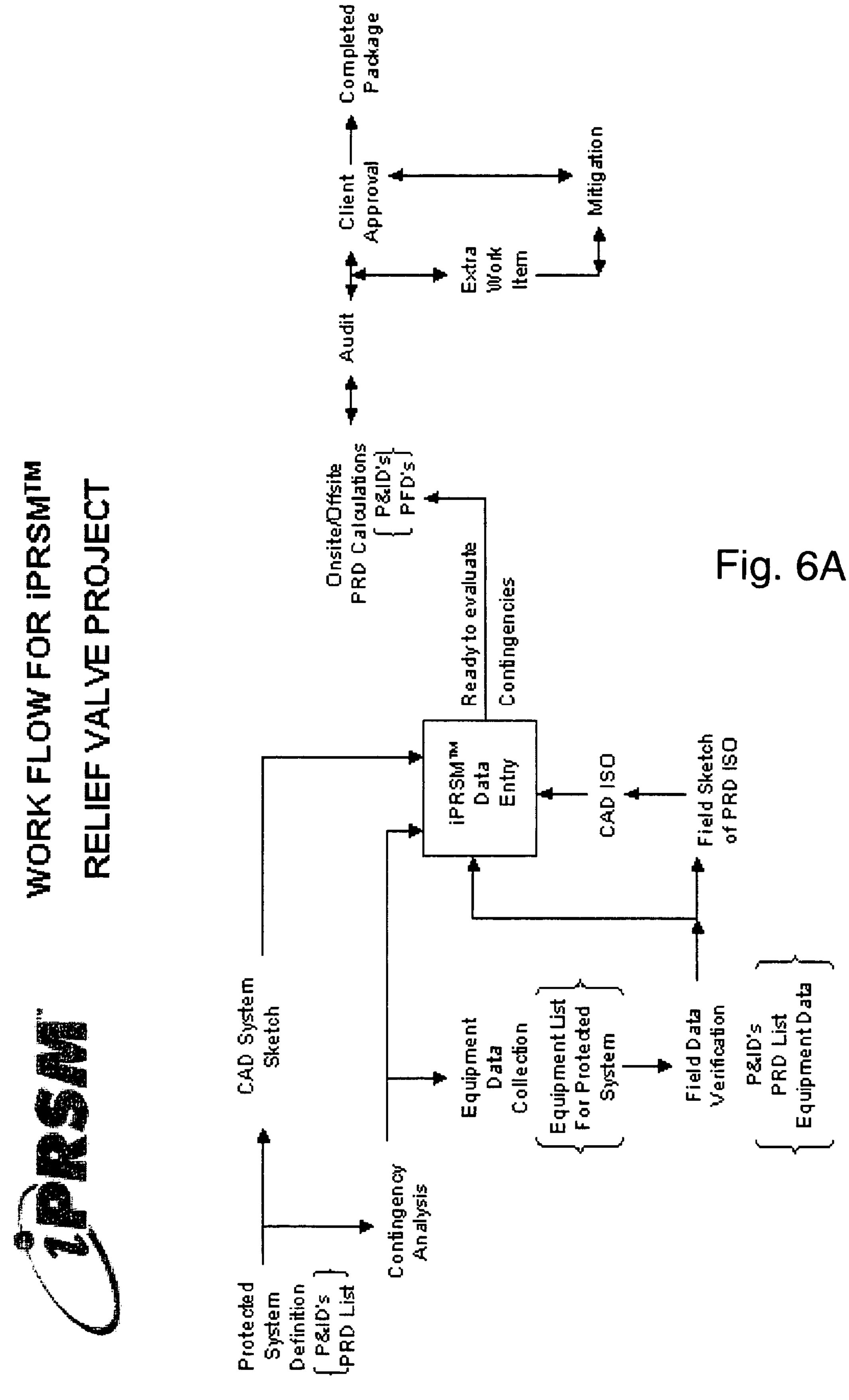
FIG. 6*a* is a work flow diagram for a Relief Valve project as a commercially available embodiment of the iPRSM™ system might be used.
Figure 6B:
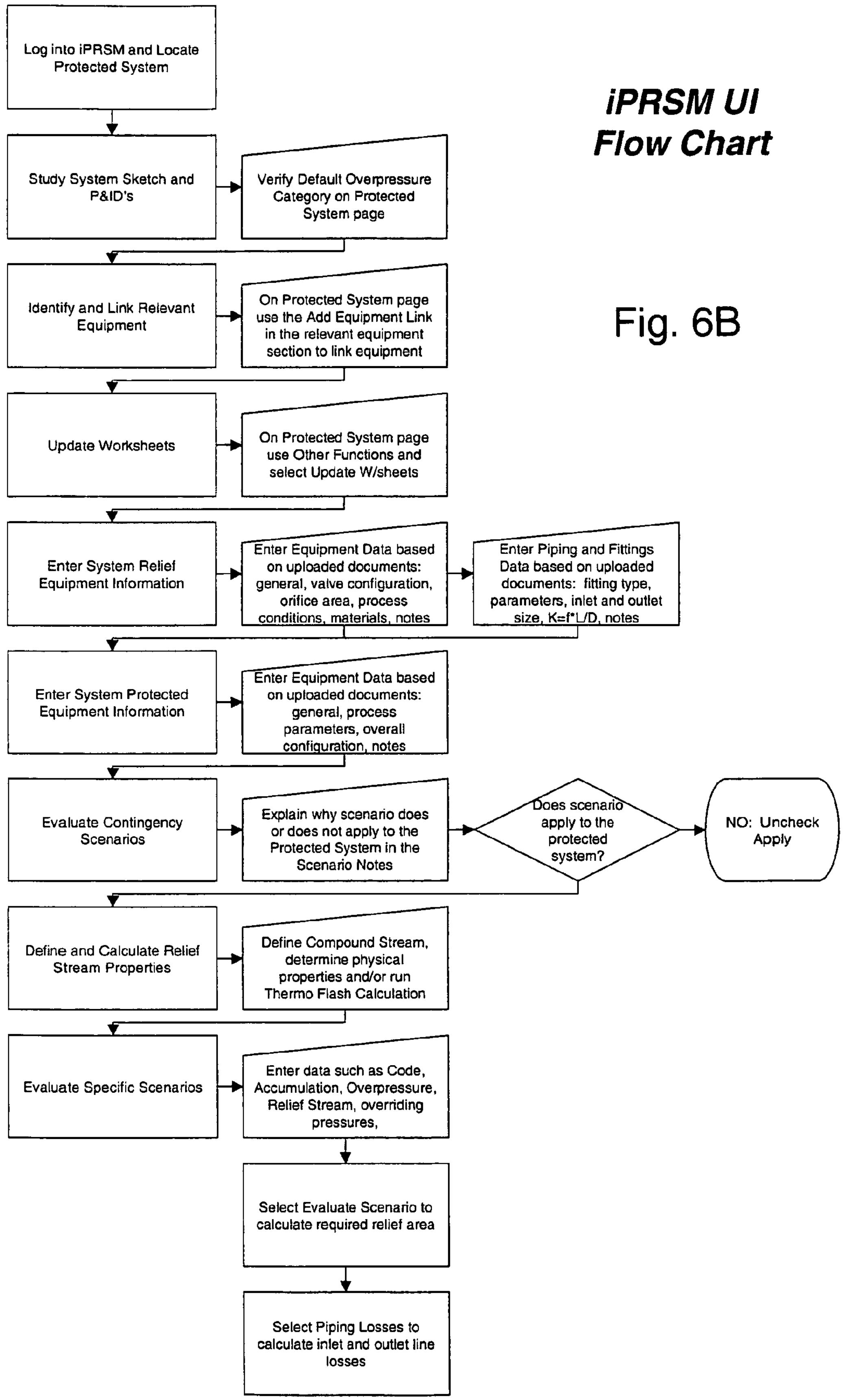
FIG. 6*b* is a Flow Chart showing an implementation of a commercially available embodiment, iPRSM™, might be utilized for performing an evaluation.

FIGS. 6*a* and 6*b* are representations of the use of the Evaluation System to evaluate a process system. FIG. 6*a* shows a workflow for such an evaluation process. FIG. 6*b* is a flow chart describing the evaluation process in more detail. Note that at some point, all of the necessary equipment information describing the process system must be properly entered into the Evaluation System database. Equipment lists and tool sets provided by the System support this task, although customized equipment can also be entered.

Figure 7:
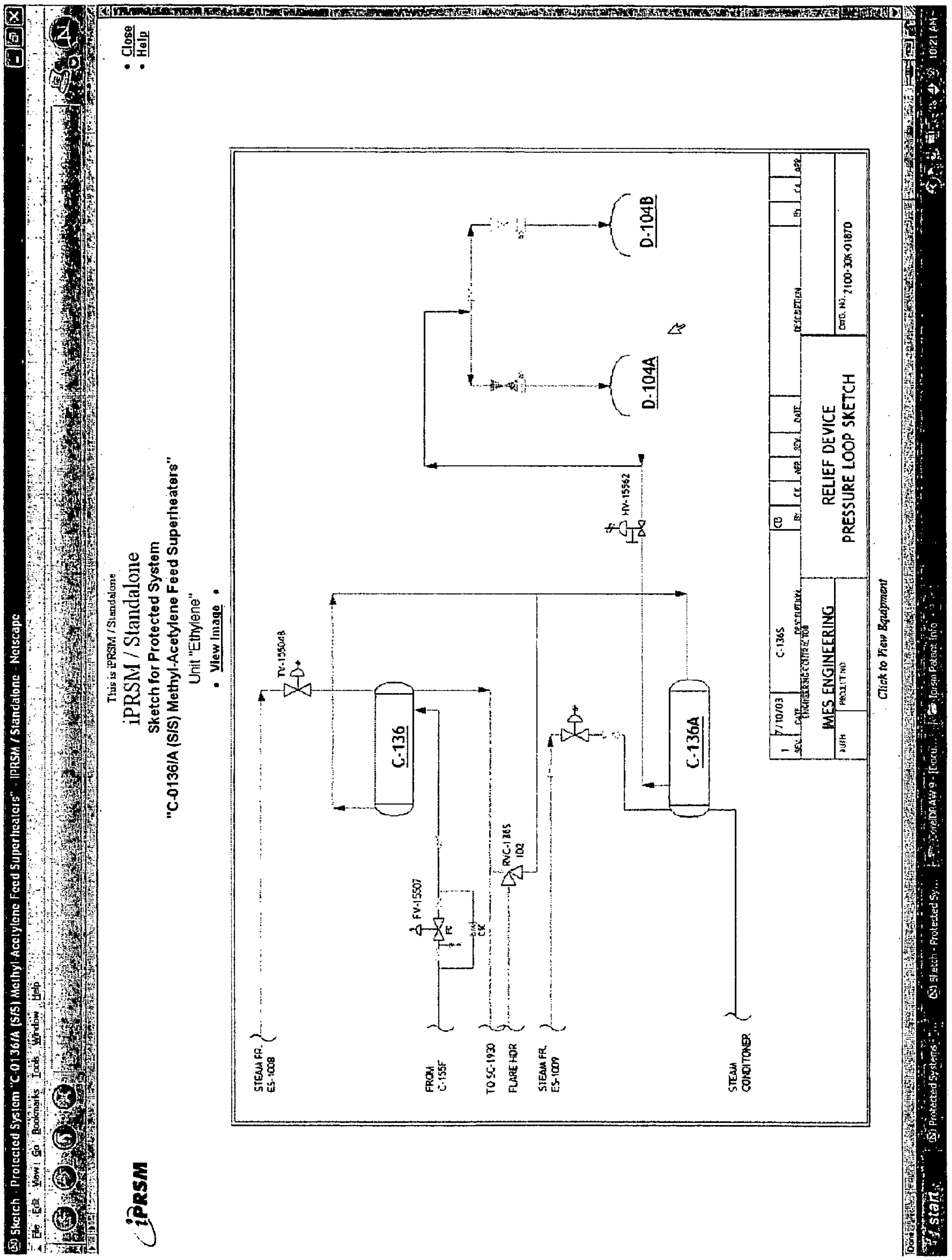
FIG. 7 is a screen shot of a commercially available embodiment, iPRSM™, showing a schematic of a process system being evaluated.

FIG. 7 shows a screen shot of a schematic diagram of part of an example process system to be evaluated by the Evaluation System.

The Evaluation System includes an equipment database and a scenarios database, allowing an engineer to input process specific information to properly determine suitable overpressure relief for that process. The engineer has the option to design or evaluate a single relief (failure) scenario or multiple relief scenarios based on the specifics of that particular process. From a design standpoint, the engineer must input equipment information and scenario information pertaining to the pieces of equipment in the process, the process conditions, the type and number of relief devices desired, the potential causes of overpressure, and the materials involved in the process. Once entered, the data enables the System to determine the proper communication between data within the database to perform the appropriate calculations to determine the size of the relief system (and/or devices) needed to protect against overpressure from the potential causes thereof.

From an evaluation, or auditing standpoint, the Evaluation System supports evaluating current pressure relief systems to ensure that changes, made or proposed, to the process have not exceeded the current relief capacity of the pressure relief system. In this manner, the engineer proceeds by selecting the portion of the relief system being evaluated by entering identifying numbers of the proper relief devices, and entering information pertaining to the equipment in the process, the process conditions, the potential causes of overpressure, and the materials involved in the process. The Evaluation System again uses this information to select the appropriate equations and determine a relief capacity and an area required for said capacity from the selected equations. These values can then be compared by the engineer to the equivalent values of the devices currently in place.

Lists of equipment, including relief devices, and causes of overpressure, are all input into the Evaluation System (or provided as part of an Evaluation System tool set). Pressure relief valves and rupture disks, for example, those manufactured by Curtiss-Wright Flow Control Corporation ("Curtiss-Wright") or its predecessors, are included in a relief devices list, and each relief device in that list is linked with information pertaining to the physical properties of the relief device. Furthermore, devices produced by manufacturers other than Curtiss-Wright can also be engineered and evaluated using the Evaluation System by inputting a manufacturer specific identification code for the appropriate pressure relief device in the relief devices list, and entering the appropriate parameters and descriptions, if necessary.

The causes of overpressure list in the Evaluation System includes causes of overpressure that are known to commonly occur in a processing facility, and aid in determining the failure scenarios and their results. Engineers using the Evaluation System are presented with the option of selecting from an Evaluation System database the causes that may potentially occur in a particular process. Once the causes of overpressure are selected, the Evaluation System can initiate communication between the causes of overpressure list and the equipment list to calculate the expected relief load capacity. From this expected relief load capacity, the Evaluation System can properly determine the size of the overpressure relief devices necessary to safely protect against equipment failure due to over pressurization.

The relief devices for a plant must be installed in a process with sufficient inlet and outlet piping capacity to safely accommodate the simultaneous overpressure of a plurality of pieces of equipment. An engineer can use the Evaluation System to determine the inlet and outlet piping necessary for the relief scenario selected. Accordingly, the Evaluation System provides the tools to allow an engineer to quickly and safely design or evaluate the relief capabilities associated with production processes.

Furthermore, the Evaluation System preferably utilizes an object-oriented database structure.

The goal of Pressure Relief Systems Management is to ensure that plants are operating under the protection of safe pressure relief systems at all times. The key to achieving this goal is the proactive management of relief systems safety compliance according to best-practices principles, including the management of compliance-related as-operating data and the ongoing verification of standards-based compliance.

A successful PRSM process according to the invention produces tasks for plant management, reports for regulatory purposes, and safer plants. To ensure that a plant remains compliant over time, the Evaluation System can aid in:

conducting periodic relief systems audits;

submitting audit reports at appropriate intervals;

correcting instances of non-compliance identified by audits; and performing "what-if" evaluations that compare the current audit with hypothetical audits performed using newer or older versions of the calculation worksheets.

Those who participate in proactive PRSM processes using the System can faithfully implement the engineering standards that the engineer utilizes on for the determination of compliance. The System should support the participants collaborative opportunities and respect their workflow management needs. It must also implement best practices from software engineering, especially in the areas of security and multi-user database access protocols. The Evaluation System can provide this support for PRSM. The preferable aspects of the Evaluation System are:

Standards Compliance: the Evaluation System preferably uses ASME and API standards-based evaluation of possible overpressure contingencies. Hazard analysis is equipment-based, rather than relief-device-based, to ensure that all equipment is properly protected.

Calculation Worksheets: the Evaluation System can contain a complete set of ASME/API standards-based engineering worksheets for accurate consistent calculation of relief flow rates, orifice areas, inlet/outlet piping losses. Installations that are inconsistent with industry standards and codes can be flagged and identified. Calculation worksheets are under version control, and every evaluation is recorded with respect to the version of the worksheet used to perform the evaluation.

Traceability: the Evaluation System aids the user to establishing dependency links between the parameters used to perform a hazard analysis on a piece of equipment and other worksheets and equipment characteristics that were used to determine those parameters. This means that decisions can then be traced back to their assumptions. If an assumption changes, then analyses based on these assumptions are flagged by the Evaluation System as needing to be re-examined for protection implications. Other system features include:

Import/Export Data can be imported/exported between the Evaluation System and other tools, such as flare header design tools, or inspection and maintenance data systems.

Standards Tracking: the Evaluation System maintains historical versions of standards calculation worksheets. When a standard changes, the impact of the proposed changes can be evaluated relative to the current hazard analysis.

Evergreen Data Management: the Evaluation System enables consolidated evergreen data management to maintain a current picture of operations in order to minimize hazards and re-evaluation errors and costs.

Workflow Support can be provided for:

Allowing selection of reasonable tasks;

Preventing selection of unreasonable tasks; and

Recording signoffs for appropriate tasks.

History Tracking and Archiving can be provided for:

Recording changes and signoffs as they are made;

Users can make queries such as who changed and who approved what, when, and why;

Reporting for summarizing changes over specified time periods; and

Maintaining Prior versions of data for review and change comparison.

Evaluation System Collaboration can be:

designed to support collaborative work;

support concurrent access by multiple users over a network;

support multi-tasking of a user's activities;

provide generic groupware tools such as task queues, discussion groups, and mailing lists; and can interface to other software tools.

As discussed in detail above, the Evaluation System is designed for multi-user web-based access using standard commodity browsers. This means that the Evaluation System can be used from any workstation with a standard browser without requiring the installation of any additional client software. The Evaluation System including its associated database can reside on a distinct server.

Control of access to pages, workflow, and database records can be controlled according to the privileges of the logged-in user. Because the preferred http protocol is connectionless, the Evaluation System can provide full support for server-side session and page instance data, with a secure login and session management scheme. To support multiple concurrent transactions, the Evaluation System can also provide automatic enforcement of end-to-end optimistic locking. This can be used to prevent concurrent users from taking action based on obsolete data, such as generating a report while other engineers are altering equipment data.

Because the Evaluation System's web applications are preferably transaction based, they can be made to fail safely. The Evaluation System can use a structured exception handling mechanism which ensures that if anything goes wrong during the processing of a transaction: (1) no changes are made to the database, and (2) the user is informed of the failure, and the failure is logged (along with relevant debugging information). From the perspective of the Evaluation System, it is better to fail correctly than to proceed wrongly. The Evaluation System can help minimizes technology risks by not relying on uncommon technology or technology that can be changed on a vendor's whim.

The Evaluation System can be used to help minimize the above identified risks as follows:

1. Evaluation System programs can be made to work with any standards-compliant web browser, such as Netscape Navigator, and Microsoft Internet Explorer, for example. Internet Explorer issued as the Evaluation System's principal test browser.
2. Evaluation System programs can be made to work with any CGI-compliant web server, in particular Microsoft IIS and Apache, for example. Apache is available on all Microsoft and Unix-like back ends and is one of the top web servers in use.
3. The Evaluation System includes its own database management system (DBMS), with full support for atomic transactions and referential integrity. Testing has shown that the Evaluation System DBMS is faster than an outboard DBMS for databases of the size required by a typical application. Alternatively, the Evaluation System can utilize any of the common DBMSs for its back-end database functions, including Postgres, Oracle, and DB2, as required, for example.

4. The Evaluation System also preferably has a real-time distributed transaction logging facility, which allows multiple (geographically dispersed) machines to keep hot-backup copies of the production database. In the event that the primary service disappears, the site administrator can simply point the domain name service to the next-level backup machine, and the Evaluation System will pick up from the point of the last successfully completed transaction.

The system was designed from the ground up with a best-practices evolvable architectural structure, and to provide an optimal set of deployment options to the application customer according to their budget and infrastructure needs. The following models are preferably implemented:

Plants & Units model: Equipment and protected systems are organized into a plants and units hierarchy. When there is a large amount of equipment involved, some sort of organization for access is beneficial.

Protected system model: The basic concept is that any kind of equipment can be linked to a protected system in one of four roles:

Protected,
protecting,
overpressure source, or
ancillary

The protected systems also have per-system data

Multiple Valves model: The protected system model preferably explicitly handles multiple valves.

Equipment abstraction model: the Evaluation System can support an arbitrary number of equipment types, including Protecting Equipment and Protected Equipment, for example.

Cause of Overpressure abstraction model: the Evaluation System can support an arbitrary number of overpressure types, each of which has its own flowchart.

Document database: A document database is preferably provided, wherein documents can link to plants, units, equipment, systems, and causes of overpressure.

Maintenance database: A maintenance database that links to equipment is preferably provided.

Workflow model: An explicit workflow model is preferably implemented that automatically manages the steps the user needs to follow to get the job done. This includes keeping track of who took each step (by person login id) and when.

Signoff model: The workflow model preferably includes signoff steps, and can keep track of who did each signoff and when.

Version Control model: A revisions database is preferably provided, linked to protected systems, for tracking versions of equipment, protected system, and causes of overpressure signoff.

Permissions model: Data access and workflow steps can be controlled by per-user access levels.

Worksheets and Units: Units handling is preferably provided. Engineering values know their units category and style, so any variable in valid style (such as inches, feet, or meters, and pounds or kilograms), can be looked, at but the underlying calculations are preferably always done in what engineers call "basis units", which is technically required by the standards.

Multi-user Concurrent Consistency is provided.

An Architectural model is provided including:

A Protected system model;
A Equipment abstraction model;
A Cause of Overpressure abstraction model;
A Document database;
A Maintenance database;
An Automated Workflow model;
A Signoff model;
A Version Control model;
A Permissions model;
Worksheets and Units;
An Engineering Worksheet Model, versions maintained (The worksheets, links, and workflow supports the overall process of PRD safety auditing;
Dependency links (all units, protected systems, equipment, calculations, documents);
Unique "workflow architecture"—Controls evaluation of worksheets;
A "State change" model—business object poster records last person who changed record and when, changes force object into state open;
An Automated Inlet/Outlet loss calculations Workflow Management; and
Multi-user/Concurrent Web access control.

Object Models: the Evaluation System provides a user interface for the manipulation of data relating to plants and the devices they contain, and for management of the workflow related to relief device compliance auditing. The data is structured according to a set of persistent classes, instances of which are stored in the database. The persistent objects are related according to the following schematic, which is described below.

PSM maintains data on one or more plants, such as a Greenwood Upstream plant or a Site #4 plant, for example. Each plant contains one or more processes, such as an Acetic Acid process and a Cellulose Fibre process, for example. Each process contains one or more protected systems, such as a Glycol Heater protected system and a Vapor Scrubber protected system, for example. Each protected system contains one or more devices, such as a Heat Exchanger and a Relief Valve (in a particular order), for example. In the field data previously studied, protected systems usually have an iso-piping drawing.

Each device typically belongs to one or more protected systems. For example, a heat exchanger can belong to separate input and output protected systems. Each device is of a particular type, such as compressor, pump, vessel, block valve, control valve, relief valve, heat exchanger, etc., for example. The device type determines the values that are associated with each device, either via user input or via connection to an upstream device, for example. The device type also determines the worksheet calculations and rules that are used to attempt to certify a device pursuant to compliance auditing (such as how to compute the required orifice area for a relief valve from the device operating values, for example).

Each protected system can have one or more hazard analysis scenarios, such as Cleaning and Fire, for example. Each scenario can have one or more hazard cases, such as Blocked Flow or Fire Vapor Generation, for example. Each type of hazard case determines the worksheet calculations and rules that are used to compute the derived values used for compliance auditing (such as required orifice area, for example), according to engineering standards that are applicable to the hazard case. Each hazard scenario determines summary values for all its cases (such as by using sum or maximum, for example). Each protected system determines summary values for all its hazard scenarios, and checks the relevant compliance rules from the engineering standards.

Devices can also have one or more maintenance records, which record the maintenance history of a device. This data can then be used during compliance auditing.

Audits can be conducted on plants, processes, or protected systems. Each audit maintains information on the compliance status of all the devices under purview by the audit. Each audit guides the auditors through the workflow required to perform inspections, certify the results, and sign-off the audit.

Whenever an audit is moved to a new workflow status, a history record is kept on who made the change, when, and why. In addition, when an audit status is changed, copies of all the PSM reports relevant to the status changed can be saved in the document repository in non-proprietary HTML format, for example, so they may be viewed at any time in the future.

Evaluation System Operation and Usage of a Preferred Embodiment

This section describes the various functions and features of the Evaluation System in the perspective of user interactions and operations for the preferred embodiment. As such, this section both describes various input/output capabilities along with the corresponding Evaluation System functionality.

Note that although the system has been described utilizing various subsystems, as shown in FIG. 1, the actual organization of the various functions below is somewhat arbitrary. The subsystems shown FIG. 1 are used for convenient categorization and to utilize commercially available applications, but the actual implementation of these functions into hardware and/or software is not critical, as various hardware and software configurations can be utilized to achieve the same results, and some combinations of functions may be implemented across the boundaries shown in FIG. 1.

Accordingly, referring to FIG. 1, and using the preferred embodiment, the server 3 is utilized to provide information, via the Internet, to a web browser application running on a user computer. The user then provides updated information to the System 1 using the browser running on the user computer, via the Internet, to the reception subsystem 4, which then routes the information to the storage subsystem for storing. Additional subsystems (e.g., report generation 7 and/or assessment 6) may also get the updated information, and/or various user commands, via the reception subsystem. Thus, the user can control various aspects of the system, and add updated information, as described in more detail, below.

Figure 8A:
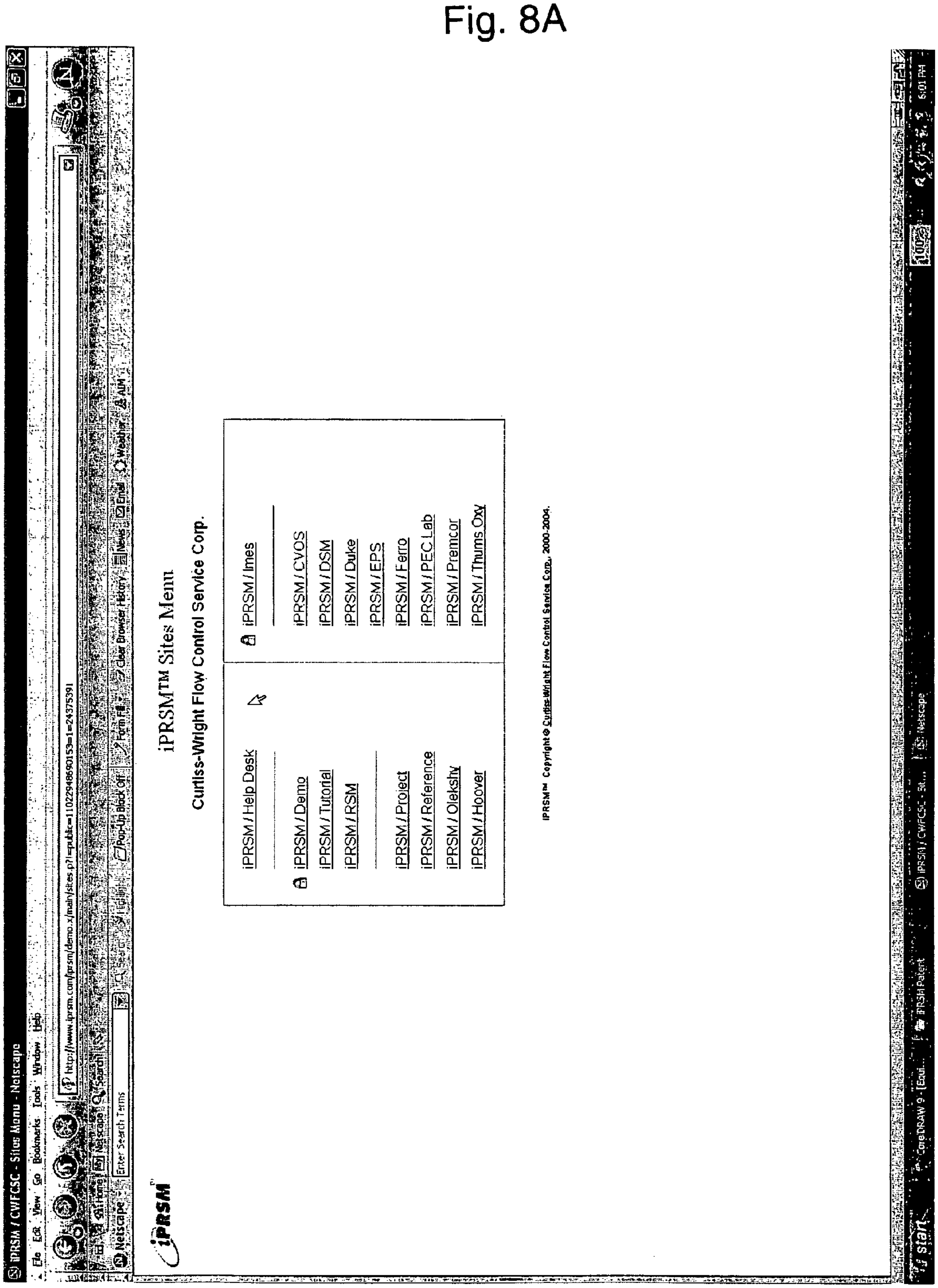
FIGS. 8A through 8X are representative screen shots as displayed to a user of a preferred embodiment of the invention, iPRSM™.
Figure 8B:
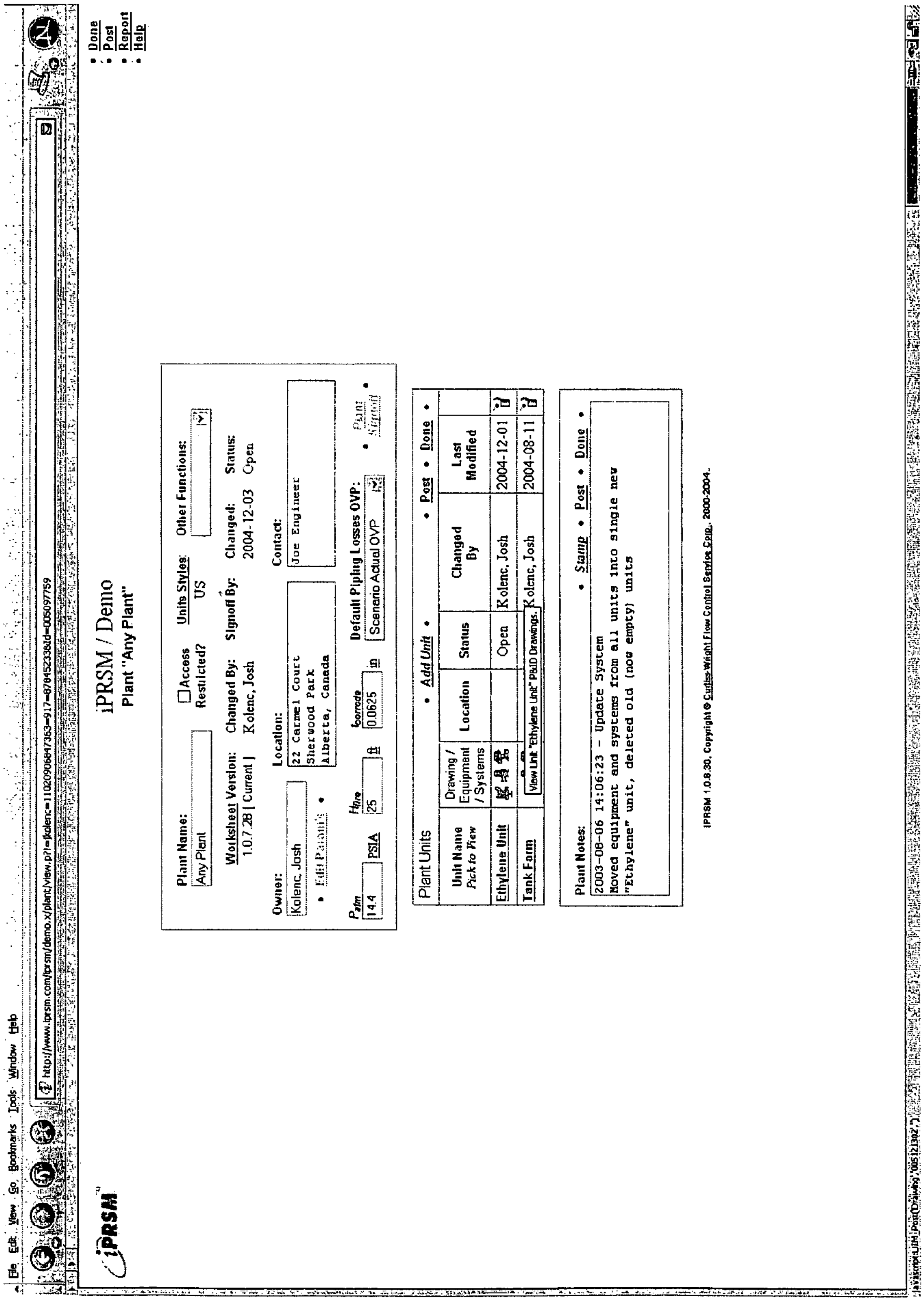
Figure 8C:
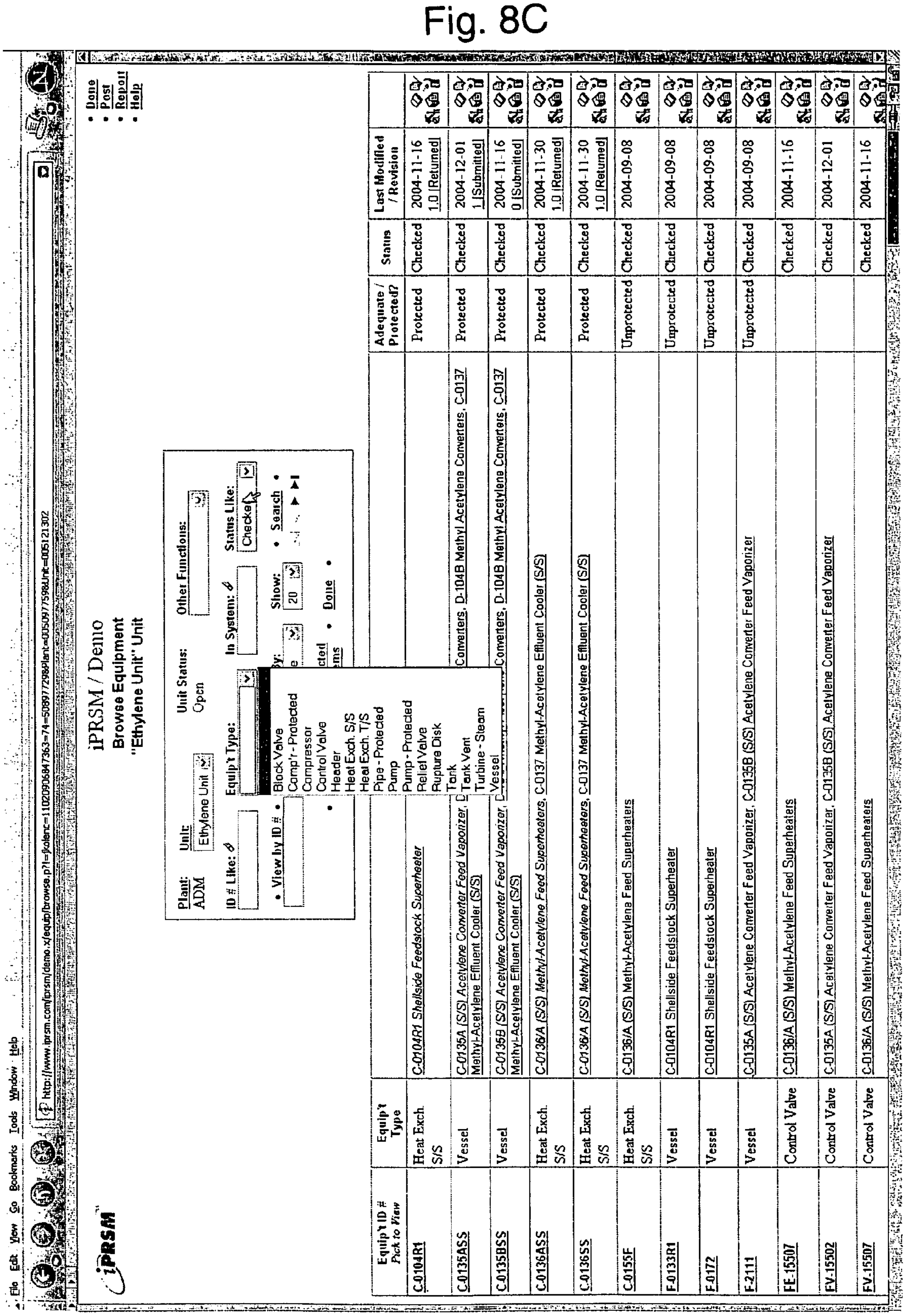
Figure 8D:
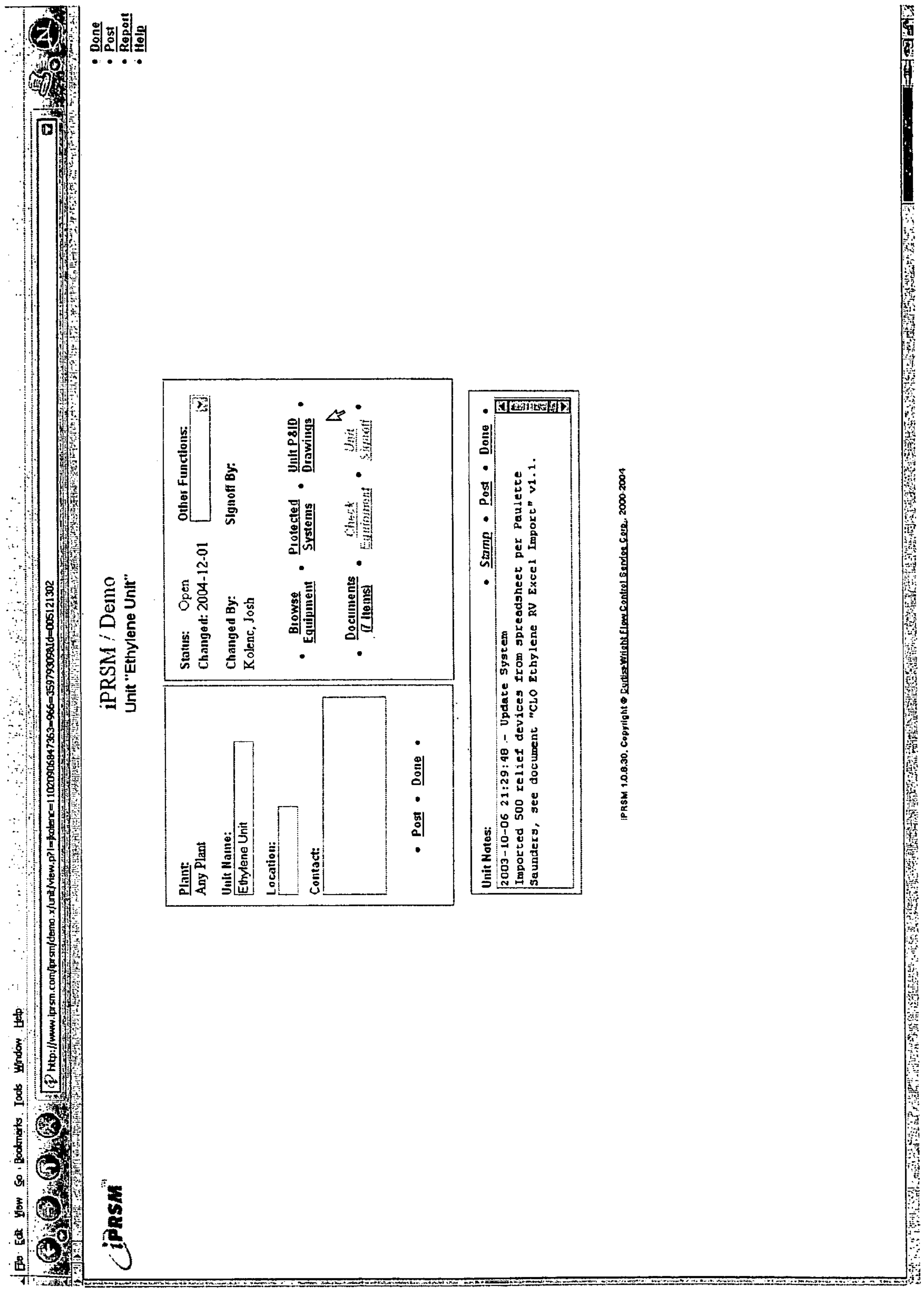
Figure 8E:
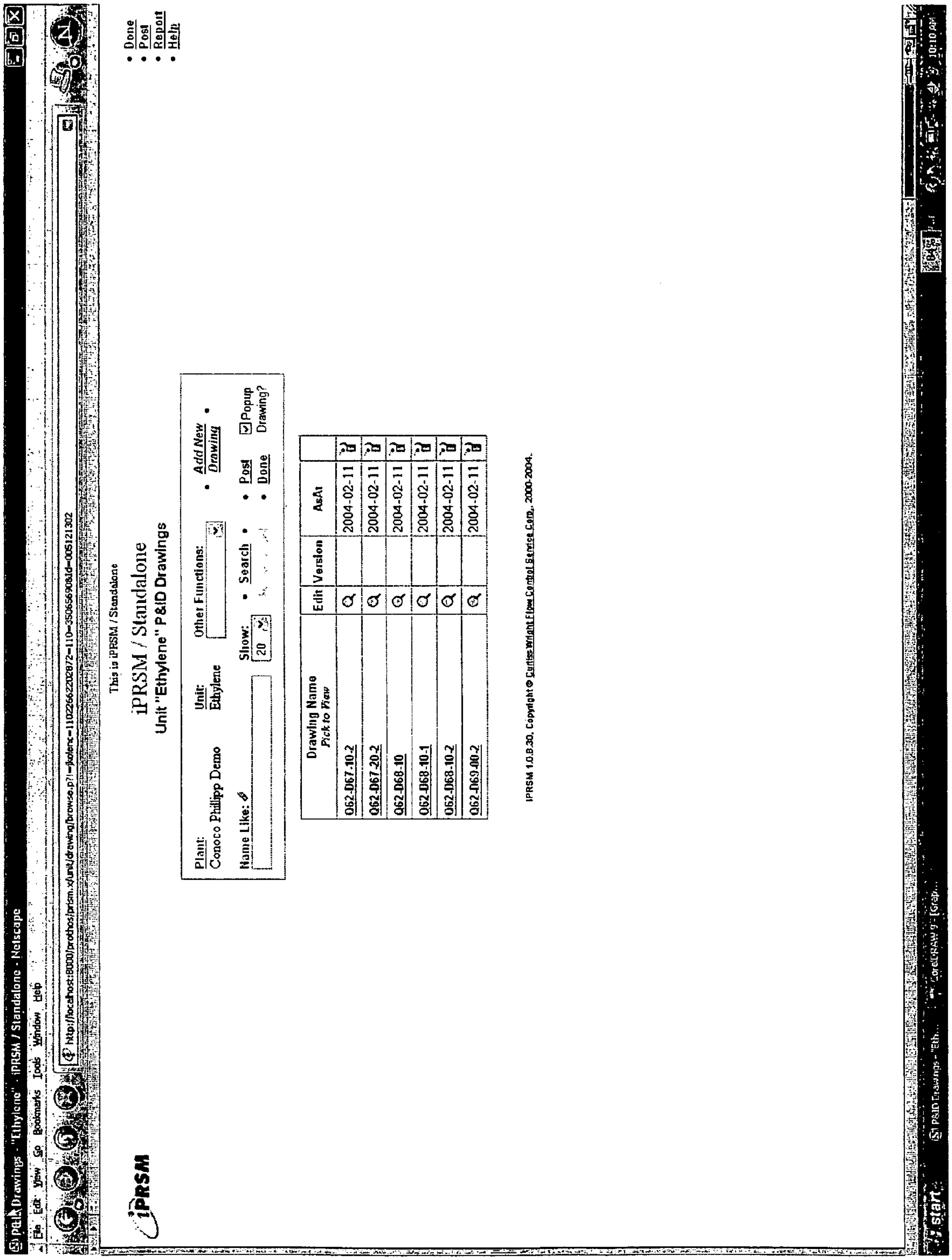
Figure 8F:
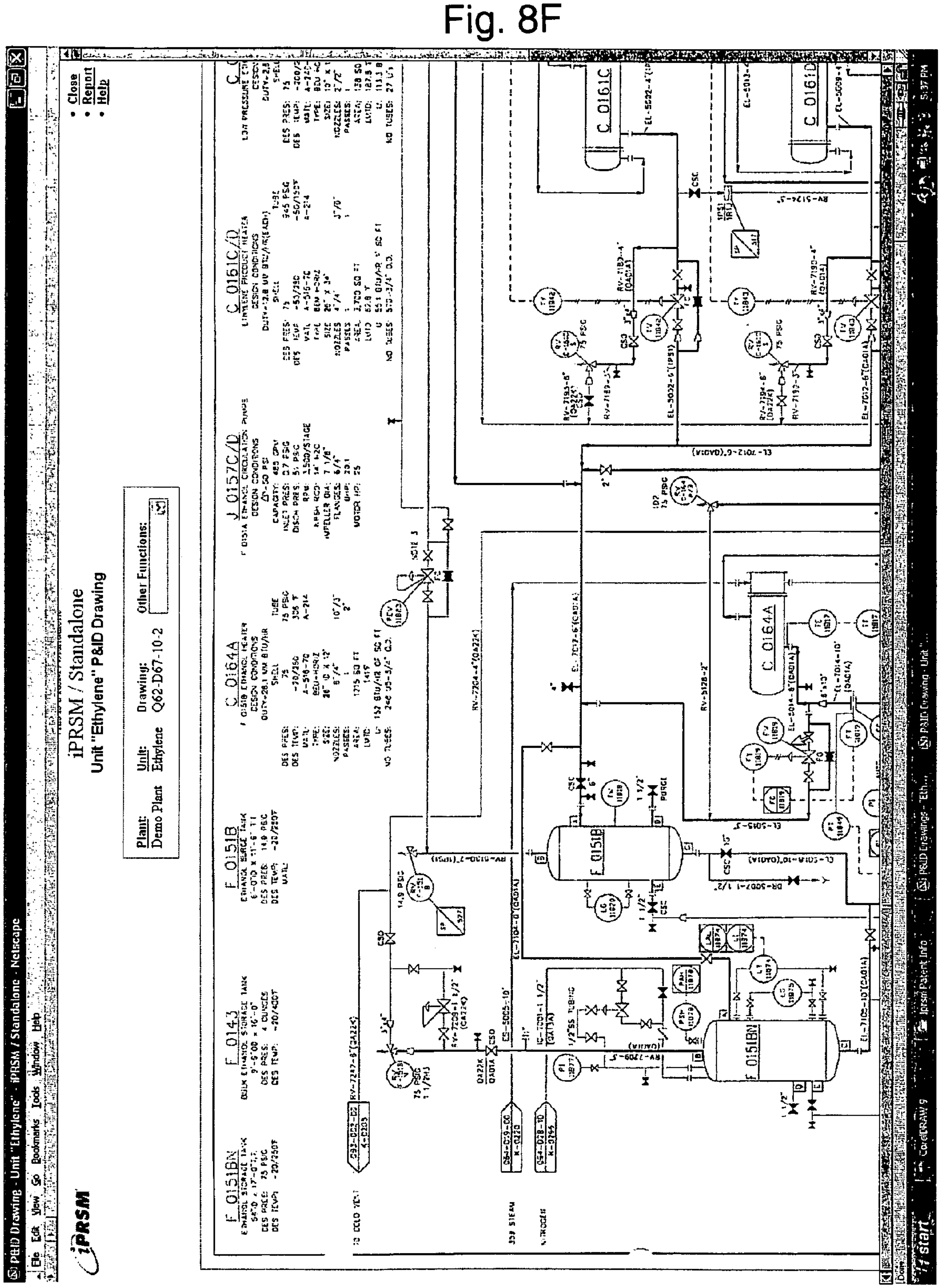
Figure 8G:
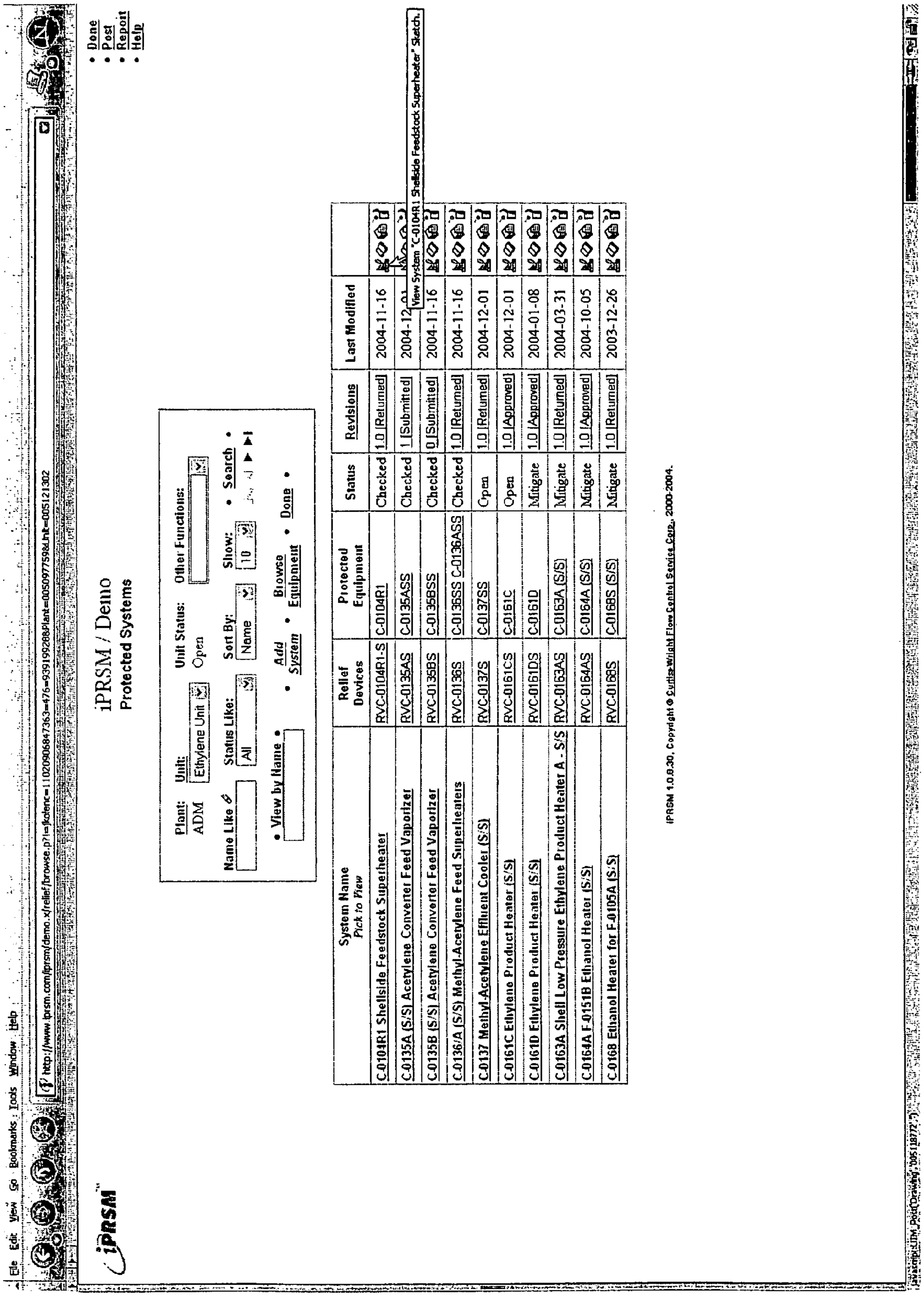
Figure 8H:
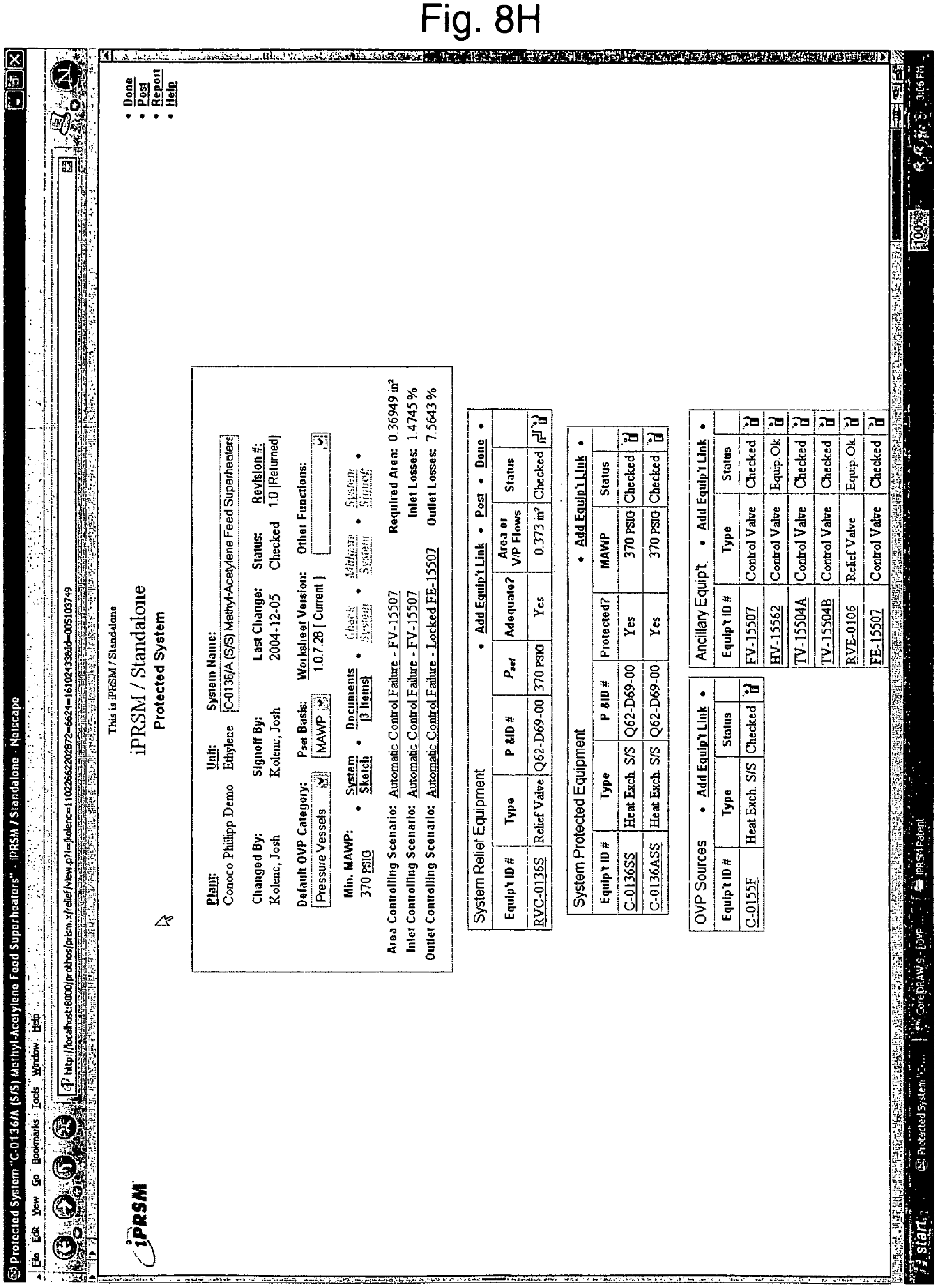
Figure 8J:
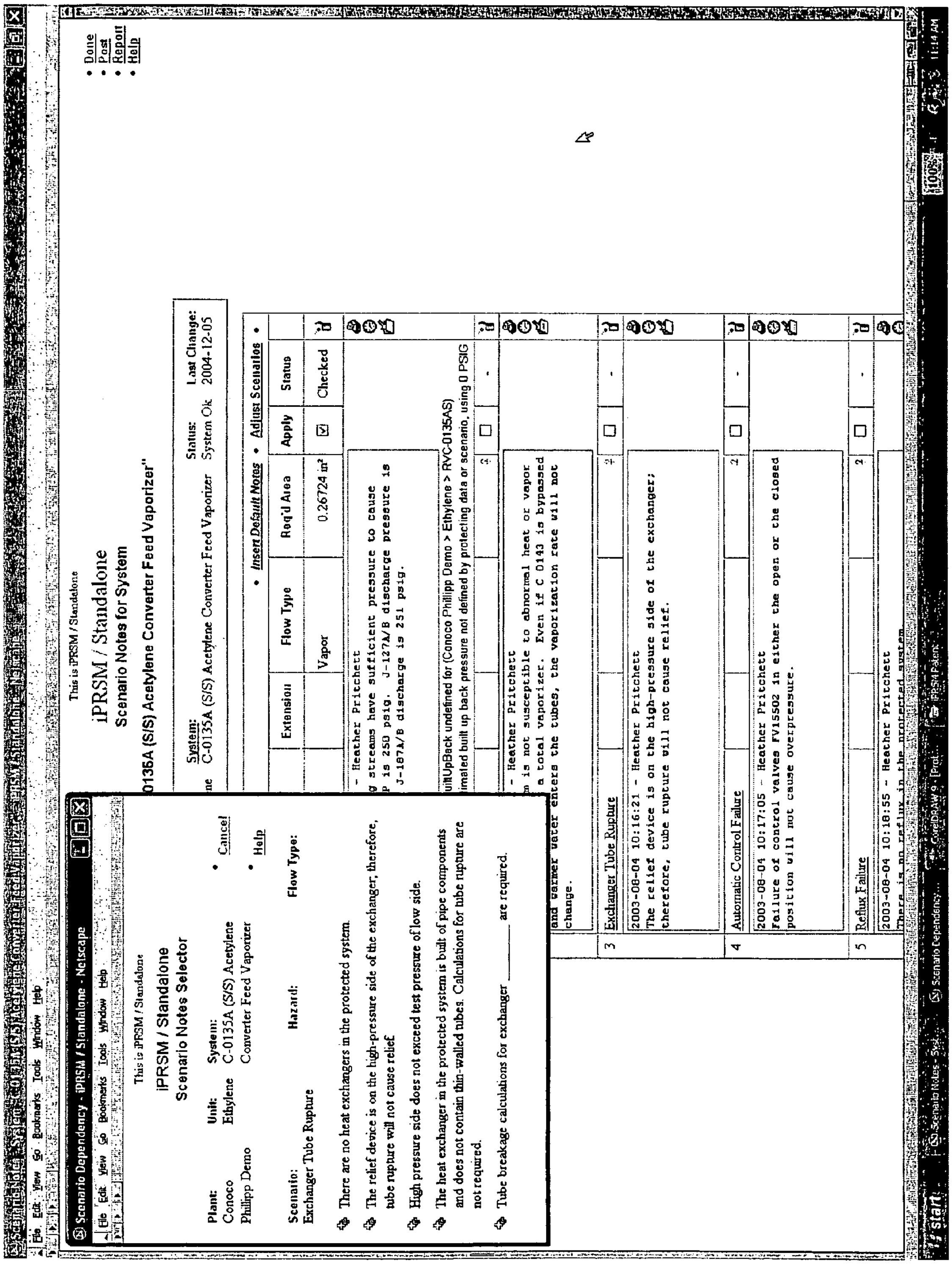
Figure 8K:
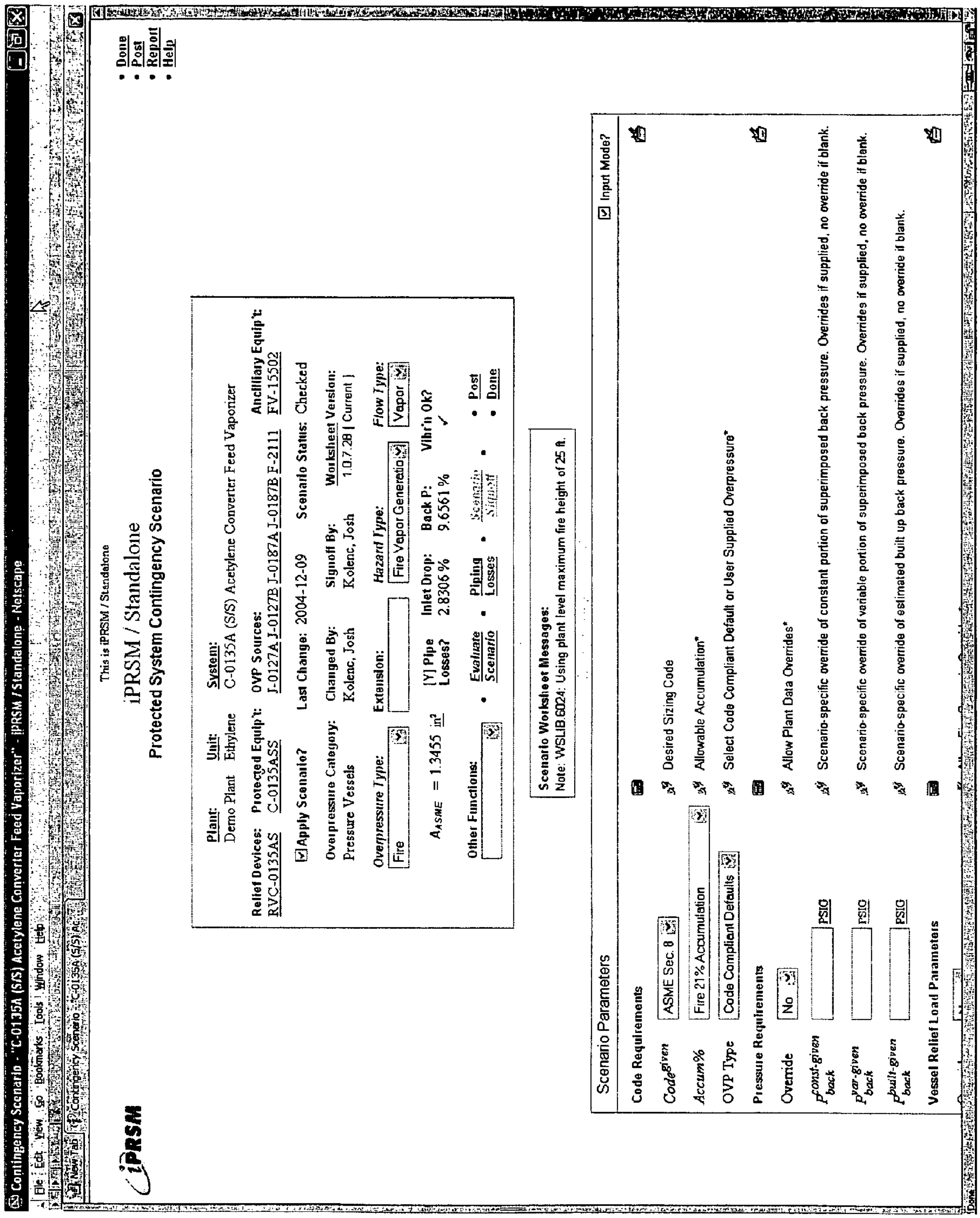
Figure 8L:
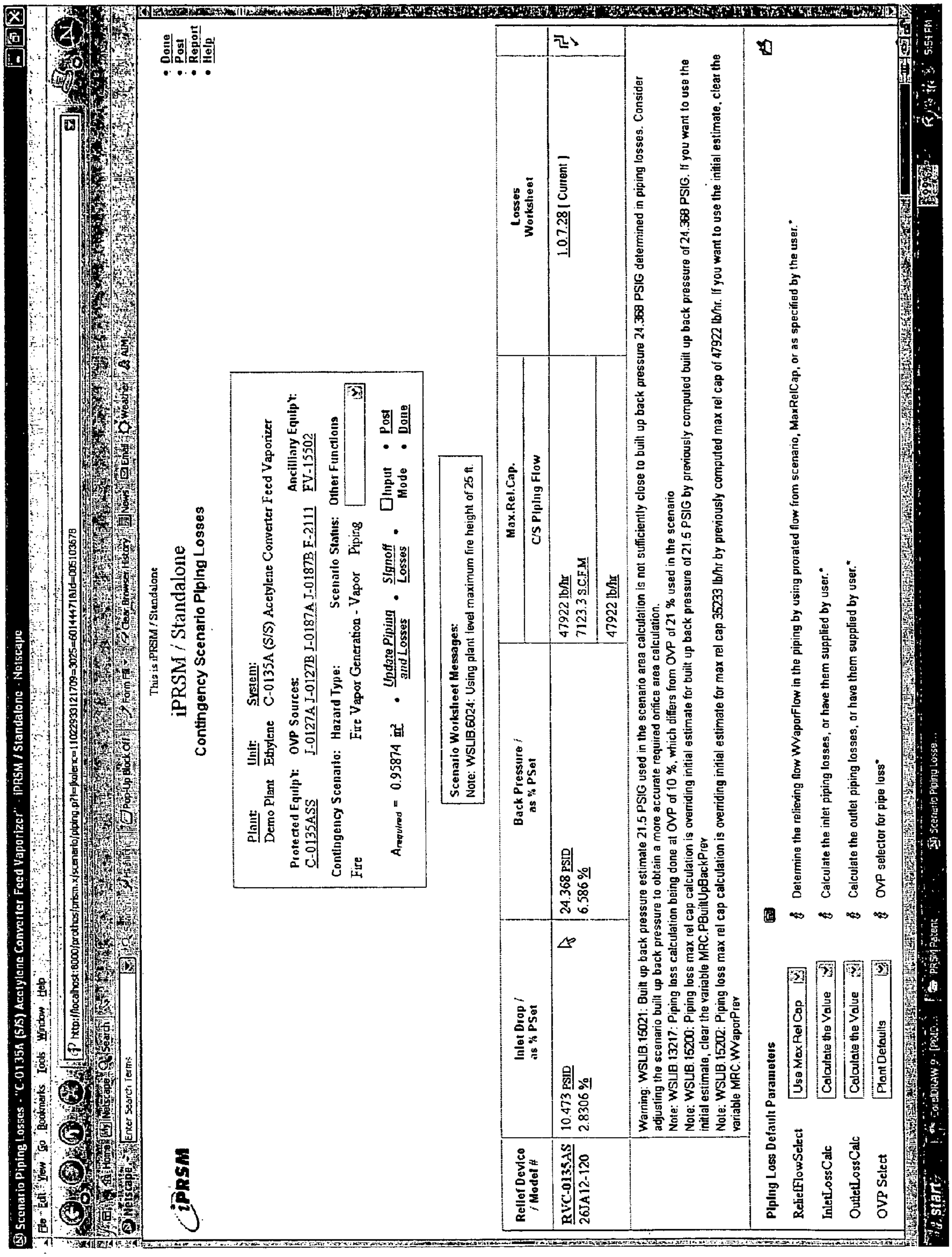
Figure 8M:
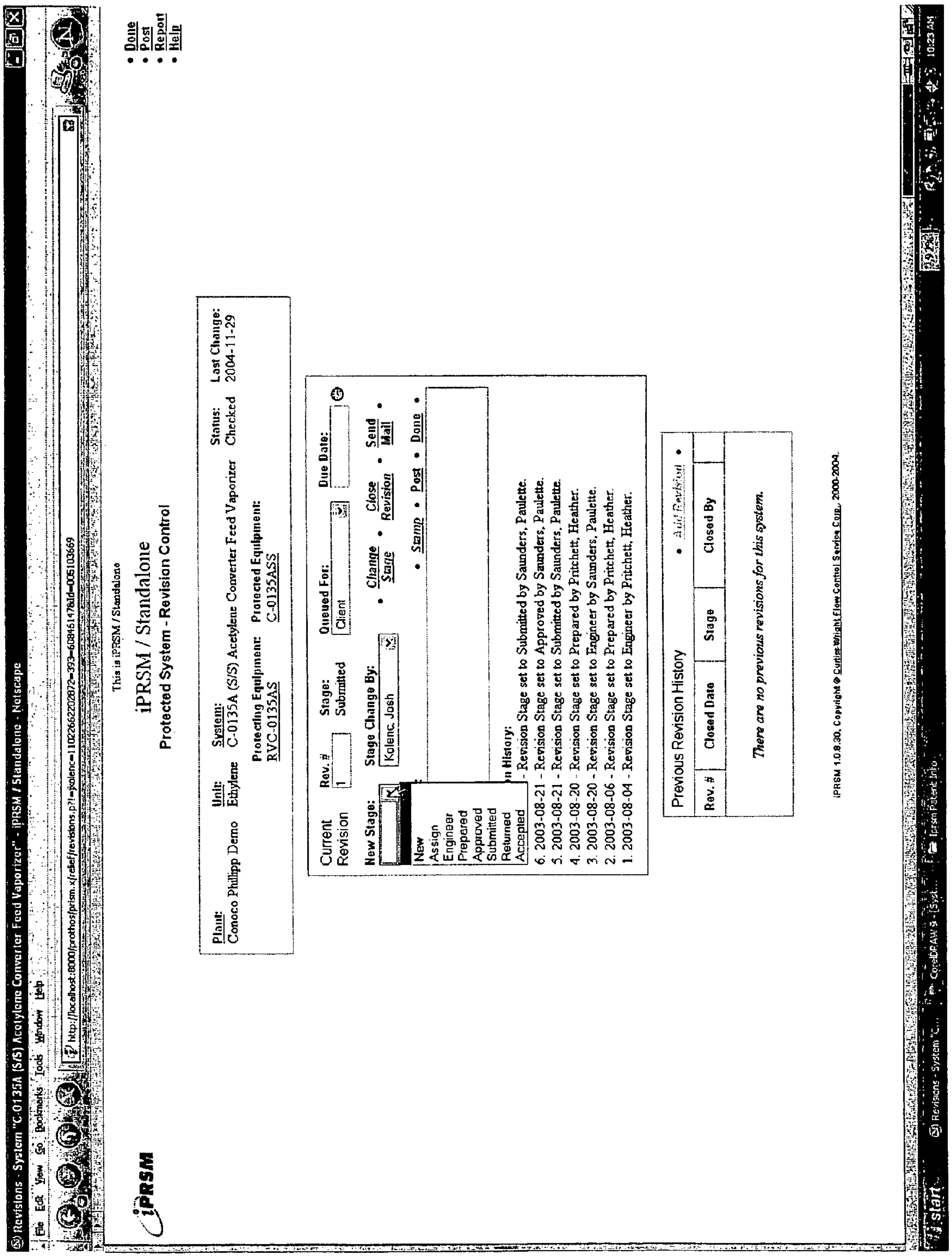
Figure 8N:
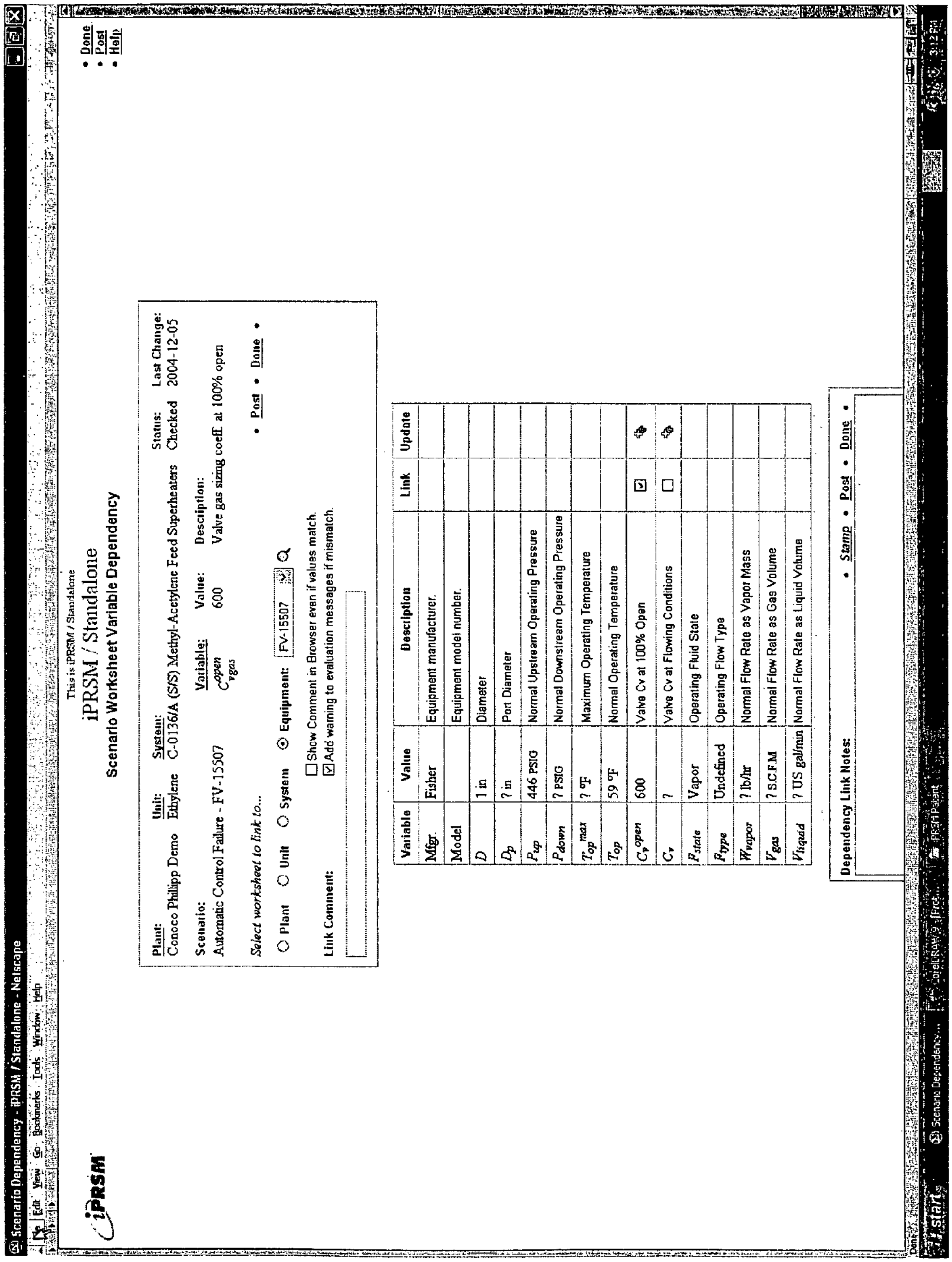
Figure 8O:
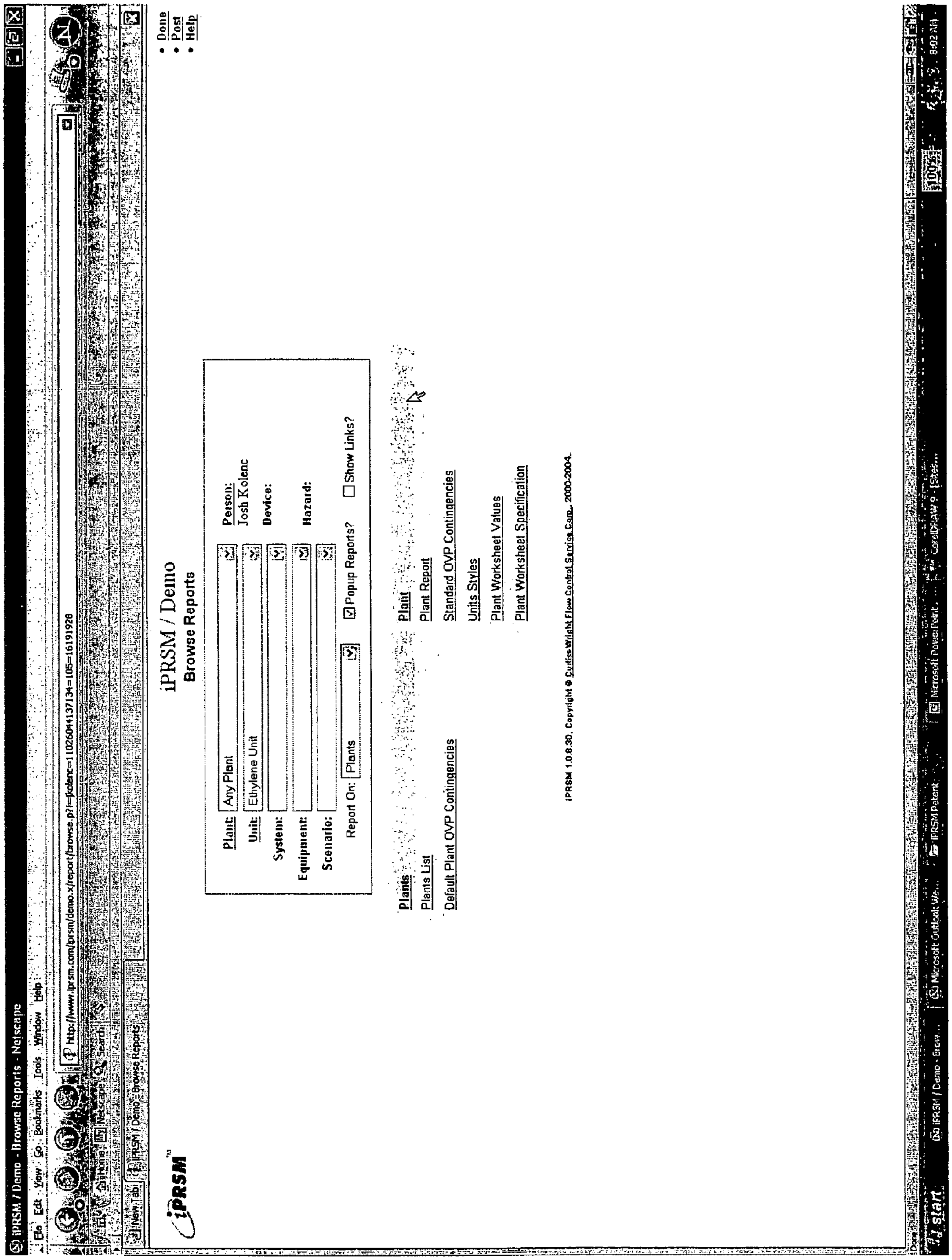
Figure 8P:
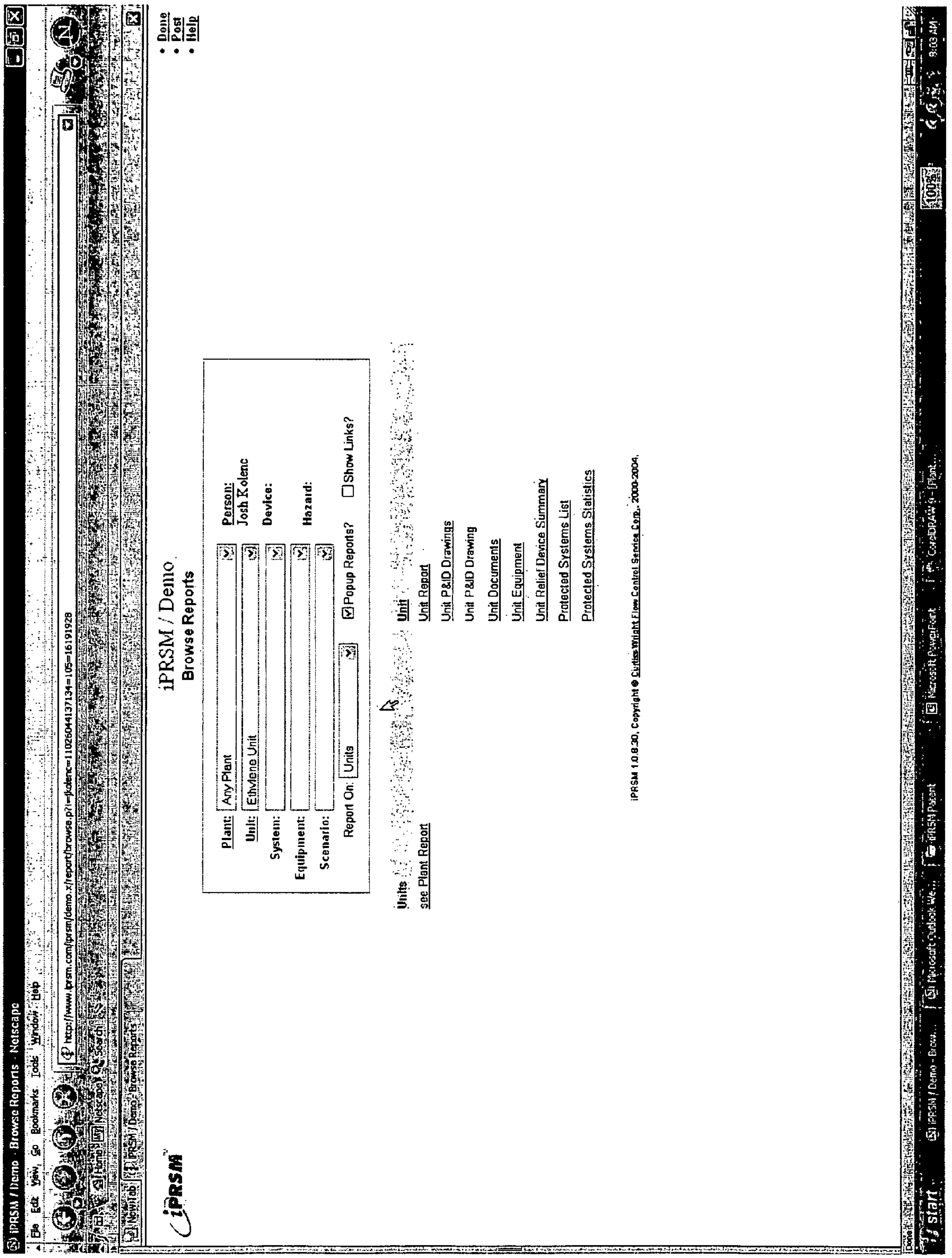
Figure 8Q:
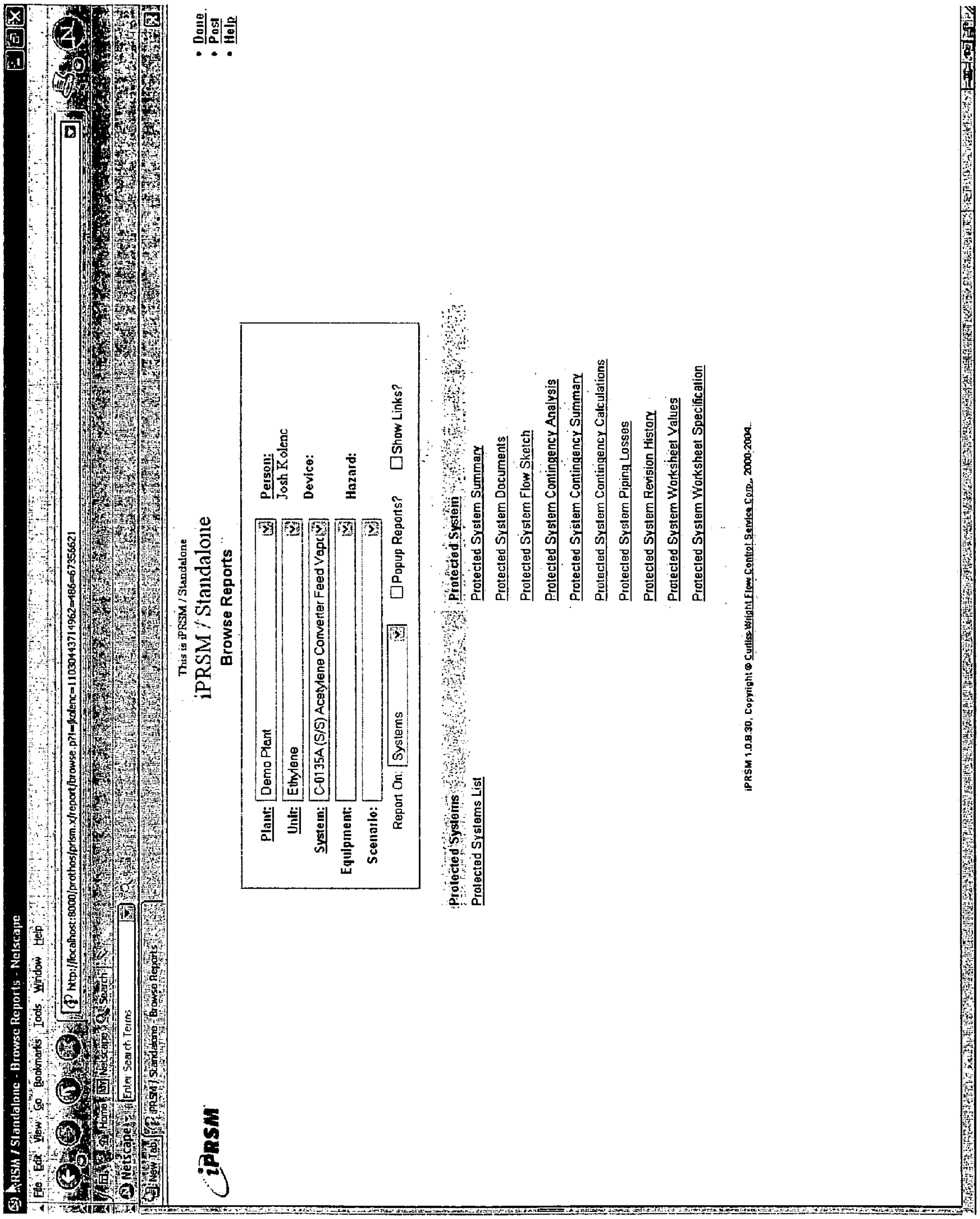
Figure 8R:
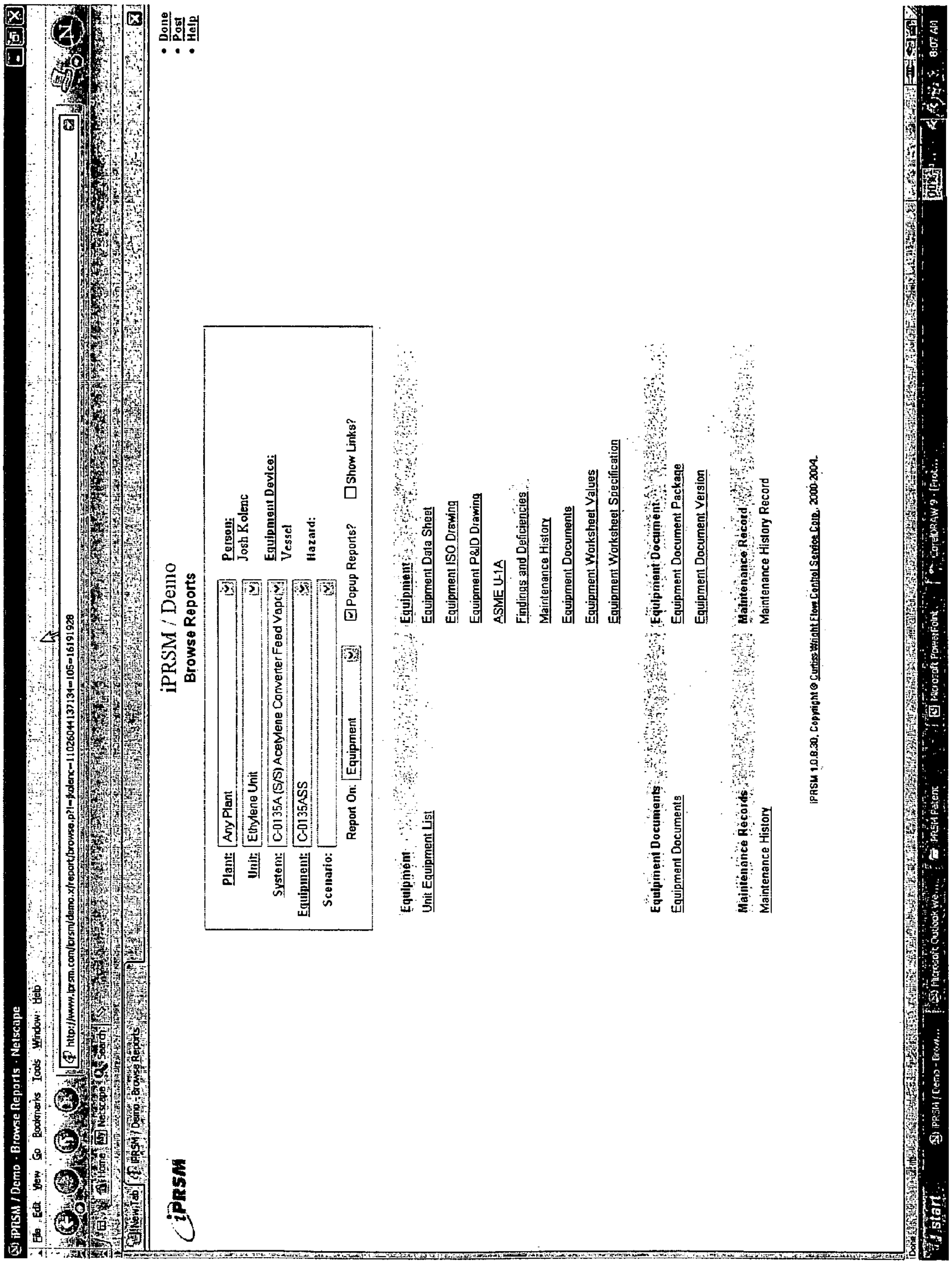
Figure 8S:
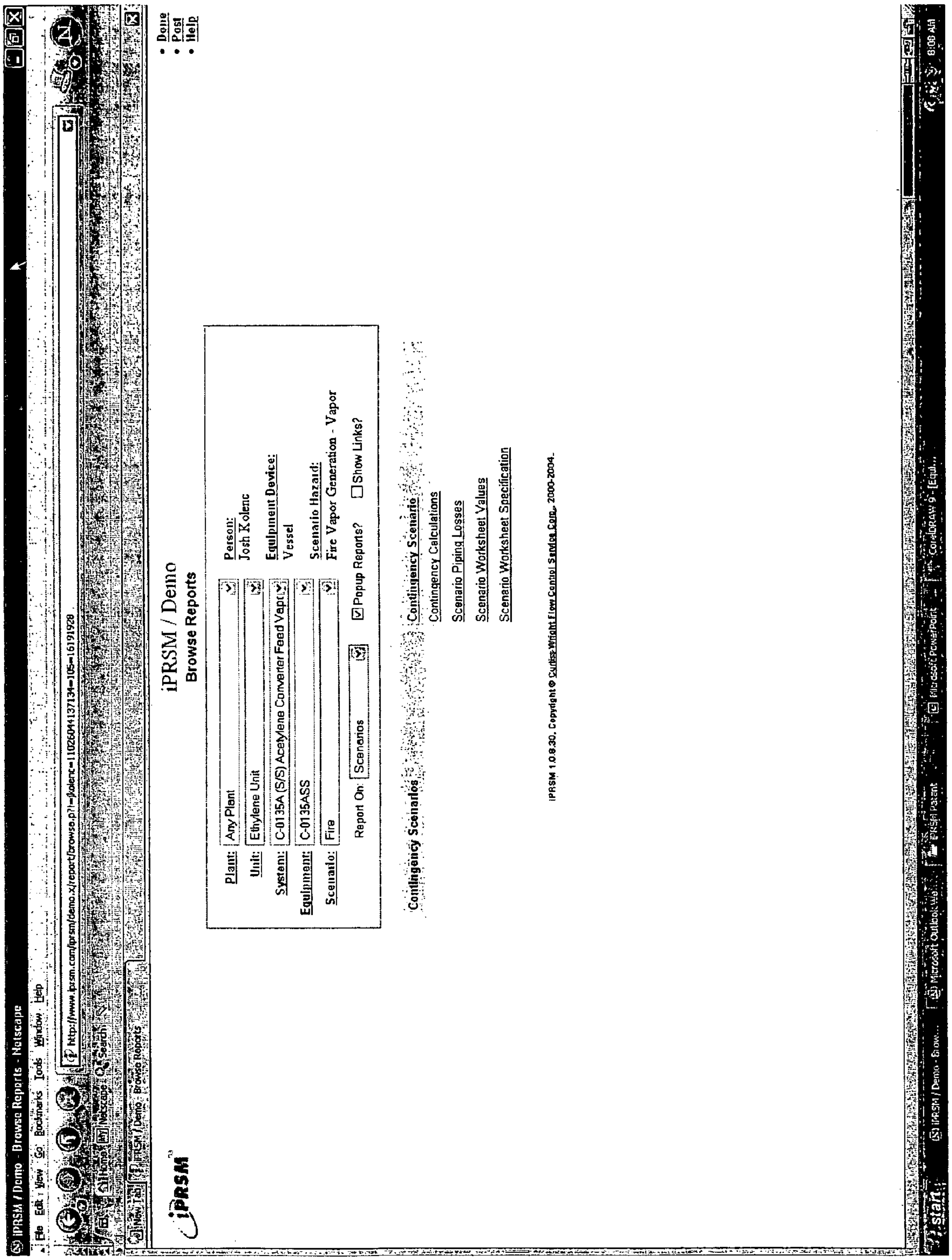
Figure 8T:
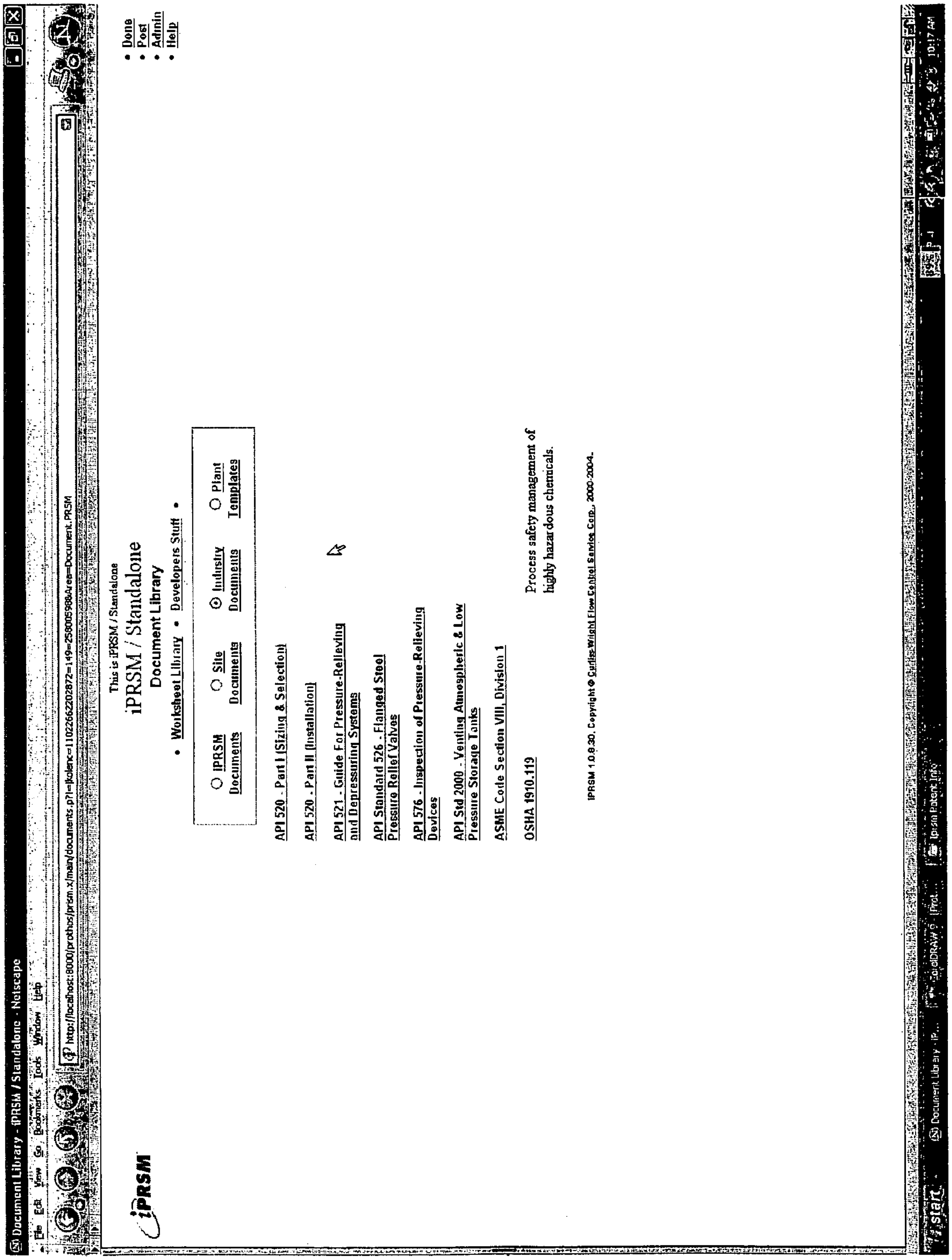

FIGS. 8A through 8X show screen shots of a number of the functions described below, for a contemplated commercial embodiment of the System, as they might be seen by a user of the system, displayed by a web browser on the user computer.

The assessment subsystem 6 is utilized to provide the various assessment and auditing reviews of the process system being evaluated, while the report generation subsystem is used to generate support documentations, as necessary, to provide a proper paper trail or explain results, as needed. Accordingly, the various features and capabilities described below can be allocated to the various subsystems consistent with this overall framework.

The Evaluation System web pages and display information, which are served by the server to the user, are designed to use one or more common elements combined according to one a number of different styles. The Evaluation System uses the common edit boxes, checkboxes, dropdowns, and radio buttons. Their appearance may depend upon the web browser used. Action buttons are specially marked links. As you pass your cursor over a link, its marks change. Menus are composed of action buttons arranged horizontally, vertically, or in dropdown menus.

Page access is also controlled in the preferred embodiment of the Evaluation System. Users can be given specific access privileges that govern what pages can be viewed, and what actions are available on those pages. Furthermore, only the Login page can be bookmarked. No other the Evaluation System web pages can be revisited once a browser window is closed.

In a preferred embodiment, Italic links are used initiate actions that make changes to the database, and generate confirmation dialogs when picked. Non-italic links are used for navigational purposes, and do not generate changes to the database.

The Evaluation System of the preferred embodiment uses small icons for indicators and actions. A short description of an icon's function is displayed when a cursor is paused over the icon for a second or two. A descriptive catalog of the icons called Common Icons used in the Evaluation System is available.

There are at least two types of dialogs used in the preferred embodiment: browser dialogs and application dialogs. Browser dialogs are used for simple confirmations. The application dialogs are pop-up windows that are small web pages with controls that are used to collect data or perform special operations for their parent pages.

Various collections of data require different display page types. The following types of pages are used in the Evaluation System:

Browsers display a list of one or more items in a table. Browsers usually have controls to select and sort the displayed items, and controls to scroll through results too numerous for display on a single page. Each row contains data for one item, a way to zoom to details about that item, and in some cases, controls to operate on it.

Viewers display details for an item, sometimes for editing. A viewer may incorporate a browser if its item can contain other items (e.g., a plant contains units).

Pop-Up Dialogs are small pages that pop up from a browser or viewer to allow special data entry, selection, or sequencing operations to be performed for an item.

Report Menus are a collection of links to individual reports, in some cases with controls for selecting and sorting report data.

Reports display details for an item, suitable for printing by a browser application.

There are typically no controls on report pages, so a browser's Back button can be used to return to a report's previous page.

Using the Database: the Evaluation System's database is designed to be used by many users at once, in some cases over a network connection that cannot be trusted to be available from page to page. These factors make using the Evaluation System database slightly different from using desktop-based databases.

Because of the nature of the connection between a user computer and the Evaluation System server, the data displayed on a user computer is a snapshot of the data held for that item.

When a user makes changes to the data, the changes are not transmitted to the database until the user selects Post, Done, or another operational link. Using the browser's Back button typically will not save the changes to the database. However, most application buttons or operational links that cause a new page to be loaded attempt to save any changes that have been made to the current page before displaying the new page.

Other users may request the same page as a particular user, and thus receive their own snapshots, but only one person can save changes at a time. If another user saves changes to the other user's snapshot first, the user will be unable to save the changes to his snapshot, but will have to refresh the snapshot first to update his data, and then modify the newly-updated data.

As an Example: A user requests the Evaluation System to view data about a valve (by clicking on a link or button displayed by a browser, for example). The Evaluation System packages it up and sends the user a webpage via the server. Then the telephone rings, and the user deals with the call. In the interim, another user else retrieves a snapshot of the data for the same valve, makes changes to their snapshot, and saves the changes successfully.

After the call, the user attempts to change some of the valve's data (by inputting data into a web form, for example) and wants to save it back to the database (via the reception subsystem to the storage subsystem). However, the Evaluation System detects that the data has changed since the time the user retrieved it, and refuses the change, displaying an error message instead.

In the error message is a link to Reload the page the user was viewing, which, when selected, presents the user with the valve's updated data, and the user must now re-enter the desired changes. A small pop-up window with the word "Posting . . . " comes and goes as the user Post his changes. In cases where changes cannot be saved, this window expands to display an error message and suggest remedial actions.

Dates and Times: Because the Evaluation System is designed for use in international environments, all dates and times preferably use the ISO-8601 format: yyyy-mm-dd [hh:mm:ss]. Example: 2003-10-31 [17:18:26]

A user can run multiple application windows in cases where the user needs to refer to one or more other pages while working. The Evaluation System logo can be used to open a new Evaluation System Main Page, allowing multiple pages to be simultaneously browsed for multitasking.

For smart navigation, the user can pick Post and then right-click the browser Back button to save changes and safely navigate directly to any page in the navigation history list. The user can pause the cursor over any icon in a browser window to view an instructional popup tool tip.

Overview

Menu and Action links are marked with Common Navigation Icons, which change as the cursor moves over them. Pick the link to take the action. Use these icons to page through multiple items in groups. From left to right, they represent First, Previous, Next and Last items. They appear grayed when paging is not possible for the current set of items. Select Post to Save changes to database.

Additional features include viewing a drawing in a separate window; viewing list of associated documents; and viewing a menu of associated reports. Furthermore, a variety of icons are provided which are linked to various functionality, including: Equipment; Equipment Pipe Fittings; Equipment Maintenance History; Equipment Findings; Protected Systems; Protected System Contingency; Piping Losses; Add; Add Under; Delete Record—Delete the record from the database; Archive Record—Archive the record so that it does not appear in views on the current database; Re-sequence—Access a re-sequencing popup and change the order of items in a list; Evaluate—Resolve outstanding calculations; Select File—select indicated file for use; Send Mail—Send email to another application user; Erase—Clear the value in a field; Clock—Enter a current timestamp in a date/time field; Select Entries—Open a page from which to select one or more entries to fill a field; Parameter Information—Access parameter information; Create a Parameter Link View or Edit a Parameter Link View or Edit a Bad Parameter Link; Select Orientation Angle; Ok; Not Ok; Locked by another user; Locked by current user; Mail Sent—Email sent.

A quick-reference summary of the web application workflow and functionality includes the following list of functions:

Log in/out
Add a plant
Add a unit to the plant
Add equipment to a unit
Add protected systems for a unit
Add contingency scenarios for a protected system
Evaluate piping losses for a contingency scenario
Evaluate contingency scenarios for a protected system
Check and sign off a protected system
Check equipment for a unit
Check and sign off a unit
Check and sign off a plant The above functions are described in more detail in the following examples:

Logging in: A user points his web browser to the appropriate website URL, enters the appropriate Login ID and Password, and picks the appropriate Login link to access the Evaluation System main page.

Logging out: On the main page, the user picks the Logout link. Merely closing the browser windows may not provide a secure logout under some operating systems.

Adding a plant: On the Evaluation System main page, pick the Add a Plant link and confirm to create a plant and access the add plant view. Enter a new Plant Name, a new Plant Owner, and select a template from the New Plant Template dropdown. Pick the Add Plant link and confirm to access a blank plant view in which to enter detailed plant information. Enter additional plant details as required, then pick Post.

Adding a unit to the plant: In the plant view's Plant Units table, pick the Add Unit link and confirm to create a unit and access a blank unit view in which to enter detailed unit information. Enter a Unit Name, Location, and Contact information. Pick Post.

Adding equipment to a unit: In the unit view, pick the Browse Equipment link to open the equipment browser.

Add one or more pieces of equipment: For each piece of equipment, pick the Add New Equipment link, enter a unique identifying string in the ID# box, then pick OK to create the new piece of equipment and access a blank equipment view in which to enter new equipment information. Select a device type from the Device Type dropdown. A parameter panel appropriate to the device type will open. Enter equipment details and parameters. Pick Add More Equipment from the Other Functions dropdown to refresh the equipment view and add more equipment, or pick Done to return to the equipment browser. A basic protected system requires a relief device, a piece of protected equipment, and an overpressure source.

For relief equipment, in the equipment view, also use the add icons icon to add associated equipment, pick the Piping & Fittings link to access the equipment piping browser and view, edit, and evaluate inlet and outlet piping and fittings. Pick the Piping Losses link to access the equipment piping losses browser and view piping losses information for each contingency scenario that is applied to a piece of protecting equipment's protected system. Pick the Findings & Deficiencies link to access the equipment findings view and enter findings and deficiency details.

Adding a protected system for a unit: In the unit view, pick the Protected Systems link to access the protected system browser. Pick the Add System link and confirm to create the protected system and access the protected system view. Enter a System Name and Default OVP Category, and select a value from the Pset Basis dropdown. Pick the Add Equipment link in any of the System Relief Equipment, System Protected Equipment, OVP Sources, or Ancillary Equipment tables to access the link equipment view and select equipment of the appropriate type to link to the protected system. Note that only equipment already added to the unit and not already used in another protected system is available to be linked to a protected system. From the Other Functions dropdown, pick Add New System to refresh the page and add another protected system, or pick Done to return to the protected system browser.

Adding a contingency scenario for a protected system: From the Contingency Scenario table in the protected system view, pick the Add New Scenario link and confirm to add a scenario and access the contingency scenario view. From the Overpressure Type, Hazard Type and/or Flow Type dropdowns, select OVP type, hazard type, and/or flow type. A parameter panel appropriate to the scenario will open. Enter scenario parameters then pick the Evaluate Scenario link or a Calculator icon. Correct problems described by any warning messages, and repeat evaluation until the scenario is successful. Pick Done to return to the protected system view, or pick Piping Losses to access the piping losses view and proceed with evaluating and signing off piping losses.

Evaluating and signing off piping losses for a contingency scenario: To access the piping losses view, pick the Piping Losses link in the contingency scenario view or pick a piping losses icon in the Contingency Scenarios table of the protected system view. Pick the Update Piping and Losses link to update piping parameters to current values and open parameter fields for editing. Pick the Evaluate Scenario and Update Piping and Losses link if the scenario has not yet been evaluated to evaluate and open parameter fields for editing. Edit parameter values as required and pick a calculator icon to evaluate piping losses until the result is satisfactory. Pick the Signoff Losses link to sign off on piping losses. Piping status will change to "OK". Pick Post to post changes or Done to post changes and return to the previous page. Evaluating, signing off, and un-checking a contingency scenario for a protected system. In the contingency scenario view edit parameter values as required.

Optionally, pick an unlink icon to open the parameter dependency worksheet and specify a parameter dependency for the selected value. Pick the Evaluate Scenario link or a calculator icon to evaluate the scenario. Scenario status will change from "Open" to "Comp" when the scenario is adequate. Edit parameters and evaluate as required until the result is satisfactory and the scenario status is "Comp".

Once a scenario's status is "Comp", pick the Scenario Signoff link to check the scenario and its piping loss calculations. Scenario status should change from "Open" to "Checked". If status remains "Open", pick the Mitigate link to resolve open issues.

Optionally, from the Other Functions dropdown, pick Uncheck Scenario to change the status of all scenario objects to "Open" and begin the evaluating and checking process anew. Scenario objects include the protected system and its equipment, the scenario, and its piping losses.

Checking, signing off, and un-checking a protected system in a unit: In the protected system view, pick the Check System link to check all contingency scenarios and their piping losses, and all relief devices within the system. If protection is adequate, the system status will change to "System Ok". Pick the System Signoff link to signoff on the protected system.

Optionally, from the Other Functions dropdown, pick Uncheck System to change the status of all objects in the system to "Open" and begin the checking and evaluating process anew. These objects include the protected system and its equipment, the contingency scenarios and their piping losses.

Checking equipment: Once all protected systems have been checked and are of status "Ok", pick the Check Equipment link in either the: unit view equipment browser or protected system browser. The status of all equipment within the unit will change to "Checked".

Signing off and un-checking a unit: Once all protected systems within a unit have been checked and are of status "Ok", and all equipment has been checked and is of status "Checked", pick the Unit Signoff link in the unit view to signoff on the unit.

Optionally, from the Other Functions dropdown in the unit view, pick the Un-check Unit link to change the status of all objects within the unit to "Open" and begin the checking and evaluating process anew. Objects within the unit include all equipment, protected systems, contingency scenarios, and piping losses.

Signing off and un-checking a plant: Once all units within a plant have been checked and are of status "Ok", in the plant view, pick the Plant Signoff link to signoff on the plant.

Optionally, from the Other Functions dropdown in the plant view, pick the Un-check Plant link to change the status of all objects within the plant to "Open" and begin the checking and evaluating process anew. Objects within the plant include all units, equipment, protected systems, contingency scenarios, and piping losses.

Extra-Workflow Procedures: Managing unit, equipment, and protected system graphics Process and instrumentation drawings for systems can be uploaded and viewed in the Evaluation System in a number of the following formats: .gif, .jpeg, .png, .tif, .pdf, and NCSA image map. An NCSA link map should use the Evaluation System equipment ID#s to identify its components.

The unit P&ID drawing browser can be used to view and sort the drawings list for a unit locate, add, and delete drawings access the unit P&ID drawing popup access the unit P&ID drawing editor. To view a unit P&ID drawing, do one of the following: In the unit P&ID drawing browser, pick a drawing name. In the equipment view, pick the P&ID Drawing link. In the protected system view, pick the drawing icon for a piece of relief equipment. In the unit P&ID drawing popup or the unit P&ID drawing editor, pick View Image from Other Functions to view an enlarged version of the drawing in a new window. Use the unit P&ID drawing editor to edit drawing name and version, and upload or download drawings or image maps. Use the equipment P&ID drawing selector to create, replace or remove a link between a piece of equipment and a P&ID drawing.

Use the equipment ISO drawing editor to upload, download, or delete an ISO drawing. To view an ISO drawing, do one of the following: In the equipment view, pick the ISO Drawing link; In the equipment ISO drawing popup or the equipment ISO drawing editor, pick the View Image link to view an enlarged version of the drawing in a new window.

Use the system sketch editor to upload, download, or delete a system sketch. To view a system sketch, do one of the following: In the protected system browser, pick a sketch icon; In the protected system view, pick the System Sketch link; In the system sketch view, pick the View Image link to view an enlarged version of the sketch in a new window.

Managing unit, equipment, and system documents: Documents can be uploaded and viewed in the Evaluation System in single or multiple file bundles in one or more of the following formats: .awp, .bkp, .doc, .xls, .pdf, .bmp, .dwg, .gif, .jpeg, .png, .tif, .html, .zip, and .txt. The Evaluation System handles documents for units, equipment, and protected systems in parallel fashion.

Use document browsers to view lists of all documents for a unit, piece of equipment, or system access the document views. Use the document views to view lists of all versions of a document for a unit, piece of equipment, or system enter or edit document details or upload new document versions download a document for editing access the document version views. Use the document version views to view lists of all files within a version of a document for a unit, piece of equipment, or system; enter or edit version details; open individual files within a version of a document; and access the version uploaders. Use the version uploaders to locate and select files to upload as versions of a document for a unit, piece of equipment, or system.

Managing worksheets: To view a selected worksheet, pick the Worksheet link in one of the plant view, equipment view, protected system view, or contingency scenario view piping losses worksheet. Use the worksheet view to update worksheets individually, or use the worksheet updater to update multiple worksheets at a time. To access the worksheet updater at a selected level, from the Other Functions dropdown, use Update W/Sheets in the plant view to update all worksheets in the plant (available only to System Administrators); use unit view, equipment browser, or protected system browser to update all worksheets in the unit; use equipment view to update all worksheets related to the piece of equipment; use protected system view to update all worksheets related to the system (updating worksheets from the protected system view is the easiest way to update the protected system, its equipment and its piping simultaneously); use contingency scenario view to update all worksheets related to the scenario; use piping losses view to update all worksheets related to the piping losses.

Managing revisions: Use the revision browser and revision view to maintain revision control over changes to protected systems. Use the revision browser to view lists of protected systems and their revision numbers for a plant or for a unit within a plant locate protected system revisions by search criteria access the revision view. Use the revision view to: view and update revision details for a protected system; change revision stage; or add a revision to a protected system.

Managing tasks: Use the tasks browser and tasks view to manage user assigned tasks. To access the tasks browser, on the main page, pick Tasks Queue from the Other Functions dropdown. Use the tasks browser to: view the tasks queue for a user or all users; download the tasks queue to Excel; locate tasks by search criteria add new tasks; or access the tasks view. Also use the tasks view to view, enter, or edit task details; or email task information to users Managing Reports: Use the report browser to locate and generate any report, or use the context-sensitive Report link on any page to access the corresponding reports view. Use the report browser to locate and generate any report without navigating to the relevant application page.

To access the report browser, on the main page select Browse Reports from the Other Functions dropdown.

Use the context-sensitive Report links throughout the Evaluation System to access the relevant reports view, then use the reports view to locate and generate the required report.

Tutorials

Various online tutorials are provided for guiding a user. The tutorials are described below. These tutorials provide an example of how to utilize the Evaluation System for analyzing a plant design in a simplified manner. the Evaluation System supports the much more complex configurations of actual plant designs, of course, and thus actual capability is not limited by these examples, which are provided for illustrative purposes only.

Creation Tutorial: This tutorial guides the user through the steps involved in creating and checking a simple one-unit plant containing a compressor, a vessel, and a pressure relief valve.

The steps in this tutorial are: add a new plant to the database; add a new unit to the plant; add new equipment to the unit; add a compressor to the unit; add a vessel to the unit; add a PRV to the unit; add piping and fittings to the PRV; add a protected system to the unit; link the equipment to the protected system; add a contingency scenario calculate piping losses; check and sign off on the protected system; sign off on the unit and plant.

Mitigation Tutorial: This tutorial guides the user through the steps involved in changing a compressor and then mitigating the effects of that change throughout a standard demonstration plant.

The steps in this tutorial include: create a standard demonstration plant; change a compressor; re-check contingency scenarios affected by the compressor change; change a relief valve to mitigate the effects of the compressor change; re-check the system to determine the effects of the relief valve change; and complete the checking and sign-off process.

Fittings Tutorial: This tutorial guides the user through the steps involved in setting up the inlet and outlet piping and fittings for a pressure relief device. The steps in this tutorial are: create a simple shop air plant; add a relief valve navigate to the piping and fittings editor; add, configure, and evaluate inlet fittings; and add and configure outlet fittings.

System Detailed Operation

User Interface Pages: User Interface Pages are used for user interaction with the Evaluation System, and such pages include:

- System Login page;
- System Logout page;
- The Main page;
- Plants page;
- Units page;
- Equipment page;
- Protected Systems page;
- Contingency Scenarios page;
- Worksheets page;
- Devices page;
- Hazards page;
- Pipe Fittings page;
- Tasks Queue page; and
- Browse Reports page.

Some of these various pages are described in more detail below:

Login Page: Use the login page to: log in to the Evaluation System; log out from the Evaluation System; and for accessing the system administrator login page. A Logout Page is the preferred way to log off the Evaluation System.

The Main Page: The main page is used to locate plants; sort the plant list view; add and delete plants; generate plant and other reports; and provide access to:

- Evaluation System handbook;
- on-line tutorials, user information and preferences;
- multi-tasking interface;
- document library (for accessing Evaluation System documents, site documents and industry documents);
- worksheet library (for accessing worksheet views or browsers for: plants, device types, pipe fittings, protected systems, scenario hazards, scenario standard OVP types, and piping losses);

reports browser;

send mail to site users utility;

Tasks queue browser;

site load graph (for generating and viewing graphs of transactions, unique users, trouble messages, and locks denied over a selected recent time period); and site administration page.

Visitor-level users can only access a restricted, read-only version of the Evaluation System main page.

The Multi-Tasking Interface for access to the Evaluation System's multitasking utilities and session. Options include Other Functions including functions of: a Document Library to access the document library and view Evaluation System documents, site documents, and industry documents; A Worksheet Library to access the worksheet library and view and manipulate plant and protected system worksheets and browse pipe fitting, hazard, and piping loss worksheets and standard OVP types; Browse Reports to access the reports browser and generate and print reports on all aspects of the Evaluation System, and to provide a read-only interface to Evaluation System reports for users with Visitor-level access; Send Mail for Users to send email to Evaluation System users; a Tasks Queue to access the tasks queue browser and view, sort and edit tasks lists for System users; a Site Load Graph to access the site load graph and view the graphs of transactions, unique users, trouble messages, and locks denied over a selected recent time period; and Site Administration to access the site administration page and conduct site administration functions (only visible to Site Administrators).

The Plants Page: is used for providing links to the following functions:

A Plant View function for: viewing, entering, or editing plant information; accessing the unit view for units within the plant; creating or deleting units; viewing unit P&ID drawings, equipment, and protected systems; accessing and updating plant worksheets; viewing, entering or editing plant notes; un-checking or re-checking a plant; signing off on a plant that has been checked; and exporting a plant.

A Plant Standard OVPs function for: viewing and sorting a list of plant standard OVP contingency types; adding or deleting an OVP contingency type; adding, sequencing or deleting hazard types for an OVP contingency type; and editing standard notes for an OVP contingency type.

An OVP Standard Notes function for: viewing to enter or edit standard notes for an overpressure contingency scenario. Notes entered here can be applied to contingency scenarios using the scenario note selector.

An Export Plant function for: browsing available plant template document packages and plant document packages in the Plant Template area of the repository; adding a plant template document or plant document to the Plant Template area of the repository; selecting a plant template document or plant document from the Plant Template area of the repository to which to export a plant template document or plant document for the current plant; viewing a selected document from the Plant Template area of the repository; viewing current and previous versions of the current plant's worksheet; generating a plant template document or plant document for export; and/or exporting a generated plant template document or plant document to the Plant Template area of the repository.

An Import Plant function for: browsing available plant template document packages and plant document packages in the Plant Template area of the repository; adding a plant template document or plant document to the Plant Template area of the repository; and/or selecting, viewing and importing a previously exported plant template or plant that has been uploaded and saved as a plant template document package or plant document package in the Plant Template area of the repository.

A Plant Unit Styles function for: selecting a default units style for all values within the plant; an OVP Type Sequencer function for: changing the order in which OVP contingency scenarios are considered and displayed; an OVP Hazard Sequencer function for: changing the order in which OVP contingency hazards are considered and displayed; a Plant or Unit Re-check for rechecking all Open systems in a plant or unit; a Plant Reports function for: creating plant-related reports; a Plant Delete function for: confirm deletion of a plant where access is restricted; a Plant Freeze/Thaw function for: freezing and thawing plants during plant export and import operations; and an Add New Plant Popup function for: creating a new plant and entering basic plant information.

A Units Page provided with links for the following functions:

A Unit View function for: viewing, entering or editing unit information; accessing unit-related information in the unit equipment browser, P&ID drawings browser, protected systems browser, or the document browser; accessing the unit worksheet updater; checking unit equipment; re-checking a unit, un-checking a unit, or signing off on a checked unit; entering or editing unit notes A Unit P&ID Drawing Browser function for: locating, viewing, adding or deleting process and instrumentation drawings for a unit; a Unit P&ID Drawing Popup function for: viewing an uploaded unit drawing if an NCSA link map has been uploaded, to access details for equipment in the unit; a Unit P&ID Drawing Uploader function for: selecting and uploading a unit P&ID image or link map to the System server; a Unit Documents Browser function for: accessing, editing, adding or deleting documents for a unit; a Unit Document Upload function for: locating, selecting and uploading files as versions of unit documents; a Unit Reports function for: viewing and printing unit-related reports and drawings; and A Unit Delete function for: confirming deletion of a unit in a plant.

A Unit P&ID Drawing Editor function for: viewing a unit P&ID drawing or link map; adding a new unit P&ID drawing or link map; uploading or downloading a unit P&ID drawing; uploading or downloading a unit P&ID link map; and accessing equipment details in a unit P&ID link map.

A Unit Document View function for: viewing, entering or editing details for a unit document; downloading a unit document for editing; designating or viewing a launch file for a multiple file unit document; and adding, viewing or deleting unit document versions.

A Unit Document Version function for: viewing, entering, or editing, document version details; uploading or downloading a document version; designating or viewing launch files for multiple file documents; and opening individual files within a document version.

A Unit Equipment Data Import function for: importing data for a new piece of equipment (equipment data should come from a document already uploaded to the Evaluation System through the Document Uploader function), and a Unit Equipment Data Export function for: exporting unit equipment data to a spreadsheet (such as MS Excel) for editing.

An Equipment Page provided with links for the following functions:

An Equipment Browser function for: viewing an equipment list for a plant or a unit within a plant; locating equipment by ID#, type, system, or status; sorting the equipment list; viewing equipment details; adding or deleting equipment; accessing protected system information; initiating an equipment check; importing or exporting equipment data; accessing the equipment redbook editor; updating equipment worksheets; and accessing revision control history.

An Equipment View function for: viewing, entering, or editing equipment details; adding equipment to a unit; managing associated equipment; accessing equipment worksheets, maintenance reports, and documents; viewing and uploading ISO drawings; viewing and selecting P&ID drawings; un-checking equipment and updating worksheets; and for protecting equipment and accessing piping and fittings, piping losses, and findings & deficiencies information.

An Equipment P&ID Drawing Select function for: locating, viewing or editing a unit P&ID drawing; and creating, replacing or removing a link between a unit P&ID drawing and the equipment currently displayed in the equipment view.

An Equipment ISO Drawing Popup function for: viewing an uploaded ISO drawing, and use the Equipment ISO Drawing Uploader function for: selecting and uploading an ISO drawing to the Evaluation System server.

An Equipment ISO Drawing Editor function for: viewing an equipment ISO drawing; uploading or downloading an equipment ISO drawing; and deleting an equipment ISO drawing.

An Equipment Associations function for: locating equipment to associate; accessing equipment details; creating an equipment association; and clearing an equipment association.

An Equipment Piping Browser function for: viewing inlet and outlet piping and fittings lists for a piece of equipment; adding or deleting piping and fittings; accessing and editing piping and fittings details; re-sequencing inlet and outlet piping and fittings; accessing the equipment piping editor; viewing piping losses; viewing ISO and P&ID drawings; evaluating piping and fittings; and updating piping and fittings worksheets and viewing or hiding worksheet information messages.

An Equipment Piping Editor function for: add, editing and deleting piping and fittings for a piece of equipment; evaluating piping and fittings; accessing and editing piping and fittings details; re-sequencing piping and fittings; viewing piping losses; viewing ISO and P&ID drawings; and updating piping and fittings worksheets and view or hide worksheet information messages and fitting notes.

An Equipment Piping View function for: viewing, entering, editing or evaluating inlet and outlet piping and fitting details; and adding new piping and fittings.

An Equipment Piping Sequencer function for: changing the order in which piping and fittings are considered and displayed: for inlet, from entrance to device; and for outlet, from device to exit.

An Equipment Redbook function for: viewing protecting equipment lists for a unit; locating protecting equipment by ID#, system, or status; sorting the protecting equipment list; and viewing or editing redbook parameters for protecting equipment.

An Equipment Piping Losses function for: accessing piping losses information for each contingency scenario that is applied to a piece of protecting equipment's protected system.

An Equipment Findings & Deficiencies function, for a piece of protecting equipment within a system, for: viewing, enter, or edit findings information; creating, editing, sequencing, and deleting equipment deficiencies; accessing equipment worksheets; viewing ISO and P&ID drawings; accessing piping and fittings or piping losses information; accessing maintenance information or equipment documents; accessing protected system information.

An Equipment Deficiency Sequencer function for: changing the order in which deficiencies are displayed; and an Equipment Documents function for: viewing, entering, editing, adding or deleting documents for a piece of equipment.

An Equipment Documents View function for: viewing, entering or editing equipment document details; downloading a document for editing; designating or viewing a launch file for a multiple file document; and adding, viewing, or deleting document versions.

An Equipment Documents Version function for: viewing, entering or editing details for a version of an equipment document; uploading or downloading an equipment document version; designating or viewing launch files for multiple file documents; and opening individual files within a document version.

An Equipment Documents Uploader function for: locating, selecting and uploading files as versions of equipment documents; and an Equipment Maintenance View function for: viewing, entering or editing record details for maintenance reports.

An Equipment Maintenance function for: viewing maintenance history; accessing maintenance details; and adding or deleting maintenance history entries.

An Equipment Reports function for: viewing a variety of equipment-related reports; and an Equipment Browser function.

A Protected Systems Page provided with links for the following functions:

A Protected System Browser function for: viewing protected systems lists for a plant or units within a plant; locating protected systems by name or status; sorting the protected systems list; viewing protected system details; adding or deleting a protected system; accessing revision history information; initiating a unit re-check; and updating protected system worksheets.

A Protected System View function for: viewing, entering or editing protected system details; adding a new protected system to a unit; viewing, adding, editing or deleting links to relief devices, protected equipment, OVP sources, and ancillary equipment; viewing relief or protected equipment P&ID drawings; adding, applying, editing, re-sequencing or deleting contingency scenarios; uploading or viewing a protected system sketch; accessing protected system documents; accessing or updating protected system worksheets; checking protected system equipment or initiate a system-wide re-check; and signing off on a protected system.

A Protected System Sketch function for: viewing an uploaded protected system sketch, and if an NCSA link map has been uploaded, for accessing equipment details for the system.

A System Sketch Editor function for: uploading, downloading or deleting a system sketch; uploading, downloading, or deleting a system link map; and accessing equipment details for system link maps.

A System Sketch Uploader function for: selecting and uploading an image or link map to the Evaluation System server and an Add Standard OVPs to System function for: setting defaults for standard OVP scenarios and adding the OVPs to a protected system.

An Impact Analysis function for: evaluating the consequences of updating the worksheets associated with the protected system to their current versions. Updating the worksheets for a protected system can affect its audit status since a change in standards may make an existing system non-compliant. This function enables the impact of the worksheet update to be evaluated without actually doing so.

A Link Equipment View function for: locating available relief equipment and sort the available relief equipment list and for linking available relief equipment to a protected system.

A System Scenario Adjustor function for: marking contingency scenarios as applicable or not applicable by category for a protected system, and for deleting contingency scenarios by category for a protected system; and a Scenario Sequencer function for: changing the order in which contingency scenarios are considered and displayed.

A System Scenario Notes function for: viewing, entering or editing custom notes for contingency scenarios associated with a protected system; selecting standard notes for contingency scenarios; and applying and re-sequencing contingency scenarios.

A System Revisions Browser function for: viewing revisions lists for a plant or units within a plant; locating revisions by name, system status, revision number, status, or stage, and/or the user for which they are queued; sorting the revisions list; and accessing revision details.

A System Revision View function for: viewing protected system revision history; and entering, editing and deleting protected system revisions.

A Send Revision Mail function for: emailing revision notices to Evaluation System users, and a System Impact Analysis function; and a System Documents Browser function for accessing, editing, adding and deleting documents for a protected system.

A System Document View function for: viewing, entering or editing system document details; downloading a document for editing; designating or viewing a launch file for a multiple file document; and adding, viewing, or deleting document versions.

A System Document Version function for: viewing, entering or editing details for a system document version; uploading or downloading a document version; designating or viewing launch files for multiple file documents; and opening individual files within a document version.

A System Document Uploader function for locating and selecting files to upload as versions of system documents; a Protected System Reports function for generating and viewing a variety of protected system-related reports; and a Protected System Browser function.

A Contingency Scenarios Page provided with links for the following functions:

A Contingency Scenario View function for: viewing, entering or editing contingency scenario details; entering or selecting contingency scenario parameters; calculating piping losses for a contingency scenario; and evaluating or signing off on a contingency scenario.

A Scenario Notes Selector function for selecting standard notes to attach to a contingency scenario; a Scenario Variable Dependency function for viewing, creating, or editing dependency links between contingency scenario parameters and parameters in other worksheets; a Scenario Piping Losses function for updating, editing, and computing scenario piping losses for each relief device to which the contingency scenario is applied; a Piping Losses Worksheet function for updating, editing, and computing piping losses for a contingency scenario applied to a single relief device; and a Contingency Scenario Reports function for generating and viewing scenario reports.

A Worksheets Page provided with links for the following functions:

A Worksheet View function for: viewing worksheets for plants, equipment, protected systems, contingency scenarios, and piping losses; selecting worksheet versions; accessing worksheet specifications; and viewing source or object code for the worksheet.

A Worksheet Updater function for: generating and viewing a worksheet updating plan; and updating worksheets to the most recently uploaded versions A Units Style Selector function for: converting and displaying the selected value in a new units style. Note that only the display value will be changed, not the basis value used in calculations.

A Worksheet Variable Information function for accessing detailed information about a parameter; and a Worksheet Specification View function for viewing to access worksheet variables and worksheet calculations in source or object code for plants, protected systems, and/or piping losses.

A Worksheet Reports View function for: generating and viewing worksheet values and worksheet specification reports for plants, equipment, protected systems, contingency scenarios and/or piping losses.

A Devices Page provided with links for the following functions:

A Device Worksheet Browser function for: accessing device worksheets and adding or deleting device worksheets; a Device Worksheet View function for: viewing device worksheet variables and worksheet calculations code for System Administrators, and selecting a protection function for a device; and a Devices Reports function for: generating and viewing device worksheet specification reports.

A Hazards Page provided with links for the following functions:

A Hazard Browser function for: accessing hazard worksheets; adding or deleting hazards; and accessing default plant OVP contingencies.

A Hazard View function for viewing hazard worksheet specifications and hazard source or object code, and entering or editing hazard details; a Hazard Reports function for: generating and viewing hazard reports; and a Default OVP Contingencies function for accessing default plant OVP contingencies.

A Pipe Fittings Page provided with links for the following functions:

A Pipe Fitting Browser function for: viewing the pipe fitting type worksheets list; accessing fitting worksheets; and adding and deleting fitting worksheets A Pipe Fitting View function for: viewing fitting worksheet specifications; viewing fitting source or object code; and entering or editing fitting details and specify defaults and width variance.

A Pipe Fitting Reports function for: generating and viewing fitting reports; and a Piping Losses Worksheets function for accessing piping losses worksheet specifications.

A Tasks Queue Page provided with links for the following functions:

A Tasks Queue Browser function for: viewing task lists for users; locating tasks by user, user role, or task status; sorting the task list; viewing task details; adding and deleting tasks; and downloading the task list to a spreadsheet (such as MS Excel).

A Tasks View function for: viewing, entering, or editing task details, and preparing task notices for email; and a Tasks Send Mail function for: emailing task notices to Evaluation System users.

A Browse Reports Page provided with links for the following functions:

A Reports Browser function for: selecting, generating, displaying and printing Evaluation System reports, where the reports browser provides a read-only interface to System reports for users with Visitor-level access; and a System Selector function for: selecting protected systems for use in the reports browser.

The Evaluation System supports at least three types of graphics files which can be uploaded, viewed and edited. These graphics files include unit process and instrumentation (P&ID) drawings, equipment isometric (ISO) piping drawings, and protected systems sketches. Various graphics formats are supported (such as gif, jpg, png, tif and pdf, for example).

A fourth type of file, the NCSA link map, can be created and uploaded along with unit P&ID drawings and protected system sketches. The NCSA link map feature can be used to create hotlinks from the pieces of equipment illustrated in a graphic to the equipment view to display each piece of equipment's details. An equipment P&ID drawing selector function is provided to create direct links from pieces of equipment in the equipment view to the unit P&ID drawing in which they are illustrated.

Once a unit P&ID drawing has been uploaded, direct links can be created from the equipment view from each piece of equipment to the drawing in which it is illustrated.

The Evaluation System provides a document library for system-wide documents, plus repositories for unit, equipment, and protected system documents. The document library is preferably a read-only resource for most users. Only system administrators is typically permitted to upload, edit, or delete these materials.

The Evaluation System manages unit, equipment, and protected system documents in parallel fashion. The Evaluation System documents can be uploaded, managed and accessed as: awp. bkp. doc. xis. pdf. bmp. dwg. gif. jpeg. png. tif, html, and txt files, for example. Multiple file bundles, such as .zip files, for which a view or launch file can be designated, are also supported. Furthermore, multiple versions of the same document can also be supported.

Document version views are provided for units, equipment, and protected systems to display document version details and a list of files within a document version.

Document uploaders are provided for units, equipment, and protected systems for use to access local standard browsers and to transmit selected document files or multiple file bundles to the Evaluation System server.

Various additional support functions are provided as described below:

A Site Administration function is provided to access the person, repository, database, and backups browsers access the site configuration, site availability, install updates, database administration, import plant, and freeze plant utilities access the site load graph set token expiry options view log file statistics and access log files launch any Evaluation System page A Site Configuration function is provided for setting access levels for add plant, mail users, and tasks queue; and setting units system for new plants access the parameters browser.

A Configuration Browser function is provided for viewing, editing, adding and deleting site configuration parameters. A Configuration View function is used for editing and adding site configuration parameters.

A Person Browser function is provided for viewing person lists; accessing person details; adding and deleting persons and email users. a Person View function is provided for viewing, entering, or editing person details; and setting access levels and batch email inclusion for a person. A Logins Browser function is provided for viewing and sorting the logins log.

A Trouble Log Analysis Browser is provided for viewing and sorting the trouble log analysis table; and accessing trouble log analysis details Accessing the Trouble Log Analysis Browser To access the trouble log analysis browser In the trouble log browser, pick the Analyze Trouble link.

A Site Availability Utility is provided for entering and activating a down time message; and adding, editing, or deleting site down times.

A Database Administration Utilities function is used for editing database configuration parameters; converting database versions; re-indexing database tables; clearing persistent locks; reaping old or unreferenced worksheet specifications; and accessing the current database version.

A Reap Worksheet Specifications function is used for deleting unused worksheet specifications. A Reap Worksheet Files function is also provided. A Database Browser function is provided for locating database objects by class or location. A Backups Manager and a Page Timing Statistics function is also provided.

A Site Administration Reports function is provided for accessing the site administration reports.

A Repository Area Browser function is provided for viewing the repository area list access repository area details, and adding and deleting repository areas.

A Repository Area View function is provided for viewing, entering or editing repository area details; sorting and sequencing the area package list; and adding, viewing, launching or deleting area packages.

An Area Packages Sequencer function is provided for changing the order in which area packages are considered and displayed.

A Repository Package View function is provided for viewing, entering or editing area package details; downloading a package for editing; designating or viewing a launch file for a package; and adding, viewing or deleting package versions.

Pick the Add Package link to add a package and access a blank repository package view in which to enter new package details.

A Repository Version View function is used for viewing, entering or editing details for a version of a repository area package; uploading or downloading a package version; designating or viewing launch files for a package; and opening individual files within a package version.

A Repository Package Uploader function for locating and selecting files to upload as versions of repository area packages.

The Evaluation System in its preferred embodiments can be installed in both MS Windows and Unix/Linux environments.

The Evaluation System report generation subsystem will be able to generate a number of reports, including:

A. Library Reports including:
- Plants List Report;
- Default Std. OVPs;
- Devices in Database;
- Hazards in Database;
- a Pipe Fittings List;
- ANSI Pipe Schedule; and
- Std. Fitting Heights.

B. Plant Reports including:
- Plant Data Sheet;
- Plant Units System;
- Plant Std. OVPs;
- Plant/Unit Recheck; and
- Impact Analysis.

C. Unit Reports including:
- Unit Data Sheet;
- Unit Drawings;
- Unit Drawing;
- Unit Equipment List;
- Relief Device Summary;
- Unit Systems List;
- Unit Systems Stat's; and
- Unit Documents.

D. Equipment Reports including:
- Equipment Data Sheet;
- Equip't ASME Data Sheet;
- Equip't ISA CV Data Sheet;
- Equip't ISA PRV Data Sheet;
- Equip't ISA RD Data Sheet;
- Equipment ISO Drawing;
- Equipment P&ID Drawing;
- Relief Device Design Record;
- Relief Device Worksheet;
- Contingency Analysis;
- Contingency Summary;
- Contingency Calculations;
- Contingency Calc. Summary;
- Equip't Design & Selection;
- Piping and Fittings;
- Piping Losses;
- Findings & Deficiencies;
- Equipment Documents;
- Equipment Document;
- Document Version;
- Equip't Maintenance List; and
- Equip't Maintenance Item.

E. Protected System Reports including:
- System Summary;
- System Flow Sketch;
- Contingency Analysis;
- Contingency Summary;
- Contingency Calc's;
- System Piping Losses;
- System Revisions; and
- System Documents.

F. Contingency Reports including:
- Scenario Calculations; and
- Scenario Piping Losses.

G. Worksheet Reports

H. Repository Reports Including:
- Repository Areas;
- Repository Area;
- Repository Package; and
- Repository Version.

I. Tasks Queue Reports

J. Person Reports including:
- Users List;
- Admin. Details; and
- User's Details.

K. Administration Reports including:
- Site Configuration Report;
- Site Transactions Report;
- Database Statistics Report; and
- Document Statistics Report.

The invention has been described hereinabove using specific examples and embodiments; however, it will be understood by those skilled in the art that various alternatives may be used and equivalents may be substituted for elements and/or steps described herein, without deviating from the scope of the invention. Modifications may be necessary to adapt the invention to a particular situation or to particular needs without departing from the scope of the invention. It is intended that the invention not be limited to the particular implementations and embodiments described herein, but that the claims be given their broadest interpretation to cover all embodiments, literal or equivalent, disclosed or not, covered thereby.

Finally, the Evaluation System is designed to support the following Industry standards represented by the following documents, all incorporated by reference in their entirety:

API (American Petroleum Institute)

Standards
- ANSI B16.34
- ANSI B16.5—Pipe Flanges & Fittings
- API Std 520—Part 1—Design Installation of Pressure Relieving Systems
- API Std 520—Part 2—Sizing, Selection & Installation of Pressure Relief Devices
- API Std 521—Guide For Pressure Relieving & Depressuring Systems
- API Std 526—Flanged Steel Pressure Relief Valves
- API Std 527—Seat Tightness of Pressure Relief Valves
- API 576—Inspection of Pressure Relief Devices
- API-2000—Venting Atmosphere and Low-pressure Storage Tanks American Society of Mechanical Engineers Regulations
- ASME Section I—Power Boilers
- ASME Section III—Rules for Construction of Nuclear Facility Components
- ASME Section VIII—Div I—Pressure Vessels
- ASME NB-18—National Board Pressure Relief Device Certifications Occupational Safety and Health Administration
- 1910.119-Process Safety Management of Highly Hazardous Chemicals Crane Technical Paper
- Flow of Fluids Through Valves, Fittings, and Pipes

Appendix A: Computer File Listing

This Appendix contains the list of files, their locations, sizes, and dates of the computer files contained in the Computer Program Listing Appendix incorporated into this specification.

| | | |
|---|---|---|
| 2004-Dec-13 10:46:21 | 340 bytes | prism |
| 2004-Dec-13 10:26:47 | 272 bytes | prism/about |
| 2004-Nov-17 15:51:36 | 3985 bytes | prism/about/add-site.txt |
| 2004-Dec-13 10:26:47 | 136 bytes | prism/about/apache |
| 2004-Dec-13 10:26:47 | 170 bytes | prism/about/apache/match |
| 2004-Nov-17 15:40:38 | 2912 bytes | prism/about/apache/match/httpd.conf |
| 2004-Nov-17 15:34:46 | 3135 bytes | prism/about/apache/match/iprsm.dat |
| 2004-Nov-17 15:35:10 | 4256 bytes | prism/about/apache/match/iprsm.x |
| 2004-Dec-13 10:26:47 | 170 bytes | prism/about/apache/port |
| 2004-Nov-17 15:37:26 | 2187 bytes | prism/about/apache/port/httpd.conf |
| 2004-Nov-17 15:39:06 | 3421 bytes | prism/about/apache/port/iprsm.conf |
| 2004-Nov-17 15:38:06 | 4256 bytes | prism/about/apache/port/iprsm.x |
| 2004-Dec-09 15:44:22 | 165927 bytes | prism/about/history.txt |
| 2004-Jul-27 15:32:32 | 2455 bytes | prism/about/mk-win-install-pkg.txt |
| 2004-Dec-13 10:26:47 | 306 bytes | prism/about/release |
| 2004-Dec-09 16:07:04 | 2770 bytes | prism/about/release.txt |
| 2004-Nov-17 06:13:18 | 728 bytes | prism/about/release/cafeavra.txt |
| 2004-May-01 18:27:22 | 484 bytes | prism/about/release/empty-db.txt |
| 2003-Dec-09 14:25:54 | 1019 bytes | prism/about/release/escrow.txt |
| 2004-Jan-31 18:29:18 | 357 bytes | prism/about/release/handbook.txt |
| 2003-Dec-05 03:31:10 | 362 bytes | prism/about/release/snapshot.txt |
| 2004-Nov-19 20:56:50 | 1340 bytes | prism/about/release/update.txt |
| 2002-Dec-31 14:40:40 | 396 bytes | prism/about/release/wslib-ewf.txt |
| 2004-Dec-13 10:26:47 | 68 bytes | prism/cgi |
| 2004-Dec-13 10:26:47 | 68 bytes | prism/config |
| 2004-Dec-13 10:26:47 | 102 bytes | prism/data |
| 2004-Dec-13 10:26:47 | 68 bytes | prism/data-empty |
| 2004-Dec-13 10:26:47 | 102 bytes | prism/data/config |
| 2004-Dec-01 15:49:04 | 23 bytes | prism/data/config/current.dat |
| 2004-Dec-13 10:26:47 | 102 bytes | prism/dispatch |
| 2004-Nov-22 23:29:10 | 8375 bytes | prism/dispatch/prism.cgi |
| 2004-Dec-13 10:54:06 | 1530 bytes | prism/private |
| 2004-Dec-13 10:26:48 | 1088 bytes | prism/private/Class |
| 2004-Oct-06 14:45:04 | 652 bytes | prism/private/Class/Classes.pm |
| 2004-Dec-06 17:20:06 | 4083 bytes | prism/private/Class/Config.pm |
| 2004-Jan-10 09:47:44 | 2386 bytes | prism/private/Class/Deficit.pm |
| 2004-Jun-16 17:16:24 | 3323 bytes | prism/private/Class/Device.pm |
| 2004-Nov-06 00:48:54 | 17379 bytes | prism/private/Class/Equip.pm |
| 2004-Jun-16 17:17:18 | 2156 bytes | prism/private/Class/EquipLink.pm |
| 2004-Jun-30 18:36:32 | 2420 bytes | prism/private/Class/Fitting.pm |
| 2004-Nov-01 21:04:18 | 8065 bytes | prism/private/Class/Flash.pm |
| 2004-Oct-06 16:07:54 | 2176 bytes | prism/private/Class/FlashType.pm |
| 2004-Nov-15 19:21:38 | 2891 bytes | prism/private/Class/Hazard.pm |
| 2003-Mar-08 22:00:26 | 2195 bytes | prism/private/Class/Maintain.pm |
| 2003-Oct-15 15:56:18 | 1578 bytes | prism/private/Class/OVP_Map.pm |
| 2004-Apr-23 15:19:56 | 2138 bytes | prism/private/Class/OVP_Type.pm |
| 2004-Jun-16 17:16:20 | 5774 bytes | prism/private/Class/Person.pm |
| 2004-Oct-31 23:57:06 | 2141 bytes | prism/private/Class/Phase.pm |
| 2004-Oct-06 16:05:34 | 2154 bytes | prism/private/Class/PhaseType.pm |
| 2004-Sep-27 13:32:54 | 31809 bytes | prism/private/Class/PipeFit.pm |
| 2004-Oct-20 16:13:32 | 9475 bytes | prism/private/Class/PipeLoss.pm |

```
2004-Nov-06 00:30:38  7959 bytes  prism/private/Class/Plant.pm
2003-Oct-15 15:59:12  2104 bytes  prism/private/Class/Protect.pm
2004-Dec-01 15:05:24  30857 bytes  prism/private/Class/Relief.pm
2004-Dec-13 10:26:47  204 bytes  prism/private/Class/Repo
2003-Oct-15 16:22:22  3286 bytes  prism/private/Class/Repo/Area.pm
2003-Oct-15 16:22:40  1564 bytes  prism/private/Class/Repo/Blob.pm
2004-Mar-03 20:23:52  6137 bytes  prism/private/Class/Repo/Package.pm
2004-Sep-13 18:30:50  8827 bytes  prism/private/Class/Repo/Version.pm
2004-Apr-26 15:07:44  6701 bytes  prism/private/Class/Revision.pm
2004-Nov-11 00:56:08  19492 bytes  prism/private/Class/Scenario.pm
2004-Oct-30 16:42:56  3760 bytes  prism/private/Class/Stream.pm
2003-Nov-25 09:28:22  5961 bytes  prism/private/Class/Task.pm
2004-Jan-22 13:49:24  3691 bytes  prism/private/Class/Trace.pm
2004-Nov-06 00:41:40  8512 bytes  prism/private/Class/Unit.pm
2004-Aug-29 14:22:42  24194 bytes  prism/private/Class/Worksheet.pm
2004-Apr-30 17:41:04  8963 bytes  prism/private/Class/WsSpec.pm
2004-Dec-13 10:28:17  1088 bytes  prism/private/EWF
2004-Dec-13 10:28:16  272 bytes  prism/private/EWF/BuildUnits
2004-Nov-06 09:52:46  50055 bytes  prism/private/EWF/BuildUnits/UnitsAdd.pm
2004-Dec-13 10:28:16  2448 bytes  prism/private/EWF/BuildUnits/_Archive
2002-Dec-30 17:33:22  27693 bytes  prism/private/EWF/BuildUnits/_Archive/UnitsAdd.pm-01
2002-Dec-30 17:33:22  27942 bytes  prism/private/EWF/BuildUnits/_Archive/UnitsAdd.pm-02
2002-Dec-30 17:33:22  28193 bytes  prism/private/EWF/BuildUnits/_Archive/UnitsAdd.pm-03
2002-Dec-30 17:33:22  28468 bytes  prism/private/EWF/BuildUnits/_Archive/UnitsAdd.pm-04
2002-Dec-30 17:33:22  28717 bytes  prism/private/EWF/BuildUnits/_Archive/UnitsAdd.pm-05
2002-Dec-30 17:33:22  28707 bytes  prism/private/EWF/BuildUnits/_Archive/UnitsAdd.pm-06
2002-Dec-30 17:33:22  28750 bytes  prism/private/EWF/BuildUnits/_Archive/UnitsAdd.pm-07
2002-Dec-30 17:33:22  29258 bytes  prism/private/EWF/BuildUnits/_Archive/UnitsAdd.pm-08
2002-Dec-31 11:23:00  29223 bytes  prism/private/EWF/BuildUnits/_Archive/UnitsAdd.pm-09
2003-Jan-02 12:44:44  29208 bytes  prism/private/EWF/BuildUnits/_Archive/UnitsAdd.pm-10
2003-Jan-11 16:12:48  29449 bytes  prism/private/EWF/BuildUnits/_Archive/UnitsAdd.pm-11
2003-Jan-27 16:13:36  30352 bytes  prism/private/EWF/BuildUnits/_Archive/UnitsAdd.pm-12
2003-Jan-27 16:17:44  30798 bytes  prism/private/EWF/BuildUnits/_Archive/UnitsAdd.pm-13
2003-Jan-29 11:38:22  30733 bytes  prism/private/EWF/BuildUnits/_Archive/UnitsAdd.pm-14
2003-Jan-31 11:19:24  34300 bytes  prism/private/EWF/BuildUnits/_Archive/UnitsAdd.pm-15
2003-Feb-04 22:40:40  34384 bytes  prism/private/EWF/BuildUnits/_Archive/UnitsAdd.pm-16
2003-Feb-20 20:46:00  35961 bytes  prism/private/EWF/BuildUnits/_Archive/UnitsAdd.pm-17
2003-Feb-27 15:04:10  35984 bytes  prism/private/EWF/BuildUnits/_Archive/UnitsAdd.pm-18
2003-Feb-28 16:30:16  36924 bytes  prism/private/EWF/BuildUnits/_Archive/UnitsAdd.pm-19
2003-Mar-02 16:49:04  37512 bytes  prism/private/EWF/BuildUnits/_Archive/UnitsAdd.pm-20
2003-Mar-14 08:58:26  37551 bytes  prism/private/EWF/BuildUnits/_Archive/UnitsAdd.pm-21
2003-Mar-28 13:32:00  37698 bytes  prism/private/EWF/BuildUnits/_Archive/UnitsAdd.pm-22
2003-Apr-03 15:11:00  37833 bytes  prism/private/EWF/BuildUnits/_Archive/UnitsAdd.pm-23
2003-Apr-26 16:55:40  37807 bytes  prism/private/EWF/BuildUnits/_Archive/UnitsAdd.pm-24
2003-May-05 15:51:58  39078 bytes  prism/private/EWF/BuildUnits/_Archive/UnitsAdd.pm-25
2003-May-11 21:03:22  38578 bytes  prism/private/EWF/BuildUnits/_Archive/UnitsAdd.pm-26
2003-May-26 21:25:00  38610 bytes  prism/private/EWF/BuildUnits/_Archive/UnitsAdd.pm-27
2003-Jul-01 11:00:22  38933 bytes  prism/private/EWF/BuildUnits/_Archive/UnitsAdd.pm-28
2003-Jul-17 14:19:10  38933 bytes  prism/private/EWF/BuildUnits/_Archive/UnitsAdd.pm-29
2003-Jul-20 23:30:36  40038 bytes  prism/private/EWF/BuildUnits/_Archive/UnitsAdd.pm-30
2004-Feb-10 16:59:50  40284 bytes  prism/private/EWF/BuildUnits/_Archive/UnitsAdd.pm-31
2004-Feb-10 16:57:48  40284 bytes  prism/private/EWF/BuildUnits/_Archive/UnitsAdd.pm-32
2004-Mar-29 23:35:46  40595 bytes  prism/private/EWF/BuildUnits/_Archive/UnitsAdd.pm-33
2004-May-19 15:35:06  44759 bytes  prism/private/EWF/BuildUnits/_Archive/UnitsAdd.pm-34
2004-Jun-13 19:41:06  46130 bytes  prism/private/EWF/BuildUnits/_Archive/UnitsAdd.pm-35
2004-Jun-22 14:40:22  45088 bytes  prism/private/EWF/BuildUnits/_Archive/UnitsAdd.pm-36
2004-Jun-24 11:55:14  46130 bytes  prism/private/EWF/BuildUnits/_Archive/UnitsAdd.pm-37
2004-Jul-21 23:19:04  46356 bytes  prism/private/EWF/BuildUnits/_Archive/UnitsAdd.pm-38
2004-Aug-17 09:41:04  46397 bytes  prism/private/EWF/BuildUnits/_Archive/UnitsAdd.pm-39
2004-Aug-25 11:48:08  47448 bytes  prism/private/EWF/BuildUnits/_Archive/UnitsAdd.pm-40
2004-Aug-28 17:52:10  48292 bytes  prism/private/EWF/BuildUnits/_Archive/UnitsAdd.pm-41
```

| | | |
|---|---|---|
| 2004-Sep-19 12:58:02 | 48516 bytes | prism/private/EWF/BuildUnits/_Archive/UnitsAdd.pm-42 |
| 2004-Oct-14 00:46:36 | 48734 bytes | prism/private/EWF/BuildUnits/_Archive/UnitsAdd.pm-43 |
| 2004-Oct-15 09:57:28 | 48998 bytes | prism/private/EWF/BuildUnits/_Archive/UnitsAdd.pm-44 |
| 2004-Oct-15 11:02:44 | 49439 bytes | prism/private/EWF/BuildUnits/_Archive/UnitsAdd.pm-45 |
| 2003-Feb-16 19:23:00 | 12356 bytes | prism/private/EWF/BuildUnits/_Archive/text.def-01 |
| 2003-Feb-26 15:32:42 | 12371 bytes | prism/private/EWF/BuildUnits/_Archive/text.def-02 |
| 2003-Mar-01 20:57:08 | 12663 bytes | prism/private/EWF/BuildUnits/_Archive/text.def-03 |
| 2004-Mar-29 22:36:44 | 14200 bytes | prism/private/EWF/BuildUnits/_Archive/text.def-04 |
| 2004-Mar-29 23:35:44 | 14139 bytes | prism/private/EWF/BuildUnits/_Archive/text.def-05 |
| 2004-Jun-13 19:37:20 | 15547 bytes | prism/private/EWF/BuildUnits/_Archive/text.def-06 |
| 2004-Jun-13 19:38:00 | 15900 bytes | prism/private/EWF/BuildUnits/_Archive/text.def-07 |
| 2004-Jun-24 11:51:44 | 15653 bytes | prism/private/EWF/BuildUnits/_Archive/text.def-08 |
| 2004-Jul-20 17:05:26 | 12557 bytes | prism/private/EWF/BuildUnits/_Archive/text.def-09 |
| 2004-Jul-21 20:05:28 | 12744 bytes | prism/private/EWF/BuildUnits/_Archive/text.def-10 |
| 2004-Aug-17 09:35:34 | 12830 bytes | prism/private/EWF/BuildUnits/_Archive/text.def-11 |
| 2004-Aug-25 10:48:48 | 12919 bytes | prism/private/EWF/BuildUnits/_Archive/text.def-12 |
| 2004-Aug-26 14:11:06 | 13158 bytes | prism/private/EWF/BuildUnits/_Archive/text.def-13 |
| 2004-Sep-19 12:56:34 | 13863 bytes | prism/private/EWF/BuildUnits/_Archive/text.def-14 |
| 2004-Oct-14 00:46:02 | 13903 bytes | prism/private/EWF/BuildUnits/_Archive/text.def-15 |
| 2004-Oct-14 00:46:24 | 13864 bytes | prism/private/EWF/BuildUnits/_Archive/text.def-16 |
| 2004-Oct-15 10:57:46 | 13934 bytes | prism/private/EWF/BuildUnits/_Archive/text.def-17 |
| 2002-Dec-30 17:33:22 | 1370 bytes | prism/private/EWF/BuildUnits/_Archive/trans-text |
| 2002-Dec-30 17:33:22 | 2689 bytes | prism/private/EWF/BuildUnits/_Archive/trans-units |
| 2004-Feb-10 16:51:06 | 8771 bytes | prism/private/EWF/BuildUnits/_Archive/translate-01 |
| 2004-Jun-13 19:39:22 | 8867 bytes | prism/private/EWF/BuildUnits/_Archive/translate-02 |
| 2004-Aug-26 14:16:42 | 8930 bytes | prism/private/EWF/BuildUnits/_Archive/translate-03 |
| 2003-Jul-17 14:15:32 | 16970 bytes | prism/private/EWF/BuildUnits/_Archive/units.def-01 |
| 2004-Oct-13 16:55:16 | 17256 bytes | prism/private/EWF/BuildUnits/_Archive/units.def-02 |
| 2004-Oct-13 17:15:34 | 17417 bytes | prism/private/EWF/BuildUnits/_Archive/units.def-03 |
| 2003-Jan-14 21:24:14 | 442 bytes | prism/private/EWF/BuildUnits/notes.txt |
| 2004-Oct-15 11:02:42 | 14145 bytes | prism/private/EWF/BuildUnits/text.def |
| 2004-Aug-26 14:24:06 | 9111 bytes | prism/private/EWF/BuildUnits/translate |
| 2004-Nov-02 17:05:54 | 17753 bytes | prism/private/EWF/BuildUnits/units.def |
| 2004-Aug-17 14:45:18 | 6655 bytes | prism/private/EWF/CU.pm |
| 2004-Mar-29 12:14:42 | 6237 bytes | prism/private/EWF/CU.pm-01 |
| 2004-Aug-23 10:09:18 | 4941 bytes | prism/private/EWF/Calculation.pm |
| 2004-Jun-03 10:54:08 | 37602 bytes | prism/private/EWF/CalculationComp.pm |
| 2004-Feb-11 19:55:26 | 33365 bytes | prism/private/EWF/CalculationComp.pm-01 |
| 2004-Feb-15 21:33:46 | 35983 bytes | prism/private/EWF/CalculationComp.pm-02 |
| 2002-Dec-30 17:33:22 | 2443 bytes | prism/private/EWF/Debug.pm |
| 2003-Dec-29 20:10:18 | 610 bytes | prism/private/EWF/DummyUIM.pm |
| 2003-Dec-29 20:05:06 | 5511 bytes | prism/private/EWF/EWF.pm |
| 2004-Jun-21 21:30:06 | 3920 bytes | prism/private/EWF/Engine.pm |
| 2004-Aug-28 22:12:44 | 76510 bytes | prism/private/EWF/FnTab.pm |
| 2003-Feb-24 10:19:50 | 6257 bytes | prism/private/EWF/Function.pm |
| 2004-Dec-13 10:28:16 | 204 bytes | prism/private/EWF/Measure |
| 2004-Jan-19 14:55:28 | 6408 bytes | prism/private/EWF/Measure.pm |
| 2004-Jan-19 14:56:28 | 2334 bytes | prism/private/EWF/Measure/Formula.pm |
| 2003-Jul-04 13:56:58 | 3361 bytes | prism/private/EWF/Measure/Key.pm |
| 2003-Nov-11 11:19:28 | 5792 bytes | prism/private/EWF/Measure/Linear.pm |
| 2004-Mar-14 08:57:50 | 2332 bytes | prism/private/EWF/Measure/String.pm |
| 2004-Dec-13 10:28:16 | 340 bytes | prism/private/EWF/Notes |
| 2004-Dec-13 10:28:16 | 238 bytes | prism/private/EWF/Notes/Surface |
| 2003-Sep-28 16:31:10 | 7087 bytes | prism/private/EWF/Notes/Surface/ellipse.pm |
| 2003-Sep-28 16:36:16 | 720 bytes | prism/private/EWF/Notes/Surface/head-ellip-horiz.pl |
| 2003-Sep-28 16:37:02 | 2198 bytes | prism/private/EWF/Notes/Surface/head-ellip-horiz.tab |
| 2003-Sep-28 16:36:26 | 614 bytes | prism/private/EWF/Notes/Surface/head-ellip-vert.pl |
| 2003-Sep-28 16:37:06 | 2256 bytes | prism/private/EWF/Notes/Surface/head-ellip-vert.tab |
| 2004-Dec-13 10:28:16 | 272 bytes | prism/private/EWF/Notes/_archive |
| 2002-Dec-30 17:33:22 | 2273 bytes | prism/private/EWF/Notes/_archive/2002-12-08.txt |
| 2002-Dec-30 17:33:22 | 1628 bytes | prism/private/EWF/Notes/_archive/deltas-2002-09-13.txt |

```
2002-Dec-30 17:33:22    93 bytes  prism/private/EWF/Notes/_archive/deltas.txt
2002-Dec-30 17:33:22 10150 bytes  prism/private/EWF/Notes/_archive/notes.txt
2002-Dec-30 17:33:22  2063 bytes  prism/private/EWF/Notes/_archive/prism-ago-deltas-2002-09-12.txt
2002-Dec-30 17:33:22  1515 bytes  prism/private/EWF/Notes/_archive/todo.txt
2004-May-20 17:04:40 15313 bytes  prism/private/EWF/Notes/ewf-notes.txt
2002-Dec-30 17:33:22   426 bytes  prism/private/EWF/Notes/exceptions.txt
2004-Aug-29 16:08:54 29442 bytes  prism/private/EWF/Notes/history.txt
2002-Dec-30 17:33:22   794 bytes  prism/private/EWF/Notes/mark4.txt
2004-Aug-23 14:10:54   811 bytes  prism/private/EWF/Notes/message-levels.txt
2002-Dec-30 17:33:22   379 bytes  prism/private/EWF/Notes/naming.txt
2004-Dec-13 10:28:17  3842 bytes  prism/private/EWF/Regress
2003-Mar-31 14:31:20   102 bytes  prism/private/EWF/Regress/ReadMe.txt
2004-Dec-13 10:28:17   238 bytes  prism/private/EWF/Regress/SyntaxCheck
2002-Dec-30 17:33:22   658 bytes  prism/private/EWF/Regress/SyntaxCheck/parlistdup.spec
2002-Dec-30 17:33:22   636 bytes  prism/private/EWF/Regress/SyntaxCheck/parlistmiss.spec
2002-Dec-30 17:33:22   645 bytes  prism/private/EWF/Regress/SyntaxCheck/parlisttype1.spec
2002-Dec-30 17:33:22   647 bytes  prism/private/EWF/Regress/SyntaxCheck/parlisttype2.spec
2002-Dec-30 17:33:22   646 bytes  prism/private/EWF/Regress/SyntaxCheck/parlisttype3.spec
2004-Dec-13 10:28:17  2210 bytes  prism/private/EWF/Regress/WS
2004-Aug-21 23:51:02  7346 bytes  prism/private/EWF/Regress/WS/ArithOps_1.pm
2004-Aug-21 23:51:02    81 bytes  prism/private/EWF/Regress/WS/ArithOps_1.tex
2004-Aug-21 23:51:02   208 bytes  prism/private/EWF/Regress/WS/ArithOps_1.ws
2004-Aug-21 23:51:02  7755 bytes  prism/private/EWF/Regress/WS/Compare_1.pm
2004-Aug-21 23:51:02    81 bytes  prism/private/EWF/Regress/WS/Compare_1.tex
2004-Aug-21 23:51:02   204 bytes  prism/private/EWF/Regress/WS/Compare_1.ws
2004-Aug-21 23:51:02  5856 bytes  prism/private/EWF/Regress/WS/Constants_1.pm
2004-Aug-21 23:51:02    81 bytes  prism/private/EWF/Regress/WS/Constants_1.tex
2004-Aug-21 23:51:02   212 bytes  prism/private/EWF/Regress/WS/Constants_1.ws
2004-Aug-21 23:51:02  3264 bytes  prism/private/EWF/Regress/WS/Defined_1.pm
2004-Aug-21 23:51:02    81 bytes  prism/private/EWF/Regress/WS/Defined_1.tex
2004-Aug-21 23:51:02   204 bytes  prism/private/EWF/Regress/WS/Defined_1.ws
2004-Aug-21 23:51:02  3551 bytes  prism/private/EWF/Regress/WS/ExternalAssign_1.pm
2004-Aug-21 23:51:02    81 bytes  prism/private/EWF/Regress/WS/ExternalAssign_1.tex
2004-Aug-21 23:51:02   232 bytes  prism/private/EWF/Regress/WS/ExternalAssign_1.ws
2004-Aug-21 23:51:02 12906 bytes  prism/private/EWF/Regress/WS/ForeignListNested_1.pm
2004-Aug-21 23:51:02    81 bytes  prism/private/EWF/Regress/WS/ForeignListNested_1.tex
2004-Aug-21 23:51:02   244 bytes  prism/private/EWF/Regress/WS/ForeignListNested_1.ws
2004-Aug-21 23:51:02  7283 bytes  prism/private/EWF/Regress/WS/ForeignList_1.pm
2004-Aug-21 23:51:02    81 bytes  prism/private/EWF/Regress/WS/ForeignList_1.tex
2004-Aug-21 23:51:02   220 bytes  prism/private/EWF/Regress/WS/ForeignList_1.ws
2004-Aug-21 23:51:02 10246 bytes  prism/private/EWF/Regress/WS/ForeignNested_1.pm
2004-Aug-21 23:51:02    81 bytes  prism/private/EWF/Regress/WS/ForeignNested_1.tex
2004-Aug-21 23:51:02   228 bytes  prism/private/EWF/Regress/WS/ForeignNested_1.ws
2004-Aug-21 23:51:02  3958 bytes  prism/private/EWF/Regress/WS/Foreign_1.pm
2004-Aug-21 23:51:02    81 bytes  prism/private/EWF/Regress/WS/Foreign_1.tex
2004-Aug-21 23:51:02   204 bytes  prism/private/EWF/Regress/WS/Foreign_1.ws
2004-Aug-21 23:51:02  3444 bytes  prism/private/EWF/Regress/WS/Function_1.pm
2004-Aug-21 23:51:02    81 bytes  prism/private/EWF/Regress/WS/Function_1.tex
2004-Aug-21 23:51:02   208 bytes  prism/private/EWF/Regress/WS/Function_1.ws
2004-Aug-21 23:51:02  3660 bytes  prism/private/EWF/Regress/WS/LocalMethodsContext_1.pm
2004-Aug-21 23:51:02    81 bytes  prism/private/EWF/Regress/WS/LocalMethodsContext_1.tex
2004-Aug-21 23:51:02   252 bytes  prism/private/EWF/Regress/WS/LocalMethodsContext_1.ws
2004-Aug-21 23:51:02  5415 bytes  prism/private/EWF/Regress/WS/LocalMethods_1.pm
2004-Aug-21 23:51:02    81 bytes  prism/private/EWF/Regress/WS/LocalMethods_1.tex
2004-Aug-21 23:51:02   224 bytes  prism/private/EWF/Regress/WS/LocalMethods_1.ws
2004-Aug-21 23:51:02  9301 bytes  prism/private/EWF/Regress/WS/NamesAndReferences_1.pm
2004-Aug-21 23:51:02    81 bytes  prism/private/EWF/Regress/WS/NamesAndReferences_1.tex
2004-Aug-21 23:51:02   248 bytes  prism/private/EWF/Regress/WS/NamesAndReferences_1.ws
2004-Aug-21 23:51:02  6576 bytes  prism/private/EWF/Regress/WS/NestedAccess_1.pm
2004-Aug-21 23:51:02    81 bytes  prism/private/EWF/Regress/WS/NestedAccess_1.tex
2004-Aug-21 23:51:02   224 bytes  prism/private/EWF/Regress/WS/NestedAccess_1.ws
```

2004-Aug-21 23:51:02 12401 bytes prism/private/EWF/Regress/WS/Nested_1.pm
2004-Aug-21 23:51:02 81 bytes prism/private/EWF/Regress/WS/Nested_1.tex
2004-Aug-21 23:51:02 200 bytes prism/private/EWF/Regress/WS/Nested_1.ws
2004-Aug-21 23:51:02 3234 bytes prism/private/EWF/Regress/WS/NonValue_1.pm
2004-Aug-21 23:51:02 81 bytes prism/private/EWF/Regress/WS/NonValue_1.tex
2004-Aug-21 23:51:02 208 bytes prism/private/EWF/Regress/WS/NonValue_1.ws
2004-Aug-21 23:51:02 4730 bytes prism/private/EWF/Regress/WS/Persistent_1.pm
2004-Aug-21 23:51:02 81 bytes prism/private/EWF/Regress/WS/Persistent_1.tex
2004-Aug-21 23:51:02 216 bytes prism/private/EWF/Regress/WS/Persistent_1.ws
2004-Aug-21 23:51:02 3471 bytes prism/private/EWF/Regress/WS/SteamTables_1.pm
2004-Aug-21 23:51:02 81 bytes prism/private/EWF/Regress/WS/SteamTables_1.tex
2004-Aug-21 23:51:02 220 bytes prism/private/EWF/Regress/WS/SteamTables_1.ws
2004-Aug-21 23:51:02 3084 bytes prism/private/EWF/Regress/WS/Undefined_1.pm
2004-Aug-21 23:51:02 81 bytes prism/private/EWF/Regress/WS/Undefined_1.tex
2004-Aug-21 23:51:02 212 bytes prism/private/EWF/Regress/WS/Undefined_1.ws
2004-Aug-21 23:51:02 6359 bytes prism/private/EWF/Regress/WS/Versions_1.pm
2004-Aug-21 23:51:02 81 bytes prism/private/EWF/Regress/WS/Versions_1.tex
2004-Aug-21 23:51:02 208 bytes prism/private/EWF/Regress/WS/Versions_1.ws
2004-Aug-21 23:51:02 10738 bytes prism/private/EWF/Regress/WS/WithinEpsilon_1.pm
2004-Aug-21 23:51:02 81 bytes prism/private/EWF/Regress/WS/WithinEpsilon_1.tex
2004-Aug-21 23:51:02 228 bytes prism/private/EWF/Regress/WS/WithinEpsilon_1.ws
2004-Dec-13 10:28:16 612 bytes prism/private/EWF/Regress/_archive
2002-Dec-30 17:33:22 4379 bytes prism/private/EWF/Regress/_archive/BF-VM-1-0-4-2.spec
2002-Dec-30 17:33:22 2685 bytes prism/private/EWF/Regress/_archive/_test-foreign
2002-Dec-30 17:33:22 1731 bytes prism/private/EWF/Regress/_archive/_test-nested
2002-Dec-30 17:33:22 994 bytes prism/private/EWF/Regress/_archive/env.clc
2002-Dec-30 17:33:22 7446 bytes prism/private/EWF/Regress/_archive/haz-vm.clc
2002-Dec-30 17:33:22 302 bytes prism/private/EWF/Regress/_archive/haz-vm.spec
2002-Dec-30 17:33:22 614 bytes prism/private/EWF/Regress/_archive/junk.spec
2002-Dec-30 17:33:22 601 bytes prism/private/EWF/Regress/_archive/plant.spec
2002-Dec-30 17:33:22 3596 bytes prism/private/EWF/Regress/_archive/relief.clc
2002-Dec-30 17:33:22 125 bytes prism/private/EWF/Regress/_archive/t.pl
2002-Dec-30 17:33:22 1527 bytes prism/private/EWF/Regress/_archive/t1.pl
2002-Dec-30 17:33:22 926 bytes prism/private/EWF/Regress/_archive/t1.test
2002-Dec-30 17:33:22 46 bytes prism/private/EWF/Regress/_archive/t1p1.in
2002-Dec-30 17:33:22 39 bytes prism/private/EWF/Regress/_archive/t1p1.out
2002-Dec-30 17:33:22 568 bytes prism/private/EWF/Regress/_archive/t1s1.in
2002-Dec-30 17:33:22 987 bytes prism/private/EWF/Regress/_archive/t1s1.out
2004-Mar-12 10:41:30 50 bytes prism/private/EWF/Regress/_compile
2004-Mar-09 22:01:36 54 bytes prism/private/EWF/Regress/_compileAll
2004-Feb-17 11:52:36 45 bytes prism/private/EWF/Regress/_test
2002-Dec-30 17:33:22 1140 bytes prism/private/EWF/Regress/add.clc
2004-Mar-23 09:59:28 2417 bytes prism/private/EWF/Regress/arithops.spec
2003-Jul-09 21:31:24 2731 bytes prism/private/EWF/Regress/compare.spec
2003-Jul-08 19:31:00 1961 bytes prism/private/EWF/Regress/constants.spec
2002-Dec-30 17:33:22 766 bytes prism/private/EWF/Regress/defined.spec
2003-Jun-05 16:11:54 906 bytes prism/private/EWF/Regress/externalAssign.spec
2002-Dec-30 17:33:22 899 bytes prism/private/EWF/Regress/foreign.clc
2002-Dec-30 17:33:22 356 bytes prism/private/EWF/Regress/foreign.spec
2003-Jun-04 10:47:36 2534 bytes prism/private/EWF/Regress/foreignlist.spec
2002-Dec-30 17:33:22 2483 bytes prism/private/EWF/Regress/foreignlistnested.clc
2002-Dec-30 17:33:22 376 bytes prism/private/EWF/Regress/foreignlistnested.spec
2002-Dec-30 17:33:22 1271 bytes prism/private/EWF/Regress/foreignlistsubcalc1.clc
2002-Dec-30 17:33:22 983 bytes prism/private/EWF/Regress/foreignlistsubcalc2.clc
2002-Dec-30 17:33:22 1415 bytes prism/private/EWF/Regress/foreignnested.clc
2002-Dec-30 17:33:22 368 bytes prism/private/EWF/Regress/foreignnested.spec
2002-Dec-30 17:33:22 1140 bytes prism/private/EWF/Regress/foreignsubcalc1.clc
2002-Dec-30 17:33:22 1024 bytes prism/private/EWF/Regress/foreignsubcalc2.clc
2002-Dec-30 17:33:22 786 bytes prism/private/EWF/Regress/function.spec
2002-Dec-30 17:33:22 970 bytes prism/private/EWF/Regress/lang.txt
2002-Dec-30 17:33:22 1850 bytes prism/private/EWF/Regress/localMethods.spec

| | | |
|---|---|---|
| 2003-Apr-15 16:01:22 | 1094 bytes | prism/private/EWF/Regress/localMethodsContext.spec |
| 2003-Mar-14 16:03:20 | 482 bytes | prism/private/EWF/Regress/namesandrefl.clc |
| 2003-Mar-14 16:32:10 | 2789 bytes | prism/private/EWF/Regress/namesandreferences.clc |
| 2003-Mar-14 12:17:46 | 378 bytes | prism/private/EWF/Regress/namesandreferences.spec |
| 2002-Dec-30 17:33:22 | 2336 bytes | prism/private/EWF/Regress/nested.clc |
| 2002-Dec-30 17:33:22 | 1415 bytes | prism/private/EWF/Regress/nested.spec |
| 2002-Dec-30 17:33:22 | 1032 bytes | prism/private/EWF/Regress/nestedAccess.clc |
| 2002-Dec-30 17:33:22 | 230 bytes | prism/private/EWF/Regress/nestedAccess.spec |
| 2002-Dec-30 17:33:22 | 765 bytes | prism/private/EWF/Regress/nestedAccessF.clc |
| 2003-Jul-08 20:06:34 | 733 bytes | prism/private/EWF/Regress/nonvalue.spec |
| 2002-Dec-30 17:33:22 | 915 bytes | prism/private/EWF/Regress/notes-regress.txt |
| 2003-Jun-02 11:10:54 | 1461 bytes | prism/private/EWF/Regress/persistent.spec |
| 2002-Dec-30 17:33:22 | 165 bytes | prism/private/EWF/Regress/reg-1.in |
| 2004-Aug-21 23:55:00 | 338 bytes | prism/private/EWF/Regress/reg-1.out |
| 2002-Dec-30 17:33:22 | 295 bytes | prism/private/EWF/Regress/reg-1.ref |
| 2003-Jul-08 17:36:16 | 4 bytes | prism/private/EWF/Regress/reg-10.in |
| 2004-Aug-21 23:55:00 | 188 bytes | prism/private/EWF/Regress/reg-10.out |
| 2003-Jul-08 20:19:30 | 188 bytes | prism/private/EWF/Regress/reg-10.ref |
| 2002-Dec-30 17:33:22 | 30 bytes | prism/private/EWF/Regress/reg-11.in |
| 2004-Aug-21 23:55:00 | 115 bytes | prism/private/EWF/Regress/reg-11.out |
| 2002-Dec-30 17:33:22 | 72 bytes | prism/private/EWF/Regress/reg-11.ref |
| 2002-Dec-30 17:33:22 | 136 bytes | prism/private/EWF/Regress/reg-12.in |
| 2004-Aug-21 23:55:00 | 302 bytes | prism/private/EWF/Regress/reg-12.out |
| 2002-Dec-30 17:33:22 | 302 bytes | prism/private/EWF/Regress/reg-12.ref |
| 2002-Dec-30 17:33:22 | 74 bytes | prism/private/EWF/Regress/reg-12a.ref |
| 2002-Dec-30 17:33:22 | 138 bytes | prism/private/EWF/Regress/reg-13.in |
| 2004-Aug-21 23:55:00 | 403 bytes | prism/private/EWF/Regress/reg-13.out |
| 2002-Dec-30 17:33:22 | 403 bytes | prism/private/EWF/Regress/reg-13.ref |
| 2003-Mar-14 14:53:06 | 64 bytes | prism/private/EWF/Regress/reg-14.in |
| 2004-Aug-21 23:55:00 | 214 bytes | prism/private/EWF/Regress/reg-14.out |
| 2003-Mar-14 16:32:32 | 214 bytes | prism/private/EWF/Regress/reg-14.ref |
| 2003-Apr-15 16:11:36 | 115 bytes | prism/private/EWF/Regress/reg-15.in |
| 2004-Aug-21 23:55:00 | 115 bytes | prism/private/EWF/Regress/reg-15.out |
| 2003-Apr-15 16:11:40 | 115 bytes | prism/private/EWF/Regress/reg-15.ref |
| 2003-Jun-02 11:08:26 | 59 bytes | prism/private/EWF/Regress/reg-16.in |
| 2004-Aug-21 23:55:00 | 116 bytes | prism/private/EWF/Regress/reg-16.out |
| 2003-Jun-02 11:06:56 | 116 bytes | prism/private/EWF/Regress/reg-16.ref |
| 2003-Jul-09 14:51:18 | 3 bytes | prism/private/EWF/Regress/reg-17.in |
| 2004-Aug-21 23:55:00 | 223 bytes | prism/private/EWF/Regress/reg-17.out |
| 2003-Jul-09 21:32:18 | 223 bytes | prism/private/EWF/Regress/reg-17.ref |
| 2003-Nov-26 11:18:42 | 3 bytes | prism/private/EWF/Regress/reg-18.in |
| 2004-Aug-21 23:55:00 | 282 bytes | prism/private/EWF/Regress/reg-18.out |
| 2004-Aug-21 23:51:08 | 282 bytes | prism/private/EWF/Regress/reg-18.ref |
| 2004-Mar-12 10:31:16 | 3 bytes | prism/private/EWF/Regress/reg-19.in |
| 2004-Aug-21 23:55:00 | 312 bytes | prism/private/EWF/Regress/reg-19.out |
| 2004-Aug-17 14:43:40 | 312 bytes | prism/private/EWF/Regress/reg-19.ref |
| 2002-Dec-30 17:33:22 | 303 bytes | prism/private/EWF/Regress/reg-1a.out |
| 2002-Dec-30 17:33:22 | 62 bytes | prism/private/EWF/Regress/reg-2.in |
| 2004-Aug-21 23:55:00 | 155 bytes | prism/private/EWF/Regress/reg-2.out |
| 2002-Dec-30 17:33:22 | 112 bytes | prism/private/EWF/Regress/reg-2.ref |
| 2004-Mar-23 09:51:38 | 3 bytes | prism/private/EWF/Regress/reg-20.in |
| 2004-Aug-21 23:55:00 | 399 bytes | prism/private/EWF/Regress/reg-20.out |
| 2004-Mar-23 09:59:44 | 399 bytes | prism/private/EWF/Regress/reg-20.ref |
| 2002-Dec-30 17:33:22 | 72 bytes | prism/private/EWF/Regress/reg-3.in |
| 2004-Aug-21 23:55:00 | 265 bytes | prism/private/EWF/Regress/reg-3.out |
| 2002-Dec-30 17:33:22 | 265 bytes | prism/private/EWF/Regress/reg-3.ref |
| 2003-Jun-05 11:33:36 | 61 bytes | prism/private/EWF/Regress/reg-4.in |
| 2004-Aug-21 23:55:00 | 118 bytes | prism/private/EWF/Regress/reg-4.out |
| 2003-Jun-05 12:03:34 | 118 bytes | prism/private/EWF/Regress/reg-4.ref |
| 2002-Dec-30 17:33:22 | 62 bytes | prism/private/EWF/Regress/reg-5.in |
| 2004-Aug-21 23:55:00 | 116 bytes | prism/private/EWF/Regress/reg-5.out |

```
2002-Dec-30 17:33:22    73 bytes   prism/private/EWF/Regress/reg-5.ref
2002-Dec-30 17:33:22    30 bytes   prism/private/EWF/Regress/reg-6.in
2004-Aug-21 23:55:00   115 bytes   prism/private/EWF/Regress/reg-6.out
2002-Dec-30 17:33:22    72 bytes   prism/private/EWF/Regress/reg-6.ref
2002-Dec-30 17:33:22    94 bytes   prism/private/EWF/Regress/reg-7.in
2004-Aug-21 23:55:00   152 bytes   prism/private/EWF/Regress/reg-7.out
2002-Dec-30 17:33:22   109 bytes   prism/private/EWF/Regress/reg-7.ref
2002-Dec-30 17:33:22    33 bytes   prism/private/EWF/Regress/reg-8.in
2004-Aug-21 23:55:00    81 bytes   prism/private/EWF/Regress/reg-8.out
2003-Jun-05 11:30:58    81 bytes   prism/private/EWF/Regress/reg-8.ref
2002-Dec-30 17:33:22    28 bytes   prism/private/EWF/Regress/reg-9.in
2004-Aug-21 23:55:00   142 bytes   prism/private/EWF/Regress/reg-9.out
2002-Dec-30 17:33:22    99 bytes   prism/private/EWF/Regress/reg-9.ref
2003-Mar-09 16:50:20  1429 bytes   prism/private/EWF/Regress/regress-value.pl
2003-Jun-05 16:10:42 10810 bytes   prism/private/EWF/Regress/regress.pl
2003-Mar-14 16:26:08 10013 bytes   prism/private/EWF/Regress/regress.pl-01
2003-Jun-05 11:39:08 10012 bytes   prism/private/EWF/Regress/regress.pl-02
2004-Aug-17 14:41:00  4090 bytes   prism/private/EWF/Regress/regress.test
2002-Dec-30 17:33:22   671 bytes   prism/private/EWF/Regress/scale.clc
2004-Mar-29 09:54:10   788 bytes   prism/private/EWF/Regress/steamtables.spec
2002-Dec-30 17:33:22   696 bytes   prism/private/EWF/Regress/undefined.spec
2004-Aug-21 23:50:54  2056 bytes   prism/private/EWF/Regress/versions.spec
2004-Aug-17 14:39:54  4044 bytes   prism/private/EWF/Regress/withinepsilon.spec
2004-Dec-13 10:28:17   408 bytes   prism/private/EWF/Test
2003-Mar-03 21:21:26  6186 bytes   prism/private/EWF/Test/D.tgz
2004-Dec-13 10:28:17  1428 bytes   prism/private/EWF/Test/_archive
2004-Dec-13 10:28:17   102 bytes   prism/private/EWF/Test/_archive/T6
2002-Dec-30 17:33:22    62 bytes   prism/private/EWF/Test/_archive/T6/test-6.pm
2002-Dec-30 17:33:22   994 bytes   prism/private/EWF/Test/_archive/env.clc
2002-Dec-30 17:33:22  7148 bytes   prism/private/EWF/Test/_archive/haz-vm.clc
2002-Dec-30 17:33:22  5021 bytes   prism/private/EWF/Test/_archive/notes.txt-01
2002-Dec-30 17:33:22   938 bytes   prism/private/EWF/Test/_archive/plant.clc
2002-Dec-30 17:33:22   376 bytes   prism/private/EWF/Test/_archive/plant.spec
2002-Dec-30 17:33:22   264 bytes   prism/private/EWF/Test/_archive/plant.spec-01
2002-Dec-30 17:33:22  1011 bytes   prism/private/EWF/Test/_archive/plant.spec-02
2002-Dec-30 17:33:22  3335 bytes   prism/private/EWF/Test/_archive/regress.pl-01
2002-Dec-30 17:33:22  3945 bytes   prism/private/EWF/Test/_archive/regress.pl-02
2002-Dec-30 17:33:22  3881 bytes   prism/private/EWF/Test/_archive/regress.pl-03
2002-Dec-30 17:33:22  3601 bytes   prism/private/EWF/Test/_archive/relief.clc
2002-Dec-30 17:33:22   811 bytes   prism/private/EWF/Test/_archive/t1.test
2002-Dec-30 17:33:22    35 bytes   prism/private/EWF/Test/_archive/t1p1.in
2002-Dec-30 17:33:22    39 bytes   prism/private/EWF/Test/_archive/t1p1.out
2002-Dec-30 17:33:22    30 bytes   prism/private/EWF/Test/_archive/t1r1.in
2002-Dec-30 17:33:22   363 bytes   prism/private/EWF/Test/_archive/t1r1.out
2002-Dec-30 17:33:22   568 bytes   prism/private/EWF/Test/_archive/t1s1.in
2002-Dec-30 17:33:22   987 bytes   prism/private/EWF/Test/_archive/t1s1.out
2002-Dec-30 17:33:22   567 bytes   prism/private/EWF/Test/_archive/t1s2.in
2002-Dec-30 17:33:22   983 bytes   prism/private/EWF/Test/_archive/t1s2.out
2002-Dec-30 17:33:22   129 bytes   prism/private/EWF/Test/_archive/t2.test
2002-Dec-30 17:33:22    38 bytes   prism/private/EWF/Test/_archive/t2p1.in
2002-Dec-30 17:33:22    74 bytes   prism/private/EWF/Test/_archive/t2p1.out
2002-Dec-30 17:33:22   131 bytes   prism/private/EWF/Test/_archive/t3.test
2002-Dec-30 17:33:22    92 bytes   prism/private/EWF/Test/_archive/t3c1.in
2002-Dec-30 17:33:22   186 bytes   prism/private/EWF/Test/_archive/t4.test
2002-Dec-30 17:33:22   414 bytes   prism/private/EWF/Test/_archive/test-1.pl
2002-Dec-30 17:33:22   549 bytes   prism/private/EWF/Test/_archive/test-10.pl
2002-Dec-30 17:33:22  1255 bytes   prism/private/EWF/Test/_archive/test-11.pl
2002-Dec-30 17:33:22   220 bytes   prism/private/EWF/Test/_archive/test-12.pl
2002-Dec-30 17:33:22   113 bytes   prism/private/EWF/Test/_archive/test-2.pl
2002-Dec-30 17:33:22   223 bytes   prism/private/EWF/Test/_archive/test-3.pl
2002-Dec-30 17:33:22  1400 bytes   prism/private/EWF/Test/_archive/test-4.pl
```

2002-Dec-30 17:33:22 1174 bytes prism/private/EWF/Test/_archive/test-5.pl
2002-Dec-30 17:33:22 172 bytes prism/private/EWF/Test/_archive/test-6.pl
2002-Dec-30 17:33:22 748 bytes prism/private/EWF/Test/_archive/test-7.pl
2002-Dec-30 17:33:22 545 bytes prism/private/EWF/Test/_archive/test-8.pl
2002-Dec-30 17:33:22 369 bytes prism/private/EWF/Test/_archive/test-9.pl
2002-Dec-30 17:33:22 213 bytes prism/private/EWF/Test/_archive/test-9.pm
2002-Dec-30 17:33:22 1162 bytes prism/private/EWF/Test/_initdb
2002-Dec-30 17:33:22 1095 bytes prism/private/EWF/Test/convertStyles
2002-Dec-30 17:33:22 2258 bytes prism/private/EWF/Test/function-1.pl
2002-Dec-30 17:33:22 1646 bytes prism/private/EWF/Test/function.pl
2002-Dec-30 17:33:22 1680 bytes prism/private/EWF/Test/hash-test.pl
2002-Dec-30 17:33:22 187 bytes prism/private/EWF/Test/t1.pl
2002-Dec-30 17:33:22 1113 bytes prism/private/EWF/Test/test1.pl
2002-Dec-30 17:33:22 1152 bytes prism/private/EWF/Test/test2.pl
2004-Mar-07 23:48:02 7622 bytes prism/private/EWF/Units.pm
2004-Aug-22 00:45:38 3887 bytes prism/private/EWF/Utils.pm
2004-Aug-24 22:08:20 15283 bytes prism/private/EWF/Value.pm
2004-Jun-14 12:45:02 3718 bytes prism/private/EWF/Variable.pm
2004-Oct-06 13:32:30 19254 bytes prism/private/EWF/Worksheet.pm
2004-Aug-20 12:26:56 9240 bytes prism/private/EWF/WorksheetComp.pm
2004-Dec-13 10:28:16 4046 bytes prism/private/EWF/fntab
2004-Dec-13 10:28:16 340 bytes prism/private/EWF/fntab/Archive
2002-Dec-30 17:33:22 61581 bytes prism/private/EWF/fntab/Archive/FnTab.pm-01
2002-Dec-30 17:33:22 691 bytes prism/private/EWF/fntab/Archive/FnTab.pm-02
2003-Mar-31 10:49:40 63731 bytes prism/private/EWF/fntab/Archive/FnTab.pm-03
2003-May-09 20:06:14 64724 bytes prism/private/EWF/fntab/Archive/FnTab.pm-04
2003-May-11 22:24:40 65677 bytes prism/private/EWF/fntab/Archive/FnTab.pm-05
2003-Jul-20 10:03:16 68064 bytes prism/private/EWF/fntab/Archive/FnTab.pm-06
2004-Mar-29 12:43:14 73943 bytes prism/private/EWF/fntab/Archive/FnTab.pm-07
2004-Mar-29 14:05:38 76382 bytes prism/private/EWF/fntab/Archive/FnTab.pm-08
2004-Dec-13 10:28:16 442 bytes prism/private/EWF/fntab/Graphs
2004-Sep-08 17:53:42 98 bytes prism/private/EWF/fntab/Graphs/8022
2004-Aug-29 09:40:30 2542 bytes prism/private/EWF/fntab/Graphs/api-kb-k10.tab.png
2004-Aug-29 09:40:30 2631 bytes prism/private/EWF/fntab/Graphs/api-kb-k12.tab.png
2004-Aug-29 09:40:32 2672 bytes prism/private/EWF/fntab/Graphs/api-kb-k14.tab.png
2004-Aug-29 09:40:32 2770 bytes prism/private/EWF/fntab/Graphs/api-kb-k16.tab.png
2004-Aug-29 09:40:32 2771 bytes prism/private/EWF/fntab/Graphs/api-kb-k18.tab.png
2004-Aug-29 09:58:22 88 bytes prism/private/EWF/fntab/Graphs/api-kb-short.tab
2004-Aug-29 09:58:46 2703 bytes prism/private/EWF/fntab/Graphs/api-kb-short.tab.png
2004-Aug-29 09:40:30 2797 bytes prism/private/EWF/fntab/Graphs/api-kb.tab.png
2004-Aug-29 09:39:36 200 bytes prism/private/EWF/fntab/Graphs/gen-plots
2004-Aug-29 09:39:14 2239 bytes prism/private/EWF/fntab/Graphs/table-plot
2004-Aug-29 10:06:20 2489 bytes prism/private/EWF/fntab/api-kb-extrapolate.pl
2004-Aug-29 09:57:26 98 bytes prism/private/EWF/fntab/api-kb-k10.tab
2004-Aug-29 09:57:30 98 bytes prism/private/EWF/fntab/api-kb-k12.tab
2004-Aug-29 10:09:42 98 bytes prism/private/EWF/fntab/api-kb-k14.tab
2004-Aug-29 09:57:38 98 bytes prism/private/EWF/fntab/api-kb-k16.tab
2004-Aug-29 09:57:40 98 bytes prism/private/EWF/fntab/api-kb-k18.tab
2004-Aug-28 22:07:22 107 bytes prism/private/EWF/fntab/api-kb.tab
2003-Jun-23 19:05:32 71 bytes prism/private/EWF/fntab/api-kv10.tab
2003-Jun-23 19:05:32 30 bytes prism/private/EWF/fntab/api-kv16.tab
2003-Jun-23 19:05:32 19 bytes prism/private/EWF/fntab/api-kv21.tab
2003-Jun-23 19:05:32 62 bytes prism/private/EWF/fntab/api-kw.tab
2004-Mar-29 12:41:50 4947 bytes prism/private/EWF/fntab/build.pl
2003-Jun-23 19:05:32 52 bytes prism/private/EWF/fntab/crosby-ext-kv10-50b-dh.tab
2003-Jun-23 19:05:32 50 bytes prism/private/EWF/fntab/crosby-ext-kv10-50b-jt.tab
2003-Jun-23 19:05:32 59 bytes prism/private/EWF/fntab/crosby-ext-kv10-50p.tab
2003-Jun-23 19:05:32 71 bytes prism/private/EWF/fntab/crosby-ext-kw.tab
2003-Jun-23 19:05:32 210 bytes prism/private/EWF/fntab/crosby-kb.tab
2003-Jun-23 19:05:32 40 bytes prism/private/EWF/fntab/crosby-kv10-50b-dh.tab
2003-Jun-23 19:05:32 40 bytes prism/private/EWF/fntab/crosby-kv10-50b-jt.tab

| | | |
|---|---|---|
| 2003-Jun-23 19:05:32 | 50 bytes | prism/private/EWF/fntab/crosby-kv10-50p.tab |
| 2003-Jun-23 19:05:32 | 61 bytes | prism/private/EWF/fntab/crosby-kw.tab |
| 2003-May-11 20:16:34 | 300 bytes | prism/private/EWF/fntab/doext |
| 2003-Jun-23 19:05:32 | 110 bytes | prism/private/EWF/fntab/farris-kb-3800.tab |
| 2003-Jun-23 19:05:32 | 69 bytes | prism/private/EWF/fntab/farris-kb.tab |
| 2003-Jun-23 19:05:32 | 49 bytes | prism/private/EWF/fntab/farris-kv-2700.tab |
| 2003-Jun-23 19:05:32 | 29 bytes | prism/private/EWF/fntab/farris-kv10.tab |
| 2003-Jun-23 19:05:32 | 29 bytes | prism/private/EWF/fntab/farris-kv16.tab |
| 2003-Jun-23 19:05:32 | 29 bytes | prism/private/EWF/fntab/farris-kv21.tab |
| 2003-Jun-23 19:05:32 | 49 bytes | prism/private/EWF/fntab/farris-kw-2700.tab |
| 2003-Jun-23 19:05:32 | 69 bytes | prism/private/EWF/fntab/farris-kw.tab |
| 2003-Jun-23 19:05:32 | 110 bytes | prism/private/EWF/fntab/fbptokb.tab |
| 2003-Jun-23 19:05:32 | 49 bytes | prism/private/EWF/fntab/fbptokvkw2700.tab |
| 2003-Jun-23 19:05:32 | 69 bytes | prism/private/EWF/fntab/fbptokw.tab |
| 2003-Jun-23 19:05:32 | 60 bytes | prism/private/EWF/fntab/fcpr05.tab |
| 2003-Jun-23 19:05:32 | 71 bytes | prism/private/EWF/fntab/fcpr07.tab |
| 2003-Jun-23 19:05:32 | 62 bytes | prism/private/EWF/fntab/fcpr10.tab |
| 2003-Jun-23 19:05:32 | 50 bytes | prism/private/EWF/fntab/fcpr15.tab |
| 2003-Jun-23 19:05:32 | 53 bytes | prism/private/EWF/fntab/fcpr20.tab |
| 2003-Jun-23 19:05:32 | 39 bytes | prism/private/EWF/fntab/fcpr40.tab |
| 2003-Jun-23 19:05:32 | 28 bytes | prism/private/EWF/fntab/fcprinf.tab |
| 2003-Jun-23 19:05:32 | 583 bytes | prism/private/EWF/fntab/fktoc.tab |
| 2003-Jun-23 19:05:32 | 210 bytes | prism/private/EWF/fntab/fktokr.tab |
| 2003-Jun-23 19:05:32 | 29 bytes | prism/private/EWF/fntab/fkv10.tab |
| 2003-Jun-23 19:05:32 | 29 bytes | prism/private/EWF/fntab/fkv16.tab |
| 2003-Jun-23 19:05:32 | 29 bytes | prism/private/EWF/fntab/fkv21.tab |
| 2003-Jun-23 19:05:32 | 699 bytes | prism/private/EWF/fntab/fomegad1.tab |
| 2003-Jun-23 19:05:32 | 133 bytes | prism/private/EWF/fntab/fprtosp.tab |
| 2003-Sep-28 16:37:40 | 2198 bytes | prism/private/EWF/fntab/head-ellip-horiz.tab |
| 2003-Sep-28 16:37:44 | 2256 bytes | prism/private/EWF/fntab/head-ellip-vert.tab |
| 2004-Aug-28 21:30:06 | 443 bytes | prism/private/EWF/fntab/interpolate.pl |
| 2003-Jun-23 19:05:32 | 17 bytes | prism/private/EWF/fntab/ksh000.tab |
| 2003-Jun-23 19:05:32 | 352 bytes | prism/private/EWF/fntab/ksh001.tab |
| 2003-Jun-23 19:05:32 | 352 bytes | prism/private/EWF/fntab/ksh002.tab |
| 2003-Jun-23 19:05:32 | 343 bytes | prism/private/EWF/fntab/ksh004.tab |
| 2003-Jun-23 19:05:32 | 334 bytes | prism/private/EWF/fntab/ksh006.tab |
| 2003-Jun-23 19:05:32 | 325 bytes | prism/private/EWF/fntab/ksh008.tab |
| 2003-Jun-23 19:05:32 | 316 bytes | prism/private/EWF/fntab/ksh010.tab |
| 2003-Jun-23 19:05:32 | 316 bytes | prism/private/EWF/fntab/ksh012.tab |
| 2003-Jun-23 19:05:32 | 307 bytes | prism/private/EWF/fntab/ksh014.tab |
| 2003-Jun-23 19:05:32 | 307 bytes | prism/private/EWF/fntab/ksh016.tab |
| 2003-Jun-23 19:05:32 | 298 bytes | prism/private/EWF/fntab/ksh018.tab |
| 2003-Jun-23 19:05:32 | 298 bytes | prism/private/EWF/fntab/ksh020.tab |
| 2003-Jun-23 19:05:32 | 298 bytes | prism/private/EWF/fntab/ksh022.tab |
| 2003-Jun-23 19:05:32 | 289 bytes | prism/private/EWF/fntab/ksh024.tab |
| 2003-Jun-23 19:05:32 | 289 bytes | prism/private/EWF/fntab/ksh026.tab |
| 2003-Jun-23 19:05:32 | 289 bytes | prism/private/EWF/fntab/ksh028.tab |
| 2003-Jun-23 19:05:32 | 280 bytes | prism/private/EWF/fntab/ksh030.tab |
| 2003-Jun-23 19:05:32 | 280 bytes | prism/private/EWF/fntab/ksh035.tab |
| 2003-Jun-23 19:05:32 | 271 bytes | prism/private/EWF/fntab/ksh040.tab |
| 2003-Jun-23 19:05:32 | 262 bytes | prism/private/EWF/fntab/ksh045.tab |
| 2003-Jun-23 19:05:32 | 262 bytes | prism/private/EWF/fntab/ksh050.tab |
| 2003-Jun-23 19:05:32 | 253 bytes | prism/private/EWF/fntab/ksh055.tab |
| 2003-Jun-23 19:05:32 | 253 bytes | prism/private/EWF/fntab/ksh060.tab |
| 2003-Jun-23 19:05:32 | 244 bytes | prism/private/EWF/fntab/ksh065.tab |
| 2003-Jun-23 19:05:32 | 244 bytes | prism/private/EWF/fntab/ksh070.tab |
| 2003-Jun-23 19:05:32 | 244 bytes | prism/private/EWF/fntab/ksh075.tab |
| 2003-Jun-23 19:05:32 | 235 bytes | prism/private/EWF/fntab/ksh080.tab |
| 2003-Jun-23 19:05:32 | 235 bytes | prism/private/EWF/fntab/ksh085.tab |
| 2003-Jun-23 19:05:32 | 235 bytes | prism/private/EWF/fntab/ksh090.tab |
| 2003-Jun-23 19:05:32 | 226 bytes | prism/private/EWF/fntab/ksh095.tab |

| | | |
|---|---|---|
| 2003-Jun-23 19:05:32 | 226 bytes | prism/private/EWF/fntab/ksh100.tab |
| 2003-Jun-23 19:05:32 | 226 bytes | prism/private/EWF/fntab/ksh105.tab |
| 2003-Jun-23 19:05:32 | 217 bytes | prism/private/EWF/fntab/ksh110.tab |
| 2003-Jun-23 19:05:32 | 217 bytes | prism/private/EWF/fntab/ksh115.tab |
| 2003-Jun-23 19:05:32 | 217 bytes | prism/private/EWF/fntab/ksh120.tab |
| 2003-Jun-23 19:05:32 | 208 bytes | prism/private/EWF/fntab/ksh125.tab |
| 2003-Jun-23 19:05:32 | 208 bytes | prism/private/EWF/fntab/ksh130.tab |
| 2003-Jun-23 19:05:32 | 208 bytes | prism/private/EWF/fntab/ksh135.tab |
| 2003-Jun-23 19:05:32 | 208 bytes | prism/private/EWF/fntab/ksh140.tab |
| 2003-Jun-23 19:05:32 | 199 bytes | prism/private/EWF/fntab/ksh145.tab |
| 2003-Jun-23 19:05:32 | 199 bytes | prism/private/EWF/fntab/ksh150.tab |
| 2003-Jun-23 19:05:32 | 199 bytes | prism/private/EWF/fntab/ksh160.tab |
| 2003-Jun-23 19:05:32 | 199 bytes | prism/private/EWF/fntab/ksh170.tab |
| 2003-Jun-23 19:05:32 | 190 bytes | prism/private/EWF/fntab/ksh180.tab |
| 2003-Jun-23 19:05:32 | 190 bytes | prism/private/EWF/fntab/ksh190.tab |
| 2003-Jun-23 19:05:32 | 181 bytes | prism/private/EWF/fntab/ksh200.tab |
| 2003-Jun-23 19:05:32 | 181 bytes | prism/private/EWF/fntab/ksh210.tab |
| 2003-Jun-23 19:05:32 | 181 bytes | prism/private/EWF/fntab/ksh220.tab |
| 2003-Jun-23 19:05:32 | 181 bytes | prism/private/EWF/fntab/ksh230.tab |
| 2003-Jun-23 19:05:32 | 172 bytes | prism/private/EWF/fntab/ksh240.tab |
| 2003-Jun-23 19:05:32 | 172 bytes | prism/private/EWF/fntab/ksh250.tab |
| 2003-Jun-23 19:05:32 | 172 bytes | prism/private/EWF/fntab/ksh260.tab |
| 2003-Jun-23 19:05:32 | 163 bytes | prism/private/EWF/fntab/ksh270.tab |
| 2003-Jun-23 19:05:32 | 163 bytes | prism/private/EWF/fntab/ksh280.tab |
| 2003-Jun-23 19:05:32 | 154 bytes | prism/private/EWF/fntab/ksh290.tab |
| 2003-Jun-23 19:05:32 | 844 bytes | prism/private/EWF/fntab/kshidx.tab |
| 2004-Aug-28 22:11:34 | 4476 bytes | prism/private/EWF/fntab/readme.txt |
| 2004-Mar-29 12:50:06 | 255 bytes | prism/private/EWF/fntab/satsteam-convert.pl |
| 2004-Mar-29 14:02:58 | 896 bytes | prism/private/EWF/fntab/satsteam-psia.tab |
| 2004-Mar-29 12:49:20 | 587 bytes | prism/private/EWF/fntab/satsteam-psia.tab-01 |
| 2003-Jun-23 19:05:32 | 471 bytes | prism/private/EWF/fntab/satsteam.tab |
| 2003-Jun-23 19:10:42 | 162 bytes | prism/private/EWF/fntab/soundpower.tab |
| 2003-Jul-20 09:59:30 | 438 bytes | prism/private/EWF/fntab/tank-thermalin.tab |
| 2003-Jul-20 09:59:36 | 434 bytes | prism/private/EWF/fntab/tank-thermalouthigh.tab |
| 2003-Jul-20 09:59:42 | 438 bytes | prism/private/EWF/fntab/tank-thermaloutlow.tab |
| 2004-Dec-13 10:28:17 | 374 bytes | prism/private/EWF/utility |
| 2003-Jan-11 11:22:46 | 658 bytes | prism/private/EWF/utility/build |
| 2003-Jan-05 21:00:08 | 221 bytes | prism/private/EWF/utility/dump |
| 2003-Dec-29 20:04:00 | 546 bytes | prism/private/EWF/utility/errornum |
| 2003-Jan-05 21:00:12 | 221 bytes | prism/private/EWF/utility/load |
| 2002-Dec-30 17:33:22 | 239 bytes | prism/private/EWF/utility/mkscheme |
| 2003-Jan-03 10:03:42 | 203 bytes | prism/private/EWF/utility/readme.txt |
| 2003-Jan-02 11:19:22 | 241 bytes | prism/private/EWF/utility/schema-build |
| 2003-Jan-02 10:24:54 | 244 bytes | prism/private/EWF/utility/schema-update |
| 2002-Dec-30 17:33:22 | 237 bytes | prism/private/EWF/utility/upschema |
| 2004-Aug-29 16:24:02 | 13771 bytes | prism/private/EWF/wscompile |
| 2004-Feb-17 22:53:48 | 7993 bytes | prism/private/EWF/wscompile-01 |
| 2004-Mar-09 22:03:04 | 13012 bytes | prism/private/EWF/wscompile-02 |
| 2004-Aug-24 14:10:20 | 13184 bytes | prism/private/EWF/wscompile-03 |
| 2004-Dec-13 10:26:48 | 476 bytes | prism/private/Generic |
| 2004-Oct-25 18:48:02 | 21220 bytes | prism/private/Generic/Export.pm |
| 2004-Nov-06 00:19:18 | 611 bytes | prism/private/Generic/GetById.pm |
| 2004-Oct-19 19:26:44 | 24289 bytes | prism/private/Generic/Import.pm |
| 2004-Nov-12 15:16:40 | 1444 bytes | prism/private/Generic/Page.pm |
| 2004-Nov-12 15:26:04 | 1197 bytes | prism/private/Generic/Standard.pm |
| 2003-Nov-27 14:34:24 | 9537 bytes | prism/private/Generic/Traverse.pm |
| 2004-Nov-12 15:26:12 | 5863 bytes | prism/private/Generic/Workflow.pm |
| 2004-Apr-26 17:33:34 | 1135 bytes | prism/private/Generic/getExpiry.pm |
| 2004-Nov-05 22:27:30 | 12890 bytes | prism/private/Generic/rptEquip.pm |
| 2004-Nov-05 22:28:18 | 7434 bytes | prism/private/Generic/rptRelief.pm |
| 2004-Nov-05 22:28:44 | 6061 bytes | prism/private/Generic/rptScenario.pm |

```
2004-Dec-09 14:15:52  2440 bytes  prism/private/Generic/setHistory.pm
2004-Dec-13 10:26:51   374 bytes  prism/private/VMG
2004-Dec-09 14:05:14  3132 bytes  prism/private/VMG/=work.txt
2004-Oct-31 12:57:10  4788 bytes  prism/private/VMG/Client.pm
2004-Oct-29 12:47:02 40193 bytes  prism/private/VMG/Compounds.pm
2004-Nov-19 18:41:00  5543 bytes  prism/private/VMG/Flash.pm
2004-Nov-02 16:32:22  9573 bytes  prism/private/VMG/PH_Flash.pm
2004-Nov-19 15:36:30  9570 bytes  prism/private/VMG/PT_Flash.pm
2004-Oct-26 16:55:12   948 bytes  prism/private/VMG/test-connect
2004-Oct-27 13:09:16  5272 bytes  prism/private/VMG/test-flash
2004-May-06 07:28:26  1288 bytes  prism/private/VMG/test-install
2004-Dec-13 10:26:51   374 bytes  prism/private/Widget
2004-Apr-27 17:53:50  2415 bytes  prism/private/Widget/DbStdNote.pm
2003-Nov-25 05:55:22  3850 bytes  prism/private/Widget/EWF_Units.p
2003-Nov-25 05:55:22  2182 bytes  prism/private/Widget/EWF_Variable.p
2004-Apr-08 18:54:00  2052 bytes  prism/private/Widget/ImageMap.pm
2004-Nov-15 18:31:56 18128 bytes  prism/private/Widget/Measures.pm
2004-Nov-15 19:33:32  4756 bytes  prism/private/Widget/R_Measure.pm
2004-Apr-21 15:45:50  1266 bytes  prism/private/Widget/R_Utility.pm
2003-Oct-15 16:39:00   801 bytes  prism/private/Widget/WS_Value.pm
2004-May-01 14:52:52   543 bytes  prism/private/Widget/WfStatus.pm
2004-Dec-13 10:26:47   680 bytes  prism/private/admin
2004-Nov-15 18:18:08 11875 bytes  prism/private/admin/LoadPlot.pm
2003-Oct-15 16:47:36 10858 bytes  prism/private/admin/a_trouble.p
2004-Nov-10 08:30:08  7486 bytes  prism/private/admin/admin.p
2003-Sep-05 15:43:38  2286 bytes  prism/private/admin/b_login.p
2004-Jan-14 17:27:26  3177 bytes  prism/private/admin/b_trouble.p
2004-Dec-13 10:26:47   170 bytes  prism/private/admin/backup
2004-Nov-10 07:39:28  1437 bytes  prism/private/admin/backup/get.p
2004-Jan-31 14:46:26  2274 bytes  prism/private/admin/backup/log.p
2004-Nov-10 07:53:32  6632 bytes  prism/private/admin/backup/main.p
2004-May-02 14:31:26  8877 bytes  prism/private/admin/config.p
2004-Jul-14 15:26:06  6098 bytes  prism/private/admin/db_admin.p
2004-Nov-10 08:23:00  3549 bytes  prism/private/admin/db_browse.p
2004-Apr-30 17:50:50  5622 bytes  prism/private/admin/deltas.p
2003-Oct-15 16:53:30  5024 bytes  prism/private/admin/fileview.p
2004-Dec-13 10:26:47   170 bytes  prism/private/admin/install
2004-Aug-29 16:36:58 25702 bytes  prism/private/admin/install/main.p
2004-Jan-27 21:26:34  1033 bytes  prism/private/admin/install/relnotes.p
2004-Jul-13 22:49:12  2794 bytes  prism/private/admin/install/upload.p
2004-Nov-10 08:40:34  5170 bytes  prism/private/admin/load-plot.p
2003-Nov-25 05:36:56  2708 bytes  prism/private/admin/login.p
2004-Dec-13 10:26:47   204 bytes  prism/private/admin/report
2003-Nov-25 05:48:46  2419 bytes  prism/private/admin/report/db_stats.p
2003-Nov-25 05:55:22  4474 bytes  prism/private/admin/report/doc_stats.p
2004-Jul-23 14:41:26  4039 bytes  prism/private/admin/report/site-config.p
2004-May-01 16:31:22  5261 bytes  prism/private/admin/report/tr_stats.p
2004-Nov-12 16:37:38  2951 bytes  prism/private/admin/reports.p
2004-Aug-27 13:08:54  5641 bytes  prism/private/admin/timestats.p
2003-Jun-20 07:45:26  1339 bytes  prism/private/admin/v_trouble.p
2004-Dec-09 15:44:12  3139 bytes  prism/private/common.a
2004-Dec-13 10:26:48   170 bytes  prism/private/config
2003-Oct-06 20:04:12  3115 bytes  prism/private/config/browse.p
2004-Oct-30 01:22:58  4507 bytes  prism/private/config/site.p
2003-May-02 15:13:52  1500 bytes  prism/private/config/view.p
2004-Dec-13 10:26:48   952 bytes  prism/private/convert
2004-Jan-23 16:36:22  1376 bytes  prism/private/convert/EquipSystems.pm
2003-Nov-27 14:19:28  1731 bytes  prism/private/convert/Fix18inPipe.pm
2004-May-12 13:35:46  1425 bytes  prism/private/convert/FixFindings.pm
2004-Jun-30 19:29:04  2179 bytes  prism/private/convert/FixFittings.pm
2004-Apr-27 12:57:48  4062 bytes  prism/private/convert/FixRepository.pm
```

2004-Feb-04 17:10:18 1244 bytes prism/private/convert/FixUnitDrawings.pm
2004-Jun-17 21:36:00 2448 bytes prism/private/convert/LoadWsSpecs.pm
2003-Nov-27 14:33:20 1526 bytes prism/private/convert/ReliefRevisions.pm
2003-Nov-02 17:35:40 872 bytes prism/private/convert/RemoveOldWsSpec.pm
2003-Nov-27 14:20:12 1126 bytes prism/private/convert/ReversePipeFits.pm
2004-Oct-31 22:57:34 1564 bytes prism/private/convert/UpdateFlashTypes.pm
2004-Aug-25 15:35:38 1549 bytes prism/private/convert/UpdateHazards.pm
2004-Oct-14 15:59:08 4626 bytes prism/private/convert/UpdateOvpTypes.pm
2004-Oct-31 22:34:58 1564 bytes prism/private/convert/UpdatePhaseTypes.pm
2004-Oct-14 15:57:50 2103 bytes prism/private/convert/convert
2004-Oct-31 22:57:00 163 bytes prism/private/convert/flash_t.dat
2004-Aug-25 15:34:26 2451 bytes prism/private/convert/hazards.dat
2004-Oct-31 22:57:12 163 bytes prism/private/convert/phase_t.dat
2003-Nov-02 17:35:40 407 bytes prism/private/convert/prv-find.dat
2003-Nov-02 17:35:40 57 bytes prism/private/convert/rd-find.dat
2004-Dec-09 15:40:48 11987 bytes prism/private/convert/script
2004-Oct-14 15:58:38 15180 bytes prism/private/convert/std-ovp.dat
2004-May-12 13:39:42 65 bytes prism/private/convert/tv-links.dat
2004-Nov-15 20:48:56 9 bytes prism/private/convert/version.txt
2003-Mar-20 05:29:12 1281 bytes prism/private/convert/ws-diff
2004-Oct-11 15:05:38 71167 bytes prism/private/convert/wsui-rules.dat
2004-Dec-13 10:26:48 306 bytes prism/private/data
2004-Jun-25 17:01:26 243076 bytes prism/private/data/LucidaSansRegular.ttf
2003-Apr-30 17:53:22 1105 bytes prism/private/data/group.acl
2004-May-24 14:29:14 3257 bytes prism/private/data/images.dat
2004-Oct-06 12:42:54 7976 bytes prism/private/data/msa.dat
2004-Mar-03 15:55:00 12954 bytes prism/private/data/msgs.dat
2004-Dec-09 14:37:26 10795 bytes prism/private/data/site.acl
2004-Dec-07 00:42:58 5120 bytes prism/private/data/sites.dat
2004-Dec-13 10:26:48 986 bytes prism/private/design
2004-Apr-19 21:06:16 11074 bytes prism/private/design/DTL-deploy-plan.txt
2004-Sep-22 14:07:22 3211 bytes prism/private/design/ansi-pipe-data.csv
2004-Sep-22 15:06:04 1901 bytes prism/private/design/ansi-pipe-data.pl
2004-Aug-25 20:07:28 1788 bytes prism/private/design/catalog.txt
2004-Nov-16 15:52:48 9640 bytes prism/private/design/check-sys-notes.txt
2004-Feb-06 17:24:24 0 bytes prism/private/design/cns.txt
2004-Sep-20 17:36:24 8959 bytes prism/private/design/equip-ok.txt
2004-Dec-13 10:26:48 340 bytes prism/private/design/ermodel
2004-Sep-28 19:38:54 1657 bytes prism/private/design/ermodel/_test
2004-Sep-28 19:22:34 5824 bytes prism/private/design/ermodel/data.dat
2004-Sep-28 19:49:36 4013 bytes prism/private/design/ermodel/er-dwg.dot
2004-Sep-28 19:49:38 5480 bytes prism/private/design/ermodel/er-dwg.pdf
2003-Oct-29 21:35:48 3464 bytes prism/private/design/ermodel/er-dwg1.dot
2003-Oct-29 21:35:50 6268 bytes prism/private/design/ermodel/er-dwg2.dot
2003-Oct-29 21:35:56 7167 bytes prism/private/design/ermodel/er-dwg3.dot
2004-Sep-28 19:33:08 6819 bytes prism/private/design/ermodel/make-dwg
2004-Dec-13 10:26:48 408 bytes prism/private/design/favicon
2003-Aug-24 14:54:44 781 bytes prism/private/design/favicon/favicon-i.pnm
2003-Aug-24 14:51:48 5130 bytes prism/private/design/favicon/favicon-i1.gif
2003-Aug-24 14:51:48 9429 bytes prism/private/design/favicon/favicon-i2.gif
2003-Aug-24 14:51:48 7377 bytes prism/private/design/favicon/favicon-i3.gif
2003-Aug-24 14:51:48 970 bytes prism/private/design/favicon/favicon-i4.gif
2003-Aug-24 14:54:44 41 bytes prism/private/design/favicon/favicon-m.pnm
2003-Aug-24 14:54:36 83 bytes prism/private/design/favicon/favicon-m4.gif
2003-Aug-24 17:12:56 7498 bytes prism/private/design/favicon/favicon-tm.gif
2003-Aug-24 14:54:44 1406 bytes prism/private/design/favicon/favicon.ico
2003-Aug-31 19:30:00 266 bytes prism/private/design/favicon/makeicon
2004-Jun-30 17:55:10 3086 bytes prism/private/design/gd-lib.txt
2004-Jun-28 14:32:38 3243 bytes prism/private/design/gd-test
2004-Dec-02 19:40:48 3504 bytes prism/private/design/generic-queue.txt
2004-Dec-13 10:26:48 136 bytes prism/private/design/gnuplot 2004-Apr-30 16:41:24 8212 bytes prism/private/design/gnuplot/timeplot.p
2004-Apr-30 16:38:26 6970 bytes prism/private/design/gnuplot/use_graph.p
2003-Nov-02 14:28:00 3960 bytes prism/private/design/hazards.txt
2002-Dec-03 10:46:50 1668 bytes prism/private/design/heat-ex.txt
2003-Feb-24 15:36:52 18065 bytes prism/private/design/iPRSM-rename.txt
2004-Jul-10 13:03:10 13485 bytes prism/private/design/impact.pl
2004-Dec-13 10:26:48 544 bytes prism/private/design/logo
2003-May-09 20:41:42 1767 bytes prism/private/design/logo/arthos.gif
2002-Dec-03 10:46:54 4393 bytes prism/private/design/logo/big.gif
2002-Dec-03 10:46:54 1835 bytes prism/private/design/logo/black-t.gif
2002-Dec-03 10:46:54 1757 bytes prism/private/design/logo/black.gif
2002-Dec-03 10:46:54 1945 bytes prism/private/design/logo/blkgrn-t.gif
2002-Dec-03 10:46:54 1871 bytes prism/private/design/logo/blkgrn.gif
2003-May-23 16:13:10 2375 bytes prism/private/design/logo/iPRSM_tm.gif
2002-Dec-03 10:46:54 1521 bytes prism/private/design/logo/logo-50.gif
2002-Dec-03 10:46:54 1817 bytes prism/private/design/logo/logo-65-t.gif
2002-Dec-03 10:46:54 1745 bytes prism/private/design/logo/logo-65.gif
2003-May-29 15:40:58 1831 bytes prism/private/design/logo/logo-iPRSM-black-100.gif
2003-May-23 16:25:08 1908 bytes prism/private/design/logo/logo-iPRSM-blue-100.gif
2003-May-29 15:22:10 1858 bytes prism/private/design/logo/logo-iPRSM-purple-100.gif
2003-May-29 15:31:32 1813 bytes prism/private/design/logo/logo-iPRSM-red2-100.gif
2004-Oct-19 11:50:28 12819 bytes prism/private/design/lpt-notes.txt
2004-Jun-15 21:09:38 2594 bytes prism/private/design/max-rel-cap.txt
2002-Dec-03 10:46:50 705 bytes prism/private/design/notes.txt
2004-Dec-13 10:26:48 170 bytes prism/private/design/orient-icon
2004-Mar-21 19:15:52 121 bytes prism/private/design/orient-icon/_test
2004-Mar-26 16:18:40 593 bytes prism/private/design/orient-icon/orient-icon.gif
2004-Mar-26 16:18:04 6436 bytes prism/private/design/orient-icon/orient-icon.sxd
2004-Dec-13 10:26:48 408 bytes prism/private/design/sample
2002-Dec-03 10:46:50 31667 bytes prism/private/design/sample/26GA10-020.gif
2002-Dec-03 10:46:50 12452 bytes prism/private/design/sample/26GA10-020.htm
2002-Dec-03 10:46:50 33188 bytes prism/private/design/sample/26GA10-020.zip
2002-Dec-03 10:46:50 4555 bytes prism/private/design/sample/circuit-21.gif
2002-Dec-03 10:46:50 8312 bytes prism/private/design/sample/circuit-22.gif
2003-Nov-12 16:15:22 33792 bytes prism/private/design/sample/create-unit.sda
2002-Dec-03 10:46:50 1871 bytes prism/private/design/sample/logo.gif
2002-Dec-03 10:46:50 5406 bytes prism/private/design/sample/sample-doc.zip
2002-Dec-03 10:46:50 9379 bytes prism/private/design/sample/unit-2.gif
2002-Dec-03 10:46:50 49664 bytes prism/private/design/sample/unit-2.sda
2004-Dec-13 10:26:48 306 bytes prism/private/design/traverse
2003-Jul-01 04:06:32 707 bytes prism/private/design/traverse/run-tests
2003-Jul-01 04:00:54 4493 bytes prism/private/design/traverse/stat-test
2003-Jul-01 04:26:28 2467 bytes prism/private/design/traverse/template.txt
2003-Jul-01 04:46:04 1354 bytes prism/private/design/traverse/test-0
2003-Jul-01 04:52:10 1443 bytes prism/private/design/traverse/test-1
2003-Jul-01 04:54:20 1645 bytes prism/private/design/traverse/test-2
2003-Jul-01 04:55:08 1631 bytes prism/private/design/traverse/test-3
2004-Dec-13 10:26:48 374 bytes prism/private/design/ui_map
2003-Nov-14 09:31:40 2667 bytes prism/private/design/ui_map/=work.txt
2003-Nov-14 09:16:26 1771 bytes prism/private/design/ui_map/_test
2003-Oct-11 18:25:20 3859 bytes prism/private/design/ui_map/check
2003-Nov-14 07:13:32 2785 bytes prism/private/design/ui_map/cut-up
2003-Nov-14 09:27:46 98904 bytes prism/private/design/ui_map/data.dat
2003-Oct-14 18:37:52 2053 bytes prism/private/design/ui_map/legend.p
2003-Oct-14 19:39:28 1440 bytes prism/private/design/ui_map/logic.p
2003-Nov-14 09:14:56 10047 bytes prism/private/design/ui_map/make-map
2003-Oct-03 17:53:06 1277 bytes prism/private/design/ui_map/regress
2004-Dec-13 10:26:48 272 bytes prism/private/design/utility
2004-Dec-13 10:26:48 136 bytes prism/private/design/utility/admin
2003-Nov-25 05:55:22 2231 bytes prism/private/design/utility/admin/chk-links.pl
2003-Feb-03 16:33:10 655 bytes prism/private/design/utility/admin/ua-stats.pl 2004-Dec-13 10:26:48 136 bytes prism/private/design/utility/certify
2003-Nov-25 05:55:22 2258 bytes prism/private/design/utility/certify/certify.pl
2003-Nov-25 05:55:22 2011 bytes prism/private/design/utility/certify/report.pl
2004-Dec-13 10:26:48 272 bytes prism/private/design/utility/convert
2002-Dec-03 10:46:50 1628 bytes prism/private/design/utility/convert/makeProtect
2003-Nov-25 05:55:22 2083 bytes prism/private/design/utility/convert/param.pl
2002-Dec-03 10:46:50 3656 bytes prism/private/design/utility/convert/pom4convert
2002-Dec-03 10:46:50 1027 bytes prism/private/design/utility/convert/setPoster
2003-Nov-25 05:55:22 1908 bytes prism/private/design/utility/convert/unit-links.pl
2003-Nov-25 05:55:22 1435 bytes prism/private/design/utility/convert/wsMeasures.pl
2004-Dec-13 10:26:48 102 bytes prism/private/design/utility/profile
2003-Nov-25 05:55:22 4613 bytes prism/private/design/utility/profile/tutor1.pl
2004-Dec-13 10:26:48 238 bytes prism/private/design/utility/test
2002-Dec-03 10:46:50 1884 bytes prism/private/design/utility/test/blob-in-memo.pl
2002-Dec-03 10:46:50 800 bytes prism/private/design/utility/test/grid.p
2003-Nov-25 05:55:22 1705 bytes prism/private/design/utility/test/many-plants.pl
2002-Dec-03 10:46:50 1391 bytes prism/private/design/utility/test/table.p
2003-Nov-25 05:55:22 1390 bytes prism/private/design/utility/test/variables.pl
2004-Dec-13 10:26:48 136 bytes prism/private/design/utility/update
2002-Dec-03 10:46:50 1337 bytes prism/private/design/utility/update/worksheet
2002-Dec-03 10:46:50 1685 bytes prism/private/design/utility/update/worksheet-hjh
2004-Apr-27 10:08:40 1634 bytes prism/private/design/yuzyk-exim.txt
2004-Dec-13 10:26:48 578 bytes prism/private/develop
2004-Jan-12 19:43:00 1553 bytes prism/private/develop/RulesPlant.pm
2004-Dec-07 02:07:02 3680 bytes prism/private/develop/browse.p
2004-Sep-06 15:50:02 9236 bytes prism/private/develop/fix10822.p
2004-Nov-15 19:24:06 1965 bytes prism/private/develop/imagelib.p
2004-Dec-13 10:26:48 136 bytes prism/private/develop/interpage
2003-Nov-11 23:12:48 1557 bytes prism/private/develop/interpage/child.p
2003-Nov-11 23:09:52 1335 bytes prism/private/develop/interpage/parent.p
2004-Dec-13 10:26:48 136 bytes prism/private/develop/license
2004-Jun-22 16:08:18 4258 bytes prism/private/develop/license/browse.p
2004-Nov-08 09:32:00 12009 bytes prism/private/develop/license/license.dat
2004-Dec-13 10:26:48 170 bytes prism/private/develop/mail
2004-Sep-30 16:27:40 6062 bytes prism/private/develop/mail/browse.p
2004-Nov-30 22:49:30 316 bytes prism/private/develop/mail/marks.dat
2004-Aug-19 17:43:22 4663 bytes prism/private/develop/mail/view.p
2004-May-01 16:39:42 1631 bytes prism/private/develop/msg_dict.p
2004-Nov-13 02:03:38 1814 bytes prism/private/develop/rpt_config.p
2004-Mar-15 18:43:56 2916 bytes prism/private/develop/snapshow.p
2004-Nov-15 19:27:50 1766 bytes prism/private/develop/snaptoc.p
2004-Aug-10 18:04:00 3201 bytes prism/private/develop/vmg-pick.p
2004-May-05 16:19:56 3103 bytes prism/private/develop/vmg-test.old
2004-Aug-13 11:05:40 12623 bytes prism/private/develop/vmg-test.p
2004-Dec-13 10:26:48 272 bytes prism/private/develop/workflow
2002-Dec-03 10:46:50 3556 bytes prism/private/develop/workflow/methods.p
2004-Dec-13 10:26:48 408 bytes prism/private/develop/workflow/regress
2002-Dec-03 10:46:50 15594 bytes prism/private/develop/workflow/regress/Test.pm
2002-Dec-03 10:46:50 254 bytes prism/private/develop/workflow/regress/_test
2002-Dec-03 10:46:50 27169 bytes prism/private/develop/workflow/regress/regress.txt
2002-Dec-03 10:46:50 130 bytes prism/private/develop/workflow/regress/test00.pl
2002-Dec-03 10:46:50 4792 bytes prism/private/develop/workflow/regress/test01.pl
2002-Dec-03 10:46:50 4790 bytes prism/private/develop/workflow/regress/test02.pl
2002-Dec-03 10:46:50 2783 bytes prism/private/develop/workflow/regress/test11.pl
2002-Dec-03 10:46:50 1825 bytes prism/private/develop/workflow/regress/test12.pl
2002-Dec-03 10:46:50 3824 bytes prism/private/develop/workflow/regress/test13.pl
2002-Dec-03 10:46:50 1542 bytes prism/private/develop/workflow/regress/test14.pl
2002-Dec-03 10:46:50 9894 bytes prism/private/develop/workflow/states.p
2002-Dec-03 10:46:50 17183 bytes prism/private/develop/workflow/workflow.gif
2002-Dec-03 10:46:50 12017 bytes prism/private/develop/workflow/workflow.p
2002-Dec-03 10:46:50 49152 bytes prism/private/develop/workflow/workflow.sda 2004-Dec-13 10:26:48 204 bytes prism/private/device
2004-Oct-01 18:14:54 2924 bytes prism/private/device/browse.p
2004-Dec-13 10:26:48 102 bytes prism/private/device/report
2003-Nov-25 05:55:22 2371 bytes prism/private/device/report/browse.p
2004-Nov-12 16:16:48 2613 bytes prism/private/device/reports.p
2004-Nov-12 13:22:22 5127 bytes prism/private/device/view.p
2004-Dec-13 10:26:48 544 bytes prism/private/equip
2003-Nov-25 05:55:22 5408 bytes prism/private/equip/assoc.p
2004-Sep-14 16:35:50 12746 bytes prism/private/equip/browse.p
2004-Dec-13 10:26:48 238 bytes prism/private/equip/document
2003-Nov-25 05:55:22 4062 bytes prism/private/equip/document/browse.p
2004-Dec-13 10:26:48 170 bytes prism/private/equip/document/report
2004-Dec-09 14:52:20 2607 bytes prism/private/equip/document/report/browse.p
2004-Dec-09 14:52:46 3375 bytes prism/private/equip/document/report/package.p
2004-Dec-09 14:52:54 3226 bytes prism/private/equip/document/report/version.p
2004-Mar-03 20:41:52 3666 bytes prism/private/equip/document/upload.p
2004-May-12 14:22:26 5166 bytes prism/private/equip/document/version.p
2003-Nov-25 11:12:24 5184 bytes prism/private/equip/document/view.p
2004-Mar-05 22:10:54 4878 bytes prism/private/equip/edit-iso.p
2004-May-20 15:16:40 13400 bytes prism/private/equip/findings.p
2004-Jul-19 14:42:26 9724 bytes prism/private/equip/pipeloss.p
2004-Aug-27 15:37:44 9491 bytes prism/private/equip/piping.p
2004-Feb-05 16:51:22 3737 bytes prism/private/equip/popup-iso.p
2004-Dec-13 10:26:48 646 bytes prism/private/equip/report
2004-Dec-09 14:53:06 9381 bytes prism/private/equip/report/datasheet-asme-u1a.p
2004-Dec-09 14:53:56 14103 bytes prism/private/equip/report/datasheet-isa-cv.p
2004-Dec-09 14:54:46 15229 bytes prism/private/equip/report/datasheet-isa-prv.p
2004-Dec-09 14:54:56 10604 bytes prism/private/equip/report/datasheet-isa-rd.p
2004-Dec-09 14:55:10 5974 bytes prism/private/equip/report/datasheet.p
2004-Apr-21 16:00:10 2903 bytes prism/private/equip/report/dwg_iso.p
2004-Apr-21 15:59:28 2906 bytes prism/private/equip/report/dwg_pid.p
2004-Dec-09 14:55:24 5790 bytes prism/private/equip/report/findings.p
2004-Dec-09 14:55:40 6698 bytes prism/private/equip/report/pipeloss.p
2004-Dec-09 14:55:48 5550 bytes prism/private/equip/report/piping.p
2004-Dec-09 14:57:00 5955 bytes prism/private/equip/report/prd-record.p
2004-Dec-09 14:57:12 8408 bytes prism/private/equip/report/prd-works.p
2004-Dec-09 14:57:18 4141 bytes prism/private/equip/report/scene-a.p
2004-Dec-09 14:57:36 6474 bytes prism/private/equip/report/scene-c.p
2004-Dec-09 14:58:04 7447 bytes prism/private/equip/report/scene-cs.p
2004-Dec-09 14:58:16 3202 bytes prism/private/equip/report/scene-s.p
2004-Dec-09 14:58:26 10931 bytes prism/private/equip/report/selectbasis.p
2004-Nov-12 16:15:46 11937 bytes prism/private/equip/reports.p
2004-Aug-03 16:03:08 5368 bytes prism/private/equip/select-pid.p
2004-Oct-30 08:32:20 1743 bytes prism/private/equip/seq-deficit.p
2004-Mar-03 20:40:44 3625 bytes prism/private/equip/upload-iso.p
2004-Nov-11 16:03:12 16492 bytes prism/private/equip/view.p
2004-Dec-13 10:26:48 102 bytes prism/private/export
2004-Jul-17 15:00:14 7160 bytes prism/private/export/unit-equip-std.p
2004-Dec-13 10:26:48 204 bytes prism/private/fitting
2004-Jun-30 18:56:16 3260 bytes prism/private/fitting/browse.p
2004-Dec-13 10:26:48 170 bytes prism/private/fitting/report
2004-Sep-22 15:24:34 2108 bytes prism/private/fitting/report/ansipipe.p
2004-Jun-30 18:58:48 2899 bytes prism/private/fitting/report/browse.p
2004-Mar-29 20:27:56 1983 bytes prism/private/fitting/report/std-fits.p
2004-Nov-12 16:39:58 3579 bytes prism/private/fitting/reports.p
2004-Nov-12 13:23:28 4903 bytes prism/private/fitting/view.p
2004-Dec-13 10:26:48 136 bytes prism/private/flash
2004-Dec-13 10:26:48 102 bytes prism/private/flash/report
2004-Nov-19 18:42:56 3942 bytes prism/private/flash/report/view.p
2004-Nov-19 17:27:46 8328 bytes prism/private/flash/view.p
2004-Dec-13 10:26:48 136 bytes prism/private/flash_t 2004-Oct-06 15:00:06 2797 bytes prism/private/flash_t/browse.p
2004-Nov-12 13:24:54 4118 bytes prism/private/flash_t/view.p
2004-Dec-13 10:26:50 1054 bytes prism/private/handbook
2004-Mar-05 20:58:04 1006 bytes prism/private/handbook/_coverage
2002-Dec-10 18:47:26 3427 bytes prism/private/handbook/_queue.txt
2003-Aug-27 18:33:32 218 bytes prism/private/handbook/admin.s
2004-Jul-23 17:57:04 10575 bytes prism/private/handbook/audit
2004-Oct-20 22:41:30 2646 bytes prism/private/handbook/audit-rules.dat
2004-Dec-13 10:26:48 204 bytes prism/private/handbook/bin
2004-Mar-03 19:42:32 1993 bytes prism/private/handbook/bin/print.p
2003-Dec-01 20:57:32 2315 bytes prism/private/handbook/bin/report.p
2004-Nov-15 19:20:36 8389 bytes prism/private/handbook/bin/utility.pm
2003-Nov-28 18:47:32 2278 bytes prism/private/handbook/bin/view.p
2004-Mar-25 19:29:12 2106 bytes prism/private/handbook/common.a
2004-Nov-15 20:01:44 582 bytes prism/private/handbook/contents.s
2004-Dec-13 10:26:49 136 bytes prism/private/handbook/cookbook
2003-Jan-31 16:43:04 31 bytes prism/private/handbook/cookbook.s
2004-Dec-13 10:26:48 136 bytes prism/private/handbook/cookbook/documents
2004-Nov-30 20:43:28 2277 bytes prism/private/handbook/cookbook/documents/intro.s
2004-Dec-13 10:26:48 204 bytes prism/private/handbook/cookbook/documents/usingDocs
2004-Nov-28 15:34:18 2646 bytes prism/private/handbook/cookbook/documents/usingDocs/editDocs.s
2004-Nov-29 22:22:50 2199 bytes prism/private/handbook/cookbook/documents/usingDocs/launch.s
2004-Dec-07 19:54:20 4674 bytes prism/private/handbook/cookbook/documents/usingDocs/loadDocs.s
2004-Dec-08 00:14:04 4409 bytes prism/private/handbook/cookbook/documents/usingDocs/viewDocs.s
2004-Dec-13 10:26:49 136 bytes prism/private/handbook/cookbook/drawings
2004-Dec-13 10:26:49 238 bytes prism/private/handbook/cookbook/drawings/imagemap
2004-Oct-31 17:45:28 1508 bytes prism/private/handbook/cookbook/drawings/imagemap.s
2004-Oct-15 21:18:20 3603 bytes prism/private/handbook/cookbook/drawings/imagemap/ISO.s
2004-Oct-15 20:55:58 4804 bytes prism/private/handbook/cookbook/drawings/imagemap/PID.s
2004-Oct-13 23:46:16 3126 bytes prism/private/handbook/cookbook/drawings/imagemap/equipPID.s
2004-Oct-13 23:19:06 5572 bytes prism/private/handbook/cookbook/drawings/imagemap/linkmaps.s
2004-Oct-15 21:40:22 4076 bytes prism/private/handbook/cookbook/drawings/imagemap/syssketch.s
2004-Nov-15 20:02:18 582 bytes prism/private/handbook/detail.s
2004-Dec-13 10:26:49 272 bytes prism/private/handbook/er_map
2003-Nov-20 18:21:04 59 bytes prism/private/handbook/er_map/complete.s
2003-Nov-20 18:20:42 59 bytes prism/private/handbook/er_map/detail.s
2003-Nov-20 18:18:18 54575 bytes prism/private/handbook/er_map/er-dwg1.png
2003-Nov-20 18:18:18 119390 bytes prism/private/handbook/er_map/er-dwg2.png
2003-Nov-20 18:18:18 159426 bytes prism/private/handbook/er_map/er-dwg3.png
2003-Nov-20 18:19:06 59 bytes prism/private/handbook/er_map/struct.s
2003-Jun-24 23:00:26 49 bytes prism/private/handbook/glossary.s
2004-Dec-13 10:26:49 170 bytes prism/private/handbook/install
2003-Jun-19 15:46:48 31 bytes prism/private/handbook/install.s
2004-Jul-29 21:09:34 8128 bytes prism/private/handbook/install/linux-bsd.s
2004-Jul-29 23:34:14 3822 bytes prism/private/handbook/install/update.s
2004-Jul-29 19:20:46 10537 bytes prism/private/handbook/install/windows.s
2004-Dec-13 10:26:49 510 bytes prism/private/handbook/intro
2003-Oct-10 14:59:04 31 bytes prism/private/handbook/intro.s
2003-Dec-06 19:24:20 1677 bytes prism/private/handbook/intro/about.s
2003-Oct-30 17:20:02 2836 bytes prism/private/handbook/intro/database.s
2003-Oct-30 17:23:14 352 bytes prism/private/handbook/intro/datestimes.s
2003-Nov-20 18:15:38 191 bytes prism/private/handbook/intro/er_map.s
2003-Oct-30 15:31:24 713 bytes prism/private/handbook/intro/howto.s
2004-Nov-15 20:06:30 5309 bytes prism/private/handbook/intro/icons.s
2003-Oct-31 20:01:36 3007 bytes prism/private/handbook/intro/pagecomponents.s
2003-Oct-30 16:19:16 2247 bytes prism/private/handbook/intro/requirements.s
2003-Oct-31 18:58:52 1347 bytes prism/private/handbook/intro/security.s
2004-Jul-21 13:44:54 880 bytes prism/private/handbook/intro/tutorials.s
2004-Sep-25 22:04:32 4158 bytes prism/private/handbook/intro/ui_map.s
2004-Nov-29 19:22:24 1756 bytes prism/private/handbook/intro/uitips.s
2004-Jul-23 11:51:36 35 bytes prism/private/handbook/intro/worksheet.s 2004-Dec-13 10:26:49 1020 bytes prism/private/handbook/page
2004-Dec-13 10:26:49 68 bytes prism/private/handbook/page/!slide
2004-Dec-13 10:26:49 136 bytes prism/private/handbook/page/Widget
2003-Dec-16 00:03:18 1242 bytes prism/private/handbook/page/Widget/EWF_Units.p.s
2003-Aug-31 00:20:18 1021 bytes prism/private/handbook/page/Widget/EWF_Variable.p.s
2004-Dec-13 10:26:49 578 bytes prism/private/handbook/page/admin
2004-Jan-12 18:53:24 2270 bytes prism/private/handbook/page/admin/a_trouble.p.s
2004-Nov-21 14:05:46 4329 bytes prism/private/handbook/page/admin/admin.p.s
2004-Jan-12 18:28:36 1405 bytes prism/private/handbook/page/admin/b_login.p.s
2004-Jan-12 18:36:48 2897 bytes prism/private/handbook/page/admin/b_trouble.p.s
2004-Dec-13 10:26:49 102 bytes prism/private/handbook/page/admin/backup
2004-Jul-23 12:54:34 29 bytes prism/private/handbook/page/admin/backup/main.p.s
2004-Jan-12 18:59:32 2052 bytes prism/private/handbook/page/admin/config.p.s
2004-Jul-23 13:00:20 2272 bytes prism/private/handbook/page/admin/db_admin.p.s
2003-Oct-04 20:40:38 1982 bytes prism/private/handbook/page/admin/db_browse.p.s
2004-Dec-13 10:26:49 136 bytes prism/private/handbook/page/admin/install
2004-Jul-21 14:51:24 282 bytes prism/private/handbook/page/admin/install/main.p.s
2004-Jul-21 14:51:40 282 bytes prism/private/handbook/page/admin/install/upload.p.s
2004-Nov-21 13:59:56 1526 bytes prism/private/handbook/page/admin/load-plot.p.s
2003-Nov-25 06:42:08 1039 bytes prism/private/handbook/page/admin/login.p.s
2004-Dec-13 10:26:49 204 bytes prism/private/handbook/page/admin/report
2003-Dec-03 14:08:04 207 bytes prism/private/handbook/page/admin/report/db_stats.p.s
2003-Dec-03 14:08:44 207 bytes prism/private/handbook/page/admin/report/doc_stats.p.s
2004-Mar-05 20:20:24 209 bytes prism/private/handbook/page/admin/report/site-config.p.s
2003-Dec-03 14:00:58 206 bytes prism/private/handbook/page/admin/report/tr_stats.p.s
2003-Dec-18 23:50:10 1746 bytes prism/private/handbook/page/admin/reports.p.s
2004-Jul-23 19:10:06 29 bytes prism/private/handbook/page/admin/timestats.p.s
2004-Jan-12 18:40:36 1086 bytes prism/private/handbook/page/admin/v_trouble.p.s
2004-Dec-13 10:26:49 170 bytes prism/private/handbook/page/config
2004-Jan-12 17:59:48 1800 bytes prism/private/handbook/page/config/browse.p.s
2003-Oct-09 15:33:16 1816 bytes prism/private/handbook/page/config/site.p.s
2003-Oct-08 20:06:02 1896 bytes prism/private/handbook/page/config/view.p.s
2004-Dec-13 10:26:49 238 bytes prism/private/handbook/page/device
2004-Oct-30 19:56:22 2472 bytes prism/private/handbook/page/device/browse.p.s
2003-Jan-31 16:42:38 205 bytes prism/private/handbook/page/device/overview.s
2004-Dec-13 10:26:49 102 bytes prism/private/handbook/page/device/report
2003-Jan-10 22:01:04 205 bytes prism/private/handbook/page/device/report/browse.p.s
2004-Oct-20 22:42:14 1579 bytes prism/private/handbook/page/device/reports.p.s
2003-Dec-16 23:18:56 3037 bytes prism/private/handbook/page/device/view.p.s
2004-Dec-13 10:26:49 68 bytes prism/private/handbook/page/document
2004-Dec-13 10:26:49 578 bytes prism/private/handbook/page/equip
2004-Oct-22 12:52:20 3872 bytes prism/private/handbook/page/equip/assoc.p.s
2004-Oct-20 22:42:22 8242 bytes prism/private/handbook/page/equip/browse.p.s
2004-Dec-13 10:26:49 238 bytes prism/private/handbook/page/equip/document
2004-Nov-28 17:50:20 2754 bytes prism/private/handbook/page/equip/document/browse.p.s
2004-Dec-13 10:26:49 170 bytes prism/private/handbook/page/equip/document/report
2003-Jan-10 23:48:12 213 bytes prism/private/handbook/page/equip/document/report/browse.p.s
2003-Jan-10 23:48:12 214 bytes prism/private/handbook/page/equip/document/report/package.p.s
2003-Jan-10 23:48:12 214 bytes prism/private/handbook/page/equip/document/report/version.p.s
2004-Oct-21 20:52:06 2515 bytes prism/private/handbook/page/equip/document/upload.p.s
2004-Nov-28 17:56:58 4399 bytes prism/private/handbook/page/equip/document/version.p.s
2004-Nov-28 17:53:34 4024 bytes prism/private/handbook/page/equip/document/view.p.s
2004-Oct-21 20:20:32 3612 bytes prism/private/handbook/page/equip/edit-iso.p.s
2004-Jun-08 15:40:32 6165 bytes prism/private/handbook/page/equip/findings.p.s
2003-Jan-31 16:41:30 207 bytes prism/private/handbook/page/equip/overview.s
2004-Feb-29 23:51:52 4749 bytes prism/private/handbook/page/equip/pipeloss.p.s
2004-Oct-25 13:30:52 5912 bytes prism/private/handbook/page/equip/piping.p.s
2004-Oct-21 00:01:54 2706 bytes prism/private/handbook/page/equip/popup-iso.p.s
2004-Dec-13 10:26:49 646 bytes prism/private/handbook/page/equip/report
2004-Jul-23 15:52:56 45 bytes prism/private/handbook/page/equip/report/datasheet-asme-u1a.p.s
2004-Jul-23 15:52:50 45 bytes prism/private/handbook/page/equip/report/datasheet-isa-cv.p.s 2004-Jul-23 15:52:24 45 bytes prism/private/handbook/page/equip/report/datasheet-isa-prv.p.s
2004-Jul-23 15:52:40 45 bytes prism/private/handbook/page/equip/report/datasheet-isa-rd.p.s
2003-Jan-10 23:48:12 207 bytes prism/private/handbook/page/equip/report/datasheet.p.s
2004-Jul-23 12:14:22 45 bytes prism/private/handbook/page/equip/report/dwg_iso.p.s
2004-Jul-23 12:15:32 45 bytes prism/private/handbook/page/equip/report/dwg_pid.p.s
2004-Mar-31 06:00:04 206 bytes prism/private/handbook/page/equip/report/findings.p.s
2003-Jan-10 23:48:12 206 bytes prism/private/handbook/page/equip/report/pipeloss.p.s
2003-Jan-10 23:48:12 204 bytes prism/private/handbook/page/equip/report/piping.p.s
2003-Jan-10 23:48:12 208 bytes prism/private/handbook/page/equip/report/prd-record.p.s
2003-Jan-10 23:48:12 207 bytes prism/private/handbook/page/equip/report/prd-works.p.s
2003-Jan-10 23:48:12 205 bytes prism/private/handbook/page/equip/report/scene-a.p.s
2003-Jan-10 23:48:12 205 bytes prism/private/handbook/page/equip/report/scene-c.p.s
2003-Dec-03 13:15:00 206 bytes prism/private/handbook/page/equip/report/scene-cs.p.s
2003-Jan-10 23:48:12 205 bytes prism/private/handbook/page/equip/report/scene-s.p.s
2003-Dec-03 13:17:16 209 bytes prism/private/handbook/page/equip/report/selectbasis.p.s
2004-Mar-01 00:15:38 2505 bytes prism/private/handbook/page/equip/reports.p.s
2004-Oct-20 23:34:48 4252 bytes prism/private/handbook/page/equip/select-pid.p.s
2004-Jun-11 15:48:48 1815 bytes prism/private/handbook/page/equip/seq-deficit.p.s
2004-Oct-21 10:02:38 1629 bytes prism/private/handbook/page/equip/upload-iso.p.s
2004-Oct-30 22:15:46 8169 bytes prism/private/handbook/page/equip/view.p.s
2004-Dec-13 10:26:49 238 bytes prism/private/handbook/page/fitting
2003-Dec-16 20:38:00 1999 bytes prism/private/handbook/page/fitting/browse.p.s
2003-Jan-31 16:42:52 211 bytes prism/private/handbook/page/fitting/overview.s
2004-Dec-13 10:26:49 170 bytes prism/private/handbook/page/fitting/report
2004-Mar-31 06:11:12 208 bytes prism/private/handbook/page/fitting/report/ansipipe.p.s
2003-Jan-10 22:09:52 206 bytes prism/private/handbook/page/fitting/report/browse.p.s
2004-Mar-31 06:11:22 208 bytes prism/private/handbook/page/fitting/report/std-fits.p.s
2003-Dec-16 20:41:20 1571 bytes prism/private/handbook/page/fitting/reports.p.s
2003-Dec-16 20:39:58 2489 bytes prism/private/handbook/page/fitting/view.p.s
2004-Dec-13 10:26:49 170 bytes prism/private/handbook/page/flash_phase
2004-Dec-13 10:26:49 136 bytes prism/private/handbook/page/flash_phase/flash_t
2004-Nov-30 19:01:30 2062 bytes prism/private/handbook/page/flash_phase/flash_t/browse.p.s
2004-Nov-30 19:48:34 1997 bytes prism/private/handbook/page/flash_phase/flash_t/view.p.s
2004-Nov-30 17:48:40 217 bytes prism/private/handbook/page/flash_phase/overview.s
2004-Dec-13 10:26:49 136 bytes prism/private/handbook/page/flash_phase/phase_t
2004-Nov-30 19:03:18 2029 bytes prism/private/handbook/page/flash_phase/phase_t/browse.p.s
2004-Nov-30 19:47:06 1991 bytes prism/private/handbook/page/flash_phase/phase_t/view.p.s
2004-Dec-13 10:26:49 102 bytes prism/private/handbook/page/handbook
2004-Dec-13 10:26:49 136 bytes prism/private/handbook/page/handbook/bin
2004-Nov-29 22:29:08 2929 bytes prism/private/handbook/page/handbook/bin/print.p.s
2004-Nov-29 20:30:02 1977 bytes prism/private/handbook/page/handbook/bin/view.p.s
2004-Dec-13 10:26:49 238 bytes prism/private/handbook/page/hazard
2003-Dec-16 20:23:36 2166 bytes prism/private/handbook/page/hazard/browse.p.s
2003-Jan-31 16:42:44 205 bytes prism/private/handbook/page/hazard/overview.s
2004-Dec-13 10:26:49 102 bytes prism/private/handbook/page/hazard/report
2003-Jan-10 22:04:16 205 bytes prism/private/handbook/page/hazard/report/browse.p.s
2003-Dec-16 20:34:08 1502 bytes prism/private/handbook/page/hazard/reports.p.s
2003-Dec-18 22:45:24 2126 bytes prism/private/handbook/page/hazard/view.p.s
2004-Dec-13 10:26:49 170 bytes prism/private/handbook/page/impact
2004-Sep-28 14:29:06 1372 bytes prism/private/handbook/page/impact/browse.p.s
2004-Jul-23 12:04:30 29 bytes prism/private/handbook/page/impact/relief.p.s
2004-Dec-13 10:26:49 102 bytes prism/private/handbook/page/impact/report
2004-Jul-23 13:35:22 59 bytes prism/private/handbook/page/impact/report/browse.p.s
2004-Dec-13 10:26:49 68 bytes prism/private/handbook/page/mailout
2004-Dec-13 10:26:49 374 bytes prism/private/handbook/page/main
2004-Apr-29 13:49:10 1727 bytes prism/private/handbook/page/main/add_plant.p.s
2004-Nov-29 19:36:30 1790 bytes prism/private/handbook/page/main/documents.p.s
2003-Nov-25 06:53:22 1682 bytes prism/private/handbook/page/main/login.p.s
2004-Nov-29 19:17:04 3066 bytes prism/private/handbook/page/main/logo_popup.p.s
2003-Dec-09 00:57:24 762 bytes prism/private/handbook/page/main/logout.p.s
2004-Nov-28 10:40:26 7755 bytes prism/private/handbook/page/main/main.p.s 2004-Dec-13 10:26:49 136 bytes prism/private/handbook/page/main/report
2003-Jan-10 21:51:52 204 bytes prism/private/handbook/page/main/report/causeop.p.s
2003-Jan-10 21:48:50 203 bytes prism/private/handbook/page/main/report/plants.p.s
2004-Sep-30 15:56:18 2762 bytes prism/private/handbook/page/main/reports.p.s
2004-Nov-21 13:55:50 1334 bytes prism/private/handbook/page/main/sendmail.p.s
2004-Dec-13 10:26:49 170 bytes prism/private/handbook/page/maintain
2003-Dec-18 22:35:44 2636 bytes prism/private/handbook/page/maintain/browse.p.s
2004-Dec-13 10:26:49 136 bytes prism/private/handbook/page/maintain/report
2003-Jan-10 23:48:12 207 bytes prism/private/handbook/page/maintain/report/browse.p.s
2003-Jan-10 23:48:12 205 bytes prism/private/handbook/page/maintain/report/view.p.s
2003-Dec-18 22:36:44 3103 bytes prism/private/handbook/page/maintain/view.p.s
2004-Dec-13 10:26:49 238 bytes prism/private/handbook/page/person
2003-Oct-02 21:48:06 1875 bytes prism/private/handbook/page/person/browse.p.s
2004-Apr-27 20:45:16 1787 bytes prism/private/handbook/page/person/password.p.s
2004-Dec-13 10:26:49 170 bytes prism/private/handbook/page/person/report
2003-Jan-10 23:48:12 205 bytes prism/private/handbook/page/person/report/browse.p.s
2003-Jan-10 23:48:12 203 bytes prism/private/handbook/page/person/report/user.p.s
2003-Jan-10 23:48:12 203 bytes prism/private/handbook/page/person/report/view.p.s
2004-Nov-29 19:29:40 2320 bytes prism/private/handbook/page/person/user.p.s
2004-Jan-12 18:23:20 2054 bytes prism/private/handbook/page/person/view.p.s
2004-Dec-13 10:26:49 170 bytes prism/private/handbook/page/pipefit
2004-Jun-08 13:59:24 6599 bytes prism/private/handbook/page/pipefit/batchedit.p.s
2003-Dec-14 21:10:30 1925 bytes prism/private/handbook/page/pipefit/sequence.p.s
2004-May-24 10:22:50 4305 bytes prism/private/handbook/page/pipefit/view.p.s
2004-Dec-13 10:26:49 136 bytes prism/private/handbook/page/pipeloss
2004-Oct-31 16:51:18 4144 bytes prism/private/handbook/page/pipeloss/view.p.s
2004-Jun-22 21:17:38 1608 bytes prism/private/handbook/page/pipeloss/wsspecs.p.s
2004-Dec-13 10:26:49 442 bytes prism/private/handbook/page/plant
2004-May-12 14:26:20 1301 bytes prism/private/handbook/page/plant/delete.p.s
2004-Sep-28 12:22:02 4845 bytes prism/private/handbook/page/plant/export.p.s
2004-Oct-01 03:58:54 2148 bytes prism/private/handbook/page/plant/freeze.p.s
2004-Sep-28 12:34:02 4117 bytes prism/private/handbook/page/plant/import.p.s
2003-Jan-31 16:39:50 204 bytes prism/private/handbook/page/plant/overview.s
2004-May-12 11:50:34 2367 bytes prism/private/handbook/page/plant/recheck.p.s
2004-Dec-13 10:26:49 204 bytes prism/private/handbook/page/plant/report
2003-Jan-10 23:48:12 205 bytes prism/private/handbook/page/plant/report/causeop.p.s
2003-Dec-03 14:16:26 205 bytes prism/private/handbook/page/plant/report/recheck.p.s
2004-Oct-20 23:07:22 265 bytes prism/private/handbook/page/plant/report/unitsys.p.s
2003-Feb-09 04:48:02 202 bytes prism/private/handbook/page/plant/report/view.p.s
2004-Sep-30 15:47:42 1986 bytes prism/private/handbook/page/plant/reports.p.s
2004-Dec-13 10:26:49 238 bytes prism/private/handbook/page/plant/stdovp
2004-May-12 11:32:14 4505 bytes prism/private/handbook/page/plant/stdovp/browse.p.s
2003-Dec-08 16:41:38 1613 bytes prism/private/handbook/page/plant/stdovp/default.p.s
2003-Dec-12 00:24:10 1775 bytes prism/private/handbook/page/plant/stdovp/seq_map.p.s
2003-Dec-12 00:16:22 1931 bytes prism/private/handbook/page/plant/stdovp/sequence.p.s
2003-Dec-12 00:32:42 1673 bytes prism/private/handbook/page/plant/stdovp/stdnotes.p.s
2004-Sep-26 01:20:54 2406 bytes prism/private/handbook/page/plant/unitsys.p.s
2004-Sep-26 00:30:58 7231 bytes prism/private/handbook/page/plant/view.p.s
2004-Dec-13 10:26:49 646 bytes prism/private/handbook/page/relief
2004-Jan-24 23:28:50 3657 bytes prism/private/handbook/page/relief/add_equip.p.s
2004-Jan-06 01:52:30 2402 bytes prism/private/handbook/page/relief/adj_scene.p.s
2004-Jun-20 19:28:50 7237 bytes prism/private/handbook/page/relief/browse.p.s
2004-Dec-13 10:26:49 238 bytes prism/private/handbook/page/relief/document
2004-Nov-28 18:03:20 2549 bytes prism/private/handbook/page/relief/document/browse.p.s
2004-Dec-13 10:26:49 102 bytes prism/private/handbook/page/relief/document/report
2004-Jul-23 12:16:08 54 bytes prism/private/handbook/page/relief/document/report/browse.p.s
2004-Oct-21 21:01:22 2315 bytes prism/private/handbook/page/relief/document/upload.p.s
2004-Nov-28 18:10:26 3994 bytes prism/private/handbook/page/relief/document/version.p.s
2004-Nov-28 18:06:36 4010 bytes prism/private/handbook/page/relief/document/view.p.s
2004-Oct-21 20:25:08 2571 bytes prism/private/handbook/page/relief/drawing.p.s
2004-May-31 12:04:28 3804 bytes prism/private/handbook/page/relief/notes.p.s 2003-Jan-31 16:41:46 215 bytes prism/private/handbook/page/relief/overview.s
2004-Oct-15 19:33:32 1926 bytes prism/private/handbook/page/relief/popup_dwg.p.s
2004-Dec-13 10:26:49 306 bytes prism/private/handbook/page/relief/report
2003-Jan-10 23:48:12 207 bytes prism/private/handbook/page/relief/report/pipeloss.p.s
2003-Dec-03 13:34:52 208 bytes prism/private/handbook/page/relief/report/revisions.p.s
2003-Dec-03 13:32:04 206 bytes prism/private/handbook/page/relief/report/scene-a.p.s
2003-Dec-03 13:32:40 206 bytes prism/private/handbook/page/relief/report/scene-s.p.s
2003-Jan-10 23:48:12 205 bytes prism/private/handbook/page/relief/report/scenes.p.s
2003-Jan-10 23:48:12 205 bytes prism/private/handbook/page/relief/report/sketch.p.s
2003-Jan-10 23:48:12 203 bytes prism/private/handbook/page/relief/report/view.p.s
2004-Jan-12 17:18:50 2463 bytes prism/private/handbook/page/relief/reports.p.s
2004-Jun-20 19:51:22 4719 bytes prism/private/handbook/page/relief/rev_browse.p.s
2004-Jun-20 17:00:22 2263 bytes prism/private/handbook/page/relief/rev_mail.p.s
2004-Jun-20 20:08:08 4230 bytes prism/private/handbook/page/relief/revisions.p.s
2004-Jan-06 01:51:18 1747 bytes prism/private/handbook/page/relief/seq_scene.p.s
2004-May-31 12:16:52 1835 bytes prism/private/handbook/page/relief/stdovps.p.s
2004-Oct-21 20:26:10 1567 bytes prism/private/handbook/page/relief/upload_dwg.p.s
2004-Oct-30 22:50:00 9714 bytes prism/private/handbook/page/relief/view.p.s
2004-Dec-13 10:26:49 170 bytes prism/private/handbook/page/repo
2004-Dec-13 10:26:49 238 bytes prism/private/handbook/page/repo/area
2004-Mar-05 21:08:52 1932 bytes prism/private/handbook/page/repo/area/browse.p.s
2003-Jan-31 16:48:42 217 bytes prism/private/handbook/page/repo/area/overview.s
2004-Dec-13 10:26:49 136 bytes prism/private/handbook/page/repo/area/report
2003-Dec-03 13:41:12 208 bytes prism/private/handbook/page/repo/area/report/browse.p.s
2003-Dec-03 13:41:38 206 bytes prism/private/handbook/page/repo/area/report/view.p.s
2003-Oct-09 16:01:00 1806 bytes prism/private/handbook/page/repo/area/sequence.p.s
2004-Apr-30 23:51:24 3289 bytes prism/private/handbook/page/repo/area/view.p.s
2004-Dec-13 10:26:49 136 bytes prism/private/handbook/page/repo/package
2004-Dec-13 10:26:49 102 bytes prism/private/handbook/page/repo/package/report
2003-Dec-03 13:43:32 210 bytes prism/private/handbook/page/repo/package/report/view.p.s
2003-Dec-19 00:08:26 3686 bytes prism/private/handbook/page/repo/package/view.p.s
2004-Dec-13 10:26:49 170 bytes prism/private/handbook/page/repo/version
2004-Dec-13 10:26:49 102 bytes prism/private/handbook/page/repo/version/report
2003-Dec-03 13:44:50 209 bytes prism/private/handbook/page/repo/version/report/view.p.s
2003-Oct-09 16:54:58 1703 bytes prism/private/handbook/page/repo/version/upload.p.s
2003-Oct-09 16:38:36 3656 bytes prism/private/handbook/page/repo/version/view.p.s
2004-Dec-13 10:26:49 170 bytes prism/private/handbook/page/report
2004-Nov-21 13:49:24 9809 bytes prism/private/handbook/page/report/browse.p.s
2003-Dec-02 17:44:38 191 bytes prism/private/handbook/page/report/overview.s
2003-Dec-16 21:03:42 2516 bytes prism/private/handbook/page/report/s_system.p.s
2004-Dec-13 10:26:49 306 bytes prism/private/handbook/page/scenario
2003-Jan-31 16:42:06 219 bytes prism/private/handbook/page/scenario/overview.s
2004-Oct-31 16:14:24 1612 bytes prism/private/handbook/page/scenario/picknote.p.s
2004-Oct-31 16:37:28 4126 bytes prism/private/handbook/page/scenario/piping.p.s
2004-Dec-13 10:26:49 136 bytes prism/private/handbook/page/scenario/report
2003-Jan-10 23:48:12 206 bytes prism/private/handbook/page/scenario/report/calcs.p.s
2003-Jan-10 23:48:12 207 bytes prism/private/handbook/page/scenario/report/piping.p.s
2004-Oct-31 17:20:30 2946 bytes prism/private/handbook/page/scenario/reports.p.s
2004-Oct-31 16:21:12 4558 bytes prism/private/handbook/page/scenario/trace.p.s
2004-Oct-31 16:10:02 7022 bytes prism/private/handbook/page/scenario/view.p.s
2004-Dec-13 10:26:49 238 bytes prism/private/handbook/page/task
2004-Nov-21 13:51:44 3323 bytes prism/private/handbook/page/task/browse.p.s
2003-Aug-28 18:32:10 191 bytes prism/private/handbook/page/task/overview.s
2003-Dec-03 13:49:24 202 bytes prism/private/handbook/page/task/report.p.s
2004-Jul-29 14:33:28 1729 bytes prism/private/handbook/page/task/sendmail.p.s
2004-Jun-20 16:54:36 2364 bytes prism/private/handbook/page/task/view.p.s
2004-Dec-13 10:26:49 68 bytes prism/private/handbook/page/tutor
2004-Dec-13 10:26:49 408 bytes prism/private/handbook/page/unit
2004-Jul-29 14:19:48 1304 bytes prism/private/handbook/page/unit/delete.p.s
2004-Dec-13 10:26:49 238 bytes prism/private/handbook/page/unit/document
2004-Nov-28 17:34:28 2299 bytes prism/private/handbook/page/unit/document/browse.p.s

```
2004-Dec-13 10:26:49   102 bytes  prism/private/handbook/page/unit/document/report
2003-Dec-03 13:08:26   212 bytes  prism/private/handbook/page/unit/document/report/browse.p.s
2004-Oct-21 20:46:54  2193 bytes  prism/private/handbook/page/unit/document/upload.p.s
2004-Nov-28 17:46:28  3680 bytes  prism/private/handbook/page/unit/document/version.p.s
2004-Nov-28 17:39:36  4061 bytes  prism/private/handbook/page/unit/document/view.p.s
2004-Dec-13 10:26:49   238 bytes  prism/private/handbook/page/unit/drawing
2004-Oct-18 18:53:04  3697 bytes  prism/private/handbook/page/unit/drawing/browse.p.s
2004-Oct-20 22:55:24  2961 bytes  prism/private/handbook/page/unit/drawing/popup.p.s
2004-Dec-13 10:26:49   136 bytes  prism/private/handbook/page/unit/drawing/report
2004-Jul-21 15:26:38   211 bytes  prism/private/handbook/page/unit/drawing/report/browse.p.s
2004-Jul-21 15:27:04   209 bytes  prism/private/handbook/page/unit/drawing/report/view.p.s
2004-Oct-15 19:43:40  1692 bytes  prism/private/handbook/page/unit/drawing/upload.p.s
2004-Oct-21 20:17:36  4400 bytes  prism/private/handbook/page/unit/drawing/view.p.s
2004-Jul-28 20:12:04  1812 bytes  prism/private/handbook/page/unit/dump_equip.p.s
2004-Jul-28 19:40:00  3131 bytes  prism/private/handbook/page/unit/load_equip.p.s
2003-Jan-31 16:40:34   203 bytes  prism/private/handbook/page/unit/overview.s
2004-Jul-28 20:34:08  3978 bytes  prism/private/handbook/page/unit/redbook.p.s
2004-Dec-13 10:26:49   238 bytes  prism/private/handbook/page/unit/report
2003-Jan-10 23:48:12   202 bytes  prism/private/handbook/page/unit/report/equip.p.s
2003-Dec-03 13:03:36   208 bytes  prism/private/handbook/page/unit/report/prd_summary.p.s
2003-Jan-10 23:48:12   203 bytes  prism/private/handbook/page/unit/report/relief.p.s
2003-Dec-03 13:06:06   206 bytes  prism/private/handbook/page/unit/report/sys_stats.p.s
2003-Jan-10 23:48:12   201 bytes  prism/private/handbook/page/unit/report/view.p.s
2004-Oct-20 00:33:18  3800 bytes  prism/private/handbook/page/unit/reports.p.s
2004-Oct-18 17:59:56  4518 bytes  prism/private/handbook/page/unit/view.p.s
2004-Dec-13 10:26:49   272 bytes  prism/private/handbook/page/worksheet
2004-Nov-30 18:25:08  2617 bytes  prism/private/handbook/page/worksheet/library.p.s
2003-Jan-31 16:42:24   209 bytes  prism/private/handbook/page/worksheet/overview.s
2004-Dec-13 10:26:49   102 bytes  prism/private/handbook/page/worksheet/report
2003-Jan-10 23:48:12   206 bytes  prism/private/handbook/page/worksheet/report/view.p.s
2003-Dec-16 22:23:14  2584 bytes  prism/private/handbook/page/worksheet/reports.p.s
2004-May-01 16:19:40  3865 bytes  prism/private/handbook/page/worksheet/update.p.s
2003-Dec-15 23:50:10  2939 bytes  prism/private/handbook/page/worksheet/view.p.s
2004-Dec-13 10:26:49   204 bytes  prism/private/handbook/page/wsspec
2004-Jan-12 19:25:52  1321 bytes  prism/private/handbook/page/wsspec/reap-db.p.s
2004-Jul-23 12:04:34    29 bytes  prism/private/handbook/page/wsspec/reap-files.p.s
2004-Dec-13 10:26:49    68 bytes  prism/private/handbook/page/wsspec/report
2004-Jun-22 20:34:46  2266 bytes  prism/private/handbook/page/wsspec/view.p.s
2004-Jul-23 16:27:54  9376 bytes  prism/private/handbook/pdf_combine
2004-Jul-23 16:27:40 11741 bytes  prism/private/handbook/ps_capture
2004-Nov-29 17:43:54 21110 bytes  prism/private/handbook/quick.s
2003-Jun-24 23:01:24    31 bytes  prism/private/handbook/reference.s
2004-Dec-13 10:26:50   952 bytes  prism/private/handbook/report
2003-Jan-31 16:43:44   212 bytes  prism/private/handbook/report.s
2004-Dec-13 10:26:49   102 bytes  prism/private/handbook/report/admin
2003-Aug-28 18:35:56   191 bytes  prism/private/handbook/report/admin.s
2004-Dec-13 10:26:49   204 bytes  prism/private/handbook/report/admin/report
2003-Dec-03 14:07:30  6754 bytes  prism/private/handbook/report/admin/report/db_stats.htm
2003-Dec-03 14:08:20  5006 bytes  prism/private/handbook/report/admin/report/doc_stats.htm
2004-Jul-23 14:50:14 22251 bytes  prism/private/handbook/report/admin/report/site-config.htm
2003-Dec-03 14:07:08  5700 bytes  prism/private/handbook/report/admin/report/tr_stats.htm
2004-Dec-13 10:26:49   102 bytes  prism/private/handbook/report/device
2004-Dec-13 10:26:49   102 bytes  prism/private/handbook/report/device/report
2003-Dec-03 12:41:18  4662 bytes  prism/private/handbook/report/device/report/browse.htm
2004-Dec-13 10:26:49   136 bytes  prism/private/handbook/report/equip
2003-Jan-31 16:44:36   192 bytes  prism/private/handbook/report/equip.s
2004-Dec-13 10:26:49   102 bytes  prism/private/handbook/report/equip/document
2004-Dec-13 10:26:49   170 bytes  prism/private/handbook/report/equip/document/report
2003-Dec-03 13:22:02  3517 bytes  prism/private/handbook/report/equip/document/report/browse.htm
2003-Dec-03 13:22:34  5102 bytes  prism/private/handbook/report/equip/document/report/package.htm
2003-Dec-03 13:22:56  5050 bytes  prism/private/handbook/report/equip/document/report/version.htm
```

2004-Dec-13 10:26:49 510 bytes prism/private/handbook/report/equip/report
2003-Dec-03 13:10:10 14869 bytes prism/private/handbook/report/equip/report/datasheet.htm
2004-Jul-23 15:44:46 5007 bytes prism/private/handbook/report/equip/report/dwg_iso.htm
2004-Jul-23 15:49:20 5086 bytes prism/private/handbook/report/equip/report/dwg_pid.htm
2004-Mar-31 06:05:36 8060 bytes prism/private/handbook/report/equip/report/findings.htm
2003-Dec-03 13:19:54 7842 bytes prism/private/handbook/report/equip/report/pipeloss.htm
2003-Dec-03 13:17:54 9390 bytes prism/private/handbook/report/equip/report/piping.htm
2003-Dec-03 13:10:32 8844 bytes prism/private/handbook/report/equip/report/prd-record.htm
2003-Dec-03 13:12:32 12832 bytes prism/private/handbook/report/equip/report/prd-works.htm
2003-Dec-03 13:13:04 7805 bytes prism/private/handbook/report/equip/report/scene-a.htm
2003-Dec-03 13:14:00 63395 bytes prism/private/handbook/report/equip/report/scene-c.htm
2003-Dec-03 13:15:40 23391 bytes prism/private/handbook/report/equip/report/scene-cs.htm
2003-Dec-03 13:13:22 15649 bytes prism/private/handbook/report/equip/report/scene-s.htm
2003-Dec-03 13:16:46 22163 bytes prism/private/handbook/report/equip/report/selectbasis.htm
2004-Dec-13 10:26:49 102 bytes prism/private/handbook/report/fitting
2004-Dec-13 10:26:49 170 bytes prism/private/handbook/report/fitting/report
2004-Mar-31 06:12:36 6740 bytes prism/private/handbook/report/fitting/report/ansipipe.htm
2003-Dec-03 12:42:38 6919 bytes prism/private/handbook/report/fitting/report/browse.htm
2004-Mar-31 06:12:52 22716 bytes prism/private/handbook/report/fitting/report/std-fits.htm
2004-Dec-13 10:26:49 102 bytes prism/private/handbook/report/hazard
2004-Dec-13 10:26:49 102 bytes prism/private/handbook/report/hazard/report
2003-Dec-03 12:41:56 4593 bytes prism/private/handbook/report/hazard/report/browse.htm
2004-Dec-13 10:26:49 102 bytes prism/private/handbook/report/impact
2004-Dec-13 10:26:49 68 bytes prism/private/handbook/report/impact/report
2003-Jan-31 16:44:14 211 bytes prism/private/handbook/report/library.s
2004-Dec-13 10:26:49 102 bytes prism/private/handbook/report/main
2004-Dec-13 10:26:50 136 bytes prism/private/handbook/report/main/report
2003-Dec-03 12:40:22 19376 bytes prism/private/handbook/report/main/report/causeop.htm
2003-Dec-03 12:34:04 4249 bytes prism/private/handbook/report/main/report/plants.htm
2004-Dec-13 10:26:50 102 bytes prism/private/handbook/report/maintain
2004-Dec-13 10:26:50 136 bytes prism/private/handbook/report/maintain/report
2003-Dec-03 13:27:14 4528 bytes prism/private/handbook/report/maintain/report/browse.htm
2003-Dec-03 13:27:44 5208 bytes prism/private/handbook/report/maintain/report/view.htm
2004-Dec-13 10:26:50 102 bytes prism/private/handbook/report/person
2003-Aug-28 18:30:08 191 bytes prism/private/handbook/report/person.s
2004-Dec-13 10:26:50 170 bytes prism/private/handbook/report/person/report
2003-Dec-03 13:54:10 2926 bytes prism/private/handbook/report/person/report/browse.htm
2004-Jul-23 15:06:36 5665 bytes prism/private/handbook/report/person/report/user.htm
2003-Dec-03 13:54:36 6452 bytes prism/private/handbook/report/person/report/view.htm
2004-Dec-13 10:26:50 102 bytes prism/private/handbook/report/plant
2003-Jan-31 16:44:22 191 bytes prism/private/handbook/report/plant.s
2004-Dec-13 10:26:50 170 bytes prism/private/handbook/report/plant/report
2003-Dec-03 12:46:44 19393 bytes prism/private/handbook/report/plant/report/causeop.htm
2003-Dec-03 14:18:02 3702 bytes prism/private/handbook/report/plant/report/recheck.htm
2003-Dec-03 12:43:18 5450 bytes prism/private/handbook/report/plant/report/view.htm
2004-Dec-13 10:26:50 136 bytes prism/private/handbook/report/relief
2003-Jan-31 16:44:46 191 bytes prism/private/handbook/report/relief.s
2004-Dec-13 10:26:50 102 bytes prism/private/handbook/report/relief/document
2004-Dec-13 10:26:50 102 bytes prism/private/handbook/report/relief/document/report
2004-Jul-23 15:36:26 4007 bytes prism/private/handbook/report/relief/document/report/browse.htm
2004-Dec-13 10:26:50 306 bytes prism/private/handbook/report/relief/report
2003-Dec-03 13:33:36 10230 bytes prism/private/handbook/report/relief/report/pipeloss.htm
2003-Dec-03 13:33:56 4491 bytes prism/private/handbook/report/relief/report/revisions.htm
2003-Dec-03 13:32:18 7882 bytes prism/private/handbook/report/relief/report/scene-a.htm
2003-Dec-03 13:32:48 15651 bytes prism/private/handbook/report/relief/report/scene-s.htm
2003-Dec-03 13:33:10 63259 bytes prism/private/handbook/report/relief/report/scenes.htm
2003-Dec-03 13:31:00 3654 bytes prism/private/handbook/report/relief/report/sketch.htm
2003-Dec-03 13:28:40 12661 bytes prism/private/handbook/report/relief/report/view.htm
2004-Dec-13 10:26:50 170 bytes prism/private/handbook/report/repo
2003-Aug-28 18:25:14 191 bytes prism/private/handbook/report/repo.s
2004-Dec-13 10:26:50 102 bytes prism/private/handbook/report/repo/area 2004-Dec-13 10:26:50 136 bytes prism/private/handbook/report/repo/area/report
2003-Dec-03 13:39:32 4622 bytes prism/private/handbook/report/repo/area/report/browse.htm
2003-Dec-03 13:41:56 4855 bytes prism/private/handbook/report/repo/area/report/view.htm
2004-Dec-13 10:26:50 102 bytes prism/private/handbook/report/repo/package
2004-Dec-13 10:26:50 102 bytes prism/private/handbook/report/repo/package/report
2003-Dec-03 13:43:52 5491 bytes prism/private/handbook/report/repo/package/report/view.htm
2004-Dec-13 10:26:50 102 bytes prism/private/handbook/report/repo/version
2004-Dec-13 10:26:50 102 bytes prism/private/handbook/report/repo/version/report
2003-Dec-03 13:45:02 5111 bytes prism/private/handbook/report/repo/version/report/view.htm
2004-Dec-13 10:26:50 102 bytes prism/private/handbook/report/scenario
2003-Jan-31 16:44:52 191 bytes prism/private/handbook/report/scenario.s
2004-Dec-13 10:26:50 136 bytes prism/private/handbook/report/scenario/report
2003-Dec-03 13:35:26 33468 bytes prism/private/handbook/report/scenario/report/calcs.htm
2003-Dec-03 13:35:46 7293 bytes prism/private/handbook/report/scenario/report/piping.htm
2004-Dec-13 10:26:50 102 bytes prism/private/handbook/report/task
2003-Dec-03 13:48:48 5040 bytes prism/private/handbook/report/task/report.htm
2004-Dec-13 10:26:50 170 bytes prism/private/handbook/report/unit
2003-Jan-31 16:44:28 191 bytes prism/private/handbook/report/unit.s
2004-Dec-13 10:26:50 102 bytes prism/private/handbook/report/unit/document
2004-Dec-13 10:26:50 102 bytes prism/private/handbook/report/unit/document/report
2003-Dec-03 13:08:40 3548 bytes prism/private/handbook/report/unit/document/report/browse.htm
2004-Dec-13 10:26:50 102 bytes prism/private/handbook/report/unit/drawing
2004-Dec-13 10:26:50 136 bytes prism/private/handbook/report/unit/drawing/report
2004-Jul-23 15:17:40 4473 bytes prism/private/handbook/report/unit/drawing/report/browse.htm
2004-Jul-23 15:24:52 4686 bytes prism/private/handbook/report/unit/drawing/report/view.htm
2004-Dec-13 10:26:50 238 bytes prism/private/handbook/report/unit/report
2003-Dec-03 13:02:02 8565 bytes prism/private/handbook/report/unit/report/equip.htm
2003-Dec-03 13:02:54 6052 bytes prism/private/handbook/report/unit/report/prd_summary.htm
2003-Dec-03 13:05:00 5053 bytes prism/private/handbook/report/unit/report/relief.htm
2003-Dec-03 13:05:30 5681 bytes prism/private/handbook/report/unit/report/sys_stats.htm
2003-Dec-03 12:49:02 4872 bytes prism/private/handbook/report/unit/report/view.htm
2004-Dec-13 10:26:50 102 bytes prism/private/handbook/report/worksheet
2004-Dec-13 10:26:50 102 bytes prism/private/handbook/report/worksheet/report
2003-Dec-03 13:36:32 41857 bytes prism/private/handbook/report/worksheet/report/view.htm
2004-Dec-13 10:26:50 102 bytes prism/private/handbook/report/wsspec
2004-Dec-13 10:26:50 68 bytes prism/private/handbook/report/wsspec/report
2004-Nov-30 19:45:06 14684 bytes prism/private/handbook/toc.dat
2004-Dec-13 10:26:50 170 bytes prism/private/handbook/tutor
2004-Nov-15 20:08:50 25924 bytes prism/private/handbook/tutor/creation.s
2004-Oct-29 15:16:28 8625 bytes prism/private/handbook/tutor/fittings.s
2004-Oct-27 23:32:20 9628 bytes prism/private/handbook/tutor/mitigation.s
2003-Jan-31 16:37:50 238 bytes prism/private/handbook/ui.s
2004-Dec-13 10:26:50 408 bytes prism/private/handbook/ui_map
2003-Oct-17 16:24:16 416719 bytes prism/private/handbook/ui_map/complete.png
2003-Oct-17 16:26:24 60 bytes prism/private/handbook/ui_map/complete.s
2003-Oct-17 16:24:16 94373 bytes prism/private/handbook/ui_map/flow.png
2003-Oct-17 16:30:52 56 bytes prism/private/handbook/ui_map/flow.s
2003-Oct-17 16:24:16 158831 bytes prism/private/handbook/ui_map/simple.png
2003-Oct-17 16:25:34 58 bytes prism/private/handbook/ui_map/simple.s
2003-Oct-17 16:33:30 316283 bytes prism/private/handbook/ui_map/standard.png
2003-Oct-17 16:32:08 60 bytes prism/private/handbook/ui_map/standard.s
2003-Oct-17 16:24:16 82340 bytes prism/private/handbook/ui_map/struct.png
2003-Oct-17 16:25:14 58 bytes prism/private/handbook/ui_map/struct.s
2003-Jan-31 16:38:52 31 bytes prism/private/handbook/work.s
2004-Dec-13 10:26:50 306 bytes prism/private/hazard
2004-Feb-05 17:48:34 3059 bytes prism/private/hazard/browse.p
2004-Jan-19 13:26:56 73 bytes prism/private/hazard/do-formula
2004-Jan-19 13:26:56 64 bytes prism/private/hazard/do-install
2004-Nov-05 14:25:14 7263 bytes prism/private/hazard/formulas.dat
2004-Dec-13 10:26:50 102 bytes prism/private/hazard/report
2003-Nov-25 05:55:22 2171 bytes prism/private/hazard/report/browse.p 2004-Nov-12 16:14:38 3439 bytes prism/private/hazard/reports.p
2004-Nov-12 13:37:46 4231 bytes prism/private/hazard/view.p
2004-Dec-13 10:26:50 408 bytes prism/private/impact
2004-Jul-13 23:21:18 19572 bytes prism/private/impact/Analyze.pm
2004-Jul-14 11:59:42 762 bytes prism/private/impact/_test
2004-Jul-13 18:48:38 177 bytes prism/private/impact/analyze.sh
2004-Jul-13 23:55:02 9974 bytes prism/private/impact/analyzeImpact
2004-Jul-13 20:26:04 21860 bytes prism/private/impact/browse.p
2004-Jul-13 20:09:14 3789 bytes prism/private/impact/indexImpact
2004-Dec-13 10:26:50 102 bytes prism/private/impact/lib
2004-Jul-13 21:16:18 1152 bytes prism/private/impact/lib/Reducer_Friction.pl
2004-Sep-11 18:14:58 8233 bytes prism/private/impact/relief.p
2004-Dec-13 10:26:50 102 bytes prism/private/impact/report
2004-Jul-11 19:56:38 10221 bytes prism/private/impact/report/browse.p
2004-Jul-14 11:47:12 7496 bytes prism/private/impact/reportImpact
2004-Dec-13 10:26:50 102 bytes prism/private/import
2004-May-01 16:57:04 28856 bytes prism/private/import/unit-equip-std.p
2004-Dec-13 10:26:50 442 bytes prism/private/main
2004-Sep-11 18:14:48 4446 bytes prism/private/main/add_plant.p
2004-Nov-09 18:55:36 3161 bytes prism/private/main/documents.p
2004-Dec-09 16:00:20 3819 bytes prism/private/main/login.p
2004-Nov-12 16:00:04 5879 bytes prism/private/main/logo_popup.p
2003-Oct-15 17:01:46 1850 bytes prism/private/main/logout.p
2004-Nov-12 16:01:16 8400 bytes prism/private/main/main.p
2004-Dec-13 10:26:50 136 bytes prism/private/main/report
2003-Dec-29 20:55:00 2706 bytes prism/private/main/report/causeop.p
2004-Nov-06 00:38:14 2382 bytes prism/private/main/report/plants.p
2004-Dec-09 14:47:50 3127 bytes prism/private/main/reports.p
2004-May-01 16:18:10 4059 bytes prism/private/main/sendmail.p
2004-Nov-11 18:17:08 1588 bytes prism/private/main/site.p
2004-Nov-12 11:47:14 2643 bytes prism/private/main/sites.p
2004-Dec-13 10:26:50 170 bytes prism/private/maintain
2004-Jan-04 13:26:50 3581 bytes prism/private/maintain/browse.p
2004-Dec-13 10:26:50 136 bytes prism/private/maintain/report
2004-Dec-09 14:58:40 3246 bytes prism/private/maintain/report/browse.p
2004-Dec-09 14:59:00 2446 bytes prism/private/maintain/report/view.p
2003-Nov-25 05:55:22 2809 bytes prism/private/maintain/view.p
2004-Dec-13 10:26:50 136 bytes prism/private/notes
2004-Dec-13 10:26:50 170 bytes prism/private/notes/history
2004-Jun-25 02:25:44 772 bytes prism/private/notes/history/common.a
2004-Jun-25 02:36:16 568 bytes prism/private/notes/history/overview.s
2004-Jun-25 03:25:14 2015 bytes prism/private/notes/history/toc.dat
2004-Dec-13 10:26:50 1258 bytes prism/private/notes/prsm_white
2002-Dec-03 10:46:54 1077 bytes prism/private/notes/prsm_white/=work.txt
2002-Dec-03 10:46:54 360 bytes prism/private/notes/prsm_white/_template.s
2002-Dec-03 10:46:54 490 bytes prism/private/notes/prsm_white/about.s
2002-Dec-03 10:46:54 1610 bytes prism/private/notes/prsm_white/archives.s
2002-Dec-03 10:46:54 1149 bytes prism/private/notes/prsm_white/avail.s
2002-Dec-03 10:46:54 6029 bytes prism/private/notes/prsm_white/change.s
2002-Dec-03 10:46:54 3677 bytes prism/private/notes/prsm_white/collab.s
2002-Dec-03 10:46:54 772 bytes prism/private/notes/prsm_white/common.a
2002-Dec-03 10:46:54 1525 bytes prism/private/notes/prsm_white/comply.s
2002-Dec-03 10:46:54 834 bytes prism/private/notes/prsm_white/conclude.s
2002-Dec-03 10:46:54 1036 bytes prism/private/notes/prsm_white/consistent.s
2002-Dec-03 10:46:54 189 bytes prism/private/notes/prsm_white/contents.s
2002-Dec-03 10:46:54 2874 bytes prism/private/notes/prsm_white/correct.s
2002-Dec-03 10:46:54 2069 bytes prism/private/notes/prsm_white/data.s
2002-Dec-03 10:46:54 502 bytes prism/private/notes/prsm_white/distribute.s
2002-Dec-03 10:46:54 1087 bytes prism/private/notes/prsm_white/extensible.s
2002-Dec-03 10:46:54 1905 bytes prism/private/notes/prsm_white/history.s
2002-Dec-03 10:46:54 1169 bytes prism/private/notes/prsm_white/login.p 2002-Dec-03 10:46:54 3826 bytes prism/private/notes/prsm_white/maint.s
2002-Dec-03 10:46:54 2327 bytes prism/private/notes/prsm_white/multitask.s
2002-Dec-03 10:46:54 1411 bytes prism/private/notes/prsm_white/multiuser.s
2002-Dec-03 10:46:54 667 bytes prism/private/notes/prsm_white/platform.s
2002-Dec-03 10:46:54 870 bytes prism/private/notes/prsm_white/process.s
2002-Dec-03 10:46:54 858 bytes prism/private/notes/prsm_white/prsm.s
2002-Dec-03 10:46:54 804 bytes prism/private/notes/prsm_white/psm.s
2002-Dec-03 10:46:54 2838 bytes prism/private/notes/prsm_white/require.s
2002-Dec-03 10:46:54 554 bytes prism/private/notes/prsm_white/robust.s
2002-Dec-03 10:46:54 719 bytes prism/private/notes/prsm_white/secure.s
2002-Dec-03 10:46:54 220 bytes prism/private/notes/prsm_white/software.s
2002-Dec-03 10:46:54 662 bytes prism/private/notes/prsm_white/start.p
2002-Dec-03 10:46:54 544 bytes prism/private/notes/prsm_white/summary.s
2002-Dec-03 10:46:54 803 bytes prism/private/notes/prsm_white/support.s
2002-Dec-03 10:46:54 1580 bytes prism/private/notes/prsm_white/toc.dat
2002-Dec-03 10:46:54 2831 bytes prism/private/notes/prsm_white/workflow.s
2002-Dec-03 10:46:54 3425 bytes prism/private/notes/prsm_white/worksheet.s
2004-Dec-13 10:26:50 238 bytes prism/private/person
2004-May-01 17:06:52 3184 bytes prism/private/person/browse.p
2004-Dec-08 00:30:04 2395 bytes prism/private/person/password.p
2004-Dec-13 10:26:50 170 bytes prism/private/person/report
2004-Dec-08 00:32:10 2513 bytes prism/private/person/report/browse.p
2003-Nov-25 05:48:46 2123 bytes prism/private/person/report/user.p
2004-Dec-08 00:33:36 3000 bytes prism/private/person/report/view.p
2004-Nov-12 15:37:46 3234 bytes prism/private/person/user.p
2004-Feb-20 21:05:26 5481 bytes prism/private/person/view.p
2004-Dec-13 10:26:50 136 bytes prism/private/phase_t
2004-Oct-06 15:00:46 2791 bytes prism/private/phase_t/browse.p
2004-Nov-12 13:25:26 4116 bytes prism/private/phase_t/view.p
2004-Dec-13 10:26:50 204 bytes prism/private/pipefit
2004-Dec-03 18:06:44 25135 bytes prism/private/pipefit/batchedit.p
2004-Mar-12 19:24:06 5698 bytes prism/private/pipefit/hdelta.dat
2004-Dec-09 14:23:42 2517 bytes prism/private/pipefit/sequence.p
2004-Aug-27 13:41:50 16282 bytes prism/private/pipefit/view.p
2004-Dec-13 10:26:50 136 bytes prism/private/pipeloss
2004-Nov-12 15:28:54 9389 bytes prism/private/pipeloss/view.p
2004-Apr-01 19:28:08 1725 bytes prism/private/pipeloss/wsspecs.p
2004-Dec-13 10:26:50 408 bytes prism/private/plant
2004-Sep-20 15:49:08 2836 bytes prism/private/plant/delete.p
2004-Sep-11 18:14:40 8213 bytes prism/private/plant/export.p
2004-Aug-28 15:45:56 2357 bytes prism/private/plant/freeze.p
2004-Sep-11 18:14:44 8790 bytes prism/private/plant/import.p
2004-May-01 16:14:12 6222 bytes prism/private/plant/recheck.p
2004-Dec-13 10:26:50 204 bytes prism/private/plant/report
2004-Dec-09 14:48:44 3436 bytes prism/private/plant/report/causeop.p
2004-Dec-09 14:49:12 3305 bytes prism/private/plant/report/recheck.p
2004-Nov-08 10:41:04 2958 bytes prism/private/plant/report/unitsys.p
2004-Dec-09 14:49:28 3090 bytes prism/private/plant/report/view.p
2004-Nov-12 16:11:48 3733 bytes prism/private/plant/reports.p
2004-Dec-13 10:26:50 238 bytes prism/private/plant/stdovp
2004-Apr-23 15:15:08 6574 bytes prism/private/plant/stdovp/browse.p
2003-Nov-25 05:55:22 2678 bytes prism/private/plant/stdovp/default.p
2004-Oct-30 08:25:54 1854 bytes prism/private/plant/stdovp/seq_map.p
2004-Oct-30 08:23:08 1732 bytes prism/private/plant/stdovp/sequence.p
2004-Apr-23 15:16:18 1918 bytes prism/private/plant/stdovp/stdnotes.p
2004-Jul-17 14:43:42 5919 bytes prism/private/plant/unitsys.p
2004-Oct-25 18:11:30 10220 bytes prism/private/plant/view.p
2004-Dec-13 10:26:50 646 bytes prism/private/relief
2004-Jan-23 14:16:30 7413 bytes prism/private/relief/add_equip.p
2003-Nov-25 05:55:22 3402 bytes prism/private/relief/adj_scene.p
2004-Oct-30 06:04:38 11050 bytes prism/private/relief/browse.p 2004-Dec-13 10:26:50 238 bytes prism/private/relief/document
2004-Jan-04 13:26:06 3854 bytes prism/private/relief/document/browse.p
2004-Dec-13 10:26:50 102 bytes prism/private/relief/document/report
2004-May-25 04:34:30 2760 bytes prism/private/relief/document/report/browse.p
2004-Mar-03 20:38:50 3480 bytes prism/private/relief/document/upload.p
2004-May-12 14:22:20 4965 bytes prism/private/relief/document/version.p
2004-Jan-04 13:25:54 4982 bytes prism/private/relief/document/view.p
2004-Feb-10 16:45:44 4900 bytes prism/private/relief/drawing.p
2004-May-01 17:06:46 5942 bytes prism/private/relief/notes.p
2004-Apr-08 20:22:46 2827 bytes prism/private/relief/popup_dwg.p
2004-Dec-13 10:26:50 374 bytes prism/private/relief/report
2004-Dec-09 14:59:16 8420 bytes prism/private/relief/report/pipeloss.p
2004-Dec-09 14:59:24 3409 bytes prism/private/relief/report/revisions.p
2004-Dec-09 14:59:34 4092 bytes prism/private/relief/report/scene-a.p
2004-Dec-09 14:59:48 3154 bytes prism/private/relief/report/scene-s.p
2004-Dec-09 15:00:34 5980 bytes prism/private/relief/report/scene_summary.pm
2004-Dec-09 15:00:02 6196 bytes prism/private/relief/report/scenes.p
2004-Dec-09 15:00:48 2905 bytes prism/private/relief/report/sketch.p
2004-Dec-09 15:27:56 4385 bytes prism/private/relief/report/streams.p
2004-Dec-09 15:14:20 10628 bytes prism/private/relief/report/view.p
2004-Dec-09 15:14:44 6809 bytes prism/private/relief/reports.p
2004-May-12 14:29:14 9983 bytes prism/private/relief/rev_browse.p
2004-Oct-11 15:24:18 6694 bytes prism/private/relief/rev_mail.p
2004-Aug-04 13:13:04 7922 bytes prism/private/relief/revisions.p
2004-Oct-30 08:39:04 1859 bytes prism/private/relief/seq_scene.p
2004-Oct-30 08:12:08 1799 bytes prism/private/relief/seq_stream.p
2004-Aug-09 17:06:36 2053 bytes prism/private/relief/stdovps.p
2004-Mar-03 20:33:12 3836 bytes prism/private/relief/upload_dwg.p
2004-Dec-02 17:07:10 25407 bytes prism/private/relief/view.p
2004-Dec-13 10:26:50 204 bytes prism/private/repo
2004-Dec-13 10:26:50 204 bytes prism/private/repo/area
2003-Oct-15 18:25:26 2352 bytes prism/private/repo/area/browse.p
2004-Dec-13 10:26:50 136 bytes prism/private/repo/area/report
2004-Apr-21 16:19:20 2161 bytes prism/private/repo/area/report/browse.p
2004-Apr-21 16:58:10 2945 bytes prism/private/repo/area/report/view.p
2004-Oct-30 08:46:32 1634 bytes prism/private/repo/area/sequence.p
2004-Oct-30 08:44:40 5031 bytes prism/private/repo/area/view.p
2004-Dec-13 10:26:50 102 bytes prism/private/repo/file
2004-Feb-02 17:14:54 1940 bytes prism/private/repo/file/serve.p
2004-Dec-13 10:26:50 136 bytes prism/private/repo/package
2004-Dec-13 10:26:50 102 bytes prism/private/repo/package/report
2003-Nov-25 05:48:46 3873 bytes prism/private/repo/package/report/view.p
2004-Oct-19 20:02:42 5055 bytes prism/private/repo/package/view.p
2004-Dec-13 10:26:50 170 bytes prism/private/repo/version
2004-Dec-13 10:26:50 102 bytes prism/private/repo/version/report
2003-Nov-25 05:48:46 3169 bytes prism/private/repo/version/report/view.p
2004-Mar-03 20:30:24 3074 bytes prism/private/repo/version/upload.p
2004-Sep-11 17:09:14 6093 bytes prism/private/repo/version/view.p
2004-Dec-13 10:26:50 204 bytes prism/private/report
2004-Dec-09 14:48:08 27711 bytes prism/private/report/browse.p
2003-Aug-28 17:20:26 3017 bytes prism/private/report/report.a
2004-Dec-09 14:48:22 21645 bytes prism/private/report/reports.dat
2003-Dec-01 18:33:14 4237 bytes prism/private/report/s_system.p
2004-Dec-13 10:26:50 272 bytes prism/private/scenario
2004-Apr-23 15:08:50 2439 bytes prism/private/scenario/picknote.p
2004-Nov-12 15:31:36 11713 bytes prism/private/scenario/piping.p
2004-Dec-13 10:26:50 136 bytes prism/private/scenario/report
2004-Dec-09 15:29:40 4501 bytes prism/private/scenario/report/calcs.p
2004-Dec-09 15:29:50 5395 bytes prism/private/scenario/report/piping.p
2004-Nov-12 16:09:06 5153 bytes prism/private/scenario/reports.p
2004-Sep-30 14:00:46 8417 bytes prism/private/scenario/trace.p 2004-Nov-12 15:34:14 14821 bytes prism/private/scenario/view.p
2004-Dec-13 10:26:50 68 bytes prism/private/snapshot
2004-Dec-13 10:26:50 170 bytes prism/private/stream
2004-Oct-30 08:11:58 2043 bytes prism/private/stream/seq_comps.p
2004-Oct-30 08:11:42 2056 bytes prism/private/stream/seq_flash.p
2004-Nov-01 21:04:42 8105 bytes prism/private/stream/view.p
2004-Dec-13 10:26:50 238 bytes prism/private/task
2004-Aug-04 11:34:50 8275 bytes prism/private/task/browse.p
2003-Nov-02 17:00:08 5100 bytes prism/private/task/report.p
2004-May-01 15:38:32 5584 bytes prism/private/task/sendmail.p
2004-Oct-11 15:30:36 5315 bytes prism/private/task/view.p
2003-Oct-16 13:41:26 3710 bytes prism/private/task/write-ss.p
2004-Dec-13 10:26:50 102 bytes prism/private/template
2004-Dec-13 10:26:50 170 bytes prism/private/template/plant
2004-Dec-13 10:26:50 136 bytes prism/private/template/plant/020-empty
2004-Oct-28 00:18:44 5099 bytes prism/private/template/plant/020-empty/plant.zip
2004-Jan-21 16:53:22 28 bytes prism/private/template/plant/020-empty/title.dat
2004-Dec-13 10:26:50 136 bytes prism/private/template/plant/040-simple
2004-Oct-28 00:18:48 15370 bytes prism/private/template/plant/040-simple/plant.zip
2004-Jan-21 16:53:48 33 bytes prism/private/template/plant/040-simple/title.dat
2004-Dec-13 10:26:51 136 bytes prism/private/template/plant/060-std-demo
2004-Oct-28 00:19:04 179205 bytes prism/private/template/plant/060-std-demo/plant.zip
2004-Jan-21 16:54:02 29 bytes prism/private/template/plant/060-std-demo/title.dat
2004-Dec-13 10:26:51 1904 bytes prism/private/tool
2003-Mar-10 07:46:28 1929 bytes prism/private/tool/=includes.pl
2003-Nov-25 05:55:22 1649 bytes prism/private/tool/=pipefit.pl
2003-Mar-11 16:48:34 136 bytes prism/private/tool/=timing.pl
2003-Nov-25 05:24:18 1609 bytes prism/private/tool/_mkimages
2003-Jan-03 04:18:06 1210 bytes prism/private/tool/_mkschema
2004-Dec-01 15:29:54 623 bytes prism/private/tool/accessKey
2004-Sep-01 16:36:42 2138 bytes prism/private/tool/chkEqTrouble
2004-Sep-01 15:34:52 1847 bytes prism/private/tool/chkEqTrouble2
2004-Feb-15 07:22:20 4369 bytes prism/private/tool/chkEquipSystems
2004-Jun-30 21:24:22 3393 bytes prism/private/tool/chkFitFriction.pl
2003-Mar-14 20:11:32 5740 bytes prism/private/tool/chkForeign
2004-Aug-12 15:27:22 1302 bytes prism/private/tool/chkOvpDflt
2003-Oct-13 16:26:10 3859 bytes prism/private/tool/chkPipeOk
2003-Nov-11 11:15:42 4051 bytes prism/private/tool/chkReservedSQL
2003-Mar-10 17:23:50 3452 bytes prism/private/tool/chkScenes
2004-Jul-05 19:19:26 1814 bytes prism/private/tool/chkSystemScenes
2003-Aug-06 14:20:32 2878 bytes prism/private/tool/clo1unit
2003-Sep-23 15:17:50 1703 bytes prism/private/tool/copyDatabase
2004-Jul-14 13:08:44 1319 bytes prism/private/tool/copyEqnImages
2004-Jan-22 21:26:00 594 bytes prism/private/tool/copySite
2004-Jun-29 17:36:10 1902 bytes prism/private/tool/deletePlant
2004-Jan-14 17:54:42 1416 bytes prism/private/tool/dupSysNames
2003-Nov-15 18:17:24 1420 bytes prism/private/tool/eachClass
2004-Mar-01 15:03:30 1339 bytes prism/private/tool/eachWorkSheet
2004-Jan-19 19:23:04 1502 bytes prism/private/tool/emptyClass
2003-Mar-10 21:42:48 1485 bytes prism/private/tool/emptyRepo
2004-Jun-21 14:51:54 2734 bytes prism/private/tool/equipLineNum.pl
2004-Jul-14 16:35:20 1973 bytes prism/private/tool/exportPlant
2004-Mar-15 15:38:54 1161 bytes prism/private/tool/findEquipLinks
2004-Feb-15 07:20:06 1781 bytes prism/private/tool/fixEquipSystems
2004-Mar-09 15:06:50 1954 bytes prism/private/tool/fixPoster
2003-Dec-17 17:40:30 1999 bytes prism/private/tool/fixRevCache
2004-Jul-23 16:27:08 2285 bytes prism/private/tool/handBookSnaps
2004-Apr-26 21:35:36 2080 bytes prism/private/tool/importPlant
2004-May-03 14:12:26 573 bytes prism/private/tool/installKey
2003-Sep-12 19:46:32 6710 bytes prism/private/tool/load-equip
2004-Jan-19 21:38:48 2462 bytes prism/private/tool/makeFormula 2004-Apr-30 19:07:16 394 bytes prism/private/tool/makeTemplates
2003-Oct-22 15:05:58 1211 bytes prism/private/tool/markTasks
2003-Jun-24 16:22:16 2473 bytes prism/private/tool/nameStats
2003-Nov-19 21:53:06 5889 bytes prism/private/tool/perPlantStats
2003-Jun-24 21:20:36 2982 bytes prism/private/tool/pgRename
2003-May-29 19:44:46 2482 bytes prism/private/tool/portUsers
2003-Oct-31 15:16:50 2835 bytes prism/private/tool/pwdCheck
2003-Apr-07 07:51:10 2069 bytes prism/private/tool/reindex
2004-Jan-19 14:27:34 1093 bytes prism/private/tool/rptHazards
2004-Feb-01 07:16:00 2382 bytes prism/private/tool/rptRepoDups
2004-Oct-28 21:01:18 1829 bytes prism/private/tool/rptRepoPackages
2003-Sep-05 16:59:26 3855 bytes prism/private/tool/rptUserPS1
2004-Mar-16 05:26:52 1824 bytes prism/private/tool/rptValveSelect
2004-Feb-01 06:08:02 3931 bytes prism/private/tool/splitSite
2004-May-25 19:01:06 8276 bytes prism/private/tool/systemStats
2003-Oct-30 12:51:40 1365 bytes prism/private/tool/taskQueue
2004-Jun-24 21:56:36 9408 bytes prism/private/tool/updatePlants
2004-Dec-13 10:26:51 374 bytes prism/private/unit
2004-May-01 16:57:52 2951 bytes prism/private/unit/delete.p
2004-Dec-13 10:26:51 238 bytes prism/private/unit/document
2004-Jan-04 13:22:52 3633 bytes prism/private/unit/document/browse.p
2004-Dec-13 10:26:51 102 bytes prism/private/unit/document/report
2004-Nov-08 10:51:50 2582 bytes prism/private/unit/document/report/browse.p
2004-Mar-03 20:26:54 3288 bytes prism/private/unit/document/upload.p
2004-May-12 14:22:06 4666 bytes prism/private/unit/document/version.p
2003-Nov-25 05:55:22 4679 bytes prism/private/unit/document/view.p
2004-Dec-13 10:26:51 238 bytes prism/private/unit/drawing
2004-Dec-02 17:13:46 5945 bytes prism/private/unit/drawing/browse.p
2004-Apr-21 15:20:40 4317 bytes prism/private/unit/drawing/popup.p
2004-Dec-13 10:26:51 136 bytes prism/private/unit/drawing/report
2004-Nov-08 10:50:58 2839 bytes prism/private/unit/drawing/report/browse.p
2004-Nov-08 11:25:42 2685 bytes prism/private/unit/drawing/report/view.p
2004-Mar-03 20:22:54 3898 bytes prism/private/unit/drawing/upload.p
2004-May-25 04:46:26 5700 bytes prism/private/unit/drawing/view.p
2003-Nov-25 05:55:22 2026 bytes prism/private/unit/dump_equip.p
2004-Aug-04 16:10:48 4339 bytes prism/private/unit/load_equip.p
2004-Sep-14 16:30:06 8528 bytes prism/private/unit/redbook.p
2004-Dec-13 10:26:51 238 bytes prism/private/unit/report
2004-Dec-09 14:50:56 5984 bytes prism/private/unit/report/equip.p
2004-Dec-09 14:51:04 4316 bytes prism/private/unit/report/prd_summary.p
2004-Dec-09 14:51:20 3515 bytes prism/private/unit/report/relief.p
2004-Dec-09 14:51:32 4542 bytes prism/private/unit/report/sys_stats.p
2004-Dec-09 14:51:46 2969 bytes prism/private/unit/report/view.p
2004-Nov-12 16:08:12 7141 bytes prism/private/unit/reports.p
2004-Feb-04 17:04:46 5321 bytes prism/private/unit/view.p
2004-Dec-13 10:26:51 374 bytes prism/private/worksheet
2004-Oct-06 15:39:20 11229 bytes prism/private/worksheet/editrules.p
2004-Nov-09 18:31:46 2598 bytes prism/private/worksheet/library.p
2004-Dec-13 10:26:51 102 bytes prism/private/worksheet/report
2004-Dec-09 14:52:06 16310 bytes prism/private/worksheet/report/view.p
2004-Nov-12 16:06:38 9456 bytes prism/private/worksheet/reports.p
2004-Apr-30 18:04:28 5114 bytes prism/private/worksheet/seq-param.p
2004-Oct-30 08:42:00 5013 bytes prism/private/worksheet/seq-secn.p
2004-Apr-30 18:02:08 1362 bytes prism/private/worksheet/uiws-export.p
2004-May-01 15:48:54 21820 bytes prism/private/worksheet/update.p
2004-May-01 15:47:48 4430 bytes prism/private/worksheet/view.p
2004-Dec-13 10:48:48 340 bytes prism/private/wslib
2004-Dec-13 10:28:47 12580 bytes prism/private/wslib/WS
2004-Dec-13 10:28:38 272 bytes prism/private/wslib/WS/Class_Device_BV_1_0_7_28
2004-Nov-15 11:03:20 8586 bytes prism/private/wslib/WS/Class_Device_BV_1_0_7_28.pm
2004-Nov-15 11:03:20 81 bytes prism/private/wslib/WS/Class_Device_BV_1_0_7_28.tex 2004-Nov-15 11:03:20 263 bytes prism/private/wslib/WS/Class_Device_BV_1_0_7_28.ws
2004-Nov-15 11:03:22 891 bytes prism/private/wslib/WS/Class_Device_BV_1_0_7_28/Class_Device_BV_1_0_7_28.css
2004-Nov-15 11:03:22 1666 bytes prism/private/wslib/WS/Class_Device_BV_1_0_7_28/Class_Device_BV_1_0_7_28.html
2004-Dec-13 10:28:38 68 bytes prism/private/wslib/WS/Class_Device_BV_1_0_7_28/EqnImages
2004-Nov-15 11:03:22 1666 bytes prism/private/wslib/WS/Class_Device_BV_1_0_7_28/index.html
2004-Nov-15 11:03:44 168 bytes prism/private/wslib/WS/Class_Device_BV_1_0_7_28/labels.pl
2004-Nov-15 11:03:22 2490 bytes prism/private/wslib/WS/Class_Device_BV_1_0_7_28/node1.html
2004-Dec-13 10:28:38 272 bytes prism/private/wslib/WS/Class_Device_CV_1_0_7_28
2004-Nov-15 11:03:28 8413 bytes prism/private/wslib/WS/Class_Device_CV_1_0_7_28.pm
2004-Nov-15 11:03:28 81 bytes prism/private/wslib/WS/Class_Device_CV_1_0_7_28.tex
2004-Nov-15 11:03:28 263 bytes prism/private/wslib/WS/Class_Device_CV_1_0_7_28.ws
2004-Nov-15 11:03:28 891 bytes prism/private/wslib/WS/Class_Device_CV_1_0_7_28/Class_Device_CV_1_0_7_28.css
2004-Nov-15 11:03:28 1666 bytes prism/private/wslib/WS/Class_Device_CV_1_0_7_28/Class_Device_CV_1_0_7_28.html
2004-Dec-13 10:28:38 68 bytes prism/private/wslib/WS/Class_Device_CV_1_0_7_28/EqnImages
2004-Nov-15 11:03:28 1666 bytes prism/private/wslib/WS/Class_Device_CV_1_0_7_28/index.html
2004-Nov-15 11:03:44 168 bytes prism/private/wslib/WS/Class_Device_CV_1_0_7_28/labels.pl
2004-Nov-15 11:03:28 2490 bytes prism/private/wslib/WS/Class_Device_CV_1_0_7_28/node1.html
2004-Dec-13 10:28:38 272 bytes prism/private/wslib/WS/Class_Device_Compr_1_0_7_28
2004-Nov-15 11:03:24 7353 bytes prism/private/wslib/WS/Class_Device_Compr_1_0_7_28.pm
2004-Nov-15 11:03:24 81 bytes prism/private/wslib/WS/Class_Device_Compr_1_0_7_28.tex
2004-Nov-15 11:03:24 275 bytes prism/private/wslib/WS/Class_Device_Compr_1_0_7_28.ws
2004-Nov-15 11:03:26 891 bytes prism/private/wslib/WS/Class_Device_Compr_1_0_7_28/Class_Device_Compr_1_0_7_28.css
2004-Nov-15 11:03:26 1678 bytes prism/private/wslib/WS/Class_Device_Compr_1_0_7_28/Class_Device_Compr_1_0_7_28.html
2004-Dec-13 10:28:38 68 bytes prism/private/wslib/WS/Class_Device_Compr_1_0_7_28/EqnImages
2004-Nov-15 11:03:26 1678 bytes prism/private/wslib/WS/Class_Device_Compr_1_0_7_28/index.html
2004-Nov-15 11:03:44 168 bytes prism/private/wslib/WS/Class_Device_Compr_1_0_7_28/labels.pl
2004-Nov-15 11:03:26 2523 bytes prism/private/wslib/WS/Class_Device_Compr_1_0_7_28/node1.html
2004-Dec-13 10:28:38 272 bytes prism/private/wslib/WS/Class_Device_Compr_P_1_0_7_28
2004-Nov-15 11:03:26 7371 bytes prism/private/wslib/WS/Class_Device_Compr_P_1_0_7_28.pm
2004-Nov-15 11:03:26 81 bytes prism/private/wslib/WS/Class_Device_Compr_P_1_0_7_28.tex
2004-Nov-15 11:03:26 283 bytes prism/private/wslib/WS/Class_Device_Compr_P_1_0_7_28.ws
2004-Nov-15 11:03:28 891 bytes prism/private/wslib/WS/Class_Device_Compr_P_1_0_7_28/Class_Device_Compr_P_1_0_7_28.css
2004-Nov-15 11:03:28 1686 bytes prism/private/wslib/WS/Class_Device_Compr_P_1_0_7_28/Class_Device_Compr_P_1_0_7_28.html
2004-Dec-13 10:28:38 68 bytes prism/private/wslib/WS/Class_Device_Compr_P_1_0_7_28/EqnImages
2004-Nov-15 11:03:28 1686 bytes prism/private/wslib/WS/Class_Device_Compr_P_1_0_7_28/index.html
2004-Nov-15 11:03:44 168 bytes prism/private/wslib/WS/Class_Device_Compr_P_1_0_7_28/labels.pl
2004-Nov-15 11:03:28 2545 bytes prism/private/wslib/WS/Class_Device_Compr_P_1_0_7_28/node1.html
2004-Dec-13 10:28:38 272 bytes prism/private/wslib/WS/Class_Device_HE_SS_1_0_7_28
2004-Nov-15 11:03:30 8734 bytes prism/private/wslib/WS/Class_Device_HE_SS_1_0_7_28.pm
2004-Nov-15 11:03:30 81 bytes prism/private/wslib/WS/Class_Device_HE_SS_1_0_7_28.tex
2004-Nov-15 11:03:30 275 bytes prism/private/wslib/WS/Class_Device_HE_SS_1_0_7_28.ws
2004-Nov-15 11:03:30 891 bytes prism/private/wslib/WS/Class_Device_HE_SS_1_0_7_28/Class_Device_HE_SS_1_0_7_28.css
2004-Nov-15 11:03:30 1678 bytes prism/private/wslib/WS/Class_Device_HE_SS_1_0_7_28/Class_Device_HE_SS_1_0_7_28.html
2004-Dec-13 10:28:38 68 bytes prism/private/wslib/WS/Class_Device_HE_SS_1_0_7_28/EqnImages
2004-Nov-15 11:03:30 1678 bytes prism/private/wslib/WS/Class_Device_HE_SS_1_0_7_28/index.html
2004-Nov-15 11:03:44 168 bytes prism/private/wslib/WS/Class_Device_HE_SS_1_0_7_28/labels.pl
2004-Nov-15 11:03:30 2523 bytes prism/private/wslib/WS/Class_Device_HE_SS_1_0_7_28/node1.html
2004-Dec-13 10:28:38 272 bytes prism/private/wslib/WS/Class_Device_HE_TS_1_0_7_28
2004-Nov-15 11:03:32 6617 bytes prism/private/wslib/WS/Class_Device_HE_TS_1_0_7_28.pm
2004-Nov-15 11:03:32 81 bytes prism/private/wslib/WS/Class_Device_HE_TS_1_0_7_28.tex
2004-Nov-15 11:03:32 275 bytes prism/private/wslib/WS/Class_Device_HE_TS_1_0_7_28.ws
2004-Nov-15 11:03:32 891 bytes prism/private/wslib/WS/Class_Device_HE_TS_1_0_7_28/Class_Device_HE_TS_1_0_7_28.css
2004-Nov-15 11:03:32 1678 bytes prism/private/wslib/WS/Class_Device_HE_TS_1_0_7_28/Class_Device_HE_TS_1_0_7_28.html
2004-Dec-13 10:28:38 68 bytes prism/private/wslib/WS/Class_Device_HE_TS_1_0_7_28/EqnImages
2004-Nov-15 11:03:32 1678 bytes prism/private/wslib/WS/Class_Device_HE_TS_1_0_7_28/index.html
2004-Nov-15 11:03:44 168 bytes prism/private/wslib/WS/Class_Device_HE_TS_1_0_7_28/labels.pl
2004-Nov-15 11:03:32 2523 bytes prism/private/wslib/WS/Class_Device_HE_TS_1_0_7_28/node1.html
2004-Dec-13 10:28:38 272 bytes prism/private/wslib/WS/Class_Device_Header_1_0_7_28
2004-Nov-15 11:03:34 3374 bytes prism/private/wslib/WS/Class_Device_Header_1_0_7_28.pm
2004-Nov-15 11:03:34 81 bytes prism/private/wslib/WS/Class_Device_Header_1_0_7_28.tex
2004-Nov-15 11:03:34 279 bytes prism/private/wslib/WS/Class_Device_Header_1_0_7_28.ws 2004-Nov-15 11:03:34 891 bytes prism/private/wslib/WS/Class_Device_Header_1_0_7_28/Class_Device_Header_1_0_7_28.css
2004-Nov-15 11:03:34 1682 bytes prism/private/wslib/WS/Class_Device_Header_1_0_7_28/Class_Device_Header_1_0_7_28.html
2004-Dec-13 10:28:38 68 bytes prism/private/wslib/WS/Class_Device_Header_1_0_7_28/EqnImages
2004-Nov-15 11:03:34 1682 bytes prism/private/wslib/WS/Class_Device_Header_1_0_7_28/index.html
2004-Nov-15 11:03:44 168 bytes prism/private/wslib/WS/Class_Device_Header_1_0_7_28/labels.pl
2004-Nov-15 11:03:34 2534 bytes prism/private/wslib/WS/Class_Device_Header_1_0_7_28/node1.html
2004-Dec-13 10:28:38 272 bytes prism/private/wslib/WS/Class_Device_PRV_1_0_7_28
2004-Nov-15 11:03:36 20633 bytes prism/private/wslib/WS/Class_Device_PRV_1_0_7_28.pm
2004-Nov-15 11:03:36 81 bytes prism/private/wslib/WS/Class_Device_PRV_1_0_7_28.tex
2004-Nov-15 11:03:36 267 bytes prism/private/wslib/WS/Class_Device_PRV_1_0_7_28.ws
2004-Nov-15 11:03:38 891 bytes prism/private/wslib/WS/Class_Device_PRV_1_0_7_28/Class_Device_PRV_1_0_7_28.css
2004-Nov-15 11:03:38 1670 bytes prism/private/wslib/WS/Class_Device_PRV_1_0_7_28/Class_Device_PRV_1_0_7_28.html
2004-Dec-13 10:28:38 68 bytes prism/private/wslib/WS/Class_Device_PRV_1_0_7_28/EqnImages
2004-Nov-15 11:03:38 1670 bytes prism/private/wslib/WS/Class_Device_PRV_1_0_7_28/index.html
2004-Nov-15 11:03:44 168 bytes prism/private/wslib/WS/Class_Device_PRV_1_0_7_28/labels.pl
2004-Nov-15 11:03:38 2501 bytes prism/private/wslib/WS/Class_Device_PRV_1_0_7_28/node1.html
2004-Dec-13 10:28:38 272 bytes prism/private/wslib/WS/Class_Device_Pipe_P_1_0_7_28
2004-Nov-15 11:03:36 11253 bytes prism/private/wslib/WS/Class_Device_Pipe_P_1_0_7_28.pm
2004-Nov-15 11:03:36 81 bytes prism/private/wslib/WS/Class_Device_Pipe_P_1_0_7_28.tex
2004-Nov-15 11:03:36 279 bytes prism/private/wslib/WS/Class_Device_Pipe_P_1_0_7_28.ws
2004-Nov-15 11:03:36 891 bytes prism/private/wslib/WS/Class_Device_Pipe_P_1_0_7_28/Class_Device_Pipe_P_1_0_7_28.css
2004-Nov-15 11:03:36 1682 bytes prism/private/wslib/WS/Class_Device_Pipe_P_1_0_7_28/Class_Device_Pipe_P_1_0_7_28.html
2004-Dec-13 10:28:38 68 bytes prism/private/wslib/WS/Class_Device_Pipe_P_1_0_7_28/EqnImages
2004-Nov-15 11:03:36 1682 bytes prism/private/wslib/WS/Class_Device_Pipe_P_1_0_7_28/index.html
2004-Nov-15 11:03:44 168 bytes prism/private/wslib/WS/Class_Device_Pipe_P_1_0_7_28/labels.pl
2004-Nov-15 11:03:36 2534 bytes prism/private/wslib/WS/Class_Device_Pipe_P_1_0_7_28/node1.html
2004-Dec-13 10:28:38 272 bytes prism/private/wslib/WS/Class_Device_Pump_1_0_7_28
2004-Nov-15 11:03:38 7949 bytes prism/private/wslib/WS/Class_Device_Pump_1_0_7_28.pm
2004-Nov-15 11:03:38 81 bytes prism/private/wslib/WS/Class_Device_Pump_1_0_7_28.tex
2004-Nov-15 11:03:38 271 bytes prism/private/wslib/WS/Class_Device_Pump_1_0_7_28.ws
2004-Nov-15 11:03:40 891 bytes prism/private/wslib/WS/Class_Device_Pump_1_0_7_28/Class_Device_Pump_1_0_7_28.css
2004-Nov-15 11:03:40 1674 bytes prism/private/wslib/WS/Class_Device_Pump_1_0_7_28/Class_Device_Pump_1_0_7_28.html
2004-Dec-13 10:28:38 68 bytes prism/private/wslib/WS/Class_Device_Pump_1_0_7_28/EqnImages
2004-Nov-15 11:03:40 1674 bytes prism/private/wslib/WS/Class_Device_Pump_1_0_7_28/index.html
2004-Nov-15 11:03:44 168 bytes prism/private/wslib/WS/Class_Device_Pump_1_0_7_28/labels.pl
2004-Nov-15 11:03:40 2512 bytes prism/private/wslib/WS/Class_Device_Pump_1_0_7_28/node1.html
2004-Dec-13 10:28:38 272 bytes prism/private/wslib/WS/Class_Device_Pump_P_1_0_7_28
2004-Nov-15 11:03:40 7969 bytes prism/private/wslib/WS/Class_Device_Pump_P_1_0_7_28.pm
2004-Nov-15 11:03:40 81 bytes prism/private/wslib/WS/Class_Device_Pump_P_1_0_7_28.tex
2004-Nov-15 11:03:40 279 bytes prism/private/wslib/WS/Class_Device_Pump_P_1_0_7_28.ws
2004-Nov-15 11:03:42 891 bytes prism/private/wslib/WS/Class_Device_Pump_P_1_0_7_28/Class_Device_Pump_P_1_0_7_28.css
2004-Nov-15 11:03:42 1682 bytes prism/private/wslib/WS/Class_Device_Pump_P_1_0_7_28/Class_Device_Pump_P_1_0_7_28.html
2004-Dec-13 10:28:38 68 bytes prism/private/wslib/WS/Class_Device_Pump_P_1_0_7_28/EqnImages
2004-Nov-15 11:03:42 1682 bytes prism/private/wslib/WS/Class_Device_Pump_P_1_0_7_28/index.html
2004-Nov-15 11:03:44 168 bytes prism/private/wslib/WS/Class_Device_Pump_P_1_0_7_28/labels.pl
2004-Nov-15 11:03:42 2534 bytes prism/private/wslib/WS/Class_Device_Pump_P_1_0_7_28/node1.html
2004-Dec-13 10:28:38 272 bytes prism/private/wslib/WS/Class_Device_RD_1_0_7_28
2004-Nov-15 11:03:42 39851 bytes prism/private/wslib/WS/Class_Device_RD_1_0_7_28.pm
2004-Nov-15 11:03:42 81 bytes prism/private/wslib/WS/Class_Device_RD_1_0_7_28.tex
2004-Nov-15 11:03:42 263 bytes prism/private/wslib/WS/Class_Device_RD_1_0_7_28.ws
2004-Nov-15 11:03:44 891 bytes prism/private/wslib/WS/Class_Device_RD_1_0_7_28/Class_Device_RD_1_0_7_28.css
2004-Nov-15 11:03:44 1666 bytes prism/private/wslib/WS/Class_Device_RD_1_0_7_28/Class_Device_RD_1_0_7_28.html
2004-Dec-13 10:28:38 68 bytes prism/private/wslib/WS/Class_Device_RD_1_0_7_28/EqnImages
2004-Nov-15 11:03:44 1666 bytes prism/private/wslib/WS/Class_Device_RD_1_0_7_28/index.html
2004-Nov-15 11:03:44 168 bytes prism/private/wslib/WS/Class_Device_RD_1_0_7_28/labels.pl
2004-Nov-15 11:03:44 2490 bytes prism/private/wslib/WS/Class_Device_RD_1_0_7_28/node1.html
2004-Dec-13 10:28:38 272 bytes prism/private/wslib/WS/Class_Device_TV_1_0_7_28
2004-Nov-15 11:03:48 23604 bytes prism/private/wslib/WS/Class_Device_TV_1_0_7_28.pm
2004-Nov-15 11:03:48 81 bytes prism/private/wslib/WS/Class_Device_TV_1_0_7_28.tex
2004-Nov-15 11:03:48 263 bytes prism/private/wslib/WS/Class_Device_TV_1_0_7_28.ws
2004-Nov-15 11:03:50 891 bytes prism/private/wslib/WS/Class_Device_TV_1_0_7_28/Class_Device_TV_1_0_7_28.css 2004-Nov-15 11:03:50 1666 bytes prism/private/wslib/WS/Class_Device_TV_1_0_7_28/Class_Device_TV_1_0_7_28.html
2004-Dec-13 10:28:38 68 bytes prism/private/wslib/WS/Class_Device_TV_1_0_7_28/EqnImages
2004-Nov-15 11:03:50 1666 bytes prism/private/wslib/WS/Class_Device_TV_1_0_7_28/index.html
2004-Nov-15 11:04:14 168 bytes prism/private/wslib/WS/Class_Device_TV_1_0_7_28/labels.pl
2004-Nov-15 11:03:50 2490 bytes prism/private/wslib/WS/Class_Device_TV_1_0_7_28/node1.html
2004-Dec-13 10:28:38 272 bytes prism/private/wslib/WS/Class_Device_Tank_1_0_7_28
2004-Nov-15 11:03:44 14641 bytes prism/private/wslib/WS/Class_Device_Tank_1_0_7_28.pm
2004-Nov-15 11:03:44 81 bytes prism/private/wslib/WS/Class_Device_Tank_1_0_7_28.tex
2004-Nov-15 11:03:44 271 bytes prism/private/wslib/WS/Class_Device_Tank_1_0_7_28.ws
2004-Nov-15 11:03:46 891 bytes prism/private/wslib/WS/Class_Device_Tank_1_0_7_28/Class_Device_Tank_1_0_7_28.css
2004-Nov-15 11:03:46 1674 bytes prism/private/wslib/WS/Class_Device_Tank_1_0_7_28/Class_Device_Tank_1_0_7_28.html
2004-Dec-13 10:28:38 68 bytes prism/private/wslib/WS/Class_Device_Tank_1_0_7_28/EqnImages
2004-Nov-15 11:03:46 1674 bytes prism/private/wslib/WS/Class_Device_Tank_1_0_7_28/index.html
2004-Nov-15 11:04:14 168 bytes prism/private/wslib/WS/Class_Device_Tank_1_0_7_28/labels.pl
2004-Nov-15 11:03:46 2512 bytes prism/private/wslib/WS/Class_Device_Tank_1_0_7_28/node1.html
2004-Dec-13 10:28:38 272 bytes prism/private/wslib/WS/Class_Device_Turbine_S_1_0_7_28
2004-Nov-15 11:03:46 10490 bytes prism/private/wslib/WS/Class_Device_Turbine_S_1_0_7_28.pm
2004-Nov-15 11:03:46 81 bytes prism/private/wslib/WS/Class_Device_Turbine_S_1_0_7_28.tex
2004-Nov-15 11:03:46 292 bytes prism/private/wslib/WS/Class_Device_Turbine_S_1_0_7_28.ws
2004-Nov-15 11:03:48 891 bytes prism/private/wslib/WS/Class_Device_Turbine_S_1_0_7_28/Class_Device_Turbine_S_1_0_7_28.css
2004-Nov-15 11:03:48 1694 bytes prism/private/wslib/WS/Class_Device_Turbine_S_1_0_7_28/Class_Device_Turbine_S_1_0_7_28.html
2004-Dec-13 10:28:38 68 bytes prism/private/wslib/WS/Class_Device_Turbine_S_1_0_7_28/EqnImages
2004-Nov-15 11:03:48 1694 bytes prism/private/wslib/WS/Class_Device_Turbine_S_1_0_7_28/index.html
2004-Nov-15 11:04:14 168 bytes prism/private/wslib/WS/Class_Device_Turbine_S_1_0_7_28/labels.pl
2004-Nov-15 11:03:48 2567 bytes prism/private/wslib/WS/Class_Device_Turbine_S_1_0_7_28/node1.html
2004-Dec-13 10:28:38 272 bytes prism/private/wslib/WS/Class_Device_Vessel_1_0_7_28
2004-Nov-15 11:03:50 9334 bytes prism/private/wslib/WS/Class_Device_Vessel_1_0_7_28.pm
2004-Nov-15 11:03:50 81 bytes prism/private/wslib/WS/Class_Device_Vessel_1_0_7_28.tex
2004-Nov-15 11:03:50 279 bytes prism/private/wslib/WS/Class_Device_Vessel_1_0_7_28.ws
2004-Nov-15 11:03:52 891 bytes prism/private/wslib/WS/Class_Device_Vessel_1_0_7_28/Class_Device_Vessel_1_0_7_28.css
2004-Nov-15 11:03:52 1682 bytes prism/private/wslib/WS/Class_Device_Vessel_1_0_7_28/Class_Device_Vessel_1_0_7_28.html
2004-Dec-13 10:28:38 68 bytes prism/private/wslib/WS/Class_Device_Vessel_1_0_7_28/EqnImages
2004-Nov-15 11:03:52 1682 bytes prism/private/wslib/WS/Class_Device_Vessel_1_0_7_28/index.html
2004-Nov-15 11:04:14 168 bytes prism/private/wslib/WS/Class_Device_Vessel_1_0_7_28/labels.pl
2004-Nov-15 11:03:52 2534 bytes prism/private/wslib/WS/Class_Device_Vessel_1_0_7_28/node1.html
2004-Dec-13 10:28:38 272 bytes prism/private/wslib/WS/Class_Fitting_BallValve_1_0_7_28
2004-Nov-15 11:03:52 12479 bytes prism/private/wslib/WS/Class_Fitting_BallValve_1_0_7_28.pm
2004-Nov-15 11:03:52 81 bytes prism/private/wslib/WS/Class_Fitting_BallValve_1_0_7_28.tex
2004-Nov-15 11:03:52 305 bytes prism/private/wslib/WS/Class_Fitting_BallValve_1_0_7_28.ws
2004-Nov-15 11:03:54 891 bytes prism/private/wslib/WS/Class_Fitting_BallValve_1_0_7_28/Class_Fitting_BallValve_1_0_7_28.css
2004-Nov-15 11:03:54 1698 bytes prism/private/wslib/WS/Class_Fitting_BallValve_1_0_7_28/Class_Fitting_BallValve_1_0_7_28.html
2004-Dec-13 10:28:38 68 bytes prism/private/wslib/WS/Class_Fitting_BallValve_1_0_7_28/EqnImages
2004-Nov-15 11:03:54 1698 bytes prism/private/wslib/WS/Class_Fitting_BallValve_1_0_7_28/index.html
2004-Nov-15 11:04:14 168 bytes prism/private/wslib/WS/Class_Fitting_BallValve_1_0_7_28/labels.pl
2004-Nov-15 11:03:54 2578 bytes prism/private/wslib/WS/Class_Fitting_BallValve_1_0_7_28/node1.html
2004-Dec-13 10:28:38 272 bytes prism/private/wslib/WS/Class_Fitting_Elbow45T_1_0_7_28
2004-Nov-15 11:03:56 12470 bytes prism/private/wslib/WS/Class_Fitting_Elbow45T_1_0_7_28.pm
2004-Nov-15 11:03:56 81 bytes prism/private/wslib/WS/Class_Fitting_Elbow45T_1_0_7_28.tex
2004-Nov-15 11:03:56 310 bytes prism/private/wslib/WS/Class_Fitting_Elbow45T_1_0_7_28.ws
2004-Nov-15 11:03:58 891 bytes prism/private/wslib/WS/Class_Fitting_Elbow45T_1_0_7_28/Class_Fitting_Elbow45T_1_0_7_28.css
2004-Nov-15 11:03:58 1694 bytes prism/private/wslib/WS/Class_Fitting_Elbow45T_1_0_7_28/Class_Fitting_Elbow45T_1_0_7_28.html
2004-Dec-13 10:28:38 68 bytes prism/private/wslib/WS/Class_Fitting_Elbow45T_1_0_7_28/EqnImages
2004-Nov-15 11:03:58 1694 bytes prism/private/wslib/WS/Class_Fitting_Elbow45T_1_0_7_28/index.html
2004-Nov-15 11:04:14 168 bytes prism/private/wslib/WS/Class_Fitting_Elbow45T_1_0_7_28/labels.pl
2004-Nov-15 11:03:58 2567 bytes prism/private/wslib/WS/Class_Fitting_Elbow45T_1_0_7_28/node1.html
2004-Dec-13 10:28:38 272 bytes prism/private/wslib/WS/Class_Fitting_Elbow45_1_0_7_28
2004-Nov-15 11:03:54 12461 bytes prism/private/wslib/WS/Class_Fitting_Elbow45_1_0_7_28.pm
2004-Nov-15 11:03:54 81 bytes prism/private/wslib/WS/Class_Fitting_Elbow45_1_0_7_28.tex
2004-Nov-15 11:03:54 297 bytes prism/private/wslib/WS/Class_Fitting_Elbow45_1_0_7_28.ws
2004-Nov-15 11:03:56 891 bytes prism/private/wslib/WS/Class_Fitting_Elbow45_1_0_7_28/Class_Fitting_Elbow45_1_0_7_28.css
2004-Nov-15 11:03:56 1690 bytes prism/private/wslib/WS/Class_Fitting_Elbow45_1_0_7_28/Class_Fitting_Elbow45_1_0_7_28.html 2004-Dec-13 10:28:38 68 bytes prism/private/wslib/WS/Class_Fitting_Elbow45_1_0_7_28/EqnImages
2004-Nov-15 11:03:56 1690 bytes prism/private/wslib/WS/Class_Fitting_Elbow45_1_0_7_28/index.html
2004-Nov-15 11:04:14 168 bytes prism/private/wslib/WS/Class_Fitting_Elbow45_1_0_7_28/labels.pl
2004-Nov-15 11:03:56 2556 bytes prism/private/wslib/WS/Class_Fitting_Elbow45_1_0_7_28/node1.html
2004-Dec-13 10:28:38 272 bytes prism/private/wslib/WS/Class_Fitting_Elbow90L_1_0_7_28
2004-Nov-15 11:04:00 12470 bytes prism/private/wslib/WS/Class_Fitting_Elbow90L_1_0_7_28.pm
2004-Nov-15 11:04:00 81 bytes prism/private/wslib/WS/Class_Fitting_Elbow90L_1_0_7_28.tex
2004-Nov-15 11:04:00 308 bytes prism/private/wslib/WS/Class_Fitting_Elbow90L_1_0_7_28.ws
2004-Nov-15 11:04:02 891 bytes prism/private/wslib/WS/Class_Fitting_Elbow90L_1_0_7_28/Class_Fitting_Elbow90L_1_0_7_28.css
2004-Nov-15 11:04:02 1694 bytes prism/private/wslib/WS/Class_Fitting_Elbow90L_1_0_7_28/Class_Fitting_Elbow90L_1_0_7_28.html
2004-Dec-13 10:28:38 68 bytes prism/private/wslib/WS/Class_Fitting_Elbow90L_1_0_7_28/EqnImages
2004-Nov-15 11:04:02 1694 bytes prism/private/wslib/WS/Class_Fitting_Elbow90L_1_0_7_28/index.html
2004-Nov-15 11:04:14 168 bytes prism/private/wslib/WS/Class_Fitting_Elbow90L_1_0_7_28/labels.pl
2004-Nov-15 11:04:02 2567 bytes prism/private/wslib/WS/Class_Fitting_Elbow90L_1_0_7_28/node1.html
2004-Dec-13 10:28:38 272 bytes prism/private/wslib/WS/Class_Fitting_Elbow90T_1_0_7_28
2004-Nov-15 11:04:02 12470 bytes prism/private/wslib/WS/Class_Fitting_Elbow90T_1_0_7_28.pm
2004-Nov-15 11:04:02 81 bytes prism/private/wslib/WS/Class_Fitting_Elbow90T_1_0_7_28.tex
2004-Nov-15 11:04:02 310 bytes prism/private/wslib/WS/Class_Fitting_Elbow90T_1_0_7_28.ws
2004-Nov-15 11:04:04 891 bytes prism/private/wslib/WS/Class_Fitting_Elbow90T_1_0_7_28/Class_Fitting_Elbow90T_1_0_7_28.css
2004-Nov-15 11:04:04 1694 bytes prism/private/wslib/WS/Class_Fitting_Elbow90T_1_0_7_28/Class_Fitting_Elbow90T_1_0_7_28.html
2004-Dec-13 10:28:38 68 bytes prism/private/wslib/WS/Class_Fitting_Elbow90T_1_0_7_28/EqnImages
2004-Nov-15 11:04:04 1694 bytes prism/private/wslib/WS/Class_Fitting_Elbow90T_1_0_7_28/index.html
2004-Nov-15 11:04:14 168 bytes prism/private/wslib/WS/Class_Fitting_Elbow90T_1_0_7_28/labels.pl
2004-Nov-15 11:04:04 2567 bytes prism/private/wslib/WS/Class_Fitting_Elbow90T_1_0_7_28/node1.html
2004-Dec-13 10:28:38 272 bytes prism/private/wslib/WS/Class_Fitting_Elbow90_1_0_7_28
2004-Nov-15 11:03:58 12461 bytes prism/private/wslib/WS/Class_Fitting_Elbow90_1_0_7_28.pm
2004-Nov-15 11:03:58 81 bytes prism/private/wslib/WS/Class_Fitting_Elbow90_1_0_7_28.tex
2004-Nov-15 11:03:58 306 bytes prism/private/wslib/WS/Class_Fitting_Elbow90_1_0_7_28.ws
2004-Nov-15 11:04:00 891 bytes prism/private/wslib/WS/Class_Fitting_Elbow90_1_0_7_28/Class_Fitting_Elbow90_1_0_7_28.css
2004-Nov-15 11:04:00 1690 bytes prism/private/wslib/WS/Class_Fitting_Elbow90_1_0_7_28/Class_Fitting_Elbow90_1_0_7_28.html
2004-Dec-13 10:28:38 68 bytes prism/private/wslib/WS/Class_Fitting_Elbow90_1_0_7_28/EqnImages
2004-Nov-15 11:04:00 1690 bytes prism/private/wslib/WS/Class_Fitting_Elbow90_1_0_7_28/index.html
2004-Nov-15 11:04:14 168 bytes prism/private/wslib/WS/Class_Fitting_Elbow90_1_0_7_28/labels.pl
2004-Nov-15 11:04:00 2556 bytes prism/private/wslib/WS/Class_Fitting_Elbow90_1_0_7_28/node1.html
2004-Dec-13 10:28:38 272 bytes prism/private/wslib/WS/Class_Fitting_Enter_1_0_7_28
2004-Nov-15 11:04:04 12443 bytes prism/private/wslib/WS/Class_Fitting_Enter_1_0_7_28.pm
2004-Nov-15 11:04:04 81 bytes prism/private/wslib/WS/Class_Fitting_Enter_1_0_7_28.tex
2004-Nov-15 11:04:04 287 bytes prism/private/wslib/WS/Class_Fitting_Enter_1_0_7_28.ws
2004-Nov-15 11:04:04 891 bytes prism/private/wslib/WS/Class_Fitting_Enter_1_0_7_28/Class_Fitting_Enter_1_0_7_28.css
2004-Nov-15 11:04:04 1682 bytes prism/private/wslib/WS/Class_Fitting_Enter_1_0_7_28/Class_Fitting_Enter_1_0_7_28.html
2004-Dec-13 10:28:38 68 bytes prism/private/wslib/WS/Class_Fitting_Enter_1_0_7_28/EqnImages
2004-Nov-15 11:04:04 1682 bytes prism/private/wslib/WS/Class_Fitting_Enter_1_0_7_28/index.html
2004-Nov-15 11:04:14 168 bytes prism/private/wslib/WS/Class_Fitting_Enter_1_0_7_28/labels.pl
2004-Nov-15 11:04:04 2534 bytes prism/private/wslib/WS/Class_Fitting_Enter_1_0_7_28/node1.html
2004-Dec-13 10:28:38 272 bytes prism/private/wslib/WS/Class_Fitting_Exit_1_0_7_28
2004-Nov-15 11:04:06 12434 bytes prism/private/wslib/WS/Class_Fitting_Exit_1_0_7_28.pm
2004-Nov-15 11:04:06 81 bytes prism/private/wslib/WS/Class_Fitting_Exit_1_0_7_28.tex
2004-Nov-15 11:04:06 279 bytes prism/private/wslib/WS/Class_Fitting_Exit_1_0_7_28.ws
2004-Nov-15 11:04:06 891 bytes prism/private/wslib/WS/Class_Fitting_Exit_1_0_7_28/Class_Fitting_Exit_1_0_7_28.css
2004-Nov-15 11:04:06 1678 bytes prism/private/wslib/WS/Class_Fitting_Exit_1_0_7_28/Class_Fitting_Exit_1_0_7_28.html
2004-Dec-13 10:28:38 68 bytes prism/private/wslib/WS/Class_Fitting_Exit_1_0_7_28/EqnImages
2004-Nov-15 11:04:06 1678 bytes prism/private/wslib/WS/Class_Fitting_Exit_1_0_7_28/index.html
2004-Nov-15 11:04:14 168 bytes prism/private/wslib/WS/Class_Fitting_Exit_1_0_7_28/labels.pl
2004-Nov-15 11:04:06 2523 bytes prism/private/wslib/WS/Class_Fitting_Exit_1_0_7_28/node1.html
2004-Dec-13 10:28:38 272 bytes prism/private/wslib/WS/Class_Fitting_ExpandTeeSide_1_0_7_28
2004-Nov-15 11:04:10 12568 bytes prism/private/wslib/WS/Class_Fitting_ExpandTeeSide_1_0_7_28.pm
2004-Nov-15 11:04:10 81 bytes prism/private/wslib/WS/Class_Fitting_ExpandTeeSide_1_0_7_28.tex
2004-Nov-15 11:04:10 347 bytes prism/private/wslib/WS/Class_Fitting_ExpandTeeSide_1_0_7_28.ws
2004-Nov-15 11:04:10 891 bytes
prism/private/wslib/WS/Class_Fitting_ExpandTeeSide_1_0_7_28/Class_Fitting_ExpandTeeSide_1_0_7_28.css 2004-Nov-15 11:04:10 1714 bytes
prism/private/wslib/WS/Class_Fitting_ExpandTeeSide_1_0_7_28/Class_Fitting_ExpandTeeSide_1_0_7_28.html
2004-Dec-13 10:28:38 68 bytes prism/private/wslib/WS/Class_Fitting_ExpandTeeSide_1_0_7_28/EqnImages
2004-Nov-15 11:04:10 1714 bytes prism/private/wslib/WS/Class_Fitting_ExpandTeeSide_1_0_7_28/index.html
2004-Nov-15 11:04:14 168 bytes prism/private/wslib/WS/Class_Fitting_ExpandTeeSide_1_0_7_28/labels.pl
2004-Nov-15 11:04:10 2622 bytes prism/private/wslib/WS/Class_Fitting_ExpandTeeSide_1_0_7_28/node1.html
2004-Dec-13 10:28:38 272 bytes prism/private/wslib/WS/Class_Fitting_ExpandTeeThrough_1_0_7_28
2004-Nov-15 11:04:12 15982 bytes prism/private/wslib/WS/Class_Fitting_ExpandTeeThrough_1_0_7_28.pm
2004-Nov-15 11:04:12 81 bytes prism/private/wslib/WS/Class_Fitting_ExpandTeeThrough_1_0_7_28.tex
2004-Nov-15 11:04:12 351 bytes prism/private/wslib/WS/Class_Fitting_ExpandTeeThrough_1_0_7_28.ws
2004-Nov-15 11:04:12 891 bytes
prism/private/wslib/WS/Class_Fitting_ExpandTeeThrough_1_0_7_28/Class_Fitting_ExpandTeeThrough_1_0_7_28.css
2004-Nov-15 11:04:12 1726 bytes
prism/private/wslib/WS/Class_Fitting_ExpandTeeThrough_1_0_7_28/Class_Fitting_ExpandTeeThrough_1_0_7_28.html
2004-Dec-13 10:28:38 68 bytes prism/private/wslib/WS/Class_Fitting_ExpandTeeThrough_1_0_7_28/EqnImages
2004-Nov-15 11:04:12 1726 bytes prism/private/wslib/WS/Class_Fitting_ExpandTeeThrough_1_0_7_28/index.html
2004-Nov-15 11:04:14 168 bytes prism/private/wslib/WS/Class_Fitting_ExpandTeeThrough_1_0_7_28/labels.pl
2004-Nov-15 11:04:12 2655 bytes prism/private/wslib/WS/Class_Fitting_ExpandTeeThrough_1_0_7_28/node1.html
2004-Dec-13 10:28:38 272 bytes prism/private/wslib/WS/Class_Fitting_Expand_1_0_7_28
2004-Nov-15 11:04:08 15892 bytes prism/private/wslib/WS/Class_Fitting_Expand_1_0_7_28.pm
2004-Nov-15 11:04:08 81 bytes prism/private/wslib/WS/Class_Fitting_Expand_1_0_7_28.tex
2004-Nov-15 11:04:08 291 bytes prism/private/wslib/WS/Class_Fitting_Expand_1_0_7_28.ws
2004-Nov-15 11:04:08 891 bytes prism/private/wslib/WS/Class_Fitting_Expand_1_0_7_28/Class_Fitting_Expand_1_0_7_28.css
2004-Nov-15 11:04:08 1686 bytes prism/private/wslib/WS/Class_Fitting_Expand_1_0_7_28/Class_Fitting_Expand_1_0_7_28.html
2004-Dec-13 10:28:38 68 bytes prism/private/wslib/WS/Class_Fitting_Expand_1_0_7_28/EqnImages
2004-Nov-15 11:04:08 1686 bytes prism/private/wslib/WS/Class_Fitting_Expand_1_0_7_28/index.html
2004-Nov-15 11:04:14 168 bytes prism/private/wslib/WS/Class_Fitting_Expand_1_0_7_28/labels.pl
2004-Nov-15 11:04:08 2545 bytes prism/private/wslib/WS/Class_Fitting_Expand_1_0_7_28/node1.html
2004-Dec-13 10:28:38 272 bytes prism/private/wslib/WS/Class_Fitting_GateValveFP_1_0_7_28
2004-Nov-15 11:04:14 12497 bytes prism/private/wslib/WS/Class_Fitting_GateValveFP_1_0_7_28.pm
2004-Nov-15 11:04:14 81 bytes prism/private/wslib/WS/Class_Fitting_GateValveFP_1_0_7_28.tex
2004-Nov-15 11:04:14 325 bytes prism/private/wslib/WS/Class_Fitting_GateValveFP_1_0_7_28.ws
2004-Nov-15 11:04:14 891 bytes prism/private/wslib/WS/Class_Fitting_GateValveFP_1_0_7_28/Class_Fitting_GateValveFP_1_0_7_28.css
2004-Nov-15 11:04:14 1706 bytes
prism/private/wslib/WS/Class_Fitting_GateValveFP_1_0_7_28/Class_Fitting_GateValveFP_1_0_7_28.html
2004-Dec-13 10:28:38 68 bytes prism/private/wslib/WS/Class_Fitting_GateValveFP_1_0_7_28/EqnImages
2004-Nov-15 11:04:14 1706 bytes prism/private/wslib/WS/Class_Fitting_GateValveFP_1_0_7_28/index.html
2004-Nov-15 11:04:14 168 bytes prism/private/wslib/WS/Class_Fitting_GateValveFP_1_0_7_28/labels.pl
2004-Nov-15 11:04:14 2600 bytes prism/private/wslib/WS/Class_Fitting_GateValveFP_1_0_7_28/node1.html
2004-Dec-13 10:28:38 272 bytes prism/private/wslib/WS/Class_Fitting_LiftCheck_1_0_7_28
2004-Nov-15 11:04:14 12479 bytes prism/private/wslib/WS/Class_Fitting_LiftCheck_1_0_7_28.pm
2004-Nov-15 11:04:14 81 bytes prism/private/wslib/WS/Class_Fitting_LiftCheck_1_0_7_28.tex
2004-Nov-15 11:04:14 305 bytes prism/private/wslib/WS/Class_Fitting_LiftCheck_1_0_7_28.ws
2004-Nov-15 11:04:16 891 bytes prism/private/wslib/WS/Class_Fitting_LiftCheck_1_0_7_28/Class_Fitting_LiftCheck_1_0_7_28.css
2004-Nov-15 11:04:16 1698 bytes prism/private/wslib/WS/Class_Fitting_LiftCheck_1_0_7_28/Class_Fitting_LiftCheck_1_0_7_28.html
2004-Dec-13 10:28:38 68 bytes prism/private/wslib/WS/Class_Fitting_LiftCheck_1_0_7_28/EqnImages
2004-Nov-15 11:04:16 1698 bytes prism/private/wslib/WS/Class_Fitting_LiftCheck_1_0_7_28/index.html
2004-Nov-15 11:04:44 168 bytes prism/private/wslib/WS/Class_Fitting_LiftCheck_1_0_7_28/labels.pl
2004-Nov-15 11:04:16 2578 bytes prism/private/wslib/WS/Class_Fitting_LiftCheck_1_0_7_28/node1.html
2004-Dec-13 10:28:38 272 bytes prism/private/wslib/WS/Class_Fitting_Pipe_1_0_7_28
2004-Nov-15 11:04:16 12759 bytes prism/private/wslib/WS/Class_Fitting_Pipe_1_0_7_28.pm
2004-Nov-15 11:04:16 81 bytes prism/private/wslib/WS/Class_Fitting_Pipe_1_0_7_28.tex
2004-Nov-15 11:04:16 279 bytes prism/private/wslib/WS/Class_Fitting_Pipe_1_0_7_28.ws
2004-Nov-15 11:04:18 891 bytes prism/private/wslib/WS/Class_Fitting_Pipe_1_0_7_28/Class_Fitting_Pipe_1_0_7_28.css
2004-Nov-15 11:04:18 1678 bytes prism/private/wslib/WS/Class_Fitting_Pipe_1_0_7_28/Class_Fitting_Pipe_1_0_7_28.html
2004-Dec-13 10:28:38 68 bytes prism/private/wslib/WS/Class_Fitting_Pipe_1_0_7_28/EqnImages
2004-Nov-15 11:04:18 1678 bytes prism/private/wslib/WS/Class_Fitting_Pipe_1_0_7_28/index.html
2004-Nov-15 11:04:44 168 bytes prism/private/wslib/WS/Class_Fitting_Pipe_1_0_7_28/labels.pl
2004-Nov-15 11:04:18 2523 bytes prism/private/wslib/WS/Class_Fitting_Pipe_1_0_7_28/node1.html
2004-Dec-13 10:28:38 272 bytes prism/private/wslib/WS/Class_Fitting_ReduceTeeSide_1_0_7_28
2004-Nov-15 11:04:20 12590 bytes prism/private/wslib/WS/Class_Fitting_ReduceTeeSide_1_0_7_28.pm 2004-Nov-15 11:04:20 81 bytes prism/private/wslib/WS/Class_Fitting_ReduceTeeSide_1_0_7_28.tex
2004-Nov-15 11:04:20 346 bytes prism/private/wslib/WS/Class_Fitting_ReduceTeeSide_1_0_7_28.ws
2004-Nov-15 11:04:22 891 bytes
prism/private/wslib/WS/Class_Fitting_ReduceTeeSide_1_0_7_28/Class_Fitting_ReduceTeeSide_1_0_7_28.css
2004-Nov-15 11:04:22 1714 bytes
prism/private/wslib/WS/Class_Fitting_ReduceTeeSide_1_0_7_28/Class_Fitting_ReduceTeeSide_1_0_7_28.html
2004-Dec-13 10:28:38 68 bytes prism/private/wslib/WS/Class_Fitting_ReduceTeeSide_1_0_7_28/EqnImages
2004-Nov-15 11:04:22 1714 bytes prism/private/wslib/WS/Class_Fitting_ReduceTeeSide_1_0_7_28/index.html
2004-Nov-15 11:04:44 168 bytes prism/private/wslib/WS/Class_Fitting_ReduceTeeSide_1_0_7_28/labels.pl
2004-Nov-15 11:04:22 2622 bytes prism/private/wslib/WS/Class_Fitting_ReduceTeeSide_1_0_7_28/node1.html
2004-Dec-13 10:28:38 272 bytes prism/private/wslib/WS/Class_Fitting_ReduceTeeThrough_1_0_7_28
2004-Nov-15 11:04:22 16213 bytes prism/private/wslib/WS/Class_Fitting_ReduceTeeThrough_1_0_7_28.pm
2004-Nov-15 11:04:22 81 bytes prism/private/wslib/WS/Class_Fitting_ReduceTeeThrough_1_0_7_28.tex
2004-Nov-15 11:04:22 350 bytes prism/private/wslib/WS/Class_Fitting_ReduceTeeThrough_1_0_7_28.ws
2004-Nov-15 11:04:24 891 bytes
prism/private/wslib/WS/Class_Fitting_ReduceTeeThrough_1_0_7_28/Class_Fitting_ReduceTeeThrough_1_0_7_28.css
2004-Nov-15 11:04:24 1726 bytes
prism/private/wslib/WS/Class_Fitting_ReduceTeeThrough_1_0_7_28/Class_Fitting_ReduceTeeThrough_1_0_7_28.html
2004-Dec-13 10:28:38 68 bytes prism/private/wslib/WS/Class_Fitting_ReduceTeeThrough_1_0_7_28/EqnImages
2004-Nov-15 11:04:24 1726 bytes prism/private/wslib/WS/Class_Fitting_ReduceTeeThrough_1_0_7_28/index.html
2004-Nov-15 11:04:44 168 bytes prism/private/wslib/WS/Class_Fitting_ReduceTeeThrough_1_0_7_28/labels.pl
2004-Nov-15 11:04:24 2655 bytes prism/private/wslib/WS/Class_Fitting_ReduceTeeThrough_1_0_7_28/node1.html
2004-Dec-13 10:28:38 272 bytes prism/private/wslib/WS/Class_Fitting_Reduce_1_0_7_28
2004-Nov-15 11:04:18 16123 bytes prism/private/wslib/WS/Class_Fitting_Reduce_1_0_7_28.pm
2004-Nov-15 11:04:18 81 bytes prism/private/wslib/WS/Class_Fitting_Reduce_1_0_7_28.tex
2004-Nov-15 11:04:18 290 bytes prism/private/wslib/WS/Class_Fitting_Reduce_1_0_7_28.ws
2004-Nov-15 11:04:20 891 bytes prism/private/wslib/WS/Class_Fitting_Reduce_1_0_7_28/Class_Fitting_Reduce_1_0_7_28.css
2004-Nov-15 11:04:20 1686 bytes prism/private/wslib/WS/Class_Fitting_Reduce_1_0_7_28/Class_Fitting_Reduce_1_0_7_28.html
2004-Dec-13 10:28:38 68 bytes prism/private/wslib/WS/Class_Fitting_Reduce_1_0_7_28/EqnImages
2004-Nov-15 11:04:20 1686 bytes prism/private/wslib/WS/Class_Fitting_Reduce_1_0_7_28/index.html
2004-Nov-15 11:04:44 168 bytes prism/private/wslib/WS/Class_Fitting_Reduce_1_0_7_28/labels.pl
2004-Nov-15 11:04:20 2545 bytes prism/private/wslib/WS/Class_Fitting_Reduce_1_0_7_28/node1.html
2004-Dec-13 10:28:38 272 bytes prism/private/wslib/WS/Class_Fitting_RuptureDisk_1_0_7_28
2004-Nov-15 11:04:24 12874 bytes prism/private/wslib/WS/Class_Fitting_RuptureDisk_1_0_7_28.pm
2004-Nov-15 11:04:24 81 bytes prism/private/wslib/WS/Class_Fitting_RuptureDisk_1_0_7_28.tex
2004-Nov-15 11:04:24 324 bytes prism/private/wslib/WS/Class_Fitting_RuptureDisk_1_0_7_28.ws
2004-Nov-15 11:04:26 891 bytes prism/private/wslib/WS/Class_Fitting_RuptureDisk_1_0_7_28/Class_Fitting_RuptureDisk_1_0_7_28.css
2004-Nov-15 11:04:26 1706 bytes prism/private/wslib/WS/Class_Fitting_RuptureDisk_1_0_7_28/Class_Fitting_RuptureDisk_1_0_7_28.html
2004-Dec-13 10:28:38 68 bytes prism/private/wslib/WS/Class_Fitting_RuptureDisk_1_0_7_28/EqnImages
2004-Nov-15 11:04:26 1706 bytes prism/private/wslib/WS/Class_Fitting_RuptureDisk_1_0_7_28/index.html
2004-Nov-15 11:04:44 168 bytes prism/private/wslib/WS/Class_Fitting_RuptureDisk_1_0_7_28/labels.pl
2004-Nov-15 11:04:26 2600 bytes prism/private/wslib/WS/Class_Fitting_RuptureDisk_1_0_7_28/node1.html
2004-Dec-13 10:28:39 272 bytes prism/private/wslib/WS/Class_Fitting_SwingCheck_1_0_7_28
2004-Nov-15 11:04:26 12488 bytes prism/private/wslib/WS/Class_Fitting_SwingCheck_1_0_7_28.pm
2004-Nov-15 11:04:26 81 bytes prism/private/wslib/WS/Class_Fitting_SwingCheck_1_0_7_28.tex
2004-Nov-15 11:04:26 310 bytes prism/private/wslib/WS/Class_Fitting_SwingCheck_1_0_7_28.ws
2004-Nov-15 11:04:28 891 bytes prism/private/wslib/WS/Class_Fitting_SwingCheck_1_0_7_28/Class_Fitting_SwingCheck_1_0_7_28.css
2004-Nov-15 11:04:28 1702 bytes prism/private/wslib/WS/Class_Fitting_SwingCheck_1_0_7_28/Class_Fitting_SwingCheck_1_0_7_28.html
2004-Dec-13 10:28:39 68 bytes prism/private/wslib/WS/Class_Fitting_SwingCheck_1_0_7_28/EqnImages
2004-Nov-15 11:04:28 1702 bytes prism/private/wslib/WS/Class_Fitting_SwingCheck_1_0_7_28/index.html
2004-Nov-15 11:04:44 168 bytes prism/private/wslib/WS/Class_Fitting_SwingCheck_1_0_7_28/labels.pl
2004-Nov-15 11:04:28 2589 bytes prism/private/wslib/WS/Class_Fitting_SwingCheck_1_0_7_28/node1.html
2004-Dec-13 10:28:39 272 bytes prism/private/wslib/WS/Class_Fitting_TeeSide_1_0_7_28
2004-Nov-15 11:04:28 12461 bytes prism/private/wslib/WS/Class_Fitting_TeeSide_1_0_7_28.pm
2004-Nov-15 11:04:28 81 bytes prism/private/wslib/WS/Class_Fitting_TeeSide_1_0_7_28.tex
2004-Nov-15 11:04:28 302 bytes prism/private/wslib/WS/Class_Fitting_TeeSide_1_0_7_28.ws
2004-Nov-15 11:04:30 891 bytes prism/private/wslib/WS/Class_Fitting_TeeSide_1_0_7_28/Class_Fitting_TeeSide_1_0_7_28.css
2004-Nov-15 11:04:30 1690 bytes prism/private/wslib/WS/Class_Fitting_TeeSide_1_0_7_28/Class_Fitting_TeeSide_1_0_7_28.html
2004-Dec-13 10:28:39 68 bytes prism/private/wslib/WS/Class_Fitting_TeeSide_1_0_7_28/EqnImages
2004-Nov-15 11:04:30 1690 bytes prism/private/wslib/WS/Class_Fitting_TeeSide_1_0_7_28/index.html
2004-Nov-15 11:04:44 168 bytes prism/private/wslib/WS/Class_Fitting_TeeSide_1_0_7_28/labels.pl 2004-Nov-15 11:04:30 2556 bytes prism/private/wslib/WS/Class_Fitting_TeeSide_1_0_7_28/node1.html
2004-Dec-13 10:28:39 272 bytes prism/private/wslib/WS/Class_Fitting_TeeThrough_1_0_7_28
2004-Nov-15 11:04:30 12488 bytes prism/private/wslib/WS/Class_Fitting_TeeThrough_1_0_7_28.pm
2004-Nov-15 11:04:30 81 bytes prism/private/wslib/WS/Class_Fitting_TeeThrough_1_0_7_28.tex
2004-Nov-15 11:04:30 317 bytes prism/private/wslib/WS/Class_Fitting_TeeThrough_1_0_7_28.ws
2004-Nov-15 11:04:32 891 bytes prism/private/wslib/WS/Class_Fitting_TeeThrough_1_0_7_28/Class_Fitting_TeeThrough_1_0_7_28.css
2004-Nov-15 11:04:32 1702 bytes prism/private/wslib/WS/Class_Fitting_TeeThrough_1_0_7_28/Class_Fitting_TeeThrough_1_0_7_28.html
2004-Dec-13 10:28:39 68 bytes prism/private/wslib/WS/Class_Fitting_TeeThrough_1_0_7_28/EqnImages
2004-Nov-15 11:04:32 1702 bytes prism/private/wslib/WS/Class_Fitting_TeeThrough_1_0_7_28/index.html
2004-Nov-15 11:04:44 168 bytes prism/private/wslib/WS/Class_Fitting_TeeThrough_1_0_7_28/labels.pl
2004-Nov-15 11:04:32 2589 bytes prism/private/wslib/WS/Class_Fitting_TeeThrough_1_0_7_28/node1.html
2004-Dec-13 10:28:39 272 bytes prism/private/wslib/WS/Class_Fitting_Valve3Way_1_0_7_28
2004-Nov-15 11:04:32 12479 bytes prism/private/wslib/WS/Class_Fitting_Valve3Way_1_0_7_28.pm
2004-Nov-15 11:04:32 81 bytes prism/private/wslib/WS/Class_Fitting_Valve3Way_1_0_7_28.tex
2004-Nov-15 11:04:32 308 bytes prism/private/wslib/WS/Class_Fitting_Valve3Way_1_0_7_28.ws
2004-Nov-15 11:04:34 891 bytes prism/private/wslib/WS/Class_Fitting_Valve3Way_1_0_7_28/Class_Fitting_Valve3Way_1_0_7_28.css
2004-Nov-15 11:04:34 1698 bytes prism/private/wslib/WS/Class_Fitting_Valve3Way_1_0_7_28/Class_Fitting_Valve3Way_1_0_7_28.html
2004-Dec-13 10:28:39 68 bytes prism/private/wslib/WS/Class_Fitting_Valve3Way_1_0_7_28/EqnImages
2004-Nov-15 11:04:34 1698 bytes prism/private/wslib/WS/Class_Fitting_Valve3Way_1_0_7_28/index.html
2004-Nov-15 11:04:44 168 bytes prism/private/wslib/WS/Class_Fitting_Valve3Way_1_0_7_28/labels.pl
2004-Nov-15 11:04:34 2578 bytes prism/private/wslib/WS/Class_Fitting_Valve3Way_1_0_7_28/node1.html
2004-Dec-13 10:28:39 272 bytes prism/private/wslib/WS/Class_FlashType_PH_1_0_7_28
2004-Nov-15 11:04:34 3329 bytes prism/private/wslib/WS/Class_FlashType_PH_1_0_7_28.pm
2004-Nov-15 11:04:34 81 bytes prism/private/wslib/WS/Class_FlashType_PH_1_0_7_28.tex
2004-Nov-15 11:04:34 292 bytes prism/private/wslib/WS/Class_FlashType_PH_1_0_7_28.ws
2004-Nov-15 11:04:36 891 bytes prism/private/wslib/WS/Class_FlashType_PH_1_0_7_28/Class_FlashType_PH_1_0_7_28.css
2004-Nov-15 11:04:36 1678 bytes prism/private/wslib/WS/Class_FlashType_PH_1_0_7_28/Class_FlashType_PH_1_0_7_28.html
2004-Dec-13 10:28:39 68 bytes prism/private/wslib/WS/Class_FlashType_PH_1_0_7_28/EqnImages
2004-Nov-15 11:04:36 1678 bytes prism/private/wslib/WS/Class_FlashType_PH_1_0_7_28/index.html
2004-Nov-15 11:04:44 168 bytes prism/private/wslib/WS/Class_FlashType_PH_1_0_7_28/labels.pl
2004-Nov-15 11:04:36 2523 bytes prism/private/wslib/WS/Class_FlashType_PH_1_0_7_28/node1.html
2004-Dec-13 10:28:39 272 bytes prism/private/wslib/WS/Class_FlashType_PT_1_0_7_28
2004-Nov-15 11:04:36 3323 bytes prism/private/wslib/WS/Class_FlashType_PT_1_0_7_28.pm
2004-Nov-15 11:04:36 81 bytes prism/private/wslib/WS/Class_FlashType_PT_1_0_7_28.tex
2004-Nov-15 11:04:36 295 bytes prism/private/wslib/WS/Class_FlashType_PT_1_0_7_28.ws
2004-Nov-15 11:04:38 891 bytes prism/private/wslib/WS/Class_FlashType_PT_1_0_7_28/Class_FlashType_PT_1_0_7_28.css
2004-Nov-15 11:04:36 1678 bytes prism/private/wslib/WS/Class_FlashType_PT_1_0_7_28/Class_FlashType_PT_1_0_7_28.html
2004-Dec-13 10:28:39 68 bytes prism/private/wslib/WS/Class_FlashType_PT_1_0_7_28/EqnImages
2004-Nov-15 11:04:36 1678 bytes prism/private/wslib/WS/Class_FlashType_PT_1_0_7_28/index.html
2004-Nov-15 11:04:44 168 bytes prism/private/wslib/WS/Class_FlashType_PT_1_0_7_28/labels.pl
2004-Nov-15 11:04:38 2523 bytes prism/private/wslib/WS/Class_FlashType_PT_1_0_7_28/node1.html
2004-Dec-13 10:28:39 1122 bytes prism/private/wslib/WS/Class_Hazard_CC_V_1_0_7_28
2004-Nov-15 11:04:38 159531 bytes prism/private/wslib/WS/Class_Hazard_CC_V_1_0_7_28.pm
2004-Nov-15 11:04:38 2152 bytes prism/private/wslib/WS/Class_Hazard_CC_V_1_0_7_28.tex
2004-Nov-15 11:04:38 309 bytes prism/private/wslib/WS/Class_Hazard_CC_V_1_0_7_28.ws
2004-Nov-15 11:04:56 891 bytes prism/private/wslib/WS/Class_Hazard_CC_V_1_0_7_28/Class_Hazard_CC_V_1_0_7_28.css
2004-Nov-15 11:04:56 10716 bytes prism/private/wslib/WS/Class_Hazard_CC_V_1_0_7_28/Class_Hazard_CC_V_1_0_7_28.html
2004-Dec-13 10:28:39 816 bytes prism/private/wslib/WS/Class_Hazard_CC_V_1_0_7_28/EqnImages
2004-Nov-15 11:04:56 774 bytes prism/private/wslib/WS/Class_Hazard_CC_V_1_0_7_28/EqnImages/BP_Eqn_0.png
2004-Nov-15 11:04:56 781 bytes prism/private/wslib/WS/Class_Hazard_CC_V_1_0_7_28/EqnImages/BP_Eqn_1.png
2004-Nov-15 11:04:56 1388 bytes prism/private/wslib/WS/Class_Hazard_CC_V_1_0_7_28/EqnImages/P_Eqn_0.png
2004-Nov-15 11:04:56 1674 bytes prism/private/wslib/WS/Class_Hazard_CC_V_1_0_7_28/EqnImages/P_Eqn_1.png
2004-Nov-15 11:04:56 1055 bytes prism/private/wslib/WS/Class_Hazard_CC_V_1_0_7_28/EqnImages/P_Eqn_10.png
2004-Nov-15 11:04:56 1201 bytes prism/private/wslib/WS/Class_Hazard_CC_V_1_0_7_28/EqnImages/P_Eqn_11.png
2004-Nov-15 11:04:56 1092 bytes prism/private/wslib/WS/Class_Hazard_CC_V_1_0_7_28/EqnImages/P_Eqn_12.png
2004-Nov-15 11:04:56 802 bytes prism/private/wslib/WS/Class_Hazard_CC_V_1_0_7_28/EqnImages/P_Eqn_13.png
2004-Nov-15 11:04:56 582 bytes prism/private/wslib/WS/Class_Hazard_CC_V_1_0_7_28/EqnImages/P_Eqn_14.png
2004-Nov-15 11:04:56 1092 bytes prism/private/wslib/WS/Class_Hazard_CC_V_1_0_7_28/EqnImages/P_Eqn_15.png
2004-Nov-15 11:04:58 616 bytes prism/private/wslib/WS/Class_Hazard_CC_V_1_0_7_28/EqnImages/P_Eqn_16.png
2004-Nov-15 11:04:58 1147 bytes prism/private/wslib/WS/Class_Hazard_CC_V_1_0_7_28/EqnImages/P_Eqn_17.png
2004-Nov-15 11:04:58 799 bytes prism/private/wslib/WS/Class_Hazard_CC_V_1_0_7_28/EqnImages/P_Eqn_18.png 2004-Nov-15 11:04:58 689 bytes prism/private/wslib/WS/Class_Hazard_CC_V_1_0_7_28/EqnImages/P_Eqn_19.png
2004-Nov-15 11:04:58 1383 bytes prism/private/wslib/WS/Class_Hazard_CC_V_1_0_7_28/EqnImages/P_Eqn_2.png
2004-Nov-15 11:04:58 1399 bytes prism/private/wslib/WS/Class_Hazard_CC_V_1_0_7_28/EqnImages/P_Eqn_3.png
2004-Nov-15 11:04:58 959 bytes prism/private/wslib/WS/Class_Hazard_CC_V_1_0_7_28/EqnImages/P_Eqn_4.png
2004-Nov-15 11:04:58 821 bytes prism/private/wslib/WS/Class_Hazard_CC_V_1_0_7_28/EqnImages/P_Eqn_5.png
2004-Nov-15 11:04:58 959 bytes prism/private/wslib/WS/Class_Hazard_CC_V_1_0_7_28/EqnImages/P_Eqn_6.png
2004-Nov-15 11:04:58 986 bytes prism/private/wslib/WS/Class_Hazard_CC_V_1_0_7_28/EqnImages/P_Eqn_7.png
2004-Nov-15 11:04:58 951 bytes prism/private/wslib/WS/Class_Hazard_CC_V_1_0_7_28/EqnImages/P_Eqn_8.png
2004-Nov-15 11:04:58 717 bytes prism/private/wslib/WS/Class_Hazard_CC_V_1_0_7_28/EqnImages/P_Eqn_9.png
2004-Nov-15 11:04:40 8 bytes prism/private/wslib/WS/Class_Hazard_CC_V_1_0_7_28/images.aux
2004-Nov-15 11:04:40 12420 bytes prism/private/wslib/WS/Class_Hazard_CC_V_1_0_7_28/images.log
2004-Nov-15 11:04:56 6394 bytes prism/private/wslib/WS/Class_Hazard_CC_V_1_0_7_28/images.pl
2004-Nov-15 11:04:40 9940 bytes prism/private/wslib/WS/Class_Hazard_CC_V_1_0_7_28/images.tex
2004-Nov-15 11:04:50 963 bytes prism/private/wslib/WS/Class_Hazard_CC_V_1_0_7_28/img1.png
2004-Nov-15 11:04:44 678 bytes prism/private/wslib/WS/Class_Hazard_CC_V_1_0_7_28/img10.png
2004-Nov-15 11:04:50 1288 bytes prism/private/wslib/WS/Class_Hazard_CC_V_1_0_7_28/img11.png
2004-Nov-15 11:04:54 936 bytes prism/private/wslib/WS/Class_Hazard_CC_V_1_0_7_28/img12.png
2004-Nov-15 11:04:52 811 bytes prism/private/wslib/WS/Class_Hazard_CC_V_1_0_7_28/img13.png
2004-Nov-15 11:04:52 1539 bytes prism/private/wslib/WS/Class_Hazard_CC_V_1_0_7_28/img14.png
2004-Nov-15 11:04:46 1563 bytes prism/private/wslib/WS/Class_Hazard_CC_V_1_0_7_28/img15.png
2004-Nov-15 11:04:48 1122 bytes prism/private/wslib/WS/Class_Hazard_CC_V_1_0_7_28/img16.png
2004-Nov-15 11:04:52 887 bytes prism/private/wslib/WS/Class_Hazard_CC_V_1_0_7_28/img17.png
2004-Nov-15 11:04:54 1142 bytes prism/private/wslib/WS/Class_Hazard_CC_V_1_0_7_28/img18.png
2004-Nov-15 11:04:54 1117 bytes prism/private/wslib/WS/Class_Hazard_CC_V_1_0_7_28/img19.png
2004-Nov-15 11:04:50 872 bytes prism/private/wslib/WS/Class_Hazard_CC_V_1_0_7_28/img2.png
2004-Nov-15 11:04:48 856 bytes prism/private/wslib/WS/Class_Hazard_CC_V_1_0_7_28/img20.png
2004-Nov-15 11:04:48 1626 bytes prism/private/wslib/WS/Class_Hazard_CC_V_1_0_7_28/img3.png
2004-Nov-15 11:04:48 1838 bytes prism/private/wslib/WS/Class_Hazard_CC_V_1_0_7_28/img4.png
2004-Nov-15 11:04:54 1205 bytes prism/private/wslib/WS/Class_Hazard_CC_V_1_0_7_28/img5.png
2004-Nov-15 11:04:52 1357 bytes prism/private/wslib/WS/Class_Hazard_CC_V_1_0_7_28/img6.png
2004-Nov-15 11:04:46 1308 bytes prism/private/wslib/WS/Class_Hazard_CC_V_1_0_7_28/img7.png
2004-Nov-15 11:04:50 933 bytes prism/private/wslib/WS/Class_Hazard_CC_V_1_0_7_28/img8.png
2004-Nov-15 11:04:44 651 bytes prism/private/wslib/WS/Class_Hazard_CC_V_1_0_7_28/img9.png
2004-Nov-15 11:04:56 10716 bytes prism/private/wslib/WS/Class_Hazard_CC_V_1_0_7_28/index.html
2004-Nov-15 11:04:56 2656 bytes prism/private/wslib/WS/Class_Hazard_CC_V_1_0_7_28/internals.pl
2004-Nov-15 11:05:14 2930 bytes prism/private/wslib/WS/Class_Hazard_CC_V_1_0_7_28/labels.pl
2004-Nov-15 11:04:56 2512 bytes prism/private/wslib/WS/Class_Hazard_CC_V_1_0_7_28/node1.html
2004-Dec-13 10:28:39 1530 bytes prism/private/wslib/WS/Class_Hazard_CVF_2_1_0_7_28
2004-Nov-15 11:05:00 466769 bytes prism/private/wslib/WS/Class_Hazard_CVF_2_1_0_7_28.pm
2004-Nov-15 11:05:00 3344 bytes prism/private/wslib/WS/Class_Hazard_CVF_2_1_0_7_28.tex
2004-Nov-15 11:05:00 319 bytes prism/private/wslib/WS/Class_Hazard_CVF_2_1_0_7_28.ws
2004-Nov-15 11:05:20 891 bytes prism/private/wslib/WS/Class_Hazard_CVF_2_1_0_7_28/Class_Hazard_CVF_2_1_0_7_28.css
2004-Nov-15 11:05:20 15706 bytes prism/private/wslib/WS/Class_Hazard_CVF_2_1_0_7_28/Class_Hazard_CVF_2_1_0_7_28.html
2004-Dec-13 10:28:39 1292 bytes prism/private/wslib/WS/Class_Hazard_CVF_2_1_0_7_28/EqnImages
2004-Nov-15 11:05:20 774 bytes prism/private/wslib/WS/Class_Hazard_CVF_2_1_0_7_28/EqnImages/BP_Eqn_0.png
2004-Nov-15 11:05:20 781 bytes prism/private/wslib/WS/Class_Hazard_CVF_2_1_0_7_28/EqnImages/BP_Eqn_1.png
2004-Nov-15 11:05:22 957 bytes prism/private/wslib/WS/Class_Hazard_CVF_2_1_0_7_28/EqnImages/CalcKbpLiquid_CalcKw_Eqn_0.png
2004-Nov-15 11:05:22 975 bytes prism/private/wslib/WS/Class_Hazard_CVF_2_1_0_7_28/EqnImages/CalcKbpLiquid_CalcKw_Eqn_1.png
2004-Nov-15 11:05:22 736 bytes prism/private/wslib/WS/Class_Hazard_CVF_2_1_0_7_28/EqnImages/CalcKbpLiquid_CalcKw_Eqn_2.png
2004-Nov-15 11:05:22 420 bytes prism/private/wslib/WS/Class_Hazard_CVF_2_1_0_7_28/EqnImages/CalcKbpLiquid_Eqn_0.png
2004-Nov-15 11:05:22 420 bytes prism/private/wslib/WS/Class_Hazard_CVF_2_1_0_7_28/EqnImages/CalcKbpLiquid_Eqn_1.png
2004-Nov-15 11:05:22 390 bytes prism/private/wslib/WS/Class_Hazard_CVF_2_1_0_7_28/EqnImages/CalcKbpLiquid_Eqn_2.png
2004-Nov-15 11:05:22 1261 bytes prism/private/wslib/WS/Class_Hazard_CVF_2_1_0_7_28/EqnImages/CalcKbpVapor_CalcKb_Eqn_0.png
2004-Nov-15 11:05:22 971 bytes prism/private/wslib/WS/Class_Hazard_CVF_2_1_0_7_28/EqnImages/CalcKbpVapor_CalcKv_Eqn_0.png
2004-Nov-15 11:05:22 736 bytes prism/private/wslib/WS/Class_Hazard_CVF_2_1_0_7_28/EqnImages/CalcKbpVapor_CalcKv_Eqn_1.png
2004-Nov-15 11:05:22 793 bytes prism/private/wslib/WS/Class_Hazard_CVF_2_1_0_7_28/EqnImages/CalcKbpVapor_CalcKv_Eqn_2.png
2004-Nov-15 11:05:22 727 bytes prism/private/wslib/WS/Class_Hazard_CVF_2_1_0_7_28/EqnImages/CalcKbpVapor_CalcKv_Eqn_3.png
2004-Nov-15 11:05:22 437 bytes prism/private/wslib/WS/Class_Hazard_CVF_2_1_0_7_28/EqnImages/CalcKbpVapor_Eqn_0.png
2004-Nov-15 11:05:22 374 bytes prism/private/wslib/WS/Class_Hazard_CVF_2_1_0_7_28/EqnImages/CalcKbpVapor_Eqn_1.png
2004-Nov-15 11:05:22 953 bytes prism/private/wslib/WS/Class_Hazard_CVF_2_1_0_7_28/EqnImages/PC_Eqn_0.png
2004-Nov-15 11:05:22 1388 bytes prism/private/wslib/WS/Class_Hazard_CVF_2_1_0_7_28/EqnImages/P_Eqn_0.png 2004-Nov-15 11:05:24 1674 bytes prism/private/wslib/WS/Class_Hazard_CVF_2_1_0_7_28/EqnImages/P_Eqn_1.png
2004-Nov-15 11:05:24 1055 bytes prism/private/wslib/WS/Class_Hazard_CVF_2_1_0_7_28/EqnImages/P_Eqn_10.png
2004-Nov-15 11:05:24 1201 bytes prism/private/wslib/WS/Class_Hazard_CVF_2_1_0_7_28/EqnImages/P_Eqn_11.png
2004-Nov-15 11:05:24 1092 bytes prism/private/wslib/WS/Class_Hazard_CVF_2_1_0_7_28/EqnImages/P_Eqn_12.png
2004-Nov-15 11:05:24 802 bytes prism/private/wslib/WS/Class_Hazard_CVF_2_1_0_7_28/EqnImages/P_Eqn_13.png
2004-Nov-15 11:05:24 582 bytes prism/private/wslib/WS/Class_Hazard_CVF_2_1_0_7_28/EqnImages/P_Eqn_14.png
2004-Nov-15 11:05:24 1092 bytes prism/private/wslib/WS/Class_Hazard_CVF_2_1_0_7_28/EqnImages/P_Eqn_15.png
2004-Nov-15 11:05:24 616 bytes prism/private/wslib/WS/Class_Hazard_CVF_2_1_0_7_28/EqnImages/P_Eqn_16.png
2004-Nov-15 11:05:24 1147 bytes prism/private/wslib/WS/Class_Hazard_CVF_2_1_0_7_28/EqnImages/P_Eqn_17.png
2004-Nov-15 11:05:24 799 bytes prism/private/wslib/WS/Class_Hazard_CVF_2_1_0_7_28/EqnImages/P_Eqn_18.png
2004-Nov-15 11:05:24 689 bytes prism/private/wslib/WS/Class_Hazard_CVF_2_1_0_7_28/EqnImages/P_Eqn_19.png
2004-Nov-15 11:05:24 1383 bytes prism/private/wslib/WS/Class_Hazard_CVF_2_1_0_7_28/EqnImages/P_Eqn_2.png
2004-Nov-15 11:05:24 1399 bytes prism/private/wslib/WS/Class_Hazard_CVF_2_1_0_7_28/EqnImages/P_Eqn_3.png
2004-Nov-15 11:05:24 959 bytes prism/private/wslib/WS/Class_Hazard_CVF_2_1_0_7_28/EqnImages/P_Eqn_4.png
2004-Nov-15 11:05:26 821 bytes prism/private/wslib/WS/Class_Hazard_CVF_2_1_0_7_28/EqnImages/P_Eqn_5.png
2004-Nov-15 11:05:26 959 bytes prism/private/wslib/WS/Class_Hazard_CVF_2_1_0_7_28/EqnImages/P_Eqn_6.png
2004-Nov-15 11:05:26 986 bytes prism/private/wslib/WS/Class_Hazard_CVF_2_1_0_7_28/EqnImages/P_Eqn_7.png
2004-Nov-15 11:05:26 951 bytes prism/private/wslib/WS/Class_Hazard_CVF_2_1_0_7_28/EqnImages/P_Eqn_8.png
2004-Nov-15 11:05:26 717 bytes prism/private/wslib/WS/Class_Hazard_CVF_2_1_0_7_28/EqnImages/P_Eqn_9.png
2004-Nov-15 11:05:02 8 bytes prism/private/wslib/WS/Class_Hazard_CVF_2_1_0_7_28/images.aux
2004-Nov-15 11:05:02 13118 bytes prism/private/wslib/WS/Class_Hazard_CVF_2_1_0_7_28/images.log
2004-Nov-15 11:05:20 9798 bytes prism/private/wslib/WS/Class_Hazard_CVF_2_1_0_7_28/images.pl
2004-Nov-15 11:05:02 12135 bytes prism/private/wslib/WS/Class_Hazard_CVF_2_1_0_7_28/images.tex
2004-Nov-15 11:05:18 963 bytes prism/private/wslib/WS/Class_Hazard_CVF_2_1_0_7_28/img1.png
2004-Nov-15 11:05:06 901 bytes prism/private/wslib/WS/Class_Hazard_CVF_2_1_0_7_28/img10.png
2004-Nov-15 11:05:08 798 bytes prism/private/wslib/WS/Class_Hazard_CVF_2_1_0_7_28/img11.png
2004-Nov-15 11:05:18 474 bytes prism/private/wslib/WS/Class_Hazard_CVF_2_1_0_7_28/img12.png
2004-Nov-15 11:05:08 460 bytes prism/private/wslib/WS/Class_Hazard_CVF_2_1_0_7_28/img13.png
2004-Nov-15 11:05:12 1069 bytes prism/private/wslib/WS/Class_Hazard_CVF_2_1_0_7_28/img14.png
2004-Nov-15 11:05:04 1626 bytes prism/private/wslib/WS/Class_Hazard_CVF_2_1_0_7_28/img15.png
2004-Nov-15 11:05:12 1838 bytes prism/private/wslib/WS/Class_Hazard_CVF_2_1_0_7_28/img16.png
2004-Nov-15 11:05:14 1205 bytes prism/private/wslib/WS/Class_Hazard_CVF_2_1_0_7_28/img17.png
2004-Nov-15 11:05:10 1357 bytes prism/private/wslib/WS/Class_Hazard_CVF_2_1_0_7_28/img18.png
2004-Nov-15 11:05:06 1308 bytes prism/private/wslib/WS/Class_Hazard_CVF_2_1_0_7_28/img19.png
2004-Nov-15 11:05:16 872 bytes prism/private/wslib/WS/Class_Hazard_CVF_2_1_0_7_28/img2.png
2004-Nov-15 11:05:16 933 bytes prism/private/wslib/WS/Class_Hazard_CVF_2_1_0_7_28/img20.png
2004-Nov-15 11:05:14 651 bytes prism/private/wslib/WS/Class_Hazard_CVF_2_1_0_7_28/img21.png
2004-Nov-15 11:05:16 678 bytes prism/private/wslib/WS/Class_Hazard_CVF_2_1_0_7_28/img22.png
2004-Nov-15 11:05:08 1288 bytes prism/private/wslib/WS/Class_Hazard_CVF_2_1_0_7_28/img23.png
2004-Nov-15 11:05:04 936 bytes prism/private/wslib/WS/Class_Hazard_CVF_2_1_0_7_28/img24.png
2004-Nov-15 11:05:18 811 bytes prism/private/wslib/WS/Class_Hazard_CVF_2_1_0_7_28/img25.png
2004-Nov-15 11:05:20 1539 bytes prism/private/wslib/WS/Class_Hazard_CVF_2_1_0_7_28/img26.png
2004-Nov-15 11:05:20 1563 bytes prism/private/wslib/WS/Class_Hazard_CVF_2_1_0_7_28/img27.png
2004-Nov-15 11:05:10 1122 bytes prism/private/wslib/WS/Class_Hazard_CVF_2_1_0_7_28/img28.png
2004-Nov-15 11:05:06 887 bytes prism/private/wslib/WS/Class_Hazard_CVF_2_1_0_7_28/img29.png
2004-Nov-15 11:05:18 1117 bytes prism/private/wslib/WS/Class_Hazard_CVF_2_1_0_7_28/img3.png
2004-Nov-15 11:05:16 1142 bytes prism/private/wslib/WS/Class_Hazard_CVF_2_1_0_7_28/img30.png
2004-Nov-15 11:05:20 1117 bytes prism/private/wslib/WS/Class_Hazard_CVF_2_1_0_7_28/img31.png
2004-Nov-15 11:05:12 856 bytes prism/private/wslib/WS/Class_Hazard_CVF_2_1_0_7_28/img32.png
2004-Nov-15 11:05:10 1099 bytes prism/private/wslib/WS/Class_Hazard_CVF_2_1_0_7_28/img4.png
2004-Nov-15 11:05:14 834 bytes prism/private/wslib/WS/Class_Hazard_CVF_2_1_0_7_28/img5.png
2004-Nov-15 11:05:12 467 bytes prism/private/wslib/WS/Class_Hazard_CVF_2_1_0_7_28/img6.png
2004-Nov-15 11:05:14 467 bytes prism/private/wslib/WS/Class_Hazard_CVF_2_1_0_7_28/img7.png
2004-Nov-15 11:05:06 1593 bytes prism/private/wslib/WS/Class_Hazard_CVF_2_1_0_7_28/img8.png
2004-Nov-15 11:05:10 1053 bytes prism/private/wslib/WS/Class_Hazard_CVF_2_1_0_7_28/img9.png
2004-Nov-15 11:05:20 15706 bytes prism/private/wslib/WS/Class_Hazard_CVF_2_1_0_7_28/index.html
2004-Nov-15 11:05:20 4522 bytes prism/private/wslib/WS/Class_Hazard_CVF_2_1_0_7_28/internals.pl
2004-Nov-15 11:05:44 4922 bytes prism/private/wslib/WS/Class_Hazard_CVF_2_1_0_7_28/labels.pl
2004-Nov-15 11:05:20 2523 bytes prism/private/wslib/WS/Class_Hazard_CVF_2_1_0_7_28/node1.html
2004-Dec-13 10:28:40 1598 bytes prism/private/wslib/WS/Class_Hazard_CVF_L_1_0_7_28
2004-Nov-15 11:05:26 231627 bytes prism/private/wslib/WS/Class_Hazard_CVF_L_1_0_7_28.pm 2004-Nov-15 11:05:26 3398 bytes prism/private/wslib/WS/Class_Hazard_CVF_L_1_0_7_28.tex
2004-Nov-15 11:05:26 316 bytes prism/private/wslib/WS/Class_Hazard_CVF_L_1_0_7_28.ws
2004-Nov-15 11:05:48 891 bytes prism/private/wslib/WS/Class_Hazard_CVF_L_1_0_7_28/Class_Hazard_CVF_L_1_0_7_28.css
2004-Nov-15 11:05:48 16146 bytes prism/private/wslib/WS/Class_Hazard_CVF_L_1_0_7_28/Class_Hazard_CVF_L_1_0_7_28.html
2004-Dec-13 10:28:40 1326 bytes prism/private/wslib/WS/Class_Hazard_CVF_L_1_0_7_28/EqnImages
2004-Nov-15 11:05:50 774 bytes prism/private/wslib/WS/Class_Hazard_CVF_L_1_0_7_28/EqnImages/BP_Eqn_0.png
2004-Nov-15 11:05:50 781 bytes prism/private/wslib/WS/Class_Hazard_CVF_L_1_0_7_28/EqnImages/BP_Eqn_1.png
2004-Nov-15 11:05:50 748 bytes prism/private/wslib/WS/Class_Hazard_CVF_L_1_0_7_28/EqnImages/CVFlow_Eqn_0.png
2004-Nov-15 11:05:50 1119 bytes prism/private/wslib/WS/Class_Hazard_CVF_L_1_0_7_28/EqnImages/CVFlow_Eqn_1.png
2004-Nov-15 11:05:50 957 bytes prism/private/wslib/WS/Class_Hazard_CVF_L_1_0_7_28/EqnImages/CalcKbp_CalcKw_Eqn_0.png
2004-Nov-15 11:05:50 975 bytes prism/private/wslib/WS/Class_Hazard_CVF_L_1_0_7_28/EqnImages/CalcKbp_CalcKw_Eqn_1.png
2004-Nov-15 11:05:50 736 bytes prism/private/wslib/WS/Class_Hazard_CVF_L_1_0_7_28/EqnImages/CalcKbp_CalcKw_Eqn_2.png
2004-Nov-15 11:05:50 420 bytes prism/private/wslib/WS/Class_Hazard_CVF_L_1_0_7_28/EqnImages/CalcKbp_Eqn_0.png
2004-Nov-15 11:05:50 420 bytes prism/private/wslib/WS/Class_Hazard_CVF_L_1_0_7_28/EqnImages/CalcKbp_Eqn_1.png
2004-Nov-15 11:05:50 390 bytes prism/private/wslib/WS/Class_Hazard_CVF_L_1_0_7_28/EqnImages/CalcKbp_Eqn_2.png
2004-Nov-15 11:05:50 1748 bytes prism/private/wslib/WS/Class_Hazard_CVF_L_1_0_7_28/EqnImages/CalcLiquidVol_Eqn_0.png
2004-Nov-15 11:05:50 590 bytes prism/private/wslib/WS/Class_Hazard_CVF_L_1_0_7_28/EqnImages/Eqn_0.png
2004-Nov-15 11:05:50 875 bytes prism/private/wslib/WS/Class_Hazard_CVF_L_1_0_7_28/EqnImages/Eqn_1.png
2004-Nov-15 11:05:50 650 bytes prism/private/wslib/WS/Class_Hazard_CVF_L_1_0_7_28/EqnImages/Eqn_2.png
2004-Nov-15 11:05:52 1195 bytes prism/private/wslib/WS/Class_Hazard_CVF_L_1_0_7_28/EqnImages/LP_Eqn_0.png
2004-Nov-15 11:05:52 953 bytes prism/private/wslib/WS/Class_Hazard_CVF_L_1_0_7_28/EqnImages/PC_Eqn_0.png
2004-Nov-15 11:05:52 773 bytes prism/private/wslib/WS/Class_Hazard_CVF_L_1_0_7_28/EqnImages/PD_Eqn_0.png
2004-Nov-15 11:05:52 1388 bytes prism/private/wslib/WS/Class_Hazard_CVF_L_1_0_7_28/EqnImages/P_Eqn_0.png
2004-Nov-15 11:05:52 1674 bytes prism/private/wslib/WS/Class_Hazard_CVF_L_1_0_7_28/EqnImages/P_Eqn_1.png
2004-Nov-15 11:05:52 1055 bytes prism/private/wslib/WS/Class_Hazard_CVF_L_1_0_7_28/EqnImages/P_Eqn_10.png
2004-Nov-15 11:05:52 1201 bytes prism/private/wslib/WS/Class_Hazard_CVF_L_1_0_7_28/EqnImages/P_Eqn_11.png
2004-Nov-15 11:05:52 1092 bytes prism/private/wslib/WS/Class_Hazard_CVF_L_1_0_7_28/EqnImages/P_Eqn_12.png
2004-Nov-15 11:05:52 802 bytes prism/private/wslib/WS/Class_Hazard_CVF_L_1_0_7_28/EqnImages/P_Eqn_13.png
2004-Nov-15 11:05:52 582 bytes prism/private/wslib/WS/Class_Hazard_CVF_L_1_0_7_28/EqnImages/P_Eqn_14.png
2004-Nov-15 11:05:52 1092 bytes prism/private/wslib/WS/Class_Hazard_CVF_L_1_0_7_28/EqnImages/P_Eqn_15.png
2004-Nov-15 11:05:52 616 bytes prism/private/wslib/WS/Class_Hazard_CVF_L_1_0_7_28/EqnImages/P_Eqn_16.png
2004-Nov-15 11:05:52 1147 bytes prism/private/wslib/WS/Class_Hazard_CVF_L_1_0_7_28/EqnImages/P_Eqn_17.png
2004-Nov-15 11:05:52 799 bytes prism/private/wslib/WS/Class_Hazard_CVF_L_1_0_7_28/EqnImages/P_Eqn_18.png
2004-Nov-15 11:05:52 689 bytes prism/private/wslib/WS/Class_Hazard_CVF_L_1_0_7_28/EqnImages/P_Eqn_19.png
2004-Nov-15 11:05:54 1383 bytes prism/private/wslib/WS/Class_Hazard_CVF_L_1_0_7_28/EqnImages/P_Eqn_2.png
2004-Nov-15 11:05:54 1399 bytes prism/private/wslib/WS/Class_Hazard_CVF_L_1_0_7_28/EqnImages/P_Eqn_3.png
2004-Nov-15 11:05:54 959 bytes prism/private/wslib/WS/Class_Hazard_CVF_L_1_0_7_28/EqnImages/P_Eqn_4.png
2004-Nov-15 11:05:54 821 bytes prism/private/wslib/WS/Class_Hazard_CVF_L_1_0_7_28/EqnImages/P_Eqn_5.png
2004-Nov-15 11:05:54 959 bytes prism/private/wslib/WS/Class_Hazard_CVF_L_1_0_7_28/EqnImages/P_Eqn_6.png
2004-Nov-15 11:05:54 986 bytes prism/private/wslib/WS/Class_Hazard_CVF_L_1_0_7_28/EqnImages/P_Eqn_7.png
2004-Nov-15 11:05:54 951 bytes prism/private/wslib/WS/Class_Hazard_CVF_L_1_0_7_28/EqnImages/P_Eqn_8.png
2004-Nov-15 11:05:54 717 bytes prism/private/wslib/WS/Class_Hazard_CVF_L_1_0_7_28/EqnImages/P_Eqn_9.png
2004-Nov-15 11:05:28 8 bytes prism/private/wslib/WS/Class_Hazard_CVF_L_1_0_7_28/images.aux
2004-Nov-15 11:05:28 13250 bytes prism/private/wslib/WS/Class_Hazard_CVF_L_1_0_7_28/images.log
2004-Nov-15 11:05:48 10611 bytes prism/private/wslib/WS/Class_Hazard_CVF_L_1_0_7_28/images.pl
2004-Nov-15 11:05:28 12622 bytes prism/private/wslib/WS/Class_Hazard_CVF_L_1_0_7_28/images.tex
2004-Nov-15 11:05:34 963 bytes prism/private/wslib/WS/Class_Hazard_CVF_L_1_0_7_28/img1.png
2004-Nov-15 11:05:48 2074 bytes prism/private/wslib/WS/Class_Hazard_CVF_L_1_0_7_28/img10.png
2004-Nov-15 11:05:34 648 bytes prism/private/wslib/WS/Class_Hazard_CVF_L_1_0_7_28/img11.png
2004-Nov-15 11:05:36 984 bytes prism/private/wslib/WS/Class_Hazard_CVF_L_1_0_7_28/img12.png
2004-Nov-15 11:05:42 701 bytes prism/private/wslib/WS/Class_Hazard_CVF_L_1_0_7_28/img13.png
2004-Nov-15 11:05:48 1292 bytes prism/private/wslib/WS/Class_Hazard_CVF_L_1_0_7_28/img14.png
2004-Nov-15 11:05:38 1069 bytes prism/private/wslib/WS/Class_Hazard_CVF_L_1_0_7_28/img15.png
2004-Nov-15 11:05:44 874 bytes prism/private/wslib/WS/Class_Hazard_CVF_L_1_0_7_28/img16.png
2004-Nov-15 11:05:38 1626 bytes prism/private/wslib/WS/Class_Hazard_CVF_L_1_0_7_28/img17.png
2004-Nov-15 11:05:46 1838 bytes prism/private/wslib/WS/Class_Hazard_CVF_L_1_0_7_28/img18.png
2004-Nov-15 11:05:34 1205 bytes prism/private/wslib/WS/Class_Hazard_CVF_L_1_0_7_28/img19.png
2004-Nov-15 11:05:44 872 bytes prism/private/wslib/WS/Class_Hazard_CVF_L_1_0_7_28/img2.png
2004-Nov-15 11:05:42 1357 bytes prism/private/wslib/WS/Class_Hazard_CVF_L_1_0_7_28/img20.png
2004-Nov-15 11:05:40 1308 bytes prism/private/wslib/WS/Class_Hazard_CVF_L_1_0_7_28/img21.png
2004-Nov-15 11:05:36 933 bytes prism/private/wslib/WS/Class_Hazard_CVF_L_1_0_7_28/img22.png 2004-Nov-15 11:05:48 651 bytes prism/private/wslib/WS/Class_Hazard_CVF_L_1_0_7_28/img23.png
2004-Nov-15 11:05:32 678 bytes prism/private/wslib/WS/Class_Hazard_CVF_L_1_0_7_28/img24.png
2004-Nov-15 11:05:46 1288 bytes prism/private/wslib/WS/Class_Hazard_CVF_L_1_0_7_28/img25.png
2004-Nov-15 11:05:44 936 bytes prism/private/wslib/WS/Class_Hazard_CVF_L_1_0_7_28/img26.png
2004-Nov-15 11:05:32 811 bytes prism/private/wslib/WS/Class_Hazard_CVF_L_1_0_7_28/img27.png
2004-Nov-15 11:05:36 1539 bytes prism/private/wslib/WS/Class_Hazard_CVF_L_1_0_7_28/img28.png
2004-Nov-15 11:05:40 1563 bytes prism/private/wslib/WS/Class_Hazard_CVF_L_1_0_7_28/img29.png
2004-Nov-15 11:05:38 871 bytes prism/private/wslib/WS/Class_Hazard_CVF_L_1_0_7_28/img3.png
2004-Nov-15 11:05:34 1122 bytes prism/private/wslib/WS/Class_Hazard_CVF_L_1_0_7_28/img30.png
2004-Nov-15 11:05:30 887 bytes prism/private/wslib/WS/Class_Hazard_CVF_L_1_0_7_28/img31.png
2004-Nov-15 11:05:42 1142 bytes prism/private/wslib/WS/Class_Hazard_CVF_L_1_0_7_28/img32.png
2004-Nov-15 11:05:40 1117 bytes prism/private/wslib/WS/Class_Hazard_CVF_L_1_0_7_28/img33.png
2004-Nov-15 11:05:44 856 bytes prism/private/wslib/WS/Class_Hazard_CVF_L_1_0_7_28/img34.png
2004-Nov-15 11:05:38 1261 bytes prism/private/wslib/WS/Class_Hazard_CVF_L_1_0_7_28/img4.png
2004-Nov-15 11:05:40 1117 bytes prism/private/wslib/WS/Class_Hazard_CVF_L_1_0_7_28/img5.png
2004-Nov-15 11:05:36 1099 bytes prism/private/wslib/WS/Class_Hazard_CVF_L_1_0_7_28/img6.png
2004-Nov-15 11:05:32 834 bytes prism/private/wslib/WS/Class_Hazard_CVF_L_1_0_7_28/img7.png
2004-Nov-15 11:05:46 467 bytes prism/private/wslib/WS/Class_Hazard_CVF_L_1_0_7_28/img8.png
2004-Nov-15 11:05:48 467 bytes prism/private/wslib/WS/Class_Hazard_CVF_L_1_0_7_28/img9.png
2004-Nov-15 11:05:48 16146 bytes prism/private/wslib/WS/Class_Hazard_CVF_L_1_0_7_28/index.html
2004-Nov-15 11:05:48 4509 bytes prism/private/wslib/WS/Class_Hazard_CVF_L_1_0_7_28/internals.pl
2004-Nov-15 11:06:14 4918 bytes prism/private/wslib/WS/Class_Hazard_CVF_L_1_0_7_28/labels.pl
2004-Nov-15 11:05:48 2523 bytes prism/private/wslib/WS/Class_Hazard_CVF_L_1_0_7_28/node1.html
2004-Dec-13 10:28:40 1122 bytes prism/private/wslib/WS/Class_Hazard_CVF_S_1_0_7_28
2004-Nov-15 11:05:54 159607 bytes prism/private/wslib/WS/Class_Hazard_CVF_S_1_0_7_28.pm
2004-Nov-15 11:05:54 2152 bytes prism/private/wslib/WS/Class_Hazard_CVF_S_1_0_7_28.tex
2004-Nov-15 11:05:54 315 bytes prism/private/wslib/WS/Class_Hazard_CVF_S_1_0_7_28.ws
2004-Nov-15 11:06:08 891 bytes prism/private/wslib/WS/Class_Hazard_CVF_S_1_0_7_28/Class_Hazard_CVF_S_1_0_7_28.css
2004-Nov-15 11:06:08 10720 bytes prism/private/wslib/WS/Class_Hazard_CVF_S_1_0_7_28/Class_Hazard_CVF_S_1_0_7_28.html
2004-Dec-13 10:28:40 816 bytes prism/private/wslib/WS/Class_Hazard_CVF_S_1_0_7_28/EqnImages
2004-Nov-15 11:06:08 774 bytes prism/private/wslib/WS/Class_Hazard_CVF_S_1_0_7_28/EqnImages/BP_Eqn_0.png
2004-Nov-15 11:06:08 781 bytes prism/private/wslib/WS/Class_Hazard_CVF_S_1_0_7_28/EqnImages/BP_Eqn_1.png
2004-Nov-15 11:06:08 1388 bytes prism/private/wslib/WS/Class_Hazard_CVF_S_1_0_7_28/EqnImages/P_Eqn_0.png
2004-Nov-15 11:06:08 1674 bytes prism/private/wslib/WS/Class_Hazard_CVF_S_1_0_7_28/EqnImages/P_Eqn_1.png
2004-Nov-15 11:06:10 1055 bytes prism/private/wslib/WS/Class_Hazard_CVF_S_1_0_7_28/EqnImages/P_Eqn_10.png
2004-Nov-15 11:06:10 1201 bytes prism/private/wslib/WS/Class_Hazard_CVF_S_1_0_7_28/EqnImages/P_Eqn_11.png
2004-Nov-15 11:06:10 1092 bytes prism/private/wslib/WS/Class_Hazard_CVF_S_1_0_7_28/EqnImages/P_Eqn_12.png
2004-Nov-15 11:06:10 802 bytes prism/private/wslib/WS/Class_Hazard_CVF_S_1_0_7_28/EqnImages/P_Eqn_13.png
2004-Nov-15 11:06:10 582 bytes prism/private/wslib/WS/Class_Hazard_CVF_S_1_0_7_28/EqnImages/P_Eqn_14.png
2004-Nov-15 11:06:10 1092 bytes prism/private/wslib/WS/Class_Hazard_CVF_S_1_0_7_28/EqnImages/P_Eqn_15.png
2004-Nov-15 11:06:10 616 bytes prism/private/wslib/WS/Class_Hazard_CVF_S_1_0_7_28/EqnImages/P_Eqn_16.png
2004-Nov-15 11:06:10 1147 bytes prism/private/wslib/WS/Class_Hazard_CVF_S_1_0_7_28/EqnImages/P_Eqn_17.png
2004-Nov-15 11:06:10 799 bytes prism/private/wslib/WS/Class_Hazard_CVF_S_1_0_7_28/EqnImages/P_Eqn_18.png
2004-Nov-15 11:06:10 689 bytes prism/private/wslib/WS/Class_Hazard_CVF_S_1_0_7_28/EqnImages/P_Eqn_19.png
2004-Nov-15 11:06:10 1383 bytes prism/private/wslib/WS/Class_Hazard_CVF_S_1_0_7_28/EqnImages/P_Eqn_2.png
2004-Nov-15 11:06:10 1399 bytes prism/private/wslib/WS/Class_Hazard_CVF_S_1_0_7_28/EqnImages/P_Eqn_3.png
2004-Nov-15 11:06:10 959 bytes prism/private/wslib/WS/Class_Hazard_CVF_S_1_0_7_28/EqnImages/P_Eqn_4.png
2004-Nov-15 11:06:10 821 bytes prism/private/wslib/WS/Class_Hazard_CVF_S_1_0_7_28/EqnImages/P_Eqn_5.png
2004-Nov-15 11:06:12 959 bytes prism/private/wslib/WS/Class_Hazard_CVF_S_1_0_7_28/EqnImages/P_Eqn_6.png
2004-Nov-15 11:06:12 986 bytes prism/private/wslib/WS/Class_Hazard_CVF_S_1_0_7_28/EqnImages/P_Eqn_7.png
2004-Nov-15 11:06:12 951 bytes prism/private/wslib/WS/Class_Hazard_CVF_S_1_0_7_28/EqnImages/P_Eqn_8.png
2004-Nov-15 11:06:12 717 bytes prism/private/wslib/WS/Class_Hazard_CVF_S_1_0_7_28/EqnImages/P_Eqn_9.png
2004-Nov-15 11:05:56 8 bytes prism/private/wslib/WS/Class_Hazard_CVF_S_1_0_7_28/images.aux
2004-Nov-15 11:05:56 12420 bytes prism/private/wslib/WS/Class_Hazard_CVF_S_1_0_7_28/images.log
2004-Nov-15 11:06:08 6394 bytes prism/private/wslib/WS/Class_Hazard_CVF_S_1_0_7_28/images.pl
2004-Nov-15 11:05:56 9940 bytes prism/private/wslib/WS/Class_Hazard_CVF_S_1_0_7_28/images.tex
2004-Nov-15 11:06:04 963 bytes prism/private/wslib/WS/Class_Hazard_CVF_S_1_0_7_28/img1.png
2004-Nov-15 11:05:58 678 bytes prism/private/wslib/WS/Class_Hazard_CVF_S_1_0_7_28/img10.png
2004-Nov-15 11:06:02 1288 bytes prism/private/wslib/WS/Class_Hazard_CVF_S_1_0_7_28/img11.png
2004-Nov-15 11:06:06 936 bytes prism/private/wslib/WS/Class_Hazard_CVF_S_1_0_7_28/img12.png
2004-Nov-15 11:06:06 811 bytes prism/private/wslib/WS/Class_Hazard_CVF_S_1_0_7_28/img13.png 2004-Nov-15 11:06:04 1539 bytes prism/private/wslib/WS/Class_Hazard_CVF_S_1_0_7_28/img14.png
2004-Nov-15 11:06:00 1563 bytes prism/private/wslib/WS/Class_Hazard_CVF_S_1_0_7_28/img15.png
2004-Nov-15 11:06:02 1122 bytes prism/private/wslib/WS/Class_Hazard_CVF_S_1_0_7_28/img16.png
2004-Nov-15 11:06:06 887 bytes prism/private/wslib/WS/Class_Hazard_CVF_S_1_0_7_28/img17.png
2004-Nov-15 11:06:08 1142 bytes prism/private/wslib/WS/Class_Hazard_CVF_S_1_0_7_28/img18.png
2004-Nov-15 11:06:08 1117 bytes prism/private/wslib/WS/Class_Hazard_CVF_S_1_0_7_28/img19.png
2004-Nov-15 11:06:04 872 bytes prism/private/wslib/WS/Class_Hazard_CVF_S_1_0_7_28/img2.png
2004-Nov-15 11:06:00 856 bytes prism/private/wslib/WS/Class_Hazard_CVF_S_1_0_7_28/img20.png
2004-Nov-15 11:06:02 1626 bytes prism/private/wslib/WS/Class_Hazard_CVF_S_1_0_7_28/img3.png
2004-Nov-15 11:06:00 1838 bytes prism/private/wslib/WS/Class_Hazard_CVF_S_1_0_7_28/img4.png
2004-Nov-15 11:06:08 1205 bytes prism/private/wslib/WS/Class_Hazard_CVF_S_1_0_7_28/img5.png
2004-Nov-15 11:06:06 1357 bytes prism/private/wslib/WS/Class_Hazard_CVF_S_1_0_7_28/img6.png
2004-Nov-15 11:06:00 1308 bytes prism/private/wslib/WS/Class_Hazard_CVF_S_1_0_7_28/img7.png
2004-Nov-15 11:06:02 933 bytes prism/private/wslib/WS/Class_Hazard_CVF_S_1_0_7_28/img8.png
2004-Nov-15 11:05:58 651 bytes prism/private/wslib/WS/Class_Hazard_CVF_S_1_0_7_28/img9.png
2004-Nov-15 11:06:08 10720 bytes prism/private/wslib/WS/Class_Hazard_CVF_S_1_0_7_28/index.html
2004-Nov-15 11:06:08 2678 bytes prism/private/wslib/WS/Class_Hazard_CVF_S_1_0_7_28/internals.pl
2004-Nov-15 11:06:14 2952 bytes prism/private/wslib/WS/Class_Hazard_CVF_S_1_0_7_28/labels.pl
2004-Nov-15 11:06:08 2523 bytes prism/private/wslib/WS/Class_Hazard_CVF_S_1_0_7_28/node1.html
2004-Dec-13 10:28:40 2176 bytes prism/private/wslib/WS/Class_Hazard_CVF_V_1_0_7_28
2004-Nov-15 11:06:12 275764 bytes prism/private/wslib/WS/Class_Hazard_CVF_V_1_0_7_28.pm
2004-Nov-15 11:06:12 5124 bytes prism/private/wslib/WS/Class_Hazard_CVF_V_1_0_7_28.tex
2004-Nov-15 11:06:12 315 bytes prism/private/wslib/WS/Class_Hazard_CVF_V_1_0_7_28.ws
2004-Nov-15 11:06:44 891 bytes prism/private/wslib/WS/Class_Hazard_CVF_V_1_0_7_28/Class_Hazard_CVF_V_1_0_7_28.css
2004-Nov-15 11:06:44 22689 bytes prism/private/wslib/WS/Class_Hazard_CVF_V_1_0_7_28/Class_Hazard_CVF_V_1_0_7_28.html
2004-Dec-13 10:28:40 1904 bytes prism/private/wslib/WS/Class_Hazard_CVF_V_1_0_7_28/EqnImages
2004-Nov-15 11:06:46 774 bytes prism/private/wslib/WS/Class_Hazard_CVF_V_1_0_7_28/EqnImages/BP_Eqn_0.png
2004-Nov-15 11:06:46 781 bytes prism/private/wslib/WS/Class_Hazard_CVF_V_1_0_7_28/EqnImages/BP_Eqn_1.png
2004-Nov-15 11:06:46 748 bytes prism/private/wslib/WS/Class_Hazard_CVF_V_1_0_7_28/EqnImages/CVFlow_Eqn_0.png
2004-Nov-15 11:06:46 672 bytes prism/private/wslib/WS/Class_Hazard_CVF_V_1_0_7_28/EqnImages/CVFlow_Eqn_1.png
2004-Nov-15 11:06:46 1368 bytes prism/private/wslib/WS/Class_Hazard_CVF_V_1_0_7_28/EqnImages/CVFlow_Eqn_2.png
2004-Nov-15 11:06:46 1420 bytes prism/private/wslib/WS/Class_Hazard_CVF_V_1_0_7_28/EqnImages/CVFlow_Eqn_3.png
2004-Nov-15 11:06:46 585 bytes prism/private/wslib/WS/Class_Hazard_CVF_V_1_0_7_28/EqnImages/CVFlow_Eqn_4.png
2004-Nov-15 11:06:46 634 bytes prism/private/wslib/WS/Class_Hazard_CVF_V_1_0_7_28/EqnImages/CVFlow_Eqn_5.png
2004-Nov-15 11:06:46 2270 bytes prism/private/wslib/WS/Class_Hazard_CVF_V_1_0_7_28/EqnImages/CVFlow_Eqn_6.png
2004-Nov-15 11:06:46 1261 bytes prism/private/wslib/WS/Class_Hazard_CVF_V_1_0_7_28/EqnImages/CalcKbp_CalcKb_Eqn_0.png
2004-Nov-15 11:06:46 971 bytes prism/private/wslib/WS/Class_Hazard_CVF_V_1_0_7_28/EqnImages/CalcKbp_CalcKv_Eqn_0.png
2004-Nov-15 11:06:46 736 bytes prism/private/wslib/WS/Class_Hazard_CVF_V_1_0_7_28/EqnImages/CalcKbp_CalcKv_Eqn_1.png
2004-Nov-15 11:06:46 793 bytes prism/private/wslib/WS/Class_Hazard_CVF_V_1_0_7_28/EqnImages/CalcKbp_CalcKv_Eqn_2.png
2004-Nov-15 11:06:48 727 bytes prism/private/wslib/WS/Class_Hazard_CVF_V_1_0_7_28/EqnImages/CalcKbp_CalcKv_Eqn_3.png
2004-Nov-15 11:06:48 437 bytes prism/private/wslib/WS/Class_Hazard_CVF_V_1_0_7_28/EqnImages/CalcKbp_Eqn_0.png
2004-Nov-15 11:06:48 374 bytes prism/private/wslib/WS/Class_Hazard_CVF_V_1_0_7_28/EqnImages/CalcKbp_Eqn_1.png
2004-Nov-15 11:06:48 625 bytes prism/private/wslib/WS/Class_Hazard_CVF_V_1_0_7_28/EqnImages/CalcVapMass_CF_Eqn_0.png
2004-Nov-15 11:06:48 827 bytes prism/private/wslib/WS/Class_Hazard_CVF_V_1_0_7_28/EqnImages/CalcVapMass_CF_Eqn_1.png
2004-Nov-15 11:06:48 1190 bytes prism/private/wslib/WS/Class_Hazard_CVF_V_1_0_7_28/EqnImages/CalcVapMass_CF_Eqn_10.png
2004-Nov-15 11:06:48 248 bytes prism/private/wslib/WS/Class_Hazard_CVF_V_1_0_7_28/EqnImages/CalcVapMass_CF_Eqn_2.png
2004-Nov-15 11:06:48 839 bytes prism/private/wslib/WS/Class_Hazard_CVF_V_1_0_7_28/EqnImages/CalcVapMass_CF_Eqn_3.png
2004-Nov-15 11:06:48 428 bytes prism/private/wslib/WS/Class_Hazard_CVF_V_1_0_7_28/EqnImages/CalcVapMass_CF_Eqn_4.png
2004-Nov-15 11:06:48 731 bytes prism/private/wslib/WS/Class_Hazard_CVF_V_1_0_7_28/EqnImages/CalcVapMass_CF_Eqn_5.png
2004-Nov-15 11:06:48 468 bytes prism/private/wslib/WS/Class_Hazard_CVF_V_1_0_7_28/EqnImages/CalcVapMass_CF_Eqn_6.png
2004-Nov-15 11:06:48 211 bytes prism/private/wslib/WS/Class_Hazard_CVF_V_1_0_7_28/EqnImages/CalcVapMass_CF_Eqn_7.png
2004-Nov-15 11:06:48 923 bytes prism/private/wslib/WS/Class_Hazard_CVF_V_1_0_7_28/EqnImages/CalcVapMass_CF_Eqn_8.png
2004-Nov-15 11:06:48 248 bytes prism/private/wslib/WS/Class_Hazard_CVF_V_1_0_7_28/EqnImages/CalcVapMass_CF_Eqn_9.png
2004-Nov-15 11:06:48 1860 bytes prism/private/wslib/WS/Class_Hazard_CVF_V_1_0_7_28/EqnImages/CalcVapMass_Eqn_0.png
2004-Nov-15 11:06:50 1416 bytes prism/private/wslib/WS/Class_Hazard_CVF_V_1_0_7_28/EqnImages/CalcVapMass_Eqn_1.png
2004-Nov-15 11:06:50 865 bytes prism/private/wslib/WS/Class_Hazard_CVF_V_1_0_7_28/EqnImages/Eqn_0.png
2004-Nov-15 11:06:50 617 bytes prism/private/wslib/WS/Class_Hazard_CVF_V_1_0_7_28/EqnImages/Eqn_1.png
2004-Nov-15 11:06:50 953 bytes prism/private/wslib/WS/Class_Hazard_CVF_V_1_0_7_28/EqnImages/PC_Eqn_0.png
2004-Nov-15 11:06:50 1054 bytes prism/private/wslib/WS/Class_Hazard_CVF_V_1_0_7_28/EqnImages/PVP_Eqn_0.png
2004-Nov-15 11:06:50 397 bytes prism/private/wslib/WS/Class_Hazard_CVF_V_1_0_7_28/EqnImages/PVP_Eqn_1.png
2004-Nov-15 11:06:50 1388 bytes prism/private/wslib/WS/Class_Hazard_CVF_V_1_0_7_28/EqnImages/P_Eqn_0.png

| | | |
|---|---|---|
| 2004-Nov-15 11:06:50 | 1674 bytes | prism/private/wslib/WS/Class_Hazard_CVF_V_1_0_7_28/EqnImages/P_Eqn_1.png |
| 2004-Nov-15 11:06:50 | 1055 bytes | prism/private/wslib/WS/Class_Hazard_CVF_V_1_0_7_28/EqnImages/P_Eqn_10.png |
| 2004-Nov-15 11:06:50 | 1201 bytes | prism/private/wslib/WS/Class_Hazard_CVF_V_1_0_7_28/EqnImages/P_Eqn_11.png |
| 2004-Nov-15 11:06:50 | 1092 bytes | prism/private/wslib/WS/Class_Hazard_CVF_V_1_0_7_28/EqnImages/P_Eqn_12.png |
| 2004-Nov-15 11:06:50 | 802 bytes | prism/private/wslib/WS/Class_Hazard_CVF_V_1_0_7_28/EqnImages/P_Eqn_13.png |
| 2004-Nov-15 11:06:50 | 582 bytes | prism/private/wslib/WS/Class_Hazard_CVF_V_1_0_7_28/EqnImages/P_Eqn_14.png |
| 2004-Nov-15 11:06:50 | 1092 bytes | prism/private/wslib/WS/Class_Hazard_CVF_V_1_0_7_28/EqnImages/P_Eqn_15.png |
| 2004-Nov-15 11:06:52 | 616 bytes | prism/private/wslib/WS/Class_Hazard_CVF_V_1_0_7_28/EqnImages/P_Eqn_16.png |
| 2004-Nov-15 11:06:52 | 1147 bytes | prism/private/wslib/WS/Class_Hazard_CVF_V_1_0_7_28/EqnImages/P_Eqn_17.png |
| 2004-Nov-15 11:06:52 | 799 bytes | prism/private/wslib/WS/Class_Hazard_CVF_V_1_0_7_28/EqnImages/P_Eqn_18.png |
| 2004-Nov-15 11:06:52 | 689 bytes | prism/private/wslib/WS/Class_Hazard_CVF_V_1_0_7_28/EqnImages/P_Eqn_19.png |
| 2004-Nov-15 11:06:52 | 1383 bytes | prism/private/wslib/WS/Class_Hazard_CVF_V_1_0_7_28/EqnImages/P_Eqn_2.png |
| 2004-Nov-15 11:06:52 | 1399 bytes | prism/private/wslib/WS/Class_Hazard_CVF_V_1_0_7_28/EqnImages/P_Eqn_3.png |
| 2004-Nov-15 11:06:52 | 959 bytes | prism/private/wslib/WS/Class_Hazard_CVF_V_1_0_7_28/EqnImages/P_Eqn_4.png |
| 2004-Nov-15 11:06:52 | 821 bytes | prism/private/wslib/WS/Class_Hazard_CVF_V_1_0_7_28/EqnImages/P_Eqn_5.png |
| 2004-Nov-15 11:06:52 | 959 bytes | prism/private/wslib/WS/Class_Hazard_CVF_V_1_0_7_28/EqnImages/P_Eqn_6.png |
| 2004-Nov-15 11:06:52 | 986 bytes | prism/private/wslib/WS/Class_Hazard_CVF_V_1_0_7_28/EqnImages/P_Eqn_7.png |
| 2004-Nov-15 11:06:52 | 951 bytes | prism/private/wslib/WS/Class_Hazard_CVF_V_1_0_7_28/EqnImages/P_Eqn_8.png |
| 2004-Nov-15 11:06:52 | 717 bytes | prism/private/wslib/WS/Class_Hazard_CVF_V_1_0_7_28/EqnImages/P_Eqn_9.png |
| 2004-Nov-15 11:06:14 | 8 bytes | prism/private/wslib/WS/Class_Hazard_CVF_V_1_0_7_28/images.aux |
| 2004-Nov-15 11:06:14 | 18976 bytes | prism/private/wslib/WS/Class_Hazard_CVF_V_1_0_7_28/images.log |
| 2004-Nov-15 11:06:44 | 15803 bytes | prism/private/wslib/WS/Class_Hazard_CVF_V_1_0_7_28/images.pl |
| 2004-Nov-15 11:06:14 | 16025 bytes | prism/private/wslib/WS/Class_Hazard_CVF_V_1_0_7_28/images.tex |
| 2004-Nov-15 11:06:28 | 963 bytes | prism/private/wslib/WS/Class_Hazard_CVF_V_1_0_7_28/img1.png |
| 2004-Nov-15 11:06:26 | 1593 bytes | prism/private/wslib/WS/Class_Hazard_CVF_V_1_0_7_28/img10.png |
| 2004-Nov-15 11:06:30 | 1053 bytes | prism/private/wslib/WS/Class_Hazard_CVF_V_1_0_7_28/img11.png |
| 2004-Nov-15 11:06:32 | 834 bytes | prism/private/wslib/WS/Class_Hazard_CVF_V_1_0_7_28/img12.png |
| 2004-Nov-15 11:06:24 | 901 bytes | prism/private/wslib/WS/Class_Hazard_CVF_V_1_0_7_28/img13.png |
| 2004-Nov-15 11:06:34 | 798 bytes | prism/private/wslib/WS/Class_Hazard_CVF_V_1_0_7_28/img14.png |
| 2004-Nov-15 11:06:24 | 474 bytes | prism/private/wslib/WS/Class_Hazard_CVF_V_1_0_7_28/img15.png |
| 2004-Nov-15 11:06:42 | 460 bytes | prism/private/wslib/WS/Class_Hazard_CVF_V_1_0_7_28/img16.png |
| 2004-Nov-15 11:06:42 | 723 bytes | prism/private/wslib/WS/Class_Hazard_CVF_V_1_0_7_28/img17.png |
| 2004-Nov-15 11:06:44 | 906 bytes | prism/private/wslib/WS/Class_Hazard_CVF_V_1_0_7_28/img18.png |
| 2004-Nov-15 11:06:30 | 1446 bytes | prism/private/wslib/WS/Class_Hazard_CVF_V_1_0_7_28/img19.png |
| 2004-Nov-15 11:06:40 | 872 bytes | prism/private/wslib/WS/Class_Hazard_CVF_V_1_0_7_28/img2.png |
| 2004-Nov-15 11:06:20 | 262 bytes | prism/private/wslib/WS/Class_Hazard_CVF_V_1_0_7_28/img20.png |
| 2004-Nov-15 11:06:22 | 949 bytes | prism/private/wslib/WS/Class_Hazard_CVF_V_1_0_7_28/img21.png |
| 2004-Nov-15 11:06:38 | 515 bytes | prism/private/wslib/WS/Class_Hazard_CVF_V_1_0_7_28/img22.png |
| 2004-Nov-15 11:06:34 | 839 bytes | prism/private/wslib/WS/Class_Hazard_CVF_V_1_0_7_28/img23.png |
| 2004-Nov-15 11:06:32 | 520 bytes | prism/private/wslib/WS/Class_Hazard_CVF_V_1_0_7_28/img24.png |
| 2004-Nov-15 11:06:32 | 230 bytes | prism/private/wslib/WS/Class_Hazard_CVF_V_1_0_7_28/img25.png |
| 2004-Nov-15 11:06:36 | 1017 bytes | prism/private/wslib/WS/Class_Hazard_CVF_V_1_0_7_28/img26.png |
| 2004-Nov-15 11:06:32 | 2158 bytes | prism/private/wslib/WS/Class_Hazard_CVF_V_1_0_7_28/img27.png |
| 2004-Nov-15 11:06:36 | 1643 bytes | prism/private/wslib/WS/Class_Hazard_CVF_V_1_0_7_28/img28.png |
| 2004-Nov-15 11:06:18 | 1045 bytes | prism/private/wslib/WS/Class_Hazard_CVF_V_1_0_7_28/img29.png |
| 2004-Nov-15 11:06:24 | 871 bytes | prism/private/wslib/WS/Class_Hazard_CVF_V_1_0_7_28/img3.png |
| 2004-Nov-15 11:06:38 | 730 bytes | prism/private/wslib/WS/Class_Hazard_CVF_V_1_0_7_28/img30.png |
| 2004-Nov-15 11:06:28 | 1069 bytes | prism/private/wslib/WS/Class_Hazard_CVF_V_1_0_7_28/img31.png |
| 2004-Nov-15 11:06:22 | 1176 bytes | prism/private/wslib/WS/Class_Hazard_CVF_V_1_0_7_28/img32.png |
| 2004-Nov-15 11:06:26 | 427 bytes | prism/private/wslib/WS/Class_Hazard_CVF_V_1_0_7_28/img33.png |
| 2004-Nov-15 11:06:38 | 1626 bytes | prism/private/wslib/WS/Class_Hazard_CVF_V_1_0_7_28/img34.png |
| 2004-Nov-15 11:06:28 | 1838 bytes | prism/private/wslib/WS/Class_Hazard_CVF_V_1_0_7_28/img35.png |
| 2004-Nov-15 11:06:36 | 1205 bytes | prism/private/wslib/WS/Class_Hazard_CVF_V_1_0_7_28/img36.png |
| 2004-Nov-15 11:06:40 | 1357 bytes | prism/private/wslib/WS/Class_Hazard_CVF_V_1_0_7_28/img37.png |
| 2004-Nov-15 11:06:20 | 1308 bytes | prism/private/wslib/WS/Class_Hazard_CVF_V_1_0_7_28/img38.png |
| 2004-Nov-15 11:06:44 | 933 bytes | prism/private/wslib/WS/Class_Hazard_CVF_V_1_0_7_28/img39.png |
| 2004-Nov-15 11:06:30 | 756 bytes | prism/private/wslib/WS/Class_Hazard_CVF_V_1_0_7_28/img4.png |
| 2004-Nov-15 11:06:26 | 651 bytes | prism/private/wslib/WS/Class_Hazard_CVF_V_1_0_7_28/img40.png |
| 2004-Nov-15 11:06:34 | 678 bytes | prism/private/wslib/WS/Class_Hazard_CVF_V_1_0_7_28/img41.png |
| 2004-Nov-15 11:06:34 | 1288 bytes | prism/private/wslib/WS/Class_Hazard_CVF_V_1_0_7_28/img42.png |
| 2004-Nov-15 11:06:20 | 936 bytes | prism/private/wslib/WS/Class_Hazard_CVF_V_1_0_7_28/img43.png |

2004-Nov-15 11:06:22 811 bytes prism/private/wslib/WS/Class_Hazard_CVF_V_1_0_7_28/img44.png
2004-Nov-15 11:06:42 1539 bytes prism/private/wslib/WS/Class_Hazard_CVF_V_1_0_7_28/img45.png
2004-Nov-15 11:06:24 1563 bytes prism/private/wslib/WS/Class_Hazard_CVF_V_1_0_7_28/img46.png
2004-Nov-15 11:06:26 1122 bytes prism/private/wslib/WS/Class_Hazard_CVF_V_1_0_7_28/img47.png
2004-Nov-15 11:06:20 887 bytes prism/private/wslib/WS/Class_Hazard_CVF_V_1_0_7_28/img48.png
2004-Nov-15 11:06:42 1142 bytes prism/private/wslib/WS/Class_Hazard_CVF_V_1_0_7_28/img49.png
2004-Nov-15 11:06:40 1509 bytes prism/private/wslib/WS/Class_Hazard_CVF_V_1_0_7_28/img5.png
2004-Nov-15 11:06:22 1117 bytes prism/private/wslib/WS/Class_Hazard_CVF_V_1_0_7_28/img50.png
2004-Nov-15 11:06:40 856 bytes prism/private/wslib/WS/Class_Hazard_CVF_V_1_0_7_28/img51.png
2004-Nov-15 11:06:18 1593 bytes prism/private/wslib/WS/Class_Hazard_CVF_V_1_0_7_28/img6.png
2004-Nov-15 11:06:38 625 bytes prism/private/wslib/WS/Class_Hazard_CVF_V_1_0_7_28/img7.png
2004-Nov-15 11:06:44 719 bytes prism/private/wslib/WS/Class_Hazard_CVF_V_1_0_7_28/img8.png
2004-Nov-15 11:06:30 2604 bytes prism/private/wslib/WS/Class_Hazard_CVF_V_1_0_7_28/img9.png
2004-Nov-15 11:06:44 22689 bytes prism/private/wslib/WS/Class_Hazard_CVF_V_1_0_7_28/index.html
2004-Nov-15 11:06:44 6699 bytes prism/private/wslib/WS/Class_Hazard_CVF_V_1_0_7_28/internals.pl
2004-Nov-15 11:06:44 7261 bytes prism/private/wslib/WS/Class_Hazard_CVF_V_1_0_7_28/labels.pl
2004-Nov-15 11:06:44 2523 bytes prism/private/wslib/WS/Class_Hazard_CVF_V_1_0_7_28/node1.html
2004-Dec-13 10:28:41 2040 bytes prism/private/wslib/WS/Class_Hazard_FGE_V_1_0_7_28
2004-Nov-15 11:06:54 274386 bytes prism/private/wslib/WS/Class_Hazard_FGE_V_1_0_7_28.pm
2004-Nov-15 11:06:54 4927 bytes prism/private/wslib/WS/Class_Hazard_FGE_V_1_0_7_28.tex
2004-Nov-15 11:06:54 312 bytes prism/private/wslib/WS/Class_Hazard_FGE_V_1_0_7_28.ws
2004-Nov-15 11:07:24 891 bytes prism/private/wslib/WS/Class_Hazard_FGE_V_1_0_7_28/Class_Hazard_FGE_V_1_0_7_28.css
2004-Nov-15 11:07:24 21398 bytes prism/private/wslib/WS/Class_Hazard_FGE_V_1_0_7_28/Class_Hazard_FGE_V_1_0_7_28.html
2004-Dec-13 10:28:40 1768 bytes prism/private/wslib/WS/Class_Hazard_FGE_V_1_0_7_28/EqnImages
2004-Nov-15 11:07:24 774 bytes prism/private/wslib/WS/Class_Hazard_FGE_V_1_0_7_28/EqnImages/BP_Eqn_0.png
2004-Nov-15 11:07:24 781 bytes prism/private/wslib/WS/Class_Hazard_FGE_V_1_0_7_28/EqnImages/BP_Eqn_1.png
2004-Nov-15 11:07:24 1261 bytes prism/private/wslib/WS/Class_Hazard_FGE_V_1_0_7_28/EqnImages/CalcKbp_CalcKb_Eqn_0.png
2004-Nov-15 11:07:24 971 bytes prism/private/wslib/WS/Class_Hazard_FGE_V_1_0_7_28/EqnImages/CalcKbp_CalcKv_Eqn_0.png
2004-Nov-15 11:07:24 736 bytes prism/private/wslib/WS/Class_Hazard_FGE_V_1_0_7_28/EqnImages/CalcKbp_CalcKv_Eqn_1.png
2004-Nov-15 11:07:24 793 bytes prism/private/wslib/WS/Class_Hazard_FGE_V_1_0_7_28/EqnImages/CalcKbp_CalcKv_Eqn_2.png
2004-Nov-15 11:07:24 727 bytes prism/private/wslib/WS/Class_Hazard_FGE_V_1_0_7_28/EqnImages/CalcKbp_CalcKv_Eqn_3.png
2004-Nov-15 11:07:24 437 bytes prism/private/wslib/WS/Class_Hazard_FGE_V_1_0_7_28/EqnImages/CalcKbp_Eqn_0.png
2004-Nov-15 11:07:24 374 bytes prism/private/wslib/WS/Class_Hazard_FGE_V_1_0_7_28/EqnImages/CalcKbp_Eqn_1.png
2004-Nov-15 11:07:26 1160 bytes prism/private/wslib/WS/Class_Hazard_FGE_V_1_0_7_28/EqnImages/CalcReqArea_Eqn_0.png
2004-Nov-15 11:07:26 533 bytes prism/private/wslib/WS/Class_Hazard_FGE_V_1_0_7_28/EqnImages/CalcReqArea_Eqn_1.png
2004-Nov-15 11:07:26 1632 bytes prism/private/wslib/WS/Class_Hazard_FGE_V_1_0_7_28/EqnImages/CalcReqArea_Eqn_2.png
2004-Nov-15 11:07:26 871 bytes prism/private/wslib/WS/Class_Hazard_FGE_V_1_0_7_28/EqnImages/CalcReqArea_Eqn_3.png
2004-Nov-15 11:07:26 1482 bytes prism/private/wslib/WS/Class_Hazard_FGE_V_1_0_7_28/EqnImages/CalcReqArea_Eqn_4.png
2004-Nov-15 11:07:26 625 bytes prism/private/wslib/WS/Class_Hazard_FGE_V_1_0_7_28/EqnImages/CalcVapMass_CF_Eqn_0.png
2004-Nov-15 11:07:26 827 bytes prism/private/wslib/WS/Class_Hazard_FGE_V_1_0_7_28/EqnImages/CalcVapMass_CF_Eqn_1.png
2004-Nov-15 11:07:26 1190 bytes prism/private/wslib/WS/Class_Hazard_FGE_V_1_0_7_28/EqnImages/CalcVapMass_CF_Eqn_10.png
2004-Nov-15 11:07:26 248 bytes prism/private/wslib/WS/Class_Hazard_FGE_V_1_0_7_28/EqnImages/CalcVapMass_CF_Eqn_2.png
2004-Nov-15 11:07:26 839 bytes prism/private/wslib/WS/Class_Hazard_FGE_V_1_0_7_28/EqnImages/CalcVapMass_CF_Eqn_3.png
2004-Nov-15 11:07:26 428 bytes prism/private/wslib/WS/Class_Hazard_FGE_V_1_0_7_28/EqnImages/CalcVapMass_CF_Eqn_4.png
2004-Nov-15 11:07:26 731 bytes prism/private/wslib/WS/Class_Hazard_FGE_V_1_0_7_28/EqnImages/CalcVapMass_CF_Eqn_5.png
2004-Nov-15 11:07:26 468 bytes prism/private/wslib/WS/Class_Hazard_FGE_V_1_0_7_28/EqnImages/CalcVapMass_CF_Eqn_6.png
2004-Nov-15 11:07:26 211 bytes prism/private/wslib/WS/Class_Hazard_FGE_V_1_0_7_28/EqnImages/CalcVapMass_CF_Eqn_7.png
2004-Nov-15 11:07:26 923 bytes prism/private/wslib/WS/Class_Hazard_FGE_V_1_0_7_28/EqnImages/CalcVapMass_CF_Eqn_8.png
2004-Nov-15 11:07:28 248 bytes prism/private/wslib/WS/Class_Hazard_FGE_V_1_0_7_28/EqnImages/CalcVapMass_CF_Eqn_9.png
2004-Nov-15 11:07:28 1813 bytes prism/private/wslib/WS/Class_Hazard_FGE_V_1_0_7_28/EqnImages/CalcVapMass_Eqn_0.png
2004-Nov-15 11:07:28 1374 bytes prism/private/wslib/WS/Class_Hazard_FGE_V_1_0_7_28/EqnImages/CalcVapMass_Eqn_1.png
2004-Nov-15 11:07:28 953 bytes prism/private/wslib/WS/Class_Hazard_FGE_V_1_0_7_28/EqnImages/PC_Eqn_0.png
2004-Nov-15 11:07:28 1054 bytes prism/private/wslib/WS/Class_Hazard_FGE_V_1_0_7_28/EqnImages/PVP_Eqn_0.png
2004-Nov-15 11:07:28 397 bytes prism/private/wslib/WS/Class_Hazard_FGE_V_1_0_7_28/EqnImages/PVP_Eqn_1.png
2004-Nov-15 11:07:28 1388 bytes prism/private/wslib/WS/Class_Hazard_FGE_V_1_0_7_28/EqnImages/P_Eqn_0.png
2004-Nov-15 11:07:28 1674 bytes prism/private/wslib/WS/Class_Hazard_FGE_V_1_0_7_28/EqnImages/P_Eqn_1.png
2004-Nov-15 11:07:28 1055 bytes prism/private/wslib/WS/Class_Hazard_FGE_V_1_0_7_28/EqnImages/P_Eqn_10.png
2004-Nov-15 11:07:28 1201 bytes prism/private/wslib/WS/Class_Hazard_FGE_V_1_0_7_28/EqnImages/P_Eqn_11.png
2004-Nov-15 11:07:28 1092 bytes prism/private/wslib/WS/Class_Hazard_FGE_V_1_0_7_28/EqnImages/P_Eqn_12.png
2004-Nov-15 11:07:28 802 bytes prism/private/wslib/WS/Class_Hazard_FGE_V_1_0_7_28/EqnImages/P_Eqn_13.png
2004-Nov-15 11:07:28 582 bytes prism/private/wslib/WS/Class_Hazard_FGE_V_1_0_7_28/EqnImages/P_Eqn_14.png 2004-Nov-15 11:07:28 1092 bytes prism/private/wslib/WS/Class_Hazard_FGE_V_1_0_7_28/EqnImages/P_Eqn_15.png
2004-Nov-15 11:07:30 616 bytes prism/private/wslib/WS/Class_Hazard_FGE_V_1_0_7_28/EqnImages/P_Eqn_16.png
2004-Nov-15 11:07:30 1147 bytes prism/private/wslib/WS/Class_Hazard_FGE_V_1_0_7_28/EqnImages/P_Eqn_17.png
2004-Nov-15 11:07:30 799 bytes prism/private/wslib/WS/Class_Hazard_FGE_V_1_0_7_28/EqnImages/P_Eqn_18.png
2004-Nov-15 11:07:30 689 bytes prism/private/wslib/WS/Class_Hazard_FGE_V_1_0_7_28/EqnImages/P_Eqn_19.png
2004-Nov-15 11:07:30 1383 bytes prism/private/wslib/WS/Class_Hazard_FGE_V_1_0_7_28/EqnImages/P_Eqn_2.png
2004-Nov-15 11:07:30 1399 bytes prism/private/wslib/WS/Class_Hazard_FGE_V_1_0_7_28/EqnImages/P_Eqn_3.png
2004-Nov-15 11:07:30 959 bytes prism/private/wslib/WS/Class_Hazard_FGE_V_1_0_7_28/EqnImages/P_Eqn_4.png
2004-Nov-15 11:07:30 821 bytes prism/private/wslib/WS/Class_Hazard_FGE_V_1_0_7_28/EqnImages/P_Eqn_5.png
2004-Nov-15 11:07:30 959 bytes prism/private/wslib/WS/Class_Hazard_FGE_V_1_0_7_28/EqnImages/P_Eqn_6.png
2004-Nov-15 11:07:30 986 bytes prism/private/wslib/WS/Class_Hazard_FGE_V_1_0_7_28/EqnImages/P_Eqn_7.png
2004-Nov-15 11:07:30 951 bytes prism/private/wslib/WS/Class_Hazard_FGE_V_1_0_7_28/EqnImages/P_Eqn_8.png
2004-Nov-15 11:07:30 717 bytes prism/private/wslib/WS/Class_Hazard_FGE_V_1_0_7_28/EqnImages/P_Eqn_9.png
2004-Nov-15 11:06:56 8 bytes prism/private/wslib/WS/Class_Hazard_FGE_V_1_0_7_28/images.aux
2004-Nov-15 11:06:56 17676 bytes prism/private/wslib/WS/Class_Hazard_FGE_V_1_0_7_28/images.log
2004-Nov-15 11:07:24 14655 bytes prism/private/wslib/WS/Class_Hazard_FGE_V_1_0_7_28/images.pl
2004-Nov-15 11:06:56 15365 bytes prism/private/wslib/WS/Class_Hazard_FGE_V_1_0_7_28/images.tex
2004-Nov-15 11:07:18 963 bytes prism/private/wslib/WS/Class_Hazard_FGE_V_1_0_7_28/img1.png
2004-Nov-15 11:07:24 1419 bytes prism/private/wslib/WS/Class_Hazard_FGE_V_1_0_7_28/img10.png
2004-Nov-15 11:07:00 606 bytes prism/private/wslib/WS/Class_Hazard_FGE_V_1_0_7_28/img11.png
2004-Nov-15 11:07:12 1878 bytes prism/private/wslib/WS/Class_Hazard_FGE_V_1_0_7_28/img12.png
2004-Nov-15 11:07:16 1066 bytes prism/private/wslib/WS/Class_Hazard_FGE_V_1_0_7_28/img13.png
2004-Nov-15 11:07:08 1704 bytes prism/private/wslib/WS/Class_Hazard_FGE_V_1_0_7_28/img14.png
2004-Nov-15 11:07:16 723 bytes prism/private/wslib/WS/Class_Hazard_FGE_V_1_0_7_28/img15.png
2004-Nov-15 11:07:06 906 bytes prism/private/wslib/WS/Class_Hazard_FGE_V_1_0_7_28/img16.png
2004-Nov-15 11:07:06 1446 bytes prism/private/wslib/WS/Class_Hazard_FGE_V_1_0_7_28/img17.png
2004-Nov-15 11:07:10 262 bytes prism/private/wslib/WS/Class_Hazard_FGE_V_1_0_7_28/img18.png
2004-Nov-15 11:07:22 949 bytes prism/private/wslib/WS/Class_Hazard_FGE_V_1_0_7_28/img19.png
2004-Nov-15 11:07:20 872 bytes prism/private/wslib/WS/Class_Hazard_FGE_V_1_0_7_28/img2.png
2004-Nov-15 11:07:02 515 bytes prism/private/wslib/WS/Class_Hazard_FGE_V_1_0_7_28/img20.png
2004-Nov-15 11:07:12 839 bytes prism/private/wslib/WS/Class_Hazard_FGE_V_1_0_7_28/img21.png
2004-Nov-15 11:07:02 520 bytes prism/private/wslib/WS/Class_Hazard_FGE_V_1_0_7_28/img22.png
2004-Nov-15 11:07:06 230 bytes prism/private/wslib/WS/Class_Hazard_FGE_V_1_0_7_28/img23.png
2004-Nov-15 11:07:14 1017 bytes prism/private/wslib/WS/Class_Hazard_FGE_V_1_0_7_28/img24.png
2004-Nov-15 11:07:22 2114 bytes prism/private/wslib/WS/Class_Hazard_FGE_V_1_0_7_28/img25.png
2004-Nov-15 11:07:08 1606 bytes prism/private/wslib/WS/Class_Hazard_FGE_V_1_0_7_28/img26.png
2004-Nov-15 11:07:12 1069 bytes prism/private/wslib/WS/Class_Hazard_FGE_V_1_0_7_28/img27.png
2004-Nov-15 11:07:04 1176 bytes prism/private/wslib/WS/Class_Hazard_FGE_V_1_0_7_28/img28.png
2004-Nov-15 11:07:16 427 bytes prism/private/wslib/WS/Class_Hazard_FGE_V_1_0_7_28/img29.png
2004-Nov-15 11:07:20 1593 bytes prism/private/wslib/WS/Class_Hazard_FGE_V_1_0_7_28/img3.png
2004-Nov-15 11:07:04 1626 bytes prism/private/wslib/WS/Class_Hazard_FGE_V_1_0_7_28/img30.png
2004-Nov-15 11:07:18 1838 bytes prism/private/wslib/WS/Class_Hazard_FGE_V_1_0_7_28/img31.png
2004-Nov-15 11:07:00 1205 bytes prism/private/wslib/WS/Class_Hazard_FGE_V_1_0_7_28/img32.png
2004-Nov-15 11:07:08 1357 bytes prism/private/wslib/WS/Class_Hazard_FGE_V_1_0_7_28/img33.png
2004-Nov-15 11:07:18 1308 bytes prism/private/wslib/WS/Class_Hazard_FGE_V_1_0_7_28/img34.png
2004-Nov-15 11:06:58 933 bytes prism/private/wslib/WS/Class_Hazard_FGE_V_1_0_7_28/img35.png
2004-Nov-15 11:07:16 651 bytes prism/private/wslib/WS/Class_Hazard_FGE_V_1_0_7_28/img36.png
2004-Nov-15 11:07:08 678 bytes prism/private/wslib/WS/Class_Hazard_FGE_V_1_0_7_28/img37.png
2004-Nov-15 11:07:04 1288 bytes prism/private/wslib/WS/Class_Hazard_FGE_V_1_0_7_28/img38.png
2004-Nov-15 11:07:10 936 bytes prism/private/wslib/WS/Class_Hazard_FGE_V_1_0_7_28/img39.png
2004-Nov-15 11:07:04 1053 bytes prism/private/wslib/WS/Class_Hazard_FGE_V_1_0_7_28/img4.png
2004-Nov-15 11:07:14 811 bytes prism/private/wslib/WS/Class_Hazard_FGE_V_1_0_7_28/img40.png
2004-Nov-15 11:07:02 1539 bytes prism/private/wslib/WS/Class_Hazard_FGE_V_1_0_7_28/img41.png
2004-Nov-15 11:07:14 1563 bytes prism/private/wslib/WS/Class_Hazard_FGE_V_1_0_7_28/img42.png
2004-Nov-15 11:07:00 1122 bytes prism/private/wslib/WS/Class_Hazard_FGE_V_1_0_7_28/img43.png
2004-Nov-15 11:07:20 887 bytes prism/private/wslib/WS/Class_Hazard_FGE_V_1_0_7_28/img44.png
2004-Nov-15 11:07:22 1142 bytes prism/private/wslib/WS/Class_Hazard_FGE_V_1_0_7_28/img45.png
2004-Nov-15 11:07:10 1117 bytes prism/private/wslib/WS/Class_Hazard_FGE_V_1_0_7_28/img46.png
2004-Nov-15 11:07:18 856 bytes prism/private/wslib/WS/Class_Hazard_FGE_V_1_0_7_28/img47.png
2004-Nov-15 11:07:00 834 bytes prism/private/wslib/WS/Class_Hazard_FGE_V_1_0_7_28/img5.png
2004-Nov-15 11:07:14 901 bytes prism/private/wslib/WS/Class_Hazard_FGE_V_1_0_7_28/img6.png 2004-Nov-15 11:07:02 798 bytes prism/private/wslib/WS/Class_Hazard_FGE_V_1_0_7_28/img7.png
2004-Nov-15 11:07:10 474 bytes prism/private/wslib/WS/Class_Hazard_FGE_V_1_0_7_28/img8.png
2004-Nov-15 11:07:20 460 bytes prism/private/wslib/WS/Class_Hazard_FGE_V_1_0_7_28/img9.png
2004-Nov-15 11:07:24 21398 bytes prism/private/wslib/WS/Class_Hazard_FGE_V_1_0_7_28/index.html
2004-Nov-15 11:07:24 6250 bytes prism/private/wslib/WS/Class_Hazard_FGE_V_1_0_7_28/internals.pl
2004-Nov-15 11:07:44 6776 bytes prism/private/wslib/WS/Class_Hazard_FGE_V_1_0_7_28/labels.pl
2004-Nov-15 11:07:24 2523 bytes prism/private/wslib/WS/Class_Hazard_FGE_V_1_0_7_28/node1.html
2004-Dec-13 10:28:41 2244 bytes prism/private/wslib/WS/Class_Hazard_FVG_V_1_0_7_28
2004-Nov-15 11:07:32 315963 bytes prism/private/wslib/WS/Class_Hazard_FVG_V_1_0_7_28.pm
2004-Nov-15 11:07:32 4949 bytes prism/private/wslib/WS/Class_Hazard_FVG_V_1_0_7_28.tex
2004-Nov-15 11:07:32 315 bytes prism/private/wslib/WS/Class_Hazard_FVG_V_1_0_7_28.ws
2004-Nov-15 11:08:04 891 bytes prism/private/wslib/WS/Class_Hazard_FVG_V_1_0_7_28/Class_Hazard_FVG_V_1_0_7_28.css
2004-Nov-15 11:08:04 22769 bytes prism/private/wslib/WS/Class_Hazard_FVG_V_1_0_7_28/Class_Hazard_FVG_V_1_0_7_28.html
2004-Dec-13 10:28:41 1972 bytes prism/private/wslib/WS/Class_Hazard_FVG_V_1_0_7_28/EqnImages
2004-Nov-15 11:08:04 774 bytes prism/private/wslib/WS/Class_Hazard_FVG_V_1_0_7_28/EqnImages/BP_Eqn_0.png
2004-Nov-15 11:08:04 781 bytes prism/private/wslib/WS/Class_Hazard_FVG_V_1_0_7_28/EqnImages/BP_Eqn_1.png
2004-Nov-15 11:08:04 1261 bytes prism/private/wslib/WS/Class_Hazard_FVG_V_1_0_7_28/EqnImages/CalcKbp_CalcKb_Eqn_0.png
2004-Nov-15 11:08:04 971 bytes prism/private/wslib/WS/Class_Hazard_FVG_V_1_0_7_28/EqnImages/CalcKbp_CalcKv_Eqn_0.png
2004-Nov-15 11:08:04 736 bytes prism/private/wslib/WS/Class_Hazard_FVG_V_1_0_7_28/EqnImages/CalcKbp_CalcKv_Eqn_1.png
2004-Nov-15 11:08:06 793 bytes prism/private/wslib/WS/Class_Hazard_FVG_V_1_0_7_28/EqnImages/CalcKbp_CalcKv_Eqn_2.png
2004-Nov-15 11:08:06 727 bytes prism/private/wslib/WS/Class_Hazard_FVG_V_1_0_7_28/EqnImages/CalcKbp_CalcKv_Eqn_3.png
2004-Nov-15 11:08:06 437 bytes prism/private/wslib/WS/Class_Hazard_FVG_V_1_0_7_28/EqnImages/CalcKbp_Eqn_0.png
2004-Nov-15 11:08:06 374 bytes prism/private/wslib/WS/Class_Hazard_FVG_V_1_0_7_28/EqnImages/CalcKbp_Eqn_1.png
2004-Nov-15 11:08:06 625 bytes prism/private/wslib/WS/Class_Hazard_FVG_V_1_0_7_28/EqnImages/CalcVapMass_CF_Eqn_0.png
2004-Nov-15 11:08:06 827 bytes prism/private/wslib/WS/Class_Hazard_FVG_V_1_0_7_28/EqnImages/CalcVapMass_CF_Eqn_1.png
2004-Nov-15 11:08:06 1190 bytes prism/private/wslib/WS/Class_Hazard_FVG_V_1_0_7_28/EqnImages/CalcVapMass_CF_Eqn_10.png
2004-Nov-15 11:08:06 248 bytes prism/private/wslib/WS/Class_Hazard_FVG_V_1_0_7_28/EqnImages/CalcVapMass_CF_Eqn_2.png
2004-Nov-15 11:08:06 839 bytes prism/private/wslib/WS/Class_Hazard_FVG_V_1_0_7_28/EqnImages/CalcVapMass_CF_Eqn_3.png
2004-Nov-15 11:08:06 428 bytes prism/private/wslib/WS/Class_Hazard_FVG_V_1_0_7_28/EqnImages/CalcVapMass_CF_Eqn_4.png
2004-Nov-15 11:08:06 731 bytes prism/private/wslib/WS/Class_Hazard_FVG_V_1_0_7_28/EqnImages/CalcVapMass_CF_Eqn_5.png
2004-Nov-15 11:08:06 468 bytes prism/private/wslib/WS/Class_Hazard_FVG_V_1_0_7_28/EqnImages/CalcVapMass_CF_Eqn_6.png
2004-Nov-15 11:08:06 211 bytes prism/private/wslib/WS/Class_Hazard_FVG_V_1_0_7_28/EqnImages/CalcVapMass_CF_Eqn_7.png
2004-Nov-15 11:08:06 923 bytes prism/private/wslib/WS/Class_Hazard_FVG_V_1_0_7_28/EqnImages/CalcVapMass_CF_Eqn_8.png
2004-Nov-15 11:08:06 248 bytes prism/private/wslib/WS/Class_Hazard_FVG_V_1_0_7_28/EqnImages/CalcVapMass_CF_Eqn_9.png
2004-Nov-15 11:08:08 1813 bytes prism/private/wslib/WS/Class_Hazard_FVG_V_1_0_7_28/EqnImages/CalcVapMass_Eqn_0.png
2004-Nov-15 11:08:08 1374 bytes prism/private/wslib/WS/Class_Hazard_FVG_V_1_0_7_28/EqnImages/CalcVapMass_Eqn_1.png
2004-Nov-15 11:08:08 953 bytes prism/private/wslib/WS/Class_Hazard_FVG_V_1_0_7_28/EqnImages/PC_Eqn_0.png
2004-Nov-15 11:08:08 1054 bytes prism/private/wslib/WS/Class_Hazard_FVG_V_1_0_7_28/EqnImages/PVP_Eqn_0.png
2004-Nov-15 11:08:08 397 bytes prism/private/wslib/WS/Class_Hazard_FVG_V_1_0_7_28/EqnImages/PVP_Eqn_1.png
2004-Nov-15 11:08:08 1388 bytes prism/private/wslib/WS/Class_Hazard_FVG_V_1_0_7_28/EqnImages/P_Eqn_0.png
2004-Nov-15 11:08:08 1674 bytes prism/private/wslib/WS/Class_Hazard_FVG_V_1_0_7_28/EqnImages/P_Eqn_1.png
2004-Nov-15 11:08:08 1055 bytes prism/private/wslib/WS/Class_Hazard_FVG_V_1_0_7_28/EqnImages/P_Eqn_10.png
2004-Nov-15 11:08:08 1201 bytes prism/private/wslib/WS/Class_Hazard_FVG_V_1_0_7_28/EqnImages/P_Eqn_11.png
2004-Nov-15 11:08:08 1092 bytes prism/private/wslib/WS/Class_Hazard_FVG_V_1_0_7_28/EqnImages/P_Eqn_12.png
2004-Nov-15 11:08:08 802 bytes prism/private/wslib/WS/Class_Hazard_FVG_V_1_0_7_28/EqnImages/P_Eqn_13.png
2004-Nov-15 11:08:08 582 bytes prism/private/wslib/WS/Class_Hazard_FVG_V_1_0_7_28/EqnImages/P_Eqn_14.png
2004-Nov-15 11:08:08 1092 bytes prism/private/wslib/WS/Class_Hazard_FVG_V_1_0_7_28/EqnImages/P_Eqn_15.png
2004-Nov-15 11:08:08 616 bytes prism/private/wslib/WS/Class_Hazard_FVG_V_1_0_7_28/EqnImages/P_Eqn_16.png
2004-Nov-15 11:08:10 1147 bytes prism/private/wslib/WS/Class_Hazard_FVG_V_1_0_7_28/EqnImages/P_Eqn_17.png
2004-Nov-15 11:08:10 799 bytes prism/private/wslib/WS/Class_Hazard_FVG_V_1_0_7_28/EqnImages/P_Eqn_18.png
2004-Nov-15 11:08:10 689 bytes prism/private/wslib/WS/Class_Hazard_FVG_V_1_0_7_28/EqnImages/P_Eqn_19.png
2004-Nov-15 11:08:10 1383 bytes prism/private/wslib/WS/Class_Hazard_FVG_V_1_0_7_28/EqnImages/P_Eqn_2.png
2004-Nov-15 11:08:10 1399 bytes prism/private/wslib/WS/Class_Hazard_FVG_V_1_0_7_28/EqnImages/P_Eqn_3.png
2004-Nov-15 11:08:10 959 bytes prism/private/wslib/WS/Class_Hazard_FVG_V_1_0_7_28/EqnImages/P_Eqn_4.png
2004-Nov-15 11:08:10 821 bytes prism/private/wslib/WS/Class_Hazard_FVG_V_1_0_7_28/EqnImages/P_Eqn_5.png
2004-Nov-15 11:08:10 959 bytes prism/private/wslib/WS/Class_Hazard_FVG_V_1_0_7_28/EqnImages/P_Eqn_6.png
2004-Nov-15 11:08:10 986 bytes prism/private/wslib/WS/Class_Hazard_FVG_V_1_0_7_28/EqnImages/P_Eqn_7.png
2004-Nov-15 11:08:10 951 bytes prism/private/wslib/WS/Class_Hazard_FVG_V_1_0_7_28/EqnImages/P_Eqn_8.png
2004-Nov-15 11:08:10 717 bytes prism/private/wslib/WS/Class_Hazard_FVG_V_1_0_7_28/EqnImages/P_Eqn_9.png
2004-Nov-15 11:08:10 625 bytes prism/private/wslib/WS/Class_Hazard_FVG_V_1_0_7_28/EqnImages/VC_Eqn_0.png
2004-Nov-15 11:08:10 613 bytes prism/private/wslib/WS/Class_Hazard_FVG_V_1_0_7_28/EqnImages/VC_Eqn_1.png 2004-Nov-15 11:08:10 683 bytes prism/private/wslib/WS/Class_Hazard_FVG_V_1_0_7_28/EqnImages/VC_Eqn_10.png
2004-Nov-15 11:08:10 541 bytes prism/private/wslib/WS/Class_Hazard_FVG_V_1_0_7_28/EqnImages/VC_Eqn_2.png
2004-Nov-15 11:08:12 457 bytes prism/private/wslib/WS/Class_Hazard_FVG_V_1_0_7_28/EqnImages/VC_Eqn_3.png
2004-Nov-15 11:08:12 405 bytes prism/private/wslib/WS/Class_Hazard_FVG_V_1_0_7_28/EqnImages/VC_Eqn_4.png
2004-Nov-15 11:08:12 752 bytes prism/private/wslib/WS/Class_Hazard_FVG_V_1_0_7_28/EqnImages/VC_Eqn_5.png
2004-Nov-15 11:08:12 828 bytes prism/private/wslib/WS/Class_Hazard_FVG_V_1_0_7_28/EqnImages/VC_Eqn_6.png
2004-Nov-15 11:08:12 438 bytes prism/private/wslib/WS/Class_Hazard_FVG_V_1_0_7_28/EqnImages/VC_Eqn_7.png
2004-Nov-15 11:08:12 698 bytes prism/private/wslib/WS/Class_Hazard_FVG_V_1_0_7_28/EqnImages/VC_Eqn_8.png
2004-Nov-15 11:08:12 931 bytes prism/private/wslib/WS/Class_Hazard_FVG_V_1_0_7_28/EqnImages/VC_Eqn_9.png
2004-Nov-15 11:07:34 8 bytes prism/private/wslib/WS/Class_Hazard_FVG_V_1_0_7_28/images.aux
2004-Nov-15 11:07:34 18027 bytes prism/private/wslib/WS/Class_Hazard_FVG_V_1_0_7_28/images.log
2004-Nov-15 11:08:04 15818 bytes prism/private/wslib/WS/Class_Hazard_FVG_V_1_0_7_28/images.pl
2004-Nov-15 11:07:34 16091 bytes prism/private/wslib/WS/Class_Hazard_FVG_V_1_0_7_28/images.tex
2004-Nov-15 11:07:38 963 bytes prism/private/wslib/WS/Class_Hazard_FVG_V_1_0_7_28/img1.png
2004-Nov-15 11:08:00 723 bytes prism/private/wslib/WS/Class_Hazard_FVG_V_1_0_7_28/img10.png
2004-Nov-15 11:08:04 906 bytes prism/private/wslib/WS/Class_Hazard_FVG_V_1_0_7_28/img11.png
2004-Nov-15 11:07:40 1446 bytes prism/private/wslib/WS/Class_Hazard_FVG_V_1_0_7_28/img12.png
2004-Nov-15 11:07:50 262 bytes prism/private/wslib/WS/Class_Hazard_FVG_V_1_0_7_28/img13.png
2004-Nov-15 11:07:56 949 bytes prism/private/wslib/WS/Class_Hazard_FVG_V_1_0_7_28/img14.png
2004-Nov-15 11:07:46 515 bytes prism/private/wslib/WS/Class_Hazard_FVG_V_1_0_7_28/img15.png
2004-Nov-15 11:07:54 839 bytes prism/private/wslib/WS/Class_Hazard_FVG_V_1_0_7_28/img16.png
2004-Nov-15 11:07:46 520 bytes prism/private/wslib/WS/Class_Hazard_FVG_V_1_0_7_28/img17.png
2004-Nov-15 11:07:44 230 bytes prism/private/wslib/WS/Class_Hazard_FVG_V_1_0_7_28/img18.png
2004-Nov-15 11:08:00 1017 bytes prism/private/wslib/WS/Class_Hazard_FVG_V_1_0_7_28/img19.png
2004-Nov-15 11:07:58 872 bytes prism/private/wslib/WS/Class_Hazard_FVG_V_1_0_7_28/img2.png
2004-Nov-15 11:07:42 2114 bytes prism/private/wslib/WS/Class_Hazard_FVG_V_1_0_7_28/img20.png
2004-Nov-15 11:07:52 1606 bytes prism/private/wslib/WS/Class_Hazard_FVG_V_1_0_7_28/img21.png
2004-Nov-15 11:07:40 1069 bytes prism/private/wslib/WS/Class_Hazard_FVG_V_1_0_7_28/img22.png
2004-Nov-15 11:07:46 1176 bytes prism/private/wslib/WS/Class_Hazard_FVG_V_1_0_7_28/img23.png
2004-Nov-15 11:07:52 427 bytes prism/private/wslib/WS/Class_Hazard_FVG_V_1_0_7_28/img24.png
2004-Nov-15 11:07:50 1626 bytes prism/private/wslib/WS/Class_Hazard_FVG_V_1_0_7_28/img25.png
2004-Nov-15 11:08:02 1838 bytes prism/private/wslib/WS/Class_Hazard_FVG_V_1_0_7_28/img26.png
2004-Nov-15 11:07:48 1205 bytes prism/private/wslib/WS/Class_Hazard_FVG_V_1_0_7_28/img27.png
2004-Nov-15 11:07:52 1357 bytes prism/private/wslib/WS/Class_Hazard_FVG_V_1_0_7_28/img28.png
2004-Nov-15 11:07:44 1308 bytes prism/private/wslib/WS/Class_Hazard_FVG_V_1_0_7_28/img29.png
2004-Nov-15 11:08:02 1593 bytes prism/private/wslib/WS/Class_Hazard_FVG_V_1_0_7_28/img3.png
2004-Nov-15 11:07:56 933 bytes prism/private/wslib/WS/Class_Hazard_FVG_V_1_0_7_28/img30.png
2004-Nov-15 11:07:44 651 bytes prism/private/wslib/WS/Class_Hazard_FVG_V_1_0_7_28/img31.png
2004-Nov-15 11:07:40 678 bytes prism/private/wslib/WS/Class_Hazard_FVG_V_1_0_7_28/img32.png
2004-Nov-15 11:07:48 1288 bytes prism/private/wslib/WS/Class_Hazard_FVG_V_1_0_7_28/img33.png
2004-Nov-15 11:07:58 936 bytes prism/private/wslib/WS/Class_Hazard_FVG_V_1_0_7_28/img34.png
2004-Nov-15 11:07:38 811 bytes prism/private/wslib/WS/Class_Hazard_FVG_V_1_0_7_28/img35.png
2004-Nov-15 11:07:56 1539 bytes prism/private/wslib/WS/Class_Hazard_FVG_V_1_0_7_28/img36.png
2004-Nov-15 11:08:02 1563 bytes prism/private/wslib/WS/Class_Hazard_FVG_V_1_0_7_28/img37.png
2004-Nov-15 11:07:48 1122 bytes prism/private/wslib/WS/Class_Hazard_FVG_V_1_0_7_28/img38.png
2004-Nov-15 11:07:44 887 bytes prism/private/wslib/WS/Class_Hazard_FVG_V_1_0_7_28/img39.png
2004-Nov-15 11:08:00 1053 bytes prism/private/wslib/WS/Class_Hazard_FVG_V_1_0_7_28/img4.png
2004-Nov-15 11:07:54 1142 bytes prism/private/wslib/WS/Class_Hazard_FVG_V_1_0_7_28/img40.png
2004-Nov-15 11:07:42 1117 bytes prism/private/wslib/WS/Class_Hazard_FVG_V_1_0_7_28/img41.png
2004-Nov-15 11:07:54 856 bytes prism/private/wslib/WS/Class_Hazard_FVG_V_1_0_7_28/img42.png
2004-Nov-15 11:07:40 688 bytes prism/private/wslib/WS/Class_Hazard_FVG_V_1_0_7_28/img43.png
2004-Nov-15 11:08:02 691 bytes prism/private/wslib/WS/Class_Hazard_FVG_V_1_0_7_28/img44.png
2004-Nov-15 11:08:00 730 bytes prism/private/wslib/WS/Class_Hazard_FVG_V_1_0_7_28/img45.png
2004-Nov-15 11:08:04 668 bytes prism/private/wslib/WS/Class_Hazard_FVG_V_1_0_7_28/img46.png
2004-Nov-15 11:07:48 532 bytes prism/private/wslib/WS/Class_Hazard_FVG_V_1_0_7_28/img47.png
2004-Nov-15 11:07:58 468 bytes prism/private/wslib/WS/Class_Hazard_FVG_V_1_0_7_28/img48.png
2004-Nov-15 11:07:38 849 bytes prism/private/wslib/WS/Class_Hazard_FVG_V_1_0_7_28/img49.png
2004-Nov-15 11:07:42 834 bytes prism/private/wslib/WS/Class_Hazard_FVG_V_1_0_7_28/img5.png
2004-Nov-15 11:07:58 900 bytes prism/private/wslib/WS/Class_Hazard_FVG_V_1_0_7_28/img50.png
2004-Nov-15 11:07:56 464 bytes prism/private/wslib/WS/Class_Hazard_FVG_V_1_0_7_28/img51.png
2004-Nov-15 11:07:50 760 bytes prism/private/wslib/WS/Class_Hazard_FVG_V_1_0_7_28/img52.png 2004-Nov-15 11:07:54 1056 bytes prism/private/wslib/WS/Class_Hazard_FVG_V_1_0_7_28/img53.png
2004-Nov-15 11:07:38 901 bytes prism/private/wslib/WS/Class_Hazard_FVG_V_1_0_7_28/img6.png
2004-Nov-15 11:07:52 798 bytes prism/private/wslib/WS/Class_Hazard_FVG_V_1_0_7_28/img7.png
2004-Nov-15 11:07:42 474 bytes prism/private/wslib/WS/Class_Hazard_FVG_V_1_0_7_28/img8.png
2004-Nov-15 11:07:50 460 bytes prism/private/wslib/WS/Class_Hazard_FVG_V_1_0_7_28/img9.png
2004-Nov-15 11:08:04 22769 bytes prism/private/wslib/WS/Class_Hazard_FVG_V_1_0_7_28/index.html
2004-Nov-15 11:08:04 6914 bytes prism/private/wslib/WS/Class_Hazard_FVG_V_1_0_7_28/internals.pl
2004-Nov-15 11:08:14 7494 bytes prism/private/wslib/WS/Class_Hazard_FVG_V_1_0_7_28/labels.pl
2004-Nov-15 11:08:04 2523 bytes prism/private/wslib/WS/Class_Hazard_FVG_V_1_0_7_28/node1.html
2004-Dec-13 10:28:41 1530 bytes prism/private/wslib/WS/Class_Hazard_GF_2_1_0_7_28
2004-Nov-15 11:08:12 466499 bytes prism/private/wslib/WS/Class_Hazard_GF_2_1_0_7_28.pm
2004-Nov-15 11:08:12 3344 bytes prism/private/wslib/WS/Class_Hazard_GF_2_1_0_7_28.tex
2004-Nov-15 11:08:12 304 bytes prism/private/wslib/WS/Class_Hazard_GF_2_1_0_7_28.ws
2004-Nov-15 11:08:34 891 bytes prism/private/wslib/WS/Class_Hazard_GF_2_1_0_7_28/Class_Hazard_GF_2_1_0_7_28.css
2004-Nov-15 11:08:34 15702 bytes prism/private/wslib/WS/Class_Hazard_GF_2_1_0_7_28/Class_Hazard_GF_2_1_0_7_28.html
2004-Dec-13 10:28:41 1292 bytes prism/private/wslib/WS/Class_Hazard_GF_2_1_0_7_28/EqnImages
2004-Nov-15 11:08:34 774 bytes prism/private/wslib/WS/Class_Hazard_GF_2_1_0_7_28/EqnImages/BP_Eqn_0.png
2004-Nov-15 11:08:34 781 bytes prism/private/wslib/WS/Class_Hazard_GF_2_1_0_7_28/EqnImages/BP_Eqn_1.png
2004-Nov-15 11:08:34 957 bytes prism/private/wslib/WS/Class_Hazard_GF_2_1_0_7_28/EqnImages/CalcKbpLiquid_CalcKw_Eqn_0.png
2004-Nov-15 11:08:36 975 bytes prism/private/wslib/WS/Class_Hazard_GF_2_1_0_7_28/EqnImages/CalcKbpLiquid_CalcKw_Eqn_1.png
2004-Nov-15 11:08:36 736 bytes prism/private/wslib/WS/Class_Hazard_GF_2_1_0_7_28/EqnImages/CalcKbpLiquid_CalcKw_Eqn_2.png
2004-Nov-15 11:08:36 420 bytes prism/private/wslib/WS/Class_Hazard_GF_2_1_0_7_28/EqnImages/CalcKbpLiquid_Eqn_0.png
2004-Nov-15 11:08:36 420 bytes prism/private/wslib/WS/Class_Hazard_GF_2_1_0_7_28/EqnImages/CalcKbpLiquid_Eqn_1.png
2004-Nov-15 11:08:36 390 bytes prism/private/wslib/WS/Class_Hazard_GF_2_1_0_7_28/EqnImages/CalcKbpLiquid_Eqn_2.png
2004-Nov-15 11:08:36 1261 bytes prism/private/wslib/WS/Class_Hazard_GF_2_1_0_7_28/EqnImages/CalcKbpVapor_CalcKb_Eqn_0.png
2004-Nov-15 11:08:36 971 bytes prism/private/wslib/WS/Class_Hazard_GF_2_1_0_7_28/EqnImages/CalcKbpVapor_CalcKv_Eqn_0.png
2004-Nov-15 11:08:36 736 bytes prism/private/wslib/WS/Class_Hazard_GF_2_1_0_7_28/EqnImages/CalcKbpVapor_CalcKv_Eqn_1.png
2004-Nov-15 11:08:36 793 bytes prism/private/wslib/WS/Class_Hazard_GF_2_1_0_7_28/EqnImages/CalcKbpVapor_CalcKv_Eqn_2.png
2004-Nov-15 11:08:36 727 bytes prism/private/wslib/WS/Class_Hazard_GF_2_1_0_7_28/EqnImages/CalcKbpVapor_CalcKv_Eqn_3.png
2004-Nov-15 11:08:36 437 bytes prism/private/wslib/WS/Class_Hazard_GF_2_1_0_7_28/EqnImages/CalcKbpVapor_Eqn_0.png
2004-Nov-15 11:08:36 374 bytes prism/private/wslib/WS/Class_Hazard_GF_2_1_0_7_28/EqnImages/CalcKbpVapor_Eqn_1.png
2004-Nov-15 11:08:36 953 bytes prism/private/wslib/WS/Class_Hazard_GF_2_1_0_7_28/EqnImages/PC_Eqn_0.png
2004-Nov-15 11:08:36 1388 bytes prism/private/wslib/WS/Class_Hazard_GF_2_1_0_7_28/EqnImages/P_Eqn_0.png
2004-Nov-15 11:08:36 1674 bytes prism/private/wslib/WS/Class_Hazard_GF_2_1_0_7_28/EqnImages/P_Eqn_1.png
2004-Nov-15 11:08:38 1055 bytes prism/private/wslib/WS/Class_Hazard_GF_2_1_0_7_28/EqnImages/P_Eqn_10.png
2004-Nov-15 11:08:38 1201 bytes prism/private/wslib/WS/Class_Hazard_GF_2_1_0_7_28/EqnImages/P_Eqn_11.png
2004-Nov-15 11:08:38 1092 bytes prism/private/wslib/WS/Class_Hazard_GF_2_1_0_7_28/EqnImages/P_Eqn_12.png
2004-Nov-15 11:08:38 802 bytes prism/private/wslib/WS/Class_Hazard_GF_2_1_0_7_28/EqnImages/P_Eqn_13.png
2004-Nov-15 11:08:38 582 bytes prism/private/wslib/WS/Class_Hazard_GF_2_1_0_7_28/EqnImages/P_Eqn_14.png
2004-Nov-15 11:08:38 1092 bytes prism/private/wslib/WS/Class_Hazard_GF_2_1_0_7_28/EqnImages/P_Eqn_15.png
2004-Nov-15 11:08:38 616 bytes prism/private/wslib/WS/Class_Hazard_GF_2_1_0_7_28/EqnImages/P_Eqn_16.png
2004-Nov-15 11:08:38 1147 bytes prism/private/wslib/WS/Class_Hazard_GF_2_1_0_7_28/EqnImages/P_Eqn_17.png
2004-Nov-15 11:08:38 799 bytes prism/private/wslib/WS/Class_Hazard_GF_2_1_0_7_28/EqnImages/P_Eqn_18.png
2004-Nov-15 11:08:38 689 bytes prism/private/wslib/WS/Class_Hazard_GF_2_1_0_7_28/EqnImages/P_Eqn_19.png
2004-Nov-15 11:08:38 1383 bytes prism/private/wslib/WS/Class_Hazard_GF_2_1_0_7_28/EqnImages/P_Eqn_2.png
2004-Nov-15 11:08:38 1399 bytes prism/private/wslib/WS/Class_Hazard_GF_2_1_0_7_28/EqnImages/P_Eqn_3.png
2004-Nov-15 11:08:38 959 bytes prism/private/wslib/WS/Class_Hazard_GF_2_1_0_7_28/EqnImages/P_Eqn_4.png
2004-Nov-15 11:08:40 821 bytes prism/private/wslib/WS/Class_Hazard_GF_2_1_0_7_28/EqnImages/P_Eqn_5.png
2004-Nov-15 11:08:40 959 bytes prism/private/wslib/WS/Class_Hazard_GF_2_1_0_7_28/EqnImages/P_Eqn_6.png
2004-Nov-15 11:08:40 986 bytes prism/private/wslib/WS/Class_Hazard_GF_2_1_0_7_28/EqnImages/P_Eqn_7.png
2004-Nov-15 11:08:40 951 bytes prism/private/wslib/WS/Class_Hazard_GF_2_1_0_7_28/EqnImages/P_Eqn_8.png
2004-Nov-15 11:08:40 717 bytes prism/private/wslib/WS/Class_Hazard_GF_2_1_0_7_28/EqnImages/P_Eqn_9.png
2004-Nov-15 11:08:16 8 bytes prism/private/wslib/WS/Class_Hazard_GF_2_1_0_7_28/images.aux
2004-Nov-15 11:08:16 13118 bytes prism/private/wslib/WS/Class_Hazard_GF_2_1_0_7_28/images.log
2004-Nov-15 11:08:34 9798 bytes prism/private/wslib/WS/Class_Hazard_GF_2_1_0_7_28/images.pl
2004-Nov-15 11:08:16 12135 bytes prism/private/wslib/WS/Class_Hazard_GF_2_1_0_7_28/images.tex
2004-Nov-15 11:08:32 963 bytes prism/private/wslib/WS/Class_Hazard_GF_2_1_0_7_28/img1.png
2004-Nov-15 11:08:18 901 bytes prism/private/wslib/WS/Class_Hazard_GF_2_1_0_7_28/img10.png
2004-Nov-15 11:08:20 798 bytes prism/private/wslib/WS/Class_Hazard_GF_2_1_0_7_28/img11.png
2004-Nov-15 11:08:32 474 bytes prism/private/wslib/WS/Class_Hazard_GF_2_1_0_7_28/img12.png
2004-Nov-15 11:08:22 460 bytes prism/private/wslib/WS/Class_Hazard_GF_2_1_0_7_28/img13.png

```
2004-Nov-15 11:08:26   1069 bytes  prism/private/wslib/WS/Class_Hazard_GF_2_1_0_7_28/img14.png
2004-Nov-15 11:08:18   1626 bytes  prism/private/wslib/WS/Class_Hazard_GF_2_1_0_7_28/img15.png
2004-Nov-15 11:08:24   1838 bytes  prism/private/wslib/WS/Class_Hazard_GF_2_1_0_7_28/img16.png
2004-Nov-15 11:08:28   1205 bytes  prism/private/wslib/WS/Class_Hazard_GF_2_1_0_7_28/img17.png
2004-Nov-15 11:08:24   1357 bytes  prism/private/wslib/WS/Class_Hazard_GF_2_1_0_7_28/img18.png
2004-Nov-15 11:08:20   1308 bytes  prism/private/wslib/WS/Class_Hazard_GF_2_1_0_7_28/img19.png
2004-Nov-15 11:08:30    872 bytes  prism/private/wslib/WS/Class_Hazard_GF_2_1_0_7_28/img2.png
2004-Nov-15 11:08:30    933 bytes  prism/private/wslib/WS/Class_Hazard_GF_2_1_0_7_28/img20.png
2004-Nov-15 11:08:26    651 bytes  prism/private/wslib/WS/Class_Hazard_GF_2_1_0_7_28/img21.png
2004-Nov-15 11:08:28    678 bytes  prism/private/wslib/WS/Class_Hazard_GF_2_1_0_7_28/img22.png
2004-Nov-15 11:08:22   1288 bytes  prism/private/wslib/WS/Class_Hazard_GF_2_1_0_7_28/img23.png
2004-Nov-15 11:08:18    936 bytes  prism/private/wslib/WS/Class_Hazard_GF_2_1_0_7_28/img24.png
2004-Nov-15 11:08:32    811 bytes  prism/private/wslib/WS/Class_Hazard_GF_2_1_0_7_28/img25.png
2004-Nov-15 11:08:34   1539 bytes  prism/private/wslib/WS/Class_Hazard_GF_2_1_0_7_28/img26.png
2004-Nov-15 11:08:34   1563 bytes  prism/private/wslib/WS/Class_Hazard_GF_2_1_0_7_28/img27.png
2004-Nov-15 11:08:22   1122 bytes  prism/private/wslib/WS/Class_Hazard_GF_2_1_0_7_28/img28.png
2004-Nov-15 11:08:20    887 bytes  prism/private/wslib/WS/Class_Hazard_GF_2_1_0_7_28/img29.png
2004-Nov-15 11:08:30   1117 bytes  prism/private/wslib/WS/Class_Hazard_GF_2_1_0_7_28/img3.png
2004-Nov-15 11:08:30   1142 bytes  prism/private/wslib/WS/Class_Hazard_GF_2_1_0_7_28/img30.png
2004-Nov-15 11:08:32   1117 bytes  prism/private/wslib/WS/Class_Hazard_GF_2_1_0_7_28/img31.png
2004-Nov-15 11:08:26    856 bytes  prism/private/wslib/WS/Class_Hazard_GF_2_1_0_7_28/img32.png
2004-Nov-15 11:08:22   1099 bytes  prism/private/wslib/WS/Class_Hazard_GF_2_1_0_7_28/img4.png
2004-Nov-15 11:08:28    834 bytes  prism/private/wslib/WS/Class_Hazard_GF_2_1_0_7_28/img5.png
2004-Nov-15 11:08:26    467 bytes  prism/private/wslib/WS/Class_Hazard_GF_2_1_0_7_28/img6.png
2004-Nov-15 11:08:26    467 bytes  prism/private/wslib/WS/Class_Hazard_GF_2_1_0_7_28/img7.png
2004-Nov-15 11:08:20   1593 bytes  prism/private/wslib/WS/Class_Hazard_GF_2_1_0_7_28/img8.png
2004-Nov-15 11:08:24   1053 bytes  prism/private/wslib/WS/Class_Hazard_GF_2_1_0_7_28/img9.png
2004-Nov-15 11:08:34  15702 bytes  prism/private/wslib/WS/Class_Hazard_GF_2_1_0_7_28/index.html
2004-Nov-15 11:08:34   4486 bytes  prism/private/wslib/WS/Class_Hazard_GF_2_1_0_7_28/internals.pl
2004-Nov-15 11:08:44   4886 bytes  prism/private/wslib/WS/Class_Hazard_GF_2_1_0_7_28/labels.pl
2004-Nov-15 11:08:34   2512 bytes  prism/private/wslib/WS/Class_Hazard_GF_2_1_0_7_28/node1.html
2004-Dec-13 10:28:41   1428 bytes  prism/private/wslib/WS/Class_Hazard_GF_L_1_0_7_28
2004-Nov-15 11:08:40 226998 bytes  prism/private/wslib/WS/Class_Hazard_GF_L_1_0_7_28.pm
2004-Nov-15 11:08:40   2994 bytes  prism/private/wslib/WS/Class_Hazard_GF_L_1_0_7_28.tex
2004-Nov-15 11:08:40    301 bytes  prism/private/wslib/WS/Class_Hazard_GF_L_1_0_7_28.ws
2004-Nov-15 11:09:02    891 bytes  prism/private/wslib/WS/Class_Hazard_GF_L_1_0_7_28/Class_Hazard_GF_L_1_0_7_28.css
2004-Nov-15 11:09:02  14328 bytes  prism/private/wslib/WS/Class_Hazard_GF_L_1_0_7_28/Class_Hazard_GF_L_1_0_7_28.html
2004-Dec-13 10:28:41   1156 bytes  prism/private/wslib/WS/Class_Hazard_GF_L_1_0_7_28/EqnImages
2004-Nov-15 11:09:02    774 bytes  prism/private/wslib/WS/Class_Hazard_GF_L_1_0_7_28/EqnImages/BP_Eqn_0.png
2004-Nov-15 11:09:02    781 bytes  prism/private/wslib/WS/Class_Hazard_GF_L_1_0_7_28/EqnImages/BP_Eqn_1.png
2004-Nov-15 11:09:02    957 bytes  prism/private/wslib/WS/Class_Hazard_GF_L_1_0_7_28/EqnImages/CalcKbp_CalcKw_Eqn_0.png
2004-Nov-15 11:09:02    975 bytes  prism/private/wslib/WS/Class_Hazard_GF_L_1_0_7_28/EqnImages/CalcKbp_CalcKw_Eqn_1.png
2004-Nov-15 11:09:02    736 bytes  prism/private/wslib/WS/Class_Hazard_GF_L_1_0_7_28/EqnImages/CalcKbp_CalcKw_Eqn_2.png
2004-Nov-15 11:09:02    420 bytes  prism/private/wslib/WS/Class_Hazard_GF_L_1_0_7_28/EqnImages/CalcKbp_Eqn_0.png
2004-Nov-15 11:09:02    420 bytes  prism/private/wslib/WS/Class_Hazard_GF_L_1_0_7_28/EqnImages/CalcKbp_Eqn_1.png
2004-Nov-15 11:09:02    390 bytes  prism/private/wslib/WS/Class_Hazard_GF_L_1_0_7_28/EqnImages/CalcKbp_Eqn_2.png
2004-Nov-15 11:09:02   1748 bytes  prism/private/wslib/WS/Class_Hazard_GF_L_1_0_7_28/EqnImages/CalcLiquidVol_Eqn_0.png
2004-Nov-15 11:09:02   1195 bytes  prism/private/wslib/WS/Class_Hazard_GF_L_1_0_7_28/EqnImages/LP_Eqn_0.png
2004-Nov-15 11:09:02    953 bytes  prism/private/wslib/WS/Class_Hazard_GF_L_1_0_7_28/EqnImages/PC_Eqn_0.png
2004-Nov-15 11:09:02    773 bytes  prism/private/wslib/WS/Class_Hazard_GF_L_1_0_7_28/EqnImages/PD_Eqn_0.png
2004-Nov-15 11:09:04   1388 bytes  prism/private/wslib/WS/Class_Hazard_GF_L_1_0_7_28/EqnImages/P_Eqn_0.png
2004-Nov-15 11:09:04   1674 bytes  prism/private/wslib/WS/Class_Hazard_GF_L_1_0_7_28/EqnImages/P_Eqn_1.png
2004-Nov-15 11:09:04   1055 bytes  prism/private/wslib/WS/Class_Hazard_GF_L_1_0_7_28/EqnImages/P_Eqn_10.png
2004-Nov-15 11:09:04   1201 bytes  prism/private/wslib/WS/Class_Hazard_GF_L_1_0_7_28/EqnImages/P_Eqn_11.png
2004-Nov-15 11:09:04   1092 bytes  prism/private/wslib/WS/Class_Hazard_GF_L_1_0_7_28/EqnImages/P_Eqn_12.png
2004-Nov-15 11:09:04    802 bytes  prism/private/wslib/WS/Class_Hazard_GF_L_1_0_7_28/EqnImages/P_Eqn_13.png
2004-Nov-15 11:09:04    582 bytes  prism/private/wslib/WS/Class_Hazard_GF_L_1_0_7_28/EqnImages/P_Eqn_14.png
2004-Nov-15 11:09:04   1092 bytes  prism/private/wslib/WS/Class_Hazard_GF_L_1_0_7_28/EqnImages/P_Eqn_15.png
2004-Nov-15 11:09:04    616 bytes  prism/private/wslib/WS/Class_Hazard_GF_L_1_0_7_28/EqnImages/P_Eqn_16.png
2004-Nov-15 11:09:04   1147 bytes  prism/private/wslib/WS/Class_Hazard_GF_L_1_0_7_28/EqnImages/P_Eqn_17.png
2004-Nov-15 11:09:04    799 bytes  prism/private/wslib/WS/Class_Hazard_GF_L_1_0_7_28/EqnImages/P_Eqn_18.png
```

2004-Nov-15 11:09:04 689 bytes prism/private/wslib/WS/Class_Hazard_GF_L_1_0_7_28/EqnImages/P_Eqn_19.png
2004-Nov-15 11:09:04 1383 bytes prism/private/wslib/WS/Class_Hazard_GF_L_1_0_7_28/EqnImages/P_Eqn_2.png
2004-Nov-15 11:09:06 1399 bytes prism/private/wslib/WS/Class_Hazard_GF_L_1_0_7_28/EqnImages/P_Eqn_3.png
2004-Nov-15 11:09:06 959 bytes prism/private/wslib/WS/Class_Hazard_GF_L_1_0_7_28/EqnImages/P_Eqn_4.png
2004-Nov-15 11:09:06 821 bytes prism/private/wslib/WS/Class_Hazard_GF_L_1_0_7_28/EqnImages/P_Eqn_5.png
2004-Nov-15 11:09:06 959 bytes prism/private/wslib/WS/Class_Hazard_GF_L_1_0_7_28/EqnImages/P_Eqn_6.png
2004-Nov-15 11:09:06 986 bytes prism/private/wslib/WS/Class_Hazard_GF_L_1_0_7_28/EqnImages/P_Eqn_7.png
2004-Nov-15 11:09:06 951 bytes prism/private/wslib/WS/Class_Hazard_GF_L_1_0_7_28/EqnImages/P_Eqn_8.png
2004-Nov-15 11:09:06 717 bytes prism/private/wslib/WS/Class_Hazard_GF_L_1_0_7_28/EqnImages/P_Eqn_9.png
2004-Nov-15 11:08:42 8 bytes prism/private/wslib/WS/Class_Hazard_GF_L_1_0_7_28/images.aux
2004-Nov-15 11:08:42 12950 bytes prism/private/wslib/WS/Class_Hazard_GF_L_1_0_7_28/images.log
2004-Nov-15 11:09:02 9095 bytes prism/private/wslib/WS/Class_Hazard_GF_L_1_0_7_28/images.pl
2004-Nov-15 11:08:42 11667 bytes prism/private/wslib/WS/Class_Hazard_GF_L_1_0_7_28/images.tex
2004-Nov-15 11:08:58 963 bytes prism/private/wslib/WS/Class_Hazard_GF_L_1_0_7_28/img1.png
2004-Nov-15 11:08:46 1069 bytes prism/private/wslib/WS/Class_Hazard_GF_L_1_0_7_28/img10.png
2004-Nov-15 11:08:50 874 bytes prism/private/wslib/WS/Class_Hazard_GF_L_1_0_7_28/img11.png
2004-Nov-15 11:08:54 1626 bytes prism/private/wslib/WS/Class_Hazard_GF_L_1_0_7_28/img12.png
2004-Nov-15 11:08:54 1838 bytes prism/private/wslib/WS/Class_Hazard_GF_L_1_0_7_28/img13.png
2004-Nov-15 11:08:50 1205 bytes prism/private/wslib/WS/Class_Hazard_GF_L_1_0_7_28/img14.png
2004-Nov-15 11:08:58 1357 bytes prism/private/wslib/WS/Class_Hazard_GF_L_1_0_7_28/img15.png
2004-Nov-15 11:08:54 1308 bytes prism/private/wslib/WS/Class_Hazard_GF_L_1_0_7_28/img16.png
2004-Nov-15 11:08:46 933 bytes prism/private/wslib/WS/Class_Hazard_GF_L_1_0_7_28/img17.png
2004-Nov-15 11:08:48 651 bytes prism/private/wslib/WS/Class_Hazard_GF_L_1_0_7_28/img18.png
2004-Nov-15 11:08:46 678 bytes prism/private/wslib/WS/Class_Hazard_GF_L_1_0_7_28/img19.png
2004-Nov-15 11:08:52 872 bytes prism/private/wslib/WS/Class_Hazard_GF_L_1_0_7_28/img2.png
2004-Nov-15 11:09:00 1288 bytes prism/private/wslib/WS/Class_Hazard_GF_L_1_0_7_28/img20.png
2004-Nov-15 11:08:52 936 bytes prism/private/wslib/WS/Class_Hazard_GF_L_1_0_7_28/img21.png
2004-Nov-15 11:09:02 811 bytes prism/private/wslib/WS/Class_Hazard_GF_L_1_0_7_28/img22.png
2004-Nov-15 11:08:54 1539 bytes prism/private/wslib/WS/Class_Hazard_GF_L_1_0_7_28/img23.png
2004-Nov-15 11:08:56 1563 bytes prism/private/wslib/WS/Class_Hazard_GF_L_1_0_7_28/img24.png
2004-Nov-15 11:08:48 1122 bytes prism/private/wslib/WS/Class_Hazard_GF_L_1_0_7_28/img25.png
2004-Nov-15 11:08:56 887 bytes prism/private/wslib/WS/Class_Hazard_GF_L_1_0_7_28/img26.png
2004-Nov-15 11:09:00 1142 bytes prism/private/wslib/WS/Class_Hazard_GF_L_1_0_7_28/img27.png
2004-Nov-15 11:08:50 1117 bytes prism/private/wslib/WS/Class_Hazard_GF_L_1_0_7_28/img28.png
2004-Nov-15 11:08:58 856 bytes prism/private/wslib/WS/Class_Hazard_GF_L_1_0_7_28/img29.png
2004-Nov-15 11:08:50 1117 bytes prism/private/wslib/WS/Class_Hazard_GF_L_1_0_7_28/img3.png
2004-Nov-15 11:08:48 1099 bytes prism/private/wslib/WS/Class_Hazard_GF_L_1_0_7_28/img4.png
2004-Nov-15 11:08:58 834 bytes prism/private/wslib/WS/Class_Hazard_GF_L_1_0_7_28/img5.png
2004-Nov-15 11:08:56 467 bytes prism/private/wslib/WS/Class_Hazard_GF_L_1_0_7_28/img6.png
2004-Nov-15 11:09:00 467 bytes prism/private/wslib/WS/Class_Hazard_GF_L_1_0_7_28/img7.png
2004-Nov-15 11:08:52 2074 bytes prism/private/wslib/WS/Class_Hazard_GF_L_1_0_7_28/img8.png
2004-Nov-15 11:08:48 1292 bytes prism/private/wslib/WS/Class_Hazard_GF_L_1_0_7_28/img9.png
2004-Nov-15 11:09:02 14328 bytes prism/private/wslib/WS/Class_Hazard_GF_L_1_0_7_28/index.html
2004-Nov-15 11:09:02 3888 bytes prism/private/wslib/WS/Class_Hazard_GF_L_1_0_7_28/internals.pl
2004-Nov-15 11:09:14 4252 bytes prism/private/wslib/WS/Class_Hazard_GF_L_1_0_7_28/labels.pl
2004-Nov-15 11:09:02 2512 bytes prism/private/wslib/WS/Class_Hazard_GF_L_1_0_7_28/node1.html
2004-Dec-13 10:28:42 1972 bytes prism/private/wslib/WS/Class_Hazard_GF_S_1_0_7_28
2004-Nov-15 11:09:06 249021 bytes prism/private/wslib/WS/Class_Hazard_GF_S_1_0_7_28.pm
2004-Nov-15 11:09:06 4180 bytes prism/private/wslib/WS/Class_Hazard_GF_S_1_0_7_28.tex
2004-Nov-15 11:09:06 299 bytes prism/private/wslib/WS/Class_Hazard_GF_S_1_0_7_28.ws
2004-Nov-15 11:09:36 891 bytes prism/private/wslib/WS/Class_Hazard_GF_S_1_0_7_28/Class_Hazard_GF_S_1_0_7_28.css
2004-Nov-15 11:09:36 19838 bytes prism/private/wslib/WS/Class_Hazard_GF_S_1_0_7_28/Class_Hazard_GF_S_1_0_7_28.html
2004-Dec-13 10:28:41 1700 bytes prism/private/wslib/WS/Class_Hazard_GF_S_1_0_7_28/EqnImages
2004-Nov-15 11:09:36 774 bytes prism/private/wslib/WS/Class_Hazard_GF_S_1_0_7_28/EqnImages/BP_Eqn_0.png
2004-Nov-15 11:09:36 781 bytes prism/private/wslib/WS/Class_Hazard_GF_S_1_0_7_28/EqnImages/BP_Eqn_1.png
2004-Nov-15 11:09:36 625 bytes prism/private/wslib/WS/Class_Hazard_GF_S_1_0_7_28/EqnImages/CF_Eqn_0.png
2004-Nov-15 11:09:36 827 bytes prism/private/wslib/WS/Class_Hazard_GF_S_1_0_7_28/EqnImages/CF_Eqn_1.png
2004-Nov-15 11:09:36 1190 bytes prism/private/wslib/WS/Class_Hazard_GF_S_1_0_7_28/EqnImages/CF_Eqn_10.png
2004-Nov-15 11:09:36 248 bytes prism/private/wslib/WS/Class_Hazard_GF_S_1_0_7_28/EqnImages/CF_Eqn_2.png
2004-Nov-15 11:09:38 839 bytes prism/private/wslib/WS/Class_Hazard_GF_S_1_0_7_28/EqnImages/CF_Eqn_3.png
2004-Nov-15 11:09:38 428 bytes prism/private/wslib/WS/Class_Hazard_GF_S_1_0_7_28/EqnImages/CF_Eqn_4.png 2004-Nov-15 11:09:38 731 bytes prism/private/wslib/WS/Class_Hazard_GF_S_1_0_7_28/EqnImages/CF_Eqn_5.png
2004-Nov-15 11:09:38 468 bytes prism/private/wslib/WS/Class_Hazard_GF_S_1_0_7_28/EqnImages/CF_Eqn_6.png
2004-Nov-15 11:09:38 211 bytes prism/private/wslib/WS/Class_Hazard_GF_S_1_0_7_28/EqnImages/CF_Eqn_7.png
2004-Nov-15 11:09:38 923 bytes prism/private/wslib/WS/Class_Hazard_GF_S_1_0_7_28/EqnImages/CF_Eqn_8.png
2004-Nov-15 11:09:38 248 bytes prism/private/wslib/WS/Class_Hazard_GF_S_1_0_7_28/EqnImages/CF_Eqn_9.png
2004-Nov-15 11:09:38 1261 bytes prism/private/wslib/WS/Class_Hazard_GF_S_1_0_7_28/EqnImages/CalcKbp_CalcKb_Eqn_0.png
2004-Nov-15 11:09:38 971 bytes prism/private/wslib/WS/Class_Hazard_GF_S_1_0_7_28/EqnImages/CalcKbp_CalcKv_Eqn_0.png
2004-Nov-15 11:09:38 736 bytes prism/private/wslib/WS/Class_Hazard_GF_S_1_0_7_28/EqnImages/CalcKbp_CalcKv_Eqn_1.png
2004-Nov-15 11:09:38 793 bytes prism/private/wslib/WS/Class_Hazard_GF_S_1_0_7_28/EqnImages/CalcKbp_CalcKv_Eqn_2.png
2004-Nov-15 11:09:38 727 bytes prism/private/wslib/WS/Class_Hazard_GF_S_1_0_7_28/EqnImages/CalcKbp_CalcKv_Eqn_3.png
2004-Nov-15 11:09:38 437 bytes prism/private/wslib/WS/Class_Hazard_GF_S_1_0_7_28/EqnImages/CalcKbp_Eqn_0.png
2004-Nov-15 11:09:38 374 bytes prism/private/wslib/WS/Class_Hazard_GF_S_1_0_7_28/EqnImages/CalcKbp_Eqn_1.png
2004-Nov-15 11:09:40 378 bytes prism/private/wslib/WS/Class_Hazard_GF_S_1_0_7_28/EqnImages/CalcKn_Eqn_0.png
2004-Nov-15 11:09:40 777 bytes prism/private/wslib/WS/Class_Hazard_GF_S_1_0_7_28/EqnImages/CalcKn_Eqn_1.png
2004-Nov-15 11:09:40 1395 bytes prism/private/wslib/WS/Class_Hazard_GF_S_1_0_7_28/EqnImages/CalcKn_Eqn_2.png
2004-Nov-15 11:09:40 960 bytes prism/private/wslib/WS/Class_Hazard_GF_S_1_0_7_28/EqnImages/CalcKn_Eqn_3.png
2004-Nov-15 11:09:40 1431 bytes prism/private/wslib/WS/Class_Hazard_GF_S_1_0_7_28/EqnImages/CalcSteam_Eqn_0.png
2004-Nov-15 11:09:40 953 bytes prism/private/wslib/WS/Class_Hazard_GF_S_1_0_7_28/EqnImages/PC_Eqn_0.png
2004-Nov-15 11:09:40 1054 bytes prism/private/wslib/WS/Class_Hazard_GF_S_1_0_7_28/EqnImages/PVP_Eqn_0.png
2004-Nov-15 11:09:40 397 bytes prism/private/wslib/WS/Class_Hazard_GF_S_1_0_7_28/EqnImages/PVP_Eqn_1.png
2004-Nov-15 11:09:40 1388 bytes prism/private/wslib/WS/Class_Hazard_GF_S_1_0_7_28/EqnImages/P_Eqn_0.png
2004-Nov-15 11:09:40 1674 bytes prism/private/wslib/WS/Class_Hazard_GF_S_1_0_7_28/EqnImages/P_Eqn_1.png
2004-Nov-15 11:09:40 1055 bytes prism/private/wslib/WS/Class_Hazard_GF_S_1_0_7_28/EqnImages/P_Eqn_10.png
2004-Nov-15 11:09:40 1201 bytes prism/private/wslib/WS/Class_Hazard_GF_S_1_0_7_28/EqnImages/P_Eqn_11.png
2004-Nov-15 11:09:40 1092 bytes prism/private/wslib/WS/Class_Hazard_GF_S_1_0_7_28/EqnImages/P_Eqn_12.png
2004-Nov-15 11:09:40 802 bytes prism/private/wslib/WS/Class_Hazard_GF_S_1_0_7_28/EqnImages/P_Eqn_13.png
2004-Nov-15 11:09:42 582 bytes prism/private/wslib/WS/Class_Hazard_GF_S_1_0_7_28/EqnImages/P_Eqn_14.png
2004-Nov-15 11:09:42 1092 bytes prism/private/wslib/WS/Class_Hazard_GF_S_1_0_7_28/EqnImages/P_Eqn_15.png
2004-Nov-15 11:09:42 616 bytes prism/private/wslib/WS/Class_Hazard_GF_S_1_0_7_28/EqnImages/P_Eqn_16.png
2004-Nov-15 11:09:42 1147 bytes prism/private/wslib/WS/Class_Hazard_GF_S_1_0_7_28/EqnImages/P_Eqn_17.png
2004-Nov-15 11:09:42 799 bytes prism/private/wslib/WS/Class_Hazard_GF_S_1_0_7_28/EqnImages/P_Eqn_18.png
2004-Nov-15 11:09:42 689 bytes prism/private/wslib/WS/Class_Hazard_GF_S_1_0_7_28/EqnImages/P_Eqn_19.png
2004-Nov-15 11:09:42 1383 bytes prism/private/wslib/WS/Class_Hazard_GF_S_1_0_7_28/EqnImages/P_Eqn_2.png
2004-Nov-15 11:09:42 1399 bytes prism/private/wslib/WS/Class_Hazard_GF_S_1_0_7_28/EqnImages/P_Eqn_3.png
2004-Nov-15 11:09:42 959 bytes prism/private/wslib/WS/Class_Hazard_GF_S_1_0_7_28/EqnImages/P_Eqn_4.png
2004-Nov-15 11:09:42 821 bytes prism/private/wslib/WS/Class_Hazard_GF_S_1_0_7_28/EqnImages/P_Eqn_5.png
2004-Nov-15 11:09:42 959 bytes prism/private/wslib/WS/Class_Hazard_GF_S_1_0_7_28/EqnImages/P_Eqn_6.png
2004-Nov-15 11:09:42 986 bytes prism/private/wslib/WS/Class_Hazard_GF_S_1_0_7_28/EqnImages/P_Eqn_7.png
2004-Nov-15 11:09:42 951 bytes prism/private/wslib/WS/Class_Hazard_GF_S_1_0_7_28/EqnImages/P_Eqn_8.png
2004-Nov-15 11:09:42 717 bytes prism/private/wslib/WS/Class_Hazard_GF_S_1_0_7_28/EqnImages/P_Eqn_9.png
2004-Nov-15 11:09:10 8 bytes prism/private/wslib/WS/Class_Hazard_GF_S_1_0_7_28/images.aux
2004-Nov-15 11:09:10 15041 bytes prism/private/wslib/WS/Class_Hazard_GF_S_1_0_7_28/images.log
2004-Nov-15 11:09:36 13562 bytes prism/private/wslib/WS/Class_Hazard_GF_S_1_0_7_28/images.pl
2004-Nov-15 11:09:08 14578 bytes prism/private/wslib/WS/Class_Hazard_GF_S_1_0_7_28/images.tex
2004-Nov-15 11:09:30 963 bytes prism/private/wslib/WS/Class_Hazard_GF_S_1_0_7_28/img1.png
2004-Nov-15 11:09:26 520 bytes prism/private/wslib/WS/Class_Hazard_GF_S_1_0_7_28/img10.png
2004-Nov-15 11:09:36 230 bytes prism/private/wslib/WS/Class_Hazard_GF_S_1_0_7_28/img11.png
2004-Nov-15 11:09:16 1017 bytes prism/private/wslib/WS/Class_Hazard_GF_S_1_0_7_28/img12.png
2004-Nov-15 11:09:32 1593 bytes prism/private/wslib/WS/Class_Hazard_GF_S_1_0_7_28/img13.png
2004-Nov-15 11:09:30 1053 bytes prism/private/wslib/WS/Class_Hazard_GF_S_1_0_7_28/img14.png
2004-Nov-15 11:09:26 834 bytes prism/private/wslib/WS/Class_Hazard_GF_S_1_0_7_28/img15.png
2004-Nov-15 11:09:28 901 bytes prism/private/wslib/WS/Class_Hazard_GF_S_1_0_7_28/img16.png
2004-Nov-15 11:09:34 798 bytes prism/private/wslib/WS/Class_Hazard_GF_S_1_0_7_28/img17.png
2004-Nov-15 11:09:16 474 bytes prism/private/wslib/WS/Class_Hazard_GF_S_1_0_7_28/img18.png
2004-Nov-15 11:09:22 460 bytes prism/private/wslib/WS/Class_Hazard_GF_S_1_0_7_28/img19.png
2004-Nov-15 11:09:34 872 bytes prism/private/wslib/WS/Class_Hazard_GF_S_1_0_7_28/img2.png
2004-Nov-15 11:09:24 410 bytes prism/private/wslib/WS/Class_Hazard_GF_S_1_0_7_28/img20.png
2004-Nov-15 11:09:24 862 bytes prism/private/wslib/WS/Class_Hazard_GF_S_1_0_7_28/img21.png
2004-Nov-15 11:09:22 1632 bytes prism/private/wslib/WS/Class_Hazard_GF_S_1_0_7_28/img22.png
2004-Nov-15 11:09:12 1094 bytes prism/private/wslib/WS/Class_Hazard_GF_S_1_0_7_28/img23.png
2004-Nov-15 11:09:20 1652 bytes prism/private/wslib/WS/Class_Hazard_GF_S_1_0_7_28/img24.png 2004-Nov-15 11:09:16 1069 bytes prism/private/wslib/WS/Class_Hazard_GF_S_1_0_7_28/img25.png
2004-Nov-15 11:09:30 1176 bytes prism/private/wslib/WS/Class_Hazard_GF_S_1_0_7_28/img26.png
2004-Nov-15 11:09:18 427 bytes prism/private/wslib/WS/Class_Hazard_GF_S_1_0_7_28/img27.png
2004-Nov-15 11:09:14 1626 bytes prism/private/wslib/WS/Class_Hazard_GF_S_1_0_7_28/img28.png
2004-Nov-15 11:09:34 1838 bytes prism/private/wslib/WS/Class_Hazard_GF_S_1_0_7_28/img29.png
2004-Nov-15 11:09:20 723 bytes prism/private/wslib/WS/Class_Hazard_GF_S_1_0_7_28/img3.png
2004-Nov-15 11:09:18 1205 bytes prism/private/wslib/WS/Class_Hazard_GF_S_1_0_7_28/img30.png
2004-Nov-15 11:09:18 1357 bytes prism/private/wslib/WS/Class_Hazard_GF_S_1_0_7_28/img31.png
2004-Nov-15 11:09:30 1308 bytes prism/private/wslib/WS/Class_Hazard_GF_S_1_0_7_28/img32.png
2004-Nov-15 11:09:14 933 bytes prism/private/wslib/WS/Class_Hazard_GF_S_1_0_7_28/img33.png
2004-Nov-15 11:09:32 651 bytes prism/private/wslib/WS/Class_Hazard_GF_S_1_0_7_28/img34.png
2004-Nov-15 11:09:28 678 bytes prism/private/wslib/WS/Class_Hazard_GF_S_1_0_7_28/img35.png
2004-Nov-15 11:09:22 1288 bytes prism/private/wslib/WS/Class_Hazard_GF_S_1_0_7_28/img36.png
2004-Nov-15 11:09:28 936 bytes prism/private/wslib/WS/Class_Hazard_GF_S_1_0_7_28/img37.png
2004-Nov-15 11:09:14 811 bytes prism/private/wslib/WS/Class_Hazard_GF_S_1_0_7_28/img38.png
2004-Nov-15 11:09:14 1539 bytes prism/private/wslib/WS/Class_Hazard_GF_S_1_0_7_28/img39.png
2004-Nov-15 11:09:24 906 bytes prism/private/wslib/WS/Class_Hazard_GF_S_1_0_7_28/img4.png
2004-Nov-15 11:09:32 1563 bytes prism/private/wslib/WS/Class_Hazard_GF_S_1_0_7_28/img40.png
2004-Nov-15 11:09:20 1122 bytes prism/private/wslib/WS/Class_Hazard_GF_S_1_0_7_28/img41.png
2004-Nov-15 11:09:20 887 bytes prism/private/wslib/WS/Class_Hazard_GF_S_1_0_7_28/img42.png
2004-Nov-15 11:09:24 1142 bytes prism/private/wslib/WS/Class_Hazard_GF_S_1_0_7_28/img43.png
2004-Nov-15 11:09:34 1117 bytes prism/private/wslib/WS/Class_Hazard_GF_S_1_0_7_28/img44.png
2004-Nov-15 11:09:12 856 bytes prism/private/wslib/WS/Class_Hazard_GF_S_1_0_7_28/img45.png
2004-Nov-15 11:09:36 1446 bytes prism/private/wslib/WS/Class_Hazard_GF_S_1_0_7_28/img5.png
2004-Nov-15 11:09:22 262 bytes prism/private/wslib/WS/Class_Hazard_GF_S_1_0_7_28/img6.png
2004-Nov-15 11:09:26 949 bytes prism/private/wslib/WS/Class_Hazard_GF_S_1_0_7_28/img7.png
2004-Nov-15 11:09:16 515 bytes prism/private/wslib/WS/Class_Hazard_GF_S_1_0_7_28/img8.png
2004-Nov-15 11:09:28 839 bytes prism/private/wslib/WS/Class_Hazard_GF_S_1_0_7_28/img9.png
2004-Nov-15 11:09:36 19838 bytes prism/private/wslib/WS/Class_Hazard_GF_S_1_0_7_28/index.html
2004-Nov-15 11:09:36 5794 bytes prism/private/wslib/WS/Class_Hazard_GF_S_1_0_7_28/internals.pl
2004-Nov-15 11:09:44 6302 bytes prism/private/wslib/WS/Class_Hazard_GF_S_1_0_7_28/labels.pl
2004-Nov-15 11:09:36 2512 bytes prism/private/wslib/WS/Class_Hazard_GF_S_1_0_7_28/node1.html
2004-Dec-13 10:28:42 1938 bytes prism/private/wslib/WS/Class_Hazard_GF_V_1_0_7_28
2004-Nov-15 11:09:44 279495 bytes prism/private/wslib/WS/Class_Hazard_GF_V_1_0_7_28.pm
2004-Nov-15 11:09:44 5546 bytes prism/private/wslib/WS/Class_Hazard_GF_V_1_0_7_28.tex
2004-Nov-15 11:09:44 300 bytes prism/private/wslib/WS/Class_Hazard_GF_V_1_0_7_28.ws
2004-Nov-15 11:10:14 891 bytes prism/private/wslib/WS/Class_Hazard_GF_V_1_0_7_28/Class_Hazard_GF_V_1_0_7_28.css
2004-Nov-15 11:10:14 24115 bytes prism/private/wslib/WS/Class_Hazard_GF_V_1_0_7_28/Class_Hazard_GF_V_1_0_7_28.html
2004-Dec-13 10:28:42 2040 bytes prism/private/wslib/WS/Class_Hazard_GF_V_1_0_7_28/EqnImages
2004-Nov-15 11:10:16 774 bytes prism/private/wslib/WS/Class_Hazard_GF_V_1_0_7_28/EqnImages/BP_Eqn_0.png
2004-Nov-15 11:10:16 781 bytes prism/private/wslib/WS/Class_Hazard_GF_V_1_0_7_28/EqnImages/BP_Eqn_1.png
2004-Nov-15 11:10:16 625 bytes prism/private/wslib/WS/Class_Hazard_GF_V_1_0_7_28/EqnImages/CalcGasVol_CF_Eqn_0.png
2004-Nov-15 11:10:16 827 bytes prism/private/wslib/WS/Class_Hazard_GF_V_1_0_7_28/EqnImages/CalcGasVol_CF_Eqn_1.png
2004-Nov-15 11:10:16 1190 bytes prism/private/wslib/WS/Class_Hazard_GF_V_1_0_7_28/EqnImages/CalcGasVol_CF_Eqn_10.png
2004-Nov-15 11:10:16 248 bytes prism/private/wslib/WS/Class_Hazard_GF_V_1_0_7_28/EqnImages/CalcGasVol_CF_Eqn_2.png
2004-Nov-15 11:10:16 839 bytes prism/private/wslib/WS/Class_Hazard_GF_V_1_0_7_28/EqnImages/CalcGasVol_CF_Eqn_3.png
2004-Nov-15 11:10:16 428 bytes prism/private/wslib/WS/Class_Hazard_GF_V_1_0_7_28/EqnImages/CalcGasVol_CF_Eqn_4.png
2004-Nov-15 11:10:16 731 bytes prism/private/wslib/WS/Class_Hazard_GF_V_1_0_7_28/EqnImages/CalcGasVol_CF_Eqn_5.png
2004-Nov-15 11:10:16 468 bytes prism/private/wslib/WS/Class_Hazard_GF_V_1_0_7_28/EqnImages/CalcGasVol_CF_Eqn_6.png
2004-Nov-15 11:10:16 211 bytes prism/private/wslib/WS/Class_Hazard_GF_V_1_0_7_28/EqnImages/CalcGasVol_CF_Eqn_7.png
2004-Nov-15 11:10:16 923 bytes prism/private/wslib/WS/Class_Hazard_GF_V_1_0_7_28/EqnImages/CalcGasVol_CF_Eqn_8.png
2004-Nov-15 11:10:16 248 bytes prism/private/wslib/WS/Class_Hazard_GF_V_1_0_7_28/EqnImages/CalcGasVol_CF_Eqn_9.png
2004-Nov-15 11:10:16 1759 bytes prism/private/wslib/WS/Class_Hazard_GF_V_1_0_7_28/EqnImages/CalcGasVol_Eqn_0.png
2004-Nov-15 11:10:18 1258 bytes prism/private/wslib/WS/Class_Hazard_GF_V_1_0_7_28/EqnImages/CalcGasVol_Eqn_1.png
2004-Nov-15 11:10:18 1261 bytes prism/private/wslib/WS/Class_Hazard_GF_V_1_0_7_28/EqnImages/CalcKbp_CalcKb_Eqn_0.png
2004-Nov-15 11:10:18 971 bytes prism/private/wslib/WS/Class_Hazard_GF_V_1_0_7_28/EqnImages/CalcKbp_CalcKv_Eqn_0.png
2004-Nov-15 11:10:18 736 bytes prism/private/wslib/WS/Class_Hazard_GF_V_1_0_7_28/EqnImages/CalcKbp_CalcKv_Eqn_1.png
2004-Nov-15 11:10:18 793 bytes prism/private/wslib/WS/Class_Hazard_GF_V_1_0_7_28/EqnImages/CalcKbp_CalcKv_Eqn_2.png
2004-Nov-15 11:10:18 727 bytes prism/private/wslib/WS/Class_Hazard_GF_V_1_0_7_28/EqnImages/CalcKbp_CalcKv_Eqn_3.png
2004-Nov-15 11:10:18 437 bytes prism/private/wslib/WS/Class_Hazard_GF_V_1_0_7_28/EqnImages/CalcKbp_Eqn_0.png
2004-Nov-15 11:10:18 374 bytes prism/private/wslib/WS/Class_Hazard_GF_V_1_0_7_28/EqnImages/CalcKbp_Eqn_1.png 2004-Nov-15 11:10:18 625 bytes prism/private/wslib/WS/Class_Hazard_GF_V_1_0_7_28/EqnImages/CalcVapMass_CF_Eqn_0.png
2004-Nov-15 11:10:18 827 bytes prism/private/wslib/WS/Class_Hazard_GF_V_1_0_7_28/EqnImages/CalcVapMass_CF_Eqn_1.png
2004-Nov-15 11:10:18 1190 bytes prism/private/wslib/WS/Class_Hazard_GF_V_1_0_7_28/EqnImages/CalcVapMass_CF_Eqn_10.png
2004-Nov-15 11:10:18 248 bytes prism/private/wslib/WS/Class_Hazard_GF_V_1_0_7_28/EqnImages/CalcVapMass_CF_Eqn_2.png
2004-Nov-15 11:10:18 839 bytes prism/private/wslib/WS/Class_Hazard_GF_V_1_0_7_28/EqnImages/CalcVapMass_CF_Eqn_3.png
2004-Nov-15 11:10:18 428 bytes prism/private/wslib/WS/Class_Hazard_GF_V_1_0_7_28/EqnImages/CalcVapMass_CF_Eqn_4.png
2004-Nov-15 11:10:18 731 bytes prism/private/wslib/WS/Class_Hazard_GF_V_1_0_7_28/EqnImages/CalcVapMass_CF_Eqn_5.png
2004-Nov-15 11:10:20 468 bytes prism/private/wslib/WS/Class_Hazard_GF_V_1_0_7_28/EqnImages/CalcVapMass_CF_Eqn_6.png
2004-Nov-15 11:10:20 211 bytes prism/private/wslib/WS/Class_Hazard_GF_V_1_0_7_28/EqnImages/CalcVapMass_CF_Eqn_7.png
2004-Nov-15 11:10:20 923 bytes prism/private/wslib/WS/Class_Hazard_GF_V_1_0_7_28/EqnImages/CalcVapMass_CF_Eqn_8.png
2004-Nov-15 11:10:20 248 bytes prism/private/wslib/WS/Class_Hazard_GF_V_1_0_7_28/EqnImages/CalcVapMass_CF_Eqn_9.png
2004-Nov-15 11:10:20 1813 bytes prism/private/wslib/WS/Class_Hazard_GF_V_1_0_7_28/EqnImages/CalcVapMass_Eqn_0.png
2004-Nov-15 11:10:20 1374 bytes prism/private/wslib/WS/Class_Hazard_GF_V_1_0_7_28/EqnImages/CalcVapMass_Eqn_1.png
2004-Nov-15 11:10:20 953 bytes prism/private/wslib/WS/Class_Hazard_GF_V_1_0_7_28/EqnImages/PC_Eqn_0.png
2004-Nov-15 11:10:20 1054 bytes prism/private/wslib/WS/Class_Hazard_GF_V_1_0_7_28/EqnImages/PVP_Eqn_0.png
2004-Nov-15 11:10:20 397 bytes prism/private/wslib/WS/Class_Hazard_GF_V_1_0_7_28/EqnImages/PVP_Eqn_1.png
2004-Nov-15 11:10:20 1388 bytes prism/private/wslib/WS/Class_Hazard_GF_V_1_0_7_28/EqnImages/P_Eqn_0.png
2004-Nov-15 11:10:20 1674 bytes prism/private/wslib/WS/Class_Hazard_GF_V_1_0_7_28/EqnImages/P_Eqn_1.png
2004-Nov-15 11:10:20 1055 bytes prism/private/wslib/WS/Class_Hazard_GF_V_1_0_7_28/EqnImages/P_Eqn_10.png
2004-Nov-15 11:10:20 1201 bytes prism/private/wslib/WS/Class_Hazard_GF_V_1_0_7_28/EqnImages/P_Eqn_11.png
2004-Nov-15 11:10:20 1092 bytes prism/private/wslib/WS/Class_Hazard_GF_V_1_0_7_28/EqnImages/P_Eqn_12.png
2004-Nov-15 11:10:20 802 bytes prism/private/wslib/WS/Class_Hazard_GF_V_1_0_7_28/EqnImages/P_Eqn_13.png
2004-Nov-15 11:10:22 582 bytes prism/private/wslib/WS/Class_Hazard_GF_V_1_0_7_28/EqnImages/P_Eqn_14.png
2004-Nov-15 11:10:22 1092 bytes prism/private/wslib/WS/Class_Hazard_GF_V_1_0_7_28/EqnImages/P_Eqn_15.png
2004-Nov-15 11:10:22 616 bytes prism/private/wslib/WS/Class_Hazard_GF_V_1_0_7_28/EqnImages/P_Eqn_16.png
2004-Nov-15 11:10:22 1147 bytes prism/private/wslib/WS/Class_Hazard_GF_V_1_0_7_28/EqnImages/P_Eqn_17.png
2004-Nov-15 11:10:22 799 bytes prism/private/wslib/WS/Class_Hazard_GF_V_1_0_7_28/EqnImages/P_Eqn_18.png
2004-Nov-15 11:10:22 689 bytes prism/private/wslib/WS/Class_Hazard_GF_V_1_0_7_28/EqnImages/P_Eqn_19.png
2004-Nov-15 11:10:22 1383 bytes prism/private/wslib/WS/Class_Hazard_GF_V_1_0_7_28/EqnImages/P_Eqn_2.png
2004-Nov-15 11:10:22 1399 bytes prism/private/wslib/WS/Class_Hazard_GF_V_1_0_7_28/EqnImages/P_Eqn_3.png
2004-Nov-15 11:10:22 959 bytes prism/private/wslib/WS/Class_Hazard_GF_V_1_0_7_28/EqnImages/P_Eqn_4.png
2004-Nov-15 11:10:22 821 bytes prism/private/wslib/WS/Class_Hazard_GF_V_1_0_7_28/EqnImages/P_Eqn_5.png
2004-Nov-15 11:10:22 959 bytes prism/private/wslib/WS/Class_Hazard_GF_V_1_0_7_28/EqnImages/P_Eqn_6.png
2004-Nov-15 11:10:22 986 bytes prism/private/wslib/WS/Class_Hazard_GF_V_1_0_7_28/EqnImages/P_Eqn_7.png
2004-Nov-15 11:10:22 951 bytes prism/private/wslib/WS/Class_Hazard_GF_V_1_0_7_28/EqnImages/P_Eqn_8.png
2004-Nov-15 11:10:22 717 bytes prism/private/wslib/WS/Class_Hazard_GF_V_1_0_7_28/EqnImages/P_Eqn_9.png
2004-Nov-15 11:09:48 8 bytes prism/private/wslib/WS/Class_Hazard_GF_V_1_0_7_28/images.aux
2004-Nov-15 11:09:48 20026 bytes prism/private/wslib/WS/Class_Hazard_GF_V_1_0_7_28/images.log
2004-Nov-15 11:10:14 13835 bytes prism/private/wslib/WS/Class_Hazard_GF_V_1_0_7_28/images.pl
2004-Nov-15 11:09:46 14813 bytes prism/private/wslib/WS/Class_Hazard_GF_V_1_0_7_28/images.tex
2004-Nov-15 11:10:08 963 bytes prism/private/wslib/WS/Class_Hazard_GF_V_1_0_7_28/img1.png
2004-Nov-15 11:09:52 520 bytes prism/private/wslib/WS/Class_Hazard_GF_V_1_0_7_28/img10.png
2004-Nov-15 11:10:12 230 bytes prism/private/wslib/WS/Class_Hazard_GF_V_1_0_7_28/img11.png
2004-Nov-15 11:10:04 1017 bytes prism/private/wslib/WS/Class_Hazard_GF_V_1_0_7_28/img12.png
2004-Nov-15 11:10:00 2085 bytes prism/private/wslib/WS/Class_Hazard_GF_V_1_0_7_28/img13.png
2004-Nov-15 11:09:52 1497 bytes prism/private/wslib/WS/Class_Hazard_GF_V_1_0_7_28/img14.png
2004-Nov-15 11:10:10 1593 bytes prism/private/wslib/WS/Class_Hazard_GF_V_1_0_7_28/img15.png
2004-Nov-15 11:10:10 1053 bytes prism/private/wslib/WS/Class_Hazard_GF_V_1_0_7_28/img16.png
2004-Nov-15 11:09:54 834 bytes prism/private/wslib/WS/Class_Hazard_GF_V_1_0_7_28/img17.png
2004-Nov-15 11:09:56 901 bytes prism/private/wslib/WS/Class_Hazard_GF_V_1_0_7_28/img18.png
2004-Nov-15 11:10:14 798 bytes prism/private/wslib/WS/Class_Hazard_GF_V_1_0_7_28/img19.png
2004-Nov-15 11:10:12 872 bytes prism/private/wslib/WS/Class_Hazard_GF_V_1_0_7_28/img2.png
2004-Nov-15 11:09:58 474 bytes prism/private/wslib/WS/Class_Hazard_GF_V_1_0_7_28/img20.png
2004-Nov-15 11:10:00 460 bytes prism/private/wslib/WS/Class_Hazard_GF_V_1_0_7_28/img21.png
2004-Nov-15 11:10:02 2114 bytes prism/private/wslib/WS/Class_Hazard_GF_V_1_0_7_28/img22.png
2004-Nov-15 11:10:08 1606 bytes prism/private/wslib/WS/Class_Hazard_GF_V_1_0_7_28/img23.png
2004-Nov-15 11:09:58 1069 bytes prism/private/wslib/WS/Class_Hazard_GF_V_1_0_7_28/img24.png
2004-Nov-15 11:09:56 1176 bytes prism/private/wslib/WS/Class_Hazard_GF_V_1_0_7_28/img25.png
2004-Nov-15 11:10:06 427 bytes prism/private/wslib/WS/Class_Hazard_GF_V_1_0_7_28/img26.png
2004-Nov-15 11:09:52 1626 bytes prism/private/wslib/WS/Class_Hazard_GF_V_1_0_7_28/img27.png
2004-Nov-15 11:10:12 1838 bytes prism/private/wslib/WS/Class_Hazard_GF_V_1_0_7_28/img28.png 2004-Nov-15 11:10:14 1205 bytes prism/private/wslib/WS/Class_Hazard_GF_V_1_0_7_28/img29.png
2004-Nov-15 11:09:52 723 bytes prism/private/wslib/WS/Class_Hazard_GF_V_1_0_7_28/img3.png
2004-Nov-15 11:10:14 1357 bytes prism/private/wslib/WS/Class_Hazard_GF_V_1_0_7_28/img30.png
2004-Nov-15 11:10:10 1308 bytes prism/private/wslib/WS/Class_Hazard_GF_V_1_0_7_28/img31.png
2004-Nov-15 11:09:56 933 bytes prism/private/wslib/WS/Class_Hazard_GF_V_1_0_7_28/img32.png
2004-Nov-15 11:09:56 651 bytes prism/private/wslib/WS/Class_Hazard_GF_V_1_0_7_28/img33.png
2004-Nov-15 11:10:12 678 bytes prism/private/wslib/WS/Class_Hazard_GF_V_1_0_7_28/img34.png
2004-Nov-15 11:09:54 1288 bytes prism/private/wslib/WS/Class_Hazard_GF_V_1_0_7_28/img35.png
2004-Nov-15 11:10:08 936 bytes prism/private/wslib/WS/Class_Hazard_GF_V_1_0_7_28/img36.png
2004-Nov-15 11:10:04 811 bytes prism/private/wslib/WS/Class_Hazard_GF_V_1_0_7_28/img37.png
2004-Nov-15 11:09:50 1539 bytes prism/private/wslib/WS/Class_Hazard_GF_V_1_0_7_28/img38.png
2004-Nov-15 11:09:54 1563 bytes prism/private/wslib/WS/Class_Hazard_GF_V_1_0_7_28/img39.png
2004-Nov-15 11:10:04 906 bytes prism/private/wslib/WS/Class_Hazard_GF_V_1_0_7_28/img4.png
2004-Nov-15 11:10:06 1122 bytes prism/private/wslib/WS/Class_Hazard_GF_V_1_0_7_28/img40.png
2004-Nov-15 11:10:10 887 bytes prism/private/wslib/WS/Class_Hazard_GF_V_1_0_7_28/img41.png
2004-Nov-15 11:09:58 1142 bytes prism/private/wslib/WS/Class_Hazard_GF_V_1_0_7_28/img42.png
2004-Nov-15 11:10:14 1117 bytes prism/private/wslib/WS/Class_Hazard_GF_V_1_0_7_28/img43.png
2004-Nov-15 11:09:50 856 bytes prism/private/wslib/WS/Class_Hazard_GF_V_1_0_7_28/img44.png
2004-Nov-15 11:10:06 1446 bytes prism/private/wslib/WS/Class_Hazard_GF_V_1_0_7_28/img5.png
2004-Nov-15 11:09:54 262 bytes prism/private/wslib/WS/Class_Hazard_GF_V_1_0_7_28/img6.png
2004-Nov-15 11:10:00 949 bytes prism/private/wslib/WS/Class_Hazard_GF_V_1_0_7_28/img7.png
2004-Nov-15 11:10:06 515 bytes prism/private/wslib/WS/Class_Hazard_GF_V_1_0_7_28/img8.png
2004-Nov-15 11:10:00 839 bytes prism/private/wslib/WS/Class_Hazard_GF_V_1_0_7_28/img9.png
2004-Nov-15 11:10:14 24115 bytes prism/private/wslib/WS/Class_Hazard_GF_V_1_0_7_28/index.html
2004-Nov-15 11:10:14 7229 bytes prism/private/wslib/WS/Class_Hazard_GF_V_1_0_7_28/internals.pl
2004-Nov-15 11:10:44 7827 bytes prism/private/wslib/WS/Class_Hazard_GF_V_1_0_7_28/labels.pl
2004-Nov-15 11:10:14 2512 bytes prism/private/wslib/WS/Class_Hazard_GF_V_1_0_7_28/node1.html
2004-Dec-13 10:28:42 1122 bytes prism/private/wslib/WS/Class_Hazard_LE_2_1_0_7_28
2004-Nov-15 11:10:24 159531 bytes prism/private/wslib/WS/Class_Hazard_LE_2_1_0_7_28.pm
2004-Nov-15 11:10:24 2152 bytes prism/private/wslib/WS/Class_Hazard_LE_2_1_0_7_28.tex
2004-Nov-15 11:10:24 295 bytes prism/private/wslib/WS/Class_Hazard_LE_2_1_0_7_28.ws
2004-Nov-15 11:10:36 891 bytes prism/private/wslib/WS/Class_Hazard_LE_2_1_0_7_28/Class_Hazard_LE_2_1_0_7_28.css
2004-Nov-15 11:10:36 10716 bytes prism/private/wslib/WS/Class_Hazard_LE_2_1_0_7_28/Class_Hazard_LE_2_1_0_7_28.html
2004-Dec-13 10:28:42 816 bytes prism/private/wslib/WS/Class_Hazard_LE_2_1_0_7_28/EqnImages
2004-Nov-15 11:10:38 774 bytes prism/private/wslib/WS/Class_Hazard_LE_2_1_0_7_28/EqnImages/BP_Eqn_0.png
2004-Nov-15 11:10:38 781 bytes prism/private/wslib/WS/Class_Hazard_LE_2_1_0_7_28/EqnImages/BP_Eqn_1.png
2004-Nov-15 11:10:38 1388 bytes prism/private/wslib/WS/Class_Hazard_LE_2_1_0_7_28/EqnImages/P_Eqn_0.png
2004-Nov-15 11:10:38 1674 bytes prism/private/wslib/WS/Class_Hazard_LE_2_1_0_7_28/EqnImages/P_Eqn_1.png
2004-Nov-15 11:10:38 1055 bytes prism/private/wslib/WS/Class_Hazard_LE_2_1_0_7_28/EqnImages/P_Eqn_10.png
2004-Nov-15 11:10:38 1201 bytes prism/private/wslib/WS/Class_Hazard_LE_2_1_0_7_28/EqnImages/P_Eqn_11.png
2004-Nov-15 11:10:38 1092 bytes prism/private/wslib/WS/Class_Hazard_LE_2_1_0_7_28/EqnImages/P_Eqn_12.png
2004-Nov-15 11:10:38 802 bytes prism/private/wslib/WS/Class_Hazard_LE_2_1_0_7_28/EqnImages/P_Eqn_13.png
2004-Nov-15 11:10:38 582 bytes prism/private/wslib/WS/Class_Hazard_LE_2_1_0_7_28/EqnImages/P_Eqn_14.png
2004-Nov-15 11:10:38 1092 bytes prism/private/wslib/WS/Class_Hazard_LE_2_1_0_7_28/EqnImages/P_Eqn_15.png
2004-Nov-15 11:10:38 616 bytes prism/private/wslib/WS/Class_Hazard_LE_2_1_0_7_28/EqnImages/P_Eqn_16.png
2004-Nov-15 11:10:38 1147 bytes prism/private/wslib/WS/Class_Hazard_LE_2_1_0_7_28/EqnImages/P_Eqn_17.png
2004-Nov-15 11:10:38 799 bytes prism/private/wslib/WS/Class_Hazard_LE_2_1_0_7_28/EqnImages/P_Eqn_18.png
2004-Nov-15 11:10:38 689 bytes prism/private/wslib/WS/Class_Hazard_LE_2_1_0_7_28/EqnImages/P_Eqn_19.png
2004-Nov-15 11:10:38 1383 bytes prism/private/wslib/WS/Class_Hazard_LE_2_1_0_7_28/EqnImages/P_Eqn_2.png
2004-Nov-15 11:10:40 1399 bytes prism/private/wslib/WS/Class_Hazard_LE_2_1_0_7_28/EqnImages/P_Eqn_3.png
2004-Nov-15 11:10:40 959 bytes prism/private/wslib/WS/Class_Hazard_LE_2_1_0_7_28/EqnImages/P_Eqn_4.png
2004-Nov-15 11:10:40 821 bytes prism/private/wslib/WS/Class_Hazard_LE_2_1_0_7_28/EqnImages/P_Eqn_5.png
2004-Nov-15 11:10:40 959 bytes prism/private/wslib/WS/Class_Hazard_LE_2_1_0_7_28/EqnImages/P_Eqn_6.png
2004-Nov-15 11:10:40 986 bytes prism/private/wslib/WS/Class_Hazard_LE_2_1_0_7_28/EqnImages/P_Eqn_7.png
2004-Nov-15 11:10:40 951 bytes prism/private/wslib/WS/Class_Hazard_LE_2_1_0_7_28/EqnImages/P_Eqn_8.png
2004-Nov-15 11:10:40 717 bytes prism/private/wslib/WS/Class_Hazard_LE_2_1_0_7_28/EqnImages/P_Eqn_9.png
2004-Nov-15 11:10:26 8 bytes prism/private/wslib/WS/Class_Hazard_LE_2_1_0_7_28/images.aux
2004-Nov-15 11:10:26 12420 bytes prism/private/wslib/WS/Class_Hazard_LE_2_1_0_7_28/images.log
2004-Nov-15 11:10:36 6394 bytes prism/private/wslib/WS/Class_Hazard_LE_2_1_0_7_28/images.pl
2004-Nov-15 11:10:26 9940 bytes prism/private/wslib/WS/Class_Hazard_LE_2_1_0_7_28/images.tex
2004-Nov-15 11:10:32 963 bytes prism/private/wslib/WS/Class_Hazard_LE_2_1_0_7_28/img1.png

| | | |
|---|---|---|
| 2004-Nov-15 11:10:26 | 678 bytes | prism/private/wslib/WS/Class_Hazard_LE_2_1_0_7_28/img10.png |
| 2004-Nov-15 11:10:32 | 1288 bytes | prism/private/wslib/WS/Class_Hazard_LE_2_1_0_7_28/img11.png |
| 2004-Nov-15 11:10:36 | 936 bytes | prism/private/wslib/WS/Class_Hazard_LE_2_1_0_7_28/img12.png |
| 2004-Nov-15 11:10:34 | 811 bytes | prism/private/wslib/WS/Class_Hazard_LE_2_1_0_7_28/img13.png |
| 2004-Nov-15 11:10:34 | 1539 bytes | prism/private/wslib/WS/Class_Hazard_LE_2_1_0_7_28/img14.png |
| 2004-Nov-15 11:10:28 | 1563 bytes | prism/private/wslib/WS/Class_Hazard_LE_2_1_0_7_28/img15.png |
| 2004-Nov-15 11:10:30 | 1122 bytes | prism/private/wslib/WS/Class_Hazard_LE_2_1_0_7_28/img16.png |
| 2004-Nov-15 11:10:34 | 887 bytes | prism/private/wslib/WS/Class_Hazard_LE_2_1_0_7_28/img17.png |
| 2004-Nov-15 11:10:36 | 1142 bytes | prism/private/wslib/WS/Class_Hazard_LE_2_1_0_7_28/img18.png |
| 2004-Nov-15 11:10:36 | 1117 bytes | prism/private/wslib/WS/Class_Hazard_LE_2_1_0_7_28/img19.png |
| 2004-Nov-15 11:10:32 | 872 bytes | prism/private/wslib/WS/Class_Hazard_LE_2_1_0_7_28/img2.png |
| 2004-Nov-15 11:10:30 | 856 bytes | prism/private/wslib/WS/Class_Hazard_LE_2_1_0_7_28/img20.png |
| 2004-Nov-15 11:10:30 | 1626 bytes | prism/private/wslib/WS/Class_Hazard_LE_2_1_0_7_28/img3.png |
| 2004-Nov-15 11:10:28 | 1838 bytes | prism/private/wslib/WS/Class_Hazard_LE_2_1_0_7_28/img4.png |
| 2004-Nov-15 11:10:36 | 1205 bytes | prism/private/wslib/WS/Class_Hazard_LE_2_1_0_7_28/img5.png |
| 2004-Nov-15 11:10:34 | 1357 bytes | prism/private/wslib/WS/Class_Hazard_LE_2_1_0_7_28/img6.png |
| 2004-Nov-15 11:10:28 | 1308 bytes | prism/private/wslib/WS/Class_Hazard_LE_2_1_0_7_28/img7.png |
| 2004-Nov-15 11:10:30 | 933 bytes | prism/private/wslib/WS/Class_Hazard_LE_2_1_0_7_28/img8.png |
| 2004-Nov-15 11:10:28 | 651 bytes | prism/private/wslib/WS/Class_Hazard_LE_2_1_0_7_28/img9.png |
| 2004-Nov-15 11:10:36 | 10716 bytes | prism/private/wslib/WS/Class_Hazard_LE_2_1_0_7_28/index.html |
| 2004-Nov-15 11:10:36 | 2656 bytes | prism/private/wslib/WS/Class_Hazard_LE_2_1_0_7_28/internals.pl |
| 2004-Nov-15 11:10:44 | 2930 bytes | prism/private/wslib/WS/Class_Hazard_LE_2_1_0_7_28/labels.pl |
| 2004-Nov-15 11:10:36 | 2512 bytes | prism/private/wslib/WS/Class_Hazard_LE_2_1_0_7_28/node1.html |
| 2004-Dec-13 10:28:42 | 1462 bytes | prism/private/wslib/WS/Class_Hazard_LE_L_1_0_7_28 |
| 2004-Nov-15 11:10:40 | 227862 bytes | prism/private/wslib/WS/Class_Hazard_LE_L_1_0_7_28.pm |
| 2004-Nov-15 11:10:40 | 3115 bytes | prism/private/wslib/WS/Class_Hazard_LE_L_1_0_7_28.tex |
| 2004-Nov-15 11:10:40 | 307 bytes | prism/private/wslib/WS/Class_Hazard_LE_L_1_0_7_28.ws |
| 2004-Nov-15 11:11:00 | 891 bytes | prism/private/wslib/WS/Class_Hazard_LE_L_1_0_7_28/Class_Hazard_LE_L_1_0_7_28.css |
| 2004-Nov-15 11:11:00 | 14756 bytes | prism/private/wslib/WS/Class_Hazard_LE_L_1_0_7_28/Class_Hazard_LE_L_1_0_7_28.html |
| 2004-Dec-13 10:28:42 | 1190 bytes | prism/private/wslib/WS/Class_Hazard_LE_L_1_0_7_28/EqnImages |
| 2004-Nov-15 11:11:00 | 774 bytes | prism/private/wslib/WS/Class_Hazard_LE_L_1_0_7_28/EqnImages/BP_Eqn_0.png |
| 2004-Nov-15 11:11:00 | 781 bytes | prism/private/wslib/WS/Class_Hazard_LE_L_1_0_7_28/EqnImages/BP_Eqn_1.png |
| 2004-Nov-15 11:11:00 | 957 bytes | prism/private/wslib/WS/Class_Hazard_LE_L_1_0_7_28/EqnImages/CalcKbp_CalcKw_Eqn_0.png |
| 2004-Nov-15 11:11:00 | 975 bytes | prism/private/wslib/WS/Class_Hazard_LE_L_1_0_7_28/EqnImages/CalcKbp_CalcKw_Eqn_1.png |
| 2004-Nov-15 11:11:00 | 736 bytes | prism/private/wslib/WS/Class_Hazard_LE_L_1_0_7_28/EqnImages/CalcKbp_CalcKw_Eqn_2.png |
| 2004-Nov-15 11:11:00 | 420 bytes | prism/private/wslib/WS/Class_Hazard_LE_L_1_0_7_28/EqnImages/CalcKbp_Eqn_0.png |
| 2004-Nov-15 11:11:00 | 420 bytes | prism/private/wslib/WS/Class_Hazard_LE_L_1_0_7_28/EqnImages/CalcKbp_Eqn_1.png |
| 2004-Nov-15 11:11:00 | 390 bytes | prism/private/wslib/WS/Class_Hazard_LE_L_1_0_7_28/EqnImages/CalcKbp_Eqn_2.png |
| 2004-Nov-15 11:11:00 | 1748 bytes | prism/private/wslib/WS/Class_Hazard_LE_L_1_0_7_28/EqnImages/CalcLiquidVol_Eqn_0.png |
| 2004-Nov-15 11:11:02 | 1156 bytes | prism/private/wslib/WS/Class_Hazard_LE_L_1_0_7_28/EqnImages/CalcReqCapacity_Eqn_0.png |
| 2004-Nov-15 11:11:02 | 1195 bytes | prism/private/wslib/WS/Class_Hazard_LE_L_1_0_7_28/EqnImages/LP_Eqn_0.png |
| 2004-Nov-15 11:11:02 | 953 bytes | prism/private/wslib/WS/Class_Hazard_LE_L_1_0_7_28/EqnImages/PC_Eqn_0.png |
| 2004-Nov-15 11:11:02 | 773 bytes | prism/private/wslib/WS/Class_Hazard_LE_L_1_0_7_28/EqnImages/PD_Eqn_0.png |
| 2004-Nov-15 11:11:02 | 1388 bytes | prism/private/wslib/WS/Class_Hazard_LE_L_1_0_7_28/EqnImages/P_Eqn_0.png |
| 2004-Nov-15 11:11:02 | 1674 bytes | prism/private/wslib/WS/Class_Hazard_LE_L_1_0_7_28/EqnImages/P_Eqn_1.png |
| 2004-Nov-15 11:11:02 | 1055 bytes | prism/private/wslib/WS/Class_Hazard_LE_L_1_0_7_28/EqnImages/P_Eqn_10.png |
| 2004-Nov-15 11:11:02 | 1201 bytes | prism/private/wslib/WS/Class_Hazard_LE_L_1_0_7_28/EqnImages/P_Eqn_11.png |
| 2004-Nov-15 11:11:02 | 1092 bytes | prism/private/wslib/WS/Class_Hazard_LE_L_1_0_7_28/EqnImages/P_Eqn_12.png |
| 2004-Nov-15 11:11:02 | 802 bytes | prism/private/wslib/WS/Class_Hazard_LE_L_1_0_7_28/EqnImages/P_Eqn_13.png |
| 2004-Nov-15 11:11:02 | 582 bytes | prism/private/wslib/WS/Class_Hazard_LE_L_1_0_7_28/EqnImages/P_Eqn_14.png |
| 2004-Nov-15 11:11:02 | 1092 bytes | prism/private/wslib/WS/Class_Hazard_LE_L_1_0_7_28/EqnImages/P_Eqn_15.png |
| 2004-Nov-15 11:11:02 | 616 bytes | prism/private/wslib/WS/Class_Hazard_LE_L_1_0_7_28/EqnImages/P_Eqn_16.png |
| 2004-Nov-15 11:11:02 | 1147 bytes | prism/private/wslib/WS/Class_Hazard_LE_L_1_0_7_28/EqnImages/P_Eqn_17.png |
| 2004-Nov-15 11:11:02 | 799 bytes | prism/private/wslib/WS/Class_Hazard_LE_L_1_0_7_28/EqnImages/P_Eqn_18.png |
| 2004-Nov-15 11:11:04 | 689 bytes | prism/private/wslib/WS/Class_Hazard_LE_L_1_0_7_28/EqnImages/P_Eqn_19.png |
| 2004-Nov-15 11:11:04 | 1383 bytes | prism/private/wslib/WS/Class_Hazard_LE_L_1_0_7_28/EqnImages/P_Eqn_2.png |
| 2004-Nov-15 11:11:04 | 1399 bytes | prism/private/wslib/WS/Class_Hazard_LE_L_1_0_7_28/EqnImages/P_Eqn_3.png |
| 2004-Nov-15 11:11:04 | 959 bytes | prism/private/wslib/WS/Class_Hazard_LE_L_1_0_7_28/EqnImages/P_Eqn_4.png |
| 2004-Nov-15 11:11:04 | 821 bytes | prism/private/wslib/WS/Class_Hazard_LE_L_1_0_7_28/EqnImages/P_Eqn_5.png |
| 2004-Nov-15 11:11:04 | 959 bytes | prism/private/wslib/WS/Class_Hazard_LE_L_1_0_7_28/EqnImages/P_Eqn_6.png |
| 2004-Nov-15 11:11:04 | 986 bytes | prism/private/wslib/WS/Class_Hazard_LE_L_1_0_7_28/EqnImages/P_Eqn_7.png |

2004-Nov-15 11:11:04 951 bytes prism/private/wslib/WS/Class_Hazard_LE_L_1_0_7_28/EqnImages/P_Eqn_8.png
2004-Nov-15 11:11:04 717 bytes prism/private/wslib/WS/Class_Hazard_LE_L_1_0_7_28/EqnImages/P_Eqn_9.png
2004-Nov-15 11:10:42 8 bytes prism/private/wslib/WS/Class_Hazard_LE_L_1_0_7_28/images.aux
2004-Nov-15 11:10:42 13010 bytes prism/private/wslib/WS/Class_Hazard_LE_L_1_0_7_28/images.log
2004-Nov-15 11:11:00 9448 bytes prism/private/wslib/WS/Class_Hazard_LE_L_1_0_7_28/images.pl
2004-Nov-15 11:10:42 11885 bytes prism/private/wslib/WS/Class_Hazard_LE_L_1_0_7_28/images.tex
2004-Nov-15 11:10:54 963 bytes prism/private/wslib/WS/Class_Hazard_LE_L_1_0_7_28/img1.png
2004-Nov-15 11:11:00 1292 bytes prism/private/wslib/WS/Class_Hazard_LE_L_1_0_7_28/img10.png
2004-Nov-15 11:10:56 1069 bytes prism/private/wslib/WS/Class_Hazard_LE_L_1_0_7_28/img11.png
2004-Nov-15 11:10:56 874 bytes prism/private/wslib/WS/Class_Hazard_LE_L_1_0_7_28/img12.png
2004-Nov-15 11:10:54 1626 bytes prism/private/wslib/WS/Class_Hazard_LE_L_1_0_7_28/img13.png
2004-Nov-15 11:10:54 1838 bytes prism/private/wslib/WS/Class_Hazard_LE_L_1_0_7_28/img14.png
2004-Nov-15 11:10:50 1205 bytes prism/private/wslib/WS/Class_Hazard_LE_L_1_0_7_28/img15.png
2004-Nov-15 11:10:58 1357 bytes prism/private/wslib/WS/Class_Hazard_LE_L_1_0_7_28/img16.png
2004-Nov-15 11:10:46 1308 bytes prism/private/wslib/WS/Class_Hazard_LE_L_1_0_7_28/img17.png
2004-Nov-15 11:10:56 933 bytes prism/private/wslib/WS/Class_Hazard_LE_L_1_0_7_28/img18.png
2004-Nov-15 11:10:52 651 bytes prism/private/wslib/WS/Class_Hazard_LE_L_1_0_7_28/img19.png
2004-Nov-15 11:10:52 872 bytes prism/private/wslib/WS/Class_Hazard_LE_L_1_0_7_28/img2.png
2004-Nov-15 11:10:50 678 bytes prism/private/wslib/WS/Class_Hazard_LE_L_1_0_7_28/img20.png
2004-Nov-15 11:10:52 1288 bytes prism/private/wslib/WS/Class_Hazard_LE_L_1_0_7_28/img21.png
2004-Nov-15 11:10:46 936 bytes prism/private/wslib/WS/Class_Hazard_LE_L_1_0_7_28/img22.png
2004-Nov-15 11:10:48 811 bytes prism/private/wslib/WS/Class_Hazard_LE_L_1_0_7_28/img23.png
2004-Nov-15 11:10:56 1539 bytes prism/private/wslib/WS/Class_Hazard_LE_L_1_0_7_28/img24.png
2004-Nov-15 11:10:48 1563 bytes prism/private/wslib/WS/Class_Hazard_LE_L_1_0_7_28/img25.png
2004-Nov-15 11:10:50 1122 bytes prism/private/wslib/WS/Class_Hazard_LE_L_1_0_7_28/img26.png
2004-Nov-15 11:10:44 887 bytes prism/private/wslib/WS/Class_Hazard_LE_L_1_0_7_28/img27.png
2004-Nov-15 11:10:54 1142 bytes prism/private/wslib/WS/Class_Hazard_LE_L_1_0_7_28/img28.png
2004-Nov-15 11:10:50 1117 bytes prism/private/wslib/WS/Class_Hazard_LE_L_1_0_7_28/img29.png
2004-Nov-15 11:10:58 1117 bytes prism/private/wslib/WS/Class_Hazard_LE_L_1_0_7_28/img3.png
2004-Nov-15 11:10:46 856 bytes prism/private/wslib/WS/Class_Hazard_LE_L_1_0_7_28/img30.png
2004-Nov-15 11:10:58 1099 bytes prism/private/wslib/WS/Class_Hazard_LE_L_1_0_7_28/img4.png
2004-Nov-15 11:10:44 834 bytes prism/private/wslib/WS/Class_Hazard_LE_L_1_0_7_28/img5.png
2004-Nov-15 11:10:48 467 bytes prism/private/wslib/WS/Class_Hazard_LE_L_1_0_7_28/img6.png
2004-Nov-15 11:10:48 467 bytes prism/private/wslib/WS/Class_Hazard_LE_L_1_0_7_28/img7.png
2004-Nov-15 11:11:00 2074 bytes prism/private/wslib/WS/Class_Hazard_LE_L_1_0_7_28/img8.png
2004-Nov-15 11:10:52 1345 bytes prism/private/wslib/WS/Class_Hazard_LE_L_1_0_7_28/img9.png
2004-Nov-15 11:11:00 14756 bytes prism/private/wslib/WS/Class_Hazard_LE_L_1_0_7_28/index.html
2004-Nov-15 11:11:00 4018 bytes prism/private/wslib/WS/Class_Hazard_LE_L_1_0_7_28/internals.pl
2004-Nov-15 11:11:14 4391 bytes prism/private/wslib/WS/Class_Hazard_LE_L_1_0_7_28/labels.pl
2004-Nov-15 11:11:00 2512 bytes prism/private/wslib/WS/Class_Hazard_LE_L_1_0_7_28/node1.html
2004-Dec-13 10:28:42 1122 bytes prism/private/wslib/WS/Class_Hazard_PF_L_1_0_7_28
2004-Nov-15 11:11:04 159531 bytes prism/private/wslib/WS/Class_Hazard_PF_L_1_0_7_28.pm
2004-Nov-15 11:11:04 2152 bytes prism/private/wslib/WS/Class_Hazard_PF_L_1_0_7_28.tex
2004-Nov-15 11:11:04 302 bytes prism/private/wslib/WS/Class_Hazard_PF_L_1_0_7_28.ws
2004-Nov-15 11:11:18 891 bytes prism/private/wslib/WS/Class_Hazard_PF_L_1_0_7_28/Class_Hazard_PF_L_1_0_7_28.css
2004-Nov-15 11:11:18 10716 bytes prism/private/wslib/WS/Class_Hazard_PF_L_1_0_7_28/Class_Hazard_PF_L_1_0_7_28.html
2004-Dec-13 10:28:42 816 bytes prism/private/wslib/WS/Class_Hazard_PF_L_1_0_7_28/EqnImages
2004-Nov-15 11:11:18 774 bytes prism/private/wslib/WS/Class_Hazard_PF_L_1_0_7_28/EqnImages/BP_Eqn_0.png
2004-Nov-15 11:11:18 781 bytes prism/private/wslib/WS/Class_Hazard_PF_L_1_0_7_28/EqnImages/BP_Eqn_1.png
2004-Nov-15 11:11:20 1388 bytes prism/private/wslib/WS/Class_Hazard_PF_L_1_0_7_28/EqnImages/P_Eqn_0.png
2004-Nov-15 11:11:20 1674 bytes prism/private/wslib/WS/Class_Hazard_PF_L_1_0_7_28/EqnImages/P_Eqn_1.png
2004-Nov-15 11:11:20 1055 bytes prism/private/wslib/WS/Class_Hazard_PF_L_1_0_7_28/EqnImages/P_Eqn_10.png
2004-Nov-15 11:11:20 1201 bytes prism/private/wslib/WS/Class_Hazard_PF_L_1_0_7_28/EqnImages/P_Eqn_11.png
2004-Nov-15 11:11:20 1092 bytes prism/private/wslib/WS/Class_Hazard_PF_L_1_0_7_28/EqnImages/P_Eqn_12.png
2004-Nov-15 11:11:20 802 bytes prism/private/wslib/WS/Class_Hazard_PF_L_1_0_7_28/EqnImages/P_Eqn_13.png
2004-Nov-15 11:11:20 582 bytes prism/private/wslib/WS/Class_Hazard_PF_L_1_0_7_28/EqnImages/P_Eqn_14.png
2004-Nov-15 11:11:20 1092 bytes prism/private/wslib/WS/Class_Hazard_PF_L_1_0_7_28/EqnImages/P_Eqn_15.png
2004-Nov-15 11:11:20 616 bytes prism/private/wslib/WS/Class_Hazard_PF_L_1_0_7_28/EqnImages/P_Eqn_16.png
2004-Nov-15 11:11:20 1147 bytes prism/private/wslib/WS/Class_Hazard_PF_L_1_0_7_28/EqnImages/P_Eqn_17.png
2004-Nov-15 11:11:20 799 bytes prism/private/wslib/WS/Class_Hazard_PF_L_1_0_7_28/EqnImages/P_Eqn_18.png
2004-Nov-15 11:11:20 689 bytes prism/private/wslib/WS/Class_Hazard_PF_L_1_0_7_28/EqnImages/P_Eqn_19.png

```
2004-Nov-15 11:11:20  1383 bytes  prism/private/wslib/WS/Class_Hazard_PF_L_1_0_7_28/EqnImages/P_Eqn_2.png
2004-Nov-15 11:11:20  1399 bytes  prism/private/wslib/WS/Class_Hazard_PF_L_1_0_7_28/EqnImages/P_Eqn_3.png
2004-Nov-15 11:11:20   959 bytes  prism/private/wslib/WS/Class_Hazard_PF_L_1_0_7_28/EqnImages/P_Eqn_4.png
2004-Nov-15 11:11:22   821 bytes  prism/private/wslib/WS/Class_Hazard_PF_L_1_0_7_28/EqnImages/P_Eqn_5.png
2004-Nov-15 11:11:22   959 bytes  prism/private/wslib/WS/Class_Hazard_PF_L_1_0_7_28/EqnImages/P_Eqn_6.png
2004-Nov-15 11:11:22   986 bytes  prism/private/wslib/WS/Class_Hazard_PF_L_1_0_7_28/EqnImages/P_Eqn_7.png
2004-Nov-15 11:11:22   951 bytes  prism/private/wslib/WS/Class_Hazard_PF_L_1_0_7_28/EqnImages/P_Eqn_8.png
2004-Nov-15 11:11:22   717 bytes  prism/private/wslib/WS/Class_Hazard_PF_L_1_0_7_28/EqnImages/P_Eqn_9.png
2004-Nov-15 11:11:06     8 bytes  prism/private/wslib/WS/Class_Hazard_PF_L_1_0_7_28/images.aux
2004-Nov-15 11:11:06 12420 bytes  prism/private/wslib/WS/Class_Hazard_PF_L_1_0_7_28/images.log
2004-Nov-15 11:11:18  6394 bytes  prism/private/wslib/WS/Class_Hazard_PF_L_1_0_7_28/images.pl
2004-Nov-15 11:11:06  9940 bytes  prism/private/wslib/WS/Class_Hazard_PF_L_1_0_7_28/images.tex
2004-Nov-15 11:11:14   963 bytes  prism/private/wslib/WS/Class_Hazard_PF_L_1_0_7_28/img1.png
2004-Nov-15 11:11:08   678 bytes  prism/private/wslib/WS/Class_Hazard_PF_L_1_0_7_28/img10.png
2004-Nov-15 11:11:12  1288 bytes  prism/private/wslib/WS/Class_Hazard_PF_L_1_0_7_28/img11.png
2004-Nov-15 11:11:16   936 bytes  prism/private/wslib/WS/Class_Hazard_PF_L_1_0_7_28/img12.png
2004-Nov-15 11:11:16   811 bytes  prism/private/wslib/WS/Class_Hazard_PF_L_1_0_7_28/img13.png
2004-Nov-15 11:11:14  1539 bytes  prism/private/wslib/WS/Class_Hazard_PF_L_1_0_7_28/img14.png
2004-Nov-15 11:11:10  1563 bytes  prism/private/wslib/WS/Class_Hazard_PF_L_1_0_7_28/img15.png
2004-Nov-15 11:11:12  1122 bytes  prism/private/wslib/WS/Class_Hazard_PF_L_1_0_7_28/img16.png
2004-Nov-15 11:11:16   887 bytes  prism/private/wslib/WS/Class_Hazard_PF_L_1_0_7_28/img17.png
2004-Nov-15 11:11:18  1142 bytes  prism/private/wslib/WS/Class_Hazard_PF_L_1_0_7_28/img18.png
2004-Nov-15 11:11:18  1117 bytes  prism/private/wslib/WS/Class_Hazard_PF_L_1_0_7_28/img19.png
2004-Nov-15 11:11:14   872 bytes  prism/private/wslib/WS/Class_Hazard_PF_L_1_0_7_28/img2.png
2004-Nov-15 11:11:10   856 bytes  prism/private/wslib/WS/Class_Hazard_PF_L_1_0_7_28/img20.png
2004-Nov-15 11:11:12  1626 bytes  prism/private/wslib/WS/Class_Hazard_PF_L_1_0_7_28/img3.png
2004-Nov-15 11:11:10  1838 bytes  prism/private/wslib/WS/Class_Hazard_PF_L_1_0_7_28/img4.png
2004-Nov-15 11:11:18  1205 bytes  prism/private/wslib/WS/Class_Hazard_PF_L_1_0_7_28/img5.png
2004-Nov-15 11:11:16  1357 bytes  prism/private/wslib/WS/Class_Hazard_PF_L_1_0_7_28/img6.png
2004-Nov-15 11:11:10  1308 bytes  prism/private/wslib/WS/Class_Hazard_PF_L_1_0_7_28/img7.png
2004-Nov-15 11:11:12   933 bytes  prism/private/wslib/WS/Class_Hazard_PF_L_1_0_7_28/img8.png
2004-Nov-15 11:11:08   651 bytes  prism/private/wslib/WS/Class_Hazard_PF_L_1_0_7_28/img9.png
2004-Nov-15 11:11:18 10716 bytes  prism/private/wslib/WS/Class_Hazard_PF_L_1_0_7_28/index.html
2004-Nov-15 11:11:18  2656 bytes  prism/private/wslib/WS/Class_Hazard_PF_L_1_0_7_28/internals.pl
2004-Nov-15 11:11:44  2930 bytes  prism/private/wslib/WS/Class_Hazard_PF_L_1_0_7_28/labels.pl
2004-Nov-15 11:11:18  2512 bytes  prism/private/wslib/WS/Class_Hazard_PF_L_1_0_7_28/node1.html
2004-Dec-13 10:28:42  1122 bytes  prism/private/wslib/WS/Class_Hazard_PF_V_1_0_7_28
2004-Nov-15 11:11:22 159531 bytes prism/private/wslib/WS/Class_Hazard_PF_V_1_0_7_28.pm
2004-Nov-15 11:11:22  2152 bytes  prism/private/wslib/WS/Class_Hazard_PF_V_1_0_7_28.tex
2004-Nov-15 11:11:22   301 bytes  prism/private/wslib/WS/Class_Hazard_PF_V_1_0_7_28.ws
2004-Nov-15 11:11:36   891 bytes  prism/private/wslib/WS/Class_Hazard_PF_V_1_0_7_28/Class_Hazard_PF_V_1_0_7_28.css
2004-Nov-15 11:11:36 10716 bytes  prism/private/wslib/WS/Class_Hazard_PF_V_1_0_7_28/Class_Hazard_PF_V_1_0_7_28.html
2004-Dec-13 10:28:42   816 bytes  prism/private/wslib/WS/Class_Hazard_PF_V_1_0_7_28/EqnImages
2004-Nov-15 11:11:36   774 bytes  prism/private/wslib/WS/Class_Hazard_PF_V_1_0_7_28/EqnImages/BP_Eqn_0.png
2004-Nov-15 11:11:36   781 bytes  prism/private/wslib/WS/Class_Hazard_PF_V_1_0_7_28/EqnImages/BP_Eqn_1.png
2004-Nov-15 11:11:36  1388 bytes  prism/private/wslib/WS/Class_Hazard_PF_V_1_0_7_28/EqnImages/P_Eqn_0.png
2004-Nov-15 11:11:36  1674 bytes  prism/private/wslib/WS/Class_Hazard_PF_V_1_0_7_28/EqnImages/P_Eqn_1.png
2004-Nov-15 11:11:36  1055 bytes  prism/private/wslib/WS/Class_Hazard_PF_V_1_0_7_28/EqnImages/P_Eqn_10.png
2004-Nov-15 11:11:36  1201 bytes  prism/private/wslib/WS/Class_Hazard_PF_V_1_0_7_28/EqnImages/P_Eqn_11.png
2004-Nov-15 11:11:36  1092 bytes  prism/private/wslib/WS/Class_Hazard_PF_V_1_0_7_28/EqnImages/P_Eqn_12.png
2004-Nov-15 11:11:36   802 bytes  prism/private/wslib/WS/Class_Hazard_PF_V_1_0_7_28/EqnImages/P_Eqn_13.png
2004-Nov-15 11:11:38   582 bytes  prism/private/wslib/WS/Class_Hazard_PF_V_1_0_7_28/EqnImages/P_Eqn_14.png
2004-Nov-15 11:11:38  1092 bytes  prism/private/wslib/WS/Class_Hazard_PF_V_1_0_7_28/EqnImages/P_Eqn_15.png
2004-Nov-15 11:11:38   616 bytes  prism/private/wslib/WS/Class_Hazard_PF_V_1_0_7_28/EqnImages/P_Eqn_16.png
2004-Nov-15 11:11:38  1147 bytes  prism/private/wslib/WS/Class_Hazard_PF_V_1_0_7_28/EqnImages/P_Eqn_17.png
2004-Nov-15 11:11:38   799 bytes  prism/private/wslib/WS/Class_Hazard_PF_V_1_0_7_28/EqnImages/P_Eqn_18.png
2004-Nov-15 11:11:38   689 bytes  prism/private/wslib/WS/Class_Hazard_PF_V_1_0_7_28/EqnImages/P_Eqn_19.png
2004-Nov-15 11:11:38  1383 bytes  prism/private/wslib/WS/Class_Hazard_PF_V_1_0_7_28/EqnImages/P_Eqn_2.png
2004-Nov-15 11:11:38  1399 bytes  prism/private/wslib/WS/Class_Hazard_PF_V_1_0_7_28/EqnImages/P_Eqn_3.png
2004-Nov-15 11:11:38   959 bytes  prism/private/wslib/WS/Class_Hazard_PF_V_1_0_7_28/EqnImages/P_Eqn_4.png
2004-Nov-15 11:11:38   821 bytes  prism/private/wslib/WS/Class_Hazard_PF_V_1_0_7_28/EqnImages/P_Eqn_5.png
```

2004-Nov-15 11:11:38 959 bytes prism/private/wslib/WS/Class_Hazard_PF_V_1_0_7_28/EqnImages/P_Eqn_6.png
2004-Nov-15 11:11:38 986 bytes prism/private/wslib/WS/Class_Hazard_PF_V_1_0_7_28/EqnImages/P_Eqn_7.png
2004-Nov-15 11:11:38 951 bytes prism/private/wslib/WS/Class_Hazard_PF_V_1_0_7_28/EqnImages/P_Eqn_8.png
2004-Nov-15 11:11:38 717 bytes prism/private/wslib/WS/Class_Hazard_PF_V_1_0_7_28/EqnImages/P_Eqn_9.png
2004-Nov-15 11:11:24 8 bytes prism/private/wslib/WS/Class_Hazard_PF_V_1_0_7_28/images.aux
2004-Nov-15 11:11:24 12420 bytes prism/private/wslib/WS/Class_Hazard_PF_V_1_0_7_28/images.log
2004-Nov-15 11:11:36 6394 bytes prism/private/wslib/WS/Class_Hazard_PF_V_1_0_7_28/images.pl
2004-Nov-15 11:11:24 9940 bytes prism/private/wslib/WS/Class_Hazard_PF_V_1_0_7_28/images.tex
2004-Nov-15 11:11:30 963 bytes prism/private/wslib/WS/Class_Hazard_PF_V_1_0_7_28/img1.png
2004-Nov-15 11:11:26 678 bytes prism/private/wslib/WS/Class_Hazard_PF_V_1_0_7_28/img10.png
2004-Nov-15 11:11:30 1288 bytes prism/private/wslib/WS/Class_Hazard_PF_V_1_0_7_28/img11.png
2004-Nov-15 11:11:34 936 bytes prism/private/wslib/WS/Class_Hazard_PF_V_1_0_7_28/img12.png
2004-Nov-15 11:11:32 811 bytes prism/private/wslib/WS/Class_Hazard_PF_V_1_0_7_28/img13.png
2004-Nov-15 11:11:32 1539 bytes prism/private/wslib/WS/Class_Hazard_PF_V_1_0_7_28/img14.png
2004-Nov-15 11:11:28 1563 bytes prism/private/wslib/WS/Class_Hazard_PF_V_1_0_7_28/img15.png
2004-Nov-15 11:11:28 1122 bytes prism/private/wslib/WS/Class_Hazard_PF_V_1_0_7_28/img16.png
2004-Nov-15 11:11:34 887 bytes prism/private/wslib/WS/Class_Hazard_PF_V_1_0_7_28/img17.png
2004-Nov-15 11:11:36 1142 bytes prism/private/wslib/WS/Class_Hazard_PF_V_1_0_7_28/img18.png
2004-Nov-15 11:11:36 1117 bytes prism/private/wslib/WS/Class_Hazard_PF_V_1_0_7_28/img19.png
2004-Nov-15 11:11:32 872 bytes prism/private/wslib/WS/Class_Hazard_PF_V_1_0_7_28/img2.png
2004-Nov-15 11:11:28 856 bytes prism/private/wslib/WS/Class_Hazard_PF_V_1_0_7_28/img20.png
2004-Nov-15 11:11:30 1626 bytes prism/private/wslib/WS/Class_Hazard_PF_V_1_0_7_28/img3.png
2004-Nov-15 11:11:28 1838 bytes prism/private/wslib/WS/Class_Hazard_PF_V_1_0_7_28/img4.png
2004-Nov-15 11:11:34 1205 bytes prism/private/wslib/WS/Class_Hazard_PF_V_1_0_7_28/img5.png
2004-Nov-15 11:11:32 1357 bytes prism/private/wslib/WS/Class_Hazard_PF_V_1_0_7_28/img6.png
2004-Nov-15 11:11:26 1308 bytes prism/private/wslib/WS/Class_Hazard_PF_V_1_0_7_28/img7.png
2004-Nov-15 11:11:30 933 bytes prism/private/wslib/WS/Class_Hazard_PF_V_1_0_7_28/img8.png
2004-Nov-15 11:11:26 651 bytes prism/private/wslib/WS/Class_Hazard_PF_V_1_0_7_28/img9.png
2004-Nov-15 11:11:36 10716 bytes prism/private/wslib/WS/Class_Hazard_PF_V_1_0_7_28/index.html
2004-Nov-15 11:11:36 2656 bytes prism/private/wslib/WS/Class_Hazard_PF_V_1_0_7_28/internals.pl
2004-Nov-15 11:11:44 2930 bytes prism/private/wslib/WS/Class_Hazard_PF_V_1_0_7_28/labels.pl
2004-Nov-15 11:11:36 2512 bytes prism/private/wslib/WS/Class_Hazard_PF_V_1_0_7_28/node1.html
2004-Dec-13 10:28:43 1122 bytes prism/private/wslib/WS/Class_Hazard_PP_L_1_0_7_28
2004-Nov-15 11:11:40 159531 bytes prism/private/wslib/WS/Class_Hazard_PP_L_1_0_7_28.pm
2004-Nov-15 11:11:40 2152 bytes prism/private/wslib/WS/Class_Hazard_PP_L_1_0_7_28.tex
2004-Nov-15 11:11:40 304 bytes prism/private/wslib/WS/Class_Hazard_PP_L_1_0_7_28.ws
2004-Nov-15 11:11:54 891 bytes prism/private/wslib/WS/Class_Hazard_PP_L_1_0_7_28/Class_Hazard_PP_L_1_0_7_28.css
2004-Nov-15 11:11:54 10716 bytes prism/private/wslib/WS/Class_Hazard_PP_L_1_0_7_28/Class_Hazard_PP_L_1_0_7_28.html
2004-Dec-13 10:28:42 816 bytes prism/private/wslib/WS/Class_Hazard_PP_L_1_0_7_28/EqnImages
2004-Nov-15 11:11:54 774 bytes prism/private/wslib/WS/Class_Hazard_PP_L_1_0_7_28/EqnImages/BP_Eqn_0.png
2004-Nov-15 11:11:54 781 bytes prism/private/wslib/WS/Class_Hazard_PP_L_1_0_7_28/EqnImages/BP_Eqn_1.png
2004-Nov-15 11:11:54 1388 bytes prism/private/wslib/WS/Class_Hazard_PP_L_1_0_7_28/EqnImages/P_Eqn_0.png
2004-Nov-15 11:11:54 1674 bytes prism/private/wslib/WS/Class_Hazard_PP_L_1_0_7_28/EqnImages/P_Eqn_1.png
2004-Nov-15 11:11:54 1055 bytes prism/private/wslib/WS/Class_Hazard_PP_L_1_0_7_28/EqnImages/P_Eqn_10.png
2004-Nov-15 11:11:54 1201 bytes prism/private/wslib/WS/Class_Hazard_PP_L_1_0_7_28/EqnImages/P_Eqn_11.png
2004-Nov-15 11:11:54 1092 bytes prism/private/wslib/WS/Class_Hazard_PP_L_1_0_7_28/EqnImages/P_Eqn_12.png
2004-Nov-15 11:11:54 802 bytes prism/private/wslib/WS/Class_Hazard_PP_L_1_0_7_28/EqnImages/P_Eqn_13.png
2004-Nov-15 11:11:54 582 bytes prism/private/wslib/WS/Class_Hazard_PP_L_1_0_7_28/EqnImages/P_Eqn_14.png
2004-Nov-15 11:11:54 1092 bytes prism/private/wslib/WS/Class_Hazard_PP_L_1_0_7_28/EqnImages/P_Eqn_15.png
2004-Nov-15 11:11:54 616 bytes prism/private/wslib/WS/Class_Hazard_PP_L_1_0_7_28/EqnImages/P_Eqn_16.png
2004-Nov-15 11:11:54 1147 bytes prism/private/wslib/WS/Class_Hazard_PP_L_1_0_7_28/EqnImages/P_Eqn_17.png
2004-Nov-15 11:11:56 799 bytes prism/private/wslib/WS/Class_Hazard_PP_L_1_0_7_28/EqnImages/P_Eqn_18.png
2004-Nov-15 11:11:56 689 bytes prism/private/wslib/WS/Class_Hazard_PP_L_1_0_7_28/EqnImages/P_Eqn_19.png
2004-Nov-15 11:11:56 1383 bytes prism/private/wslib/WS/Class_Hazard_PP_L_1_0_7_28/EqnImages/P_Eqn_2.png
2004-Nov-15 11:11:56 1399 bytes prism/private/wslib/WS/Class_Hazard_PP_L_1_0_7_28/EqnImages/P_Eqn_3.png
2004-Nov-15 11:11:56 959 bytes prism/private/wslib/WS/Class_Hazard_PP_L_1_0_7_28/EqnImages/P_Eqn_4.png
2004-Nov-15 11:11:56 821 bytes prism/private/wslib/WS/Class_Hazard_PP_L_1_0_7_28/EqnImages/P_Eqn_5.png
2004-Nov-15 11:11:56 959 bytes prism/private/wslib/WS/Class_Hazard_PP_L_1_0_7_28/EqnImages/P_Eqn_6.png
2004-Nov-15 11:11:56 986 bytes prism/private/wslib/WS/Class_Hazard_PP_L_1_0_7_28/EqnImages/P_Eqn_7.png
2004-Nov-15 11:11:56 951 bytes prism/private/wslib/WS/Class_Hazard_PP_L_1_0_7_28/EqnImages/P_Eqn_8.png
2004-Nov-15 11:11:56 717 bytes prism/private/wslib/WS/Class_Hazard_PP_L_1_0_7_28/EqnImages/P_Eqn_9.png 2004-Nov-15 11:11:42 8 bytes prism/private/wslib/WS/Class_Hazard_PP_L_1_0_7_28/images.aux
2004-Nov-15 11:11:42 12420 bytes prism/private/wslib/WS/Class_Hazard_PP_L_1_0_7_28/images.log
2004-Nov-15 11:11:54 6394 bytes prism/private/wslib/WS/Class_Hazard_PP_L_1_0_7_28/images.pl
2004-Nov-15 11:11:42 9940 bytes prism/private/wslib/WS/Class_Hazard_PP_L_1_0_7_28/images.tex
2004-Nov-15 11:11:48 963 bytes prism/private/wslib/WS/Class_Hazard_PP_L_1_0_7_28/img1.png
2004-Nov-15 11:11:42 678 bytes prism/private/wslib/WS/Class_Hazard_PP_L_1_0_7_28/img10.png
2004-Nov-15 11:11:48 1288 bytes prism/private/wslib/WS/Class_Hazard_PP_L_1_0_7_28/img11.png
2004-Nov-15 11:11:52 936 bytes prism/private/wslib/WS/Class_Hazard_PP_L_1_0_7_28/img12.png
2004-Nov-15 11:11:50 811 bytes prism/private/wslib/WS/Class_Hazard_PP_L_1_0_7_28/img13.png
2004-Nov-15 11:11:50 1539 bytes prism/private/wslib/WS/Class_Hazard_PP_L_1_0_7_28/img14.png
2004-Nov-15 11:11:44 1563 bytes prism/private/wslib/WS/Class_Hazard_PP_L_1_0_7_28/img15.png
2004-Nov-15 11:11:46 1122 bytes prism/private/wslib/WS/Class_Hazard_PP_L_1_0_7_28/img16.png
2004-Nov-15 11:11:52 887 bytes prism/private/wslib/WS/Class_Hazard_PP_L_1_0_7_28/img17.png
2004-Nov-15 11:11:54 1142 bytes prism/private/wslib/WS/Class_Hazard_PP_L_1_0_7_28/img18.png
2004-Nov-15 11:11:52 1117 bytes prism/private/wslib/WS/Class_Hazard_PP_L_1_0_7_28/img19.png
2004-Nov-15 11:11:50 872 bytes prism/private/wslib/WS/Class_Hazard_PP_L_1_0_7_28/img2.png
2004-Nov-15 11:11:46 856 bytes prism/private/wslib/WS/Class_Hazard_PP_L_1_0_7_28/img20.png
2004-Nov-15 11:11:48 1626 bytes prism/private/wslib/WS/Class_Hazard_PP_L_1_0_7_28/img3.png
2004-Nov-15 11:11:46 1838 bytes prism/private/wslib/WS/Class_Hazard_PP_L_1_0_7_28/img4.png
2004-Nov-15 11:11:52 1205 bytes prism/private/wslib/WS/Class_Hazard_PP_L_1_0_7_28/img5.png
2004-Nov-15 11:11:50 1357 bytes prism/private/wslib/WS/Class_Hazard_PP_L_1_0_7_28/img6.png
2004-Nov-15 11:11:44 1308 bytes prism/private/wslib/WS/Class_Hazard_PP_L_1_0_7_28/img7.png
2004-Nov-15 11:11:48 933 bytes prism/private/wslib/WS/Class_Hazard_PP_L_1_0_7_28/img8.png
2004-Nov-15 11:11:44 651 bytes prism/private/wslib/WS/Class_Hazard_PP_L_1_0_7_28/img9.png
2004-Nov-15 11:11:54 10716 bytes prism/private/wslib/WS/Class_Hazard_PP_L_1_0_7_28/index.html
2004-Nov-15 11:11:54 2656 bytes prism/private/wslib/WS/Class_Hazard_PP_L_1_0_7_28/internals.pl
2004-Nov-15 11:12:14 2930 bytes prism/private/wslib/WS/Class_Hazard_PP_L_1_0_7_28/labels.pl
2004-Nov-15 11:11:54 2512 bytes prism/private/wslib/WS/Class_Hazard_PP_L_1_0_7_28/node1.html
2004-Dec-13 10:28:43 1122 bytes prism/private/wslib/WS/Class_Hazard_PT_V_1_0_7_28
2004-Nov-15 11:11:56 159531 bytes prism/private/wslib/WS/Class_Hazard_PT_V_1_0_7_28.pm
2004-Nov-15 11:11:56 2152 bytes prism/private/wslib/WS/Class_Hazard_PT_V_1_0_7_28.tex
2004-Nov-15 11:11:56 304 bytes prism/private/wslib/WS/Class_Hazard_PT_V_1_0_7_28.ws
2004-Nov-15 11:12:10 891 bytes prism/private/wslib/WS/Class_Hazard_PT_V_1_0_7_28/Class_Hazard_PT_V_1_0_7_28.css
2004-Nov-15 11:12:10 10716 bytes prism/private/wslib/WS/Class_Hazard_PT_V_1_0_7_28/Class_Hazard_PT_V_1_0_7_28.html
2004-Dec-13 10:28:43 816 bytes prism/private/wslib/WS/Class_Hazard_PT_V_1_0_7_28/EqnImages
2004-Nov-15 11:12:10 774 bytes prism/private/wslib/WS/Class_Hazard_PT_V_1_0_7_28/EqnImages/BP_Eqn_0.png
2004-Nov-15 11:12:10 781 bytes prism/private/wslib/WS/Class_Hazard_PT_V_1_0_7_28/EqnImages/BP_Eqn_1.png
2004-Nov-15 11:12:10 1388 bytes prism/private/wslib/WS/Class_Hazard_PT_V_1_0_7_28/EqnImages/P_Eqn_0.png
2004-Nov-15 11:12:10 1674 bytes prism/private/wslib/WS/Class_Hazard_PT_V_1_0_7_28/EqnImages/P_Eqn_1.png
2004-Nov-15 11:12:12 1055 bytes prism/private/wslib/WS/Class_Hazard_PT_V_1_0_7_28/EqnImages/P_Eqn_10.png
2004-Nov-15 11:12:12 1201 bytes prism/private/wslib/WS/Class_Hazard_PT_V_1_0_7_28/EqnImages/P_Eqn_11.png
2004-Nov-15 11:12:12 1092 bytes prism/private/wslib/WS/Class_Hazard_PT_V_1_0_7_28/EqnImages/P_Eqn_12.png
2004-Nov-15 11:12:12 802 bytes prism/private/wslib/WS/Class_Hazard_PT_V_1_0_7_28/EqnImages/P_Eqn_13.png
2004-Nov-15 11:12:12 582 bytes prism/private/wslib/WS/Class_Hazard_PT_V_1_0_7_28/EqnImages/P_Eqn_14.png
2004-Nov-15 11:12:12 1092 bytes prism/private/wslib/WS/Class_Hazard_PT_V_1_0_7_28/EqnImages/P_Eqn_15.png
2004-Nov-15 11:12:12 616 bytes prism/private/wslib/WS/Class_Hazard_PT_V_1_0_7_28/EqnImages/P_Eqn_16.png
2004-Nov-15 11:12:12 1147 bytes prism/private/wslib/WS/Class_Hazard_PT_V_1_0_7_28/EqnImages/P_Eqn_17.png
2004-Nov-15 11:12:12 799 bytes prism/private/wslib/WS/Class_Hazard_PT_V_1_0_7_28/EqnImages/P_Eqn_18.png
2004-Nov-15 11:12:12 689 bytes prism/private/wslib/WS/Class_Hazard_PT_V_1_0_7_28/EqnImages/P_Eqn_19.png
2004-Nov-15 11:12:12 1383 bytes prism/private/wslib/WS/Class_Hazard_PT_V_1_0_7_28/EqnImages/P_Eqn_2.png
2004-Nov-15 11:12:12 1399 bytes prism/private/wslib/WS/Class_Hazard_PT_V_1_0_7_28/EqnImages/P_Eqn_3.png
2004-Nov-15 11:12:12 959 bytes prism/private/wslib/WS/Class_Hazard_PT_V_1_0_7_28/EqnImages/P_Eqn_4.png
2004-Nov-15 11:12:12 821 bytes prism/private/wslib/WS/Class_Hazard_PT_V_1_0_7_28/EqnImages/P_Eqn_5.png
2004-Nov-15 11:12:12 959 bytes prism/private/wslib/WS/Class_Hazard_PT_V_1_0_7_28/EqnImages/P_Eqn_6.png
2004-Nov-15 11:12:14 986 bytes prism/private/wslib/WS/Class_Hazard_PT_V_1_0_7_28/EqnImages/P_Eqn_7.png
2004-Nov-15 11:12:14 951 bytes prism/private/wslib/WS/Class_Hazard_PT_V_1_0_7_28/EqnImages/P_Eqn_8.png
2004-Nov-15 11:12:14 717 bytes prism/private/wslib/WS/Class_Hazard_PT_V_1_0_7_28/EqnImages/P_Eqn_9.png
2004-Nov-15 11:11:58 8 bytes prism/private/wslib/WS/Class_Hazard_PT_V_1_0_7_28/images.aux
2004-Nov-15 11:11:58 12420 bytes prism/private/wslib/WS/Class_Hazard_PT_V_1_0_7_28/images.log
2004-Nov-15 11:12:10 6394 bytes prism/private/wslib/WS/Class_Hazard_PT_V_1_0_7_28/images.pl
2004-Nov-15 11:11:58 9940 bytes prism/private/wslib/WS/Class_Hazard_PT_V_1_0_7_28/images.tex 2004-Nov-15 11:12:06 963 bytes prism/private/wslib/WS/Class_Hazard_PT_V_1_0_7_28/img1.png
2004-Nov-15 11:12:00 678 bytes prism/private/wslib/WS/Class_Hazard_PT_V_1_0_7_28/img10.png
2004-Nov-15 11:12:04 1288 bytes prism/private/wslib/WS/Class_Hazard_PT_V_1_0_7_28/img11.png
2004-Nov-15 11:12:08 936 bytes prism/private/wslib/WS/Class_Hazard_PT_V_1_0_7_28/img12.png
2004-Nov-15 11:12:08 811 bytes prism/private/wslib/WS/Class_Hazard_PT_V_1_0_7_28/img13.png
2004-Nov-15 11:12:06 1539 bytes prism/private/wslib/WS/Class_Hazard_PT_V_1_0_7_28/img14.png
2004-Nov-15 11:12:02 1563 bytes prism/private/wslib/WS/Class_Hazard_PT_V_1_0_7_28/img15.png
2004-Nov-15 11:12:04 1122 bytes prism/private/wslib/WS/Class_Hazard_PT_V_1_0_7_28/img16.png
2004-Nov-15 11:12:08 887 bytes prism/private/wslib/WS/Class_Hazard_PT_V_1_0_7_28/img17.png
2004-Nov-15 11:12:10 1142 bytes prism/private/wslib/WS/Class_Hazard_PT_V_1_0_7_28/img18.png
2004-Nov-15 11:12:10 1117 bytes prism/private/wslib/WS/Class_Hazard_PT_V_1_0_7_28/img19.png
2004-Nov-15 11:12:06 872 bytes prism/private/wslib/WS/Class_Hazard_PT_V_1_0_7_28/img2.png
2004-Nov-15 11:12:02 856 bytes prism/private/wslib/WS/Class_Hazard_PT_V_1_0_7_28/img20.png
2004-Nov-15 11:12:04 1626 bytes prism/private/wslib/WS/Class_Hazard_PT_V_1_0_7_28/img3.png
2004-Nov-15 11:12:02 1838 bytes prism/private/wslib/WS/Class_Hazard_PT_V_1_0_7_28/img4.png
2004-Nov-15 11:12:10 1205 bytes prism/private/wslib/WS/Class_Hazard_PT_V_1_0_7_28/img5.png
2004-Nov-15 11:12:08 1357 bytes prism/private/wslib/WS/Class_Hazard_PT_V_1_0_7_28/img6.png
2004-Nov-15 11:12:02 1308 bytes prism/private/wslib/WS/Class_Hazard_PT_V_1_0_7_28/img7.png
2004-Nov-15 11:12:04 933 bytes prism/private/wslib/WS/Class_Hazard_PT_V_1_0_7_28/img8.png
2004-Nov-15 11:12:00 651 bytes prism/private/wslib/WS/Class_Hazard_PT_V_1_0_7_28/img9.png
2004-Nov-15 11:12:10 10716 bytes prism/private/wslib/WS/Class_Hazard_PT_V_1_0_7_28/index.html
2004-Nov-15 11:12:10 2656 bytes prism/private/wslib/WS/Class_Hazard_PT_V_1_0_7_28/internals.pl
2004-Nov-15 11:12:14 2930 bytes prism/private/wslib/WS/Class_Hazard_PT_V_1_0_7_28/labels.pl
2004-Nov-15 11:12:10 2512 bytes prism/private/wslib/WS/Class_Hazard_PT_V_1_0_7_28/node1.html
2004-Dec-13 10:28:43 1122 bytes prism/private/wslib/WS/Class_Hazard_SC_S_1_0_7_28
2004-Nov-15 11:12:14 159531 bytes prism/private/wslib/WS/Class_Hazard_SC_S_1_0_7_28.pm
2004-Nov-15 11:12:14 2152 bytes prism/private/wslib/WS/Class_Hazard_SC_S_1_0_7_28.tex
2004-Nov-15 11:12:14 308 bytes prism/private/wslib/WS/Class_Hazard_SC_S_1_0_7_28.ws
2004-Nov-15 11:12:28 891 bytes prism/private/wslib/WS/Class_Hazard_SC_S_1_0_7_28/Class_Hazard_SC_S_1_0_7_28.css
2004-Nov-15 11:12:28 10716 bytes prism/private/wslib/WS/Class_Hazard_SC_S_1_0_7_28/Class_Hazard_SC_S_1_0_7_28.html
2004-Dec-13 10:28:43 816 bytes prism/private/wslib/WS/Class_Hazard_SC_S_1_0_7_28/EqnImages
2004-Nov-15 11:12:28 774 bytes prism/private/wslib/WS/Class_Hazard_SC_S_1_0_7_28/EqnImages/BP_Eqn_0.png
2004-Nov-15 11:12:28 781 bytes prism/private/wslib/WS/Class_Hazard_SC_S_1_0_7_28/EqnImages/BP_Eqn_1.png
2004-Nov-15 11:12:28 1388 bytes prism/private/wslib/WS/Class_Hazard_SC_S_1_0_7_28/EqnImages/P_Eqn_0.png
2004-Nov-15 11:12:28 1674 bytes prism/private/wslib/WS/Class_Hazard_SC_S_1_0_7_28/EqnImages/P_Eqn_1.png
2004-Nov-15 11:12:28 1055 bytes prism/private/wslib/WS/Class_Hazard_SC_S_1_0_7_28/EqnImages/P_Eqn_10.png
2004-Nov-15 11:12:28 1201 bytes prism/private/wslib/WS/Class_Hazard_SC_S_1_0_7_28/EqnImages/P_Eqn_11.png
2004-Nov-15 11:12:28 1092 bytes prism/private/wslib/WS/Class_Hazard_SC_S_1_0_7_28/EqnImages/P_Eqn_12.png
2004-Nov-15 11:12:28 802 bytes prism/private/wslib/WS/Class_Hazard_SC_S_1_0_7_28/EqnImages/P_Eqn_13.png
2004-Nov-15 11:12:28 582 bytes prism/private/wslib/WS/Class_Hazard_SC_S_1_0_7_28/EqnImages/P_Eqn_14.png
2004-Nov-15 11:12:28 1092 bytes prism/private/wslib/WS/Class_Hazard_SC_S_1_0_7_28/EqnImages/P_Eqn_15.png
2004-Nov-15 11:12:28 616 bytes prism/private/wslib/WS/Class_Hazard_SC_S_1_0_7_28/EqnImages/P_Eqn_16.png
2004-Nov-15 11:12:30 1147 bytes prism/private/wslib/WS/Class_Hazard_SC_S_1_0_7_28/EqnImages/P_Eqn_17.png
2004-Nov-15 11:12:30 799 bytes prism/private/wslib/WS/Class_Hazard_SC_S_1_0_7_28/EqnImages/P_Eqn_18.png
2004-Nov-15 11:12:30 689 bytes prism/private/wslib/WS/Class_Hazard_SC_S_1_0_7_28/EqnImages/P_Eqn_19.png
2004-Nov-15 11:12:30 1383 bytes prism/private/wslib/WS/Class_Hazard_SC_S_1_0_7_28/EqnImages/P_Eqn_2.png
2004-Nov-15 11:12:30 1399 bytes prism/private/wslib/WS/Class_Hazard_SC_S_1_0_7_28/EqnImages/P_Eqn_3.png
2004-Nov-15 11:12:30 959 bytes prism/private/wslib/WS/Class_Hazard_SC_S_1_0_7_28/EqnImages/P_Eqn_4.png
2004-Nov-15 11:12:30 821 bytes prism/private/wslib/WS/Class_Hazard_SC_S_1_0_7_28/EqnImages/P_Eqn_5.png
2004-Nov-15 11:12:30 959 bytes prism/private/wslib/WS/Class_Hazard_SC_S_1_0_7_28/EqnImages/P_Eqn_6.png
2004-Nov-15 11:12:30 986 bytes prism/private/wslib/WS/Class_Hazard_SC_S_1_0_7_28/EqnImages/P_Eqn_7.png
2004-Nov-15 11:12:30 951 bytes prism/private/wslib/WS/Class_Hazard_SC_S_1_0_7_28/EqnImages/P_Eqn_8.png
2004-Nov-15 11:12:30 717 bytes prism/private/wslib/WS/Class_Hazard_SC_S_1_0_7_28/EqnImages/P_Eqn_9.png
2004-Nov-15 11:12:16 8 bytes prism/private/wslib/WS/Class_Hazard_SC_S_1_0_7_28/images.aux
2004-Nov-15 11:12:16 12420 bytes prism/private/wslib/WS/Class_Hazard_SC_S_1_0_7_28/images.log
2004-Nov-15 11:12:28 6394 bytes prism/private/wslib/WS/Class_Hazard_SC_S_1_0_7_28/images.pl
2004-Nov-15 11:12:16 9940 bytes prism/private/wslib/WS/Class_Hazard_SC_S_1_0_7_28/images.tex
2004-Nov-15 11:12:22 963 bytes prism/private/wslib/WS/Class_Hazard_SC_S_1_0_7_28/img1.png
2004-Nov-15 11:12:18 678 bytes prism/private/wslib/WS/Class_Hazard_SC_S_1_0_7_28/img10.png
2004-Nov-15 11:12:22 1288 bytes prism/private/wslib/WS/Class_Hazard_SC_S_1_0_7_28/img11.png
2004-Nov-15 11:12:26 936 bytes prism/private/wslib/WS/Class_Hazard_SC_S_1_0_7_28/img12.png 2004-Nov-15 11:12:24 811 bytes prism/private/wslib/WS/Class_Hazard_SC_S_1_0_7_28/img13.png
2004-Nov-15 11:12:24 1539 bytes prism/private/wslib/WS/Class_Hazard_SC_S_1_0_7_28/img14.png
2004-Nov-15 11:12:18 1563 bytes prism/private/wslib/WS/Class_Hazard_SC_S_1_0_7_28/img15.png
2004-Nov-15 11:12:20 1122 bytes prism/private/wslib/WS/Class_Hazard_SC_S_1_0_7_28/img16.png
2004-Nov-15 11:12:26 887 bytes prism/private/wslib/WS/Class_Hazard_SC_S_1_0_7_28/img17.png
2004-Nov-15 11:12:28 1142 bytes prism/private/wslib/WS/Class_Hazard_SC_S_1_0_7_28/img18.png
2004-Nov-15 11:12:26 1117 bytes prism/private/wslib/WS/Class_Hazard_SC_S_1_0_7_28/img19.png
2004-Nov-15 11:12:24 872 bytes prism/private/wslib/WS/Class_Hazard_SC_S_1_0_7_28/img2.png
2004-Nov-15 11:12:20 856 bytes prism/private/wslib/WS/Class_Hazard_SC_S_1_0_7_28/img20.png
2004-Nov-15 11:12:22 1626 bytes prism/private/wslib/WS/Class_Hazard_SC_S_1_0_7_28/img3.png
2004-Nov-15 11:12:20 1838 bytes prism/private/wslib/WS/Class_Hazard_SC_S_1_0_7_28/img4.png
2004-Nov-15 11:12:26 1205 bytes prism/private/wslib/WS/Class_Hazard_SC_S_1_0_7_28/img5.png
2004-Nov-15 11:12:24 1357 bytes prism/private/wslib/WS/Class_Hazard_SC_S_1_0_7_28/img6.png
2004-Nov-15 11:12:18 1308 bytes prism/private/wslib/WS/Class_Hazard_SC_S_1_0_7_28/img7.png
2004-Nov-15 11:12:22 933 bytes prism/private/wslib/WS/Class_Hazard_SC_S_1_0_7_28/img8.png
2004-Nov-15 11:12:18 651 bytes prism/private/wslib/WS/Class_Hazard_SC_S_1_0_7_28/img9.png
2004-Nov-15 11:12:28 10716 bytes prism/private/wslib/WS/Class_Hazard_SC_S_1_0_7_28/index.html
2004-Nov-15 11:12:28 2656 bytes prism/private/wslib/WS/Class_Hazard_SC_S_1_0_7_28/internals.pl
2004-Nov-15 11:12:44 2930 bytes prism/private/wslib/WS/Class_Hazard_SC_S_1_0_7_28/labels.pl
2004-Nov-15 11:12:28 2512 bytes prism/private/wslib/WS/Class_Hazard_SC_S_1_0_7_28/node1.html
2004-Dec-13 10:28:43 782 bytes prism/private/wslib/WS/Class_Hazard_TBF_V_1_0_7_28
2004-Nov-15 11:12:30 85962 bytes prism/private/wslib/WS/Class_Hazard_TBF_V_1_0_7_28.pm
2004-Nov-15 11:12:30 982 bytes prism/private/wslib/WS/Class_Hazard_TBF_V_1_0_7_28.tex
2004-Nov-15 11:12:30 301 bytes prism/private/wslib/WS/Class_Hazard_TBF_V_1_0_7_28.ws
2004-Nov-15 11:12:38 891 bytes prism/private/wslib/WS/Class_Hazard_TBF_V_1_0_7_28/Class_Hazard_TBF_V_1_0_7_28.css
2004-Nov-15 11:12:38 5441 bytes prism/private/wslib/WS/Class_Hazard_TBF_V_1_0_7_28/Class_Hazard_TBF_V_1_0_7_28.html
2004-Dec-13 10:28:43 408 bytes prism/private/wslib/WS/Class_Hazard_TBF_V_1_0_7_28/EqnImages
2004-Nov-15 11:12:38 748 bytes prism/private/wslib/WS/Class_Hazard_TBF_V_1_0_7_28/EqnImages/CVFlow_Eqn_0.png
2004-Nov-15 11:12:38 672 bytes prism/private/wslib/WS/Class_Hazard_TBF_V_1_0_7_28/EqnImages/CVFlow_Eqn_1.png
2004-Nov-15 11:12:38 1368 bytes prism/private/wslib/WS/Class_Hazard_TBF_V_1_0_7_28/EqnImages/CVFlow_Eqn_2.png
2004-Nov-15 11:12:40 1420 bytes prism/private/wslib/WS/Class_Hazard_TBF_V_1_0_7_28/EqnImages/CVFlow_Eqn_3.png
2004-Nov-15 11:12:40 585 bytes prism/private/wslib/WS/Class_Hazard_TBF_V_1_0_7_28/EqnImages/CVFlow_Eqn_4.png
2004-Nov-15 11:12:40 634 bytes prism/private/wslib/WS/Class_Hazard_TBF_V_1_0_7_28/EqnImages/CVFlow_Eqn_5.png
2004-Nov-15 11:12:40 2270 bytes prism/private/wslib/WS/Class_Hazard_TBF_V_1_0_7_28/EqnImages/CVFlow_Eqn_6.png
2004-Nov-15 11:12:40 883 bytes prism/private/wslib/WS/Class_Hazard_TBF_V_1_0_7_28/EqnImages/Eqn_0.png
2004-Nov-15 11:12:40 1054 bytes prism/private/wslib/WS/Class_Hazard_TBF_V_1_0_7_28/EqnImages/PVP_Eqn_0.png
2004-Nov-15 11:12:40 397 bytes prism/private/wslib/WS/Class_Hazard_TBF_V_1_0_7_28/EqnImages/PVP_Eqn_1.png
2004-Nov-15 11:12:32 8 bytes prism/private/wslib/WS/Class_Hazard_TBF_V_1_0_7_28/images.aux
2004-Nov-15 11:12:32 10405 bytes prism/private/wslib/WS/Class_Hazard_TBF_V_1_0_7_28/images.log
2004-Nov-15 11:12:38 3203 bytes prism/private/wslib/WS/Class_Hazard_TBF_V_1_0_7_28/images.pl
2004-Nov-15 11:12:32 7810 bytes prism/private/wslib/WS/Class_Hazard_TBF_V_1_0_7_28/images.tex
2004-Nov-15 11:12:36 871 bytes prism/private/wslib/WS/Class_Hazard_TBF_V_1_0_7_28/img1.png
2004-Nov-15 11:12:38 427 bytes prism/private/wslib/WS/Class_Hazard_TBF_V_1_0_7_28/img10.png
2004-Nov-15 11:12:36 756 bytes prism/private/wslib/WS/Class_Hazard_TBF_V_1_0_7_28/img2.png
2004-Nov-15 11:12:38 1509 bytes prism/private/wslib/WS/Class_Hazard_TBF_V_1_0_7_28/img3.png
2004-Nov-15 11:12:34 1593 bytes prism/private/wslib/WS/Class_Hazard_TBF_V_1_0_7_28/img4.png
2004-Nov-15 11:12:38 625 bytes prism/private/wslib/WS/Class_Hazard_TBF_V_1_0_7_28/img5.png
2004-Nov-15 11:12:34 719 bytes prism/private/wslib/WS/Class_Hazard_TBF_V_1_0_7_28/img6.png
2004-Nov-15 11:12:34 2604 bytes prism/private/wslib/WS/Class_Hazard_TBF_V_1_0_7_28/img7.png
2004-Nov-15 11:12:36 979 bytes prism/private/wslib/WS/Class_Hazard_TBF_V_1_0_7_28/img8.png
2004-Nov-15 11:12:36 1176 bytes prism/private/wslib/WS/Class_Hazard_TBF_V_1_0_7_28/img9.png
2004-Nov-15 11:12:38 5441 bytes prism/private/wslib/WS/Class_Hazard_TBF_V_1_0_7_28/index.html
2004-Nov-15 11:12:38 1299 bytes prism/private/wslib/WS/Class_Hazard_TBF_V_1_0_7_28/internals.pl
2004-Nov-15 11:12:44 1465 bytes prism/private/wslib/WS/Class_Hazard_TBF_V_1_0_7_28/labels.pl
2004-Nov-15 11:12:38 2523 bytes prism/private/wslib/WS/Class_Hazard_TBF_V_1_0_7_28/node1.html
2004-Dec-13 10:28:43 510 bytes prism/private/wslib/WS/Class_Hazard_TD_V_1_0_7_28
2004-Nov-15 11:12:40 32673 bytes prism/private/wslib/WS/Class_Hazard_TD_V_1_0_7_28.pm
2004-Nov-15 11:12:40 196 bytes prism/private/wslib/WS/Class_Hazard_TD_V_1_0_7_28.tex
2004-Nov-15 11:12:40 284 bytes prism/private/wslib/WS/Class_Hazard_TD_V_1_0_7_28.ws
2004-Nov-15 11:12:44 891 bytes prism/private/wslib/WS/Class_Hazard_TD_V_1_0_7_28/Class_Hazard_TD_V_1_0_7_28.css
2004-Nov-15 11:12:44 2310 bytes prism/private/wslib/WS/Class_Hazard_TD_V_1_0_7_28/Class_Hazard_TD_V_1_0_7_28.html

| | | |
|---|---|---|
| 2004-Dec-13 10:28:43 | 136 bytes | prism/private/wslib/WS/Class_Hazard_TD_V_1_0_7_28/EqnImages |
| 2004-Nov-15 11:12:44 | 876 bytes | prism/private/wslib/WS/Class_Hazard_TD_V_1_0_7_28/EqnImages/Eqn_0.png |
| 2004-Nov-15 11:12:44 | 733 bytes | prism/private/wslib/WS/Class_Hazard_TD_V_1_0_7_28/EqnImages/Eqn_1.png |
| 2004-Nov-15 11:12:42 | 8 bytes | prism/private/wslib/WS/Class_Hazard_TD_V_1_0_7_28/images.aux |
| 2004-Nov-15 11:12:42 | 8884 bytes | prism/private/wslib/WS/Class_Hazard_TD_V_1_0_7_28/images.log |
| 2004-Nov-15 11:12:44 | 615 bytes | prism/private/wslib/WS/Class_Hazard_TD_V_1_0_7_28/images.pl |
| 2004-Nov-15 11:12:42 | 6175 bytes | prism/private/wslib/WS/Class_Hazard_TD_V_1_0_7_28/images.tex |
| 2004-Nov-15 11:12:44 | 951 bytes | prism/private/wslib/WS/Class_Hazard_TD_V_1_0_7_28/img1.png |
| 2004-Nov-15 11:12:42 | 786 bytes | prism/private/wslib/WS/Class_Hazard_TD_V_1_0_7_28/img2.png |
| 2004-Nov-15 11:12:44 | 2310 bytes | prism/private/wslib/WS/Class_Hazard_TD_V_1_0_7_28/index.html |
| 2004-Nov-15 11:12:44 | 320 bytes | prism/private/wslib/WS/Class_Hazard_TD_V_1_0_7_28/internals.pl |
| 2004-Nov-15 11:12:44 | 414 bytes | prism/private/wslib/WS/Class_Hazard_TD_V_1_0_7_28/labels.pl |
| 2004-Nov-15 11:12:44 | 2512 bytes | prism/private/wslib/WS/Class_Hazard_TD_V_1_0_7_28/node1.html |
| 2004-Dec-13 10:28:43 | 782 bytes | prism/private/wslib/WS/Class_Hazard_TF_V_1_0_7_28 |
| 2004-Nov-15 11:12:44 | 58603 bytes | prism/private/wslib/WS/Class_Hazard_TF_V_1_0_7_28.pm |
| 2004-Nov-15 11:12:44 | 840 bytes | prism/private/wslib/WS/Class_Hazard_TF_V_1_0_7_28.tex |
| 2004-Nov-15 11:12:44 | 292 bytes | prism/private/wslib/WS/Class_Hazard_TF_V_1_0_7_28.ws |
| 2004-Nov-15 11:12:52 | 891 bytes | prism/private/wslib/WS/Class_Hazard_TF_V_1_0_7_28/Class_Hazard_TF_V_1_0_7_28.css |
| 2004-Nov-15 11:12:52 | 5316 bytes | prism/private/wslib/WS/Class_Hazard_TF_V_1_0_7_28/Class_Hazard_TF_V_1_0_7_28.html |
| 2004-Dec-13 10:28:43 | 442 bytes | prism/private/wslib/WS/Class_Hazard_TF_V_1_0_7_28/EqnImages |
| 2004-Nov-15 11:12:52 | 606 bytes | prism/private/wslib/WS/Class_Hazard_TF_V_1_0_7_28/EqnImages/Eqn_0.png |
| 2004-Nov-15 11:12:52 | 807 bytes | prism/private/wslib/WS/Class_Hazard_TF_V_1_0_7_28/EqnImages/Eqn_1.png |
| 2004-Nov-15 11:12:52 | 828 bytes | prism/private/wslib/WS/Class_Hazard_TF_V_1_0_7_28/EqnImages/Eqn_2.png |
| 2004-Nov-15 11:12:52 | 550 bytes | prism/private/wslib/WS/Class_Hazard_TF_V_1_0_7_28/EqnImages/Eqn_3.png |
| 2004-Nov-15 11:12:52 | 716 bytes | prism/private/wslib/WS/Class_Hazard_TF_V_1_0_7_28/EqnImages/Eqn_4.png |
| 2004-Nov-15 11:12:52 | 1602 bytes | prism/private/wslib/WS/Class_Hazard_TF_V_1_0_7_28/EqnImages/Eqn_5.png |
| 2004-Nov-15 11:12:52 | 544 bytes | prism/private/wslib/WS/Class_Hazard_TF_V_1_0_7_28/EqnImages/ProtectedData_Eqn_0.png |
| 2004-Nov-15 11:12:52 | 541 bytes | prism/private/wslib/WS/Class_Hazard_TF_V_1_0_7_28/EqnImages/ProtectedData_Eqn_1.png |
| 2004-Nov-15 11:12:52 | 557 bytes | prism/private/wslib/WS/Class_Hazard_TF_V_1_0_7_28/EqnImages/ProtectedData_Eqn_2.png |
| 2004-Nov-15 11:12:52 | 541 bytes | prism/private/wslib/WS/Class_Hazard_TF_V_1_0_7_28/EqnImages/ProtectedData_Eqn_3.png |
| 2004-Nov-15 11:12:52 | 457 bytes | prism/private/wslib/WS/Class_Hazard_TF_V_1_0_7_28/EqnImages/ProtectedData_Eqn_4.png |
| 2004-Nov-15 11:12:46 | 8 bytes | prism/private/wslib/WS/Class_Hazard_TF_V_1_0_7_28/images.aux |
| 2004-Nov-15 11:12:46 | 10171 bytes | prism/private/wslib/WS/Class_Hazard_TF_V_1_0_7_28/images.log |
| 2004-Nov-15 11:12:52 | 2755 bytes | prism/private/wslib/WS/Class_Hazard_TF_V_1_0_7_28/images.pl |
| 2004-Nov-15 11:12:46 | 7581 bytes | prism/private/wslib/WS/Class_Hazard_TF_V_1_0_7_28/images.tex |
| 2004-Nov-15 11:12:52 | 686 bytes | prism/private/wslib/WS/Class_Hazard_TF_V_1_0_7_28/img1.png |
| 2004-Nov-15 11:12:48 | 532 bytes | prism/private/wslib/WS/Class_Hazard_TF_V_1_0_7_28/img10.png |
| 2004-Nov-15 11:12:48 | 870 bytes | prism/private/wslib/WS/Class_Hazard_TF_V_1_0_7_28/img2.png |
| 2004-Nov-15 11:12:50 | 887 bytes | prism/private/wslib/WS/Class_Hazard_TF_V_1_0_7_28/img3.png |
| 2004-Nov-15 11:12:48 | 625 bytes | prism/private/wslib/WS/Class_Hazard_TF_V_1_0_7_28/img4.png |
| 2004-Nov-15 11:12:46 | 772 bytes | prism/private/wslib/WS/Class_Hazard_TF_V_1_0_7_28/img5.png |
| 2004-Nov-15 11:12:50 | 1767 bytes | prism/private/wslib/WS/Class_Hazard_TF_V_1_0_7_28/img6.png |
| 2004-Nov-15 11:12:50 | 616 bytes | prism/private/wslib/WS/Class_Hazard_TF_V_1_0_7_28/img7.png |
| 2004-Nov-15 11:12:48 | 668 bytes | prism/private/wslib/WS/Class_Hazard_TF_V_1_0_7_28/img8.png |
| 2004-Nov-15 11:12:50 | 632 bytes | prism/private/wslib/WS/Class_Hazard_TF_V_1_0_7_28/img9.png |
| 2004-Nov-15 11:12:52 | 5316 bytes | prism/private/wslib/WS/Class_Hazard_TF_V_1_0_7_28/index.html |
| 2004-Nov-15 11:12:52 | 1416 bytes | prism/private/wslib/WS/Class_Hazard_TF_V_1_0_7_28/internals.pl |
| 2004-Nov-15 11:13:14 | 1591 bytes | prism/private/wslib/WS/Class_Hazard_TF_V_1_0_7_28/labels.pl |
| 2004-Nov-15 11:12:52 | 2512 bytes | prism/private/wslib/WS/Class_Hazard_TF_V_1_0_7_28/node1.html |
| 2004-Dec-13 10:28:43 | 510 bytes | prism/private/wslib/WS/Class_Hazard_TGIF_V_1_0_7_28 |
| 2004-Nov-15 11:12:54 | 37384 bytes | prism/private/wslib/WS/Class_Hazard_TGIF_V_1_0_7_28.pm |
| 2004-Nov-15 11:12:54 | 250 bytes | prism/private/wslib/WS/Class_Hazard_TGIF_V_1_0_7_28.tex |
| 2004-Nov-15 11:12:54 | 297 bytes | prism/private/wslib/WS/Class_Hazard_TGIF_V_1_0_7_28.ws |
| 2004-Nov-15 11:12:56 | 891 bytes | prism/private/wslib/WS/Class_Hazard_TGIF_V_1_0_7_28/Class_Hazard_TGIF_V_1_0_7_28.css |
| 2004-Nov-15 11:12:56 | 2412 bytes | prism/private/wslib/WS/Class_Hazard_TGIF_V_1_0_7_28/Class_Hazard_TGIF_V_1_0_7_28.html |
| 2004-Dec-13 10:28:43 | 136 bytes | prism/private/wslib/WS/Class_Hazard_TGIF_V_1_0_7_28/EqnImages |
| 2004-Nov-15 11:12:56 | 610 bytes | prism/private/wslib/WS/Class_Hazard_TGIF_V_1_0_7_28/EqnImages/Eqn_0.png |
| 2004-Nov-15 11:12:56 | 1345 bytes | prism/private/wslib/WS/Class_Hazard_TGIF_V_1_0_7_28/EqnImages/GasAirConvert_Eqn_0.png |
| 2004-Nov-15 11:12:54 | 8 bytes | prism/private/wslib/WS/Class_Hazard_TGIF_V_1_0_7_28/images.aux |
| 2004-Nov-15 11:12:54 | 8884 bytes | prism/private/wslib/WS/Class_Hazard_TGIF_V_1_0_7_28/images.log |
| 2004-Nov-15 11:12:56 | 694 bytes | prism/private/wslib/WS/Class_Hazard_TGIF_V_1_0_7_28/images.pl |

2004-Nov-15 11:12:54 6215 bytes prism/private/wslib/WS/Class_Hazard_TGIF_V_1_0_7_28/images.tex
2004-Nov-15 11:12:56 697 bytes prism/private/wslib/WS/Class_Hazard_TGIF_V_1_0_7_28/img1.png
2004-Nov-15 11:12:56 1463 bytes prism/private/wslib/WS/Class_Hazard_TGIF_V_1_0_7_28/img2.png
2004-Nov-15 11:12:56 2412 bytes prism/private/wslib/WS/Class_Hazard_TGIF_V_1_0_7_28/index.html
2004-Nov-15 11:12:56 338 bytes prism/private/wslib/WS/Class_Hazard_TGIF_V_1_0_7_28/internals.pl
2004-Nov-15 11:13:14 432 bytes prism/private/wslib/WS/Class_Hazard_TGIF_V_1_0_7_28/labels.pl
2004-Nov-15 11:12:56 2534 bytes prism/private/wslib/WS/Class_Hazard_TGIF_V_1_0_7_28/node1.html
2004-Dec-13 10:28:43 510 bytes prism/private/wslib/WS/Class_Hazard_TGOF_V_1_0_7_28
2004-Nov-15 11:12:56 48011 bytes prism/private/wslib/WS/Class_Hazard_TGOF_V_1_0_7_28.pm
2004-Nov-15 11:12:56 253 bytes prism/private/wslib/WS/Class_Hazard_TGOF_V_1_0_7_28.tex
2004-Nov-15 11:12:56 298 bytes prism/private/wslib/WS/Class_Hazard_TGOF_V_1_0_7_28.ws
2004-Nov-15 11:13:00 891 bytes prism/private/wslib/WS/Class_Hazard_TGOF_V_1_0_7_28/Class_Hazard_TGOF_V_1_0_7_28.css
2004-Nov-15 11:13:00 2418 bytes prism/private/wslib/WS/Class_Hazard_TGOF_V_1_0_7_28/Class_Hazard_TGOF_V_1_0_7_28.html
2004-Dec-13 10:28:43 136 bytes prism/private/wslib/WS/Class_Hazard_TGOF_V_1_0_7_28/EqnImages
2004-Nov-15 11:13:00 562 bytes prism/private/wslib/WS/Class_Hazard_TGOF_V_1_0_7_28/EqnImages/Eqn_0.png
2004-Nov-15 11:13:00 1390 bytes prism/private/wslib/WS/Class_Hazard_TGOF_V_1_0_7_28/EqnImages/GasAirConvert_Eqn_0.png
2004-Nov-15 11:12:58 8 bytes prism/private/wslib/WS/Class_Hazard_TGOF_V_1_0_7_28/images.aux
2004-Nov-15 11:12:58 8884 bytes prism/private/wslib/WS/Class_Hazard_TGOF_V_1_0_7_28/images.log
2004-Nov-15 11:13:00 700 bytes prism/private/wslib/WS/Class_Hazard_TGOF_V_1_0_7_28/images.pl
2004-Nov-15 11:12:58 6218 bytes prism/private/wslib/WS/Class_Hazard_TGOF_V_1_0_7_28/images.tex
2004-Nov-15 11:13:00 645 bytes prism/private/wslib/WS/Class_Hazard_TGOF_V_1_0_7_28/img1.png
2004-Nov-15 11:13:00 1483 bytes prism/private/wslib/WS/Class_Hazard_TGOF_V_1_0_7_28/img2.png
2004-Nov-15 11:13:00 2418 bytes prism/private/wslib/WS/Class_Hazard_TGOF_V_1_0_7_28/index.html
2004-Nov-15 11:13:00 338 bytes prism/private/wslib/WS/Class_Hazard_TGOF_V_1_0_7_28/internals.pl
2004-Nov-15 11:13:14 432 bytes prism/private/wslib/WS/Class_Hazard_TGOF_V_1_0_7_28/labels.pl
2004-Nov-15 11:13:00 2534 bytes prism/private/wslib/WS/Class_Hazard_TGOF_V_1_0_7_28/node1.html
2004-Dec-13 10:28:43 1122 bytes prism/private/wslib/WS/Class_Hazard_TLO_L_1_0_7_28
2004-Nov-15 11:13:00 159607 bytes prism/private/wslib/WS/Class_Hazard_TLO_L_1_0_7_28.pm
2004-Nov-15 11:13:00 2152 bytes prism/private/wslib/WS/Class_Hazard_TLO_L_1_0_7_28.tex
2004-Nov-15 11:13:00 295 bytes prism/private/wslib/WS/Class_Hazard_TLO_L_1_0_7_28.ws
2004-Nov-15 11:13:14 891 bytes prism/private/wslib/WS/Class_Hazard_TLO_L_1_0_7_28/Class_Hazard_TLO_L_1_0_7_28.css
2004-Nov-15 11:13:14 10720 bytes prism/private/wslib/WS/Class_Hazard_TLO_L_1_0_7_28/Class_Hazard_TLO_L_1_0_7_28.html
2004-Dec-13 10:28:43 816 bytes prism/private/wslib/WS/Class_Hazard_TLO_L_1_0_7_28/EqnImages
2004-Nov-15 11:13:16 774 bytes prism/private/wslib/WS/Class_Hazard_TLO_L_1_0_7_28/EqnImages/BP_Eqn_0.png
2004-Nov-15 11:13:16 781 bytes prism/private/wslib/WS/Class_Hazard_TLO_L_1_0_7_28/EqnImages/BP_Eqn_1.png
2004-Nov-15 11:13:16 1388 bytes prism/private/wslib/WS/Class_Hazard_TLO_L_1_0_7_28/EqnImages/P_Eqn_0.png
2004-Nov-15 11:13:16 1674 bytes prism/private/wslib/WS/Class_Hazard_TLO_L_1_0_7_28/EqnImages/P_Eqn_1.png
2004-Nov-15 11:13:16 1055 bytes prism/private/wslib/WS/Class_Hazard_TLO_L_1_0_7_28/EqnImages/P_Eqn_10.png
2004-Nov-15 11:13:16 1201 bytes prism/private/wslib/WS/Class_Hazard_TLO_L_1_0_7_28/EqnImages/P_Eqn_11.png
2004-Nov-15 11:13:16 1092 bytes prism/private/wslib/WS/Class_Hazard_TLO_L_1_0_7_28/EqnImages/P_Eqn_12.png
2004-Nov-15 11:13:16 802 bytes prism/private/wslib/WS/Class_Hazard_TLO_L_1_0_7_28/EqnImages/P_Eqn_13.png
2004-Nov-15 11:13:16 582 bytes prism/private/wslib/WS/Class_Hazard_TLO_L_1_0_7_28/EqnImages/P_Eqn_14.png
2004-Nov-15 11:13:16 1092 bytes prism/private/wslib/WS/Class_Hazard_TLO_L_1_0_7_28/EqnImages/P_Eqn_15.png
2004-Nov-15 11:13:16 616 bytes prism/private/wslib/WS/Class_Hazard_TLO_L_1_0_7_28/EqnImages/P_Eqn_16.png
2004-Nov-15 11:13:16 1147 bytes prism/private/wslib/WS/Class_Hazard_TLO_L_1_0_7_28/EqnImages/P_Eqn_17.png
2004-Nov-15 11:13:16 799 bytes prism/private/wslib/WS/Class_Hazard_TLO_L_1_0_7_28/EqnImages/P_Eqn_18.png
2004-Nov-15 11:13:18 689 bytes prism/private/wslib/WS/Class_Hazard_TLO_L_1_0_7_28/EqnImages/P_Eqn_19.png
2004-Nov-15 11:13:18 1383 bytes prism/private/wslib/WS/Class_Hazard_TLO_L_1_0_7_28/EqnImages/P_Eqn_2.png
2004-Nov-15 11:13:18 1399 bytes prism/private/wslib/WS/Class_Hazard_TLO_L_1_0_7_28/EqnImages/P_Eqn_3.png
2004-Nov-15 11:13:18 959 bytes prism/private/wslib/WS/Class_Hazard_TLO_L_1_0_7_28/EqnImages/P_Eqn_4.png
2004-Nov-15 11:13:18 821 bytes prism/private/wslib/WS/Class_Hazard_TLO_L_1_0_7_28/EqnImages/P_Eqn_5.png
2004-Nov-15 11:13:18 959 bytes prism/private/wslib/WS/Class_Hazard_TLO_L_1_0_7_28/EqnImages/P_Eqn_6.png
2004-Nov-15 11:13:18 986 bytes prism/private/wslib/WS/Class_Hazard_TLO_L_1_0_7_28/EqnImages/P_Eqn_7.png
2004-Nov-15 11:13:18 951 bytes prism/private/wslib/WS/Class_Hazard_TLO_L_1_0_7_28/EqnImages/P_Eqn_8.png
2004-Nov-15 11:13:18 717 bytes prism/private/wslib/WS/Class_Hazard_TLO_L_1_0_7_28/EqnImages/P_Eqn_9.png
2004-Nov-15 11:13:02 8 bytes prism/private/wslib/WS/Class_Hazard_TLO_L_1_0_7_28/images.aux
2004-Nov-15 11:13:02 12420 bytes prism/private/wslib/WS/Class_Hazard_TLO_L_1_0_7_28/images.log
2004-Nov-15 11:13:14 6394 bytes prism/private/wslib/WS/Class_Hazard_TLO_L_1_0_7_28/images.pl
2004-Nov-15 11:13:02 9940 bytes prism/private/wslib/WS/Class_Hazard_TLO_L_1_0_7_28/images.tex
2004-Nov-15 11:13:10 963 bytes prism/private/wslib/WS/Class_Hazard_TLO_L_1_0_7_28/img1.png
2004-Nov-15 11:13:04 678 bytes prism/private/wslib/WS/Class_Hazard_TLO_L_1_0_7_28/img10.png

```
2004-Nov-15 11:13:10  1288 bytes  prism/private/wslib/WS/Class_Hazard_TLO_L_1_0_7_28/img11.png
2004-Nov-15 11:13:14  936 bytes  prism/private/wslib/WS/Class_Hazard_TLO_L_1_0_7_28/img12.png
2004-Nov-15 11:13:12  811 bytes  prism/private/wslib/WS/Class_Hazard_TLO_L_1_0_7_28/img13.png
2004-Nov-15 11:13:12  1539 bytes  prism/private/wslib/WS/Class_Hazard_TLO_L_1_0_7_28/img14.png
2004-Nov-15 11:13:06  1563 bytes  prism/private/wslib/WS/Class_Hazard_TLO_L_1_0_7_28/img15.png
2004-Nov-15 11:13:08  1122 bytes  prism/private/wslib/WS/Class_Hazard_TLO_L_1_0_7_28/img16.png
2004-Nov-15 11:13:12  887 bytes  prism/private/wslib/WS/Class_Hazard_TLO_L_1_0_7_28/img17.png
2004-Nov-15 11:13:14  1142 bytes  prism/private/wslib/WS/Class_Hazard_TLO_L_1_0_7_28/img18.png
2004-Nov-15 11:13:14  1117 bytes  prism/private/wslib/WS/Class_Hazard_TLO_L_1_0_7_28/img19.png
2004-Nov-15 11:13:10  872 bytes  prism/private/wslib/WS/Class_Hazard_TLO_L_1_0_7_28/img2.png
2004-Nov-15 11:13:08  856 bytes  prism/private/wslib/WS/Class_Hazard_TLO_L_1_0_7_28/img20.png
2004-Nov-15 11:13:08  1626 bytes  prism/private/wslib/WS/Class_Hazard_TLO_L_1_0_7_28/img3.png
2004-Nov-15 11:13:06  1838 bytes  prism/private/wslib/WS/Class_Hazard_TLO_L_1_0_7_28/img4.png
2004-Nov-15 11:13:14  1205 bytes  prism/private/wslib/WS/Class_Hazard_TLO_L_1_0_7_28/img5.png
2004-Nov-15 11:13:12  1357 bytes  prism/private/wslib/WS/Class_Hazard_TLO_L_1_0_7_28/img6.png
2004-Nov-15 11:13:04  1308 bytes  prism/private/wslib/WS/Class_Hazard_TLO_L_1_0_7_28/img7.png
2004-Nov-15 11:13:08  933 bytes  prism/private/wslib/WS/Class_Hazard_TLO_L_1_0_7_28/img8.png
2004-Nov-15 11:13:04  651 bytes  prism/private/wslib/WS/Class_Hazard_TLO_L_1_0_7_28/img9.png
2004-Nov-15 11:13:14  10720 bytes  prism/private/wslib/WS/Class_Hazard_TLO_L_1_0_7_28/index.html
2004-Nov-15 11:13:14  2678 bytes  prism/private/wslib/WS/Class_Hazard_TLO_L_1_0_7_28/internals.pl
2004-Nov-15 11:13:44  2952 bytes  prism/private/wslib/WS/Class_Hazard_TLO_L_1_0_7_28/labels.pl
2004-Nov-15 11:13:14  2523 bytes  prism/private/wslib/WS/Class_Hazard_TLO_L_1_0_7_28/node1.html
2004-Dec-13 10:28:43  1122 bytes  prism/private/wslib/WS/Class_Hazard_TPF_L_1_0_7_28
2004-Nov-15 11:13:18  159607 bytes  prism/private/wslib/WS/Class_Hazard_TPF_L_1_0_7_28.pm
2004-Nov-15 11:13:18  2152 bytes  prism/private/wslib/WS/Class_Hazard_TPF_L_1_0_7_28.tex
2004-Nov-15 11:13:18  291 bytes  prism/private/wslib/WS/Class_Hazard_TPF_L_1_0_7_28.ws
2004-Nov-15 11:13:32  891 bytes  prism/private/wslib/WS/Class_Hazard_TPF_L_1_0_7_28/Class_Hazard_TPF_L_1_0_7_28.css
2004-Nov-15 11:13:32  10720 bytes  prism/private/wslib/WS/Class_Hazard_TPF_L_1_0_7_28/Class_Hazard_TPF_L_1_0_7_28.html
2004-Dec-13 10:28:43  816 bytes  prism/private/wslib/WS/Class_Hazard_TPF_L_1_0_7_28/EqnImages
2004-Nov-15 11:13:32  774 bytes  prism/private/wslib/WS/Class_Hazard_TPF_L_1_0_7_28/EqnImages/BP_Eqn_0.png
2004-Nov-15 11:13:32  781 bytes  prism/private/wslib/WS/Class_Hazard_TPF_L_1_0_7_28/EqnImages/BP_Eqn_1.png
2004-Nov-15 11:13:32  1388 bytes  prism/private/wslib/WS/Class_Hazard_TPF_L_1_0_7_28/EqnImages/P_Eqn_0.png
2004-Nov-15 11:13:34  1674 bytes  prism/private/wslib/WS/Class_Hazard_TPF_L_1_0_7_28/EqnImages/P_Eqn_1.png
2004-Nov-15 11:13:34  1055 bytes  prism/private/wslib/WS/Class_Hazard_TPF_L_1_0_7_28/EqnImages/P_Eqn_10.png
2004-Nov-15 11:13:34  1201 bytes  prism/private/wslib/WS/Class_Hazard_TPF_L_1_0_7_28/EqnImages/P_Eqn_11.png
2004-Nov-15 11:13:34  1092 bytes  prism/private/wslib/WS/Class_Hazard_TPF_L_1_0_7_28/EqnImages/P_Eqn_12.png
2004-Nov-15 11:13:34  802 bytes  prism/private/wslib/WS/Class_Hazard_TPF_L_1_0_7_28/EqnImages/P_Eqn_13.png
2004-Nov-15 11:13:34  582 bytes  prism/private/wslib/WS/Class_Hazard_TPF_L_1_0_7_28/EqnImages/P_Eqn_14.png
2004-Nov-15 11:13:34  1092 bytes  prism/private/wslib/WS/Class_Hazard_TPF_L_1_0_7_28/EqnImages/P_Eqn_15.png
2004-Nov-15 11:13:34  616 bytes  prism/private/wslib/WS/Class_Hazard_TPF_L_1_0_7_28/EqnImages/P_Eqn_16.png
2004-Nov-15 11:13:34  1147 bytes  prism/private/wslib/WS/Class_Hazard_TPF_L_1_0_7_28/EqnImages/P_Eqn_17.png
2004-Nov-15 11:13:34  799 bytes  prism/private/wslib/WS/Class_Hazard_TPF_L_1_0_7_28/EqnImages/P_Eqn_18.png
2004-Nov-15 11:13:34  689 bytes  prism/private/wslib/WS/Class_Hazard_TPF_L_1_0_7_28/EqnImages/P_Eqn_19.png
2004-Nov-15 11:13:34  1383 bytes  prism/private/wslib/WS/Class_Hazard_TPF_L_1_0_7_28/EqnImages/P_Eqn_2.png
2004-Nov-15 11:13:34  1399 bytes  prism/private/wslib/WS/Class_Hazard_TPF_L_1_0_7_28/EqnImages/P_Eqn_3.png
2004-Nov-15 11:13:34  959 bytes  prism/private/wslib/WS/Class_Hazard_TPF_L_1_0_7_28/EqnImages/P_Eqn_4.png
2004-Nov-15 11:13:34  821 bytes  prism/private/wslib/WS/Class_Hazard_TPF_L_1_0_7_28/EqnImages/P_Eqn_5.png
2004-Nov-15 11:13:36  959 bytes  prism/private/wslib/WS/Class_Hazard_TPF_L_1_0_7_28/EqnImages/P_Eqn_6.png
2004-Nov-15 11:13:36  986 bytes  prism/private/wslib/WS/Class_Hazard_TPF_L_1_0_7_28/EqnImages/P_Eqn_7.png
2004-Nov-15 11:13:36  951 bytes  prism/private/wslib/WS/Class_Hazard_TPF_L_1_0_7_28/EqnImages/P_Eqn_8.png
2004-Nov-15 11:13:36  717 bytes  prism/private/wslib/WS/Class_Hazard_TPF_L_1_0_7_28/EqnImages/P_Eqn_9.png
2004-Nov-15 11:13:20  8 bytes  prism/private/wslib/WS/Class_Hazard_TPF_L_1_0_7_28/images.aux
2004-Nov-15 11:13:20  12420 bytes  prism/private/wslib/WS/Class_Hazard_TPF_L_1_0_7_28/images.log
2004-Nov-15 11:13:32  6394 bytes  prism/private/wslib/WS/Class_Hazard_TPF_L_1_0_7_28/images.pl
2004-Nov-15 11:13:20  9940 bytes  prism/private/wslib/WS/Class_Hazard_TPF_L_1_0_7_28/images.tex
2004-Nov-15 11:13:28  963 bytes  prism/private/wslib/WS/Class_Hazard_TPF_L_1_0_7_28/img1.png
2004-Nov-15 11:13:22  678 bytes  prism/private/wslib/WS/Class_Hazard_TPF_L_1_0_7_28/img10.png
2004-Nov-15 11:13:28  1288 bytes  prism/private/wslib/WS/Class_Hazard_TPF_L_1_0_7_28/img11.png
2004-Nov-15 11:13:30  936 bytes  prism/private/wslib/WS/Class_Hazard_TPF_L_1_0_7_28/img12.png
2004-Nov-15 11:13:30  811 bytes  prism/private/wslib/WS/Class_Hazard_TPF_L_1_0_7_28/img13.png
2004-Nov-15 11:13:28  1539 bytes  prism/private/wslib/WS/Class_Hazard_TPF_L_1_0_7_28/img14.png
```

```
2004-Nov-15 11:13:24  1563 bytes  prism/private/wslib/WS/Class_Hazard_TPF_L_1_0_7_28/img15.png
2004-Nov-15 11:13:26  1122 bytes  prism/private/wslib/WS/Class_Hazard_TPF_L_1_0_7_28/img16.png
2004-Nov-15 11:13:30  887 bytes  prism/private/wslib/WS/Class_Hazard_TPF_L_1_0_7_28/img17.png
2004-Nov-15 11:13:32  1142 bytes  prism/private/wslib/WS/Class_Hazard_TPF_L_1_0_7_28/img18.png
2004-Nov-15 11:13:32  1117 bytes  prism/private/wslib/WS/Class_Hazard_TPF_L_1_0_7_28/img19.png
2004-Nov-15 11:13:28  872 bytes  prism/private/wslib/WS/Class_Hazard_TPF_L_1_0_7_28/img2.png
2004-Nov-15 11:13:24  856 bytes  prism/private/wslib/WS/Class_Hazard_TPF_L_1_0_7_28/img20.png
2004-Nov-15 11:13:26  1626 bytes  prism/private/wslib/WS/Class_Hazard_TPF_L_1_0_7_28/img3.png
2004-Nov-15 11:13:24  1838 bytes  prism/private/wslib/WS/Class_Hazard_TPF_L_1_0_7_28/img4.png
2004-Nov-15 11:13:32  1205 bytes  prism/private/wslib/WS/Class_Hazard_TPF_L_1_0_7_28/img5.png
2004-Nov-15 11:13:30  1357 bytes  prism/private/wslib/WS/Class_Hazard_TPF_L_1_0_7_28/img6.png
2004-Nov-15 11:13:24  1308 bytes  prism/private/wslib/WS/Class_Hazard_TPF_L_1_0_7_28/img7.png
2004-Nov-15 11:13:26  933 bytes  prism/private/wslib/WS/Class_Hazard_TPF_L_1_0_7_28/img8.png
2004-Nov-15 11:13:22  651 bytes  prism/private/wslib/WS/Class_Hazard_TPF_L_1_0_7_28/img9.png
2004-Nov-15 11:13:32  10720 bytes  prism/private/wslib/WS/Class_Hazard_TPF_L_1_0_7_28/index.html
2004-Nov-15 11:13:32  2678 bytes  prism/private/wslib/WS/Class_Hazard_TPF_L_1_0_7_28/internals.pl
2004-Nov-15 11:13:44  2952 bytes  prism/private/wslib/WS/Class_Hazard_TPF_L_1_0_7_28/labels.pl
2004-Nov-15 11:13:32  2523 bytes  prism/private/wslib/WS/Class_Hazard_TPF_L_1_0_7_28/node1.html
2004-Dec-13 10:28:43  578 bytes  prism/private/wslib/WS/Class_Hazard_TPIT_V_1_0_7_28
2004-Nov-15 11:13:36  54015 bytes  prism/private/wslib/WS/Class_Hazard_TPIT_V_1_0_7_28.pm
2004-Nov-15 11:13:36  559 bytes  prism/private/wslib/WS/Class_Hazard_TPIT_V_1_0_7_28.tex
2004-Nov-15 11:13:36  303 bytes  prism/private/wslib/WS/Class_Hazard_TPIT_V_1_0_7_28.ws
2004-Nov-15 11:13:40  891 bytes  prism/private/wslib/WS/Class_Hazard_TPIT_V_1_0_7_28/Class_Hazard_TPIT_V_1_0_7_28.css
2004-Nov-15 11:13:40  3842 bytes  prism/private/wslib/WS/Class_Hazard_TPIT_V_1_0_7_28/Class_Hazard_TPIT_V_1_0_7_28.html
2004-Dec-13 10:28:43  272 bytes  prism/private/wslib/WS/Class_Hazard_TPIT_V_1_0_7_28/EqnImages
2004-Nov-15 11:13:40  1144 bytes  prism/private/wslib/WS/Class_Hazard_TPIT_V_1_0_7_28/EqnImages/Eqn_0.png
2004-Nov-15 11:13:40  1077 bytes  prism/private/wslib/WS/Class_Hazard_TPIT_V_1_0_7_28/EqnImages/Eqn_1.png
2004-Nov-15 11:13:40  1144 bytes  prism/private/wslib/WS/Class_Hazard_TPIT_V_1_0_7_28/EqnImages/Eqn_2.png
2004-Nov-15 11:13:40  1077 bytes  prism/private/wslib/WS/Class_Hazard_TPIT_V_1_0_7_28/EqnImages/Eqn_3.png
2004-Nov-15 11:13:40  973 bytes  prism/private/wslib/WS/Class_Hazard_TPIT_V_1_0_7_28/EqnImages/Eqn_4.png
2004-Nov-15 11:13:42  583 bytes  prism/private/wslib/WS/Class_Hazard_TPIT_V_1_0_7_28/EqnImages/ProtectedData_Eqn_0.png
2004-Nov-15 11:13:38  8 bytes  prism/private/wslib/WS/Class_Hazard_TPIT_V_1_0_7_28/images.aux
2004-Nov-15 11:13:38  9001 bytes  prism/private/wslib/WS/Class_Hazard_TPIT_V_1_0_7_28/images.log
2004-Nov-15 11:13:40  1295 bytes  prism/private/wslib/WS/Class_Hazard_TPIT_V_1_0_7_28/images.pl
2004-Nov-15 11:13:38  6591 bytes  prism/private/wslib/WS/Class_Hazard_TPIT_V_1_0_7_28/images.tex
2004-Nov-15 11:13:40  1310 bytes  prism/private/wslib/WS/Class_Hazard_TPIT_V_1_0_7_28/img1.png
2004-Nov-15 11:13:38  1226 bytes  prism/private/wslib/WS/Class_Hazard_TPIT_V_1_0_7_28/img2.png
2004-Nov-15 11:13:40  1195 bytes  prism/private/wslib/WS/Class_Hazard_TPIT_V_1_0_7_28/img3.png
2004-Nov-15 11:13:40  649 bytes  prism/private/wslib/WS/Class_Hazard_TPIT_V_1_0_7_28/img4.png
2004-Nov-15 11:13:40  3842 bytes  prism/private/wslib/WS/Class_Hazard_TPIT_V_1_0_7_28/index.html
2004-Nov-15 11:13:40  802 bytes  prism/private/wslib/WS/Class_Hazard_TPIT_V_1_0_7_28/internals.pl
2004-Nov-15 11:13:44  932 bytes  prism/private/wslib/WS/Class_Hazard_TPIT_V_1_0_7_28/labels.pl
2004-Nov-15 11:13:40  2534 bytes  prism/private/wslib/WS/Class_Hazard_TPIT_V_1_0_7_28/node1.html
2004-Dec-13 10:28:43  544 bytes  prism/private/wslib/WS/Class_Hazard_TPOT_V_1_0_7_28
2004-Nov-15 11:13:42  38698 bytes  prism/private/wslib/WS/Class_Hazard_TPOT_V_1_0_7_28.pm
2004-Nov-15 11:13:42  320 bytes  prism/private/wslib/WS/Class_Hazard_TPOT_V_1_0_7_28.tex
2004-Nov-15 11:13:42  304 bytes  prism/private/wslib/WS/Class_Hazard_TPOT_V_1_0_7_28.ws
2004-Nov-15 11:13:46  891 bytes  prism/private/wslib/WS/Class_Hazard_TPOT_V_1_0_7_28/Class_Hazard_TPOT_V_1_0_7_28.css
2004-Nov-15 11:13:46  2755 bytes  prism/private/wslib/WS/Class_Hazard_TPOT_V_1_0_7_28/Class_Hazard_TPOT_V_1_0_7_28.html
2004-Dec-13 10:28:43  170 bytes  prism/private/wslib/WS/Class_Hazard_TPOT_V_1_0_7_28/EqnImages
2004-Nov-15 11:13:46  1110 bytes  prism/private/wslib/WS/Class_Hazard_TPOT_V_1_0_7_28/EqnImages/Eqn_0.png
2004-Nov-15 11:13:46  903 bytes  prism/private/wslib/WS/Class_Hazard_TPOT_V_1_0_7_28/EqnImages/Eqn_1.png
2004-Nov-15 11:13:46  583 bytes  prism/private/wslib/WS/Class_Hazard_TPOT_V_1_0_7_28/EqnImages/ProtectedData_Eqn_0.png
2004-Nov-15 11:13:44  8 bytes  prism/private/wslib/WS/Class_Hazard_TPOT_V_1_0_7_28/images.aux
2004-Nov-15 11:13:44  8942 bytes  prism/private/wslib/WS/Class_Hazard_TPOT_V_1_0_7_28/images.log
2004-Nov-15 11:13:46  982 bytes  prism/private/wslib/WS/Class_Hazard_TPOT_V_1_0_7_28/images.pl
2004-Nov-15 11:13:42  6397 bytes  prism/private/wslib/WS/Class_Hazard_TPOT_V_1_0_7_28/images.tex
2004-Nov-15 11:13:44  1234 bytes  prism/private/wslib/WS/Class_Hazard_TPOT_V_1_0_7_28/img1.png
2004-Nov-15 11:13:44  1104 bytes  prism/private/wslib/WS/Class_Hazard_TPOT_V_1_0_7_28/img2.png
2004-Nov-15 11:13:46  649 bytes  prism/private/wslib/WS/Class_Hazard_TPOT_V_1_0_7_28/img3.png
2004-Nov-15 11:13:46  2755 bytes  prism/private/wslib/WS/Class_Hazard_TPOT_V_1_0_7_28/index.html
```

2004-Nov-15 11:13:46 454 bytes prism/private/wslib/WS/Class_Hazard_TPOT_V_1_0_7_28/internals.pl
2004-Nov-15 11:14:14 557 bytes prism/private/wslib/WS/Class_Hazard_TPOT_V_1_0_7_28/labels.pl
2004-Nov-15 11:13:46 2534 bytes prism/private/wslib/WS/Class_Hazard_TPOT_V_1_0_7_28/node1.html
2004-Dec-13 10:28:44 1122 bytes prism/private/wslib/WS/Class_Hazard_TPTB_V_1_0_7_28
2004-Nov-15 11:13:46 159683 bytes prism/private/wslib/WS/Class_Hazard_TPTB_V_1_0_7_28.pm
2004-Nov-15 11:13:46 2152 bytes prism/private/wslib/WS/Class_Hazard_TPTB_V_1_0_7_28.tex
2004-Nov-15 11:13:46 308 bytes prism/private/wslib/WS/Class_Hazard_TPTB_V_1_0_7_28.ws
2004-Nov-15 11:14:00 891 bytes prism/private/wslib/WS/Class_Hazard_TPTB_V_1_0_7_28/Class_Hazard_TPTB_V_1_0_7_28.css
2004-Nov-15 11:14:00 10724 bytes prism/private/wslib/WS/Class_Hazard_TPTB_V_1_0_7_28/Class_Hazard_TPTB_V_1_0_7_28.html
2004-Dec-13 10:28:43 816 bytes prism/private/wslib/WS/Class_Hazard_TPTB_V_1_0_7_28/EqnImages
2004-Nov-15 11:14:00 774 bytes prism/private/wslib/WS/Class_Hazard_TPTB_V_1_0_7_28/EqnImages/BP_Eqn_0.png
2004-Nov-15 11:14:00 781 bytes prism/private/wslib/WS/Class_Hazard_TPTB_V_1_0_7_28/EqnImages/BP_Eqn_1.png
2004-Nov-15 11:14:00 1388 bytes prism/private/wslib/WS/Class_Hazard_TPTB_V_1_0_7_28/EqnImages/P_Eqn_0.png
2004-Nov-15 11:14:00 1674 bytes prism/private/wslib/WS/Class_Hazard_TPTB_V_1_0_7_28/EqnImages/P_Eqn_1.png
2004-Nov-15 11:14:00 1055 bytes prism/private/wslib/WS/Class_Hazard_TPTB_V_1_0_7_28/EqnImages/P_Eqn_10.png
2004-Nov-15 11:14:02 1201 bytes prism/private/wslib/WS/Class_Hazard_TPTB_V_1_0_7_28/EqnImages/P_Eqn_11.png
2004-Nov-15 11:14:02 1092 bytes prism/private/wslib/WS/Class_Hazard_TPTB_V_1_0_7_28/EqnImages/P_Eqn_12.png
2004-Nov-15 11:14:02 802 bytes prism/private/wslib/WS/Class_Hazard_TPTB_V_1_0_7_28/EqnImages/P_Eqn_13.png
2004-Nov-15 11:14:02 582 bytes prism/private/wslib/WS/Class_Hazard_TPTB_V_1_0_7_28/EqnImages/P_Eqn_14.png
2004-Nov-15 11:14:02 1092 bytes prism/private/wslib/WS/Class_Hazard_TPTB_V_1_0_7_28/EqnImages/P_Eqn_15.png
2004-Nov-15 11:14:02 616 bytes prism/private/wslib/WS/Class_Hazard_TPTB_V_1_0_7_28/EqnImages/P_Eqn_16.png
2004-Nov-15 11:14:02 1147 bytes prism/private/wslib/WS/Class_Hazard_TPTB_V_1_0_7_28/EqnImages/P_Eqn_17.png
2004-Nov-15 11:14:02 799 bytes prism/private/wslib/WS/Class_Hazard_TPTB_V_1_0_7_28/EqnImages/P_Eqn_18.png
2004-Nov-15 11:14:02 689 bytes prism/private/wslib/WS/Class_Hazard_TPTB_V_1_0_7_28/EqnImages/P_Eqn_19.png
2004-Nov-15 11:14:02 1383 bytes prism/private/wslib/WS/Class_Hazard_TPTB_V_1_0_7_28/EqnImages/P_Eqn_2.png
2004-Nov-15 11:14:02 1399 bytes prism/private/wslib/WS/Class_Hazard_TPTB_V_1_0_7_28/EqnImages/P_Eqn_3.png
2004-Nov-15 11:14:02 959 bytes prism/private/wslib/WS/Class_Hazard_TPTB_V_1_0_7_28/EqnImages/P_Eqn_4.png
2004-Nov-15 11:14:02 821 bytes prism/private/wslib/WS/Class_Hazard_TPTB_V_1_0_7_28/EqnImages/P_Eqn_5.png
2004-Nov-15 11:14:02 959 bytes prism/private/wslib/WS/Class_Hazard_TPTB_V_1_0_7_28/EqnImages/P_Eqn_6.png
2004-Nov-15 11:14:04 986 bytes prism/private/wslib/WS/Class_Hazard_TPTB_V_1_0_7_28/EqnImages/P_Eqn_7.png
2004-Nov-15 11:14:04 951 bytes prism/private/wslib/WS/Class_Hazard_TPTB_V_1_0_7_28/EqnImages/P_Eqn_8.png
2004-Nov-15 11:14:04 717 bytes prism/private/wslib/WS/Class_Hazard_TPTB_V_1_0_7_28/EqnImages/P_Eqn_9.png
2004-Nov-15 11:13:48 8 bytes prism/private/wslib/WS/Class_Hazard_TPTB_V_1_0_7_28/images.aux
2004-Nov-15 11:13:48 12420 bytes prism/private/wslib/WS/Class_Hazard_TPTB_V_1_0_7_28/images.log
2004-Nov-15 11:14:00 6394 bytes prism/private/wslib/WS/Class_Hazard_TPTB_V_1_0_7_28/images.pl
2004-Nov-15 11:13:48 9940 bytes prism/private/wslib/WS/Class_Hazard_TPTB_V_1_0_7_28/images.tex
2004-Nov-15 11:13:56 963 bytes prism/private/wslib/WS/Class_Hazard_TPTB_V_1_0_7_28/img1.png
2004-Nov-15 11:13:50 678 bytes prism/private/wslib/WS/Class_Hazard_TPTB_V_1_0_7_28/img10.png
2004-Nov-15 11:13:54 1288 bytes prism/private/wslib/WS/Class_Hazard_TPTB_V_1_0_7_28/img11.png
2004-Nov-15 11:13:58 936 bytes prism/private/wslib/WS/Class_Hazard_TPTB_V_1_0_7_28/img12.png
2004-Nov-15 11:13:58 811 bytes prism/private/wslib/WS/Class_Hazard_TPTB_V_1_0_7_28/img13.png
2004-Nov-15 11:13:56 1539 bytes prism/private/wslib/WS/Class_Hazard_TPTB_V_1_0_7_28/img14.png
2004-Nov-15 11:13:52 1563 bytes prism/private/wslib/WS/Class_Hazard_TPTB_V_1_0_7_28/img15.png
2004-Nov-15 11:13:54 1122 bytes prism/private/wslib/WS/Class_Hazard_TPTB_V_1_0_7_28/img16.png
2004-Nov-15 11:13:58 887 bytes prism/private/wslib/WS/Class_Hazard_TPTB_V_1_0_7_28/img17.png
2004-Nov-15 11:14:00 1142 bytes prism/private/wslib/WS/Class_Hazard_TPTB_V_1_0_7_28/img18.png
2004-Nov-15 11:14:00 1117 bytes prism/private/wslib/WS/Class_Hazard_TPTB_V_1_0_7_28/img19.png
2004-Nov-15 11:13:56 872 bytes prism/private/wslib/WS/Class_Hazard_TPTB_V_1_0_7_28/img2.png
2004-Nov-15 11:13:52 856 bytes prism/private/wslib/WS/Class_Hazard_TPTB_V_1_0_7_28/img20.png
2004-Nov-15 11:13:54 1626 bytes prism/private/wslib/WS/Class_Hazard_TPTB_V_1_0_7_28/img3.png
2004-Nov-15 11:13:52 1838 bytes prism/private/wslib/WS/Class_Hazard_TPTB_V_1_0_7_28/img4.png
2004-Nov-15 11:13:58 1205 bytes prism/private/wslib/WS/Class_Hazard_TPTB_V_1_0_7_28/img5.png
2004-Nov-15 11:13:56 1357 bytes prism/private/wslib/WS/Class_Hazard_TPTB_V_1_0_7_28/img6.png
2004-Nov-15 11:13:50 1308 bytes prism/private/wslib/WS/Class_Hazard_TPTB_V_1_0_7_28/img7.png
2004-Nov-15 11:13:54 933 bytes prism/private/wslib/WS/Class_Hazard_TPTB_V_1_0_7_28/img8.png
2004-Nov-15 11:13:50 651 bytes prism/private/wslib/WS/Class_Hazard_TPTB_V_1_0_7_28/img9.png
2004-Nov-15 11:14:00 10724 bytes prism/private/wslib/WS/Class_Hazard_TPTB_V_1_0_7_28/index.html
2004-Nov-15 11:14:00 2700 bytes prism/private/wslib/WS/Class_Hazard_TPTB_V_1_0_7_28/internals.pl
2004-Nov-15 11:14:14 2974 bytes prism/private/wslib/WS/Class_Hazard_TPTB_V_1_0_7_28/labels.pl
2004-Nov-15 11:14:00 2534 bytes prism/private/wslib/WS/Class_Hazard_TPTB_V_1_0_7_28/node1.html
2004-Dec-13 10:28:44 1666 bytes prism/private/wslib/WS/Class_Hazard_TR_L_1_0_7_28

2004-Nov-15 11:14:04 242458 bytes prism/private/wslib/WS/Class_Hazard_TR_L_1_0_7_28.pm
2004-Nov-15 11:14:04 3691 bytes prism/private/wslib/WS/Class_Hazard_TR_L_1_0_7_28.tex
2004-Nov-15 11:14:04 303 bytes prism/private/wslib/WS/Class_Hazard_TR_L_1_0_7_28.ws
2004-Nov-15 11:14:28 891 bytes prism/private/wslib/WS/Class_Hazard_TR_L_1_0_7_28/Class_Hazard_TR_L_1_0_7_28.css
2004-Nov-15 11:14:28 17099 bytes prism/private/wslib/WS/Class_Hazard_TR_L_1_0_7_28/Class_Hazard_TR_L_1_0_7_28.html
2004-Dec-13 10:28:44 1394 bytes prism/private/wslib/WS/Class_Hazard_TR_L_1_0_7_28/EqnImages
2004-Nov-15 11:14:28 774 bytes prism/private/wslib/WS/Class_Hazard_TR_L_1_0_7_28/EqnImages/BP_Eqn_0.png
2004-Nov-15 11:14:28 781 bytes prism/private/wslib/WS/Class_Hazard_TR_L_1_0_7_28/EqnImages/BP_Eqn_1.png
2004-Nov-15 11:14:28 957 bytes prism/private/wslib/WS/Class_Hazard_TR_L_1_0_7_28/EqnImages/CalcKbp_CalcKw_Eqn_0.png
2004-Nov-15 11:14:28 975 bytes prism/private/wslib/WS/Class_Hazard_TR_L_1_0_7_28/EqnImages/CalcKbp_CalcKw_Eqn_1.png
2004-Nov-15 11:14:28 736 bytes prism/private/wslib/WS/Class_Hazard_TR_L_1_0_7_28/EqnImages/CalcKbp_CalcKw_Eqn_2.png
2004-Nov-15 11:14:28 420 bytes prism/private/wslib/WS/Class_Hazard_TR_L_1_0_7_28/EqnImages/CalcKbp_Eqn_0.png
2004-Nov-15 11:14:30 420 bytes prism/private/wslib/WS/Class_Hazard_TR_L_1_0_7_28/EqnImages/CalcKbp_Eqn_1.png
2004-Nov-15 11:14:30 390 bytes prism/private/wslib/WS/Class_Hazard_TR_L_1_0_7_28/EqnImages/CalcKbp_Eqn_2.png
2004-Nov-15 11:14:30 1748 bytes prism/private/wslib/WS/Class_Hazard_TR_L_1_0_7_28/EqnImages/CalcLiquidVol_Eqn_0.png
2004-Nov-15 11:14:30 978 bytes prism/private/wslib/WS/Class_Hazard_TR_L_1_0_7_28/EqnImages/Eqn_0.png
2004-Nov-15 11:14:30 698 bytes prism/private/wslib/WS/Class_Hazard_TR_L_1_0_7_28/EqnImages/Eqn_1.png
2004-Nov-15 11:14:30 1048 bytes prism/private/wslib/WS/Class_Hazard_TR_L_1_0_7_28/EqnImages/Eqn_2.png
2004-Nov-15 11:14:30 745 bytes prism/private/wslib/WS/Class_Hazard_TR_L_1_0_7_28/EqnImages/Eqn_3.png
2004-Nov-15 11:14:30 1034 bytes prism/private/wslib/WS/Class_Hazard_TR_L_1_0_7_28/EqnImages/Eqn_4.png
2004-Nov-15 11:14:30 1195 bytes prism/private/wslib/WS/Class_Hazard_TR_L_1_0_7_28/EqnImages/LP_Eqn_0.png
2004-Nov-15 11:14:30 953 bytes prism/private/wslib/WS/Class_Hazard_TR_L_1_0_7_28/EqnImages/PC_Eqn_0.png
2004-Nov-15 11:14:30 773 bytes prism/private/wslib/WS/Class_Hazard_TR_L_1_0_7_28/EqnImages/PD_Eqn_0.png
2004-Nov-15 11:14:30 1388 bytes prism/private/wslib/WS/Class_Hazard_TR_L_1_0_7_28/EqnImages/P_Eqn_0.png
2004-Nov-15 11:14:30 1674 bytes prism/private/wslib/WS/Class_Hazard_TR_L_1_0_7_28/EqnImages/P_Eqn_1.png
2004-Nov-15 11:14:30 1055 bytes prism/private/wslib/WS/Class_Hazard_TR_L_1_0_7_28/EqnImages/P_Eqn_10.png
2004-Nov-15 11:14:30 1201 bytes prism/private/wslib/WS/Class_Hazard_TR_L_1_0_7_28/EqnImages/P_Eqn_11.png
2004-Nov-15 11:14:32 1092 bytes prism/private/wslib/WS/Class_Hazard_TR_L_1_0_7_28/EqnImages/P_Eqn_12.png
2004-Nov-15 11:14:32 802 bytes prism/private/wslib/WS/Class_Hazard_TR_L_1_0_7_28/EqnImages/P_Eqn_13.png
2004-Nov-15 11:14:32 582 bytes prism/private/wslib/WS/Class_Hazard_TR_L_1_0_7_28/EqnImages/P_Eqn_14.png
2004-Nov-15 11:14:32 1092 bytes prism/private/wslib/WS/Class_Hazard_TR_L_1_0_7_28/EqnImages/P_Eqn_15.png
2004-Nov-15 11:14:32 616 bytes prism/private/wslib/WS/Class_Hazard_TR_L_1_0_7_28/EqnImages/P_Eqn_16.png
2004-Nov-15 11:14:32 1147 bytes prism/private/wslib/WS/Class_Hazard_TR_L_1_0_7_28/EqnImages/P_Eqn_17.png
2004-Nov-15 11:14:32 799 bytes prism/private/wslib/WS/Class_Hazard_TR_L_1_0_7_28/EqnImages/P_Eqn_18.png
2004-Nov-15 11:14:32 689 bytes prism/private/wslib/WS/Class_Hazard_TR_L_1_0_7_28/EqnImages/P_Eqn_19.png
2004-Nov-15 11:14:32 1383 bytes prism/private/wslib/WS/Class_Hazard_TR_L_1_0_7_28/EqnImages/P_Eqn_2.png
2004-Nov-15 11:14:32 1399 bytes prism/private/wslib/WS/Class_Hazard_TR_L_1_0_7_28/EqnImages/P_Eqn_3.png
2004-Nov-15 11:14:32 959 bytes prism/private/wslib/WS/Class_Hazard_TR_L_1_0_7_28/EqnImages/P_Eqn_4.png
2004-Nov-15 11:14:32 821 bytes prism/private/wslib/WS/Class_Hazard_TR_L_1_0_7_28/EqnImages/P_Eqn_5.png
2004-Nov-15 11:14:32 959 bytes prism/private/wslib/WS/Class_Hazard_TR_L_1_0_7_28/EqnImages/P_Eqn_6.png
2004-Nov-15 11:14:32 986 bytes prism/private/wslib/WS/Class_Hazard_TR_L_1_0_7_28/EqnImages/P_Eqn_7.png
2004-Nov-15 11:14:34 951 bytes prism/private/wslib/WS/Class_Hazard_TR_L_1_0_7_28/EqnImages/P_Eqn_8.png
2004-Nov-15 11:14:34 717 bytes prism/private/wslib/WS/Class_Hazard_TR_L_1_0_7_28/EqnImages/P_Eqn_9.png
2004-Nov-15 11:14:34 1651 bytes prism/private/wslib/WS/Class_Hazard_TR_L_1_0_7_28/EqnImages/TRMassFlow_Eqn_0.png
2004-Nov-15 11:14:34 1664 bytes prism/private/wslib/WS/Class_Hazard_TR_L_1_0_7_28/EqnImages/TRVolFlow_Eqn_0.png
2004-Nov-15 11:14:06 8 bytes prism/private/wslib/WS/Class_Hazard_TR_L_1_0_7_28/images.aux
2004-Nov-15 11:14:06 13370 bytes prism/private/wslib/WS/Class_Hazard_TR_L_1_0_7_28/images.log
2004-Nov-15 11:14:28 11407 bytes prism/private/wslib/WS/Class_Hazard_TR_L_1_0_7_28/images.pl
2004-Nov-15 11:14:06 13134 bytes prism/private/wslib/WS/Class_Hazard_TR_L_1_0_7_28/images.tex
2004-Nov-15 11:14:24 963 bytes prism/private/wslib/WS/Class_Hazard_TR_L_1_0_7_28/img1.png
2004-Nov-15 11:14:22 754 bytes prism/private/wslib/WS/Class_Hazard_TR_L_1_0_7_28/img10.png
2004-Nov-15 11:14:22 1222 bytes prism/private/wslib/WS/Class_Hazard_TR_L_1_0_7_28/img11.png
2004-Nov-15 11:14:10 822 bytes prism/private/wslib/WS/Class_Hazard_TR_L_1_0_7_28/img12.png
2004-Nov-15 11:14:26 1201 bytes prism/private/wslib/WS/Class_Hazard_TR_L_1_0_7_28/img13.png
2004-Nov-15 11:14:28 1292 bytes prism/private/wslib/WS/Class_Hazard_TR_L_1_0_7_28/img14.png
2004-Nov-15 11:14:26 1069 bytes prism/private/wslib/WS/Class_Hazard_TR_L_1_0_7_28/img15.png
2004-Nov-15 11:14:26 874 bytes prism/private/wslib/WS/Class_Hazard_TR_L_1_0_7_28/img16.png
2004-Nov-15 11:14:24 1626 bytes prism/private/wslib/WS/Class_Hazard_TR_L_1_0_7_28/img17.png
2004-Nov-15 11:14:18 1838 bytes prism/private/wslib/WS/Class_Hazard_TR_L_1_0_7_28/img18.png
2004-Nov-15 11:14:28 1205 bytes prism/private/wslib/WS/Class_Hazard_TR_L_1_0_7_28/img19.png
2004-Nov-15 11:14:22 872 bytes prism/private/wslib/WS/Class_Hazard_TR_L_1_0_7_28/img2.png 2004-Nov-15 11:14:18 1357 bytes prism/private/wslib/WS/Class_Hazard_TR_L_1_0_7_28/img20.png
2004-Nov-15 11:14:20 1308 bytes prism/private/wslib/WS/Class_Hazard_TR_L_1_0_7_28/img21.png
2004-Nov-15 11:14:10 933 bytes prism/private/wslib/WS/Class_Hazard_TR_L_1_0_7_28/img22.png
2004-Nov-15 11:14:24 651 bytes prism/private/wslib/WS/Class_Hazard_TR_L_1_0_7_28/img23.png
2004-Nov-15 11:14:12 678 bytes prism/private/wslib/WS/Class_Hazard_TR_L_1_0_7_28/img24.png
2004-Nov-15 11:14:12 1288 bytes prism/private/wslib/WS/Class_Hazard_TR_L_1_0_7_28/img25.png
2004-Nov-15 11:14:18 936 bytes prism/private/wslib/WS/Class_Hazard_TR_L_1_0_7_28/img26.png
2004-Nov-15 11:14:16 811 bytes prism/private/wslib/WS/Class_Hazard_TR_L_1_0_7_28/img27.png
2004-Nov-15 11:14:08 1539 bytes prism/private/wslib/WS/Class_Hazard_TR_L_1_0_7_28/img28.png
2004-Nov-15 11:14:14 1563 bytes prism/private/wslib/WS/Class_Hazard_TR_L_1_0_7_28/img29.png
2004-Nov-15 11:14:12 1117 bytes prism/private/wslib/WS/Class_Hazard_TR_L_1_0_7_28/img3.png
2004-Nov-15 11:14:14 1122 bytes prism/private/wslib/WS/Class_Hazard_TR_L_1_0_7_28/img30.png
2004-Nov-15 11:14:20 887 bytes prism/private/wslib/WS/Class_Hazard_TR_L_1_0_7_28/img31.png
2004-Nov-15 11:14:24 1142 bytes prism/private/wslib/WS/Class_Hazard_TR_L_1_0_7_28/img32.png
2004-Nov-15 11:14:16 1117 bytes prism/private/wslib/WS/Class_Hazard_TR_L_1_0_7_28/img33.png
2004-Nov-15 11:14:14 856 bytes prism/private/wslib/WS/Class_Hazard_TR_L_1_0_7_28/img34.png
2004-Nov-15 11:14:10 1813 bytes prism/private/wslib/WS/Class_Hazard_TR_L_1_0_7_28/img35.png
2004-Nov-15 11:14:26 1823 bytes prism/private/wslib/WS/Class_Hazard_TR_L_1_0_7_28/img36.png
2004-Nov-15 11:14:16 1099 bytes prism/private/wslib/WS/Class_Hazard_TR_L_1_0_7_28/img4.png
2004-Nov-15 11:14:20 834 bytes prism/private/wslib/WS/Class_Hazard_TR_L_1_0_7_28/img5.png
2004-Nov-15 11:14:10 467 bytes prism/private/wslib/WS/Class_Hazard_TR_L_1_0_7_28/img6.png
2004-Nov-15 11:14:12 467 bytes prism/private/wslib/WS/Class_Hazard_TR_L_1_0_7_28/img7.png
2004-Nov-15 11:14:22 2074 bytes prism/private/wslib/WS/Class_Hazard_TR_L_1_0_7_28/img8.png
2004-Nov-15 11:14:18 1155 bytes prism/private/wslib/WS/Class_Hazard_TR_L_1_0_7_28/img9.png
2004-Nov-15 11:14:28 17099 bytes prism/private/wslib/WS/Class_Hazard_TR_L_1_0_7_28/index.html
2004-Nov-15 11:14:28 4707 bytes prism/private/wslib/WS/Class_Hazard_TR_L_1_0_7_28/internals.pl
2004-Nov-15 11:14:44 5134 bytes prism/private/wslib/WS/Class_Hazard_TR_L_1_0_7_28/labels.pl
2004-Nov-15 11:14:28 2512 bytes prism/private/wslib/WS/Class_Hazard_TR_L_1_0_7_28/node1.html
2004-Dec-13 10:28:44 2176 bytes prism/private/wslib/WS/Class_Hazard_TR_V_1_0_7_28
2004-Nov-15 11:14:34 284113 bytes prism/private/wslib/WS/Class_Hazard_TR_V_1_0_7_28.pm
2004-Nov-15 11:14:34 5349 bytes prism/private/wslib/WS/Class_Hazard_TR_V_1_0_7_28.tex
2004-Nov-15 11:14:34 302 bytes prism/private/wslib/WS/Class_Hazard_TR_V_1_0_7_28.ws
2004-Nov-15 11:15:08 891 bytes prism/private/wslib/WS/Class_Hazard_TR_V_1_0_7_28/Class_Hazard_TR_V_1_0_7_28.css
2004-Nov-15 11:15:08 23005 bytes prism/private/wslib/WS/Class_Hazard_TR_V_1_0_7_28/Class_Hazard_TR_V_1_0_7_28.html
2004-Dec-13 10:28:44 1904 bytes prism/private/wslib/WS/Class_Hazard_TR_V_1_0_7_28/EqnImages
2004-Nov-15 11:15:08 774 bytes prism/private/wslib/WS/Class_Hazard_TR_V_1_0_7_28/EqnImages/BP_Eqn_0.png
2004-Nov-15 11:15:08 781 bytes prism/private/wslib/WS/Class_Hazard_TR_V_1_0_7_28/EqnImages/BP_Eqn_1.png
2004-Nov-15 11:15:08 859 bytes prism/private/wslib/WS/Class_Hazard_TR_V_1_0_7_28/EqnImages/CTF_Eqn_0.png
2004-Nov-15 11:15:08 626 bytes prism/private/wslib/WS/Class_Hazard_TR_V_1_0_7_28/EqnImages/CTF_Eqn_1.png
2004-Nov-15 11:15:08 1261 bytes prism/private/wslib/WS/Class_Hazard_TR_V_1_0_7_28/EqnImages/CalcKbp_CalcKb_Eqn_0.png
2004-Nov-15 11:15:08 971 bytes prism/private/wslib/WS/Class_Hazard_TR_V_1_0_7_28/EqnImages/CalcKbp_CalcKv_Eqn_0.png
2004-Nov-15 11:15:08 736 bytes prism/private/wslib/WS/Class_Hazard_TR_V_1_0_7_28/EqnImages/CalcKbp_CalcKv_Eqn_1.png
2004-Nov-15 11:15:08 793 bytes prism/private/wslib/WS/Class_Hazard_TR_V_1_0_7_28/EqnImages/CalcKbp_CalcKv_Eqn_2.png
2004-Nov-15 11:15:08 727 bytes prism/private/wslib/WS/Class_Hazard_TR_V_1_0_7_28/EqnImages/CalcKbp_CalcKv_Eqn_3.png
2004-Nov-15 11:15:10 437 bytes prism/private/wslib/WS/Class_Hazard_TR_V_1_0_7_28/EqnImages/CalcKbp_Eqn_0.png
2004-Nov-15 11:15:10 374 bytes prism/private/wslib/WS/Class_Hazard_TR_V_1_0_7_28/EqnImages/CalcKbp_Eqn_1.png
2004-Nov-15 11:15:10 625 bytes prism/private/wslib/WS/Class_Hazard_TR_V_1_0_7_28/EqnImages/CalcVapMass_CF_Eqn_0.png
2004-Nov-15 11:15:10 827 bytes prism/private/wslib/WS/Class_Hazard_TR_V_1_0_7_28/EqnImages/CalcVapMass_CF_Eqn_1.png
2004-Nov-15 11:15:10 1190 bytes prism/private/wslib/WS/Class_Hazard_TR_V_1_0_7_28/EqnImages/CalcVapMass_CF_Eqn_10.png
2004-Nov-15 11:15:10 248 bytes prism/private/wslib/WS/Class_Hazard_TR_V_1_0_7_28/EqnImages/CalcVapMass_CF_Eqn_2.png
2004-Nov-15 11:15:10 839 bytes prism/private/wslib/WS/Class_Hazard_TR_V_1_0_7_28/EqnImages/CalcVapMass_CF_Eqn_3.png
2004-Nov-15 11:15:10 428 bytes prism/private/wslib/WS/Class_Hazard_TR_V_1_0_7_28/EqnImages/CalcVapMass_CF_Eqn_4.png
2004-Nov-15 11:15:10 731 bytes prism/private/wslib/WS/Class_Hazard_TR_V_1_0_7_28/EqnImages/CalcVapMass_CF_Eqn_5.png
2004-Nov-15 11:15:10 468 bytes prism/private/wslib/WS/Class_Hazard_TR_V_1_0_7_28/EqnImages/CalcVapMass_CF_Eqn_6.png
2004-Nov-15 11:15:10 211 bytes prism/private/wslib/WS/Class_Hazard_TR_V_1_0_7_28/EqnImages/CalcVapMass_CF_Eqn_7.png
2004-Nov-15 11:15:10 923 bytes prism/private/wslib/WS/Class_Hazard_TR_V_1_0_7_28/EqnImages/CalcVapMass_CF_Eqn_8.png
2004-Nov-15 11:15:10 248 bytes prism/private/wslib/WS/Class_Hazard_TR_V_1_0_7_28/EqnImages/CalcVapMass_CF_Eqn_9.png
2004-Nov-15 11:15:10 1860 bytes prism/private/wslib/WS/Class_Hazard_TR_V_1_0_7_28/EqnImages/CalcVapMass_Eqn_0.png
2004-Nov-15 11:15:12 1416 bytes prism/private/wslib/WS/Class_Hazard_TR_V_1_0_7_28/EqnImages/CalcVapMass_Eqn_1.png
2004-Nov-15 11:15:12 670 bytes prism/private/wslib/WS/Class_Hazard_TR_V_1_0_7_28/EqnImages/Eqn_0.png
2004-Nov-15 11:15:12 678 bytes prism/private/wslib/WS/Class_Hazard_TR_V_1_0_7_28/EqnImages/Eqn_1.png 2004-Nov-15 11:15:12 953 bytes prism/private/wslib/WS/Class_Hazard_TR_V_1_0_7_28/EqnImages/PC_Eqn_0.png
2004-Nov-15 11:15:12 1054 bytes prism/private/wslib/WS/Class_Hazard_TR_V_1_0_7_28/EqnImages/PVP_Eqn_0.png
2004-Nov-15 11:15:12 397 bytes prism/private/wslib/WS/Class_Hazard_TR_V_1_0_7_28/EqnImages/PVP_Eqn_1.png
2004-Nov-15 11:15:12 1388 bytes prism/private/wslib/WS/Class_Hazard_TR_V_1_0_7_28/EqnImages/P_Eqn_0.png
2004-Nov-15 11:15:12 1674 bytes prism/private/wslib/WS/Class_Hazard_TR_V_1_0_7_28/EqnImages/P_Eqn_1.png
2004-Nov-15 11:15:12 1055 bytes prism/private/wslib/WS/Class_Hazard_TR_V_1_0_7_28/EqnImages/P_Eqn_10.png
2004-Nov-15 11:15:12 1201 bytes prism/private/wslib/WS/Class_Hazard_TR_V_1_0_7_28/EqnImages/P_Eqn_11.png
2004-Nov-15 11:15:12 1092 bytes prism/private/wslib/WS/Class_Hazard_TR_V_1_0_7_28/EqnImages/P_Eqn_12.png
2004-Nov-15 11:15:12 802 bytes prism/private/wslib/WS/Class_Hazard_TR_V_1_0_7_28/EqnImages/P_Eqn_13.png
2004-Nov-15 11:15:12 582 bytes prism/private/wslib/WS/Class_Hazard_TR_V_1_0_7_28/EqnImages/P_Eqn_14.png
2004-Nov-15 11:15:12 1092 bytes prism/private/wslib/WS/Class_Hazard_TR_V_1_0_7_28/EqnImages/P_Eqn_15.png
2004-Nov-15 11:15:12 616 bytes prism/private/wslib/WS/Class_Hazard_TR_V_1_0_7_28/EqnImages/P_Eqn_16.png
2004-Nov-15 11:15:14 1147 bytes prism/private/wslib/WS/Class_Hazard_TR_V_1_0_7_28/EqnImages/P_Eqn_17.png
2004-Nov-15 11:15:14 799 bytes prism/private/wslib/WS/Class_Hazard_TR_V_1_0_7_28/EqnImages/P_Eqn_18.png
2004-Nov-15 11:15:14 689 bytes prism/private/wslib/WS/Class_Hazard_TR_V_1_0_7_28/EqnImages/P_Eqn_19.png
2004-Nov-15 11:15:14 1383 bytes prism/private/wslib/WS/Class_Hazard_TR_V_1_0_7_28/EqnImages/P_Eqn_2.png
2004-Nov-15 11:15:14 1399 bytes prism/private/wslib/WS/Class_Hazard_TR_V_1_0_7_28/EqnImages/P_Eqn_3.png
2004-Nov-15 11:15:14 959 bytes prism/private/wslib/WS/Class_Hazard_TR_V_1_0_7_28/EqnImages/P_Eqn_4.png
2004-Nov-15 11:15:14 821 bytes prism/private/wslib/WS/Class_Hazard_TR_V_1_0_7_28/EqnImages/P_Eqn_5.png
2004-Nov-15 11:15:14 959 bytes prism/private/wslib/WS/Class_Hazard_TR_V_1_0_7_28/EqnImages/P_Eqn_6.png
2004-Nov-15 11:15:14 986 bytes prism/private/wslib/WS/Class_Hazard_TR_V_1_0_7_28/EqnImages/P_Eqn_7.png
2004-Nov-15 11:15:14 951 bytes prism/private/wslib/WS/Class_Hazard_TR_V_1_0_7_28/EqnImages/P_Eqn_8.png
2004-Nov-15 11:15:14 717 bytes prism/private/wslib/WS/Class_Hazard_TR_V_1_0_7_28/EqnImages/P_Eqn_9.png
2004-Nov-15 11:15:14 1813 bytes prism/private/wslib/WS/Class_Hazard_TR_V_1_0_7_28/EqnImages/TRFlowCrit_Eqn_0.png
2004-Nov-15 11:15:14 1720 bytes prism/private/wslib/WS/Class_Hazard_TR_V_1_0_7_28/EqnImages/TRFlowSub_Eqn_0.png
2004-Nov-15 11:15:14 678 bytes prism/private/wslib/WS/Class_Hazard_TR_V_1_0_7_28/EqnImages/VCC_Eqn_0.png
2004-Nov-15 11:15:16 1892 bytes prism/private/wslib/WS/Class_Hazard_TR_V_1_0_7_28/EqnImages/VCC_Eqn_1.png
2004-Nov-15 11:15:16 1474 bytes prism/private/wslib/WS/Class_Hazard_TR_V_1_0_7_28/EqnImages/VCC_Eqn_2.png
2004-Nov-15 11:14:38 8 bytes prism/private/wslib/WS/Class_Hazard_TR_V_1_0_7_28/images.aux
2004-Nov-15 11:14:38 17927 bytes prism/private/wslib/WS/Class_Hazard_TR_V_1_0_7_28/images.log
2004-Nov-15 11:15:08 15973 bytes prism/private/wslib/WS/Class_Hazard_TR_V_1_0_7_28/images.pl
2004-Nov-15 11:14:36 16258 bytes prism/private/wslib/WS/Class_Hazard_TR_V_1_0_7_28/images.tex
2004-Nov-15 11:15:06 963 bytes prism/private/wslib/WS/Class_Hazard_TR_V_1_0_7_28/img1.png
2004-Nov-15 11:14:44 474 bytes prism/private/wslib/WS/Class_Hazard_TR_V_1_0_7_28/img10.png
2004-Nov-15 11:14:54 460 bytes prism/private/wslib/WS/Class_Hazard_TR_V_1_0_7_28/img11.png
2004-Nov-15 11:14:58 723 bytes prism/private/wslib/WS/Class_Hazard_TR_V_1_0_7_28/img12.png
2004-Nov-15 11:14:42 906 bytes prism/private/wslib/WS/Class_Hazard_TR_V_1_0_7_28/img13.png
2004-Nov-15 11:15:02 1446 bytes prism/private/wslib/WS/Class_Hazard_TR_V_1_0_7_28/img14.png
2004-Nov-15 11:14:52 262 bytes prism/private/wslib/WS/Class_Hazard_TR_V_1_0_7_28/img15.png
2004-Nov-15 11:14:44 949 bytes prism/private/wslib/WS/Class_Hazard_TR_V_1_0_7_28/img16.png
2004-Nov-15 11:14:50 515 bytes prism/private/wslib/WS/Class_Hazard_TR_V_1_0_7_28/img17.png
2004-Nov-15 11:15:00 839 bytes prism/private/wslib/WS/Class_Hazard_TR_V_1_0_7_28/img18.png
2004-Nov-15 11:14:52 520 bytes prism/private/wslib/WS/Class_Hazard_TR_V_1_0_7_28/img19.png
2004-Nov-15 11:14:52 872 bytes prism/private/wslib/WS/Class_Hazard_TR_V_1_0_7_28/img2.png
2004-Nov-15 11:15:00 230 bytes prism/private/wslib/WS/Class_Hazard_TR_V_1_0_7_28/img20.png
2004-Nov-15 11:15:02 1017 bytes prism/private/wslib/WS/Class_Hazard_TR_V_1_0_7_28/img21.png
2004-Nov-15 11:15:08 2158 bytes prism/private/wslib/WS/Class_Hazard_TR_V_1_0_7_28/img22.png
2004-Nov-15 11:14:50 1643 bytes prism/private/wslib/WS/Class_Hazard_TR_V_1_0_7_28/img23.png
2004-Nov-15 11:14:42 780 bytes prism/private/wslib/WS/Class_Hazard_TR_V_1_0_7_28/img24.png
2004-Nov-15 11:14:56 791 bytes prism/private/wslib/WS/Class_Hazard_TR_V_1_0_7_28/img25.png
2004-Nov-15 11:14:58 1069 bytes prism/private/wslib/WS/Class_Hazard_TR_V_1_0_7_28/img26.png
2004-Nov-15 11:14:42 1176 bytes prism/private/wslib/WS/Class_Hazard_TR_V_1_0_7_28/img27.png
2004-Nov-15 11:14:46 427 bytes prism/private/wslib/WS/Class_Hazard_TR_V_1_0_7_28/img28.png
2004-Nov-15 11:15:04 1626 bytes prism/private/wslib/WS/Class_Hazard_TR_V_1_0_7_28/img29.png
2004-Nov-15 11:15:00 954 bytes prism/private/wslib/WS/Class_Hazard_TR_V_1_0_7_28/img3.png
2004-Nov-15 11:14:48 1838 bytes prism/private/wslib/WS/Class_Hazard_TR_V_1_0_7_28/img30.png
2004-Nov-15 11:14:48 1205 bytes prism/private/wslib/WS/Class_Hazard_TR_V_1_0_7_28/img31.png
2004-Nov-15 11:14:42 1357 bytes prism/private/wslib/WS/Class_Hazard_TR_V_1_0_7_28/img32.png
2004-Nov-15 11:14:50 1308 bytes prism/private/wslib/WS/Class_Hazard_TR_V_1_0_7_28/img33.png
2004-Nov-15 11:15:06 933 bytes prism/private/wslib/WS/Class_Hazard_TR_V_1_0_7_28/img34.png
2004-Nov-15 11:14:46 651 bytes prism/private/wslib/WS/Class_Hazard_TR_V_1_0_7_28/img35.png 2004-Nov-15 11:14:52 678 bytes prism/private/wslib/WS/Class_Hazard_TR_V_1_0_7_28/img36.png
2004-Nov-15 11:14:50 1288 bytes prism/private/wslib/WS/Class_Hazard_TR_V_1_0_7_28/img37.png
2004-Nov-15 11:14:40 936 bytes prism/private/wslib/WS/Class_Hazard_TR_V_1_0_7_28/img38.png
2004-Nov-15 11:14:58 811 bytes prism/private/wslib/WS/Class_Hazard_TR_V_1_0_7_28/img39.png
2004-Nov-15 11:14:44 682 bytes prism/private/wslib/WS/Class_Hazard_TR_V_1_0_7_28/img4.png
2004-Nov-15 11:14:56 1539 bytes prism/private/wslib/WS/Class_Hazard_TR_V_1_0_7_28/img40.png
2004-Nov-15 11:15:04 1563 bytes prism/private/wslib/WS/Class_Hazard_TR_V_1_0_7_28/img41.png
2004-Nov-15 11:14:48 1122 bytes prism/private/wslib/WS/Class_Hazard_TR_V_1_0_7_28/img42.png
2004-Nov-15 11:14:54 887 bytes prism/private/wslib/WS/Class_Hazard_TR_V_1_0_7_28/img43.png
2004-Nov-15 11:14:46 1142 bytes prism/private/wslib/WS/Class_Hazard_TR_V_1_0_7_28/img44.png
2004-Nov-15 11:14:54 1117 bytes prism/private/wslib/WS/Class_Hazard_TR_V_1_0_7_28/img45.png
2004-Nov-15 11:14:40 856 bytes prism/private/wslib/WS/Class_Hazard_TR_V_1_0_7_28/img46.png
2004-Nov-15 11:15:02 2025 bytes prism/private/wslib/WS/Class_Hazard_TR_V_1_0_7_28/img47.png
2004-Nov-15 11:15:06 1897 bytes prism/private/wslib/WS/Class_Hazard_TR_V_1_0_7_28/img48.png
2004-Nov-15 11:15:06 787 bytes prism/private/wslib/WS/Class_Hazard_TR_V_1_0_7_28/img49.png
2004-Nov-15 11:15:02 1593 bytes prism/private/wslib/WS/Class_Hazard_TR_V_1_0_7_28/img5.png
2004-Nov-15 11:15:04 2155 bytes prism/private/wslib/WS/Class_Hazard_TR_V_1_0_7_28/img50.png
2004-Nov-15 11:14:46 1605 bytes prism/private/wslib/WS/Class_Hazard_TR_V_1_0_7_28/img51.png
2004-Nov-15 11:14:56 1053 bytes prism/private/wslib/WS/Class_Hazard_TR_V_1_0_7_28/img6.png
2004-Nov-15 11:14:54 834 bytes prism/private/wslib/WS/Class_Hazard_TR_V_1_0_7_28/img7.png
2004-Nov-15 11:14:56 901 bytes prism/private/wslib/WS/Class_Hazard_TR_V_1_0_7_28/img8.png
2004-Nov-15 11:14:58 798 bytes prism/private/wslib/WS/Class_Hazard_TR_V_1_0_7_28/img9.png
2004-Nov-15 11:15:08 23005 bytes prism/private/wslib/WS/Class_Hazard_TR_V_1_0_7_28/index.html
2004-Nov-15 11:15:08 6637 bytes prism/private/wslib/WS/Class_Hazard_TR_V_1_0_7_28/internals.pl
2004-Nov-15 11:15:14 7199 bytes prism/private/wslib/WS/Class_Hazard_TR_V_1_0_7_28/labels.pl
2004-Nov-15 11:15:08 2512 bytes prism/private/wslib/WS/Class_Hazard_TR_V_1_0_7_28/node1.html
2004-Dec-13 10:28:45 510 bytes prism/private/wslib/WS/Class_Hazard_TSO_V_1_0_7_28
2004-Nov-15 11:15:16 41417 bytes prism/private/wslib/WS/Class_Hazard_TSO_V_1_0_7_28.pm
2004-Nov-15 11:15:16 305 bytes prism/private/wslib/WS/Class_Hazard_TSO_V_1_0_7_28.tex
2004-Nov-15 11:15:16 295 bytes prism/private/wslib/WS/Class_Hazard_TSO_V_1_0_7_28.ws
2004-Nov-15 11:15:18 891 bytes prism/private/wslib/WS/Class_Hazard_TSO_V_1_0_7_28/Class_Hazard_TSO_V_1_0_7_28.css
2004-Nov-15 11:15:18 2491 bytes prism/private/wslib/WS/Class_Hazard_TSO_V_1_0_7_28/Class_Hazard_TSO_V_1_0_7_28.html
2004-Dec-13 10:28:45 136 bytes prism/private/wslib/WS/Class_Hazard_TSO_V_1_0_7_28/EqnImages
2004-Nov-15 11:15:20 1485 bytes prism/private/wslib/WS/Class_Hazard_TSO_V_1_0_7_28/EqnImages/Eqn_0.png
2004-Nov-15 11:15:20 736 bytes prism/private/wslib/WS/Class_Hazard_TSO_V_1_0_7_28/EqnImages/ProtectedData_Eqn_0.png
2004-Nov-15 11:15:18 8 bytes prism/private/wslib/WS/Class_Hazard_TSO_V_1_0_7_28/images.aux
2004-Nov-15 11:15:18 8884 bytes prism/private/wslib/WS/Class_Hazard_TSO_V_1_0_7_28/images.log
2004-Nov-15 11:15:18 745 bytes prism/private/wslib/WS/Class_Hazard_TSO_V_1_0_7_28/images.pl
2004-Nov-15 11:15:18 6270 bytes prism/private/wslib/WS/Class_Hazard_TSO_V_1_0_7_28/images.tex
2004-Nov-15 11:15:18 1687 bytes prism/private/wslib/WS/Class_Hazard_TSO_V_1_0_7_28/img1.png
2004-Nov-15 11:15:18 794 bytes prism/private/wslib/WS/Class_Hazard_TSO_V_1_0_7_28/img2.png
2004-Nov-15 11:15:18 2491 bytes prism/private/wslib/WS/Class_Hazard_TSO_V_1_0_7_28/index.html
2004-Nov-15 11:15:18 336 bytes prism/private/wslib/WS/Class_Hazard_TSO_V_1_0_7_28/internals.pl
2004-Nov-15 11:15:44 430 bytes prism/private/wslib/WS/Class_Hazard_TSO_V_1_0_7_28/labels.pl
2004-Nov-15 11:15:18 2523 bytes prism/private/wslib/WS/Class_Hazard_TSO_V_1_0_7_28/node1.html
2004-Dec-13 10:28:45 1122 bytes prism/private/wslib/WS/Class_Hazard_TTR_L_1_0_7_28
2004-Nov-15 11:15:20 159607 bytes prism/private/wslib/WS/Class_Hazard_TTR_L_1_0_7_28.pm
2004-Nov-15 11:15:20 2152 bytes prism/private/wslib/WS/Class_Hazard_TTR_L_1_0_7_28.tex
2004-Nov-15 11:15:20 309 bytes prism/private/wslib/WS/Class_Hazard_TTR_L_1_0_7_28.ws
2004-Nov-15 11:15:34 891 bytes prism/private/wslib/WS/Class_Hazard_TTR_L_1_0_7_28/Class_Hazard_TTR_L_1_0_7_28.css
2004-Nov-15 11:15:34 10720 bytes prism/private/wslib/WS/Class_Hazard_TTR_L_1_0_7_28/Class_Hazard_TTR_L_1_0_7_28.html
2004-Dec-13 10:28:45 816 bytes prism/private/wslib/WS/Class_Hazard_TTR_L_1_0_7_28/EqnImages
2004-Nov-15 11:15:34 774 bytes prism/private/wslib/WS/Class_Hazard_TTR_L_1_0_7_28/EqnImages/BP_Eqn_0.png
2004-Nov-15 11:15:34 781 bytes prism/private/wslib/WS/Class_Hazard_TTR_L_1_0_7_28/EqnImages/BP_Eqn_1.png
2004-Nov-15 11:15:34 1388 bytes prism/private/wslib/WS/Class_Hazard_TTR_L_1_0_7_28/EqnImages/P_Eqn_0.png
2004-Nov-15 11:15:34 1674 bytes prism/private/wslib/WS/Class_Hazard_TTR_L_1_0_7_28/EqnImages/P_Eqn_1.png
2004-Nov-15 11:15:34 1055 bytes prism/private/wslib/WS/Class_Hazard_TTR_L_1_0_7_28/EqnImages/P_Eqn_10.png
2004-Nov-15 11:15:34 1201 bytes prism/private/wslib/WS/Class_Hazard_TTR_L_1_0_7_28/EqnImages/P_Eqn_11.png
2004-Nov-15 11:15:34 1092 bytes prism/private/wslib/WS/Class_Hazard_TTR_L_1_0_7_28/EqnImages/P_Eqn_12.png
2004-Nov-15 11:15:34 802 bytes prism/private/wslib/WS/Class_Hazard_TTR_L_1_0_7_28/EqnImages/P_Eqn_13.png
2004-Nov-15 11:15:34 582 bytes prism/private/wslib/WS/Class_Hazard_TTR_L_1_0_7_28/EqnImages/P_Eqn_14.png 2004-Nov-15 11:15:34 1092 bytes prism/private/wslib/WS/Class_Hazard_TTR_L_1_0_7_28/EqnImages/P_Eqn_15.png
2004-Nov-15 11:15:36 616 bytes prism/private/wslib/WS/Class_Hazard_TTR_L_1_0_7_28/EqnImages/P_Eqn_16.png
2004-Nov-15 11:15:36 1147 bytes prism/private/wslib/WS/Class_Hazard_TTR_L_1_0_7_28/EqnImages/P_Eqn_17.png
2004-Nov-15 11:15:36 799 bytes prism/private/wslib/WS/Class_Hazard_TTR_L_1_0_7_28/EqnImages/P_Eqn_18.png
2004-Nov-15 11:15:36 689 bytes prism/private/wslib/WS/Class_Hazard_TTR_L_1_0_7_28/EqnImages/P_Eqn_19.png
2004-Nov-15 11:15:36 1383 bytes prism/private/wslib/WS/Class_Hazard_TTR_L_1_0_7_28/EqnImages/P_Eqn_2.png
2004-Nov-15 11:15:36 1399 bytes prism/private/wslib/WS/Class_Hazard_TTR_L_1_0_7_28/EqnImages/P_Eqn_3.png
2004-Nov-15 11:15:36 959 bytes prism/private/wslib/WS/Class_Hazard_TTR_L_1_0_7_28/EqnImages/P_Eqn_4.png
2004-Nov-15 11:15:36 821 bytes prism/private/wslib/WS/Class_Hazard_TTR_L_1_0_7_28/EqnImages/P_Eqn_5.png
2004-Nov-15 11:15:36 959 bytes prism/private/wslib/WS/Class_Hazard_TTR_L_1_0_7_28/EqnImages/P_Eqn_6.png
2004-Nov-15 11:15:36 986 bytes prism/private/wslib/WS/Class_Hazard_TTR_L_1_0_7_28/EqnImages/P_Eqn_7.png
2004-Nov-15 11:15:36 951 bytes prism/private/wslib/WS/Class_Hazard_TTR_L_1_0_7_28/EqnImages/P_Eqn_8.png
2004-Nov-15 11:15:36 717 bytes prism/private/wslib/WS/Class_Hazard_TTR_L_1_0_7_28/EqnImages/P_Eqn_9.png
2004-Nov-15 11:15:22 8 bytes prism/private/wslib/WS/Class_Hazard_TTR_L_1_0_7_28/images.aux
2004-Nov-15 11:15:22 12420 bytes prism/private/wslib/WS/Class_Hazard_TTR_L_1_0_7_28/images.log
2004-Nov-15 11:15:34 6394 bytes prism/private/wslib/WS/Class_Hazard_TTR_L_1_0_7_28/images.pl
2004-Nov-15 11:15:22 9940 bytes prism/private/wslib/WS/Class_Hazard_TTR_L_1_0_7_28/images.tex
2004-Nov-15 11:15:28 963 bytes prism/private/wslib/WS/Class_Hazard_TTR_L_1_0_7_28/img1.png
2004-Nov-15 11:15:24 678 bytes prism/private/wslib/WS/Class_Hazard_TTR_L_1_0_7_28/img10.png
2004-Nov-15 11:15:28 1288 bytes prism/private/wslib/WS/Class_Hazard_TTR_L_1_0_7_28/img11.png
2004-Nov-15 11:15:32 936 bytes prism/private/wslib/WS/Class_Hazard_TTR_L_1_0_7_28/img12.png
2004-Nov-15 11:15:30 811 bytes prism/private/wslib/WS/Class_Hazard_TTR_L_1_0_7_28/img13.png
2004-Nov-15 11:15:30 1539 bytes prism/private/wslib/WS/Class_Hazard_TTR_L_1_0_7_28/img14.png
2004-Nov-15 11:15:24 1563 bytes prism/private/wslib/WS/Class_Hazard_TTR_L_1_0_7_28/img15.png
2004-Nov-15 11:15:26 1122 bytes prism/private/wslib/WS/Class_Hazard_TTR_L_1_0_7_28/img16.png
2004-Nov-15 11:15:32 887 bytes prism/private/wslib/WS/Class_Hazard_TTR_L_1_0_7_28/img17.png
2004-Nov-15 11:15:34 1142 bytes prism/private/wslib/WS/Class_Hazard_TTR_L_1_0_7_28/img18.png
2004-Nov-15 11:15:32 1117 bytes prism/private/wslib/WS/Class_Hazard_TTR_L_1_0_7_28/img19.png
2004-Nov-15 11:15:30 872 bytes prism/private/wslib/WS/Class_Hazard_TTR_L_1_0_7_28/img2.png
2004-Nov-15 11:15:26 856 bytes prism/private/wslib/WS/Class_Hazard_TTR_L_1_0_7_28/img20.png
2004-Nov-15 11:15:26 1626 bytes prism/private/wslib/WS/Class_Hazard_TTR_L_1_0_7_28/img3.png
2004-Nov-15 11:15:26 1838 bytes prism/private/wslib/WS/Class_Hazard_TTR_L_1_0_7_28/img4.png
2004-Nov-15 11:15:32 1205 bytes prism/private/wslib/WS/Class_Hazard_TTR_L_1_0_7_28/img5.png
2004-Nov-15 11:15:30 1357 bytes prism/private/wslib/WS/Class_Hazard_TTR_L_1_0_7_28/img6.png
2004-Nov-15 11:15:24 1308 bytes prism/private/wslib/WS/Class_Hazard_TTR_L_1_0_7_28/img7.png
2004-Nov-15 11:15:28 933 bytes prism/private/wslib/WS/Class_Hazard_TTR_L_1_0_7_28/img8.png
2004-Nov-15 11:15:24 651 bytes prism/private/wslib/WS/Class_Hazard_TTR_L_1_0_7_28/img9.png
2004-Nov-15 11:15:34 10720 bytes prism/private/wslib/WS/Class_Hazard_TTR_L_1_0_7_28/index.html
2004-Nov-15 11:15:34 2678 bytes prism/private/wslib/WS/Class_Hazard_TTR_L_1_0_7_28/internals.pl
2004-Nov-15 11:15:44 2952 bytes prism/private/wslib/WS/Class_Hazard_TTR_L_1_0_7_28/labels.pl
2004-Nov-15 11:15:34 2523 bytes prism/private/wslib/WS/Class_Hazard_TTR_L_1_0_7_28/node1.html
2004-Dec-13 10:28:45 1122 bytes prism/private/wslib/WS/Class_Hazard_TTR_V_1_0_7_28
2004-Nov-15 11:15:38 159607 bytes prism/private/wslib/WS/Class_Hazard_TTR_V_1_0_7_28.pm
2004-Nov-15 11:15:38 2152 bytes prism/private/wslib/WS/Class_Hazard_TTR_V_1_0_7_28.tex
2004-Nov-15 11:15:38 308 bytes prism/private/wslib/WS/Class_Hazard_TTR_V_1_0_7_28.ws
2004-Nov-15 11:15:50 891 bytes prism/private/wslib/WS/Class_Hazard_TTR_V_1_0_7_28/Class_Hazard_TTR_V_1_0_7_28.css
2004-Nov-15 11:15:50 10720 bytes prism/private/wslib/WS/Class_Hazard_TTR_V_1_0_7_28/Class_Hazard_TTR_V_1_0_7_28.html
2004-Dec-13 10:28:45 816 bytes prism/private/wslib/WS/Class_Hazard_TTR_V_1_0_7_28/EqnImages
2004-Nov-15 11:15:52 774 bytes prism/private/wslib/WS/Class_Hazard_TTR_V_1_0_7_28/EqnImages/BP_Eqn_0.png
2004-Nov-15 11:15:52 781 bytes prism/private/wslib/WS/Class_Hazard_TTR_V_1_0_7_28/EqnImages/BP_Eqn_1.png
2004-Nov-15 11:15:52 1388 bytes prism/private/wslib/WS/Class_Hazard_TTR_V_1_0_7_28/EqnImages/P_Eqn_0.png
2004-Nov-15 11:15:52 1674 bytes prism/private/wslib/WS/Class_Hazard_TTR_V_1_0_7_28/EqnImages/P_Eqn_1.png
2004-Nov-15 11:15:52 1055 bytes prism/private/wslib/WS/Class_Hazard_TTR_V_1_0_7_28/EqnImages/P_Eqn_10.png
2004-Nov-15 11:15:52 1201 bytes prism/private/wslib/WS/Class_Hazard_TTR_V_1_0_7_28/EqnImages/P_Eqn_11.png
2004-Nov-15 11:15:52 1092 bytes prism/private/wslib/WS/Class_Hazard_TTR_V_1_0_7_28/EqnImages/P_Eqn_12.png
2004-Nov-15 11:15:52 802 bytes prism/private/wslib/WS/Class_Hazard_TTR_V_1_0_7_28/EqnImages/P_Eqn_13.png
2004-Nov-15 11:15:52 582 bytes prism/private/wslib/WS/Class_Hazard_TTR_V_1_0_7_28/EqnImages/P_Eqn_14.png
2004-Nov-15 11:15:52 1092 bytes prism/private/wslib/WS/Class_Hazard_TTR_V_1_0_7_28/EqnImages/P_Eqn_15.png
2004-Nov-15 11:15:52 616 bytes prism/private/wslib/WS/Class_Hazard_TTR_V_1_0_7_28/EqnImages/P_Eqn_16.png
2004-Nov-15 11:15:52 1147 bytes prism/private/wslib/WS/Class_Hazard_TTR_V_1_0_7_28/EqnImages/P_Eqn_17.png
2004-Nov-15 11:15:52 799 bytes prism/private/wslib/WS/Class_Hazard_TTR_V_1_0_7_28/EqnImages/P_Eqn_18.png 2004-Nov-15 11:15:54 689 bytes prism/private/wslib/WS/Class_Hazard_TTR_V_1_0_7_28/EqnImages/P_Eqn_19.png
2004-Nov-15 11:15:54 1383 bytes prism/private/wslib/WS/Class_Hazard_TTR_V_1_0_7_28/EqnImages/P_Eqn_2.png
2004-Nov-15 11:15:54 1399 bytes prism/private/wslib/WS/Class_Hazard_TTR_V_1_0_7_28/EqnImages/P_Eqn_3.png
2004-Nov-15 11:15:54 959 bytes prism/private/wslib/WS/Class_Hazard_TTR_V_1_0_7_28/EqnImages/P_Eqn_4.png
2004-Nov-15 11:15:54 821 bytes prism/private/wslib/WS/Class_Hazard_TTR_V_1_0_7_28/EqnImages/P_Eqn_5.png
2004-Nov-15 11:15:54 959 bytes prism/private/wslib/WS/Class_Hazard_TTR_V_1_0_7_28/EqnImages/P_Eqn_6.png
2004-Nov-15 11:15:54 986 bytes prism/private/wslib/WS/Class_Hazard_TTR_V_1_0_7_28/EqnImages/P_Eqn_7.png
2004-Nov-15 11:15:54 951 bytes prism/private/wslib/WS/Class_Hazard_TTR_V_1_0_7_28/EqnImages/P_Eqn_8.png
2004-Nov-15 11:15:54 717 bytes prism/private/wslib/WS/Class_Hazard_TTR_V_1_0_7_28/EqnImages/P_Eqn_9.png
2004-Nov-15 11:15:40 8 bytes prism/private/wslib/WS/Class_Hazard_TTR_V_1_0_7_28/images.aux
2004-Nov-15 11:15:40 12420 bytes prism/private/wslib/WS/Class_Hazard_TTR_V_1_0_7_28/images.log
2004-Nov-15 11:15:50 6394 bytes prism/private/wslib/WS/Class_Hazard_TTR_V_1_0_7_28/images.pl
2004-Nov-15 11:15:38 9940 bytes prism/private/wslib/WS/Class_Hazard_TTR_V_1_0_7_28/images.tex
2004-Nov-15 11:15:46 963 bytes prism/private/wslib/WS/Class_Hazard_TTR_V_1_0_7_28/img1.png
2004-Nov-15 11:15:40 678 bytes prism/private/wslib/WS/Class_Hazard_TTR_V_1_0_7_28/img10.png
2004-Nov-15 11:15:46 1288 bytes prism/private/wslib/WS/Class_Hazard_TTR_V_1_0_7_28/img11.png
2004-Nov-15 11:15:50 936 bytes prism/private/wslib/WS/Class_Hazard_TTR_V_1_0_7_28/img12.png
2004-Nov-15 11:15:48 811 bytes prism/private/wslib/WS/Class_Hazard_TTR_V_1_0_7_28/img13.png
2004-Nov-15 11:15:48 1539 bytes prism/private/wslib/WS/Class_Hazard_TTR_V_1_0_7_28/img14.png
2004-Nov-15 11:15:42 1563 bytes prism/private/wslib/WS/Class_Hazard_TTR_V_1_0_7_28/img15.png
2004-Nov-15 11:15:44 1122 bytes prism/private/wslib/WS/Class_Hazard_TTR_V_1_0_7_28/img16.png
2004-Nov-15 11:15:48 887 bytes prism/private/wslib/WS/Class_Hazard_TTR_V_1_0_7_28/img17.png
2004-Nov-15 11:15:50 1142 bytes prism/private/wslib/WS/Class_Hazard_TTR_V_1_0_7_28/img18.png
2004-Nov-15 11:15:50 1117 bytes prism/private/wslib/WS/Class_Hazard_TTR_V_1_0_7_28/img19.png
2004-Nov-15 11:15:46 872 bytes prism/private/wslib/WS/Class_Hazard_TTR_V_1_0_7_28/img2.png
2004-Nov-15 11:15:44 856 bytes prism/private/wslib/WS/Class_Hazard_TTR_V_1_0_7_28/img20.png
2004-Nov-15 11:15:44 1626 bytes prism/private/wslib/WS/Class_Hazard_TTR_V_1_0_7_28/img3.png
2004-Nov-15 11:15:42 1838 bytes prism/private/wslib/WS/Class_Hazard_TTR_V_1_0_7_28/img4.png
2004-Nov-15 11:15:50 1205 bytes prism/private/wslib/WS/Class_Hazard_TTR_V_1_0_7_28/img5.png
2004-Nov-15 11:15:48 1357 bytes prism/private/wslib/WS/Class_Hazard_TTR_V_1_0_7_28/img6.png
2004-Nov-15 11:15:42 1308 bytes prism/private/wslib/WS/Class_Hazard_TTR_V_1_0_7_28/img7.png
2004-Nov-15 11:15:46 933 bytes prism/private/wslib/WS/Class_Hazard_TTR_V_1_0_7_28/img8.png
2004-Nov-15 11:15:42 651 bytes prism/private/wslib/WS/Class_Hazard_TTR_V_1_0_7_28/img9.png
2004-Nov-15 11:15:50 10720 bytes prism/private/wslib/WS/Class_Hazard_TTR_V_1_0_7_28/index.html
2004-Nov-15 11:15:50 2678 bytes prism/private/wslib/WS/Class_Hazard_TTR_V_1_0_7_28/internals.pl
2004-Nov-15 11:16:14 2952 bytes prism/private/wslib/WS/Class_Hazard_TTR_V_1_0_7_28/labels.pl
2004-Nov-15 11:15:50 2523 bytes prism/private/wslib/WS/Class_Hazard_TTR_V_1_0_7_28/node1.html
2004-Dec-13 10:28:45 1122 bytes prism/private/wslib/WS/Class_Hazard_TTV_V_1_0_7_28
2004-Nov-15 11:15:54 159607 bytes prism/private/wslib/WS/Class_Hazard_TTV_V_1_0_7_28.pm
2004-Nov-15 11:15:54 2152 bytes prism/private/wslib/WS/Class_Hazard_TTV_V_1_0_7_28.tex
2004-Nov-15 11:15:54 300 bytes prism/private/wslib/WS/Class_Hazard_TTV_V_1_0_7_28.ws
2004-Nov-15 11:16:08 891 bytes prism/private/wslib/WS/Class_Hazard_TTV_V_1_0_7_28/Class_Hazard_TTV_V_1_0_7_28.css
2004-Nov-15 11:16:08 10720 bytes prism/private/wslib/WS/Class_Hazard_TTV_V_1_0_7_28/Class_Hazard_TTV_V_1_0_7_28.html
2004-Dec-13 10:28:45 816 bytes prism/private/wslib/WS/Class_Hazard_TTV_V_1_0_7_28/EqnImages
2004-Nov-15 11:16:08 774 bytes prism/private/wslib/WS/Class_Hazard_TTV_V_1_0_7_28/EqnImages/BP_Eqn_0.png
2004-Nov-15 11:16:08 781 bytes prism/private/wslib/WS/Class_Hazard_TTV_V_1_0_7_28/EqnImages/BP_Eqn_1.png
2004-Nov-15 11:16:08 1388 bytes prism/private/wslib/WS/Class_Hazard_TTV_V_1_0_7_28/EqnImages/P_Eqn_0.png
2004-Nov-15 11:16:10 1674 bytes prism/private/wslib/WS/Class_Hazard_TTV_V_1_0_7_28/EqnImages/P_Eqn_1.png
2004-Nov-15 11:16:10 1055 bytes prism/private/wslib/WS/Class_Hazard_TTV_V_1_0_7_28/EqnImages/P_Eqn_10.png
2004-Nov-15 11:16:10 1201 bytes prism/private/wslib/WS/Class_Hazard_TTV_V_1_0_7_28/EqnImages/P_Eqn_11.png
2004-Nov-15 11:16:10 1092 bytes prism/private/wslib/WS/Class_Hazard_TTV_V_1_0_7_28/EqnImages/P_Eqn_12.png
2004-Nov-15 11:16:10 802 bytes prism/private/wslib/WS/Class_Hazard_TTV_V_1_0_7_28/EqnImages/P_Eqn_13.png
2004-Nov-15 11:16:10 582 bytes prism/private/wslib/WS/Class_Hazard_TTV_V_1_0_7_28/EqnImages/P_Eqn_14.png
2004-Nov-15 11:16:10 1092 bytes prism/private/wslib/WS/Class_Hazard_TTV_V_1_0_7_28/EqnImages/P_Eqn_15.png
2004-Nov-15 11:16:10 616 bytes prism/private/wslib/WS/Class_Hazard_TTV_V_1_0_7_28/EqnImages/P_Eqn_16.png
2004-Nov-15 11:16:10 1147 bytes prism/private/wslib/WS/Class_Hazard_TTV_V_1_0_7_28/EqnImages/P_Eqn_17.png
2004-Nov-15 11:16:10 799 bytes prism/private/wslib/WS/Class_Hazard_TTV_V_1_0_7_28/EqnImages/P_Eqn_18.png
2004-Nov-15 11:16:10 689 bytes prism/private/wslib/WS/Class_Hazard_TTV_V_1_0_7_28/EqnImages/P_Eqn_19.png
2004-Nov-15 11:16:10 1383 bytes prism/private/wslib/WS/Class_Hazard_TTV_V_1_0_7_28/EqnImages/P_Eqn_2.png
2004-Nov-15 11:16:10 1399 bytes prism/private/wslib/WS/Class_Hazard_TTV_V_1_0_7_28/EqnImages/P_Eqn_3.png
2004-Nov-15 11:16:10 959 bytes prism/private/wslib/WS/Class_Hazard_TTV_V_1_0_7_28/EqnImages/P_Eqn_4.png 2004-Nov-15 11:16:12 821 bytes prism/private/wslib/WS/Class_Hazard_TTV_V_1_0_7_28/EqnImages/P_Eqn_5.png
2004-Nov-15 11:16:12 959 bytes prism/private/wslib/WS/Class_Hazard_TTV_V_1_0_7_28/EqnImages/P_Eqn_6.png
2004-Nov-15 11:16:12 986 bytes prism/private/wslib/WS/Class_Hazard_TTV_V_1_0_7_28/EqnImages/P_Eqn_7.png
2004-Nov-15 11:16:12 951 bytes prism/private/wslib/WS/Class_Hazard_TTV_V_1_0_7_28/EqnImages/P_Eqn_8.png
2004-Nov-15 11:16:12 717 bytes prism/private/wslib/WS/Class_Hazard_TTV_V_1_0_7_28/EqnImages/P_Eqn_9.png
2004-Nov-15 11:15:56 8 bytes prism/private/wslib/WS/Class_Hazard_TTV_V_1_0_7_28/images.aux
2004-Nov-15 11:15:56 12420 bytes prism/private/wslib/WS/Class_Hazard_TTV_V_1_0_7_28/images.log
2004-Nov-15 11:16:08 6394 bytes prism/private/wslib/WS/Class_Hazard_TTV_V_1_0_7_28/images.pl
2004-Nov-15 11:15:56 9940 bytes prism/private/wslib/WS/Class_Hazard_TTV_V_1_0_7_28/images.tex
2004-Nov-15 11:16:04 963 bytes prism/private/wslib/WS/Class_Hazard_TTV_V_1_0_7_28/img1.png
2004-Nov-15 11:15:58 678 bytes prism/private/wslib/WS/Class_Hazard_TTV_V_1_0_7_28/img10.png
2004-Nov-15 11:16:04 1288 bytes prism/private/wslib/WS/Class_Hazard_TTV_V_1_0_7_28/img11.png
2004-Nov-15 11:16:06 936 bytes prism/private/wslib/WS/Class_Hazard_TTV_V_1_0_7_28/img12.png
2004-Nov-15 11:16:06 811 bytes prism/private/wslib/WS/Class_Hazard_TTV_V_1_0_7_28/img13.png
2004-Nov-15 11:16:04 1539 bytes prism/private/wslib/WS/Class_Hazard_TTV_V_1_0_7_28/img14.png
2004-Nov-15 11:16:00 1563 bytes prism/private/wslib/WS/Class_Hazard_TTV_V_1_0_7_28/img15.png
2004-Nov-15 11:16:02 1122 bytes prism/private/wslib/WS/Class_Hazard_TTV_V_1_0_7_28/img16.png
2004-Nov-15 11:16:06 887 bytes prism/private/wslib/WS/Class_Hazard_TTV_V_1_0_7_28/img17.png
2004-Nov-15 11:16:08 1142 bytes prism/private/wslib/WS/Class_Hazard_TTV_V_1_0_7_28/img18.png
2004-Nov-15 11:16:08 1117 bytes prism/private/wslib/WS/Class_Hazard_TTV_V_1_0_7_28/img19.png
2004-Nov-15 11:16:04 872 bytes prism/private/wslib/WS/Class_Hazard_TTV_V_1_0_7_28/img2.png
2004-Nov-15 11:16:00 856 bytes prism/private/wslib/WS/Class_Hazard_TTV_V_1_0_7_28/img20.png
2004-Nov-15 11:16:02 1626 bytes prism/private/wslib/WS/Class_Hazard_TTV_V_1_0_7_28/img3.png
2004-Nov-15 11:16:00 1838 bytes prism/private/wslib/WS/Class_Hazard_TTV_V_1_0_7_28/img4.png
2004-Nov-15 11:16:08 1205 bytes prism/private/wslib/WS/Class_Hazard_TTV_V_1_0_7_28/img5.png
2004-Nov-15 11:16:06 1357 bytes prism/private/wslib/WS/Class_Hazard_TTV_V_1_0_7_28/img6.png
2004-Nov-15 11:16:00 1308 bytes prism/private/wslib/WS/Class_Hazard_TTV_V_1_0_7_28/img7.png
2004-Nov-15 11:16:02 933 bytes prism/private/wslib/WS/Class_Hazard_TTV_V_1_0_7_28/img8.png
2004-Nov-15 11:15:58 651 bytes prism/private/wslib/WS/Class_Hazard_TTV_V_1_0_7_28/img9.png
2004-Nov-15 11:16:08 10720 bytes prism/private/wslib/WS/Class_Hazard_TTV_V_1_0_7_28/index.html
2004-Nov-15 11:16:08 2678 bytes prism/private/wslib/WS/Class_Hazard_TTV_V_1_0_7_28/internals.pl
2004-Nov-15 11:16:14 2952 bytes prism/private/wslib/WS/Class_Hazard_TTV_V_1_0_7_28/labels.pl
2004-Nov-15 11:16:08 2523 bytes prism/private/wslib/WS/Class_Hazard_TTV_V_1_0_7_28/node1.html
2004-Dec-13 10:28:45 1122 bytes prism/private/wslib/WS/Class_Hazard_TVG_V_1_0_7_28
2004-Nov-15 11:16:12 159607 bytes prism/private/wslib/WS/Class_Hazard_TVG_V_1_0_7_28.pm
2004-Nov-15 11:16:12 2152 bytes prism/private/wslib/WS/Class_Hazard_TVG_V_1_0_7_28.tex
2004-Nov-15 11:16:12 299 bytes prism/private/wslib/WS/Class_Hazard_TVG_V_1_0_7_28.ws
2004-Nov-15 11:16:26 891 bytes prism/private/wslib/WS/Class_Hazard_TVG_V_1_0_7_28/Class_Hazard_TVG_V_1_0_7_28.css
2004-Nov-15 11:16:26 10720 bytes prism/private/wslib/WS/Class_Hazard_TVG_V_1_0_7_28/Class_Hazard_TVG_V_1_0_7_28.html
2004-Dec-13 10:28:45 816 bytes prism/private/wslib/WS/Class_Hazard_TVG_V_1_0_7_28/EqnImages
2004-Nov-15 11:16:26 774 bytes prism/private/wslib/WS/Class_Hazard_TVG_V_1_0_7_28/EqnImages/BP_Eqn_0.png
2004-Nov-15 11:16:26 781 bytes prism/private/wslib/WS/Class_Hazard_TVG_V_1_0_7_28/EqnImages/BP_Eqn_1.png
2004-Nov-15 11:16:26 1388 bytes prism/private/wslib/WS/Class_Hazard_TVG_V_1_0_7_28/EqnImages/P_Eqn_0.png
2004-Nov-15 11:16:26 1674 bytes prism/private/wslib/WS/Class_Hazard_TVG_V_1_0_7_28/EqnImages/P_Eqn_1.png
2004-Nov-15 11:16:26 1055 bytes prism/private/wslib/WS/Class_Hazard_TVG_V_1_0_7_28/EqnImages/P_Eqn_10.png
2004-Nov-15 11:16:26 1201 bytes prism/private/wslib/WS/Class_Hazard_TVG_V_1_0_7_28/EqnImages/P_Eqn_11.png
2004-Nov-15 11:16:28 1092 bytes prism/private/wslib/WS/Class_Hazard_TVG_V_1_0_7_28/EqnImages/P_Eqn_12.png
2004-Nov-15 11:16:28 802 bytes prism/private/wslib/WS/Class_Hazard_TVG_V_1_0_7_28/EqnImages/P_Eqn_13.png
2004-Nov-15 11:16:28 582 bytes prism/private/wslib/WS/Class_Hazard_TVG_V_1_0_7_28/EqnImages/P_Eqn_14.png
2004-Nov-15 11:16:28 1092 bytes prism/private/wslib/WS/Class_Hazard_TVG_V_1_0_7_28/EqnImages/P_Eqn_15.png
2004-Nov-15 11:16:28 616 bytes prism/private/wslib/WS/Class_Hazard_TVG_V_1_0_7_28/EqnImages/P_Eqn_16.png
2004-Nov-15 11:16:28 1147 bytes prism/private/wslib/WS/Class_Hazard_TVG_V_1_0_7_28/EqnImages/P_Eqn_17.png
2004-Nov-15 11:16:28 799 bytes prism/private/wslib/WS/Class_Hazard_TVG_V_1_0_7_28/EqnImages/P_Eqn_18.png
2004-Nov-15 11:16:28 689 bytes prism/private/wslib/WS/Class_Hazard_TVG_V_1_0_7_28/EqnImages/P_Eqn_19.png
2004-Nov-15 11:16:28 1383 bytes prism/private/wslib/WS/Class_Hazard_TVG_V_1_0_7_28/EqnImages/P_Eqn_2.png
2004-Nov-15 11:16:28 1399 bytes prism/private/wslib/WS/Class_Hazard_TVG_V_1_0_7_28/EqnImages/P_Eqn_3.png
2004-Nov-15 11:16:28 959 bytes prism/private/wslib/WS/Class_Hazard_TVG_V_1_0_7_28/EqnImages/P_Eqn_4.png
2004-Nov-15 11:16:28 821 bytes prism/private/wslib/WS/Class_Hazard_TVG_V_1_0_7_28/EqnImages/P_Eqn_5.png
2004-Nov-15 11:16:28 959 bytes prism/private/wslib/WS/Class_Hazard_TVG_V_1_0_7_28/EqnImages/P_Eqn_6.png
2004-Nov-15 11:16:28 986 bytes prism/private/wslib/WS/Class_Hazard_TVG_V_1_0_7_28/EqnImages/P_Eqn_7.png
2004-Nov-15 11:16:28 951 bytes prism/private/wslib/WS/Class_Hazard_TVG_V_1_0_7_28/EqnImages/P_Eqn_8.png 2004-Nov-15 11:16:30 717 bytes prism/private/wslib/WS/Class_Hazard_TVG_V_1_0_7_28/EqnImages/P_Eqn_9.png
2004-Nov-15 11:16:14 8 bytes prism/private/wslib/WS/Class_Hazard_TVG_V_1_0_7_28/images.aux
2004-Nov-15 11:16:14 12420 bytes prism/private/wslib/WS/Class_Hazard_TVG_V_1_0_7_28/images.log
2004-Nov-15 11:16:26 6394 bytes prism/private/wslib/WS/Class_Hazard_TVG_V_1_0_7_28/images.pl
2004-Nov-15 11:16:14 9940 bytes prism/private/wslib/WS/Class_Hazard_TVG_V_1_0_7_28/images.tex
2004-Nov-15 11:16:22 963 bytes prism/private/wslib/WS/Class_Hazard_TVG_V_1_0_7_28/img1.png
2004-Nov-15 11:16:16 678 bytes prism/private/wslib/WS/Class_Hazard_TVG_V_1_0_7_28/img10.png
2004-Nov-15 11:16:20 1288 bytes prism/private/wslib/WS/Class_Hazard_TVG_V_1_0_7_28/img11.png
2004-Nov-15 11:16:24 936 bytes prism/private/wslib/WS/Class_Hazard_TVG_V_1_0_7_28/img12.png
2004-Nov-15 11:16:24 811 bytes prism/private/wslib/WS/Class_Hazard_TVG_V_1_0_7_28/img13.png
2004-Nov-15 11:16:22 1539 bytes prism/private/wslib/WS/Class_Hazard_TVG_V_1_0_7_28/img14.png
2004-Nov-15 11:16:18 1563 bytes prism/private/wslib/WS/Class_Hazard_TVG_V_1_0_7_28/img15.png
2004-Nov-15 11:16:18 1122 bytes prism/private/wslib/WS/Class_Hazard_TVG_V_1_0_7_28/img16.png
2004-Nov-15 11:16:24 887 bytes prism/private/wslib/WS/Class_Hazard_TVG_V_1_0_7_28/img17.png
2004-Nov-15 11:16:26 1142 bytes prism/private/wslib/WS/Class_Hazard_TVG_V_1_0_7_28/img18.png
2004-Nov-15 11:16:26 1117 bytes prism/private/wslib/WS/Class_Hazard_TVG_V_1_0_7_28/img19.png
2004-Nov-15 11:16:22 872 bytes prism/private/wslib/WS/Class_Hazard_TVG_V_1_0_7_28/img2.png
2004-Nov-15 11:16:18 856 bytes prism/private/wslib/WS/Class_Hazard_TVG_V_1_0_7_28/img20.png
2004-Nov-15 11:16:20 1626 bytes prism/private/wslib/WS/Class_Hazard_TVG_V_1_0_7_28/img3.png
2004-Nov-15 11:16:18 1838 bytes prism/private/wslib/WS/Class_Hazard_TVG_V_1_0_7_28/img4.png
2004-Nov-15 11:16:24 1205 bytes prism/private/wslib/WS/Class_Hazard_TVG_V_1_0_7_28/img5.png
2004-Nov-15 11:16:22 1357 bytes prism/private/wslib/WS/Class_Hazard_TVG_V_1_0_7_28/img6.png
2004-Nov-15 11:16:16 1308 bytes prism/private/wslib/WS/Class_Hazard_TVG_V_1_0_7_28/img7.png
2004-Nov-15 11:16:20 933 bytes prism/private/wslib/WS/Class_Hazard_TVG_V_1_0_7_28/img8.png
2004-Nov-15 11:16:16 651 bytes prism/private/wslib/WS/Class_Hazard_TVG_V_1_0_7_28/img9.png
2004-Nov-15 11:16:26 10720 bytes prism/private/wslib/WS/Class_Hazard_TVG_V_1_0_7_28/index.html
2004-Nov-15 11:16:26 2678 bytes prism/private/wslib/WS/Class_Hazard_TVG_V_1_0_7_28/internals.pl
2004-Nov-15 11:16:44 2952 bytes prism/private/wslib/WS/Class_Hazard_TVG_V_1_0_7_28/labels.pl
2004-Nov-15 11:16:26 2523 bytes prism/private/wslib/WS/Class_Hazard_TVG_V_1_0_7_28/node1.html
2004-Dec-13 10:28:46 1122 bytes prism/private/wslib/WS/Class_Hazard_US_2_1_0_7_28
2004-Nov-15 11:16:30 159531 bytes prism/private/wslib/WS/Class_Hazard_US_2_1_0_7_28.pm
2004-Nov-15 11:16:30 2152 bytes prism/private/wslib/WS/Class_Hazard_US_2_1_0_7_28.tex
2004-Nov-15 11:16:30 308 bytes prism/private/wslib/WS/Class_Hazard_US_2_1_0_7_28.ws
2004-Nov-15 11:16:44 891 bytes prism/private/wslib/WS/Class_Hazard_US_2_1_0_7_28/Class_Hazard_US_2_1_0_7_28.css
2004-Nov-15 11:16:44 10716 bytes prism/private/wslib/WS/Class_Hazard_US_2_1_0_7_28/Class_Hazard_US_2_1_0_7_28.html
2004-Dec-13 10:28:46 816 bytes prism/private/wslib/WS/Class_Hazard_US_2_1_0_7_28/EqnImages
2004-Nov-15 11:16:44 774 bytes prism/private/wslib/WS/Class_Hazard_US_2_1_0_7_28/EqnImages/BP_Eqn_0.png
2004-Nov-15 11:16:44 781 bytes prism/private/wslib/WS/Class_Hazard_US_2_1_0_7_28/EqnImages/BP_Eqn_1.png
2004-Nov-15 11:16:44 1388 bytes prism/private/wslib/WS/Class_Hazard_US_2_1_0_7_28/EqnImages/P_Eqn_0.png
2004-Nov-15 11:16:44 1674 bytes prism/private/wslib/WS/Class_Hazard_US_2_1_0_7_28/EqnImages/P_Eqn_1.png
2004-Nov-15 11:16:44 1055 bytes prism/private/wslib/WS/Class_Hazard_US_2_1_0_7_28/EqnImages/P_Eqn_10.png
2004-Nov-15 11:16:44 1201 bytes prism/private/wslib/WS/Class_Hazard_US_2_1_0_7_28/EqnImages/P_Eqn_11.png
2004-Nov-15 11:16:44 1092 bytes prism/private/wslib/WS/Class_Hazard_US_2_1_0_7_28/EqnImages/P_Eqn_12.png
2004-Nov-15 11:16:44 802 bytes prism/private/wslib/WS/Class_Hazard_US_2_1_0_7_28/EqnImages/P_Eqn_13.png
2004-Nov-15 11:16:44 582 bytes prism/private/wslib/WS/Class_Hazard_US_2_1_0_7_28/EqnImages/P_Eqn_14.png
2004-Nov-15 11:16:44 1092 bytes prism/private/wslib/WS/Class_Hazard_US_2_1_0_7_28/EqnImages/P_Eqn_15.png
2004-Nov-15 11:16:46 616 bytes prism/private/wslib/WS/Class_Hazard_US_2_1_0_7_28/EqnImages/P_Eqn_16.png
2004-Nov-15 11:16:46 1147 bytes prism/private/wslib/WS/Class_Hazard_US_2_1_0_7_28/EqnImages/P_Eqn_17.png
2004-Nov-15 11:16:46 799 bytes prism/private/wslib/WS/Class_Hazard_US_2_1_0_7_28/EqnImages/P_Eqn_18.png
2004-Nov-15 11:16:46 689 bytes prism/private/wslib/WS/Class_Hazard_US_2_1_0_7_28/EqnImages/P_Eqn_19.png
2004-Nov-15 11:16:46 1383 bytes prism/private/wslib/WS/Class_Hazard_US_2_1_0_7_28/EqnImages/P_Eqn_2.png
2004-Nov-15 11:16:46 1399 bytes prism/private/wslib/WS/Class_Hazard_US_2_1_0_7_28/EqnImages/P_Eqn_3.png
2004-Nov-15 11:16:46 959 bytes prism/private/wslib/WS/Class_Hazard_US_2_1_0_7_28/EqnImages/P_Eqn_4.png
2004-Nov-15 11:16:46 821 bytes prism/private/wslib/WS/Class_Hazard_US_2_1_0_7_28/EqnImages/P_Eqn_5.png
2004-Nov-15 11:16:46 959 bytes prism/private/wslib/WS/Class_Hazard_US_2_1_0_7_28/EqnImages/P_Eqn_6.png
2004-Nov-15 11:16:46 986 bytes prism/private/wslib/WS/Class_Hazard_US_2_1_0_7_28/EqnImages/P_Eqn_7.png
2004-Nov-15 11:16:46 951 bytes prism/private/wslib/WS/Class_Hazard_US_2_1_0_7_28/EqnImages/P_Eqn_8.png
2004-Nov-15 11:16:46 717 bytes prism/private/wslib/WS/Class_Hazard_US_2_1_0_7_28/EqnImages/P_Eqn_9.png
2004-Nov-15 11:16:32 8 bytes prism/private/wslib/WS/Class_Hazard_US_2_1_0_7_28/images.aux
2004-Nov-15 11:16:32 12420 bytes prism/private/wslib/WS/Class_Hazard_US_2_1_0_7_28/images.log
2004-Nov-15 11:16:44 6394 bytes prism/private/wslib/WS/Class_Hazard_US_2_1_0_7_28/images.pl 2004-Nov-15 11:16:32 9940 bytes prism/private/wslib/WS/Class_Hazard_US_2_1_0_7_28/images.tex
2004-Nov-15 11:16:38 963 bytes prism/private/wslib/WS/Class_Hazard_US_2_1_0_7_28/img1.png
2004-Nov-15 11:16:34 678 bytes prism/private/wslib/WS/Class_Hazard_US_2_1_0_7_28/img10.png
2004-Nov-15 11:16:38 1288 bytes prism/private/wslib/WS/Class_Hazard_US_2_1_0_7_28/img11.png
2004-Nov-15 11:16:42 936 bytes prism/private/wslib/WS/Class_Hazard_US_2_1_0_7_28/img12.png
2004-Nov-15 11:16:40 811 bytes prism/private/wslib/WS/Class_Hazard_US_2_1_0_7_28/img13.png
2004-Nov-15 11:16:40 1539 bytes prism/private/wslib/WS/Class_Hazard_US_2_1_0_7_28/img14.png
2004-Nov-15 11:16:34 1563 bytes prism/private/wslib/WS/Class_Hazard_US_2_1_0_7_28/img15.png
2004-Nov-15 11:16:36 1122 bytes prism/private/wslib/WS/Class_Hazard_US_2_1_0_7_28/img16.png
2004-Nov-15 11:16:42 887 bytes prism/private/wslib/WS/Class_Hazard_US_2_1_0_7_28/img17.png
2004-Nov-15 11:16:44 1142 bytes prism/private/wslib/WS/Class_Hazard_US_2_1_0_7_28/img18.png
2004-Nov-15 11:16:42 1117 bytes prism/private/wslib/WS/Class_Hazard_US_2_1_0_7_28/img19.png
2004-Nov-15 11:16:40 872 bytes prism/private/wslib/WS/Class_Hazard_US_2_1_0_7_28/img2.png
2004-Nov-15 11:16:36 856 bytes prism/private/wslib/WS/Class_Hazard_US_2_1_0_7_28/img20.png
2004-Nov-15 11:16:36 1626 bytes prism/private/wslib/WS/Class_Hazard_US_2_1_0_7_28/img3.png
2004-Nov-15 11:16:36 1838 bytes prism/private/wslib/WS/Class_Hazard_US_2_1_0_7_28/img4.png
2004-Nov-15 11:16:42 1205 bytes prism/private/wslib/WS/Class_Hazard_US_2_1_0_7_28/img5.png
2004-Nov-15 11:16:40 1357 bytes prism/private/wslib/WS/Class_Hazard_US_2_1_0_7_28/img6.png
2004-Nov-15 11:16:34 1308 bytes prism/private/wslib/WS/Class_Hazard_US_2_1_0_7_28/img7.png
2004-Nov-15 11:16:38 933 bytes prism/private/wslib/WS/Class_Hazard_US_2_1_0_7_28/img8.png
2004-Nov-15 11:16:34 651 bytes prism/private/wslib/WS/Class_Hazard_US_2_1_0_7_28/img9.png
2004-Nov-15 11:16:44 10716 bytes prism/private/wslib/WS/Class_Hazard_US_2_1_0_7_28/index.html
2004-Nov-15 11:16:44 2656 bytes prism/private/wslib/WS/Class_Hazard_US_2_1_0_7_28/internals.pl
2004-Nov-15 11:16:44 2930 bytes prism/private/wslib/WS/Class_Hazard_US_2_1_0_7_28/labels.pl
2004-Nov-15 11:16:44 2512 bytes prism/private/wslib/WS/Class_Hazard_US_2_1_0_7_28/node1.html
2004-Dec-13 10:28:46 1462 bytes prism/private/wslib/WS/Class_Hazard_US_L_1_0_7_28
2004-Nov-15 11:16:48 212504 bytes prism/private/wslib/WS/Class_Hazard_US_L_1_0_7_28.pm
2004-Nov-15 11:16:48 2962 bytes prism/private/wslib/WS/Class_Hazard_US_L_1_0_7_28.tex
2004-Nov-15 11:16:48 305 bytes prism/private/wslib/WS/Class_Hazard_US_L_1_0_7_28.ws
2004-Nov-15 11:17:06 891 bytes prism/private/wslib/WS/Class_Hazard_US_L_1_0_7_28/Class_Hazard_US_L_1_0_7_28.css
2004-Nov-15 11:17:06 14495 bytes prism/private/wslib/WS/Class_Hazard_US_L_1_0_7_28/Class_Hazard_US_L_1_0_7_28.html
2004-Dec-13 10:28:46 1190 bytes prism/private/wslib/WS/Class_Hazard_US_L_1_0_7_28/EqnImages
2004-Nov-15 11:17:06 774 bytes prism/private/wslib/WS/Class_Hazard_US_L_1_0_7_28/EqnImages/BP_Eqn_0.png
2004-Nov-15 11:17:08 781 bytes prism/private/wslib/WS/Class_Hazard_US_L_1_0_7_28/EqnImages/BP_Eqn_1.png
2004-Nov-15 11:17:08 957 bytes prism/private/wslib/WS/Class_Hazard_US_L_1_0_7_28/EqnImages/CalcKbp_CalcKw_Eqn_0.png
2004-Nov-15 11:17:08 975 bytes prism/private/wslib/WS/Class_Hazard_US_L_1_0_7_28/EqnImages/CalcKbp_CalcKw_Eqn_1.png
2004-Nov-15 11:17:08 736 bytes prism/private/wslib/WS/Class_Hazard_US_L_1_0_7_28/EqnImages/CalcKbp_CalcKw_Eqn_2.png
2004-Nov-15 11:17:08 420 bytes prism/private/wslib/WS/Class_Hazard_US_L_1_0_7_28/EqnImages/CalcKbp_Eqn_0.png
2004-Nov-15 11:17:08 420 bytes prism/private/wslib/WS/Class_Hazard_US_L_1_0_7_28/EqnImages/CalcKbp_Eqn_1.png
2004-Nov-15 11:17:08 390 bytes prism/private/wslib/WS/Class_Hazard_US_L_1_0_7_28/EqnImages/CalcKbp_Eqn_2.png
2004-Nov-15 11:17:08 628 bytes prism/private/wslib/WS/Class_Hazard_US_L_1_0_7_28/EqnImages/Eqn_0.png
2004-Nov-15 11:17:08 1585 bytes prism/private/wslib/WS/Class_Hazard_US_L_1_0_7_28/EqnImages/Eqn_1.png
2004-Nov-15 11:17:08 1195 bytes prism/private/wslib/WS/Class_Hazard_US_L_1_0_7_28/EqnImages/LP_Eqn_0.png
2004-Nov-15 11:17:08 953 bytes prism/private/wslib/WS/Class_Hazard_US_L_1_0_7_28/EqnImages/PC_Eqn_0.png
2004-Nov-15 11:17:08 773 bytes prism/private/wslib/WS/Class_Hazard_US_L_1_0_7_28/EqnImages/PD_Eqn_0.png
2004-Nov-15 11:17:08 1388 bytes prism/private/wslib/WS/Class_Hazard_US_L_1_0_7_28/EqnImages/P_Eqn_0.png
2004-Nov-15 11:17:08 1674 bytes prism/private/wslib/WS/Class_Hazard_US_L_1_0_7_28/EqnImages/P_Eqn_1.png
2004-Nov-15 11:17:08 1055 bytes prism/private/wslib/WS/Class_Hazard_US_L_1_0_7_28/EqnImages/P_Eqn_10.png
2004-Nov-15 11:17:10 1201 bytes prism/private/wslib/WS/Class_Hazard_US_L_1_0_7_28/EqnImages/P_Eqn_11.png
2004-Nov-15 11:17:10 1092 bytes prism/private/wslib/WS/Class_Hazard_US_L_1_0_7_28/EqnImages/P_Eqn_12.png
2004-Nov-15 11:17:10 802 bytes prism/private/wslib/WS/Class_Hazard_US_L_1_0_7_28/EqnImages/P_Eqn_13.png
2004-Nov-15 11:17:10 582 bytes prism/private/wslib/WS/Class_Hazard_US_L_1_0_7_28/EqnImages/P_Eqn_14.png
2004-Nov-15 11:17:10 1092 bytes prism/private/wslib/WS/Class_Hazard_US_L_1_0_7_28/EqnImages/P_Eqn_15.png
2004-Nov-15 11:17:10 616 bytes prism/private/wslib/WS/Class_Hazard_US_L_1_0_7_28/EqnImages/P_Eqn_16.png
2004-Nov-15 11:17:10 1147 bytes prism/private/wslib/WS/Class_Hazard_US_L_1_0_7_28/EqnImages/P_Eqn_17.png
2004-Nov-15 11:17:10 799 bytes prism/private/wslib/WS/Class_Hazard_US_L_1_0_7_28/EqnImages/P_Eqn_18.png
2004-Nov-15 11:17:10 689 bytes prism/private/wslib/WS/Class_Hazard_US_L_1_0_7_28/EqnImages/P_Eqn_19.png
2004-Nov-15 11:17:10 1383 bytes prism/private/wslib/WS/Class_Hazard_US_L_1_0_7_28/EqnImages/P_Eqn_2.png
2004-Nov-15 11:17:10 1399 bytes prism/private/wslib/WS/Class_Hazard_US_L_1_0_7_28/EqnImages/P_Eqn_3.png
2004-Nov-15 11:17:10 959 bytes prism/private/wslib/WS/Class_Hazard_US_L_1_0_7_28/EqnImages/P_Eqn_4.png
2004-Nov-15 11:17:10 821 bytes prism/private/wslib/WS/Class_Hazard_US_L_1_0_7_28/EqnImages/P_Eqn_5.png 2004-Nov-15 11:17:10 959 bytes prism/private/wslib/WS/Class_Hazard_US_L_1_0_7_28/EqnImages/P_Eqn_6.png
2004-Nov-15 11:17:12 986 bytes prism/private/wslib/WS/Class_Hazard_US_L_1_0_7_28/EqnImages/P_Eqn_7.png
2004-Nov-15 11:17:12 951 bytes prism/private/wslib/WS/Class_Hazard_US_L_1_0_7_28/EqnImages/P_Eqn_8.png
2004-Nov-15 11:17:12 717 bytes prism/private/wslib/WS/Class_Hazard_US_L_1_0_7_28/EqnImages/P_Eqn_9.png
2004-Nov-15 11:16:50 8 bytes prism/private/wslib/WS/Class_Hazard_US_L_1_0_7_28/images.aux
2004-Nov-15 11:16:50 13010 bytes prism/private/wslib/WS/Class_Hazard_US_L_1_0_7_28/images.log
2004-Nov-15 11:17:06 9246 bytes prism/private/wslib/WS/Class_Hazard_US_L_1_0_7_28/images.pl
2004-Nov-15 11:16:50 11762 bytes prism/private/wslib/WS/Class_Hazard_US_L_1_0_7_28/images.tex
2004-Nov-15 11:17:00 963 bytes prism/private/wslib/WS/Class_Hazard_US_L_1_0_7_28/img1.png
2004-Nov-15 11:17:04 1292 bytes prism/private/wslib/WS/Class_Hazard_US_L_1_0_7_28/img10.png
2004-Nov-15 11:17:00 1069 bytes prism/private/wslib/WS/Class_Hazard_US_L_1_0_7_28/img11.png
2004-Nov-15 11:16:58 874 bytes prism/private/wslib/WS/Class_Hazard_US_L_1_0_7_28/img12.png
2004-Nov-15 11:16:54 1626 bytes prism/private/wslib/WS/Class_Hazard_US_L_1_0_7_28/img13.png
2004-Nov-15 11:17:06 1838 bytes prism/private/wslib/WS/Class_Hazard_US_L_1_0_7_28/img14.png
2004-Nov-15 11:17:02 1205 bytes prism/private/wslib/WS/Class_Hazard_US_L_1_0_7_28/img15.png
2004-Nov-15 11:17:04 1357 bytes prism/private/wslib/WS/Class_Hazard_US_L_1_0_7_28/img16.png
2004-Nov-15 11:16:52 1308 bytes prism/private/wslib/WS/Class_Hazard_US_L_1_0_7_28/img17.png
2004-Nov-15 11:17:00 933 bytes prism/private/wslib/WS/Class_Hazard_US_L_1_0_7_28/img18.png
2004-Nov-15 11:16:54 651 bytes prism/private/wslib/WS/Class_Hazard_US_L_1_0_7_28/img19.png
2004-Nov-15 11:16:52 872 bytes prism/private/wslib/WS/Class_Hazard_US_L_1_0_7_28/img2.png
2004-Nov-15 11:16:58 678 bytes prism/private/wslib/WS/Class_Hazard_US_L_1_0_7_28/img20.png
2004-Nov-15 11:17:02 1288 bytes prism/private/wslib/WS/Class_Hazard_US_L_1_0_7_28/img21.png
2004-Nov-15 11:17:02 936 bytes prism/private/wslib/WS/Class_Hazard_US_L_1_0_7_28/img22.png
2004-Nov-15 11:16:58 811 bytes prism/private/wslib/WS/Class_Hazard_US_L_1_0_7_28/img23.png
2004-Nov-15 11:17:04 1539 bytes prism/private/wslib/WS/Class_Hazard_US_L_1_0_7_28/img24.png
2004-Nov-15 11:17:06 1563 bytes prism/private/wslib/WS/Class_Hazard_US_L_1_0_7_28/img25.png
2004-Nov-15 11:16:52 1122 bytes prism/private/wslib/WS/Class_Hazard_US_L_1_0_7_28/img26.png
2004-Nov-15 11:16:56 887 bytes prism/private/wslib/WS/Class_Hazard_US_L_1_0_7_28/img27.png
2004-Nov-15 11:16:54 1142 bytes prism/private/wslib/WS/Class_Hazard_US_L_1_0_7_28/img28.png
2004-Nov-15 11:17:06 1117 bytes prism/private/wslib/WS/Class_Hazard_US_L_1_0_7_28/img29.png
2004-Nov-15 11:17:02 1117 bytes prism/private/wslib/WS/Class_Hazard_US_L_1_0_7_28/img3.png
2004-Nov-15 11:16:58 856 bytes prism/private/wslib/WS/Class_Hazard_US_L_1_0_7_28/img30.png
2004-Nov-15 11:17:00 1099 bytes prism/private/wslib/WS/Class_Hazard_US_L_1_0_7_28/img4.png
2004-Nov-15 11:17:04 834 bytes prism/private/wslib/WS/Class_Hazard_US_L_1_0_7_28/img5.png
2004-Nov-15 11:16:56 467 bytes prism/private/wslib/WS/Class_Hazard_US_L_1_0_7_28/img6.png
2004-Nov-15 11:16:56 467 bytes prism/private/wslib/WS/Class_Hazard_US_L_1_0_7_28/img7.png
2004-Nov-15 11:16:52 683 bytes prism/private/wslib/WS/Class_Hazard_US_L_1_0_7_28/img8.png
2004-Nov-15 11:16:56 1719 bytes prism/private/wslib/WS/Class_Hazard_US_L_1_0_7_28/img9.png
2004-Nov-15 11:17:06 14495 bytes prism/private/wslib/WS/Class_Hazard_US_L_1_0_7_28/index.html
2004-Nov-15 11:17:06 3988 bytes prism/private/wslib/WS/Class_Hazard_US_L_1_0_7_28/internals.pl
2004-Nov-15 11:17:14 4361 bytes prism/private/wslib/WS/Class_Hazard_US_L_1_0_7_28/labels.pl
2004-Nov-15 11:17:06 2512 bytes prism/private/wslib/WS/Class_Hazard_US_L_1_0_7_28/node1.html
2004-Dec-13 10:28:46 1564 bytes prism/private/wslib/WS/Class_Hazard_US_S_1_0_7_28
2004-Nov-15 11:17:12 225244 bytes prism/private/wslib/WS/Class_Hazard_US_S_1_0_7_28.pm
2004-Nov-15 11:17:12 3215 bytes prism/private/wslib/WS/Class_Hazard_US_S_1_0_7_28.tex
2004-Nov-15 11:17:12 303 bytes prism/private/wslib/WS/Class_Hazard_US_S_1_0_7_28.ws
2004-Nov-15 11:17:34 891 bytes prism/private/wslib/WS/Class_Hazard_US_S_1_0_7_28/Class_Hazard_US_S_1_0_7_28.css
2004-Nov-15 11:17:34 15350 bytes prism/private/wslib/WS/Class_Hazard_US_S_1_0_7_28/Class_Hazard_US_S_1_0_7_28.html
2004-Dec-13 10:28:46 1258 bytes prism/private/wslib/WS/Class_Hazard_US_S_1_0_7_28/EqnImages
2004-Nov-15 11:17:34 774 bytes prism/private/wslib/WS/Class_Hazard_US_S_1_0_7_28/EqnImages/BP_Eqn_0.png
2004-Nov-15 11:17:34 781 bytes prism/private/wslib/WS/Class_Hazard_US_S_1_0_7_28/EqnImages/BP_Eqn_1.png
2004-Nov-15 11:17:34 1261 bytes prism/private/wslib/WS/Class_Hazard_US_S_1_0_7_28/EqnImages/CalcKbp_CalcKb_Eqn_0.png
2004-Nov-15 11:17:34 971 bytes prism/private/wslib/WS/Class_Hazard_US_S_1_0_7_28/EqnImages/CalcKbp_CalcKv_Eqn_0.png
2004-Nov-15 11:17:34 736 bytes prism/private/wslib/WS/Class_Hazard_US_S_1_0_7_28/EqnImages/CalcKbp_CalcKv_Eqn_1.png
2004-Nov-15 11:17:34 793 bytes prism/private/wslib/WS/Class_Hazard_US_S_1_0_7_28/EqnImages/CalcKbp_CalcKv_Eqn_2.png
2004-Nov-15 11:17:34 727 bytes prism/private/wslib/WS/Class_Hazard_US_S_1_0_7_28/EqnImages/CalcKbp_CalcKv_Eqn_3.png
2004-Nov-15 11:17:34 437 bytes prism/private/wslib/WS/Class_Hazard_US_S_1_0_7_28/EqnImages/CalcKbp_Eqn_0.png
2004-Nov-15 11:17:34 374 bytes prism/private/wslib/WS/Class_Hazard_US_S_1_0_7_28/EqnImages/CalcKbp_Eqn_1.png
2004-Nov-15 11:17:34 378 bytes prism/private/wslib/WS/Class_Hazard_US_S_1_0_7_28/EqnImages/CalcKn_Eqn_0.png
2004-Nov-15 11:17:34 777 bytes prism/private/wslib/WS/Class_Hazard_US_S_1_0_7_28/EqnImages/CalcKn_Eqn_1.png
2004-Nov-15 11:17:36 1395 bytes prism/private/wslib/WS/Class_Hazard_US_S_1_0_7_28/EqnImages/CalcKn_Eqn_2.png 2004-Nov-15 11:17:36 960 bytes prism/private/wslib/WS/Class_Hazard_US_S_1_0_7_28/EqnImages/CalcKn_Eqn_3.png
2004-Nov-15 11:17:36 532 bytes prism/private/wslib/WS/Class_Hazard_US_S_1_0_7_28/EqnImages/Eqn_0.png
2004-Nov-15 11:17:36 953 bytes prism/private/wslib/WS/Class_Hazard_US_S_1_0_7_28/EqnImages/PC_Eqn_0.png
2004-Nov-15 11:17:36 1388 bytes prism/private/wslib/WS/Class_Hazard_US_S_1_0_7_28/EqnImages/P_Eqn_0.png
2004-Nov-15 11:17:36 1674 bytes prism/private/wslib/WS/Class_Hazard_US_S_1_0_7_28/EqnImages/P_Eqn_1.png
2004-Nov-15 11:17:36 1055 bytes prism/private/wslib/WS/Class_Hazard_US_S_1_0_7_28/EqnImages/P_Eqn_10.png
2004-Nov-15 11:17:36 1201 bytes prism/private/wslib/WS/Class_Hazard_US_S_1_0_7_28/EqnImages/P_Eqn_11.png
2004-Nov-15 11:17:36 1092 bytes prism/private/wslib/WS/Class_Hazard_US_S_1_0_7_28/EqnImages/P_Eqn_12.png
2004-Nov-15 11:17:36 802 bytes prism/private/wslib/WS/Class_Hazard_US_S_1_0_7_28/EqnImages/P_Eqn_13.png
2004-Nov-15 11:17:36 582 bytes prism/private/wslib/WS/Class_Hazard_US_S_1_0_7_28/EqnImages/P_Eqn_14.png
2004-Nov-15 11:17:36 1092 bytes prism/private/wslib/WS/Class_Hazard_US_S_1_0_7_28/EqnImages/P_Eqn_15.png
2004-Nov-15 11:17:36 616 bytes prism/private/wslib/WS/Class_Hazard_US_S_1_0_7_28/EqnImages/P_Eqn_16.png
2004-Nov-15 11:17:36 1147 bytes prism/private/wslib/WS/Class_Hazard_US_S_1_0_7_28/EqnImages/P_Eqn_17.png
2004-Nov-15 11:17:36 799 bytes prism/private/wslib/WS/Class_Hazard_US_S_1_0_7_28/EqnImages/P_Eqn_18.png
2004-Nov-15 11:17:38 689 bytes prism/private/wslib/WS/Class_Hazard_US_S_1_0_7_28/EqnImages/P_Eqn_19.png
2004-Nov-15 11:17:38 1383 bytes prism/private/wslib/WS/Class_Hazard_US_S_1_0_7_28/EqnImages/P_Eqn_2.png
2004-Nov-15 11:17:38 1399 bytes prism/private/wslib/WS/Class_Hazard_US_S_1_0_7_28/EqnImages/P_Eqn_3.png
2004-Nov-15 11:17:38 959 bytes prism/private/wslib/WS/Class_Hazard_US_S_1_0_7_28/EqnImages/P_Eqn_4.png
2004-Nov-15 11:17:38 821 bytes prism/private/wslib/WS/Class_Hazard_US_S_1_0_7_28/EqnImages/P_Eqn_5.png
2004-Nov-15 11:17:38 959 bytes prism/private/wslib/WS/Class_Hazard_US_S_1_0_7_28/EqnImages/P_Eqn_6.png
2004-Nov-15 11:17:38 986 bytes prism/private/wslib/WS/Class_Hazard_US_S_1_0_7_28/EqnImages/P_Eqn_7.png
2004-Nov-15 11:17:38 951 bytes prism/private/wslib/WS/Class_Hazard_US_S_1_0_7_28/EqnImages/P_Eqn_8.png
2004-Nov-15 11:17:38 717 bytes prism/private/wslib/WS/Class_Hazard_US_S_1_0_7_28/EqnImages/P_Eqn_9.png
2004-Nov-15 11:17:14 8 bytes prism/private/wslib/WS/Class_Hazard_US_S_1_0_7_28/images.aux
2004-Nov-15 11:17:14 13186 bytes prism/private/wslib/WS/Class_Hazard_US_S_1_0_7_28/images.log
2004-Nov-15 11:17:34 10127 bytes prism/private/wslib/WS/Class_Hazard_US_S_1_0_7_28/images.pl
2004-Nov-15 11:17:14 12350 bytes prism/private/wslib/WS/Class_Hazard_US_S_1_0_7_28/images.tex
2004-Nov-15 11:17:26 963 bytes prism/private/wslib/WS/Class_Hazard_US_S_1_0_7_28/img1.png
2004-Nov-15 11:17:26 410 bytes prism/private/wslib/WS/Class_Hazard_US_S_1_0_7_28/img10.png
2004-Nov-15 11:17:34 862 bytes prism/private/wslib/WS/Class_Hazard_US_S_1_0_7_28/img11.png
2004-Nov-15 11:17:28 1632 bytes prism/private/wslib/WS/Class_Hazard_US_S_1_0_7_28/img12.png
2004-Nov-15 11:17:30 1094 bytes prism/private/wslib/WS/Class_Hazard_US_S_1_0_7_28/img13.png
2004-Nov-15 11:17:28 605 bytes prism/private/wslib/WS/Class_Hazard_US_S_1_0_7_28/img14.png
2004-Nov-15 11:17:28 1069 bytes prism/private/wslib/WS/Class_Hazard_US_S_1_0_7_28/img15.png
2004-Nov-15 11:17:22 1626 bytes prism/private/wslib/WS/Class_Hazard_US_S_1_0_7_28/img16.png
2004-Nov-15 11:17:32 1838 bytes prism/private/wslib/WS/Class_Hazard_US_S_1_0_7_28/img17.png
2004-Nov-15 11:17:24 1205 bytes prism/private/wslib/WS/Class_Hazard_US_S_1_0_7_28/img18.png
2004-Nov-15 11:17:30 1357 bytes prism/private/wslib/WS/Class_Hazard_US_S_1_0_7_28/img19.png
2004-Nov-15 11:17:24 872 bytes prism/private/wslib/WS/Class_Hazard_US_S_1_0_7_28/img2.png
2004-Nov-15 11:17:24 1308 bytes prism/private/wslib/WS/Class_Hazard_US_S_1_0_7_28/img20.png
2004-Nov-15 11:17:18 933 bytes prism/private/wslib/WS/Class_Hazard_US_S_1_0_7_28/img21.png
2004-Nov-15 11:17:22 651 bytes prism/private/wslib/WS/Class_Hazard_US_S_1_0_7_28/img22.png
2004-Nov-15 11:17:18 678 bytes prism/private/wslib/WS/Class_Hazard_US_S_1_0_7_28/img23.png
2004-Nov-15 11:17:20 1288 bytes prism/private/wslib/WS/Class_Hazard_US_S_1_0_7_28/img24.png
2004-Nov-15 11:17:30 936 bytes prism/private/wslib/WS/Class_Hazard_US_S_1_0_7_28/img25.png
2004-Nov-15 11:17:20 811 bytes prism/private/wslib/WS/Class_Hazard_US_S_1_0_7_28/img26.png
2004-Nov-15 11:17:22 1539 bytes prism/private/wslib/WS/Class_Hazard_US_S_1_0_7_28/img27.png
2004-Nov-15 11:17:16 1563 bytes prism/private/wslib/WS/Class_Hazard_US_S_1_0_7_28/img28.png
2004-Nov-15 11:17:22 1122 bytes prism/private/wslib/WS/Class_Hazard_US_S_1_0_7_28/img29.png
2004-Nov-15 11:17:32 1593 bytes prism/private/wslib/WS/Class_Hazard_US_S_1_0_7_28/img3.png
2004-Nov-15 11:17:26 887 bytes prism/private/wslib/WS/Class_Hazard_US_S_1_0_7_28/img30.png
2004-Nov-15 11:17:18 1142 bytes prism/private/wslib/WS/Class_Hazard_US_S_1_0_7_28/img31.png
2004-Nov-15 11:17:26 1117 bytes prism/private/wslib/WS/Class_Hazard_US_S_1_0_7_28/img32.png
2004-Nov-15 11:17:24 856 bytes prism/private/wslib/WS/Class_Hazard_US_S_1_0_7_28/img33.png
2004-Nov-15 11:17:32 1053 bytes prism/private/wslib/WS/Class_Hazard_US_S_1_0_7_28/img4.png
2004-Nov-15 11:17:16 834 bytes prism/private/wslib/WS/Class_Hazard_US_S_1_0_7_28/img5.png
2004-Nov-15 11:17:20 901 bytes prism/private/wslib/WS/Class_Hazard_US_S_1_0_7_28/img6.png
2004-Nov-15 11:17:28 798 bytes prism/private/wslib/WS/Class_Hazard_US_S_1_0_7_28/img7.png
2004-Nov-15 11:17:18 474 bytes prism/private/wslib/WS/Class_Hazard_US_S_1_0_7_28/img8.png
2004-Nov-15 11:17:32 460 bytes prism/private/wslib/WS/Class_Hazard_US_S_1_0_7_28/img9.png
2004-Nov-15 11:17:34 15350 bytes prism/private/wslib/WS/Class_Hazard_US_S_1_0_7_28/index.html 2004-Nov-15 11:17:34 4260 bytes prism/private/wslib/WS/Class_Hazard_US_S_1_0_7_28/internals.pl
2004-Nov-15 11:17:44 4651 bytes prism/private/wslib/WS/Class_Hazard_US_S_1_0_7_28/labels.pl
2004-Nov-15 11:17:34 2512 bytes prism/private/wslib/WS/Class_Hazard_US_S_1_0_7_28/node1.html
2004-Dec-13 10:28:46 1496 bytes prism/private/wslib/WS/Class_Hazard_US_V_1_0_7_28
2004-Nov-15 11:17:38 245425 bytes prism/private/wslib/WS/Class_Hazard_US_V_1_0_7_28.pm
2004-Nov-15 11:17:38 3046 bytes prism/private/wslib/WS/Class_Hazard_US_V_1_0_7_28.tex
2004-Nov-15 11:17:38 293 bytes prism/private/wslib/WS/Class_Hazard_US_V_1_0_7_28.ws
2004-Nov-15 11:17:58 891 bytes prism/private/wslib/WS/Class_Hazard_US_V_1_0_7_28/Class_Hazard_US_V_1_0_7_28.css
2004-Nov-15 11:17:58 14630 bytes prism/private/wslib/WS/Class_Hazard_US_V_1_0_7_28/Class_Hazard_US_V_1_0_7_28.html
2004-Dec-13 10:28:46 1190 bytes prism/private/wslib/WS/Class_Hazard_US_V_1_0_7_28/EqnImages
2004-Nov-15 11:18:00 774 bytes prism/private/wslib/WS/Class_Hazard_US_V_1_0_7_28/EqnImages/BP_Eqn_0.png
2004-Nov-15 11:18:00 781 bytes prism/private/wslib/WS/Class_Hazard_US_V_1_0_7_28/EqnImages/BP_Eqn_1.png
2004-Nov-15 11:18:00 1261 bytes prism/private/wslib/WS/Class_Hazard_US_V_1_0_7_28/EqnImages/CalcKbp_CalcKb_Eqn_0.png
2004-Nov-15 11:18:00 971 bytes prism/private/wslib/WS/Class_Hazard_US_V_1_0_7_28/EqnImages/CalcKbp_CalcKv_Eqn_0.png
2004-Nov-15 11:18:00 736 bytes prism/private/wslib/WS/Class_Hazard_US_V_1_0_7_28/EqnImages/CalcKbp_CalcKv_Eqn_1.png
2004-Nov-15 11:18:00 793 bytes prism/private/wslib/WS/Class_Hazard_US_V_1_0_7_28/EqnImages/CalcKbp_CalcKv_Eqn_2.png
2004-Nov-15 11:18:00 727 bytes prism/private/wslib/WS/Class_Hazard_US_V_1_0_7_28/EqnImages/CalcKbp_CalcKv_Eqn_3.png
2004-Nov-15 11:18:00 437 bytes prism/private/wslib/WS/Class_Hazard_US_V_1_0_7_28/EqnImages/CalcKbp_Eqn_0.png
2004-Nov-15 11:18:00 374 bytes prism/private/wslib/WS/Class_Hazard_US_V_1_0_7_28/EqnImages/CalcKbp_Eqn_1.png
2004-Nov-15 11:18:00 532 bytes prism/private/wslib/WS/Class_Hazard_US_V_1_0_7_28/EqnImages/Eqn_0.png
2004-Nov-15 11:18:00 953 bytes prism/private/wslib/WS/Class_Hazard_US_V_1_0_7_28/EqnImages/PC_Eqn_0.png
2004-Nov-15 11:18:00 1054 bytes prism/private/wslib/WS/Class_Hazard_US_V_1_0_7_28/EqnImages/PVP_Eqn_0.png
2004-Nov-15 11:18:00 397 bytes prism/private/wslib/WS/Class_Hazard_US_V_1_0_7_28/EqnImages/PVP_Eqn_1.png
2004-Nov-15 11:18:00 1388 bytes prism/private/wslib/WS/Class_Hazard_US_V_1_0_7_28/EqnImages/P_Eqn_0.png
2004-Nov-15 11:18:02 1674 bytes prism/private/wslib/WS/Class_Hazard_US_V_1_0_7_28/EqnImages/P_Eqn_1.png
2004-Nov-15 11:18:02 1055 bytes prism/private/wslib/WS/Class_Hazard_US_V_1_0_7_28/EqnImages/P_Eqn_10.png
2004-Nov-15 11:18:02 1201 bytes prism/private/wslib/WS/Class_Hazard_US_V_1_0_7_28/EqnImages/P_Eqn_11.png
2004-Nov-15 11:18:02 1092 bytes prism/private/wslib/WS/Class_Hazard_US_V_1_0_7_28/EqnImages/P_Eqn_12.png
2004-Nov-15 11:18:02 802 bytes prism/private/wslib/WS/Class_Hazard_US_V_1_0_7_28/EqnImages/P_Eqn_13.png
2004-Nov-15 11:18:02 582 bytes prism/private/wslib/WS/Class_Hazard_US_V_1_0_7_28/EqnImages/P_Eqn_14.png
2004-Nov-15 11:18:02 1092 bytes prism/private/wslib/WS/Class_Hazard_US_V_1_0_7_28/EqnImages/P_Eqn_15.png
2004-Nov-15 11:18:02 616 bytes prism/private/wslib/WS/Class_Hazard_US_V_1_0_7_28/EqnImages/P_Eqn_16.png
2004-Nov-15 11:18:02 1147 bytes prism/private/wslib/WS/Class_Hazard_US_V_1_0_7_28/EqnImages/P_Eqn_17.png
2004-Nov-15 11:18:02 799 bytes prism/private/wslib/WS/Class_Hazard_US_V_1_0_7_28/EqnImages/P_Eqn_18.png
2004-Nov-15 11:18:02 689 bytes prism/private/wslib/WS/Class_Hazard_US_V_1_0_7_28/EqnImages/P_Eqn_19.png
2004-Nov-15 11:18:02 1383 bytes prism/private/wslib/WS/Class_Hazard_US_V_1_0_7_28/EqnImages/P_Eqn_2.png
2004-Nov-15 11:18:02 1399 bytes prism/private/wslib/WS/Class_Hazard_US_V_1_0_7_28/EqnImages/P_Eqn_3.png
2004-Nov-15 11:18:02 959 bytes prism/private/wslib/WS/Class_Hazard_US_V_1_0_7_28/EqnImages/P_Eqn_4.png
2004-Nov-15 11:18:04 821 bytes prism/private/wslib/WS/Class_Hazard_US_V_1_0_7_28/EqnImages/P_Eqn_5.png
2004-Nov-15 11:18:04 959 bytes prism/private/wslib/WS/Class_Hazard_US_V_1_0_7_28/EqnImages/P_Eqn_6.png
2004-Nov-15 11:18:04 986 bytes prism/private/wslib/WS/Class_Hazard_US_V_1_0_7_28/EqnImages/P_Eqn_7.png
2004-Nov-15 11:18:04 951 bytes prism/private/wslib/WS/Class_Hazard_US_V_1_0_7_28/EqnImages/P_Eqn_8.png
2004-Nov-15 11:18:04 717 bytes prism/private/wslib/WS/Class_Hazard_US_V_1_0_7_28/EqnImages/P_Eqn_9.png
2004-Nov-15 11:17:42 8 bytes prism/private/wslib/WS/Class_Hazard_US_V_1_0_7_28/images.aux
2004-Nov-15 11:17:42 13062 bytes prism/private/wslib/WS/Class_Hazard_US_V_1_0_7_28/images.log
2004-Nov-15 11:17:58 9557 bytes prism/private/wslib/WS/Class_Hazard_US_V_1_0_7_28/images.pl
2004-Nov-15 11:17:40 11975 bytes prism/private/wslib/WS/Class_Hazard_US_V_1_0_7_28/images.tex
2004-Nov-15 11:17:52 963 bytes prism/private/wslib/WS/Class_Hazard_US_V_1_0_7_28/img1.png
2004-Nov-15 11:17:42 605 bytes prism/private/wslib/WS/Class_Hazard_US_V_1_0_7_28/img10.png
2004-Nov-15 11:17:48 1069 bytes prism/private/wslib/WS/Class_Hazard_US_V_1_0_7_28/img11.png
2004-Nov-15 11:17:54 1176 bytes prism/private/wslib/WS/Class_Hazard_US_V_1_0_7_28/img12.png
2004-Nov-15 11:17:46 427 bytes prism/private/wslib/WS/Class_Hazard_US_V_1_0_7_28/img13.png
2004-Nov-15 11:17:58 1626 bytes prism/private/wslib/WS/Class_Hazard_US_V_1_0_7_28/img14.png
2004-Nov-15 11:17:52 1838 bytes prism/private/wslib/WS/Class_Hazard_US_V_1_0_7_28/img15.png
2004-Nov-15 11:17:58 1205 bytes prism/private/wslib/WS/Class_Hazard_US_V_1_0_7_28/img16.png
2004-Nov-15 11:17:54 1357 bytes prism/private/wslib/WS/Class_Hazard_US_V_1_0_7_28/img17.png
2004-Nov-15 11:17:48 1308 bytes prism/private/wslib/WS/Class_Hazard_US_V_1_0_7_28/img18.png
2004-Nov-15 11:17:54 933 bytes prism/private/wslib/WS/Class_Hazard_US_V_1_0_7_28/img19.png
2004-Nov-15 11:17:46 872 bytes prism/private/wslib/WS/Class_Hazard_US_V_1_0_7_28/img2.png
2004-Nov-15 11:17:56 651 bytes prism/private/wslib/WS/Class_Hazard_US_V_1_0_7_28/img20.png
2004-Nov-15 11:17:58 678 bytes prism/private/wslib/WS/Class_Hazard_US_V_1_0_7_28/img21.png 2004-Nov-15 11:17:50 1288 bytes prism/private/wslib/WS/Class_Hazard_US_V_1_0_7_28/img22.png
2004-Nov-15 11:17:56 936 bytes prism/private/wslib/WS/Class_Hazard_US_V_1_0_7_28/img23.png
2004-Nov-15 11:17:50 811 bytes prism/private/wslib/WS/Class_Hazard_US_V_1_0_7_28/img24.png
2004-Nov-15 11:17:44 1539 bytes prism/private/wslib/WS/Class_Hazard_US_V_1_0_7_28/img25.png
2004-Nov-15 11:17:48 1563 bytes prism/private/wslib/WS/Class_Hazard_US_V_1_0_7_28/img26.png
2004-Nov-15 11:17:46 1122 bytes prism/private/wslib/WS/Class_Hazard_US_V_1_0_7_28/img27.png
2004-Nov-15 11:17:44 887 bytes prism/private/wslib/WS/Class_Hazard_US_V_1_0_7_28/img28.png
2004-Nov-15 11:17:56 1142 bytes prism/private/wslib/WS/Class_Hazard_US_V_1_0_7_28/img29.png
2004-Nov-15 11:17:44 1593 bytes prism/private/wslib/WS/Class_Hazard_US_V_1_0_7_28/img3.png
2004-Nov-15 11:17:46 1117 bytes prism/private/wslib/WS/Class_Hazard_US_V_1_0_7_28/img30.png
2004-Nov-15 11:17:48 856 bytes prism/private/wslib/WS/Class_Hazard_US_V_1_0_7_28/img31.png
2004-Nov-15 11:17:52 1053 bytes prism/private/wslib/WS/Class_Hazard_US_V_1_0_7_28/img4.png
2004-Nov-15 11:17:54 834 bytes prism/private/wslib/WS/Class_Hazard_US_V_1_0_7_28/img5.png
2004-Nov-15 11:17:52 901 bytes prism/private/wslib/WS/Class_Hazard_US_V_1_0_7_28/img6.png
2004-Nov-15 11:17:50 798 bytes prism/private/wslib/WS/Class_Hazard_US_V_1_0_7_28/img7.png
2004-Nov-15 11:17:56 474 bytes prism/private/wslib/WS/Class_Hazard_US_V_1_0_7_28/img8.png
2004-Nov-15 11:17:58 460 bytes prism/private/wslib/WS/Class_Hazard_US_V_1_0_7_28/img9.png
2004-Nov-15 11:17:58 14630 bytes prism/private/wslib/WS/Class_Hazard_US_V_1_0_7_28/index.html
2004-Nov-15 11:17:58 4012 bytes prism/private/wslib/WS/Class_Hazard_US_V_1_0_7_28/internals.pl
2004-Nov-15 11:18:14 4385 bytes prism/private/wslib/WS/Class_Hazard_US_V_1_0_7_28/labels.pl
2004-Nov-15 11:17:58 2512 bytes prism/private/wslib/WS/Class_Hazard_US_V_1_0_7_28/node1.html
2004-Dec-13 10:28:46 272 bytes prism/private/wslib/WS/Class_PhaseType_PH_1_0_7_28
2004-Nov-15 11:18:04 12528 bytes prism/private/wslib/WS/Class_PhaseType_PH_1_0_7_28.pm
2004-Nov-15 11:18:04 81 bytes prism/private/wslib/WS/Class_PhaseType_PH_1_0_7_28.tex
2004-Nov-15 11:18:04 292 bytes prism/private/wslib/WS/Class_PhaseType_PH_1_0_7_28.ws
2004-Nov-15 11:18:06 891 bytes prism/private/wslib/WS/Class_PhaseType_PH_1_0_7_28/Class_PhaseType_PH_1_0_7_28.css
2004-Nov-15 11:18:06 1678 bytes prism/private/wslib/WS/Class_PhaseType_PH_1_0_7_28/Class_PhaseType_PH_1_0_7_28.html
2004-Dec-13 10:28:46 68 bytes prism/private/wslib/WS/Class_PhaseType_PH_1_0_7_28/EqnImages
2004-Nov-15 11:18:06 1678 bytes prism/private/wslib/WS/Class_PhaseType_PH_1_0_7_28/index.html
2004-Nov-15 11:18:14 168 bytes prism/private/wslib/WS/Class_PhaseType_PH_1_0_7_28/labels.pl
2004-Nov-15 11:18:06 2523 bytes prism/private/wslib/WS/Class_PhaseType_PH_1_0_7_28/node1.html
2004-Dec-13 10:28:46 272 bytes prism/private/wslib/WS/Class_PhaseType_PT_1_0_7_28
2004-Nov-15 11:18:06 12528 bytes prism/private/wslib/WS/Class_PhaseType_PT_1_0_7_28.pm
2004-Nov-15 11:18:06 81 bytes prism/private/wslib/WS/Class_PhaseType_PT_1_0_7_28.tex
2004-Nov-15 11:18:06 295 bytes prism/private/wslib/WS/Class_PhaseType_PT_1_0_7_28.ws
2004-Nov-15 11:18:08 891 bytes prism/private/wslib/WS/Class_PhaseType_PT_1_0_7_28/Class_PhaseType_PT_1_0_7_28.css
2004-Nov-15 11:18:08 1678 bytes prism/private/wslib/WS/Class_PhaseType_PT_1_0_7_28/Class_PhaseType_PT_1_0_7_28.html
2004-Dec-13 10:28:46 68 bytes prism/private/wslib/WS/Class_PhaseType_PT_1_0_7_28/EqnImages
2004-Nov-15 11:18:08 1678 bytes prism/private/wslib/WS/Class_PhaseType_PT_1_0_7_28/index.html
2004-Nov-15 11:18:14 168 bytes prism/private/wslib/WS/Class_PhaseType_PT_1_0_7_28/labels.pl
2004-Nov-15 11:18:08 2523 bytes prism/private/wslib/WS/Class_PhaseType_PT_1_0_7_28/node1.html
2004-Dec-13 10:28:46 272 bytes prism/private/wslib/WS/Class_PhaseType_X_1_0_7_28
2004-Nov-15 11:18:08 14058 bytes prism/private/wslib/WS/Class_PhaseType_X_1_0_7_28.pm
2004-Nov-15 11:18:08 81 bytes prism/private/wslib/WS/Class_PhaseType_X_1_0_7_28.tex
2004-Nov-15 11:18:08 285 bytes prism/private/wslib/WS/Class_PhaseType_X_1_0_7_28.ws
2004-Nov-15 11:18:10 891 bytes prism/private/wslib/WS/Class_PhaseType_X_1_0_7_28/Class_PhaseType_X_1_0_7_28.css
2004-Nov-15 11:18:10 1674 bytes prism/private/wslib/WS/Class_PhaseType_X_1_0_7_28/Class_PhaseType_X_1_0_7_28.html
2004-Dec-13 10:28:46 68 bytes prism/private/wslib/WS/Class_PhaseType_X_1_0_7_28/EqnImages
2004-Nov-15 11:18:10 1674 bytes prism/private/wslib/WS/Class_PhaseType_X_1_0_7_28/index.html
2004-Nov-15 11:18:14 168 bytes prism/private/wslib/WS/Class_PhaseType_X_1_0_7_28/labels.pl
2004-Nov-15 11:18:10 2512 bytes prism/private/wslib/WS/Class_PhaseType_X_1_0_7_28/node1.html
2004-Dec-13 10:28:46 272 bytes prism/private/wslib/WS/Class_PipeLoss_PL_2_1_0_7_28
2004-Nov-15 11:18:10 29572 bytes prism/private/wslib/WS/Class_PipeLoss_PL_2_1_0_7_28.pm
2004-Nov-15 11:18:10 81 bytes prism/private/wslib/WS/Class_PipeLoss_PL_2_1_0_7_28.tex
2004-Nov-15 11:18:10 298 bytes prism/private/wslib/WS/Class_PipeLoss_PL_2_1_0_7_28.ws
2004-Nov-15 11:18:12 891 bytes prism/private/wslib/WS/Class_PipeLoss_PL_2_1_0_7_28/Class_PipeLoss_PL_2_1_0_7_28.css
2004-Nov-15 11:18:12 1682 bytes prism/private/wslib/WS/Class_PipeLoss_PL_2_1_0_7_28/Class_PipeLoss_PL_2_1_0_7_28.html
2004-Dec-13 10:28:46 68 bytes prism/private/wslib/WS/Class_PipeLoss_PL_2_1_0_7_28/EqnImages
2004-Nov-15 11:18:12 1682 bytes prism/private/wslib/WS/Class_PipeLoss_PL_2_1_0_7_28/index.html
2004-Nov-15 11:18:14 168 bytes prism/private/wslib/WS/Class_PipeLoss_PL_2_1_0_7_28/labels.pl
2004-Nov-15 11:18:12 2534 bytes prism/private/wslib/WS/Class_PipeLoss_PL_2_1_0_7_28/node1.html 2004-Dec-13 10:28:46 272 bytes prism/private/wslib/WS/Class_PipeLoss_PL_2_RD_1_0_7_28
2004-Nov-15 11:18:12 28917 bytes prism/private/wslib/WS/Class_PipeLoss_PL_2_RD_1_0_7_28.pm
2004-Nov-15 11:18:12 81 bytes prism/private/wslib/WS/Class_PipeLoss_PL_2_RD_1_0_7_28.tex
2004-Nov-15 11:18:12 326 bytes prism/private/wslib/WS/Class_PipeLoss_PL_2_RD_1_0_7_28.ws
2004-Nov-15 11:18:14 891 bytes prism/private/wslib/WS/Class_PipeLoss_PL_2_RD_1_0_7_28/Class_PipeLoss_PL_2_RD_1_0_7_28.css
2004-Nov-15 11:18:14 1694 bytes prism/private/wslib/WS/Class_PipeLoss_PL_2_RD_1_0_7_28/Class_PipeLoss_PL_2_RD_1_0_7_28.html
2004-Dec-13 10:28:46 68 bytes prism/private/wslib/WS/Class_PipeLoss_PL_2_RD_1_0_7_28/EqnImages
2004-Nov-15 11:18:14 1694 bytes prism/private/wslib/WS/Class_PipeLoss_PL_2_RD_1_0_7_28/index.html
2004-Nov-15 11:18:14 168 bytes prism/private/wslib/WS/Class_PipeLoss_PL_2_RD_1_0_7_28/labels.pl
2004-Nov-15 11:18:14 2567 bytes prism/private/wslib/WS/Class_PipeLoss_PL_2_RD_1_0_7_28/node1.html
2004-Dec-13 10:28:47 1156 bytes prism/private/wslib/WS/Class_PipeLoss_PL_L_1_0_7_28
2004-Nov-15 11:18:14 284411 bytes prism/private/wslib/WS/Class_PipeLoss_PL_L_1_0_7_28.pm
2004-Nov-15 11:18:14 2308 bytes prism/private/wslib/WS/Class_PipeLoss_PL_L_1_0_7_28.tex
2004-Nov-15 11:18:14 297 bytes prism/private/wslib/WS/Class_PipeLoss_PL_L_1_0_7_28.ws
2004-Nov-15 11:18:28 891 bytes prism/private/wslib/WS/Class_PipeLoss_PL_L_1_0_7_28/Class_PipeLoss_PL_L_1_0_7_28.css
2004-Nov-15 11:18:28 11856 bytes prism/private/wslib/WS/Class_PipeLoss_PL_L_1_0_7_28/Class_PipeLoss_PL_L_1_0_7_28.html
2004-Dec-13 10:28:46 986 bytes prism/private/wslib/WS/Class_PipeLoss_PL_L_1_0_7_28/EqnImages
2004-Nov-15 11:18:28 826 bytes prism/private/wslib/WS/Class_PipeLoss_PL_L_1_0_7_28/EqnImages/LiquidKbp_CalcKw_Eqn_0.png
2004-Nov-15 11:18:28 975 bytes prism/private/wslib/WS/Class_PipeLoss_PL_L_1_0_7_28/EqnImages/LiquidKbp_CalcKw_Eqn_1.png
2004-Nov-15 11:18:28 736 bytes prism/private/wslib/WS/Class_PipeLoss_PL_L_1_0_7_28/EqnImages/LiquidKbp_CalcKw_Eqn_2.png
2004-Nov-15 11:18:28 420 bytes prism/private/wslib/WS/Class_PipeLoss_PL_L_1_0_7_28/EqnImages/LiquidKbp_Eqn_0.png
2004-Nov-15 11:18:28 420 bytes prism/private/wslib/WS/Class_PipeLoss_PL_L_1_0_7_28/EqnImages/LiquidKbp_Eqn_1.png
2004-Nov-15 11:18:28 390 bytes prism/private/wslib/WS/Class_PipeLoss_PL_L_1_0_7_28/EqnImages/LiquidKbp_Eqn_2.png
2004-Nov-15 11:18:30 829 bytes prism/private/wslib/WS/Class_PipeLoss_PL_L_1_0_7_28/EqnImages/MRC_BP_Eqn_0.png
2004-Nov-15 11:18:30 781 bytes prism/private/wslib/WS/Class_PipeLoss_PL_L_1_0_7_28/EqnImages/MRC_BP_Eqn_1.png
2004-Nov-15 11:18:30 957 bytes
prism/private/wslib/WS/Class_PipeLoss_PL_L_1_0_7_28/EqnImages/MRC_LiquidKbp_CalcKw_Eqn_0.png
2004-Nov-15 11:18:30 975 bytes
prism/private/wslib/WS/Class_PipeLoss_PL_L_1_0_7_28/EqnImages/MRC_LiquidKbp_CalcKw_Eqn_1.png
2004-Nov-15 11:18:30 736 bytes
prism/private/wslib/WS/Class_PipeLoss_PL_L_1_0_7_28/EqnImages/MRC_LiquidKbp_CalcKw_Eqn_2.png
2004-Nov-15 11:18:30 420 bytes prism/private/wslib/WS/Class_PipeLoss_PL_L_1_0_7_28/EqnImages/MRC_LiquidKbp_Eqn_0.png
2004-Nov-15 11:18:30 420 bytes prism/private/wslib/WS/Class_PipeLoss_PL_L_1_0_7_28/EqnImages/MRC_LiquidKbp_Eqn_1.png
2004-Nov-15 11:18:30 390 bytes prism/private/wslib/WS/Class_PipeLoss_PL_L_1_0_7_28/EqnImages/MRC_LiquidKbp_Eqn_2.png
2004-Nov-15 11:18:30 773 bytes prism/private/wslib/WS/Class_PipeLoss_PL_L_1_0_7_28/EqnImages/MRC_PD_Eqn_0.png
2004-Nov-15 11:18:30 712 bytes prism/private/wslib/WS/Class_PipeLoss_PL_L_1_0_7_28/EqnImages/PD_Eqn_0.png
2004-Nov-15 11:18:30 580 bytes prism/private/wslib/WS/Class_PipeLoss_PL_L_1_0_7_28/EqnImages/PLInit_P_Eqn_0.png
2004-Nov-15 11:18:30 800 bytes prism/private/wslib/WS/Class_PipeLoss_PL_L_1_0_7_28/EqnImages/PLInit_P_Eqn_1.png
2004-Nov-15 11:18:30 689 bytes prism/private/wslib/WS/Class_PipeLoss_PL_L_1_0_7_28/EqnImages/PLInit_P_Eqn_10.png
2004-Nov-15 11:18:30 1055 bytes prism/private/wslib/WS/Class_PipeLoss_PL_L_1_0_7_28/EqnImages/PLInit_P_Eqn_2.png
2004-Nov-15 11:18:30 1201 bytes prism/private/wslib/WS/Class_PipeLoss_PL_L_1_0_7_28/EqnImages/PLInit_P_Eqn_3.png
2004-Nov-15 11:18:32 1149 bytes prism/private/wslib/WS/Class_PipeLoss_PL_L_1_0_7_28/EqnImages/PLInit_P_Eqn_4.png
2004-Nov-15 11:18:32 802 bytes prism/private/wslib/WS/Class_PipeLoss_PL_L_1_0_7_28/EqnImages/PLInit_P_Eqn_5.png
2004-Nov-15 11:18:32 582 bytes prism/private/wslib/WS/Class_PipeLoss_PL_L_1_0_7_28/EqnImages/PLInit_P_Eqn_6.png
2004-Nov-15 11:18:32 1330 bytes prism/private/wslib/WS/Class_PipeLoss_PL_L_1_0_7_28/EqnImages/PLInit_P_Eqn_7.png
2004-Nov-15 11:18:32 588 bytes prism/private/wslib/WS/Class_PipeLoss_PL_L_1_0_7_28/EqnImages/PLInit_P_Eqn_8.png
2004-Nov-15 11:18:32 899 bytes prism/private/wslib/WS/Class_PipeLoss_PL_L_1_0_7_28/EqnImages/PLInit_P_Eqn_9.png
2004-Nov-15 11:18:16 8 bytes prism/private/wslib/WS/Class_PipeLoss_PL_L_1_0_7_28/images.aux
2004-Nov-15 11:18:16 10812 bytes prism/private/wslib/WS/Class_PipeLoss_PL_L_1_0_7_28/images.log
2004-Nov-15 11:18:28 6273 bytes prism/private/wslib/WS/Class_PipeLoss_PL_L_1_0_7_28/images.pl
2004-Nov-15 11:18:16 9817 bytes prism/private/wslib/WS/Class_PipeLoss_PL_L_1_0_7_28/images.tex
2004-Nov-15 11:18:22 941 bytes prism/private/wslib/WS/Class_PipeLoss_PL_L_1_0_7_28/img1.png
2004-Nov-15 11:18:26 787 bytes prism/private/wslib/WS/Class_PipeLoss_PL_L_1_0_7_28/img10.png
2004-Nov-15 11:18:24 664 bytes prism/private/wslib/WS/Class_PipeLoss_PL_L_1_0_7_28/img11.png
2004-Nov-15 11:18:24 890 bytes prism/private/wslib/WS/Class_PipeLoss_PL_L_1_0_7_28/img12.png
2004-Nov-15 11:18:20 811 bytes prism/private/wslib/WS/Class_PipeLoss_PL_L_1_0_7_28/img13.png
2004-Nov-15 11:18:22 1205 bytes prism/private/wslib/WS/Class_PipeLoss_PL_L_1_0_7_28/img14.png
2004-Nov-15 11:18:26 1357 bytes prism/private/wslib/WS/Class_PipeLoss_PL_L_1_0_7_28/img15.png
2004-Nov-15 11:18:22 1299 bytes prism/private/wslib/WS/Class_PipeLoss_PL_L_1_0_7_28/img16.png
2004-Nov-15 11:18:28 933 bytes prism/private/wslib/WS/Class_PipeLoss_PL_L_1_0_7_28/img17.png
2004-Nov-15 11:18:26 651 bytes prism/private/wslib/WS/Class_PipeLoss_PL_L_1_0_7_28/img18.png 2004-Nov-15 11:18:20 1596 bytes prism/private/wslib/WS/Class_PipeLoss_PL_L_1_0_7_28/img19.png
2004-Nov-15 11:18:18 1099 bytes prism/private/wslib/WS/Class_PipeLoss_PL_L_1_0_7_28/img2.png
2004-Nov-15 11:18:24 656 bytes prism/private/wslib/WS/Class_PipeLoss_PL_L_1_0_7_28/img20.png
2004-Nov-15 11:18:28 1037 bytes prism/private/wslib/WS/Class_PipeLoss_PL_L_1_0_7_28/img21.png
2004-Nov-15 11:18:18 834 bytes prism/private/wslib/WS/Class_PipeLoss_PL_L_1_0_7_28/img3.png
2004-Nov-15 11:18:18 467 bytes prism/private/wslib/WS/Class_PipeLoss_PL_L_1_0_7_28/img4.png
2004-Nov-15 11:18:18 467 bytes prism/private/wslib/WS/Class_PipeLoss_PL_L_1_0_7_28/img5.png
2004-Nov-15 11:18:20 1029 bytes prism/private/wslib/WS/Class_PipeLoss_PL_L_1_0_7_28/img6.png
2004-Nov-15 11:18:26 872 bytes prism/private/wslib/WS/Class_PipeLoss_PL_L_1_0_7_28/img7.png
2004-Nov-15 11:18:24 1117 bytes prism/private/wslib/WS/Class_PipeLoss_PL_L_1_0_7_28/img8.png
2004-Nov-15 11:18:22 874 bytes prism/private/wslib/WS/Class_PipeLoss_PL_L_1_0_7_28/img9.png
2004-Nov-15 11:18:28 11856 bytes prism/private/wslib/WS/Class_PipeLoss_PL_L_1_0_7_28/index.html
2004-Nov-15 11:18:28 3534 bytes prism/private/wslib/WS/Class_PipeLoss_PL_L_1_0_7_28/internals.pl
2004-Nov-15 11:18:44 3853 bytes prism/private/wslib/WS/Class_PipeLoss_PL_L_1_0_7_28/labels.pl
2004-Nov-15 11:18:28 2534 bytes prism/private/wslib/WS/Class_PipeLoss_PL_L_1_0_7_28/node1.html
2004-Dec-13 10:28:47 782 bytes prism/private/wslib/WS/Class_PipeLoss_PL_L_RD_1_0_7_28
2004-Nov-15 11:18:32 194039 bytes prism/private/wslib/WS/Class_PipeLoss_PL_L_RD_1_0_7_28.pm
2004-Nov-15 11:18:32 987 bytes prism/private/wslib/WS/Class_PipeLoss_PL_L_RD_1_0_7_28.tex
2004-Nov-15 11:18:32 325 bytes prism/private/wslib/WS/Class_PipeLoss_PL_L_RD_1_0_7_28.ws
2004-Nov-15 11:18:40 891 bytes prism/private/wslib/WS/Class_PipeLoss_PL_L_RD_1_0_7_28/Class_PipeLoss_PL_L_RD_1_0_7_28.css
2004-Nov-15 11:18:40 5425 bytes prism/private/wslib/WS/Class_PipeLoss_PL_L_RD_1_0_7_28/Class_PipeLoss_PL_L_RD_1_0_7_28.html
2004-Dec-13 10:28:47 408 bytes prism/private/wslib/WS/Class_PipeLoss_PL_L_RD_1_0_7_28/EqnImages
2004-Nov-15 11:18:40 580 bytes prism/private/wslib/WS/Class_PipeLoss_PL_L_RD_1_0_7_28/EqnImages/PLInit_P_Eqn_0.png
2004-Nov-15 11:18:40 1055 bytes prism/private/wslib/WS/Class_PipeLoss_PL_L_RD_1_0_7_28/EqnImages/PLInit_P_Eqn_1.png
2004-Nov-15 11:18:40 1201 bytes prism/private/wslib/WS/Class_PipeLoss_PL_L_RD_1_0_7_28/EqnImages/PLInit_P_Eqn_2.png
2004-Nov-15 11:18:42 1149 bytes prism/private/wslib/WS/Class_PipeLoss_PL_L_RD_1_0_7_28/EqnImages/PLInit_P_Eqn_3.png
2004-Nov-15 11:18:42 802 bytes prism/private/wslib/WS/Class_PipeLoss_PL_L_RD_1_0_7_28/EqnImages/PLInit_P_Eqn_4.png
2004-Nov-15 11:18:42 582 bytes prism/private/wslib/WS/Class_PipeLoss_PL_L_RD_1_0_7_28/EqnImages/PLInit_P_Eqn_5.png
2004-Nov-15 11:18:42 1330 bytes prism/private/wslib/WS/Class_PipeLoss_PL_L_RD_1_0_7_28/EqnImages/PLInit_P_Eqn_6.png
2004-Nov-15 11:18:42 588 bytes prism/private/wslib/WS/Class_PipeLoss_PL_L_RD_1_0_7_28/EqnImages/PLInit_P_Eqn_7.png
2004-Nov-15 11:18:42 899 bytes prism/private/wslib/WS/Class_PipeLoss_PL_L_RD_1_0_7_28/EqnImages/PLInit_P_Eqn_8.png
2004-Nov-15 11:18:42 689 bytes prism/private/wslib/WS/Class_PipeLoss_PL_L_RD_1_0_7_28/EqnImages/PLInit_P_Eqn_9.png
2004-Nov-15 11:18:34 8 bytes prism/private/wslib/WS/Class_PipeLoss_PL_L_RD_1_0_7_28/images.aux
2004-Nov-15 11:18:34 10161 bytes prism/private/wslib/WS/Class_PipeLoss_PL_L_RD_1_0_7_28/images.log
2004-Nov-15 11:18:40 3083 bytes prism/private/wslib/WS/Class_PipeLoss_PL_L_RD_1_0_7_28/images.pl
2004-Nov-15 11:18:34 7772 bytes prism/private/wslib/WS/Class_PipeLoss_PL_L_RD_1_0_7_28/images.tex
2004-Nov-15 11:18:36 664 bytes prism/private/wslib/WS/Class_PipeLoss_PL_L_RD_1_0_7_28/img1.png
2004-Nov-15 11:18:40 811 bytes prism/private/wslib/WS/Class_PipeLoss_PL_L_RD_1_0_7_28/img10.png
2004-Nov-15 11:18:36 1205 bytes prism/private/wslib/WS/Class_PipeLoss_PL_L_RD_1_0_7_28/img2.png
2004-Nov-15 11:18:40 1357 bytes prism/private/wslib/WS/Class_PipeLoss_PL_L_RD_1_0_7_28/img3.png
2004-Nov-15 11:18:38 1299 bytes prism/private/wslib/WS/Class_PipeLoss_PL_L_RD_1_0_7_28/img4.png
2004-Nov-15 11:18:38 933 bytes prism/private/wslib/WS/Class_PipeLoss_PL_L_RD_1_0_7_28/img5.png
2004-Nov-15 11:18:38 651 bytes prism/private/wslib/WS/Class_PipeLoss_PL_L_RD_1_0_7_28/img6.png
2004-Nov-15 11:18:40 1596 bytes prism/private/wslib/WS/Class_PipeLoss_PL_L_RD_1_0_7_28/img7.png
2004-Nov-15 11:18:38 656 bytes prism/private/wslib/WS/Class_PipeLoss_PL_L_RD_1_0_7_28/img8.png
2004-Nov-15 11:18:36 1037 bytes prism/private/wslib/WS/Class_PipeLoss_PL_L_RD_1_0_7_28/img9.png
2004-Nov-15 11:18:40 5425 bytes prism/private/wslib/WS/Class_PipeLoss_PL_L_RD_1_0_7_28/index.html
2004-Nov-15 11:18:40 1372 bytes prism/private/wslib/WS/Class_PipeLoss_PL_L_RD_1_0_7_28/internals.pl
2004-Nov-15 11:18:44 1538 bytes prism/private/wslib/WS/Class_PipeLoss_PL_L_RD_1_0_7_28/labels.pl
2004-Nov-15 11:18:40 2567 bytes prism/private/wslib/WS/Class_PipeLoss_PL_L_RD_1_0_7_28/node1.html
2004-Dec-13 10:28:47 1530 bytes prism/private/wslib/WS/Class_PipeLoss_PL_S_1_0_7_28
2004-Nov-15 11:18:42 345938 bytes prism/private/wslib/WS/Class_PipeLoss_PL_S_1_0_7_28.pm
2004-Nov-15 11:18:42 2823 bytes prism/private/wslib/WS/Class_PipeLoss_PL_S_1_0_7_28.tex
2004-Nov-15 11:18:42 296 bytes prism/private/wslib/WS/Class_PipeLoss_PL_S_1_0_7_28.ws
2004-Nov-15 11:19:04 891 bytes prism/private/wslib/WS/Class_PipeLoss_PL_S_1_0_7_28/Class_PipeLoss_PL_S_1_0_7_28.css
2004-Nov-15 11:19:04 14027 bytes prism/private/wslib/WS/Class_PipeLoss_PL_S_1_0_7_28/Class_PipeLoss_PL_S_1_0_7_28.html
2004-Dec-13 10:28:47 1190 bytes prism/private/wslib/WS/Class_PipeLoss_PL_S_1_0_7_28/EqnImages
2004-Nov-15 11:19:04 615 bytes prism/private/wslib/WS/Class_PipeLoss_PL_S_1_0_7_28/EqnImages/MRC_CF_Eqn_0.png
2004-Nov-15 11:19:04 827 bytes prism/private/wslib/WS/Class_PipeLoss_PL_S_1_0_7_28/EqnImages/MRC_CF_Eqn_1.png
2004-Nov-15 11:19:04 1190 bytes prism/private/wslib/WS/Class_PipeLoss_PL_S_1_0_7_28/EqnImages/MRC_CF_Eqn_10.png
2004-Nov-15 11:19:04 248 bytes prism/private/wslib/WS/Class_PipeLoss_PL_S_1_0_7_28/EqnImages/MRC_CF_Eqn_2.png 2004-Nov-15 11:19:04 839 bytes prism/private/wslib/WS/Class_PipeLoss_PL_S_1_0_7_28/EqnImages/MRC_CF_Eqn_3.png
2004-Nov-15 11:19:06 428 bytes prism/private/wslib/WS/Class_PipeLoss_PL_S_1_0_7_28/EqnImages/MRC_CF_Eqn_4.png
2004-Nov-15 11:19:06 704 bytes prism/private/wslib/WS/Class_PipeLoss_PL_S_1_0_7_28/EqnImages/MRC_CF_Eqn_5.png
2004-Nov-15 11:19:06 468 bytes prism/private/wslib/WS/Class_PipeLoss_PL_S_1_0_7_28/EqnImages/MRC_CF_Eqn_6.png
2004-Nov-15 11:19:06 211 bytes prism/private/wslib/WS/Class_PipeLoss_PL_S_1_0_7_28/EqnImages/MRC_CF_Eqn_7.png
2004-Nov-15 11:19:06 923 bytes prism/private/wslib/WS/Class_PipeLoss_PL_S_1_0_7_28/EqnImages/MRC_CF_Eqn_8.png
2004-Nov-15 11:19:06 248 bytes prism/private/wslib/WS/Class_PipeLoss_PL_S_1_0_7_28/EqnImages/MRC_CF_Eqn_9.png
2004-Nov-15 11:19:06 378 bytes prism/private/wslib/WS/Class_PipeLoss_PL_S_1_0_7_28/EqnImages/MRC_CalcKn_Eqn_0.png
2004-Nov-15 11:19:06 777 bytes prism/private/wslib/WS/Class_PipeLoss_PL_S_1_0_7_28/EqnImages/MRC_CalcKn_Eqn_1.png
2004-Nov-15 11:19:06 1395 bytes prism/private/wslib/WS/Class_PipeLoss_PL_S_1_0_7_28/EqnImages/MRC_CalcKn_Eqn_2.png
2004-Nov-15 11:19:06 960 bytes prism/private/wslib/WS/Class_PipeLoss_PL_S_1_0_7_28/EqnImages/MRC_CalcKn_Eqn_3.png
2004-Nov-15 11:19:06 1436 bytes
prism/private/wslib/WS/Class_PipeLoss_PL_S_1_0_7_28/EqnImages/MRC_VaporKbp_CalcKb_Eqn_0.png
2004-Nov-15 11:19:06 971 bytes
prism/private/wslib/WS/Class_PipeLoss_PL_S_1_0_7_28/EqnImages/MRC_VaporKbp_CalcKv_Eqn_0.png
2004-Nov-15 11:19:06 736 bytes
prism/private/wslib/WS/Class_PipeLoss_PL_S_1_0_7_28/EqnImages/MRC_VaporKbp_CalcKv_Eqn_1.png
2004-Nov-15 11:19:06 764 bytes
prism/private/wslib/WS/Class_PipeLoss_PL_S_1_0_7_28/EqnImages/MRC_VaporKbp_CalcKv_Eqn_2.png
2004-Nov-15 11:19:06 727 bytes
prism/private/wslib/WS/Class_PipeLoss_PL_S_1_0_7_28/EqnImages/MRC_VaporKbp_CalcKv_Eqn_3.png
2004-Nov-15 11:19:08 437 bytes prism/private/wslib/WS/Class_PipeLoss_PL_S_1_0_7_28/EqnImages/MRC_VaporKbp_Eqn_0.png
2004-Nov-15 11:19:08 374 bytes prism/private/wslib/WS/Class_PipeLoss_PL_S_1_0_7_28/EqnImages/MRC_VaporKbp_Eqn_1.png
2004-Nov-15 11:19:08 580 bytes prism/private/wslib/WS/Class_PipeLoss_PL_S_1_0_7_28/EqnImages/PLInit_P_Eqn_0.png
2004-Nov-15 11:19:08 800 bytes prism/private/wslib/WS/Class_PipeLoss_PL_S_1_0_7_28/EqnImages/PLInit_P_Eqn_1.png
2004-Nov-15 11:19:08 689 bytes prism/private/wslib/WS/Class_PipeLoss_PL_S_1_0_7_28/EqnImages/PLInit_P_Eqn_10.png
2004-Nov-15 11:19:08 1055 bytes prism/private/wslib/WS/Class_PipeLoss_PL_S_1_0_7_28/EqnImages/PLInit_P_Eqn_2.png
2004-Nov-15 11:19:08 1201 bytes prism/private/wslib/WS/Class_PipeLoss_PL_S_1_0_7_28/EqnImages/PLInit_P_Eqn_3.png
2004-Nov-15 11:19:08 1149 bytes prism/private/wslib/WS/Class_PipeLoss_PL_S_1_0_7_28/EqnImages/PLInit_P_Eqn_4.png
2004-Nov-15 11:19:08 802 bytes prism/private/wslib/WS/Class_PipeLoss_PL_S_1_0_7_28/EqnImages/PLInit_P_Eqn_5.png
2004-Nov-15 11:19:08 582 bytes prism/private/wslib/WS/Class_PipeLoss_PL_S_1_0_7_28/EqnImages/PLInit_P_Eqn_6.png
2004-Nov-15 11:19:08 1330 bytes prism/private/wslib/WS/Class_PipeLoss_PL_S_1_0_7_28/EqnImages/PLInit_P_Eqn_7.png
2004-Nov-15 11:19:08 588 bytes prism/private/wslib/WS/Class_PipeLoss_PL_S_1_0_7_28/EqnImages/PLInit_P_Eqn_8.png
2004-Nov-15 11:19:08 899 bytes prism/private/wslib/WS/Class_PipeLoss_PL_S_1_0_7_28/EqnImages/PLInit_P_Eqn_9.png
2004-Nov-15 11:18:46 8 bytes prism/private/wslib/WS/Class_PipeLoss_PL_S_1_0_7_28/images.aux
2004-Nov-15 11:18:46 12612 bytes prism/private/wslib/WS/Class_PipeLoss_PL_S_1_0_7_28/images.log
2004-Nov-15 11:19:04 9275 bytes prism/private/wslib/WS/Class_PipeLoss_PL_S_1_0_7_28/images.pl
2004-Nov-15 11:18:46 11805 bytes prism/private/wslib/WS/Class_PipeLoss_PL_S_1_0_7_28/images.tex
2004-Nov-15 11:18:50 695 bytes prism/private/wslib/WS/Class_PipeLoss_PL_S_1_0_7_28/img1.png
2004-Nov-15 11:18:58 1017 bytes prism/private/wslib/WS/Class_PipeLoss_PL_S_1_0_7_28/img10.png
2004-Nov-15 11:19:00 410 bytes prism/private/wslib/WS/Class_PipeLoss_PL_S_1_0_7_28/img11.png
2004-Nov-15 11:19:02 862 bytes prism/private/wslib/WS/Class_PipeLoss_PL_S_1_0_7_28/img12.png
2004-Nov-15 11:18:54 1632 bytes prism/private/wslib/WS/Class_PipeLoss_PL_S_1_0_7_28/img13.png
2004-Nov-15 11:18:54 1094 bytes prism/private/wslib/WS/Class_PipeLoss_PL_S_1_0_7_28/img14.png
2004-Nov-15 11:19:04 1657 bytes prism/private/wslib/WS/Class_PipeLoss_PL_S_1_0_7_28/img15.png
2004-Nov-15 11:18:58 1053 bytes prism/private/wslib/WS/Class_PipeLoss_PL_S_1_0_7_28/img16.png
2004-Nov-15 11:18:56 834 bytes prism/private/wslib/WS/Class_PipeLoss_PL_S_1_0_7_28/img17.png
2004-Nov-15 11:18:54 864 bytes prism/private/wslib/WS/Class_PipeLoss_PL_S_1_0_7_28/img18.png
2004-Nov-15 11:18:56 798 bytes prism/private/wslib/WS/Class_PipeLoss_PL_S_1_0_7_28/img19.png
2004-Nov-15 11:19:02 906 bytes prism/private/wslib/WS/Class_PipeLoss_PL_S_1_0_7_28/img2.png
2004-Nov-15 11:18:48 474 bytes prism/private/wslib/WS/Class_PipeLoss_PL_S_1_0_7_28/img20.png
2004-Nov-15 11:18:52 460 bytes prism/private/wslib/WS/Class_PipeLoss_PL_S_1_0_7_28/img21.png
2004-Nov-15 11:19:00 664 bytes prism/private/wslib/WS/Class_PipeLoss_PL_S_1_0_7_28/img22.png
2004-Nov-15 11:19:00 890 bytes prism/private/wslib/WS/Class_PipeLoss_PL_S_1_0_7_28/img23.png
2004-Nov-15 11:18:50 811 bytes prism/private/wslib/WS/Class_PipeLoss_PL_S_1_0_7_28/img24.png
2004-Nov-15 11:18:50 1205 bytes prism/private/wslib/WS/Class_PipeLoss_PL_S_1_0_7_28/img25.png
2004-Nov-15 11:19:02 1357 bytes prism/private/wslib/WS/Class_PipeLoss_PL_S_1_0_7_28/img26.png
2004-Nov-15 11:18:54 1299 bytes prism/private/wslib/WS/Class_PipeLoss_PL_S_1_0_7_28/img27.png
2004-Nov-15 11:18:56 933 bytes prism/private/wslib/WS/Class_PipeLoss_PL_S_1_0_7_28/img28.png
2004-Nov-15 11:19:04 651 bytes prism/private/wslib/WS/Class_PipeLoss_PL_S_1_0_7_28/img29.png
2004-Nov-15 11:18:58 1446 bytes prism/private/wslib/WS/Class_PipeLoss_PL_S_1_0_7_28/img3.png 2004-Nov-15 11:19:00 1596 bytes prism/private/wslib/WS/Class_PipeLoss_PL_S_1_0_7_28/img30.png
2004-Nov-15 11:19:02 656 bytes prism/private/wslib/WS/Class_PipeLoss_PL_S_1_0_7_28/img31.png
2004-Nov-15 11:18:48 1037 bytes prism/private/wslib/WS/Class_PipeLoss_PL_S_1_0_7_28/img32.png
2004-Nov-15 11:18:56 262 bytes prism/private/wslib/WS/Class_PipeLoss_PL_S_1_0_7_28/img4.png
2004-Nov-15 11:18:52 949 bytes prism/private/wslib/WS/Class_PipeLoss_PL_S_1_0_7_28/img5.png
2004-Nov-15 11:18:52 515 bytes prism/private/wslib/WS/Class_PipeLoss_PL_S_1_0_7_28/img6.png
2004-Nov-15 11:18:58 831 bytes prism/private/wslib/WS/Class_PipeLoss_PL_S_1_0_7_28/img7.png
2004-Nov-15 11:18:50 520 bytes prism/private/wslib/WS/Class_PipeLoss_PL_S_1_0_7_28/img8.png
2004-Nov-15 11:18:50 230 bytes prism/private/wslib/WS/Class_PipeLoss_PL_S_1_0_7_28/img9.png
2004-Nov-15 11:19:04 14027 bytes prism/private/wslib/WS/Class_PipeLoss_PL_S_1_0_7_28/index.html
2004-Nov-15 11:19:04 4268 bytes prism/private/wslib/WS/Class_PipeLoss_PL_S_1_0_7_28/internals.pl
2004-Nov-15 11:19:14 4641 bytes prism/private/wslib/WS/Class_PipeLoss_PL_S_1_0_7_28/labels.pl
2004-Nov-15 11:19:04 2534 bytes prism/private/wslib/WS/Class_PipeLoss_PL_S_1_0_7_28/node1.html
2004-Dec-13 10:28:47 272 bytes prism/private/wslib/WS/Class_PipeLoss_PL_S_RD_1_0_7_28
2004-Nov-15 11:19:10 28917 bytes prism/private/wslib/WS/Class_PipeLoss_PL_S_RD_1_0_7_28.pm
2004-Nov-15 11:19:10 81 bytes prism/private/wslib/WS/Class_PipeLoss_PL_S_RD_1_0_7_28.tex
2004-Nov-15 11:19:10 324 bytes prism/private/wslib/WS/Class_PipeLoss_PL_S_RD_1_0_7_28.ws
2004-Nov-15 11:19:10 891 bytes prism/private/wslib/WS/Class_PipeLoss_PL_S_RD_1_0_7_28/Class_PipeLoss_PL_S_RD_1_0_7_28.css
2004-Nov-15 11:19:10 1694 bytes prism/private/wslib/WS/Class_PipeLoss_PL_S_RD_1_0_7_28/Class_PipeLoss_PL_S_RD_1_0_7_28.html
2004-Dec-13 10:28:47 68 bytes prism/private/wslib/WS/Class_PipeLoss_PL_S_RD_1_0_7_28/EqnImages
2004-Nov-15 11:19:10 1694 bytes prism/private/wslib/WS/Class_PipeLoss_PL_S_RD_1_0_7_28/index.html
2004-Nov-15 11:19:14 168 bytes prism/private/wslib/WS/Class_PipeLoss_PL_S_RD_1_0_7_28/labels.pl
2004-Nov-15 11:19:10 2567 bytes prism/private/wslib/WS/Class_PipeLoss_PL_S_RD_1_0_7_28/node1.html
2004-Dec-13 10:28:47 1394 bytes prism/private/wslib/WS/Class_PipeLoss_PL_V_1_0_7_28
2004-Nov-15 11:19:12 348634 bytes prism/private/wslib/WS/Class_PipeLoss_PL_V_1_0_7_28.pm
2004-Nov-15 11:19:12 2500 bytes prism/private/wslib/WS/Class_PipeLoss_PL_V_1_0_7_28.tex
2004-Nov-15 11:19:12 296 bytes prism/private/wslib/WS/Class_PipeLoss_PL_V_1_0_7_28.ws
2004-Nov-15 11:19:30 891 bytes prism/private/wslib/WS/Class_PipeLoss_PL_V_1_0_7_28/Class_PipeLoss_PL_V_1_0_7_28.css
2004-Nov-15 11:19:30 12616 bytes prism/private/wslib/WS/Class_PipeLoss_PL_V_1_0_7_28/Class_PipeLoss_PL_V_1_0_7_28.html
2004-Dec-13 10:28:47 1054 bytes prism/private/wslib/WS/Class_PipeLoss_PL_V_1_0_7_28/EqnImages
2004-Nov-15 11:19:30 615 bytes prism/private/wslib/WS/Class_PipeLoss_PL_V_1_0_7_28/EqnImages/MRC_CF_Eqn_0.png
2004-Nov-15 11:19:30 827 bytes prism/private/wslib/WS/Class_PipeLoss_PL_V_1_0_7_28/EqnImages/MRC_CF_Eqn_1.png
2004-Nov-15 11:19:30 1190 bytes prism/private/wslib/WS/Class_PipeLoss_PL_V_1_0_7_28/EqnImages/MRC_CF_Eqn_10.png
2004-Nov-15 11:19:30 248 bytes prism/private/wslib/WS/Class_PipeLoss_PL_V_1_0_7_28/EqnImages/MRC_CF_Eqn_2.png
2004-Nov-15 11:19:30 839 bytes prism/private/wslib/WS/Class_PipeLoss_PL_V_1_0_7_28/EqnImages/MRC_CF_Eqn_3.png
2004-Nov-15 11:19:30 428 bytes prism/private/wslib/WS/Class_PipeLoss_PL_V_1_0_7_28/EqnImages/MRC_CF_Eqn_4.png
2004-Nov-15 11:19:30 704 bytes prism/private/wslib/WS/Class_PipeLoss_PL_V_1_0_7_28/EqnImages/MRC_CF_Eqn_5.png
2004-Nov-15 11:19:30 468 bytes prism/private/wslib/WS/Class_PipeLoss_PL_V_1_0_7_28/EqnImages/MRC_CF_Eqn_6.png
2004-Nov-15 11:19:32 211 bytes prism/private/wslib/WS/Class_PipeLoss_PL_V_1_0_7_28/EqnImages/MRC_CF_Eqn_7.png
2004-Nov-15 11:19:32 923 bytes prism/private/wslib/WS/Class_PipeLoss_PL_V_1_0_7_28/EqnImages/MRC_CF_Eqn_8.png
2004-Nov-15 11:19:32 248 bytes prism/private/wslib/WS/Class_PipeLoss_PL_V_1_0_7_28/EqnImages/MRC_CF_Eqn_9.png
2004-Nov-15 11:19:32 1436 bytes
prism/private/wslib/WS/Class_PipeLoss_PL_V_1_0_7_28/EqnImages/MRC_VaporKbp_CalcKb_Eqn_0.png
2004-Nov-15 11:19:32 971 bytes
prism/private/wslib/WS/Class_PipeLoss_PL_V_1_0_7_28/EqnImages/MRC_VaporKbp_CalcKv_Eqn_0.png
2004-Nov-15 11:19:32 736 bytes
prism/private/wslib/WS/Class_PipeLoss_PL_V_1_0_7_28/EqnImages/MRC_VaporKbp_CalcKv_Eqn_1.png
2004-Nov-15 11:19:32 764 bytes
prism/private/wslib/WS/Class_PipeLoss_PL_V_1_0_7_28/EqnImages/MRC_VaporKbp_CalcKv_Eqn_2.png
2004-Nov-15 11:19:32 727 bytes
prism/private/wslib/WS/Class_PipeLoss_PL_V_1_0_7_28/EqnImages/MRC_VaporKbp_CalcKv_Eqn_3.png
2004-Nov-15 11:19:32 437 bytes prism/private/wslib/WS/Class_PipeLoss_PL_V_1_0_7_28/EqnImages/MRC_VaporKbp_Eqn_0.png
2004-Nov-15 11:19:32 374 bytes prism/private/wslib/WS/Class_PipeLoss_PL_V_1_0_7_28/EqnImages/MRC_VaporKbp_Eqn_1.png
2004-Nov-15 11:19:32 580 bytes prism/private/wslib/WS/Class_PipeLoss_PL_V_1_0_7_28/EqnImages/PLInit_P_Eqn_0.png
2004-Nov-15 11:19:32 800 bytes prism/private/wslib/WS/Class_PipeLoss_PL_V_1_0_7_28/EqnImages/PLInit_P_Eqn_1.png
2004-Nov-15 11:19:32 689 bytes prism/private/wslib/WS/Class_PipeLoss_PL_V_1_0_7_28/EqnImages/PLInit_P_Eqn_10.png
2004-Nov-15 11:19:32 1055 bytes prism/private/wslib/WS/Class_PipeLoss_PL_V_1_0_7_28/EqnImages/PLInit_P_Eqn_2.png
2004-Nov-15 11:19:32 1201 bytes prism/private/wslib/WS/Class_PipeLoss_PL_V_1_0_7_28/EqnImages/PLInit_P_Eqn_3.png
2004-Nov-15 11:19:34 1149 bytes prism/private/wslib/WS/Class_PipeLoss_PL_V_1_0_7_28/EqnImages/PLInit_P_Eqn_4.png
2004-Nov-15 11:19:34 802 bytes prism/private/wslib/WS/Class_PipeLoss_PL_V_1_0_7_28/EqnImages/PLInit_P_Eqn_5.png
2004-Nov-15 11:19:34 582 bytes prism/private/wslib/WS/Class_PipeLoss_PL_V_1_0_7_28/EqnImages/PLInit_P_Eqn_6.png 2004-Nov-15 11:19:34 1330 bytes prism/private/wslib/WS/Class_PipeLoss_PL_V_1_0_7_28/EqnImages/PLInit_P_Eqn_7.png
2004-Nov-15 11:19:34 588 bytes prism/private/wslib/WS/Class_PipeLoss_PL_V_1_0_7_28/EqnImages/PLInit_P_Eqn_8.png
2004-Nov-15 11:19:34 899 bytes prism/private/wslib/WS/Class_PipeLoss_PL_V_1_0_7_28/EqnImages/PLInit_P_Eqn_9.png
2004-Nov-15 11:19:14 8 bytes prism/private/wslib/WS/Class_PipeLoss_PL_V_1_0_7_28/images.aux
2004-Nov-15 11:19:14 12372 bytes prism/private/wslib/WS/Class_PipeLoss_PL_V_1_0_7_28/images.log
2004-Nov-15 11:19:30 8152 bytes prism/private/wslib/WS/Class_PipeLoss_PL_V_1_0_7_28/images.pl
2004-Nov-15 11:19:14 11074 bytes prism/private/wslib/WS/Class_PipeLoss_PL_V_1_0_7_28/images.tex
2004-Nov-15 11:19:28 695 bytes prism/private/wslib/WS/Class_PipeLoss_PL_V_1_0_7_28/img1.png
2004-Nov-15 11:19:18 1017 bytes prism/private/wslib/WS/Class_PipeLoss_PL_V_1_0_7_28/img10.png
2004-Nov-15 11:19:30 1657 bytes prism/private/wslib/WS/Class_PipeLoss_PL_V_1_0_7_28/img11.png
2004-Nov-15 11:19:22 1053 bytes prism/private/wslib/WS/Class_PipeLoss_PL_V_1_0_7_28/img12.png
2004-Nov-15 11:19:26 834 bytes prism/private/wslib/WS/Class_PipeLoss_PL_V_1_0_7_28/img13.png
2004-Nov-15 11:19:24 864 bytes prism/private/wslib/WS/Class_PipeLoss_PL_V_1_0_7_28/img14.png
2004-Nov-15 11:19:16 798 bytes prism/private/wslib/WS/Class_PipeLoss_PL_V_1_0_7_28/img15.png
2004-Nov-15 11:19:18 474 bytes prism/private/wslib/WS/Class_PipeLoss_PL_V_1_0_7_28/img16.png
2004-Nov-15 11:19:22 460 bytes prism/private/wslib/WS/Class_PipeLoss_PL_V_1_0_7_28/img17.png
2004-Nov-15 11:19:28 664 bytes prism/private/wslib/WS/Class_PipeLoss_PL_V_1_0_7_28/img18.png
2004-Nov-15 11:19:20 890 bytes prism/private/wslib/WS/Class_PipeLoss_PL_V_1_0_7_28/img19.png
2004-Nov-15 11:19:26 906 bytes prism/private/wslib/WS/Class_PipeLoss_PL_V_1_0_7_28/img2.png
2004-Nov-15 11:19:22 811 bytes prism/private/wslib/WS/Class_PipeLoss_PL_V_1_0_7_28/img20.png
2004-Nov-15 11:19:26 1205 bytes prism/private/wslib/WS/Class_PipeLoss_PL_V_1_0_7_28/img21.png
2004-Nov-15 11:19:18 1357 bytes prism/private/wslib/WS/Class_PipeLoss_PL_V_1_0_7_28/img22.png
2004-Nov-15 11:19:16 1299 bytes prism/private/wslib/WS/Class_PipeLoss_PL_V_1_0_7_28/img23.png
2004-Nov-15 11:19:22 933 bytes prism/private/wslib/WS/Class_PipeLoss_PL_V_1_0_7_28/img24.png
2004-Nov-15 11:19:24 651 bytes prism/private/wslib/WS/Class_PipeLoss_PL_V_1_0_7_28/img25.png
2004-Nov-15 11:19:18 1596 bytes prism/private/wslib/WS/Class_PipeLoss_PL_V_1_0_7_28/img26.png
2004-Nov-15 11:19:20 656 bytes prism/private/wslib/WS/Class_PipeLoss_PL_V_1_0_7_28/img27.png
2004-Nov-15 11:19:20 1037 bytes prism/private/wslib/WS/Class_PipeLoss_PL_V_1_0_7_28/img28.png
2004-Nov-15 11:19:26 1446 bytes prism/private/wslib/WS/Class_PipeLoss_PL_V_1_0_7_28/img3.png
2004-Nov-15 11:19:16 262 bytes prism/private/wslib/WS/Class_PipeLoss_PL_V_1_0_7_28/img4.png
2004-Nov-15 11:19:20 949 bytes prism/private/wslib/WS/Class_PipeLoss_PL_V_1_0_7_28/img5.png
2004-Nov-15 11:19:28 515 bytes prism/private/wslib/WS/Class_PipeLoss_PL_V_1_0_7_28/img6.png
2004-Nov-15 11:19:24 831 bytes prism/private/wslib/WS/Class_PipeLoss_PL_V_1_0_7_28/img7.png
2004-Nov-15 11:19:30 520 bytes prism/private/wslib/WS/Class_PipeLoss_PL_V_1_0_7_28/img8.png
2004-Nov-15 11:19:28 230 bytes prism/private/wslib/WS/Class_PipeLoss_PL_V_1_0_7_28/img9.png
2004-Nov-15 11:19:30 12616 bytes prism/private/wslib/WS/Class_PipeLoss_PL_V_1_0_7_28/index.html
2004-Nov-15 11:19:30 3760 bytes prism/private/wslib/WS/Class_PipeLoss_PL_V_1_0_7_28/internals.pl
2004-Nov-15 11:19:30 4097 bytes prism/private/wslib/WS/Class_PipeLoss_PL_V_1_0_7_28/labels.pl
2004-Nov-15 11:19:30 2534 bytes prism/private/wslib/WS/Class_PipeLoss_PL_V_1_0_7_28/node1.html
2004-Dec-13 10:28:47 782 bytes prism/private/wslib/WS/Class_PipeLoss_PL_V_RD_1_0_7_28
2004-Nov-15 11:19:34 279449 bytes prism/private/wslib/WS/Class_PipeLoss_PL_V_RD_1_0_7_28.pm
2004-Nov-15 11:19:34 987 bytes prism/private/wslib/WS/Class_PipeLoss_PL_V_RD_1_0_7_28.tex
2004-Nov-15 11:19:34 324 bytes prism/private/wslib/WS/Class_PipeLoss_PL_V_RD_1_0_7_28.ws
2004-Nov-15 11:19:42 891 bytes prism/private/wslib/WS/Class_PipeLoss_PL_V_RD_1_0_7_28/Class_PipeLoss_PL_V_RD_1_0_7_28.css
2004-Nov-15 11:19:42 5425 bytes
prism/private/wslib/WS/Class_PipeLoss_PL_V_RD_1_0_7_28/Class_PipeLoss_PL_V_RD_1_0_7_28.html
2004-Dec-13 10:28:47 408 bytes prism/private/wslib/WS/Class_PipeLoss_PL_V_RD_1_0_7_28/EqnImages
2004-Nov-15 11:19:42 580 bytes prism/private/wslib/WS/Class_PipeLoss_PL_V_RD_1_0_7_28/EqnImages/PLInit_P_Eqn_0.png
2004-Nov-15 11:19:42 1055 bytes prism/private/wslib/WS/Class_PipeLoss_PL_V_RD_1_0_7_28/EqnImages/PLInit_P_Eqn_1.png
2004-Nov-15 11:19:42 1201 bytes prism/private/wslib/WS/Class_PipeLoss_PL_V_RD_1_0_7_28/EqnImages/PLInit_P_Eqn_2.png
2004-Nov-15 11:19:44 1149 bytes prism/private/wslib/WS/Class_PipeLoss_PL_V_RD_1_0_7_28/EqnImages/PLInit_P_Eqn_3.png
2004-Nov-15 11:19:44 802 bytes prism/private/wslib/WS/Class_PipeLoss_PL_V_RD_1_0_7_28/EqnImages/PLInit_P_Eqn_4.png
2004-Nov-15 11:19:44 582 bytes prism/private/wslib/WS/Class_PipeLoss_PL_V_RD_1_0_7_28/EqnImages/PLInit_P_Eqn_5.png
2004-Nov-15 11:19:44 1330 bytes prism/private/wslib/WS/Class_PipeLoss_PL_V_RD_1_0_7_28/EqnImages/PLInit_P_Eqn_6.png
2004-Nov-15 11:19:44 588 bytes prism/private/wslib/WS/Class_PipeLoss_PL_V_RD_1_0_7_28/EqnImages/PLInit_P_Eqn_7.png
2004-Nov-15 11:19:44 899 bytes prism/private/wslib/WS/Class_PipeLoss_PL_V_RD_1_0_7_28/EqnImages/PLInit_P_Eqn_8.png
2004-Nov-15 11:19:44 689 bytes prism/private/wslib/WS/Class_PipeLoss_PL_V_RD_1_0_7_28/EqnImages/PLInit_P_Eqn_9.png
2004-Nov-15 11:19:36 8 bytes prism/private/wslib/WS/Class_PipeLoss_PL_V_RD_1_0_7_28/images.aux
2004-Nov-15 11:19:36 10161 bytes prism/private/wslib/WS/Class_PipeLoss_PL_V_RD_1_0_7_28/images.log
2004-Nov-15 11:19:42 3083 bytes prism/private/wslib/WS/Class_PipeLoss_PL_V_RD_1_0_7_28/images.pl
2004-Nov-15 11:19:36 7772 bytes prism/private/wslib/WS/Class_PipeLoss_PL_V_RD_1_0_7_28/images.tex 2004-Nov-15 11:19:38 664 bytes prism/private/wslib/WS/Class_PipeLoss_PL_V_RD_1_0_7_28/img1.png
2004-Nov-15 11:19:42 811 bytes prism/private/wslib/WS/Class_PipeLoss_PL_V_RD_1_0_7_28/img10.png
2004-Nov-15 11:19:38 1205 bytes prism/private/wslib/WS/Class_PipeLoss_PL_V_RD_1_0_7_28/img2.png
2004-Nov-15 11:19:42 1357 bytes prism/private/wslib/WS/Class_PipeLoss_PL_V_RD_1_0_7_28/img3.png
2004-Nov-15 11:19:40 1299 bytes prism/private/wslib/WS/Class_PipeLoss_PL_V_RD_1_0_7_28/img4.png
2004-Nov-15 11:19:40 933 bytes prism/private/wslib/WS/Class_PipeLoss_PL_V_RD_1_0_7_28/img5.png
2004-Nov-15 11:19:40 651 bytes prism/private/wslib/WS/Class_PipeLoss_PL_V_RD_1_0_7_28/img6.png
2004-Nov-15 11:19:42 1596 bytes prism/private/wslib/WS/Class_PipeLoss_PL_V_RD_1_0_7_28/img7.png
2004-Nov-15 11:19:40 656 bytes prism/private/wslib/WS/Class_PipeLoss_PL_V_RD_1_0_7_28/img8.png
2004-Nov-15 11:19:38 1037 bytes prism/private/wslib/WS/Class_PipeLoss_PL_V_RD_1_0_7_28/img9.png
2004-Nov-15 11:19:42 5425 bytes prism/private/wslib/WS/Class_PipeLoss_PL_V_RD_1_0_7_28/index.html
2004-Nov-15 11:19:42 1372 bytes prism/private/wslib/WS/Class_PipeLoss_PL_V_RD_1_0_7_28/internals.pl
2004-Nov-15 11:19:44 1538 bytes prism/private/wslib/WS/Class_PipeLoss_PL_V_RD_1_0_7_28/labels.pl
2004-Nov-15 11:19:42 2567 bytes prism/private/wslib/WS/Class_PipeLoss_PL_V_RD_1_0_7_28/node1.html
2004-Dec-13 10:28:47 272 bytes prism/private/wslib/WS/Class_Plant_1_0_7_28
2004-Nov-15 11:19:44 5686 bytes prism/private/wslib/WS/Class_Plant_1_0_7_28.pm
2004-Nov-15 11:19:44 81 bytes prism/private/wslib/WS/Class_Plant_1_0_7_28.tex
2004-Nov-15 11:19:44 254 bytes prism/private/wslib/WS/Class_Plant_1_0_7_28.ws
2004-Nov-15 11:19:46 891 bytes prism/private/wslib/WS/Class_Plant_1_0_7_28/Class_Plant_1_0_7_28.css
2004-Nov-15 11:19:46 1650 bytes prism/private/wslib/WS/Class_Plant_1_0_7_28/Class_Plant_1_0_7_28.html
2004-Dec-13 10:28:47 68 bytes prism/private/wslib/WS/Class_Plant_1_0_7_28/EqnImages
2004-Nov-15 11:19:46 1650 bytes prism/private/wslib/WS/Class_Plant_1_0_7_28/index.html
2004-Nov-15 11:20:14 168 bytes prism/private/wslib/WS/Class_Plant_1_0_7_28/labels.pl
2004-Nov-15 11:19:46 2446 bytes prism/private/wslib/WS/Class_Plant_1_0_7_28/node1.html
2004-Dec-13 10:28:47 272 bytes prism/private/wslib/WS/Class_Relief_1_0_7_28
2004-Nov-15 11:19:46 3826 bytes prism/private/wslib/WS/Class_Relief_1_0_7_28.pm
2004-Nov-15 11:19:46 81 bytes prism/private/wslib/WS/Class_Relief_1_0_7_28.tex
2004-Nov-15 11:19:46 265 bytes prism/private/wslib/WS/Class_Relief_1_0_7_28.ws
2004-Nov-15 11:19:48 891 bytes prism/private/wslib/WS/Class_Relief_1_0_7_28/Class_Relief_1_0_7_28.css
2004-Nov-15 11:19:48 1654 bytes prism/private/wslib/WS/Class_Relief_1_0_7_28/Class_Relief_1_0_7_28.html
2004-Dec-13 10:28:47 68 bytes prism/private/wslib/WS/Class_Relief_1_0_7_28/EqnImages
2004-Nov-15 11:19:48 1654 bytes prism/private/wslib/WS/Class_Relief_1_0_7_28/index.html
2004-Nov-15 11:20:14 168 bytes prism/private/wslib/WS/Class_Relief_1_0_7_28/labels.pl
2004-Nov-15 11:19:48 2457 bytes prism/private/wslib/WS/Class_Relief_1_0_7_28/node1.html
2004-Mar-10 18:52:46 79 bytes prism/private/wslib/_compile_current
2004-Mar-10 18:52:08 65 bytes prism/private/wslib/_compile_current_image
2004-Jul-16 16:11:52 107 bytes prism/private/wslib/_load_data
2004-Dec-13 10:53:22 374 bytes prism/private/wslib/calc-lib
2004-Dec-13 10:28:23 884 bytes prism/private/wslib/calc-lib/1.0.7
2004-Dec-13 10:28:28 918 bytes prism/private/wslib/calc-lib/1.0.7.23
2004-Mar-12 16:08:46 12288 bytes prism/private/wslib/calc-lib/1.0.7.23/.swp
2004-Aug-20 11:06:56 6542 bytes prism/private/wslib/calc-lib/1.0.7.23/ControlValveLiquid.clc
2004-Aug-22 15:49:58 6436 bytes prism/private/wslib/calc-lib/1.0.7.23/ControlValveVapor.clc
2004-Dec-13 10:28:27 306 bytes prism/private/wslib/calc-lib/1.0.7.23/Device
2004-Jun-22 14:43:38 6127 bytes prism/private/wslib/calc-lib/1.0.7.23/Device/PRVDeviceData.clc
2003-Oct-10 14:17:08 3251 bytes prism/private/wslib/calc-lib/1.0.7.23/Device/PipeDeviceData.clc
2004-May-19 17:05:12 9547 bytes prism/private/wslib/calc-lib/1.0.7.23/Device/RDDeviceData.clc
2004-Aug-17 10:17:02 11282 bytes prism/private/wslib/calc-lib/1.0.7.23/Device/TVDeviceData.clc
2004-Aug-17 10:17:04 6502 bytes prism/private/wslib/calc-lib/1.0.7.23/Device/TankDeviceData.clc
2003-Oct-10 14:17:08 2672 bytes prism/private/wslib/calc-lib/1.0.7.23/Device/TurbineStmDeviceData.clc
2003-Oct-29 14:54:00 2665 bytes prism/private/wslib/calc-lib/1.0.7.23/Device/Vessel.clc
2004-Jul-16 11:22:20 6447 bytes prism/private/wslib/calc-lib/1.0.7.23/FireGasExpansion.clc
2004-Aug-17 10:17:04 5984 bytes prism/private/wslib/calc-lib/1.0.7.23/FireVaporGeneration.clc
2004-Dec-13 10:28:27 306 bytes prism/private/wslib/calc-lib/1.0.7.23/Fitting
2003-Oct-10 14:17:08 5636 bytes prism/private/wslib/calc-lib/1.0.7.23/Fitting/ExpandingFitting.clc
2003-Oct-10 14:17:08 4149 bytes prism/private/wslib/calc-lib/1.0.7.23/Fitting/ExpandingTeeSide.clc
2003-Oct-10 14:17:08 4153 bytes prism/private/wslib/calc-lib/1.0.7.23/Fitting/Pipe.clc
2004-Jul-02 16:58:00 5741 bytes prism/private/wslib/calc-lib/1.0.7.23/Fitting/ReducingFitting.clc
2003-Oct-10 14:17:08 4176 bytes prism/private/wslib/calc-lib/1.0.7.23/Fitting/ReducingTeeSide.clc
2003-Oct-10 14:17:08 4128 bytes prism/private/wslib/calc-lib/1.0.7.23/Fitting/StandardFitting.clc
2004-Jul-02 16:57:22 5741 bytes prism/private/wslib/calc-lib/1.0.7.23/Fitting/junk1

2004-Jul-15 21:59:10 6539 bytes prism/private/wslib/calc-lib/1.0.7.23/GivenFlowLiquid.clc
2004-Jul-15 21:59:22 5520 bytes prism/private/wslib/calc-lib/1.0.7.23/GivenFlowSteam.clc
2004-Jul-15 21:59:34 7059 bytes prism/private/wslib/calc-lib/1.0.7.23/GivenFlowVapor.clc
2004-Dec-13 10:28:27 272 bytes prism/private/wslib/calc-lib/1.0.7.23/Liquid
2004-Feb-15 20:52:26 1191 bytes prism/private/wslib/calc-lib/1.0.7.23/Liquid/ControlValveLiquidFlow.clc
2004-May-20 10:21:36 652 bytes prism/private/wslib/calc-lib/1.0.7.23/Liquid/LiquidExpansionCapacity.clc
2004-Jun-21 11:17:22 5116 bytes prism/private/wslib/calc-lib/1.0.7.23/Liquid/LiquidProps.clc
2004-Jul-07 13:46:44 5132 bytes prism/private/wslib/calc-lib/1.0.7.23/Liquid/LiquidVol.clc
2004-May-20 10:47:44 822 bytes prism/private/wslib/calc-lib/1.0.7.23/Liquid/TubeRuptureLiquidMassFlow.clc
2004-May-20 10:47:56 830 bytes prism/private/wslib/calc-lib/1.0.7.23/Liquid/TubeRuptureLiquidVolFlow.clc
2004-Aug-17 10:17:06 5833 bytes prism/private/wslib/calc-lib/1.0.7.23/LiquidExpansion.clc
2004-Jul-06 21:17:50 3251 bytes prism/private/wslib/calc-lib/1.0.7.23/NotImplemented.clc
2004-Dec-13 10:28:27 544 bytes prism/private/wslib/calc-lib/1.0.7.23/PipingLoss
2004-Jun-15 11:57:02 4665 bytes prism/private/wslib/calc-lib/1.0.7.23/PipingLoss/CheckInlet.clc
2004-Jun-15 11:57:16 5318 bytes prism/private/wslib/calc-lib/1.0.7.23/PipingLoss/CheckOutlet.clc
2004-Jun-11 10:26:26 637 bytes prism/private/wslib/calc-lib/1.0.7.23/PipingLoss/HDelta.clc
2004-Aug-24 22:16:34 30499 bytes prism/private/wslib/calc-lib/1.0.7.23/PipingLoss/Liquid.clc
2004-Jun-22 11:24:14 2195 bytes prism/private/wslib/calc-lib/1.0.7.23/PipingLoss/LiquidDrop.clc
2004-Jul-22 11:17:20 16671 bytes prism/private/wslib/calc-lib/1.0.7.23/PipingLoss/MaxRelCapLiquid.clc
2004-Jul-22 11:17:30 15750 bytes prism/private/wslib/calc-lib/1.0.7.23/PipingLoss/MaxRelCapSteam.clc
2004-Jul-22 11:13:40 16771 bytes prism/private/wslib/calc-lib/1.0.7.23/PipingLoss/MaxRelCapVapor.clc
2004-May-19 17:44:18 9733 bytes prism/private/wslib/calc-lib/1.0.7.23/PipingLoss/NotImplemented.clc
2004-Aug-23 10:11:28 17820 bytes prism/private/wslib/calc-lib/1.0.7.23/PipingLoss/PipingLossInit.clc
2004-Aug-24 22:24:38 34228 bytes prism/private/wslib/calc-lib/1.0.7.23/PipingLoss/Steam.clc
2004-Aug-24 22:24:02 38576 bytes prism/private/wslib/calc-lib/1.0.7.23/PipingLoss/Vapor.clc
2004-Aug-20 15:54:56 2513 bytes prism/private/wslib/calc-lib/1.0.7.23/PipingLoss/VaporDropIn.clc
2004-Aug-20 15:55:38 6784 bytes prism/private/wslib/calc-lib/1.0.7.23/PipingLoss/VaporDropOut.clc
2004-Dec-13 10:28:27 204 bytes prism/private/wslib/calc-lib/1.0.7.23/Post
2004-Jul-15 22:18:44 11722 bytes prism/private/wslib/calc-lib/1.0.7.23/Post/AcousticVibration.clc
2004-Jun-21 11:19:34 1812 bytes prism/private/wslib/calc-lib/1.0.7.23/Post/NoiseLevel.clc
2004-Jun-24 10:44:26 1575 bytes prism/private/wslib/calc-lib/1.0.7.23/Post/ReactionForceSteam.clc
2004-Jun-15 12:02:44 1503 bytes prism/private/wslib/calc-lib/1.0.7.23/Post/ReactionForceVapor.clc
2004-Dec-13 10:28:27 442 bytes prism/private/wslib/calc-lib/1.0.7.23/Pressure
2004-Jun-04 11:58:24 1514 bytes prism/private/wslib/calc-lib/1.0.7.23/Pressure/BackPressure.clc
2004-Jun-21 11:20:40 2461 bytes prism/private/wslib/calc-lib/1.0.7.23/Pressure/BackPressureCheck.clc
2004-Feb-27 19:14:28 2058 bytes prism/private/wslib/calc-lib/1.0.7.23/Pressure/ColdDiffTestPressure.clc
2004-Jul-07 10:35:00 6605 bytes prism/private/wslib/calc-lib/1.0.7.23/Pressure/MRCPOverPRelief.clc
2004-Jun-15 10:24:58 1150 bytes prism/private/wslib/calc-lib/1.0.7.23/Pressure/PAtm.clc
2004-Mar-18 11:31:24 708 bytes prism/private/wslib/calc-lib/1.0.7.23/Pressure/PDelta.clc
2004-Jul-19 16:42:28 15157 bytes prism/private/wslib/calc-lib/1.0.7.23/Pressure/POverPRelief.clc
2004-Aug-17 11:27:14 2090 bytes prism/private/wslib/calc-lib/1.0.7.23/Pressure/POverTank.clc
2004-Jul-15 20:21:40 2670 bytes prism/private/wslib/calc-lib/1.0.7.23/Pressure/PressureChecks.clc
2004-Jun-24 10:37:16 3515 bytes prism/private/wslib/calc-lib/1.0.7.23/Pressure/PressureChecksTank.clc
2004-Jul-08 17:07:12 852 bytes prism/private/wslib/calc-lib/1.0.7.23/Pressure/notes.txt
2004-Dec-13 10:28:27 136 bytes prism/private/wslib/calc-lib/1.0.7.23/Steam
2004-Mar-29 14:10:14 947 bytes prism/private/wslib/calc-lib/1.0.7.23/Steam/Steam.clc
2004-Jun-15 20:22:40 929 bytes prism/private/wslib/calc-lib/1.0.7.23/Steam/SteamProps.clc
2004-Dec-13 10:28:27 272 bytes prism/private/wslib/calc-lib/1.0.7.23/Tanks
2004-Aug-17 10:17:18 3820 bytes prism/private/wslib/calc-lib/1.0.7.23/Tanks/FireVaporGen.clc
2004-Aug-17 10:17:18 3673 bytes prism/private/wslib/calc-lib/1.0.7.23/Tanks/PadFailure.clc
2004-Aug-17 10:17:20 5546 bytes prism/private/wslib/calc-lib/1.0.7.23/Tanks/PumpInLiquidThermal.clc
2004-Aug-17 10:17:20 3689 bytes prism/private/wslib/calc-lib/1.0.7.23/Tanks/PumpOutLiquidThermal.clc
2004-Aug-17 10:17:22 3189 bytes prism/private/wslib/calc-lib/1.0.7.23/Tanks/SteamOut.clc
2004-Aug-17 10:17:22 2799 bytes prism/private/wslib/calc-lib/1.0.7.23/Tanks/TankDraining.clc
2004-Aug-20 09:46:36 9954 bytes prism/private/wslib/calc-lib/1.0.7.23/TubeRuptureLiquid.clc
2004-Aug-20 10:21:04 8743 bytes prism/private/wslib/calc-lib/1.0.7.23/TubeRuptureVapor.clc
2004-Aug-19 14:04:24 6124 bytes prism/private/wslib/calc-lib/1.0.7.23/UserSpecifiedLiquid.clc
2004-Jul-15 22:00:22 4890 bytes prism/private/wslib/calc-lib/1.0.7.23/UserSpecifiedSteam.clc
2004-Jul-15 22:00:28 5814 bytes prism/private/wslib/calc-lib/1.0.7.23/UserSpecifiedVapor.clc
2004-Dec-13 10:28:28 816 bytes prism/private/wslib/calc-lib/1.0.7.23/Util
2003-Nov-11 18:36:28 605 bytes prism/private/wslib/calc-lib/1.0.7.23/Util/AreaAdequateChecks.clc 2003-Oct-29 14:25:16 786 bytes prism/private/wslib/calc-lib/1.0.7.23/Util/AreaChecks.clc
2004-Jul-16 07:58:36 5483 bytes prism/private/wslib/calc-lib/1.0.7.23/Util/CheckProtectingValves.clc
2004-Jun-15 12:04:20 3729 bytes prism/private/wslib/calc-lib/1.0.7.23/Util/CriticalFlow.clc
2004-Mar-08 13:39:08 1109 bytes prism/private/wslib/calc-lib/1.0.7.23/Util/CriticalTubeFlow.clc
2004-Jul-07 15:18:52 4510 bytes prism/private/wslib/calc-lib/1.0.7.23/Util/Kb.clc
2004-Mar-12 11:53:32 1555 bytes prism/private/wslib/calc-lib/1.0.7.23/Util/KbpLiquid.clc
2004-Mar-08 13:21:56 1818 bytes prism/private/wslib/calc-lib/1.0.7.23/Util/KbpVapor.clc
2004-Mar-08 13:22:24 1125 bytes prism/private/wslib/calc-lib/1.0.7.23/Util/Kn.clc
2004-Mar-29 14:08:48 1380 bytes prism/private/wslib/calc-lib/1.0.7.23/Util/Ksh.clc
2004-Jul-07 15:10:20 10998 bytes prism/private/wslib/calc-lib/1.0.7.23/Util/Kv.clc
2004-Jul-07 15:16:44 4375 bytes prism/private/wslib/calc-lib/1.0.7.23/Util/Kw.clc
2004-Aug-23 15:07:26 6174 bytes prism/private/wslib/calc-lib/1.0.7.23/Util/ProtectedData.clc
2004-Aug-21 12:34:04 4923 bytes prism/private/wslib/calc-lib/1.0.7.23/Util/ProtectedDataTank.clc
2004-Aug-23 11:54:08 14233 bytes prism/private/wslib/calc-lib/1.0.7.23/Util/ProtectedDataVessel.clc
2004-Aug-22 00:46:14 18044 bytes prism/private/wslib/calc-lib/1.0.7.23/Util/ProtectingData.clc
2004-Aug-20 18:25:24 5853 bytes prism/private/wslib/calc-lib/1.0.7.23/Util/ProtectingDataTV.clc
2004-Jul-06 21:08:02 3283 bytes prism/private/wslib/calc-lib/1.0.7.23/Util/ReqSizingCode.clc
2004-Jun-21 16:11:04 1022 bytes prism/private/wslib/calc-lib/1.0.7.23/Util/ReqValveType.clc
2004-Jul-07 13:51:14 510 bytes prism/private/wslib/calc-lib/1.0.7.23/Util/ReynoldsToKu.clc
2004-May-20 10:34:54 1533 bytes prism/private/wslib/calc-lib/1.0.7.23/Util/VaporCapCreditCnvrt.clc
2004-Aug-17 11:26:12 767 bytes prism/private/wslib/calc-lib/1.0.7.23/Util/VentAdequateChecks.clc
2004-Dec-13 10:28:28 408 bytes prism/private/wslib/calc-lib/1.0.7.23/Vapor
2004-Jun-15 10:26:10 3951 bytes prism/private/wslib/calc-lib/1.0.7.23/Vapor/ControlValveVaporFlow.clc
2004-Jul-16 11:27:14 2520 bytes prism/private/wslib/calc-lib/1.0.7.23/Vapor/FGEVaporMass.clc
2004-Jun-23 15:01:10 1610 bytes prism/private/wslib/calc-lib/1.0.7.23/Vapor/FireGasCapacity.clc
2004-Aug-17 13:56:16 10053 bytes prism/private/wslib/calc-lib/1.0.7.23/Vapor/FireVaporCapacity.clc
2004-May-20 10:46:50 1185 bytes prism/private/wslib/calc-lib/1.0.7.23/Vapor/TubeRuptureVaporFlowCrit.clc
2004-May-20 10:46:58 881 bytes prism/private/wslib/calc-lib/1.0.7.23/Vapor/TubeRuptureVaporFlowSub.clc
2004-Jun-15 10:26:28 2099 bytes prism/private/wslib/calc-lib/1.0.7.23/Vapor/VaporMass.clc
2004-Feb-27 21:19:16 1725 bytes prism/private/wslib/calc-lib/1.0.7.23/Vapor/VaporProcessProps.clc
2004-Jul-06 15:36:52 7672 bytes prism/private/wslib/calc-lib/1.0.7.23/Vapor/VaporProps.clc
2004-Jun-15 10:27:02 2085 bytes prism/private/wslib/calc-lib/1.0.7.23/Vapor/VaporVol.clc
2004-Dec-13 10:28:28 918 bytes prism/private/wslib/calc-lib/1.0.7.24
2004-Mar-12 16:08:46 12288 bytes prism/private/wslib/calc-lib/1.0.7.24/.swp
2004-Aug-20 11:06:56 6542 bytes prism/private/wslib/calc-lib/1.0.7.24/ControlValveLiquid.clc
2004-Aug-27 20:59:12 6489 bytes prism/private/wslib/calc-lib/1.0.7.24/ControlValveVapor.clc
2004-Dec-13 10:28:28 306 bytes prism/private/wslib/calc-lib/1.0.7.24/Device
2004-Jun-22 14:43:38 6127 bytes prism/private/wslib/calc-lib/1.0.7.24/Device/PRVDeviceData.clc
2003-Oct-10 14:17:08 3251 bytes prism/private/wslib/calc-lib/1.0.7.24/Device/PipeDeviceData.clc
2004-Aug-28 17:49:32 10298 bytes prism/private/wslib/calc-lib/1.0.7.24/Device/RDDeviceData.clc
2004-Aug-25 11:51:16 13861 bytes prism/private/wslib/calc-lib/1.0.7.24/Device/TVDeviceData.clc
2004-Aug-25 10:37:14 6564 bytes prism/private/wslib/calc-lib/1.0.7.24/Device/TankDeviceData.clc
2003-Oct-10 14:17:08 2672 bytes prism/private/wslib/calc-lib/1.0.7.24/Device/TurbineStmDeviceData.clc
2003-Oct-29 14:54:00 2665 bytes prism/private/wslib/calc-lib/1.0.7.24/Device/Vessel.clc
2004-Aug-27 20:59:30 6499 bytes prism/private/wslib/calc-lib/1.0.7.24/FireGasExpansion.clc
2004-Aug-27 20:59:38 6036 bytes prism/private/wslib/calc-lib/1.0.7.24/FireVaporGeneration.clc
2004-Dec-13 10:28:28 306 bytes prism/private/wslib/calc-lib/1.0.7.24/Fitting
2003-Oct-10 14:17:08 5636 bytes prism/private/wslib/calc-lib/1.0.7.24/Fitting/ExpandingFitting.clc
2003-Oct-10 14:17:08 4149 bytes prism/private/wslib/calc-lib/1.0.7.24/Fitting/ExpandingTeeSide.clc
2003-Oct-10 14:17:08 4153 bytes prism/private/wslib/calc-lib/1.0.7.24/Fitting/Pipe.clc
2004-Jul-02 16:58:00 5741 bytes prism/private/wslib/calc-lib/1.0.7.24/Fitting/ReducingFitting.clc
2003-Oct-10 14:17:08 4176 bytes prism/private/wslib/calc-lib/1.0.7.24/Fitting/ReducingTeeSide.clc
2003-Oct-10 14:17:08 4128 bytes prism/private/wslib/calc-lib/1.0.7.24/Fitting/StandardFitting.clc
2004-Jul-02 16:57:22 5741 bytes prism/private/wslib/calc-lib/1.0.7.24/Fitting/junk1
2004-Jul-15 21:59:10 6539 bytes prism/private/wslib/calc-lib/1.0.7.24/GivenFlowLiquid.clc
2004-Aug-27 20:59:50 5572 bytes prism/private/wslib/calc-lib/1.0.7.24/GivenFlowSteam.clc
2004-Aug-27 21:00:16 7111 bytes prism/private/wslib/calc-lib/1.0.7.24/GivenFlowVapor.clc
2004-Dec-13 10:28:28 272 bytes prism/private/wslib/calc-lib/1.0.7.24/Liquid
2004-Feb-15 20:52:26 1191 bytes prism/private/wslib/calc-lib/1.0.7.24/Liquid/ControlValveLiquidFlow.clc
2004-May-20 10:21:36 652 bytes prism/private/wslib/calc-lib/1.0.7.24/Liquid/LiquidExpansionCapacity.clc
2004-Jun-21 11:17:22 5116 bytes prism/private/wslib/calc-lib/1.0.7.24/Liquid/LiquidProps.clc 2004-Jul-07 13:46:44 5132 bytes prism/private/wslib/calc-lib/1.0.7.24/Liquid/LiquidVol.clc
2004-May-20 10:47:44 822 bytes prism/private/wslib/calc-lib/1.0.7.24/Liquid/TubeRuptureLiquidMassFlow.clc
2004-May-20 10:47:56 830 bytes prism/private/wslib/calc-lib/1.0.7.24/Liquid/TubeRuptureLiquidVolFlow.clc
2004-Aug-17 10:17:06 5833 bytes prism/private/wslib/calc-lib/1.0.7.24/LiquidExpansion.clc
2004-Jul-06 21:17:50 3251 bytes prism/private/wslib/calc-lib/1.0.7.24/NotImplemented.clc
2004-Dec-13 10:28:28 544 bytes prism/private/wslib/calc-lib/1.0.7.24/PipingLoss
2004-Jun-15 11:57:02 4665 bytes prism/private/wslib/calc-lib/1.0.7.24/PipingLoss/CheckInlet.clc
2004-Jun-15 11:57:16 5318 bytes prism/private/wslib/calc-lib/1.0.7.24/PipingLoss/CheckOutlet.clc
2004-Jun-11 10:26:26 637 bytes prism/private/wslib/calc-lib/1.0.7.24/PipingLoss/HDelta.clc
2004-Aug-24 22:33:52 30499 bytes prism/private/wslib/calc-lib/1.0.7.24/PipingLoss/Liquid.clc
2004-Jun-22 11:24:14 2195 bytes prism/private/wslib/calc-lib/1.0.7.24/PipingLoss/LiquidDrop.clc
2004-Jul-22 11:17:20 16671 bytes prism/private/wslib/calc-lib/1.0.7.24/PipingLoss/MaxRelCapLiquid.clc
2004-Aug-27 21:02:34 15796 bytes prism/private/wslib/calc-lib/1.0.7.24/PipingLoss/MaxRelCapSteam.clc
2004-Aug-27 21:02:42 16817 bytes prism/private/wslib/calc-lib/1.0.7.24/PipingLoss/MaxRelCapVapor.clc
2004-May-19 17:44:18 9733 bytes prism/private/wslib/calc-lib/1.0.7.24/PipingLoss/NotImplemented.clc
2004-Aug-23 10:11:28 17820 bytes prism/private/wslib/calc-lib/1.0.7.24/PipingLoss/PipingLossInit.clc
2004-Aug-24 22:33:52 34228 bytes prism/private/wslib/calc-lib/1.0.7.24/PipingLoss/Steam.clc
2004-Aug-25 10:00:38 38676 bytes prism/private/wslib/calc-lib/1.0.7.24/PipingLoss/Vapor.clc
2004-Aug-20 15:54:56 2513 bytes prism/private/wslib/calc-lib/1.0.7.24/PipingLoss/VaporDropIn.clc
2004-Aug-20 15:55:38 6784 bytes prism/private/wslib/calc-lib/1.0.7.24/PipingLoss/VaporDropOut.clc
2004-Dec-13 10:28:28 204 bytes prism/private/wslib/calc-lib/1.0.7.24/Post
2004-Jul-15 22:18:44 11722 bytes prism/private/wslib/calc-lib/1.0.7.24/Post/AcousticVibration.clc
2004-Jun-21 11:19:34 1812 bytes prism/private/wslib/calc-lib/1.0.7.24/Post/NoiseLevel.clc
2004-Jun-24 10:44:26 1575 bytes prism/private/wslib/calc-lib/1.0.7.24/Post/ReactionForceSteam.clc
2004-Jun-15 12:02:44 1503 bytes prism/private/wslib/calc-lib/1.0.7.24/Post/ReactionForceVapor.clc
2004-Dec-13 10:28:28 442 bytes prism/private/wslib/calc-lib/1.0.7.24/Pressure
2004-Jun-04 11:58:24 1514 bytes prism/private/wslib/calc-lib/1.0.7.24/Pressure/BackPressure.clc
2004-Jun-21 11:20:40 2461 bytes prism/private/wslib/calc-lib/1.0.7.24/Pressure/BackPressureCheck.clc
2004-Feb-27 19:14:28 2058 bytes prism/private/wslib/calc-lib/1.0.7.24/Pressure/ColdDiffTestPressure.clc
2004-Jul-07 10:35:00 6605 bytes prism/private/wslib/calc-lib/1.0.7.24/Pressure/MRCPOverPRelief.clc
2004-Jun-15 10:24:58 1150 bytes prism/private/wslib/calc-lib/1.0.7.24/Pressure/PAtm.clc
2004-Mar-18 11:31:24 708 bytes prism/private/wslib/calc-lib/1.0.7.24/Pressure/PDelta.clc
2004-Jul-19 16:42:28 15157 bytes prism/private/wslib/calc-lib/1.0.7.24/Pressure/POverPRelief.clc
2004-Aug-17 11:27:14 2090 bytes prism/private/wslib/calc-lib/1.0.7.24/Pressure/POverTank.clc
2004-Jul-15 20:21:40 2670 bytes prism/private/wslib/calc-lib/1.0.7.24/Pressure/PressureChecks.clc
2004-Jun-24 10:37:16 3515 bytes prism/private/wslib/calc-lib/1.0.7.24/Pressure/PressureChecksTank.clc
2004-Jul-08 17:07:12 852 bytes prism/private/wslib/calc-lib/1.0.7.24/Pressure/notes.txt
2004-Dec-13 10:28:28 136 bytes prism/private/wslib/calc-lib/1.0.7.24/Steam
2004-Mar-29 14:10:14 947 bytes prism/private/wslib/calc-lib/1.0.7.24/Steam/Steam.clc
2004-Jun-15 20:22:40 929 bytes prism/private/wslib/calc-lib/1.0.7.24/Steam/SteamProps.clc
2004-Dec-13 10:28:28 272 bytes prism/private/wslib/calc-lib/1.0.7.24/Tanks
2004-Aug-17 10:17:18 3820 bytes prism/private/wslib/calc-lib/1.0.7.24/Tanks/FireVaporGen.clc
2004-Aug-17 10:17:18 3673 bytes prism/private/wslib/calc-lib/1.0.7.24/Tanks/PadFailure.clc
2004-Aug-17 10:17:20 5546 bytes prism/private/wslib/calc-lib/1.0.7.24/Tanks/PumpInLiquidThermal.clc
2004-Aug-17 10:17:20 3689 bytes prism/private/wslib/calc-lib/1.0.7.24/Tanks/PumpOutLiquidThermal.clc
2004-Aug-17 10:17:22 3189 bytes prism/private/wslib/calc-lib/1.0.7.24/Tanks/SteamOut.clc
2004-Aug-17 10:17:22 2799 bytes prism/private/wslib/calc-lib/1.0.7.24/Tanks/TankDraining.clc
2004-Aug-20 09:46:36 9954 bytes prism/private/wslib/calc-lib/1.0.7.24/TubeRuptureLiquid.clc
2004-Aug-27 21:00:42 8795 bytes prism/private/wslib/calc-lib/1.0.7.24/TubeRuptureVapor.clc
2004-Aug-19 14:04:24 6124 bytes prism/private/wslib/calc-lib/1.0.7.24/UserSpecifiedLiquid.clc
2004-Aug-27 21:00:52 4942 bytes prism/private/wslib/calc-lib/1.0.7.24/UserSpecifiedSteam.clc
2004-Aug-27 21:01:00 5866 bytes prism/private/wslib/calc-lib/1.0.7.24/UserSpecifiedVapor.clc
2004-Dec-13 10:28:28 850 bytes prism/private/wslib/calc-lib/1.0.7.24/Util
2003-Nov-11 18:36:28 605 bytes prism/private/wslib/calc-lib/1.0.7.24/Util/AreaAdequateChecks.clc
2003-Oct-29 14:25:16 786 bytes prism/private/wslib/calc-lib/1.0.7.24/Util/AreaChecks.clc
2004-Jul-16 07:58:36 5483 bytes prism/private/wslib/calc-lib/1.0.7.24/Util/CheckProtectingValves.clc
2004-Jun-15 12:04:20 3729 bytes prism/private/wslib/calc-lib/1.0.7.24/Util/CriticalFlow.clc
2004-Mar-08 13:39:08 1109 bytes prism/private/wslib/calc-lib/1.0.7.24/Util/CriticalTubeFlow.clc
2004-Aug-28 22:11:04 4739 bytes prism/private/wslib/calc-lib/1.0.7.24/Util/Kb.clc
2004-Mar-12 11:53:32 1555 bytes prism/private/wslib/calc-lib/1.0.7.24/Util/KbpLiquid.clc
2004-Aug-27 21:12:14 1926 bytes prism/private/wslib/calc-lib/1.0.7.24/Util/KbpVapor.clc 2004-Aug-26 15:41:26 1818 bytes prism/private/wslib/calc-lib/1.0.7.24/Util/KbpVapor.clc-01
2004-Mar-08 13:22:24 1125 bytes prism/private/wslib/calc-lib/1.0.7.24/Util/Kn.clc
2004-Mar-29 14:08:48 1380 bytes prism/private/wslib/calc-lib/1.0.7.24/Util/Ksh.clc
2004-Jul-07 15:10:20 10998 bytes prism/private/wslib/calc-lib/1.0.7.24/Util/Kv.clc
2004-Jul-07 15:16:44 4375 bytes prism/private/wslib/calc-lib/1.0.7.24/Util/Kw.clc
2004-Aug-23 15:07:26 6174 bytes prism/private/wslib/calc-lib/1.0.7.24/Util/ProtectedData.clc
2004-Aug-21 12:34:04 4923 bytes prism/private/wslib/calc-lib/1.0.7.24/Util/ProtectedDataTank.clc
2004-Aug-23 11:54:08 14233 bytes prism/private/wslib/calc-lib/1.0.7.24/Util/ProtectedDataVessel.clc
2004-Aug-27 22:27:56 18888 bytes prism/private/wslib/calc-lib/1.0.7.24/Util/ProtectingData.clc
2004-Aug-25 12:02:54 6093 bytes prism/private/wslib/calc-lib/1.0.7.24/Util/ProtectingDataTV.clc
2004-Jul-06 21:08:02 3283 bytes prism/private/wslib/calc-lib/1.0.7.24/Util/ReqSizingCode.clc
2004-Jun-21 16:11:04 1022 bytes prism/private/wslib/calc-lib/1.0.7.24/Util/ReqValveType.clc
2004-Jul-07 13:51:14 510 bytes prism/private/wslib/calc-lib/1.0.7.24/Util/ReynoldsToKu.clc
2004-May-20 10:34:54 1533 bytes prism/private/wslib/calc-lib/1.0.7.24/Util/VaporCapCreditCnvrt.clc
2004-Aug-17 11:26:12 767 bytes prism/private/wslib/calc-lib/1.0.7.24/Util/VentAdequateChecks.clc
2004-Dec-13 10:28:28 408 bytes prism/private/wslib/calc-lib/1.0.7.24/Vapor
2004-Jun-15 10:26:10 3951 bytes prism/private/wslib/calc-lib/1.0.7.24/Vapor/ControlValveVaporFlow.clc
2004-Jul-16 11:27:14 2520 bytes prism/private/wslib/calc-lib/1.0.7.24/Vapor/FGEVaporMass.clc
2004-Jun-23 15:01:10 1610 bytes prism/private/wslib/calc-lib/1.0.7.24/Vapor/FireGasCapacity.clc
2004-Aug-17 13:56:16 10053 bytes prism/private/wslib/calc-lib/1.0.7.24/Vapor/FireVaporCapacity.clc
2004-May-20 10:46:50 1185 bytes prism/private/wslib/calc-lib/1.0.7.24/Vapor/TubeRuptureVaporFlowCrit.clc
2004-May-20 10:46:58 881 bytes prism/private/wslib/calc-lib/1.0.7.24/Vapor/TubeRuptureVaporFlowSub.clc
2004-Jun-15 10:26:28 2099 bytes prism/private/wslib/calc-lib/1.0.7.24/Vapor/VaporMass.clc
2004-Feb-27 21:19:16 1725 bytes prism/private/wslib/calc-lib/1.0.7.24/Vapor/VaporProcessProps.clc
2004-Jul-06 15:36:52 7672 bytes prism/private/wslib/calc-lib/1.0.7.24/Vapor/VaporProps.clc
2004-Jun-15 10:27:02 2085 bytes prism/private/wslib/calc-lib/1.0.7.24/Vapor/VaporVol.clc
2004-Dec-13 10:28:28 1020 bytes prism/private/wslib/calc-lib/1.0.7.25
2004-Mar-12 16:08:46 12288 bytes prism/private/wslib/calc-lib/1.0.7.25/.swp
2004-Oct-08 13:52:08 6766 bytes prism/private/wslib/calc-lib/1.0.7.25/ControlValveLiquid.clc
2004-Oct-08 13:52:18 6715 bytes prism/private/wslib/calc-lib/1.0.7.25/ControlValveVapor.clc
2004-Dec-13 10:28:28 306 bytes prism/private/wslib/calc-lib/1.0.7.25/Device
2004-Jun-22 14:43:38 6127 bytes prism/private/wslib/calc-lib/1.0.7.25/Device/PRVDeviceData.clc
2003-Oct-10 14:17:08 3251 bytes prism/private/wslib/calc-lib/1.0.7.25/Device/PipeDeviceData.clc
2004-Oct-17 14:07:54 11538 bytes prism/private/wslib/calc-lib/1.0.7.25/Device/RDDeviceData.clc
2004-Sep-13 15:05:52 9797 bytes prism/private/wslib/calc-lib/1.0.7.25/Device/TVDeviceData.clc
2004-Aug-26 17:05:26 6882 bytes prism/private/wslib/calc-lib/1.0.7.25/Device/TankDeviceData.clc
2003-Oct-10 14:17:08 2672 bytes prism/private/wslib/calc-lib/1.0.7.25/Device/TurbineStmDeviceData.clc
2003-Oct-29 14:54:00 2665 bytes prism/private/wslib/calc-lib/1.0.7.25/Device/Vessel.clc
2004-Oct-08 13:52:32 6724 bytes prism/private/wslib/calc-lib/1.0.7.25/FireGasExpansion.clc
2004-Oct-08 13:52:42 6261 bytes prism/private/wslib/calc-lib/1.0.7.25/FireVaporGeneration.clc
2004-Dec-13 10:28:28 306 bytes prism/private/wslib/calc-lib/1.0.7.25/Fitting
2003-Oct-10 14:17:08 5636 bytes prism/private/wslib/calc-lib/1.0.7.25/Fitting/ExpandingFitting.clc
2003-Oct-10 14:17:08 4149 bytes prism/private/wslib/calc-lib/1.0.7.25/Fitting/ExpandingTeeSide.clc
2003-Oct-10 14:17:08 4153 bytes prism/private/wslib/calc-lib/1.0.7.25/Fitting/Pipe.clc
2004-Jul-02 16:58:00 5741 bytes prism/private/wslib/calc-lib/1.0.7.25/Fitting/ReducingFitting.clc
2003-Oct-10 14:17:08 4176 bytes prism/private/wslib/calc-lib/1.0.7.25/Fitting/ReducingTeeSide.clc
2003-Oct-10 14:17:08 4128 bytes prism/private/wslib/calc-lib/1.0.7.25/Fitting/StandardFitting.clc
2004-Jul-02 16:57:22 5741 bytes prism/private/wslib/calc-lib/1.0.7.25/Fitting/junk1
2004-Oct-08 13:52:50 6764 bytes prism/private/wslib/calc-lib/1.0.7.25/GivenFlowLiquid.clc
2004-Oct-08 13:53:02 5797 bytes prism/private/wslib/calc-lib/1.0.7.25/GivenFlowSteam.clc
2004-Oct-05 17:09:24 7337 bytes prism/private/wslib/calc-lib/1.0.7.25/GivenFlowVapor.clc
2004-Oct-06 14:01:52 9086 bytes prism/private/wslib/calc-lib/1.0.7.25/GivenFlowVapor.clc-RD
2004-Dec-13 10:28:28 272 bytes prism/private/wslib/calc-lib/1.0.7.25/Liquid
2004-Feb-15 20:52:26 1191 bytes prism/private/wslib/calc-lib/1.0.7.25/Liquid/ControlValveLiquidFlow.clc
2004-May-20 10:21:36 652 bytes prism/private/wslib/calc-lib/1.0.7.25/Liquid/LiquidExpansionCapacity.clc
2004-Jun-21 11:17:22 5116 bytes prism/private/wslib/calc-lib/1.0.7.25/Liquid/LiquidProps.clc
2004-Jul-07 13:46:44 5132 bytes prism/private/wslib/calc-lib/1.0.7.25/Liquid/LiquidVol.clc
2004-May-20 10:47:44 822 bytes prism/private/wslib/calc-lib/1.0.7.25/Liquid/TubeRuptureLiquidMassFlow.clc
2004-May-20 10:47:56 830 bytes prism/private/wslib/calc-lib/1.0.7.25/Liquid/TubeRuptureLiquidVolFlow.clc
2004-Oct-08 13:53:10 6058 bytes prism/private/wslib/calc-lib/1.0.7.25/LiquidExpansion.clc
2004-Oct-08 13:53:22 3484 bytes prism/private/wslib/calc-lib/1.0.7.25/NotImplemented.clc 2004-Dec-13 10:28:28 238 bytes prism/private/wslib/calc-lib/1.0.7.25/Omega
2004-Oct-12 16:26:36 10750 bytes prism/private/wslib/calc-lib/1.0.7.25/Omega/OmegaD21.clc
2004-Oct-12 16:27:22 8233 bytes prism/private/wslib/calc-lib/1.0.7.25/Omega/OmegaD22.clc
2004-Oct-12 16:24:18 13397 bytes prism/private/wslib/calc-lib/1.0.7.25/Omega/OmegaD23.clc
2004-Oct-08 17:11:00 7575 bytes prism/private/wslib/calc-lib/1.0.7.25/Omega/OmegaTwoPhase.clc
2004-Dec-13 10:28:28 918 bytes prism/private/wslib/calc-lib/1.0.7.25/Omega/Util
2004-Sep-28 14:48:56 606 bytes prism/private/wslib/calc-lib/1.0.7.25/Omega/Util/InletVoidFraction.clc
2004-Sep-16 11:28:44 627 bytes prism/private/wslib/calc-lib/1.0.7.25/Omega/Util/OmegaAreaD21.clc
2004-Sep-28 10:26:54 721 bytes prism/private/wslib/calc-lib/1.0.7.25/Omega/Util/OmegaAreaD22.clc
2004-Sep-29 16:05:42 627 bytes prism/private/wslib/calc-lib/1.0.7.25/Omega/Util/OmegaAreaD23.clc
2004-Oct-12 16:34:04 3641 bytes prism/private/wslib/calc-lib/1.0.7.25/Omega/Util/OmegaCriticalFlowD14.clc
2004-Oct-12 16:34:22 2075 bytes prism/private/wslib/calc-lib/1.0.7.25/Omega/Util/OmegaCriticalFlowD15.clc
2004-Sep-27 13:32:40 1706 bytes prism/private/wslib/calc-lib/1.0.7.25/Omega/Util/OmegaCriticalFlowD21.clc
2004-Oct-12 16:29:10 3767 bytes prism/private/wslib/calc-lib/1.0.7.25/Omega/Util/OmegaCriticalFlowD22.clc
2004-Sep-22 13:16:56 1095 bytes prism/private/wslib/calc-lib/1.0.7.25/Omega/Util/OmegaD1.clc
2004-Sep-29 10:51:02 970 bytes prism/private/wslib/calc-lib/1.0.7.25/Omega/Util/OmegaD14.clc
2004-Sep-29 12:50:10 507 bytes prism/private/wslib/calc-lib/1.0.7.25/Omega/Util/OmegaD15.clc
2004-Sep-22 13:24:06 1073 bytes prism/private/wslib/calc-lib/1.0.7.25/Omega/Util/OmegaD2.clc
2004-Sep-22 13:43:36 510 bytes prism/private/wslib/calc-lib/1.0.7.25/Omega/Util/OmegaD3.clc
2004-Sep-22 14:05:30 628 bytes prism/private/wslib/calc-lib/1.0.7.25/Omega/Util/OmegaD4.clc
2004-Sep-27 13:14:56 830 bytes prism/private/wslib/calc-lib/1.0.7.25/Omega/Util/OmegaD8.clc
2004-Sep-28 11:11:50 468 bytes prism/private/wslib/calc-lib/1.0.7.25/Omega/Util/OmegaD9.clc
2004-Oct-12 16:35:12 4604 bytes prism/private/wslib/calc-lib/1.0.7.25/Omega/Util/OmegaKd1234.clc
2004-Oct-12 16:30:20 4604 bytes prism/private/wslib/calc-lib/1.0.7.25/Omega/Util/OmegaKd1415.clc
2004-Oct-12 16:35:54 1878 bytes prism/private/wslib/calc-lib/1.0.7.25/Omega/Util/OmegaKd89.clc
2004-Oct-12 16:36:14 5586 bytes prism/private/wslib/calc-lib/1.0.7.25/Omega/Util/OmegaMassFluxD14.clc
2004-Oct-13 10:46:12 1979 bytes prism/private/wslib/calc-lib/1.0.7.25/Omega/Util/OmegaMassFluxD15.clc
2004-Oct-13 10:46:22 2049 bytes prism/private/wslib/calc-lib/1.0.7.25/Omega/Util/OmegaMassFluxD21.clc
2004-Oct-13 10:45:38 2875 bytes prism/private/wslib/calc-lib/1.0.7.25/Omega/Util/OmegaMassFluxD22.clc
2004-Oct-12 16:33:28 1431 bytes prism/private/wslib/calc-lib/1.0.7.25/Omega/Util/OmegaSubcoolingRegionD22.clc
2004-Sep-14 15:03:40 1522 bytes prism/private/wslib/calc-lib/1.0.7.25/Omega/Util/ThermodynamicCritPoint.clc
2004-Dec-13 10:28:28 578 bytes prism/private/wslib/calc-lib/1.0.7.25/PipingLoss
2004-Jun-15 11:57:02 4665 bytes prism/private/wslib/calc-lib/1.0.7.25/PipingLoss/CheckInlet.clc
2004-Jun-15 11:57:16 5318 bytes prism/private/wslib/calc-lib/1.0.7.25/PipingLoss/CheckOutlet.clc
2004-Jun-11 10:26:26 637 bytes prism/private/wslib/calc-lib/1.0.7.25/PipingLoss/HDelta.clc
2004-Oct-15 11:32:06 30735 bytes prism/private/wslib/calc-lib/1.0.7.25/PipingLoss/Liquid.clc
2004-Jun-22 11:24:14 2195 bytes prism/private/wslib/calc-lib/1.0.7.25/PipingLoss/LiquidDrop.clc
2004-Oct-08 14:16:32 16695 bytes prism/private/wslib/calc-lib/1.0.7.25/PipingLoss/MaxRelCapLiquid.clc
2004-Oct-08 14:46:32 15819 bytes prism/private/wslib/calc-lib/1.0.7.25/PipingLoss/MaxRelCapSteam.clc
2004-Oct-08 14:45:44 16840 bytes prism/private/wslib/calc-lib/1.0.7.25/PipingLoss/MaxRelCapVapor.clc
2004-Oct-08 14:49:20 16939 bytes prism/private/wslib/calc-lib/1.0.7.25/PipingLoss/MaxRelCapVaporFixedBP.clc
2004-May-19 17:44:18 9733 bytes prism/private/wslib/calc-lib/1.0.7.25/PipingLoss/NotImplemented.clc
2004-Aug-23 10:11:28 17820 bytes prism/private/wslib/calc-lib/1.0.7.25/PipingLoss/PipingLossInit.clc
2004-Oct-15 11:32:12 34466 bytes prism/private/wslib/calc-lib/1.0.7.25/PipingLoss/Steam.clc
2004-Oct-18 14:56:44 38932 bytes prism/private/wslib/calc-lib/1.0.7.25/PipingLoss/Vapor.clc
2004-Aug-20 15:54:56 2513 bytes prism/private/wslib/calc-lib/1.0.7.25/PipingLoss/VaporDropIn.clc
2004-Aug-20 15:55:38 6784 bytes prism/private/wslib/calc-lib/1.0.7.25/PipingLoss/VaporDropOut.clc
2004-Dec-13 10:28:28 204 bytes prism/private/wslib/calc-lib/1.0.7.25/Post
2004-Jul-15 22:18:44 11722 bytes prism/private/wslib/calc-lib/1.0.7.25/Post/AcousticVibration.clc
2004-Jun-21 11:19:34 1812 bytes prism/private/wslib/calc-lib/1.0.7.25/Post/NoiseLevel.clc
2004-Jun-24 10:44:26 1575 bytes prism/private/wslib/calc-lib/1.0.7.25/Post/ReactionForceSteam.clc
2004-Jun-15 12:02:44 1503 bytes prism/private/wslib/calc-lib/1.0.7.25/Post/ReactionForceVapor.clc
2004-Dec-13 10:28:28 374 bytes prism/private/wslib/calc-lib/1.0.7.25/Pressure
2004-Jun-04 11:58:24 1514 bytes prism/private/wslib/calc-lib/1.0.7.25/Pressure/BackPressure.clc
2004-Jun-21 11:20:40 2461 bytes prism/private/wslib/calc-lib/1.0.7.25/Pressure/BackPressureCheck.clc
2004-Feb-27 19:14:28 2058 bytes prism/private/wslib/calc-lib/1.0.7.25/Pressure/ColdDiffTestPressure.clc
2004-Jul-07 10:35:00 6605 bytes prism/private/wslib/calc-lib/1.0.7.25/Pressure/MRCPOverPRelief.clc
2004-Jun-15 10:24:58 1150 bytes prism/private/wslib/calc-lib/1.0.7.25/Pressure/PAtm.clc
2004-Mar-18 11:31:24 708 bytes prism/private/wslib/calc-lib/1.0.7.25/Pressure/PDelta.clc
2004-Sep-01 10:42:12 15261 bytes prism/private/wslib/calc-lib/1.0.7.25/Pressure/POverPRelief.clc
2004-Jul-15 20:21:40 2670 bytes prism/private/wslib/calc-lib/1.0.7.25/Pressure/PressureChecks.clc 2004-Jul-08 17:07:12 852 bytes prism/private/wslib/calc-lib/1.0.7.25/Pressure/notes.txt
2004-Dec-13 10:28:28 442 bytes prism/private/wslib/calc-lib/1.0.7.25/RuptureDisks
2004-Oct-06 18:19:26 4665 bytes prism/private/wslib/calc-lib/1.0.7.25/RuptureDisks/CheckInlet.clc
2004-Oct-06 18:19:38 5318 bytes prism/private/wslib/calc-lib/1.0.7.25/RuptureDisks/CheckOutlet.clc
2004-Jun-11 10:26:26 637 bytes prism/private/wslib/calc-lib/1.0.7.25/RuptureDisks/HDelta.clc
2004-Dec-13 10:28:28 272 bytes prism/private/wslib/calc-lib/1.0.7.25/RuptureDisks/Holding
2004-Oct-15 11:32:52 26669 bytes prism/private/wslib/calc-lib/1.0.7.25/RuptureDisks/Holding/Liquid.clc
2004-Oct-06 18:20:02 2195 bytes prism/private/wslib/calc-lib/1.0.7.25/RuptureDisks/Holding/LiquidDrop.clc
2004-Oct-06 18:23:02 16675 bytes prism/private/wslib/calc-lib/1.0.7.25/RuptureDisks/Holding/MaxRelCapLiquid.clc
2004-Oct-06 18:23:08 15800 bytes prism/private/wslib/calc-lib/1.0.7.25/RuptureDisks/Holding/MaxRelCapSteam.clc
2004-May-19 17:44:18 9733 bytes prism/private/wslib/calc-lib/1.0.7.25/RuptureDisks/Holding/NotImplemented.clc
2004-Oct-15 11:32:58 34631 bytes prism/private/wslib/calc-lib/1.0.7.25/RuptureDisks/Holding/Steam.clc
2004-Oct-15 12:04:30 6144 bytes prism/private/wslib/calc-lib/1.0.7.25/RuptureDisks/MRCPOverPRelief.clc
2004-Oct-18 14:10:46 11742 bytes prism/private/wslib/calc-lib/1.0.7.25/RuptureDisks/MaxRelCapVapor.clc
2004-Oct-08 14:26:06 9735 bytes prism/private/wslib/calc-lib/1.0.7.25/RuptureDisks/NotImplemented.clc
2004-Dec-13 10:28:28 136 bytes prism/private/wslib/calc-lib/1.0.7.25/RuptureDisks/Old
2004-Oct-06 18:20:32 2513 bytes prism/private/wslib/calc-lib/1.0.7.25/RuptureDisks/Old/VaporDropIn.clc
2004-Oct-06 18:20:36 6784 bytes prism/private/wslib/calc-lib/1.0.7.25/RuptureDisks/Old/VaporDropOut.clc
2004-Oct-18 13:50:20 18069 bytes prism/private/wslib/calc-lib/1.0.7.25/RuptureDisks/PipingLossInit.clc
2004-Oct-18 13:56:56 25360 bytes prism/private/wslib/calc-lib/1.0.7.25/RuptureDisks/Vapor.clc
2004-Oct-18 13:56:14 10708 bytes prism/private/wslib/calc-lib/1.0.7.25/RuptureDisks/VaporDrop.clc
2004-Dec-13 10:28:28 136 bytes prism/private/wslib/calc-lib/1.0.7.25/Steam
2004-Mar-29 14:10:14 947 bytes prism/private/wslib/calc-lib/1.0.7.25/Steam/Steam.clc
2004-Jun-15 20:22:40 929 bytes prism/private/wslib/calc-lib/1.0.7.25/Steam/SteamProps.clc
2004-Dec-13 10:28:28 408 bytes prism/private/wslib/calc-lib/1.0.7.25/Tanks
2004-Oct-08 17:09:02 3530 bytes prism/private/wslib/calc-lib/1.0.7.25/Tanks/FireVaporGen.clc
2004-Oct-15 09:22:20 2798 bytes prism/private/wslib/calc-lib/1.0.7.25/Tanks/GivenInFlow.clc
2004-Oct-15 09:22:18 2875 bytes prism/private/wslib/calc-lib/1.0.7.25/Tanks/GivenOutFlow.clc
2004-Oct-08 17:10:56 3311 bytes prism/private/wslib/calc-lib/1.0.7.25/Tanks/PadFailure.clc
2004-Dec-13 10:28:28 170 bytes prism/private/wslib/calc-lib/1.0.7.25/Tanks/Pressure
2004-Oct-07 16:31:22 1891 bytes prism/private/wslib/calc-lib/1.0.7.25/Tanks/Pressure/PresPOverTV.clc
2004-Oct-12 15:04:36 1814 bytes prism/private/wslib/calc-lib/1.0.7.25/Tanks/Pressure/VacPOverTV.clc
2004-Sep-17 11:35:26 419 bytes prism/private/wslib/calc-lib/1.0.7.25/Tanks/Pressure/pressure-notes.txt
2004-Oct-08 17:09:58 5251 bytes prism/private/wslib/calc-lib/1.0.7.25/Tanks/PumpInLiquidThermal.clc
2004-Oct-08 17:10:22 3344 bytes prism/private/wslib/calc-lib/1.0.7.25/Tanks/PumpOutLiquidThermal.clc
2004-Oct-13 17:21:28 2892 bytes prism/private/wslib/calc-lib/1.0.7.25/Tanks/SteamOut.clc
2004-Oct-08 17:10:44 2302 bytes prism/private/wslib/calc-lib/1.0.7.25/Tanks/TankDraining.clc
2004-Dec-13 10:28:28 510 bytes prism/private/wslib/calc-lib/1.0.7.25/Tanks/Util
2004-Oct-14 17:01:20 1184 bytes prism/private/wslib/calc-lib/1.0.7.25/Tanks/Util/GasAirConvert.clc
2004-Oct-13 10:53:06 9513 bytes prism/private/wslib/calc-lib/1.0.7.25/Tanks/Util/ProtectedDataFire.clc
2004-Oct-13 10:38:06 1122 bytes prism/private/wslib/calc-lib/1.0.7.25/Tanks/Util/ProtectedDataGivenInFlow.clc
2004-Oct-13 10:42:16 4811 bytes prism/private/wslib/calc-lib/1.0.7.25/Tanks/Util/ProtectedDataGivenOutFlow.clc
2004-Oct-13 10:38:46 4962 bytes prism/private/wslib/calc-lib/1.0.7.25/Tanks/Util/ProtectedDataPadFail.clc
2004-Oct-13 10:39:40 6549 bytes prism/private/wslib/calc-lib/1.0.7.25/Tanks/Util/ProtectedDataPumpIn.clc
2004-Oct-13 10:40:04 2673 bytes prism/private/wslib/calc-lib/1.0.7.25/Tanks/Util/ProtectedDataPumpOut.clc
2004-Oct-13 10:40:44 2646 bytes prism/private/wslib/calc-lib/1.0.7.25/Tanks/Util/ProtectedDataSteam.clc
2004-Oct-13 10:41:02 1513 bytes prism/private/wslib/calc-lib/1.0.7.25/Tanks/Util/ProtectedDataTankDrain.clc
2004-Oct-12 16:18:10 4418 bytes prism/private/wslib/calc-lib/1.0.7.25/Tanks/Util/ProtectingDataFire.clc
2004-Oct-13 10:43:12 4345 bytes prism/private/wslib/calc-lib/1.0.7.25/Tanks/Util/ProtectingDataPressure.clc
2004-Oct-13 10:43:48 4261 bytes prism/private/wslib/calc-lib/1.0.7.25/Tanks/Util/ProtectingDataVacuum.clc
2004-Oct-12 14:08:26 743 bytes prism/private/wslib/calc-lib/1.0.7.25/Tanks/Util/VentAdequateChecks.clc
2004-Oct-08 13:53:26 10465 bytes prism/private/wslib/calc-lib/1.0.7.25/TubeRuptureLiquid.clc
2004-Oct-08 13:53:30 9254 bytes prism/private/wslib/calc-lib/1.0.7.25/TubeRuptureVapor.clc
2004-Oct-08 13:53:36 6349 bytes prism/private/wslib/calc-lib/1.0.7.25/UserSpecifiedLiquid.clc
2004-Oct-08 13:53:40 5215 bytes prism/private/wslib/calc-lib/1.0.7.25/UserSpecifiedSteam.clc
2004-Oct-08 13:53:48 6091 bytes prism/private/wslib/calc-lib/1.0.7.25/UserSpecifiedVapor.clc
2004-Dec-13 10:28:28 884 bytes prism/private/wslib/calc-lib/1.0.7.25/Util
2003-Nov-11 18:36:28 605 bytes prism/private/wslib/calc-lib/1.0.7.25/Util/AreaAdequateChecks.clc
2003-Oct-29 14:25:16 786 bytes prism/private/wslib/calc-lib/1.0.7.25/Util/AreaChecks.clc
2004-Oct-15 11:28:32 6504 bytes prism/private/wslib/calc-lib/1.0.7.25/Util/CheckProtectingValves.clc
2004-Sep-19 12:54:20 5637 bytes prism/private/wslib/calc-lib/1.0.7.25/Util/CheckProtectingValves.clc-01

2004-Oct-06 14:20:40 6216 bytes prism/private/wslib/calc-lib/1.0.7.25/Util/CheckProtectingValves.clc-02
2004-Jun-15 12:04:20 3729 bytes prism/private/wslib/calc-lib/1.0.7.25/Util/CriticalFlow.clc
2004-Mar-08 13:39:08 1109 bytes prism/private/wslib/calc-lib/1.0.7.25/Util/CriticalTubeFlow.clc
2004-Sep-29 14:30:34 4723 bytes prism/private/wslib/calc-lib/1.0.7.25/Util/Kb.clc
2004-Mar-12 11:53:32 1555 bytes prism/private/wslib/calc-lib/1.0.7.25/Util/KbpLiquid.clc
2004-Sep-29 14:29:46 1874 bytes prism/private/wslib/calc-lib/1.0.7.25/Util/KbpVapor.clc
2004-Mar-08 13:22:24 1125 bytes prism/private/wslib/calc-lib/1.0.7.25/Util/Kn.clc
2004-Mar-29 14:08:48 1380 bytes prism/private/wslib/calc-lib/1.0.7.25/Util/Ksh.clc
2004-Jul-07 15:10:20 10998 bytes prism/private/wslib/calc-lib/1.0.7.25/Util/Kv.clc
2004-Jul-07 15:16:44 4375 bytes prism/private/wslib/calc-lib/1.0.7.25/Util/Kw.clc
2004-Aug-23 15:07:26 6174 bytes prism/private/wslib/calc-lib/1.0.7.25/Util/ProtectedData.clc
2004-Aug-23 11:54:08 14233 bytes prism/private/wslib/calc-lib/1.0.7.25/Util/ProtectedDataVessel.clc
2004-Oct-15 11:28:46 19329 bytes prism/private/wslib/calc-lib/1.0.7.25/Util/ProtectingData.clc
2004-Oct-06 13:22:10 18888 bytes prism/private/wslib/calc-lib/1.0.7.25/Util/ProtectingData.clc-01
2004-Oct-06 13:26:04 18888 bytes prism/private/wslib/calc-lib/1.0.7.25/Util/ProtectingData.clc-02
2004-Jul-06 21:08:02 3283 bytes prism/private/wslib/calc-lib/1.0.7.25/Util/ReqSizingCode.clc
2004-Jun-21 16:11:04 1022 bytes prism/private/wslib/calc-lib/1.0.7.25/Util/ReqValveType.clc
2004-Jul-07 13:51:14 510 bytes prism/private/wslib/calc-lib/1.0.7.25/Util/ReynoldsToKu.clc
2004-Sep-14 15:03:40 1522 bytes prism/private/wslib/calc-lib/1.0.7.25/Util/ThermodynamicCritPoint.clc
2004-May-20 10:34:54 1533 bytes prism/private/wslib/calc-lib/1.0.7.25/Util/VaporCapCreditCnvrt.clc
2004-Dec-13 10:28:28 408 bytes prism/private/wslib/calc-lib/1.0.7.25/Vapor
2004-Jun-15 10:26:10 3951 bytes prism/private/wslib/calc-lib/1.0.7.25/Vapor/ControlValveVaporFlow.clc
2004-Jul-16 11:27:14 2520 bytes prism/private/wslib/calc-lib/1.0.7.25/Vapor/FGEVaporMass.clc
2004-Jun-23 15:01:10 1610 bytes prism/private/wslib/calc-lib/1.0.7.25/Vapor/FireGasCapacity.clc
2004-Aug-17 13:56:16 10053 bytes prism/private/wslib/calc-lib/1.0.7.25/Vapor/FireVaporCapacity.clc
2004-May-20 10:46:50 1185 bytes prism/private/wslib/calc-lib/1.0.7.25/Vapor/TubeRuptureVaporFlowCrit.clc
2004-May-20 10:46:58 881 bytes prism/private/wslib/calc-lib/1.0.7.25/Vapor/TubeRuptureVaporFlowSub.clc
2004-Jun-15 10:26:28 2099 bytes prism/private/wslib/calc-lib/1.0.7.25/Vapor/VaporMass.clc
2004-Feb-27 21:19:16 1725 bytes prism/private/wslib/calc-lib/1.0.7.25/Vapor/VaporProcessProps.clc
2004-Jul-06 15:36:52 7672 bytes prism/private/wslib/calc-lib/1.0.7.25/Vapor/VaporProps.clc
2004-Jun-15 10:27:02 2085 bytes prism/private/wslib/calc-lib/1.0.7.25/Vapor/VaporVol.clc
2004-Dec-13 10:28:29 1054 bytes prism/private/wslib/calc-lib/1.0.7.26
2004-Mar-12 16:08:46 12288 bytes prism/private/wslib/calc-lib/1.0.7.26/.swp
2004-Oct-08 13:52:08 6766 bytes prism/private/wslib/calc-lib/1.0.7.26/ControlValveLiquid.clc
2004-Oct-08 13:52:18 6715 bytes prism/private/wslib/calc-lib/1.0.7.26/ControlValveVapor.clc
2004-Dec-13 10:28:28 306 bytes prism/private/wslib/calc-lib/1.0.7.26/Device
2004-Jun-22 14:43:38 6127 bytes prism/private/wslib/calc-lib/1.0.7.26/Device/PRVDeviceData.clc
2003-Oct-10 14:17:08 3251 bytes prism/private/wslib/calc-lib/1.0.7.26/Device/PipeDeviceData.clc
2004-Oct-19 12:04:00 12379 bytes prism/private/wslib/calc-lib/1.0.7.26/Device/RDDeviceData.clc
2004-Sep-13 15:05:52 9797 bytes prism/private/wslib/calc-lib/1.0.7.26/Device/TVDeviceData.clc
2004-Aug-26 17:05:26 6882 bytes prism/private/wslib/calc-lib/1.0.7.26/Device/TankDeviceData.clc
2003-Oct-10 14:17:08 2672 bytes prism/private/wslib/calc-lib/1.0.7.26/Device/TurbineStmDeviceData.clc
2003-Oct-29 14:54:00 2665 bytes prism/private/wslib/calc-lib/1.0.7.26/Device/Vessel.clc
2004-Oct-08 13:52:32 6724 bytes prism/private/wslib/calc-lib/1.0.7.26/FireGasExpansion.clc
2004-Oct-08 13:52:42 6261 bytes prism/private/wslib/calc-lib/1.0.7.26/FireVaporGeneration.clc
2004-Dec-13 10:28:28 306 bytes prism/private/wslib/calc-lib/1.0.7.26/Fitting
2003-Oct-10 14:17:08 5636 bytes prism/private/wslib/calc-lib/1.0.7.26/Fitting/ExpandingFitting.clc
2003-Oct-10 14:17:08 4149 bytes prism/private/wslib/calc-lib/1.0.7.26/Fitting/ExpandingTeeSide.clc
2003-Oct-10 14:17:08 4153 bytes prism/private/wslib/calc-lib/1.0.7.26/Fitting/Pipe.clc
2004-Jul-02 16:58:00 5741 bytes prism/private/wslib/calc-lib/1.0.7.26/Fitting/ReducingFitting.clc
2003-Oct-10 14:17:08 4176 bytes prism/private/wslib/calc-lib/1.0.7.26/Fitting/ReducingTeeSide.clc
2003-Oct-10 14:17:08 4128 bytes prism/private/wslib/calc-lib/1.0.7.26/Fitting/StandardFitting.clc
2004-Jul-02 16:57:22 5741 bytes prism/private/wslib/calc-lib/1.0.7.26/Fitting/junk1
2004-Oct-08 13:52:50 6764 bytes prism/private/wslib/calc-lib/1.0.7.26/GivenFlowLiquid.clc
2004-Oct-08 13:53:02 5797 bytes prism/private/wslib/calc-lib/1.0.7.26/GivenFlowSteam.clc
2004-Oct-05 17:09:24 7337 bytes prism/private/wslib/calc-lib/1.0.7.26/GivenFlowVapor.clc
2004-Oct-06 14:01:52 9086 bytes prism/private/wslib/calc-lib/1.0.7.26/GivenFlowVapor.clc-RD
2004-Dec-13 10:28:29 272 bytes prism/private/wslib/calc-lib/1.0.7.26/Liquid
2004-Feb-15 20:52:26 1191 bytes prism/private/wslib/calc-lib/1.0.7.26/Liquid/ControlValveLiquidFlow.clc
2004-May-20 10:21:36 652 bytes prism/private/wslib/calc-lib/1.0.7.26/Liquid/LiquidExpansionCapacity.clc
2004-Jun-21 11:17:22 5116 bytes prism/private/wslib/calc-lib/1.0.7.26/Liquid/LiquidProps.clc 2004-Jul-07 13:46:44 5132 bytes prism/private/wslib/calc-lib/1.0.7.26/Liquid/LiquidVol.clc
2004-May-20 10:47:44 822 bytes prism/private/wslib/calc-lib/1.0.7.26/Liquid/TubeRuptureLiquidMassFlow.clc
2004-May-20 10:47:56 830 bytes prism/private/wslib/calc-lib/1.0.7.26/Liquid/TubeRuptureLiquidVolFlow.clc
2004-Oct-08 13:53:10 6058 bytes prism/private/wslib/calc-lib/1.0.7.26/LiquidExpansion.clc
2004-Oct-08 13:53:22 3484 bytes prism/private/wslib/calc-lib/1.0.7.26/NotImplemented.clc
2004-Dec-13 10:28:29 238 bytes prism/private/wslib/calc-lib/1.0.7.26/Omega
2004-Oct-12 16:26:36 10750 bytes prism/private/wslib/calc-lib/1.0.7.26/Omega/OmegaD21.clc
2004-Oct-12 16:27:22 8233 bytes prism/private/wslib/calc-lib/1.0.7.26/Omega/OmegaD22.clc
2004-Oct-12 16:24:18 13397 bytes prism/private/wslib/calc-lib/1.0.7.26/Omega/OmegaD23.clc
2004-Oct-08 17:11:00 7575 bytes prism/private/wslib/calc-lib/1.0.7.26/Omega/OmegaTwoPhase.clc
2004-Dec-13 10:28:29 918 bytes prism/private/wslib/calc-lib/1.0.7.26/Omega/Util
2004-Sep-28 14:48:56 606 bytes prism/private/wslib/calc-lib/1.0.7.26/Omega/Util/InletVoidFraction.clc
2004-Sep-16 11:28:44 627 bytes prism/private/wslib/calc-lib/1.0.7.26/Omega/Util/OmegaAreaD21.clc
2004-Sep-28 10:26:54 721 bytes prism/private/wslib/calc-lib/1.0.7.26/Omega/Util/OmegaAreaD22.clc
2004-Sep-29 16:05:42 627 bytes prism/private/wslib/calc-lib/1.0.7.26/Omega/Util/OmegaAreaD23.clc
2004-Oct-12 16:34:04 3641 bytes prism/private/wslib/calc-lib/1.0.7.26/Omega/Util/OmegaCriticalFlowD14.clc
2004-Oct-12 16:34:22 2075 bytes prism/private/wslib/calc-lib/1.0.7.26/Omega/Util/OmegaCriticalFlowD15.clc
2004-Sep-27 13:32:40 1706 bytes prism/private/wslib/calc-lib/1.0.7.26/Omega/Util/OmegaCriticalFlowD21.clc
2004-Oct-12 16:29:10 3767 bytes prism/private/wslib/calc-lib/1.0.7.26/Omega/Util/OmegaCriticalFlowD22.clc
2004-Sep-22 13:16:56 1095 bytes prism/private/wslib/calc-lib/1.0.7.26/Omega/Util/OmegaD1.clc
2004-Sep-29 10:51:02 970 bytes prism/private/wslib/calc-lib/1.0.7.26/Omega/Util/OmegaD14.clc
2004-Sep-29 12:50:10 507 bytes prism/private/wslib/calc-lib/1.0.7.26/Omega/Util/OmegaD15.clc
2004-Sep-22 13:24:06 1073 bytes prism/private/wslib/calc-lib/1.0.7.26/Omega/Util/OmegaD2.clc
2004-Sep-22 13:43:36 510 bytes prism/private/wslib/calc-lib/1.0.7.26/Omega/Util/OmegaD3.clc
2004-Sep-22 14:05:30 628 bytes prism/private/wslib/calc-lib/1.0.7.26/Omega/Util/OmegaD4.clc
2004-Sep-27 13:14:56 830 bytes prism/private/wslib/calc-lib/1.0.7.26/Omega/Util/OmegaD8.clc
2004-Sep-28 11:11:50 468 bytes prism/private/wslib/calc-lib/1.0.7.26/Omega/Util/OmegaD9.clc
2004-Oct-12 16:35:12 4604 bytes prism/private/wslib/calc-lib/1.0.7.26/Omega/Util/OmegaKd1234.clc
2004-Oct-12 16:30:20 4604 bytes prism/private/wslib/calc-lib/1.0.7.26/Omega/Util/OmegaKd1415.clc
2004-Oct-12 16:35:54 1878 bytes prism/private/wslib/calc-lib/1.0.7.26/Omega/Util/OmegaKd89.clc
2004-Oct-12 16:36:14 5586 bytes prism/private/wslib/calc-lib/1.0.7.26/Omega/Util/OmegaMassFluxD14.clc
2004-Oct-13 10:46:12 1979 bytes prism/private/wslib/calc-lib/1.0.7.26/Omega/Util/OmegaMassFluxD15.clc
2004-Oct-13 10:46:22 2049 bytes prism/private/wslib/calc-lib/1.0.7.26/Omega/Util/OmegaMassFluxD21.clc
2004-Oct-13 10:45:38 2875 bytes prism/private/wslib/calc-lib/1.0.7.26/Omega/Util/OmegaMassFluxD22.clc
2004-Oct-12 16:33:28 1431 bytes prism/private/wslib/calc-lib/1.0.7.26/Omega/Util/OmegaSubcoolingRegionD22.clc
2004-Sep-14 15:03:40 1522 bytes prism/private/wslib/calc-lib/1.0.7.26/Omega/Util/ThermodynamicCritPoint.clc
2004-Dec-13 10:28:29 578 bytes prism/private/wslib/calc-lib/1.0.7.26/PipingLoss
2004-Jun-15 11:57:02 4665 bytes prism/private/wslib/calc-lib/1.0.7.26/PipingLoss/CheckInlet.clc
2004-Jun-15 11:57:16 5318 bytes prism/private/wslib/calc-lib/1.0.7.26/PipingLoss/CheckOutlet.clc
2004-Jun-11 10:26:26 637 bytes prism/private/wslib/calc-lib/1.0.7.26/PipingLoss/HDelta.clc
2004-Oct-15 11:32:06 30735 bytes prism/private/wslib/calc-lib/1.0.7.26/PipingLoss/Liquid.clc
2004-Jun-22 11:24:14 2195 bytes prism/private/wslib/calc-lib/1.0.7.26/PipingLoss/LiquidDrop.clc
2004-Oct-08 14:16:32 16695 bytes prism/private/wslib/calc-lib/1.0.7.26/PipingLoss/MaxRelCapLiquid.clc
2004-Oct-08 14:46:32 15819 bytes prism/private/wslib/calc-lib/1.0.7.26/PipingLoss/MaxRelCapSteam.clc
2004-Oct-08 14:45:44 16840 bytes prism/private/wslib/calc-lib/1.0.7.26/PipingLoss/MaxRelCapVapor.clc
2004-Oct-08 14:49:20 16939 bytes prism/private/wslib/calc-lib/1.0.7.26/PipingLoss/MaxRelCapVaporFixedBP.clc
2004-May-19 17:44:18 9733 bytes prism/private/wslib/calc-lib/1.0.7.26/PipingLoss/NotImplemented.clc
2004-Aug-23 10:11:28 17820 bytes prism/private/wslib/calc-lib/1.0.7.26/PipingLoss/PipingLossInit.clc
2004-Oct-15 11:32:12 34466 bytes prism/private/wslib/calc-lib/1.0.7.26/PipingLoss/Steam.clc
2004-Oct-18 14:57:12 38932 bytes prism/private/wslib/calc-lib/1.0.7.26/PipingLoss/Vapor.clc
2004-Aug-20 15:54:56 2513 bytes prism/private/wslib/calc-lib/1.0.7.26/PipingLoss/VaporDropIn.clc
2004-Aug-20 15:55:38 6784 bytes prism/private/wslib/calc-lib/1.0.7.26/PipingLoss/VaporDropOut.clc
2004-Dec-13 10:28:29 204 bytes prism/private/wslib/calc-lib/1.0.7.26/Post
2004-Jul-15 22:18:44 11722 bytes prism/private/wslib/calc-lib/1.0.7.26/Post/AcousticVibration.clc
2004-Jun-21 11:19:34 1812 bytes prism/private/wslib/calc-lib/1.0.7.26/Post/NoiseLevel.clc
2004-Jun-24 10:44:26 1575 bytes prism/private/wslib/calc-lib/1.0.7.26/Post/ReactionForceSteam.clc
2004-Jun-15 12:02:44 1503 bytes prism/private/wslib/calc-lib/1.0.7.26/Post/ReactionForceVapor.clc
2004-Dec-13 10:28:29 374 bytes prism/private/wslib/calc-lib/1.0.7.26/Pressure
2004-Jun-04 11:58:24 1514 bytes prism/private/wslib/calc-lib/1.0.7.26/Pressure/BackPressure.clc
2004-Jun-21 11:20:40 2461 bytes prism/private/wslib/calc-lib/1.0.7.26/Pressure/BackPressureCheck.clc
2004-Feb-27 19:14:28 2058 bytes prism/private/wslib/calc-lib/1.0.7.26/Pressure/ColdDiffTestPressure.clc

```
2004-Jul-07 10:35:00  6605 bytes  prism/private/wslib/calc-lib/1.0.7.26/Pressure/MRCPOverPRelief.clc
2004-Jun-15 10:24:58  1150 bytes  prism/private/wslib/calc-lib/1.0.7.26/Pressure/PAtm.clc
2004-Mar-18 11:31:24   708 bytes  prism/private/wslib/calc-lib/1.0.7.26/Pressure/PDelta.clc
2004-Sep-01 10:42:12 15261 bytes  prism/private/wslib/calc-lib/1.0.7.26/Pressure/POverPRelief.clc
2004-Jul-15 20:21:40  2670 bytes  prism/private/wslib/calc-lib/1.0.7.26/Pressure/PressureChecks.clc
2004-Jul-08 17:07:12   852 bytes  prism/private/wslib/calc-lib/1.0.7.26/Pressure/notes.txt
2004-Dec-13 10:28:29   408 bytes  prism/private/wslib/calc-lib/1.0.7.26/RuptureDisks
2004-Oct-06 18:19:26  4665 bytes  prism/private/wslib/calc-lib/1.0.7.26/RuptureDisks/CheckInlet.clc
2004-Oct-06 18:19:38  5318 bytes  prism/private/wslib/calc-lib/1.0.7.26/RuptureDisks/CheckOutlet.clc
2004-Jun-11 10:26:26   637 bytes  prism/private/wslib/calc-lib/1.0.7.26/RuptureDisks/HDelta.clc
2004-Dec-13 10:28:29   272 bytes  prism/private/wslib/calc-lib/1.0.7.26/RuptureDisks/Holding
2004-Oct-15 11:32:52 26669 bytes  prism/private/wslib/calc-lib/1.0.7.26/RuptureDisks/Holding/Liquid.clc
2004-Oct-06 18:20:02  2195 bytes  prism/private/wslib/calc-lib/1.0.7.26/RuptureDisks/Holding/LiquidDrop.clc
2004-Oct-06 18:23:02 16675 bytes  prism/private/wslib/calc-lib/1.0.7.26/RuptureDisks/Holding/MaxRelCapLiquid.clc
2004-Oct-06 18:23:08 15800 bytes  prism/private/wslib/calc-lib/1.0.7.26/RuptureDisks/Holding/MaxRelCapSteam.clc
2004-May-19 17:44:18  9733 bytes  prism/private/wslib/calc-lib/1.0.7.26/RuptureDisks/Holding/NotImplemented.clc
2004-Oct-15 11:32:58 34631 bytes  prism/private/wslib/calc-lib/1.0.7.26/RuptureDisks/Holding/Steam.clc
2004-Oct-15 12:04:30  6144 bytes  prism/private/wslib/calc-lib/1.0.7.26/RuptureDisks/MRCPOverPRelief.clc
2004-Oct-18 17:37:10 11531 bytes  prism/private/wslib/calc-lib/1.0.7.26/RuptureDisks/MaxRelCapVapor.clc
2004-Oct-08 14:26:06  9735 bytes  prism/private/wslib/calc-lib/1.0.7.26/RuptureDisks/NotImplemented.clc
2004-Oct-18 22:06:12 16834 bytes  prism/private/wslib/calc-lib/1.0.7.26/RuptureDisks/PipingLossInit.clc
2004-Oct-18 22:09:20 22998 bytes  prism/private/wslib/calc-lib/1.0.7.26/RuptureDisks/Vapor.clc
2004-Oct-18 13:56:14 10708 bytes  prism/private/wslib/calc-lib/1.0.7.26/RuptureDisks/VaporDrop.clc
2004-Dec-13 10:28:29   136 bytes  prism/private/wslib/calc-lib/1.0.7.26/Steam
2004-Mar-29 14:10:14   947 bytes  prism/private/wslib/calc-lib/1.0.7.26/Steam/Steam.clc
2004-Jun-15 20:22:40   929 bytes  prism/private/wslib/calc-lib/1.0.7.26/Steam/SteamProps.clc
2004-Dec-13 10:28:29   408 bytes  prism/private/wslib/calc-lib/1.0.7.26/Tanks
2004-Dec-13 10:28:29   408 bytes  prism/private/wslib/calc-lib/1.0.7.26/Tanks-01
2004-Oct-08 17:09:02  3530 bytes  prism/private/wslib/calc-lib/1.0.7.26/Tanks-01/FireVaporGen.clc
2004-Oct-19 11:18:56  2800 bytes  prism/private/wslib/calc-lib/1.0.7.26/Tanks-01/GivenInFlow.clc
2004-Oct-19 11:19:16  2877 bytes  prism/private/wslib/calc-lib/1.0.7.26/Tanks-01/GivenOutFlow.clc
2004-Oct-08 17:10:56  3311 bytes  prism/private/wslib/calc-lib/1.0.7.26/Tanks-01/PadFailure.clc
2004-Dec-13 10:28:29   170 bytes  prism/private/wslib/calc-lib/1.0.7.26/Tanks-01/Pressure
2004-Oct-07 16:31:22  1891 bytes  prism/private/wslib/calc-lib/1.0.7.26/Tanks-01/Pressure/PresPOverTV.clc
2004-Oct-12 15:04:36  1814 bytes  prism/private/wslib/calc-lib/1.0.7.26/Tanks-01/Pressure/VacPOverTV.clc
2004-Sep-17 11:35:26   419 bytes  prism/private/wslib/calc-lib/1.0.7.26/Tanks-01/Pressure/pressure-notes.txt
2004-Oct-19 11:19:26  5253 bytes  prism/private/wslib/calc-lib/1.0.7.26/Tanks-01/PumpInLiquidThermal.clc
2004-Oct-19 11:19:32  3346 bytes  prism/private/wslib/calc-lib/1.0.7.26/Tanks-01/PumpOutLiquidThermal.clc
2004-Oct-19 11:19:38  2894 bytes  prism/private/wslib/calc-lib/1.0.7.26/Tanks-01/SteamOut.clc
2004-Oct-19 11:19:48  2304 bytes  prism/private/wslib/calc-lib/1.0.7.26/Tanks-01/TankDraining.clc
2004-Dec-13 10:28:29   510 bytes  prism/private/wslib/calc-lib/1.0.7.26/Tanks-01/Util
2004-Oct-14 17:01:20  1184 bytes  prism/private/wslib/calc-lib/1.0.7.26/Tanks-01/Util/GasAirConvert.clc
2004-Oct-13 10:53:06  9513 bytes  prism/private/wslib/calc-lib/1.0.7.26/Tanks-01/Util/ProtectedDataFire.clc
2004-Oct-13 10:38:06  1122 bytes  prism/private/wslib/calc-lib/1.0.7.26/Tanks-01/Util/ProtectedDataGivenInFlow.clc
2004-Oct-13 10:42:16  4811 bytes  prism/private/wslib/calc-lib/1.0.7.26/Tanks-01/Util/ProtectedDataGivenOutFlow.clc
2004-Oct-13 10:38:46  4962 bytes  prism/private/wslib/calc-lib/1.0.7.26/Tanks-01/Util/ProtectedDataPadFail.clc
2004-Oct-13 10:39:40  6549 bytes  prism/private/wslib/calc-lib/1.0.7.26/Tanks-01/Util/ProtectedDataPumpIn.clc
2004-Oct-13 10:40:04  2673 bytes  prism/private/wslib/calc-lib/1.0.7.26/Tanks-01/Util/ProtectedDataPumpOut.clc
2004-Oct-13 10:40:44  2646 bytes  prism/private/wslib/calc-lib/1.0.7.26/Tanks-01/Util/ProtectedDataSteam.clc
2004-Oct-13 10:41:02  1513 bytes  prism/private/wslib/calc-lib/1.0.7.26/Tanks-01/Util/ProtectedDataTankDrain.clc
2004-Oct-12 16:18:10  4418 bytes  prism/private/wslib/calc-lib/1.0.7.26/Tanks-01/Util/ProtectingDataFire.clc
2004-Oct-13 10:43:12  4345 bytes  prism/private/wslib/calc-lib/1.0.7.26/Tanks-01/Util/ProtectingDataPressure.clc
2004-Oct-13 10:43:48  4261 bytes  prism/private/wslib/calc-lib/1.0.7.26/Tanks-01/Util/ProtectingDataVacuum.clc
2004-Oct-12 14:08:26   743 bytes  prism/private/wslib/calc-lib/1.0.7.26/Tanks-01/Util/VentAdequateChecks.clc
2004-Oct-08 17:09:02  3530 bytes  prism/private/wslib/calc-lib/1.0.7.26/Tanks/FireVaporGen.clc
2004-Oct-19 11:18:56  2800 bytes  prism/private/wslib/calc-lib/1.0.7.26/Tanks/GivenInFlow.clc
2004-Oct-19 11:19:16  2877 bytes  prism/private/wslib/calc-lib/1.0.7.26/Tanks/GivenOutFlow.clc
2004-Oct-08 17:10:56  3311 bytes  prism/private/wslib/calc-lib/1.0.7.26/Tanks/PadFailure.clc
2004-Dec-13 10:28:29   170 bytes  prism/private/wslib/calc-lib/1.0.7.26/Tanks/Pressure
2004-Oct-19 14:56:12  2139 bytes  prism/private/wslib/calc-lib/1.0.7.26/Tanks/Pressure/PresPOverTV.clc
2004-Oct-19 15:13:14  2139 bytes  prism/private/wslib/calc-lib/1.0.7.26/Tanks/Pressure/VacPOverTV.clc
```

2004-Sep-17 11:35:26 419 bytes prism/private/wslib/calc-lib/1.0.7.26/Tanks/Pressure/pressure-notes.txt
2004-Oct-19 11:19:26 5253 bytes prism/private/wslib/calc-lib/1.0.7.26/Tanks/PumpInLiquidThermal.clc
2004-Oct-19 11:19:32 3346 bytes prism/private/wslib/calc-lib/1.0.7.26/Tanks/PumpOutLiquidThermal.clc
2004-Oct-19 11:19:38 2894 bytes prism/private/wslib/calc-lib/1.0.7.26/Tanks/SteamOut.clc
2004-Oct-19 11:19:48 2304 bytes prism/private/wslib/calc-lib/1.0.7.26/Tanks/TankDraining.clc
2004-Dec-13 10:28:29 510 bytes prism/private/wslib/calc-lib/1.0.7.26/Tanks/Util
2004-Oct-14 17:01:20 1184 bytes prism/private/wslib/calc-lib/1.0.7.26/Tanks/Util/GasAirConvert.clc
2004-Oct-13 10:53:06 9513 bytes prism/private/wslib/calc-lib/1.0.7.26/Tanks/Util/ProtectedDataFire.clc
2004-Oct-13 10:38:06 1122 bytes prism/private/wslib/calc-lib/1.0.7.26/Tanks/Util/ProtectedDataGivenInFlow.clc
2004-Oct-13 10:42:16 4811 bytes prism/private/wslib/calc-lib/1.0.7.26/Tanks/Util/ProtectedDataGivenOutFlow.clc
2004-Oct-13 10:38:46 4962 bytes prism/private/wslib/calc-lib/1.0.7.26/Tanks/Util/ProtectedDataPadFail.clc
2004-Oct-13 10:39:40 6549 bytes prism/private/wslib/calc-lib/1.0.7.26/Tanks/Util/ProtectedDataPumpIn.clc
2004-Oct-13 10:40:04 2673 bytes prism/private/wslib/calc-lib/1.0.7.26/Tanks/Util/ProtectedDataPumpOut.clc
2004-Oct-13 10:40:44 2646 bytes prism/private/wslib/calc-lib/1.0.7.26/Tanks/Util/ProtectedDataSteam.clc
2004-Oct-13 10:41:02 1513 bytes prism/private/wslib/calc-lib/1.0.7.26/Tanks/Util/ProtectedDataTankDrain.clc
2004-Oct-12 16:18:10 4418 bytes prism/private/wslib/calc-lib/1.0.7.26/Tanks/Util/ProtectingDataFire.clc
2004-Oct-13 10:43:12 4345 bytes prism/private/wslib/calc-lib/1.0.7.26/Tanks/Util/ProtectingDataPressure.clc
2004-Oct-13 10:43:48 4261 bytes prism/private/wslib/calc-lib/1.0.7.26/Tanks/Util/ProtectingDataVacuum.clc
2004-Oct-12 14:08:26 743 bytes prism/private/wslib/calc-lib/1.0.7.26/Tanks/Util/VentAdequateChecks.clc
2004-Oct-08 13:53:26 10465 bytes prism/private/wslib/calc-lib/1.0.7.26/TubeRuptureLiquid.clc
2004-Oct-08 13:53:30 9254 bytes prism/private/wslib/calc-lib/1.0.7.26/TubeRuptureVapor.clc
2004-Oct-08 13:53:36 6349 bytes prism/private/wslib/calc-lib/1.0.7.26/UserSpecifiedLiquid.clc
2004-Oct-08 13:53:40 5215 bytes prism/private/wslib/calc-lib/1.0.7.26/UserSpecifiedSteam.clc
2004-Oct-08 13:53:48 6091 bytes prism/private/wslib/calc-lib/1.0.7.26/UserSpecifiedVapor.clc
2004-Dec-13 10:28:29 918 bytes prism/private/wslib/calc-lib/1.0.7.26/Util
2003-Nov-11 18:36:28 605 bytes prism/private/wslib/calc-lib/1.0.7.26/Util/AreaAdequateChecks.clc
2003-Oct-29 14:25:16 786 bytes prism/private/wslib/calc-lib/1.0.7.26/Util/AreaChecks.clc
2004-Oct-18 21:26:36 6614 bytes prism/private/wslib/calc-lib/1.0.7.26/Util/CheckProtectingValves.clc
2004-Sep-19 12:54:20 5637 bytes prism/private/wslib/calc-lib/1.0.7.26/Util/CheckProtectingValves.clc-01
2004-Oct-06 14:20:40 6216 bytes prism/private/wslib/calc-lib/1.0.7.26/Util/CheckProtectingValves.clc-02
2004-Oct-15 11:28:32 6504 bytes prism/private/wslib/calc-lib/1.0.7.26/Util/CheckProtectingValves.clc-03
2004-Jun-15 12:04:20 3729 bytes prism/private/wslib/calc-lib/1.0.7.26/Util/CriticalFlow.clc
2004-Mar-08 13:39:08 1109 bytes prism/private/wslib/calc-lib/1.0.7.26/Util/CriticalTubeFlow.clc
2004-Sep-29 14:30:34 4723 bytes prism/private/wslib/calc-lib/1.0.7.26/Util/Kb.clc
2004-Mar-12 11:53:32 1555 bytes prism/private/wslib/calc-lib/1.0.7.26/Util/KbpLiquid.clc
2004-Sep-29 14:29:46 1874 bytes prism/private/wslib/calc-lib/1.0.7.26/Util/KbpVapor.clc
2004-Mar-08 13:22:24 1125 bytes prism/private/wslib/calc-lib/1.0.7.26/Util/Kn.clc
2004-Mar-29 14:08:48 1380 bytes prism/private/wslib/calc-lib/1.0.7.26/Util/Ksh.clc
2004-Jul-07 15:10:20 10998 bytes prism/private/wslib/calc-lib/1.0.7.26/Util/Kv.clc
2004-Jul-07 15:16:44 4375 bytes prism/private/wslib/calc-lib/1.0.7.26/Util/Kw.clc
2004-Aug-23 15:07:26 6174 bytes prism/private/wslib/calc-lib/1.0.7.26/Util/ProtectedData.clc
2004-Aug-23 11:54:08 14233 bytes prism/private/wslib/calc-lib/1.0.7.26/Util/ProtectedDataVessel.clc
2004-Oct-18 22:03:24 21084 bytes prism/private/wslib/calc-lib/1.0.7.26/Util/ProtectingData.clc
2004-Oct-06 13:22:10 18888 bytes prism/private/wslib/calc-lib/1.0.7.26/Util/ProtectingData.clc-01
2004-Oct-06 13:26:04 18888 bytes prism/private/wslib/calc-lib/1.0.7.26/Util/ProtectingData.clc-02
2004-Jul-06 21:08:02 3283 bytes prism/private/wslib/calc-lib/1.0.7.26/Util/ReqSizingCode.clc
2004-Jun-21 16:11:04 1022 bytes prism/private/wslib/calc-lib/1.0.7.26/Util/ReqValveType.clc
2004-Jul-07 13:51:14 510 bytes prism/private/wslib/calc-lib/1.0.7.26/Util/ReynoldsToKu.clc
2004-Sep-14 15:03:40 1522 bytes prism/private/wslib/calc-lib/1.0.7.26/Util/ThermodynamicCritPoint.clc
2004-May-20 10:34:54 1533 bytes prism/private/wslib/calc-lib/1.0.7.26/Util/VaporCapCreditCnvrt.clc
2004-Dec-13 10:28:29 408 bytes prism/private/wslib/calc-lib/1.0.7.26/Vapor
2004-Jun-15 10:26:10 3951 bytes prism/private/wslib/calc-lib/1.0.7.26/Vapor/ControlValveVaporFlow.clc
2004-Jul-16 11:27:14 2520 bytes prism/private/wslib/calc-lib/1.0.7.26/Vapor/FGEVaporMass.clc
2004-Jun-23 15:01:10 1610 bytes prism/private/wslib/calc-lib/1.0.7.26/Vapor/FireGasCapacity.clc
2004-Aug-17 13:56:16 10053 bytes prism/private/wslib/calc-lib/1.0.7.26/Vapor/FireVaporCapacity.clc
2004-May-20 10:46:50 1185 bytes prism/private/wslib/calc-lib/1.0.7.26/Vapor/TubeRuptureVaporFlowCrit.clc
2004-May-20 10:46:58 881 bytes prism/private/wslib/calc-lib/1.0.7.26/Vapor/TubeRuptureVaporFlowSub.clc
2004-Jun-15 10:26:28 2099 bytes prism/private/wslib/calc-lib/1.0.7.26/Vapor/VaporMass.clc
2004-Feb-27 21:19:16 1725 bytes prism/private/wslib/calc-lib/1.0.7.26/Vapor/VaporProcessProps.clc
2004-Jul-06 15:36:52 7672 bytes prism/private/wslib/calc-lib/1.0.7.26/Vapor/VaporProps.clc
2004-Jun-15 10:27:02 2085 bytes prism/private/wslib/calc-lib/1.0.7.26/Vapor/VaporVol.clc

```
2004-Dec-13 10:28:30 1020 bytes prism/private/wslib/calc-lib/1.0.7.27
2004-Mar-12 16:08:46 12288 bytes prism/private/wslib/calc-lib/1.0.7.27/.swp
2004-Nov-06 14:45:16 6541 bytes prism/private/wslib/calc-lib/1.0.7.27/ControlValveLiquid.clc
2004-Nov-06 14:45:20 6490 bytes prism/private/wslib/calc-lib/1.0.7.27/ControlValveVapor.clc
2004-Dec-13 10:28:29 306 bytes prism/private/wslib/calc-lib/1.0.7.27/Device
2004-Jun-22 14:43:38 6127 bytes prism/private/wslib/calc-lib/1.0.7.27/Device/PRVDeviceData.clc
2003-Oct-10 14:17:08 3251 bytes prism/private/wslib/calc-lib/1.0.7.27/Device/PipeDeviceData.clc
2004-Nov-06 10:04:02 12239 bytes prism/private/wslib/calc-lib/1.0.7.27/Device/RDDeviceData.clc
2004-Sep-13 15:05:52 9797 bytes prism/private/wslib/calc-lib/1.0.7.27/Device/TVDeviceData.clc
2004-Aug-26 17:05:26 6882 bytes prism/private/wslib/calc-lib/1.0.7.27/Device/TankDeviceData.clc
2003-Oct-10 14:17:08 2672 bytes prism/private/wslib/calc-lib/1.0.7.27/Device/TurbineStmDeviceData.clc
2003-Oct-29 14:54:00 2665 bytes prism/private/wslib/calc-lib/1.0.7.27/Device/Vessel.clc
2004-Nov-06 14:45:24 6499 bytes prism/private/wslib/calc-lib/1.0.7.27/FireGasExpansion.clc
2004-Nov-06 14:45:28 6036 bytes prism/private/wslib/calc-lib/1.0.7.27/FireVaporGeneration.clc
2004-Dec-13 10:28:29 306 bytes prism/private/wslib/calc-lib/1.0.7.27/Fitting
2003-Oct-10 14:17:08 5636 bytes prism/private/wslib/calc-lib/1.0.7.27/Fitting/ExpandingFitting.clc
2003-Oct-10 14:17:08 4149 bytes prism/private/wslib/calc-lib/1.0.7.27/Fitting/ExpandingTeeSide.clc
2003-Oct-10 14:17:08 4153 bytes prism/private/wslib/calc-lib/1.0.7.27/Fitting/Pipe.clc
2004-Nov-07 14:46:54 4329 bytes prism/private/wslib/calc-lib/1.0.7.27/Fitting/RDFitting.clc
2004-Jul-02 16:58:00 5741 bytes prism/private/wslib/calc-lib/1.0.7.27/Fitting/ReducingFitting.clc
2003-Oct-10 14:17:08 4176 bytes prism/private/wslib/calc-lib/1.0.7.27/Fitting/ReducingTeeSide.clc
2003-Oct-10 14:17:08 4128 bytes prism/private/wslib/calc-lib/1.0.7.27/Fitting/StandardFitting.clc
2004-Nov-06 14:45:30 6539 bytes prism/private/wslib/calc-lib/1.0.7.27/GivenFlowLiquid.clc
2004-Nov-06 14:45:34 5572 bytes prism/private/wslib/calc-lib/1.0.7.27/GivenFlowSteam.clc
2004-Nov-06 14:45:38 7112 bytes prism/private/wslib/calc-lib/1.0.7.27/GivenFlowVapor.clc
2004-Nov-06 14:45:44 8861 bytes prism/private/wslib/calc-lib/1.0.7.27/GivenFlowVapor.clc-RD
2004-Dec-13 10:28:29 272 bytes prism/private/wslib/calc-lib/1.0.7.27/Liquid
2004-Feb-15 20:52:26 1191 bytes prism/private/wslib/calc-lib/1.0.7.27/Liquid/ControlValveLiquidFlow.clc
2004-May-20 10:21:36 652 bytes prism/private/wslib/calc-lib/1.0.7.27/Liquid/LiquidExpansionCapacity.clc
2004-Jun-21 11:17:22 5116 bytes prism/private/wslib/calc-lib/1.0.7.27/Liquid/LiquidProps.clc
2004-Jul-07 13:46:44 5132 bytes prism/private/wslib/calc-lib/1.0.7.27/Liquid/LiquidVol.clc
2004-May-20 10:47:44 822 bytes prism/private/wslib/calc-lib/1.0.7.27/Liquid/TubeRuptureLiquidMassFlow.clc
2004-May-20 10:47:56 830 bytes prism/private/wslib/calc-lib/1.0.7.27/Liquid/TubeRuptureLiquidVolFlow.clc
2004-Nov-06 14:45:46 5833 bytes prism/private/wslib/calc-lib/1.0.7.27/LiquidExpansion.clc
2004-Nov-06 14:45:50 3259 bytes prism/private/wslib/calc-lib/1.0.7.27/NotImplemented.clc
2004-Dec-13 10:28:29 238 bytes prism/private/wslib/calc-lib/1.0.7.27/Omega
2004-Oct-12 16:26:36 10750 bytes prism/private/wslib/calc-lib/1.0.7.27/Omega/OmegaD21.clc
2004-Oct-12 16:27:22 8233 bytes prism/private/wslib/calc-lib/1.0.7.27/Omega/OmegaD22.clc
2004-Oct-12 16:24:18 13397 bytes prism/private/wslib/calc-lib/1.0.7.27/Omega/OmegaD23.clc
2004-Nov-06 14:45:54 7350 bytes prism/private/wslib/calc-lib/1.0.7.27/Omega/OmegaTwoPhase.clc
2004-Dec-13 10:28:29 918 bytes prism/private/wslib/calc-lib/1.0.7.27/Omega/Util
2004-Sep-28 14:48:56 606 bytes prism/private/wslib/calc-lib/1.0.7.27/Omega/Util/InletVoidFraction.clc
2004-Sep-16 11:28:44 627 bytes prism/private/wslib/calc-lib/1.0.7.27/Omega/Util/OmegaAreaD21.clc
2004-Sep-28 10:26:54 721 bytes prism/private/wslib/calc-lib/1.0.7.27/Omega/Util/OmegaAreaD22.clc
2004-Sep-29 16:05:42 627 bytes prism/private/wslib/calc-lib/1.0.7.27/Omega/Util/OmegaAreaD23.clc
2004-Oct-12 16:34:04 3641 bytes prism/private/wslib/calc-lib/1.0.7.27/Omega/Util/OmegaCriticalFlowD14.clc
2004-Oct-12 16:34:22 2075 bytes prism/private/wslib/calc-lib/1.0.7.27/Omega/Util/OmegaCriticalFlowD15.clc
2004-Sep-27 13:32:40 1706 bytes prism/private/wslib/calc-lib/1.0.7.27/Omega/Util/OmegaCriticalFlowD21.clc
2004-Oct-12 16:29:10 3767 bytes prism/private/wslib/calc-lib/1.0.7.27/Omega/Util/OmegaCriticalFlowD22.clc
2004-Sep-22 13:16:56 1095 bytes prism/private/wslib/calc-lib/1.0.7.27/Omega/Util/OmegaD1.clc
2004-Sep-29 10:51:02 970 bytes prism/private/wslib/calc-lib/1.0.7.27/Omega/Util/OmegaD14.clc
2004-Sep-29 12:50:10 507 bytes prism/private/wslib/calc-lib/1.0.7.27/Omega/Util/OmegaD15.clc
2004-Sep-22 13:24:06 1073 bytes prism/private/wslib/calc-lib/1.0.7.27/Omega/Util/OmegaD2.clc
2004-Sep-22 13:43:36 510 bytes prism/private/wslib/calc-lib/1.0.7.27/Omega/Util/OmegaD3.clc
2004-Sep-22 14:05:30 628 bytes prism/private/wslib/calc-lib/1.0.7.27/Omega/Util/OmegaD4.clc
2004-Sep-27 13:14:56 830 bytes prism/private/wslib/calc-lib/1.0.7.27/Omega/Util/OmegaD8.clc
2004-Sep-28 11:11:50 468 bytes prism/private/wslib/calc-lib/1.0.7.27/Omega/Util/OmegaD9.clc
2004-Oct-12 16:35:12 4604 bytes prism/private/wslib/calc-lib/1.0.7.27/Omega/Util/OmegaKd1234.clc
2004-Oct-12 16:30:20 4604 bytes prism/private/wslib/calc-lib/1.0.7.27/Omega/Util/OmegaKd1415.clc
2004-Oct-12 16:35:54 1878 bytes prism/private/wslib/calc-lib/1.0.7.27/Omega/Util/OmegaKd89.clc
2004-Oct-12 16:36:14 5586 bytes prism/private/wslib/calc-lib/1.0.7.27/Omega/Util/OmegaMassFluxD14.clc
```

| | | |
|---|---|---|
| 2004-Oct-13 10:46:12 | 1979 bytes | prism/private/wslib/calc-lib/1.0.7.27/Omega/Util/OmegaMassFluxD15.clc |
| 2004-Oct-13 10:46:22 | 2049 bytes | prism/private/wslib/calc-lib/1.0.7.27/Omega/Util/OmegaMassFluxD21.clc |
| 2004-Oct-13 10:45:38 | 2875 bytes | prism/private/wslib/calc-lib/1.0.7.27/Omega/Util/OmegaMassFluxD22.clc |
| 2004-Oct-12 16:33:28 | 1431 bytes | prism/private/wslib/calc-lib/1.0.7.27/Omega/Util/OmegaSubcoolingRegionD22.clc |
| 2004-Sep-14 15:03:40 | 1522 bytes | prism/private/wslib/calc-lib/1.0.7.27/Omega/Util/ThermodynamicCritPoint.clc |
| 2004-Dec-13 10:28:29 | 578 bytes | prism/private/wslib/calc-lib/1.0.7.27/PipingLoss |
| 2004-Nov-07 12:01:16 | 5729 bytes | prism/private/wslib/calc-lib/1.0.7.27/PipingLoss/CheckInlet.clc |
| 2004-Nov-07 12:17:06 | 6513 bytes | prism/private/wslib/calc-lib/1.0.7.27/PipingLoss/CheckOutlet.clc |
| 2004-Jun-11 10:26:26 | 637 bytes | prism/private/wslib/calc-lib/1.0.7.27/PipingLoss/HDelta.clc |
| 2004-Nov-07 12:23:24 | 30601 bytes | prism/private/wslib/calc-lib/1.0.7.27/PipingLoss/Liquid.clc |
| 2004-Jun-22 11:24:14 | 2195 bytes | prism/private/wslib/calc-lib/1.0.7.27/PipingLoss/LiquidDrop.clc |
| 2004-Oct-08 14:16:32 | 16695 bytes | prism/private/wslib/calc-lib/1.0.7.27/PipingLoss/MaxRelCapLiquid.clc |
| 2004-Oct-08 14:46:32 | 15819 bytes | prism/private/wslib/calc-lib/1.0.7.27/PipingLoss/MaxRelCapSteam.clc |
| 2004-Oct-08 14:45:44 | 16840 bytes | prism/private/wslib/calc-lib/1.0.7.27/PipingLoss/MaxRelCapVapor.clc |
| 2004-Oct-08 14:49:20 | 16939 bytes | prism/private/wslib/calc-lib/1.0.7.27/PipingLoss/MaxRelCapVaporFixedBP.clc-new |
| 2004-May-19 17:44:18 | 9733 bytes | prism/private/wslib/calc-lib/1.0.7.27/PipingLoss/NotImplemented.clc |
| 2004-Aug-23 10:11:28 | 17820 bytes | prism/private/wslib/calc-lib/1.0.7.27/PipingLoss/PipingLossInit.clc |
| 2004-Nov-07 12:20:46 | 34333 bytes | prism/private/wslib/calc-lib/1.0.7.27/PipingLoss/Steam.clc |
| 2004-Nov-07 12:20:02 | 38796 bytes | prism/private/wslib/calc-lib/1.0.7.27/PipingLoss/Vapor.clc |
| 2004-Aug-20 15:54:56 | 2513 bytes | prism/private/wslib/calc-lib/1.0.7.27/PipingLoss/VaporDropIn.clc |
| 2004-Aug-20 15:55:38 | 6784 bytes | prism/private/wslib/calc-lib/1.0.7.27/PipingLoss/VaporDropOut.clc |
| 2004-Dec-13 10:28:29 | 204 bytes | prism/private/wslib/calc-lib/1.0.7.27/Post |
| 2004-Jul-15 22:18:44 | 11722 bytes | prism/private/wslib/calc-lib/1.0.7.27/Post/AcousticVibration.clc |
| 2004-Jun-21 11:19:34 | 1812 bytes | prism/private/wslib/calc-lib/1.0.7.27/Post/NoiseLevel.clc |
| 2004-Jun-24 10:44:26 | 1575 bytes | prism/private/wslib/calc-lib/1.0.7.27/Post/ReactionForceSteam.clc |
| 2004-Jun-15 12:02:44 | 1503 bytes | prism/private/wslib/calc-lib/1.0.7.27/Post/ReactionForceVapor.clc |
| 2004-Dec-13 10:28:29 | 374 bytes | prism/private/wslib/calc-lib/1.0.7.27/Pressure |
| 2004-Jun-04 11:58:24 | 1514 bytes | prism/private/wslib/calc-lib/1.0.7.27/Pressure/BackPressure.clc |
| 2004-Jun-21 11:20:40 | 2461 bytes | prism/private/wslib/calc-lib/1.0.7.27/Pressure/BackPressureCheck.clc |
| 2004-Feb-27 19:14:28 | 2058 bytes | prism/private/wslib/calc-lib/1.0.7.27/Pressure/ColdDiffTestPressure.clc |
| 2004-Jul-07 10:35:00 | 6605 bytes | prism/private/wslib/calc-lib/1.0.7.27/Pressure/MRCPOverPRelief.clc |
| 2004-Jun-15 10:24:58 | 1150 bytes | prism/private/wslib/calc-lib/1.0.7.27/Pressure/PAtm.clc |
| 2004-Mar-18 11:31:24 | 708 bytes | prism/private/wslib/calc-lib/1.0.7.27/Pressure/PDelta.clc |
| 2004-Sep-01 10:42:12 | 15261 bytes | prism/private/wslib/calc-lib/1.0.7.27/Pressure/POverPRelief.clc |
| 2004-Jul-15 20:21:40 | 2670 bytes | prism/private/wslib/calc-lib/1.0.7.27/Pressure/PressureChecks.clc |
| 2004-Jul-08 17:07:12 | 852 bytes | prism/private/wslib/calc-lib/1.0.7.27/Pressure/notes.txt |
| 2004-Dec-13 10:28:29 | 510 bytes | prism/private/wslib/calc-lib/1.0.7.27/RuptureDisks |
| 2004-Oct-30 19:45:10 | 18173 bytes | prism/private/wslib/calc-lib/1.0.7.27/RuptureDisks/AcousticVibration.clc |
| 2004-Oct-30 11:44:38 | 11799 bytes | prism/private/wslib/calc-lib/1.0.7.27/RuptureDisks/AcousticVibration.clc-01 |
| 2004-Oct-06 18:19:26 | 4665 bytes | prism/private/wslib/calc-lib/1.0.7.27/RuptureDisks/CheckInlet.clc |
| 2004-Oct-06 18:19:38 | 5318 bytes | prism/private/wslib/calc-lib/1.0.7.27/RuptureDisks/CheckOutlet.clc |
| 2004-Jun-11 10:26:26 | 637 bytes | prism/private/wslib/calc-lib/1.0.7.27/RuptureDisks/HDelta.clc |
| 2004-Dec-13 10:28:29 | 306 bytes | prism/private/wslib/calc-lib/1.0.7.27/RuptureDisks/Holding |
| 2004-Oct-30 11:37:44 | 12370 bytes | prism/private/wslib/calc-lib/1.0.7.27/RuptureDisks/Holding/AcousticVibrationPipeSection.clc-01 |
| 2004-Nov-06 14:46:10 | 26433 bytes | prism/private/wslib/calc-lib/1.0.7.27/RuptureDisks/Holding/Liquid.clc-01 |
| 2004-Oct-06 18:20:02 | 2195 bytes | prism/private/wslib/calc-lib/1.0.7.27/RuptureDisks/Holding/LiquidDrop.clc |
| 2004-Oct-06 18:23:02 | 16675 bytes | prism/private/wslib/calc-lib/1.0.7.27/RuptureDisks/Holding/MaxRelCapLiquid.clc |
| 2004-Oct-06 18:23:08 | 15800 bytes | prism/private/wslib/calc-lib/1.0.7.27/RuptureDisks/Holding/MaxRelCapSteam.clc |
| 2004-May-19 17:44:18 | 9733 bytes | prism/private/wslib/calc-lib/1.0.7.27/RuptureDisks/Holding/NotImplemented.clc |
| 2004-Nov-06 14:46:14 | 34395 bytes | prism/private/wslib/calc-lib/1.0.7.27/RuptureDisks/Holding/Steam.clc-01 |
| 2004-Nov-06 20:33:56 | 6234 bytes | prism/private/wslib/calc-lib/1.0.7.27/RuptureDisks/MRCPOverPRelief.clc |
| 2004-Oct-15 12:04:30 | 6144 bytes | prism/private/wslib/calc-lib/1.0.7.27/RuptureDisks/MRCPOverPRelief.clc-01 |
| 2004-Nov-07 11:26:54 | 12566 bytes | prism/private/wslib/calc-lib/1.0.7.27/RuptureDisks/MaxRelCapVapor.clc |
| 2004-Oct-08 14:26:06 | 9735 bytes | prism/private/wslib/calc-lib/1.0.7.27/RuptureDisks/NotImplemented.clc |
| 2004-Nov-07 14:50:16 | 17439 bytes | prism/private/wslib/calc-lib/1.0.7.27/RuptureDisks/PipingLossInit.clc |
| 2004-Nov-06 17:30:24 | 23980 bytes | prism/private/wslib/calc-lib/1.0.7.27/RuptureDisks/Vapor.clc |
| 2004-Oct-18 13:56:14 | 10708 bytes | prism/private/wslib/calc-lib/1.0.7.27/RuptureDisks/VaporDrop.clc |
| 2004-Dec-13 10:28:29 | 136 bytes | prism/private/wslib/calc-lib/1.0.7.27/Steam |
| 2004-Mar-29 14:10:14 | 947 bytes | prism/private/wslib/calc-lib/1.0.7.27/Steam/Steam.clc |
| 2004-Jun-15 20:22:40 | 929 bytes | prism/private/wslib/calc-lib/1.0.7.27/Steam/SteamProps.clc |
| 2004-Dec-13 10:28:29 | 408 bytes | prism/private/wslib/calc-lib/1.0.7.27/Tanks |

2004-Nov-06 17:17:14 3308 bytes prism/private/wslib/calc-lib/1.0.7.27/Tanks/FireVaporGen.clc
2004-Nov-06 17:17:14 2577 bytes prism/private/wslib/calc-lib/1.0.7.27/Tanks/GivenInFlow.clc
2004-Nov-06 17:17:16 2654 bytes prism/private/wslib/calc-lib/1.0.7.27/Tanks/GivenOutFlow.clc
2004-Nov-06 17:17:16 3087 bytes prism/private/wslib/calc-lib/1.0.7.27/Tanks/PadFailure.clc
2004-Dec-13 10:28:29 136 bytes prism/private/wslib/calc-lib/1.0.7.27/Tanks/Pressure
2004-Nov-06 17:17:16 2144 bytes prism/private/wslib/calc-lib/1.0.7.27/Tanks/Pressure/PresPOverTV.clc
2004-Nov-06 17:17:16 2144 bytes prism/private/wslib/calc-lib/1.0.7.27/Tanks/Pressure/VacPOverTV.clc
2004-Nov-06 17:17:16 5034 bytes prism/private/wslib/calc-lib/1.0.7.27/Tanks/PumpInLiquidThermal.clc
2004-Nov-06 17:17:16 3125 bytes prism/private/wslib/calc-lib/1.0.7.27/Tanks/PumpOutLiquidThermal.clc
2004-Nov-06 17:17:16 2671 bytes prism/private/wslib/calc-lib/1.0.7.27/Tanks/SteamOut.clc
2004-Nov-06 17:17:16 2081 bytes prism/private/wslib/calc-lib/1.0.7.27/Tanks/TankDraining.clc
2004-Dec-13 10:28:29 510 bytes prism/private/wslib/calc-lib/1.0.7.27/Tanks/Util
2004-Nov-06 17:17:16 1184 bytes prism/private/wslib/calc-lib/1.0.7.27/Tanks/Util/GasAirConvert.clc
2004-Nov-06 17:17:16 9535 bytes prism/private/wslib/calc-lib/1.0.7.27/Tanks/Util/ProtectedDataFire.clc
2004-Nov-06 17:17:16 1125 bytes prism/private/wslib/calc-lib/1.0.7.27/Tanks/Util/ProtectedDataGivenInFlow.clc
2004-Nov-06 17:17:16 4823 bytes prism/private/wslib/calc-lib/1.0.7.27/Tanks/Util/ProtectedDataGivenOutFlow.clc
2004-Nov-06 17:17:16 4974 bytes prism/private/wslib/calc-lib/1.0.7.27/Tanks/Util/ProtectedDataPadFail.clc
2004-Nov-06 17:17:16 6562 bytes prism/private/wslib/calc-lib/1.0.7.27/Tanks/Util/ProtectedDataPumpIn.clc
2004-Nov-06 17:17:16 2677 bytes prism/private/wslib/calc-lib/1.0.7.27/Tanks/Util/ProtectedDataPumpOut.clc
2004-Nov-06 17:17:16 2650 bytes prism/private/wslib/calc-lib/1.0.7.27/Tanks/Util/ProtectedDataSteam.clc
2004-Nov-06 17:17:16 1516 bytes prism/private/wslib/calc-lib/1.0.7.27/Tanks/Util/ProtectedDataTankDrain.clc
2004-Nov-06 17:17:16 4425 bytes prism/private/wslib/calc-lib/1.0.7.27/Tanks/Util/ProtectingDataFire.clc
2004-Nov-06 17:17:16 4352 bytes prism/private/wslib/calc-lib/1.0.7.27/Tanks/Util/ProtectingDataPressure.clc
2004-Nov-06 17:17:16 4268 bytes prism/private/wslib/calc-lib/1.0.7.27/Tanks/Util/ProtectingDataVacuum.clc
2004-Nov-06 17:17:16 745 bytes prism/private/wslib/calc-lib/1.0.7.27/Tanks/Util/VentAdequateChecks.clc
2004-Nov-06 14:46:44 10240 bytes prism/private/wslib/calc-lib/1.0.7.27/TubeRuptureLiquid.clc
2004-Nov-06 14:46:48 9029 bytes prism/private/wslib/calc-lib/1.0.7.27/TubeRuptureVapor.clc
2004-Nov-06 14:46:50 6124 bytes prism/private/wslib/calc-lib/1.0.7.27/UserSpecifiedLiquid.clc
2004-Nov-06 14:46:54 4990 bytes prism/private/wslib/calc-lib/1.0.7.27/UserSpecifiedSteam.clc
2004-Nov-06 14:46:56 5866 bytes prism/private/wslib/calc-lib/1.0.7.27/UserSpecifiedVapor.clc
2004-Dec-13 10:28:30 918 bytes prism/private/wslib/calc-lib/1.0.7.27/Util
2003-Nov-11 18:36:28 605 bytes prism/private/wslib/calc-lib/1.0.7.27/Util/AreaAdequateChecks.clc
2003-Oct-29 14:25:16 786 bytes prism/private/wslib/calc-lib/1.0.7.27/Util/AreaChecks.clc
2004-Oct-18 21:26:36 6614 bytes prism/private/wslib/calc-lib/1.0.7.27/Util/CheckProtectingValves.clc
2004-Sep-19 12:54:20 5637 bytes prism/private/wslib/calc-lib/1.0.7.27/Util/CheckProtectingValves.clc-01
2004-Oct-06 14:20:40 6216 bytes prism/private/wslib/calc-lib/1.0.7.27/Util/CheckProtectingValves.clc-02
2004-Oct-15 11:28:32 6504 bytes prism/private/wslib/calc-lib/1.0.7.27/Util/CheckProtectingValves.clc-03
2004-Jun-15 12:04:20 3729 bytes prism/private/wslib/calc-lib/1.0.7.27/Util/CriticalFlow.clc
2004-Mar-08 13:39:08 1109 bytes prism/private/wslib/calc-lib/1.0.7.27/Util/CriticalTubeFlow.clc
2004-Sep-29 14:30:34 4723 bytes prism/private/wslib/calc-lib/1.0.7.27/Util/Kb.clc
2004-Mar-12 11:53:32 1555 bytes prism/private/wslib/calc-lib/1.0.7.27/Util/KbpLiquid.clc
2004-Sep-29 14:29:46 1874 bytes prism/private/wslib/calc-lib/1.0.7.27/Util/KbpVapor.clc
2004-Mar-08 13:22:24 1125 bytes prism/private/wslib/calc-lib/1.0.7.27/Util/Kn.clc
2004-Mar-29 14:08:48 1380 bytes prism/private/wslib/calc-lib/1.0.7.27/Util/Ksh.clc
2004-Jul-07 15:10:20 10998 bytes prism/private/wslib/calc-lib/1.0.7.27/Util/Kv.clc
2004-Jul-07 15:16:44 4375 bytes prism/private/wslib/calc-lib/1.0.7.27/Util/Kw.clc
2004-Aug-23 15:07:26 6174 bytes prism/private/wslib/calc-lib/1.0.7.27/Util/ProtectedData.clc
2004-Aug-23 11:54:08 14233 bytes prism/private/wslib/calc-lib/1.0.7.27/Util/ProtectedDataVessel.clc
2004-Nov-07 14:11:26 22478 bytes prism/private/wslib/calc-lib/1.0.7.27/Util/ProtectingData.clc
2004-Oct-06 13:22:10 18888 bytes prism/private/wslib/calc-lib/1.0.7.27/Util/ProtectingData.clc-01
2004-Oct-06 13:26:04 18888 bytes prism/private/wslib/calc-lib/1.0.7.27/Util/ProtectingData.clc-02
2004-Jul-06 21:08:02 3283 bytes prism/private/wslib/calc-lib/1.0.7.27/Util/ReqSizingCode.clc
2004-Jun-21 16:11:04 1022 bytes prism/private/wslib/calc-lib/1.0.7.27/Util/ReqValveType.clc
2004-Jul-07 13:51:14 510 bytes prism/private/wslib/calc-lib/1.0.7.27/Util/ReynoldsToKu.clc
2004-Sep-14 15:03:40 1522 bytes prism/private/wslib/calc-lib/1.0.7.27/Util/ThermodynamicCritPoint.clc
2004-May-20 10:34:54 1533 bytes prism/private/wslib/calc-lib/1.0.7.27/Util/VaporCapCreditCnvrt.clc
2004-Dec-13 10:28:30 408 bytes prism/private/wslib/calc-lib/1.0.7.27/Vapor
2004-Jun-15 10:26:10 3951 bytes prism/private/wslib/calc-lib/1.0.7.27/Vapor/ControlValveVaporFlow.clc
2004-Jul-16 11:27:14 2520 bytes prism/private/wslib/calc-lib/1.0.7.27/Vapor/FGEVaporMass.clc
2004-Jun-23 15:01:10 1610 bytes prism/private/wslib/calc-lib/1.0.7.27/Vapor/FireGasCapacity.clc
2004-Aug-17 13:56:16 10053 bytes prism/private/wslib/calc-lib/1.0.7.27/Vapor/FireVaporCapacity.clc 2004-May-20 10:46:50 1185 bytes prism/private/wslib/calc-lib/1.0.7.27/Vapor/TubeRuptureVaporFlowCrit.clc
2004-May-20 10:46:58 881 bytes prism/private/wslib/calc-lib/1.0.7.27/Vapor/TubeRuptureVaporFlowSub.clc
2004-Jun-15 10:26:28 2099 bytes prism/private/wslib/calc-lib/1.0.7.27/Vapor/VaporMass.clc
2004-Feb-27 21:19:16 1725 bytes prism/private/wslib/calc-lib/1.0.7.27/Vapor/VaporProcessProps.clc
2004-Jul-06 15:36:52 7672 bytes prism/private/wslib/calc-lib/1.0.7.27/Vapor/VaporProps.clc
2004-Jun-15 10:27:02 2085 bytes prism/private/wslib/calc-lib/1.0.7.27/Vapor/VaporVol.clc
2004-Dec-13 10:28:30 1020 bytes prism/private/wslib/calc-lib/1.0.7.28
2004-Mar-12 16:08:46 12288 bytes prism/private/wslib/calc-lib/1.0.7.28/.swp
2004-Nov-06 14:45:16 6541 bytes prism/private/wslib/calc-lib/1.0.7.28/ControlValveLiquid.clc
2004-Nov-06 14:45:20 6490 bytes prism/private/wslib/calc-lib/1.0.7.28/ControlValveVapor.clc
2004-Dec-13 10:28:30 306 bytes prism/private/wslib/calc-lib/1.0.7.28/Device
2004-Jun-22 14:43:38 6127 bytes prism/private/wslib/calc-lib/1.0.7.28/Device/PRVDeviceData.clc
2003-Oct-10 14:17:08 3251 bytes prism/private/wslib/calc-lib/1.0.7.28/Device/PipeDeviceData.clc
2004-Nov-06 10:04:02 12239 bytes prism/private/wslib/calc-lib/1.0.7.28/Device/RDDeviceData.clc
2004-Sep-13 15:05:52 9797 bytes prism/private/wslib/calc-lib/1.0.7.28/Device/TVDeviceData.clc
2004-Aug-26 17:05:26 6882 bytes prism/private/wslib/calc-lib/1.0.7.28/Device/TankDeviceData.clc
2003-Oct-10 14:17:08 2672 bytes prism/private/wslib/calc-lib/1.0.7.28/Device/TurbineStmDeviceData.clc
2003-Oct-29 14:54:00 2665 bytes prism/private/wslib/calc-lib/1.0.7.28/Device/Vessel.clc
2004-Nov-06 14:45:24 6499 bytes prism/private/wslib/calc-lib/1.0.7.28/FireGasExpansion.clc
2004-Nov-06 14:45:28 6036 bytes prism/private/wslib/calc-lib/1.0.7.28/FireVaporGeneration.clc
2004-Dec-13 10:28:30 306 bytes prism/private/wslib/calc-lib/1.0.7.28/Fitting
2003-Oct-10 14:17:08 5636 bytes prism/private/wslib/calc-lib/1.0.7.28/Fitting/ExpandingFitting.clc
2003-Oct-10 14:17:08 4149 bytes prism/private/wslib/calc-lib/1.0.7.28/Fitting/ExpandingTeeSide.clc
2003-Oct-10 14:17:08 4153 bytes prism/private/wslib/calc-lib/1.0.7.28/Fitting/Pipe.clc
2004-Nov-07 14:46:54 4329 bytes prism/private/wslib/calc-lib/1.0.7.28/Fitting/RDFitting.clc
2004-Jul-02 16:58:00 5741 bytes prism/private/wslib/calc-lib/1.0.7.28/Fitting/ReducingFitting.clc
2003-Oct-10 14:17:08 4176 bytes prism/private/wslib/calc-lib/1.0.7.28/Fitting/ReducingTeeSide.clc
2003-Oct-10 14:17:08 4128 bytes prism/private/wslib/calc-lib/1.0.7.28/Fitting/StandardFitting.clc
2004-Nov-06 14:45:30 6539 bytes prism/private/wslib/calc-lib/1.0.7.28/GivenFlowLiquid.clc
2004-Nov-06 14:45:34 5572 bytes prism/private/wslib/calc-lib/1.0.7.28/GivenFlowSteam.clc
2004-Nov-06 14:45:38 7112 bytes prism/private/wslib/calc-lib/1.0.7.28/GivenFlowVapor.clc
2004-Nov-06 14:45:44 8861 bytes prism/private/wslib/calc-lib/1.0.7.28/GivenFlowVapor.clc-RD
2004-Dec-13 10:28:30 272 bytes prism/private/wslib/calc-lib/1.0.7.28/Liquid
2004-Feb-15 20:52:26 1191 bytes prism/private/wslib/calc-lib/1.0.7.28/Liquid/ControlValveLiquidFlow.clc
2004-May-20 10:21:36 652 bytes prism/private/wslib/calc-lib/1.0.7.28/Liquid/LiquidExpansionCapacity.clc
2004-Jun-21 11:17:22 5116 bytes prism/private/wslib/calc-lib/1.0.7.28/Liquid/LiquidProps.clc
2004-Jul-07 13:46:44 5132 bytes prism/private/wslib/calc-lib/1.0.7.28/Liquid/LiquidVol.clc
2004-May-20 10:47:44 822 bytes prism/private/wslib/calc-lib/1.0.7.28/Liquid/TubeRuptureLiquidMassFlow.clc
2004-May-20 10:47:56 830 bytes prism/private/wslib/calc-lib/1.0.7.28/Liquid/TubeRuptureLiquidVolFlow.clc
2004-Nov-06 14:45:46 5833 bytes prism/private/wslib/calc-lib/1.0.7.28/LiquidExpansion.clc
2004-Nov-06 14:45:50 3259 bytes prism/private/wslib/calc-lib/1.0.7.28/NotImplemented.clc
2004-Dec-13 10:28:30 238 bytes prism/private/wslib/calc-lib/1.0.7.28/Omega
2004-Oct-12 16:26:36 10750 bytes prism/private/wslib/calc-lib/1.0.7.28/Omega/OmegaD21.clc
2004-Oct-12 16:27:22 8233 bytes prism/private/wslib/calc-lib/1.0.7.28/Omega/OmegaD22.clc
2004-Oct-12 16:24:18 13397 bytes prism/private/wslib/calc-lib/1.0.7.28/Omega/OmegaD23.clc
2004-Nov-06 14:45:54 7350 bytes prism/private/wslib/calc-lib/1.0.7.28/Omega/OmegaTwoPhase.clc
2004-Dec-13 10:28:30 918 bytes prism/private/wslib/calc-lib/1.0.7.28/Omega/Util
2004-Sep-28 14:48:56 606 bytes prism/private/wslib/calc-lib/1.0.7.28/Omega/Util/InletVoidFraction.clc
2004-Sep-16 11:28:44 627 bytes prism/private/wslib/calc-lib/1.0.7.28/Omega/Util/OmegaAreaD21.clc
2004-Sep-28 10:26:54 721 bytes prism/private/wslib/calc-lib/1.0.7.28/Omega/Util/OmegaAreaD22.clc
2004-Sep-29 16:05:42 627 bytes prism/private/wslib/calc-lib/1.0.7.28/Omega/Util/OmegaAreaD23.clc
2004-Oct-12 16:34:04 3641 bytes prism/private/wslib/calc-lib/1.0.7.28/Omega/Util/OmegaCriticalFlowD14.clc
2004-Oct-12 16:34:22 2075 bytes prism/private/wslib/calc-lib/1.0.7.28/Omega/Util/OmegaCriticalFlowD15.clc
2004-Sep-27 13:32:40 1706 bytes prism/private/wslib/calc-lib/1.0.7.28/Omega/Util/OmegaCriticalFlowD21.clc
2004-Oct-12 16:29:10 3767 bytes prism/private/wslib/calc-lib/1.0.7.28/Omega/Util/OmegaCriticalFlowD22.clc
2004-Sep-22 13:16:56 1095 bytes prism/private/wslib/calc-lib/1.0.7.28/Omega/Util/OmegaD1.clc
2004-Sep-29 10:51:02 970 bytes prism/private/wslib/calc-lib/1.0.7.28/Omega/Util/OmegaD14.clc
2004-Sep-29 12:50:10 507 bytes prism/private/wslib/calc-lib/1.0.7.28/Omega/Util/OmegaD15.clc
2004-Sep-22 13:24:06 1073 bytes prism/private/wslib/calc-lib/1.0.7.28/Omega/Util/OmegaD2.clc
2004-Sep-22 13:43:36 510 bytes prism/private/wslib/calc-lib/1.0.7.28/Omega/Util/OmegaD3.clc
2004-Sep-22 14:05:30 628 bytes prism/private/wslib/calc-lib/1.0.7.28/Omega/Util/OmegaD4.clc 2004-Sep-27 13:14:56 830 bytes prism/private/wslib/calc-lib/1.0.7.28/Omega/Util/OmegaD8.clc
2004-Sep-28 11:11:50 468 bytes prism/private/wslib/calc-lib/1.0.7.28/Omega/Util/OmegaD9.clc
2004-Oct-12 16:35:12 4604 bytes prism/private/wslib/calc-lib/1.0.7.28/Omega/Util/OmegaKd1234.clc
2004-Oct-12 16:30:20 4604 bytes prism/private/wslib/calc-lib/1.0.7.28/Omega/Util/OmegaKd1415.clc
2004-Oct-12 16:35:54 1878 bytes prism/private/wslib/calc-lib/1.0.7.28/Omega/Util/OmegaKd89.clc
2004-Oct-12 16:36:14 5586 bytes prism/private/wslib/calc-lib/1.0.7.28/Omega/Util/OmegaMassFluxD14.clc
2004-Oct-13 10:46:12 1979 bytes prism/private/wslib/calc-lib/1.0.7.28/Omega/Util/OmegaMassFluxD15.clc
2004-Oct-13 10:46:22 2049 bytes prism/private/wslib/calc-lib/1.0.7.28/Omega/Util/OmegaMassFluxD21.clc
2004-Oct-13 10:45:38 2875 bytes prism/private/wslib/calc-lib/1.0.7.28/Omega/Util/OmegaMassFluxD22.clc
2004-Oct-12 16:33:28 1431 bytes prism/private/wslib/calc-lib/1.0.7.28/Omega/Util/OmegaSubcoolingRegionD22.clc
2004-Sep-14 15:03:40 1522 bytes prism/private/wslib/calc-lib/1.0.7.28/Omega/Util/ThermodynamicCritPoint.clc
2004-Dec-13 10:28:30 578 bytes prism/private/wslib/calc-lib/1.0.7.28/PipingLoss
2004-Nov-07 12:01:16 5729 bytes prism/private/wslib/calc-lib/1.0.7.28/PipingLoss/CheckInlet.clc
2004-Nov-07 12:17:06 6513 bytes prism/private/wslib/calc-lib/1.0.7.28/PipingLoss/CheckOutlet.clc
2004-Jun-11 10:26:26 637 bytes prism/private/wslib/calc-lib/1.0.7.28/PipingLoss/HDelta.clc
2004-Nov-07 12:23:24 30601 bytes prism/private/wslib/calc-lib/1.0.7.28/PipingLoss/Liquid.clc
2004-Jun-22 11:24:14 2195 bytes prism/private/wslib/calc-lib/1.0.7.28/PipingLoss/LiquidDrop.clc
2004-Oct-08 14:16:32 16695 bytes prism/private/wslib/calc-lib/1.0.7.28/PipingLoss/MaxRelCapLiquid.clc
2004-Oct-08 14:46:32 15819 bytes prism/private/wslib/calc-lib/1.0.7.28/PipingLoss/MaxRelCapSteam.clc
2004-Oct-08 14:45:44 16840 bytes prism/private/wslib/calc-lib/1.0.7.28/PipingLoss/MaxRelCapVapor.clc
2004-Oct-08 14:49:20 16939 bytes prism/private/wslib/calc-lib/1.0.7.28/PipingLoss/MaxRelCapVaporFixedBP.clc-new
2004-May-19 17:44:18 9733 bytes prism/private/wslib/calc-lib/1.0.7.28/PipingLoss/NotImplemented.clc
2004-Aug-23 10:11:28 17820 bytes prism/private/wslib/calc-lib/1.0.7.28/PipingLoss/PipingLossInit.clc
2004-Nov-07 12:20:46 34333 bytes prism/private/wslib/calc-lib/1.0.7.28/PipingLoss/Steam.clc
2004-Nov-07 12:20:02 38796 bytes prism/private/wslib/calc-lib/1.0.7.28/PipingLoss/Vapor.clc
2004-Aug-20 15:54:56 2513 bytes prism/private/wslib/calc-lib/1.0.7.28/PipingLoss/VaporDropIn.clc
2004-Aug-20 15:55:38 6784 bytes prism/private/wslib/calc-lib/1.0.7.28/PipingLoss/VaporDropOut.clc
2004-Dec-13 10:28:30 204 bytes prism/private/wslib/calc-lib/1.0.7.28/Post
2004-Jul-15 22:18:44 11722 bytes prism/private/wslib/calc-lib/1.0.7.28/Post/AcousticVibration.clc
2004-Jun-21 11:19:34 1812 bytes prism/private/wslib/calc-lib/1.0.7.28/Post/NoiseLevel.clc
2004-Jun-24 10:44:26 1575 bytes prism/private/wslib/calc-lib/1.0.7.28/Post/ReactionForceSteam.clc
2004-Jun-15 12:02:44 1503 bytes prism/private/wslib/calc-lib/1.0.7.28/Post/ReactionForceVapor.clc
2004-Dec-13 10:28:30 374 bytes prism/private/wslib/calc-lib/1.0.7.28/Pressure
2004-Jun-04 11:58:24 1514 bytes prism/private/wslib/calc-lib/1.0.7.28/Pressure/BackPressure.clc
2004-Jun-21 11:20:40 2461 bytes prism/private/wslib/calc-lib/1.0.7.28/Pressure/BackPressureCheck.clc
2004-Feb-27 19:14:28 2058 bytes prism/private/wslib/calc-lib/1.0.7.28/Pressure/ColdDiffTestPressure.clc
2004-Jul-07 10:35:00 6605 bytes prism/private/wslib/calc-lib/1.0.7.28/Pressure/MRCPOverPRelief.clc
2004-Jun-15 10:24:58 1150 bytes prism/private/wslib/calc-lib/1.0.7.28/Pressure/PAtm.clc
2004-Mar-18 11:31:24 708 bytes prism/private/wslib/calc-lib/1.0.7.28/Pressure/PDelta.clc
2004-Sep-01 10:42:12 15261 bytes prism/private/wslib/calc-lib/1.0.7.28/Pressure/POverPRelief.clc
2004-Jul-15 20:21:40 2670 bytes prism/private/wslib/calc-lib/1.0.7.28/Pressure/PressureChecks.clc
2004-Jul-08 17:07:12 852 bytes prism/private/wslib/calc-lib/1.0.7.28/Pressure/notes.txt
2004-Dec-13 10:28:30 612 bytes prism/private/wslib/calc-lib/1.0.7.28/RuptureDisks
2004-Oct-30 19:45:10 18173 bytes prism/private/wslib/calc-lib/1.0.7.28/RuptureDisks/AcousticVibration.clc
2004-Oct-30 11:44:38 11799 bytes prism/private/wslib/calc-lib/1.0.7.28/RuptureDisks/AcousticVibration.clc-01
2004-Oct-06 18:19:26 4665 bytes prism/private/wslib/calc-lib/1.0.7.28/RuptureDisks/CheckInlet.clc
2004-Oct-06 18:19:38 5318 bytes prism/private/wslib/calc-lib/1.0.7.28/RuptureDisks/CheckOutlet.clc
2004-Jun-11 10:26:26 637 bytes prism/private/wslib/calc-lib/1.0.7.28/RuptureDisks/HDelta.clc
2004-Dec-13 10:28:30 306 bytes prism/private/wslib/calc-lib/1.0.7.28/RuptureDisks/Holding
2004-Oct-30 11:37:44 12370 bytes prism/private/wslib/calc-lib/1.0.7.28/RuptureDisks/Holding/AcousticVibrationPipeSection.clc-01
2004-Nov-06 14:46:10 26433 bytes prism/private/wslib/calc-lib/1.0.7.28/RuptureDisks/Holding/Liquid.clc-01
2004-Oct-06 18:20:02 2195 bytes prism/private/wslib/calc-lib/1.0.7.28/RuptureDisks/Holding/LiquidDrop.clc-01
2004-Oct-06 18:23:02 16675 bytes prism/private/wslib/calc-lib/1.0.7.28/RuptureDisks/Holding/MaxRelCapLiquid.clc-01
2004-Oct-06 18:23:08 15800 bytes prism/private/wslib/calc-lib/1.0.7.28/RuptureDisks/Holding/MaxRelCapSteam.clc
2004-May-19 17:44:18 9733 bytes prism/private/wslib/calc-lib/1.0.7.28/RuptureDisks/Holding/NotImplemented.clc
2004-Nov-06 14:46:14 34395 bytes prism/private/wslib/calc-lib/1.0.7.28/RuptureDisks/Holding/Steam.clc-01
2004-Nov-11 19:12:18 18996 bytes prism/private/wslib/calc-lib/1.0.7.28/RuptureDisks/Liquid.clc
2004-Nov-11 19:09:18 4691 bytes prism/private/wslib/calc-lib/1.0.7.28/RuptureDisks/LiquidDrop.clc
2004-Nov-06 20:33:56 6234 bytes prism/private/wslib/calc-lib/1.0.7.28/RuptureDisks/MRCPOverPRelief.clc
2004-Oct-15 12:04:30 6144 bytes prism/private/wslib/calc-lib/1.0.7.28/RuptureDisks/MRCPOverPRelief.clc-01
2004-Nov-11 18:37:00 12080 bytes prism/private/wslib/calc-lib/1.0.7.28/RuptureDisks/MaxRelCapLiquid.clc 2004-Nov-07 11:26:54 12566 bytes prism/private/wslib/calc-lib/1.0.7.28/RuptureDisks/MaxRelCapVapor.clc
2004-Oct-08 14:26:06 9735 bytes prism/private/wslib/calc-lib/1.0.7.28/RuptureDisks/NotImplemented.clc
2004-Nov-07 14:50:16 17439 bytes prism/private/wslib/calc-lib/1.0.7.28/RuptureDisks/PipingLossInit.clc
2004-Nov-11 11:03:40 23878 bytes prism/private/wslib/calc-lib/1.0.7.28/RuptureDisks/Vapor.clc
2004-Oct-18 13:56:14 10708 bytes prism/private/wslib/calc-lib/1.0.7.28/RuptureDisks/VaporDrop.clc
2004-Dec-13 10:28:30 136 bytes prism/private/wslib/calc-lib/1.0.7.28/Steam
2004-Mar-29 14:10:14 947 bytes prism/private/wslib/calc-lib/1.0.7.28/Steam/Steam.clc
2004-Jun-15 20:22:40 929 bytes prism/private/wslib/calc-lib/1.0.7.28/Steam/SteamProps.clc
2004-Dec-13 10:28:30 408 bytes prism/private/wslib/calc-lib/1.0.7.28/Tanks
2004-Nov-06 17:17:14 3308 bytes prism/private/wslib/calc-lib/1.0.7.28/Tanks/FireVaporGen.clc
2004-Nov-06 17:17:14 2577 bytes prism/private/wslib/calc-lib/1.0.7.28/Tanks/GivenInFlow.clc
2004-Nov-06 17:17:16 2654 bytes prism/private/wslib/calc-lib/1.0.7.28/Tanks/GivenOutFlow.clc
2004-Nov-06 17:17:16 3087 bytes prism/private/wslib/calc-lib/1.0.7.28/Tanks/PadFailure.clc
2004-Dec-13 10:28:30 136 bytes prism/private/wslib/calc-lib/1.0.7.28/Tanks/Pressure
2004-Nov-06 17:17:16 2144 bytes prism/private/wslib/calc-lib/1.0.7.28/Tanks/Pressure/PresPOverTV.clc
2004-Nov-06 17:17:16 2144 bytes prism/private/wslib/calc-lib/1.0.7.28/Tanks/Pressure/VacPOverTV.clc
2004-Nov-06 17:17:16 5034 bytes prism/private/wslib/calc-lib/1.0.7.28/Tanks/PumpInLiquidThermal.clc
2004-Nov-06 17:17:16 3125 bytes prism/private/wslib/calc-lib/1.0.7.28/Tanks/PumpOutLiquidThermal.clc
2004-Nov-06 17:17:16 2671 bytes prism/private/wslib/calc-lib/1.0.7.28/Tanks/SteamOut.clc
2004-Nov-06 17:17:16 2081 bytes prism/private/wslib/calc-lib/1.0.7.28/Tanks/TankDraining.clc
2004-Dec-13 10:28:30 510 bytes prism/private/wslib/calc-lib/1.0.7.28/Tanks/Util
2004-Nov-06 17:17:16 1184 bytes prism/private/wslib/calc-lib/1.0.7.28/Tanks/Util/GasAirConvert.clc
2004-Nov-06 17:17:16 9535 bytes prism/private/wslib/calc-lib/1.0.7.28/Tanks/Util/ProtectedDataFire.clc
2004-Nov-06 17:17:16 1125 bytes prism/private/wslib/calc-lib/1.0.7.28/Tanks/Util/ProtectedDataGivenInFlow.clc
2004-Nov-06 17:17:16 4823 bytes prism/private/wslib/calc-lib/1.0.7.28/Tanks/Util/ProtectedDataGivenOutFlow.clc
2004-Nov-06 17:17:16 4974 bytes prism/private/wslib/calc-lib/1.0.7.28/Tanks/Util/ProtectedDataPadFail.clc
2004-Nov-06 17:17:16 6562 bytes prism/private/wslib/calc-lib/1.0.7.28/Tanks/Util/ProtectedDataPumpIn.clc
2004-Nov-06 17:17:16 2677 bytes prism/private/wslib/calc-lib/1.0.7.28/Tanks/Util/ProtectedDataPumpOut.clc
2004-Nov-06 17:17:16 2650 bytes prism/private/wslib/calc-lib/1.0.7.28/Tanks/Util/ProtectedDataSteam.clc
2004-Nov-06 17:17:16 1516 bytes prism/private/wslib/calc-lib/1.0.7.28/Tanks/Util/ProtectedDataTankDrain.clc
2004-Nov-06 17:17:16 4425 bytes prism/private/wslib/calc-lib/1.0.7.28/Tanks/Util/ProtectingDataFire.clc
2004-Nov-06 17:17:16 4352 bytes prism/private/wslib/calc-lib/1.0.7.28/Tanks/Util/ProtectingDataPressure.clc
2004-Nov-06 17:17:16 4268 bytes prism/private/wslib/calc-lib/1.0.7.28/Tanks/Util/ProtectingDataVacuum.clc
2004-Nov-06 17:17:16 745 bytes prism/private/wslib/calc-lib/1.0.7.28/Tanks/Util/VentAdequateChecks.clc
2004-Nov-06 14:46:44 10240 bytes prism/private/wslib/calc-lib/1.0.7.28/TubeRuptureLiquid.clc
2004-Nov-06 14:46:48 9029 bytes prism/private/wslib/calc-lib/1.0.7.28/TubeRuptureVapor.clc
2004-Nov-06 14:46:50 6124 bytes prism/private/wslib/calc-lib/1.0.7.28/UserSpecifiedLiquid.clc
2004-Nov-06 14:46:54 4990 bytes prism/private/wslib/calc-lib/1.0.7.28/UserSpecifiedSteam.clc
2004-Nov-06 14:46:56 5866 bytes prism/private/wslib/calc-lib/1.0.7.28/UserSpecifiedVapor.clc
2004-Dec-13 10:28:30 918 bytes prism/private/wslib/calc-lib/1.0.7.28/Util
2003-Nov-11 18:36:28 605 bytes prism/private/wslib/calc-lib/1.0.7.28/Util/AreaAdequateChecks.clc
2003-Oct-29 14:25:16 786 bytes prism/private/wslib/calc-lib/1.0.7.28/Util/AreaChecks.clc
2004-Oct-18 21:26:36 6614 bytes prism/private/wslib/calc-lib/1.0.7.28/Util/CheckProtectingValves.clc
2004-Sep-19 12:54:20 5637 bytes prism/private/wslib/calc-lib/1.0.7.28/Util/CheckProtectingValves.clc-01
2004-Oct-06 14:20:40 6216 bytes prism/private/wslib/calc-lib/1.0.7.28/Util/CheckProtectingValves.clc-02
2004-Oct-15 11:28:32 6504 bytes prism/private/wslib/calc-lib/1.0.7.28/Util/CheckProtectingValves.clc-03
2004-Jun-15 12:04:20 3729 bytes prism/private/wslib/calc-lib/1.0.7.28/Util/CriticalFlow.clc
2004-Mar-08 13:39:08 1109 bytes prism/private/wslib/calc-lib/1.0.7.28/Util/CriticalTubeFlow.clc
2004-Sep-29 14:30:34 4723 bytes prism/private/wslib/calc-lib/1.0.7.28/Util/Kb.clc
2004-Mar-12 11:53:32 1555 bytes prism/private/wslib/calc-lib/1.0.7.28/Util/KbpLiquid.clc
2004-Sep-29 14:29:46 1874 bytes prism/private/wslib/calc-lib/1.0.7.28/Util/KbpVapor.clc
2004-Mar-08 13:22:24 1125 bytes prism/private/wslib/calc-lib/1.0.7.28/Util/Kn.clc
2004-Mar-29 14:08:48 1380 bytes prism/private/wslib/calc-lib/1.0.7.28/Util/Ksh.clc
2004-Jul-07 15:10:20 10998 bytes prism/private/wslib/calc-lib/1.0.7.28/Util/Kv.clc
2004-Jul-07 15:16:44 4375 bytes prism/private/wslib/calc-lib/1.0.7.28/Util/Kw.clc
2004-Aug-23 15:07:26 6174 bytes prism/private/wslib/calc-lib/1.0.7.28/Util/ProtectedData.clc
2004-Aug-23 11:54:08 14233 bytes prism/private/wslib/calc-lib/1.0.7.28/Util/ProtectedDataVessel.clc
2004-Nov-07 14:11:26 22478 bytes prism/private/wslib/calc-lib/1.0.7.28/Util/ProtectingData.clc
2004-Oct-06 13:22:10 18888 bytes prism/private/wslib/calc-lib/1.0.7.28/Util/ProtectingData.clc-01
2004-Oct-06 13:26:04 18888 bytes prism/private/wslib/calc-lib/1.0.7.28/Util/ProtectingData.clc-02
2004-Jul-06 21:08:02 3283 bytes prism/private/wslib/calc-lib/1.0.7.28/Util/ReqSizingCode.clc 2004-Jun-21 16:11:04 1022 bytes prism/private/wslib/calc-lib/1.0.7.28/Util/ReqValveType.clc
2004-Jul-07 13:51:14 510 bytes prism/private/wslib/calc-lib/1.0.7.28/Util/ReynoldsToKu.clc
2004-Sep-14 15:03:40 1522 bytes prism/private/wslib/calc-lib/1.0.7.28/Util/ThermodynamicCritPoint.clc
2004-May-20 10:34:54 1533 bytes prism/private/wslib/calc-lib/1.0.7.28/Util/VaporCapCreditCnvrt.clc
2004-Dec-13 10:28:30 408 bytes prism/private/wslib/calc-lib/1.0.7.28/Vapor
2004-Jun-15 10:26:10 3951 bytes prism/private/wslib/calc-lib/1.0.7.28/Vapor/ControlValveVaporFlow.clc
2004-Jul-16 11:27:14 2520 bytes prism/private/wslib/calc-lib/1.0.7.28/Vapor/FGEVaporMass.clc
2004-Jun-23 15:01:10 1610 bytes prism/private/wslib/calc-lib/1.0.7.28/Vapor/FireGasCapacity.clc
2004-Aug-17 13:56:16 10053 bytes prism/private/wslib/calc-lib/1.0.7.28/Vapor/FireVaporCapacity.clc
2004-May-20 10:46:50 1185 bytes prism/private/wslib/calc-lib/1.0.7.28/Vapor/TubeRuptureVaporFlowCrit.clc
2004-May-20 10:46:58 881 bytes prism/private/wslib/calc-lib/1.0.7.28/Vapor/TubeRuptureVaporFlowSub.clc
2004-Jun-15 10:26:28 2099 bytes prism/private/wslib/calc-lib/1.0.7.28/Vapor/VaporMass.clc
2004-Feb-27 21:19:16 1725 bytes prism/private/wslib/calc-lib/1.0.7.28/Vapor/VaporProcessProps.clc
2004-Jul-06 15:36:52 7672 bytes prism/private/wslib/calc-lib/1.0.7.28/Vapor/VaporProps.clc
2004-Jun-15 10:27:02 2085 bytes prism/private/wslib/calc-lib/1.0.7.28/Vapor/VaporVol.clc
2004-Dec-13 10:28:17 782 bytes prism/private/wslib/calc-lib/1.0.7/1.0.7.0
2003-May-26 20:19:20 5089 bytes prism/private/wslib/calc-lib/1.0.7/1.0.7.0/ControlValveLiquid.clc
2003-May-26 20:19:36 4804 bytes prism/private/wslib/calc-lib/1.0.7/1.0.7.0/ControlValveVapor.clc
2004-Dec-13 10:28:17 204 bytes prism/private/wslib/calc-lib/1.0.7/1.0.7.0/Device
2003-Apr-30 13:51:28 4069 bytes prism/private/wslib/calc-lib/1.0.7/1.0.7.0/Device/PRVDeviceData.clc
2003-May-27 16:50:44 3251 bytes prism/private/wslib/calc-lib/1.0.7/1.0.7.0/Device/PipeDeviceData.clc
2003-Feb-03 19:25:52 7591 bytes prism/private/wslib/calc-lib/1.0.7/1.0.7.0/Device/RDDeviceData.clc
2003-May-02 11:01:48 2672 bytes prism/private/wslib/calc-lib/1.0.7/1.0.7.0/Device/TurbineStmDeviceData.clc
2003-May-26 20:19:42 5181 bytes prism/private/wslib/calc-lib/1.0.7/1.0.7.0/FireVaporGeneration.clc
2003-May-26 20:19:50 5958 bytes prism/private/wslib/calc-lib/1.0.7/1.0.7.0/GivenFlowLiquid.clc
2003-May-26 20:23:06 4887 bytes prism/private/wslib/calc-lib/1.0.7/1.0.7.0/GivenFlowSteam.clc
2003-May-26 20:20:04 5864 bytes prism/private/wslib/calc-lib/1.0.7/1.0.7.0/GivenFlowVapor.clc
2004-Dec-13 10:28:17 170 bytes prism/private/wslib/calc-lib/1.0.7/1.0.7.0/Liquid
2003-Feb-27 15:22:26 939 bytes prism/private/wslib/calc-lib/1.0.7/1.0.7.0/Liquid/ControlValveLiquidFlow.clc
2003-Mar-09 23:14:08 4894 bytes prism/private/wslib/calc-lib/1.0.7/1.0.7.0/Liquid/LiquidProps.clc
2003-Apr-25 11:02:58 4826 bytes prism/private/wslib/calc-lib/1.0.7/1.0.7.0/Liquid/LiquidVol.clc
2003-May-26 20:20:10 2870 bytes prism/private/wslib/calc-lib/1.0.7/1.0.7.0/NotImplemented.clc
2003-Jul-06 22:04:28 32631 bytes prism/private/wslib/calc-lib/1.0.7/1.0.7.0/PipingLoss.clc
2003-May-19 20:19:26 31210 bytes prism/private/wslib/calc-lib/1.0.7/1.0.7.0/PipingLoss.clc-01
2003-May-26 11:55:02 31397 bytes prism/private/wslib/calc-lib/1.0.7/1.0.7.0/PipingLoss.clc-02
2004-Dec-13 10:28:17 102 bytes prism/private/wslib/calc-lib/1.0.7/1.0.7.0/Post
2003-May-26 23:57:46 22218 bytes prism/private/wslib/calc-lib/1.0.7/1.0.7.0/Post/MaxRelCap.clc
2004-Dec-13 10:28:17 340 bytes prism/private/wslib/calc-lib/1.0.7/1.0.7.0/Pressure
2003-May-26 20:01:54 1553 bytes prism/private/wslib/calc-lib/1.0.7/1.0.7.0/Pressure/BackPressure.clc
2002-Dec-30 17:33:24 1384 bytes prism/private/wslib/calc-lib/1.0.7/1.0.7.0/Pressure/ColdDiffTestPressure.clc
2003-May-26 21:59:18 4630 bytes prism/private/wslib/calc-lib/1.0.7/1.0.7.0/Pressure/MRCPOverPRelief.clc
2003-Mar-09 23:08:02 1126 bytes prism/private/wslib/calc-lib/1.0.7/1.0.7.0/Pressure/PAtm.clc
2002-Dec-30 17:33:24 399 bytes prism/private/wslib/calc-lib/1.0.7/1.0.7.0/Pressure/PDelta.clc
2003-May-26 21:55:26 11422 bytes prism/private/wslib/calc-lib/1.0.7/1.0.7.0/Pressure/POverPRelief.clc
2003-May-26 21:55:56 8055 bytes prism/private/wslib/calc-lib/1.0.7/1.0.7.0/Pressure/POverPReliefFire.clc
2003-May-26 23:41:40 2353 bytes prism/private/wslib/calc-lib/1.0.7/1.0.7.0/Pressure/PressureChecks.clc
2004-Dec-13 10:28:17 136 bytes prism/private/wslib/calc-lib/1.0.7/1.0.7.0/Steam
2003-Mar-24 11:30:50 708 bytes prism/private/wslib/calc-lib/1.0.7/1.0.7.0/Steam/Steam.clc
2003-Mar-09 23:16:14 2544 bytes prism/private/wslib/calc-lib/1.0.7/1.0.7.0/Steam/ValveSteam.clc
2003-May-26 20:20:14 5255 bytes prism/private/wslib/calc-lib/1.0.7/1.0.7.0/UserSpecifiedLiquid.clc
2003-May-26 20:20:20 4365 bytes prism/private/wslib/calc-lib/1.0.7/1.0.7.0/UserSpecifiedSteam.clc
2003-May-26 20:20:26 4721 bytes prism/private/wslib/calc-lib/1.0.7/1.0.7.0/UserSpecifiedVapor.clc
2004-Dec-13 10:28:17 578 bytes prism/private/wslib/calc-lib/1.0.7/1.0.7.0/Util
2003-Apr-25 09:56:36 601 bytes prism/private/wslib/calc-lib/1.0.7/1.0.7.0/Util/AreaAdequateChecks.clc
2003-Apr-25 15:30:22 782 bytes prism/private/wslib/calc-lib/1.0.7/1.0.7.0/Util/AreaChecks.clc
2003-May-28 18:50:20 3570 bytes prism/private/wslib/calc-lib/1.0.7/1.0.7.0/Util/Kb.clc
2003-May-26 19:56:04 1219 bytes prism/private/wslib/calc-lib/1.0.7/1.0.7.0/Util/KbpLiquid.clc
2003-May-26 19:56:10 1547 bytes prism/private/wslib/calc-lib/1.0.7/1.0.7.0/Util/KbpVapor.clc
2003-Mar-09 23:01:08 724 bytes prism/private/wslib/calc-lib/1.0.7/1.0.7.0/Util/Kn.clc
2003-Mar-24 13:08:16 1305 bytes prism/private/wslib/calc-lib/1.0.7/1.0.7.0/Util/Ksh.clc
2003-May-28 18:47:50 9775 bytes prism/private/wslib/calc-lib/1.0.7/1.0.7.0/Util/Kv.clc 2003-May-28 18:47:56 3355 bytes prism/private/wslib/calc-lib/1.0.7/1.0.7.0/Util/Kw.clc
2003-May-22 22:40:14 6277 bytes prism/private/wslib/calc-lib/1.0.7/1.0.7.0/Util/ProtectedData.clc
2003-May-22 22:39:28 6287 bytes prism/private/wslib/calc-lib/1.0.7/1.0.7.0/Util/ProtectedData.clc-01
2003-May-22 23:22:20 8913 bytes prism/private/wslib/calc-lib/1.0.7/1.0.7.0/Util/ProtectedDataVessel.clc
2003-May-14 21:43:48 16009 bytes prism/private/wslib/calc-lib/1.0.7/1.0.7.0/Util/ProtectingData.clc
2003-Mar-09 23:04:20 2983 bytes prism/private/wslib/calc-lib/1.0.7/1.0.7.0/Util/ReqSizingCode.clc
2003-May-27 20:38:20 1614 bytes prism/private/wslib/calc-lib/1.0.7/1.0.7.0/Util/ReqValveType.clc
2004-Dec-13 10:28:17 272 bytes prism/private/wslib/calc-lib/1.0.7/1.0.7.0/Vapor
2003-Mar-09 23:14:52 2543 bytes prism/private/wslib/calc-lib/1.0.7/1.0.7.0/Vapor/ControlValveVaporFlow.clc
2003-Mar-09 23:14:58 4814 bytes prism/private/wslib/calc-lib/1.0.7/1.0.7.0/Vapor/FireVaporCapacity.clc
2003-Jan-03 14:30:22 681 bytes prism/private/wslib/calc-lib/1.0.7/1.0.7.0/Vapor/VaporMass.clc
2003-Mar-03 12:05:00 1388 bytes prism/private/wslib/calc-lib/1.0.7/1.0.7.0/Vapor/VaporProcessProps.clc
2003-Mar-09 23:15:28 6648 bytes prism/private/wslib/calc-lib/1.0.7/1.0.7.0/Vapor/VaporProps.clc
2003-Jan-29 11:30:40 695 bytes prism/private/wslib/calc-lib/1.0.7/1.0.7.0/Vapor/VaporVol.clc
2003-Mar-09 23:19:10 221 bytes prism/private/wslib/calc-lib/1.0.7/1.0.7.0/error-nums.txt
2004-Dec-13 10:28:17 680 bytes prism/private/wslib/calc-lib/1.0.7/1.0.7.1
2003-May-26 20:19:20 5089 bytes prism/private/wslib/calc-lib/1.0.7/1.0.7.1/ControlValveLiquid.clc
2003-May-26 20:19:36 4804 bytes prism/private/wslib/calc-lib/1.0.7/1.0.7.1/ControlValveVapor.clc
2004-Dec-13 10:28:17 204 bytes prism/private/wslib/calc-lib/1.0.7/1.0.7.1/Device
2003-Apr-30 13:51:28 4069 bytes prism/private/wslib/calc-lib/1.0.7/1.0.7.1/Device/PRVDeviceData.clc
2003-May-27 16:50:44 3251 bytes prism/private/wslib/calc-lib/1.0.7/1.0.7.1/Device/PipeDeviceData.clc
2003-Feb-03 19:25:52 7591 bytes prism/private/wslib/calc-lib/1.0.7/1.0.7.1/Device/RDDeviceData.clc
2003-May-02 11:01:48 2672 bytes prism/private/wslib/calc-lib/1.0.7/1.0.7.1/Device/TurbineStmDeviceData.clc
2003-May-26 20:19:42 5181 bytes prism/private/wslib/calc-lib/1.0.7/1.0.7.1/FireVaporGeneration.clc
2003-May-26 20:19:50 5958 bytes prism/private/wslib/calc-lib/1.0.7/1.0.7.1/GivenFlowLiquid.clc
2003-May-26 20:23:06 4887 bytes prism/private/wslib/calc-lib/1.0.7/1.0.7.1/GivenFlowSteam.clc
2003-May-26 20:20:04 5864 bytes prism/private/wslib/calc-lib/1.0.7/1.0.7.1/GivenFlowVapor.clc
2004-Dec-13 10:28:17 170 bytes prism/private/wslib/calc-lib/1.0.7/1.0.7.1/Liquid
2003-Feb-27 15:22:26 939 bytes prism/private/wslib/calc-lib/1.0.7/1.0.7.1/Liquid/ControlValveLiquidFlow.clc
2003-Mar-09 23:14:08 4894 bytes prism/private/wslib/calc-lib/1.0.7/1.0.7.1/Liquid/LiquidProps.clc
2003-Apr-25 11:02:58 4826 bytes prism/private/wslib/calc-lib/1.0.7/1.0.7.1/Liquid/LiquidVol.clc
2003-May-26 20:20:10 2870 bytes prism/private/wslib/calc-lib/1.0.7/1.0.7.1/NotImplemented.clc
2003-Jul-06 22:03:46 42357 bytes prism/private/wslib/calc-lib/1.0.7/1.0.7.1/PipingLoss.clc
2004-Dec-13 10:28:17 170 bytes prism/private/wslib/calc-lib/1.0.7/1.0.7.1/Post
2003-Jun-12 11:26:04 23518 bytes prism/private/wslib/calc-lib/1.0.7/1.0.7.1/Post/MaxRelCap.clc
2003-Jun-12 10:09:28 1763 bytes prism/private/wslib/calc-lib/1.0.7/1.0.7.1/Post/NoiseLevel.clc
2003-Jun-12 10:08:56 2004 bytes prism/private/wslib/calc-lib/1.0.7/1.0.7.1/Post/ReactionForce.clc
2004-Dec-13 10:28:17 340 bytes prism/private/wslib/calc-lib/1.0.7/1.0.7.1/Pressure
2003-May-26 20:01:54 1553 bytes prism/private/wslib/calc-lib/1.0.7/1.0.7.1/Pressure/BackPressure.clc
2003-May-31 22:13:28 1384 bytes prism/private/wslib/calc-lib/1.0.7/1.0.7.1/Pressure/ColdDiffTestPressure.clc
2003-May-26 21:59:18 4630 bytes prism/private/wslib/calc-lib/1.0.7/1.0.7.1/Pressure/MRCPOverPRelief.clc
2003-Mar-09 23:08:02 1126 bytes prism/private/wslib/calc-lib/1.0.7/1.0.7.1/Pressure/PAtm.clc
2002-Dec-30 17:33:24 399 bytes prism/private/wslib/calc-lib/1.0.7/1.0.7.1/Pressure/PDelta.clc
2003-May-30 10:31:18 11593 bytes prism/private/wslib/calc-lib/1.0.7/1.0.7.1/Pressure/POverPRelief.clc
2003-May-30 10:31:12 8225 bytes prism/private/wslib/calc-lib/1.0.7/1.0.7.1/Pressure/POverPReliefFire.clc
2003-May-26 23:41:40 2353 bytes prism/private/wslib/calc-lib/1.0.7/1.0.7.1/Pressure/PressureChecks.clc
2004-Dec-13 10:28:17 102 bytes prism/private/wslib/calc-lib/1.0.7/1.0.7.1/Steam
2003-Mar-24 11:30:50 708 bytes prism/private/wslib/calc-lib/1.0.7/1.0.7.1/Steam/Steam.clc
2003-May-26 20:20:14 5255 bytes prism/private/wslib/calc-lib/1.0.7/1.0.7.1/UserSpecifiedLiquid.clc
2003-May-26 20:20:20 4365 bytes prism/private/wslib/calc-lib/1.0.7/1.0.7.1/UserSpecifiedSteam.clc
2003-May-26 20:20:26 4721 bytes prism/private/wslib/calc-lib/1.0.7/1.0.7.1/UserSpecifiedVapor.clc
2004-Dec-13 10:28:17 544 bytes prism/private/wslib/calc-lib/1.0.7/1.0.7.1/Util
2003-Apr-25 09:56:36 601 bytes prism/private/wslib/calc-lib/1.0.7/1.0.7.1/Util/AreaAdequateChecks.clc
2003-Apr-25 15:30:22 782 bytes prism/private/wslib/calc-lib/1.0.7/1.0.7.1/Util/AreaChecks.clc
2003-May-28 18:50:20 3570 bytes prism/private/wslib/calc-lib/1.0.7/1.0.7.1/Util/Kb.clc
2003-May-26 19:56:04 1219 bytes prism/private/wslib/calc-lib/1.0.7/1.0.7.1/Util/KbpLiquid.clc
2003-May-26 19:56:10 1547 bytes prism/private/wslib/calc-lib/1.0.7/1.0.7.1/Util/KbpVapor.clc
2003-Mar-09 23:01:08 724 bytes prism/private/wslib/calc-lib/1.0.7/1.0.7.1/Util/Kn.clc
2003-Mar-24 13:08:16 1305 bytes prism/private/wslib/calc-lib/1.0.7/1.0.7.1/Util/Ksh.clc
2003-May-28 18:47:50 9775 bytes prism/private/wslib/calc-lib/1.0.7/1.0.7.1/Util/Kv.clc
2003-May-28 18:47:56 3355 bytes prism/private/wslib/calc-lib/1.0.7/1.0.7.1/Util/Kw.clc 2003-May-22 22:40:14 6277 bytes prism/private/wslib/calc-lib/1.0.7/1.0.7.1/Util/ProtectedData.clc
2003-May-22 23:22:20 8913 bytes prism/private/wslib/calc-lib/1.0.7/1.0.7.1/Util/ProtectedDataVessel.clc
2003-May-14 21:43:48 16009 bytes prism/private/wslib/calc-lib/1.0.7/1.0.7.1/Util/ProtectingData.clc
2003-Mar-09 23:04:20 2983 bytes prism/private/wslib/calc-lib/1.0.7/1.0.7.1/Util/ReqSizingCode.clc
2003-May-27 20:38:20 1614 bytes prism/private/wslib/calc-lib/1.0.7/1.0.7.1/Util/ReqValveType.clc
2004-Dec-13 10:28:18 272 bytes prism/private/wslib/calc-lib/1.0.7/1.0.7.1/Vapor
2003-Mar-09 23:14:52 2543 bytes prism/private/wslib/calc-lib/1.0.7/1.0.7.1/Vapor/ControlValveVaporFlow.clc
2003-Mar-09 23:14:58 4814 bytes prism/private/wslib/calc-lib/1.0.7/1.0.7.1/Vapor/FireVaporCapacity.clc
2003-Jan-03 14:30:22 681 bytes prism/private/wslib/calc-lib/1.0.7/1.0.7.1/Vapor/VaporMass.clc
2003-Mar-03 12:05:00 1388 bytes prism/private/wslib/calc-lib/1.0.7/1.0.7.1/Vapor/VaporProcessProps.clc
2003-Mar-09 23:15:28 6648 bytes prism/private/wslib/calc-lib/1.0.7/1.0.7.1/Vapor/VaporProps.clc
2003-Jan-29 11:30:40 695 bytes prism/private/wslib/calc-lib/1.0.7/1.0.7.1/Vapor/VaporVol.clc
2004-Dec-13 10:28:18 748 bytes prism/private/wslib/calc-lib/1.0.7/1.0.7.10
2003-Oct-10 14:17:08 5165 bytes prism/private/wslib/calc-lib/1.0.7/1.0.7.10/ControlValveLiquid.clc
2003-Oct-10 14:17:08 4980 bytes prism/private/wslib/calc-lib/1.0.7/1.0.7.10/ControlValveVapor.clc
2004-Dec-13 10:28:18 306 bytes prism/private/wslib/calc-lib/1.0.7/1.0.7.10/Device
2003-Nov-05 21:08:04 4361 bytes prism/private/wslib/calc-lib/1.0.7/1.0.7.10/Device/PRVDeviceData.clc
2003-Oct-10 14:17:08 3251 bytes prism/private/wslib/calc-lib/1.0.7/1.0.7.10/Device/PipeDeviceData.clc
2003-Nov-05 20:24:36 7721 bytes prism/private/wslib/calc-lib/1.0.7/1.0.7.10/Device/RDDeviceData.clc
2003-Oct-10 14:17:08 7891 bytes prism/private/wslib/calc-lib/1.0.7/1.0.7.10/Device/TVDeviceData.clc
2003-Oct-10 14:17:08 4447 bytes prism/private/wslib/calc-lib/1.0.7/1.0.7.10/Device/TankDeviceData.clc
2003-Oct-10 14:17:08 2672 bytes prism/private/wslib/calc-lib/1.0.7/1.0.7.10/Device/TurbineStmDeviceData.clc
2003-Oct-29 14:54:00 2665 bytes prism/private/wslib/calc-lib/1.0.7/1.0.7.10/Device/Vessel.clc
2003-Oct-10 14:17:08 5354 bytes prism/private/wslib/calc-lib/1.0.7/1.0.7.10/FireVaporGeneration.clc
2004-Dec-13 10:28:18 272 bytes prism/private/wslib/calc-lib/1.0.7/1.0.7.10/Fitting
2003-Oct-10 14:17:08 5636 bytes prism/private/wslib/calc-lib/1.0.7/1.0.7.10/Fitting/ExpandingFitting.clc
2003-Oct-10 14:17:08 4149 bytes prism/private/wslib/calc-lib/1.0.7/1.0.7.10/Fitting/ExpandingTeeSide.clc
2003-Oct-10 14:17:08 4153 bytes prism/private/wslib/calc-lib/1.0.7/1.0.7.10/Fitting/Pipe.clc
2003-Oct-10 14:17:08 5741 bytes prism/private/wslib/calc-lib/1.0.7/1.0.7.10/Fitting/ReducingFitting.clc
2003-Oct-10 14:17:08 4176 bytes prism/private/wslib/calc-lib/1.0.7/1.0.7.10/Fitting/ReducingTeeSide.clc
2003-Oct-10 14:17:08 4128 bytes prism/private/wslib/calc-lib/1.0.7/1.0.7.10/Fitting/StandardFitting.clc
2003-Oct-10 14:17:08 6102 bytes prism/private/wslib/calc-lib/1.0.7/1.0.7.10/GivenFlowLiquid.clc
2003-Oct-10 14:17:08 4964 bytes prism/private/wslib/calc-lib/1.0.7/1.0.7.10/GivenFlowSteam.clc
2003-Oct-10 14:17:08 6232 bytes prism/private/wslib/calc-lib/1.0.7/1.0.7.10/GivenFlowVapor.clc
2004-Dec-13 10:28:18 170 bytes prism/private/wslib/calc-lib/1.0.7/1.0.7.10/Liquid
2003-Oct-10 14:17:08 939 bytes prism/private/wslib/calc-lib/1.0.7/1.0.7.10/Liquid/ControlValveLiquidFlow.clc
2003-Oct-12 14:58:14 4894 bytes prism/private/wslib/calc-lib/1.0.7/1.0.7.10/Liquid/LiquidProps.clc
2003-Oct-10 14:17:08 4991 bytes prism/private/wslib/calc-lib/1.0.7/1.0.7.10/Liquid/LiquidVol.clc
2003-Oct-10 14:17:08 2880 bytes prism/private/wslib/calc-lib/1.0.7/1.0.7.10/NotImplemented.clc
2003-Nov-05 21:21:26 69816 bytes prism/private/wslib/calc-lib/1.0.7/1.0.7.10/PipingLoss.clc
2004-Dec-13 10:28:18 204 bytes prism/private/wslib/calc-lib/1.0.7/1.0.7.10/Post
2003-Nov-08 14:19:44 18871 bytes prism/private/wslib/calc-lib/1.0.7/1.0.7.10/Post/MaxRelCap.clc
2003-Oct-10 14:17:08 9558 bytes prism/private/wslib/calc-lib/1.0.7/1.0.7.10/Post/MaxRelCapIter.clc
2003-Dec-15 13:00:42 1800 bytes prism/private/wslib/calc-lib/1.0.7/1.0.7.10/Post/NoiseLevel.clc
2003-Oct-10 14:17:08 2041 bytes prism/private/wslib/calc-lib/1.0.7/1.0.7.10/Post/ReactionForce.clc
2004-Dec-13 10:28:18 306 bytes prism/private/wslib/calc-lib/1.0.7/1.0.7.10/Pressure
2003-Oct-29 14:02:34 1941 bytes prism/private/wslib/calc-lib/1.0.7/1.0.7.10/Pressure/BackPressure.clc
2003-Oct-10 14:17:08 1384 bytes prism/private/wslib/calc-lib/1.0.7/1.0.7.10/Pressure/ColdDiffTestPressure.clc
2003-Oct-29 13:06:54 4477 bytes prism/private/wslib/calc-lib/1.0.7/1.0.7.10/Pressure/MRCPOverPRelief.clc
2003-Oct-10 14:17:08 1126 bytes prism/private/wslib/calc-lib/1.0.7/1.0.7.10/Pressure/PAtm.clc
2003-Oct-29 14:04:20 551 bytes prism/private/wslib/calc-lib/1.0.7/1.0.7.10/Pressure/PDelta.clc
2003-Nov-08 14:52:14 10817 bytes prism/private/wslib/calc-lib/1.0.7/1.0.7.10/Pressure/POverPRelief.clc
2003-Oct-29 13:59:56 2792 bytes prism/private/wslib/calc-lib/1.0.7/1.0.7.10/Pressure/PressureChecks.clc
2004-Dec-13 10:28:18 102 bytes prism/private/wslib/calc-lib/1.0.7/1.0.7.10/Steam
2003-Oct-10 14:17:08 708 bytes prism/private/wslib/calc-lib/1.0.7/1.0.7.10/Steam/Steam.clc
2004-Dec-13 10:28:18 170 bytes prism/private/wslib/calc-lib/1.0.7/1.0.7.10/Tanks
2003-Oct-10 14:17:08 4785 bytes prism/private/wslib/calc-lib/1.0.7/1.0.7.10/Tanks/FireVaporGen.clc
2003-Oct-10 14:17:08 5871 bytes prism/private/wslib/calc-lib/1.0.7/1.0.7.10/Tanks/PumpInLiquidThermal.clc
2003-Oct-10 14:17:08 4789 bytes prism/private/wslib/calc-lib/1.0.7/1.0.7.10/Tanks/PumpOutLiquidThermal.clc
2003-Oct-10 14:17:08 5570 bytes prism/private/wslib/calc-lib/1.0.7/1.0.7.10/UserSpecifiedLiquid.clc
2003-Oct-10 14:17:08 4442 bytes prism/private/wslib/calc-lib/1.0.7/1.0.7.10/UserSpecifiedSteam.clc

```
2003-Oct-10 14:17:08   4798 bytes  prism/private/wslib/calc-lib/1.0.7/1.0.7.10/UserSpecifiedVapor.clc
2004-Dec-13 10:28:18    646 bytes  prism/private/wslib/calc-lib/1.0.7/1.0.7.10/Util
2003-Oct-29 14:25:36    605 bytes  prism/private/wslib/calc-lib/1.0.7/1.0.7.10/Util/AreaAdequateChecks.clc
2003-Oct-29 14:25:16    786 bytes  prism/private/wslib/calc-lib/1.0.7/1.0.7.10/Util/AreaChecks.clc
2003-Oct-10 14:17:08   2673 bytes  prism/private/wslib/calc-lib/1.0.7/1.0.7.10/Util/CriticalFlow.clc
2003-Oct-29 14:33:46   4252 bytes  prism/private/wslib/calc-lib/1.0.7/1.0.7.10/Util/Kb.clc
2003-Oct-10 14:17:08   1278 bytes  prism/private/wslib/calc-lib/1.0.7/1.0.7.10/Util/KbpLiquid.clc
2003-Oct-10 14:17:08   1570 bytes  prism/private/wslib/calc-lib/1.0.7/1.0.7.10/Util/KbpVapor.clc
2003-Oct-10 14:17:08    748 bytes  prism/private/wslib/calc-lib/1.0.7/1.0.7.10/Util/Kn.clc
2003-Oct-10 14:17:08   1317 bytes  prism/private/wslib/calc-lib/1.0.7/1.0.7.10/Util/Ksh.clc
2003-Oct-29 14:34:14  10563 bytes  prism/private/wslib/calc-lib/1.0.7/1.0.7.10/Util/Kv.clc
2003-Oct-29 14:26:40   4022 bytes  prism/private/wslib/calc-lib/1.0.7/1.0.7.10/Util/Kw.clc
2003-Oct-29 14:42:34   5958 bytes  prism/private/wslib/calc-lib/1.0.7/1.0.7.10/Util/ProtectedData.clc
2003-Nov-05 20:45:10  16392 bytes  prism/private/wslib/calc-lib/1.0.7/1.0.7.10/Util/ProtectedData.clc-01
2003-Nov-05 14:01:38  14060 bytes  prism/private/wslib/calc-lib/1.0.7/1.0.7.10/Util/ProtectedDataVessel.clc
2003-Oct-10 14:17:08  11069 bytes  prism/private/wslib/calc-lib/1.0.7/1.0.7.10/Util/ProtectedDataVessel.clc-01
2003-Nov-05 21:13:24  16799 bytes  prism/private/wslib/calc-lib/1.0.7/1.0.7.10/Util/ProtectingData.clc
2003-Oct-10 14:17:08   2976 bytes  prism/private/wslib/calc-lib/1.0.7/1.0.7.10/Util/ReqSizingCode.clc
2003-Oct-10 14:17:08   1693 bytes  prism/private/wslib/calc-lib/1.0.7/1.0.7.10/Util/ReqValveType.clc
2004-Dec-13 10:28:18    272 bytes  prism/private/wslib/calc-lib/1.0.7/1.0.7.10/Vapor
2003-Oct-10 14:17:08   2567 bytes  prism/private/wslib/calc-lib/1.0.7/1.0.7.10/Vapor/ControlValveVaporFlow.clc
2003-Oct-29 14:56:22   6906 bytes  prism/private/wslib/calc-lib/1.0.7/1.0.7.10/Vapor/FireVaporCapacity.clc
2003-Oct-10 14:17:08   1548 bytes  prism/private/wslib/calc-lib/1.0.7/1.0.7.10/Vapor/VaporMass.clc
2003-Oct-10 14:17:08   1409 bytes  prism/private/wslib/calc-lib/1.0.7/1.0.7.10/Vapor/VaporProcessProps.clc
2003-Oct-22 21:03:52   6898 bytes  prism/private/wslib/calc-lib/1.0.7/1.0.7.10/Vapor/VaporProps.clc
2003-Oct-10 14:17:08   1550 bytes  prism/private/wslib/calc-lib/1.0.7/1.0.7.10/Vapor/VaporVol.clc
2004-Dec-13 10:28:18    782 bytes  prism/private/wslib/calc-lib/1.0.7/1.0.7.11
2003-Oct-10 14:17:08   5165 bytes  prism/private/wslib/calc-lib/1.0.7/1.0.7.11/ControlValveLiquid.clc
2003-Oct-10 14:17:08   4980 bytes  prism/private/wslib/calc-lib/1.0.7/1.0.7.11/ControlValveVapor.clc
2004-Dec-13 10:28:18    306 bytes  prism/private/wslib/calc-lib/1.0.7/1.0.7.11/Device
2003-Nov-05 21:08:04   4361 bytes  prism/private/wslib/calc-lib/1.0.7/1.0.7.11/Device/PRVDeviceData.clc
2003-Oct-10 14:17:08   3251 bytes  prism/private/wslib/calc-lib/1.0.7/1.0.7.11/Device/PipeDeviceData.clc
2003-Nov-05 20:24:36   7721 bytes  prism/private/wslib/calc-lib/1.0.7/1.0.7.11/Device/RDDeviceData.clc
2003-Oct-10 14:17:08   7891 bytes  prism/private/wslib/calc-lib/1.0.7/1.0.7.11/Device/TVDeviceData.clc
2003-Oct-10 14:17:08   4447 bytes  prism/private/wslib/calc-lib/1.0.7/1.0.7.11/Device/TankDeviceData.clc
2003-Oct-10 14:17:08   2672 bytes  prism/private/wslib/calc-lib/1.0.7/1.0.7.11/Device/TurbineStmDeviceData.clc
2003-Oct-29 14:54:00   2665 bytes  prism/private/wslib/calc-lib/1.0.7/1.0.7.11/Device/Vessel.clc
2003-Oct-10 14:17:08   5354 bytes  prism/private/wslib/calc-lib/1.0.7/1.0.7.11/FireVaporGeneration.clc
2004-Dec-13 10:28:18    272 bytes  prism/private/wslib/calc-lib/1.0.7/1.0.7.11/Fitting
2003-Oct-10 14:17:08   5636 bytes  prism/private/wslib/calc-lib/1.0.7/1.0.7.11/Fitting/ExpandingFitting.clc
2003-Oct-10 14:17:08   4149 bytes  prism/private/wslib/calc-lib/1.0.7/1.0.7.11/Fitting/ExpandingTeeSide.clc
2003-Oct-10 14:17:08   4153 bytes  prism/private/wslib/calc-lib/1.0.7/1.0.7.11/Fitting/Pipe.clc
2003-Oct-10 14:17:08   5741 bytes  prism/private/wslib/calc-lib/1.0.7/1.0.7.11/Fitting/ReducingFitting.clc
2003-Oct-10 14:17:08   4176 bytes  prism/private/wslib/calc-lib/1.0.7/1.0.7.11/Fitting/ReducingTeeSide.clc
2003-Oct-10 14:17:08   4128 bytes  prism/private/wslib/calc-lib/1.0.7/1.0.7.11/Fitting/StandardFitting.clc
2003-Oct-10 14:17:08   6102 bytes  prism/private/wslib/calc-lib/1.0.7/1.0.7.11/GivenFlowLiquid.clc
2003-Oct-10 14:17:08   4964 bytes  prism/private/wslib/calc-lib/1.0.7/1.0.7.11/GivenFlowSteam.clc
2003-Oct-10 14:17:08   6232 bytes  prism/private/wslib/calc-lib/1.0.7/1.0.7.11/GivenFlowVapor.clc
2004-Dec-13 10:28:18    170 bytes  prism/private/wslib/calc-lib/1.0.7/1.0.7.11/Liquid
2003-Oct-10 14:17:08    939 bytes  prism/private/wslib/calc-lib/1.0.7/1.0.7.11/Liquid/ControlValveLiquidFlow.clc
2003-Oct-12 14:58:14   4894 bytes  prism/private/wslib/calc-lib/1.0.7/1.0.7.11/Liquid/LiquidProps.clc
2003-Oct-10 14:17:08   4991 bytes  prism/private/wslib/calc-lib/1.0.7/1.0.7.11/Liquid/LiquidVol.clc
2003-Oct-10 14:17:08   2880 bytes  prism/private/wslib/calc-lib/1.0.7/1.0.7.11/NotImplemented.clc
2003-Dec-17 12:18:46  79357 bytes  prism/private/wslib/calc-lib/1.0.7/1.0.7.11/PipingLoss.clc
2004-Dec-13 10:28:18    204 bytes  prism/private/wslib/calc-lib/1.0.7/1.0.7.11/Post
2003-Nov-08 14:19:44  18871 bytes  prism/private/wslib/calc-lib/1.0.7/1.0.7.11/Post/MaxRelCap.clc
2003-Dec-15 15:46:12   9638 bytes  prism/private/wslib/calc-lib/1.0.7/1.0.7.11/Post/MaxRelCapIter.clc
2003-Dec-15 13:00:56   1800 bytes  prism/private/wslib/calc-lib/1.0.7/1.0.7.11/Post/NoiseLevel.clc
2003-Oct-10 14:17:08   2041 bytes  prism/private/wslib/calc-lib/1.0.7/1.0.7.11/Post/ReactionForce.clc
2004-Dec-13 10:28:18    306 bytes  prism/private/wslib/calc-lib/1.0.7/1.0.7.11/Pressure
2003-Oct-29 14:02:34   1941 bytes  prism/private/wslib/calc-lib/1.0.7/1.0.7.11/Pressure/BackPressure.clc
```

2003-Oct-10 14:17:08 1384 bytes prism/private/wslib/calc-lib/1.0.7/1.0.7.11/Pressure/ColdDiffTestPressure.clc
2003-Oct-29 13:06:54 4477 bytes prism/private/wslib/calc-lib/1.0.7/1.0.7.11/Pressure/MRCPOverPRelief.clc
2003-Oct-10 14:17:08 1126 bytes prism/private/wslib/calc-lib/1.0.7/1.0.7.11/Pressure/PAtm.clc
2003-Oct-29 14:04:20 551 bytes prism/private/wslib/calc-lib/1.0.7/1.0.7.11/Pressure/PDelta.clc
2003-Nov-08 14:52:14 10817 bytes prism/private/wslib/calc-lib/1.0.7/1.0.7.11/Pressure/POverPRelief.clc
2003-Oct-29 13:59:56 2792 bytes prism/private/wslib/calc-lib/1.0.7/1.0.7.11/Pressure/PressureChecks.clc
2004-Dec-13 10:28:18 102 bytes prism/private/wslib/calc-lib/1.0.7/1.0.7.11/Steam
2003-Oct-10 14:17:08 708 bytes prism/private/wslib/calc-lib/1.0.7/1.0.7.11/Steam/Steam.clc
2004-Dec-13 10:28:18 170 bytes prism/private/wslib/calc-lib/1.0.7/1.0.7.11/Tanks
2003-Oct-10 14:17:08 4785 bytes prism/private/wslib/calc-lib/1.0.7/1.0.7.11/Tanks/FireVaporGen.clc
2003-Oct-10 14:17:08 5871 bytes prism/private/wslib/calc-lib/1.0.7/1.0.7.11/Tanks/PumpInLiquidThermal.clc
2003-Oct-10 14:17:08 4789 bytes prism/private/wslib/calc-lib/1.0.7/1.0.7.11/Tanks/PumpOutLiquidThermal.clc
2003-Oct-10 14:17:08 5570 bytes prism/private/wslib/calc-lib/1.0.7/1.0.7.11/UserSpecifiedLiquid.clc
2003-Oct-10 14:17:08 4442 bytes prism/private/wslib/calc-lib/1.0.7/1.0.7.11/UserSpecifiedSteam.clc
2003-Oct-10 14:17:08 4798 bytes prism/private/wslib/calc-lib/1.0.7/1.0.7.11/UserSpecifiedVapor.clc
2004-Dec-13 10:28:18 646 bytes prism/private/wslib/calc-lib/1.0.7/1.0.7.11/Util
2003-Nov-11 18:36:28 605 bytes prism/private/wslib/calc-lib/1.0.7/1.0.7.11/Util/AreaAdequateChecks.clc
2003-Oct-29 14:25:16 786 bytes prism/private/wslib/calc-lib/1.0.7/1.0.7.11/Util/AreaChecks.clc
2003-Oct-10 14:17:08 2673 bytes prism/private/wslib/calc-lib/1.0.7/1.0.7.11/Util/CriticalFlow.clc
2003-Oct-29 14:33:46 4252 bytes prism/private/wslib/calc-lib/1.0.7/1.0.7.11/Util/Kb.clc
2003-Oct-10 14:17:08 1278 bytes prism/private/wslib/calc-lib/1.0.7/1.0.7.11/Util/KbpLiquid.clc
2003-Oct-10 14:17:08 1570 bytes prism/private/wslib/calc-lib/1.0.7/1.0.7.11/Util/KbpVapor.clc
2003-Oct-10 14:17:08 748 bytes prism/private/wslib/calc-lib/1.0.7/1.0.7.11/Util/Kn.clc
2003-Oct-10 14:17:08 1317 bytes prism/private/wslib/calc-lib/1.0.7/1.0.7.11/Util/Ksh.clc
2003-Oct-29 14:34:14 10563 bytes prism/private/wslib/calc-lib/1.0.7/1.0.7.11/Util/Kv.clc
2003-Oct-29 14:26:40 4022 bytes prism/private/wslib/calc-lib/1.0.7/1.0.7.11/Util/Kw.clc
2003-Oct-29 14:42:34 5958 bytes prism/private/wslib/calc-lib/1.0.7/1.0.7.11/Util/ProtectedData.clc
2003-Nov-05 20:45:10 16392 bytes prism/private/wslib/calc-lib/1.0.7/1.0.7.11/Util/ProtectedData.clc-01
2003-Nov-05 14:01:38 14060 bytes prism/private/wslib/calc-lib/1.0.7/1.0.7.11/Util/ProtectedDataVessel.clc
2003-Oct-10 14:17:08 11069 bytes prism/private/wslib/calc-lib/1.0.7/1.0.7.11/Util/ProtectedDataVessel.clc-01
2003-Nov-05 21:13:24 16799 bytes prism/private/wslib/calc-lib/1.0.7/1.0.7.11/Util/ProtectingData.clc
2003-Oct-10 14:17:08 2976 bytes prism/private/wslib/calc-lib/1.0.7/1.0.7.11/Util/ReqSizingCode.clc
2003-Oct-10 14:17:08 1693 bytes prism/private/wslib/calc-lib/1.0.7/1.0.7.11/Util/ReqValveType.clc
2004-Dec-13 10:28:18 272 bytes prism/private/wslib/calc-lib/1.0.7/1.0.7.11/Vapor
2003-Oct-10 14:17:08 2567 bytes prism/private/wslib/calc-lib/1.0.7/1.0.7.11/Vapor/ControlValveVaporFlow.clc
2003-Oct-29 14:56:22 6906 bytes prism/private/wslib/calc-lib/1.0.7/1.0.7.11/Vapor/FireVaporCapacity.clc
2003-Oct-10 14:17:08 1548 bytes prism/private/wslib/calc-lib/1.0.7/1.0.7.11/Vapor/VaporMass.clc
2003-Oct-10 14:17:08 1409 bytes prism/private/wslib/calc-lib/1.0.7/1.0.7.11/Vapor/VaporProcessProps.clc
2003-Oct-22 21:03:52 6898 bytes prism/private/wslib/calc-lib/1.0.7/1.0.7.11/Vapor/VaporProps.clc
2003-Oct-10 14:17:08 1550 bytes prism/private/wslib/calc-lib/1.0.7/1.0.7.11/Vapor/VaporVol.clc
2004-Dec-13 10:28:18 510 bytes prism/private/wslib/calc-lib/1.0.7/1.0.7.11/formulas
2003-Nov-14 19:34:56 6148 bytes prism/private/wslib/calc-lib/1.0.7/1.0.7.11/formulas/.DS_Store
2003-Nov-11 22:17:56 55 bytes prism/private/wslib/calc-lib/1.0.7/1.0.7.11/formulas/doit
2003-Nov-11 22:36:26 8 bytes prism/private/wslib/calc-lib/1.0.7/1.0.7.11/formulas/fire-vapor.aux
2003-Nov-11 22:36:26 1212 bytes prism/private/wslib/calc-lib/1.0.7/1.0.7.11/formulas/fire-vapor.dvi
2003-Nov-11 22:36:26 5735 bytes prism/private/wslib/calc-lib/1.0.7/1.0.7.11/formulas/fire-vapor.log
2003-Nov-11 22:36:26 29944 bytes prism/private/wslib/calc-lib/1.0.7/1.0.7.11/formulas/fire-vapor.pdf
2003-Nov-11 22:41:52 1487 bytes prism/private/wslib/calc-lib/1.0.7/1.0.7.11/formulas/fire-vapor.tex
2003-Nov-11 20:52:20 174 bytes prism/private/wslib/calc-lib/1.0.7/1.0.7.11/formulas/h-fvg-v-area.f
2003-Nov-19 22:15:08 8 bytes prism/private/wslib/calc-lib/1.0.7/1.0.7.11/formulas/wetted-area-vessel.aux
2003-Nov-19 22:15:08 2952 bytes prism/private/wslib/calc-lib/1.0.7/1.0.7.11/formulas/wetted-area-vessel.dvi
2003-Nov-19 22:15:08 5783 bytes prism/private/wslib/calc-lib/1.0.7/1.0.7.11/formulas/wetted-area-vessel.log
2003-Nov-19 22:15:08 46361 bytes prism/private/wslib/calc-lib/1.0.7/1.0.7.11/formulas/wetted-area-vessel.pdf
2003-Nov-19 22:15:06 2742 bytes prism/private/wslib/calc-lib/1.0.7/1.0.7.11/formulas/wetted-area-vessel.tex
2004-Dec-13 10:28:18 816 bytes prism/private/wslib/calc-lib/1.0.7/1.0.7.12
2003-Oct-10 14:17:08 5165 bytes prism/private/wslib/calc-lib/1.0.7/1.0.7.12/ControlValveLiquid.clc
2003-Dec-18 16:37:30 4978 bytes prism/private/wslib/calc-lib/1.0.7/1.0.7.12/ControlValveVapor.clc
2004-Dec-13 10:28:18 306 bytes prism/private/wslib/calc-lib/1.0.7/1.0.7.12/Device
2003-Nov-05 21:08:04 4361 bytes prism/private/wslib/calc-lib/1.0.7/1.0.7.12/Device/PRVDeviceData.clc
2003-Oct-10 14:17:08 3251 bytes prism/private/wslib/calc-lib/1.0.7/1.0.7.12/Device/PipeDeviceData.clc
2003-Nov-05 20:24:36 7721 bytes prism/private/wslib/calc-lib/1.0.7/1.0.7.12/Device/RDDeviceData.clc 2003-Oct-10 14:17:08 7891 bytes prism/private/wslib/calc-lib/1.0.7/1.0.7.12/Device/TVDeviceData.clc
2003-Oct-10 14:17:08 4447 bytes prism/private/wslib/calc-lib/1.0.7/1.0.7.12/Device/TankDeviceData.clc
2003-Oct-10 14:17:08 2672 bytes prism/private/wslib/calc-lib/1.0.7/1.0.7.12/Device/TurbineStmDeviceData.clc
2003-Oct-29 14:54:00 2665 bytes prism/private/wslib/calc-lib/1.0.7/1.0.7.12/Device/Vessel.clc
2003-Oct-10 14:17:08 5354 bytes prism/private/wslib/calc-lib/1.0.7/1.0.7.12/FireVaporGeneration.clc
2004-Dec-13 10:28:18 272 bytes prism/private/wslib/calc-lib/1.0.7/1.0.7.12/Fitting
2003-Oct-10 14:17:08 5636 bytes prism/private/wslib/calc-lib/1.0.7/1.0.7.12/Fitting/ExpandingFitting.clc
2003-Oct-10 14:17:08 4149 bytes prism/private/wslib/calc-lib/1.0.7/1.0.7.12/Fitting/ExpandingTeeSide.clc
2003-Oct-10 14:17:08 4153 bytes prism/private/wslib/calc-lib/1.0.7/1.0.7.12/Fitting/Pipe.clc
2003-Oct-10 14:17:08 5741 bytes prism/private/wslib/calc-lib/1.0.7/1.0.7.12/Fitting/ReducingFitting.clc
2003-Oct-10 14:17:08 4176 bytes prism/private/wslib/calc-lib/1.0.7/1.0.7.12/Fitting/ReducingTeeSide.clc
2003-Oct-10 14:17:08 4128 bytes prism/private/wslib/calc-lib/1.0.7/1.0.7.12/Fitting/StandardFitting.clc
2003-Oct-10 14:17:08 6102 bytes prism/private/wslib/calc-lib/1.0.7/1.0.7.12/GivenFlowLiquid.clc
2003-Oct-10 14:17:08 4964 bytes prism/private/wslib/calc-lib/1.0.7/1.0.7.12/GivenFlowSteam.clc
2003-Oct-10 14:17:08 6232 bytes prism/private/wslib/calc-lib/1.0.7/1.0.7.12/GivenFlowVapor.clc
2004-Dec-13 10:28:18 170 bytes prism/private/wslib/calc-lib/1.0.7/1.0.7.12/Liquid
2003-Oct-10 14:17:08 939 bytes prism/private/wslib/calc-lib/1.0.7/1.0.7.12/Liquid/ControlValveLiquidFlow.clc
2003-Oct-12 14:58:14 4894 bytes prism/private/wslib/calc-lib/1.0.7/1.0.7.12/Liquid/LiquidProps.clc
2003-Oct-10 14:17:08 4991 bytes prism/private/wslib/calc-lib/1.0.7/1.0.7.12/Liquid/LiquidVol.clc
2003-Oct-10 14:17:08 2880 bytes prism/private/wslib/calc-lib/1.0.7/1.0.7.12/NotImplemented.clc
2003-Dec-29 14:49:26 82235 bytes prism/private/wslib/calc-lib/1.0.7/1.0.7.12/PipingLoss.clc
2003-Dec-17 16:31:30 78925 bytes prism/private/wslib/calc-lib/1.0.7/1.0.7.12/PipingLoss.clc-01
2004-Dec-13 10:28:18 204 bytes prism/private/wslib/calc-lib/1.0.7/1.0.7.12/Post
2003-Nov-08 14:19:44 18871 bytes prism/private/wslib/calc-lib/1.0.7/1.0.7.12/Post/MaxRelCap.clc
2003-Dec-15 15:46:12 9638 bytes prism/private/wslib/calc-lib/1.0.7/1.0.7.12/Post/MaxRelCapIter.clc
2003-Dec-15 13:00:56 1800 bytes prism/private/wslib/calc-lib/1.0.7/1.0.7.12/Post/NoiseLevel.clc
2003-Oct-10 14:17:08 2041 bytes prism/private/wslib/calc-lib/1.0.7/1.0.7.12/Post/ReactionForce.clc
2004-Dec-13 10:28:18 306 bytes prism/private/wslib/calc-lib/1.0.7/1.0.7.12/Pressure
2003-Oct-29 14:02:34 1941 bytes prism/private/wslib/calc-lib/1.0.7/1.0.7.12/Pressure/BackPressure.clc
2003-Oct-10 14:17:08 1384 bytes prism/private/wslib/calc-lib/1.0.7/1.0.7.12/Pressure/ColdDiffTestPressure.clc
2003-Oct-29 13:06:54 4477 bytes prism/private/wslib/calc-lib/1.0.7/1.0.7.12/Pressure/MRCPOverPRelief.clc
2003-Oct-10 14:17:08 1126 bytes prism/private/wslib/calc-lib/1.0.7/1.0.7.12/Pressure/PAtm.clc
2003-Oct-29 14:04:20 551 bytes prism/private/wslib/calc-lib/1.0.7/1.0.7.12/Pressure/PDelta.clc
2003-Nov-08 14:52:14 10817 bytes prism/private/wslib/calc-lib/1.0.7/1.0.7.12/Pressure/POverPRelief.clc
2003-Oct-29 13:59:56 2792 bytes prism/private/wslib/calc-lib/1.0.7/1.0.7.12/Pressure/PressureChecks.clc
2004-Dec-13 10:28:18 102 bytes prism/private/wslib/calc-lib/1.0.7/1.0.7.12/Steam
2003-Oct-10 14:17:08 708 bytes prism/private/wslib/calc-lib/1.0.7/1.0.7.12/Steam/Steam.clc
2004-Dec-13 10:28:18 170 bytes prism/private/wslib/calc-lib/1.0.7/1.0.7.12/Tanks
2003-Oct-10 14:17:08 4785 bytes prism/private/wslib/calc-lib/1.0.7/1.0.7.12/Tanks/FireVaporGen.clc
2003-Oct-10 14:17:08 5871 bytes prism/private/wslib/calc-lib/1.0.7/1.0.7.12/Tanks/PumpInLiquidThermal.clc
2003-Oct-10 14:17:08 4789 bytes prism/private/wslib/calc-lib/1.0.7/1.0.7.12/Tanks/PumpOutLiquidThermal.clc
2003-Oct-10 14:17:08 5570 bytes prism/private/wslib/calc-lib/1.0.7/1.0.7.12/UserSpecifiedLiquid.clc
2003-Oct-10 14:17:08 4442 bytes prism/private/wslib/calc-lib/1.0.7/1.0.7.12/UserSpecifiedSteam.clc
2003-Oct-10 14:17:08 4798 bytes prism/private/wslib/calc-lib/1.0.7/1.0.7.12/UserSpecifiedVapor.clc
2004-Dec-13 10:28:18 646 bytes prism/private/wslib/calc-lib/1.0.7/1.0.7.12/Util
2003-Nov-11 18:36:28 605 bytes prism/private/wslib/calc-lib/1.0.7/1.0.7.12/Util/AreaAdequateChecks.clc
2003-Oct-29 14:25:16 786 bytes prism/private/wslib/calc-lib/1.0.7/1.0.7.12/Util/AreaChecks.clc
2003-Oct-10 14:17:08 2673 bytes prism/private/wslib/calc-lib/1.0.7/1.0.7.12/Util/CriticalFlow.clc
2003-Oct-29 14:33:46 4252 bytes prism/private/wslib/calc-lib/1.0.7/1.0.7.12/Util/Kb.clc
2003-Oct-10 14:17:08 1278 bytes prism/private/wslib/calc-lib/1.0.7/1.0.7.12/Util/KbpLiquid.clc
2003-Oct-10 14:17:08 1570 bytes prism/private/wslib/calc-lib/1.0.7/1.0.7.12/Util/KbpVapor.clc
2003-Oct-10 14:17:08 748 bytes prism/private/wslib/calc-lib/1.0.7/1.0.7.12/Util/Kn.clc
2003-Oct-10 14:17:08 1317 bytes prism/private/wslib/calc-lib/1.0.7/1.0.7.12/Util/Ksh.clc
2003-Oct-29 14:34:14 10563 bytes prism/private/wslib/calc-lib/1.0.7/1.0.7.12/Util/Kv.clc
2003-Oct-29 14:26:40 4022 bytes prism/private/wslib/calc-lib/1.0.7/1.0.7.12/Util/Kw.clc
2003-Oct-29 14:42:34 5958 bytes prism/private/wslib/calc-lib/1.0.7/1.0.7.12/Util/ProtectedData.clc
2003-Nov-05 20:45:10 16392 bytes prism/private/wslib/calc-lib/1.0.7/1.0.7.12/Util/ProtectedData.clc-01
2003-Dec-29 20:28:54 14082 bytes prism/private/wslib/calc-lib/1.0.7/1.0.7.12/Util/ProtectedDataVessel.clc
2003-Oct-10 14:17:08 11069 bytes prism/private/wslib/calc-lib/1.0.7/1.0.7.12/Util/ProtectedDataVessel.clc-01
2003-Nov-05 21:13:24 16799 bytes prism/private/wslib/calc-lib/1.0.7/1.0.7.12/Util/ProtectingData.clc
2003-Oct-10 14:17:08 2976 bytes prism/private/wslib/calc-lib/1.0.7/1.0.7.12/Util/ReqSizingCode.clc 2003-Oct-10 14:17:08 1693 bytes prism/private/wslib/calc-lib/1.0.7/1.0.7.12/Util/ReqValveType.clc
2004-Dec-13 10:28:18 272 bytes prism/private/wslib/calc-lib/1.0.7/1.0.7.12/Vapor
2003-Oct-10 14:17:08 2567 bytes prism/private/wslib/calc-lib/1.0.7/1.0.7.12/Vapor/ControlValveVaporFlow.clc
2003-Oct-29 14:56:22 6906 bytes prism/private/wslib/calc-lib/1.0.7/1.0.7.12/Vapor/FireVaporCapacity.clc
2003-Oct-10 14:17:08 1548 bytes prism/private/wslib/calc-lib/1.0.7/1.0.7.12/Vapor/VaporMass.clc
2003-Oct-10 14:17:08 1409 bytes prism/private/wslib/calc-lib/1.0.7/1.0.7.12/Vapor/VaporProcessProps.clc
2003-Oct-22 21:03:52 6898 bytes prism/private/wslib/calc-lib/1.0.7/1.0.7.12/Vapor/VaporProps.clc
2003-Oct-10 14:17:08 1550 bytes prism/private/wslib/calc-lib/1.0.7/1.0.7.12/Vapor/VaporVol.clc
2004-Dec-13 10:28:18 510 bytes prism/private/wslib/calc-lib/1.0.7/1.0.7.12/formulas
2003-Nov-14 19:34:56 6148 bytes prism/private/wslib/calc-lib/1.0.7/1.0.7.12/formulas/.DS_Store
2003-Nov-11 22:17:56 55 bytes prism/private/wslib/calc-lib/1.0.7/1.0.7.12/formulas/doit
2003-Nov-11 22:36:26 8 bytes prism/private/wslib/calc-lib/1.0.7/1.0.7.12/formulas/fire-vapor.aux
2003-Nov-11 22:36:26 1212 bytes prism/private/wslib/calc-lib/1.0.7/1.0.7.12/formulas/fire-vapor.dvi
2003-Nov-11 22:36:26 5735 bytes prism/private/wslib/calc-lib/1.0.7/1.0.7.12/formulas/fire-vapor.log
2003-Nov-11 22:36:26 29944 bytes prism/private/wslib/calc-lib/1.0.7/1.0.7.12/formulas/fire-vapor.pdf
2003-Nov-11 22:41:52 1487 bytes prism/private/wslib/calc-lib/1.0.7/1.0.7.12/formulas/fire-vapor.tex
2003-Nov-11 20:52:20 174 bytes prism/private/wslib/calc-lib/1.0.7/1.0.7.12/formulas/h-fvg-v-area.f
2003-Nov-19 22:15:08 8 bytes prism/private/wslib/calc-lib/1.0.7/1.0.7.12/formulas/wetted-area-vessel.aux
2003-Nov-19 22:15:08 2952 bytes prism/private/wslib/calc-lib/1.0.7/1.0.7.12/formulas/wetted-area-vessel.dvi
2003-Nov-19 22:15:08 5783 bytes prism/private/wslib/calc-lib/1.0.7/1.0.7.12/formulas/wetted-area-vessel.log
2003-Nov-19 22:15:08 46361 bytes prism/private/wslib/calc-lib/1.0.7/1.0.7.12/formulas/wetted-area-vessel.pdf
2003-Nov-19 22:15:06 2742 bytes prism/private/wslib/calc-lib/1.0.7/1.0.7.12/formulas/wetted-area-vessel.tex
2004-Dec-13 10:28:19 918 bytes prism/private/wslib/calc-lib/1.0.7/1.0.7.13
2004-Feb-10 16:20:30 5608 bytes prism/private/wslib/calc-lib/1.0.7/1.0.7.13/ControlValveLiquid.clc
2004-Feb-09 21:00:02 5583 bytes prism/private/wslib/calc-lib/1.0.7/1.0.7.13/ControlValveVapor.clc
2004-Feb-08 17:01:20 5532 bytes prism/private/wslib/calc-lib/1.0.7/1.0.7.13/ControlValveVapor.clc-01
2004-Dec-13 10:28:18 306 bytes prism/private/wslib/calc-lib/1.0.7/1.0.7.13/Device
2004-Feb-08 12:28:14 4270 bytes prism/private/wslib/calc-lib/1.0.7/1.0.7.13/Device/PRVDeviceData.clc
2003-Oct-10 14:17:08 3251 bytes prism/private/wslib/calc-lib/1.0.7/1.0.7.13/Device/PipeDeviceData.clc
2004-Mar-10 18:50:28 7721 bytes prism/private/wslib/calc-lib/1.0.7/1.0.7.13/Device/RDDeviceData.clc
2003-Oct-10 14:17:08 7891 bytes prism/private/wslib/calc-lib/1.0.7/1.0.7.13/Device/TVDeviceData.clc
2003-Oct-10 14:17:08 4447 bytes prism/private/wslib/calc-lib/1.0.7/1.0.7.13/Device/TankDeviceData.clc
2003-Oct-10 14:17:08 2672 bytes prism/private/wslib/calc-lib/1.0.7/1.0.7.13/Device/TurbineStmDeviceData.clc
2003-Oct-29 14:54:00 2665 bytes prism/private/wslib/calc-lib/1.0.7/1.0.7.13/Device/Vessel.clc
2003-Oct-10 14:17:08 5354 bytes prism/private/wslib/calc-lib/1.0.7/1.0.7.13/FireVaporGeneration.clc
2004-Dec-13 10:28:18 272 bytes prism/private/wslib/calc-lib/1.0.7/1.0.7.13/Fitting
2003-Oct-10 14:17:08 5636 bytes prism/private/wslib/calc-lib/1.0.7/1.0.7.13/Fitting/ExpandingFitting.clc
2003-Oct-10 14:17:08 4149 bytes prism/private/wslib/calc-lib/1.0.7/1.0.7.13/Fitting/ExpandingTeeSide.clc
2003-Oct-10 14:17:08 4153 bytes prism/private/wslib/calc-lib/1.0.7/1.0.7.13/Fitting/Pipe.clc
2003-Oct-10 14:17:08 5741 bytes prism/private/wslib/calc-lib/1.0.7/1.0.7.13/Fitting/ReducingFitting.clc
2003-Oct-10 14:17:08 4176 bytes prism/private/wslib/calc-lib/1.0.7/1.0.7.13/Fitting/ReducingTeeSide.clc
2003-Oct-10 14:17:08 4128 bytes prism/private/wslib/calc-lib/1.0.7/1.0.7.13/Fitting/StandardFitting.clc
2004-Feb-09 21:44:58 6382 bytes prism/private/wslib/calc-lib/1.0.7/1.0.7.13/FormulaTest.clc
2003-Oct-10 14:17:08 6102 bytes prism/private/wslib/calc-lib/1.0.7/1.0.7.13/GivenFlowLiquid.clc
2003-Oct-10 14:17:08 4964 bytes prism/private/wslib/calc-lib/1.0.7/1.0.7.13/GivenFlowSteam.clc
2004-Feb-09 21:45:14 6232 bytes prism/private/wslib/calc-lib/1.0.7/1.0.7.13/GivenFlowVapor.clc
2004-Jan-19 15:01:12 6232 bytes prism/private/wslib/calc-lib/1.0.7/1.0.7.13/GivenFlowVapor.clc-01
2004-Dec-13 10:28:18 170 bytes prism/private/wslib/calc-lib/1.0.7/1.0.7.13/Liquid
2003-Oct-10 14:17:08 939 bytes prism/private/wslib/calc-lib/1.0.7/1.0.7.13/Liquid/ControlValveLiquidFlow.clc
2003-Oct-12 14:58:14 4894 bytes prism/private/wslib/calc-lib/1.0.7/1.0.7.13/Liquid/LiquidProps.clc
2003-Oct-10 14:17:08 4991 bytes prism/private/wslib/calc-lib/1.0.7/1.0.7.13/Liquid/LiquidVol.clc
2003-Oct-10 14:17:08 2880 bytes prism/private/wslib/calc-lib/1.0.7/1.0.7.13/NotImplemented.clc
2004-Feb-08 12:37:04 82464 bytes prism/private/wslib/calc-lib/1.0.7/1.0.7.13/PipingLoss.clc
2003-Dec-17 16:31:30 78925 bytes prism/private/wslib/calc-lib/1.0.7/1.0.7.13/PipingLoss.clc-01
2004-Dec-13 10:28:18 204 bytes prism/private/wslib/calc-lib/1.0.7/1.0.7.13/Post
2003-Nov-08 14:19:44 18871 bytes prism/private/wslib/calc-lib/1.0.7/1.0.7.13/Post/MaxRelCap.clc
2003-Dec-15 15:46:12 9638 bytes prism/private/wslib/calc-lib/1.0.7/1.0.7.13/Post/MaxRelCapIter.clc
2003-Dec-15 13:00:56 1800 bytes prism/private/wslib/calc-lib/1.0.7/1.0.7.13/Post/NoiseLevel.clc
2003-Oct-10 14:17:08 2041 bytes prism/private/wslib/calc-lib/1.0.7/1.0.7.13/Post/ReactionForce.clc
2004-Dec-13 10:28:19 306 bytes prism/private/wslib/calc-lib/1.0.7/1.0.7.13/Pressure
2003-Oct-29 14:02:34 1941 bytes prism/private/wslib/calc-lib/1.0.7/1.0.7.13/Pressure/BackPressure.clc 2003-Oct-10 14:17:08 1384 bytes prism/private/wslib/calc-lib/1.0.7/1.0.7.13/Pressure/ColdDiffTestPressure.clc
2003-Oct-29 13:06:54 4477 bytes prism/private/wslib/calc-lib/1.0.7/1.0.7.13/Pressure/MRCPOverPRelief.clc
2003-Oct-10 14:17:08 1126 bytes prism/private/wslib/calc-lib/1.0.7/1.0.7.13/Pressure/PAtm.clc
2003-Oct-29 14:04:20 551 bytes prism/private/wslib/calc-lib/1.0.7/1.0.7.13/Pressure/PDelta.clc
2003-Nov-08 14:52:14 10817 bytes prism/private/wslib/calc-lib/1.0.7/1.0.7.13/Pressure/POverPRelief.clc
2003-Oct-29 13:59:56 2792 bytes prism/private/wslib/calc-lib/1.0.7/1.0.7.13/Pressure/PressureChecks.clc
2004-Dec-13 10:28:19 102 bytes prism/private/wslib/calc-lib/1.0.7/1.0.7.13/Steam
2003-Oct-10 14:17:08 708 bytes prism/private/wslib/calc-lib/1.0.7/1.0.7.13/Steam/Steam.clc
2004-Dec-13 10:28:19 170 bytes prism/private/wslib/calc-lib/1.0.7/1.0.7.13/Tanks
2003-Oct-10 14:17:08 4785 bytes prism/private/wslib/calc-lib/1.0.7/1.0.7.13/Tanks/FireVaporGen.clc
2003-Oct-10 14:17:08 5871 bytes prism/private/wslib/calc-lib/1.0.7/1.0.7.13/Tanks/PumpInLiquidThermal.clc
2003-Oct-10 14:17:08 4789 bytes prism/private/wslib/calc-lib/1.0.7/1.0.7.13/Tanks/PumpOutLiquidThermal.clc
2003-Oct-10 14:17:08 5570 bytes prism/private/wslib/calc-lib/1.0.7/1.0.7.13/UserSpecifiedLiquid.clc
2003-Oct-10 14:17:08 4442 bytes prism/private/wslib/calc-lib/1.0.7/1.0.7.13/UserSpecifiedSteam.clc
2003-Oct-10 14:17:08 4798 bytes prism/private/wslib/calc-lib/1.0.7/1.0.7.13/UserSpecifiedVapor.clc
2004-Dec-13 10:28:19 646 bytes prism/private/wslib/calc-lib/1.0.7/1.0.7.13/Util
2003-Nov-11 18:36:28 605 bytes prism/private/wslib/calc-lib/1.0.7/1.0.7.13/Util/AreaAdequateChecks.clc
2003-Oct-29 14:25:16 786 bytes prism/private/wslib/calc-lib/1.0.7/1.0.7.13/Util/AreaChecks.clc
2003-Oct-10 14:17:08 2673 bytes prism/private/wslib/calc-lib/1.0.7/1.0.7.13/Util/CriticalFlow.clc
2003-Oct-29 14:33:46 4252 bytes prism/private/wslib/calc-lib/1.0.7/1.0.7.13/Util/Kb.clc
2003-Oct-10 14:17:08 1278 bytes prism/private/wslib/calc-lib/1.0.7/1.0.7.13/Util/KbpLiquid.clc
2003-Oct-10 14:17:08 1570 bytes prism/private/wslib/calc-lib/1.0.7/1.0.7.13/Util/KbpVapor.clc
2003-Oct-10 14:17:08 748 bytes prism/private/wslib/calc-lib/1.0.7/1.0.7.13/Util/Kn.clc
2003-Oct-10 14:17:08 1317 bytes prism/private/wslib/calc-lib/1.0.7/1.0.7.13/Util/Ksh.clc
2003-Oct-29 14:34:14 10563 bytes prism/private/wslib/calc-lib/1.0.7/1.0.7.13/Util/Kv.clc
2003-Oct-29 14:26:40 4022 bytes prism/private/wslib/calc-lib/1.0.7/1.0.7.13/Util/Kw.clc
2003-Oct-29 14:42:34 5958 bytes prism/private/wslib/calc-lib/1.0.7/1.0.7.13/Util/ProtectedData.clc
2003-Nov-05 20:45:10 16392 bytes prism/private/wslib/calc-lib/1.0.7/1.0.7.13/Util/ProtectedData.clc-01
2003-Dec-29 20:28:54 14082 bytes prism/private/wslib/calc-lib/1.0.7/1.0.7.13/Util/ProtectedDataVessel.clc
2003-Oct-10 14:17:08 11069 bytes prism/private/wslib/calc-lib/1.0.7/1.0.7.13/Util/ProtectedDataVessel.clc-01
2003-Nov-05 21:13:24 16799 bytes prism/private/wslib/calc-lib/1.0.7/1.0.7.13/Util/ProtectingData.clc
2003-Oct-10 14:17:08 2976 bytes prism/private/wslib/calc-lib/1.0.7/1.0.7.13/Util/ReqSizingCode.clc
2003-Oct-10 14:17:08 1693 bytes prism/private/wslib/calc-lib/1.0.7/1.0.7.13/Util/ReqValveType.clc
2004-Dec-13 10:28:19 272 bytes prism/private/wslib/calc-lib/1.0.7/1.0.7.13/Vapor
2004-Feb-09 14:34:26 3049 bytes prism/private/wslib/calc-lib/1.0.7/1.0.7.13/Vapor/ControlValveVaporFlow.clc
2004-Feb-09 21:28:04 7260 bytes prism/private/wslib/calc-lib/1.0.7/1.0.7.13/Vapor/FireVaporCapacity.clc
2003-Oct-10 14:17:08 1548 bytes prism/private/wslib/calc-lib/1.0.7/1.0.7.13/Vapor/VaporMass.clc
2004-Feb-08 17:19:16 1482 bytes prism/private/wslib/calc-lib/1.0.7/1.0.7.13/Vapor/VaporProcessProps.clc
2003-Oct-22 21:03:52 6898 bytes prism/private/wslib/calc-lib/1.0.7/1.0.7.13/Vapor/VaporProps.clc
2003-Oct-10 14:17:08 1550 bytes prism/private/wslib/calc-lib/1.0.7/1.0.7.13/Vapor/VaporVol.clc
2004-Dec-13 10:28:18 510 bytes prism/private/wslib/calc-lib/1.0.7/1.0.7.13/formulas
2003-Nov-14 19:34:56 6148 bytes prism/private/wslib/calc-lib/1.0.7/1.0.7.13/formulas/.DS_Store
2003-Nov-11 22:17:56 55 bytes prism/private/wslib/calc-lib/1.0.7/1.0.7.13/formulas/doit
2003-Nov-11 22:36:26 8 bytes prism/private/wslib/calc-lib/1.0.7/1.0.7.13/formulas/fire-vapor.aux
2003-Nov-11 22:36:26 1212 bytes prism/private/wslib/calc-lib/1.0.7/1.0.7.13/formulas/fire-vapor.dvi
2003-Nov-11 22:36:26 5735 bytes prism/private/wslib/calc-lib/1.0.7/1.0.7.13/formulas/fire-vapor.log
2003-Nov-11 22:36:26 29944 bytes prism/private/wslib/calc-lib/1.0.7/1.0.7.13/formulas/fire-vapor.pdf
2003-Nov-11 22:41:52 1487 bytes prism/private/wslib/calc-lib/1.0.7/1.0.7.13/formulas/fire-vapor.tex
2003-Nov-11 20:52:20 174 bytes prism/private/wslib/calc-lib/1.0.7/1.0.7.13/formulas/h-fvg-v-area.f
2003-Nov-19 22:15:08 8 bytes prism/private/wslib/calc-lib/1.0.7/1.0.7.13/formulas/wetted-area-vessel.aux
2003-Nov-19 22:15:08 2952 bytes prism/private/wslib/calc-lib/1.0.7/1.0.7.13/formulas/wetted-area-vessel.dvi
2003-Nov-19 22:15:08 5783 bytes prism/private/wslib/calc-lib/1.0.7/1.0.7.13/formulas/wetted-area-vessel.log
2003-Nov-19 22:15:08 46361 bytes prism/private/wslib/calc-lib/1.0.7/1.0.7.13/formulas/wetted-area-vessel.pdf
2003-Nov-19 22:15:06 2742 bytes prism/private/wslib/calc-lib/1.0.7/1.0.7.13/formulas/wetted-area-vessel.tex
2004-Dec-13 10:28:19 782 bytes prism/private/wslib/calc-lib/1.0.7/1.0.7.14
2004-Feb-19 11:43:02 5919 bytes prism/private/wslib/calc-lib/1.0.7/1.0.7.14/ControlValveLiquid.clc
2004-Feb-19 11:43:42 5688 bytes prism/private/wslib/calc-lib/1.0.7/1.0.7.14/ControlValveVapor.clc
2004-Dec-13 10:28:19 306 bytes prism/private/wslib/calc-lib/1.0.7/1.0.7.14/Device
2004-Feb-08 12:28:14 4270 bytes prism/private/wslib/calc-lib/1.0.7/1.0.7.14/Device/PRVDeviceData.clc
2003-Oct-10 14:17:08 3251 bytes prism/private/wslib/calc-lib/1.0.7/1.0.7.14/Device/PipeDeviceData.clc
2003-Nov-05 20:24:36 7721 bytes prism/private/wslib/calc-lib/1.0.7/1.0.7.14/Device/RDDeviceData.clc 2003-Oct-10 14:17:08 7891 bytes prism/private/wslib/calc-lib/1.0.7/1.0.7.14/Device/TVDeviceData.clc
2003-Oct-10 14:17:08 4447 bytes prism/private/wslib/calc-lib/1.0.7/1.0.7.14/Device/TankDeviceData.clc
2003-Oct-10 14:17:08 2672 bytes prism/private/wslib/calc-lib/1.0.7/1.0.7.14/Device/TurbineStmDeviceData.clc
2003-Oct-29 14:54:00 2665 bytes prism/private/wslib/calc-lib/1.0.7/1.0.7.14/Device/Vessel.clc
2004-Feb-27 15:55:22 5466 bytes prism/private/wslib/calc-lib/1.0.7/1.0.7.14/FireVaporGeneration.clc
2004-Dec-13 10:28:19 272 bytes prism/private/wslib/calc-lib/1.0.7/1.0.7.14/Fitting
2003-Oct-10 14:17:08 5636 bytes prism/private/wslib/calc-lib/1.0.7/1.0.7.14/Fitting/ExpandingFitting.clc
2003-Oct-10 14:17:08 4149 bytes prism/private/wslib/calc-lib/1.0.7/1.0.7.14/Fitting/ExpandingTeeSide.clc
2003-Oct-10 14:17:08 4153 bytes prism/private/wslib/calc-lib/1.0.7/1.0.7.14/Fitting/Pipe.clc
2003-Oct-10 14:17:08 5741 bytes prism/private/wslib/calc-lib/1.0.7/1.0.7.14/Fitting/ReducingFitting.clc
2003-Oct-10 14:17:08 4176 bytes prism/private/wslib/calc-lib/1.0.7/1.0.7.14/Fitting/ReducingTeeSide.clc
2003-Oct-10 14:17:08 4128 bytes prism/private/wslib/calc-lib/1.0.7/1.0.7.14/Fitting/StandardFitting.clc
2004-Feb-19 11:43:52 6207 bytes prism/private/wslib/calc-lib/1.0.7/1.0.7.14/GivenFlowLiquid.clc
2004-Feb-19 11:44:00 5069 bytes prism/private/wslib/calc-lib/1.0.7/1.0.7.14/GivenFlowSteam.clc
2004-Feb-19 11:44:10 6337 bytes prism/private/wslib/calc-lib/1.0.7/1.0.7.14/GivenFlowVapor.clc
2004-Dec-13 10:28:19 170 bytes prism/private/wslib/calc-lib/1.0.7/1.0.7.14/Liquid
2004-Feb-15 20:52:26 1191 bytes prism/private/wslib/calc-lib/1.0.7/1.0.7.14/Liquid/ControlValveLiquidFlow.clc
2004-Feb-19 14:10:00 5112 bytes prism/private/wslib/calc-lib/1.0.7/1.0.7.14/Liquid/LiquidProps.clc
2004-Feb-15 22:36:16 5224 bytes prism/private/wslib/calc-lib/1.0.7/1.0.7.14/Liquid/LiquidVol.clc
2004-Feb-27 15:55:52 2992 bytes prism/private/wslib/calc-lib/1.0.7/1.0.7.14/NotImplemented.clc
2004-Mar-08 20:54:18 82580 bytes prism/private/wslib/calc-lib/1.0.7/1.0.7.14/PipingLoss.clc
2004-Dec-13 10:28:19 204 bytes prism/private/wslib/calc-lib/1.0.7/1.0.7.14/Post
2003-Nov-08 14:19:44 18871 bytes prism/private/wslib/calc-lib/1.0.7/1.0.7.14/Post/MaxRelCap.clc
2003-Dec-15 15:46:12 9638 bytes prism/private/wslib/calc-lib/1.0.7/1.0.7.14/Post/MaxRelCapIter.clc
2003-Dec-15 13:00:56 1800 bytes prism/private/wslib/calc-lib/1.0.7/1.0.7.14/Post/NoiseLevel.clc
2003-Oct-10 14:17:08 2041 bytes prism/private/wslib/calc-lib/1.0.7/1.0.7.14/Post/ReactionForce.clc
2004-Dec-13 10:28:19 306 bytes prism/private/wslib/calc-lib/1.0.7/1.0.7.14/Pressure
2004-Feb-27 19:05:32 2211 bytes prism/private/wslib/calc-lib/1.0.7/1.0.7.14/Pressure/BackPressure.clc
2004-Feb-27 19:14:28 2058 bytes prism/private/wslib/calc-lib/1.0.7/1.0.7.14/Pressure/ColdDiffTestPressure.clc
2004-Feb-27 19:35:40 5212 bytes prism/private/wslib/calc-lib/1.0.7/1.0.7.14/Pressure/MRCPOverPRelief.clc
2004-Feb-15 20:59:08 1126 bytes prism/private/wslib/calc-lib/1.0.7/1.0.7.14/Pressure/PAtm.clc
2004-Feb-27 19:37:12 708 bytes prism/private/wslib/calc-lib/1.0.7/1.0.7.14/Pressure/PDelta.clc
2004-Feb-28 11:52:30 12421 bytes prism/private/wslib/calc-lib/1.0.7/1.0.7.14/Pressure/POverPRelief.clc
2004-Feb-27 20:39:24 2957 bytes prism/private/wslib/calc-lib/1.0.7/1.0.7.14/Pressure/PressureChecks.clc
2004-Dec-13 10:28:19 102 bytes prism/private/wslib/calc-lib/1.0.7/1.0.7.14/Steam
2004-Feb-27 21:35:50 919 bytes prism/private/wslib/calc-lib/1.0.7/1.0.7.14/Steam/Steam.clc
2004-Dec-13 10:28:19 170 bytes prism/private/wslib/calc-lib/1.0.7/1.0.7.14/Tanks
2003-Oct-10 14:17:08 4785 bytes prism/private/wslib/calc-lib/1.0.7/1.0.7.14/Tanks/FireVaporGen.clc
2003-Oct-10 14:17:08 5871 bytes prism/private/wslib/calc-lib/1.0.7/1.0.7.14/Tanks/PumpInLiquidThermal.clc
2003-Oct-10 14:17:08 4789 bytes prism/private/wslib/calc-lib/1.0.7/1.0.7.14/Tanks/PumpOutLiquidThermal.clc
2004-Feb-27 17:44:02 2992 bytes prism/private/wslib/calc-lib/1.0.7/1.0.7.14/TubeRupture.clc
2004-Feb-19 11:44:20 5675 bytes prism/private/wslib/calc-lib/1.0.7/1.0.7.14/UserSpecifiedLiquid.clc
2004-Feb-19 11:44:30 4547 bytes prism/private/wslib/calc-lib/1.0.7/1.0.7.14/UserSpecifiedSteam.clc
2004-Feb-19 11:44:38 4903 bytes prism/private/wslib/calc-lib/1.0.7/1.0.7.14/UserSpecifiedVapor.clc
2004-Dec-13 10:28:19 578 bytes prism/private/wslib/calc-lib/1.0.7/1.0.7.14/Util
2003-Nov-11 18:36:28 605 bytes prism/private/wslib/calc-lib/1.0.7/1.0.7.14/Util/AreaAdequateChecks.clc
2003-Oct-29 14:25:16 786 bytes prism/private/wslib/calc-lib/1.0.7/1.0.7.14/Util/AreaChecks.clc
2004-Feb-27 19:03:56 3709 bytes prism/private/wslib/calc-lib/1.0.7/1.0.7.14/Util/CriticalFlow.clc
2003-Oct-29 14:33:46 4252 bytes prism/private/wslib/calc-lib/1.0.7/1.0.7.14/Util/Kb.clc
2004-Feb-28 11:23:46 1549 bytes prism/private/wslib/calc-lib/1.0.7/1.0.7.14/Util/KbpLiquid.clc
2004-Feb-28 11:21:40 1814 bytes prism/private/wslib/calc-lib/1.0.7/1.0.7.14/Util/KbpVapor.clc
2004-Feb-28 11:01:58 1121 bytes prism/private/wslib/calc-lib/1.0.7/1.0.7.14/Util/Kn.clc
2003-Oct-10 14:17:08 1317 bytes prism/private/wslib/calc-lib/1.0.7/1.0.7.14/Util/Ksh.clc
2004-Feb-28 11:34:48 10918 bytes prism/private/wslib/calc-lib/1.0.7/1.0.7.14/Util/Kv.clc
2004-Apr-02 14:43:16 4305 bytes prism/private/wslib/calc-lib/1.0.7/1.0.7.14/Util/Kw.clc
2003-Oct-29 14:42:34 5958 bytes prism/private/wslib/calc-lib/1.0.7/1.0.7.14/Util/ProtectedData.clc
2003-Dec-29 20:28:54 14082 bytes prism/private/wslib/calc-lib/1.0.7/1.0.7.14/Util/ProtectedDataVessel.clc
2003-Nov-05 21:13:24 16799 bytes prism/private/wslib/calc-lib/1.0.7/1.0.7.14/Util/ProtectingData.clc
2004-Mar-10 19:06:10 2976 bytes prism/private/wslib/calc-lib/1.0.7/1.0.7.14/Util/ReqSizingCode.clc
2003-Oct-10 14:17:08 1693 bytes prism/private/wslib/calc-lib/1.0.7/1.0.7.14/Util/ReqValveType.clc
2004-Dec-13 10:28:19 272 bytes prism/private/wslib/calc-lib/1.0.7/1.0.7.14/Vapor 2004-Feb-19 15:11:06 3797 bytes prism/private/wslib/calc-lib/1.0.7/1.0.7.14/Vapor/ControlValveVaporFlow.clc
2004-Feb-27 21:32:30 8326 bytes prism/private/wslib/calc-lib/1.0.7/1.0.7.14/Vapor/FireVaporCapacity.clc
2004-Feb-27 20:51:32 2057 bytes prism/private/wslib/calc-lib/1.0.7/1.0.7.14/Vapor/VaporMass.clc
2004-Feb-27 21:19:16 1725 bytes prism/private/wslib/calc-lib/1.0.7/1.0.7.14/Vapor/VaporProcessProps.clc
2003-Oct-22 21:03:52 6898 bytes prism/private/wslib/calc-lib/1.0.7/1.0.7.14/Vapor/VaporProps.clc
2004-Feb-27 20:52:28 2059 bytes prism/private/wslib/calc-lib/1.0.7/1.0.7.14/Vapor/VaporVol.clc
2004-Dec-13 10:28:19 884 bytes prism/private/wslib/calc-lib/1.0.7/1.0.7.15
2004-Mar-12 16:08:46 12288 bytes prism/private/wslib/calc-lib/1.0.7/1.0.7.15/.swp
2004-Feb-19 11:43:02 5919 bytes prism/private/wslib/calc-lib/1.0.7/1.0.7.15/ControlValveLiquid.clc
2004-Mar-08 13:46:52 5722 bytes prism/private/wslib/calc-lib/1.0.7/1.0.7.15/ControlValveVapor.clc
2004-Dec-13 10:28:19 340 bytes prism/private/wslib/calc-lib/1.0.7/1.0.7.15/Device
2004-Jun-13 17:26:18 6519 bytes prism/private/wslib/calc-lib/1.0.7/1.0.7.15/Device/PRVDeviceData.clc
2004-May-12 12:44:52 5701 bytes prism/private/wslib/calc-lib/1.0.7/1.0.7.15/Device/PRVDeviceData.clc-01
2003-Oct-10 14:17:08 3251 bytes prism/private/wslib/calc-lib/1.0.7/1.0.7.15/Device/PipeDeviceData.clc
2004-May-12 12:45:24 9547 bytes prism/private/wslib/calc-lib/1.0.7/1.0.7.15/Device/RDDeviceData.clc
2004-May-12 13:17:16 10676 bytes prism/private/wslib/calc-lib/1.0.7/1.0.7.15/Device/TVDeviceData.clc
2004-May-12 15:56:06 6643 bytes prism/private/wslib/calc-lib/1.0.7/1.0.7.15/Device/TankDeviceData.clc
2003-Oct-10 14:17:08 2672 bytes prism/private/wslib/calc-lib/1.0.7/1.0.7.15/Device/TurbineStmDeviceData.clc
2003-Oct-29 14:54:00 2665 bytes prism/private/wslib/calc-lib/1.0.7/1.0.7.15/Device/Vessel.clc
2004-Mar-08 13:41:52 5499 bytes prism/private/wslib/calc-lib/1.0.7/1.0.7.15/FireVaporGeneration.clc
2004-Dec-13 10:28:19 272 bytes prism/private/wslib/calc-lib/1.0.7/1.0.7.15/Fitting
2003-Oct-10 14:17:08 5636 bytes prism/private/wslib/calc-lib/1.0.7/1.0.7.15/Fitting/ExpandingFitting.clc
2003-Oct-10 14:17:08 4149 bytes prism/private/wslib/calc-lib/1.0.7/1.0.7.15/Fitting/ExpandingTeeSide.clc
2003-Oct-10 14:17:08 4153 bytes prism/private/wslib/calc-lib/1.0.7/1.0.7.15/Fitting/Pipe.clc
2003-Oct-10 14:17:08 5741 bytes prism/private/wslib/calc-lib/1.0.7/1.0.7.15/Fitting/ReducingFitting.clc
2003-Oct-10 14:17:08 4176 bytes prism/private/wslib/calc-lib/1.0.7/1.0.7.15/Fitting/ReducingTeeSide.clc
2003-Oct-10 14:17:08 4128 bytes prism/private/wslib/calc-lib/1.0.7/1.0.7.15/Fitting/StandardFitting.clc
2004-Mar-08 13:42:24 6243 bytes prism/private/wslib/calc-lib/1.0.7/1.0.7.15/GivenFlowLiquid.clc
2004-Mar-08 13:47:50 5101 bytes prism/private/wslib/calc-lib/1.0.7/1.0.7.15/GivenFlowSteam.clc
2004-Mar-08 13:48:14 6370 bytes prism/private/wslib/calc-lib/1.0.7/1.0.7.15/GivenFlowVapor.clc
2004-Dec-13 10:28:19 238 bytes prism/private/wslib/calc-lib/1.0.7/1.0.7.15/Liquid
2004-Feb-15 20:52:26 1191 bytes prism/private/wslib/calc-lib/1.0.7/1.0.7.15/Liquid/ControlValveLiquidFlow.clc
2004-Feb-19 14:10:00 5112 bytes prism/private/wslib/calc-lib/1.0.7/1.0.7.15/Liquid/LiquidProps.clc
2004-Feb-15 22:36:16 5224 bytes prism/private/wslib/calc-lib/1.0.7/1.0.7.15/Liquid/LiquidVol.clc
2004-Mar-12 12:14:44 1085 bytes prism/private/wslib/calc-lib/1.0.7/1.0.7.15/Liquid/TubeRuptureLiquidMassFlow.clc
2004-Mar-12 12:15:20 1192 bytes prism/private/wslib/calc-lib/1.0.7/1.0.7.15/Liquid/TubeRuptureLiquidVolFlow.clc
2004-Mar-08 13:48:48 3018 bytes prism/private/wslib/calc-lib/1.0.7/1.0.7.15/NotImplemented.clc
2004-Dec-13 10:28:19 510 bytes prism/private/wslib/calc-lib/1.0.7/1.0.7.15/PipingLoss
2004-Mar-20 14:50:54 83102 bytes prism/private/wslib/calc-lib/1.0.7/1.0.7.15/PipingLoss.clc
2004-Mar-27 20:30:50 4641 bytes prism/private/wslib/calc-lib/1.0.7/1.0.7.15/PipingLoss/CheckInlet.clc
2004-Mar-27 20:31:04 5293 bytes prism/private/wslib/calc-lib/1.0.7/1.0.7.15/PipingLoss/CheckOutlet.clc
2004-Mar-21 16:56:34 637 bytes prism/private/wslib/calc-lib/1.0.7/1.0.7.15/PipingLoss/HDelta.clc
2004-Mar-30 16:17:58 26792 bytes prism/private/wslib/calc-lib/1.0.7/1.0.7.15/PipingLoss/Liquid.clc
2004-Mar-27 20:29:44 2024 bytes prism/private/wslib/calc-lib/1.0.7/1.0.7.15/PipingLoss/LiquidDrop.clc
2004-Mar-22 14:32:04 16852 bytes prism/private/wslib/calc-lib/1.0.7/1.0.7.15/PipingLoss/MaxRelCap.clc
2004-Mar-29 14:10:04 4194 bytes prism/private/wslib/calc-lib/1.0.7/1.0.7.15/PipingLoss/MaxRelCapIterSteam.clc
2004-Mar-21 16:42:22 6083 bytes prism/private/wslib/calc-lib/1.0.7/1.0.7.15/PipingLoss/MaxRelCapIterVapor.clc
2004-Mar-29 23:26:08 15983 bytes prism/private/wslib/calc-lib/1.0.7/1.0.7.15/PipingLoss/MaxRelCapLiquid.clc
2004-Mar-24 10:54:00 16789 bytes prism/private/wslib/calc-lib/1.0.7/1.0.7.15/PipingLoss/PipingLossInit.clc
2004-Mar-30 00:10:16 49317 bytes prism/private/wslib/calc-lib/1.0.7/1.0.7.15/PipingLoss/Steam.clc
2004-Mar-29 21:25:16 55405 bytes prism/private/wslib/calc-lib/1.0.7/1.0.7.15/PipingLoss/Vapor.clc
2004-Dec-13 10:28:19 374 bytes prism/private/wslib/calc-lib/1.0.7/1.0.7.15/PipingLoss/_archive
2004-Mar-22 09:24:44 31908 bytes prism/private/wslib/calc-lib/1.0.7/1.0.7.15/PipingLoss/_archive/Liquid.clc-01
2004-Mar-24 10:58:04 38044 bytes prism/private/wslib/calc-lib/1.0.7/1.0.7.15/PipingLoss/_archive/Liquid.clc-02
2004-Mar-22 14:31:18 19317 bytes prism/private/wslib/calc-lib/1.0.7/1.0.7.15/PipingLoss/_archive/MaxRelCap.clc-01
2004-Mar-22 15:43:20 5931 bytes prism/private/wslib/calc-lib/1.0.7/1.0.7.15/PipingLoss/_archive/MaxRelCapIterLiquid.clc
2004-Mar-24 14:45:36 20009 bytes prism/private/wslib/calc-lib/1.0.7/1.0.7.15/PipingLoss/_archive/MaxRelCapLiquid.clc-01
2004-Mar-24 21:42:18 20624 bytes prism/private/wslib/calc-lib/1.0.7/1.0.7.15/PipingLoss/_archive/MaxRelCapLiquid.clc-02
2004-Mar-24 21:51:24 20632 bytes prism/private/wslib/calc-lib/1.0.7/1.0.7.15/PipingLoss/_archive/MaxRelCapLiquid.clc-03
2004-Dec-13 10:28:19 782 bytes prism/private/wslib/calc-lib/1.0.7/1.0.7.15/PipingLoss/_archive/PipingLoss-01
2004-Mar-25 09:04:52 36864 bytes prism/private/wslib/calc-lib/1.0.7/1.0.7.15/PipingLoss/_archive/PipingLoss-01/.Liquid.clc.swp 2004-Mar-22 09:28:52 4641 bytes prism/private/wslib/calc-lib/1.0.7/1.0.7.15/PipingLoss/_archive/PipingLoss-01/CheckInlet.clc
2004-Mar-22 09:30:22 5293 bytes prism/private/wslib/calc-lib/1.0.7/1.0.7.15/PipingLoss/_archive/PipingLoss-01/CheckOutlet.clc
2004-Mar-21 16:56:34 637 bytes prism/private/wslib/calc-lib/1.0.7/1.0.7.15/PipingLoss/_archive/PipingLoss-01/HDelta.clc
2004-Mar-25 09:04:32 23893 bytes prism/private/wslib/calc-lib/1.0.7/1.0.7.15/PipingLoss/_archive/PipingLoss-01/Liquid.clc
2004-Mar-22 09:24:44 31908 bytes prism/private/wslib/calc-lib/1.0.7/1.0.7.15/PipingLoss/_archive/PipingLoss-01/Liquid.clc-01
2004-Mar-24 10:58:04 38044 bytes prism/private/wslib/calc-lib/1.0.7/1.0.7.15/PipingLoss/_archive/PipingLoss-01/Liquid.clc-02
2004-Mar-24 23:03:14 2024 bytes prism/private/wslib/calc-lib/1.0.7/1.0.7.15/PipingLoss/_archive/PipingLoss-01/LiquidDrop.clc
2004-Mar-22 14:32:04 16852 bytes prism/private/wslib/calc-lib/1.0.7/1.0.7.15/PipingLoss/_archive/PipingLoss-01/MaxRelCap.clc
2004-Mar-22 14:31:18 19317 bytes prism/private/wslib/calc-lib/1.0.7/1.0.7.15/PipingLoss/_archive/PipingLoss-01/MaxRelCap.clc-01
2004-Mar-21 16:42:52 4166 bytes prism/private/wslib/calc-lib/1.0.7/1.0.7.15/PipingLoss/_archive/PipingLoss-01/MaxRelCapIterSteam.clc
2004-Mar-21 16:42:22 6083 bytes prism/private/wslib/calc-lib/1.0.7/1.0.7.15/PipingLoss/_archive/PipingLoss-01/MaxRelCapIterVapor.clc
2004-Mar-25 09:06:30 18417 bytes prism/private/wslib/calc-lib/1.0.7/1.0.7.15/PipingLoss/_archive/PipingLoss-01/MaxRelCapLiquid.clc
2004-Mar-24 14:45:36 20009 bytes prism/private/wslib/calc-lib/1.0.7/1.0.7.15/PipingLoss/_archive/PipingLoss-01/MaxRelCapLiquid.clc-01
2004-Mar-24 21:42:18 20624 bytes prism/private/wslib/calc-lib/1.0.7/1.0.7.15/PipingLoss/_archive/PipingLoss-01/MaxRelCapLiquid.clc-02
2004-Mar-24 21:51:24 20632 bytes prism/private/wslib/calc-lib/1.0.7/1.0.7.15/PipingLoss/_archive/PipingLoss-01/MaxRelCapLiquid.clc-03
2004-Mar-24 10:54:00 16789 bytes prism/private/wslib/calc-lib/1.0.7/1.0.7.15/PipingLoss/_archive/PipingLoss-01/PipingLossInit.clc
2004-Mar-22 09:31:00 49310 bytes prism/private/wslib/calc-lib/1.0.7/1.0.7.15/PipingLoss/_archive/PipingLoss-01/Steam.clc
2004-Mar-22 09:30:52 55393 bytes prism/private/wslib/calc-lib/1.0.7/1.0.7.15/PipingLoss/_archive/PipingLoss-01/Vapor.clc
2004-Dec-13 10:28:19 102 bytes prism/private/wslib/calc-lib/1.0.7/1.0.7.15/PipingLoss/_archive/PipingLoss-01/_archive
2004-Mar-22 15:43:20 5931 bytes prism/private/wslib/calc-lib/1.0.7/1.0.7.15/PipingLoss/_archive/PipingLoss-01/_archive/MaxRelCapIterLiquid.clc
2004-Mar-24 22:46:20 906 bytes prism/private/wslib/calc-lib/1.0.7/1.0.7.15/PipingLoss/_archive/PipingLoss-01/junk
2004-Dec-13 10:28:19 510 bytes prism/private/wslib/calc-lib/1.0.7/1.0.7.15/PipingLoss/_archive/PipingLoss-02
2004-Mar-27 20:30:50 4641 bytes prism/private/wslib/calc-lib/1.0.7/1.0.7.15/PipingLoss/_archive/PipingLoss-02/CheckInlet.clc
2004-Mar-27 20:31:04 5293 bytes prism/private/wslib/calc-lib/1.0.7/1.0.7.15/PipingLoss/_archive/PipingLoss-02/CheckOutlet.clc
2004-Mar-21 16:56:34 637 bytes prism/private/wslib/calc-lib/1.0.7/1.0.7.15/PipingLoss/_archive/PipingLoss-02/HDelta.clc
2004-Mar-29 23:11:56 26180 bytes prism/private/wslib/calc-lib/1.0.7/1.0.7.15/PipingLoss/_archive/PipingLoss-02/Liquid.clc
2004-Mar-27 20:29:44 2024 bytes prism/private/wslib/calc-lib/1.0.7/1.0.7.15/PipingLoss/_archive/PipingLoss-02/LiquidDrop.clc
2004-Mar-22 14:32:04 16852 bytes prism/private/wslib/calc-lib/1.0.7/1.0.7.15/PipingLoss/_archive/PipingLoss-02/MaxRelCap.clc
2004-Mar-29 14:10:04 4194 bytes prism/private/wslib/calc-lib/1.0.7/1.0.7.15/PipingLoss/_archive/PipingLoss-02/MaxRelCapIterSteam.clc
2004-Mar-21 16:42:22 6083 bytes prism/private/wslib/calc-lib/1.0.7/1.0.7.15/PipingLoss/_archive/PipingLoss-02/MaxRelCapIterVapor.clc
2004-Mar-29 23:03:32 17767 bytes prism/private/wslib/calc-lib/1.0.7/1.0.7.15/PipingLoss/_archive/PipingLoss-02/MaxRelCapLiquid.clc
2004-Mar-24 10:54:00 16789 bytes prism/private/wslib/calc-lib/1.0.7/1.0.7.15/PipingLoss/_archive/PipingLoss-02/PipingLossInit.clc
2004-Mar-29 21:24:58 49322 bytes prism/private/wslib/calc-lib/1.0.7/1.0.7.15/PipingLoss/_archive/PipingLoss-02/Steam.clc
2004-Mar-29 21:25:16 55405 bytes prism/private/wslib/calc-lib/1.0.7/1.0.7.15/PipingLoss/_archive/PipingLoss-02/Vapor.clc
2004-Dec-13 10:28:19 306 bytes prism/private/wslib/calc-lib/1.0.7/1.0.7.15/PipingLoss/_archive/PipingLoss-02/_archive
2004-Mar-22 09:24:44 31908 bytes prism/private/wslib/calc-lib/1.0.7/1.0.7.15/PipingLoss/_archive/PipingLoss-02/_archive/Liquid.clc-01
2004-Mar-24 10:58:04 38044 bytes prism/private/wslib/calc-lib/1.0.7/1.0.7.15/PipingLoss/_archive/PipingLoss-02/_archive/Liquid.clc-02
2004-Mar-22 14:31:18 19317 bytes prism/private/wslib/calc-lib/1.0.7/1.0.7.15/PipingLoss/_archive/PipingLoss-02/_archive/MaxRelCap.clc-01
2004-Mar-22 15:43:20 5931 bytes prism/private/wslib/calc-lib/1.0.7/1.0.7.15/PipingLoss/_archive/PipingLoss-02/_archive/MaxRelCapIterLiquid.clc
2004-Mar-24 14:45:36 20009 bytes prism/private/wslib/calc-lib/1.0.7/1.0.7.15/PipingLoss/_archive/PipingLoss-02/_archive/MaxRelCapLiquid.clc-01
2004-Mar-24 21:42:18 20624 bytes prism/private/wslib/calc-lib/1.0.7/1.0.7.15/PipingLoss/_archive/PipingLoss-02/_archive/MaxRelCapLiquid.clc-02
2004-Mar-24 21:51:24 20632 bytes prism/private/wslib/calc-lib/1.0.7/1.0.7.15/PipingLoss/_archive/PipingLoss-02/_archive/MaxRelCapLiquid.clc-03
2004-Dec-13 10:28:19 238 bytes prism/private/wslib/calc-lib/1.0.7/1.0.7.15/Post
2004-Mar-22 12:12:22 19426 bytes prism/private/wslib/calc-lib/1.0.7/1.0.7.15/Post/MaxRelCap.clc
2004-Mar-29 14:10:40 10006 bytes prism/private/wslib/calc-lib/1.0.7/1.0.7.15/Post/MaxRelCapIter.clc
2003-Dec-15 13:00:56 1800 bytes prism/private/wslib/calc-lib/1.0.7/1.0.7.15/Post/NoiseLevel.clc
2003-Oct-10 14:17:08 2041 bytes prism/private/wslib/calc-lib/1.0.7/1.0.7.15/Post/ReactionForce.clc
2004-Mar-20 14:48:46 1491 bytes prism/private/wslib/calc-lib/1.0.7/1.0.7.15/Post/ReactionForceVapor.clc
2004-Dec-13 10:28:19 306 bytes prism/private/wslib/calc-lib/1.0.7/1.0.7.15/Pressure
2004-Feb-27 19:05:32 2211 bytes prism/private/wslib/calc-lib/1.0.7/1.0.7.15/Pressure/BackPressure.clc
2004-Feb-27 19:14:28 2058 bytes prism/private/wslib/calc-lib/1.0.7/1.0.7.15/Pressure/ColdDiffTestPressure.clc
2004-Mar-08 13:16:44 5216 bytes prism/private/wslib/calc-lib/1.0.7/1.0.7.15/Pressure/MRCPOverPRelief.clc
2004-Feb-15 20:59:08 1126 bytes prism/private/wslib/calc-lib/1.0.7/1.0.7.15/Pressure/PAtm.clc
2004-Mar-18 11:31:24 708 bytes prism/private/wslib/calc-lib/1.0.7/1.0.7.15/Pressure/PDelta.clc
2004-Mar-08 13:19:30 12441 bytes prism/private/wslib/calc-lib/1.0.7/1.0.7.15/Pressure/POverPRelief.clc
2004-Feb-27 20:39:24 2957 bytes prism/private/wslib/calc-lib/1.0.7/1.0.7.15/Pressure/PressureChecks.clc 2004-Dec-13 10:28:19 102 bytes prism/private/wslib/calc-lib/1.0.7/1.0.7.15/Steam
2004-Mar-29 14:10:14 947 bytes prism/private/wslib/calc-lib/1.0.7/1.0.7.15/Steam/Steam.clc
2004-Dec-13 10:28:19 170 bytes prism/private/wslib/calc-lib/1.0.7/1.0.7.15/Tanks
2003-Oct-10 14:17:08 4785 bytes prism/private/wslib/calc-lib/1.0.7/1.0.7.15/Tanks/FireVaporGen.clc
2003-Oct-10 14:17:08 5871 bytes prism/private/wslib/calc-lib/1.0.7/1.0.7.15/Tanks/PumpInLiquidThermal.clc
2003-Oct-10 14:17:08 4789 bytes prism/private/wslib/calc-lib/1.0.7/1.0.7.15/Tanks/PumpOutLiquidThermal.clc
2004-Mar-20 14:51:42 8145 bytes prism/private/wslib/calc-lib/1.0.7/1.0.7.15/TubeRuptureLiquid.clc
2004-Mar-20 14:51:56 8082 bytes prism/private/wslib/calc-lib/1.0.7/1.0.7.15/TubeRuptureVapor.clc
2004-Mar-08 13:53:48 5794 bytes prism/private/wslib/calc-lib/1.0.7/1.0.7.15/UserSpecifiedLiquid.clc
2004-Mar-08 13:54:54 4594 bytes prism/private/wslib/calc-lib/1.0.7/1.0.7.15/UserSpecifiedSteam.clc
2004-Mar-08 13:55:32 4950 bytes prism/private/wslib/calc-lib/1.0.7/1.0.7.15/UserSpecifiedVapor.clc
2004-Dec-13 10:28:19 646 bytes prism/private/wslib/calc-lib/1.0.7/1.0.7.15/Util
2003-Nov-11 18:36:28 605 bytes prism/private/wslib/calc-lib/1.0.7/1.0.7.15/Util/AreaAdequateChecks.clc
2003-Oct-29 14:25:16 786 bytes prism/private/wslib/calc-lib/1.0.7/1.0.7.15/Util/AreaChecks.clc
2004-Mar-08 13:21:22 3717 bytes prism/private/wslib/calc-lib/1.0.7/1.0.7.15/Util/CriticalFlow.clc
2004-Mar-08 13:39:08 1109 bytes prism/private/wslib/calc-lib/1.0.7/1.0.7.15/Util/CriticalTubeFlow.clc
2003-Oct-29 14:33:46 4252 bytes prism/private/wslib/calc-lib/1.0.7/1.0.7.15/Util/Kb.clc
2004-Mar-12 11:53:32 1555 bytes prism/private/wslib/calc-lib/1.0.7/1.0.7.15/Util/KbpLiquid.clc
2004-Mar-08 13:21:56 1818 bytes prism/private/wslib/calc-lib/1.0.7/1.0.7.15/Util/KbpVapor.clc
2004-Mar-08 13:22:24 1125 bytes prism/private/wslib/calc-lib/1.0.7/1.0.7.15/Util/Kn.clc
2004-Mar-29 14:08:48 1380 bytes prism/private/wslib/calc-lib/1.0.7/1.0.7.15/Util/Ksh.clc
2004-Mar-08 13:22:58 10934 bytes prism/private/wslib/calc-lib/1.0.7/1.0.7.15/Util/Kv.clc
2004-Mar-30 16:22:28 4328 bytes prism/private/wslib/calc-lib/1.0.7/1.0.7.15/Util/Kw.clc
2003-Oct-29 14:42:34 5958 bytes prism/private/wslib/calc-lib/1.0.7/1.0.7.15/Util/ProtectedData.clc
2003-Dec-29 20:28:54 14082 bytes prism/private/wslib/calc-lib/1.0.7/1.0.7.15/Util/ProtectedDataVessel.clc
2003-Nov-05 21:13:24 16799 bytes prism/private/wslib/calc-lib/1.0.7/1.0.7.15/Util/ProtectingData.clc
2004-Mar-08 13:23:52 2976 bytes prism/private/wslib/calc-lib/1.0.7/1.0.7.15/Util/ReqSizingCode.clc
2003-Oct-10 14:17:08 1693 bytes prism/private/wslib/calc-lib/1.0.7/1.0.7.15/Util/ReqValveType.clc
2004-Mar-08 13:39:08 1301 bytes prism/private/wslib/calc-lib/1.0.7/1.0.7.15/Util/VaporCapCreditCnvrt.clc
2004-Dec-13 10:28:20 340 bytes prism/private/wslib/calc-lib/1.0.7/1.0.7.15/Vapor
2004-Feb-19 15:11:06 3797 bytes prism/private/wslib/calc-lib/1.0.7/1.0.7.15/Vapor/ControlValveVaporFlow.clc
2004-Feb-27 21:32:30 8326 bytes prism/private/wslib/calc-lib/1.0.7/1.0.7.15/Vapor/FireVaporCapacity.clc
2004-Mar-08 13:39:20 1187 bytes prism/private/wslib/calc-lib/1.0.7/1.0.7.15/Vapor/TubeRuptureVaporFlowCrit.clc
2004-Mar-08 13:39:20 879 bytes prism/private/wslib/calc-lib/1.0.7/1.0.7.15/Vapor/TubeRuptureVaporFlowSub.clc
2004-Mar-08 13:24:20 2071 bytes prism/private/wslib/calc-lib/1.0.7/1.0.7.15/Vapor/VaporMass.clc
2004-Feb-27 21:19:16 1725 bytes prism/private/wslib/calc-lib/1.0.7/1.0.7.15/Vapor/VaporProcessProps.clc
2003-Oct-22 21:03:52 6898 bytes prism/private/wslib/calc-lib/1.0.7/1.0.7.15/Vapor/VaporProps.clc
2004-Mar-08 13:24:42 2073 bytes prism/private/wslib/calc-lib/1.0.7/1.0.7.15/Vapor/VaporVol.clc
2004-Dec-13 10:28:20 918 bytes prism/private/wslib/calc-lib/1.0.7/1.0.7.16
2004-Mar-12 16:08:46 12288 bytes prism/private/wslib/calc-lib/1.0.7/1.0.7.16/.swp
2004-Feb-19 11:43:02 5919 bytes prism/private/wslib/calc-lib/1.0.7/1.0.7.16/ControlValveLiquid.clc
2004-Mar-08 13:46:52 5722 bytes prism/private/wslib/calc-lib/1.0.7/1.0.7.16/ControlValveVapor.clc
2004-Dec-13 10:28:20 340 bytes prism/private/wslib/calc-lib/1.0.7/1.0.7.16/Device
2004-Jun-13 17:35:50 6553 bytes prism/private/wslib/calc-lib/1.0.7/1.0.7.16/Device/PRVDeviceData.clc
2004-May-19 17:04:58 5701 bytes prism/private/wslib/calc-lib/1.0.7/1.0.7.16/Device/PRVDeviceData.clc-01
2003-Oct-10 14:17:08 3251 bytes prism/private/wslib/calc-lib/1.0.7/1.0.7.16/Device/PipeDeviceData.clc
2004-May-19 17:05:12 9547 bytes prism/private/wslib/calc-lib/1.0.7/1.0.7.16/Device/RDDeviceData.clc
2004-May-19 17:05:20 10676 bytes prism/private/wslib/calc-lib/1.0.7/1.0.7.16/Device/TVDeviceData.clc
2004-May-19 17:05:26 6643 bytes prism/private/wslib/calc-lib/1.0.7/1.0.7.16/Device/TankDeviceData.clc
2003-Oct-10 14:17:08 2672 bytes prism/private/wslib/calc-lib/1.0.7/1.0.7.16/Device/TurbineStmDeviceData.clc
2003-Oct-29 14:54:00 2665 bytes prism/private/wslib/calc-lib/1.0.7/1.0.7.16/Device/Vessel.clc
2004-Mar-08 13:41:52 5499 bytes prism/private/wslib/calc-lib/1.0.7/1.0.7.16/FireVaporGeneration.clc
2004-Dec-13 10:28:20 272 bytes prism/private/wslib/calc-lib/1.0.7/1.0.7.16/Fitting
2003-Oct-10 14:17:08 5636 bytes prism/private/wslib/calc-lib/1.0.7/1.0.7.16/Fitting/ExpandingFitting.clc
2003-Oct-10 14:17:08 4149 bytes prism/private/wslib/calc-lib/1.0.7/1.0.7.16/Fitting/ExpandingTeeSide.clc
2003-Oct-10 14:17:08 4153 bytes prism/private/wslib/calc-lib/1.0.7/1.0.7.16/Fitting/Pipe.clc
2003-Oct-10 14:17:08 5741 bytes prism/private/wslib/calc-lib/1.0.7/1.0.7.16/Fitting/ReducingFitting.clc
2003-Oct-10 14:17:08 4176 bytes prism/private/wslib/calc-lib/1.0.7/1.0.7.16/Fitting/ReducingTeeSide.clc
2003-Oct-10 14:17:08 4128 bytes prism/private/wslib/calc-lib/1.0.7/1.0.7.16/Fitting/StandardFitting.clc
2004-Mar-08 13:42:24 6243 bytes prism/private/wslib/calc-lib/1.0.7/1.0.7.16/GivenFlowLiquid.clc
2004-Mar-08 13:47:50 5101 bytes prism/private/wslib/calc-lib/1.0.7/1.0.7.16/GivenFlowSteam.clc 2004-Mar-08 13:48:14 6370 bytes prism/private/wslib/calc-lib/1.0.7/1.0.7.16/GivenFlowVapor.clc
2004-Dec-13 10:28:20 272 bytes prism/private/wslib/calc-lib/1.0.7/1.0.7.16/Liquid
2004-Feb-15 20:52:26 1191 bytes prism/private/wslib/calc-lib/1.0.7/1.0.7.16/Liquid/ControlValveLiquidFlow.clc
2004-May-20 10:21:36 652 bytes prism/private/wslib/calc-lib/1.0.7/1.0.7.16/Liquid/LiquidExpansionCapacity.clc
2004-Feb-19 14:10:00 5112 bytes prism/private/wslib/calc-lib/1.0.7/1.0.7.16/Liquid/LiquidProps.clc
2004-Feb-15 22:36:16 5224 bytes prism/private/wslib/calc-lib/1.0.7/1.0.7.16/Liquid/LiquidVol.clc
2004-May-20 10:47:44 822 bytes prism/private/wslib/calc-lib/1.0.7/1.0.7.16/Liquid/TubeRuptureLiquidMassFlow.clc
2004-May-20 10:47:56 830 bytes prism/private/wslib/calc-lib/1.0.7/1.0.7.16/Liquid/TubeRuptureLiquidVolFlow.clc
2004-May-20 10:21:56 5516 bytes prism/private/wslib/calc-lib/1.0.7/1.0.7.16/LiquidExpansion.clc
2004-Mar-08 13:48:48 3018 bytes prism/private/wslib/calc-lib/1.0.7/1.0.7.16/NotImplemented.clc
2004-Dec-13 10:28:20 578 bytes prism/private/wslib/calc-lib/1.0.7/1.0.7.16/PipingLoss
2004-May-19 17:55:16 83103 bytes prism/private/wslib/calc-lib/1.0.7/1.0.7.16/PipingLoss.clc
2004-Mar-27 20:30:50 4641 bytes prism/private/wslib/calc-lib/1.0.7/1.0.7.16/PipingLoss/CheckInlet.clc
2004-Mar-27 20:31:04 5293 bytes prism/private/wslib/calc-lib/1.0.7/1.0.7.16/PipingLoss/CheckOutlet.clc
2004-Mar-21 16:56:34 637 bytes prism/private/wslib/calc-lib/1.0.7/1.0.7.16/PipingLoss/HDelta.clc
2004-Mar-30 16:17:58 26792 bytes prism/private/wslib/calc-lib/1.0.7/1.0.7.16/PipingLoss/Liquid.clc
2004-Mar-27 20:29:44 2024 bytes prism/private/wslib/calc-lib/1.0.7/1.0.7.16/PipingLoss/LiquidDrop.clc
2004-Mar-22 14:32:04 16852 bytes prism/private/wslib/calc-lib/1.0.7/1.0.7.16/PipingLoss/MaxRelCap.clc
2004-Mar-29 14:10:04 4194 bytes prism/private/wslib/calc-lib/1.0.7/1.0.7.16/PipingLoss/MaxRelCapIterSteam.clc
2004-Mar-21 16:42:22 6083 bytes prism/private/wslib/calc-lib/1.0.7/1.0.7.16/PipingLoss/MaxRelCapIterVapor.clc
2004-May-19 17:08:38 15984 bytes prism/private/wslib/calc-lib/1.0.7/1.0.7.16/PipingLoss/MaxRelCapLiquid.clc
2004-May-19 20:18:24 16301 bytes prism/private/wslib/calc-lib/1.0.7/1.0.7.16/PipingLoss/MaxRelCapVapor.clc
2004-May-19 17:44:18 9733 bytes prism/private/wslib/calc-lib/1.0.7/1.0.7.16/PipingLoss/NotImplemented.clc
2004-Mar-24 10:54:00 16789 bytes prism/private/wslib/calc-lib/1.0.7/1.0.7.16/PipingLoss/PipingLossInit.clc
2004-May-19 14:11:46 49318 bytes prism/private/wslib/calc-lib/1.0.7/1.0.7.16/PipingLoss/Steam.clc
2004-May-19 15:19:54 55407 bytes prism/private/wslib/calc-lib/1.0.7/1.0.7.16/PipingLoss/Vapor.clc
2004-Dec-13 10:28:20 374 bytes prism/private/wslib/calc-lib/1.0.7/1.0.7.16/PipingLoss/_archive
2004-Mar-22 09:24:44 31908 bytes prism/private/wslib/calc-lib/1.0.7/1.0.7.16/PipingLoss/_archive/Liquid.clc-01
2004-Mar-24 10:58:04 38044 bytes prism/private/wslib/calc-lib/1.0.7/1.0.7.16/PipingLoss/_archive/Liquid.clc-02
2004-Mar-22 14:31:18 19317 bytes prism/private/wslib/calc-lib/1.0.7/1.0.7.16/PipingLoss/_archive/MaxRelCap.clc-01
2004-Mar-22 15:43:20 5931 bytes prism/private/wslib/calc-lib/1.0.7/1.0.7.16/PipingLoss/_archive/MaxRelCapIterLiquid.clc
2004-Mar-24 14:45:36 20009 bytes prism/private/wslib/calc-lib/1.0.7/1.0.7.16/PipingLoss/_archive/MaxRelCapLiquid.clc-01
2004-Mar-24 21:42:18 20624 bytes prism/private/wslib/calc-lib/1.0.7/1.0.7.16/PipingLoss/_archive/MaxRelCapLiquid.clc-02
2004-Mar-24 21:51:24 20632 bytes prism/private/wslib/calc-lib/1.0.7/1.0.7.16/PipingLoss/_archive/MaxRelCapLiquid.clc-03
2004-Dec-13 10:28:20 782 bytes prism/private/wslib/calc-lib/1.0.7/1.0.7.16/PipingLoss/_archive/PipingLoss-01
2004-Mar-25 09:04:52 36864 bytes prism/private/wslib/calc-lib/1.0.7/1.0.7.16/PipingLoss/_archive/PipingLoss-01/.Liquid.clc.swp
2004-Mar-22 09:28:52 4641 bytes prism/private/wslib/calc-lib/1.0.7/1.0.7.16/PipingLoss/_archive/PipingLoss-01/CheckInlet.clc
2004-Mar-22 09:30:22 5293 bytes prism/private/wslib/calc-lib/1.0.7/1.0.7.16/PipingLoss/_archive/PipingLoss-01/CheckOutlet.clc
2004-Mar-21 16:56:34 637 bytes prism/private/wslib/calc-lib/1.0.7/1.0.7.16/PipingLoss/_archive/PipingLoss-01/HDelta.clc
2004-Mar-25 09:04:32 23893 bytes prism/private/wslib/calc-lib/1.0.7/1.0.7.16/PipingLoss/_archive/PipingLoss-01/Liquid.clc
2004-Mar-22 09:24:44 31908 bytes prism/private/wslib/calc-lib/1.0.7/1.0.7.16/PipingLoss/_archive/PipingLoss-01/Liquid.clc-01
2004-Mar-24 10:58:04 38044 bytes prism/private/wslib/calc-lib/1.0.7/1.0.7.16/PipingLoss/_archive/PipingLoss-01/Liquid.clc-02
2004-Mar-24 23:03:14 2024 bytes prism/private/wslib/calc-lib/1.0.7/1.0.7.16/PipingLoss/_archive/PipingLoss-01/LiquidDrop.clc
2004-Mar-22 14:32:04 16852 bytes prism/private/wslib/calc-lib/1.0.7/1.0.7.16/PipingLoss/_archive/PipingLoss-01/MaxRelCap.clc
2004-Mar-22 14:31:18 19317 bytes prism/private/wslib/calc-lib/1.0.7/1.0.7.16/PipingLoss/_archive/PipingLoss-01/MaxRelCap.clc-01
2004-Mar-21 16:42:52 4166 bytes prism/private/wslib/calc-lib/1.0.7/1.0.7.16/PipingLoss/_archive/PipingLoss-01/MaxRelCapIterSteam.clc
2004-Mar-21 16:42:22 6083 bytes prism/private/wslib/calc-lib/1.0.7/1.0.7.16/PipingLoss/_archive/PipingLoss-01/MaxRelCapIterVapor.clc
2004-Mar-25 09:06:30 18417 bytes prism/private/wslib/calc-lib/1.0.7/1.0.7.16/PipingLoss/_archive/PipingLoss-01/MaxRelCapLiquid.clc
2004-Mar-24 14:45:36 20009 bytes prism/private/wslib/calc-lib/1.0.7/1.0.7.16/PipingLoss/_archive/PipingLoss-01/MaxRelCapLiquid.clc-01
2004-Mar-24 21:42:18 20624 bytes prism/private/wslib/calc-lib/1.0.7/1.0.7.16/PipingLoss/_archive/PipingLoss-01/MaxRelCapLiquid.clc-02
2004-Mar-24 21:51:24 20632 bytes prism/private/wslib/calc-lib/1.0.7/1.0.7.16/PipingLoss/_archive/PipingLoss-01/MaxRelCapLiquid.clc-03
2004-Mar-24 10:54:00 16789 bytes prism/private/wslib/calc-lib/1.0.7/1.0.7.16/PipingLoss/_archive/PipingLoss-01/PipingLossInit.clc
2004-Mar-22 09:31:00 49310 bytes prism/private/wslib/calc-lib/1.0.7/1.0.7.16/PipingLoss/_archive/PipingLoss-01/Steam.clc
2004-Mar-22 09:30:52 55393 bytes prism/private/wslib/calc-lib/1.0.7/1.0.7.16/PipingLoss/_archive/PipingLoss-01/Vapor.clc
2004-Dec-13 10:28:20 102 bytes prism/private/wslib/calc-lib/1.0.7/1.0.7.16/PipingLoss/_archive/PipingLoss-01/_archive
2004-Mar-22 15:43:20 5931 bytes prism/private/wslib/calc-lib/1.0.7/1.0.7.16/PipingLoss/_archive/PipingLoss-01/_archive/MaxRelCapIterLiquid.clc
2004-Mar-24 22:46:20 906 bytes prism/private/wslib/calc-lib/1.0.7/1.0.7.16/PipingLoss/_archive/PipingLoss-01/junk
2004-Dec-13 10:28:20 510 bytes prism/private/wslib/calc-lib/1.0.7/1.0.7.16/PipingLoss/_archive/PipingLoss-02
2004-Mar-27 20:30:50 4641 bytes prism/private/wslib/calc-lib/1.0.7/1.0.7.16/PipingLoss/_archive/PipingLoss-02/CheckInlet.clc
2004-Mar-27 20:31:04 5293 bytes prism/private/wslib/calc-lib/1.0.7/1.0.7.16/PipingLoss/_archive/PipingLoss-02/CheckOutlet.clc 2004-Mar-21 16:56:34 637 bytes prism/private/wslib/calc-lib/1.0.7/1.0.7.16/PipingLoss/_archive/PipingLoss-02/HDelta.clc
2004-Mar-29 23:11:56 26180 bytes prism/private/wslib/calc-lib/1.0.7/1.0.7.16/PipingLoss/_archive/PipingLoss-02/Liquid.clc
2004-Mar-27 20:29:44 2024 bytes prism/private/wslib/calc-lib/1.0.7/1.0.7.16/PipingLoss/_archive/PipingLoss-02/LiquidDrop.clc
2004-Mar-22 14:32:04 16852 bytes prism/private/wslib/calc-lib/1.0.7/1.0.7.16/PipingLoss/_archive/PipingLoss-02/MaxRelCap.clc
2004-Mar-29 14:10:04 4194 bytes prism/private/wslib/calc-lib/1.0.7/1.0.7.16/PipingLoss/_archive/PipingLoss-02/MaxRelCapIterSteam.clc
2004-Mar-21 16:42:22 6083 bytes prism/private/wslib/calc-lib/1.0.7/1.0.7.16/PipingLoss/_archive/PipingLoss-02/MaxRelCapIterVapor.clc
2004-Mar-29 23:03:32 17767 bytes prism/private/wslib/calc-lib/1.0.7/1.0.7.16/PipingLoss/_archive/PipingLoss-02/MaxRelCapLiquid.clc
2004-Mar-24 10:54:00 16789 bytes prism/private/wslib/calc-lib/1.0.7/1.0.7.16/PipingLoss/_archive/PipingLoss-02/PipingLossInit.clc
2004-Mar-29 21:24:58 49322 bytes prism/private/wslib/calc-lib/1.0.7/1.0.7.16/PipingLoss/_archive/PipingLoss-02/Steam.clc
2004-Mar-29 21:25:16 55405 bytes prism/private/wslib/calc-lib/1.0.7/1.0.7.16/PipingLoss/_archive/PipingLoss-02/Vapor.clc
2004-Dec-13 10:28:20 306 bytes prism/private/wslib/calc-lib/1.0.7/1.0.7.16/PipingLoss/_archive/PipingLoss-02/_archive
2004-Mar-22 09:24:44 31908 bytes prism/private/wslib/calc-lib/1.0.7/1.0.7.16/PipingLoss/_archive/PipingLoss-02/_archive/Liquid.clc-01
2004-Mar-24 10:58:04 38044 bytes prism/private/wslib/calc-lib/1.0.7/1.0.7.16/PipingLoss/_archive/PipingLoss-02/_archive/Liquid.clc-02
2004-Mar-22 14:31:18 19317 bytes prism/private/wslib/calc-lib/1.0.7/1.0.7.16/PipingLoss/_archive/PipingLoss-02/_archive/MaxRelCap.clc-01
2004-Mar-22 15:43:20 5931 bytes prism/private/wslib/calc-lib/1.0.7/1.0.7.16/PipingLoss/_archive/PipingLoss-02/_archive/MaxRelCapIterLiquid.clc
2004-Mar-24 14:45:36 20009 bytes prism/private/wslib/calc-lib/1.0.7/1.0.7.16/PipingLoss/_archive/PipingLoss-02/_archive/MaxRelCapLiquid.clc-01
2004-Mar-24 21:42:18 20624 bytes prism/private/wslib/calc-lib/1.0.7/1.0.7.16/PipingLoss/_archive/PipingLoss-02/_archive/MaxRelCapLiquid.clc-02
2004-Mar-24 21:51:24 20632 bytes prism/private/wslib/calc-lib/1.0.7/1.0.7.16/PipingLoss/_archive/PipingLoss-02/_archive/MaxRelCapLiquid.clc-03
2004-Dec-13 10:28:20 238 bytes prism/private/wslib/calc-lib/1.0.7/1.0.7.16/Post
2004-Mar-22 12:12:22 19426 bytes prism/private/wslib/calc-lib/1.0.7/1.0.7.16/Post/MaxRelCap.clc
2004-Mar-29 14:10:40 10006 bytes prism/private/wslib/calc-lib/1.0.7/1.0.7.16/Post/MaxRelCapIter.clc
2003-Dec-15 13:00:56 1800 bytes prism/private/wslib/calc-lib/1.0.7/1.0.7.16/Post/NoiseLevel.clc
2003-Oct-10 14:17:08 2041 bytes prism/private/wslib/calc-lib/1.0.7/1.0.7.16/Post/ReactionForce.clc
2004-Mar-20 14:48:46 1491 bytes prism/private/wslib/calc-lib/1.0.7/1.0.7.16/Post/ReactionForceVapor.clc
2004-Dec-13 10:28:20 306 bytes prism/private/wslib/calc-lib/1.0.7/1.0.7.16/Pressure
2004-Feb-27 19:05:32 2211 bytes prism/private/wslib/calc-lib/1.0.7/1.0.7.16/Pressure/BackPressure.clc
2004-Feb-27 19:14:28 2058 bytes prism/private/wslib/calc-lib/1.0.7/1.0.7.16/Pressure/ColdDiffTestPressure.clc
2004-Mar-08 13:16:44 5216 bytes prism/private/wslib/calc-lib/1.0.7/1.0.7.16/Pressure/MRCPOverPRelief.clc
2004-Feb-15 20:59:08 1126 bytes prism/private/wslib/calc-lib/1.0.7/1.0.7.16/Pressure/PAtm.clc
2004-Mar-18 11:31:24 708 bytes prism/private/wslib/calc-lib/1.0.7/1.0.7.16/Pressure/PDelta.clc
2004-Mar-08 13:19:30 12441 bytes prism/private/wslib/calc-lib/1.0.7/1.0.7.16/Pressure/POverPRelief.clc
2004-Feb-27 20:39:24 2957 bytes prism/private/wslib/calc-lib/1.0.7/1.0.7.16/Pressure/PressureChecks.clc
2004-Dec-13 10:28:20 102 bytes prism/private/wslib/calc-lib/1.0.7/1.0.7.16/Steam
2004-Mar-29 14:10:14 947 bytes prism/private/wslib/calc-lib/1.0.7/1.0.7.16/Steam/Steam.clc
2004-Dec-13 10:28:20 170 bytes prism/private/wslib/calc-lib/1.0.7/1.0.7.16/Tanks
2003-Oct-10 14:17:08 4785 bytes prism/private/wslib/calc-lib/1.0.7/1.0.7.16/Tanks/FireVaporGen.clc
2003-Oct-10 14:17:08 5871 bytes prism/private/wslib/calc-lib/1.0.7/1.0.7.16/Tanks/PumpInLiquidThermal.clc
2004-May-20 10:30:44 3322 bytes prism/private/wslib/calc-lib/1.0.7/1.0.7.16/Tanks/PumpOutLiquidThermal.clc
2004-May-20 10:44:18 9267 bytes prism/private/wslib/calc-lib/1.0.7/1.0.7.16/TubeRuptureLiquid.clc
2004-May-20 10:44:34 8547 bytes prism/private/wslib/calc-lib/1.0.7/1.0.7.16/TubeRuptureVapor.clc
2004-Mar-08 13:53:48 5794 bytes prism/private/wslib/calc-lib/1.0.7/1.0.7.16/UserSpecifiedLiquid.clc
2004-Mar-08 13:54:54 4594 bytes prism/private/wslib/calc-lib/1.0.7/1.0.7.16/UserSpecifiedSteam.clc
2004-Mar-08 13:55:32 4950 bytes prism/private/wslib/calc-lib/1.0.7/1.0.7.16/UserSpecifiedVapor.clc
2004-Dec-13 10:28:20 646 bytes prism/private/wslib/calc-lib/1.0.7/1.0.7.16/Util
2003-Nov-11 18:36:28 605 bytes prism/private/wslib/calc-lib/1.0.7/1.0.7.16/Util/AreaAdequateChecks.clc
2003-Oct-29 14:25:16 786 bytes prism/private/wslib/calc-lib/1.0.7/1.0.7.16/Util/AreaChecks.clc
2004-Mar-08 13:21:22 3717 bytes prism/private/wslib/calc-lib/1.0.7/1.0.7.16/Util/CriticalFlow.clc
2004-Mar-08 13:39:08 1109 bytes prism/private/wslib/calc-lib/1.0.7/1.0.7.16/Util/CriticalTubeFlow.clc
2003-Oct-29 14:33:46 4252 bytes prism/private/wslib/calc-lib/1.0.7/1.0.7.16/Util/Kb.clc
2004-Mar-12 11:53:32 1555 bytes prism/private/wslib/calc-lib/1.0.7/1.0.7.16/Util/KbpLiquid.clc
2004-Mar-08 13:21:56 1818 bytes prism/private/wslib/calc-lib/1.0.7/1.0.7.16/Util/KbpVapor.clc
2004-Mar-08 13:22:24 1125 bytes prism/private/wslib/calc-lib/1.0.7/1.0.7.16/Util/Kn.clc
2004-Mar-29 14:08:48 1380 bytes prism/private/wslib/calc-lib/1.0.7/1.0.7.16/Util/Ksh.clc
2004-Mar-08 13:22:58 10934 bytes prism/private/wslib/calc-lib/1.0.7/1.0.7.16/Util/Kv.clc
2004-Mar-30 16:22:28 4328 bytes prism/private/wslib/calc-lib/1.0.7/1.0.7.16/Util/Kw.clc
2003-Oct-29 14:42:34 5958 bytes prism/private/wslib/calc-lib/1.0.7/1.0.7.16/Util/ProtectedData.clc
2003-Dec-29 20:28:54 14082 bytes prism/private/wslib/calc-lib/1.0.7/1.0.7.16/Util/ProtectedDataVessel.clc 2003-Nov-05 21:13:24 16799 bytes prism/private/wslib/calc-lib/1.0.7/1.0.7.16/Util/ProtectingData.clc
2004-Mar-08 13:23:52 2976 bytes prism/private/wslib/calc-lib/1.0.7/1.0.7.16/Util/ReqSizingCode.clc
2003-Oct-10 14:17:08 1693 bytes prism/private/wslib/calc-lib/1.0.7/1.0.7.16/Util/ReqValveType.clc
2004-May-20 10:34:54 1533 bytes prism/private/wslib/calc-lib/1.0.7/1.0.7.16/Util/VaporCapCreditCnvrt.clc
2004-Dec-13 10:28:20 340 bytes prism/private/wslib/calc-lib/1.0.7/1.0.7.16/Vapor
2004-Feb-19 15:11:06 3797 bytes prism/private/wslib/calc-lib/1.0.7/1.0.7.16/Vapor/ControlValveVaporFlow.clc
2004-Feb-27 21:32:30 8326 bytes prism/private/wslib/calc-lib/1.0.7/1.0.7.16/Vapor/FireVaporCapacity.clc
2004-May-20 10:46:50 1185 bytes prism/private/wslib/calc-lib/1.0.7/1.0.7.16/Vapor/TubeRuptureVaporFlowCrit.clc
2004-May-20 10:46:58 881 bytes prism/private/wslib/calc-lib/1.0.7/1.0.7.16/Vapor/TubeRuptureVaporFlowSub.clc
2004-May-20 10:36:52 2087 bytes prism/private/wslib/calc-lib/1.0.7/1.0.7.16/Vapor/VaporMass.clc
2004-Feb-27 21:19:16 1725 bytes prism/private/wslib/calc-lib/1.0.7/1.0.7.16/Vapor/VaporProcessProps.clc
2003-Oct-22 21:03:52 6898 bytes prism/private/wslib/calc-lib/1.0.7/1.0.7.16/Vapor/VaporProps.clc
2004-Mar-08 13:24:42 2073 bytes prism/private/wslib/calc-lib/1.0.7/1.0.7.16/Vapor/VaporVol.clc
2004-Dec-13 10:28:20 918 bytes prism/private/wslib/calc-lib/1.0.7/1.0.7.17
2004-Mar-12 16:08:46 12288 bytes prism/private/wslib/calc-lib/1.0.7/1.0.7.17/.swp
2004-Feb-19 11:43:02 5919 bytes prism/private/wslib/calc-lib/1.0.7/1.0.7.17/ControlValveLiquid.clc
2004-Mar-08 13:46:52 5722 bytes prism/private/wslib/calc-lib/1.0.7/1.0.7.17/ControlValveVapor.clc
2004-Dec-13 10:28:20 306 bytes prism/private/wslib/calc-lib/1.0.7/1.0.7.17/Device
2004-Jun-22 14:43:38 6127 bytes prism/private/wslib/calc-lib/1.0.7/1.0.7.17/Device/PRVDeviceData.clc
2003-Oct-10 14:17:08 3251 bytes prism/private/wslib/calc-lib/1.0.7/1.0.7.17/Device/PipeDeviceData.clc
2004-May-19 17:05:12 9547 bytes prism/private/wslib/calc-lib/1.0.7/1.0.7.17/Device/RDDeviceData.clc
2004-May-19 17:05:20 10676 bytes prism/private/wslib/calc-lib/1.0.7/1.0.7.17/Device/TVDeviceData.clc
2004-Jun-10 13:54:22 6637 bytes prism/private/wslib/calc-lib/1.0.7/1.0.7.17/Device/TankDeviceData.clc
2003-Oct-10 14:17:08 2672 bytes prism/private/wslib/calc-lib/1.0.7/1.0.7.17/Device/TurbineStmDeviceData.clc
2003-Oct-29 14:54:00 2665 bytes prism/private/wslib/calc-lib/1.0.7/1.0.7.17/Device/Vessel.clc
2004-Jun-14 16:00:14 5035 bytes prism/private/wslib/calc-lib/1.0.7/1.0.7.17/FireGasExpansion.clc
2004-Jun-09 10:21:08 5645 bytes prism/private/wslib/calc-lib/1.0.7/1.0.7.17/FireVaporGeneration.clc
2004-Dec-13 10:28:20 272 bytes prism/private/wslib/calc-lib/1.0.7/1.0.7.17/Fitting
2003-Oct-10 14:17:08 5636 bytes prism/private/wslib/calc-lib/1.0.7/1.0.7.17/Fitting/ExpandingFitting.clc
2003-Oct-10 14:17:08 4149 bytes prism/private/wslib/calc-lib/1.0.7/1.0.7.17/Fitting/ExpandingTeeSide.clc
2003-Oct-10 14:17:08 4153 bytes prism/private/wslib/calc-lib/1.0.7/1.0.7.17/Fitting/Pipe.clc
2003-Oct-10 14:17:08 5741 bytes prism/private/wslib/calc-lib/1.0.7/1.0.7.17/Fitting/ReducingFitting.clc
2003-Oct-10 14:17:08 4176 bytes prism/private/wslib/calc-lib/1.0.7/1.0.7.17/Fitting/ReducingTeeSide.clc
2003-Oct-10 14:17:08 4128 bytes prism/private/wslib/calc-lib/1.0.7/1.0.7.17/Fitting/StandardFitting.clc
2004-Mar-08 13:42:24 6243 bytes prism/private/wslib/calc-lib/1.0.7/1.0.7.17/GivenFlowLiquid.clc
2004-Jun-15 20:52:48 5223 bytes prism/private/wslib/calc-lib/1.0.7/1.0.7.17/GivenFlowSteam.clc
2004-Jun-16 16:25:54 6701 bytes prism/private/wslib/calc-lib/1.0.7/1.0.7.17/GivenFlowVapor.clc
2004-Dec-13 10:28:20 272 bytes prism/private/wslib/calc-lib/1.0.7/1.0.7.17/Liquid
2004-Feb-15 20:52:26 1191 bytes prism/private/wslib/calc-lib/1.0.7/1.0.7.17/Liquid/ControlValveLiquidFlow.clc
2004-May-20 10:21:36 652 bytes prism/private/wslib/calc-lib/1.0.7/1.0.7.17/Liquid/LiquidExpansionCapacity.clc
2004-Jun-21 11:17:22 5116 bytes prism/private/wslib/calc-lib/1.0.7/1.0.7.17/Liquid/LiquidProps.clc
2004-Jun-21 11:18:56 5254 bytes prism/private/wslib/calc-lib/1.0.7/1.0.7.17/Liquid/LiquidVol.clc
2004-May-20 10:47:44 822 bytes prism/private/wslib/calc-lib/1.0.7/1.0.7.17/Liquid/TubeRuptureLiquidMassFlow.clc
2004-May-20 10:47:56 830 bytes prism/private/wslib/calc-lib/1.0.7/1.0.7.17/Liquid/TubeRuptureLiquidVolFlow.clc
2004-May-20 10:21:56 5516 bytes prism/private/wslib/calc-lib/1.0.7/1.0.7.17/LiquidExpansion.clc
2004-Mar-08 13:48:48 3018 bytes prism/private/wslib/calc-lib/1.0.7/1.0.7.17/NotImplemented.clc
2004-Dec-13 10:28:20 544 bytes prism/private/wslib/calc-lib/1.0.7/1.0.7.17/PipingLoss
2004-Jun-15 11:57:02 4665 bytes prism/private/wslib/calc-lib/1.0.7/1.0.7.17/PipingLoss/CheckInlet.clc
2004-Jun-15 11:57:16 5318 bytes prism/private/wslib/calc-lib/1.0.7/1.0.7.17/PipingLoss/CheckOutlet.clc
2004-Jun-11 10:26:26 637 bytes prism/private/wslib/calc-lib/1.0.7/1.0.7.17/PipingLoss/HDelta.clc
2004-Jun-22 11:24:02 29507 bytes prism/private/wslib/calc-lib/1.0.7/1.0.7.17/PipingLoss/Liquid.clc
2004-Jun-22 11:24:14 2195 bytes prism/private/wslib/calc-lib/1.0.7/1.0.7.17/PipingLoss/LiquidDrop.clc
2004-Jun-22 11:41:32 16234 bytes prism/private/wslib/calc-lib/1.0.7/1.0.7.17/PipingLoss/MaxRelCapLiquid.clc
2004-Jun-21 22:02:46 15449 bytes prism/private/wslib/calc-lib/1.0.7/1.0.7.17/PipingLoss/MaxRelCapSteam.clc
2004-Jun-21 22:03:20 16471 bytes prism/private/wslib/calc-lib/1.0.7/1.0.7.17/PipingLoss/MaxRelCapVapor.clc
2004-May-19 17:44:18 9733 bytes prism/private/wslib/calc-lib/1.0.7/1.0.7.17/PipingLoss/NotImplemented.clc
2004-Jun-21 11:14:54 16887 bytes prism/private/wslib/calc-lib/1.0.7/1.0.7.17/PipingLoss/PipingLossInit.clc
2004-Jun-22 13:08:56 34925 bytes prism/private/wslib/calc-lib/1.0.7/1.0.7.17/PipingLoss/Steam.clc
2004-Jun-22 11:24:54 39176 bytes prism/private/wslib/calc-lib/1.0.7/1.0.7.17/PipingLoss/Vapor.clc
2004-Jun-22 11:25:02 2501 bytes prism/private/wslib/calc-lib/1.0.7/1.0.7.17/PipingLoss/VaporDropIn.clc
2004-Jun-22 11:25:10 4999 bytes prism/private/wslib/calc-lib/1.0.7/1.0.7.17/PipingLoss/VaporDropOut.clc 2004-Dec-13 10:28:20 238 bytes prism/private/wslib/calc-lib/1.0.7/1.0.7.17/Post
2004-Jun-21 21:34:24 11730 bytes prism/private/wslib/calc-lib/1.0.7/1.0.7.17/Post/AcousticVibration.clc
2004-Jun-21 11:19:34 1812 bytes prism/private/wslib/calc-lib/1.0.7/1.0.7.17/Post/NoiseLevel.clc
2004-Jun-15 12:01:56 2065 bytes prism/private/wslib/calc-lib/1.0.7/1.0.7.17/Post/ReactionForce.clc
2004-Jun-22 13:06:32 1575 bytes prism/private/wslib/calc-lib/1.0.7/1.0.7.17/Post/ReactionForceSteam.clc
2004-Jun-15 12:02:44 1503 bytes prism/private/wslib/calc-lib/1.0.7/1.0.7.17/Post/ReactionForceVapor.clc
2004-Dec-13 10:28:20 374 bytes prism/private/wslib/calc-lib/1.0.7/1.0.7.17/Pressure
2004-Jun-04 11:58:24 1514 bytes prism/private/wslib/calc-lib/1.0.7/1.0.7.17/Pressure/BackPressure.clc
2004-Jun-21 11:20:40 2461 bytes prism/private/wslib/calc-lib/1.0.7/1.0.7.17/Pressure/BackPressureCheck.clc
2004-Feb-27 19:14:28 2058 bytes prism/private/wslib/calc-lib/1.0.7/1.0.7.17/Pressure/ColdDiffTestPressure.clc
2004-Jun-21 11:22:46 5219 bytes prism/private/wslib/calc-lib/1.0.7/1.0.7.17/Pressure/MRCPOverPRelief.clc
2004-Jun-15 10:24:58 1150 bytes prism/private/wslib/calc-lib/1.0.7/1.0.7.17/Pressure/PAtm.clc
2004-Mar-18 11:31:24 708 bytes prism/private/wslib/calc-lib/1.0.7/1.0.7.17/Pressure/PDelta.clc
2004-Jun-21 11:50:46 12966 bytes prism/private/wslib/calc-lib/1.0.7/1.0.7.17/Pressure/POverPRelief.clc
2004-Jun-21 16:05:12 2957 bytes prism/private/wslib/calc-lib/1.0.7/1.0.7.17/Pressure/PressureChecks.clc
2004-Jun-14 13:23:06 3515 bytes prism/private/wslib/calc-lib/1.0.7/1.0.7.17/Pressure/PressureChecksTank.clc
2004-Dec-13 10:28:20 170 bytes prism/private/wslib/calc-lib/1.0.7/1.0.7.17/Steam
2004-Mar-29 14:10:14 947 bytes prism/private/wslib/calc-lib/1.0.7/1.0.7.17/Steam/Steam.clc
2004-Jun-15 20:22:40 929 bytes prism/private/wslib/calc-lib/1.0.7/1.0.7.17/Steam/SteamProps.clc
2004-Jun-15 20:18:28 6898 bytes prism/private/wslib/calc-lib/1.0.7/1.0.7.17/Steam/SteamProps.clc-01
2004-Dec-13 10:28:20 170 bytes prism/private/wslib/calc-lib/1.0.7/1.0.7.17/Tanks
2004-Jun-14 14:15:34 3284 bytes prism/private/wslib/calc-lib/1.0.7/1.0.7.17/Tanks/FireVaporGen.clc
2004-Jun-14 14:15:00 6290 bytes prism/private/wslib/calc-lib/1.0.7/1.0.7.17/Tanks/PumpInLiquidThermal.clc
2004-Jun-14 14:15:38 3593 bytes prism/private/wslib/calc-lib/1.0.7/1.0.7.17/Tanks/PumpOutLiquidThermal.clc
2004-Jun-11 10:30:48 9267 bytes prism/private/wslib/calc-lib/1.0.7/1.0.7.17/TubeRuptureLiquid.clc
2004-Jun-11 10:30:54 8547 bytes prism/private/wslib/calc-lib/1.0.7/1.0.7.17/TubeRuptureVapor.clc
2004-Mar-08 13:53:48 5794 bytes prism/private/wslib/calc-lib/1.0.7/1.0.7.17/UserSpecifiedLiquid.clc
2004-Mar-08 13:54:54 4594 bytes prism/private/wslib/calc-lib/1.0.7/1.0.7.17/UserSpecifiedSteam.clc
2004-Jun-16 16:26:10 5455 bytes prism/private/wslib/calc-lib/1.0.7/1.0.7.17/UserSpecifiedVapor.clc
2004-Dec-13 10:28:20 748 bytes prism/private/wslib/calc-lib/1.0.7/1.0.7.17/Util
2003-Nov-11 18:36:28 605 bytes prism/private/wslib/calc-lib/1.0.7/1.0.7.17/Util/AreaAdequateChecks.clc
2003-Oct-29 14:25:16 786 bytes prism/private/wslib/calc-lib/1.0.7/1.0.7.17/Util/AreaChecks.clc
2004-Jun-15 12:04:20 3729 bytes prism/private/wslib/calc-lib/1.0.7/1.0.7.17/Util/CriticalFlow.clc
2004-Mar-08 13:39:08 1109 bytes prism/private/wslib/calc-lib/1.0.7/1.0.7.17/Util/CriticalTubeFlow.clc
2004-Jun-21 11:51:54 4252 bytes prism/private/wslib/calc-lib/1.0.7/1.0.7.17/Util/Kb.clc
2004-Mar-12 11:53:32 1555 bytes prism/private/wslib/calc-lib/1.0.7/1.0.7.17/Util/KbpLiquid.clc
2004-Mar-08 13:21:56 1818 bytes prism/private/wslib/calc-lib/1.0.7/1.0.7.17/Util/KbpVapor.clc
2004-Mar-08 13:22:24 1125 bytes prism/private/wslib/calc-lib/1.0.7/1.0.7.17/Util/Kn.clc
2004-Mar-29 14:08:48 1380 bytes prism/private/wslib/calc-lib/1.0.7/1.0.7.17/Util/Ksh.clc
2004-Jun-21 16:06:02 10934 bytes prism/private/wslib/calc-lib/1.0.7/1.0.7.17/Util/Kv.clc
2004-Jun-21 11:54:28 4328 bytes prism/private/wslib/calc-lib/1.0.7/1.0.7.17/Util/Kw.clc
2004-Jun-21 16:06:38 5994 bytes prism/private/wslib/calc-lib/1.0.7/1.0.7.17/Util/ProtectedData.clc
2004-Jun-11 13:01:42 14617 bytes prism/private/wslib/calc-lib/1.0.7/1.0.7.17/Util/ProtectedDataTank.clc
2004-Jun-21 16:14:26 14214 bytes prism/private/wslib/calc-lib/1.0.7/1.0.7.17/Util/ProtectedDataVessel.clc
2004-Jun-21 16:15:20 16895 bytes prism/private/wslib/calc-lib/1.0.7/1.0.7.17/Util/ProtectingData.clc
2004-Jun-14 13:08:42 3321 bytes prism/private/wslib/calc-lib/1.0.7/1.0.7.17/Util/ProtectingDataTV.clc
2004-Jun-21 16:10:24 2976 bytes prism/private/wslib/calc-lib/1.0.7/1.0.7.17/Util/ReqSizingCode.clc
2004-Jun-21 16:11:04 1022 bytes prism/private/wslib/calc-lib/1.0.7/1.0.7.17/Util/ReqValveType.clc
2004-May-20 10:34:54 1533 bytes prism/private/wslib/calc-lib/1.0.7/1.0.7.17/Util/VaporCapCreditCnvrt.clc
2004-Jun-07 14:44:42 645 bytes prism/private/wslib/calc-lib/1.0.7/1.0.7.17/Util/VentAdequateChecks.clc
2004-Dec-13 10:28:20 374 bytes prism/private/wslib/calc-lib/1.0.7/1.0.7.17/Vapor
2004-Jun-15 10:26:10 3951 bytes prism/private/wslib/calc-lib/1.0.7/1.0.7.17/Vapor/ControlValveVaporFlow.clc
2004-Jun-15 13:54:16 2623 bytes prism/private/wslib/calc-lib/1.0.7/1.0.7.17/Vapor/FGEVaporMass.clc
2004-Jun-15 10:26:16 8338 bytes prism/private/wslib/calc-lib/1.0.7/1.0.7.17/Vapor/FireVaporCapacity.clc
2004-May-20 10:46:50 1185 bytes prism/private/wslib/calc-lib/1.0.7/1.0.7.17/Vapor/TubeRuptureVaporFlowCrit.clc
2004-May-20 10:46:58 881 bytes prism/private/wslib/calc-lib/1.0.7/1.0.7.17/Vapor/TubeRuptureVaporFlowSub.clc
2004-Jun-15 10:26:28 2099 bytes prism/private/wslib/calc-lib/1.0.7/1.0.7.17/Vapor/VaporMass.clc
2004-Feb-27 21:19:16 1725 bytes prism/private/wslib/calc-lib/1.0.7/1.0.7.17/Vapor/VaporProcessProps.clc
2004-Jun-21 16:14:00 6898 bytes prism/private/wslib/calc-lib/1.0.7/1.0.7.17/Vapor/VaporProps.clc
2004-Jun-15 10:27:02 2085 bytes prism/private/wslib/calc-lib/1.0.7/1.0.7.17/Vapor/VaporVol.clc
2004-Dec-13 10:28:21 918 bytes prism/private/wslib/calc-lib/1.0.7/1.0.7.18

2004-Mar-12 16:08:46 12288 bytes prism/private/wslib/calc-lib/1.0.7/1.0.7.18/.swp
2004-Jul-07 11:48:46 6212 bytes prism/private/wslib/calc-lib/1.0.7/1.0.7.18/ControlValveLiquid.clc
2004-Jul-07 11:48:50 6033 bytes prism/private/wslib/calc-lib/1.0.7/1.0.7.18/ControlValveVapor.clc
2004-Dec-13 10:28:20 306 bytes prism/private/wslib/calc-lib/1.0.7/1.0.7.18/Device
2004-Jun-22 14:43:38 6127 bytes prism/private/wslib/calc-lib/1.0.7/1.0.7.18/Device/PRVDeviceData.clc
2003-Oct-10 14:17:08 3251 bytes prism/private/wslib/calc-lib/1.0.7/1.0.7.18/Device/PipeDeviceData.clc
2004-May-19 17:05:12 9547 bytes prism/private/wslib/calc-lib/1.0.7/1.0.7.18/Device/RDDeviceData.clc
2004-May-19 17:05:20 10676 bytes prism/private/wslib/calc-lib/1.0.7/1.0.7.18/Device/TVDeviceData.clc
2004-Jun-10 13:54:22 6637 bytes prism/private/wslib/calc-lib/1.0.7/1.0.7.18/Device/TankDeviceData.clc
2003-Oct-10 14:17:08 2672 bytes prism/private/wslib/calc-lib/1.0.7/1.0.7.18/Device/TurbineStmDeviceData.clc
2003-Oct-29 14:54:00 2665 bytes prism/private/wslib/calc-lib/1.0.7/1.0.7.18/Device/Vessel.clc
2004-Jul-07 11:48:54 6436 bytes prism/private/wslib/calc-lib/1.0.7/1.0.7.18/FireGasExpansion.clc
2004-Jul-07 11:48:58 5956 bytes prism/private/wslib/calc-lib/1.0.7/1.0.7.18/FireVaporGeneration.clc
2004-Dec-13 10:28:20 306 bytes prism/private/wslib/calc-lib/1.0.7/1.0.7.18/Fitting
2003-Oct-10 14:17:08 5636 bytes prism/private/wslib/calc-lib/1.0.7/1.0.7.18/Fitting/ExpandingFitting.clc
2003-Oct-10 14:17:08 4149 bytes prism/private/wslib/calc-lib/1.0.7/1.0.7.18/Fitting/ExpandingTeeSide.clc
2003-Oct-10 14:17:08 4153 bytes prism/private/wslib/calc-lib/1.0.7/1.0.7.18/Fitting/Pipe.clc
2004-Jul-02 16:58:00 5741 bytes prism/private/wslib/calc-lib/1.0.7/1.0.7.18/Fitting/ReducingFitting.clc
2003-Oct-10 14:17:08 4176 bytes prism/private/wslib/calc-lib/1.0.7/1.0.7.18/Fitting/ReducingTeeSide.clc
2003-Oct-10 14:17:08 4128 bytes prism/private/wslib/calc-lib/1.0.7/1.0.7.18/Fitting/StandardFitting.clc
2004-Jul-02 16:57:22 5741 bytes prism/private/wslib/calc-lib/1.0.7/1.0.7.18/Fitting/junk1
2004-Jul-07 11:49:02 6533 bytes prism/private/wslib/calc-lib/1.0.7/1.0.7.18/GivenFlowLiquid.clc
2004-Jul-07 11:49:04 5514 bytes prism/private/wslib/calc-lib/1.0.7/1.0.7.18/GivenFlowSteam.clc
2004-Jul-07 11:48:30 7053 bytes prism/private/wslib/calc-lib/1.0.7/1.0.7.18/GivenFlowVapor.clc
2004-Dec-13 10:28:20 272 bytes prism/private/wslib/calc-lib/1.0.7/1.0.7.18/Liquid
2004-Feb-15 20:52:26 1191 bytes prism/private/wslib/calc-lib/1.0.7/1.0.7.18/Liquid/ControlValveLiquidFlow.clc
2004-May-20 10:21:36 652 bytes prism/private/wslib/calc-lib/1.0.7/1.0.7.18/Liquid/LiquidExpansionCapacity.clc
2004-Jun-21 11:17:22 5116 bytes prism/private/wslib/calc-lib/1.0.7/1.0.7.18/Liquid/LiquidProps.clc
2004-Jul-07 13:46:44 5132 bytes prism/private/wslib/calc-lib/1.0.7/1.0.7.18/Liquid/LiquidVol.clc
2004-May-20 10:47:44 822 bytes prism/private/wslib/calc-lib/1.0.7/1.0.7.18/Liquid/TubeRuptureLiquidMassFlow.clc
2004-May-20 10:47:56 830 bytes prism/private/wslib/calc-lib/1.0.7/1.0.7.18/Liquid/TubeRuptureLiquidVolFlow.clc
2004-Jul-07 11:49:22 5806 bytes prism/private/wslib/calc-lib/1.0.7/1.0.7.18/LiquidExpansion.clc
2004-Jul-06 21:17:50 3251 bytes prism/private/wslib/calc-lib/1.0.7/1.0.7.18/NotImplemented.clc
2004-Dec-13 10:28:20 544 bytes prism/private/wslib/calc-lib/1.0.7/1.0.7.18/PipingLoss
2004-Jun-15 11:57:02 4665 bytes prism/private/wslib/calc-lib/1.0.7/1.0.7.18/PipingLoss/CheckInlet.clc
2004-Jun-15 11:57:16 5318 bytes prism/private/wslib/calc-lib/1.0.7/1.0.7.18/PipingLoss/CheckOutlet.clc
2004-Jun-11 10:26:26 637 bytes prism/private/wslib/calc-lib/1.0.7/1.0.7.18/PipingLoss/HDelta.clc
2004-Jul-13 21:47:56 29856 bytes prism/private/wslib/calc-lib/1.0.7/1.0.7.18/PipingLoss/Liquid.clc
2004-Jun-22 11:24:14 2195 bytes prism/private/wslib/calc-lib/1.0.7/1.0.7.18/PipingLoss/LiquidDrop.clc
2004-Jul-07 13:46:52 16328 bytes prism/private/wslib/calc-lib/1.0.7/1.0.7.18/PipingLoss/MaxRelCapLiquid.clc
2004-Jun-21 22:02:46 15449 bytes prism/private/wslib/calc-lib/1.0.7/1.0.7.18/PipingLoss/MaxRelCapSteam.clc
2004-Jun-21 22:03:20 16471 bytes prism/private/wslib/calc-lib/1.0.7/1.0.7.18/PipingLoss/MaxRelCapVapor.clc
2004-May-19 17:44:18 9733 bytes prism/private/wslib/calc-lib/1.0.7/1.0.7.18/PipingLoss/NotImplemented.clc
2004-Jul-08 16:28:50 17207 bytes prism/private/wslib/calc-lib/1.0.7/1.0.7.18/PipingLoss/PipingLossInit.clc
2004-Jul-13 21:47:26 35217 bytes prism/private/wslib/calc-lib/1.0.7/1.0.7.18/PipingLoss/Steam.clc
2004-Jul-13 21:47:16 39463 bytes prism/private/wslib/calc-lib/1.0.7/1.0.7.18/PipingLoss/Vapor.clc
2004-Jun-22 11:25:02 2501 bytes prism/private/wslib/calc-lib/1.0.7/1.0.7.18/PipingLoss/VaporDropIn.clc
2004-Jun-22 11:25:10 4999 bytes prism/private/wslib/calc-lib/1.0.7/1.0.7.18/PipingLoss/VaporDropOut.clc
2004-Dec-13 10:28:20 204 bytes prism/private/wslib/calc-lib/1.0.7/1.0.7.18/Post
2004-Jun-21 21:34:24 11730 bytes prism/private/wslib/calc-lib/1.0.7/1.0.7.18/Post/AcousticVibration.clc
2004-Jun-21 11:19:34 1812 bytes prism/private/wslib/calc-lib/1.0.7/1.0.7.18/Post/NoiseLevel.clc
2004-Jun-24 10:44:26 1575 bytes prism/private/wslib/calc-lib/1.0.7/1.0.7.18/Post/ReactionForceSteam.clc
2004-Jun-15 12:02:44 1503 bytes prism/private/wslib/calc-lib/1.0.7/1.0.7.18/Post/ReactionForceVapor.clc
2004-Dec-13 10:28:20 408 bytes prism/private/wslib/calc-lib/1.0.7/1.0.7.18/Pressure
2004-Jun-04 11:58:24 1514 bytes prism/private/wslib/calc-lib/1.0.7/1.0.7.18/Pressure/BackPressure.clc
2004-Jun-21 11:20:40 2461 bytes prism/private/wslib/calc-lib/1.0.7/1.0.7.18/Pressure/BackPressureCheck.clc
2004-Feb-27 19:14:28 2058 bytes prism/private/wslib/calc-lib/1.0.7/1.0.7.18/Pressure/ColdDiffTestPressure.clc
2004-Jul-07 10:35:00 6605 bytes prism/private/wslib/calc-lib/1.0.7/1.0.7.18/Pressure/MRCPOverPRelief.clc
2004-Jun-15 10:24:58 1150 bytes prism/private/wslib/calc-lib/1.0.7/1.0.7.18/Pressure/PAtm.clc
2004-Mar-18 11:31:24 708 bytes prism/private/wslib/calc-lib/1.0.7/1.0.7.18/Pressure/PDelta.clc
2004-Jul-07 10:35:20 15157 bytes prism/private/wslib/calc-lib/1.0.7/1.0.7.18/Pressure/POverPRelief.clc 2004-Jun-21 16:05:12 2957 bytes prism/private/wslib/calc-lib/1.0.7/1.0.7.18/Pressure/PressureChecks.clc
2004-Jun-24 10:37:16 3515 bytes prism/private/wslib/calc-lib/1.0.7/1.0.7.18/Pressure/PressureChecksTank.clc
2004-Jul-08 17:07:12 852 bytes prism/private/wslib/calc-lib/1.0.7/1.0.7.18/Pressure/notes.txt
2004-Dec-13 10:28:20 170 bytes prism/private/wslib/calc-lib/1.0.7/1.0.7.18/Steam
2004-Mar-29 14:10:14 947 bytes prism/private/wslib/calc-lib/1.0.7/1.0.7.18/Steam/Steam.clc
2004-Jun-15 20:22:40 929 bytes prism/private/wslib/calc-lib/1.0.7/1.0.7.18/Steam/SteamProps.clc
2004-Jun-15 20:18:28 6898 bytes prism/private/wslib/calc-lib/1.0.7/1.0.7.18/Steam/SteamProps.clc-01
2004-Dec-13 10:28:20 170 bytes prism/private/wslib/calc-lib/1.0.7/1.0.7.18/Tanks
2004-Jun-24 10:43:32 3284 bytes prism/private/wslib/calc-lib/1.0.7/1.0.7.18/Tanks/FireVaporGen.clc
2004-Jun-14 14:15:00 6290 bytes prism/private/wslib/calc-lib/1.0.7/1.0.7.18/Tanks/PumpInLiquidThermal.clc
2004-Jun-24 10:33:10 3593 bytes prism/private/wslib/calc-lib/1.0.7/1.0.7.18/Tanks/PumpOutLiquidThermal.clc
2004-Jul-07 11:49:36 9556 bytes prism/private/wslib/calc-lib/1.0.7/1.0.7.18/TubeRuptureLiquid.clc
2004-Jul-07 11:49:42 8859 bytes prism/private/wslib/calc-lib/1.0.7/1.0.7.18/TubeRuptureVapor.clc
2004-Jul-07 11:49:46 6084 bytes prism/private/wslib/calc-lib/1.0.7/1.0.7.18/UserSpecifiedLiquid.clc
2004-Jul-07 11:49:48 4884 bytes prism/private/wslib/calc-lib/1.0.7/1.0.7.18/UserSpecifiedSteam.clc
2004-Jul-07 11:49:52 5808 bytes prism/private/wslib/calc-lib/1.0.7/1.0.7.18/UserSpecifiedVapor.clc
2004-Dec-13 10:28:21 816 bytes prism/private/wslib/calc-lib/1.0.7/1.0.7.18/Util
2003-Nov-11 18:36:28 605 bytes prism/private/wslib/calc-lib/1.0.7/1.0.7.18/Util/AreaAdequateChecks.clc
2003-Oct-29 14:25:16 786 bytes prism/private/wslib/calc-lib/1.0.7/1.0.7.18/Util/AreaChecks.clc
2004-Jul-07 19:51:26 3431 bytes prism/private/wslib/calc-lib/1.0.7/1.0.7.18/Util/CheckProtectingValves.clc
2004-Jun-15 12:04:20 3729 bytes prism/private/wslib/calc-lib/1.0.7/1.0.7.18/Util/CriticalFlow.clc
2004-Mar-08 13:39:08 1109 bytes prism/private/wslib/calc-lib/1.0.7/1.0.7.18/Util/CriticalTubeFlow.clc
2004-Jul-07 15:18:52 4510 bytes prism/private/wslib/calc-lib/1.0.7/1.0.7.18/Util/Kb.clc
2004-Mar-12 11:53:32 1555 bytes prism/private/wslib/calc-lib/1.0.7/1.0.7.18/Util/KbpLiquid.clc
2004-Mar-08 13:21:56 1818 bytes prism/private/wslib/calc-lib/1.0.7/1.0.7.18/Util/KbpVapor.clc
2004-Mar-08 13:22:24 1125 bytes prism/private/wslib/calc-lib/1.0.7/1.0.7.18/Util/Kn.clc
2004-Mar-29 14:08:48 1380 bytes prism/private/wslib/calc-lib/1.0.7/1.0.7.18/Util/Ksh.clc
2004-Jul-07 15:10:20 10998 bytes prism/private/wslib/calc-lib/1.0.7/1.0.7.18/Util/Kv.clc
2004-Jul-07 15:16:44 4375 bytes prism/private/wslib/calc-lib/1.0.7/1.0.7.18/Util/Kw.clc
2004-Jun-21 16:06:38 5994 bytes prism/private/wslib/calc-lib/1.0.7/1.0.7.18/Util/ProtectedData.clc
2004-Jun-24 10:55:14 14656 bytes prism/private/wslib/calc-lib/1.0.7/1.0.7.18/Util/ProtectedDataTank.clc
2004-Jun-21 16:14:26 14214 bytes prism/private/wslib/calc-lib/1.0.7/1.0.7.18/Util/ProtectedDataVessel.clc
2004-Jun-21 16:15:20 16895 bytes prism/private/wslib/calc-lib/1.0.7/1.0.7.18/Util/ProtectingData.clc
2004-Jun-24 10:55:02 3333 bytes prism/private/wslib/calc-lib/1.0.7/1.0.7.18/Util/ProtectingDataTV.clc
2004-Jul-06 21:08:02 3283 bytes prism/private/wslib/calc-lib/1.0.7/1.0.7.18/Util/ReqSizingCode.clc
2004-Jun-21 16:11:04 1022 bytes prism/private/wslib/calc-lib/1.0.7/1.0.7.18/Util/ReqValveType.clc
2004-Jul-07 13:51:14 510 bytes prism/private/wslib/calc-lib/1.0.7/1.0.7.18/Util/ReynoldsToKu.clc
2004-May-20 10:34:54 1533 bytes prism/private/wslib/calc-lib/1.0.7/1.0.7.18/Util/VaporCapCreditCnvrt.clc
2004-Jun-24 10:46:34 645 bytes prism/private/wslib/calc-lib/1.0.7/1.0.7.18/Util/VentAdequateChecks.clc
2004-Dec-13 10:28:21 408 bytes prism/private/wslib/calc-lib/1.0.7/1.0.7.18/Vapor
2004-Jun-15 10:26:10 3951 bytes prism/private/wslib/calc-lib/1.0.7/1.0.7.18/Vapor/ControlValveVaporFlow.clc
2004-Jun-15 13:54:16 2623 bytes prism/private/wslib/calc-lib/1.0.7/1.0.7.18/Vapor/FGEVaporMass.clc
2004-Jun-23 15:01:10 1610 bytes prism/private/wslib/calc-lib/1.0.7/1.0.7.18/Vapor/FireGasCapacity.clc
2004-Jun-15 10:26:16 8338 bytes prism/private/wslib/calc-lib/1.0.7/1.0.7.18/Vapor/FireVaporCapacity.clc
2004-May-20 10:46:50 1185 bytes prism/private/wslib/calc-lib/1.0.7/1.0.7.18/Vapor/TubeRuptureVaporFlowCrit.clc
2004-May-20 10:46:58 881 bytes prism/private/wslib/calc-lib/1.0.7/1.0.7.18/Vapor/TubeRuptureVaporFlowSub.clc
2004-Jun-15 10:26:28 2099 bytes prism/private/wslib/calc-lib/1.0.7/1.0.7.18/Vapor/VaporMass.clc
2004-Feb-27 21:19:16 1725 bytes prism/private/wslib/calc-lib/1.0.7/1.0.7.18/Vapor/VaporProcessProps.clc
2004-Jul-06 15:36:52 7672 bytes prism/private/wslib/calc-lib/1.0.7/1.0.7.18/Vapor/VaporProps.clc
2004-Jun-15 10:27:02 2085 bytes prism/private/wslib/calc-lib/1.0.7/1.0.7.18/Vapor/VaporVol.clc
2004-Dec-13 10:28:21 918 bytes prism/private/wslib/calc-lib/1.0.7/1.0.7.19
2004-Mar-12 16:08:46 12288 bytes prism/private/wslib/calc-lib/1.0.7/1.0.7.19/.swp
2004-Jul-15 21:58:18 6218 bytes prism/private/wslib/calc-lib/1.0.7/1.0.7.19/ControlValveLiquid.clc
2004-Jul-15 21:58:32 6039 bytes prism/private/wslib/calc-lib/1.0.7/1.0.7.19/ControlValveVapor.clc
2004-Dec-13 10:28:21 306 bytes prism/private/wslib/calc-lib/1.0.7/1.0.7.19/Device
2004-Jun-22 14:43:38 6127 bytes prism/private/wslib/calc-lib/1.0.7/1.0.7.19/Device/PRVDeviceData.clc
2003-Oct-10 14:17:08 3251 bytes prism/private/wslib/calc-lib/1.0.7/1.0.7.19/Device/PipeDeviceData.clc
2004-May-19 17:05:12 9547 bytes prism/private/wslib/calc-lib/1.0.7/1.0.7.19/Device/RDDeviceData.clc
2004-May-19 17:05:20 10676 bytes prism/private/wslib/calc-lib/1.0.7/1.0.7.19/Device/TVDeviceData.clc
2004-Jun-10 13:54:22 6637 bytes prism/private/wslib/calc-lib/1.0.7/1.0.7.19/Device/TankDeviceData.clc
2003-Oct-10 14:17:08 2672 bytes prism/private/wslib/calc-lib/1.0.7/1.0.7.19/Device/TurbineStmDeviceData.clc 2003-Oct-29 14:54:00 2665 bytes prism/private/wslib/calc-lib/1.0.7/1.0.7.19/Device/Vessel.clc
2004-Jul-16 11:22:20 6447 bytes prism/private/wslib/calc-lib/1.0.7/1.0.7.19/FireGasExpansion.clc
2004-Jul-15 21:59:02 5962 bytes prism/private/wslib/calc-lib/1.0.7/1.0.7.19/FireVaporGeneration.clc
2004-Dec-13 10:28:21 306 bytes prism/private/wslib/calc-lib/1.0.7/1.0.7.19/Fitting
2003-Oct-10 14:17:08 5636 bytes prism/private/wslib/calc-lib/1.0.7/1.0.7.19/Fitting/ExpandingFitting.clc
2003-Oct-10 14:17:08 4149 bytes prism/private/wslib/calc-lib/1.0.7/1.0.7.19/Fitting/ExpandingTeeSide.clc
2003-Oct-10 14:17:08 4153 bytes prism/private/wslib/calc-lib/1.0.7/1.0.7.19/Fitting/Pipe.clc
2004-Jul-02 16:58:00 5741 bytes prism/private/wslib/calc-lib/1.0.7/1.0.7.19/Fitting/ReducingFitting.clc
2003-Oct-10 14:17:08 4176 bytes prism/private/wslib/calc-lib/1.0.7/1.0.7.19/Fitting/ReducingTeeSide.clc
2003-Oct-10 14:17:08 4128 bytes prism/private/wslib/calc-lib/1.0.7/1.0.7.19/Fitting/StandardFitting.clc
2004-Jul-02 16:57:22 5741 bytes prism/private/wslib/calc-lib/1.0.7/1.0.7.19/Fitting/junk1
2004-Jul-15 21:59:10 6539 bytes prism/private/wslib/calc-lib/1.0.7/1.0.7.19/GivenFlowLiquid.clc
2004-Jul-15 21:59:22 5520 bytes prism/private/wslib/calc-lib/1.0.7/1.0.7.19/GivenFlowSteam.clc
2004-Jul-15 21:59:34 7059 bytes prism/private/wslib/calc-lib/1.0.7/1.0.7.19/GivenFlowVapor.clc
2004-Dec-13 10:28:21 272 bytes prism/private/wslib/calc-lib/1.0.7/1.0.7.19/Liquid
2004-Feb-15 20:52:26 1191 bytes prism/private/wslib/calc-lib/1.0.7/1.0.7.19/Liquid/ControlValveLiquidFlow.clc
2004-May-20 10:21:36 652 bytes prism/private/wslib/calc-lib/1.0.7/1.0.7.19/Liquid/LiquidExpansionCapacity.clc
2004-Jun-21 11:17:22 5116 bytes prism/private/wslib/calc-lib/1.0.7/1.0.7.19/Liquid/LiquidProps.clc
2004-Jul-07 13:46:44 5132 bytes prism/private/wslib/calc-lib/1.0.7/1.0.7.19/Liquid/LiquidVol.clc
2004-May-20 10:47:44 822 bytes prism/private/wslib/calc-lib/1.0.7/1.0.7.19/Liquid/TubeRuptureLiquidMassFlow.clc
2004-May-20 10:47:56 830 bytes prism/private/wslib/calc-lib/1.0.7/1.0.7.19/Liquid/TubeRuptureLiquidVolFlow.clc
2004-Jul-15 21:59:46 5812 bytes prism/private/wslib/calc-lib/1.0.7/1.0.7.19/LiquidExpansion.clc
2004-Jul-06 21:17:50 3251 bytes prism/private/wslib/calc-lib/1.0.7/1.0.7.19/NotImplemented.clc
2004-Dec-13 10:28:21 544 bytes prism/private/wslib/calc-lib/1.0.7/1.0.7.19/PipingLoss
2004-Jun-15 11:57:02 4665 bytes prism/private/wslib/calc-lib/1.0.7/1.0.7.19/PipingLoss/CheckInlet.clc
2004-Jun-15 11:57:16 5318 bytes prism/private/wslib/calc-lib/1.0.7/1.0.7.19/PipingLoss/CheckOutlet.clc
2004-Jun-11 10:26:26 637 bytes prism/private/wslib/calc-lib/1.0.7/1.0.7.19/PipingLoss/HDelta.clc
2004-Jul-13 21:47:56 29856 bytes prism/private/wslib/calc-lib/1.0.7/1.0.7.19/PipingLoss/Liquid.clc
2004-Jun-22 11:24:14 2195 bytes prism/private/wslib/calc-lib/1.0.7/1.0.7.19/PipingLoss/LiquidDrop.clc
2004-Jul-07 13:46:52 16328 bytes prism/private/wslib/calc-lib/1.0.7/1.0.7.19/PipingLoss/MaxRelCapLiquid.clc
2004-Jun-21 22:02:46 15449 bytes prism/private/wslib/calc-lib/1.0.7/1.0.7.19/PipingLoss/MaxRelCapSteam.clc
2004-Jun-21 22:03:20 16471 bytes prism/private/wslib/calc-lib/1.0.7/1.0.7.19/PipingLoss/MaxRelCapVapor.clc
2004-May-19 17:44:18 9733 bytes prism/private/wslib/calc-lib/1.0.7/1.0.7.19/PipingLoss/NotImplemented.clc
2004-Jul-08 16:28:50 17207 bytes prism/private/wslib/calc-lib/1.0.7/1.0.7.19/PipingLoss/PipingLossInit.clc
2004-Jul-15 22:26:14 35219 bytes prism/private/wslib/calc-lib/1.0.7/1.0.7.19/PipingLoss/Steam.clc
2004-Jul-15 22:25:30 39435 bytes prism/private/wslib/calc-lib/1.0.7/1.0.7.19/PipingLoss/Vapor.clc
2004-Jun-22 11:25:02 2501 bytes prism/private/wslib/calc-lib/1.0.7/1.0.7.19/PipingLoss/VaporDropIn.clc
2004-Jun-22 11:25:10 4999 bytes prism/private/wslib/calc-lib/1.0.7/1.0.7.19/PipingLoss/VaporDropOut.clc
2004-Dec-13 10:28:21 204 bytes prism/private/wslib/calc-lib/1.0.7/1.0.7.19/Post
2004-Jul-15 22:18:44 11722 bytes prism/private/wslib/calc-lib/1.0.7/1.0.7.19/Post/AcousticVibration.clc
2004-Jun-21 11:19:34 1812 bytes prism/private/wslib/calc-lib/1.0.7/1.0.7.19/Post/NoiseLevel.clc
2004-Jun-24 10:44:26 1575 bytes prism/private/wslib/calc-lib/1.0.7/1.0.7.19/Post/ReactionForceSteam.clc
2004-Jun-15 12:02:44 1503 bytes prism/private/wslib/calc-lib/1.0.7/1.0.7.19/Post/ReactionForceVapor.clc
2004-Dec-13 10:28:21 408 bytes prism/private/wslib/calc-lib/1.0.7/1.0.7.19/Pressure
2004-Jun-04 11:58:24 1514 bytes prism/private/wslib/calc-lib/1.0.7/1.0.7.19/Pressure/BackPressure.clc
2004-Jun-21 11:20:40 2461 bytes prism/private/wslib/calc-lib/1.0.7/1.0.7.19/Pressure/BackPressureCheck.clc
2004-Feb-27 19:14:28 2058 bytes prism/private/wslib/calc-lib/1.0.7/1.0.7.19/Pressure/ColdDiffTestPressure.clc
2004-Jul-07 10:35:00 6605 bytes prism/private/wslib/calc-lib/1.0.7/1.0.7.19/Pressure/MRCPOverPRelief.clc
2004-Jun-15 10:24:58 1150 bytes prism/private/wslib/calc-lib/1.0.7/1.0.7.19/Pressure/PAtm.clc
2004-Mar-18 11:31:24 708 bytes prism/private/wslib/calc-lib/1.0.7/1.0.7.19/Pressure/PDelta.clc
2004-Jul-16 07:57:46 15157 bytes prism/private/wslib/calc-lib/1.0.7/1.0.7.19/Pressure/POverPRelief.clc
2004-Jul-15 20:21:40 2670 bytes prism/private/wslib/calc-lib/1.0.7/1.0.7.19/Pressure/PressureChecks.clc
2004-Jun-24 10:37:16 3515 bytes prism/private/wslib/calc-lib/1.0.7/1.0.7.19/Pressure/PressureChecksTank.clc
2004-Jul-08 17:07:12 852 bytes prism/private/wslib/calc-lib/1.0.7/1.0.7.19/Pressure/notes.txt
2004-Dec-13 10:28:21 136 bytes prism/private/wslib/calc-lib/1.0.7/1.0.7.19/Steam
2004-Mar-29 14:10:14 947 bytes prism/private/wslib/calc-lib/1.0.7/1.0.7.19/Steam/Steam.clc
2004-Jun-15 20:22:40 929 bytes prism/private/wslib/calc-lib/1.0.7/1.0.7.19/Steam/SteamProps.clc
2004-Dec-13 10:28:21 272 bytes prism/private/wslib/calc-lib/1.0.7/1.0.7.19/Tanks
2004-Jul-16 11:23:56 3983 bytes prism/private/wslib/calc-lib/1.0.7/1.0.7.19/Tanks/FireVaporGen.clc
2004-Jul-16 16:04:12 4337 bytes prism/private/wslib/calc-lib/1.0.7/1.0.7.19/Tanks/PadFailure.clc
2004-Jul-16 16:08:22 6890 bytes prism/private/wslib/calc-lib/1.0.7/1.0.7.19/Tanks/PumpInLiquidThermal.clc 2004-Jul-16 11:25:32 3888 bytes prism/private/wslib/calc-lib/1.0.7/1.0.7.19/Tanks/PumpOutLiquidThermal.clc
2004-Jul-16 16:08:34 3386 bytes prism/private/wslib/calc-lib/1.0.7/1.0.7.19/Tanks/SteamOut.clc
2004-Jul-16 11:31:06 2997 bytes prism/private/wslib/calc-lib/1.0.7/1.0.7.19/Tanks/TankDraining.clc
2004-Jul-15 21:59:58 9562 bytes prism/private/wslib/calc-lib/1.0.7/1.0.7.19/TubeRuptureLiquid.clc
2004-Jul-15 22:00:06 8865 bytes prism/private/wslib/calc-lib/1.0.7/1.0.7.19/TubeRuptureVapor.clc
2004-Jul-15 22:00:14 6090 bytes prism/private/wslib/calc-lib/1.0.7/1.0.7.19/UserSpecifiedLiquid.clc
2004-Jul-15 22:00:22 4890 bytes prism/private/wslib/calc-lib/1.0.7/1.0.7.19/UserSpecifiedSteam.clc
2004-Jul-15 22:00:28 5814 bytes prism/private/wslib/calc-lib/1.0.7/1.0.7.19/UserSpecifiedVapor.clc
2004-Dec-13 10:28:21 816 bytes prism/private/wslib/calc-lib/1.0.7/1.0.7.19/Util
2003-Nov-11 18:36:28 605 bytes prism/private/wslib/calc-lib/1.0.7/1.0.7.19/Util/AreaAdequateChecks.clc
2003-Oct-29 14:25:16 786 bytes prism/private/wslib/calc-lib/1.0.7/1.0.7.19/Util/AreaChecks.clc
2004-Jul-16 07:58:36 5483 bytes prism/private/wslib/calc-lib/1.0.7/1.0.7.19/Util/CheckProtectingValves.clc
2004-Jun-15 12:04:20 3729 bytes prism/private/wslib/calc-lib/1.0.7/1.0.7.19/Util/CriticalFlow.clc
2004-Mar-08 13:39:08 1109 bytes prism/private/wslib/calc-lib/1.0.7/1.0.7.19/Util/CriticalTubeFlow.clc
2004-Jul-07 15:18:52 4510 bytes prism/private/wslib/calc-lib/1.0.7/1.0.7.19/Util/Kb.clc
2004-Mar-12 11:53:32 1555 bytes prism/private/wslib/calc-lib/1.0.7/1.0.7.19/Util/KbpLiquid.clc
2004-Mar-08 13:21:56 1818 bytes prism/private/wslib/calc-lib/1.0.7/1.0.7.19/Util/KbpVapor.clc
2004-Mar-08 13:22:24 1125 bytes prism/private/wslib/calc-lib/1.0.7/1.0.7.19/Util/Kn.clc
2004-Mar-29 14:08:48 1380 bytes prism/private/wslib/calc-lib/1.0.7/1.0.7.19/Util/Ksh.clc
2004-Jul-07 15:10:20 10998 bytes prism/private/wslib/calc-lib/1.0.7/1.0.7.19/Util/Kv.clc
2004-Jul-07 15:16:44 4375 bytes prism/private/wslib/calc-lib/1.0.7/1.0.7.19/Util/Kw.clc
2004-Jun-21 16:06:38 5994 bytes prism/private/wslib/calc-lib/1.0.7/1.0.7.19/Util/ProtectedData.clc
2004-Jun-24 10:55:14 14656 bytes prism/private/wslib/calc-lib/1.0.7/1.0.7.19/Util/ProtectedDataTank.clc
2004-Jun-21 16:14:26 14214 bytes prism/private/wslib/calc-lib/1.0.7/1.0.7.19/Util/ProtectedDataVessel.clc
2004-Jun-21 16:15:20 16895 bytes prism/private/wslib/calc-lib/1.0.7/1.0.7.19/Util/ProtectingData.clc
2004-Jul-16 16:06:52 3432 bytes prism/private/wslib/calc-lib/1.0.7/1.0.7.19/Util/ProtectingDataTV.clc
2004-Jul-06 21:08:02 3283 bytes prism/private/wslib/calc-lib/1.0.7/1.0.7.19/Util/ReqSizingCode.clc
2004-Jun-21 16:11:04 1022 bytes prism/private/wslib/calc-lib/1.0.7/1.0.7.19/Util/ReqValveType.clc
2004-Jul-07 13:51:14 510 bytes prism/private/wslib/calc-lib/1.0.7/1.0.7.19/Util/ReynoldsToKu.clc
2004-May-20 10:34:54 1533 bytes prism/private/wslib/calc-lib/1.0.7/1.0.7.19/Util/VaporCapCreditCnvrt.clc
2004-Jun-24 10:46:34 645 bytes prism/private/wslib/calc-lib/1.0.7/1.0.7.19/Util/VentAdequateChecks.clc
2004-Dec-13 10:28:21 408 bytes prism/private/wslib/calc-lib/1.0.7/1.0.7.19/Vapor
2004-Jun-15 10:26:10 3951 bytes prism/private/wslib/calc-lib/1.0.7/1.0.7.19/Vapor/ControlValveVaporFlow.clc
2004-Jul-16 11:27:14 2520 bytes prism/private/wslib/calc-lib/1.0.7/1.0.7.19/Vapor/FGEVaporMass.clc
2004-Jun-23 15:01:10 1610 bytes prism/private/wslib/calc-lib/1.0.7/1.0.7.19/Vapor/FireGasCapacity.clc
2004-Jun-15 10:26:16 8338 bytes prism/private/wslib/calc-lib/1.0.7/1.0.7.19/Vapor/FireVaporCapacity.clc
2004-May-20 10:46:50 1185 bytes prism/private/wslib/calc-lib/1.0.7/1.0.7.19/Vapor/TubeRuptureVaporFlowCrit.clc
2004-May-20 10:46:58 881 bytes prism/private/wslib/calc-lib/1.0.7/1.0.7.19/Vapor/TubeRuptureVaporFlowSub.clc
2004-Jun-15 10:26:28 2099 bytes prism/private/wslib/calc-lib/1.0.7/1.0.7.19/Vapor/VaporMass.clc
2004-Feb-27 21:19:16 1725 bytes prism/private/wslib/calc-lib/1.0.7/1.0.7.19/Vapor/VaporProcessProps.clc
2004-Jul-06 15:36:52 7672 bytes prism/private/wslib/calc-lib/1.0.7/1.0.7.19/Vapor/VaporProps.clc
2004-Jun-15 10:27:02 2085 bytes prism/private/wslib/calc-lib/1.0.7/1.0.7.19/Vapor/VaporVol.clc
2004-Dec-13 10:28:21 782 bytes prism/private/wslib/calc-lib/1.0.7/1.0.7.2
2003-Jun-20 13:44:26 5098 bytes prism/private/wslib/calc-lib/1.0.7/1.0.7.2/ControlValveLiquid.clc
2003-Jun-20 13:44:36 4813 bytes prism/private/wslib/calc-lib/1.0.7/1.0.7.2/ControlValveVapor.clc
2004-Dec-13 10:28:21 204 bytes prism/private/wslib/calc-lib/1.0.7/1.0.7.2/Device
2003-Apr-30 13:51:28 4069 bytes prism/private/wslib/calc-lib/1.0.7/1.0.7.2/Device/PRVDeviceData.clc
2003-May-27 16:50:44 3251 bytes prism/private/wslib/calc-lib/1.0.7/1.0.7.2/Device/PipeDeviceData.clc
2003-Feb-03 19:25:52 7591 bytes prism/private/wslib/calc-lib/1.0.7/1.0.7.2/Device/RDDeviceData.clc
2003-May-02 11:01:48 2672 bytes prism/private/wslib/calc-lib/1.0.7/1.0.7.2/Device/TurbineStmDeviceData.clc
2003-Jun-20 13:44:42 5187 bytes prism/private/wslib/calc-lib/1.0.7/1.0.7.2/FireVaporGeneration.clc
2004-Dec-13 10:28:21 272 bytes prism/private/wslib/calc-lib/1.0.7/1.0.7.2/Fitting
2003-Jul-06 22:06:10 3931 bytes prism/private/wslib/calc-lib/1.0.7/1.0.7.2/Fitting/ExpandingFitting.clc
2003-Jul-06 22:06:20 3944 bytes prism/private/wslib/calc-lib/1.0.7/1.0.7.2/Fitting/ExpandingTeeSide.clc
2003-Jul-06 22:06:30 3930 bytes prism/private/wslib/calc-lib/1.0.7/1.0.7.2/Fitting/Pipe.clc
2003-Jul-06 22:06:46 3945 bytes prism/private/wslib/calc-lib/1.0.7/1.0.7.2/Fitting/ReducingFitting.clc
2003-Jul-06 22:07:12 3958 bytes prism/private/wslib/calc-lib/1.0.7/1.0.7.2/Fitting/ReducingTeeSide.clc
2003-Jul-06 22:07:24 3918 bytes prism/private/wslib/calc-lib/1.0.7/1.0.7.2/Fitting/StandardFitting.clc
2003-Jul-07 19:08:40 6035 bytes prism/private/wslib/calc-lib/1.0.7/1.0.7.2/GivenFlowLiquid.clc
2003-Jun-20 13:44:54 4897 bytes prism/private/wslib/calc-lib/1.0.7/1.0.7.2/GivenFlowSteam.clc
2003-Jul-07 19:10:44 5941 bytes prism/private/wslib/calc-lib/1.0.7/1.0.7.2/GivenFlowVapor.clc 2004-Dec-13 10:28:21 170 bytes prism/private/wslib/calc-lib/1.0.7/1.0.7.2/Liquid
2003-Feb-27 15:22:26 939 bytes prism/private/wslib/calc-lib/1.0.7/1.0.7.2/Liquid/ControlValveLiquidFlow.clc
2003-Mar-09 23:14:08 4894 bytes prism/private/wslib/calc-lib/1.0.7/1.0.7.2/Liquid/LiquidProps.clc
2003-Jul-07 23:01:18 4991 bytes prism/private/wslib/calc-lib/1.0.7/1.0.7.2/Liquid/LiquidVol.clc
2003-Jun-20 13:50:20 2880 bytes prism/private/wslib/calc-lib/1.0.7/1.0.7.2/NotImplemented.clc
2003-Jul-07 22:58:06 53838 bytes prism/private/wslib/calc-lib/1.0.7/1.0.7.2/PipingLoss.clc
2003-Jun-23 19:48:14 43562 bytes prism/private/wslib/calc-lib/1.0.7/1.0.7.2/PipingLoss.clc-01
2003-Jul-06 22:03:10 52989 bytes prism/private/wslib/calc-lib/1.0.7/1.0.7.2/PipingLoss.clc-02
2004-Dec-13 10:28:21 170 bytes prism/private/wslib/calc-lib/1.0.7/1.0.7.2/Post
2003-Jul-07 22:58:32 24184 bytes prism/private/wslib/calc-lib/1.0.7/1.0.7.2/Post/MaxRelCap.clc
2003-Jul-07 22:40:02 1800 bytes prism/private/wslib/calc-lib/1.0.7/1.0.7.2/Post/NoiseLevel.clc
2003-Jul-07 22:40:24 2041 bytes prism/private/wslib/calc-lib/1.0.7/1.0.7.2/Post/ReactionForce.clc
2004-Dec-13 10:28:21 374 bytes prism/private/wslib/calc-lib/1.0.7/1.0.7.2/Pressure
2003-Jun-24 13:04:46 1676 bytes prism/private/wslib/calc-lib/1.0.7/1.0.7.2/Pressure/BackPressure.clc
2003-May-31 22:13:28 1384 bytes prism/private/wslib/calc-lib/1.0.7/1.0.7.2/Pressure/ColdDiffTestPressure.clc
2003-Jun-13 10:57:12 4670 bytes prism/private/wslib/calc-lib/1.0.7/1.0.7.2/Pressure/MRCPOverPRelief.clc
2003-Mar-09 23:08:02 1126 bytes prism/private/wslib/calc-lib/1.0.7/1.0.7.2/Pressure/PAtm.clc
2002-Dec-30 17:33:24 399 bytes prism/private/wslib/calc-lib/1.0.7/1.0.7.2/Pressure/PDelta.clc
2003-Jul-09 11:59:38 10468 bytes prism/private/wslib/calc-lib/1.0.7/1.0.7.2/Pressure/POverPRelief.clc
2003-Jul-08 17:10:16 10752 bytes prism/private/wslib/calc-lib/1.0.7/1.0.7.2/Pressure/POverPRelief.clc-01
2003-Jun-14 20:31:12 8416 bytes prism/private/wslib/calc-lib/1.0.7/1.0.7.2/Pressure/POverPReliefFire.clc
2003-Jun-13 16:21:34 2365 bytes prism/private/wslib/calc-lib/1.0.7/1.0.7.2/Pressure/PressureChecks.clc
2004-Dec-13 10:28:21 102 bytes prism/private/wslib/calc-lib/1.0.7/1.0.7.2/Steam
2003-Mar-24 11:30:50 708 bytes prism/private/wslib/calc-lib/1.0.7/1.0.7.2/Steam/Steam.clc
2003-Jul-07 22:27:50 5330 bytes prism/private/wslib/calc-lib/1.0.7/1.0.7.2/UserSpecifiedLiquid.clc
2003-Jun-20 13:50:28 4375 bytes prism/private/wslib/calc-lib/1.0.7/1.0.7.2/UserSpecifiedSteam.clc
2003-Jun-20 13:50:34 4731 bytes prism/private/wslib/calc-lib/1.0.7/1.0.7.2/UserSpecifiedVapor.clc
2004-Dec-13 10:28:21 544 bytes prism/private/wslib/calc-lib/1.0.7/1.0.7.2/Util
2003-Apr-25 09:56:36 601 bytes prism/private/wslib/calc-lib/1.0.7/1.0.7.2/Util/AreaAdequateChecks.clc
2003-Apr-25 15:30:22 782 bytes prism/private/wslib/calc-lib/1.0.7/1.0.7.2/Util/AreaChecks.clc
2003-Jul-07 23:01:58 3644 bytes prism/private/wslib/calc-lib/1.0.7/1.0.7.2/Util/Kb.clc
2003-Jul-07 22:59:38 1278 bytes prism/private/wslib/calc-lib/1.0.7/1.0.7.2/Util/KbpLiquid.clc
2003-Jul-07 22:59:46 1570 bytes prism/private/wslib/calc-lib/1.0.7/1.0.7.2/Util/KbpVapor.clc
2003-Jul-07 22:59:52 782 bytes prism/private/wslib/calc-lib/1.0.7/1.0.7.2/Util/Kn.clc
2003-Jul-07 23:00:04 1318 bytes prism/private/wslib/calc-lib/1.0.7/1.0.7.2/Util/Ksh.clc
2003-Jul-07 23:00:14 9924 bytes prism/private/wslib/calc-lib/1.0.7/1.0.7.2/Util/Kv.clc
2003-Jul-07 23:00:22 3429 bytes prism/private/wslib/calc-lib/1.0.7/1.0.7.2/Util/Kw.clc
2003-Jul-07 22:50:52 6275 bytes prism/private/wslib/calc-lib/1.0.7/1.0.7.2/Util/ProtectedData.clc
2003-May-22 23:22:20 8913 bytes prism/private/wslib/calc-lib/1.0.7/1.0.7.2/Util/ProtectedDataVessel.clc
2003-Jul-07 22:51:58 16009 bytes prism/private/wslib/calc-lib/1.0.7/1.0.7.2/Util/ProtectingData.clc
2003-Mar-09 23:04:20 2983 bytes prism/private/wslib/calc-lib/1.0.7/1.0.7.2/Util/ReqSizingCode.clc
2003-May-27 20:38:20 1614 bytes prism/private/wslib/calc-lib/1.0.7/1.0.7.2/Util/ReqValveType.clc
2004-Dec-13 10:28:21 272 bytes prism/private/wslib/calc-lib/1.0.7/1.0.7.2/Vapor
2003-Mar-09 23:14:52 2543 bytes prism/private/wslib/calc-lib/1.0.7/1.0.7.2/Vapor/ControlValveVaporFlow.clc
2003-Jun-23 23:11:40 6906 bytes prism/private/wslib/calc-lib/1.0.7/1.0.7.2/Vapor/FireVaporCapacity.clc
2003-Jan-03 14:30:22 681 bytes prism/private/wslib/calc-lib/1.0.7/1.0.7.2/Vapor/VaporMass.clc
2003-Jun-24 18:22:38 1409 bytes prism/private/wslib/calc-lib/1.0.7/1.0.7.2/Vapor/VaporProcessProps.clc
2003-Jul-07 23:00:56 6792 bytes prism/private/wslib/calc-lib/1.0.7/1.0.7.2/Vapor/VaporProps.clc
2003-Jan-29 11:30:40 695 bytes prism/private/wslib/calc-lib/1.0.7/1.0.7.2/Vapor/VaporVol.clc
2004-Dec-13 10:28:21 918 bytes prism/private/wslib/calc-lib/1.0.7/1.0.7.20
2004-Mar-12 16:08:46 12288 bytes prism/private/wslib/calc-lib/1.0.7/1.0.7.20/.swp
2004-Jul-15 21:58:18 6218 bytes prism/private/wslib/calc-lib/1.0.7/1.0.7.20/ControlValveLiquid.clc
2004-Jul-20 11:57:42 6038 bytes prism/private/wslib/calc-lib/1.0.7/1.0.7.20/ControlValveVapor.clc
2004-Dec-13 10:28:21 306 bytes prism/private/wslib/calc-lib/1.0.7/1.0.7.20/Device
2004-Jun-22 14:43:38 6127 bytes prism/private/wslib/calc-lib/1.0.7/1.0.7.20/Device/PRVDeviceData.clc
2003-Oct-10 14:17:08 3251 bytes prism/private/wslib/calc-lib/1.0.7/1.0.7.20/Device/PipeDeviceData.clc
2004-May-19 17:05:12 9547 bytes prism/private/wslib/calc-lib/1.0.7/1.0.7.20/Device/RDDeviceData.clc
2004-May-19 17:05:20 10676 bytes prism/private/wslib/calc-lib/1.0.7/1.0.7.20/Device/TVDeviceData.clc
2004-Jun-10 13:54:22 6637 bytes prism/private/wslib/calc-lib/1.0.7/1.0.7.20/Device/TankDeviceData.clc
2003-Oct-10 14:17:08 2672 bytes prism/private/wslib/calc-lib/1.0.7/1.0.7.20/Device/TurbineStmDeviceData.clc
2003-Oct-29 14:54:00 2665 bytes prism/private/wslib/calc-lib/1.0.7/1.0.7.20/Device/Vessel.clc 2004-Jul-16 11:22:20 6447 bytes prism/private/wslib/calc-lib/1.0.7/1.0.7.20/FireGasExpansion.clc
2004-Jul-15 21:59:02 5962 bytes prism/private/wslib/calc-lib/1.0.7/1.0.7.20/FireVaporGeneration.clc
2004-Dec-13 10:28:21 306 bytes prism/private/wslib/calc-lib/1.0.7/1.0.7.20/Fitting
2003-Oct-10 14:17:08 5636 bytes prism/private/wslib/calc-lib/1.0.7/1.0.7.20/Fitting/ExpandingFitting.clc
2003-Oct-10 14:17:08 4149 bytes prism/private/wslib/calc-lib/1.0.7/1.0.7.20/Fitting/ExpandingTeeSide.clc
2003-Oct-10 14:17:08 4153 bytes prism/private/wslib/calc-lib/1.0.7/1.0.7.20/Fitting/Pipe.clc
2004-Jul-02 16:58:00 5741 bytes prism/private/wslib/calc-lib/1.0.7/1.0.7.20/Fitting/ReducingFitting.clc
2003-Oct-10 14:17:08 4176 bytes prism/private/wslib/calc-lib/1.0.7/1.0.7.20/Fitting/ReducingTeeSide.clc
2003-Oct-10 14:17:08 4128 bytes prism/private/wslib/calc-lib/1.0.7/1.0.7.20/Fitting/StandardFitting.clc
2004-Jul-02 16:57:22 5741 bytes prism/private/wslib/calc-lib/1.0.7/1.0.7.20/Fitting/junk1
2004-Jul-15 21:59:10 6539 bytes prism/private/wslib/calc-lib/1.0.7/1.0.7.20/GivenFlowLiquid.clc
2004-Jul-15 21:59:22 5520 bytes prism/private/wslib/calc-lib/1.0.7/1.0.7.20/GivenFlowSteam.clc
2004-Jul-15 21:59:34 7059 bytes prism/private/wslib/calc-lib/1.0.7/1.0.7.20/GivenFlowVapor.clc
2004-Dec-13 10:28:21 272 bytes prism/private/wslib/calc-lib/1.0.7/1.0.7.20/Liquid
2004-Feb-15 20:52:26 1191 bytes prism/private/wslib/calc-lib/1.0.7/1.0.7.20/Liquid/ControlValveLiquidFlow.clc
2004-May-20 10:21:36 652 bytes prism/private/wslib/calc-lib/1.0.7/1.0.7.20/Liquid/LiquidExpansionCapacity.clc
2004-Jun-21 11:17:22 5116 bytes prism/private/wslib/calc-lib/1.0.7/1.0.7.20/Liquid/LiquidProps.clc
2004-Jul-07 13:46:44 5132 bytes prism/private/wslib/calc-lib/1.0.7/1.0.7.20/Liquid/LiquidVol.clc
2004-May-20 10:47:44 822 bytes prism/private/wslib/calc-lib/1.0.7/1.0.7.20/Liquid/TubeRuptureLiquidMassFlow.clc
2004-May-20 10:47:56 830 bytes prism/private/wslib/calc-lib/1.0.7/1.0.7.20/Liquid/TubeRuptureLiquidVolFlow.clc
2004-Jul-15 21:59:46 5812 bytes prism/private/wslib/calc-lib/1.0.7/1.0.7.20/LiquidExpansion.clc
2004-Jul-06 21:17:50 3251 bytes prism/private/wslib/calc-lib/1.0.7/1.0.7.20/NotImplemented.clc
2004-Dec-13 10:28:21 646 bytes prism/private/wslib/calc-lib/1.0.7/1.0.7.20/PipingLoss
2004-Jun-15 11:57:02 4665 bytes prism/private/wslib/calc-lib/1.0.7/1.0.7.20/PipingLoss/CheckInlet.clc
2004-Jun-15 11:57:16 5318 bytes prism/private/wslib/calc-lib/1.0.7/1.0.7.20/PipingLoss/CheckOutlet.clc
2004-Jun-11 10:26:26 637 bytes prism/private/wslib/calc-lib/1.0.7/1.0.7.20/PipingLoss/HDelta.clc
2004-Jul-21 23:44:36 30586 bytes prism/private/wslib/calc-lib/1.0.7/1.0.7.20/PipingLoss/Liquid.clc
2004-Jul-21 20:48:04 29856 bytes prism/private/wslib/calc-lib/1.0.7/1.0.7.20/PipingLoss/Liquid.clc-01
2004-Jun-22 11:24:14 2195 bytes prism/private/wslib/calc-lib/1.0.7/1.0.7.20/PipingLoss/LiquidDrop.clc
2004-Jul-07 13:46:52 16328 bytes prism/private/wslib/calc-lib/1.0.7/1.0.7.20/PipingLoss/MaxRelCapLiquid.clc
2004-Jun-21 22:02:46 15449 bytes prism/private/wslib/calc-lib/1.0.7/1.0.7.20/PipingLoss/MaxRelCapSteam.clc
2004-Jul-21 23:08:54 16471 bytes prism/private/wslib/calc-lib/1.0.7/1.0.7.20/PipingLoss/MaxRelCapVapor.clc
2004-May-19 17:44:18 9733 bytes prism/private/wslib/calc-lib/1.0.7/1.0.7.20/PipingLoss/NotImplemented.clc
2004-Jul-21 23:14:12 17820 bytes prism/private/wslib/calc-lib/1.0.7/1.0.7.20/PipingLoss/PipingLossInit.clc
2004-Jul-21 23:44:58 34494 bytes prism/private/wslib/calc-lib/1.0.7/1.0.7.20/PipingLoss/Steam.clc
2004-Jul-21 20:34:14 35219 bytes prism/private/wslib/calc-lib/1.0.7/1.0.7.20/PipingLoss/Steam.clc-01
2004-Jul-21 23:42:24 38783 bytes prism/private/wslib/calc-lib/1.0.7/1.0.7.20/PipingLoss/Vapor.clc
2004-Jul-21 21:05:04 39435 bytes prism/private/wslib/calc-lib/1.0.7/1.0.7.20/PipingLoss/Vapor.clc-01
2004-Jun-22 11:25:02 2501 bytes prism/private/wslib/calc-lib/1.0.7/1.0.7.20/PipingLoss/VaporDropIn.clc
2004-Jun-22 11:25:10 4999 bytes prism/private/wslib/calc-lib/1.0.7/1.0.7.20/PipingLoss/VaporDropOut.clc
2004-Dec-13 10:28:21 204 bytes prism/private/wslib/calc-lib/1.0.7/1.0.7.20/Post
2004-Jul-15 22:18:44 11722 bytes prism/private/wslib/calc-lib/1.0.7/1.0.7.20/Post/AcousticVibration.clc
2004-Jun-21 11:19:34 1812 bytes prism/private/wslib/calc-lib/1.0.7/1.0.7.20/Post/NoiseLevel.clc
2004-Jun-24 10:44:26 1575 bytes prism/private/wslib/calc-lib/1.0.7/1.0.7.20/Post/ReactionForceSteam.clc
2004-Jun-15 12:02:44 1503 bytes prism/private/wslib/calc-lib/1.0.7/1.0.7.20/Post/ReactionForceVapor.clc
2004-Dec-13 10:28:21 408 bytes prism/private/wslib/calc-lib/1.0.7/1.0.7.20/Pressure
2004-Jun-04 11:58:24 1514 bytes prism/private/wslib/calc-lib/1.0.7/1.0.7.20/Pressure/BackPressure.clc
2004-Jun-21 11:20:40 2461 bytes prism/private/wslib/calc-lib/1.0.7/1.0.7.20/Pressure/BackPressureCheck.clc
2004-Feb-27 19:14:28 2058 bytes prism/private/wslib/calc-lib/1.0.7/1.0.7.20/Pressure/ColdDiffTestPressure.clc
2004-Jul-07 10:35:00 6605 bytes prism/private/wslib/calc-lib/1.0.7/1.0.7.20/Pressure/MRCPOverPRelief.clc
2004-Jun-15 10:24:58 1150 bytes prism/private/wslib/calc-lib/1.0.7/1.0.7.20/Pressure/PAtm.clc
2004-Mar-18 11:31:24 708 bytes prism/private/wslib/calc-lib/1.0.7/1.0.7.20/Pressure/PDelta.clc
2004-Jul-19 16:42:28 15157 bytes prism/private/wslib/calc-lib/1.0.7/1.0.7.20/Pressure/POverPRelief.clc
2004-Jul-15 20:21:40 2670 bytes prism/private/wslib/calc-lib/1.0.7/1.0.7.20/Pressure/PressureChecks.clc
2004-Jun-24 10:37:16 3515 bytes prism/private/wslib/calc-lib/1.0.7/1.0.7.20/Pressure/PressureChecksTank.clc
2004-Jul-08 17:07:12 852 bytes prism/private/wslib/calc-lib/1.0.7/1.0.7.20/Pressure/notes.txt
2004-Dec-13 10:28:21 136 bytes prism/private/wslib/calc-lib/1.0.7/1.0.7.20/Steam
2004-Mar-29 14:10:14 947 bytes prism/private/wslib/calc-lib/1.0.7/1.0.7.20/Steam/Steam.clc
2004-Jun-15 20:22:40 929 bytes prism/private/wslib/calc-lib/1.0.7/1.0.7.20/Steam/SteamProps.clc
2004-Dec-13 10:28:21 272 bytes prism/private/wslib/calc-lib/1.0.7/1.0.7.20/Tanks
2004-Jul-16 11:23:56 3983 bytes prism/private/wslib/calc-lib/1.0.7/1.0.7.20/Tanks/FireVaporGen.clc 2004-Jul-16 16:04:12 4337 bytes prism/private/wslib/calc-lib/1.0.7/1.0.7.20/Tanks/PadFailure.clc
2004-Jul-16 16:08:22 6890 bytes prism/private/wslib/calc-lib/1.0.7/1.0.7.20/Tanks/PumpInLiquidThermal.clc
2004-Jul-16 11:25:32 3888 bytes prism/private/wslib/calc-lib/1.0.7/1.0.7.20/Tanks/PumpOutLiquidThermal.clc
2004-Jul-16 16:08:34 3386 bytes prism/private/wslib/calc-lib/1.0.7/1.0.7.20/Tanks/SteamOut.clc
2004-Jul-16 11:31:06 2997 bytes prism/private/wslib/calc-lib/1.0.7/1.0.7.20/Tanks/TankDraining.clc
2004-Jul-15 21:59:58 9562 bytes prism/private/wslib/calc-lib/1.0.7/1.0.7.20/TubeRuptureLiquid.clc
2004-Jul-15 22:00:06 8865 bytes prism/private/wslib/calc-lib/1.0.7/1.0.7.20/TubeRuptureVapor.clc
2004-Jul-15 22:00:14 6090 bytes prism/private/wslib/calc-lib/1.0.7/1.0.7.20/UserSpecifiedLiquid.clc
2004-Jul-15 22:00:22 4890 bytes prism/private/wslib/calc-lib/1.0.7/1.0.7.20/UserSpecifiedSteam.clc
2004-Jul-15 22:00:28 5814 bytes prism/private/wslib/calc-lib/1.0.7/1.0.7.20/UserSpecifiedVapor.clc
2004-Dec-13 10:28:21 816 bytes prism/private/wslib/calc-lib/1.0.7/1.0.7.20/Util
2003-Nov-11 18:36:28 605 bytes prism/private/wslib/calc-lib/1.0.7/1.0.7.20/Util/AreaAdequateChecks.clc
2003-Oct-29 14:25:16 786 bytes prism/private/wslib/calc-lib/1.0.7/1.0.7.20/Util/AreaChecks.clc
2004-Jul-16 07:58:36 5483 bytes prism/private/wslib/calc-lib/1.0.7/1.0.7.20/Util/CheckProtectingValves.clc
2004-Jun-15 12:04:20 3729 bytes prism/private/wslib/calc-lib/1.0.7/1.0.7.20/Util/CriticalFlow.clc
2004-Mar-08 13:39:08 1109 bytes prism/private/wslib/calc-lib/1.0.7/1.0.7.20/Util/CriticalTubeFlow.clc
2004-Jul-07 15:18:52 4510 bytes prism/private/wslib/calc-lib/1.0.7/1.0.7.20/Util/Kb.clc
2004-Mar-12 11:53:32 1555 bytes prism/private/wslib/calc-lib/1.0.7/1.0.7.20/Util/KbpLiquid.clc
2004-Mar-08 13:21:56 1818 bytes prism/private/wslib/calc-lib/1.0.7/1.0.7.20/Util/KbpVapor.clc
2004-Mar-08 13:22:24 1125 bytes prism/private/wslib/calc-lib/1.0.7/1.0.7.20/Util/Kn.clc
2004-Mar-29 14:08:48 1380 bytes prism/private/wslib/calc-lib/1.0.7/1.0.7.20/Util/Ksh.clc
2004-Jul-07 15:10:20 10998 bytes prism/private/wslib/calc-lib/1.0.7/1.0.7.20/Util/Kv.clc
2004-Jul-07 15:16:44 4375 bytes prism/private/wslib/calc-lib/1.0.7/1.0.7.20/Util/Kw.clc
2004-Jun-21 16:06:38 5994 bytes prism/private/wslib/calc-lib/1.0.7/1.0.7.20/Util/ProtectedData.clc
2004-Jun-24 10:55:14 14656 bytes prism/private/wslib/calc-lib/1.0.7/1.0.7.20/Util/ProtectedDataTank.clc
2004-Jun-21 16:14:26 14214 bytes prism/private/wslib/calc-lib/1.0.7/1.0.7.20/Util/ProtectedDataVessel.clc
2004-Jun-21 16:15:20 16895 bytes prism/private/wslib/calc-lib/1.0.7/1.0.7.20/Util/ProtectingData.clc
2004-Jul-16 16:06:52 3432 bytes prism/private/wslib/calc-lib/1.0.7/1.0.7.20/Util/ProtectingDataTV.clc
2004-Jul-06 21:08:02 3283 bytes prism/private/wslib/calc-lib/1.0.7/1.0.7.20/Util/ReqSizingCode.clc
2004-Jun-21 16:11:04 1022 bytes prism/private/wslib/calc-lib/1.0.7/1.0.7.20/Util/ReqValveType.clc
2004-Jul-07 13:51:14 510 bytes prism/private/wslib/calc-lib/1.0.7/1.0.7.20/Util/ReynoldsToKu.clc
2004-May-20 10:34:54 1533 bytes prism/private/wslib/calc-lib/1.0.7/1.0.7.20/Util/VaporCapCreditCnvrt.clc
2004-Jun-24 10:46:34 645 bytes prism/private/wslib/calc-lib/1.0.7/1.0.7.20/Util/VentAdequateChecks.clc
2004-Dec-13 10:28:21 408 bytes prism/private/wslib/calc-lib/1.0.7/1.0.7.20/Vapor
2004-Jun-15 10:26:10 3951 bytes prism/private/wslib/calc-lib/1.0.7/1.0.7.20/Vapor/ControlValveVaporFlow.clc
2004-Jul-16 11:27:14 2520 bytes prism/private/wslib/calc-lib/1.0.7/1.0.7.20/Vapor/FGEVaporMass.clc
2004-Jun-23 15:01:10 1610 bytes prism/private/wslib/calc-lib/1.0.7/1.0.7.20/Vapor/FireGasCapacity.clc
2004-Jun-15 10:26:16 8338 bytes prism/private/wslib/calc-lib/1.0.7/1.0.7.20/Vapor/FireVaporCapacity.clc
2004-May-20 10:46:50 1185 bytes prism/private/wslib/calc-lib/1.0.7/1.0.7.20/Vapor/TubeRuptureVaporFlowCrit.clc
2004-May-20 10:46:58 881 bytes prism/private/wslib/calc-lib/1.0.7/1.0.7.20/Vapor/TubeRuptureVaporFlowSub.clc
2004-Jun-15 10:26:28 2099 bytes prism/private/wslib/calc-lib/1.0.7/1.0.7.20/Vapor/VaporMass.clc
2004-Feb-27 21:19:16 1725 bytes prism/private/wslib/calc-lib/1.0.7/1.0.7.20/Vapor/VaporProcessProps.clc
2004-Jul-06 15:36:52 7672 bytes prism/private/wslib/calc-lib/1.0.7/1.0.7.20/Vapor/VaporProps.clc
2004-Jun-15 10:27:02 2085 bytes prism/private/wslib/calc-lib/1.0.7/1.0.7.20/Vapor/VaporVol.clc
2004-Dec-13 10:28:22 918 bytes prism/private/wslib/calc-lib/1.0.7/1.0.7.21
2004-Mar-12 16:08:46 12288 bytes prism/private/wslib/calc-lib/1.0.7/1.0.7.21/.swp
2004-Jul-15 21:58:18 6218 bytes prism/private/wslib/calc-lib/1.0.7/1.0.7.21/ControlValveLiquid.clc
2004-Jul-20 11:57:42 6038 bytes prism/private/wslib/calc-lib/1.0.7/1.0.7.21/ControlValveVapor.clc
2004-Dec-13 10:28:21 306 bytes prism/private/wslib/calc-lib/1.0.7/1.0.7.21/Device
2004-Jun-22 14:43:38 6127 bytes prism/private/wslib/calc-lib/1.0.7/1.0.7.21/Device/PRVDeviceData.clc
2003-Oct-10 14:17:08 3251 bytes prism/private/wslib/calc-lib/1.0.7/1.0.7.21/Device/PipeDeviceData.clc
2004-May-19 17:05:12 9547 bytes prism/private/wslib/calc-lib/1.0.7/1.0.7.21/Device/RDDeviceData.clc
2004-Aug-17 10:17:02 11282 bytes prism/private/wslib/calc-lib/1.0.7/1.0.7.21/Device/TVDeviceData.clc
2004-Aug-17 10:17:04 6502 bytes prism/private/wslib/calc-lib/1.0.7/1.0.7.21/Device/TankDeviceData.clc
2003-Oct-10 14:17:08 2672 bytes prism/private/wslib/calc-lib/1.0.7/1.0.7.21/Device/TurbineStmDeviceData.clc
2003-Oct-29 14:54:00 2665 bytes prism/private/wslib/calc-lib/1.0.7/1.0.7.21/Device/Vessel.clc
2004-Jul-16 11:22:20 6447 bytes prism/private/wslib/calc-lib/1.0.7/1.0.7.21/FireGasExpansion.clc
2004-Aug-17 10:17:04 5984 bytes prism/private/wslib/calc-lib/1.0.7/1.0.7.21/FireVaporGeneration.clc
2004-Dec-13 10:28:22 306 bytes prism/private/wslib/calc-lib/1.0.7/1.0.7.21/Fitting
2003-Oct-10 14:17:08 5636 bytes prism/private/wslib/calc-lib/1.0.7/1.0.7.21/Fitting/ExpandingFitting.clc
2003-Oct-10 14:17:08 4149 bytes prism/private/wslib/calc-lib/1.0.7/1.0.7.21/Fitting/ExpandingTeeSide.clc 2003-Oct-10 14:17:08 4153 bytes prism/private/wslib/calc-lib/1.0.7/1.0.7.21/Fitting/Pipe.clc
2004-Jul-02 16:58:00 5741 bytes prism/private/wslib/calc-lib/1.0.7/1.0.7.21/Fitting/ReducingFitting.clc
2003-Oct-10 14:17:08 4176 bytes prism/private/wslib/calc-lib/1.0.7/1.0.7.21/Fitting/ReducingTeeSide.clc
2003-Oct-10 14:17:08 4128 bytes prism/private/wslib/calc-lib/1.0.7/1.0.7.21/Fitting/StandardFitting.clc
2004-Jul-02 16:57:22 5741 bytes prism/private/wslib/calc-lib/1.0.7/1.0.7.21/Fitting/junk1
2004-Jul-15 21:59:10 6539 bytes prism/private/wslib/calc-lib/1.0.7/1.0.7.21/GivenFlowLiquid.clc
2004-Jul-15 21:59:22 5520 bytes prism/private/wslib/calc-lib/1.0.7/1.0.7.21/GivenFlowSteam.clc
2004-Jul-15 21:59:34 7059 bytes prism/private/wslib/calc-lib/1.0.7/1.0.7.21/GivenFlowVapor.clc
2004-Dec-13 10:28:22 272 bytes prism/private/wslib/calc-lib/1.0.7/1.0.7.21/Liquid
2004-Feb-15 20:52:26 1191 bytes prism/private/wslib/calc-lib/1.0.7/1.0.7.21/Liquid/ControlValveLiquidFlow.clc
2004-May-20 10:21:36 652 bytes prism/private/wslib/calc-lib/1.0.7/1.0.7.21/Liquid/LiquidExpansionCapacity.clc
2004-Jun-21 11:17:22 5116 bytes prism/private/wslib/calc-lib/1.0.7/1.0.7.21/Liquid/LiquidProps.clc
2004-Jul-07 13:46:44 5132 bytes prism/private/wslib/calc-lib/1.0.7/1.0.7.21/Liquid/LiquidVol.clc
2004-May-20 10:47:44 822 bytes prism/private/wslib/calc-lib/1.0.7/1.0.7.21/Liquid/TubeRuptureLiquidMassFlow.clc
2004-May-20 10:47:56 830 bytes prism/private/wslib/calc-lib/1.0.7/1.0.7.21/Liquid/TubeRuptureLiquidVolFlow.clc
2004-Aug-17 10:17:06 5833 bytes prism/private/wslib/calc-lib/1.0.7/1.0.7.21/LiquidExpansion.clc
2004-Jul-06 21:17:50 3251 bytes prism/private/wslib/calc-lib/1.0.7/1.0.7.21/NotImplemented.clc
2004-Dec-13 10:28:22 646 bytes prism/private/wslib/calc-lib/1.0.7/1.0.7.21/PipingLoss
2004-Jun-15 11:57:02 4665 bytes prism/private/wslib/calc-lib/1.0.7/1.0.7.21/PipingLoss/CheckInlet.clc
2004-Jun-15 11:57:16 5318 bytes prism/private/wslib/calc-lib/1.0.7/1.0.7.21/PipingLoss/CheckOutlet.clc
2004-Jun-11 10:26:26 637 bytes prism/private/wslib/calc-lib/1.0.7/1.0.7.21/PipingLoss/HDelta.clc
2004-Aug-17 15:07:02 30571 bytes prism/private/wslib/calc-lib/1.0.7/1.0.7.21/PipingLoss/Liquid.clc
2004-Jul-21 20:48:04 29856 bytes prism/private/wslib/calc-lib/1.0.7/1.0.7.21/PipingLoss/Liquid.clc-01
2004-Jun-22 11:24:14 2195 bytes prism/private/wslib/calc-lib/1.0.7/1.0.7.21/PipingLoss/LiquidDrop.clc
2004-Jul-22 11:17:20 16671 bytes prism/private/wslib/calc-lib/1.0.7/1.0.7.21/PipingLoss/MaxRelCapLiquid.clc
2004-Jul-22 11:17:30 15750 bytes prism/private/wslib/calc-lib/1.0.7/1.0.7.21/PipingLoss/MaxRelCapSteam.clc
2004-Jul-22 11:13:40 16771 bytes prism/private/wslib/calc-lib/1.0.7/1.0.7.21/PipingLoss/MaxRelCapVapor.clc
2004-May-19 17:44:18 9733 bytes prism/private/wslib/calc-lib/1.0.7/1.0.7.21/PipingLoss/NotImplemented.clc
2004-Jul-21 23:14:12 17820 bytes prism/private/wslib/calc-lib/1.0.7/1.0.7.21/PipingLoss/PipingLossInit.clc
2004-Aug-17 15:07:06 34478 bytes prism/private/wslib/calc-lib/1.0.7/1.0.7.21/PipingLoss/Steam.clc
2004-Jul-21 20:34:14 35219 bytes prism/private/wslib/calc-lib/1.0.7/1.0.7.21/PipingLoss/Steam.clc-01
2004-Aug-17 15:07:10 38767 bytes prism/private/wslib/calc-lib/1.0.7/1.0.7.21/PipingLoss/Vapor.clc
2004-Jul-21 21:05:04 39435 bytes prism/private/wslib/calc-lib/1.0.7/1.0.7.21/PipingLoss/Vapor.clc-01
2004-Jun-22 11:25:02 2501 bytes prism/private/wslib/calc-lib/1.0.7/1.0.7.21/PipingLoss/VaporDropIn.clc
2004-Jun-22 11:25:10 4999 bytes prism/private/wslib/calc-lib/1.0.7/1.0.7.21/PipingLoss/VaporDropOut.clc
2004-Dec-13 10:28:22 204 bytes prism/private/wslib/calc-lib/1.0.7/1.0.7.21/Post
2004-Jul-15 22:18:44 11722 bytes prism/private/wslib/calc-lib/1.0.7/1.0.7.21/Post/AcousticVibration.clc
2004-Jun-21 11:19:34 1812 bytes prism/private/wslib/calc-lib/1.0.7/1.0.7.21/Post/NoiseLevel.clc
2004-Jun-24 10:44:26 1575 bytes prism/private/wslib/calc-lib/1.0.7/1.0.7.21/Post/ReactionForceSteam.clc
2004-Jun-15 12:02:44 1503 bytes prism/private/wslib/calc-lib/1.0.7/1.0.7.21/Post/ReactionForceVapor.clc
2004-Dec-13 10:28:22 442 bytes prism/private/wslib/calc-lib/1.0.7/1.0.7.21/Pressure
2004-Jun-04 11:58:24 1514 bytes prism/private/wslib/calc-lib/1.0.7/1.0.7.21/Pressure/BackPressure.clc
2004-Jun-21 11:20:40 2461 bytes prism/private/wslib/calc-lib/1.0.7/1.0.7.21/Pressure/BackPressureCheck.clc
2004-Feb-27 19:14:28 2058 bytes prism/private/wslib/calc-lib/1.0.7/1.0.7.21/Pressure/ColdDiffTestPressure.clc
2004-Jul-07 10:35:00 6605 bytes prism/private/wslib/calc-lib/1.0.7/1.0.7.21/Pressure/MRCPOverPRelief.clc
2004-Jun-15 10:24:58 1150 bytes prism/private/wslib/calc-lib/1.0.7/1.0.7.21/Pressure/PAtm.clc
2004-Mar-18 11:31:24 708 bytes prism/private/wslib/calc-lib/1.0.7/1.0.7.21/Pressure/PDelta.clc
2004-Jul-19 16:42:28 15157 bytes prism/private/wslib/calc-lib/1.0.7/1.0.7.21/Pressure/POverPRelief.clc
2004-Aug-17 11:27:14 2090 bytes prism/private/wslib/calc-lib/1.0.7/1.0.7.21/Pressure/POverTank.clc
2004-Jul-15 20:21:40 2670 bytes prism/private/wslib/calc-lib/1.0.7/1.0.7.21/Pressure/PressureChecks.clc
2004-Jun-24 10:37:16 3515 bytes prism/private/wslib/calc-lib/1.0.7/1.0.7.21/Pressure/PressureChecksTank.clc
2004-Jul-08 17:07:12 852 bytes prism/private/wslib/calc-lib/1.0.7/1.0.7.21/Pressure/notes.txt
2004-Dec-13 10:28:22 136 bytes prism/private/wslib/calc-lib/1.0.7/1.0.7.21/Steam
2004-Mar-29 14:10:14 947 bytes prism/private/wslib/calc-lib/1.0.7/1.0.7.21/Steam/Steam.clc
2004-Jun-15 20:22:40 929 bytes prism/private/wslib/calc-lib/1.0.7/1.0.7.21/Steam/SteamProps.clc
2004-Dec-13 10:28:22 272 bytes prism/private/wslib/calc-lib/1.0.7/1.0.7.21/Tanks
2004-Aug-17 10:17:18 3820 bytes prism/private/wslib/calc-lib/1.0.7/1.0.7.21/Tanks/FireVaporGen.clc
2004-Aug-17 10:17:18 3673 bytes prism/private/wslib/calc-lib/1.0.7/1.0.7.21/Tanks/PadFailure.clc
2004-Aug-17 10:17:20 5546 bytes prism/private/wslib/calc-lib/1.0.7/1.0.7.21/Tanks/PumpInLiquidThermal.clc
2004-Aug-17 10:17:20 3689 bytes prism/private/wslib/calc-lib/1.0.7/1.0.7.21/Tanks/PumpOutLiquidThermal.clc
2004-Aug-17 10:17:22 3189 bytes prism/private/wslib/calc-lib/1.0.7/1.0.7.21/Tanks/SteamOut.clc 2004-Aug-17 10:17:22 2799 bytes prism/private/wslib/calc-lib/1.0.7/1.0.7.21/Tanks/TankDraining.clc
2004-Jul-15 21:59:58 9562 bytes prism/private/wslib/calc-lib/1.0.7/1.0.7.21/TubeRuptureLiquid.clc
2004-Jul-15 22:00:06 8865 bytes prism/private/wslib/calc-lib/1.0.7/1.0.7.21/TubeRuptureVapor.clc
2004-Jul-15 22:00:14 6090 bytes prism/private/wslib/calc-lib/1.0.7/1.0.7.21/UserSpecifiedLiquid.clc
2004-Jul-15 22:00:22 4890 bytes prism/private/wslib/calc-lib/1.0.7/1.0.7.21/UserSpecifiedSteam.clc
2004-Jul-15 22:00:28 5814 bytes prism/private/wslib/calc-lib/1.0.7/1.0.7.21/UserSpecifiedVapor.clc
2004-Dec-13 10:28:22 816 bytes prism/private/wslib/calc-lib/1.0.7/1.0.7.21/Util
2003-Nov-11 18:36:28 605 bytes prism/private/wslib/calc-lib/1.0.7/1.0.7.21/Util/AreaAdequateChecks.clc
2003-Oct-29 14:25:16 786 bytes prism/private/wslib/calc-lib/1.0.7/1.0.7.21/Util/AreaChecks.clc
2004-Jul-16 07:58:36 5483 bytes prism/private/wslib/calc-lib/1.0.7/1.0.7.21/Util/CheckProtectingValves.clc
2004-Jun-15 12:04:20 3729 bytes prism/private/wslib/calc-lib/1.0.7/1.0.7.21/Util/CriticalFlow.clc
2004-Mar-08 13:39:08 1109 bytes prism/private/wslib/calc-lib/1.0.7/1.0.7.21/Util/CriticalTubeFlow.clc
2004-Jul-07 15:18:52 4510 bytes prism/private/wslib/calc-lib/1.0.7/1.0.7.21/Util/Kb.clc
2004-Mar-12 11:53:32 1555 bytes prism/private/wslib/calc-lib/1.0.7/1.0.7.21/Util/KbpLiquid.clc
2004-Mar-08 13:21:56 1818 bytes prism/private/wslib/calc-lib/1.0.7/1.0.7.21/Util/KbpVapor.clc
2004-Mar-08 13:22:24 1125 bytes prism/private/wslib/calc-lib/1.0.7/1.0.7.21/Util/Kn.clc
2004-Mar-29 14:08:48 1380 bytes prism/private/wslib/calc-lib/1.0.7/1.0.7.21/Util/Ksh.clc
2004-Jul-07 15:10:20 10998 bytes prism/private/wslib/calc-lib/1.0.7/1.0.7.21/Util/Kv.clc
2004-Jul-07 15:16:44 4375 bytes prism/private/wslib/calc-lib/1.0.7/1.0.7.21/Util/Kw.clc
2004-Jun-21 16:06:38 5994 bytes prism/private/wslib/calc-lib/1.0.7/1.0.7.21/Util/ProtectedData.clc
2004-Aug-17 10:17:24 16060 bytes prism/private/wslib/calc-lib/1.0.7/1.0.7.21/Util/ProtectedDataTank.clc
2004-Jun-21 16:14:26 14214 bytes prism/private/wslib/calc-lib/1.0.7/1.0.7.21/Util/ProtectedDataVessel.clc
2004-Aug-17 10:17:26 17189 bytes prism/private/wslib/calc-lib/1.0.7/1.0.7.21/Util/ProtectingData.clc
2004-Aug-17 10:17:26 3479 bytes prism/private/wslib/calc-lib/1.0.7/1.0.7.21/Util/ProtectingDataTV.clc
2004-Jul-06 21:08:02 3283 bytes prism/private/wslib/calc-lib/1.0.7/1.0.7.21/Util/ReqSizingCode.clc
2004-Jun-21 16:11:04 1022 bytes prism/private/wslib/calc-lib/1.0.7/1.0.7.21/Util/ReqValveType.clc
2004-Jul-07 13:51:14 510 bytes prism/private/wslib/calc-lib/1.0.7/1.0.7.21/Util/ReynoldsToKu.clc
2004-May-20 10:34:54 1533 bytes prism/private/wslib/calc-lib/1.0.7/1.0.7.21/Util/VaporCapCreditCnvrt.clc
2004-Aug-17 11:26:12 767 bytes prism/private/wslib/calc-lib/1.0.7/1.0.7.21/Util/VentAdequateChecks.clc
2004-Dec-13 10:28:22 408 bytes prism/private/wslib/calc-lib/1.0.7/1.0.7.21/Vapor
2004-Jun-15 10:26:10 3951 bytes prism/private/wslib/calc-lib/1.0.7/1.0.7.21/Vapor/ControlValveVaporFlow.clc
2004-Jul-16 11:27:14 2520 bytes prism/private/wslib/calc-lib/1.0.7/1.0.7.21/Vapor/FGEVaporMass.clc
2004-Jun-23 15:01:10 1610 bytes prism/private/wslib/calc-lib/1.0.7/1.0.7.21/Vapor/FireGasCapacity.clc
2004-Aug-17 13:56:16 10053 bytes prism/private/wslib/calc-lib/1.0.7/1.0.7.21/Vapor/FireVaporCapacity.clc
2004-May-20 10:46:50 1185 bytes prism/private/wslib/calc-lib/1.0.7/1.0.7.21/Vapor/TubeRuptureVaporFlowCrit.clc
2004-May-20 10:46:58 881 bytes prism/private/wslib/calc-lib/1.0.7/1.0.7.21/Vapor/TubeRuptureVaporFlowSub.clc
2004-Jun-15 10:26:28 2099 bytes prism/private/wslib/calc-lib/1.0.7/1.0.7.21/Vapor/VaporMass.clc
2004-Feb-27 21:19:16 1725 bytes prism/private/wslib/calc-lib/1.0.7/1.0.7.21/Vapor/VaporProcessProps.clc
2004-Jul-06 15:36:52 7672 bytes prism/private/wslib/calc-lib/1.0.7/1.0.7.21/Vapor/VaporProps.clc
2004-Jun-15 10:27:02 2085 bytes prism/private/wslib/calc-lib/1.0.7/1.0.7.21/Vapor/VaporVol.clc
2004-Dec-13 10:28:22 918 bytes prism/private/wslib/calc-lib/1.0.7/1.0.7.22
2004-Mar-12 16:08:46 12288 bytes prism/private/wslib/calc-lib/1.0.7/1.0.7.22/.swp
2004-Aug-20 11:06:56 6542 bytes prism/private/wslib/calc-lib/1.0.7/1.0.7.22/ControlValveLiquid.clc
2004-Aug-22 15:49:58 6436 bytes prism/private/wslib/calc-lib/1.0.7/1.0.7.22/ControlValveVapor.clc
2004-Dec-13 10:28:22 306 bytes prism/private/wslib/calc-lib/1.0.7/1.0.7.22/Device
2004-Jun-22 14:43:38 6127 bytes prism/private/wslib/calc-lib/1.0.7/1.0.7.22/Device/PRVDeviceData.clc
2003-Oct-10 14:17:08 3251 bytes prism/private/wslib/calc-lib/1.0.7/1.0.7.22/Device/PipeDeviceData.clc
2004-May-19 17:05:12 9547 bytes prism/private/wslib/calc-lib/1.0.7/1.0.7.22/Device/RDDeviceData.clc
2004-Aug-17 10:17:02 11282 bytes prism/private/wslib/calc-lib/1.0.7/1.0.7.22/Device/TVDeviceData.clc
2004-Aug-17 10:17:04 6502 bytes prism/private/wslib/calc-lib/1.0.7/1.0.7.22/Device/TankDeviceData.clc
2003-Oct-10 14:17:08 2672 bytes prism/private/wslib/calc-lib/1.0.7/1.0.7.22/Device/TurbineStmDeviceData.clc
2003-Oct-29 14:54:00 2665 bytes prism/private/wslib/calc-lib/1.0.7/1.0.7.22/Device/Vessel.clc
2004-Jul-16 11:22:20 6447 bytes prism/private/wslib/calc-lib/1.0.7/1.0.7.22/FireGasExpansion.clc
2004-Aug-17 10:17:04 5984 bytes prism/private/wslib/calc-lib/1.0.7/1.0.7.22/FireVaporGeneration.clc
2004-Dec-13 10:28:22 306 bytes prism/private/wslib/calc-lib/1.0.7/1.0.7.22/Fitting
2003-Oct-10 14:17:08 5636 bytes prism/private/wslib/calc-lib/1.0.7/1.0.7.22/Fitting/ExpandingFitting.clc
2003-Oct-10 14:17:08 4149 bytes prism/private/wslib/calc-lib/1.0.7/1.0.7.22/Fitting/ExpandingTeeSide.clc
2003-Oct-10 14:17:08 4153 bytes prism/private/wslib/calc-lib/1.0.7/1.0.7.22/Fitting/Pipe.clc
2004-Jul-02 16:58:00 5741 bytes prism/private/wslib/calc-lib/1.0.7/1.0.7.22/Fitting/ReducingFitting.clc
2003-Oct-10 14:17:08 4176 bytes prism/private/wslib/calc-lib/1.0.7/1.0.7.22/Fitting/ReducingTeeSide.clc
2003-Oct-10 14:17:08 4128 bytes prism/private/wslib/calc-lib/1.0.7/1.0.7.22/Fitting/StandardFitting.clc 2004-Jul-02 16:57:22 5741 bytes prism/private/wslib/calc-lib/1.0.7/1.0.7.22/Fitting/junk1
2004-Jul-15 21:59:10 6539 bytes prism/private/wslib/calc-lib/1.0.7/1.0.7.22/GivenFlowLiquid.clc
2004-Jul-15 21:59:22 5520 bytes prism/private/wslib/calc-lib/1.0.7/1.0.7.22/GivenFlowSteam.clc
2004-Jul-15 21:59:34 7059 bytes prism/private/wslib/calc-lib/1.0.7/1.0.7.22/GivenFlowVapor.clc
2004-Dec-13 10:28:22 272 bytes prism/private/wslib/calc-lib/1.0.7/1.0.7.22/Liquid
2004-Feb-15 20:52:26 1191 bytes prism/private/wslib/calc-lib/1.0.7/1.0.7.22/Liquid/ControlValveLiquidFlow.clc
2004-May-20 10:21:36 652 bytes prism/private/wslib/calc-lib/1.0.7/1.0.7.22/Liquid/LiquidExpansionCapacity.clc
2004-Jun-21 11:17:22 5116 bytes prism/private/wslib/calc-lib/1.0.7/1.0.7.22/Liquid/LiquidProps.clc
2004-Jul-07 13:46:44 5132 bytes prism/private/wslib/calc-lib/1.0.7/1.0.7.22/Liquid/LiquidVol.clc
2004-May-20 10:47:44 822 bytes prism/private/wslib/calc-lib/1.0.7/1.0.7.22/Liquid/TubeRuptureLiquidMassFlow.clc
2004-May-20 10:47:56 830 bytes prism/private/wslib/calc-lib/1.0.7/1.0.7.22/Liquid/TubeRuptureLiquidVolFlow.clc
2004-Aug-17 10:17:06 5833 bytes prism/private/wslib/calc-lib/1.0.7/1.0.7.22/LiquidExpansion.clc
2004-Jul-06 21:17:50 3251 bytes prism/private/wslib/calc-lib/1.0.7/1.0.7.22/NotImplemented.clc
2004-Dec-13 10:28:22 612 bytes prism/private/wslib/calc-lib/1.0.7/1.0.7.22/PipingLoss
2004-Jun-15 11:57:02 4665 bytes prism/private/wslib/calc-lib/1.0.7/1.0.7.22/PipingLoss/CheckInlet.clc
2004-Jun-15 11:57:16 5318 bytes prism/private/wslib/calc-lib/1.0.7/1.0.7.22/PipingLoss/CheckOutlet.clc
2004-Jun-11 10:26:26 637 bytes prism/private/wslib/calc-lib/1.0.7/1.0.7.22/PipingLoss/HDelta.clc
2004-Aug-22 22:10:34 30485 bytes prism/private/wslib/calc-lib/1.0.7/1.0.7.22/PipingLoss/Liquid.clc
2004-Jun-22 11:24:14 2195 bytes prism/private/wslib/calc-lib/1.0.7/1.0.7.22/PipingLoss/LiquidDrop.clc
2004-Jul-22 11:17:20 16671 bytes prism/private/wslib/calc-lib/1.0.7/1.0.7.22/PipingLoss/MaxRelCapLiquid.clc
2004-Jul-22 11:17:30 15750 bytes prism/private/wslib/calc-lib/1.0.7/1.0.7.22/PipingLoss/MaxRelCapSteam.clc
2004-Jul-22 11:13:40 16771 bytes prism/private/wslib/calc-lib/1.0.7/1.0.7.22/PipingLoss/MaxRelCapVapor.clc
2004-May-19 17:44:18 9733 bytes prism/private/wslib/calc-lib/1.0.7/1.0.7.22/PipingLoss/NotImplemented.clc
2004-Aug-23 10:10:40 17820 bytes prism/private/wslib/calc-lib/1.0.7/1.0.7.22/PipingLoss/PipingLossInit.clc
2004-Aug-22 22:11:18 34392 bytes prism/private/wslib/calc-lib/1.0.7/1.0.7.22/PipingLoss/Steam.clc
2004-Aug-22 22:08:30 38680 bytes prism/private/wslib/calc-lib/1.0.7/1.0.7.22/PipingLoss/Vapor.clc
2004-Aug-20 15:54:56 2513 bytes prism/private/wslib/calc-lib/1.0.7/1.0.7.22/PipingLoss/VaporDropIn.clc
2004-Aug-20 15:55:38 6784 bytes prism/private/wslib/calc-lib/1.0.7/1.0.7.22/PipingLoss/VaporDropOut.clc
2004-Aug-20 14:58:52 4999 bytes prism/private/wslib/calc-lib/1.0.7/1.0.7.22/PipingLoss/VaporDropOut.clc-01
2004-Aug-20 15:36:30 8093 bytes prism/private/wslib/calc-lib/1.0.7/1.0.7.22/PipingLoss/VaporDropOut.clc-02
2004-Dec-13 10:28:22 204 bytes prism/private/wslib/calc-lib/1.0.7/1.0.7.22/Post
2004-Jul-15 22:18:44 11722 bytes prism/private/wslib/calc-lib/1.0.7/1.0.7.22/Post/AcousticVibration.clc
2004-Jun-21 11:19:34 1812 bytes prism/private/wslib/calc-lib/1.0.7/1.0.7.22/Post/NoiseLevel.clc
2004-Jun-24 10:44:26 1575 bytes prism/private/wslib/calc-lib/1.0.7/1.0.7.22/Post/ReactionForceSteam.clc
2004-Jun-15 12:02:44 1503 bytes prism/private/wslib/calc-lib/1.0.7/1.0.7.22/Post/ReactionForceVapor.clc
2004-Dec-13 10:28:22 442 bytes prism/private/wslib/calc-lib/1.0.7/1.0.7.22/Pressure
2004-Jun-04 11:58:24 1514 bytes prism/private/wslib/calc-lib/1.0.7/1.0.7.22/Pressure/BackPressure.clc
2004-Jun-21 11:20:40 2461 bytes prism/private/wslib/calc-lib/1.0.7/1.0.7.22/Pressure/BackPressureCheck.clc
2004-Feb-27 19:14:28 2058 bytes prism/private/wslib/calc-lib/1.0.7/1.0.7.22/Pressure/ColdDiffTestPressure.clc
2004-Jul-07 10:35:00 6605 bytes prism/private/wslib/calc-lib/1.0.7/1.0.7.22/Pressure/MRCPOverPRelief.clc
2004-Jun-15 10:24:58 1150 bytes prism/private/wslib/calc-lib/1.0.7/1.0.7.22/Pressure/PAtm.clc
2004-Mar-18 11:31:24 708 bytes prism/private/wslib/calc-lib/1.0.7/1.0.7.22/Pressure/PDelta.clc
2004-Jul-19 16:42:28 15157 bytes prism/private/wslib/calc-lib/1.0.7/1.0.7.22/Pressure/POverPRelief.clc
2004-Aug-17 11:27:14 2090 bytes prism/private/wslib/calc-lib/1.0.7/1.0.7.22/Pressure/POverTank.clc
2004-Jul-15 20:21:40 2670 bytes prism/private/wslib/calc-lib/1.0.7/1.0.7.22/Pressure/PressureChecks.clc
2004-Jun-24 10:37:16 3515 bytes prism/private/wslib/calc-lib/1.0.7/1.0.7.22/Pressure/PressureChecksTank.clc
2004-Jul-08 17:07:12 852 bytes prism/private/wslib/calc-lib/1.0.7/1.0.7.22/Pressure/notes.txt
2004-Dec-13 10:28:22 136 bytes prism/private/wslib/calc-lib/1.0.7/1.0.7.22/Steam
2004-Mar-29 14:10:14 947 bytes prism/private/wslib/calc-lib/1.0.7/1.0.7.22/Steam/Steam.clc
2004-Jun-15 20:22:40 929 bytes prism/private/wslib/calc-lib/1.0.7/1.0.7.22/Steam/SteamProps.clc
2004-Dec-13 10:28:22 272 bytes prism/private/wslib/calc-lib/1.0.7/1.0.7.22/Tanks
2004-Aug-17 10:17:18 3820 bytes prism/private/wslib/calc-lib/1.0.7/1.0.7.22/Tanks/FireVaporGen.clc
2004-Aug-17 10:17:18 3673 bytes prism/private/wslib/calc-lib/1.0.7/1.0.7.22/Tanks/PadFailure.clc
2004-Aug-17 10:17:20 5546 bytes prism/private/wslib/calc-lib/1.0.7/1.0.7.22/Tanks/PumpInLiquidThermal.clc
2004-Aug-17 10:17:20 3689 bytes prism/private/wslib/calc-lib/1.0.7/1.0.7.22/Tanks/PumpOutLiquidThermal.clc
2004-Aug-17 10:17:22 3189 bytes prism/private/wslib/calc-lib/1.0.7/1.0.7.22/Tanks/SteamOut.clc
2004-Aug-17 10:17:22 2799 bytes prism/private/wslib/calc-lib/1.0.7/1.0.7.22/Tanks/TankDraining.clc
2004-Aug-20 09:46:36 9954 bytes prism/private/wslib/calc-lib/1.0.7/1.0.7.22/TubeRuptureLiquid.clc
2004-Aug-20 10:21:04 8743 bytes prism/private/wslib/calc-lib/1.0.7/1.0.7.22/TubeRuptureVapor.clc
2004-Aug-19 14:04:24 6124 bytes prism/private/wslib/calc-lib/1.0.7/1.0.7.22/UserSpecifiedLiquid.clc
2004-Jul-15 22:00:22 4890 bytes prism/private/wslib/calc-lib/1.0.7/1.0.7.22/UserSpecifiedSteam.clc 2004-Jul-15 22:00:28 5814 bytes prism/private/wslib/calc-lib/1.0.7/1.0.7.22/UserSpecifiedVapor.clc
2004-Dec-13 10:28:22 816 bytes prism/private/wslib/calc-lib/1.0.7/1.0.7.22/Util
2003-Nov-11 18:36:28 605 bytes prism/private/wslib/calc-lib/1.0.7/1.0.7.22/Util/AreaAdequateChecks.clc
2003-Oct-29 14:25:16 786 bytes prism/private/wslib/calc-lib/1.0.7/1.0.7.22/Util/AreaChecks.clc
2004-Jul-16 07:58:36 5483 bytes prism/private/wslib/calc-lib/1.0.7/1.0.7.22/Util/CheckProtectingValves.clc
2004-Jun-15 12:04:20 3729 bytes prism/private/wslib/calc-lib/1.0.7/1.0.7.22/Util/CriticalFlow.clc
2004-Mar-08 13:39:08 1109 bytes prism/private/wslib/calc-lib/1.0.7/1.0.7.22/Util/CriticalTubeFlow.clc
2004-Jul-07 15:18:52 4510 bytes prism/private/wslib/calc-lib/1.0.7/1.0.7.22/Util/Kb.clc
2004-Mar-12 11:53:32 1555 bytes prism/private/wslib/calc-lib/1.0.7/1.0.7.22/Util/KbpLiquid.clc
2004-Mar-08 13:21:56 1818 bytes prism/private/wslib/calc-lib/1.0.7/1.0.7.22/Util/KbpVapor.clc
2004-Mar-08 13:22:24 1125 bytes prism/private/wslib/calc-lib/1.0.7/1.0.7.22/Util/Kn.clc
2004-Mar-29 14:08:48 1380 bytes prism/private/wslib/calc-lib/1.0.7/1.0.7.22/Util/Ksh.clc
2004-Jul-07 15:10:20 10998 bytes prism/private/wslib/calc-lib/1.0.7/1.0.7.22/Util/Kv.clc
2004-Jul-07 15:16:44 4375 bytes prism/private/wslib/calc-lib/1.0.7/1.0.7.22/Util/Kw.clc
2004-Jun-21 16:06:38 5994 bytes prism/private/wslib/calc-lib/1.0.7/1.0.7.22/Util/ProtectedData.clc
2004-Aug-21 12:34:04 4923 bytes prism/private/wslib/calc-lib/1.0.7/1.0.7.22/Util/ProtectedDataTank.clc
2004-Jun-21 16:14:26 14214 bytes prism/private/wslib/calc-lib/1.0.7/1.0.7.22/Util/ProtectedDataVessel.clc
2004-Aug-22 00:46:14 18044 bytes prism/private/wslib/calc-lib/1.0.7/1.0.7.22/Util/ProtectingData.clc
2004-Aug-20 18:25:24 5853 bytes prism/private/wslib/calc-lib/1.0.7/1.0.7.22/Util/ProtectingDataTV.clc
2004-Jul-06 21:08:02 3283 bytes prism/private/wslib/calc-lib/1.0.7/1.0.7.22/Util/ReqSizingCode.clc
2004-Jun-21 16:11:04 1022 bytes prism/private/wslib/calc-lib/1.0.7/1.0.7.22/Util/ReqValveType.clc
2004-Jul-07 13:51:14 510 bytes prism/private/wslib/calc-lib/1.0.7/1.0.7.22/Util/ReynoldsToKu.clc
2004-May-20 10:34:54 1533 bytes prism/private/wslib/calc-lib/1.0.7/1.0.7.22/Util/VaporCapCreditCnvrt.clc
2004-Aug-17 11:26:12 767 bytes prism/private/wslib/calc-lib/1.0.7/1.0.7.22/Util/VentAdequateChecks.clc
2004-Dec-13 10:28:22 408 bytes prism/private/wslib/calc-lib/1.0.7/1.0.7.22/Vapor
2004-Jun-15 10:26:10 3951 bytes prism/private/wslib/calc-lib/1.0.7/1.0.7.22/Vapor/ControlValveVaporFlow.clc
2004-Jul-16 11:27:14 2520 bytes prism/private/wslib/calc-lib/1.0.7/1.0.7.22/Vapor/FGEVaporMass.clc
2004-Jun-23 15:01:10 1610 bytes prism/private/wslib/calc-lib/1.0.7/1.0.7.22/Vapor/FireGasCapacity.clc
2004-Aug-17 13:56:16 10053 bytes prism/private/wslib/calc-lib/1.0.7/1.0.7.22/Vapor/FireVaporCapacity.clc
2004-May-20 10:46:50 1185 bytes prism/private/wslib/calc-lib/1.0.7/1.0.7.22/Vapor/TubeRuptureVaporFlowCrit.clc
2004-May-20 10:46:58 881 bytes prism/private/wslib/calc-lib/1.0.7/1.0.7.22/Vapor/TubeRuptureVaporFlowSub.clc
2004-Jun-15 10:26:28 2099 bytes prism/private/wslib/calc-lib/1.0.7/1.0.7.22/Vapor/VaporMass.clc
2004-Feb-27 21:19:16 1725 bytes prism/private/wslib/calc-lib/1.0.7/1.0.7.22/Vapor/VaporProcessProps.clc
2004-Jul-06 15:36:52 7672 bytes prism/private/wslib/calc-lib/1.0.7/1.0.7.22/Vapor/VaporProps.clc
2004-Jun-15 10:27:02 2085 bytes prism/private/wslib/calc-lib/1.0.7/1.0.7.22/Vapor/VaporVol.clc
2004-Dec-13 10:28:22 748 bytes prism/private/wslib/calc-lib/1.0.7/1.0.7.3
2003-Jul-06 16:35:14 5165 bytes prism/private/wslib/calc-lib/1.0.7/1.0.7.3/ControlValveLiquid.clc
2003-Jul-06 16:35:28 4980 bytes prism/private/wslib/calc-lib/1.0.7/1.0.7.3/ControlValveVapor.clc
2004-Dec-13 10:28:22 204 bytes prism/private/wslib/calc-lib/1.0.7/1.0.7.3/Device
2003-Apr-30 13:51:28 4069 bytes prism/private/wslib/calc-lib/1.0.7/1.0.7.3/Device/PRVDeviceData.clc
2003-May-27 16:50:44 3251 bytes prism/private/wslib/calc-lib/1.0.7/1.0.7.3/Device/PipeDeviceData.clc
2003-Feb-03 19:25:52 7591 bytes prism/private/wslib/calc-lib/1.0.7/1.0.7.3/Device/RDDeviceData.clc
2003-May-02 11:01:48 2672 bytes prism/private/wslib/calc-lib/1.0.7/1.0.7.3/Device/TurbineStmDeviceData.clc
2003-Jul-06 16:35:36 5354 bytes prism/private/wslib/calc-lib/1.0.7/1.0.7.3/FireVaporGeneration.clc
2004-Dec-13 10:28:22 272 bytes prism/private/wslib/calc-lib/1.0.7/1.0.7.3/Fitting
2003-Jul-05 18:46:00 5636 bytes prism/private/wslib/calc-lib/1.0.7/1.0.7.3/Fitting/ExpandingFitting.clc
2003-Jul-05 18:04:42 4149 bytes prism/private/wslib/calc-lib/1.0.7/1.0.7.3/Fitting/ExpandingTeeSide.clc
2003-Jul-05 17:06:02 4153 bytes prism/private/wslib/calc-lib/1.0.7/1.0.7.3/Fitting/Pipe.clc
2003-Jul-05 18:46:02 5741 bytes prism/private/wslib/calc-lib/1.0.7/1.0.7.3/Fitting/ReducingFitting.clc
2003-Jul-05 18:05:10 4176 bytes prism/private/wslib/calc-lib/1.0.7/1.0.7.3/Fitting/ReducingTeeSide.clc
2003-Jul-05 18:05:16 4128 bytes prism/private/wslib/calc-lib/1.0.7/1.0.7.3/Fitting/StandardFitting.clc
2003-Jul-07 23:23:40 6102 bytes prism/private/wslib/calc-lib/1.0.7/1.0.7.3/GivenFlowLiquid.clc
2003-Jul-06 16:35:52 4964 bytes prism/private/wslib/calc-lib/1.0.7/1.0.7.3/GivenFlowSteam.clc
2003-Jul-07 23:25:38 6232 bytes prism/private/wslib/calc-lib/1.0.7/1.0.7.3/GivenFlowVapor.clc
2004-Dec-13 10:28:22 170 bytes prism/private/wslib/calc-lib/1.0.7/1.0.7.3/Liquid
2003-Feb-27 15:22:26 939 bytes prism/private/wslib/calc-lib/1.0.7/1.0.7.3/Liquid/ControlValveLiquidFlow.clc
2003-Mar-09 23:14:08 4894 bytes prism/private/wslib/calc-lib/1.0.7/1.0.7.3/Liquid/LiquidProps.clc
2003-Jul-07 23:57:52 4991 bytes prism/private/wslib/calc-lib/1.0.7/1.0.7.3/Liquid/LiquidVol.clc
2003-Jun-20 13:50:20 2880 bytes prism/private/wslib/calc-lib/1.0.7/1.0.7.3/NotImplemented.clc
2003-Jul-09 16:04:26 53797 bytes prism/private/wslib/calc-lib/1.0.7/1.0.7.3/PipingLoss.clc
2004-Dec-13 10:28:22 170 bytes prism/private/wslib/calc-lib/1.0.7/1.0.7.3/Post 2003-Jul-07 23:32:00 25908 bytes prism/private/wslib/calc-lib/1.0.7/1.0.7.3/Post/MaxRelCap.clc
2003-Jul-07 23:32:56 1800 bytes prism/private/wslib/calc-lib/1.0.7/1.0.7.3/Post/NoiseLevel.clc
2003-Jul-07 23:34:02 2041 bytes prism/private/wslib/calc-lib/1.0.7/1.0.7.3/Post/ReactionForce.clc
2004-Dec-13 10:28:22 340 bytes prism/private/wslib/calc-lib/1.0.7/1.0.7.3/Pressure
2003-Jun-24 13:04:46 1676 bytes prism/private/wslib/calc-lib/1.0.7/1.0.7.3/Pressure/BackPressure.clc
2003-May-31 22:13:28 1384 bytes prism/private/wslib/calc-lib/1.0.7/1.0.7.3/Pressure/ColdDiffTestPressure.clc
2003-Jul-08 00:36:26 4786 bytes prism/private/wslib/calc-lib/1.0.7/1.0.7.3/Pressure/MRCPOverPRelief.clc
2003-Mar-09 23:08:02 1126 bytes prism/private/wslib/calc-lib/1.0.7/1.0.7.3/Pressure/PAtm.clc
2003-Jul-08 00:36:32 523 bytes prism/private/wslib/calc-lib/1.0.7/1.0.7.3/Pressure/PDelta.clc
2003-Jul-09 14:45:06 10480 bytes prism/private/wslib/calc-lib/1.0.7/1.0.7.3/Pressure/POverPRelief.clc
2003-Jun-14 20:31:12 8416 bytes prism/private/wslib/calc-lib/1.0.7/1.0.7.3/Pressure/POverPReliefFire.clc
2003-Jul-08 00:36:38 2739 bytes prism/private/wslib/calc-lib/1.0.7/1.0.7.3/Pressure/PressureChecks.clc
2004-Dec-13 10:28:22 102 bytes prism/private/wslib/calc-lib/1.0.7/1.0.7.3/Steam
2003-Mar-24 11:30:50 708 bytes prism/private/wslib/calc-lib/1.0.7/1.0.7.3/Steam/Steam.clc
2003-Jul-07 23:36:04 5397 bytes prism/private/wslib/calc-lib/1.0.7/1.0.7.3/UserSpecifiedLiquid.clc
2003-Jul-06 16:36:06 4442 bytes prism/private/wslib/calc-lib/1.0.7/1.0.7.3/UserSpecifiedSteam.clc
2003-Jul-06 16:36:14 4798 bytes prism/private/wslib/calc-lib/1.0.7/1.0.7.3/UserSpecifiedVapor.clc
2004-Dec-13 10:28:22 578 bytes prism/private/wslib/calc-lib/1.0.7/1.0.7.3/Util
2003-Apr-25 09:56:36 601 bytes prism/private/wslib/calc-lib/1.0.7/1.0.7.3/Util/AreaAdequateChecks.clc
2003-Apr-25 15:30:22 782 bytes prism/private/wslib/calc-lib/1.0.7/1.0.7.3/Util/AreaChecks.clc
2003-Jul-06 18:34:00 1843 bytes prism/private/wslib/calc-lib/1.0.7/1.0.7.3/Util/CriticalFlow.clc
2003-Jul-07 23:37:10 3644 bytes prism/private/wslib/calc-lib/1.0.7/1.0.7.3/Util/Kb.clc
2003-Jul-07 23:39:06 1278 bytes prism/private/wslib/calc-lib/1.0.7/1.0.7.3/Util/KbpLiquid.clc
2003-Jul-07 23:39:24 1570 bytes prism/private/wslib/calc-lib/1.0.7/1.0.7.3/Util/KbpVapor.clc
2003-Jul-07 23:58:58 748 bytes prism/private/wslib/calc-lib/1.0.7/1.0.7.3/Util/Kn.clc
2003-Jul-07 23:43:32 1317 bytes prism/private/wslib/calc-lib/1.0.7/1.0.7.3/Util/Ksh.clc
2003-Jul-07 23:45:06 9924 bytes prism/private/wslib/calc-lib/1.0.7/1.0.7.3/Util/Kv.clc
2003-Jul-07 23:45:48 3429 bytes prism/private/wslib/calc-lib/1.0.7/1.0.7.3/Util/Kw.clc
2003-Jun-13 16:22:28 6275 bytes prism/private/wslib/calc-lib/1.0.7/1.0.7.3/Util/ProtectedData.clc
2003-May-22 23:22:20 8913 bytes prism/private/wslib/calc-lib/1.0.7/1.0.7.3/Util/ProtectedDataVessel.clc
2003-May-14 21:43:48 16009 bytes prism/private/wslib/calc-lib/1.0.7/1.0.7.3/Util/ProtectingData.clc
2003-Mar-09 23:04:20 2983 bytes prism/private/wslib/calc-lib/1.0.7/1.0.7.3/Util/ReqSizingCode.clc
2003-May-27 20:38:20 1614 bytes prism/private/wslib/calc-lib/1.0.7/1.0.7.3/Util/ReqValveType.clc
2004-Dec-13 10:28:22 340 bytes prism/private/wslib/calc-lib/1.0.7/1.0.7.3/Vapor
2003-Mar-09 23:14:52 2543 bytes prism/private/wslib/calc-lib/1.0.7/1.0.7.3/Vapor/ControlValveVaporFlow.clc
2003-Jun-23 23:11:40 6906 bytes prism/private/wslib/calc-lib/1.0.7/1.0.7.3/Vapor/FireVaporCapacity.clc
2003-Jul-06 19:42:26 1548 bytes prism/private/wslib/calc-lib/1.0.7/1.0.7.3/Vapor/VaporMass.clc
2003-Jul-06 18:22:14 2693 bytes prism/private/wslib/calc-lib/1.0.7/1.0.7.3/Vapor/VaporMass.clc-01
2003-Jun-24 18:22:38 1409 bytes prism/private/wslib/calc-lib/1.0.7/1.0.7.3/Vapor/VaporProcessProps.clc
2003-Jul-07 23:47:14 6789 bytes prism/private/wslib/calc-lib/1.0.7/1.0.7.3/Vapor/VaporProps.clc
2003-Jul-06 19:41:40 1550 bytes prism/private/wslib/calc-lib/1.0.7/1.0.7.3/Vapor/VaporVol.clc
2003-Jul-06 18:22:18 2308 bytes prism/private/wslib/calc-lib/1.0.7/1.0.7.3/Vapor/VaporVol.clc-01
2003-Jul-07 23:46:24 318 bytes prism/private/wslib/calc-lib/1.0.7/1.0.7.3/deltas.txt
2004-Dec-13 10:28:23 782 bytes prism/private/wslib/calc-lib/1.0.7/1.0.7.4
2003-Jul-06 16:35:14 5165 bytes prism/private/wslib/calc-lib/1.0.7/1.0.7.4/ControlValveLiquid.clc
2003-Jul-06 16:35:28 4980 bytes prism/private/wslib/calc-lib/1.0.7/1.0.7.4/ControlValveVapor.clc
2004-Dec-13 10:28:22 204 bytes prism/private/wslib/calc-lib/1.0.7/1.0.7.4/Device
2003-Apr-30 13:51:28 4069 bytes prism/private/wslib/calc-lib/1.0.7/1.0.7.4/Device/PRVDeviceData.clc
2003-May-27 16:50:44 3251 bytes prism/private/wslib/calc-lib/1.0.7/1.0.7.4/Device/PipeDeviceData.clc
2003-Feb-03 19:25:52 7591 bytes prism/private/wslib/calc-lib/1.0.7/1.0.7.4/Device/RDDeviceData.clc
2003-May-02 11:01:48 2672 bytes prism/private/wslib/calc-lib/1.0.7/1.0.7.4/Device/TurbineStmDeviceData.clc
2003-Jul-06 16:35:36 5354 bytes prism/private/wslib/calc-lib/1.0.7/1.0.7.4/FireVaporGeneration.clc
2004-Dec-13 10:28:22 272 bytes prism/private/wslib/calc-lib/1.0.7/1.0.7.4/Fitting
2003-Jul-05 18:46:00 5636 bytes prism/private/wslib/calc-lib/1.0.7/1.0.7.4/Fitting/ExpandingFitting.clc
2003-Jul-05 18:04:42 4149 bytes prism/private/wslib/calc-lib/1.0.7/1.0.7.4/Fitting/ExpandingTeeSide.clc
2003-Jul-05 17:06:02 4153 bytes prism/private/wslib/calc-lib/1.0.7/1.0.7.4/Fitting/Pipe.clc
2003-Jul-05 18:46:02 5741 bytes prism/private/wslib/calc-lib/1.0.7/1.0.7.4/Fitting/ReducingFitting.clc
2003-Jul-05 18:05:10 4176 bytes prism/private/wslib/calc-lib/1.0.7/1.0.7.4/Fitting/ReducingTeeSide.clc
2003-Jul-05 18:05:16 4128 bytes prism/private/wslib/calc-lib/1.0.7/1.0.7.4/Fitting/StandardFitting.clc
2003-Jul-07 23:23:40 6102 bytes prism/private/wslib/calc-lib/1.0.7/1.0.7.4/GivenFlowLiquid.clc
2003-Jul-06 16:35:52 4964 bytes prism/private/wslib/calc-lib/1.0.7/1.0.7.4/GivenFlowSteam.clc 2003-Jul-07 23:25:38 6232 bytes prism/private/wslib/calc-lib/1.0.7/1.0.7.4/GivenFlowVapor.clc
2004-Dec-13 10:28:22 170 bytes prism/private/wslib/calc-lib/1.0.7/1.0.7.4/Liquid
2003-Feb-27 15:22:26 939 bytes prism/private/wslib/calc-lib/1.0.7/1.0.7.4/Liquid/ControlValveLiquidFlow.clc
2003-Mar-09 23:14:08 4894 bytes prism/private/wslib/calc-lib/1.0.7/1.0.7.4/Liquid/LiquidProps.clc
2003-Jul-07 23:57:52 4991 bytes prism/private/wslib/calc-lib/1.0.7/1.0.7.4/Liquid/LiquidVol.clc
2003-Jun-20 13:50:20 2880 bytes prism/private/wslib/calc-lib/1.0.7/1.0.7.4/NotImplemented.clc
2003-Jul-12 22:00:20 61872 bytes prism/private/wslib/calc-lib/1.0.7/1.0.7.4/PipingLoss.clc
2003-Jul-10 14:27:00 55145 bytes prism/private/wslib/calc-lib/1.0.7/1.0.7.4/PipingLoss.clc-01
2004-Dec-13 10:28:22 204 bytes prism/private/wslib/calc-lib/1.0.7/1.0.7.4/Post
2003-Jul-10 21:55:30 17956 bytes prism/private/wslib/calc-lib/1.0.7/1.0.7.4/Post/MaxRelCap.clc
2003-Jul-10 13:54:22 9558 bytes prism/private/wslib/calc-lib/1.0.7/1.0.7.4/Post/MaxRelCapIter.clc
2003-Jul-07 23:32:56 1800 bytes prism/private/wslib/calc-lib/1.0.7/1.0.7.4/Post/NoiseLevel.clc
2003-Jul-07 23:34:02 2041 bytes prism/private/wslib/calc-lib/1.0.7/1.0.7.4/Post/ReactionForce.clc
2004-Dec-13 10:28:22 340 bytes prism/private/wslib/calc-lib/1.0.7/1.0.7.4/Pressure
2003-Jun-24 13:04:46 1676 bytes prism/private/wslib/calc-lib/1.0.7/1.0.7.4/Pressure/BackPressure.clc
2003-May-31 22:13:28 1384 bytes prism/private/wslib/calc-lib/1.0.7/1.0.7.4/Pressure/ColdDiffTestPressure.clc
2003-Jul-10 13:18:24 4450 bytes prism/private/wslib/calc-lib/1.0.7/1.0.7.4/Pressure/MRCPOverPRelief.clc
2003-Mar-09 23:08:02 1126 bytes prism/private/wslib/calc-lib/1.0.7/1.0.7.4/Pressure/PAtm.clc
2003-Jul-08 00:36:32 523 bytes prism/private/wslib/calc-lib/1.0.7/1.0.7.4/Pressure/PDelta.clc
2003-Jul-09 14:45:06 10480 bytes prism/private/wslib/calc-lib/1.0.7/1.0.7.4/Pressure/POverPRelief.clc
2003-Jun-14 20:31:12 8416 bytes prism/private/wslib/calc-lib/1.0.7/1.0.7.4/Pressure/POverPReliefFire.clc
2003-Jul-08 00:36:38 2739 bytes prism/private/wslib/calc-lib/1.0.7/1.0.7.4/Pressure/PressureChecks.clc
2004-Dec-13 10:28:22 102 bytes prism/private/wslib/calc-lib/1.0.7/1.0.7.4/Steam
2003-Mar-24 11:30:50 708 bytes prism/private/wslib/calc-lib/1.0.7/1.0.7.4/Steam/Steam.clc
2003-Jul-07 23:36:04 5397 bytes prism/private/wslib/calc-lib/1.0.7/1.0.7.4/UserSpecifiedLiquid.clc
2003-Jul-06 16:36:06 4442 bytes prism/private/wslib/calc-lib/1.0.7/1.0.7.4/UserSpecifiedSteam.clc
2003-Jul-06 16:36:14 4798 bytes prism/private/wslib/calc-lib/1.0.7/1.0.7.4/UserSpecifiedVapor.clc
2004-Dec-13 10:28:23 578 bytes prism/private/wslib/calc-lib/1.0.7/1.0.7.4/Util
2003-Apr-25 09:56:36 601 bytes prism/private/wslib/calc-lib/1.0.7/1.0.7.4/Util/AreaAdequateChecks.clc
2003-Apr-25 15:30:22 782 bytes prism/private/wslib/calc-lib/1.0.7/1.0.7.4/Util/AreaChecks.clc
2003-Jul-10 15:42:12 1843 bytes prism/private/wslib/calc-lib/1.0.7/1.0.7.4/Util/CriticalFlow.clc
2003-Jul-07 23:37:10 3644 bytes prism/private/wslib/calc-lib/1.0.7/1.0.7.4/Util/Kb.clc
2003-Jul-10 15:42:22 1278 bytes prism/private/wslib/calc-lib/1.0.7/1.0.7.4/Util/KbpLiquid.clc
2003-Jul-07 23:39:24 1570 bytes prism/private/wslib/calc-lib/1.0.7/1.0.7.4/Util/KbpVapor.clc
2003-Jul-07 23:58:58 748 bytes prism/private/wslib/calc-lib/1.0.7/1.0.7.4/Util/Kn.clc
2003-Jul-07 23:43:32 1317 bytes prism/private/wslib/calc-lib/1.0.7/1.0.7.4/Util/Ksh.clc
2003-Jul-07 23:45:06 9924 bytes prism/private/wslib/calc-lib/1.0.7/1.0.7.4/Util/Kv.clc
2003-Jul-07 23:45:48 3429 bytes prism/private/wslib/calc-lib/1.0.7/1.0.7.4/Util/Kw.clc
2003-Jun-13 16:22:28 6275 bytes prism/private/wslib/calc-lib/1.0.7/1.0.7.4/Util/ProtectedData.clc
2003-May-22 23:22:20 8913 bytes prism/private/wslib/calc-lib/1.0.7/1.0.7.4/Util/ProtectedDataVessel.clc
2003-Jul-11 09:57:44 16404 bytes prism/private/wslib/calc-lib/1.0.7/1.0.7.4/Util/ProtectingData.clc
2003-Mar-09 23:04:20 2983 bytes prism/private/wslib/calc-lib/1.0.7/1.0.7.4/Util/ReqSizingCode.clc
2003-May-27 20:38:20 1614 bytes prism/private/wslib/calc-lib/1.0.7/1.0.7.4/Util/ReqValveType.clc
2004-Dec-13 10:28:23 272 bytes prism/private/wslib/calc-lib/1.0.7/1.0.7.4/Vapor
2003-Mar-09 23:14:52 2543 bytes prism/private/wslib/calc-lib/1.0.7/1.0.7.4/Vapor/ControlValveVaporFlow.clc
2003-Jun-23 23:11:40 6906 bytes prism/private/wslib/calc-lib/1.0.7/1.0.7.4/Vapor/FireVaporCapacity.clc
2003-Jul-06 19:42:26 1548 bytes prism/private/wslib/calc-lib/1.0.7/1.0.7.4/Vapor/VaporMass.clc
2003-Jun-24 18:22:38 1409 bytes prism/private/wslib/calc-lib/1.0.7/1.0.7.4/Vapor/VaporProcessProps.clc
2003-Jul-07 23:47:14 6789 bytes prism/private/wslib/calc-lib/1.0.7/1.0.7.4/Vapor/VaporProps.clc
2003-Jul-06 19:41:40 1550 bytes prism/private/wslib/calc-lib/1.0.7/1.0.7.4/Vapor/VaporVol.clc
2003-Jul-07 23:46:24 318 bytes prism/private/wslib/calc-lib/1.0.7/1.0.7.4/deltas.txt
2004-Dec-13 10:28:23 816 bytes prism/private/wslib/calc-lib/1.0.7/1.0.7.5
2003-Jul-06 16:35:14 5165 bytes prism/private/wslib/calc-lib/1.0.7/1.0.7.5/ControlValveLiquid.clc
2003-Jul-06 16:35:28 4980 bytes prism/private/wslib/calc-lib/1.0.7/1.0.7.5/ControlValveVapor.clc
2004-Dec-13 10:28:23 272 bytes prism/private/wslib/calc-lib/1.0.7/1.0.7.5/Device
2003-Apr-30 13:51:28 4069 bytes prism/private/wslib/calc-lib/1.0.7/1.0.7.5/Device/PRVDeviceData.clc
2003-May-27 16:50:44 3251 bytes prism/private/wslib/calc-lib/1.0.7/1.0.7.5/Device/PipeDeviceData.clc
2003-Feb-03 19:25:52 7591 bytes prism/private/wslib/calc-lib/1.0.7/1.0.7.5/Device/RDDeviceData.clc
2003-Jul-20 23:40:48 7891 bytes prism/private/wslib/calc-lib/1.0.7/1.0.7.5/Device/TVDeviceData.clc
2003-Jul-20 21:28:52 4447 bytes prism/private/wslib/calc-lib/1.0.7/1.0.7.5/Device/TankDeviceData.clc
2003-May-02 11:01:48 2672 bytes prism/private/wslib/calc-lib/1.0.7/1.0.7.5/Device/TurbineStmDeviceData.clc 2003-Jul-06 16:35:36 5354 bytes prism/private/wslib/calc-lib/1.0.7/1.0.7.5/FireVaporGeneration.clc
2004-Dec-13 10:28:23 272 bytes prism/private/wslib/calc-lib/1.0.7/1.0.7.5/Fitting
2003-Jul-05 18:46:00 5636 bytes prism/private/wslib/calc-lib/1.0.7/1.0.7.5/Fitting/ExpandingFitting.clc
2003-Jul-05 18:04:42 4149 bytes prism/private/wslib/calc-lib/1.0.7/1.0.7.5/Fitting/ExpandingTeeSide.clc
2003-Jul-05 17:06:02 4153 bytes prism/private/wslib/calc-lib/1.0.7/1.0.7.5/Fitting/Pipe.clc
2003-Jul-05 18:46:02 5741 bytes prism/private/wslib/calc-lib/1.0.7/1.0.7.5/Fitting/ReducingFitting.clc
2003-Jul-05 18:05:10 4176 bytes prism/private/wslib/calc-lib/1.0.7/1.0.7.5/Fitting/ReducingTeeSide.clc
2003-Jul-05 18:05:16 4128 bytes prism/private/wslib/calc-lib/1.0.7/1.0.7.5/Fitting/StandardFitting.clc
2003-Jul-07 23:23:40 6102 bytes prism/private/wslib/calc-lib/1.0.7/1.0.7.5/GivenFlowLiquid.clc
2003-Jul-06 16:35:52 4964 bytes prism/private/wslib/calc-lib/1.0.7/1.0.7.5/GivenFlowSteam.clc
2003-Jul-07 23:25:38 6232 bytes prism/private/wslib/calc-lib/1.0.7/1.0.7.5/GivenFlowVapor.clc
2004-Dec-13 10:28:23 170 bytes prism/private/wslib/calc-lib/1.0.7/1.0.7.5/Liquid
2003-Feb-27 15:22:26 939 bytes prism/private/wslib/calc-lib/1.0.7/1.0.7.5/Liquid/ControlValveLiquidFlow.clc
2003-Mar-09 23:14:08 4894 bytes prism/private/wslib/calc-lib/1.0.7/1.0.7.5/Liquid/LiquidProps.clc
2003-Jul-07 23:57:52 4991 bytes prism/private/wslib/calc-lib/1.0.7/1.0.7.5/Liquid/LiquidVol.clc
2003-Jun-20 13:50:20 2880 bytes prism/private/wslib/calc-lib/1.0.7/1.0.7.5/NotImplemented.clc
2003-Jul-20 20:17:32 63701 bytes prism/private/wslib/calc-lib/1.0.7/1.0.7.5/PipingLoss.clc
2003-Jul-10 14:27:00 55145 bytes prism/private/wslib/calc-lib/1.0.7/1.0.7.5/PipingLoss.clc-01
2003-Jul-20 17:40:28 61872 bytes prism/private/wslib/calc-lib/1.0.7/1.0.7.5/PipingLoss.clc-02
2004-Dec-13 10:28:23 204 bytes prism/private/wslib/calc-lib/1.0.7/1.0.7.5/Post
2003-Jul-10 21:55:30 17956 bytes prism/private/wslib/calc-lib/1.0.7/1.0.7.5/Post/MaxRelCap.clc
2003-Jul-10 13:54:22 9558 bytes prism/private/wslib/calc-lib/1.0.7/1.0.7.5/Post/MaxRelCapIter.clc
2003-Jul-07 23:32:56 1800 bytes prism/private/wslib/calc-lib/1.0.7/1.0.7.5/Post/NoiseLevel.clc
2003-Jul-07 23:34:02 2041 bytes prism/private/wslib/calc-lib/1.0.7/1.0.7.5/Post/ReactionForce.clc
2004-Dec-13 10:28:23 340 bytes prism/private/wslib/calc-lib/1.0.7/1.0.7.5/Pressure
2003-Jun-24 13:04:46 1676 bytes prism/private/wslib/calc-lib/1.0.7/1.0.7.5/Pressure/BackPressure.clc
2003-May-31 22:13:28 1384 bytes prism/private/wslib/calc-lib/1.0.7/1.0.7.5/Pressure/ColdDiffTestPressure.clc
2003-Jul-10 13:18:24 4450 bytes prism/private/wslib/calc-lib/1.0.7/1.0.7.5/Pressure/MRCPOverPRelief.clc
2003-Mar-09 23:08:02 1126 bytes prism/private/wslib/calc-lib/1.0.7/1.0.7.5/Pressure/PAtm.clc
2003-Jul-08 00:36:32 523 bytes prism/private/wslib/calc-lib/1.0.7/1.0.7.5/Pressure/PDelta.clc
2003-Jul-09 14:45:06 10480 bytes prism/private/wslib/calc-lib/1.0.7/1.0.7.5/Pressure/POverPRelief.clc
2003-Jun-14 20:31:12 8416 bytes prism/private/wslib/calc-lib/1.0.7/1.0.7.5/Pressure/POverPReliefFire.clc
2003-Jul-08 00:36:38 2739 bytes prism/private/wslib/calc-lib/1.0.7/1.0.7.5/Pressure/PressureChecks.clc
2004-Dec-13 10:28:23 102 bytes prism/private/wslib/calc-lib/1.0.7/1.0.7.5/Steam
2003-Mar-24 11:30:50 708 bytes prism/private/wslib/calc-lib/1.0.7/1.0.7.5/Steam/Steam.clc
2004-Dec-13 10:28:23 102 bytes prism/private/wslib/calc-lib/1.0.7/1.0.7.5/Tanks
2003-Jul-20 23:45:56 4788 bytes prism/private/wslib/calc-lib/1.0.7/1.0.7.5/Tanks/PumpInLiquidThermal.clc
2003-Jul-07 23:36:04 5397 bytes prism/private/wslib/calc-lib/1.0.7/1.0.7.5/UserSpecifiedLiquid.clc
2003-Jul-06 16:36:06 4442 bytes prism/private/wslib/calc-lib/1.0.7/1.0.7.5/UserSpecifiedSteam.clc
2003-Jul-06 16:36:14 4798 bytes prism/private/wslib/calc-lib/1.0.7/1.0.7.5/UserSpecifiedVapor.clc
2004-Dec-13 10:28:23 578 bytes prism/private/wslib/calc-lib/1.0.7/1.0.7.5/Util
2003-Apr-25 09:56:36 601 bytes prism/private/wslib/calc-lib/1.0.7/1.0.7.5/Util/AreaAdequateChecks.clc
2003-Apr-25 15:30:22 782 bytes prism/private/wslib/calc-lib/1.0.7/1.0.7.5/Util/AreaChecks.clc
2003-Jul-10 15:42:12 1843 bytes prism/private/wslib/calc-lib/1.0.7/1.0.7.5/Util/CriticalFlow.clc
2003-Jul-07 23:37:10 3644 bytes prism/private/wslib/calc-lib/1.0.7/1.0.7.5/Util/Kb.clc
2003-Jul-10 15:42:22 1278 bytes prism/private/wslib/calc-lib/1.0.7/1.0.7.5/Util/KbpLiquid.clc
2003-Jul-07 23:39:24 1570 bytes prism/private/wslib/calc-lib/1.0.7/1.0.7.5/Util/KbpVapor.clc
2003-Jul-07 23:58:58 748 bytes prism/private/wslib/calc-lib/1.0.7/1.0.7.5/Util/Kn.clc
2003-Jul-07 23:43:32 1317 bytes prism/private/wslib/calc-lib/1.0.7/1.0.7.5/Util/Ksh.clc
2003-Jul-07 23:45:06 9924 bytes prism/private/wslib/calc-lib/1.0.7/1.0.7.5/Util/Kv.clc
2003-Jul-07 23:45:48 3429 bytes prism/private/wslib/calc-lib/1.0.7/1.0.7.5/Util/Kw.clc
2003-Jun-13 16:22:28 6275 bytes prism/private/wslib/calc-lib/1.0.7/1.0.7.5/Util/ProtectedData.clc
2003-May-22 23:22:20 8913 bytes prism/private/wslib/calc-lib/1.0.7/1.0.7.5/Util/ProtectedDataVessel.clc
2003-Jul-11 09:57:44 16404 bytes prism/private/wslib/calc-lib/1.0.7/1.0.7.5/Util/ProtectingData.clc
2003-Mar-09 23:04:20 2983 bytes prism/private/wslib/calc-lib/1.0.7/1.0.7.5/Util/ReqSizingCode.clc
2003-May-27 20:38:20 1614 bytes prism/private/wslib/calc-lib/1.0.7/1.0.7.5/Util/ReqValveType.clc
2004-Dec-13 10:28:23 272 bytes prism/private/wslib/calc-lib/1.0.7/1.0.7.5/Vapor
2003-Mar-09 23:14:52 2543 bytes prism/private/wslib/calc-lib/1.0.7/1.0.7.5/Vapor/ControlValveVaporFlow.clc
2003-Jun-23 23:11:40 6906 bytes prism/private/wslib/calc-lib/1.0.7/1.0.7.5/Vapor/FireVaporCapacity.clc
2003-Jul-06 19:42:26 1548 bytes prism/private/wslib/calc-lib/1.0.7/1.0.7.5/Vapor/VaporMass.clc
2003-Jun-24 18:22:38 1409 bytes prism/private/wslib/calc-lib/1.0.7/1.0.7.5/Vapor/VaporProcessProps.clc 2003-Jul-07 23:47:14 6789 bytes prism/private/wslib/calc-lib/1.0.7/1.0.7.5/Vapor/VaporProps.clc
2003-Jul-06 19:41:40 1550 bytes prism/private/wslib/calc-lib/1.0.7/1.0.7.5/Vapor/VaporVol.clc
2004-Dec-13 10:28:23 782 bytes prism/private/wslib/calc-lib/1.0.7/1.0.7.6
2003-Jul-06 16:35:14 5165 bytes prism/private/wslib/calc-lib/1.0.7/1.0.7.6/ControlValveLiquid.clc
2003-Jul-06 16:35:28 4980 bytes prism/private/wslib/calc-lib/1.0.7/1.0.7.6/ControlValveVapor.clc
2004-Dec-13 10:28:23 272 bytes prism/private/wslib/calc-lib/1.0.7/1.0.7.6/Device
2003-Aug-12 20:18:52 4361 bytes prism/private/wslib/calc-lib/1.0.7/1.0.7.6/Device/PRVDeviceData.clc
2003-May-27 16:50:44 3251 bytes prism/private/wslib/calc-lib/1.0.7/1.0.7.6/Device/PipeDeviceData.clc
2003-Feb-03 19:25:52 7591 bytes prism/private/wslib/calc-lib/1.0.7/1.0.7.6/Device/RDDeviceData.clc
2003-Jul-20 23:40:48 7891 bytes prism/private/wslib/calc-lib/1.0.7/1.0.7.6/Device/TVDeviceData.clc
2003-Jul-20 21:28:52 4447 bytes prism/private/wslib/calc-lib/1.0.7/1.0.7.6/Device/TankDeviceData.clc
2003-May-02 11:01:48 2672 bytes prism/private/wslib/calc-lib/1.0.7/1.0.7.6/Device/TurbineStmDeviceData.clc
2003-Jul-06 16:35:36 5354 bytes prism/private/wslib/calc-lib/1.0.7/1.0.7.6/FireVaporGeneration.clc
2004-Dec-13 10:28:23 272 bytes prism/private/wslib/calc-lib/1.0.7/1.0.7.6/Fitting
2003-Jul-05 18:46:00 5636 bytes prism/private/wslib/calc-lib/1.0.7/1.0.7.6/Fitting/ExpandingFitting.clc
2003-Jul-05 18:04:42 4149 bytes prism/private/wslib/calc-lib/1.0.7/1.0.7.6/Fitting/ExpandingTeeSide.clc
2003-Jul-05 17:06:02 4153 bytes prism/private/wslib/calc-lib/1.0.7/1.0.7.6/Fitting/Pipe.clc
2003-Jul-05 18:46:02 5741 bytes prism/private/wslib/calc-lib/1.0.7/1.0.7.6/Fitting/ReducingFitting.clc
2003-Jul-05 18:05:10 4176 bytes prism/private/wslib/calc-lib/1.0.7/1.0.7.6/Fitting/ReducingTeeSide.clc
2003-Jul-05 18:05:16 4128 bytes prism/private/wslib/calc-lib/1.0.7/1.0.7.6/Fitting/StandardFitting.clc
2003-Jul-07 23:23:40 6102 bytes prism/private/wslib/calc-lib/1.0.7/1.0.7.6/GivenFlowLiquid.clc
2003-Jul-06 16:35:52 4964 bytes prism/private/wslib/calc-lib/1.0.7/1.0.7.6/GivenFlowSteam.clc
2003-Jul-07 23:25:38 6232 bytes prism/private/wslib/calc-lib/1.0.7/1.0.7.6/GivenFlowVapor.clc
2004-Dec-13 10:28:23 170 bytes prism/private/wslib/calc-lib/1.0.7/1.0.7.6/Liquid
2003-Feb-27 15:22:26 939 bytes prism/private/wslib/calc-lib/1.0.7/1.0.7.6/Liquid/ControlValveLiquidFlow.clc
2003-Mar-09 23:14:08 4894 bytes prism/private/wslib/calc-lib/1.0.7/1.0.7.6/Liquid/LiquidProps.clc
2003-Jul-07 23:57:52 4991 bytes prism/private/wslib/calc-lib/1.0.7/1.0.7.6/Liquid/LiquidVol.clc
2003-Jun-20 13:50:20 2880 bytes prism/private/wslib/calc-lib/1.0.7/1.0.7.6/NotImplemented.clc
2003-Aug-13 19:34:28 65940 bytes prism/private/wslib/calc-lib/1.0.7/1.0.7.6/PipingLoss.clc
2003-Aug-11 17:18:42 65350 bytes prism/private/wslib/calc-lib/1.0.7/1.0.7.6/PipingLoss.clc-01
2004-Dec-13 10:28:23 204 bytes prism/private/wslib/calc-lib/1.0.7/1.0.7.6/Post
2003-Aug-19 22:43:40 18095 bytes prism/private/wslib/calc-lib/1.0.7/1.0.7.6/Post/MaxRelCap.clc
2003-Jul-10 13:54:22 9558 bytes prism/private/wslib/calc-lib/1.0.7/1.0.7.6/Post/MaxRelCapIter.clc
2003-Jul-07 23:32:56 1800 bytes prism/private/wslib/calc-lib/1.0.7/1.0.7.6/Post/NoiseLevel.clc
2003-Jul-07 23:34:02 2041 bytes prism/private/wslib/calc-lib/1.0.7/1.0.7.6/Post/ReactionForce.clc
2004-Dec-13 10:28:23 306 bytes prism/private/wslib/calc-lib/1.0.7/1.0.7.6/Pressure
2003-Jun-24 13:04:46 1676 bytes prism/private/wslib/calc-lib/1.0.7/1.0.7.6/Pressure/BackPressure.clc
2003-May-31 22:13:28 1384 bytes prism/private/wslib/calc-lib/1.0.7/1.0.7.6/Pressure/ColdDiffTestPressure.clc
2003-Jul-10 13:18:24 4450 bytes prism/private/wslib/calc-lib/1.0.7/1.0.7.6/Pressure/MRCPOverPRelief.clc
2003-Mar-09 23:08:02 1126 bytes prism/private/wslib/calc-lib/1.0.7/1.0.7.6/Pressure/PAtm.clc
2003-Jul-08 00:36:32 523 bytes prism/private/wslib/calc-lib/1.0.7/1.0.7.6/Pressure/PDelta.clc
2003-Jul-09 14:45:06 10480 bytes prism/private/wslib/calc-lib/1.0.7/1.0.7.6/Pressure/POverPRelief.clc
2003-Jul-08 00:36:38 2739 bytes prism/private/wslib/calc-lib/1.0.7/1.0.7.6/Pressure/PressureChecks.clc
2004-Dec-13 10:28:23 102 bytes prism/private/wslib/calc-lib/1.0.7/1.0.7.6/Steam
2003-Mar-24 11:30:50 708 bytes prism/private/wslib/calc-lib/1.0.7/1.0.7.6/Steam/Steam.clc
2004-Dec-13 10:28:23 102 bytes prism/private/wslib/calc-lib/1.0.7/1.0.7.6/Tanks
2003-Aug-08 11:54:16 4788 bytes prism/private/wslib/calc-lib/1.0.7/1.0.7.6/Tanks/PumpInLiquidThermal.clc
2003-Aug-10 22:46:50 5570 bytes prism/private/wslib/calc-lib/1.0.7/1.0.7.6/UserSpecifiedLiquid.clc
2003-Jul-06 16:36:06 4442 bytes prism/private/wslib/calc-lib/1.0.7/1.0.7.6/UserSpecifiedSteam.clc
2003-Jul-06 16:36:14 4798 bytes prism/private/wslib/calc-lib/1.0.7/1.0.7.6/UserSpecifiedVapor.clc
2004-Dec-13 10:28:23 578 bytes prism/private/wslib/calc-lib/1.0.7/1.0.7.6/Util
2003-Apr-25 09:56:36 601 bytes prism/private/wslib/calc-lib/1.0.7/1.0.7.6/Util/AreaAdequateChecks.clc
2003-Apr-25 15:30:22 782 bytes prism/private/wslib/calc-lib/1.0.7/1.0.7.6/Util/AreaChecks.clc
2003-Jul-10 15:42:12 1843 bytes prism/private/wslib/calc-lib/1.0.7/1.0.7.6/Util/CriticalFlow.clc
2003-Jul-07 23:37:10 3644 bytes prism/private/wslib/calc-lib/1.0.7/1.0.7.6/Util/Kb.clc
2003-Jul-10 15:42:22 1278 bytes prism/private/wslib/calc-lib/1.0.7/1.0.7.6/Util/KbpLiquid.clc
2003-Jul-07 23:39:24 1570 bytes prism/private/wslib/calc-lib/1.0.7/1.0.7.6/Util/KbpVapor.clc
2003-Jul-07 23:58:58 748 bytes prism/private/wslib/calc-lib/1.0.7/1.0.7.6/Util/Kn.clc
2003-Jul-07 23:43:32 1317 bytes prism/private/wslib/calc-lib/1.0.7/1.0.7.6/Util/Ksh.clc
2003-Jul-07 23:45:06 9924 bytes prism/private/wslib/calc-lib/1.0.7/1.0.7.6/Util/Kv.clc
2003-Jul-07 23:45:48 3429 bytes prism/private/wslib/calc-lib/1.0.7/1.0.7.6/Util/Kw.clc 2003-Jun-13 16:22:28 6275 bytes prism/private/wslib/calc-lib/1.0.7/1.0.7.6/Util/ProtectedData.clc
2003-Aug-10 21:03:10 9689 bytes prism/private/wslib/calc-lib/1.0.7/1.0.7.6/Util/ProtectedDataVessel.clc
2003-Jul-11 09:57:44 16404 bytes prism/private/wslib/calc-lib/1.0.7/1.0.7.6/Util/ProtectingData.clc
2003-Mar-09 23:04:20 2983 bytes prism/private/wslib/calc-lib/1.0.7/1.0.7.6/Util/ReqSizingCode.clc
2003-Aug-10 21:14:08 1693 bytes prism/private/wslib/calc-lib/1.0.7/1.0.7.6/Util/ReqValveType.clc
2004-Dec-13 10:28:23 272 bytes prism/private/wslib/calc-lib/1.0.7/1.0.7.6/Vapor
2003-Aug-07 16:03:20 2567 bytes prism/private/wslib/calc-lib/1.0.7/1.0.7.6/Vapor/ControlValveVaporFlow.clc
2003-Jun-23 23:11:40 6906 bytes prism/private/wslib/calc-lib/1.0.7/1.0.7.6/Vapor/FireVaporCapacity.clc
2003-Jul-06 19:42:26 1548 bytes prism/private/wslib/calc-lib/1.0.7/1.0.7.6/Vapor/VaporMass.clc
2003-Jun-24 18:22:38 1409 bytes prism/private/wslib/calc-lib/1.0.7/1.0.7.6/Vapor/VaporProcessProps.clc
2003-Jul-07 23:47:14 6789 bytes prism/private/wslib/calc-lib/1.0.7/1.0.7.6/Vapor/VaporProps.clc
2003-Jul-06 19:41:40 1550 bytes prism/private/wslib/calc-lib/1.0.7/1.0.7.6/Vapor/VaporVol.clc
2004-Dec-13 10:28:23 782 bytes prism/private/wslib/calc-lib/1.0.7/1.0.7.7
2003-Jul-06 16:35:14 5165 bytes prism/private/wslib/calc-lib/1.0.7/1.0.7.7/ControlValveLiquid.clc
2003-Jul-06 16:35:28 4980 bytes prism/private/wslib/calc-lib/1.0.7/1.0.7.7/ControlValveVapor.clc
2004-Dec-13 10:28:23 306 bytes prism/private/wslib/calc-lib/1.0.7/1.0.7.7/Device
2003-Aug-12 20:18:52 4361 bytes prism/private/wslib/calc-lib/1.0.7/1.0.7.7/Device/PRVDeviceData.clc
2003-May-27 16:50:44 3251 bytes prism/private/wslib/calc-lib/1.0.7/1.0.7.7/Device/PipeDeviceData.clc
2003-Feb-03 19:25:52 7591 bytes prism/private/wslib/calc-lib/1.0.7/1.0.7.7/Device/RDDeviceData.clc
2003-Jul-20 23:40:48 7891 bytes prism/private/wslib/calc-lib/1.0.7/1.0.7.7/Device/TVDeviceData.clc
2003-Jul-20 21:28:52 4447 bytes prism/private/wslib/calc-lib/1.0.7/1.0.7.7/Device/TankDeviceData.clc
2003-May-02 11:01:48 2672 bytes prism/private/wslib/calc-lib/1.0.7/1.0.7.7/Device/TurbineStmDeviceData.clc
2003-Oct-04 14:52:46 2619 bytes prism/private/wslib/calc-lib/1.0.7/1.0.7.7/Device/Vessel.clc
2003-Jul-06 16:35:36 5354 bytes prism/private/wslib/calc-lib/1.0.7/1.0.7.7/FireVaporGeneration.clc
2004-Dec-13 10:28:23 272 bytes prism/private/wslib/calc-lib/1.0.7/1.0.7.7/Fitting
2003-Jul-05 18:46:00 5636 bytes prism/private/wslib/calc-lib/1.0.7/1.0.7.7/Fitting/ExpandingFitting.clc
2003-Jul-05 18:04:42 4149 bytes prism/private/wslib/calc-lib/1.0.7/1.0.7.7/Fitting/ExpandingTeeSide.clc
2003-Jul-05 17:06:02 4153 bytes prism/private/wslib/calc-lib/1.0.7/1.0.7.7/Fitting/Pipe.clc
2003-Jul-05 18:46:02 5741 bytes prism/private/wslib/calc-lib/1.0.7/1.0.7.7/Fitting/ReducingFitting.clc
2003-Jul-05 18:05:10 4176 bytes prism/private/wslib/calc-lib/1.0.7/1.0.7.7/Fitting/ReducingTeeSide.clc
2003-Jul-05 18:05:16 4128 bytes prism/private/wslib/calc-lib/1.0.7/1.0.7.7/Fitting/StandardFitting.clc
2003-Jul-07 23:23:40 6102 bytes prism/private/wslib/calc-lib/1.0.7/1.0.7.7/GivenFlowLiquid.clc
2003-Jul-06 16:35:52 4964 bytes prism/private/wslib/calc-lib/1.0.7/1.0.7.7/GivenFlowSteam.clc
2003-Jul-07 23:25:38 6232 bytes prism/private/wslib/calc-lib/1.0.7/1.0.7.7/GivenFlowVapor.clc
2004-Dec-13 10:28:23 170 bytes prism/private/wslib/calc-lib/1.0.7/1.0.7.7/Liquid
2003-Feb-27 15:22:26 939 bytes prism/private/wslib/calc-lib/1.0.7/1.0.7.7/Liquid/ControlValveLiquidFlow.clc
2003-Mar-09 23:14:08 4894 bytes prism/private/wslib/calc-lib/1.0.7/1.0.7.7/Liquid/LiquidProps.clc
2003-Jul-07 23:57:52 4991 bytes prism/private/wslib/calc-lib/1.0.7/1.0.7.7/Liquid/LiquidVol.clc
2003-Jun-20 13:50:20 2880 bytes prism/private/wslib/calc-lib/1.0.7/1.0.7.7/NotImplemented.clc
2003-Oct-10 14:16:44 68537 bytes prism/private/wslib/calc-lib/1.0.7/1.0.7.7/PipingLoss.clc
2003-Aug-11 17:18:42 65350 bytes prism/private/wslib/calc-lib/1.0.7/1.0.7.7/PipingLoss.clc-01
2004-Dec-13 10:28:23 204 bytes prism/private/wslib/calc-lib/1.0.7/1.0.7.7/Post
2003-Oct-04 20:57:26 18681 bytes prism/private/wslib/calc-lib/1.0.7/1.0.7.7/Post/MaxRelCap.clc
2003-Jul-10 13:54:22 9558 bytes prism/private/wslib/calc-lib/1.0.7/1.0.7.7/Post/MaxRelCapIter.clc
2003-Jul-07 23:32:56 1800 bytes prism/private/wslib/calc-lib/1.0.7/1.0.7.7/Post/NoiseLevel.clc
2003-Jul-07 23:34:02 2041 bytes prism/private/wslib/calc-lib/1.0.7/1.0.7.7/Post/ReactionForce.clc
2004-Dec-13 10:28:23 306 bytes prism/private/wslib/calc-lib/1.0.7/1.0.7.7/Pressure
2003-Oct-03 10:47:56 1926 bytes prism/private/wslib/calc-lib/1.0.7/1.0.7.7/Pressure/BackPressure.clc
2003-May-31 22:13:28 1384 bytes prism/private/wslib/calc-lib/1.0.7/1.0.7.7/Pressure/ColdDiffTestPressure.clc
2003-Jul-10 13:18:24 4450 bytes prism/private/wslib/calc-lib/1.0.7/1.0.7.7/Pressure/MRCPOverPRelief.clc
2003-Mar-09 23:08:02 1126 bytes prism/private/wslib/calc-lib/1.0.7/1.0.7.7/Pressure/PAtm.clc
2003-Jul-08 00:36:32 523 bytes prism/private/wslib/calc-lib/1.0.7/1.0.7.7/Pressure/PDelta.clc
2003-Jul-09 14:45:06 10480 bytes prism/private/wslib/calc-lib/1.0.7/1.0.7.7/Pressure/POverPRelief.clc
2003-Oct-03 13:55:02 2784 bytes prism/private/wslib/calc-lib/1.0.7/1.0.7.7/Pressure/PressureChecks.clc
2004-Dec-13 10:28:23 102 bytes prism/private/wslib/calc-lib/1.0.7/1.0.7.7/Steam
2003-Mar-24 11:30:50 708 bytes prism/private/wslib/calc-lib/1.0.7/1.0.7.7/Steam/Steam.clc
2004-Dec-13 10:28:23 170 bytes prism/private/wslib/calc-lib/1.0.7/1.0.7.7/Tanks
2003-Aug-21 13:48:02 4785 bytes prism/private/wslib/calc-lib/1.0.7/1.0.7.7/Tanks/FireVaporGen.clc
2003-Aug-21 14:05:18 5871 bytes prism/private/wslib/calc-lib/1.0.7/1.0.7.7/Tanks/PumpInLiquidThermal.clc
2003-Aug-21 13:48:14 4789 bytes prism/private/wslib/calc-lib/1.0.7/1.0.7.7/Tanks/PumpOutLiquidThermal.clc
2003-Aug-10 22:46:50 5570 bytes prism/private/wslib/calc-lib/1.0.7/1.0.7.7/UserSpecifiedLiquid.clc 2003-Jul-06 16:36:06 4442 bytes prism/private/wslib/calc-lib/1.0.7/1.0.7.7/UserSpecifiedSteam.clc
2003-Jul-06 16:36:14 4798 bytes prism/private/wslib/calc-lib/1.0.7/1.0.7.7/UserSpecifiedVapor.clc
2004-Dec-13 10:28:23 612 bytes prism/private/wslib/calc-lib/1.0.7/1.0.7.7/Util
2003-Apr-25 09:56:36 601 bytes prism/private/wslib/calc-lib/1.0.7/1.0.7.7/Util/AreaAdequateChecks.clc
2003-Apr-25 15:30:22 782 bytes prism/private/wslib/calc-lib/1.0.7/1.0.7.7/Util/AreaChecks.clc
2003-Oct-03 10:47:04 2673 bytes prism/private/wslib/calc-lib/1.0.7/1.0.7.7/Util/CriticalFlow.clc
2003-Jul-07 23:37:10 3644 bytes prism/private/wslib/calc-lib/1.0.7/1.0.7.7/Util/Kb.clc
2003-Jul-10 15:42:22 1278 bytes prism/private/wslib/calc-lib/1.0.7/1.0.7.7/Util/KbpLiquid.clc
2003-Jul-07 23:39:24 1570 bytes prism/private/wslib/calc-lib/1.0.7/1.0.7.7/Util/KbpVapor.clc
2003-Jul-07 23:58:58 748 bytes prism/private/wslib/calc-lib/1.0.7/1.0.7.7/Util/Kn.clc
2003-Jul-07 23:43:32 1317 bytes prism/private/wslib/calc-lib/1.0.7/1.0.7.7/Util/Ksh.clc
2003-Oct-03 10:28:14 9924 bytes prism/private/wslib/calc-lib/1.0.7/1.0.7.7/Util/Kv.clc
2003-Jul-07 23:45:48 3429 bytes prism/private/wslib/calc-lib/1.0.7/1.0.7.7/Util/Kw.clc
2003-Jun-13 16:22:28 6275 bytes prism/private/wslib/calc-lib/1.0.7/1.0.7.7/Util/ProtectedData.clc
2003-Oct-03 10:47:08 13839 bytes prism/private/wslib/calc-lib/1.0.7/1.0.7.7/Util/ProtectedDataVessel.clc
2003-Sep-24 14:52:14 11069 bytes prism/private/wslib/calc-lib/1.0.7/1.0.7.7/Util/ProtectedDataVessel.clc-01
2003-Sep-29 11:38:12 16391 bytes prism/private/wslib/calc-lib/1.0.7/1.0.7.7/Util/ProtectingData.clc
2003-Aug-19 22:25:24 2976 bytes prism/private/wslib/calc-lib/1.0.7/1.0.7.7/Util/ReqSizingCode.clc
2003-Aug-10 21:14:08 1693 bytes prism/private/wslib/calc-lib/1.0.7/1.0.7.7/Util/ReqValveType.clc
2004-Dec-13 10:28:23 272 bytes prism/private/wslib/calc-lib/1.0.7/1.0.7.7/Vapor
2003-Sep-24 13:40:52 2567 bytes prism/private/wslib/calc-lib/1.0.7/1.0.7.7/Vapor/ControlValveVaporFlow.clc
2003-Jun-23 23:11:40 6906 bytes prism/private/wslib/calc-lib/1.0.7/1.0.7.7/Vapor/FireVaporCapacity.clc
2003-Jul-06 19:42:26 1548 bytes prism/private/wslib/calc-lib/1.0.7/1.0.7.7/Vapor/VaporMass.clc
2003-Jun-24 18:22:38 1409 bytes prism/private/wslib/calc-lib/1.0.7/1.0.7.7/Vapor/VaporProcessProps.clc
2003-Jul-07 23:47:14 6789 bytes prism/private/wslib/calc-lib/1.0.7/1.0.7.7/Vapor/VaporProps.clc
2003-Jul-06 19:41:40 1550 bytes prism/private/wslib/calc-lib/1.0.7/1.0.7.7/Vapor/VaporVol.clc
2004-Dec-13 10:28:23 782 bytes prism/private/wslib/calc-lib/1.0.7/1.0.7.8
2003-Oct-10 14:17:08 5165 bytes prism/private/wslib/calc-lib/1.0.7/1.0.7.8/ControlValveLiquid.clc
2003-Oct-10 14:17:08 4980 bytes prism/private/wslib/calc-lib/1.0.7/1.0.7.8/ControlValveVapor.clc
2004-Dec-13 10:28:23 306 bytes prism/private/wslib/calc-lib/1.0.7/1.0.7.8/Device
2003-Oct-10 14:17:08 4361 bytes prism/private/wslib/calc-lib/1.0.7/1.0.7.8/Device/PRVDeviceData.clc
2003-Oct-10 14:17:08 3251 bytes prism/private/wslib/calc-lib/1.0.7/1.0.7.8/Device/PipeDeviceData.clc
2003-Oct-10 14:17:08 7591 bytes prism/private/wslib/calc-lib/1.0.7/1.0.7.8/Device/RDDeviceData.clc
2003-Oct-10 14:17:08 7891 bytes prism/private/wslib/calc-lib/1.0.7/1.0.7.8/Device/TVDeviceData.clc
2003-Oct-10 14:17:08 4447 bytes prism/private/wslib/calc-lib/1.0.7/1.0.7.8/Device/TankDeviceData.clc
2003-Oct-10 14:17:08 2672 bytes prism/private/wslib/calc-lib/1.0.7/1.0.7.8/Device/TurbineStmDeviceData.clc
2003-Oct-10 14:17:08 2619 bytes prism/private/wslib/calc-lib/1.0.7/1.0.7.8/Device/Vessel.clc
2003-Oct-10 14:17:08 5354 bytes prism/private/wslib/calc-lib/1.0.7/1.0.7.8/FireVaporGeneration.clc
2004-Dec-13 10:28:23 272 bytes prism/private/wslib/calc-lib/1.0.7/1.0.7.8/Fitting
2003-Oct-10 14:17:08 5636 bytes prism/private/wslib/calc-lib/1.0.7/1.0.7.8/Fitting/ExpandingFitting.clc
2003-Oct-10 14:17:08 4149 bytes prism/private/wslib/calc-lib/1.0.7/1.0.7.8/Fitting/ExpandingTeeSide.clc
2003-Oct-10 14:17:08 4153 bytes prism/private/wslib/calc-lib/1.0.7/1.0.7.8/Fitting/Pipe.clc
2003-Oct-10 14:17:08 5741 bytes prism/private/wslib/calc-lib/1.0.7/1.0.7.8/Fitting/ReducingFitting.clc
2003-Oct-10 14:17:08 4176 bytes prism/private/wslib/calc-lib/1.0.7/1.0.7.8/Fitting/ReducingTeeSide.clc
2003-Oct-10 14:17:08 4128 bytes prism/private/wslib/calc-lib/1.0.7/1.0.7.8/Fitting/StandardFitting.clc
2003-Oct-10 14:17:08 6102 bytes prism/private/wslib/calc-lib/1.0.7/1.0.7.8/GivenFlowLiquid.clc
2003-Oct-10 14:17:08 4964 bytes prism/private/wslib/calc-lib/1.0.7/1.0.7.8/GivenFlowSteam.clc
2003-Oct-10 14:17:08 6232 bytes prism/private/wslib/calc-lib/1.0.7/1.0.7.8/GivenFlowVapor.clc
2004-Dec-13 10:28:23 170 bytes prism/private/wslib/calc-lib/1.0.7/1.0.7.8/Liquid
2003-Oct-10 14:17:08 939 bytes prism/private/wslib/calc-lib/1.0.7/1.0.7.8/Liquid/ControlValveLiquidFlow.clc
2003-Oct-12 14:58:14 4894 bytes prism/private/wslib/calc-lib/1.0.7/1.0.7.8/Liquid/LiquidProps.clc
2003-Oct-10 14:17:08 4991 bytes prism/private/wslib/calc-lib/1.0.7/1.0.7.8/Liquid/LiquidVol.clc
2003-Oct-10 14:17:08 2880 bytes prism/private/wslib/calc-lib/1.0.7/1.0.7.8/NotImplemented.clc
2003-Oct-12 11:44:10 69032 bytes prism/private/wslib/calc-lib/1.0.7/1.0.7.8/PipingLoss.clc
2003-Oct-10 14:17:08 65350 bytes prism/private/wslib/calc-lib/1.0.7/1.0.7.8/PipingLoss.clc-01
2004-Dec-13 10:28:23 204 bytes prism/private/wslib/calc-lib/1.0.7/1.0.7.8/Post
2003-Oct-10 14:17:08 18681 bytes prism/private/wslib/calc-lib/1.0.7/1.0.7.8/Post/MaxRelCap.clc
2003-Oct-10 14:17:08 9558 bytes prism/private/wslib/calc-lib/1.0.7/1.0.7.8/Post/MaxRelCapIter.clc
2003-Oct-10 14:17:08 1800 bytes prism/private/wslib/calc-lib/1.0.7/1.0.7.8/Post/NoiseLevel.clc
2003-Oct-10 14:17:08 2041 bytes prism/private/wslib/calc-lib/1.0.7/1.0.7.8/Post/ReactionForce.clc
2004-Dec-13 10:28:23 306 bytes prism/private/wslib/calc-lib/1.0.7/1.0.7.8/Pressure 2003-Oct-10 14:17:08 1926 bytes prism/private/wslib/calc-lib/1.0.7/1.0.7.8/Pressure/BackPressure.clc
2003-Oct-10 14:17:08 1384 bytes prism/private/wslib/calc-lib/1.0.7/1.0.7.8/Pressure/ColdDiffTestPressure.clc
2003-Oct-10 14:17:08 4450 bytes prism/private/wslib/calc-lib/1.0.7/1.0.7.8/Pressure/MRCPOverPRelief.clc
2003-Oct-10 14:17:08 1126 bytes prism/private/wslib/calc-lib/1.0.7/1.0.7.8/Pressure/PAtm.clc
2003-Oct-10 14:17:08 523 bytes prism/private/wslib/calc-lib/1.0.7/1.0.7.8/Pressure/PDelta.clc
2003-Oct-10 14:17:08 10480 bytes prism/private/wslib/calc-lib/1.0.7/1.0.7.8/Pressure/POverPRelief.clc
2003-Oct-10 14:17:08 2784 bytes prism/private/wslib/calc-lib/1.0.7/1.0.7.8/Pressure/PressureChecks.clc
2004-Dec-13 10:28:23 102 bytes prism/private/wslib/calc-lib/1.0.7/1.0.7.8/Steam
2003-Oct-10 14:17:08 708 bytes prism/private/wslib/calc-lib/1.0.7/1.0.7.8/Steam/Steam.clc
2004-Dec-13 10:28:23 170 bytes prism/private/wslib/calc-lib/1.0.7/1.0.7.8/Tanks
2003-Oct-10 14:17:08 4785 bytes prism/private/wslib/calc-lib/1.0.7/1.0.7.8/Tanks/FireVaporGen.clc
2003-Oct-10 14:17:08 5871 bytes prism/private/wslib/calc-lib/1.0.7/1.0.7.8/Tanks/PumpInLiquidThermal.clc
2003-Oct-10 14:17:08 4789 bytes prism/private/wslib/calc-lib/1.0.7/1.0.7.8/Tanks/PumpOutLiquidThermal.clc
2003-Oct-10 14:17:08 5570 bytes prism/private/wslib/calc-lib/1.0.7/1.0.7.8/UserSpecifiedLiquid.clc
2003-Oct-10 14:17:08 4442 bytes prism/private/wslib/calc-lib/1.0.7/1.0.7.8/UserSpecifiedSteam.clc
2003-Oct-10 14:17:08 4798 bytes prism/private/wslib/calc-lib/1.0.7/1.0.7.8/UserSpecifiedVapor.clc
2004-Dec-13 10:28:23 612 bytes prism/private/wslib/calc-lib/1.0.7/1.0.7.8/Util
2003-Oct-10 14:17:08 601 bytes prism/private/wslib/calc-lib/1.0.7/1.0.7.8/Util/AreaAdequateChecks.clc
2003-Oct-10 14:17:08 782 bytes prism/private/wslib/calc-lib/1.0.7/1.0.7.8/Util/AreaChecks.clc
2003-Oct-10 14:17:08 2673 bytes prism/private/wslib/calc-lib/1.0.7/1.0.7.8/Util/CriticalFlow.clc
2003-Oct-10 14:17:08 3644 bytes prism/private/wslib/calc-lib/1.0.7/1.0.7.8/Util/Kb.clc
2003-Oct-10 14:17:08 1278 bytes prism/private/wslib/calc-lib/1.0.7/1.0.7.8/Util/KbpLiquid.clc
2003-Oct-10 14:17:08 1570 bytes prism/private/wslib/calc-lib/1.0.7/1.0.7.8/Util/KbpVapor.clc
2003-Oct-10 14:17:08 748 bytes prism/private/wslib/calc-lib/1.0.7/1.0.7.8/Util/Kn.clc
2003-Oct-10 14:17:08 1317 bytes prism/private/wslib/calc-lib/1.0.7/1.0.7.8/Util/Ksh.clc
2003-Oct-10 14:17:08 9924 bytes prism/private/wslib/calc-lib/1.0.7/1.0.7.8/Util/Kv.clc
2003-Oct-10 14:17:08 3429 bytes prism/private/wslib/calc-lib/1.0.7/1.0.7.8/Util/Kw.clc
2003-Oct-10 14:17:08 6275 bytes prism/private/wslib/calc-lib/1.0.7/1.0.7.8/Util/ProtectedData.clc
2003-Oct-10 14:17:08 13839 bytes prism/private/wslib/calc-lib/1.0.7/1.0.7.8/Util/ProtectedDataVessel.clc
2003-Oct-10 14:17:08 11069 bytes prism/private/wslib/calc-lib/1.0.7/1.0.7.8/Util/ProtectedDataVessel.clc-01
2003-Oct-10 14:17:08 16391 bytes prism/private/wslib/calc-lib/1.0.7/1.0.7.8/Util/ProtectingData.clc
2003-Oct-10 14:17:08 2976 bytes prism/private/wslib/calc-lib/1.0.7/1.0.7.8/Util/ReqSizingCode.clc
2003-Oct-10 14:17:08 1693 bytes prism/private/wslib/calc-lib/1.0.7/1.0.7.8/Util/ReqValveType.clc
2004-Dec-13 10:28:23 272 bytes prism/private/wslib/calc-lib/1.0.7/1.0.7.8/Vapor
2003-Oct-10 14:17:08 2567 bytes prism/private/wslib/calc-lib/1.0.7/1.0.7.8/Vapor/ControlValveVaporFlow.clc
2003-Oct-10 14:17:08 6906 bytes prism/private/wslib/calc-lib/1.0.7/1.0.7.8/Vapor/FireVaporCapacity.clc
2003-Oct-10 14:17:08 1548 bytes prism/private/wslib/calc-lib/1.0.7/1.0.7.8/Vapor/VaporMass.clc
2003-Oct-10 14:17:08 1409 bytes prism/private/wslib/calc-lib/1.0.7/1.0.7.8/Vapor/VaporProcessProps.clc
2003-Oct-10 14:17:08 6789 bytes prism/private/wslib/calc-lib/1.0.7/1.0.7.8/Vapor/VaporProps.clc
2003-Oct-10 14:17:08 1550 bytes prism/private/wslib/calc-lib/1.0.7/1.0.7.8/Vapor/VaporVol.clc
2004-Dec-13 10:28:23 748 bytes prism/private/wslib/calc-lib/1.0.7/1.0.7.9
2003-Oct-10 14:17:08 5165 bytes prism/private/wslib/calc-lib/1.0.7/1.0.7.9/ControlValveLiquid.clc
2003-Oct-10 14:17:08 4980 bytes prism/private/wslib/calc-lib/1.0.7/1.0.7.9/ControlValveVapor.clc
2004-Dec-13 10:28:23 306 bytes prism/private/wslib/calc-lib/1.0.7/1.0.7.9/Device
2003-Oct-10 14:17:08 4361 bytes prism/private/wslib/calc-lib/1.0.7/1.0.7.9/Device/PRVDeviceData.clc
2003-Oct-10 14:17:08 3251 bytes prism/private/wslib/calc-lib/1.0.7/1.0.7.9/Device/PipeDeviceData.clc
2003-Oct-10 14:17:08 7591 bytes prism/private/wslib/calc-lib/1.0.7/1.0.7.9/Device/RDDeviceData.clc
2003-Oct-10 14:17:08 7891 bytes prism/private/wslib/calc-lib/1.0.7/1.0.7.9/Device/TVDeviceData.clc
2003-Oct-10 14:17:08 4447 bytes prism/private/wslib/calc-lib/1.0.7/1.0.7.9/Device/TankDeviceData.clc
2003-Oct-10 14:17:08 2672 bytes prism/private/wslib/calc-lib/1.0.7/1.0.7.9/Device/TurbineStmDeviceData.clc
2003-Oct-10 14:17:08 2619 bytes prism/private/wslib/calc-lib/1.0.7/1.0.7.9/Device/Vessel.clc
2003-Oct-10 14:17:08 5354 bytes prism/private/wslib/calc-lib/1.0.7/1.0.7.9/FireVaporGeneration.clc
2004-Dec-13 10:28:23 272 bytes prism/private/wslib/calc-lib/1.0.7/1.0.7.9/Fitting
2003-Oct-10 14:17:08 5636 bytes prism/private/wslib/calc-lib/1.0.7/1.0.7.9/Fitting/ExpandingFitting.clc
2003-Oct-10 14:17:08 4149 bytes prism/private/wslib/calc-lib/1.0.7/1.0.7.9/Fitting/ExpandingTeeSide.clc
2003-Oct-10 14:17:08 4153 bytes prism/private/wslib/calc-lib/1.0.7/1.0.7.9/Fitting/Pipe.clc
2003-Oct-10 14:17:08 5741 bytes prism/private/wslib/calc-lib/1.0.7/1.0.7.9/Fitting/ReducingFitting.clc
2003-Oct-10 14:17:08 4176 bytes prism/private/wslib/calc-lib/1.0.7/1.0.7.9/Fitting/ReducingTeeSide.clc
2003-Oct-10 14:17:08 4128 bytes prism/private/wslib/calc-lib/1.0.7/1.0.7.9/Fitting/StandardFitting.clc
2003-Oct-10 14:17:08 6102 bytes prism/private/wslib/calc-lib/1.0.7/1.0.7.9/GivenFlowLiquid.clc
2003-Oct-10 14:17:08 4964 bytes prism/private/wslib/calc-lib/1.0.7/1.0.7.9/GivenFlowSteam.clc

| | | |
|---|---|---|
| 2003-Oct-10 14:17:08 | 6232 bytes | prism/private/wslib/calc-lib/1.0.7/1.0.7.9/GivenFlowVapor.clc |
| 2004-Dec-13 10:28:23 | 170 bytes | prism/private/wslib/calc-lib/1.0.7/1.0.7.9/Liquid |
| 2003-Oct-10 14:17:08 | 939 bytes | prism/private/wslib/calc-lib/1.0.7/1.0.7.9/Liquid/ControlValveLiquidFlow.clc |
| 2003-Oct-12 14:58:14 | 4894 bytes | prism/private/wslib/calc-lib/1.0.7/1.0.7.9/Liquid/LiquidProps.clc |
| 2003-Oct-10 14:17:08 | 4991 bytes | prism/private/wslib/calc-lib/1.0.7/1.0.7.9/Liquid/LiquidVol.clc |
| 2003-Oct-10 14:17:08 | 2880 bytes | prism/private/wslib/calc-lib/1.0.7/1.0.7.9/NotImplemented.clc |
| 2003-Oct-12 11:44:10 | 69032 bytes | prism/private/wslib/calc-lib/1.0.7/1.0.7.9/PipingLoss.clc |
| 2004-Dec-13 10:28:23 | 204 bytes | prism/private/wslib/calc-lib/1.0.7/1.0.7.9/Post |
| 2003-Oct-10 14:17:08 | 18681 bytes | prism/private/wslib/calc-lib/1.0.7/1.0.7.9/Post/MaxRelCap.clc |
| 2003-Oct-10 14:17:08 | 9558 bytes | prism/private/wslib/calc-lib/1.0.7/1.0.7.9/Post/MaxRelCapIter.clc |
| 2003-Oct-10 14:17:08 | 1800 bytes | prism/private/wslib/calc-lib/1.0.7/1.0.7.9/Post/NoiseLevel.clc |
| 2003-Oct-10 14:17:08 | 2041 bytes | prism/private/wslib/calc-lib/1.0.7/1.0.7.9/Post/ReactionForce.clc |
| 2004-Dec-13 10:28:23 | 306 bytes | prism/private/wslib/calc-lib/1.0.7/1.0.7.9/Pressure |
| 2003-Oct-15 16:58:34 | 1941 bytes | prism/private/wslib/calc-lib/1.0.7/1.0.7.9/Pressure/BackPressure.clc |
| 2003-Oct-10 14:17:08 | 1384 bytes | prism/private/wslib/calc-lib/1.0.7/1.0.7.9/Pressure/ColdDiffTestPressure.clc |
| 2003-Oct-10 14:17:08 | 4450 bytes | prism/private/wslib/calc-lib/1.0.7/1.0.7.9/Pressure/MRCPOverPRelief.clc |
| 2003-Oct-10 14:17:08 | 1126 bytes | prism/private/wslib/calc-lib/1.0.7/1.0.7.9/Pressure/PAtm.clc |
| 2003-Oct-10 14:17:08 | 523 bytes | prism/private/wslib/calc-lib/1.0.7/1.0.7.9/Pressure/PDelta.clc |
| 2003-Oct-15 17:16:02 | 10514 bytes | prism/private/wslib/calc-lib/1.0.7/1.0.7.9/Pressure/POverPRelief.clc |
| 2003-Oct-10 14:17:08 | 2784 bytes | prism/private/wslib/calc-lib/1.0.7/1.0.7.9/Pressure/PressureChecks.clc |
| 2004-Dec-13 10:28:23 | 102 bytes | prism/private/wslib/calc-lib/1.0.7/1.0.7.9/Steam |
| 2003-Oct-10 14:17:08 | 708 bytes | prism/private/wslib/calc-lib/1.0.7/1.0.7.9/Steam/Steam.clc |
| 2004-Dec-13 10:28:23 | 170 bytes | prism/private/wslib/calc-lib/1.0.7/1.0.7.9/Tanks |
| 2003-Oct-10 14:17:08 | 4785 bytes | prism/private/wslib/calc-lib/1.0.7/1.0.7.9/Tanks/FireVaporGen.clc |
| 2003-Oct-10 14:17:08 | 5871 bytes | prism/private/wslib/calc-lib/1.0.7/1.0.7.9/Tanks/PumpInLiquidThermal.clc |
| 2003-Oct-10 14:17:08 | 4789 bytes | prism/private/wslib/calc-lib/1.0.7/1.0.7.9/Tanks/PumpOutLiquidThermal.clc |
| 2003-Oct-10 14:17:08 | 5570 bytes | prism/private/wslib/calc-lib/1.0.7/1.0.7.9/UserSpecifiedLiquid.clc |
| 2003-Oct-10 14:17:08 | 4442 bytes | prism/private/wslib/calc-lib/1.0.7/1.0.7.9/UserSpecifiedSteam.clc |
| 2003-Oct-10 14:17:08 | 4798 bytes | prism/private/wslib/calc-lib/1.0.7/1.0.7.9/UserSpecifiedVapor.clc |
| 2004-Dec-13 10:28:23 | 612 bytes | prism/private/wslib/calc-lib/1.0.7/1.0.7.9/Util |
| 2003-Oct-10 14:17:08 | 601 bytes | prism/private/wslib/calc-lib/1.0.7/1.0.7.9/Util/AreaAdequateChecks.clc |
| 2003-Oct-10 14:17:08 | 782 bytes | prism/private/wslib/calc-lib/1.0.7/1.0.7.9/Util/AreaChecks.clc |
| 2003-Oct-10 14:17:08 | 2673 bytes | prism/private/wslib/calc-lib/1.0.7/1.0.7.9/Util/CriticalFlow.clc |
| 2003-Oct-15 08:57:18 | 4248 bytes | prism/private/wslib/calc-lib/1.0.7/1.0.7.9/Util/Kb.clc |
| 2003-Oct-10 14:17:08 | 1278 bytes | prism/private/wslib/calc-lib/1.0.7/1.0.7.9/Util/KbpLiquid.clc |
| 2003-Oct-10 14:17:08 | 1570 bytes | prism/private/wslib/calc-lib/1.0.7/1.0.7.9/Util/KbpVapor.clc |
| 2003-Oct-10 14:17:08 | 748 bytes | prism/private/wslib/calc-lib/1.0.7/1.0.7.9/Util/Kn.clc |
| 2003-Oct-10 14:17:08 | 1317 bytes | prism/private/wslib/calc-lib/1.0.7/1.0.7.9/Util/Ksh.clc |
| 2003-Oct-15 08:57:30 | 10559 bytes | prism/private/wslib/calc-lib/1.0.7/1.0.7.9/Util/Kv.clc |
| 2003-Oct-15 08:57:48 | 4018 bytes | prism/private/wslib/calc-lib/1.0.7/1.0.7.9/Util/Kw.clc |
| 2003-Oct-10 14:17:08 | 6275 bytes | prism/private/wslib/calc-lib/1.0.7/1.0.7.9/Util/ProtectedData.clc |
| 2003-Oct-10 14:17:08 | 13839 bytes | prism/private/wslib/calc-lib/1.0.7/1.0.7.9/Util/ProtectedDataVessel.clc |
| 2003-Oct-10 14:17:08 | 11069 bytes | prism/private/wslib/calc-lib/1.0.7/1.0.7.9/Util/ProtectedDataVessel.clc-01 |
| 2003-Oct-10 14:17:08 | 16391 bytes | prism/private/wslib/calc-lib/1.0.7/1.0.7.9/Util/ProtectingData.clc |
| 2003-Oct-10 14:17:08 | 2976 bytes | prism/private/wslib/calc-lib/1.0.7/1.0.7.9/Util/ReqSizingCode.clc |
| 2003-Oct-10 14:17:08 | 1693 bytes | prism/private/wslib/calc-lib/1.0.7/1.0.7.9/Util/ReqValveType.clc |
| 2004-Dec-13 10:28:23 | 272 bytes | prism/private/wslib/calc-lib/1.0.7/1.0.7.9/Vapor |
| 2003-Oct-10 14:17:08 | 2567 bytes | prism/private/wslib/calc-lib/1.0.7/1.0.7.9/Vapor/ControlValveVaporFlow.clc |
| 2003-Oct-10 14:17:08 | 6906 bytes | prism/private/wslib/calc-lib/1.0.7/1.0.7.9/Vapor/FireVaporCapacity.clc |
| 2003-Oct-10 14:17:08 | 1548 bytes | prism/private/wslib/calc-lib/1.0.7/1.0.7.9/Vapor/VaporMass.clc |
| 2003-Oct-10 14:17:08 | 1409 bytes | prism/private/wslib/calc-lib/1.0.7/1.0.7.9/Vapor/VaporProcessProps.clc |
| 2003-Oct-15 18:01:48 | 6898 bytes | prism/private/wslib/calc-lib/1.0.7/1.0.7.9/Vapor/VaporProps.clc |
| 2003-Oct-10 14:17:08 | 1550 bytes | prism/private/wslib/calc-lib/1.0.7/1.0.7.9/Vapor/VaporVol.clc |
| 2004-Dec-13 10:28:27 | 272 bytes | prism/private/wslib/calc-lib/1.0.7/lib |
| 2004-Dec-13 10:28:24 | 612 bytes | prism/private/wslib/calc-lib/1.0.7/lib/device |
| 2004-Dec-13 10:28:23 | 748 bytes | prism/private/wslib/calc-lib/1.0.7/lib/device/BV |
| 2003-May-02 10:59:26 | 3623 bytes | prism/private/wslib/calc-lib/1.0.7/lib/device/BV/1-0-6-15.spec |
| 2003-May-09 16:08:18 | 3622 bytes | prism/private/wslib/calc-lib/1.0.7/lib/device/BV/1-0-7-0.spec |
| 2003-May-28 22:58:56 | 3622 bytes | prism/private/wslib/calc-lib/1.0.7/lib/device/BV/1-0-7-1.spec |
| 2003-Oct-22 12:20:36 | 3623 bytes | prism/private/wslib/calc-lib/1.0.7/lib/device/BV/1-0-7-10.spec |
| 2003-Nov-11 18:29:52 | 3623 bytes | prism/private/wslib/calc-lib/1.0.7/lib/device/BV/1-0-7-11.spec |

2003-Dec-18 14:01:22 3623 bytes prism/private/wslib/calc-lib/1.0.7/lib/device/BV/1-0-7-12.spec
2003-Dec-30 13:42:48 3623 bytes prism/private/wslib/calc-lib/1.0.7/lib/device/BV/1-0-7-13.spec
2004-Feb-10 16:23:22 3623 bytes prism/private/wslib/calc-lib/1.0.7/lib/device/BV/1-0-7-14.spec
2004-Mar-10 19:09:40 3623 bytes prism/private/wslib/calc-lib/1.0.7/lib/device/BV/1-0-7-15.spec
2004-May-19 16:55:40 3623 bytes prism/private/wslib/calc-lib/1.0.7/lib/device/BV/1-0-7-16.spec
2004-May-20 20:35:40 3623 bytes prism/private/wslib/calc-lib/1.0.7/lib/device/BV/1-0-7-17.spec
2004-Jun-22 22:24:10 3623 bytes prism/private/wslib/calc-lib/1.0.7/lib/device/BV/1-0-7-18.spec
2003-Jun-11 13:14:38 3622 bytes prism/private/wslib/calc-lib/1.0.7/lib/device/BV/1-0-7-2.spec
2003-Jun-29 05:49:54 3622 bytes prism/private/wslib/calc-lib/1.0.7/lib/device/BV/1-0-7-3.spec
2003-Jul-09 16:05:22 3622 bytes prism/private/wslib/calc-lib/1.0.7/lib/device/BV/1-0-7-4.spec
2003-Jul-18 10:25:40 3622 bytes prism/private/wslib/calc-lib/1.0.7/lib/device/BV/1-0-7-5.spec
2003-Aug-07 15:44:02 3622 bytes prism/private/wslib/calc-lib/1.0.7/lib/device/BV/1-0-7-6.spec
2003-Aug-13 11:23:36 3622 bytes prism/private/wslib/calc-lib/1.0.7/lib/device/BV/1-0-7-7.spec
2003-Oct-12 11:01:04 3622 bytes prism/private/wslib/calc-lib/1.0.7/lib/device/BV/1-0-7-8.spec
2003-Oct-15 08:27:18 3622 bytes prism/private/wslib/calc-lib/1.0.7/lib/device/BV/1-0-7-9.spec
2004-Dec-13 10:28:24 748 bytes prism/private/wslib/calc-lib/1.0.7/lib/device/CV
2003-Apr-27 14:15:54 3450 bytes prism/private/wslib/calc-lib/1.0.7/lib/device/CV/1-0-6-15.spec
2003-May-09 16:08:18 3449 bytes prism/private/wslib/calc-lib/1.0.7/lib/device/CV/1-0-7-0.spec
2003-May-28 22:58:56 3449 bytes prism/private/wslib/calc-lib/1.0.7/lib/device/CV/1-0-7-1.spec
2003-Oct-22 12:20:36 3450 bytes prism/private/wslib/calc-lib/1.0.7/lib/device/CV/1-0-7-10.spec
2003-Nov-11 18:29:52 3450 bytes prism/private/wslib/calc-lib/1.0.7/lib/device/CV/1-0-7-11.spec
2003-Dec-18 14:01:22 3450 bytes prism/private/wslib/calc-lib/1.0.7/lib/device/CV/1-0-7-12.spec
2003-Dec-30 13:42:48 3450 bytes prism/private/wslib/calc-lib/1.0.7/lib/device/CV/1-0-7-13.spec
2004-Feb-10 16:23:22 3450 bytes prism/private/wslib/calc-lib/1.0.7/lib/device/CV/1-0-7-14.spec
2004-Mar-10 19:09:42 3450 bytes prism/private/wslib/calc-lib/1.0.7/lib/device/CV/1-0-7-15.spec
2004-May-19 16:55:40 3450 bytes prism/private/wslib/calc-lib/1.0.7/lib/device/CV/1-0-7-16.spec
2004-May-20 20:35:40 3450 bytes prism/private/wslib/calc-lib/1.0.7/lib/device/CV/1-0-7-17.spec
2004-Jun-22 22:24:10 3450 bytes prism/private/wslib/calc-lib/1.0.7/lib/device/CV/1-0-7-18.spec
2003-Jun-11 13:14:38 3449 bytes prism/private/wslib/calc-lib/1.0.7/lib/device/CV/1-0-7-2.spec
2003-Jun-29 05:49:54 3449 bytes prism/private/wslib/calc-lib/1.0.7/lib/device/CV/1-0-7-3.spec
2003-Jul-09 16:05:22 3449 bytes prism/private/wslib/calc-lib/1.0.7/lib/device/CV/1-0-7-4.spec
2003-Jul-18 10:25:40 3449 bytes prism/private/wslib/calc-lib/1.0.7/lib/device/CV/1-0-7-5.spec
2003-Aug-07 15:44:02 3449 bytes prism/private/wslib/calc-lib/1.0.7/lib/device/CV/1-0-7-6.spec
2003-Aug-13 11:23:36 3449 bytes prism/private/wslib/calc-lib/1.0.7/lib/device/CV/1-0-7-7.spec
2003-Oct-12 11:01:04 3449 bytes prism/private/wslib/calc-lib/1.0.7/lib/device/CV/1-0-7-8.spec
2003-Oct-15 08:27:18 3449 bytes prism/private/wslib/calc-lib/1.0.7/lib/device/CV/1-0-7-9.spec
2004-Dec-13 10:28:23 748 bytes prism/private/wslib/calc-lib/1.0.7/lib/device/Compr
2004-Dec-13 10:28:23 408 bytes prism/private/wslib/calc-lib/1.0.7/lib/device/Compr-P
2003-Nov-05 13:05:10 2816 bytes prism/private/wslib/calc-lib/1.0.7/lib/device/Compr-P/1-0-7-10.spec
2003-Nov-11 18:29:52 2816 bytes prism/private/wslib/calc-lib/1.0.7/lib/device/Compr-P/1-0-7-11.spec
2003-Dec-18 14:01:22 2816 bytes prism/private/wslib/calc-lib/1.0.7/lib/device/Compr-P/1-0-7-12.spec
2003-Dec-30 13:42:48 2816 bytes prism/private/wslib/calc-lib/1.0.7/lib/device/Compr-P/1-0-7-13.spec
2004-Feb-10 16:23:22 2816 bytes prism/private/wslib/calc-lib/1.0.7/lib/device/Compr-P/1-0-7-14.spec
2004-Mar-10 19:09:42 2816 bytes prism/private/wslib/calc-lib/1.0.7/lib/device/Compr-P/1-0-7-15.spec
2004-May-19 16:55:40 2816 bytes prism/private/wslib/calc-lib/1.0.7/lib/device/Compr-P/1-0-7-16.spec
2004-May-20 20:35:40 2816 bytes prism/private/wslib/calc-lib/1.0.7/lib/device/Compr-P/1-0-7-17.spec
2004-Jun-22 22:24:10 2816 bytes prism/private/wslib/calc-lib/1.0.7/lib/device/Compr-P/1-0-7-18.spec
2003-Nov-04 17:51:20 2815 bytes prism/private/wslib/calc-lib/1.0.7/lib/device/Compr-P/1-0-7-9.spec
2003-May-02 10:57:44 2814 bytes prism/private/wslib/calc-lib/1.0.7/lib/device/Compr/1-0-6-15.spec
2003-May-09 16:08:18 2813 bytes prism/private/wslib/calc-lib/1.0.7/lib/device/Compr/1-0-7-0.spec
2003-May-28 22:58:56 2813 bytes prism/private/wslib/calc-lib/1.0.7/lib/device/Compr/1-0-7-1.spec
2003-Oct-22 12:20:36 2814 bytes prism/private/wslib/calc-lib/1.0.7/lib/device/Compr/1-0-7-10.spec
2003-Nov-11 18:29:52 2814 bytes prism/private/wslib/calc-lib/1.0.7/lib/device/Compr/1-0-7-11.spec
2003-Dec-18 14:01:22 2814 bytes prism/private/wslib/calc-lib/1.0.7/lib/device/Compr/1-0-7-12.spec
2003-Dec-30 13:42:48 2814 bytes prism/private/wslib/calc-lib/1.0.7/lib/device/Compr/1-0-7-13.spec
2004-Feb-10 16:23:22 2814 bytes prism/private/wslib/calc-lib/1.0.7/lib/device/Compr/1-0-7-14.spec
2004-Mar-10 19:09:42 2814 bytes prism/private/wslib/calc-lib/1.0.7/lib/device/Compr/1-0-7-15.spec
2004-May-19 16:55:40 2814 bytes prism/private/wslib/calc-lib/1.0.7/lib/device/Compr/1-0-7-16.spec
2004-May-20 20:35:40 2814 bytes prism/private/wslib/calc-lib/1.0.7/lib/device/Compr/1-0-7-17.spec
2004-Jun-22 22:24:10 2814 bytes prism/private/wslib/calc-lib/1.0.7/lib/device/Compr/1-0-7-18.spec
2003-Jun-11 13:14:38 2813 bytes prism/private/wslib/calc-lib/1.0.7/lib/device/Compr/1-0-7-2.spec 2003-Jun-29 05:49:54 2813 bytes prism/private/wslib/calc-lib/1.0.7/lib/device/Compr/1-0-7-3.spec
2003-Jul-09 16:05:22 2813 bytes prism/private/wslib/calc-lib/1.0.7/lib/device/Compr/1-0-7-4.spec
2003-Jul-18 10:25:40 2813 bytes prism/private/wslib/calc-lib/1.0.7/lib/device/Compr/1-0-7-5.spec
2003-Aug-07 15:44:02 2813 bytes prism/private/wslib/calc-lib/1.0.7/lib/device/Compr/1-0-7-6.spec
2003-Aug-13 11:23:36 2813 bytes prism/private/wslib/calc-lib/1.0.7/lib/device/Compr/1-0-7-7.spec
2003-Oct-12 11:01:04 2813 bytes prism/private/wslib/calc-lib/1.0.7/lib/device/Compr/1-0-7-8.spec
2003-Oct-15 08:27:18 2813 bytes prism/private/wslib/calc-lib/1.0.7/lib/device/Compr/1-0-7-9.spec
2004-Dec-13 10:28:24 748 bytes prism/private/wslib/calc-lib/1.0.7/lib/device/HE-SS
2003-Apr-27 14:15:54 3725 bytes prism/private/wslib/calc-lib/1.0.7/lib/device/HE-SS/1-0-6-15.spec
2003-May-09 16:08:18 3724 bytes prism/private/wslib/calc-lib/1.0.7/lib/device/HE-SS/1-0-7-0.spec
2003-May-28 22:58:56 3724 bytes prism/private/wslib/calc-lib/1.0.7/lib/device/HE-SS/1-0-7-1.spec
2003-Oct-22 12:20:36 3725 bytes prism/private/wslib/calc-lib/1.0.7/lib/device/HE-SS/1-0-7-10.spec
2003-Nov-11 18:29:52 3725 bytes prism/private/wslib/calc-lib/1.0.7/lib/device/HE-SS/1-0-7-11.spec
2003-Dec-18 14:01:22 3725 bytes prism/private/wslib/calc-lib/1.0.7/lib/device/HE-SS/1-0-7-12.spec
2003-Dec-30 13:42:48 3725 bytes prism/private/wslib/calc-lib/1.0.7/lib/device/HE-SS/1-0-7-13.spec
2004-Feb-10 16:23:22 3725 bytes prism/private/wslib/calc-lib/1.0.7/lib/device/HE-SS/1-0-7-14.spec
2004-Mar-10 19:09:42 3725 bytes prism/private/wslib/calc-lib/1.0.7/lib/device/HE-SS/1-0-7-15.spec
2004-May-19 16:55:40 3725 bytes prism/private/wslib/calc-lib/1.0.7/lib/device/HE-SS/1-0-7-16.spec
2004-May-20 20:35:40 3725 bytes prism/private/wslib/calc-lib/1.0.7/lib/device/HE-SS/1-0-7-17.spec
2004-Jun-22 22:24:10 3725 bytes prism/private/wslib/calc-lib/1.0.7/lib/device/HE-SS/1-0-7-18.spec
2003-Jun-11 13:14:38 3724 bytes prism/private/wslib/calc-lib/1.0.7/lib/device/HE-SS/1-0-7-2.spec
2003-Jun-29 05:49:54 3724 bytes prism/private/wslib/calc-lib/1.0.7/lib/device/HE-SS/1-0-7-3.spec
2003-Jul-09 16:05:22 3724 bytes prism/private/wslib/calc-lib/1.0.7/lib/device/HE-SS/1-0-7-4.spec
2003-Jul-18 10:25:40 3724 bytes prism/private/wslib/calc-lib/1.0.7/lib/device/HE-SS/1-0-7-5.spec
2003-Aug-07 15:44:02 3724 bytes prism/private/wslib/calc-lib/1.0.7/lib/device/HE-SS/1-0-7-6.spec
2003-Aug-13 11:23:36 3724 bytes prism/private/wslib/calc-lib/1.0.7/lib/device/HE-SS/1-0-7-7.spec
2003-Oct-12 11:01:04 3724 bytes prism/private/wslib/calc-lib/1.0.7/lib/device/HE-SS/1-0-7-8.spec
2003-Oct-15 08:27:18 3724 bytes prism/private/wslib/calc-lib/1.0.7/lib/device/HE-SS/1-0-7-9.spec
2004-Dec-13 10:28:24 748 bytes prism/private/wslib/calc-lib/1.0.7/lib/device/HE-TS
2003-Apr-27 14:15:54 2423 bytes prism/private/wslib/calc-lib/1.0.7/lib/device/HE-TS/1-0-6-15.spec
2003-May-09 16:08:18 2422 bytes prism/private/wslib/calc-lib/1.0.7/lib/device/HE-TS/1-0-7-0.spec
2003-May-28 22:58:56 2422 bytes prism/private/wslib/calc-lib/1.0.7/lib/device/HE-TS/1-0-7-1.spec
2003-Oct-22 12:20:36 2423 bytes prism/private/wslib/calc-lib/1.0.7/lib/device/HE-TS/1-0-7-10.spec
2003-Nov-11 18:29:52 2423 bytes prism/private/wslib/calc-lib/1.0.7/lib/device/HE-TS/1-0-7-11.spec
2003-Dec-18 14:01:22 2423 bytes prism/private/wslib/calc-lib/1.0.7/lib/device/HE-TS/1-0-7-12.spec
2003-Dec-30 13:42:48 2423 bytes prism/private/wslib/calc-lib/1.0.7/lib/device/HE-TS/1-0-7-13.spec
2004-Feb-10 16:23:22 2423 bytes prism/private/wslib/calc-lib/1.0.7/lib/device/HE-TS/1-0-7-14.spec
2004-Mar-10 19:09:42 2423 bytes prism/private/wslib/calc-lib/1.0.7/lib/device/HE-TS/1-0-7-15.spec
2004-May-19 16:55:40 2423 bytes prism/private/wslib/calc-lib/1.0.7/lib/device/HE-TS/1-0-7-16.spec
2004-May-20 20:35:40 2423 bytes prism/private/wslib/calc-lib/1.0.7/lib/device/HE-TS/1-0-7-17.spec
2004-Jun-22 22:24:10 2423 bytes prism/private/wslib/calc-lib/1.0.7/lib/device/HE-TS/1-0-7-18.spec
2003-Jun-11 13:14:38 2422 bytes prism/private/wslib/calc-lib/1.0.7/lib/device/HE-TS/1-0-7-2.spec
2003-Jun-29 05:49:54 2422 bytes prism/private/wslib/calc-lib/1.0.7/lib/device/HE-TS/1-0-7-3.spec
2003-Jul-09 16:05:22 2422 bytes prism/private/wslib/calc-lib/1.0.7/lib/device/HE-TS/1-0-7-4.spec
2003-Jul-18 10:25:40 2422 bytes prism/private/wslib/calc-lib/1.0.7/lib/device/HE-TS/1-0-7-5.spec
2003-Aug-07 15:44:02 2422 bytes prism/private/wslib/calc-lib/1.0.7/lib/device/HE-TS/1-0-7-6.spec
2003-Aug-13 11:23:36 2422 bytes prism/private/wslib/calc-lib/1.0.7/lib/device/HE-TS/1-0-7-7.spec
2003-Oct-12 11:01:04 2422 bytes prism/private/wslib/calc-lib/1.0.7/lib/device/HE-TS/1-0-7-8.spec
2003-Oct-15 08:27:18 2422 bytes prism/private/wslib/calc-lib/1.0.7/lib/device/HE-TS/1-0-7-9.spec
2004-Dec-13 10:28:24 748 bytes prism/private/wslib/calc-lib/1.0.7/lib/device/Header
2003-Apr-27 14:15:54 694 bytes prism/private/wslib/calc-lib/1.0.7/lib/device/Header/1-0-6-15.spec
2003-May-09 16:08:18 693 bytes prism/private/wslib/calc-lib/1.0.7/lib/device/Header/1-0-7-0.spec
2003-May-28 22:58:56 693 bytes prism/private/wslib/calc-lib/1.0.7/lib/device/Header/1-0-7-1.spec
2003-Oct-22 12:20:36 694 bytes prism/private/wslib/calc-lib/1.0.7/lib/device/Header/1-0-7-10.spec
2003-Nov-11 18:29:52 694 bytes prism/private/wslib/calc-lib/1.0.7/lib/device/Header/1-0-7-11.spec
2003-Dec-18 14:01:22 694 bytes prism/private/wslib/calc-lib/1.0.7/lib/device/Header/1-0-7-12.spec
2003-Dec-30 13:42:48 694 bytes prism/private/wslib/calc-lib/1.0.7/lib/device/Header/1-0-7-13.spec
2004-Feb-10 16:23:22 694 bytes prism/private/wslib/calc-lib/1.0.7/lib/device/Header/1-0-7-14.spec
2004-Mar-10 19:09:42 694 bytes prism/private/wslib/calc-lib/1.0.7/lib/device/Header/1-0-7-15.spec
2004-May-19 16:55:40 694 bytes prism/private/wslib/calc-lib/1.0.7/lib/device/Header/1-0-7-16.spec
2004-May-20 20:35:40 694 bytes prism/private/wslib/calc-lib/1.0.7/lib/device/Header/1-0-7-17.spec 2004-Jun-22 22:24:10 694 bytes prism/private/wslib/calc-lib/1.0.7/lib/device/Header/1-0-7-18.spec
2003-Jun-11 13:14:38 693 bytes prism/private/wslib/calc-lib/1.0.7/lib/device/Header/1-0-7-2.spec
2003-Jun-29 05:49:54 693 bytes prism/private/wslib/calc-lib/1.0.7/lib/device/Header/1-0-7-3.spec
2003-Jul-09 16:05:22 693 bytes prism/private/wslib/calc-lib/1.0.7/lib/device/Header/1-0-7-4.spec
2003-Jul-18 10:25:40 693 bytes prism/private/wslib/calc-lib/1.0.7/lib/device/Header/1-0-7-5.spec
2003-Aug-07 15:44:02 693 bytes prism/private/wslib/calc-lib/1.0.7/lib/device/Header/1-0-7-6.spec
2003-Aug-13 11:23:36 693 bytes prism/private/wslib/calc-lib/1.0.7/lib/device/Header/1-0-7-7.spec
2003-Oct-12 11:01:04 693 bytes prism/private/wslib/calc-lib/1.0.7/lib/device/Header/1-0-7-8.spec
2003-Oct-15 08:27:18 693 bytes prism/private/wslib/calc-lib/1.0.7/lib/device/Header/1-0-7-9.spec
2004-Dec-13 10:28:24 748 bytes prism/private/wslib/calc-lib/1.0.7/lib/device/PRV
2003-Apr-27 14:15:54 186 bytes prism/private/wslib/calc-lib/1.0.7/lib/device/PRV/1-0-6-15.spec
2003-May-09 16:08:18 185 bytes prism/private/wslib/calc-lib/1.0.7/lib/device/PRV/1-0-7-0.spec
2003-May-28 22:58:56 185 bytes prism/private/wslib/calc-lib/1.0.7/lib/device/PRV/1-0-7-1.spec
2003-Oct-22 12:20:36 186 bytes prism/private/wslib/calc-lib/1.0.7/lib/device/PRV/1-0-7-10.spec
2003-Nov-11 18:29:52 186 bytes prism/private/wslib/calc-lib/1.0.7/lib/device/PRV/1-0-7-11.spec
2003-Dec-18 14:01:22 186 bytes prism/private/wslib/calc-lib/1.0.7/lib/device/PRV/1-0-7-12.spec
2003-Dec-30 13:42:48 186 bytes prism/private/wslib/calc-lib/1.0.7/lib/device/PRV/1-0-7-13.spec
2004-Feb-10 16:23:22 186 bytes prism/private/wslib/calc-lib/1.0.7/lib/device/PRV/1-0-7-14.spec
2004-Mar-10 19:09:42 186 bytes prism/private/wslib/calc-lib/1.0.7/lib/device/PRV/1-0-7-15.spec
2004-May-19 16:55:40 186 bytes prism/private/wslib/calc-lib/1.0.7/lib/device/PRV/1-0-7-16.spec
2004-May-20 20:35:40 186 bytes prism/private/wslib/calc-lib/1.0.7/lib/device/PRV/1-0-7-17.spec
2004-Jun-22 22:24:10 186 bytes prism/private/wslib/calc-lib/1.0.7/lib/device/PRV/1-0-7-18.spec
2003-Jun-11 13:14:38 185 bytes prism/private/wslib/calc-lib/1.0.7/lib/device/PRV/1-0-7-2.spec
2003-Jun-29 05:49:54 185 bytes prism/private/wslib/calc-lib/1.0.7/lib/device/PRV/1-0-7-3.spec
2003-Jul-09 16:05:22 185 bytes prism/private/wslib/calc-lib/1.0.7/lib/device/PRV/1-0-7-4.spec
2003-Jul-18 10:25:40 185 bytes prism/private/wslib/calc-lib/1.0.7/lib/device/PRV/1-0-7-5.spec
2003-Aug-07 15:44:02 185 bytes prism/private/wslib/calc-lib/1.0.7/lib/device/PRV/1-0-7-6.spec
2003-Aug-13 11:23:36 185 bytes prism/private/wslib/calc-lib/1.0.7/lib/device/PRV/1-0-7-7.spec
2003-Oct-12 11:01:04 185 bytes prism/private/wslib/calc-lib/1.0.7/lib/device/PRV/1-0-7-8.spec
2003-Oct-15 08:27:18 185 bytes prism/private/wslib/calc-lib/1.0.7/lib/device/PRV/1-0-7-9.spec
2004-Dec-13 10:28:24 748 bytes prism/private/wslib/calc-lib/1.0.7/lib/device/Pipe-P
2003-Apr-27 14:15:54 190 bytes prism/private/wslib/calc-lib/1.0.7/lib/device/Pipe-P/1-0-6-15.spec
2003-May-27 16:53:46 523 bytes prism/private/wslib/calc-lib/1.0.7/lib/device/Pipe-P/1-0-7-0.spec
2003-May-28 22:58:56 523 bytes prism/private/wslib/calc-lib/1.0.7/lib/device/Pipe-P/1-0-7-1.spec
2003-Oct-22 12:20:36 191 bytes prism/private/wslib/calc-lib/1.0.7/lib/device/Pipe-P/1-0-7-10.spec
2003-Nov-11 18:29:52 191 bytes prism/private/wslib/calc-lib/1.0.7/lib/device/Pipe-P/1-0-7-11.spec
2003-Dec-18 14:01:22 191 bytes prism/private/wslib/calc-lib/1.0.7/lib/device/Pipe-P/1-0-7-12.spec
2003-Dec-30 13:42:48 191 bytes prism/private/wslib/calc-lib/1.0.7/lib/device/Pipe-P/1-0-7-13.spec
2004-Feb-10 16:23:22 191 bytes prism/private/wslib/calc-lib/1.0.7/lib/device/Pipe-P/1-0-7-14.spec
2004-Mar-10 19:09:42 191 bytes prism/private/wslib/calc-lib/1.0.7/lib/device/Pipe-P/1-0-7-15.spec
2004-May-19 16:55:40 191 bytes prism/private/wslib/calc-lib/1.0.7/lib/device/Pipe-P/1-0-7-16.spec
2004-May-20 20:35:40 191 bytes prism/private/wslib/calc-lib/1.0.7/lib/device/Pipe-P/1-0-7-17.spec
2004-Jun-22 22:24:10 191 bytes prism/private/wslib/calc-lib/1.0.7/lib/device/Pipe-P/1-0-7-18.spec
2003-Jun-11 13:14:38 523 bytes prism/private/wslib/calc-lib/1.0.7/lib/device/Pipe-P/1-0-7-2.spec
2003-Jun-29 05:49:54 523 bytes prism/private/wslib/calc-lib/1.0.7/lib/device/Pipe-P/1-0-7-3.spec
2003-Jul-09 16:18:24 190 bytes prism/private/wslib/calc-lib/1.0.7/lib/device/Pipe-P/1-0-7-4.spec
2003-Jul-18 10:25:40 190 bytes prism/private/wslib/calc-lib/1.0.7/lib/device/Pipe-P/1-0-7-5.spec
2003-Aug-07 15:44:02 190 bytes prism/private/wslib/calc-lib/1.0.7/lib/device/Pipe-P/1-0-7-6.spec
2003-Aug-13 11:23:36 190 bytes prism/private/wslib/calc-lib/1.0.7/lib/device/Pipe-P/1-0-7-7.spec
2003-Oct-12 11:01:04 190 bytes prism/private/wslib/calc-lib/1.0.7/lib/device/Pipe-P/1-0-7-8.spec
2003-Oct-15 08:27:18 190 bytes prism/private/wslib/calc-lib/1.0.7/lib/device/Pipe-P/1-0-7-9.spec
2004-Dec-13 10:28:24 748 bytes prism/private/wslib/calc-lib/1.0.7/lib/device/Pump
2004-Dec-13 10:28:24 510 bytes prism/private/wslib/calc-lib/1.0.7/lib/device/Pump-P
2003-Oct-22 12:20:36 3096 bytes prism/private/wslib/calc-lib/1.0.7/lib/device/Pump-P/1-0-7-10.spec
2003-Nov-11 18:29:52 3096 bytes prism/private/wslib/calc-lib/1.0.7/lib/device/Pump-P/1-0-7-11.spec
2003-Dec-18 14:01:22 3096 bytes prism/private/wslib/calc-lib/1.0.7/lib/device/Pump-P/1-0-7-12.spec
2003-Dec-30 13:42:48 3096 bytes prism/private/wslib/calc-lib/1.0.7/lib/device/Pump-P/1-0-7-13.spec
2004-Feb-10 16:23:22 3096 bytes prism/private/wslib/calc-lib/1.0.7/lib/device/Pump-P/1-0-7-14.spec
2004-Mar-10 19:09:42 3096 bytes prism/private/wslib/calc-lib/1.0.7/lib/device/Pump-P/1-0-7-15.spec
2004-May-19 16:55:40 3096 bytes prism/private/wslib/calc-lib/1.0.7/lib/device/Pump-P/1-0-7-16.spec
2004-May-20 20:35:40 3096 bytes prism/private/wslib/calc-lib/1.0.7/lib/device/Pump-P/1-0-7-17.spec 2004-Jun-22 22:24:10 3096 bytes prism/private/wslib/calc-lib/1.0.7/lib/device/Pump-P/1-0-7-18.spec
2003-Sep-16 13:43:36 3095 bytes prism/private/wslib/calc-lib/1.0.7/lib/device/Pump-P/1-0-7-6.spec
2003-Sep-24 13:27:46 3095 bytes prism/private/wslib/calc-lib/1.0.7/lib/device/Pump-P/1-0-7-7.spec
2003-Oct-12 11:01:04 3095 bytes prism/private/wslib/calc-lib/1.0.7/lib/device/Pump-P/1-0-7-8.spec
2003-Oct-15 08:27:18 3095 bytes prism/private/wslib/calc-lib/1.0.7/lib/device/Pump-P/1-0-7-9.spec
2003-May-02 10:58:36 3093 bytes prism/private/wslib/calc-lib/1.0.7/lib/device/Pump/1-0-6-15.spec
2003-May-09 16:08:18 3092 bytes prism/private/wslib/calc-lib/1.0.7/lib/device/Pump/1-0-7-0.spec
2003-May-28 22:58:56 3092 bytes prism/private/wslib/calc-lib/1.0.7/lib/device/Pump/1-0-7-1.spec
2003-Oct-22 12:20:36 3093 bytes prism/private/wslib/calc-lib/1.0.7/lib/device/Pump/1-0-7-10.spec
2003-Nov-11 18:29:52 3093 bytes prism/private/wslib/calc-lib/1.0.7/lib/device/Pump/1-0-7-11.spec
2003-Dec-18 14:01:22 3093 bytes prism/private/wslib/calc-lib/1.0.7/lib/device/Pump/1-0-7-12.spec
2003-Dec-30 13:42:48 3093 bytes prism/private/wslib/calc-lib/1.0.7/lib/device/Pump/1-0-7-13.spec
2004-Feb-10 16:23:22 3093 bytes prism/private/wslib/calc-lib/1.0.7/lib/device/Pump/1-0-7-14.spec
2004-Mar-10 19:09:42 3093 bytes prism/private/wslib/calc-lib/1.0.7/lib/device/Pump/1-0-7-15.spec
2004-May-19 16:55:40 3093 bytes prism/private/wslib/calc-lib/1.0.7/lib/device/Pump/1-0-7-16.spec
2004-May-20 20:35:40 3093 bytes prism/private/wslib/calc-lib/1.0.7/lib/device/Pump/1-0-7-17.spec
2004-Jun-22 22:24:10 3093 bytes prism/private/wslib/calc-lib/1.0.7/lib/device/Pump/1-0-7-18.spec
2003-Jun-11 13:14:38 3092 bytes prism/private/wslib/calc-lib/1.0.7/lib/device/Pump/1-0-7-2.spec
2003-Jun-29 05:49:54 3092 bytes prism/private/wslib/calc-lib/1.0.7/lib/device/Pump/1-0-7-3.spec
2003-Jul-09 16:05:22 3092 bytes prism/private/wslib/calc-lib/1.0.7/lib/device/Pump/1-0-7-4.spec
2003-Jul-18 10:25:40 3092 bytes prism/private/wslib/calc-lib/1.0.7/lib/device/Pump/1-0-7-5.spec
2003-Aug-07 15:44:02 3092 bytes prism/private/wslib/calc-lib/1.0.7/lib/device/Pump/1-0-7-6.spec
2003-Aug-13 11:23:36 3092 bytes prism/private/wslib/calc-lib/1.0.7/lib/device/Pump/1-0-7-7.spec
2003-Oct-12 11:01:04 3092 bytes prism/private/wslib/calc-lib/1.0.7/lib/device/Pump/1-0-7-8.spec
2003-Oct-15 08:27:18 3092 bytes prism/private/wslib/calc-lib/1.0.7/lib/device/Pump/1-0-7-9.spec
2004-Dec-13 10:28:24 748 bytes prism/private/wslib/calc-lib/1.0.7/lib/device/RD
2003-Apr-27 14:15:54 184 bytes prism/private/wslib/calc-lib/1.0.7/lib/device/RD/1-0-6-15.spec
2003-May-09 16:08:18 183 bytes prism/private/wslib/calc-lib/1.0.7/lib/device/RD/1-0-7-0.spec
2003-May-28 22:58:56 183 bytes prism/private/wslib/calc-lib/1.0.7/lib/device/RD/1-0-7-1.spec
2003-Oct-22 12:20:36 184 bytes prism/private/wslib/calc-lib/1.0.7/lib/device/RD/1-0-7-10.spec
2003-Nov-11 18:29:52 184 bytes prism/private/wslib/calc-lib/1.0.7/lib/device/RD/1-0-7-11.spec
2003-Dec-18 14:01:22 184 bytes prism/private/wslib/calc-lib/1.0.7/lib/device/RD/1-0-7-12.spec
2003-Dec-30 13:42:48 184 bytes prism/private/wslib/calc-lib/1.0.7/lib/device/RD/1-0-7-13.spec
2004-Feb-10 16:23:22 184 bytes prism/private/wslib/calc-lib/1.0.7/lib/device/RD/1-0-7-14.spec
2004-Mar-10 19:09:42 184 bytes prism/private/wslib/calc-lib/1.0.7/lib/device/RD/1-0-7-15.spec
2004-May-19 16:55:40 184 bytes prism/private/wslib/calc-lib/1.0.7/lib/device/RD/1-0-7-16.spec
2004-May-20 20:35:40 184 bytes prism/private/wslib/calc-lib/1.0.7/lib/device/RD/1-0-7-17.spec
2004-Jun-22 22:24:10 184 bytes prism/private/wslib/calc-lib/1.0.7/lib/device/RD/1-0-7-18.spec
2003-Jun-11 13:14:38 183 bytes prism/private/wslib/calc-lib/1.0.7/lib/device/RD/1-0-7-2.spec
2003-Jun-29 05:49:54 183 bytes prism/private/wslib/calc-lib/1.0.7/lib/device/RD/1-0-7-3.spec
2003-Jul-09 16:05:22 183 bytes prism/private/wslib/calc-lib/1.0.7/lib/device/RD/1-0-7-4.spec
2003-Jul-18 10:25:40 183 bytes prism/private/wslib/calc-lib/1.0.7/lib/device/RD/1-0-7-5.spec
2003-Aug-07 15:44:02 183 bytes prism/private/wslib/calc-lib/1.0.7/lib/device/RD/1-0-7-6.spec
2003-Aug-13 11:23:36 183 bytes prism/private/wslib/calc-lib/1.0.7/lib/device/RD/1-0-7-7.spec
2003-Oct-12 11:01:04 183 bytes prism/private/wslib/calc-lib/1.0.7/lib/device/RD/1-0-7-8.spec
2003-Oct-15 08:27:18 183 bytes prism/private/wslib/calc-lib/1.0.7/lib/device/RD/1-0-7-9.spec
2004-Dec-13 10:28:24 544 bytes prism/private/wslib/calc-lib/1.0.7/lib/device/TV
2003-Oct-22 12:20:36 184 bytes prism/private/wslib/calc-lib/1.0.7/lib/device/TV/1-0-7-10.spec
2003-Nov-11 18:29:52 184 bytes prism/private/wslib/calc-lib/1.0.7/lib/device/TV/1-0-7-11.spec
2003-Dec-18 14:01:22 184 bytes prism/private/wslib/calc-lib/1.0.7/lib/device/TV/1-0-7-12.spec
2003-Dec-30 13:42:48 184 bytes prism/private/wslib/calc-lib/1.0.7/lib/device/TV/1-0-7-13.spec
2004-Feb-10 16:23:22 184 bytes prism/private/wslib/calc-lib/1.0.7/lib/device/TV/1-0-7-14.spec
2004-Mar-10 19:09:42 184 bytes prism/private/wslib/calc-lib/1.0.7/lib/device/TV/1-0-7-15.spec
2004-May-19 16:55:40 184 bytes prism/private/wslib/calc-lib/1.0.7/lib/device/TV/1-0-7-16.spec
2004-May-20 20:35:40 184 bytes prism/private/wslib/calc-lib/1.0.7/lib/device/TV/1-0-7-17.spec
2004-Jun-22 22:24:10 184 bytes prism/private/wslib/calc-lib/1.0.7/lib/device/TV/1-0-7-18.spec
2003-Jul-18 12:15:38 183 bytes prism/private/wslib/calc-lib/1.0.7/lib/device/TV/1-0-7-5.spec
2003-Aug-07 15:44:02 183 bytes prism/private/wslib/calc-lib/1.0.7/lib/device/TV/1-0-7-6.spec
2003-Aug-13 11:23:36 183 bytes prism/private/wslib/calc-lib/1.0.7/lib/device/TV/1-0-7-7.spec
2003-Oct-12 11:01:04 183 bytes prism/private/wslib/calc-lib/1.0.7/lib/device/TV/1-0-7-8.spec
2003-Oct-15 08:27:18 183 bytes prism/private/wslib/calc-lib/1.0.7/lib/device/TV/1-0-7-9.spec

| | | |
|---|---|---|
| 2004-Dec-13 10:28:24 | 748 bytes | prism/private/wslib/calc-lib/1.0.7/lib/device/Tank |
| 2003-Apr-27 14:15:54 | 3852 bytes | prism/private/wslib/calc-lib/1.0.7/lib/device/Tank/1-0-6-15.spec |
| 2003-May-09 16:08:18 | 3851 bytes | prism/private/wslib/calc-lib/1.0.7/lib/device/Tank/1-0-7-0.spec |
| 2003-May-28 22:58:56 | 3851 bytes | prism/private/wslib/calc-lib/1.0.7/lib/device/Tank/1-0-7-1.spec |
| 2003-Oct-22 12:20:36 | 190 bytes | prism/private/wslib/calc-lib/1.0.7/lib/device/Tank/1-0-7-10.spec |
| 2003-Nov-11 18:29:52 | 190 bytes | prism/private/wslib/calc-lib/1.0.7/lib/device/Tank/1-0-7-11.spec |
| 2003-Dec-18 14:01:22 | 190 bytes | prism/private/wslib/calc-lib/1.0.7/lib/device/Tank/1-0-7-12.spec |
| 2003-Dec-30 13:42:48 | 190 bytes | prism/private/wslib/calc-lib/1.0.7/lib/device/Tank/1-0-7-13.spec |
| 2004-Feb-10 16:23:22 | 190 bytes | prism/private/wslib/calc-lib/1.0.7/lib/device/Tank/1-0-7-14.spec |
| 2004-Mar-10 19:09:42 | 190 bytes | prism/private/wslib/calc-lib/1.0.7/lib/device/Tank/1-0-7-15.spec |
| 2004-May-19 16:55:40 | 190 bytes | prism/private/wslib/calc-lib/1.0.7/lib/device/Tank/1-0-7-16.spec |
| 2004-Jun-22 14:25:18 | 963 bytes | prism/private/wslib/calc-lib/1.0.7/lib/device/Tank/1-0-7-17.spec |
| 2004-Jun-22 22:24:10 | 963 bytes | prism/private/wslib/calc-lib/1.0.7/lib/device/Tank/1-0-7-18.spec |
| 2003-Jun-11 13:14:38 | 3851 bytes | prism/private/wslib/calc-lib/1.0.7/lib/device/Tank/1-0-7-2.spec |
| 2003-Jun-29 05:49:54 | 3851 bytes | prism/private/wslib/calc-lib/1.0.7/lib/device/Tank/1-0-7-3.spec |
| 2003-Jul-09 16:05:22 | 3851 bytes | prism/private/wslib/calc-lib/1.0.7/lib/device/Tank/1-0-7-4.spec |
| 2003-Jul-20 10:42:46 | 189 bytes | prism/private/wslib/calc-lib/1.0.7/lib/device/Tank/1-0-7-5.spec |
| 2003-Aug-07 15:44:02 | 189 bytes | prism/private/wslib/calc-lib/1.0.7/lib/device/Tank/1-0-7-6.spec |
| 2003-Aug-13 11:23:36 | 189 bytes | prism/private/wslib/calc-lib/1.0.7/lib/device/Tank/1-0-7-7.spec |
| 2003-Oct-12 11:01:04 | 189 bytes | prism/private/wslib/calc-lib/1.0.7/lib/device/Tank/1-0-7-8.spec |
| 2003-Oct-15 08:27:18 | 189 bytes | prism/private/wslib/calc-lib/1.0.7/lib/device/Tank/1-0-7-9.spec |
| 2004-Dec-13 10:28:24 | 748 bytes | prism/private/wslib/calc-lib/1.0.7/lib/device/TurbineStm |
| 2003-Apr-27 14:15:54 | 199 bytes | prism/private/wslib/calc-lib/1.0.7/lib/device/TurbineStm/1-0-6-15.spec |
| 2003-May-09 16:08:18 | 198 bytes | prism/private/wslib/calc-lib/1.0.7/lib/device/TurbineStm/1-0-7-0.spec |
| 2003-May-28 22:58:56 | 198 bytes | prism/private/wslib/calc-lib/1.0.7/lib/device/TurbineStm/1-0-7-1.spec |
| 2003-Oct-22 12:20:36 | 199 bytes | prism/private/wslib/calc-lib/1.0.7/lib/device/TurbineStm/1-0-7-10.spec |
| 2003-Nov-11 18:29:52 | 199 bytes | prism/private/wslib/calc-lib/1.0.7/lib/device/TurbineStm/1-0-7-11.spec |
| 2003-Dec-18 14:01:22 | 199 bytes | prism/private/wslib/calc-lib/1.0.7/lib/device/TurbineStm/1-0-7-12.spec |
| 2003-Dec-30 13:42:48 | 199 bytes | prism/private/wslib/calc-lib/1.0.7/lib/device/TurbineStm/1-0-7-13.spec |
| 2004-Feb-10 16:23:22 | 199 bytes | prism/private/wslib/calc-lib/1.0.7/lib/device/TurbineStm/1-0-7-14.spec |
| 2004-Mar-10 19:09:42 | 199 bytes | prism/private/wslib/calc-lib/1.0.7/lib/device/TurbineStm/1-0-7-15.spec |
| 2004-May-19 16:55:40 | 199 bytes | prism/private/wslib/calc-lib/1.0.7/lib/device/TurbineStm/1-0-7-16.spec |
| 2004-May-20 20:35:40 | 199 bytes | prism/private/wslib/calc-lib/1.0.7/lib/device/TurbineStm/1-0-7-17.spec |
| 2004-Jun-22 22:24:10 | 199 bytes | prism/private/wslib/calc-lib/1.0.7/lib/device/TurbineStm/1-0-7-18.spec |
| 2003-Jun-11 13:14:38 | 198 bytes | prism/private/wslib/calc-lib/1.0.7/lib/device/TurbineStm/1-0-7-2.spec |
| 2003-Jun-29 05:49:54 | 198 bytes | prism/private/wslib/calc-lib/1.0.7/lib/device/TurbineStm/1-0-7-3.spec |
| 2003-Jul-09 16:05:22 | 198 bytes | prism/private/wslib/calc-lib/1.0.7/lib/device/TurbineStm/1-0-7-4.spec |
| 2003-Jul-18 10:25:40 | 198 bytes | prism/private/wslib/calc-lib/1.0.7/lib/device/TurbineStm/1-0-7-5.spec |
| 2003-Aug-07 15:44:02 | 198 bytes | prism/private/wslib/calc-lib/1.0.7/lib/device/TurbineStm/1-0-7-6.spec |
| 2003-Aug-13 11:23:36 | 198 bytes | prism/private/wslib/calc-lib/1.0.7/lib/device/TurbineStm/1-0-7-7.spec |
| 2003-Oct-12 11:01:04 | 198 bytes | prism/private/wslib/calc-lib/1.0.7/lib/device/TurbineStm/1-0-7-8.spec |
| 2003-Oct-15 08:27:18 | 198 bytes | prism/private/wslib/calc-lib/1.0.7/lib/device/TurbineStm/1-0-7-9.spec |
| 2004-Dec-13 10:28:24 | 748 bytes | prism/private/wslib/calc-lib/1.0.7/lib/device/Vessel |
| 2003-Apr-27 14:15:54 | 3717 bytes | prism/private/wslib/calc-lib/1.0.7/lib/device/Vessel/1-0-6-15.spec |
| 2003-May-09 16:08:18 | 3716 bytes | prism/private/wslib/calc-lib/1.0.7/lib/device/Vessel/1-0-7-0.spec |
| 2003-May-28 22:58:56 | 3716 bytes | prism/private/wslib/calc-lib/1.0.7/lib/device/Vessel/1-0-7-1.spec |
| 2003-Oct-22 12:20:36 | 182 bytes | prism/private/wslib/calc-lib/1.0.7/lib/device/Vessel/1-0-7-10.spec |
| 2003-Nov-11 18:29:52 | 182 bytes | prism/private/wslib/calc-lib/1.0.7/lib/device/Vessel/1-0-7-11.spec |
| 2003-Dec-18 14:01:22 | 182 bytes | prism/private/wslib/calc-lib/1.0.7/lib/device/Vessel/1-0-7-12.spec |
| 2003-Dec-30 13:42:48 | 182 bytes | prism/private/wslib/calc-lib/1.0.7/lib/device/Vessel/1-0-7-13.spec |
| 2004-Feb-10 16:23:22 | 182 bytes | prism/private/wslib/calc-lib/1.0.7/lib/device/Vessel/1-0-7-14.spec |
| 2004-Mar-10 19:09:42 | 182 bytes | prism/private/wslib/calc-lib/1.0.7/lib/device/Vessel/1-0-7-15.spec |
| 2004-May-19 16:55:40 | 182 bytes | prism/private/wslib/calc-lib/1.0.7/lib/device/Vessel/1-0-7-16.spec |
| 2004-May-20 20:35:40 | 182 bytes | prism/private/wslib/calc-lib/1.0.7/lib/device/Vessel/1-0-7-17.spec |
| 2004-Jun-22 22:24:10 | 182 bytes | prism/private/wslib/calc-lib/1.0.7/lib/device/Vessel/1-0-7-18.spec |
| 2003-Jun-11 13:14:38 | 3716 bytes | prism/private/wslib/calc-lib/1.0.7/lib/device/Vessel/1-0-7-2.spec |
| 2003-Jun-29 05:49:54 | 3716 bytes | prism/private/wslib/calc-lib/1.0.7/lib/device/Vessel/1-0-7-3.spec |
| 2003-Jul-09 16:05:22 | 3716 bytes | prism/private/wslib/calc-lib/1.0.7/lib/device/Vessel/1-0-7-4.spec |
| 2003-Jul-18 10:25:40 | 3716 bytes | prism/private/wslib/calc-lib/1.0.7/lib/device/Vessel/1-0-7-5.spec |
| 2003-Aug-07 15:44:02 | 3716 bytes | prism/private/wslib/calc-lib/1.0.7/lib/device/Vessel/1-0-7-6.spec |
| 2003-Aug-15 10:00:56 | 181 bytes | prism/private/wslib/calc-lib/1.0.7/lib/device/Vessel/1-0-7-7.spec |

| | | |
|---|---|---|
| 2003-Oct-12 11:01:04 | 181 bytes | prism/private/wslib/calc-lib/1.0.7/lib/device/Vessel/1-0-7-8.spec |
| 2003-Oct-15 08:27:18 | 181 bytes | prism/private/wslib/calc-lib/1.0.7/lib/device/Vessel/1-0-7-9.spec |
| 2004-Dec-13 10:28:25 | 816 bytes | prism/private/wslib/calc-lib/1.0.7/lib/fitting |
| 2004-Dec-13 10:28:24 | 748 bytes | prism/private/wslib/calc-lib/1.0.7/lib/fitting/BallValve |
| 2003-Apr-27 14:15:54 | 3397 bytes | prism/private/wslib/calc-lib/1.0.7/lib/fitting/BallValve/1-0-6-15.spec |
| 2003-May-09 16:08:18 | 3396 bytes | prism/private/wslib/calc-lib/1.0.7/lib/fitting/BallValve/1-0-7-0.spec |
| 2003-Jun-20 15:19:20 | 3426 bytes | prism/private/wslib/calc-lib/1.0.7/lib/fitting/BallValve/1-0-7-1.spec |
| 2003-Oct-22 12:20:36 | 211 bytes | prism/private/wslib/calc-lib/1.0.7/lib/fitting/BallValve/1-0-7-10.spec |
| 2003-Nov-11 18:29:52 | 211 bytes | prism/private/wslib/calc-lib/1.0.7/lib/fitting/BallValve/1-0-7-11.spec |
| 2003-Dec-18 14:01:22 | 211 bytes | prism/private/wslib/calc-lib/1.0.7/lib/fitting/BallValve/1-0-7-12.spec |
| 2003-Dec-30 13:42:48 | 211 bytes | prism/private/wslib/calc-lib/1.0.7/lib/fitting/BallValve/1-0-7-13.spec |
| 2004-Feb-10 16:23:22 | 211 bytes | prism/private/wslib/calc-lib/1.0.7/lib/fitting/BallValve/1-0-7-14.spec |
| 2004-Mar-10 19:09:42 | 211 bytes | prism/private/wslib/calc-lib/1.0.7/lib/fitting/BallValve/1-0-7-15.spec |
| 2004-May-19 16:55:40 | 211 bytes | prism/private/wslib/calc-lib/1.0.7/lib/fitting/BallValve/1-0-7-16.spec |
| 2004-May-20 20:35:40 | 211 bytes | prism/private/wslib/calc-lib/1.0.7/lib/fitting/BallValve/1-0-7-17.spec |
| 2004-Jun-22 22:24:10 | 211 bytes | prism/private/wslib/calc-lib/1.0.7/lib/fitting/BallValve/1-0-7-18.spec |
| 2003-Jun-20 16:06:10 | 210 bytes | prism/private/wslib/calc-lib/1.0.7/lib/fitting/BallValve/1-0-7-2.spec |
| 2003-Jun-29 05:49:54 | 210 bytes | prism/private/wslib/calc-lib/1.0.7/lib/fitting/BallValve/1-0-7-3.spec |
| 2003-Jul-09 16:05:22 | 210 bytes | prism/private/wslib/calc-lib/1.0.7/lib/fitting/BallValve/1-0-7-4.spec |
| 2003-Jul-18 10:25:40 | 210 bytes | prism/private/wslib/calc-lib/1.0.7/lib/fitting/BallValve/1-0-7-5.spec |
| 2003-Aug-07 15:44:02 | 210 bytes | prism/private/wslib/calc-lib/1.0.7/lib/fitting/BallValve/1-0-7-6.spec |
| 2003-Aug-13 11:23:36 | 210 bytes | prism/private/wslib/calc-lib/1.0.7/lib/fitting/BallValve/1-0-7-7.spec |
| 2003-Oct-12 11:01:04 | 210 bytes | prism/private/wslib/calc-lib/1.0.7/lib/fitting/BallValve/1-0-7-8.spec |
| 2003-Oct-15 08:27:18 | 210 bytes | prism/private/wslib/calc-lib/1.0.7/lib/fitting/BallValve/1-0-7-9.spec |
| 2004-Dec-13 10:28:24 | 748 bytes | prism/private/wslib/calc-lib/1.0.7/lib/fitting/Elbow45 |
| 2003-Apr-27 14:15:54 | 3416 bytes | prism/private/wslib/calc-lib/1.0.7/lib/fitting/Elbow45/1-0-6-15.spec |
| 2003-May-09 16:08:18 | 3415 bytes | prism/private/wslib/calc-lib/1.0.7/lib/fitting/Elbow45/1-0-7-0.spec |
| 2003-Jun-20 15:20:04 | 3445 bytes | prism/private/wslib/calc-lib/1.0.7/lib/fitting/Elbow45/1-0-7-1.spec |
| 2003-Oct-22 12:20:36 | 210 bytes | prism/private/wslib/calc-lib/1.0.7/lib/fitting/Elbow45/1-0-7-10.spec |
| 2003-Nov-11 18:29:52 | 210 bytes | prism/private/wslib/calc-lib/1.0.7/lib/fitting/Elbow45/1-0-7-11.spec |
| 2003-Dec-18 14:01:22 | 210 bytes | prism/private/wslib/calc-lib/1.0.7/lib/fitting/Elbow45/1-0-7-12.spec |
| 2003-Dec-30 13:42:48 | 210 bytes | prism/private/wslib/calc-lib/1.0.7/lib/fitting/Elbow45/1-0-7-13.spec |
| 2004-Feb-10 16:23:22 | 210 bytes | prism/private/wslib/calc-lib/1.0.7/lib/fitting/Elbow45/1-0-7-14.spec |
| 2004-Mar-10 19:09:42 | 210 bytes | prism/private/wslib/calc-lib/1.0.7/lib/fitting/Elbow45/1-0-7-15.spec |
| 2004-May-19 16:55:40 | 210 bytes | prism/private/wslib/calc-lib/1.0.7/lib/fitting/Elbow45/1-0-7-16.spec |
| 2004-May-20 20:35:40 | 210 bytes | prism/private/wslib/calc-lib/1.0.7/lib/fitting/Elbow45/1-0-7-17.spec |
| 2004-Jun-22 22:24:10 | 210 bytes | prism/private/wslib/calc-lib/1.0.7/lib/fitting/Elbow45/1-0-7-18.spec |
| 2003-Jun-20 16:06:34 | 209 bytes | prism/private/wslib/calc-lib/1.0.7/lib/fitting/Elbow45/1-0-7-2.spec |
| 2003-Jun-29 05:49:54 | 209 bytes | prism/private/wslib/calc-lib/1.0.7/lib/fitting/Elbow45/1-0-7-3.spec |
| 2003-Jul-09 16:05:22 | 209 bytes | prism/private/wslib/calc-lib/1.0.7/lib/fitting/Elbow45/1-0-7-4.spec |
| 2003-Jul-18 10:25:40 | 209 bytes | prism/private/wslib/calc-lib/1.0.7/lib/fitting/Elbow45/1-0-7-5.spec |
| 2003-Aug-07 15:44:02 | 209 bytes | prism/private/wslib/calc-lib/1.0.7/lib/fitting/Elbow45/1-0-7-6.spec |
| 2003-Aug-13 11:23:36 | 209 bytes | prism/private/wslib/calc-lib/1.0.7/lib/fitting/Elbow45/1-0-7-7.spec |
| 2003-Oct-12 11:01:04 | 209 bytes | prism/private/wslib/calc-lib/1.0.7/lib/fitting/Elbow45/1-0-7-8.spec |
| 2003-Oct-15 08:27:18 | 209 bytes | prism/private/wslib/calc-lib/1.0.7/lib/fitting/Elbow45/1-0-7-9.spec |
| 2004-Dec-13 10:28:24 | 510 bytes | prism/private/wslib/calc-lib/1.0.7/lib/fitting/Elbow45T |
| 2003-Oct-22 12:20:36 | 220 bytes | prism/private/wslib/calc-lib/1.0.7/lib/fitting/Elbow45T/1-0-7-10.spec |
| 2003-Nov-11 18:29:52 | 220 bytes | prism/private/wslib/calc-lib/1.0.7/lib/fitting/Elbow45T/1-0-7-11.spec |
| 2003-Dec-18 14:01:22 | 220 bytes | prism/private/wslib/calc-lib/1.0.7/lib/fitting/Elbow45T/1-0-7-12.spec |
| 2003-Dec-30 13:42:48 | 220 bytes | prism/private/wslib/calc-lib/1.0.7/lib/fitting/Elbow45T/1-0-7-13.spec |
| 2004-Feb-10 16:23:22 | 220 bytes | prism/private/wslib/calc-lib/1.0.7/lib/fitting/Elbow45T/1-0-7-14.spec |
| 2004-Mar-10 19:09:42 | 220 bytes | prism/private/wslib/calc-lib/1.0.7/lib/fitting/Elbow45T/1-0-7-15.spec |
| 2004-May-19 16:55:40 | 220 bytes | prism/private/wslib/calc-lib/1.0.7/lib/fitting/Elbow45T/1-0-7-16.spec |
| 2004-May-20 20:35:40 | 220 bytes | prism/private/wslib/calc-lib/1.0.7/lib/fitting/Elbow45T/1-0-7-17.spec |
| 2004-Jun-22 22:24:10 | 220 bytes | prism/private/wslib/calc-lib/1.0.7/lib/fitting/Elbow45T/1-0-7-18.spec |
| 2003-Sep-05 18:12:08 | 219 bytes | prism/private/wslib/calc-lib/1.0.7/lib/fitting/Elbow45T/1-0-7-6.spec |
| 2003-Sep-24 13:29:52 | 219 bytes | prism/private/wslib/calc-lib/1.0.7/lib/fitting/Elbow45T/1-0-7-7.spec |
| 2003-Oct-12 11:01:04 | 219 bytes | prism/private/wslib/calc-lib/1.0.7/lib/fitting/Elbow45T/1-0-7-8.spec |
| 2003-Oct-15 08:27:18 | 219 bytes | prism/private/wslib/calc-lib/1.0.7/lib/fitting/Elbow45T/1-0-7-9.spec |
| 2004-Dec-13 10:28:24 | 748 bytes | prism/private/wslib/calc-lib/1.0.7/lib/fitting/Elbow90 |
| 2003-Apr-27 14:15:54 | 3410 bytes | prism/private/wslib/calc-lib/1.0.7/lib/fitting/Elbow90/1-0-6-15.spec |

2003-May-09 16:08:18 3409 bytes prism/private/wslib/calc-lib/1.0.7/lib/fitting/Elbow90/1-0-7-0.spec
2003-Jun-20 15:20:12 3439 bytes prism/private/wslib/calc-lib/1.0.7/lib/fitting/Elbow90/1-0-7-1.spec
2003-Oct-22 12:20:36 218 bytes prism/private/wslib/calc-lib/1.0.7/lib/fitting/Elbow90/1-0-7-10.spec
2003-Nov-11 18:29:52 218 bytes prism/private/wslib/calc-lib/1.0.7/lib/fitting/Elbow90/1-0-7-11.spec
2003-Dec-18 14:01:22 218 bytes prism/private/wslib/calc-lib/1.0.7/lib/fitting/Elbow90/1-0-7-12.spec
2003-Dec-30 13:42:48 218 bytes prism/private/wslib/calc-lib/1.0.7/lib/fitting/Elbow90/1-0-7-13.spec
2004-Feb-10 16:23:22 218 bytes prism/private/wslib/calc-lib/1.0.7/lib/fitting/Elbow90/1-0-7-14.spec
2004-Mar-10 19:09:42 218 bytes prism/private/wslib/calc-lib/1.0.7/lib/fitting/Elbow90/1-0-7-15.spec
2004-May-19 16:55:40 218 bytes prism/private/wslib/calc-lib/1.0.7/lib/fitting/Elbow90/1-0-7-16.spec
2004-May-20 20:35:40 218 bytes prism/private/wslib/calc-lib/1.0.7/lib/fitting/Elbow90/1-0-7-17.spec
2004-Jun-22 22:24:12 218 bytes prism/private/wslib/calc-lib/1.0.7/lib/fitting/Elbow90/1-0-7-18.spec
2003-Jun-20 16:07:12 217 bytes prism/private/wslib/calc-lib/1.0.7/lib/fitting/Elbow90/1-0-7-2.spec
2003-Jun-29 05:49:54 217 bytes prism/private/wslib/calc-lib/1.0.7/lib/fitting/Elbow90/1-0-7-3.spec
2003-Jul-09 16:05:22 217 bytes prism/private/wslib/calc-lib/1.0.7/lib/fitting/Elbow90/1-0-7-4.spec
2003-Jul-18 10:25:40 217 bytes prism/private/wslib/calc-lib/1.0.7/lib/fitting/Elbow90/1-0-7-5.spec
2003-Aug-07 15:44:02 217 bytes prism/private/wslib/calc-lib/1.0.7/lib/fitting/Elbow90/1-0-7-6.spec
2003-Aug-13 11:23:36 217 bytes prism/private/wslib/calc-lib/1.0.7/lib/fitting/Elbow90/1-0-7-7.spec
2003-Oct-12 11:01:04 217 bytes prism/private/wslib/calc-lib/1.0.7/lib/fitting/Elbow90/1-0-7-8.spec
2003-Oct-15 08:27:18 217 bytes prism/private/wslib/calc-lib/1.0.7/lib/fitting/Elbow90/1-0-7-9.spec
2004-Dec-13 10:28:24 748 bytes prism/private/wslib/calc-lib/1.0.7/lib/fitting/Elbow90L
2003-Apr-27 14:15:54 3410 bytes prism/private/wslib/calc-lib/1.0.7/lib/fitting/Elbow90L/1-0-6-15.spec
2003-May-09 16:08:18 3409 bytes prism/private/wslib/calc-lib/1.0.7/lib/fitting/Elbow90L/1-0-7-0.spec
2003-Jun-20 15:20:28 3439 bytes prism/private/wslib/calc-lib/1.0.7/lib/fitting/Elbow90L/1-0-7-1.spec
2003-Oct-22 12:20:36 217 bytes prism/private/wslib/calc-lib/1.0.7/lib/fitting/Elbow90L/1-0-7-10.spec
2003-Nov-11 18:29:52 217 bytes prism/private/wslib/calc-lib/1.0.7/lib/fitting/Elbow90L/1-0-7-11.spec
2003-Dec-18 14:01:22 217 bytes prism/private/wslib/calc-lib/1.0.7/lib/fitting/Elbow90L/1-0-7-12.spec
2003-Dec-30 13:42:48 217 bytes prism/private/wslib/calc-lib/1.0.7/lib/fitting/Elbow90L/1-0-7-13.spec
2004-Feb-10 16:23:22 217 bytes prism/private/wslib/calc-lib/1.0.7/lib/fitting/Elbow90L/1-0-7-14.spec
2004-Mar-10 19:09:42 217 bytes prism/private/wslib/calc-lib/1.0.7/lib/fitting/Elbow90L/1-0-7-15.spec
2004-May-19 16:55:40 217 bytes prism/private/wslib/calc-lib/1.0.7/lib/fitting/Elbow90L/1-0-7-16.spec
2004-May-20 20:35:40 217 bytes prism/private/wslib/calc-lib/1.0.7/lib/fitting/Elbow90L/1-0-7-17.spec
2004-Jun-22 22:24:12 217 bytes prism/private/wslib/calc-lib/1.0.7/lib/fitting/Elbow90L/1-0-7-18.spec
2003-Jun-20 16:07:26 216 bytes prism/private/wslib/calc-lib/1.0.7/lib/fitting/Elbow90L/1-0-7-2.spec
2003-Jun-29 05:49:54 216 bytes prism/private/wslib/calc-lib/1.0.7/lib/fitting/Elbow90L/1-0-7-3.spec
2003-Jul-09 16:05:22 216 bytes prism/private/wslib/calc-lib/1.0.7/lib/fitting/Elbow90L/1-0-7-4.spec
2003-Jul-18 10:25:40 216 bytes prism/private/wslib/calc-lib/1.0.7/lib/fitting/Elbow90L/1-0-7-5.spec
2003-Aug-07 15:44:02 216 bytes prism/private/wslib/calc-lib/1.0.7/lib/fitting/Elbow90L/1-0-7-6.spec
2003-Aug-13 11:23:36 216 bytes prism/private/wslib/calc-lib/1.0.7/lib/fitting/Elbow90L/1-0-7-7.spec
2003-Oct-12 11:01:04 216 bytes prism/private/wslib/calc-lib/1.0.7/lib/fitting/Elbow90L/1-0-7-8.spec
2003-Oct-15 08:27:18 216 bytes prism/private/wslib/calc-lib/1.0.7/lib/fitting/Elbow90L/1-0-7-9.spec
2004-Dec-13 10:28:24 510 bytes prism/private/wslib/calc-lib/1.0.7/lib/fitting/Elbow90T
2003-Oct-22 12:20:36 219 bytes prism/private/wslib/calc-lib/1.0.7/lib/fitting/Elbow90T/1-0-7-10.spec
2003-Nov-11 18:29:52 219 bytes prism/private/wslib/calc-lib/1.0.7/lib/fitting/Elbow90T/1-0-7-11.spec
2003-Dec-18 14:01:22 219 bytes prism/private/wslib/calc-lib/1.0.7/lib/fitting/Elbow90T/1-0-7-12.spec
2003-Dec-30 13:42:48 219 bytes prism/private/wslib/calc-lib/1.0.7/lib/fitting/Elbow90T/1-0-7-13.spec
2004-Feb-10 16:23:22 219 bytes prism/private/wslib/calc-lib/1.0.7/lib/fitting/Elbow90T/1-0-7-14.spec
2004-Mar-10 19:09:42 219 bytes prism/private/wslib/calc-lib/1.0.7/lib/fitting/Elbow90T/1-0-7-15.spec
2004-May-19 16:55:40 219 bytes prism/private/wslib/calc-lib/1.0.7/lib/fitting/Elbow90T/1-0-7-16.spec
2004-May-20 20:35:40 219 bytes prism/private/wslib/calc-lib/1.0.7/lib/fitting/Elbow90T/1-0-7-17.spec
2004-Jun-22 22:24:12 219 bytes prism/private/wslib/calc-lib/1.0.7/lib/fitting/Elbow90T/1-0-7-18.spec
2003-Sep-05 18:12:20 218 bytes prism/private/wslib/calc-lib/1.0.7/lib/fitting/Elbow90T/1-0-7-6.spec
2003-Sep-24 13:30:12 218 bytes prism/private/wslib/calc-lib/1.0.7/lib/fitting/Elbow90T/1-0-7-7.spec
2003-Oct-12 11:01:04 218 bytes prism/private/wslib/calc-lib/1.0.7/lib/fitting/Elbow90T/1-0-7-8.spec
2003-Oct-15 08:27:18 218 bytes prism/private/wslib/calc-lib/1.0.7/lib/fitting/Elbow90T/1-0-7-9.spec
2004-Dec-13 10:28:24 748 bytes prism/private/wslib/calc-lib/1.0.7/lib/fitting/Enter
2003-Apr-27 14:15:54 3402 bytes prism/private/wslib/calc-lib/1.0.7/lib/fitting/Enter/1-0-6-15.spec
2003-May-09 16:08:18 3401 bytes prism/private/wslib/calc-lib/1.0.7/lib/fitting/Enter/1-0-7-0.spec
2003-Jun-20 15:20:34 3431 bytes prism/private/wslib/calc-lib/1.0.7/lib/fitting/Enter/1-0-7-1.spec
2003-Oct-22 12:20:36 219 bytes prism/private/wslib/calc-lib/1.0.7/lib/fitting/Enter/1-0-7-10.spec
2003-Nov-11 18:29:52 219 bytes prism/private/wslib/calc-lib/1.0.7/lib/fitting/Enter/1-0-7-11.spec
2003-Dec-18 14:01:22 219 bytes prism/private/wslib/calc-lib/1.0.7/lib/fitting/Enter/1-0-7-12.spec 2003-Dec-30 13:42:48 219 bytes prism/private/wslib/calc-lib/1.0.7/lib/fitting/Enter/1-0-7-13.spec
2004-Feb-10 16:23:22 219 bytes prism/private/wslib/calc-lib/1.0.7/lib/fitting/Enter/1-0-7-14.spec
2004-Mar-10 19:09:42 219 bytes prism/private/wslib/calc-lib/1.0.7/lib/fitting/Enter/1-0-7-15.spec
2004-May-19 16:55:40 219 bytes prism/private/wslib/calc-lib/1.0.7/lib/fitting/Enter/1-0-7-16.spec
2004-May-20 20:35:40 219 bytes prism/private/wslib/calc-lib/1.0.7/lib/fitting/Enter/1-0-7-17.spec
2004-Jun-22 22:24:12 219 bytes prism/private/wslib/calc-lib/1.0.7/lib/fitting/Enter/1-0-7-18.spec
2003-Jun-20 16:41:50 218 bytes prism/private/wslib/calc-lib/1.0.7/lib/fitting/Enter/1-0-7-2.spec
2003-Jun-29 05:49:54 218 bytes prism/private/wslib/calc-lib/1.0.7/lib/fitting/Enter/1-0-7-3.spec
2003-Jul-09 16:05:22 218 bytes prism/private/wslib/calc-lib/1.0.7/lib/fitting/Enter/1-0-7-4.spec
2003-Jul-18 10:25:40 218 bytes prism/private/wslib/calc-lib/1.0.7/lib/fitting/Enter/1-0-7-5.spec
2003-Aug-07 15:44:02 218 bytes prism/private/wslib/calc-lib/1.0.7/lib/fitting/Enter/1-0-7-6.spec
2003-Aug-13 11:23:36 218 bytes prism/private/wslib/calc-lib/1.0.7/lib/fitting/Enter/1-0-7-7.spec
2003-Oct-12 11:01:04 218 bytes prism/private/wslib/calc-lib/1.0.7/lib/fitting/Enter/1-0-7-8.spec
2003-Oct-15 08:27:18 218 bytes prism/private/wslib/calc-lib/1.0.7/lib/fitting/Enter/1-0-7-9.spec
2004-Dec-13 10:28:24 748 bytes prism/private/wslib/calc-lib/1.0.7/lib/fitting/Exit
2003-Apr-27 14:15:54 3386 bytes prism/private/wslib/calc-lib/1.0.7/lib/fitting/Exit/1-0-6-15.spec
2003-May-09 16:08:18 3385 bytes prism/private/wslib/calc-lib/1.0.7/lib/fitting/Exit/1-0-7-0.spec
2003-Jun-20 15:20:38 3415 bytes prism/private/wslib/calc-lib/1.0.7/lib/fitting/Exit/1-0-7-1.spec
2003-Oct-22 12:20:36 214 bytes prism/private/wslib/calc-lib/1.0.7/lib/fitting/Exit/1-0-7-10.spec
2003-Nov-11 18:29:52 214 bytes prism/private/wslib/calc-lib/1.0.7/lib/fitting/Exit/1-0-7-11.spec
2003-Dec-18 14:01:22 214 bytes prism/private/wslib/calc-lib/1.0.7/lib/fitting/Exit/1-0-7-12.spec
2003-Dec-30 13:42:48 214 bytes prism/private/wslib/calc-lib/1.0.7/lib/fitting/Exit/1-0-7-13.spec
2004-Feb-10 16:23:22 214 bytes prism/private/wslib/calc-lib/1.0.7/lib/fitting/Exit/1-0-7-14.spec
2004-Mar-10 19:09:42 214 bytes prism/private/wslib/calc-lib/1.0.7/lib/fitting/Exit/1-0-7-15.spec
2004-May-19 16:55:40 214 bytes prism/private/wslib/calc-lib/1.0.7/lib/fitting/Exit/1-0-7-16.spec
2004-May-20 20:35:40 214 bytes prism/private/wslib/calc-lib/1.0.7/lib/fitting/Exit/1-0-7-17.spec
2004-Jun-22 22:24:12 214 bytes prism/private/wslib/calc-lib/1.0.7/lib/fitting/Exit/1-0-7-18.spec
2003-Jun-20 16:42:06 213 bytes prism/private/wslib/calc-lib/1.0.7/lib/fitting/Exit/1-0-7-2.spec
2003-Jun-29 05:49:54 213 bytes prism/private/wslib/calc-lib/1.0.7/lib/fitting/Exit/1-0-7-3.spec
2003-Jul-09 16:05:22 213 bytes prism/private/wslib/calc-lib/1.0.7/lib/fitting/Exit/1-0-7-4.spec
2003-Jul-18 10:25:40 213 bytes prism/private/wslib/calc-lib/1.0.7/lib/fitting/Exit/1-0-7-5.spec
2003-Aug-07 15:44:02 213 bytes prism/private/wslib/calc-lib/1.0.7/lib/fitting/Exit/1-0-7-6.spec
2003-Aug-13 11:23:36 213 bytes prism/private/wslib/calc-lib/1.0.7/lib/fitting/Exit/1-0-7-7.spec
2003-Oct-12 11:01:04 213 bytes prism/private/wslib/calc-lib/1.0.7/lib/fitting/Exit/1-0-7-8.spec
2003-Oct-15 08:27:18 213 bytes prism/private/wslib/calc-lib/1.0.7/lib/fitting/Exit/1-0-7-9.spec
2004-Dec-13 10:28:25 748 bytes prism/private/wslib/calc-lib/1.0.7/lib/fitting/Expand
2003-Apr-27 14:15:54 3397 bytes prism/private/wslib/calc-lib/1.0.7/lib/fitting/Expand/1-0-6-15.spec
2003-May-09 16:08:18 3396 bytes prism/private/wslib/calc-lib/1.0.7/lib/fitting/Expand/1-0-7-0.spec
2003-Jun-20 15:20:44 3426 bytes prism/private/wslib/calc-lib/1.0.7/lib/fitting/Expand/1-0-7-1.spec
2003-Oct-22 12:20:36 208 bytes prism/private/wslib/calc-lib/1.0.7/lib/fitting/Expand/1-0-7-10.spec
2003-Nov-11 18:29:52 208 bytes prism/private/wslib/calc-lib/1.0.7/lib/fitting/Expand/1-0-7-11.spec
2003-Dec-18 14:01:22 208 bytes prism/private/wslib/calc-lib/1.0.7/lib/fitting/Expand/1-0-7-12.spec
2003-Dec-30 13:42:48 208 bytes prism/private/wslib/calc-lib/1.0.7/lib/fitting/Expand/1-0-7-13.spec
2004-Feb-10 16:23:22 208 bytes prism/private/wslib/calc-lib/1.0.7/lib/fitting/Expand/1-0-7-14.spec
2004-Mar-10 19:09:42 208 bytes prism/private/wslib/calc-lib/1.0.7/lib/fitting/Expand/1-0-7-15.spec
2004-May-19 16:55:40 208 bytes prism/private/wslib/calc-lib/1.0.7/lib/fitting/Expand/1-0-7-16.spec
2004-May-20 20:35:40 208 bytes prism/private/wslib/calc-lib/1.0.7/lib/fitting/Expand/1-0-7-17.spec
2004-Jun-22 22:24:12 208 bytes prism/private/wslib/calc-lib/1.0.7/lib/fitting/Expand/1-0-7-18.spec
2003-Jun-20 16:11:08 207 bytes prism/private/wslib/calc-lib/1.0.7/lib/fitting/Expand/1-0-7-2.spec
2003-Jun-29 05:49:54 207 bytes prism/private/wslib/calc-lib/1.0.7/lib/fitting/Expand/1-0-7-3.spec
2003-Jul-09 16:05:22 207 bytes prism/private/wslib/calc-lib/1.0.7/lib/fitting/Expand/1-0-7-4.spec
2003-Jul-18 10:25:40 207 bytes prism/private/wslib/calc-lib/1.0.7/lib/fitting/Expand/1-0-7-5.spec
2003-Aug-07 15:44:02 207 bytes prism/private/wslib/calc-lib/1.0.7/lib/fitting/Expand/1-0-7-6.spec
2003-Aug-13 11:23:36 207 bytes prism/private/wslib/calc-lib/1.0.7/lib/fitting/Expand/1-0-7-7.spec
2003-Oct-12 11:01:04 207 bytes prism/private/wslib/calc-lib/1.0.7/lib/fitting/Expand/1-0-7-8.spec
2003-Oct-15 08:27:18 207 bytes prism/private/wslib/calc-lib/1.0.7/lib/fitting/Expand/1-0-7-9.spec
2004-Dec-13 10:28:25 646 bytes prism/private/wslib/calc-lib/1.0.7/lib/fitting/ExpandTeeSide
2003-Oct-22 12:20:36 243 bytes prism/private/wslib/calc-lib/1.0.7/lib/fitting/ExpandTeeSide/1-0-7-10.spec
2003-Nov-11 18:29:52 243 bytes prism/private/wslib/calc-lib/1.0.7/lib/fitting/ExpandTeeSide/1-0-7-11.spec
2003-Dec-18 14:01:22 243 bytes prism/private/wslib/calc-lib/1.0.7/lib/fitting/ExpandTeeSide/1-0-7-12.spec
2003-Dec-30 13:42:48 243 bytes prism/private/wslib/calc-lib/1.0.7/lib/fitting/ExpandTeeSide/1-0-7-13.spec 2004-Feb-10 16:23:22 243 bytes prism/private/wslib/calc-lib/1.0.7/lib/fitting/ExpandTeeSide/1-0-7-14.spec
2004-Mar-10 19:09:42 243 bytes prism/private/wslib/calc-lib/1.0.7/lib/fitting/ExpandTeeSide/1-0-7-15.spec
2004-May-19 16:55:40 243 bytes prism/private/wslib/calc-lib/1.0.7/lib/fitting/ExpandTeeSide/1-0-7-16.spec
2004-May-20 20:35:40 243 bytes prism/private/wslib/calc-lib/1.0.7/lib/fitting/ExpandTeeSide/1-0-7-17.spec
2004-Jun-22 22:24:12 243 bytes prism/private/wslib/calc-lib/1.0.7/lib/fitting/ExpandTeeSide/1-0-7-18.spec
2003-Jun-20 16:25:50 242 bytes prism/private/wslib/calc-lib/1.0.7/lib/fitting/ExpandTeeSide/1-0-7-2.spec
2003-Jun-29 05:49:54 242 bytes prism/private/wslib/calc-lib/1.0.7/lib/fitting/ExpandTeeSide/1-0-7-3.spec
2003-Jul-09 16:05:22 242 bytes prism/private/wslib/calc-lib/1.0.7/lib/fitting/ExpandTeeSide/1-0-7-4.spec
2003-Jul-18 10:25:40 242 bytes prism/private/wslib/calc-lib/1.0.7/lib/fitting/ExpandTeeSide/1-0-7-5.spec
2003-Aug-07 15:44:02 242 bytes prism/private/wslib/calc-lib/1.0.7/lib/fitting/ExpandTeeSide/1-0-7-6.spec
2003-Aug-13 11:23:36 242 bytes prism/private/wslib/calc-lib/1.0.7/lib/fitting/ExpandTeeSide/1-0-7-7.spec
2003-Oct-12 11:01:04 242 bytes prism/private/wslib/calc-lib/1.0.7/lib/fitting/ExpandTeeSide/1-0-7-8.spec
2003-Oct-15 08:27:18 242 bytes prism/private/wslib/calc-lib/1.0.7/lib/fitting/ExpandTeeSide/1-0-7-9.spec
2004-Dec-13 10:28:25 646 bytes prism/private/wslib/calc-lib/1.0.7/lib/fitting/ExpandTeeThrough
2003-Oct-22 12:20:36 238 bytes prism/private/wslib/calc-lib/1.0.7/lib/fitting/ExpandTeeThrough/1-0-7-10.spec
2003-Nov-11 18:29:52 238 bytes prism/private/wslib/calc-lib/1.0.7/lib/fitting/ExpandTeeThrough/1-0-7-11.spec
2003-Dec-18 14:01:22 238 bytes prism/private/wslib/calc-lib/1.0.7/lib/fitting/ExpandTeeThrough/1-0-7-12.spec
2003-Dec-30 13:42:48 238 bytes prism/private/wslib/calc-lib/1.0.7/lib/fitting/ExpandTeeThrough/1-0-7-13.spec
2004-Feb-10 16:23:22 238 bytes prism/private/wslib/calc-lib/1.0.7/lib/fitting/ExpandTeeThrough/1-0-7-14.spec
2004-Mar-10 19:09:42 238 bytes prism/private/wslib/calc-lib/1.0.7/lib/fitting/ExpandTeeThrough/1-0-7-15.spec
2004-May-19 16:55:40 238 bytes prism/private/wslib/calc-lib/1.0.7/lib/fitting/ExpandTeeThrough/1-0-7-16.spec
2004-May-20 20:35:40 238 bytes prism/private/wslib/calc-lib/1.0.7/lib/fitting/ExpandTeeThrough/1-0-7-17.spec
2004-Jun-22 22:24:12 238 bytes prism/private/wslib/calc-lib/1.0.7/lib/fitting/ExpandTeeThrough/1-0-7-18.spec
2003-Jun-20 16:12:06 237 bytes prism/private/wslib/calc-lib/1.0.7/lib/fitting/ExpandTeeThrough/1-0-7-2.spec
2003-Jun-29 05:49:54 237 bytes prism/private/wslib/calc-lib/1.0.7/lib/fitting/ExpandTeeThrough/1-0-7-3.spec
2003-Jul-09 16:05:22 237 bytes prism/private/wslib/calc-lib/1.0.7/lib/fitting/ExpandTeeThrough/1-0-7-4.spec
2003-Jul-18 10:25:40 237 bytes prism/private/wslib/calc-lib/1.0.7/lib/fitting/ExpandTeeThrough/1-0-7-5.spec
2003-Aug-07 15:44:02 237 bytes prism/private/wslib/calc-lib/1.0.7/lib/fitting/ExpandTeeThrough/1-0-7-6.spec
2003-Aug-13 11:23:36 237 bytes prism/private/wslib/calc-lib/1.0.7/lib/fitting/ExpandTeeThrough/1-0-7-7.spec
2003-Oct-12 11:01:04 237 bytes prism/private/wslib/calc-lib/1.0.7/lib/fitting/ExpandTeeThrough/1-0-7-8.spec
2003-Oct-15 08:27:18 237 bytes prism/private/wslib/calc-lib/1.0.7/lib/fitting/ExpandTeeThrough/1-0-7-9.spec
2004-Dec-13 10:28:25 748 bytes prism/private/wslib/calc-lib/1.0.7/lib/fitting/GateValveFP
2003-Apr-27 14:15:54 3421 bytes prism/private/wslib/calc-lib/1.0.7/lib/fitting/GateValveFP/1-0-6-15.spec
2003-May-09 16:08:18 3420 bytes prism/private/wslib/calc-lib/1.0.7/lib/fitting/GateValveFP/1-0-7-0.spec
2003-Jun-20 15:20:48 3450 bytes prism/private/wslib/calc-lib/1.0.7/lib/fitting/GateValveFP/1-0-7-1.spec
2003-Oct-22 12:20:36 226 bytes prism/private/wslib/calc-lib/1.0.7/lib/fitting/GateValveFP/1-0-7-10.spec
2003-Nov-11 18:29:52 226 bytes prism/private/wslib/calc-lib/1.0.7/lib/fitting/GateValveFP/1-0-7-11.spec
2003-Dec-18 14:01:22 226 bytes prism/private/wslib/calc-lib/1.0.7/lib/fitting/GateValveFP/1-0-7-12.spec
2003-Dec-30 13:42:48 226 bytes prism/private/wslib/calc-lib/1.0.7/lib/fitting/GateValveFP/1-0-7-13.spec
2004-Feb-10 16:23:22 226 bytes prism/private/wslib/calc-lib/1.0.7/lib/fitting/GateValveFP/1-0-7-14.spec
2004-Mar-10 19:09:42 226 bytes prism/private/wslib/calc-lib/1.0.7/lib/fitting/GateValveFP/1-0-7-15.spec
2004-May-19 16:55:40 226 bytes prism/private/wslib/calc-lib/1.0.7/lib/fitting/GateValveFP/1-0-7-16.spec
2004-May-20 20:35:40 226 bytes prism/private/wslib/calc-lib/1.0.7/lib/fitting/GateValveFP/1-0-7-17.spec
2004-Jun-22 22:24:12 226 bytes prism/private/wslib/calc-lib/1.0.7/lib/fitting/GateValveFP/1-0-7-18.spec
2003-Jun-20 16:08:08 225 bytes prism/private/wslib/calc-lib/1.0.7/lib/fitting/GateValveFP/1-0-7-2.spec
2003-Jun-29 05:49:54 225 bytes prism/private/wslib/calc-lib/1.0.7/lib/fitting/GateValveFP/1-0-7-3.spec
2003-Jul-09 16:05:22 225 bytes prism/private/wslib/calc-lib/1.0.7/lib/fitting/GateValveFP/1-0-7-4.spec
2003-Jul-18 10:25:40 225 bytes prism/private/wslib/calc-lib/1.0.7/lib/fitting/GateValveFP/1-0-7-5.spec
2003-Aug-07 15:44:02 225 bytes prism/private/wslib/calc-lib/1.0.7/lib/fitting/GateValveFP/1-0-7-6.spec
2003-Aug-13 11:23:36 225 bytes prism/private/wslib/calc-lib/1.0.7/lib/fitting/GateValveFP/1-0-7-7.spec
2003-Oct-12 11:01:04 225 bytes prism/private/wslib/calc-lib/1.0.7/lib/fitting/GateValveFP/1-0-7-8.spec
2003-Oct-15 08:27:18 225 bytes prism/private/wslib/calc-lib/1.0.7/lib/fitting/GateValveFP/1-0-7-9.spec
2004-Dec-13 10:28:25 748 bytes prism/private/wslib/calc-lib/1.0.7/lib/fitting/LiftCheck
2003-Apr-27 14:15:54 3405 bytes prism/private/wslib/calc-lib/1.0.7/lib/fitting/LiftCheck/1-0-6-15.spec
2003-May-09 16:08:18 3404 bytes prism/private/wslib/calc-lib/1.0.7/lib/fitting/LiftCheck/1-0-7-0.spec
2003-Jun-20 15:20:52 3434 bytes prism/private/wslib/calc-lib/1.0.7/lib/fitting/LiftCheck/1-0-7-1.spec
2003-Oct-22 12:20:36 212 bytes prism/private/wslib/calc-lib/1.0.7/lib/fitting/LiftCheck/1-0-7-10.spec
2003-Nov-11 18:29:52 212 bytes prism/private/wslib/calc-lib/1.0.7/lib/fitting/LiftCheck/1-0-7-11.spec
2003-Dec-18 14:01:22 212 bytes prism/private/wslib/calc-lib/1.0.7/lib/fitting/LiftCheck/1-0-7-12.spec
2003-Dec-30 13:42:48 212 bytes prism/private/wslib/calc-lib/1.0.7/lib/fitting/LiftCheck/1-0-7-13.spec
2004-Feb-10 16:23:22 212 bytes prism/private/wslib/calc-lib/1.0.7/lib/fitting/LiftCheck/1-0-7-14.spec 2004-Mar-10 19:09:42 212 bytes prism/private/wslib/calc-lib/1.0.7/lib/fitting/LiftCheck/1-0-7-15.spec
2004-May-19 16:55:40 212 bytes prism/private/wslib/calc-lib/1.0.7/lib/fitting/LiftCheck/1-0-7-16.spec
2004-May-20 20:35:40 212 bytes prism/private/wslib/calc-lib/1.0.7/lib/fitting/LiftCheck/1-0-7-17.spec
2004-Jun-22 22:24:12 212 bytes prism/private/wslib/calc-lib/1.0.7/lib/fitting/LiftCheck/1-0-7-18.spec
2003-Jun-20 16:08:14 211 bytes prism/private/wslib/calc-lib/1.0.7/lib/fitting/LiftCheck/1-0-7-2.spec
2003-Jun-29 05:49:54 211 bytes prism/private/wslib/calc-lib/1.0.7/lib/fitting/LiftCheck/1-0-7-3.spec
2003-Jul-09 16:05:22 211 bytes prism/private/wslib/calc-lib/1.0.7/lib/fitting/LiftCheck/1-0-7-4.spec
2003-Jul-18 10:25:40 211 bytes prism/private/wslib/calc-lib/1.0.7/lib/fitting/LiftCheck/1-0-7-5.spec
2003-Aug-07 15:44:02 211 bytes prism/private/wslib/calc-lib/1.0.7/lib/fitting/LiftCheck/1-0-7-6.spec
2003-Aug-13 11:23:36 211 bytes prism/private/wslib/calc-lib/1.0.7/lib/fitting/LiftCheck/1-0-7-7.spec
2003-Oct-12 11:01:04 211 bytes prism/private/wslib/calc-lib/1.0.7/lib/fitting/LiftCheck/1-0-7-8.spec
2003-Oct-15 08:27:18 211 bytes prism/private/wslib/calc-lib/1.0.7/lib/fitting/LiftCheck/1-0-7-9.spec
2004-Dec-13 10:28:25 748 bytes prism/private/wslib/calc-lib/1.0.7/lib/fitting/Pipe
2003-Apr-27 14:15:54 3341 bytes prism/private/wslib/calc-lib/1.0.7/lib/fitting/Pipe/1-0-6-15.spec
2003-May-09 16:08:18 3340 bytes prism/private/wslib/calc-lib/1.0.7/lib/fitting/Pipe/1-0-7-0.spec
2003-Jun-20 15:20:56 3370 bytes prism/private/wslib/calc-lib/1.0.7/lib/fitting/Pipe/1-0-7-1.spec
2003-Oct-22 12:20:36 190 bytes prism/private/wslib/calc-lib/1.0.7/lib/fitting/Pipe/1-0-7-10.spec
2003-Nov-11 18:29:52 190 bytes prism/private/wslib/calc-lib/1.0.7/lib/fitting/Pipe/1-0-7-11.spec
2003-Dec-18 14:01:22 190 bytes prism/private/wslib/calc-lib/1.0.7/lib/fitting/Pipe/1-0-7-12.spec
2003-Dec-30 13:42:48 190 bytes prism/private/wslib/calc-lib/1.0.7/lib/fitting/Pipe/1-0-7-13.spec
2004-Feb-10 16:23:22 190 bytes prism/private/wslib/calc-lib/1.0.7/lib/fitting/Pipe/1-0-7-14.spec
2004-Mar-10 19:09:42 190 bytes prism/private/wslib/calc-lib/1.0.7/lib/fitting/Pipe/1-0-7-15.spec
2004-May-19 16:55:40 190 bytes prism/private/wslib/calc-lib/1.0.7/lib/fitting/Pipe/1-0-7-16.spec
2004-May-20 20:35:40 190 bytes prism/private/wslib/calc-lib/1.0.7/lib/fitting/Pipe/1-0-7-17.spec
2004-Jun-22 22:24:12 190 bytes prism/private/wslib/calc-lib/1.0.7/lib/fitting/Pipe/1-0-7-18.spec
2003-Jun-20 16:15:36 189 bytes prism/private/wslib/calc-lib/1.0.7/lib/fitting/Pipe/1-0-7-2.spec
2003-Jun-29 05:49:54 189 bytes prism/private/wslib/calc-lib/1.0.7/lib/fitting/Pipe/1-0-7-3.spec
2003-Jul-09 16:05:22 189 bytes prism/private/wslib/calc-lib/1.0.7/lib/fitting/Pipe/1-0-7-4.spec
2003-Jul-18 10:25:42 189 bytes prism/private/wslib/calc-lib/1.0.7/lib/fitting/Pipe/1-0-7-5.spec
2003-Aug-07 15:44:02 189 bytes prism/private/wslib/calc-lib/1.0.7/lib/fitting/Pipe/1-0-7-6.spec
2003-Aug-13 11:23:36 189 bytes prism/private/wslib/calc-lib/1.0.7/lib/fitting/Pipe/1-0-7-7.spec
2003-Oct-12 11:01:04 189 bytes prism/private/wslib/calc-lib/1.0.7/lib/fitting/Pipe/1-0-7-8.spec
2003-Oct-15 08:27:18 189 bytes prism/private/wslib/calc-lib/1.0.7/lib/fitting/Pipe/1-0-7-9.spec
2004-Dec-13 10:28:25 748 bytes prism/private/wslib/calc-lib/1.0.7/lib/fitting/Reduce
2003-Apr-27 14:15:54 3396 bytes prism/private/wslib/calc-lib/1.0.7/lib/fitting/Reduce/1-0-6-15.spec
2003-May-09 16:08:18 3395 bytes prism/private/wslib/calc-lib/1.0.7/lib/fitting/Reduce/1-0-7-0.spec
2003-Jun-20 15:20:58 3425 bytes prism/private/wslib/calc-lib/1.0.7/lib/fitting/Reduce/1-0-7-1.spec
2003-Oct-22 12:20:36 206 bytes prism/private/wslib/calc-lib/1.0.7/lib/fitting/Reduce/1-0-7-10.spec
2003-Nov-11 18:29:52 206 bytes prism/private/wslib/calc-lib/1.0.7/lib/fitting/Reduce/1-0-7-11.spec
2003-Dec-18 14:01:22 206 bytes prism/private/wslib/calc-lib/1.0.7/lib/fitting/Reduce/1-0-7-12.spec
2003-Dec-30 13:42:48 206 bytes prism/private/wslib/calc-lib/1.0.7/lib/fitting/Reduce/1-0-7-13.spec
2004-Feb-10 16:23:22 206 bytes prism/private/wslib/calc-lib/1.0.7/lib/fitting/Reduce/1-0-7-14.spec
2004-Mar-10 19:09:42 206 bytes prism/private/wslib/calc-lib/1.0.7/lib/fitting/Reduce/1-0-7-15.spec
2004-May-19 16:55:40 206 bytes prism/private/wslib/calc-lib/1.0.7/lib/fitting/Reduce/1-0-7-16.spec
2004-May-20 20:35:40 206 bytes prism/private/wslib/calc-lib/1.0.7/lib/fitting/Reduce/1-0-7-17.spec
2004-Jun-22 22:24:12 206 bytes prism/private/wslib/calc-lib/1.0.7/lib/fitting/Reduce/1-0-7-18.spec
2003-Jun-20 16:14:58 205 bytes prism/private/wslib/calc-lib/1.0.7/lib/fitting/Reduce/1-0-7-2.spec
2003-Jun-29 05:49:54 205 bytes prism/private/wslib/calc-lib/1.0.7/lib/fitting/Reduce/1-0-7-3.spec
2003-Jul-09 16:05:22 205 bytes prism/private/wslib/calc-lib/1.0.7/lib/fitting/Reduce/1-0-7-4.spec
2003-Jul-18 10:25:42 205 bytes prism/private/wslib/calc-lib/1.0.7/lib/fitting/Reduce/1-0-7-5.spec
2003-Aug-07 15:44:02 205 bytes prism/private/wslib/calc-lib/1.0.7/lib/fitting/Reduce/1-0-7-6.spec
2003-Aug-13 11:23:36 205 bytes prism/private/wslib/calc-lib/1.0.7/lib/fitting/Reduce/1-0-7-7.spec
2003-Oct-12 11:01:04 205 bytes prism/private/wslib/calc-lib/1.0.7/lib/fitting/Reduce/1-0-7-8.spec
2003-Oct-15 08:27:18 205 bytes prism/private/wslib/calc-lib/1.0.7/lib/fitting/Reduce/1-0-7-9.spec
2004-Dec-13 10:28:25 646 bytes prism/private/wslib/calc-lib/1.0.7/lib/fitting/ReduceTeeSide
2003-Oct-22 12:20:36 241 bytes prism/private/wslib/calc-lib/1.0.7/lib/fitting/ReduceTeeSide/1-0-7-10.spec
2003-Nov-11 18:29:52 241 bytes prism/private/wslib/calc-lib/1.0.7/lib/fitting/ReduceTeeSide/1-0-7-11.spec
2003-Dec-18 14:01:22 241 bytes prism/private/wslib/calc-lib/1.0.7/lib/fitting/ReduceTeeSide/1-0-7-12.spec
2003-Dec-30 13:42:48 241 bytes prism/private/wslib/calc-lib/1.0.7/lib/fitting/ReduceTeeSide/1-0-7-13.spec
2004-Feb-10 16:23:22 241 bytes prism/private/wslib/calc-lib/1.0.7/lib/fitting/ReduceTeeSide/1-0-7-14.spec
2004-Mar-10 19:09:42 241 bytes prism/private/wslib/calc-lib/1.0.7/lib/fitting/ReduceTeeSide/1-0-7-15.spec 2004-May-19 16:55:40 241 bytes prism/private/wslib/calc-lib/1.0.7/lib/fitting/ReduceTeeSide/1-0-7-16.spec
2004-May-20 20:35:40 241 bytes prism/private/wslib/calc-lib/1.0.7/lib/fitting/ReduceTeeSide/1-0-7-17.spec
2004-Jun-22 22:24:12 241 bytes prism/private/wslib/calc-lib/1.0.7/lib/fitting/ReduceTeeSide/1-0-7-18.spec
2003-Jun-20 16:30:30 240 bytes prism/private/wslib/calc-lib/1.0.7/lib/fitting/ReduceTeeSide/1-0-7-2.spec
2003-Jun-29 05:49:54 240 bytes prism/private/wslib/calc-lib/1.0.7/lib/fitting/ReduceTeeSide/1-0-7-3.spec
2003-Jul-09 16:05:22 240 bytes prism/private/wslib/calc-lib/1.0.7/lib/fitting/ReduceTeeSide/1-0-7-4.spec
2003-Jul-18 10:25:42 240 bytes prism/private/wslib/calc-lib/1.0.7/lib/fitting/ReduceTeeSide/1-0-7-5.spec
2003-Aug-07 15:44:02 240 bytes prism/private/wslib/calc-lib/1.0.7/lib/fitting/ReduceTeeSide/1-0-7-6.spec
2003-Aug-13 11:23:36 240 bytes prism/private/wslib/calc-lib/1.0.7/lib/fitting/ReduceTeeSide/1-0-7-7.spec
2003-Oct-12 11:01:04 240 bytes prism/private/wslib/calc-lib/1.0.7/lib/fitting/ReduceTeeSide/1-0-7-8.spec
2003-Oct-15 08:27:18 240 bytes prism/private/wslib/calc-lib/1.0.7/lib/fitting/ReduceTeeSide/1-0-7-9.spec
2004-Dec-13 10:28:25 646 bytes prism/private/wslib/calc-lib/1.0.7/lib/fitting/ReduceTeeThrough
2003-Oct-22 12:20:36 236 bytes prism/private/wslib/calc-lib/1.0.7/lib/fitting/ReduceTeeThrough/1-0-7-10.spec
2003-Nov-11 18:29:52 236 bytes prism/private/wslib/calc-lib/1.0.7/lib/fitting/ReduceTeeThrough/1-0-7-11.spec
2003-Dec-18 14:01:22 236 bytes prism/private/wslib/calc-lib/1.0.7/lib/fitting/ReduceTeeThrough/1-0-7-12.spec
2003-Dec-30 13:42:48 236 bytes prism/private/wslib/calc-lib/1.0.7/lib/fitting/ReduceTeeThrough/1-0-7-13.spec
2004-Feb-10 16:23:22 236 bytes prism/private/wslib/calc-lib/1.0.7/lib/fitting/ReduceTeeThrough/1-0-7-14.spec
2004-Mar-10 19:09:42 236 bytes prism/private/wslib/calc-lib/1.0.7/lib/fitting/ReduceTeeThrough/1-0-7-15.spec
2004-May-19 16:55:40 236 bytes prism/private/wslib/calc-lib/1.0.7/lib/fitting/ReduceTeeThrough/1-0-7-16.spec
2004-May-20 20:35:40 236 bytes prism/private/wslib/calc-lib/1.0.7/lib/fitting/ReduceTeeThrough/1-0-7-17.spec
2004-Jun-22 22:24:12 236 bytes prism/private/wslib/calc-lib/1.0.7/lib/fitting/ReduceTeeThrough/1-0-7-18.spec
2003-Jun-20 16:15:12 235 bytes prism/private/wslib/calc-lib/1.0.7/lib/fitting/ReduceTeeThrough/1-0-7-2.spec
2003-Jun-29 05:49:54 235 bytes prism/private/wslib/calc-lib/1.0.7/lib/fitting/ReduceTeeThrough/1-0-7-3.spec
2003-Jul-09 16:05:22 235 bytes prism/private/wslib/calc-lib/1.0.7/lib/fitting/ReduceTeeThrough/1-0-7-4.spec
2003-Jul-18 10:25:42 235 bytes prism/private/wslib/calc-lib/1.0.7/lib/fitting/ReduceTeeThrough/1-0-7-5.spec
2003-Aug-07 15:44:02 235 bytes prism/private/wslib/calc-lib/1.0.7/lib/fitting/ReduceTeeThrough/1-0-7-6.spec
2003-Aug-13 11:23:36 235 bytes prism/private/wslib/calc-lib/1.0.7/lib/fitting/ReduceTeeThrough/1-0-7-7.spec
2003-Oct-12 11:01:04 235 bytes prism/private/wslib/calc-lib/1.0.7/lib/fitting/ReduceTeeThrough/1-0-7-8.spec
2003-Oct-15 08:27:18 235 bytes prism/private/wslib/calc-lib/1.0.7/lib/fitting/ReduceTeeThrough/1-0-7-9.spec
2004-Dec-13 10:28:25 748 bytes prism/private/wslib/calc-lib/1.0.7/lib/fitting/RuptureDisk
2003-Apr-27 14:15:54 3420 bytes prism/private/wslib/calc-lib/1.0.7/lib/fitting/RuptureDisk/1-0-6-15.spec
2003-May-09 16:08:18 3419 bytes prism/private/wslib/calc-lib/1.0.7/lib/fitting/RuptureDisk/1-0-7-0.spec
2003-Jun-20 15:21:02 3449 bytes prism/private/wslib/calc-lib/1.0.7/lib/fitting/RuptureDisk/1-0-7-1.spec
2003-Oct-22 12:20:36 225 bytes prism/private/wslib/calc-lib/1.0.7/lib/fitting/RuptureDisk/1-0-7-10.spec
2003-Nov-11 18:29:52 225 bytes prism/private/wslib/calc-lib/1.0.7/lib/fitting/RuptureDisk/1-0-7-11.spec
2003-Dec-18 14:01:22 225 bytes prism/private/wslib/calc-lib/1.0.7/lib/fitting/RuptureDisk/1-0-7-12.spec
2003-Dec-30 13:42:48 225 bytes prism/private/wslib/calc-lib/1.0.7/lib/fitting/RuptureDisk/1-0-7-13.spec
2004-Feb-10 16:23:22 225 bytes prism/private/wslib/calc-lib/1.0.7/lib/fitting/RuptureDisk/1-0-7-14.spec
2004-Mar-10 19:09:42 225 bytes prism/private/wslib/calc-lib/1.0.7/lib/fitting/RuptureDisk/1-0-7-15.spec
2004-May-19 16:55:40 225 bytes prism/private/wslib/calc-lib/1.0.7/lib/fitting/RuptureDisk/1-0-7-16.spec
2004-May-20 20:35:40 225 bytes prism/private/wslib/calc-lib/1.0.7/lib/fitting/RuptureDisk/1-0-7-17.spec
2004-Jun-22 22:24:12 225 bytes prism/private/wslib/calc-lib/1.0.7/lib/fitting/RuptureDisk/1-0-7-18.spec
2003-Jun-20 16:21:50 224 bytes prism/private/wslib/calc-lib/1.0.7/lib/fitting/RuptureDisk/1-0-7-2.spec
2003-Jun-29 05:49:54 224 bytes prism/private/wslib/calc-lib/1.0.7/lib/fitting/RuptureDisk/1-0-7-3.spec
2003-Jul-09 16:05:22 224 bytes prism/private/wslib/calc-lib/1.0.7/lib/fitting/RuptureDisk/1-0-7-4.spec
2003-Jul-18 10:25:42 224 bytes prism/private/wslib/calc-lib/1.0.7/lib/fitting/RuptureDisk/1-0-7-5.spec
2003-Aug-07 15:44:02 224 bytes prism/private/wslib/calc-lib/1.0.7/lib/fitting/RuptureDisk/1-0-7-6.spec
2003-Aug-13 11:23:36 224 bytes prism/private/wslib/calc-lib/1.0.7/lib/fitting/RuptureDisk/1-0-7-7.spec
2003-Oct-12 11:01:04 224 bytes prism/private/wslib/calc-lib/1.0.7/lib/fitting/RuptureDisk/1-0-7-8.spec
2003-Oct-15 08:27:18 224 bytes prism/private/wslib/calc-lib/1.0.7/lib/fitting/RuptureDisk/1-0-7-9.spec
2004-Dec-13 10:28:25 748 bytes prism/private/wslib/calc-lib/1.0.7/lib/fitting/SwingCheck
2003-Apr-27 14:15:54 3408 bytes prism/private/wslib/calc-lib/1.0.7/lib/fitting/SwingCheck/1-0-6-15.spec
2003-May-09 16:08:18 3407 bytes prism/private/wslib/calc-lib/1.0.7/lib/fitting/SwingCheck/1-0-7-0.spec
2003-Jun-20 15:21:06 3437 bytes prism/private/wslib/calc-lib/1.0.7/lib/fitting/SwingCheck/1-0-7-1.spec
2003-Oct-22 12:20:36 214 bytes prism/private/wslib/calc-lib/1.0.7/lib/fitting/SwingCheck/1-0-7-10.spec
2003-Nov-11 18:29:52 214 bytes prism/private/wslib/calc-lib/1.0.7/lib/fitting/SwingCheck/1-0-7-11.spec
2003-Dec-18 14:01:22 214 bytes prism/private/wslib/calc-lib/1.0.7/lib/fitting/SwingCheck/1-0-7-12.spec
2003-Dec-30 13:42:48 214 bytes prism/private/wslib/calc-lib/1.0.7/lib/fitting/SwingCheck/1-0-7-13.spec
2004-Feb-10 16:23:22 214 bytes prism/private/wslib/calc-lib/1.0.7/lib/fitting/SwingCheck/1-0-7-14.spec
2004-Mar-10 19:09:42 214 bytes prism/private/wslib/calc-lib/1.0.7/lib/fitting/SwingCheck/1-0-7-15.spec
2004-May-19 16:55:40 214 bytes prism/private/wslib/calc-lib/1.0.7/lib/fitting/SwingCheck/1-0-7-16.spec 2004-May-20 20:35:40 214 bytes prism/private/wslib/calc-lib/1.0.7/lib/fitting/SwingCheck/1-0-7-17.spec
2004-Jun-22 22:24:12 214 bytes prism/private/wslib/calc-lib/1.0.7/lib/fitting/SwingCheck/1-0-7-18.spec
2003-Jun-20 16:08:24 213 bytes prism/private/wslib/calc-lib/1.0.7/lib/fitting/SwingCheck/1-0-7-2.spec
2003-Jun-29 05:49:54 213 bytes prism/private/wslib/calc-lib/1.0.7/lib/fitting/SwingCheck/1-0-7-3.spec
2003-Jul-09 16:05:22 213 bytes prism/private/wslib/calc-lib/1.0.7/lib/fitting/SwingCheck/1-0-7-4.spec
2003-Jul-18 10:25:42 213 bytes prism/private/wslib/calc-lib/1.0.7/lib/fitting/SwingCheck/1-0-7-5.spec
2003-Aug-07 15:44:02 213 bytes prism/private/wslib/calc-lib/1.0.7/lib/fitting/SwingCheck/1-0-7-6.spec
2003-Aug-13 11:23:36 213 bytes prism/private/wslib/calc-lib/1.0.7/lib/fitting/SwingCheck/1-0-7-7.spec
2003-Oct-12 11:01:04 213 bytes prism/private/wslib/calc-lib/1.0.7/lib/fitting/SwingCheck/1-0-7-8.spec
2003-Oct-15 08:27:18 213 bytes prism/private/wslib/calc-lib/1.0.7/lib/fitting/SwingCheck/1-0-7-9.spec
2004-Dec-13 10:28:25 748 bytes prism/private/wslib/calc-lib/1.0.7/lib/fitting/TeeSide
2003-Apr-27 14:15:54 3406 bytes prism/private/wslib/calc-lib/1.0.7/lib/fitting/TeeSide/1-0-6-15.spec
2003-May-09 16:08:18 3405 bytes prism/private/wslib/calc-lib/1.0.7/lib/fitting/TeeSide/1-0-7-0.spec
2003-Jun-20 15:21:10 3435 bytes prism/private/wslib/calc-lib/1.0.7/lib/fitting/TeeSide/1-0-7-1.spec
2003-Oct-22 12:20:36 215 bytes prism/private/wslib/calc-lib/1.0.7/lib/fitting/TeeSide/1-0-7-10.spec
2003-Nov-11 18:29:52 215 bytes prism/private/wslib/calc-lib/1.0.7/lib/fitting/TeeSide/1-0-7-11.spec
2003-Dec-18 14:01:22 215 bytes prism/private/wslib/calc-lib/1.0.7/lib/fitting/TeeSide/1-0-7-12.spec
2003-Dec-30 13:42:48 215 bytes prism/private/wslib/calc-lib/1.0.7/lib/fitting/TeeSide/1-0-7-13.spec
2004-Feb-10 16:23:22 215 bytes prism/private/wslib/calc-lib/1.0.7/lib/fitting/TeeSide/1-0-7-14.spec
2004-Mar-10 19:09:42 215 bytes prism/private/wslib/calc-lib/1.0.7/lib/fitting/TeeSide/1-0-7-15.spec
2004-May-19 16:55:40 215 bytes prism/private/wslib/calc-lib/1.0.7/lib/fitting/TeeSide/1-0-7-16.spec
2004-May-20 20:35:40 215 bytes prism/private/wslib/calc-lib/1.0.7/lib/fitting/TeeSide/1-0-7-17.spec
2004-Jun-22 22:24:12 215 bytes prism/private/wslib/calc-lib/1.0.7/lib/fitting/TeeSide/1-0-7-18.spec
2003-Jun-20 16:40:42 214 bytes prism/private/wslib/calc-lib/1.0.7/lib/fitting/TeeSide/1-0-7-2.spec
2003-Jun-29 05:49:54 214 bytes prism/private/wslib/calc-lib/1.0.7/lib/fitting/TeeSide/1-0-7-3.spec
2003-Jul-09 16:05:22 214 bytes prism/private/wslib/calc-lib/1.0.7/lib/fitting/TeeSide/1-0-7-4.spec
2003-Jul-18 10:25:42 214 bytes prism/private/wslib/calc-lib/1.0.7/lib/fitting/TeeSide/1-0-7-5.spec
2003-Aug-07 15:44:02 214 bytes prism/private/wslib/calc-lib/1.0.7/lib/fitting/TeeSide/1-0-7-6.spec
2003-Aug-13 11:23:36 214 bytes prism/private/wslib/calc-lib/1.0.7/lib/fitting/TeeSide/1-0-7-7.spec
2003-Oct-12 11:01:04 214 bytes prism/private/wslib/calc-lib/1.0.7/lib/fitting/TeeSide/1-0-7-8.spec
2003-Oct-15 08:27:18 214 bytes prism/private/wslib/calc-lib/1.0.7/lib/fitting/TeeSide/1-0-7-9.spec
2004-Dec-13 10:28:25 748 bytes prism/private/wslib/calc-lib/1.0.7/lib/fitting/TeeThrough
2003-Apr-27 14:15:54 3415 bytes prism/private/wslib/calc-lib/1.0.7/lib/fitting/TeeThrough/1-0-6-15.spec
2003-May-09 16:08:18 3414 bytes prism/private/wslib/calc-lib/1.0.7/lib/fitting/TeeThrough/1-0-7-0.spec
2003-Jun-20 15:21:16 3444 bytes prism/private/wslib/calc-lib/1.0.7/lib/fitting/TeeThrough/1-0-7-1.spec
2003-Oct-22 12:20:36 234 bytes prism/private/wslib/calc-lib/1.0.7/lib/fitting/TeeThrough/1-0-7-10.spec
2003-Nov-11 18:29:52 234 bytes prism/private/wslib/calc-lib/1.0.7/lib/fitting/TeeThrough/1-0-7-11.spec
2003-Dec-18 14:01:22 234 bytes prism/private/wslib/calc-lib/1.0.7/lib/fitting/TeeThrough/1-0-7-12.spec
2003-Dec-30 13:42:48 234 bytes prism/private/wslib/calc-lib/1.0.7/lib/fitting/TeeThrough/1-0-7-13.spec
2004-Feb-10 16:23:22 234 bytes prism/private/wslib/calc-lib/1.0.7/lib/fitting/TeeThrough/1-0-7-14.spec
2004-Mar-10 19:09:42 234 bytes prism/private/wslib/calc-lib/1.0.7/lib/fitting/TeeThrough/1-0-7-15.spec
2004-May-19 16:55:40 234 bytes prism/private/wslib/calc-lib/1.0.7/lib/fitting/TeeThrough/1-0-7-16.spec
2004-May-20 20:35:40 234 bytes prism/private/wslib/calc-lib/1.0.7/lib/fitting/TeeThrough/1-0-7-17.spec
2004-Jun-22 22:24:12 234 bytes prism/private/wslib/calc-lib/1.0.7/lib/fitting/TeeThrough/1-0-7-18.spec
2003-Jun-20 16:40:50 233 bytes prism/private/wslib/calc-lib/1.0.7/lib/fitting/TeeThrough/1-0-7-2.spec
2003-Jun-29 05:49:54 233 bytes prism/private/wslib/calc-lib/1.0.7/lib/fitting/TeeThrough/1-0-7-3.spec
2003-Jul-09 16:05:22 233 bytes prism/private/wslib/calc-lib/1.0.7/lib/fitting/TeeThrough/1-0-7-4.spec
2003-Jul-18 10:25:42 233 bytes prism/private/wslib/calc-lib/1.0.7/lib/fitting/TeeThrough/1-0-7-5.spec
2003-Aug-07 15:44:02 233 bytes prism/private/wslib/calc-lib/1.0.7/lib/fitting/TeeThrough/1-0-7-6.spec
2003-Aug-13 11:23:36 233 bytes prism/private/wslib/calc-lib/1.0.7/lib/fitting/TeeThrough/1-0-7-7.spec
2003-Oct-12 11:01:04 233 bytes prism/private/wslib/calc-lib/1.0.7/lib/fitting/TeeThrough/1-0-7-8.spec
2003-Oct-15 08:27:18 233 bytes prism/private/wslib/calc-lib/1.0.7/lib/fitting/TeeThrough/1-0-7-9.spec
2004-Dec-13 10:28:25 646 bytes prism/private/wslib/calc-lib/1.0.7/lib/fitting/Valve3Way
2003-Oct-22 12:20:36 215 bytes prism/private/wslib/calc-lib/1.0.7/lib/fitting/Valve3Way/1-0-7-10.spec
2003-Nov-11 18:29:52 215 bytes prism/private/wslib/calc-lib/1.0.7/lib/fitting/Valve3Way/1-0-7-11.spec
2003-Dec-18 14:01:22 215 bytes prism/private/wslib/calc-lib/1.0.7/lib/fitting/Valve3Way/1-0-7-12.spec
2003-Dec-30 13:42:48 215 bytes prism/private/wslib/calc-lib/1.0.7/lib/fitting/Valve3Way/1-0-7-13.spec
2004-Feb-10 16:23:22 215 bytes prism/private/wslib/calc-lib/1.0.7/lib/fitting/Valve3Way/1-0-7-14.spec
2004-Mar-10 19:09:42 215 bytes prism/private/wslib/calc-lib/1.0.7/lib/fitting/Valve3Way/1-0-7-15.spec
2004-May-19 16:55:40 215 bytes prism/private/wslib/calc-lib/1.0.7/lib/fitting/Valve3Way/1-0-7-16.spec
2004-May-20 20:35:40 215 bytes prism/private/wslib/calc-lib/1.0.7/lib/fitting/Valve3Way/1-0-7-17.spec 2004-Jun-22 22:24:12 215 bytes prism/private/wslib/calc-lib/1.0.7/lib/fitting/Valve3Way/1-0-7-18.spec
2003-Jun-21 14:24:10 214 bytes prism/private/wslib/calc-lib/1.0.7/lib/fitting/Valve3Way/1-0-7-2.spec
2003-Jun-29 05:49:54 214 bytes prism/private/wslib/calc-lib/1.0.7/lib/fitting/Valve3Way/1-0-7-3.spec
2003-Jul-09 16:05:22 214 bytes prism/private/wslib/calc-lib/1.0.7/lib/fitting/Valve3Way/1-0-7-4.spec
2003-Jul-18 10:25:42 214 bytes prism/private/wslib/calc-lib/1.0.7/lib/fitting/Valve3Way/1-0-7-5.spec
2003-Aug-07 15:44:02 214 bytes prism/private/wslib/calc-lib/1.0.7/lib/fitting/Valve3Way/1-0-7-6.spec
2003-Aug-13 11:23:36 214 bytes prism/private/wslib/calc-lib/1.0.7/lib/fitting/Valve3Way/1-0-7-7.spec
2003-Oct-12 11:01:04 214 bytes prism/private/wslib/calc-lib/1.0.7/lib/fitting/Valve3Way/1-0-7-8.spec
2003-Oct-15 08:27:18 214 bytes prism/private/wslib/calc-lib/1.0.7/lib/fitting/Valve3Way/1-0-7-9.spec
2004-Dec-13 10:28:27 952 bytes prism/private/wslib/calc-lib/1.0.7/lib/hazard
2004-Dec-13 10:28:25 748 bytes prism/private/wslib/calc-lib/1.0.7/lib/hazard/CC-V
2003-Apr-27 14:15:54 218 bytes prism/private/wslib/calc-lib/1.0.7/lib/hazard/CC-V/1-0-6-15.spec
2003-May-09 16:08:18 217 bytes prism/private/wslib/calc-lib/1.0.7/lib/hazard/CC-V/1-0-7-0.spec
2003-May-28 22:58:56 217 bytes prism/private/wslib/calc-lib/1.0.7/lib/hazard/CC-V/1-0-7-1.spec
2003-Oct-22 12:20:36 218 bytes prism/private/wslib/calc-lib/1.0.7/lib/hazard/CC-V/1-0-7-10.spec
2003-Nov-11 18:29:52 218 bytes prism/private/wslib/calc-lib/1.0.7/lib/hazard/CC-V/1-0-7-11.spec
2003-Dec-18 14:01:22 218 bytes prism/private/wslib/calc-lib/1.0.7/lib/hazard/CC-V/1-0-7-12.spec
2003-Dec-30 13:42:48 218 bytes prism/private/wslib/calc-lib/1.0.7/lib/hazard/CC-V/1-0-7-13.spec
2004-Feb-10 16:23:22 218 bytes prism/private/wslib/calc-lib/1.0.7/lib/hazard/CC-V/1-0-7-14.spec
2004-Mar-10 19:09:42 218 bytes prism/private/wslib/calc-lib/1.0.7/lib/hazard/CC-V/1-0-7-15.spec
2004-May-19 16:55:40 218 bytes prism/private/wslib/calc-lib/1.0.7/lib/hazard/CC-V/1-0-7-16.spec
2004-May-20 20:35:40 218 bytes prism/private/wslib/calc-lib/1.0.7/lib/hazard/CC-V/1-0-7-17.spec
2004-Jun-22 22:24:12 218 bytes prism/private/wslib/calc-lib/1.0.7/lib/hazard/CC-V/1-0-7-18.spec
2003-Jun-11 13:14:38 217 bytes prism/private/wslib/calc-lib/1.0.7/lib/hazard/CC-V/1-0-7-2.spec
2003-Jun-29 05:49:54 217 bytes prism/private/wslib/calc-lib/1.0.7/lib/hazard/CC-V/1-0-7-3.spec
2003-Jul-09 16:05:22 217 bytes prism/private/wslib/calc-lib/1.0.7/lib/hazard/CC-V/1-0-7-4.spec
2003-Jul-18 10:25:42 217 bytes prism/private/wslib/calc-lib/1.0.7/lib/hazard/CC-V/1-0-7-5.spec
2003-Aug-07 15:44:02 217 bytes prism/private/wslib/calc-lib/1.0.7/lib/hazard/CC-V/1-0-7-6.spec
2003-Aug-13 11:23:36 217 bytes prism/private/wslib/calc-lib/1.0.7/lib/hazard/CC-V/1-0-7-7.spec
2003-Oct-12 11:01:04 217 bytes prism/private/wslib/calc-lib/1.0.7/lib/hazard/CC-V/1-0-7-8.spec
2003-Oct-15 08:27:18 217 bytes prism/private/wslib/calc-lib/1.0.7/lib/hazard/CC-V/1-0-7-9.spec
2004-Dec-13 10:28:25 748 bytes prism/private/wslib/calc-lib/1.0.7/lib/hazard/CVF-2
2003-Apr-27 14:15:54 224 bytes prism/private/wslib/calc-lib/1.0.7/lib/hazard/CVF-2/1-0-6-15.spec
2003-May-09 16:08:18 223 bytes prism/private/wslib/calc-lib/1.0.7/lib/hazard/CVF-2/1-0-7-0.spec
2003-May-28 22:58:56 223 bytes prism/private/wslib/calc-lib/1.0.7/lib/hazard/CVF-2/1-0-7-1.spec
2003-Oct-22 12:20:36 224 bytes prism/private/wslib/calc-lib/1.0.7/lib/hazard/CVF-2/1-0-7-10.spec
2003-Nov-11 18:29:52 224 bytes prism/private/wslib/calc-lib/1.0.7/lib/hazard/CVF-2/1-0-7-11.spec
2003-Dec-18 14:01:22 224 bytes prism/private/wslib/calc-lib/1.0.7/lib/hazard/CVF-2/1-0-7-12.spec
2003-Dec-30 13:42:48 224 bytes prism/private/wslib/calc-lib/1.0.7/lib/hazard/CVF-2/1-0-7-13.spec
2004-Feb-10 16:23:22 224 bytes prism/private/wslib/calc-lib/1.0.7/lib/hazard/CVF-2/1-0-7-14.spec
2004-Mar-10 19:09:42 224 bytes prism/private/wslib/calc-lib/1.0.7/lib/hazard/CVF-2/1-0-7-15.spec
2004-May-19 16:55:40 224 bytes prism/private/wslib/calc-lib/1.0.7/lib/hazard/CVF-2/1-0-7-16.spec
2004-May-20 20:35:40 224 bytes prism/private/wslib/calc-lib/1.0.7/lib/hazard/CVF-2/1-0-7-17.spec
2004-Jun-22 22:24:12 224 bytes prism/private/wslib/calc-lib/1.0.7/lib/hazard/CVF-2/1-0-7-18.spec
2003-Jun-11 13:14:38 223 bytes prism/private/wslib/calc-lib/1.0.7/lib/hazard/CVF-2/1-0-7-2.spec
2003-Jun-29 05:49:56 223 bytes prism/private/wslib/calc-lib/1.0.7/lib/hazard/CVF-2/1-0-7-3.spec
2003-Jul-09 16:05:22 223 bytes prism/private/wslib/calc-lib/1.0.7/lib/hazard/CVF-2/1-0-7-4.spec
2003-Jul-18 10:25:42 223 bytes prism/private/wslib/calc-lib/1.0.7/lib/hazard/CVF-2/1-0-7-5.spec
2003-Aug-07 15:44:02 223 bytes prism/private/wslib/calc-lib/1.0.7/lib/hazard/CVF-2/1-0-7-6.spec
2003-Aug-13 11:23:36 223 bytes prism/private/wslib/calc-lib/1.0.7/lib/hazard/CVF-2/1-0-7-7.spec
2003-Oct-12 11:01:04 223 bytes prism/private/wslib/calc-lib/1.0.7/lib/hazard/CVF-2/1-0-7-8.spec
2003-Oct-15 08:27:18 223 bytes prism/private/wslib/calc-lib/1.0.7/lib/hazard/CVF-2/1-0-7-9.spec
2004-Dec-13 10:28:26 748 bytes prism/private/wslib/calc-lib/1.0.7/lib/hazard/CVF-L
2003-Apr-27 14:15:54 225 bytes prism/private/wslib/calc-lib/1.0.7/lib/hazard/CVF-L/1-0-6-15.spec
2003-May-09 16:08:18 224 bytes prism/private/wslib/calc-lib/1.0.7/lib/hazard/CVF-L/1-0-7-0.spec
2003-May-28 22:58:56 224 bytes prism/private/wslib/calc-lib/1.0.7/lib/hazard/CVF-L/1-0-7-1.spec
2003-Oct-22 12:20:36 225 bytes prism/private/wslib/calc-lib/1.0.7/lib/hazard/CVF-L/1-0-7-10.spec
2003-Nov-11 18:29:52 225 bytes prism/private/wslib/calc-lib/1.0.7/lib/hazard/CVF-L/1-0-7-11.spec
2003-Dec-18 14:01:22 225 bytes prism/private/wslib/calc-lib/1.0.7/lib/hazard/CVF-L/1-0-7-12.spec
2003-Dec-30 13:42:48 225 bytes prism/private/wslib/calc-lib/1.0.7/lib/hazard/CVF-L/1-0-7-13.spec
2004-Feb-10 16:23:22 225 bytes prism/private/wslib/calc-lib/1.0.7/lib/hazard/CVF-L/1-0-7-14.spec 2004-Mar-10 19:09:42 225 bytes prism/private/wslib/calc-lib/1.0.7/lib/hazard/CVF-L/1-0-7-15.spec
2004-May-19 16:55:40 225 bytes prism/private/wslib/calc-lib/1.0.7/lib/hazard/CVF-L/1-0-7-16.spec
2004-May-20 20:35:40 225 bytes prism/private/wslib/calc-lib/1.0.7/lib/hazard/CVF-L/1-0-7-17.spec
2004-Jun-22 22:24:12 225 bytes prism/private/wslib/calc-lib/1.0.7/lib/hazard/CVF-L/1-0-7-18.spec
2003-Jun-11 13:14:38 224 bytes prism/private/wslib/calc-lib/1.0.7/lib/hazard/CVF-L/1-0-7-2.spec
2003-Jun-29 05:49:56 224 bytes prism/private/wslib/calc-lib/1.0.7/lib/hazard/CVF-L/1-0-7-3.spec
2003-Jul-09 16:05:22 224 bytes prism/private/wslib/calc-lib/1.0.7/lib/hazard/CVF-L/1-0-7-4.spec
2003-Jul-18 10:25:42 224 bytes prism/private/wslib/calc-lib/1.0.7/lib/hazard/CVF-L/1-0-7-5.spec
2003-Aug-07 15:44:02 224 bytes prism/private/wslib/calc-lib/1.0.7/lib/hazard/CVF-L/1-0-7-6.spec
2003-Aug-13 11:23:36 224 bytes prism/private/wslib/calc-lib/1.0.7/lib/hazard/CVF-L/1-0-7-7.spec
2003-Oct-12 11:01:04 224 bytes prism/private/wslib/calc-lib/1.0.7/lib/hazard/CVF-L/1-0-7-8.spec
2003-Oct-15 08:27:18 224 bytes prism/private/wslib/calc-lib/1.0.7/lib/hazard/CVF-L/1-0-7-9.spec
2004-Dec-13 10:28:26 748 bytes prism/private/wslib/calc-lib/1.0.7/lib/hazard/CVF-S
2003-Apr-27 14:15:54 220 bytes prism/private/wslib/calc-lib/1.0.7/lib/hazard/CVF-S/1-0-6-15.spec
2003-May-09 16:08:18 219 bytes prism/private/wslib/calc-lib/1.0.7/lib/hazard/CVF-S/1-0-7-0.spec
2003-May-28 22:58:56 219 bytes prism/private/wslib/calc-lib/1.0.7/lib/hazard/CVF-S/1-0-7-1.spec
2003-Oct-22 12:20:36 220 bytes prism/private/wslib/calc-lib/1.0.7/lib/hazard/CVF-S/1-0-7-10.spec
2003-Nov-11 18:29:52 220 bytes prism/private/wslib/calc-lib/1.0.7/lib/hazard/CVF-S/1-0-7-11.spec
2003-Dec-18 14:01:22 220 bytes prism/private/wslib/calc-lib/1.0.7/lib/hazard/CVF-S/1-0-7-12.spec
2003-Dec-30 13:42:48 220 bytes prism/private/wslib/calc-lib/1.0.7/lib/hazard/CVF-S/1-0-7-13.spec
2004-Feb-10 16:23:22 220 bytes prism/private/wslib/calc-lib/1.0.7/lib/hazard/CVF-S/1-0-7-14.spec
2004-Mar-10 19:09:42 220 bytes prism/private/wslib/calc-lib/1.0.7/lib/hazard/CVF-S/1-0-7-15.spec
2004-May-19 16:55:40 220 bytes prism/private/wslib/calc-lib/1.0.7/lib/hazard/CVF-S/1-0-7-16.spec
2004-May-20 20:35:40 220 bytes prism/private/wslib/calc-lib/1.0.7/lib/hazard/CVF-S/1-0-7-17.spec
2004-Jun-22 22:24:12 220 bytes prism/private/wslib/calc-lib/1.0.7/lib/hazard/CVF-S/1-0-7-18.spec
2003-Jun-11 13:14:38 219 bytes prism/private/wslib/calc-lib/1.0.7/lib/hazard/CVF-S/1-0-7-2.spec
2003-Jun-29 05:49:56 219 bytes prism/private/wslib/calc-lib/1.0.7/lib/hazard/CVF-S/1-0-7-3.spec
2003-Jul-09 16:05:22 219 bytes prism/private/wslib/calc-lib/1.0.7/lib/hazard/CVF-S/1-0-7-4.spec
2003-Jul-18 10:25:42 219 bytes prism/private/wslib/calc-lib/1.0.7/lib/hazard/CVF-S/1-0-7-5.spec
2003-Aug-07 15:44:02 219 bytes prism/private/wslib/calc-lib/1.0.7/lib/hazard/CVF-S/1-0-7-6.spec
2003-Aug-13 11:23:36 219 bytes prism/private/wslib/calc-lib/1.0.7/lib/hazard/CVF-S/1-0-7-7.spec
2003-Oct-12 11:01:04 219 bytes prism/private/wslib/calc-lib/1.0.7/lib/hazard/CVF-S/1-0-7-8.spec
2003-Oct-15 08:27:18 219 bytes prism/private/wslib/calc-lib/1.0.7/lib/hazard/CVF-S/1-0-7-9.spec
2004-Dec-13 10:28:26 748 bytes prism/private/wslib/calc-lib/1.0.7/lib/hazard/CVF-V
2003-Apr-27 14:15:54 223 bytes prism/private/wslib/calc-lib/1.0.7/lib/hazard/CVF-V/1-0-6-15.spec
2003-May-09 16:08:18 222 bytes prism/private/wslib/calc-lib/1.0.7/lib/hazard/CVF-V/1-0-7-0.spec
2003-May-28 22:58:56 222 bytes prism/private/wslib/calc-lib/1.0.7/lib/hazard/CVF-V/1-0-7-1.spec
2003-Oct-22 12:20:36 223 bytes prism/private/wslib/calc-lib/1.0.7/lib/hazard/CVF-V/1-0-7-10.spec
2003-Nov-11 18:29:52 223 bytes prism/private/wslib/calc-lib/1.0.7/lib/hazard/CVF-V/1-0-7-11.spec
2003-Dec-19 09:41:32 842 bytes prism/private/wslib/calc-lib/1.0.7/lib/hazard/CVF-V/1-0-7-12.spec
2003-Dec-30 13:42:48 842 bytes prism/private/wslib/calc-lib/1.0.7/lib/hazard/CVF-V/1-0-7-13.spec
2004-Feb-10 16:23:22 842 bytes prism/private/wslib/calc-lib/1.0.7/lib/hazard/CVF-V/1-0-7-14.spec
2004-Mar-10 19:09:42 842 bytes prism/private/wslib/calc-lib/1.0.7/lib/hazard/CVF-V/1-0-7-15.spec
2004-May-19 16:55:40 842 bytes prism/private/wslib/calc-lib/1.0.7/lib/hazard/CVF-V/1-0-7-16.spec
2004-May-20 20:35:40 842 bytes prism/private/wslib/calc-lib/1.0.7/lib/hazard/CVF-V/1-0-7-17.spec
2004-Jun-22 22:24:12 842 bytes prism/private/wslib/calc-lib/1.0.7/lib/hazard/CVF-V/1-0-7-18.spec
2003-Jun-11 13:14:38 222 bytes prism/private/wslib/calc-lib/1.0.7/lib/hazard/CVF-V/1-0-7-2.spec
2003-Jun-29 05:49:56 222 bytes prism/private/wslib/calc-lib/1.0.7/lib/hazard/CVF-V/1-0-7-3.spec
2003-Jul-09 16:05:22 222 bytes prism/private/wslib/calc-lib/1.0.7/lib/hazard/CVF-V/1-0-7-4.spec
2003-Jul-18 10:25:42 222 bytes prism/private/wslib/calc-lib/1.0.7/lib/hazard/CVF-V/1-0-7-5.spec
2003-Aug-07 15:44:02 222 bytes prism/private/wslib/calc-lib/1.0.7/lib/hazard/CVF-V/1-0-7-6.spec
2003-Aug-13 11:23:36 222 bytes prism/private/wslib/calc-lib/1.0.7/lib/hazard/CVF-V/1-0-7-7.spec
2003-Oct-12 11:01:04 222 bytes prism/private/wslib/calc-lib/1.0.7/lib/hazard/CVF-V/1-0-7-8.spec
2003-Oct-15 08:27:18 222 bytes prism/private/wslib/calc-lib/1.0.7/lib/hazard/CVF-V/1-0-7-9.spec
2004-Dec-13 10:28:26 748 bytes prism/private/wslib/calc-lib/1.0.7/lib/hazard/FGE-V
2003-Apr-27 14:15:54 217 bytes prism/private/wslib/calc-lib/1.0.7/lib/hazard/FGE-V/1-0-6-15.spec
2003-May-09 16:08:18 216 bytes prism/private/wslib/calc-lib/1.0.7/lib/hazard/FGE-V/1-0-7-0.spec
2003-May-28 22:58:56 216 bytes prism/private/wslib/calc-lib/1.0.7/lib/hazard/FGE-V/1-0-7-1.spec
2003-Oct-22 12:20:36 217 bytes prism/private/wslib/calc-lib/1.0.7/lib/hazard/FGE-V/1-0-7-10.spec
2003-Nov-11 18:29:52 217 bytes prism/private/wslib/calc-lib/1.0.7/lib/hazard/FGE-V/1-0-7-11.spec
2003-Dec-18 14:01:22 217 bytes prism/private/wslib/calc-lib/1.0.7/lib/hazard/FGE-V/1-0-7-12.spec

| | | |
|---|---|---|
| 2003-Dec-30 13:42:48 | 217 bytes | prism/private/wslib/calc-lib/1.0.7/lib/hazard/FGE-V/1-0-7-13.spec |
| 2004-Feb-10 16:23:22 | 217 bytes | prism/private/wslib/calc-lib/1.0.7/lib/hazard/FGE-V/1-0-7-14.spec |
| 2004-Mar-10 19:09:42 | 217 bytes | prism/private/wslib/calc-lib/1.0.7/lib/hazard/FGE-V/1-0-7-15.spec |
| 2004-May-19 16:55:40 | 217 bytes | prism/private/wslib/calc-lib/1.0.7/lib/hazard/FGE-V/1-0-7-16.spec |
| 2004-May-20 20:35:40 | 217 bytes | prism/private/wslib/calc-lib/1.0.7/lib/hazard/FGE-V/1-0-7-17.spec |
| 2004-Jun-23 15:55:26 | 219 bytes | prism/private/wslib/calc-lib/1.0.7/lib/hazard/FGE-V/1-0-7-18.spec |
| 2003-Jun-11 13:14:38 | 216 bytes | prism/private/wslib/calc-lib/1.0.7/lib/hazard/FGE-V/1-0-7-2.spec |
| 2003-Jun-29 05:49:56 | 216 bytes | prism/private/wslib/calc-lib/1.0.7/lib/hazard/FGE-V/1-0-7-3.spec |
| 2003-Jul-09 16:05:22 | 216 bytes | prism/private/wslib/calc-lib/1.0.7/lib/hazard/FGE-V/1-0-7-4.spec |
| 2003-Jul-18 10:25:42 | 216 bytes | prism/private/wslib/calc-lib/1.0.7/lib/hazard/FGE-V/1-0-7-5.spec |
| 2003-Aug-07 15:44:02 | 216 bytes | prism/private/wslib/calc-lib/1.0.7/lib/hazard/FGE-V/1-0-7-6.spec |
| 2003-Aug-13 11:23:36 | 216 bytes | prism/private/wslib/calc-lib/1.0.7/lib/hazard/FGE-V/1-0-7-7.spec |
| 2003-Oct-12 11:01:04 | 216 bytes | prism/private/wslib/calc-lib/1.0.7/lib/hazard/FGE-V/1-0-7-8.spec |
| 2003-Oct-15 08:27:18 | 216 bytes | prism/private/wslib/calc-lib/1.0.7/lib/hazard/FGE-V/1-0-7-9.spec |
| 2004-Dec-13 10:28:26 | 748 bytes | prism/private/wslib/calc-lib/1.0.7/lib/hazard/FVG-V |
| 2003-Apr-27 14:15:54 | 225 bytes | prism/private/wslib/calc-lib/1.0.7/lib/hazard/FVG-V/1-0-6-15.spec |
| 2003-May-09 16:08:18 | 224 bytes | prism/private/wslib/calc-lib/1.0.7/lib/hazard/FVG-V/1-0-7-0.spec |
| 2003-May-28 22:58:56 | 224 bytes | prism/private/wslib/calc-lib/1.0.7/lib/hazard/FVG-V/1-0-7-1.spec |
| 2003-Oct-22 12:20:36 | 225 bytes | prism/private/wslib/calc-lib/1.0.7/lib/hazard/FVG-V/1-0-7-10.spec |
| 2003-Nov-11 18:29:52 | 225 bytes | prism/private/wslib/calc-lib/1.0.7/lib/hazard/FVG-V/1-0-7-11.spec |
| 2003-Dec-18 14:01:22 | 225 bytes | prism/private/wslib/calc-lib/1.0.7/lib/hazard/FVG-V/1-0-7-12.spec |
| 2003-Dec-30 13:42:48 | 225 bytes | prism/private/wslib/calc-lib/1.0.7/lib/hazard/FVG-V/1-0-7-13.spec |
| 2004-Feb-10 16:23:22 | 225 bytes | prism/private/wslib/calc-lib/1.0.7/lib/hazard/FVG-V/1-0-7-14.spec |
| 2004-Mar-10 19:09:42 | 225 bytes | prism/private/wslib/calc-lib/1.0.7/lib/hazard/FVG-V/1-0-7-15.spec |
| 2004-May-19 16:55:40 | 225 bytes | prism/private/wslib/calc-lib/1.0.7/lib/hazard/FVG-V/1-0-7-16.spec |
| 2004-May-20 20:35:40 | 225 bytes | prism/private/wslib/calc-lib/1.0.7/lib/hazard/FVG-V/1-0-7-17.spec |
| 2004-Jun-22 22:24:12 | 225 bytes | prism/private/wslib/calc-lib/1.0.7/lib/hazard/FVG-V/1-0-7-18.spec |
| 2003-Jun-11 13:14:38 | 224 bytes | prism/private/wslib/calc-lib/1.0.7/lib/hazard/FVG-V/1-0-7-2.spec |
| 2003-Jun-29 05:49:56 | 224 bytes | prism/private/wslib/calc-lib/1.0.7/lib/hazard/FVG-V/1-0-7-3.spec |
| 2003-Jul-09 16:05:22 | 224 bytes | prism/private/wslib/calc-lib/1.0.7/lib/hazard/FVG-V/1-0-7-4.spec |
| 2003-Jul-18 10:25:42 | 224 bytes | prism/private/wslib/calc-lib/1.0.7/lib/hazard/FVG-V/1-0-7-5.spec |
| 2003-Aug-07 15:44:02 | 224 bytes | prism/private/wslib/calc-lib/1.0.7/lib/hazard/FVG-V/1-0-7-6.spec |
| 2003-Aug-13 11:23:36 | 224 bytes | prism/private/wslib/calc-lib/1.0.7/lib/hazard/FVG-V/1-0-7-7.spec |
| 2003-Oct-12 11:01:04 | 224 bytes | prism/private/wslib/calc-lib/1.0.7/lib/hazard/FVG-V/1-0-7-8.spec |
| 2003-Oct-15 08:27:18 | 224 bytes | prism/private/wslib/calc-lib/1.0.7/lib/hazard/FVG-V/1-0-7-9.spec |
| 2004-Dec-13 10:28:26 | 748 bytes | prism/private/wslib/calc-lib/1.0.7/lib/hazard/GF-2 |
| 2003-Apr-27 14:15:54 | 213 bytes | prism/private/wslib/calc-lib/1.0.7/lib/hazard/GF-2/1-0-6-15.spec |
| 2003-May-09 16:08:18 | 212 bytes | prism/private/wslib/calc-lib/1.0.7/lib/hazard/GF-2/1-0-7-0.spec |
| 2003-May-28 22:58:56 | 212 bytes | prism/private/wslib/calc-lib/1.0.7/lib/hazard/GF-2/1-0-7-1.spec |
| 2003-Oct-22 12:20:36 | 213 bytes | prism/private/wslib/calc-lib/1.0.7/lib/hazard/GF-2/1-0-7-10.spec |
| 2003-Nov-11 18:29:52 | 213 bytes | prism/private/wslib/calc-lib/1.0.7/lib/hazard/GF-2/1-0-7-11.spec |
| 2003-Dec-18 14:01:22 | 213 bytes | prism/private/wslib/calc-lib/1.0.7/lib/hazard/GF-2/1-0-7-12.spec |
| 2003-Dec-30 13:42:48 | 213 bytes | prism/private/wslib/calc-lib/1.0.7/lib/hazard/GF-2/1-0-7-13.spec |
| 2004-Feb-10 16:23:22 | 213 bytes | prism/private/wslib/calc-lib/1.0.7/lib/hazard/GF-2/1-0-7-14.spec |
| 2004-Mar-10 19:09:42 | 213 bytes | prism/private/wslib/calc-lib/1.0.7/lib/hazard/GF-2/1-0-7-15.spec |
| 2004-May-19 16:55:40 | 213 bytes | prism/private/wslib/calc-lib/1.0.7/lib/hazard/GF-2/1-0-7-16.spec |
| 2004-May-20 20:35:40 | 213 bytes | prism/private/wslib/calc-lib/1.0.7/lib/hazard/GF-2/1-0-7-17.spec |
| 2004-Jun-22 22:24:12 | 213 bytes | prism/private/wslib/calc-lib/1.0.7/lib/hazard/GF-2/1-0-7-18.spec |
| 2003-Jun-11 13:14:38 | 212 bytes | prism/private/wslib/calc-lib/1.0.7/lib/hazard/GF-2/1-0-7-2.spec |
| 2003-Jun-29 05:49:56 | 212 bytes | prism/private/wslib/calc-lib/1.0.7/lib/hazard/GF-2/1-0-7-3.spec |
| 2003-Jul-09 16:05:22 | 212 bytes | prism/private/wslib/calc-lib/1.0.7/lib/hazard/GF-2/1-0-7-4.spec |
| 2003-Jul-18 10:25:42 | 212 bytes | prism/private/wslib/calc-lib/1.0.7/lib/hazard/GF-2/1-0-7-5.spec |
| 2003-Aug-07 15:44:02 | 212 bytes | prism/private/wslib/calc-lib/1.0.7/lib/hazard/GF-2/1-0-7-6.spec |
| 2003-Aug-13 11:23:36 | 212 bytes | prism/private/wslib/calc-lib/1.0.7/lib/hazard/GF-2/1-0-7-7.spec |
| 2003-Oct-12 11:01:04 | 212 bytes | prism/private/wslib/calc-lib/1.0.7/lib/hazard/GF-2/1-0-7-8.spec |
| 2003-Oct-15 08:27:18 | 212 bytes | prism/private/wslib/calc-lib/1.0.7/lib/hazard/GF-2/1-0-7-9.spec |
| 2004-Dec-13 10:28:26 | 748 bytes | prism/private/wslib/calc-lib/1.0.7/lib/hazard/GF-L |
| 2003-Apr-27 14:15:54 | 210 bytes | prism/private/wslib/calc-lib/1.0.7/lib/hazard/GF-L/1-0-6-15.spec |
| 2003-May-09 16:08:18 | 209 bytes | prism/private/wslib/calc-lib/1.0.7/lib/hazard/GF-L/1-0-7-0.spec |
| 2003-May-28 22:58:56 | 209 bytes | prism/private/wslib/calc-lib/1.0.7/lib/hazard/GF-L/1-0-7-1.spec |
| 2003-Oct-22 12:20:36 | 210 bytes | prism/private/wslib/calc-lib/1.0.7/lib/hazard/GF-L/1-0-7-10.spec |

2003-Nov-11 18:29:52 210 bytes prism/private/wslib/calc-lib/1.0.7/lib/hazard/GF-L/1-0-7-11.spec
2003-Dec-18 14:01:22 210 bytes prism/private/wslib/calc-lib/1.0.7/lib/hazard/GF-L/1-0-7-12.spec
2003-Dec-30 13:42:48 210 bytes prism/private/wslib/calc-lib/1.0.7/lib/hazard/GF-L/1-0-7-13.spec
2004-Feb-10 16:23:22 210 bytes prism/private/wslib/calc-lib/1.0.7/lib/hazard/GF-L/1-0-7-14.spec
2004-Mar-10 19:09:42 210 bytes prism/private/wslib/calc-lib/1.0.7/lib/hazard/GF-L/1-0-7-15.spec
2004-May-19 16:55:40 210 bytes prism/private/wslib/calc-lib/1.0.7/lib/hazard/GF-L/1-0-7-16.spec
2004-May-20 20:35:40 210 bytes prism/private/wslib/calc-lib/1.0.7/lib/hazard/GF-L/1-0-7-17.spec
2004-Jun-22 22:24:12 210 bytes prism/private/wslib/calc-lib/1.0.7/lib/hazard/GF-L/1-0-7-18.spec
2003-Jun-11 13:14:38 209 bytes prism/private/wslib/calc-lib/1.0.7/lib/hazard/GF-L/1-0-7-2.spec
2003-Jun-29 05:49:56 209 bytes prism/private/wslib/calc-lib/1.0.7/lib/hazard/GF-L/1-0-7-3.spec
2003-Jul-09 16:05:22 209 bytes prism/private/wslib/calc-lib/1.0.7/lib/hazard/GF-L/1-0-7-4.spec
2003-Jul-18 10:25:42 209 bytes prism/private/wslib/calc-lib/1.0.7/lib/hazard/GF-L/1-0-7-5.spec
2003-Aug-07 15:44:02 209 bytes prism/private/wslib/calc-lib/1.0.7/lib/hazard/GF-L/1-0-7-6.spec
2003-Aug-13 11:23:36 209 bytes prism/private/wslib/calc-lib/1.0.7/lib/hazard/GF-L/1-0-7-7.spec
2003-Oct-12 11:01:04 209 bytes prism/private/wslib/calc-lib/1.0.7/lib/hazard/GF-L/1-0-7-8.spec
2003-Oct-15 08:27:18 209 bytes prism/private/wslib/calc-lib/1.0.7/lib/hazard/GF-L/1-0-7-9.spec
2004-Dec-13 10:28:26 748 bytes prism/private/wslib/calc-lib/1.0.7/lib/hazard/GF-S
2003-Apr-27 14:15:54 207 bytes prism/private/wslib/calc-lib/1.0.7/lib/hazard/GF-S/1-0-6-15.spec
2003-May-09 16:08:18 206 bytes prism/private/wslib/calc-lib/1.0.7/lib/hazard/GF-S/1-0-7-0.spec
2003-May-28 22:58:56 206 bytes prism/private/wslib/calc-lib/1.0.7/lib/hazard/GF-S/1-0-7-1.spec
2003-Oct-22 12:20:36 207 bytes prism/private/wslib/calc-lib/1.0.7/lib/hazard/GF-S/1-0-7-10.spec
2003-Nov-11 18:29:52 207 bytes prism/private/wslib/calc-lib/1.0.7/lib/hazard/GF-S/1-0-7-11.spec
2003-Dec-18 14:01:22 207 bytes prism/private/wslib/calc-lib/1.0.7/lib/hazard/GF-S/1-0-7-12.spec
2003-Dec-30 13:42:48 207 bytes prism/private/wslib/calc-lib/1.0.7/lib/hazard/GF-S/1-0-7-13.spec
2004-Feb-10 16:23:22 207 bytes prism/private/wslib/calc-lib/1.0.7/lib/hazard/GF-S/1-0-7-14.spec
2004-Mar-10 19:09:42 207 bytes prism/private/wslib/calc-lib/1.0.7/lib/hazard/GF-S/1-0-7-15.spec
2004-May-19 16:55:40 207 bytes prism/private/wslib/calc-lib/1.0.7/lib/hazard/GF-S/1-0-7-16.spec
2004-May-20 20:35:40 207 bytes prism/private/wslib/calc-lib/1.0.7/lib/hazard/GF-S/1-0-7-17.spec
2004-Jun-22 22:24:12 207 bytes prism/private/wslib/calc-lib/1.0.7/lib/hazard/GF-S/1-0-7-18.spec
2003-Jun-11 13:14:38 206 bytes prism/private/wslib/calc-lib/1.0.7/lib/hazard/GF-S/1-0-7-2.spec
2003-Jun-29 05:49:56 206 bytes prism/private/wslib/calc-lib/1.0.7/lib/hazard/GF-S/1-0-7-3.spec
2003-Jul-09 16:05:22 206 bytes prism/private/wslib/calc-lib/1.0.7/lib/hazard/GF-S/1-0-7-4.spec
2003-Jul-18 10:25:42 206 bytes prism/private/wslib/calc-lib/1.0.7/lib/hazard/GF-S/1-0-7-5.spec
2003-Aug-07 15:44:02 206 bytes prism/private/wslib/calc-lib/1.0.7/lib/hazard/GF-S/1-0-7-6.spec
2003-Aug-13 11:23:36 206 bytes prism/private/wslib/calc-lib/1.0.7/lib/hazard/GF-S/1-0-7-7.spec
2003-Oct-12 11:01:04 206 bytes prism/private/wslib/calc-lib/1.0.7/lib/hazard/GF-S/1-0-7-8.spec
2003-Oct-15 08:27:18 206 bytes prism/private/wslib/calc-lib/1.0.7/lib/hazard/GF-S/1-0-7-9.spec
2004-Dec-13 10:28:26 748 bytes prism/private/wslib/calc-lib/1.0.7/lib/hazard/GF-V
2003-Apr-27 14:15:54 208 bytes prism/private/wslib/calc-lib/1.0.7/lib/hazard/GF-V/1-0-6-15.spec
2003-May-09 16:08:18 207 bytes prism/private/wslib/calc-lib/1.0.7/lib/hazard/GF-V/1-0-7-0.spec
2003-May-28 22:58:56 207 bytes prism/private/wslib/calc-lib/1.0.7/lib/hazard/GF-V/1-0-7-1.spec
2003-Oct-22 12:20:36 208 bytes prism/private/wslib/calc-lib/1.0.7/lib/hazard/GF-V/1-0-7-10.spec
2003-Nov-11 18:29:52 208 bytes prism/private/wslib/calc-lib/1.0.7/lib/hazard/GF-V/1-0-7-11.spec
2003-Dec-18 14:01:22 208 bytes prism/private/wslib/calc-lib/1.0.7/lib/hazard/GF-V/1-0-7-12.spec
2003-Dec-30 13:42:48 208 bytes prism/private/wslib/calc-lib/1.0.7/lib/hazard/GF-V/1-0-7-13.spec
2004-Feb-10 16:23:22 208 bytes prism/private/wslib/calc-lib/1.0.7/lib/hazard/GF-V/1-0-7-14.spec
2004-Mar-10 19:09:42 208 bytes prism/private/wslib/calc-lib/1.0.7/lib/hazard/GF-V/1-0-7-15.spec
2004-May-19 16:55:40 208 bytes prism/private/wslib/calc-lib/1.0.7/lib/hazard/GF-V/1-0-7-16.spec
2004-May-20 20:35:40 208 bytes prism/private/wslib/calc-lib/1.0.7/lib/hazard/GF-V/1-0-7-17.spec
2004-Jun-22 22:24:12 208 bytes prism/private/wslib/calc-lib/1.0.7/lib/hazard/GF-V/1-0-7-18.spec
2003-Jun-11 13:14:38 207 bytes prism/private/wslib/calc-lib/1.0.7/lib/hazard/GF-V/1-0-7-2.spec
2003-Jun-29 05:49:56 207 bytes prism/private/wslib/calc-lib/1.0.7/lib/hazard/GF-V/1-0-7-3.spec
2003-Jul-09 16:05:22 207 bytes prism/private/wslib/calc-lib/1.0.7/lib/hazard/GF-V/1-0-7-4.spec
2003-Jul-18 10:25:42 207 bytes prism/private/wslib/calc-lib/1.0.7/lib/hazard/GF-V/1-0-7-5.spec
2003-Aug-07 15:44:02 207 bytes prism/private/wslib/calc-lib/1.0.7/lib/hazard/GF-V/1-0-7-6.spec
2003-Aug-13 11:23:36 207 bytes prism/private/wslib/calc-lib/1.0.7/lib/hazard/GF-V/1-0-7-7.spec
2003-Oct-12 11:01:04 207 bytes prism/private/wslib/calc-lib/1.0.7/lib/hazard/GF-V/1-0-7-8.spec
2003-Oct-15 08:27:18 207 bytes prism/private/wslib/calc-lib/1.0.7/lib/hazard/GF-V/1-0-7-9.spec
2004-Dec-13 10:28:26 748 bytes prism/private/wslib/calc-lib/1.0.7/lib/hazard/LE-L
2003-Apr-27 14:15:54 215 bytes prism/private/wslib/calc-lib/1.0.7/lib/hazard/LE-L/1-0-6-15.spec
2003-May-09 16:08:18 214 bytes prism/private/wslib/calc-lib/1.0.7/lib/hazard/LE-L/1-0-7-0.spec

```
2003-May-28 22:58:56   214 bytes  prism/private/wslib/calc-lib/1.0.7/lib/hazard/LE-L/1-0-7-1.spec
2003-Oct-22 12:20:36   215 bytes  prism/private/wslib/calc-lib/1.0.7/lib/hazard/LE-L/1-0-7-10.spec
2003-Nov-11 18:29:52   215 bytes  prism/private/wslib/calc-lib/1.0.7/lib/hazard/LE-L/1-0-7-11.spec
2003-Dec-18 14:01:22   215 bytes  prism/private/wslib/calc-lib/1.0.7/lib/hazard/LE-L/1-0-7-12.spec
2003-Dec-30 13:42:48   215 bytes  prism/private/wslib/calc-lib/1.0.7/lib/hazard/LE-L/1-0-7-13.spec
2004-Feb-10 16:23:22   215 bytes  prism/private/wslib/calc-lib/1.0.7/lib/hazard/LE-L/1-0-7-14.spec
2004-Mar-10 19:09:42   215 bytes  prism/private/wslib/calc-lib/1.0.7/lib/hazard/LE-L/1-0-7-15.spec
2004-May-19 16:55:40   215 bytes  prism/private/wslib/calc-lib/1.0.7/lib/hazard/LE-L/1-0-7-16.spec
2004-Jun-02 11:32:58   216 bytes  prism/private/wslib/calc-lib/1.0.7/lib/hazard/LE-L/1-0-7-17.spec
2004-Jun-22 22:24:12   216 bytes  prism/private/wslib/calc-lib/1.0.7/lib/hazard/LE-L/1-0-7-18.spec
2003-Jun-11 13:14:38   214 bytes  prism/private/wslib/calc-lib/1.0.7/lib/hazard/LE-L/1-0-7-2.spec
2003-Jun-29 05:49:56   214 bytes  prism/private/wslib/calc-lib/1.0.7/lib/hazard/LE-L/1-0-7-3.spec
2003-Jul-09 16:05:22   214 bytes  prism/private/wslib/calc-lib/1.0.7/lib/hazard/LE-L/1-0-7-4.spec
2003-Jul-18 10:25:42   214 bytes  prism/private/wslib/calc-lib/1.0.7/lib/hazard/LE-L/1-0-7-5.spec
2003-Aug-07 15:44:02   214 bytes  prism/private/wslib/calc-lib/1.0.7/lib/hazard/LE-L/1-0-7-6.spec
2003-Aug-13 11:23:36   214 bytes  prism/private/wslib/calc-lib/1.0.7/lib/hazard/LE-L/1-0-7-7.spec
2003-Oct-12 11:01:04   214 bytes  prism/private/wslib/calc-lib/1.0.7/lib/hazard/LE-L/1-0-7-8.spec
2003-Oct-15 08:27:18   214 bytes  prism/private/wslib/calc-lib/1.0.7/lib/hazard/LE-L/1-0-7-9.spec
2004-Dec-13 10:28:26   748 bytes  prism/private/wslib/calc-lib/1.0.7/lib/hazard/PF-L
2003-Apr-27 14:15:54   210 bytes  prism/private/wslib/calc-lib/1.0.7/lib/hazard/PF-L/1-0-6-15.spec
2003-May-09 16:08:18   209 bytes  prism/private/wslib/calc-lib/1.0.7/lib/hazard/PF-L/1-0-7-0.spec
2003-May-28 22:58:56   209 bytes  prism/private/wslib/calc-lib/1.0.7/lib/hazard/PF-L/1-0-7-1.spec
2003-Oct-22 12:20:36   210 bytes  prism/private/wslib/calc-lib/1.0.7/lib/hazard/PF-L/1-0-7-10.spec
2003-Nov-11 18:29:52   210 bytes  prism/private/wslib/calc-lib/1.0.7/lib/hazard/PF-L/1-0-7-11.spec
2003-Dec-18 14:01:22   210 bytes  prism/private/wslib/calc-lib/1.0.7/lib/hazard/PF-L/1-0-7-12.spec
2003-Dec-30 13:42:48   210 bytes  prism/private/wslib/calc-lib/1.0.7/lib/hazard/PF-L/1-0-7-13.spec
2004-Feb-10 16:23:22   210 bytes  prism/private/wslib/calc-lib/1.0.7/lib/hazard/PF-L/1-0-7-14.spec
2004-Mar-10 19:09:42   210 bytes  prism/private/wslib/calc-lib/1.0.7/lib/hazard/PF-L/1-0-7-15.spec
2004-May-19 16:55:40   210 bytes  prism/private/wslib/calc-lib/1.0.7/lib/hazard/PF-L/1-0-7-16.spec
2004-May-20 20:35:42   210 bytes  prism/private/wslib/calc-lib/1.0.7/lib/hazard/PF-L/1-0-7-17.spec
2004-Jun-22 22:24:12   210 bytes  prism/private/wslib/calc-lib/1.0.7/lib/hazard/PF-L/1-0-7-18.spec
2003-Jun-11 13:14:38   209 bytes  prism/private/wslib/calc-lib/1.0.7/lib/hazard/PF-L/1-0-7-2.spec
2003-Jun-29 05:49:56   209 bytes  prism/private/wslib/calc-lib/1.0.7/lib/hazard/PF-L/1-0-7-3.spec
2003-Jul-09 16:05:22   209 bytes  prism/private/wslib/calc-lib/1.0.7/lib/hazard/PF-L/1-0-7-4.spec
2003-Jul-18 10:25:42   209 bytes  prism/private/wslib/calc-lib/1.0.7/lib/hazard/PF-L/1-0-7-5.spec
2003-Aug-07 15:44:02   209 bytes  prism/private/wslib/calc-lib/1.0.7/lib/hazard/PF-L/1-0-7-6.spec
2003-Aug-13 11:23:36   209 bytes  prism/private/wslib/calc-lib/1.0.7/lib/hazard/PF-L/1-0-7-7.spec
2003-Oct-12 11:01:04   209 bytes  prism/private/wslib/calc-lib/1.0.7/lib/hazard/PF-L/1-0-7-8.spec
2003-Oct-15 08:27:18   209 bytes  prism/private/wslib/calc-lib/1.0.7/lib/hazard/PF-L/1-0-7-9.spec
2004-Dec-13 10:28:26   748 bytes  prism/private/wslib/calc-lib/1.0.7/lib/hazard/PF-V
2003-Apr-27 14:15:54   210 bytes  prism/private/wslib/calc-lib/1.0.7/lib/hazard/PF-V/1-0-6-15.spec
2003-May-09 16:08:18   209 bytes  prism/private/wslib/calc-lib/1.0.7/lib/hazard/PF-V/1-0-7-0.spec
2003-May-28 22:58:56   209 bytes  prism/private/wslib/calc-lib/1.0.7/lib/hazard/PF-V/1-0-7-1.spec
2003-Oct-22 12:20:36   210 bytes  prism/private/wslib/calc-lib/1.0.7/lib/hazard/PF-V/1-0-7-10.spec
2003-Nov-11 18:29:52   210 bytes  prism/private/wslib/calc-lib/1.0.7/lib/hazard/PF-V/1-0-7-11.spec
2003-Dec-18 14:01:22   210 bytes  prism/private/wslib/calc-lib/1.0.7/lib/hazard/PF-V/1-0-7-12.spec
2003-Dec-30 13:42:48   210 bytes  prism/private/wslib/calc-lib/1.0.7/lib/hazard/PF-V/1-0-7-13.spec
2004-Feb-10 16:23:22   210 bytes  prism/private/wslib/calc-lib/1.0.7/lib/hazard/PF-V/1-0-7-14.spec
2004-Mar-10 19:09:42   210 bytes  prism/private/wslib/calc-lib/1.0.7/lib/hazard/PF-V/1-0-7-15.spec
2004-May-19 16:55:40   210 bytes  prism/private/wslib/calc-lib/1.0.7/lib/hazard/PF-V/1-0-7-16.spec
2004-May-20 20:35:42   210 bytes  prism/private/wslib/calc-lib/1.0.7/lib/hazard/PF-V/1-0-7-17.spec
2004-Jun-22 22:24:12   210 bytes  prism/private/wslib/calc-lib/1.0.7/lib/hazard/PF-V/1-0-7-18.spec
2003-Jun-11 13:14:38   209 bytes  prism/private/wslib/calc-lib/1.0.7/lib/hazard/PF-V/1-0-7-2.spec
2003-Jun-29 05:49:56   209 bytes  prism/private/wslib/calc-lib/1.0.7/lib/hazard/PF-V/1-0-7-3.spec
2003-Jul-09 16:05:22   209 bytes  prism/private/wslib/calc-lib/1.0.7/lib/hazard/PF-V/1-0-7-4.spec
2003-Jul-18 10:25:42   209 bytes  prism/private/wslib/calc-lib/1.0.7/lib/hazard/PF-V/1-0-7-5.spec
2003-Aug-07 15:44:02   209 bytes  prism/private/wslib/calc-lib/1.0.7/lib/hazard/PF-V/1-0-7-6.spec
2003-Aug-13 11:23:36   209 bytes  prism/private/wslib/calc-lib/1.0.7/lib/hazard/PF-V/1-0-7-7.spec
2003-Oct-12 11:01:04   209 bytes  prism/private/wslib/calc-lib/1.0.7/lib/hazard/PF-V/1-0-7-8.spec
2003-Oct-15 08:27:18   209 bytes  prism/private/wslib/calc-lib/1.0.7/lib/hazard/PF-V/1-0-7-9.spec
2004-Dec-13 10:28:26   748 bytes  prism/private/wslib/calc-lib/1.0.7/lib/hazard/PP-L
```

2003-Apr-27 14:15:54 212 bytes prism/private/wslib/calc-lib/1.0.7/lib/hazard/PP-L/1-0-6-15.spec
2003-May-09 16:08:18 211 bytes prism/private/wslib/calc-lib/1.0.7/lib/hazard/PP-L/1-0-7-0.spec
2003-May-28 22:58:56 211 bytes prism/private/wslib/calc-lib/1.0.7/lib/hazard/PP-L/1-0-7-1.spec
2003-Oct-22 12:20:36 212 bytes prism/private/wslib/calc-lib/1.0.7/lib/hazard/PP-L/1-0-7-10.spec
2003-Nov-11 18:29:52 212 bytes prism/private/wslib/calc-lib/1.0.7/lib/hazard/PP-L/1-0-7-11.spec
2003-Dec-18 14:01:22 212 bytes prism/private/wslib/calc-lib/1.0.7/lib/hazard/PP-L/1-0-7-12.spec
2003-Dec-30 13:42:48 212 bytes prism/private/wslib/calc-lib/1.0.7/lib/hazard/PP-L/1-0-7-13.spec
2004-Feb-10 16:23:22 212 bytes prism/private/wslib/calc-lib/1.0.7/lib/hazard/PP-L/1-0-7-14.spec
2004-Mar-10 19:09:42 212 bytes prism/private/wslib/calc-lib/1.0.7/lib/hazard/PP-L/1-0-7-15.spec
2004-May-19 16:55:40 212 bytes prism/private/wslib/calc-lib/1.0.7/lib/hazard/PP-L/1-0-7-16.spec
2004-May-20 20:35:42 212 bytes prism/private/wslib/calc-lib/1.0.7/lib/hazard/PP-L/1-0-7-17.spec
2004-Jun-22 22:24:12 212 bytes prism/private/wslib/calc-lib/1.0.7/lib/hazard/PP-L/1-0-7-18.spec
2003-Jun-11 13:14:38 211 bytes prism/private/wslib/calc-lib/1.0.7/lib/hazard/PP-L/1-0-7-2.spec
2003-Jun-29 05:49:56 211 bytes prism/private/wslib/calc-lib/1.0.7/lib/hazard/PP-L/1-0-7-3.spec
2003-Jul-09 16:05:22 211 bytes prism/private/wslib/calc-lib/1.0.7/lib/hazard/PP-L/1-0-7-4.spec
2003-Jul-18 10:25:42 211 bytes prism/private/wslib/calc-lib/1.0.7/lib/hazard/PP-L/1-0-7-5.spec
2003-Aug-07 15:44:02 211 bytes prism/private/wslib/calc-lib/1.0.7/lib/hazard/PP-L/1-0-7-6.spec
2003-Aug-13 11:23:36 211 bytes prism/private/wslib/calc-lib/1.0.7/lib/hazard/PP-L/1-0-7-7.spec
2003-Oct-12 11:01:04 211 bytes prism/private/wslib/calc-lib/1.0.7/lib/hazard/PP-L/1-0-7-8.spec
2003-Oct-15 08:27:18 211 bytes prism/private/wslib/calc-lib/1.0.7/lib/hazard/PP-L/1-0-7-9.spec
2004-Dec-13 10:28:26 748 bytes prism/private/wslib/calc-lib/1.0.7/lib/hazard/PT-V
2003-Apr-27 14:15:54 212 bytes prism/private/wslib/calc-lib/1.0.7/lib/hazard/PT-V/1-0-6-15.spec
2003-May-09 16:08:18 211 bytes prism/private/wslib/calc-lib/1.0.7/lib/hazard/PT-V/1-0-7-0.spec
2003-May-28 22:58:56 211 bytes prism/private/wslib/calc-lib/1.0.7/lib/hazard/PT-V/1-0-7-1.spec
2003-Oct-22 12:20:36 212 bytes prism/private/wslib/calc-lib/1.0.7/lib/hazard/PT-V/1-0-7-10.spec
2003-Nov-11 18:29:52 212 bytes prism/private/wslib/calc-lib/1.0.7/lib/hazard/PT-V/1-0-7-11.spec
2003-Dec-18 14:01:22 212 bytes prism/private/wslib/calc-lib/1.0.7/lib/hazard/PT-V/1-0-7-12.spec
2003-Dec-30 13:42:48 212 bytes prism/private/wslib/calc-lib/1.0.7/lib/hazard/PT-V/1-0-7-13.spec
2004-Feb-10 16:23:22 212 bytes prism/private/wslib/calc-lib/1.0.7/lib/hazard/PT-V/1-0-7-14.spec
2004-Mar-10 19:09:42 212 bytes prism/private/wslib/calc-lib/1.0.7/lib/hazard/PT-V/1-0-7-15.spec
2004-May-19 16:55:40 212 bytes prism/private/wslib/calc-lib/1.0.7/lib/hazard/PT-V/1-0-7-16.spec
2004-May-20 20:35:42 212 bytes prism/private/wslib/calc-lib/1.0.7/lib/hazard/PT-V/1-0-7-17.spec
2004-Jun-22 22:24:12 212 bytes prism/private/wslib/calc-lib/1.0.7/lib/hazard/PT-V/1-0-7-18.spec
2003-Jun-11 13:14:38 211 bytes prism/private/wslib/calc-lib/1.0.7/lib/hazard/PT-V/1-0-7-2.spec
2003-Jun-29 05:49:56 211 bytes prism/private/wslib/calc-lib/1.0.7/lib/hazard/PT-V/1-0-7-3.spec
2003-Jul-09 16:05:22 211 bytes prism/private/wslib/calc-lib/1.0.7/lib/hazard/PT-V/1-0-7-4.spec
2003-Jul-18 10:25:42 211 bytes prism/private/wslib/calc-lib/1.0.7/lib/hazard/PT-V/1-0-7-5.spec
2003-Aug-07 15:44:02 211 bytes prism/private/wslib/calc-lib/1.0.7/lib/hazard/PT-V/1-0-7-6.spec
2003-Aug-13 11:23:36 211 bytes prism/private/wslib/calc-lib/1.0.7/lib/hazard/PT-V/1-0-7-7.spec
2003-Oct-12 11:01:04 211 bytes prism/private/wslib/calc-lib/1.0.7/lib/hazard/PT-V/1-0-7-8.spec
2003-Oct-15 08:27:18 211 bytes prism/private/wslib/calc-lib/1.0.7/lib/hazard/PT-V/1-0-7-9.spec
2004-Dec-13 10:28:26 748 bytes prism/private/wslib/calc-lib/1.0.7/lib/hazard/SC-S
2003-Apr-27 14:15:54 216 bytes prism/private/wslib/calc-lib/1.0.7/lib/hazard/SC-S/1-0-6-15.spec
2003-May-09 16:08:18 215 bytes prism/private/wslib/calc-lib/1.0.7/lib/hazard/SC-S/1-0-7-0.spec
2003-May-28 22:58:56 215 bytes prism/private/wslib/calc-lib/1.0.7/lib/hazard/SC-S/1-0-7-1.spec
2003-Oct-22 12:20:36 216 bytes prism/private/wslib/calc-lib/1.0.7/lib/hazard/SC-S/1-0-7-10.spec
2003-Nov-11 18:29:52 216 bytes prism/private/wslib/calc-lib/1.0.7/lib/hazard/SC-S/1-0-7-11.spec
2003-Dec-18 14:01:22 216 bytes prism/private/wslib/calc-lib/1.0.7/lib/hazard/SC-S/1-0-7-12.spec
2003-Dec-30 13:42:48 216 bytes prism/private/wslib/calc-lib/1.0.7/lib/hazard/SC-S/1-0-7-13.spec
2004-Feb-10 16:23:22 216 bytes prism/private/wslib/calc-lib/1.0.7/lib/hazard/SC-S/1-0-7-14.spec
2004-Mar-10 19:09:42 216 bytes prism/private/wslib/calc-lib/1.0.7/lib/hazard/SC-S/1-0-7-15.spec
2004-May-19 16:55:40 216 bytes prism/private/wslib/calc-lib/1.0.7/lib/hazard/SC-S/1-0-7-16.spec
2004-May-20 20:35:42 216 bytes prism/private/wslib/calc-lib/1.0.7/lib/hazard/SC-S/1-0-7-17.spec
2004-Jun-22 22:24:12 216 bytes prism/private/wslib/calc-lib/1.0.7/lib/hazard/SC-S/1-0-7-18.spec
2003-Jun-11 13:14:38 215 bytes prism/private/wslib/calc-lib/1.0.7/lib/hazard/SC-S/1-0-7-2.spec
2003-Jun-29 05:49:56 215 bytes prism/private/wslib/calc-lib/1.0.7/lib/hazard/SC-S/1-0-7-3.spec
2003-Jul-09 16:05:22 215 bytes prism/private/wslib/calc-lib/1.0.7/lib/hazard/SC-S/1-0-7-4.spec
2003-Jul-18 10:25:42 215 bytes prism/private/wslib/calc-lib/1.0.7/lib/hazard/SC-S/1-0-7-5.spec
2003-Aug-07 15:44:02 215 bytes prism/private/wslib/calc-lib/1.0.7/lib/hazard/SC-S/1-0-7-6.spec
2003-Aug-13 11:23:36 215 bytes prism/private/wslib/calc-lib/1.0.7/lib/hazard/SC-S/1-0-7-7.spec
2003-Oct-12 11:01:04 215 bytes prism/private/wslib/calc-lib/1.0.7/lib/hazard/SC-S/1-0-7-8.spec 2003-Oct-15 08:27:18 215 bytes prism/private/wslib/calc-lib/1.0.7/lib/hazard/SC-S/1-0-7-9.spec
2004-Dec-13 10:28:26 476 bytes prism/private/wslib/calc-lib/1.0.7/lib/hazard/TF-V
2003-Oct-22 12:20:36 204 bytes prism/private/wslib/calc-lib/1.0.7/lib/hazard/TF-V/1-0-7-10.spec
2003-Nov-11 18:29:52 204 bytes prism/private/wslib/calc-lib/1.0.7/lib/hazard/TF-V/1-0-7-11.spec
2003-Dec-18 14:01:22 204 bytes prism/private/wslib/calc-lib/1.0.7/lib/hazard/TF-V/1-0-7-12.spec
2003-Dec-30 13:42:48 204 bytes prism/private/wslib/calc-lib/1.0.7/lib/hazard/TF-V/1-0-7-13.spec
2004-Feb-10 16:23:22 204 bytes prism/private/wslib/calc-lib/1.0.7/lib/hazard/TF-V/1-0-7-14.spec
2004-Mar-10 19:09:42 204 bytes prism/private/wslib/calc-lib/1.0.7/lib/hazard/TF-V/1-0-7-15.spec
2004-May-19 16:55:40 204 bytes prism/private/wslib/calc-lib/1.0.7/lib/hazard/TF-V/1-0-7-16.spec
2004-May-20 20:35:42 204 bytes prism/private/wslib/calc-lib/1.0.7/lib/hazard/TF-V/1-0-7-17.spec
2004-Jun-22 22:24:12 204 bytes prism/private/wslib/calc-lib/1.0.7/lib/hazard/TF-V/1-0-7-18.spec
2003-Aug-21 13:46:30 203 bytes prism/private/wslib/calc-lib/1.0.7/lib/hazard/TF-V/1-0-7-7.spec
2003-Oct-12 11:01:04 203 bytes prism/private/wslib/calc-lib/1.0.7/lib/hazard/TF-V/1-0-7-8.spec
2003-Oct-15 08:27:18 203 bytes prism/private/wslib/calc-lib/1.0.7/lib/hazard/TF-V/1-0-7-9.spec
2004-Dec-13 10:28:26 544 bytes prism/private/wslib/calc-lib/1.0.7/lib/hazard/TPIT-V
2003-Oct-22 12:20:36 216 bytes prism/private/wslib/calc-lib/1.0.7/lib/hazard/TPIT-V/1-0-7-10.spec
2003-Nov-11 18:29:52 216 bytes prism/private/wslib/calc-lib/1.0.7/lib/hazard/TPIT-V/1-0-7-11.spec
2003-Dec-18 14:01:22 216 bytes prism/private/wslib/calc-lib/1.0.7/lib/hazard/TPIT-V/1-0-7-12.spec
2003-Dec-30 13:42:48 216 bytes prism/private/wslib/calc-lib/1.0.7/lib/hazard/TPIT-V/1-0-7-13.spec
2004-Feb-10 16:23:22 216 bytes prism/private/wslib/calc-lib/1.0.7/lib/hazard/TPIT-V/1-0-7-14.spec
2004-Mar-10 19:09:42 216 bytes prism/private/wslib/calc-lib/1.0.7/lib/hazard/TPIT-V/1-0-7-15.spec
2004-May-19 16:55:40 216 bytes prism/private/wslib/calc-lib/1.0.7/lib/hazard/TPIT-V/1-0-7-16.spec
2004-May-20 20:35:42 216 bytes prism/private/wslib/calc-lib/1.0.7/lib/hazard/TPIT-V/1-0-7-17.spec
2004-Jun-22 22:24:12 216 bytes prism/private/wslib/calc-lib/1.0.7/lib/hazard/TPIT-V/1-0-7-18.spec
2003-Jul-20 16:12:36 215 bytes prism/private/wslib/calc-lib/1.0.7/lib/hazard/TPIT-V/1-0-7-5.spec
2003-Aug-07 15:44:02 215 bytes prism/private/wslib/calc-lib/1.0.7/lib/hazard/TPIT-V/1-0-7-6.spec
2003-Aug-13 11:23:36 215 bytes prism/private/wslib/calc-lib/1.0.7/lib/hazard/TPIT-V/1-0-7-7.spec
2003-Oct-12 11:01:04 215 bytes prism/private/wslib/calc-lib/1.0.7/lib/hazard/TPIT-V/1-0-7-8.spec
2003-Oct-15 08:27:18 215 bytes prism/private/wslib/calc-lib/1.0.7/lib/hazard/TPIT-V/1-0-7-9.spec
2004-Dec-13 10:28:26 476 bytes prism/private/wslib/calc-lib/1.0.7/lib/hazard/TPOT-V
2003-Oct-22 12:20:36 218 bytes prism/private/wslib/calc-lib/1.0.7/lib/hazard/TPOT-V/1-0-7-10.spec
2003-Nov-11 18:29:52 218 bytes prism/private/wslib/calc-lib/1.0.7/lib/hazard/TPOT-V/1-0-7-11.spec
2003-Dec-18 14:01:22 218 bytes prism/private/wslib/calc-lib/1.0.7/lib/hazard/TPOT-V/1-0-7-12.spec
2003-Dec-30 13:42:48 218 bytes prism/private/wslib/calc-lib/1.0.7/lib/hazard/TPOT-V/1-0-7-13.spec
2004-Feb-10 16:23:22 218 bytes prism/private/wslib/calc-lib/1.0.7/lib/hazard/TPOT-V/1-0-7-14.spec
2004-Mar-10 19:09:42 218 bytes prism/private/wslib/calc-lib/1.0.7/lib/hazard/TPOT-V/1-0-7-15.spec
2004-May-19 16:55:40 218 bytes prism/private/wslib/calc-lib/1.0.7/lib/hazard/TPOT-V/1-0-7-16.spec
2004-May-20 20:35:42 218 bytes prism/private/wslib/calc-lib/1.0.7/lib/hazard/TPOT-V/1-0-7-17.spec
2004-Jun-22 22:24:12 218 bytes prism/private/wslib/calc-lib/1.0.7/lib/hazard/TPOT-V/1-0-7-18.spec
2003-Aug-21 13:44:18 217 bytes prism/private/wslib/calc-lib/1.0.7/lib/hazard/TPOT-V/1-0-7-7.spec
2003-Oct-12 11:01:04 217 bytes prism/private/wslib/calc-lib/1.0.7/lib/hazard/TPOT-V/1-0-7-8.spec
2003-Oct-15 08:27:18 217 bytes prism/private/wslib/calc-lib/1.0.7/lib/hazard/TPOT-V/1-0-7-9.spec
2004-Dec-13 10:28:26 748 bytes prism/private/wslib/calc-lib/1.0.7/lib/hazard/TR-L
2003-Apr-27 14:15:54 211 bytes prism/private/wslib/calc-lib/1.0.7/lib/hazard/TR-L/1-0-6-15.spec
2003-May-09 16:08:18 210 bytes prism/private/wslib/calc-lib/1.0.7/lib/hazard/TR-L/1-0-7-0.spec
2003-May-28 22:58:56 210 bytes prism/private/wslib/calc-lib/1.0.7/lib/hazard/TR-L/1-0-7-1.spec
2003-Oct-22 12:20:36 211 bytes prism/private/wslib/calc-lib/1.0.7/lib/hazard/TR-L/1-0-7-10.spec
2003-Nov-11 18:29:52 211 bytes prism/private/wslib/calc-lib/1.0.7/lib/hazard/TR-L/1-0-7-11.spec
2003-Dec-18 14:01:22 211 bytes prism/private/wslib/calc-lib/1.0.7/lib/hazard/TR-L/1-0-7-12.spec
2003-Dec-30 13:42:48 211 bytes prism/private/wslib/calc-lib/1.0.7/lib/hazard/TR-L/1-0-7-13.spec
2004-Mar-10 18:46:04 211 bytes prism/private/wslib/calc-lib/1.0.7/lib/hazard/TR-L/1-0-7-14.spec
2004-Mar-10 19:10:28 214 bytes prism/private/wslib/calc-lib/1.0.7/lib/hazard/TR-L/1-0-7-15.spec
2004-May-19 16:55:40 214 bytes prism/private/wslib/calc-lib/1.0.7/lib/hazard/TR-L/1-0-7-16.spec
2004-May-20 20:35:42 214 bytes prism/private/wslib/calc-lib/1.0.7/lib/hazard/TR-L/1-0-7-17.spec
2004-Jun-22 22:24:12 214 bytes prism/private/wslib/calc-lib/1.0.7/lib/hazard/TR-L/1-0-7-18.spec
2003-Jun-11 13:14:38 210 bytes prism/private/wslib/calc-lib/1.0.7/lib/hazard/TR-L/1-0-7-2.spec
2003-Jun-29 05:49:56 210 bytes prism/private/wslib/calc-lib/1.0.7/lib/hazard/TR-L/1-0-7-3.spec
2003-Jul-09 16:05:22 210 bytes prism/private/wslib/calc-lib/1.0.7/lib/hazard/TR-L/1-0-7-4.spec
2003-Jul-18 10:25:42 210 bytes prism/private/wslib/calc-lib/1.0.7/lib/hazard/TR-L/1-0-7-5.spec
2003-Aug-07 15:44:02 210 bytes prism/private/wslib/calc-lib/1.0.7/lib/hazard/TR-L/1-0-7-6.spec
2003-Aug-13 11:23:36 210 bytes prism/private/wslib/calc-lib/1.0.7/lib/hazard/TR-L/1-0-7-7.spec 2003-Oct-12 11:01:04 210 bytes prism/private/wslib/calc-lib/1.0.7/lib/hazard/TR-L/1-0-7-8.spec
2003-Oct-15 08:27:18 210 bytes prism/private/wslib/calc-lib/1.0.7/lib/hazard/TR-L/1-0-7-9.spec
2004-Dec-13 10:28:27 748 bytes prism/private/wslib/calc-lib/1.0.7/lib/hazard/TR-V
2003-Apr-27 14:15:54 210 bytes prism/private/wslib/calc-lib/1.0.7/lib/hazard/TR-V/1-0-6-15.spec
2003-May-09 16:08:18 209 bytes prism/private/wslib/calc-lib/1.0.7/lib/hazard/TR-V/1-0-7-0.spec
2003-May-28 22:58:56 209 bytes prism/private/wslib/calc-lib/1.0.7/lib/hazard/TR-V/1-0-7-1.spec
2003-Oct-22 12:20:36 210 bytes prism/private/wslib/calc-lib/1.0.7/lib/hazard/TR-V/1-0-7-10.spec
2003-Nov-11 18:29:52 210 bytes prism/private/wslib/calc-lib/1.0.7/lib/hazard/TR-V/1-0-7-11.spec
2003-Dec-18 14:01:22 210 bytes prism/private/wslib/calc-lib/1.0.7/lib/hazard/TR-V/1-0-7-12.spec
2004-Mar-10 18:47:20 210 bytes prism/private/wslib/calc-lib/1.0.7/lib/hazard/TR-V/1-0-7-13.spec
2004-Mar-10 18:46:40 210 bytes prism/private/wslib/calc-lib/1.0.7/lib/hazard/TR-V/1-0-7-14.spec
2004-Mar-10 19:10:34 212 bytes prism/private/wslib/calc-lib/1.0.7/lib/hazard/TR-V/1-0-7-15.spec
2004-May-20 17:05:02 907 bytes prism/private/wslib/calc-lib/1.0.7/lib/hazard/TR-V/1-0-7-16.spec
2004-May-20 20:35:42 907 bytes prism/private/wslib/calc-lib/1.0.7/lib/hazard/TR-V/1-0-7-17.spec
2004-Jun-22 22:24:12 907 bytes prism/private/wslib/calc-lib/1.0.7/lib/hazard/TR-V/1-0-7-18.spec
2003-Jun-11 13:14:38 209 bytes prism/private/wslib/calc-lib/1.0.7/lib/hazard/TR-V/1-0-7-2.spec
2003-Jun-29 05:49:56 209 bytes prism/private/wslib/calc-lib/1.0.7/lib/hazard/TR-V/1-0-7-3.spec
2003-Jul-09 16:05:22 209 bytes prism/private/wslib/calc-lib/1.0.7/lib/hazard/TR-V/1-0-7-4.spec
2003-Jul-18 10:25:42 209 bytes prism/private/wslib/calc-lib/1.0.7/lib/hazard/TR-V/1-0-7-5.spec
2003-Aug-07 15:44:02 209 bytes prism/private/wslib/calc-lib/1.0.7/lib/hazard/TR-V/1-0-7-6.spec
2003-Aug-13 11:23:36 209 bytes prism/private/wslib/calc-lib/1.0.7/lib/hazard/TR-V/1-0-7-7.spec
2003-Oct-12 11:01:04 209 bytes prism/private/wslib/calc-lib/1.0.7/lib/hazard/TR-V/1-0-7-8.spec
2003-Oct-15 08:27:18 209 bytes prism/private/wslib/calc-lib/1.0.7/lib/hazard/TR-V/1-0-7-9.spec
2004-Dec-13 10:28:27 748 bytes prism/private/wslib/calc-lib/1.0.7/lib/hazard/US-2
2003-Apr-27 14:15:54 217 bytes prism/private/wslib/calc-lib/1.0.7/lib/hazard/US-2/1-0-6-15.spec
2003-May-09 16:08:18 216 bytes prism/private/wslib/calc-lib/1.0.7/lib/hazard/US-2/1-0-7-0.spec
2003-May-28 22:58:56 216 bytes prism/private/wslib/calc-lib/1.0.7/lib/hazard/US-2/1-0-7-1.spec
2003-Oct-22 12:20:36 217 bytes prism/private/wslib/calc-lib/1.0.7/lib/hazard/US-2/1-0-7-10.spec
2003-Nov-11 18:29:52 217 bytes prism/private/wslib/calc-lib/1.0.7/lib/hazard/US-2/1-0-7-11.spec
2003-Dec-18 14:01:22 217 bytes prism/private/wslib/calc-lib/1.0.7/lib/hazard/US-2/1-0-7-12.spec
2003-Dec-30 13:42:48 217 bytes prism/private/wslib/calc-lib/1.0.7/lib/hazard/US-2/1-0-7-13.spec
2004-Feb-10 16:23:22 217 bytes prism/private/wslib/calc-lib/1.0.7/lib/hazard/US-2/1-0-7-14.spec
2004-Mar-10 19:09:42 217 bytes prism/private/wslib/calc-lib/1.0.7/lib/hazard/US-2/1-0-7-15.spec
2004-May-19 16:55:40 217 bytes prism/private/wslib/calc-lib/1.0.7/lib/hazard/US-2/1-0-7-16.spec
2004-May-20 20:35:42 217 bytes prism/private/wslib/calc-lib/1.0.7/lib/hazard/US-2/1-0-7-17.spec
2004-Jun-22 22:24:12 217 bytes prism/private/wslib/calc-lib/1.0.7/lib/hazard/US-2/1-0-7-18.spec
2003-Jun-11 13:14:38 216 bytes prism/private/wslib/calc-lib/1.0.7/lib/hazard/US-2/1-0-7-2.spec
2003-Jun-29 05:49:56 216 bytes prism/private/wslib/calc-lib/1.0.7/lib/hazard/US-2/1-0-7-3.spec
2003-Jul-09 16:05:22 216 bytes prism/private/wslib/calc-lib/1.0.7/lib/hazard/US-2/1-0-7-4.spec
2003-Jul-18 10:25:42 216 bytes prism/private/wslib/calc-lib/1.0.7/lib/hazard/US-2/1-0-7-5.spec
2003-Aug-07 15:44:02 216 bytes prism/private/wslib/calc-lib/1.0.7/lib/hazard/US-2/1-0-7-6.spec
2003-Aug-13 11:23:36 216 bytes prism/private/wslib/calc-lib/1.0.7/lib/hazard/US-2/1-0-7-7.spec
2003-Oct-12 11:01:04 216 bytes prism/private/wslib/calc-lib/1.0.7/lib/hazard/US-2/1-0-7-8.spec
2003-Oct-15 08:27:18 216 bytes prism/private/wslib/calc-lib/1.0.7/lib/hazard/US-2/1-0-7-9.spec
2004-Dec-13 10:28:27 748 bytes prism/private/wslib/calc-lib/1.0.7/lib/hazard/US-L
2003-Apr-27 14:15:54 218 bytes prism/private/wslib/calc-lib/1.0.7/lib/hazard/US-L/1-0-6-15.spec
2003-May-09 16:08:18 217 bytes prism/private/wslib/calc-lib/1.0.7/lib/hazard/US-L/1-0-7-0.spec
2003-May-28 22:58:56 217 bytes prism/private/wslib/calc-lib/1.0.7/lib/hazard/US-L/1-0-7-1.spec
2003-Oct-22 12:20:36 218 bytes prism/private/wslib/calc-lib/1.0.7/lib/hazard/US-L/1-0-7-10.spec
2003-Nov-11 18:29:52 218 bytes prism/private/wslib/calc-lib/1.0.7/lib/hazard/US-L/1-0-7-11.spec
2003-Dec-18 14:01:22 218 bytes prism/private/wslib/calc-lib/1.0.7/lib/hazard/US-L/1-0-7-12.spec
2003-Dec-30 13:42:48 218 bytes prism/private/wslib/calc-lib/1.0.7/lib/hazard/US-L/1-0-7-13.spec
2004-Feb-10 16:23:22 218 bytes prism/private/wslib/calc-lib/1.0.7/lib/hazard/US-L/1-0-7-14.spec
2004-Mar-10 19:09:42 218 bytes prism/private/wslib/calc-lib/1.0.7/lib/hazard/US-L/1-0-7-15.spec
2004-May-19 16:55:40 218 bytes prism/private/wslib/calc-lib/1.0.7/lib/hazard/US-L/1-0-7-16.spec
2004-May-20 20:35:42 218 bytes prism/private/wslib/calc-lib/1.0.7/lib/hazard/US-L/1-0-7-17.spec
2004-Jun-22 22:24:12 218 bytes prism/private/wslib/calc-lib/1.0.7/lib/hazard/US-L/1-0-7-18.spec
2003-Jun-11 13:14:38 217 bytes prism/private/wslib/calc-lib/1.0.7/lib/hazard/US-L/1-0-7-2.spec
2003-Jun-29 05:49:56 217 bytes prism/private/wslib/calc-lib/1.0.7/lib/hazard/US-L/1-0-7-3.spec
2003-Jul-09 16:05:22 217 bytes prism/private/wslib/calc-lib/1.0.7/lib/hazard/US-L/1-0-7-4.spec
2003-Jul-18 10:25:42 217 bytes prism/private/wslib/calc-lib/1.0.7/lib/hazard/US-L/1-0-7-5.spec

| | | |
|---|---|---|
| 2003-Aug-07 15:44:02 | 217 bytes | prism/private/wslib/calc-lib/1.0.7/lib/hazard/US-L/1-0-7-6.spec |
| 2003-Aug-13 11:23:36 | 217 bytes | prism/private/wslib/calc-lib/1.0.7/lib/hazard/US-L/1-0-7-7.spec_ |
| 2003-Oct-12 11:01:04 | 217 bytes | prism/private/wslib/calc-lib/1.0.7/lib/hazard/US-L/1-0-7-8.spec |
| 2003-Oct-15 08:27:18 | 217 bytes | prism/private/wslib/calc-lib/1.0.7/lib/hazard/US-L/1-0-7-9.spec |
| 2004-Dec-13 10:28:27 | 748 bytes | prism/private/wslib/calc-lib/1.0.7/lib/hazard/US-S |
| 2003-Apr-27 14:15:54 | 215 bytes | prism/private/wslib/calc-lib/1.0.7/lib/hazard/US-S/1-0-6-15.spec |
| 2003-May-09 16:08:18 | 214 bytes | prism/private/wslib/calc-lib/1.0.7/lib/hazard/US-S/1-0-7-0.spec |
| 2003-May-28 22:58:56 | 214 bytes | prism/private/wslib/calc-lib/1.0.7/lib/hazard/US-S/1-0-7-1.spec |
| 2003-Oct-22 12:20:36 | 215 bytes | prism/private/wslib/calc-lib/1.0.7/lib/hazard/US-S/1-0-7-10.spec |
| 2003-Nov-11 18:29:52 | 215 bytes | prism/private/wslib/calc-lib/1.0.7/lib/hazard/US-S/1-0-7-11.spec |
| 2003-Dec-18 14:01:22 | 215 bytes | prism/private/wslib/calc-lib/1.0.7/lib/hazard/US-S/1-0-7-12.spec |
| 2003-Dec-30 13:42:48 | 215 bytes | prism/private/wslib/calc-lib/1.0.7/lib/hazard/US-S/1-0-7-13.spec |
| 2004-Feb-10 16:23:22 | 215 bytes | prism/private/wslib/calc-lib/1.0.7/lib/hazard/US-S/1-0-7-14.spec |
| 2004-Mar-10 19:09:42 | 215 bytes | prism/private/wslib/calc-lib/1.0.7/lib/hazard/US-S/1-0-7-15.spec |
| 2004-May-19 16:55:40 | 215 bytes | prism/private/wslib/calc-lib/1.0.7/lib/hazard/US-S/1-0-7-16.spec |
| 2004-May-20 20:35:42 | 215 bytes | prism/private/wslib/calc-lib/1.0.7/lib/hazard/US-S/1-0-7-17.spec |
| 2004-Jun-22 22:24:12 | 215 bytes | prism/private/wslib/calc-lib/1.0.7/lib/hazard/US-S/1-0-7-18.spec |
| 2003-Jun-11 13:14:38 | 214 bytes | prism/private/wslib/calc-lib/1.0.7/lib/hazard/US-S/1-0-7-2.spec |
| 2003-Jun-29 05:49:56 | 214 bytes | prism/private/wslib/calc-lib/1.0.7/lib/hazard/US-S/1-0-7-3.spec |
| 2003-Jul-09 16:05:22 | 214 bytes | prism/private/wslib/calc-lib/1.0.7/lib/hazard/US-S/1-0-7-4.spec |
| 2003-Jul-18 10:25:42 | 214 bytes | prism/private/wslib/calc-lib/1.0.7/lib/hazard/US-S/1-0-7-5.spec |
| 2003-Aug-07 15:44:02 | 214 bytes | prism/private/wslib/calc-lib/1.0.7/lib/hazard/US-S/1-0-7-6.spec |
| 2003-Aug-13 11:23:36 | 214 bytes | prism/private/wslib/calc-lib/1.0.7/lib/hazard/US-S/1-0-7-7.spec |
| 2003-Oct-12 11:01:04 | 214 bytes | prism/private/wslib/calc-lib/1.0.7/lib/hazard/US-S/1-0-7-8.spec |
| 2003-Oct-15 08:27:18 | 214 bytes | prism/private/wslib/calc-lib/1.0.7/lib/hazard/US-S/1-0-7-9.spec |
| 2004-Dec-13 10:28:27 | 748 bytes | prism/private/wslib/calc-lib/1.0.7/lib/hazard/US-V |
| 2003-Apr-27 14:15:54 | 235 bytes | prism/private/wslib/calc-lib/1.0.7/lib/hazard/US-V/1-0-6-15.spec |
| 2003-May-09 16:08:18 | 234 bytes | prism/private/wslib/calc-lib/1.0.7/lib/hazard/US-V/1-0-7-0.spec |
| 2003-May-28 22:58:56 | 234 bytes | prism/private/wslib/calc-lib/1.0.7/lib/hazard/US-V/1-0-7-1.spec |
| 2003-Oct-22 12:20:36 | 235 bytes | prism/private/wslib/calc-lib/1.0.7/lib/hazard/US-V/1-0-7-10.spec |
| 2003-Nov-11 18:29:52 | 235 bytes | prism/private/wslib/calc-lib/1.0.7/lib/hazard/US-V/1-0-7-11.spec |
| 2003-Dec-18 14:01:22 | 235 bytes | prism/private/wslib/calc-lib/1.0.7/lib/hazard/US-V/1-0-7-12.spec |
| 2003-Dec-30 13:42:48 | 235 bytes | prism/private/wslib/calc-lib/1.0.7/lib/hazard/US-V/1-0-7-13.spec |
| 2004-Feb-10 16:23:22 | 235 bytes | prism/private/wslib/calc-lib/1.0.7/lib/hazard/US-V/1-0-7-14.spec |
| 2004-Mar-10 19:09:42 | 235 bytes | prism/private/wslib/calc-lib/1.0.7/lib/hazard/US-V/1-0-7-15.spec |
| 2004-May-19 16:55:40 | 235 bytes | prism/private/wslib/calc-lib/1.0.7/lib/hazard/US-V/1-0-7-16.spec |
| 2004-May-20 20:35:42 | 235 bytes | prism/private/wslib/calc-lib/1.0.7/lib/hazard/US-V/1-0-7-17.spec |
| 2004-Jun-22 22:24:12 | 235 bytes | prism/private/wslib/calc-lib/1.0.7/lib/hazard/US-V/1-0-7-18.spec |
| 2003-Jun-11 13:14:38 | 234 bytes | prism/private/wslib/calc-lib/1.0.7/lib/hazard/US-V/1-0-7-2.spec |
| 2003-Jun-29 05:49:56 | 234 bytes | prism/private/wslib/calc-lib/1.0.7/lib/hazard/US-V/1-0-7-3.spec |
| 2003-Jul-09 16:05:22 | 234 bytes | prism/private/wslib/calc-lib/1.0.7/lib/hazard/US-V/1-0-7-4.spec |
| 2003-Jul-18 10:25:42 | 234 bytes | prism/private/wslib/calc-lib/1.0.7/lib/hazard/US-V/1-0-7-5.spec |
| 2003-Aug-07 15:44:02 | 234 bytes | prism/private/wslib/calc-lib/1.0.7/lib/hazard/US-V/1-0-7-6.spec |
| 2003-Aug-13 11:23:36 | 234 bytes | prism/private/wslib/calc-lib/1.0.7/lib/hazard/US-V/1-0-7-7.spec |
| 2003-Oct-12 11:01:04 | 234 bytes | prism/private/wslib/calc-lib/1.0.7/lib/hazard/US-V/1-0-7-8.spec |
| 2003-Oct-15 08:27:18 | 234 bytes | prism/private/wslib/calc-lib/1.0.7/lib/hazard/US-V/1-0-7-9.spec |
| 2004-Dec-13 10:28:27 | 748 bytes | prism/private/wslib/calc-lib/1.0.7/lib/pipeloss |
| 2003-Apr-27 14:15:54 | 186 bytes | prism/private/wslib/calc-lib/1.0.7/lib/pipeloss/1-0-6-15.spec |
| 2003-May-27 16:54:44 | 524 bytes | prism/private/wslib/calc-lib/1.0.7/lib/pipeloss/1-0-7-0.spec |
| 2003-May-28 22:58:56 | 524 bytes | prism/private/wslib/calc-lib/1.0.7/lib/pipeloss/1-0-7-1.spec |
| 2003-Nov-26 12:12:58 | 724 bytes | prism/private/wslib/calc-lib/1.0.7/lib/pipeloss/1-0-7-10.spec |
| 2003-Nov-26 12:10:36 | 1036 bytes | prism/private/wslib/calc-lib/1.0.7/lib/pipeloss/1-0-7-11.spec |
| 2003-Dec-18 14:01:22 | 1036 bytes | prism/private/wslib/calc-lib/1.0.7/lib/pipeloss/1-0-7-12.spec |
| 2003-Dec-30 13:42:48 | 1036 bytes | prism/private/wslib/calc-lib/1.0.7/lib/pipeloss/1-0-7-13.spec |
| 2004-Feb-10 16:23:22 | 1036 bytes | prism/private/wslib/calc-lib/1.0.7/lib/pipeloss/1-0-7-14.spec |
| 2003-Jun-11 13:14:38 | 524 bytes | prism/private/wslib/calc-lib/1.0.7/lib/pipeloss/1-0-7-2.spec |
| 2003-Jul-09 16:12:40 | 187 bytes | prism/private/wslib/calc-lib/1.0.7/lib/pipeloss/1-0-7-3.spec |
| 2003-Nov-26 12:13:18 | 723 bytes | prism/private/wslib/calc-lib/1.0.7/lib/pipeloss/1-0-7-4.spec |
| 2003-Nov-26 12:13:26 | 723 bytes | prism/private/wslib/calc-lib/1.0.7/lib/pipeloss/1-0-7-5.spec |
| 2003-Nov-26 12:13:34 | 723 bytes | prism/private/wslib/calc-lib/1.0.7/lib/pipeloss/1-0-7-6.spec |
| 2003-Nov-26 12:13:42 | 723 bytes | prism/private/wslib/calc-lib/1.0.7/lib/pipeloss/1-0-7-7.spec |

2003-Nov-26 12:13:54 723 bytes prism/private/wslib/calc-lib/1.0.7/lib/pipeloss/1-0-7-8.spec
2003-Nov-26 12:14:00 723 bytes prism/private/wslib/calc-lib/1.0.7/lib/pipeloss/1-0-7-9.spec
2004-Dec-13 10:28:27 238 bytes prism/private/wslib/calc-lib/1.0.7/lib/pipeloss/PL-2
2004-Mar-26 10:05:32 1046 bytes prism/private/wslib/calc-lib/1.0.7/lib/pipeloss/PL-2/1-0-7-14.spec
2004-Mar-19 12:25:32 1047 bytes prism/private/wslib/calc-lib/1.0.7/lib/pipeloss/PL-2/1-0-7-15.spec
2004-May-19 17:45:08 1062 bytes prism/private/wslib/calc-lib/1.0.7/lib/pipeloss/PL-2/1-0-7-16.spec
2004-May-20 20:35:42 1062 bytes prism/private/wslib/calc-lib/1.0.7/lib/pipeloss/PL-2/1-0-7-17.spec
2004-Jun-22 22:24:12 1062 bytes prism/private/wslib/calc-lib/1.0.7/lib/pipeloss/PL-2/1-0-7-18.spec
2004-Dec-13 10:28:27 238 bytes prism/private/wslib/calc-lib/1.0.7/lib/pipeloss/PL-L
2004-Mar-26 10:05:44 1046 bytes prism/private/wslib/calc-lib/1.0.7/lib/pipeloss/PL-L/1-0-7-14.spec
2004-Mar-25 21:35:52 732 bytes prism/private/wslib/calc-lib/1.0.7/lib/pipeloss/PL-L/1-0-7-15.spec
2004-May-19 16:55:40 732 bytes prism/private/wslib/calc-lib/1.0.7/lib/pipeloss/PL-L/1-0-7-16.spec
2004-May-20 20:35:42 732 bytes prism/private/wslib/calc-lib/1.0.7/lib/pipeloss/PL-L/1-0-7-17.spec
2004-Jun-22 22:24:12 732 bytes prism/private/wslib/calc-lib/1.0.7/lib/pipeloss/PL-L/1-0-7-18.spec
2004-Dec-13 10:28:27 238 bytes prism/private/wslib/calc-lib/1.0.7/lib/pipeloss/PL-S
2004-Mar-26 10:05:52 1045 bytes prism/private/wslib/calc-lib/1.0.7/lib/pipeloss/PL-S/1-0-7-14.spec
2004-Mar-26 13:39:26 1085 bytes prism/private/wslib/calc-lib/1.0.7/lib/pipeloss/PL-S/1-0-7-15.spec
2004-May-19 17:51:58 1086 bytes prism/private/wslib/calc-lib/1.0.7/lib/pipeloss/PL-S/1-0-7-16.spec
2004-Jun-15 10:17:28 1085 bytes prism/private/wslib/calc-lib/1.0.7/lib/pipeloss/PL-S/1-0-7-17.spec
2004-Jun-22 22:24:12 1085 bytes prism/private/wslib/calc-lib/1.0.7/lib/pipeloss/PL-S/1-0-7-18.spec
2004-Dec-13 10:28:27 238 bytes prism/private/wslib/calc-lib/1.0.7/lib/pipeloss/PL-V
2004-Mar-26 10:06:16 1045 bytes prism/private/wslib/calc-lib/1.0.7/lib/pipeloss/PL-V/1-0-7-14.spec
2004-Mar-26 13:39:36 1086 bytes prism/private/wslib/calc-lib/1.0.7/lib/pipeloss/PL-V/1-0-7-15.spec
2004-May-20 10:03:46 1086 bytes prism/private/wslib/calc-lib/1.0.7/lib/pipeloss/PL-V/1-0-7-16.spec
2004-Jun-02 09:40:34 1086 bytes prism/private/wslib/calc-lib/1.0.7/lib/pipeloss/PL-V/1-0-7-17.spec
2004-Jun-22 22:24:12 1086 bytes prism/private/wslib/calc-lib/1.0.7/lib/pipeloss/PL-V/1-0-7-18.spec
2004-Dec-13 10:28:27 748 bytes prism/private/wslib/calc-lib/1.0.7/lib/plant
2003-May-09 15:46:08 1193 bytes prism/private/wslib/calc-lib/1.0.7/lib/plant/1-0-6-15.spec
2003-May-11 21:38:54 1190 bytes prism/private/wslib/calc-lib/1.0.7/lib/plant/1-0-7-0.spec
2003-May-28 22:58:56 1190 bytes prism/private/wslib/calc-lib/1.0.7/lib/plant/1-0-7-1.spec
2003-Oct-22 12:20:36 1461 bytes prism/private/wslib/calc-lib/1.0.7/lib/plant/1-0-7-10.spec
2003-Nov-11 18:29:52 1461 bytes prism/private/wslib/calc-lib/1.0.7/lib/plant/1-0-7-11.spec
2003-Dec-18 14:01:22 1461 bytes prism/private/wslib/calc-lib/1.0.7/lib/plant/1-0-7-12.spec
2003-Dec-30 13:42:48 1461 bytes prism/private/wslib/calc-lib/1.0.7/lib/plant/1-0-7-13.spec
2004-Feb-10 16:23:24 1461 bytes prism/private/wslib/calc-lib/1.0.7/lib/plant/1-0-7-14.spec
2004-Mar-10 19:09:42 1461 bytes prism/private/wslib/calc-lib/1.0.7/lib/plant/1-0-7-15.spec
2004-May-19 16:55:40 1461 bytes prism/private/wslib/calc-lib/1.0.7/lib/plant/1-0-7-16.spec
2004-May-20 20:35:42 1461 bytes prism/private/wslib/calc-lib/1.0.7/lib/plant/1-0-7-17.spec
2004-Jun-22 22:24:12 1461 bytes prism/private/wslib/calc-lib/1.0.7/lib/plant/1-0-7-18.spec
2003-Jun-24 01:12:56 1460 bytes prism/private/wslib/calc-lib/1.0.7/lib/plant/1-0-7-2.spec
2003-Jun-29 05:49:56 1460 bytes prism/private/wslib/calc-lib/1.0.7/lib/plant/1-0-7-3.spec
2003-Jul-09 16:05:22 1460 bytes prism/private/wslib/calc-lib/1.0.7/lib/plant/1-0-7-4.spec
2003-Jul-18 10:25:42 1460 bytes prism/private/wslib/calc-lib/1.0.7/lib/plant/1-0-7-5.spec
2003-Aug-07 15:44:02 1460 bytes prism/private/wslib/calc-lib/1.0.7/lib/plant/1-0-7-6.spec
2003-Aug-13 11:23:38 1460 bytes prism/private/wslib/calc-lib/1.0.7/lib/plant/1-0-7-7.spec
2003-Oct-12 11:01:04 1460 bytes prism/private/wslib/calc-lib/1.0.7/lib/plant/1-0-7-8.spec
2003-Oct-15 08:27:18 1460 bytes prism/private/wslib/calc-lib/1.0.7/lib/plant/1-0-7-9.spec
2004-Dec-13 10:28:27 748 bytes prism/private/wslib/calc-lib/1.0.7/lib/relief
2003-Apr-27 14:15:54 1048 bytes prism/private/wslib/calc-lib/1.0.7/lib/relief/1-0-6-15.spec
2003-May-09 16:08:18 1047 bytes prism/private/wslib/calc-lib/1.0.7/lib/relief/1-0-7-0.spec
2003-May-28 22:58:56 1047 bytes prism/private/wslib/calc-lib/1.0.7/lib/relief/1-0-7-1.spec
2003-Oct-22 12:20:36 1048 bytes prism/private/wslib/calc-lib/1.0.7/lib/relief/1-0-7-10.spec
2003-Nov-11 18:29:52 1048 bytes prism/private/wslib/calc-lib/1.0.7/lib/relief/1-0-7-11.spec
2003-Dec-18 14:01:22 1048 bytes prism/private/wslib/calc-lib/1.0.7/lib/relief/1-0-7-12.spec
2003-Dec-30 13:42:48 1048 bytes prism/private/wslib/calc-lib/1.0.7/lib/relief/1-0-7-13.spec
2004-Feb-10 16:23:24 1048 bytes prism/private/wslib/calc-lib/1.0.7/lib/relief/1-0-7-14.spec
2004-Mar-10 19:09:42 1048 bytes prism/private/wslib/calc-lib/1.0.7/lib/relief/1-0-7-15.spec
2004-May-19 16:55:40 1048 bytes prism/private/wslib/calc-lib/1.0.7/lib/relief/1-0-7-16.spec
2004-May-20 20:35:42 1048 bytes prism/private/wslib/calc-lib/1.0.7/lib/relief/1-0-7-17.spec
2004-Jun-22 22:24:12 1048 bytes prism/private/wslib/calc-lib/1.0.7/lib/relief/1-0-7-18.spec
2003-Jun-11 13:14:38 1047 bytes prism/private/wslib/calc-lib/1.0.7/lib/relief/1-0-7-2.spec 2003-Jun-29 05:49:56 1047 bytes prism/private/wslib/calc-lib/1.0.7/lib/relief/1-0-7-3.spec
2003-Jul-09 16:05:22 1047 bytes prism/private/wslib/calc-lib/1.0.7/lib/relief/1-0-7-4.spec
2003-Jul-18 10:25:42 1047 bytes prism/private/wslib/calc-lib/1.0.7/lib/relief/1-0-7-5.spec
2003-Aug-07 15:44:02 1047 bytes prism/private/wslib/calc-lib/1.0.7/lib/relief/1-0-7-6.spec
2003-Aug-13 11:23:38 1047 bytes prism/private/wslib/calc-lib/1.0.7/lib/relief/1-0-7-7.spec
2003-Oct-12 11:01:04 1047 bytes prism/private/wslib/calc-lib/1.0.7/lib/relief/1-0-7-8.spec
2003-Oct-15 08:27:18 1047 bytes prism/private/wslib/calc-lib/1.0.7/lib/relief/1-0-7-9.spec
2004-Nov-15 11:03:08 79573 bytes prism/private/wslib/calc-lib/history.txt
2004-Aug-29 16:25:16 328 bytes prism/private/wslib/calc-lib/release-checklist.txt
2004-Dec-13 10:28:35 340 bytes prism/private/wslib/lib
2004-Dec-13 10:28:31 612 bytes prism/private/wslib/lib/device
2004-Dec-13 10:28:30 1088 bytes prism/private/wslib/lib/device/BV
2003-May-02 10:59:26 3623 bytes prism/private/wslib/lib/device/BV/1-0-6-15.spec
2003-May-09 16:08:18 3622 bytes prism/private/wslib/lib/device/BV/1-0-7-0.spec
2003-May-28 22:58:56 3622 bytes prism/private/wslib/lib/device/BV/1-0-7-1.spec
2003-Oct-22 12:20:36 3623 bytes prism/private/wslib/lib/device/BV/1-0-7-10.spec
2003-Nov-11 18:29:52 3623 bytes prism/private/wslib/lib/device/BV/1-0-7-11.spec
2003-Dec-18 14:01:22 3623 bytes prism/private/wslib/lib/device/BV/1-0-7-12.spec
2003-Dec-30 13:42:48 3623 bytes prism/private/wslib/lib/device/BV/1-0-7-13.spec
2004-Feb-10 16:23:22 3623 bytes prism/private/wslib/lib/device/BV/1-0-7-14.spec
2004-Mar-10 19:09:40 3623 bytes prism/private/wslib/lib/device/BV/1-0-7-15.spec
2004-May-19 16:55:40 3623 bytes prism/private/wslib/lib/device/BV/1-0-7-16.spec
2004-May-20 20:35:40 3623 bytes prism/private/wslib/lib/device/BV/1-0-7-17.spec
2004-Jun-22 22:24:10 3623 bytes prism/private/wslib/lib/device/BV/1-0-7-18.spec
2004-Jul-13 21:59:22 3623 bytes prism/private/wslib/lib/device/BV/1-0-7-19.spec
2003-Jun-11 13:14:38 3622 bytes prism/private/wslib/lib/device/BV/1-0-7-2.spec
2004-Jul-16 16:44:40 3623 bytes prism/private/wslib/lib/device/BV/1-0-7-20.spec
2004-Jul-22 10:14:40 3623 bytes prism/private/wslib/lib/device/BV/1-0-7-21.spec
2004-Aug-17 15:29:48 3623 bytes prism/private/wslib/lib/device/BV/1-0-7-22.spec
2004-Aug-22 22:24:46 3623 bytes prism/private/wslib/lib/device/BV/1-0-7-23.spec
2004-Aug-23 22:46:58 3623 bytes prism/private/wslib/lib/device/BV/1-0-7-24.spec
2004-Aug-29 16:25:32 3623 bytes prism/private/wslib/lib/device/BV/1-0-7-25.spec
2004-Oct-15 10:25:38 3623 bytes prism/private/wslib/lib/device/BV/1-0-7-26.spec
2004-Oct-25 20:32:42 3623 bytes prism/private/wslib/lib/device/BV/1-0-7-27.spec
2004-Nov-11 10:48:10 3623 bytes prism/private/wslib/lib/device/BV/1-0-7-28.spec
2003-Jun-29 05:49:54 3622 bytes prism/private/wslib/lib/device/BV/1-0-7-3.spec
2003-Jul-09 16:05:22 3622 bytes prism/private/wslib/lib/device/BV/1-0-7-4.spec
2003-Jul-18 10:25:40 3622 bytes prism/private/wslib/lib/device/BV/1-0-7-5.spec
2003-Aug-07 15:44:02 3622 bytes prism/private/wslib/lib/device/BV/1-0-7-6.spec
2003-Aug-13 11:23:36 3622 bytes prism/private/wslib/lib/device/BV/1-0-7-7.spec
2003-Oct-12 11:01:04 3622 bytes prism/private/wslib/lib/device/BV/1-0-7-8.spec
2003-Oct-15 08:27:18 3622 bytes prism/private/wslib/lib/device/BV/1-0-7-9.spec
2004-Dec-13 10:28:31 1088 bytes prism/private/wslib/lib/device/CV
2003-Apr-27 14:15:54 3450 bytes prism/private/wslib/lib/device/CV/1-0-6-15.spec
2003-May-09 16:08:18 3449 bytes prism/private/wslib/lib/device/CV/1-0-7-0.spec
2003-May-28 22:58:56 3449 bytes prism/private/wslib/lib/device/CV/1-0-7-1.spec
2003-Oct-22 12:20:36 3450 bytes prism/private/wslib/lib/device/CV/1-0-7-10.spec
2003-Nov-11 18:29:52 3450 bytes prism/private/wslib/lib/device/CV/1-0-7-11.spec
2003-Dec-18 14:01:22 3450 bytes prism/private/wslib/lib/device/CV/1-0-7-12.spec
2003-Dec-30 13:42:48 3450 bytes prism/private/wslib/lib/device/CV/1-0-7-13.spec
2004-Feb-10 16:23:22 3450 bytes prism/private/wslib/lib/device/CV/1-0-7-14.spec
2004-Mar-10 19:09:42 3450 bytes prism/private/wslib/lib/device/CV/1-0-7-15.spec
2004-May-19 16:55:40 3450 bytes prism/private/wslib/lib/device/CV/1-0-7-16.spec
2004-May-20 20:35:40 3450 bytes prism/private/wslib/lib/device/CV/1-0-7-17.spec
2004-Jun-22 22:24:10 3450 bytes prism/private/wslib/lib/device/CV/1-0-7-18.spec
2004-Jul-13 21:59:22 3450 bytes prism/private/wslib/lib/device/CV/1-0-7-19.spec
2003-Jun-11 13:14:38 3449 bytes prism/private/wslib/lib/device/CV/1-0-7-2.spec
2004-Jul-16 16:44:40 3450 bytes prism/private/wslib/lib/device/CV/1-0-7-20.spec
2004-Jul-22 10:14:40 3450 bytes prism/private/wslib/lib/device/CV/1-0-7-21.spec
2004-Aug-17 15:29:48 3450 bytes prism/private/wslib/lib/device/CV/1-0-7-22.spec
2004-Aug-22 22:24:46 3450 bytes prism/private/wslib/lib/device/CV/1-0-7-23.spec 2004-Aug-23 22:46:58 3450 bytes prism/private/wslib/lib/device/CV/1-0-7-24.spec
2004-Aug-29 16:25:32 3450 bytes prism/private/wslib/lib/device/CV/1-0-7-25.spec
2004-Oct-15 10:25:38 3450 bytes prism/private/wslib/lib/device/CV/1-0-7-26.spec
2004-Oct-25 20:32:42 3450 bytes prism/private/wslib/lib/device/CV/1-0-7-27.spec
2004-Nov-11 10:48:10 3450 bytes prism/private/wslib/lib/device/CV/1-0-7-28.spec
2003-Jun-29 05:49:54 3449 bytes prism/private/wslib/lib/device/CV/1-0-7-3.spec
2003-Jul-09 16:05:22 3449 bytes prism/private/wslib/lib/device/CV/1-0-7-4.spec
2003-Jul-18 10:25:40 3449 bytes prism/private/wslib/lib/device/CV/1-0-7-5.spec
2003-Aug-07 15:44:02 3449 bytes prism/private/wslib/lib/device/CV/1-0-7-6.spec
2003-Aug-13 11:23:36 3449 bytes prism/private/wslib/lib/device/CV/1-0-7-7.spec
2003-Oct-12 11:01:04 3449 bytes prism/private/wslib/lib/device/CV/1-0-7-8.spec
2003-Oct-15 08:27:18 3449 bytes prism/private/wslib/lib/device/CV/1-0-7-9.spec
2004-Dec-13 10:28:31 1088 bytes prism/private/wslib/lib/device/Compr
2004-Dec-13 10:28:31 748 bytes prism/private/wslib/lib/device/Compr-P
2003-Nov-05 13:05:10 2816 bytes prism/private/wslib/lib/device/Compr-P/1-0-7-10.spec
2003-Nov-11 18:29:52 2816 bytes prism/private/wslib/lib/device/Compr-P/1-0-7-11.spec
2003-Dec-18 14:01:22 2816 bytes prism/private/wslib/lib/device/Compr-P/1-0-7-12.spec
2003-Dec-30 13:42:48 2816 bytes prism/private/wslib/lib/device/Compr-P/1-0-7-13.spec
2004-Feb-10 16:23:22 2816 bytes prism/private/wslib/lib/device/Compr-P/1-0-7-14.spec
2004-Mar-10 19:09:42 2816 bytes prism/private/wslib/lib/device/Compr-P/1-0-7-15.spec
2004-May-19 16:55:40 2816 bytes prism/private/wslib/lib/device/Compr-P/1-0-7-16.spec
2004-May-20 20:35:40 2816 bytes prism/private/wslib/lib/device/Compr-P/1-0-7-17.spec
2004-Jun-22 22:24:10 2816 bytes prism/private/wslib/lib/device/Compr-P/1-0-7-18.spec
2004-Jul-13 21:59:22 2816 bytes prism/private/wslib/lib/device/Compr-P/1-0-7-19.spec
2004-Jul-16 16:44:40 2816 bytes prism/private/wslib/lib/device/Compr-P/1-0-7-20.spec
2004-Jul-22 10:14:40 2816 bytes prism/private/wslib/lib/device/Compr-P/1-0-7-21.spec
2004-Aug-17 15:29:48 2816 bytes prism/private/wslib/lib/device/Compr-P/1-0-7-22.spec
2004-Aug-22 22:24:46 2816 bytes prism/private/wslib/lib/device/Compr-P/1-0-7-23.spec
2004-Aug-23 22:46:58 2816 bytes prism/private/wslib/lib/device/Compr-P/1-0-7-24.spec
2004-Aug-29 16:25:32 2816 bytes prism/private/wslib/lib/device/Compr-P/1-0-7-25.spec
2004-Oct-15 10:25:38 2816 bytes prism/private/wslib/lib/device/Compr-P/1-0-7-26.spec
2004-Oct-25 20:32:42 2816 bytes prism/private/wslib/lib/device/Compr-P/1-0-7-27.spec
2004-Nov-11 10:48:10 2816 bytes prism/private/wslib/lib/device/Compr-P/1-0-7-28.spec
2003-Nov-04 17:51:20 2815 bytes prism/private/wslib/lib/device/Compr-P/1-0-7-9.spec
2003-May-02 10:57:44 2814 bytes prism/private/wslib/lib/device/Compr/1-0-6-15.spec
2003-May-09 16:08:18 2813 bytes prism/private/wslib/lib/device/Compr/1-0-7-0.spec
2003-May-28 22:58:56 2813 bytes prism/private/wslib/lib/device/Compr/1-0-7-1.spec
2003-Oct-22 12:20:36 2814 bytes prism/private/wslib/lib/device/Compr/1-0-7-10.spec
2003-Nov-11 18:29:52 2814 bytes prism/private/wslib/lib/device/Compr/1-0-7-11.spec
2003-Dec-18 14:01:22 2814 bytes prism/private/wslib/lib/device/Compr/1-0-7-12.spec
2003-Dec-30 13:42:48 2814 bytes prism/private/wslib/lib/device/Compr/1-0-7-13.spec
2004-Feb-10 16:23:22 2814 bytes prism/private/wslib/lib/device/Compr/1-0-7-14.spec
2004-Mar-10 19:09:42 2814 bytes prism/private/wslib/lib/device/Compr/1-0-7-15.spec
2004-May-19 16:55:40 2814 bytes prism/private/wslib/lib/device/Compr/1-0-7-16.spec
2004-May-20 20:35:40 2814 bytes prism/private/wslib/lib/device/Compr/1-0-7-17.spec
2004-Jun-22 22:24:10 2814 bytes prism/private/wslib/lib/device/Compr/1-0-7-18.spec
2004-Jul-13 21:59:22 2814 bytes prism/private/wslib/lib/device/Compr/1-0-7-19.spec
2003-Jun-11 13:14:38 2813 bytes prism/private/wslib/lib/device/Compr/1-0-7-2.spec
2004-Jul-16 16:44:40 2814 bytes prism/private/wslib/lib/device/Compr/1-0-7-20.spec
2004-Jul-22 10:14:40 2814 bytes prism/private/wslib/lib/device/Compr/1-0-7-21.spec
2004-Aug-17 15:29:48 2814 bytes prism/private/wslib/lib/device/Compr/1-0-7-22.spec
2004-Aug-22 22:24:46 2814 bytes prism/private/wslib/lib/device/Compr/1-0-7-23.spec
2004-Aug-23 22:46:58 2814 bytes prism/private/wslib/lib/device/Compr/1-0-7-24.spec
2004-Aug-29 16:25:32 2814 bytes prism/private/wslib/lib/device/Compr/1-0-7-25.spec
2004-Oct-15 10:25:38 2814 bytes prism/private/wslib/lib/device/Compr/1-0-7-26.spec
2004-Oct-25 20:32:42 2814 bytes prism/private/wslib/lib/device/Compr/1-0-7-27.spec
2004-Nov-11 10:48:10 2814 bytes prism/private/wslib/lib/device/Compr/1-0-7-28.spec
2003-Jun-29 05:49:54 2813 bytes prism/private/wslib/lib/device/Compr/1-0-7-3.spec
2003-Jul-09 16:05:22 2813 bytes prism/private/wslib/lib/device/Compr/1-0-7-4.spec
2003-Jul-18 10:25:40 2813 bytes prism/private/wslib/lib/device/Compr/1-0-7-5.spec
2003-Aug-07 15:44:02 2813 bytes prism/private/wslib/lib/device/Compr/1-0-7-6.spec 2003-Aug-13 11:23:36 2813 bytes prism/private/wslib/lib/device/Compr/1-0-7-7.spec
2003-Oct-12 11:01:04 2813 bytes prism/private/wslib/lib/device/Compr/1-0-7-8.spec
2003-Oct-15 08:27:18 2813 bytes prism/private/wslib/lib/device/Compr/1-0-7-9.spec
2004-Dec-13 10:28:31 1088 bytes prism/private/wslib/lib/device/HE-SS
2003-Apr-27 14:15:54 3725 bytes prism/private/wslib/lib/device/HE-SS/1-0-6-15.spec
2003-May-09 16:08:18 3724 bytes prism/private/wslib/lib/device/HE-SS/1-0-7-0.spec
2003-May-28 22:58:56 3724 bytes prism/private/wslib/lib/device/HE-SS/1-0-7-1.spec
2003-Oct-22 12:20:36 3725 bytes prism/private/wslib/lib/device/HE-SS/1-0-7-10.spec
2003-Nov-11 18:29:52 3725 bytes prism/private/wslib/lib/device/HE-SS/1-0-7-11.spec
2003-Dec-18 14:01:22 3725 bytes prism/private/wslib/lib/device/HE-SS/1-0-7-12.spec
2003-Dec-30 13:42:48 3725 bytes prism/private/wslib/lib/device/HE-SS/1-0-7-13.spec
2004-Feb-10 16:23:22 3725 bytes prism/private/wslib/lib/device/HE-SS/1-0-7-14.spec
2004-Mar-10 19:09:42 3725 bytes prism/private/wslib/lib/device/HE-SS/1-0-7-15.spec
2004-May-19 16:55:40 3725 bytes prism/private/wslib/lib/device/HE-SS/1-0-7-16.spec
2004-May-20 20:35:40 3725 bytes prism/private/wslib/lib/device/HE-SS/1-0-7-17.spec
2004-Jun-22 22:24:10 3725 bytes prism/private/wslib/lib/device/HE-SS/1-0-7-18.spec
2004-Jul-13 21:59:22 3725 bytes prism/private/wslib/lib/device/HE-SS/1-0-7-19.spec
2003-Jun-11 13:14:38 3724 bytes prism/private/wslib/lib/device/HE-SS/1-0-7-2.spec
2004-Jul-16 16:44:40 3725 bytes prism/private/wslib/lib/device/HE-SS/1-0-7-20.spec
2004-Jul-22 10:14:40 3725 bytes prism/private/wslib/lib/device/HE-SS/1-0-7-21.spec
2004-Aug-17 15:29:48 3725 bytes prism/private/wslib/lib/device/HE-SS/1-0-7-22.spec
2004-Aug-22 22:24:46 3725 bytes prism/private/wslib/lib/device/HE-SS/1-0-7-23.spec
2004-Aug-23 22:46:58 3725 bytes prism/private/wslib/lib/device/HE-SS/1-0-7-24.spec
2004-Aug-29 16:25:32 3725 bytes prism/private/wslib/lib/device/HE-SS/1-0-7-25.spec
2004-Oct-15 10:25:38 3725 bytes prism/private/wslib/lib/device/HE-SS/1-0-7-26.spec
2004-Oct-25 20:32:42 3725 bytes prism/private/wslib/lib/device/HE-SS/1-0-7-27.spec
2004-Nov-11 10:48:10 3725 bytes prism/private/wslib/lib/device/HE-SS/1-0-7-28.spec
2003-Jun-29 05:49:54 3724 bytes prism/private/wslib/lib/device/HE-SS/1-0-7-3.spec
2003-Jul-09 16:05:22 3724 bytes prism/private/wslib/lib/device/HE-SS/1-0-7-4.spec
2003-Jul-18 10:25:40 3724 bytes prism/private/wslib/lib/device/HE-SS/1-0-7-5.spec
2003-Aug-07 15:44:02 3724 bytes prism/private/wslib/lib/device/HE-SS/1-0-7-6.spec
2003-Aug-13 11:23:36 3724 bytes prism/private/wslib/lib/device/HE-SS/1-0-7-7.spec
2003-Oct-12 11:01:04 3724 bytes prism/private/wslib/lib/device/HE-SS/1-0-7-8.spec
2003-Oct-15 08:27:18 3724 bytes prism/private/wslib/lib/device/HE-SS/1-0-7-9.spec
2004-Dec-13 10:28:31 1088 bytes prism/private/wslib/lib/device/HE-TS
2003-Apr-27 14:15:54 2423 bytes prism/private/wslib/lib/device/HE-TS/1-0-6-15.spec
2003-May-09 16:08:18 2422 bytes prism/private/wslib/lib/device/HE-TS/1-0-7-0.spec
2003-May-28 22:58:56 2422 bytes prism/private/wslib/lib/device/HE-TS/1-0-7-1.spec
2003-Oct-22 12:20:36 2423 bytes prism/private/wslib/lib/device/HE-TS/1-0-7-10.spec
2003-Nov-11 18:29:52 2423 bytes prism/private/wslib/lib/device/HE-TS/1-0-7-11.spec
2003-Dec-18 14:01:22 2423 bytes prism/private/wslib/lib/device/HE-TS/1-0-7-12.spec
2003-Dec-30 13:42:48 2423 bytes prism/private/wslib/lib/device/HE-TS/1-0-7-13.spec
2004-Feb-10 16:23:22 2423 bytes prism/private/wslib/lib/device/HE-TS/1-0-7-14.spec
2004-Mar-10 19:09:42 2423 bytes prism/private/wslib/lib/device/HE-TS/1-0-7-15.spec
2004-May-19 16:55:40 2423 bytes prism/private/wslib/lib/device/HE-TS/1-0-7-16.spec
2004-May-20 20:35:40 2423 bytes prism/private/wslib/lib/device/HE-TS/1-0-7-17.spec
2004-Jun-22 22:24:10 2423 bytes prism/private/wslib/lib/device/HE-TS/1-0-7-18.spec
2004-Jul-13 21:59:22 2423 bytes prism/private/wslib/lib/device/HE-TS/1-0-7-19.spec
2003-Jun-11 13:14:38 2422 bytes prism/private/wslib/lib/device/HE-TS/1-0-7-2.spec
2004-Jul-16 16:44:40 2423 bytes prism/private/wslib/lib/device/HE-TS/1-0-7-20.spec
2004-Jul-22 10:14:40 2423 bytes prism/private/wslib/lib/device/HE-TS/1-0-7-21.spec
2004-Aug-17 15:29:48 2423 bytes prism/private/wslib/lib/device/HE-TS/1-0-7-22.spec
2004-Aug-22 22:24:46 2423 bytes prism/private/wslib/lib/device/HE-TS/1-0-7-23.spec
2004-Aug-23 22:46:58 2423 bytes prism/private/wslib/lib/device/HE-TS/1-0-7-24.spec
2004-Aug-29 16:25:32 2423 bytes prism/private/wslib/lib/device/HE-TS/1-0-7-25.spec
2004-Oct-15 10:25:38 2423 bytes prism/private/wslib/lib/device/HE-TS/1-0-7-26.spec
2004-Oct-25 20:32:42 2423 bytes prism/private/wslib/lib/device/HE-TS/1-0-7-27.spec
2004-Nov-11 10:48:10 2423 bytes prism/private/wslib/lib/device/HE-TS/1-0-7-28.spec
2003-Jun-29 05:49:54 2422 bytes prism/private/wslib/lib/device/HE-TS/1-0-7-3.spec
2003-Jul-09 16:05:22 2422 bytes prism/private/wslib/lib/device/HE-TS/1-0-7-4.spec
2003-Jul-18 10:25:40 2422 bytes prism/private/wslib/lib/device/HE-TS/1-0-7-5.spec 2003-Aug-07 15:44:02 2422 bytes prism/private/wslib/lib/device/HE-TS/1-0-7-6.spec
2003-Aug-13 11:23:36 2422 bytes prism/private/wslib/lib/device/HE-TS/1-0-7-7.spec
2003-Oct-12 11:01:04 2422 bytes prism/private/wslib/lib/device/HE-TS/1-0-7-8.spec
2003-Oct-15 08:27:18 2422 bytes prism/private/wslib/lib/device/HE-TS/1-0-7-9.spec
2004-Dec-13 10:28:31 1088 bytes prism/private/wslib/lib/device/Header
2003-Apr-27 14:15:54 694 bytes prism/private/wslib/lib/device/Header/1-0-6-15.spec
2003-May-09 16:08:18 693 bytes prism/private/wslib/lib/device/Header/1-0-7-0.spec
2003-May-28 22:58:56 693 bytes prism/private/wslib/lib/device/Header/1-0-7-1.spec
2003-Oct-22 12:20:36 694 bytes prism/private/wslib/lib/device/Header/1-0-7-10.spec
2003-Nov-11 18:29:52 694 bytes prism/private/wslib/lib/device/Header/1-0-7-11.spec
2003-Dec-18 14:01:22 694 bytes prism/private/wslib/lib/device/Header/1-0-7-12.spec
2003-Dec-30 13:42:48 694 bytes prism/private/wslib/lib/device/Header/1-0-7-13.spec
2004-Feb-10 16:23:22 694 bytes prism/private/wslib/lib/device/Header/1-0-7-14.spec
2004-Mar-10 19:09:42 694 bytes prism/private/wslib/lib/device/Header/1-0-7-15.spec
2004-May-19 16:55:40 694 bytes prism/private/wslib/lib/device/Header/1-0-7-16.spec
2004-May-20 20:35:40 694 bytes prism/private/wslib/lib/device/Header/1-0-7-17.spec
2004-Jun-22 22:24:10 694 bytes prism/private/wslib/lib/device/Header/1-0-7-18.spec
2004-Jul-13 21:59:22 694 bytes prism/private/wslib/lib/device/Header/1-0-7-19.spec
2003-Jun-11 13:14:38 693 bytes prism/private/wslib/lib/device/Header/1-0-7-2.spec
2004-Jul-16 16:44:40 694 bytes prism/private/wslib/lib/device/Header/1-0-7-20.spec
2004-Jul-22 10:14:40 694 bytes prism/private/wslib/lib/device/Header/1-0-7-21.spec
2004-Aug-17 15:29:48 694 bytes prism/private/wslib/lib/device/Header/1-0-7-22.spec
2004-Aug-22 22:24:46 694 bytes prism/private/wslib/lib/device/Header/1-0-7-23.spec
2004-Aug-23 22:46:58 694 bytes prism/private/wslib/lib/device/Header/1-0-7-24.spec
2004-Aug-29 16:25:32 694 bytes prism/private/wslib/lib/device/Header/1-0-7-25.spec
2004-Oct-15 10:25:38 694 bytes prism/private/wslib/lib/device/Header/1-0-7-26.spec
2004-Oct-25 20:32:42 694 bytes prism/private/wslib/lib/device/Header/1-0-7-27.spec
2004-Nov-11 10:48:10 694 bytes prism/private/wslib/lib/device/Header/1-0-7-28.spec
2003-Jun-29 05:49:54 693 bytes prism/private/wslib/lib/device/Header/1-0-7-3.spec
2003-Jul-09 16:05:22 693 bytes prism/private/wslib/lib/device/Header/1-0-7-4.spec
2003-Jul-18 10:25:40 693 bytes prism/private/wslib/lib/device/Header/1-0-7-5.spec
2003-Aug-07 15:44:02 693 bytes prism/private/wslib/lib/device/Header/1-0-7-6.spec
2003-Aug-13 11:23:36 693 bytes prism/private/wslib/lib/device/Header/1-0-7-7.spec
2003-Oct-12 11:01:04 693 bytes prism/private/wslib/lib/device/Header/1-0-7-8.spec
2003-Oct-15 08:27:18 693 bytes prism/private/wslib/lib/device/Header/1-0-7-9.spec
2004-Dec-13 10:28:31 1088 bytes prism/private/wslib/lib/device/PRV
2003-Apr-27 14:15:54 186 bytes prism/private/wslib/lib/device/PRV/1-0-6-15.spec
2003-May-09 16:08:18 185 bytes prism/private/wslib/lib/device/PRV/1-0-7-0.spec
2003-May-28 22:58:56 185 bytes prism/private/wslib/lib/device/PRV/1-0-7-1.spec
2003-Oct-22 12:20:36 186 bytes prism/private/wslib/lib/device/PRV/1-0-7-10.spec
2003-Nov-11 18:29:52 186 bytes prism/private/wslib/lib/device/PRV/1-0-7-11.spec
2003-Dec-18 14:01:22 186 bytes prism/private/wslib/lib/device/PRV/1-0-7-12.spec
2003-Dec-30 13:42:48 186 bytes prism/private/wslib/lib/device/PRV/1-0-7-13.spec
2004-Feb-10 16:23:22 186 bytes prism/private/wslib/lib/device/PRV/1-0-7-14.spec
2004-Mar-10 19:09:42 186 bytes prism/private/wslib/lib/device/PRV/1-0-7-15.spec
2004-May-19 16:55:40 186 bytes prism/private/wslib/lib/device/PRV/1-0-7-16.spec
2004-May-20 20:35:40 186 bytes prism/private/wslib/lib/device/PRV/1-0-7-17.spec
2004-Jun-22 22:24:10 186 bytes prism/private/wslib/lib/device/PRV/1-0-7-18.spec
2004-Jul-13 21:59:22 186 bytes prism/private/wslib/lib/device/PRV/1-0-7-19.spec
2003-Jun-11 13:14:38 185 bytes prism/private/wslib/lib/device/PRV/1-0-7-2.spec
2004-Jul-16 16:44:40 186 bytes prism/private/wslib/lib/device/PRV/1-0-7-20.spec
2004-Jul-22 10:14:40 186 bytes prism/private/wslib/lib/device/PRV/1-0-7-21.spec
2004-Aug-17 15:29:48 186 bytes prism/private/wslib/lib/device/PRV/1-0-7-22.spec
2004-Aug-22 22:24:46 186 bytes prism/private/wslib/lib/device/PRV/1-0-7-23.spec
2004-Aug-23 22:46:58 186 bytes prism/private/wslib/lib/device/PRV/1-0-7-24.spec
2004-Aug-29 16:25:32 186 bytes prism/private/wslib/lib/device/PRV/1-0-7-25.spec
2004-Oct-15 10:25:38 186 bytes prism/private/wslib/lib/device/PRV/1-0-7-26.spec
2004-Oct-25 20:32:42 186 bytes prism/private/wslib/lib/device/PRV/1-0-7-27.spec
2004-Nov-11 10:48:10 186 bytes prism/private/wslib/lib/device/PRV/1-0-7-28.spec
2003-Jun-29 05:49:54 185 bytes prism/private/wslib/lib/device/PRV/1-0-7-3.spec
2003-Jul-09 16:05:22 185 bytes prism/private/wslib/lib/device/PRV/1-0-7-4.spec

| | | |
|---|---|---|
| 2003-Jul-18 10:25:40 | 185 bytes | prism/private/wslib/lib/device/PRV/1-0-7-5.spec |
| 2003-Aug-07 15:44:02 | 185 bytes | prism/private/wslib/lib/device/PRV/1-0-7-6.spec |
| 2003-Aug-13 11:23:36 | 185 bytes | prism/private/wslib/lib/device/PRV/1-0-7-7.spec |
| 2003-Oct-12 11:01:04 | 185 bytes | prism/private/wslib/lib/device/PRV/1-0-7-8.spec |
| 2003-Oct-15 08:27:18 | 185 bytes | prism/private/wslib/lib/device/PRV/1-0-7-9.spec |
| 2004-Dec-13 10:28:31 | 1088 bytes | prism/private/wslib/lib/device/Pipe-P |
| 2003-Apr-27 14:15:54 | 190 bytes | prism/private/wslib/lib/device/Pipe-P/1-0-6-15.spec |
| 2003-May-27 16:53:46 | 523 bytes | prism/private/wslib/lib/device/Pipe-P/1-0-7-0.spec |
| 2003-May-28 22:58:56 | 523 bytes | prism/private/wslib/lib/device/Pipe-P/1-0-7-1.spec |
| 2003-Oct-22 12:20:36 | 191 bytes | prism/private/wslib/lib/device/Pipe-P/1-0-7-10.spec |
| 2003-Nov-11 18:29:52 | 191 bytes | prism/private/wslib/lib/device/Pipe-P/1-0-7-11.spec |
| 2003-Dec-18 14:01:22 | 191 bytes | prism/private/wslib/lib/device/Pipe-P/1-0-7-12.spec |
| 2003-Dec-30 13:42:48 | 191 bytes | prism/private/wslib/lib/device/Pipe-P/1-0-7-13.spec |
| 2004-Feb-10 16:23:22 | 191 bytes | prism/private/wslib/lib/device/Pipe-P/1-0-7-14.spec |
| 2004-Mar-10 19:09:42 | 191 bytes | prism/private/wslib/lib/device/Pipe-P/1-0-7-15.spec |
| 2004-May-19 16:55:40 | 191 bytes | prism/private/wslib/lib/device/Pipe-P/1-0-7-16.spec |
| 2004-May-20 20:35:40 | 191 bytes | prism/private/wslib/lib/device/Pipe-P/1-0-7-17.spec |
| 2004-Jun-22 22:24:10 | 191 bytes | prism/private/wslib/lib/device/Pipe-P/1-0-7-18.spec |
| 2004-Jul-13 21:59:22 | 191 bytes | prism/private/wslib/lib/device/Pipe-P/1-0-7-19.spec |
| 2003-Jun-11 13:14:38 | 523 bytes | prism/private/wslib/lib/device/Pipe-P/1-0-7-2.spec |
| 2004-Jul-16 16:44:40 | 191 bytes | prism/private/wslib/lib/device/Pipe-P/1-0-7-20.spec |
| 2004-Jul-22 10:14:40 | 191 bytes | prism/private/wslib/lib/device/Pipe-P/1-0-7-21.spec |
| 2004-Aug-17 15:29:48 | 191 bytes | prism/private/wslib/lib/device/Pipe-P/1-0-7-22.spec |
| 2004-Aug-22 22:24:46 | 191 bytes | prism/private/wslib/lib/device/Pipe-P/1-0-7-23.spec |
| 2004-Aug-23 22:46:58 | 191 bytes | prism/private/wslib/lib/device/Pipe-P/1-0-7-24.spec |
| 2004-Aug-29 16:25:32 | 191 bytes | prism/private/wslib/lib/device/Pipe-P/1-0-7-25.spec |
| 2004-Oct-15 10:25:38 | 191 bytes | prism/private/wslib/lib/device/Pipe-P/1-0-7-26.spec |
| 2004-Oct-25 20:32:42 | 191 bytes | prism/private/wslib/lib/device/Pipe-P/1-0-7-27.spec |
| 2004-Nov-11 10:48:10 | 191 bytes | prism/private/wslib/lib/device/Pipe-P/1-0-7-28.spec |
| 2003-Jun-29 05:49:54 | 523 bytes | prism/private/wslib/lib/device/Pipe-P/1-0-7-3.spec |
| 2003-Jul-09 16:18:24 | 190 bytes | prism/private/wslib/lib/device/Pipe-P/1-0-7-4.spec |
| 2003-Jul-18 10:25:40 | 190 bytes | prism/private/wslib/lib/device/Pipe-P/1-0-7-5.spec |
| 2003-Aug-07 15:44:02 | 190 bytes | prism/private/wslib/lib/device/Pipe-P/1-0-7-6.spec |
| 2003-Aug-13 11:23:36 | 190 bytes | prism/private/wslib/lib/device/Pipe-P/1-0-7-7.spec |
| 2003-Oct-12 11:01:04 | 190 bytes | prism/private/wslib/lib/device/Pipe-P/1-0-7-8.spec |
| 2003-Oct-15 08:27:18 | 190 bytes | prism/private/wslib/lib/device/Pipe-P/1-0-7-9.spec |
| 2004-Dec-13 10:28:31 | 1088 bytes | prism/private/wslib/lib/device/Pump |
| 2004-Dec-13 10:28:31 | 850 bytes | prism/private/wslib/lib/device/Pump-P |
| 2003-Oct-22 12:20:36 | 3096 bytes | prism/private/wslib/lib/device/Pump-P/1-0-7-10.spec |
| 2003-Nov-11 18:29:52 | 3096 bytes | prism/private/wslib/lib/device/Pump-P/1-0-7-11.spec |
| 2003-Dec-18 14:01:22 | 3096 bytes | prism/private/wslib/lib/device/Pump-P/1-0-7-12.spec |
| 2003-Dec-30 13:42:48 | 3096 bytes | prism/private/wslib/lib/device/Pump-P/1-0-7-13.spec |
| 2004-Feb-10 16:23:22 | 3096 bytes | prism/private/wslib/lib/device/Pump-P/1-0-7-14.spec |
| 2004-Mar-10 19:09:42 | 3096 bytes | prism/private/wslib/lib/device/Pump-P/1-0-7-15.spec |
| 2004-May-19 16:55:40 | 3096 bytes | prism/private/wslib/lib/device/Pump-P/1-0-7-16.spec |
| 2004-May-20 20:35:40 | 3096 bytes | prism/private/wslib/lib/device/Pump-P/1-0-7-17.spec |
| 2004-Jun-22 22:24:10 | 3096 bytes | prism/private/wslib/lib/device/Pump-P/1-0-7-18.spec |
| 2004-Jul-13 21:59:22 | 3096 bytes | prism/private/wslib/lib/device/Pump-P/1-0-7-19.spec |
| 2004-Jul-16 16:44:40 | 3096 bytes | prism/private/wslib/lib/device/Pump-P/1-0-7-20.spec |
| 2004-Jul-22 10:14:40 | 3096 bytes | prism/private/wslib/lib/device/Pump-P/1-0-7-21.spec |
| 2004-Aug-17 15:29:48 | 3096 bytes | prism/private/wslib/lib/device/Pump-P/1-0-7-22.spec |
| 2004-Aug-22 22:24:46 | 3096 bytes | prism/private/wslib/lib/device/Pump-P/1-0-7-23.spec |
| 2004-Aug-23 22:46:58 | 3096 bytes | prism/private/wslib/lib/device/Pump-P/1-0-7-24.spec |
| 2004-Aug-29 16:25:32 | 3096 bytes | prism/private/wslib/lib/device/Pump-P/1-0-7-25.spec |
| 2004-Oct-15 10:25:38 | 3096 bytes | prism/private/wslib/lib/device/Pump-P/1-0-7-26.spec |
| 2004-Oct-25 20:32:42 | 3096 bytes | prism/private/wslib/lib/device/Pump-P/1-0-7-27.spec |
| 2004-Nov-11 10:48:10 | 3096 bytes | prism/private/wslib/lib/device/Pump-P/1-0-7-28.spec |
| 2003-Sep-16 13:43:36 | 3095 bytes | prism/private/wslib/lib/device/Pump-P/1-0-7-6.spec |
| 2003-Sep-24 13:27:46 | 3095 bytes | prism/private/wslib/lib/device/Pump-P/1-0-7-7.spec |
| 2003-Oct-12 11:01:04 | 3095 bytes | prism/private/wslib/lib/device/Pump-P/1-0-7-8.spec |
| 2003-Oct-15 08:27:18 | 3095 bytes | prism/private/wslib/lib/device/Pump-P/1-0-7-9.spec |

2003-May-02 10:58:36 3093 bytes prism/private/wslib/lib/device/Pump/1-0-6-15.spec
2003-May-09 16:08:18 3092 bytes prism/private/wslib/lib/device/Pump/1-0-7-0.spec
2003-May-28 22:58:56 3092 bytes prism/private/wslib/lib/device/Pump/1-0-7-1.spec
2003-Oct-22 12:20:36 3093 bytes prism/private/wslib/lib/device/Pump/1-0-7-10.spec
2003-Nov-11 18:29:52 3093 bytes prism/private/wslib/lib/device/Pump/1-0-7-11.spec
2003-Dec-18 14:01:22 3093 bytes prism/private/wslib/lib/device/Pump/1-0-7-12.spec
2003-Dec-30 13:42:48 3093 bytes prism/private/wslib/lib/device/Pump/1-0-7-13.spec
2004-Feb-10 16:23:22 3093 bytes prism/private/wslib/lib/device/Pump/1-0-7-14.spec
2004-Mar-10 19:09:42 3093 bytes prism/private/wslib/lib/device/Pump/1-0-7-15.spec
2004-May-19 16:55:40 3093 bytes prism/private/wslib/lib/device/Pump/1-0-7-16.spec
2004-May-20 20:35:40 3093 bytes prism/private/wslib/lib/device/Pump/1-0-7-17.spec
2004-Jun-22 22:24:10 3093 bytes prism/private/wslib/lib/device/Pump/1-0-7-18.spec
2004-Jul-13 21:59:22 3093 bytes prism/private/wslib/lib/device/Pump/1-0-7-19.spec
2003-Jun-11 13:14:38 3092 bytes prism/private/wslib/lib/device/Pump/1-0-7-2.spec
2004-Jul-16 16:44:40 3093 bytes prism/private/wslib/lib/device/Pump/1-0-7-20.spec
2004-Jul-22 10:14:40 3093 bytes prism/private/wslib/lib/device/Pump/1-0-7-21.spec
2004-Aug-17 15:29:48 3093 bytes prism/private/wslib/lib/device/Pump/1-0-7-22.spec
2004-Aug-22 22:24:46 3093 bytes prism/private/wslib/lib/device/Pump/1-0-7-23.spec
2004-Aug-23 22:46:58 3093 bytes prism/private/wslib/lib/device/Pump/1-0-7-24.spec
2004-Aug-29 16:25:32 3093 bytes prism/private/wslib/lib/device/Pump/1-0-7-25.spec
2004-Oct-15 10:25:38 3093 bytes prism/private/wslib/lib/device/Pump/1-0-7-26.spec
2004-Oct-25 20:32:42 3093 bytes prism/private/wslib/lib/device/Pump/1-0-7-27.spec
2004-Nov-11 10:48:10 3093 bytes prism/private/wslib/lib/device/Pump/1-0-7-28.spec
2003-Jun-29 05:49:54 3092 bytes prism/private/wslib/lib/device/Pump/1-0-7-3.spec
2003-Jul-09 16:05:22 3092 bytes prism/private/wslib/lib/device/Pump/1-0-7-4.spec
2003-Jul-18 10:25:40 3092 bytes prism/private/wslib/lib/device/Pump/1-0-7-5.spec
2003-Aug-07 15:44:02 3092 bytes prism/private/wslib/lib/device/Pump/1-0-7-6.spec
2003-Aug-13 11:23:36 3092 bytes prism/private/wslib/lib/device/Pump/1-0-7-7.spec
2003-Oct-12 11:01:04 3092 bytes prism/private/wslib/lib/device/Pump/1-0-7-8.spec
2003-Oct-15 08:27:18 3092 bytes prism/private/wslib/lib/device/Pump/1-0-7-9.spec
2004-Dec-13 10:28:31 1088 bytes prism/private/wslib/lib/device/RD
2003-Apr-27 14:15:54 184 bytes prism/private/wslib/lib/device/RD/1-0-6-15.spec
2003-May-09 16:08:18 183 bytes prism/private/wslib/lib/device/RD/1-0-7-0.spec
2003-May-28 22:58:56 183 bytes prism/private/wslib/lib/device/RD/1-0-7-1.spec
2003-Oct-22 12:20:36 184 bytes prism/private/wslib/lib/device/RD/1-0-7-10.spec
2003-Nov-11 18:29:52 184 bytes prism/private/wslib/lib/device/RD/1-0-7-11.spec
2003-Dec-18 14:01:22 184 bytes prism/private/wslib/lib/device/RD/1-0-7-12.spec
2003-Dec-30 13:42:48 184 bytes prism/private/wslib/lib/device/RD/1-0-7-13.spec
2004-Feb-10 16:23:22 184 bytes prism/private/wslib/lib/device/RD/1-0-7-14.spec
2004-Mar-10 19:09:42 184 bytes prism/private/wslib/lib/device/RD/1-0-7-15.spec
2004-May-19 16:55:40 184 bytes prism/private/wslib/lib/device/RD/1-0-7-16.spec
2004-May-20 20:35:40 184 bytes prism/private/wslib/lib/device/RD/1-0-7-17.spec
2004-Jun-22 22:24:10 184 bytes prism/private/wslib/lib/device/RD/1-0-7-18.spec
2004-Jul-13 21:59:22 184 bytes prism/private/wslib/lib/device/RD/1-0-7-19.spec
2003-Jun-11 13:14:38 183 bytes prism/private/wslib/lib/device/RD/1-0-7-2.spec
2004-Jul-16 16:44:40 184 bytes prism/private/wslib/lib/device/RD/1-0-7-20.spec
2004-Jul-22 10:14:40 184 bytes prism/private/wslib/lib/device/RD/1-0-7-21.spec
2004-Aug-17 15:29:48 184 bytes prism/private/wslib/lib/device/RD/1-0-7-22.spec
2004-Aug-22 22:24:46 184 bytes prism/private/wslib/lib/device/RD/1-0-7-23.spec
2004-Aug-28 19:44:22 1453 bytes prism/private/wslib/lib/device/RD/1-0-7-24.spec
2004-Aug-29 16:25:32 1453 bytes prism/private/wslib/lib/device/RD/1-0-7-25.spec
2004-Oct-15 10:25:38 1453 bytes prism/private/wslib/lib/device/RD/1-0-7-26.spec
2004-Oct-25 20:32:44 1453 bytes prism/private/wslib/lib/device/RD/1-0-7-27.spec
2004-Nov-11 10:48:10 1453 bytes prism/private/wslib/lib/device/RD/1-0-7-28.spec
2003-Jun-29 05:49:54 183 bytes prism/private/wslib/lib/device/RD/1-0-7-3.spec
2003-Jul-09 16:05:22 183 bytes prism/private/wslib/lib/device/RD/1-0-7-4.spec
2003-Jul-18 10:25:40 183 bytes prism/private/wslib/lib/device/RD/1-0-7-5.spec
2003-Aug-07 15:44:02 183 bytes prism/private/wslib/lib/device/RD/1-0-7-6.spec
2003-Aug-13 11:23:36 183 bytes prism/private/wslib/lib/device/RD/1-0-7-7.spec
2003-Oct-12 11:01:04 183 bytes prism/private/wslib/lib/device/RD/1-0-7-8.spec
2003-Oct-15 08:27:18 183 bytes prism/private/wslib/lib/device/RD/1-0-7-9.spec

| | | |
|---|---|---|
| 2004-Dec-13 10:28:31 | 884 bytes | prism/private/wslib/lib/device/TV |
| 2003-Oct-22 12:20:36 | 184 bytes | prism/private/wslib/lib/device/TV/1-0-7-10.spec |
| 2003-Nov-11 18:29:52 | 184 bytes | prism/private/wslib/lib/device/TV/1-0-7-11.spec |
| 2003-Dec-18 14:01:22 | 184 bytes | prism/private/wslib/lib/device/TV/1-0-7-12.spec |
| 2003-Dec-30 13:42:48 | 184 bytes | prism/private/wslib/lib/device/TV/1-0-7-13.spec |
| 2004-Feb-10 16:23:22 | 184 bytes | prism/private/wslib/lib/device/TV/1-0-7-14.spec |
| 2004-Mar-10 19:09:42 | 184 bytes | prism/private/wslib/lib/device/TV/1-0-7-15.spec |
| 2004-May-19 16:55:40 | 184 bytes | prism/private/wslib/lib/device/TV/1-0-7-16.spec |
| 2004-May-20 20:35:40 | 184 bytes | prism/private/wslib/lib/device/TV/1-0-7-17.spec |
| 2004-Jun-22 22:24:10 | 184 bytes | prism/private/wslib/lib/device/TV/1-0-7-18.spec |
| 2004-Jul-13 21:59:22 | 184 bytes | prism/private/wslib/lib/device/TV/1-0-7-19.spec |
| 2004-Jul-16 16:44:40 | 184 bytes | prism/private/wslib/lib/device/TV/1-0-7-20.spec |
| 2004-Jul-22 10:14:40 | 184 bytes | prism/private/wslib/lib/device/TV/1-0-7-21.spec |
| 2004-Aug-17 15:29:48 | 184 bytes | prism/private/wslib/lib/device/TV/1-0-7-22.spec |
| 2004-Aug-22 22:24:46 | 184 bytes | prism/private/wslib/lib/device/TV/1-0-7-23.spec |
| 2004-Aug-23 22:46:58 | 184 bytes | prism/private/wslib/lib/device/TV/1-0-7-24.spec |
| 2004-Aug-29 16:25:32 | 184 bytes | prism/private/wslib/lib/device/TV/1-0-7-25.spec |
| 2004-Oct-15 10:25:38 | 184 bytes | prism/private/wslib/lib/device/TV/1-0-7-26.spec |
| 2004-Oct-25 20:32:44 | 184 bytes | prism/private/wslib/lib/device/TV/1-0-7-27.spec |
| 2004-Nov-11 10:48:10 | 184 bytes | prism/private/wslib/lib/device/TV/1-0-7-28.spec |
| 2003-Jul-18 12:15:38 | 183 bytes | prism/private/wslib/lib/device/TV/1-0-7-5.spec |
| 2003-Aug-07 15:44:02 | 183 bytes | prism/private/wslib/lib/device/TV/1-0-7-6.spec |
| 2003-Aug-13 11:23:36 | 183 bytes | prism/private/wslib/lib/device/TV/1-0-7-7.spec |
| 2003-Oct-12 11:01:04 | 183 bytes | prism/private/wslib/lib/device/TV/1-0-7-8.spec |
| 2003-Oct-15 08:27:18 | 183 bytes | prism/private/wslib/lib/device/TV/1-0-7-9.spec |
| 2004-Dec-13 10:28:31 | 1088 bytes | prism/private/wslib/lib/device/Tank |
| 2003-Apr-27 14:15:54 | 3852 bytes | prism/private/wslib/lib/device/Tank/1-0-6-15.spec |
| 2003-May-09 16:08:18 | 3851 bytes | prism/private/wslib/lib/device/Tank/1-0-7-0.spec |
| 2003-May-28 22:58:56 | 3851 bytes | prism/private/wslib/lib/device/Tank/1-0-7-1.spec |
| 2003-Oct-22 12:20:36 | 190 bytes | prism/private/wslib/lib/device/Tank/1-0-7-10.spec |
| 2003-Nov-11 18:29:52 | 190 bytes | prism/private/wslib/lib/device/Tank/1-0-7-11.spec |
| 2003-Dec-18 14:01:22 | 190 bytes | prism/private/wslib/lib/device/Tank/1-0-7-12.spec |
| 2003-Dec-30 13:42:48 | 190 bytes | prism/private/wslib/lib/device/Tank/1-0-7-13.spec |
| 2004-Feb-10 16:23:22 | 190 bytes | prism/private/wslib/lib/device/Tank/1-0-7-14.spec |
| 2004-Mar-10 19:09:42 | 190 bytes | prism/private/wslib/lib/device/Tank/1-0-7-15.spec |
| 2004-May-19 16:55:40 | 190 bytes | prism/private/wslib/lib/device/Tank/1-0-7-16.spec |
| 2004-Jun-22 14:25:18 | 963 bytes | prism/private/wslib/lib/device/Tank/1-0-7-17.spec |
| 2004-Jun-22 22:24:10 | 963 bytes | prism/private/wslib/lib/device/Tank/1-0-7-18.spec |
| 2004-Jul-13 21:59:22 | 963 bytes | prism/private/wslib/lib/device/Tank/1-0-7-19.spec |
| 2003-Jun-11 13:14:38 | 3851 bytes | prism/private/wslib/lib/device/Tank/1-0-7-2.spec |
| 2004-Jul-16 16:44:40 | 963 bytes | prism/private/wslib/lib/device/Tank/1-0-7-20.spec |
| 2004-Jul-22 10:14:40 | 963 bytes | prism/private/wslib/lib/device/Tank/1-0-7-21.spec |
| 2004-Aug-17 15:29:48 | 963 bytes | prism/private/wslib/lib/device/Tank/1-0-7-22.spec |
| 2004-Aug-22 22:24:46 | 963 bytes | prism/private/wslib/lib/device/Tank/1-0-7-23.spec |
| 2004-Aug-23 22:46:58 | 963 bytes | prism/private/wslib/lib/device/Tank/1-0-7-24.spec |
| 2004-Aug-29 16:25:32 | 963 bytes | prism/private/wslib/lib/device/Tank/1-0-7-25.spec |
| 2004-Oct-15 10:25:38 | 963 bytes | prism/private/wslib/lib/device/Tank/1-0-7-26.spec |
| 2004-Oct-25 20:32:44 | 963 bytes | prism/private/wslib/lib/device/Tank/1-0-7-27.spec |
| 2004-Nov-11 10:48:10 | 963 bytes | prism/private/wslib/lib/device/Tank/1-0-7-28.spec |
| 2003-Jun-29 05:49:54 | 3851 bytes | prism/private/wslib/lib/device/Tank/1-0-7-3.spec |
| 2003-Jul-09 16:05:22 | 3851 bytes | prism/private/wslib/lib/device/Tank/1-0-7-4.spec |
| 2003-Jul-20 10:42:46 | 189 bytes | prism/private/wslib/lib/device/Tank/1-0-7-5.spec |
| 2003-Aug-07 15:44:02 | 189 bytes | prism/private/wslib/lib/device/Tank/1-0-7-6.spec |
| 2003-Aug-13 11:23:36 | 189 bytes | prism/private/wslib/lib/device/Tank/1-0-7-7.spec |
| 2003-Oct-12 11:01:04 | 189 bytes | prism/private/wslib/lib/device/Tank/1-0-7-8.spec |
| 2003-Oct-15 08:27:18 | 189 bytes | prism/private/wslib/lib/device/Tank/1-0-7-9.spec |
| 2004-Dec-13 10:28:31 | 1088 bytes | prism/private/wslib/lib/device/TurbineStm |
| 2003-Apr-27 14:15:54 | 199 bytes | prism/private/wslib/lib/device/TurbineStm/1-0-6-15.spec |
| 2003-May-09 16:08:18 | 198 bytes | prism/private/wslib/lib/device/TurbineStm/1-0-7-0.spec |
| 2003-May-28 22:58:56 | 198 bytes | prism/private/wslib/lib/device/TurbineStm/1-0-7-1.spec |
| 2003-Oct-22 12:20:36 | 199 bytes | prism/private/wslib/lib/device/TurbineStm/1-0-7-10.spec |

2003-Nov-11 18:29:52 199 bytes prism/private/wslib/lib/device/TurbineStm/1-0-7-11.spec
2003-Dec-18 14:01:22 199 bytes prism/private/wslib/lib/device/TurbineStm/1-0-7-12.spec
2003-Dec-30 13:42:48 199 bytes prism/private/wslib/lib/device/TurbineStm/1-0-7-13.spec
2004-Feb-10 16:23:22 199 bytes prism/private/wslib/lib/device/TurbineStm/1-0-7-14.spec
2004-Mar-10 19:09:42 199 bytes prism/private/wslib/lib/device/TurbineStm/1-0-7-15.spec
2004-May-19 16:55:40 199 bytes prism/private/wslib/lib/device/TurbineStm/1-0-7-16.spec
2004-May-20 20:35:40 199 bytes prism/private/wslib/lib/device/TurbineStm/1-0-7-17.spec
2004-Jun-22 22:24:10 199 bytes prism/private/wslib/lib/device/TurbineStm/1-0-7-18.spec
2004-Jul-13 21:59:22 199 bytes prism/private/wslib/lib/device/TurbineStm/1-0-7-19.spec
2003-Jun-11 13:14:38 198 bytes prism/private/wslib/lib/device/TurbineStm/1-0-7-2.spec
2004-Jul-16 16:44:40 199 bytes prism/private/wslib/lib/device/TurbineStm/1-0-7-20.spec
2004-Jul-22 10:14:40 199 bytes prism/private/wslib/lib/device/TurbineStm/1-0-7-21.spec
2004-Aug-17 15:29:48 199 bytes prism/private/wslib/lib/device/TurbineStm/1-0-7-22.spec
2004-Aug-22 22:24:46 199 bytes prism/private/wslib/lib/device/TurbineStm/1-0-7-23.spec
2004-Aug-23 22:46:58 199 bytes prism/private/wslib/lib/device/TurbineStm/1-0-7-24.spec
2004-Aug-29 16:25:32 199 bytes prism/private/wslib/lib/device/TurbineStm/1-0-7-25.spec
2004-Oct-15 10:25:38 199 bytes prism/private/wslib/lib/device/TurbineStm/1-0-7-26.spec
2004-Oct-25 20:32:44 199 bytes prism/private/wslib/lib/device/TurbineStm/1-0-7-27.spec
2004-Nov-11 10:48:10 199 bytes prism/private/wslib/lib/device/TurbineStm/1-0-7-28.spec
2003-Jun-29 05:49:54 198 bytes prism/private/wslib/lib/device/TurbineStm/1-0-7-3.spec
2003-Jul-09 16:05:22 198 bytes prism/private/wslib/lib/device/TurbineStm/1-0-7-4.spec
2003-Jul-18 10:25:40 198 bytes prism/private/wslib/lib/device/TurbineStm/1-0-7-5.spec
2003-Aug-07 15:44:02 198 bytes prism/private/wslib/lib/device/TurbineStm/1-0-7-6.spec
2003-Aug-13 11:23:36 198 bytes prism/private/wslib/lib/device/TurbineStm/1-0-7-7.spec
2003-Oct-12 11:01:04 198 bytes prism/private/wslib/lib/device/TurbineStm/1-0-7-8.spec
2003-Oct-15 08:27:18 198 bytes prism/private/wslib/lib/device/TurbineStm/1-0-7-9.spec
2004-Dec-13 10:28:32 1088 bytes prism/private/wslib/lib/device/Vessel
2003-Apr-27 14:15:54 3717 bytes prism/private/wslib/lib/device/Vessel/1-0-6-15.spec
2003-May-09 16:08:18 3716 bytes prism/private/wslib/lib/device/Vessel/1-0-7-0.spec
2003-May-28 22:58:56 3716 bytes prism/private/wslib/lib/device/Vessel/1-0-7-1.spec
2003-Oct-22 12:20:36 182 bytes prism/private/wslib/lib/device/Vessel/1-0-7-10.spec
2003-Nov-11 18:29:52 182 bytes prism/private/wslib/lib/device/Vessel/1-0-7-11.spec
2003-Dec-18 14:01:22 182 bytes prism/private/wslib/lib/device/Vessel/1-0-7-12.spec
2003-Dec-30 13:42:48 182 bytes prism/private/wslib/lib/device/Vessel/1-0-7-13.spec
2004-Feb-10 16:23:22 182 bytes prism/private/wslib/lib/device/Vessel/1-0-7-14.spec
2004-Mar-10 19:09:42 182 bytes prism/private/wslib/lib/device/Vessel/1-0-7-15.spec
2004-May-19 16:55:40 182 bytes prism/private/wslib/lib/device/Vessel/1-0-7-16.spec
2004-May-20 20:35:40 182 bytes prism/private/wslib/lib/device/Vessel/1-0-7-17.spec
2004-Jun-22 22:24:10 182 bytes prism/private/wslib/lib/device/Vessel/1-0-7-18.spec
2004-Jul-13 21:59:22 182 bytes prism/private/wslib/lib/device/Vessel/1-0-7-19.spec
2003-Jun-11 13:14:38 3716 bytes prism/private/wslib/lib/device/Vessel/1-0-7-2.spec
2004-Jul-16 16:44:40 182 bytes prism/private/wslib/lib/device/Vessel/1-0-7-20.spec
2004-Jul-22 10:14:40 182 bytes prism/private/wslib/lib/device/Vessel/1-0-7-21.spec
2004-Aug-17 15:29:48 182 bytes prism/private/wslib/lib/device/Vessel/1-0-7-22.spec
2004-Aug-22 22:24:46 182 bytes prism/private/wslib/lib/device/Vessel/1-0-7-23.spec
2004-Aug-23 22:46:58 182 bytes prism/private/wslib/lib/device/Vessel/1-0-7-24.spec
2004-Aug-29 16:25:32 182 bytes prism/private/wslib/lib/device/Vessel/1-0-7-25.spec
2004-Oct-15 10:25:38 182 bytes prism/private/wslib/lib/device/Vessel/1-0-7-26.spec
2004-Oct-25 20:32:44 182 bytes prism/private/wslib/lib/device/Vessel/1-0-7-27.spec
2004-Nov-11 10:48:10 182 bytes prism/private/wslib/lib/device/Vessel/1-0-7-28.spec
2003-Jun-29 05:49:54 3716 bytes prism/private/wslib/lib/device/Vessel/1-0-7-3.spec
2003-Jul-09 16:05:22 3716 bytes prism/private/wslib/lib/device/Vessel/1-0-7-4.spec
2003-Jul-18 10:25:40 3716 bytes prism/private/wslib/lib/device/Vessel/1-0-7-5.spec
2003-Aug-07 15:44:02 3716 bytes prism/private/wslib/lib/device/Vessel/1-0-7-6.spec
2003-Aug-15 10:00:56 181 bytes prism/private/wslib/lib/device/Vessel/1-0-7-7.spec
2003-Oct-12 11:01:04 181 bytes prism/private/wslib/lib/device/Vessel/1-0-7-8.spec
2003-Oct-15 08:27:18 181 bytes prism/private/wslib/lib/device/Vessel/1-0-7-9.spec
2004-Dec-13 10:28:33 816 bytes prism/private/wslib/lib/fitting
2004-Dec-13 10:28:32 1088 bytes prism/private/wslib/lib/fitting/BallValve
2003-Apr-27 14:15:54 3397 bytes prism/private/wslib/lib/fitting/BallValve/1-0-6-15.spec
2003-May-09 16:08:18 3396 bytes prism/private/wslib/lib/fitting/BallValve/1-0-7-0.spec

| | | |
|---|---|---|
| 2003-Jun-20 15:19:20 | 3426 bytes | prism/private/wslib/lib/fitting/BallValve/1-0-7-1.spec |
| 2003-Oct-22 12:20:36 | 211 bytes | prism/private/wslib/lib/fitting/BallValve/1-0-7-10.spec |
| 2003-Nov-11 18:29:52 | 211 bytes | prism/private/wslib/lib/fitting/BallValve/1-0-7-11.spec |
| 2003-Dec-18 14:01:22 | 211 bytes | prism/private/wslib/lib/fitting/BallValve/1-0-7-12.spec |
| 2003-Dec-30 13:42:48 | 211 bytes | prism/private/wslib/lib/fitting/BallValve/1-0-7-13.spec |
| 2004-Feb-10 16:23:22 | 211 bytes | prism/private/wslib/lib/fitting/BallValve/1-0-7-14.spec |
| 2004-Mar-10 19:09:42 | 211 bytes | prism/private/wslib/lib/fitting/BallValve/1-0-7-15.spec |
| 2004-May-19 16:55:40 | 211 bytes | prism/private/wslib/lib/fitting/BallValve/1-0-7-16.spec |
| 2004-May-20 20:35:40 | 211 bytes | prism/private/wslib/lib/fitting/BallValve/1-0-7-17.spec |
| 2004-Jun-22 22:24:10 | 211 bytes | prism/private/wslib/lib/fitting/BallValve/1-0-7-18.spec |
| 2004-Jul-13 21:59:22 | 211 bytes | prism/private/wslib/lib/fitting/BallValve/1-0-7-19.spec |
| 2003-Jun-20 16:06:10 | 210 bytes | prism/private/wslib/lib/fitting/BallValve/1-0-7-2.spec |
| 2004-Jul-16 16:44:40 | 211 bytes | prism/private/wslib/lib/fitting/BallValve/1-0-7-20.spec |
| 2004-Jul-22 10:14:40 | 211 bytes | prism/private/wslib/lib/fitting/BallValve/1-0-7-21.spec |
| 2004-Aug-17 15:29:48 | 211 bytes | prism/private/wslib/lib/fitting/BallValve/1-0-7-22.spec |
| 2004-Aug-22 22:24:46 | 211 bytes | prism/private/wslib/lib/fitting/BallValve/1-0-7-23.spec |
| 2004-Aug-23 22:46:58 | 211 bytes | prism/private/wslib/lib/fitting/BallValve/1-0-7-24.spec |
| 2004-Aug-29 16:25:32 | 211 bytes | prism/private/wslib/lib/fitting/BallValve/1-0-7-25.spec |
| 2004-Oct-15 10:25:38 | 211 bytes | prism/private/wslib/lib/fitting/BallValve/1-0-7-26.spec |
| 2004-Oct-25 20:32:44 | 211 bytes | prism/private/wslib/lib/fitting/BallValve/1-0-7-27.spec |
| 2004-Nov-11 10:48:10 | 211 bytes | prism/private/wslib/lib/fitting/BallValve/1-0-7-28.spec |
| 2003-Jun-29 05:49:54 | 210 bytes | prism/private/wslib/lib/fitting/BallValve/1-0-7-3.spec |
| 2003-Jul-09 16:05:22 | 210 bytes | prism/private/wslib/lib/fitting/BallValve/1-0-7-4.spec |
| 2003-Jul-18 10:25:40 | 210 bytes | prism/private/wslib/lib/fitting/BallValve/1-0-7-5.spec |
| 2003-Aug-07 15:44:02 | 210 bytes | prism/private/wslib/lib/fitting/BallValve/1-0-7-6.spec |
| 2003-Aug-13 11:23:36 | 210 bytes | prism/private/wslib/lib/fitting/BallValve/1-0-7-7.spec |
| 2003-Oct-12 11:01:04 | 210 bytes | prism/private/wslib/lib/fitting/BallValve/1-0-7-8.spec |
| 2003-Oct-15 08:27:18 | 210 bytes | prism/private/wslib/lib/fitting/BallValve/1-0-7-9.spec |
| 2004-Dec-13 10:28:32 | 1088 bytes | prism/private/wslib/lib/fitting/Elbow45 |
| 2003-Apr-27 14:15:54 | 3416 bytes | prism/private/wslib/lib/fitting/Elbow45/1-0-6-15.spec |
| 2003-May-09 16:08:18 | 3415 bytes | prism/private/wslib/lib/fitting/Elbow45/1-0-7-0.spec |
| 2003-Jun-20 15:20:04 | 3445 bytes | prism/private/wslib/lib/fitting/Elbow45/1-0-7-1.spec |
| 2003-Oct-22 12:20:36 | 210 bytes | prism/private/wslib/lib/fitting/Elbow45/1-0-7-10.spec |
| 2003-Nov-11 18:29:52 | 210 bytes | prism/private/wslib/lib/fitting/Elbow45/1-0-7-11.spec |
| 2003-Dec-18 14:01:22 | 210 bytes | prism/private/wslib/lib/fitting/Elbow45/1-0-7-12.spec |
| 2003-Dec-30 13:42:48 | 210 bytes | prism/private/wslib/lib/fitting/Elbow45/1-0-7-13.spec |
| 2004-Feb-10 16:23:22 | 210 bytes | prism/private/wslib/lib/fitting/Elbow45/1-0-7-14.spec |
| 2004-Mar-10 19:09:42 | 210 bytes | prism/private/wslib/lib/fitting/Elbow45/1-0-7-15.spec |
| 2004-May-19 16:55:40 | 210 bytes | prism/private/wslib/lib/fitting/Elbow45/1-0-7-16.spec |
| 2004-May-20 20:35:40 | 210 bytes | prism/private/wslib/lib/fitting/Elbow45/1-0-7-17.spec |
| 2004-Jun-22 22:24:10 | 210 bytes | prism/private/wslib/lib/fitting/Elbow45/1-0-7-18.spec |
| 2004-Jul-13 21:59:22 | 210 bytes | prism/private/wslib/lib/fitting/Elbow45/1-0-7-19.spec |
| 2003-Jun-20 16:06:34 | 209 bytes | prism/private/wslib/lib/fitting/Elbow45/1-0-7-2.spec |
| 2004-Jul-16 16:44:40 | 210 bytes | prism/private/wslib/lib/fitting/Elbow45/1-0-7-20.spec |
| 2004-Jul-22 10:14:40 | 210 bytes | prism/private/wslib/lib/fitting/Elbow45/1-0-7-21.spec |
| 2004-Aug-17 15:29:48 | 210 bytes | prism/private/wslib/lib/fitting/Elbow45/1-0-7-22.spec |
| 2004-Aug-22 22:24:46 | 210 bytes | prism/private/wslib/lib/fitting/Elbow45/1-0-7-23.spec |
| 2004-Aug-23 22:46:58 | 210 bytes | prism/private/wslib/lib/fitting/Elbow45/1-0-7-24.spec |
| 2004-Aug-29 16:25:32 | 210 bytes | prism/private/wslib/lib/fitting/Elbow45/1-0-7-25.spec |
| 2004-Oct-15 10:25:38 | 210 bytes | prism/private/wslib/lib/fitting/Elbow45/1-0-7-26.spec |
| 2004-Oct-25 20:32:44 | 210 bytes | prism/private/wslib/lib/fitting/Elbow45/1-0-7-27.spec |
| 2004-Nov-11 10:48:10 | 210 bytes | prism/private/wslib/lib/fitting/Elbow45/1-0-7-28.spec |
| 2003-Jun-29 05:49:54 | 209 bytes | prism/private/wslib/lib/fitting/Elbow45/1-0-7-3.spec |
| 2003-Jul-09 16:05:22 | 209 bytes | prism/private/wslib/lib/fitting/Elbow45/1-0-7-4.spec |
| 2003-Jul-18 10:25:40 | 209 bytes | prism/private/wslib/lib/fitting/Elbow45/1-0-7-5.spec |
| 2003-Aug-07 15:44:02 | 209 bytes | prism/private/wslib/lib/fitting/Elbow45/1-0-7-6.spec |
| 2003-Aug-13 11:23:36 | 209 bytes | prism/private/wslib/lib/fitting/Elbow45/1-0-7-7.spec |
| 2003-Oct-12 11:01:04 | 209 bytes | prism/private/wslib/lib/fitting/Elbow45/1-0-7-8.spec |
| 2003-Oct-15 08:27:18 | 209 bytes | prism/private/wslib/lib/fitting/Elbow45/1-0-7-9.spec |
| 2004-Dec-13 10:28:32 | 850 bytes | prism/private/wslib/lib/fitting/Elbow45T |
| 2003-Oct-22 12:20:36 | 220 bytes | prism/private/wslib/lib/fitting/Elbow45T/1-0-7-10.spec |

| | | |
|---|---|---|
| 2003-Nov-11 18:29:52 | 220 bytes | prism/private/wslib/lib/fitting/Elbow45T/1-0-7-11.spec |
| 2003-Dec-18 14:01:22 | 220 bytes | prism/private/wslib/lib/fitting/Elbow45T/1-0-7-12.spec |
| 2003-Dec-30 13:42:48 | 220 bytes | prism/private/wslib/lib/fitting/Elbow45T/1-0-7-13.spec |
| 2004-Feb-10 16:23:22 | 220 bytes | prism/private/wslib/lib/fitting/Elbow45T/1-0-7-14.spec |
| 2004-Mar-10 19:09:42 | 220 bytes | prism/private/wslib/lib/fitting/Elbow45T/1-0-7-15.spec |
| 2004-May-19 16:55:40 | 220 bytes | prism/private/wslib/lib/fitting/Elbow45T/1-0-7-16.spec |
| 2004-May-20 20:35:40 | 220 bytes | prism/private/wslib/lib/fitting/Elbow45T/1-0-7-17.spec |
| 2004-Jun-22 22:24:10 | 220 bytes | prism/private/wslib/lib/fitting/Elbow45T/1-0-7-18.spec |
| 2004-Jul-13 21:59:22 | 220 bytes | prism/private/wslib/lib/fitting/Elbow45T/1-0-7-19.spec |
| 2004-Jul-16 16:44:40 | 220 bytes | prism/private/wslib/lib/fitting/Elbow45T/1-0-7-20.spec |
| 2004-Jul-22 10:14:40 | 220 bytes | prism/private/wslib/lib/fitting/Elbow45T/1-0-7-21.spec |
| 2004-Aug-17 15:29:48 | 220 bytes | prism/private/wslib/lib/fitting/Elbow45T/1-0-7-22.spec |
| 2004-Aug-22 22:24:46 | 220 bytes | prism/private/wslib/lib/fitting/Elbow45T/1-0-7-23.spec |
| 2004-Aug-23 22:46:58 | 220 bytes | prism/private/wslib/lib/fitting/Elbow45T/1-0-7-24.spec |
| 2004-Aug-29 16:25:32 | 220 bytes | prism/private/wslib/lib/fitting/Elbow45T/1-0-7-25.spec |
| 2004-Oct-15 10:25:38 | 220 bytes | prism/private/wslib/lib/fitting/Elbow45T/1-0-7-26.spec |
| 2004-Oct-25 20:32:44 | 220 bytes | prism/private/wslib/lib/fitting/Elbow45T/1-0-7-27.spec |
| 2004-Nov-11 10:48:10 | 220 bytes | prism/private/wslib/lib/fitting/Elbow45T/1-0-7-28.spec |
| 2003-Sep-05 18:12:08 | 219 bytes | prism/private/wslib/lib/fitting/Elbow45T/1-0-7-6.spec |
| 2003-Sep-24 13:29:52 | 219 bytes | prism/private/wslib/lib/fitting/Elbow45T/1-0-7-7.spec |
| 2003-Oct-12 11:01:04 | 219 bytes | prism/private/wslib/lib/fitting/Elbow45T/1-0-7-8.spec |
| 2003-Oct-15 08:27:18 | 219 bytes | prism/private/wslib/lib/fitting/Elbow45T/1-0-7-9.spec |
| 2004-Dec-13 10:28:32 | 1088 bytes | prism/private/wslib/lib/fitting/Elbow90 |
| 2003-Apr-27 14:15:54 | 3410 bytes | prism/private/wslib/lib/fitting/Elbow90/1-0-6-15.spec |
| 2003-May-09 16:08:18 | 3409 bytes | prism/private/wslib/lib/fitting/Elbow90/1-0-7-0.spec |
| 2003-Jun-20 15:20:12 | 3439 bytes | prism/private/wslib/lib/fitting/Elbow90/1-0-7-1.spec |
| 2003-Oct-22 12:20:36 | 218 bytes | prism/private/wslib/lib/fitting/Elbow90/1-0-7-10.spec |
| 2003-Nov-11 18:29:52 | 218 bytes | prism/private/wslib/lib/fitting/Elbow90/1-0-7-11.spec |
| 2003-Dec-18 14:01:22 | 218 bytes | prism/private/wslib/lib/fitting/Elbow90/1-0-7-12.spec |
| 2003-Dec-30 13:42:48 | 218 bytes | prism/private/wslib/lib/fitting/Elbow90/1-0-7-13.spec |
| 2004-Feb-10 16:23:22 | 218 bytes | prism/private/wslib/lib/fitting/Elbow90/1-0-7-14.spec |
| 2004-Mar-10 19:09:42 | 218 bytes | prism/private/wslib/lib/fitting/Elbow90/1-0-7-15.spec |
| 2004-May-19 16:55:40 | 218 bytes | prism/private/wslib/lib/fitting/Elbow90/1-0-7-16.spec |
| 2004-May-20 20:35:40 | 218 bytes | prism/private/wslib/lib/fitting/Elbow90/1-0-7-17.spec |
| 2004-Jun-22 22:24:12 | 218 bytes | prism/private/wslib/lib/fitting/Elbow90/1-0-7-18.spec |
| 2004-Jul-13 21:59:22 | 218 bytes | prism/private/wslib/lib/fitting/Elbow90/1-0-7-19.spec |
| 2003-Jun-20 16:07:12 | 217 bytes | prism/private/wslib/lib/fitting/Elbow90/1-0-7-2.spec |
| 2004-Jul-16 16:44:40 | 218 bytes | prism/private/wslib/lib/fitting/Elbow90/1-0-7-20.spec |
| 2004-Jul-22 10:14:40 | 218 bytes | prism/private/wslib/lib/fitting/Elbow90/1-0-7-21.spec |
| 2004-Aug-17 15:29:48 | 218 bytes | prism/private/wslib/lib/fitting/Elbow90/1-0-7-22.spec |
| 2004-Aug-22 22:24:46 | 218 bytes | prism/private/wslib/lib/fitting/Elbow90/1-0-7-23.spec |
| 2004-Aug-23 22:46:58 | 218 bytes | prism/private/wslib/lib/fitting/Elbow90/1-0-7-24.spec |
| 2004-Aug-29 16:25:32 | 218 bytes | prism/private/wslib/lib/fitting/Elbow90/1-0-7-25.spec |
| 2004-Oct-15 10:25:38 | 218 bytes | prism/private/wslib/lib/fitting/Elbow90/1-0-7-26.spec |
| 2004-Oct-25 20:32:44 | 218 bytes | prism/private/wslib/lib/fitting/Elbow90/1-0-7-27.spec |
| 2004-Nov-11 10:48:10 | 218 bytes | prism/private/wslib/lib/fitting/Elbow90/1-0-7-28.spec |
| 2003-Jun-29 05:49:54 | 217 bytes | prism/private/wslib/lib/fitting/Elbow90/1-0-7-3.spec |
| 2003-Jul-09 16:05:22 | 217 bytes | prism/private/wslib/lib/fitting/Elbow90/1-0-7-4.spec |
| 2003-Jul-18 10:25:40 | 217 bytes | prism/private/wslib/lib/fitting/Elbow90/1-0-7-5.spec |
| 2003-Aug-07 15:44:02 | 217 bytes | prism/private/wslib/lib/fitting/Elbow90/1-0-7-6.spec |
| 2003-Aug-13 11:23:36 | 217 bytes | prism/private/wslib/lib/fitting/Elbow90/1-0-7-7.spec |
| 2003-Oct-12 11:01:04 | 217 bytes | prism/private/wslib/lib/fitting/Elbow90/1-0-7-8.spec |
| 2003-Oct-15 08:27:18 | 217 bytes | prism/private/wslib/lib/fitting/Elbow90/1-0-7-9.spec |
| 2004-Dec-13 10:28:32 | 1088 bytes | prism/private/wslib/lib/fitting/Elbow90L |
| 2003-Apr-27 14:15:54 | 3410 bytes | prism/private/wslib/lib/fitting/Elbow90L/1-0-6-15.spec |
| 2003-May-09 16:08:18 | 3409 bytes | prism/private/wslib/lib/fitting/Elbow90L/1-0-7-0.spec |
| 2003-Jun-20 15:20:28 | 3439 bytes | prism/private/wslib/lib/fitting/Elbow90L/1-0-7-1.spec |
| 2003-Oct-22 12:20:36 | 217 bytes | prism/private/wslib/lib/fitting/Elbow90L/1-0-7-10.spec |
| 2003-Nov-11 18:29:52 | 217 bytes | prism/private/wslib/lib/fitting/Elbow90L/1-0-7-11.spec |
| 2003-Dec-18 14:01:22 | 217 bytes | prism/private/wslib/lib/fitting/Elbow90L/1-0-7-12.spec |
| 2003-Dec-30 13:42:48 | 217 bytes | prism/private/wslib/lib/fitting/Elbow90L/1-0-7-13.spec |

| | | |
|---|---|---|
| 2004-Feb-10 16:23:22 | 217 bytes | prism/private/wslib/lib/fitting/Elbow90L/1-0-7-14.spec |
| 2004-Mar-10 19:09:42 | 217 bytes | prism/private/wslib/lib/fitting/Elbow90L/1-0-7-15.spec |
| 2004-May-19 16:55:40 | 217 bytes | prism/private/wslib/lib/fitting/Elbow90L/1-0-7-16.spec |
| 2004-May-20 20:35:40 | 217 bytes | prism/private/wslib/lib/fitting/Elbow90L/1-0-7-17.spec |
| 2004-Jun-22 22:24:12 | 217 bytes | prism/private/wslib/lib/fitting/Elbow90L/1-0-7-18.spec |
| 2004-Jul-13 21:59:22 | 217 bytes | prism/private/wslib/lib/fitting/Elbow90L/1-0-7-19.spec |
| 2003-Jun-20 16:07:26 | 216 bytes | prism/private/wslib/lib/fitting/Elbow90L/1-0-7-2.spec |
| 2004-Jul-16 16:44:40 | 217 bytes | prism/private/wslib/lib/fitting/Elbow90L/1-0-7-20.spec |
| 2004-Jul-22 10:14:40 | 217 bytes | prism/private/wslib/lib/fitting/Elbow90L/1-0-7-21.spec |
| 2004-Aug-17 15:29:48 | 217 bytes | prism/private/wslib/lib/fitting/Elbow90L/1-0-7-22.spec |
| 2004-Aug-22 22:24:46 | 217 bytes | prism/private/wslib/lib/fitting/Elbow90L/1-0-7-23.spec |
| 2004-Aug-23 22:46:58 | 217 bytes | prism/private/wslib/lib/fitting/Elbow90L/1-0-7-24.spec |
| 2004-Aug-29 16:25:32 | 217 bytes | prism/private/wslib/lib/fitting/Elbow90L/1-0-7-25.spec |
| 2004-Oct-15 10:25:38 | 217 bytes | prism/private/wslib/lib/fitting/Elbow90L/1-0-7-26.spec |
| 2004-Oct-25 20:32:44 | 217 bytes | prism/private/wslib/lib/fitting/Elbow90L/1-0-7-27.spec |
| 2004-Nov-11 10:48:10 | 217 bytes | prism/private/wslib/lib/fitting/Elbow90L/1-0-7-28.spec |
| 2003-Jun-29 05:49:54 | 216 bytes | prism/private/wslib/lib/fitting/Elbow90L/1-0-7-3.spec |
| 2003-Jul-09 16:05:22 | 216 bytes | prism/private/wslib/lib/fitting/Elbow90L/1-0-7-4.spec |
| 2003-Jul-18 10:25:40 | 216 bytes | prism/private/wslib/lib/fitting/Elbow90L/1-0-7-5.spec |
| 2003-Aug-07 15:44:02 | 216 bytes | prism/private/wslib/lib/fitting/Elbow90L/1-0-7-6.spec |
| 2003-Aug-13 11:23:36 | 216 bytes | prism/private/wslib/lib/fitting/Elbow90L/1-0-7-7.spec |
| 2003-Oct-12 11:01:04 | 216 bytes | prism/private/wslib/lib/fitting/Elbow90L/1-0-7-8.spec |
| 2003-Oct-15 08:27:18 | 216 bytes | prism/private/wslib/lib/fitting/Elbow90L/1-0-7-9.spec |
| 2004-Dec-13 10:28:32 | 850 bytes | prism/private/wslib/lib/fitting/Elbow90T |
| 2003-Oct-22 12:20:36 | 219 bytes | prism/private/wslib/lib/fitting/Elbow90T/1-0-7-10.spec |
| 2003-Nov-11 18:29:52 | 219 bytes | prism/private/wslib/lib/fitting/Elbow90T/1-0-7-11.spec |
| 2003-Dec-18 14:01:22 | 219 bytes | prism/private/wslib/lib/fitting/Elbow90T/1-0-7-12.spec |
| 2003-Dec-30 13:42:48 | 219 bytes | prism/private/wslib/lib/fitting/Elbow90T/1-0-7-13.spec |
| 2004-Feb-10 16:23:22 | 219 bytes | prism/private/wslib/lib/fitting/Elbow90T/1-0-7-14.spec |
| 2004-Mar-10 19:09:42 | 219 bytes | prism/private/wslib/lib/fitting/Elbow90T/1-0-7-15.spec |
| 2004-May-19 16:55:40 | 219 bytes | prism/private/wslib/lib/fitting/Elbow90T/1-0-7-16.spec |
| 2004-May-20 20:35:40 | 219 bytes | prism/private/wslib/lib/fitting/Elbow90T/1-0-7-17.spec |
| 2004-Jun-22 22:24:12 | 219 bytes | prism/private/wslib/lib/fitting/Elbow90T/1-0-7-18.spec |
| 2004-Jul-13 21:59:22 | 219 bytes | prism/private/wslib/lib/fitting/Elbow90T/1-0-7-19.spec |
| 2004-Jul-16 16:44:40 | 219 bytes | prism/private/wslib/lib/fitting/Elbow90T/1-0-7-20.spec |
| 2004-Jul-22 10:14:40 | 219 bytes | prism/private/wslib/lib/fitting/Elbow90T/1-0-7-21.spec |
| 2004-Aug-17 15:29:48 | 219 bytes | prism/private/wslib/lib/fitting/Elbow90T/1-0-7-22.spec |
| 2004-Aug-22 22:24:46 | 219 bytes | prism/private/wslib/lib/fitting/Elbow90T/1-0-7-23.spec |
| 2004-Aug-23 22:46:58 | 219 bytes | prism/private/wslib/lib/fitting/Elbow90T/1-0-7-24.spec |
| 2004-Aug-29 16:25:32 | 219 bytes | prism/private/wslib/lib/fitting/Elbow90T/1-0-7-25.spec |
| 2004-Oct-15 10:25:38 | 219 bytes | prism/private/wslib/lib/fitting/Elbow90T/1-0-7-26.spec |
| 2004-Oct-25 20:32:44 | 219 bytes | prism/private/wslib/lib/fitting/Elbow90T/1-0-7-27.spec |
| 2004-Nov-11 10:48:10 | 219 bytes | prism/private/wslib/lib/fitting/Elbow90T/1-0-7-28.spec |
| 2003-Sep-05 18:12:20 | 218 bytes | prism/private/wslib/lib/fitting/Elbow90T/1-0-7-6.spec |
| 2003-Sep-24 13:30:12 | 218 bytes | prism/private/wslib/lib/fitting/Elbow90T/1-0-7-7.spec |
| 2003-Oct-12 11:01:04 | 218 bytes | prism/private/wslib/lib/fitting/Elbow90T/1-0-7-8.spec |
| 2003-Oct-15 08:27:18 | 218 bytes | prism/private/wslib/lib/fitting/Elbow90T/1-0-7-9.spec |
| 2004-Dec-13 10:28:32 | 1088 bytes | prism/private/wslib/lib/fitting/Enter |
| 2003-Apr-27 14:15:54 | 3402 bytes | prism/private/wslib/lib/fitting/Enter/1-0-6-15.spec |
| 2003-May-09 16:08:18 | 3401 bytes | prism/private/wslib/lib/fitting/Enter/1-0-7-0.spec |
| 2003-Jun-20 15:20:34 | 3431 bytes | prism/private/wslib/lib/fitting/Enter/1-0-7-1.spec |
| 2003-Oct-22 12:20:36 | 219 bytes | prism/private/wslib/lib/fitting/Enter/1-0-7-10.spec |
| 2003-Nov-11 18:29:52 | 219 bytes | prism/private/wslib/lib/fitting/Enter/1-0-7-11.spec |
| 2003-Dec-18 14:01:22 | 219 bytes | prism/private/wslib/lib/fitting/Enter/1-0-7-12.spec |
| 2003-Dec-30 13:42:48 | 219 bytes | prism/private/wslib/lib/fitting/Enter/1-0-7-13.spec |
| 2004-Feb-10 16:23:22 | 219 bytes | prism/private/wslib/lib/fitting/Enter/1-0-7-14.spec |
| 2004-Mar-10 19:09:42 | 219 bytes | prism/private/wslib/lib/fitting/Enter/1-0-7-15.spec |
| 2004-May-19 16:55:40 | 219 bytes | prism/private/wslib/lib/fitting/Enter/1-0-7-16.spec |
| 2004-May-20 20:35:40 | 219 bytes | prism/private/wslib/lib/fitting/Enter/1-0-7-17.spec |
| 2004-Jun-22 22:24:12 | 219 bytes | prism/private/wslib/lib/fitting/Enter/1-0-7-18.spec |
| 2004-Jul-13 21:59:22 | 219 bytes | prism/private/wslib/lib/fitting/Enter/1-0-7-19.spec |

2003-Jun-20 16:41:50 218 bytes prism/private/wslib/lib/fitting/Enter/1-0-7-2.spec
2004-Jul-16 16:44:40 219 bytes prism/private/wslib/lib/fitting/Enter/1-0-7-20.spec
2004-Jul-22 10:14:40 219 bytes prism/private/wslib/lib/fitting/Enter/1-0-7-21.spec
2004-Aug-17 15:29:48 219 bytes prism/private/wslib/lib/fitting/Enter/1-0-7-22.spec
2004-Aug-22 22:24:46 219 bytes prism/private/wslib/lib/fitting/Enter/1-0-7-23.spec
2004-Aug-23 22:46:58 219 bytes prism/private/wslib/lib/fitting/Enter/1-0-7-24.spec
2004-Aug-29 16:25:32 219 bytes prism/private/wslib/lib/fitting/Enter/1-0-7-25.spec
2004-Oct-15 10:25:38 219 bytes prism/private/wslib/lib/fitting/Enter/1-0-7-26.spec
2004-Oct-25 20:32:44 219 bytes prism/private/wslib/lib/fitting/Enter/1-0-7-27.spec
2004-Nov-11 10:48:10 219 bytes prism/private/wslib/lib/fitting/Enter/1-0-7-28.spec
2003-Jun-29 05:49:54 218 bytes prism/private/wslib/lib/fitting/Enter/1-0-7-3.spec
2003-Jul-09 16:05:22 218 bytes prism/private/wslib/lib/fitting/Enter/1-0-7-4.spec
2003-Jul-18 10:25:40 218 bytes prism/private/wslib/lib/fitting/Enter/1-0-7-5.spec
2003-Aug-07 15:44:02 218 bytes prism/private/wslib/lib/fitting/Enter/1-0-7-6.spec
2003-Aug-13 11:23:36 218 bytes prism/private/wslib/lib/fitting/Enter/1-0-7-7.spec
2003-Oct-12 11:01:04 218 bytes prism/private/wslib/lib/fitting/Enter/1-0-7-8.spec
2003-Oct-15 08:27:18 218 bytes prism/private/wslib/lib/fitting/Enter/1-0-7-9.spec
2004-Dec-13 10:28:32 1088 bytes prism/private/wslib/lib/fitting/Exit
2003-Apr-27 14:15:54 3386 bytes prism/private/wslib/lib/fitting/Exit/1-0-6-15.spec
2003-May-09 16:08:18 3385 bytes prism/private/wslib/lib/fitting/Exit/1-0-7-0.spec
2003-Jun-20 15:20:38 3415 bytes prism/private/wslib/lib/fitting/Exit/1-0-7-1.spec
2003-Oct-22 12:20:36 214 bytes prism/private/wslib/lib/fitting/Exit/1-0-7-10.spec
2003-Nov-11 18:29:52 214 bytes prism/private/wslib/lib/fitting/Exit/1-0-7-11.spec
2003-Dec-18 14:01:22 214 bytes prism/private/wslib/lib/fitting/Exit/1-0-7-12.spec
2003-Dec-30 13:42:48 214 bytes prism/private/wslib/lib/fitting/Exit/1-0-7-13.spec
2004-Feb-10 16:23:22 214 bytes prism/private/wslib/lib/fitting/Exit/1-0-7-14.spec
2004-Mar-10 19:09:42 214 bytes prism/private/wslib/lib/fitting/Exit/1-0-7-15.spec
2004-May-19 16:55:40 214 bytes prism/private/wslib/lib/fitting/Exit/1-0-7-16.spec
2004-May-20 20:35:40 214 bytes prism/private/wslib/lib/fitting/Exit/1-0-7-17.spec
2004-Jun-22 22:24:12 214 bytes prism/private/wslib/lib/fitting/Exit/1-0-7-18.spec
2004-Jul-13 21:59:22 214 bytes prism/private/wslib/lib/fitting/Exit/1-0-7-19.spec
2003-Jun-20 16:42:06 213 bytes prism/private/wslib/lib/fitting/Exit/1-0-7-2.spec
2004-Jul-16 16:44:40 214 bytes prism/private/wslib/lib/fitting/Exit/1-0-7-20.spec
2004-Jul-22 10:14:40 214 bytes prism/private/wslib/lib/fitting/Exit/1-0-7-21.spec
2004-Aug-17 15:29:48 214 bytes prism/private/wslib/lib/fitting/Exit/1-0-7-22.spec
2004-Aug-22 22:24:46 214 bytes prism/private/wslib/lib/fitting/Exit/1-0-7-23.spec
2004-Aug-23 22:46:58 214 bytes prism/private/wslib/lib/fitting/Exit/1-0-7-24.spec
2004-Aug-29 16:25:32 214 bytes prism/private/wslib/lib/fitting/Exit/1-0-7-25.spec
2004-Oct-15 10:25:38 214 bytes prism/private/wslib/lib/fitting/Exit/1-0-7-26.spec
2004-Oct-25 20:32:44 214 bytes prism/private/wslib/lib/fitting/Exit/1-0-7-27.spec
2004-Nov-11 10:48:10 214 bytes prism/private/wslib/lib/fitting/Exit/1-0-7-28.spec
2003-Jun-29 05:49:54 213 bytes prism/private/wslib/lib/fitting/Exit/1-0-7-3.spec
2003-Jul-09 16:05:22 213 bytes prism/private/wslib/lib/fitting/Exit/1-0-7-4.spec
2003-Jul-18 10:25:40 213 bytes prism/private/wslib/lib/fitting/Exit/1-0-7-5.spec
2003-Aug-07 15:44:02 213 bytes prism/private/wslib/lib/fitting/Exit/1-0-7-6.spec
2003-Aug-13 11:23:36 213 bytes prism/private/wslib/lib/fitting/Exit/1-0-7-7.spec
2003-Oct-12 11:01:04 213 bytes prism/private/wslib/lib/fitting/Exit/1-0-7-8.spec
2003-Oct-15 08:27:18 213 bytes prism/private/wslib/lib/fitting/Exit/1-0-7-9.spec
2004-Dec-13 10:28:32 1088 bytes prism/private/wslib/lib/fitting/Expand
2003-Apr-27 14:15:54 3397 bytes prism/private/wslib/lib/fitting/Expand/1-0-6-15.spec
2003-May-09 16:08:18 3396 bytes prism/private/wslib/lib/fitting/Expand/1-0-7-0.spec
2003-Jun-20 15:20:44 3426 bytes prism/private/wslib/lib/fitting/Expand/1-0-7-1.spec
2003-Oct-22 12:20:36 208 bytes prism/private/wslib/lib/fitting/Expand/1-0-7-10.spec
2003-Nov-11 18:29:52 208 bytes prism/private/wslib/lib/fitting/Expand/1-0-7-11.spec
2003-Dec-18 14:01:22 208 bytes prism/private/wslib/lib/fitting/Expand/1-0-7-12.spec
2003-Dec-30 13:42:48 208 bytes prism/private/wslib/lib/fitting/Expand/1-0-7-13.spec
2004-Feb-10 16:23:22 208 bytes prism/private/wslib/lib/fitting/Expand/1-0-7-14.spec
2004-Mar-10 19:09:42 208 bytes prism/private/wslib/lib/fitting/Expand/1-0-7-15.spec
2004-May-19 16:55:40 208 bytes prism/private/wslib/lib/fitting/Expand/1-0-7-16.spec
2004-May-20 20:35:40 208 bytes prism/private/wslib/lib/fitting/Expand/1-0-7-17.spec
2004-Jun-22 22:24:12 208 bytes prism/private/wslib/lib/fitting/Expand/1-0-7-18.spec 2004-Jul-13 21:59:22 208 bytes prism/private/wslib/lib/fitting/Expand/1-0-7-19.spec
2003-Jun-20 16:11:08 207 bytes prism/private/wslib/lib/fitting/Expand/1-0-7-2.spec
2004-Jul-16 16:44:40 208 bytes prism/private/wslib/lib/fitting/Expand/1-0-7-20.spec
2004-Jul-22 10:14:40 208 bytes prism/private/wslib/lib/fitting/Expand/1-0-7-21.spec
2004-Aug-17 15:29:48 208 bytes prism/private/wslib/lib/fitting/Expand/1-0-7-22.spec
2004-Aug-22 22:24:46 208 bytes prism/private/wslib/lib/fitting/Expand/1-0-7-23.spec
2004-Aug-23 22:46:58 208 bytes prism/private/wslib/lib/fitting/Expand/1-0-7-24.spec
2004-Aug-29 16:25:32 208 bytes prism/private/wslib/lib/fitting/Expand/1-0-7-25.spec
2004-Oct-15 10:25:38 208 bytes prism/private/wslib/lib/fitting/Expand/1-0-7-26.spec
2004-Oct-25 20:32:44 208 bytes prism/private/wslib/lib/fitting/Expand/1-0-7-27.spec
2004-Nov-11 10:48:10 208 bytes prism/private/wslib/lib/fitting/Expand/1-0-7-28.spec
2003-Jun-29 05:49:54 207 bytes prism/private/wslib/lib/fitting/Expand/1-0-7-3.spec
2003-Jul-09 16:05:22 207 bytes prism/private/wslib/lib/fitting/Expand/1-0-7-4.spec
2003-Jul-18 10:25:40 207 bytes prism/private/wslib/lib/fitting/Expand/1-0-7-5.spec
2003-Aug-07 15:44:02 207 bytes prism/private/wslib/lib/fitting/Expand/1-0-7-6.spec
2003-Aug-13 11:23:36 207 bytes prism/private/wslib/lib/fitting/Expand/1-0-7-7.spec
2003-Oct-12 11:01:04 207 bytes prism/private/wslib/lib/fitting/Expand/1-0-7-8.spec
2003-Oct-15 08:27:18 207 bytes prism/private/wslib/lib/fitting/Expand/1-0-7-9.spec
2004-Dec-13 10:28:32 986 bytes prism/private/wslib/lib/fitting/ExpandTeeSide
2003-Oct-22 12:20:36 243 bytes prism/private/wslib/lib/fitting/ExpandTeeSide/1-0-7-10.spec
2003-Nov-11 18:29:52 243 bytes prism/private/wslib/lib/fitting/ExpandTeeSide/1-0-7-11.spec
2003-Dec-18 14:01:22 243 bytes prism/private/wslib/lib/fitting/ExpandTeeSide/1-0-7-12.spec
2003-Dec-30 13:42:48 243 bytes prism/private/wslib/lib/fitting/ExpandTeeSide/1-0-7-13.spec
2004-Feb-10 16:23:22 243 bytes prism/private/wslib/lib/fitting/ExpandTeeSide/1-0-7-14.spec
2004-Mar-10 19:09:42 243 bytes prism/private/wslib/lib/fitting/ExpandTeeSide/1-0-7-15.spec
2004-May-19 16:55:40 243 bytes prism/private/wslib/lib/fitting/ExpandTeeSide/1-0-7-16.spec
2004-May-20 20:35:40 243 bytes prism/private/wslib/lib/fitting/ExpandTeeSide/1-0-7-17.spec
2004-Jun-22 22:24:12 243 bytes prism/private/wslib/lib/fitting/ExpandTeeSide/1-0-7-18.spec
2004-Jul-13 21:59:22 243 bytes prism/private/wslib/lib/fitting/ExpandTeeSide/1-0-7-19.spec
2003-Jun-20 16:25:50 242 bytes prism/private/wslib/lib/fitting/ExpandTeeSide/1-0-7-2.spec
2004-Jul-16 16:44:40 243 bytes prism/private/wslib/lib/fitting/ExpandTeeSide/1-0-7-20.spec
2004-Jul-22 10:14:40 243 bytes prism/private/wslib/lib/fitting/ExpandTeeSide/1-0-7-21.spec
2004-Aug-17 15:29:48 243 bytes prism/private/wslib/lib/fitting/ExpandTeeSide/1-0-7-22.spec
2004-Aug-22 22:24:46 243 bytes prism/private/wslib/lib/fitting/ExpandTeeSide/1-0-7-23.spec
2004-Aug-23 22:46:58 243 bytes prism/private/wslib/lib/fitting/ExpandTeeSide/1-0-7-24.spec
2004-Aug-29 16:25:32 243 bytes prism/private/wslib/lib/fitting/ExpandTeeSide/1-0-7-25.spec
2004-Oct-15 10:25:38 243 bytes prism/private/wslib/lib/fitting/ExpandTeeSide/1-0-7-26.spec
2004-Oct-25 20:32:44 243 bytes prism/private/wslib/lib/fitting/ExpandTeeSide/1-0-7-27.spec
2004-Nov-11 10:48:10 243 bytes prism/private/wslib/lib/fitting/ExpandTeeSide/1-0-7-28.spec
2003-Jun-29 05:49:54 242 bytes prism/private/wslib/lib/fitting/ExpandTeeSide/1-0-7-3.spec
2003-Jul-09 16:05:22 242 bytes prism/private/wslib/lib/fitting/ExpandTeeSide/1-0-7-4.spec
2003-Jul-18 10:25:40 242 bytes prism/private/wslib/lib/fitting/ExpandTeeSide/1-0-7-5.spec
2003-Aug-07 15:44:02 242 bytes prism/private/wslib/lib/fitting/ExpandTeeSide/1-0-7-6.spec
2003-Aug-13 11:23:36 242 bytes prism/private/wslib/lib/fitting/ExpandTeeSide/1-0-7-7.spec
2003-Oct-12 11:01:04 242 bytes prism/private/wslib/lib/fitting/ExpandTeeSide/1-0-7-8.spec
2003-Oct-15 08:27:18 242 bytes prism/private/wslib/lib/fitting/ExpandTeeSide/1-0-7-9.spec
2004-Dec-13 10:28:32 986 bytes prism/private/wslib/lib/fitting/ExpandTeeThrough
2003-Oct-22 12:20:36 238 bytes prism/private/wslib/lib/fitting/ExpandTeeThrough/1-0-7-10.spec
2003-Nov-11 18:29:52 238 bytes prism/private/wslib/lib/fitting/ExpandTeeThrough/1-0-7-11.spec
2003-Dec-18 14:01:22 238 bytes prism/private/wslib/lib/fitting/ExpandTeeThrough/1-0-7-12.spec
2003-Dec-30 13:42:48 238 bytes prism/private/wslib/lib/fitting/ExpandTeeThrough/1-0-7-13.spec
2004-Feb-10 16:23:22 238 bytes prism/private/wslib/lib/fitting/ExpandTeeThrough/1-0-7-14.spec
2004-Mar-10 19:09:42 238 bytes prism/private/wslib/lib/fitting/ExpandTeeThrough/1-0-7-15.spec
2004-May-19 16:55:40 238 bytes prism/private/wslib/lib/fitting/ExpandTeeThrough/1-0-7-16.spec
2004-May-20 20:35:40 238 bytes prism/private/wslib/lib/fitting/ExpandTeeThrough/1-0-7-17.spec
2004-Jun-22 22:24:12 238 bytes prism/private/wslib/lib/fitting/ExpandTeeThrough/1-0-7-18.spec
2004-Jul-13 21:59:22 238 bytes prism/private/wslib/lib/fitting/ExpandTeeThrough/1-0-7-19.spec
2003-Jun-20 16:12:06 237 bytes prism/private/wslib/lib/fitting/ExpandTeeThrough/1-0-7-2.spec
2004-Jul-16 16:44:40 238 bytes prism/private/wslib/lib/fitting/ExpandTeeThrough/1-0-7-20.spec
2004-Jul-22 10:14:40 238 bytes prism/private/wslib/lib/fitting/ExpandTeeThrough/1-0-7-21.spec
2004-Aug-17 15:29:48 238 bytes prism/private/wslib/lib/fitting/ExpandTeeThrough/1-0-7-22.spec 2004-Aug-22 22:24:46 238 bytes prism/private/wslib/lib/fitting/ExpandTeeThrough/1-0-7-23.spec
2004-Aug-23 22:46:58 238 bytes prism/private/wslib/lib/fitting/ExpandTeeThrough/1-0-7-24.spec
2004-Aug-29 16:25:32 238 bytes prism/private/wslib/lib/fitting/ExpandTeeThrough/1-0-7-25.spec
2004-Oct-15 10:25:38 238 bytes prism/private/wslib/lib/fitting/ExpandTeeThrough/1-0-7-26.spec
2004-Oct-25 20:32:44 238 bytes prism/private/wslib/lib/fitting/ExpandTeeThrough/1-0-7-27.spec
2004-Nov-11 10:48:10 238 bytes prism/private/wslib/lib/fitting/ExpandTeeThrough/1-0-7-28.spec
2003-Jun-29 05:49:54 237 bytes prism/private/wslib/lib/fitting/ExpandTeeThrough/1-0-7-3.spec
2003-Jul-09 16:05:22 237 bytes prism/private/wslib/lib/fitting/ExpandTeeThrough/1-0-7-4.spec
2003-Jul-18 10:25:40 237 bytes prism/private/wslib/lib/fitting/ExpandTeeThrough/1-0-7-5.spec
2003-Aug-07 15:44:02 237 bytes prism/private/wslib/lib/fitting/ExpandTeeThrough/1-0-7-6.spec
2003-Aug-13 11:23:36 237 bytes prism/private/wslib/lib/fitting/ExpandTeeThrough/1-0-7-7.spec
2003-Oct-12 11:01:04 237 bytes prism/private/wslib/lib/fitting/ExpandTeeThrough/1-0-7-8.spec
2003-Oct-15 08:27:18 237 bytes prism/private/wslib/lib/fitting/ExpandTeeThrough/1-0-7-9.spec
2004-Dec-13 10:28:32 1088 bytes prism/private/wslib/lib/fitting/GateValveFP
2003-Apr-27 14:15:54 3421 bytes prism/private/wslib/lib/fitting/GateValveFP/1-0-6-15.spec
2003-May-09 16:08:18 3420 bytes prism/private/wslib/lib/fitting/GateValveFP/1-0-7-0.spec
2003-Jun-20 15:20:48 3450 bytes prism/private/wslib/lib/fitting/GateValveFP/1-0-7-1.spec
2003-Oct-22 12:20:36 226 bytes prism/private/wslib/lib/fitting/GateValveFP/1-0-7-10.spec
2003-Nov-11 18:29:52 226 bytes prism/private/wslib/lib/fitting/GateValveFP/1-0-7-11.spec
2003-Dec-18 14:01:22 226 bytes prism/private/wslib/lib/fitting/GateValveFP/1-0-7-12.spec
2003-Dec-30 13:42:48 226 bytes prism/private/wslib/lib/fitting/GateValveFP/1-0-7-13.spec
2004-Feb-10 16:23:22 226 bytes prism/private/wslib/lib/fitting/GateValveFP/1-0-7-14.spec
2004-Mar-10 19:09:42 226 bytes prism/private/wslib/lib/fitting/GateValveFP/1-0-7-15.spec
2004-May-19 16:55:40 226 bytes prism/private/wslib/lib/fitting/GateValveFP/1-0-7-16.spec
2004-May-20 20:35:40 226 bytes prism/private/wslib/lib/fitting/GateValveFP/1-0-7-17.spec
2004-Jun-22 22:24:12 226 bytes prism/private/wslib/lib/fitting/GateValveFP/1-0-7-18.spec
2004-Jul-13 21:59:22 226 bytes prism/private/wslib/lib/fitting/GateValveFP/1-0-7-19.spec
2003-Jun-20 16:08:08 225 bytes prism/private/wslib/lib/fitting/GateValveFP/1-0-7-2.spec
2004-Jul-16 16:44:40 226 bytes prism/private/wslib/lib/fitting/GateValveFP/1-0-7-20.spec
2004-Jul-22 10:14:40 226 bytes prism/private/wslib/lib/fitting/GateValveFP/1-0-7-21.spec
2004-Aug-17 15:29:48 226 bytes prism/private/wslib/lib/fitting/GateValveFP/1-0-7-22.spec
2004-Aug-22 22:24:46 226 bytes prism/private/wslib/lib/fitting/GateValveFP/1-0-7-23.spec
2004-Aug-23 22:46:58 226 bytes prism/private/wslib/lib/fitting/GateValveFP/1-0-7-24.spec
2004-Aug-29 16:25:32 226 bytes prism/private/wslib/lib/fitting/GateValveFP/1-0-7-25.spec
2004-Oct-15 10:25:38 226 bytes prism/private/wslib/lib/fitting/GateValveFP/1-0-7-26.spec
2004-Oct-25 20:32:44 226 bytes prism/private/wslib/lib/fitting/GateValveFP/1-0-7-27.spec
2004-Nov-11 10:48:10 226 bytes prism/private/wslib/lib/fitting/GateValveFP/1-0-7-28.spec
2003-Jun-29 05:49:54 225 bytes prism/private/wslib/lib/fitting/GateValveFP/1-0-7-3.spec
2003-Jul-09 16:05:22 225 bytes prism/private/wslib/lib/fitting/GateValveFP/1-0-7-4.spec
2003-Jul-18 10:25:40 225 bytes prism/private/wslib/lib/fitting/GateValveFP/1-0-7-5.spec
2003-Aug-07 15:44:02 225 bytes prism/private/wslib/lib/fitting/GateValveFP/1-0-7-6.spec
2003-Aug-13 11:23:36 225 bytes prism/private/wslib/lib/fitting/GateValveFP/1-0-7-7.spec
2003-Oct-12 11:01:04 225 bytes prism/private/wslib/lib/fitting/GateValveFP/1-0-7-8.spec
2003-Oct-15 08:27:18 225 bytes prism/private/wslib/lib/fitting/GateValveFP/1-0-7-9.spec
2004-Dec-13 10:28:32 1088 bytes prism/private/wslib/lib/fitting/LiftCheck
2003-Apr-27 14:15:54 3405 bytes prism/private/wslib/lib/fitting/LiftCheck/1-0-6-15.spec
2003-May-09 16:08:18 3404 bytes prism/private/wslib/lib/fitting/LiftCheck/1-0-7-0.spec
2003-Jun-20 15:20:52 3434 bytes prism/private/wslib/lib/fitting/LiftCheck/1-0-7-1.spec
2003-Oct-22 12:20:36 212 bytes prism/private/wslib/lib/fitting/LiftCheck/1-0-7-10.spec
2003-Nov-11 18:29:52 212 bytes prism/private/wslib/lib/fitting/LiftCheck/1-0-7-11.spec
2003-Dec-18 14:01:22 212 bytes prism/private/wslib/lib/fitting/LiftCheck/1-0-7-12.spec
2003-Dec-30 13:42:48 212 bytes prism/private/wslib/lib/fitting/LiftCheck/1-0-7-13.spec
2004-Feb-10 16:23:22 212 bytes prism/private/wslib/lib/fitting/LiftCheck/1-0-7-14.spec
2004-Mar-10 19:09:42 212 bytes prism/private/wslib/lib/fitting/LiftCheck/1-0-7-15.spec
2004-May-19 16:55:40 212 bytes prism/private/wslib/lib/fitting/LiftCheck/1-0-7-16.spec
2004-May-20 20:35:40 212 bytes prism/private/wslib/lib/fitting/LiftCheck/1-0-7-17.spec
2004-Jun-22 22:24:12 212 bytes prism/private/wslib/lib/fitting/LiftCheck/1-0-7-18.spec
2004-Jul-13 21:59:22 212 bytes prism/private/wslib/lib/fitting/LiftCheck/1-0-7-19.spec
2003-Jun-20 16:08:14 211 bytes prism/private/wslib/lib/fitting/LiftCheck/1-0-7-2.spec
2004-Jul-16 16:44:40 212 bytes prism/private/wslib/lib/fitting/LiftCheck/1-0-7-20.spec
2004-Jul-22 10:14:40 212 bytes prism/private/wslib/lib/fitting/LiftCheck/1-0-7-21.spec 2004-Aug-17 15:29:48 212 bytes prism/private/wslib/lib/fitting/LiftCheck/1-0-7-22.spec
2004-Aug-22 22:24:46 212 bytes prism/private/wslib/lib/fitting/LiftCheck/1-0-7-23.spec
2004-Aug-23 22:46:58 212 bytes prism/private/wslib/lib/fitting/LiftCheck/1-0-7-24.spec
2004-Aug-29 16:25:32 212 bytes prism/private/wslib/lib/fitting/LiftCheck/1-0-7-25.spec
2004-Oct-15 10:25:38 212 bytes prism/private/wslib/lib/fitting/LiftCheck/1-0-7-26.spec
2004-Oct-25 20:32:44 212 bytes prism/private/wslib/lib/fitting/LiftCheck/1-0-7-27.spec
2004-Nov-11 10:48:10 212 bytes prism/private/wslib/lib/fitting/LiftCheck/1-0-7-28.spec
2003-Jun-29 05:49:54 211 bytes prism/private/wslib/lib/fitting/LiftCheck/1-0-7-3.spec
2003-Jul-09 16:05:22 211 bytes prism/private/wslib/lib/fitting/LiftCheck/1-0-7-4.spec
2003-Jul-18 10:25:40 211 bytes prism/private/wslib/lib/fitting/LiftCheck/1-0-7-5.spec
2003-Aug-07 15:44:02 211 bytes prism/private/wslib/lib/fitting/LiftCheck/1-0-7-6.spec
2003-Aug-13 11:23:36 211 bytes prism/private/wslib/lib/fitting/LiftCheck/1-0-7-7.spec
2003-Oct-12 11:01:04 211 bytes prism/private/wslib/lib/fitting/LiftCheck/1-0-7-8.spec
2003-Oct-15 08:27:18 211 bytes prism/private/wslib/lib/fitting/LiftCheck/1-0-7-9.spec
2004-Dec-13 10:28:33 1088 bytes prism/private/wslib/lib/fitting/Pipe
2003-Apr-27 14:15:54 3341 bytes prism/private/wslib/lib/fitting/Pipe/1-0-6-15.spec
2003-May-09 16:08:18 3340 bytes prism/private/wslib/lib/fitting/Pipe/1-0-7-0.spec
2003-Jun-20 15:20:56 3370 bytes prism/private/wslib/lib/fitting/Pipe/1-0-7-1.spec
2003-Oct-22 12:20:36 190 bytes prism/private/wslib/lib/fitting/Pipe/1-0-7-10.spec
2003-Nov-11 18:29:52 190 bytes prism/private/wslib/lib/fitting/Pipe/1-0-7-11.spec
2003-Dec-18 14:01:22 190 bytes prism/private/wslib/lib/fitting/Pipe/1-0-7-12.spec
2003-Dec-30 13:42:48 190 bytes prism/private/wslib/lib/fitting/Pipe/1-0-7-13.spec
2004-Feb-10 16:23:22 190 bytes prism/private/wslib/lib/fitting/Pipe/1-0-7-14.spec
2004-Mar-10 19:09:42 190 bytes prism/private/wslib/lib/fitting/Pipe/1-0-7-15.spec
2004-May-19 16:55:40 190 bytes prism/private/wslib/lib/fitting/Pipe/1-0-7-16.spec
2004-May-20 20:35:40 190 bytes prism/private/wslib/lib/fitting/Pipe/1-0-7-17.spec
2004-Jun-22 22:24:12 190 bytes prism/private/wslib/lib/fitting/Pipe/1-0-7-18.spec
2004-Jul-13 21:59:22 190 bytes prism/private/wslib/lib/fitting/Pipe/1-0-7-19.spec
2003-Jun-20 16:15:36 189 bytes prism/private/wslib/lib/fitting/Pipe/1-0-7-2.spec
2004-Jul-16 16:44:40 190 bytes prism/private/wslib/lib/fitting/Pipe/1-0-7-20.spec
2004-Jul-22 10:14:40 190 bytes prism/private/wslib/lib/fitting/Pipe/1-0-7-21.spec
2004-Aug-17 15:29:48 190 bytes prism/private/wslib/lib/fitting/Pipe/1-0-7-22.spec
2004-Aug-22 22:24:46 190 bytes prism/private/wslib/lib/fitting/Pipe/1-0-7-23.spec
2004-Aug-23 22:46:58 190 bytes prism/private/wslib/lib/fitting/Pipe/1-0-7-24.spec
2004-Aug-29 16:25:32 190 bytes prism/private/wslib/lib/fitting/Pipe/1-0-7-25.spec
2004-Oct-15 10:25:38 190 bytes prism/private/wslib/lib/fitting/Pipe/1-0-7-26.spec
2004-Oct-25 20:32:44 190 bytes prism/private/wslib/lib/fitting/Pipe/1-0-7-27.spec
2004-Nov-11 10:48:10 190 bytes prism/private/wslib/lib/fitting/Pipe/1-0-7-28.spec
2003-Jun-29 05:49:54 189 bytes prism/private/wslib/lib/fitting/Pipe/1-0-7-3.spec
2003-Jul-09 16:05:22 189 bytes prism/private/wslib/lib/fitting/Pipe/1-0-7-4.spec
2003-Jul-18 10:25:42 189 bytes prism/private/wslib/lib/fitting/Pipe/1-0-7-5.spec
2003-Aug-07 15:44:02 189 bytes prism/private/wslib/lib/fitting/Pipe/1-0-7-6.spec
2003-Aug-13 11:23:36 189 bytes prism/private/wslib/lib/fitting/Pipe/1-0-7-7.spec
2003-Oct-12 11:01:04 189 bytes prism/private/wslib/lib/fitting/Pipe/1-0-7-8.spec
2003-Oct-15 08:27:18 189 bytes prism/private/wslib/lib/fitting/Pipe/1-0-7-9.spec
2004-Dec-13 10:28:33 1088 bytes prism/private/wslib/lib/fitting/Reduce
2003-Apr-27 14:15:54 3396 bytes prism/private/wslib/lib/fitting/Reduce/1-0-6-15.spec
2003-May-09 16:08:18 3395 bytes prism/private/wslib/lib/fitting/Reduce/1-0-7-0.spec
2003-Jun-20 15:20:58 3425 bytes prism/private/wslib/lib/fitting/Reduce/1-0-7-1.spec
2003-Oct-22 12:20:36 206 bytes prism/private/wslib/lib/fitting/Reduce/1-0-7-10.spec
2003-Nov-11 18:29:52 206 bytes prism/private/wslib/lib/fitting/Reduce/1-0-7-11.spec
2003-Dec-18 14:01:22 206 bytes prism/private/wslib/lib/fitting/Reduce/1-0-7-12.spec
2003-Dec-30 13:42:48 206 bytes prism/private/wslib/lib/fitting/Reduce/1-0-7-13.spec
2004-Feb-10 16:23:22 206 bytes prism/private/wslib/lib/fitting/Reduce/1-0-7-14.spec
2004-Mar-10 19:09:42 206 bytes prism/private/wslib/lib/fitting/Reduce/1-0-7-15.spec
2004-May-19 16:55:40 206 bytes prism/private/wslib/lib/fitting/Reduce/1-0-7-16.spec
2004-May-20 20:35:40 206 bytes prism/private/wslib/lib/fitting/Reduce/1-0-7-17.spec
2004-Jun-22 22:24:12 206 bytes prism/private/wslib/lib/fitting/Reduce/1-0-7-18.spec
2004-Jul-13 21:59:22 206 bytes prism/private/wslib/lib/fitting/Reduce/1-0-7-19.spec
2003-Jun-20 16:14:58 205 bytes prism/private/wslib/lib/fitting/Reduce/1-0-7-2.spec
2004-Jul-16 16:44:40 206 bytes prism/private/wslib/lib/fitting/Reduce/1-0-7-20.spec 2004-Jul-22 10:14:40 206 bytes prism/private/wslib/lib/fitting/Reduce/1-0-7-21.spec
2004-Aug-17 15:29:48 206 bytes prism/private/wslib/lib/fitting/Reduce/1-0-7-22.spec
2004-Aug-22 22:24:46 206 bytes prism/private/wslib/lib/fitting/Reduce/1-0-7-23.spec
2004-Aug-23 22:46:58 206 bytes prism/private/wslib/lib/fitting/Reduce/1-0-7-24.spec
2004-Aug-29 16:25:32 206 bytes prism/private/wslib/lib/fitting/Reduce/1-0-7-25.spec
2004-Oct-15 10:25:38 206 bytes prism/private/wslib/lib/fitting/Reduce/1-0-7-26.spec
2004-Oct-25 20:32:44 206 bytes prism/private/wslib/lib/fitting/Reduce/1-0-7-27.spec
2004-Nov-11 10:48:10 206 bytes prism/private/wslib/lib/fitting/Reduce/1-0-7-28.spec
2003-Jun-29 05:49:54 205 bytes prism/private/wslib/lib/fitting/Reduce/1-0-7-3.spec
2003-Jul-09 16:05:22 205 bytes prism/private/wslib/lib/fitting/Reduce/1-0-7-4.spec
2003-Jul-18 10:25:42 205 bytes prism/private/wslib/lib/fitting/Reduce/1-0-7-5.spec
2003-Aug-07 15:44:02 205 bytes prism/private/wslib/lib/fitting/Reduce/1-0-7-6.spec
2003-Aug-13 11:23:36 205 bytes prism/private/wslib/lib/fitting/Reduce/1-0-7-7.spec
2003-Oct-12 11:01:04 205 bytes prism/private/wslib/lib/fitting/Reduce/1-0-7-8.spec
2003-Oct-15 08:27:18 205 bytes prism/private/wslib/lib/fitting/Reduce/1-0-7-9.spec
2004-Dec-13 10:28:33 986 bytes prism/private/wslib/lib/fitting/ReduceTeeSide
2003-Oct-22 12:20:36 241 bytes prism/private/wslib/lib/fitting/ReduceTeeSide/1-0-7-10.spec
2003-Nov-11 18:29:52 241 bytes prism/private/wslib/lib/fitting/ReduceTeeSide/1-0-7-11.spec
2003-Dec-18 14:01:22 241 bytes prism/private/wslib/lib/fitting/ReduceTeeSide/1-0-7-12.spec
2003-Dec-30 13:42:48 241 bytes prism/private/wslib/lib/fitting/ReduceTeeSide/1-0-7-13.spec
2004-Feb-10 16:23:22 241 bytes prism/private/wslib/lib/fitting/ReduceTeeSide/1-0-7-14.spec
2004-Mar-10 19:09:42 241 bytes prism/private/wslib/lib/fitting/ReduceTeeSide/1-0-7-15.spec
2004-May-19 16:55:40 241 bytes prism/private/wslib/lib/fitting/ReduceTeeSide/1-0-7-16.spec
2004-May-20 20:35:40 241 bytes prism/private/wslib/lib/fitting/ReduceTeeSide/1-0-7-17.spec
2004-Jun-22 22:24:12 241 bytes prism/private/wslib/lib/fitting/ReduceTeeSide/1-0-7-18.spec
2004-Jul-13 21:59:22 241 bytes prism/private/wslib/lib/fitting/ReduceTeeSide/1-0-7-19.spec
2003-Jun-20 16:30:30 240 bytes prism/private/wslib/lib/fitting/ReduceTeeSide/1-0-7-2.spec
2004-Jul-16 16:44:40 241 bytes prism/private/wslib/lib/fitting/ReduceTeeSide/1-0-7-20.spec
2004-Jul-22 10:14:40 241 bytes prism/private/wslib/lib/fitting/ReduceTeeSide/1-0-7-21.spec
2004-Aug-17 15:29:48 241 bytes prism/private/wslib/lib/fitting/ReduceTeeSide/1-0-7-22.spec
2004-Aug-22 22:24:46 241 bytes prism/private/wslib/lib/fitting/ReduceTeeSide/1-0-7-23.spec
2004-Aug-23 22:46:58 241 bytes prism/private/wslib/lib/fitting/ReduceTeeSide/1-0-7-24.spec
2004-Aug-29 16:25:32 241 bytes prism/private/wslib/lib/fitting/ReduceTeeSide/1-0-7-25.spec
2004-Oct-15 10:25:38 241 bytes prism/private/wslib/lib/fitting/ReduceTeeSide/1-0-7-26.spec
2004-Oct-25 20:32:44 241 bytes prism/private/wslib/lib/fitting/ReduceTeeSide/1-0-7-27.spec
2004-Nov-11 10:48:10 241 bytes prism/private/wslib/lib/fitting/ReduceTeeSide/1-0-7-28.spec
2003-Jun-29 05:49:54 240 bytes prism/private/wslib/lib/fitting/ReduceTeeSide/1-0-7-3.spec
2003-Jul-09 16:05:22 240 bytes prism/private/wslib/lib/fitting/ReduceTeeSide/1-0-7-4.spec
2003-Jul-18 10:25:42 240 bytes prism/private/wslib/lib/fitting/ReduceTeeSide/1-0-7-5.spec
2003-Aug-07 15:44:02 240 bytes prism/private/wslib/lib/fitting/ReduceTeeSide/1-0-7-6.spec
2003-Aug-13 11:23:36 240 bytes prism/private/wslib/lib/fitting/ReduceTeeSide/1-0-7-7.spec
2003-Oct-12 11:01:04 240 bytes prism/private/wslib/lib/fitting/ReduceTeeSide/1-0-7-8.spec
2003-Oct-15 08:27:18 240 bytes prism/private/wslib/lib/fitting/ReduceTeeSide/1-0-7-9.spec
2004-Dec-13 10:28:33 986 bytes prism/private/wslib/lib/fitting/ReduceTeeThrough
2003-Oct-22 12:20:36 236 bytes prism/private/wslib/lib/fitting/ReduceTeeThrough/1-0-7-10.spec
2003-Nov-11 18:29:52 236 bytes prism/private/wslib/lib/fitting/ReduceTeeThrough/1-0-7-11.spec
2003-Dec-18 14:01:22 236 bytes prism/private/wslib/lib/fitting/ReduceTeeThrough/1-0-7-12.spec
2003-Dec-30 13:42:48 236 bytes prism/private/wslib/lib/fitting/ReduceTeeThrough/1-0-7-13.spec
2004-Feb-10 16:23:22 236 bytes prism/private/wslib/lib/fitting/ReduceTeeThrough/1-0-7-14.spec
2004-Mar-10 19:09:42 236 bytes prism/private/wslib/lib/fitting/ReduceTeeThrough/1-0-7-15.spec
2004-May-19 16:55:40 236 bytes prism/private/wslib/lib/fitting/ReduceTeeThrough/1-0-7-16.spec
2004-May-20 20:35:40 236 bytes prism/private/wslib/lib/fitting/ReduceTeeThrough/1-0-7-17.spec
2004-Jun-22 22:24:12 236 bytes prism/private/wslib/lib/fitting/ReduceTeeThrough/1-0-7-18.spec
2004-Jul-13 21:59:22 236 bytes prism/private/wslib/lib/fitting/ReduceTeeThrough/1-0-7-19.spec
2003-Jun-20 16:15:12 235 bytes prism/private/wslib/lib/fitting/ReduceTeeThrough/1-0-7-2.spec
2004-Jul-16 16:44:42 236 bytes prism/private/wslib/lib/fitting/ReduceTeeThrough/1-0-7-20.spec
2004-Jul-22 10:14:40 236 bytes prism/private/wslib/lib/fitting/ReduceTeeThrough/1-0-7-21.spec
2004-Aug-17 15:29:48 236 bytes prism/private/wslib/lib/fitting/ReduceTeeThrough/1-0-7-22.spec
2004-Aug-22 22:24:46 236 bytes prism/private/wslib/lib/fitting/ReduceTeeThrough/1-0-7-23.spec
2004-Aug-23 22:46:58 236 bytes prism/private/wslib/lib/fitting/ReduceTeeThrough/1-0-7-24.spec
2004-Aug-29 16:25:32 236 bytes prism/private/wslib/lib/fitting/ReduceTeeThrough/1-0-7-25.spec 2004-Oct-15 10:25:38 236 bytes prism/private/wslib/lib/fitting/ReduceTeeThrough/1-0-7-26.spec
2004-Oct-25 20:32:44 236 bytes prism/private/wslib/lib/fitting/ReduceTeeThrough/1-0-7-27.spec
2004-Nov-11 10:48:10 236 bytes prism/private/wslib/lib/fitting/ReduceTeeThrough/1-0-7-28.spec
2003-Jun-29 05:49:54 235 bytes prism/private/wslib/lib/fitting/ReduceTeeThrough/1-0-7-3.spec
2003-Jul-09 16:05:22 235 bytes prism/private/wslib/lib/fitting/ReduceTeeThrough/1-0-7-4.spec
2003-Jul-18 10:25:42 235 bytes prism/private/wslib/lib/fitting/ReduceTeeThrough/1-0-7-5.spec
2003-Aug-07 15:44:02 235 bytes prism/private/wslib/lib/fitting/ReduceTeeThrough/1-0-7-6.spec
2003-Aug-13 11:23:36 235 bytes prism/private/wslib/lib/fitting/ReduceTeeThrough/1-0-7-7.spec
2003-Oct-12 11:01:04 235 bytes prism/private/wslib/lib/fitting/ReduceTeeThrough/1-0-7-8.spec
2003-Oct-15 08:27:18 235 bytes prism/private/wslib/lib/fitting/ReduceTeeThrough/1-0-7-9.spec
2004-Dec-13 10:28:33 1088 bytes prism/private/wslib/lib/fitting/RuptureDisk
2003-Apr-27 14:15:54 3420 bytes prism/private/wslib/lib/fitting/RuptureDisk/1-0-6-15.spec
2003-May-09 16:08:18 3419 bytes prism/private/wslib/lib/fitting/RuptureDisk/1-0-7-0.spec
2003-Jun-20 15:21:02 3449 bytes prism/private/wslib/lib/fitting/RuptureDisk/1-0-7-1.spec
2003-Oct-22 12:20:36 225 bytes prism/private/wslib/lib/fitting/RuptureDisk/1-0-7-10.spec
2003-Nov-11 18:29:52 225 bytes prism/private/wslib/lib/fitting/RuptureDisk/1-0-7-11.spec
2003-Dec-18 14:01:22 225 bytes prism/private/wslib/lib/fitting/RuptureDisk/1-0-7-12.spec
2003-Dec-30 13:42:48 225 bytes prism/private/wslib/lib/fitting/RuptureDisk/1-0-7-13.spec
2004-Feb-10 16:23:22 225 bytes prism/private/wslib/lib/fitting/RuptureDisk/1-0-7-14.spec
2004-Mar-10 19:09:42 225 bytes prism/private/wslib/lib/fitting/RuptureDisk/1-0-7-15.spec
2004-May-19 16:55:40 225 bytes prism/private/wslib/lib/fitting/RuptureDisk/1-0-7-16.spec
2004-May-20 20:35:40 225 bytes prism/private/wslib/lib/fitting/RuptureDisk/1-0-7-17.spec
2004-Jun-22 22:24:12 225 bytes prism/private/wslib/lib/fitting/RuptureDisk/1-0-7-18.spec
2004-Jul-13 21:59:22 225 bytes prism/private/wslib/lib/fitting/RuptureDisk/1-0-7-19.spec
2003-Jun-20 16:21:50 224 bytes prism/private/wslib/lib/fitting/RuptureDisk/1-0-7-2.spec
2004-Jul-16 16:44:42 225 bytes prism/private/wslib/lib/fitting/RuptureDisk/1-0-7-20.spec
2004-Jul-22 10:14:40 225 bytes prism/private/wslib/lib/fitting/RuptureDisk/1-0-7-21.spec
2004-Aug-17 15:29:48 225 bytes prism/private/wslib/lib/fitting/RuptureDisk/1-0-7-22.spec
2004-Aug-22 22:24:46 225 bytes prism/private/wslib/lib/fitting/RuptureDisk/1-0-7-23.spec
2004-Aug-23 22:46:58 225 bytes prism/private/wslib/lib/fitting/RuptureDisk/1-0-7-24.spec
2004-Aug-29 16:25:32 225 bytes prism/private/wslib/lib/fitting/RuptureDisk/1-0-7-25.spec
2004-Oct-15 10:25:38 225 bytes prism/private/wslib/lib/fitting/RuptureDisk/1-0-7-26.spec
2004-Nov-06 19:53:16 219 bytes prism/private/wslib/lib/fitting/RuptureDisk/1-0-7-27.spec
2004-Nov-11 10:48:10 219 bytes prism/private/wslib/lib/fitting/RuptureDisk/1-0-7-28.spec
2003-Jun-29 05:49:54 224 bytes prism/private/wslib/lib/fitting/RuptureDisk/1-0-7-3.spec
2003-Jul-09 16:05:22 224 bytes prism/private/wslib/lib/fitting/RuptureDisk/1-0-7-4.spec
2003-Jul-18 10:25:42 224 bytes prism/private/wslib/lib/fitting/RuptureDisk/1-0-7-5.spec
2003-Aug-07 15:44:02 224 bytes prism/private/wslib/lib/fitting/RuptureDisk/1-0-7-6.spec
2003-Aug-13 11:23:36 224 bytes prism/private/wslib/lib/fitting/RuptureDisk/1-0-7-7.spec
2003-Oct-12 11:01:04 224 bytes prism/private/wslib/lib/fitting/RuptureDisk/1-0-7-8.spec
2003-Oct-15 08:27:18 224 bytes prism/private/wslib/lib/fitting/RuptureDisk/1-0-7-9.spec
2004-Dec-13 10:28:33 1088 bytes prism/private/wslib/lib/fitting/SwingCheck
2003-Apr-27 14:15:54 3408 bytes prism/private/wslib/lib/fitting/SwingCheck/1-0-6-15.spec
2003-May-09 16:08:18 3407 bytes prism/private/wslib/lib/fitting/SwingCheck/1-0-7-0.spec
2003-Jun-20 15:21:06 3437 bytes prism/private/wslib/lib/fitting/SwingCheck/1-0-7-1.spec
2003-Oct-22 12:20:36 214 bytes prism/private/wslib/lib/fitting/SwingCheck/1-0-7-10.spec
2003-Nov-11 18:29:52 214 bytes prism/private/wslib/lib/fitting/SwingCheck/1-0-7-11.spec
2003-Dec-18 14:01:22 214 bytes prism/private/wslib/lib/fitting/SwingCheck/1-0-7-12.spec
2003-Dec-30 13:42:48 214 bytes prism/private/wslib/lib/fitting/SwingCheck/1-0-7-13.spec
2004-Feb-10 16:23:22 214 bytes prism/private/wslib/lib/fitting/SwingCheck/1-0-7-14.spec
2004-Mar-10 19:09:42 214 bytes prism/private/wslib/lib/fitting/SwingCheck/1-0-7-15.spec
2004-May-19 16:55:40 214 bytes prism/private/wslib/lib/fitting/SwingCheck/1-0-7-16.spec
2004-May-20 20:35:40 214 bytes prism/private/wslib/lib/fitting/SwingCheck/1-0-7-17.spec
2004-Jun-22 22:24:12 214 bytes prism/private/wslib/lib/fitting/SwingCheck/1-0-7-18.spec
2004-Jul-13 21:59:22 214 bytes prism/private/wslib/lib/fitting/SwingCheck/1-0-7-19.spec
2003-Jun-20 16:08:24 213 bytes prism/private/wslib/lib/fitting/SwingCheck/1-0-7-2.spec
2004-Jul-16 16:44:42 214 bytes prism/private/wslib/lib/fitting/SwingCheck/1-0-7-20.spec
2004-Jul-22 10:14:40 214 bytes prism/private/wslib/lib/fitting/SwingCheck/1-0-7-21.spec
2004-Aug-17 15:29:48 214 bytes prism/private/wslib/lib/fitting/SwingCheck/1-0-7-22.spec
2004-Aug-22 22:24:46 214 bytes prism/private/wslib/lib/fitting/SwingCheck/1-0-7-23.spec
2004-Aug-23 22:46:58 214 bytes prism/private/wslib/lib/fitting/SwingCheck/1-0-7-24.spec 2004-Aug-29 16:25:32 214 bytes prism/private/wslib/lib/fitting/SwingCheck/1-0-7-25.spec
2004-Oct-15 10:25:38 214 bytes prism/private/wslib/lib/fitting/SwingCheck/1-0-7-26.spec
2004-Oct-25 20:32:44 214 bytes prism/private/wslib/lib/fitting/SwingCheck/1-0-7-27.spec
2004-Nov-11 10:48:10 214 bytes prism/private/wslib/lib/fitting/SwingCheck/1-0-7-28.spec
2003-Jun-29 05:49:54 213 bytes prism/private/wslib/lib/fitting/SwingCheck/1-0-7-3.spec
2003-Jul-09 16:05:22 213 bytes prism/private/wslib/lib/fitting/SwingCheck/1-0-7-4.spec
2003-Jul-18 10:25:42 213 bytes prism/private/wslib/lib/fitting/SwingCheck/1-0-7-5.spec
2003-Aug-07 15:44:02 213 bytes prism/private/wslib/lib/fitting/SwingCheck/1-0-7-6.spec
2003-Aug-13 11:23:36 213 bytes prism/private/wslib/lib/fitting/SwingCheck/1-0-7-7.spec
2003-Oct-12 11:01:04 213 bytes prism/private/wslib/lib/fitting/SwingCheck/1-0-7-8.spec
2003-Oct-15 08:27:18 213 bytes prism/private/wslib/lib/fitting/SwingCheck/1-0-7-9.spec
2004-Dec-13 10:28:33 1088 bytes prism/private/wslib/lib/fitting/TeeSide
2003-Apr-27 14:15:54 3406 bytes prism/private/wslib/lib/fitting/TeeSide/1-0-6-15.spec
2003-May-09 16:08:18 3405 bytes prism/private/wslib/lib/fitting/TeeSide/1-0-7-0.spec
2003-Jun-20 15:21:10 3435 bytes prism/private/wslib/lib/fitting/TeeSide/1-0-7-1.spec
2003-Oct-22 12:20:36 215 bytes prism/private/wslib/lib/fitting/TeeSide/1-0-7-10.spec
2003-Nov-11 18:29:52 215 bytes prism/private/wslib/lib/fitting/TeeSide/1-0-7-11.spec
2003-Dec-18 14:01:22 215 bytes prism/private/wslib/lib/fitting/TeeSide/1-0-7-12.spec
2003-Dec-30 13:42:48 215 bytes prism/private/wslib/lib/fitting/TeeSide/1-0-7-13.spec
2004-Feb-10 16:23:22 215 bytes prism/private/wslib/lib/fitting/TeeSide/1-0-7-14.spec
2004-Mar-10 19:09:42 215 bytes prism/private/wslib/lib/fitting/TeeSide/1-0-7-15.spec
2004-May-19 16:55:40 215 bytes prism/private/wslib/lib/fitting/TeeSide/1-0-7-16.spec
2004-May-20 20:35:40 215 bytes prism/private/wslib/lib/fitting/TeeSide/1-0-7-17.spec
2004-Jun-22 22:24:12 215 bytes prism/private/wslib/lib/fitting/TeeSide/1-0-7-18.spec
2004-Jul-13 21:59:22 215 bytes prism/private/wslib/lib/fitting/TeeSide/1-0-7-19.spec
2003-Jun-20 16:40:42 214 bytes prism/private/wslib/lib/fitting/TeeSide/1-0-7-2.spec
2004-Jul-16 16:44:42 215 bytes prism/private/wslib/lib/fitting/TeeSide/1-0-7-20.spec
2004-Jul-22 10:14:40 215 bytes prism/private/wslib/lib/fitting/TeeSide/1-0-7-21.spec
2004-Aug-17 15:29:48 215 bytes prism/private/wslib/lib/fitting/TeeSide/1-0-7-22.spec
2004-Aug-22 22:24:46 215 bytes prism/private/wslib/lib/fitting/TeeSide/1-0-7-23.spec
2004-Aug-23 22:46:58 215 bytes prism/private/wslib/lib/fitting/TeeSide/1-0-7-24.spec
2004-Aug-29 16:25:32 215 bytes prism/private/wslib/lib/fitting/TeeSide/1-0-7-25.spec
2004-Oct-15 10:25:38 215 bytes prism/private/wslib/lib/fitting/TeeSide/1-0-7-26.spec
2004-Oct-25 20:32:44 215 bytes prism/private/wslib/lib/fitting/TeeSide/1-0-7-27.spec
2004-Nov-11 10:48:10 215 bytes prism/private/wslib/lib/fitting/TeeSide/1-0-7-28.spec
2003-Jun-29 05:49:54 214 bytes prism/private/wslib/lib/fitting/TeeSide/1-0-7-3.spec
2003-Jul-09 16:05:22 214 bytes prism/private/wslib/lib/fitting/TeeSide/1-0-7-4.spec
2003-Jul-18 10:25:42 214 bytes prism/private/wslib/lib/fitting/TeeSide/1-0-7-5.spec
2003-Aug-07 15:44:02 214 bytes prism/private/wslib/lib/fitting/TeeSide/1-0-7-6.spec
2003-Aug-13 11:23:36 214 bytes prism/private/wslib/lib/fitting/TeeSide/1-0-7-7.spec
2003-Oct-12 11:01:04 214 bytes prism/private/wslib/lib/fitting/TeeSide/1-0-7-8.spec
2003-Oct-15 08:27:18 214 bytes prism/private/wslib/lib/fitting/TeeSide/1-0-7-9.spec
2004-Dec-13 10:28:33 1088 bytes prism/private/wslib/lib/fitting/TeeThrough
2003-Apr-27 14:15:54 3415 bytes prism/private/wslib/lib/fitting/TeeThrough/1-0-6-15.spec
2003-May-09 16:08:18 3414 bytes prism/private/wslib/lib/fitting/TeeThrough/1-0-7-0.spec
2003-Jun-20 15:21:16 3444 bytes prism/private/wslib/lib/fitting/TeeThrough/1-0-7-1.spec
2003-Oct-22 12:20:36 234 bytes prism/private/wslib/lib/fitting/TeeThrough/1-0-7-10.spec
2003-Nov-11 18:29:52 234 bytes prism/private/wslib/lib/fitting/TeeThrough/1-0-7-11.spec
2003-Dec-18 14:01:22 234 bytes prism/private/wslib/lib/fitting/TeeThrough/1-0-7-12.spec
2003-Dec-30 13:42:48 234 bytes prism/private/wslib/lib/fitting/TeeThrough/1-0-7-13.spec
2004-Feb-10 16:23:22 234 bytes prism/private/wslib/lib/fitting/TeeThrough/1-0-7-14.spec
2004-Mar-10 19:09:42 234 bytes prism/private/wslib/lib/fitting/TeeThrough/1-0-7-15.spec
2004-May-19 16:55:40 234 bytes prism/private/wslib/lib/fitting/TeeThrough/1-0-7-16.spec
2004-May-20 20:35:40 234 bytes prism/private/wslib/lib/fitting/TeeThrough/1-0-7-17.spec
2004-Jun-22 22:24:12 234 bytes prism/private/wslib/lib/fitting/TeeThrough/1-0-7-18.spec
2004-Jul-13 21:59:22 234 bytes prism/private/wslib/lib/fitting/TeeThrough/1-0-7-19.spec
2003-Jun-20 16:40:50 233 bytes prism/private/wslib/lib/fitting/TeeThrough/1-0-7-2.spec
2004-Jul-16 16:44:42 234 bytes prism/private/wslib/lib/fitting/TeeThrough/1-0-7-20.spec
2004-Jul-22 10:14:42 234 bytes prism/private/wslib/lib/fitting/TeeThrough/1-0-7-21.spec
2004-Aug-17 15:29:48 234 bytes prism/private/wslib/lib/fitting/TeeThrough/1-0-7-22.spec
2004-Aug-22 22:24:46 234 bytes prism/private/wslib/lib/fitting/TeeThrough/1-0-7-23.spec

| | | |
|---|---|---|
| 2004-Aug-23 22:46:58 | 234 bytes | prism/private/wslib/lib/fitting/TeeThrough/1-0-7-24.spec |
| 2004-Aug-29 16:25:32 | 234 bytes | prism/private/wslib/lib/fitting/TeeThrough/1-0-7-25.spec |
| 2004-Oct-15 10:25:38 | 234 bytes | prism/private/wslib/lib/fitting/TeeThrough/1-0-7-26.spec |
| 2004-Oct-25 20:32:44 | 234 bytes | prism/private/wslib/lib/fitting/TeeThrough/1-0-7-27.spec |
| 2004-Nov-11 10:48:10 | 234 bytes | prism/private/wslib/lib/fitting/TeeThrough/1-0-7-28.spec |
| 2003-Jun-29 05:49:54 | 233 bytes | prism/private/wslib/lib/fitting/TeeThrough/1-0-7-3.spec |
| 2003-Jul-09 16:05:22 | 233 bytes | prism/private/wslib/lib/fitting/TeeThrough/1-0-7-4.spec |
| 2003-Jul-18 10:25:42 | 233 bytes | prism/private/wslib/lib/fitting/TeeThrough/1-0-7-5.spec |
| 2003-Aug-07 15:44:02 | 233 bytes | prism/private/wslib/lib/fitting/TeeThrough/1-0-7-6.spec |
| 2003-Aug-13 11:23:36 | 233 bytes | prism/private/wslib/lib/fitting/TeeThrough/1-0-7-7.spec |
| 2003-Oct-12 11:01:04 | 233 bytes | prism/private/wslib/lib/fitting/TeeThrough/1-0-7-8.spec |
| 2003-Oct-15 08:27:18 | 233 bytes | prism/private/wslib/lib/fitting/TeeThrough/1-0-7-9.spec |
| 2004-Dec-13 10:28:33 | 986 bytes | prism/private/wslib/lib/fitting/Valve3Way |
| 2003-Oct-22 12:20:36 | 215 bytes | prism/private/wslib/lib/fitting/Valve3Way/1-0-7-10.spec |
| 2003-Nov-11 18:29:52 | 215 bytes | prism/private/wslib/lib/fitting/Valve3Way/1-0-7-11.spec |
| 2003-Dec-18 14:01:22 | 215 bytes | prism/private/wslib/lib/fitting/Valve3Way/1-0-7-12.spec |
| 2003-Dec-30 13:42:48 | 215 bytes | prism/private/wslib/lib/fitting/Valve3Way/1-0-7-13.spec |
| 2004-Feb-10 16:23:22 | 215 bytes | prism/private/wslib/lib/fitting/Valve3Way/1-0-7-14.spec |
| 2004-Mar-10 19:09:42 | 215 bytes | prism/private/wslib/lib/fitting/Valve3Way/1-0-7-15.spec |
| 2004-May-19 16:55:40 | 215 bytes | prism/private/wslib/lib/fitting/Valve3Way/1-0-7-16.spec |
| 2004-May-20 20:35:40 | 215 bytes | prism/private/wslib/lib/fitting/Valve3Way/1-0-7-17.spec |
| 2004-Jun-22 22:24:12 | 215 bytes | prism/private/wslib/lib/fitting/Valve3Way/1-0-7-18.spec |
| 2004-Jul-13 21:59:22 | 215 bytes | prism/private/wslib/lib/fitting/Valve3Way/1-0-7-19.spec |
| 2003-Jun-21 14:24:10 | 214 bytes | prism/private/wslib/lib/fitting/Valve3Way/1-0-7-2.spec |
| 2004-Jul-16 16:44:42 | 215 bytes | prism/private/wslib/lib/fitting/Valve3Way/1-0-7-20.spec |
| 2004-Jul-22 10:14:42 | 215 bytes | prism/private/wslib/lib/fitting/Valve3Way/1-0-7-21.spec |
| 2004-Aug-17 15:29:48 | 215 bytes | prism/private/wslib/lib/fitting/Valve3Way/1-0-7-22.spec |
| 2004-Aug-22 22:24:46 | 215 bytes | prism/private/wslib/lib/fitting/Valve3Way/1-0-7-23.spec |
| 2004-Aug-23 22:46:58 | 215 bytes | prism/private/wslib/lib/fitting/Valve3Way/1-0-7-24.spec |
| 2004-Aug-29 16:25:32 | 215 bytes | prism/private/wslib/lib/fitting/Valve3Way/1-0-7-25.spec |
| 2004-Oct-15 10:25:38 | 215 bytes | prism/private/wslib/lib/fitting/Valve3Way/1-0-7-26.spec |
| 2004-Oct-25 20:32:44 | 215 bytes | prism/private/wslib/lib/fitting/Valve3Way/1-0-7-27.spec |
| 2004-Nov-11 10:48:10 | 215 bytes | prism/private/wslib/lib/fitting/Valve3Way/1-0-7-28.spec |
| 2003-Jun-29 05:49:54 | 214 bytes | prism/private/wslib/lib/fitting/Valve3Way/1-0-7-3.spec |
| 2003-Jul-09 16:05:22 | 214 bytes | prism/private/wslib/lib/fitting/Valve3Way/1-0-7-4.spec |
| 2003-Jul-18 10:25:42 | 214 bytes | prism/private/wslib/lib/fitting/Valve3Way/1-0-7-5.spec |
| 2003-Aug-07 15:44:02 | 214 bytes | prism/private/wslib/lib/fitting/Valve3Way/1-0-7-6.spec |
| 2003-Aug-13 11:23:36 | 214 bytes | prism/private/wslib/lib/fitting/Valve3Way/1-0-7-7.spec |
| 2003-Oct-12 11:01:04 | 214 bytes | prism/private/wslib/lib/fitting/Valve3Way/1-0-7-8.spec |
| 2003-Oct-15 08:27:18 | 214 bytes | prism/private/wslib/lib/fitting/Valve3Way/1-0-7-9.spec |
| 2004-Dec-13 10:28:33 | 136 bytes | prism/private/wslib/lib/flashtype |
| 2004-Dec-13 10:28:33 | 170 bytes | prism/private/wslib/lib/flashtype/PH |
| 2004-Nov-01 02:23:48 | 695 bytes | prism/private/wslib/lib/flashtype/PH/1-0-7-26.spec |
| 2004-Nov-06 10:02:28 | 695 bytes | prism/private/wslib/lib/flashtype/PH/1-0-7-27.spec |
| 2004-Nov-11 10:48:10 | 695 bytes | prism/private/wslib/lib/flashtype/PH/1-0-7-28.spec |
| 2004-Dec-13 10:28:33 | 204 bytes | prism/private/wslib/lib/flashtype/PT |
| 2004-Oct-14 15:48:32 | 695 bytes | prism/private/wslib/lib/flashtype/PT/1-0-7-25.spec |
| 2004-Oct-19 15:31:20 | 695 bytes | prism/private/wslib/lib/flashtype/PT/1-0-7-26.spec |
| 2004-Nov-06 10:02:28 | 695 bytes | prism/private/wslib/lib/flashtype/PT/1-0-7-27.spec |
| 2004-Nov-11 10:48:10 | 695 bytes | prism/private/wslib/lib/flashtype/PT/1-0-7-28.spec |
| 2004-Dec-13 10:28:35 | 1394 bytes | prism/private/wslib/lib/hazard |
| 2004-Dec-13 10:28:33 | 1088 bytes | prism/private/wslib/lib/hazard/CC-V |
| 2003-Apr-27 14:15:54 | 218 bytes | prism/private/wslib/lib/hazard/CC-V/1-0-6-15.spec |
| 2003-May-09 16:08:18 | 217 bytes | prism/private/wslib/lib/hazard/CC-V/1-0-7-0.spec |
| 2003-May-28 22:58:56 | 217 bytes | prism/private/wslib/lib/hazard/CC-V/1-0-7-1.spec |
| 2003-Oct-22 12:20:36 | 218 bytes | prism/private/wslib/lib/hazard/CC-V/1-0-7-10.spec |
| 2003-Nov-11 18:29:52 | 218 bytes | prism/private/wslib/lib/hazard/CC-V/1-0-7-11.spec |
| 2003-Dec-18 14:01:22 | 218 bytes | prism/private/wslib/lib/hazard/CC-V/1-0-7-12.spec |
| 2003-Dec-30 13:42:48 | 218 bytes | prism/private/wslib/lib/hazard/CC-V/1-0-7-13.spec |
| 2004-Feb-10 16:23:22 | 218 bytes | prism/private/wslib/lib/hazard/CC-V/1-0-7-14.spec |
| 2004-Mar-10 19:09:42 | 218 bytes | prism/private/wslib/lib/hazard/CC-V/1-0-7-15.spec |

2004-May-19 16:55:40 218 bytes prism/private/wslib/lib/hazard/CC-V/1-0-7-16.spec
2004-May-20 20:35:40 218 bytes prism/private/wslib/lib/hazard/CC-V/1-0-7-17.spec
2004-Jun-22 22:24:12 218 bytes prism/private/wslib/lib/hazard/CC-V/1-0-7-18.spec
2004-Jul-13 21:59:22 218 bytes prism/private/wslib/lib/hazard/CC-V/1-0-7-19.spec
2003-Jun-11 13:14:38 217 bytes prism/private/wslib/lib/hazard/CC-V/1-0-7-2.spec
2004-Jul-16 16:44:42 218 bytes prism/private/wslib/lib/hazard/CC-V/1-0-7-20.spec
2004-Jul-22 10:14:42 218 bytes prism/private/wslib/lib/hazard/CC-V/1-0-7-21.spec
2004-Aug-17 15:29:48 218 bytes prism/private/wslib/lib/hazard/CC-V/1-0-7-22.spec
2004-Aug-22 22:24:46 218 bytes prism/private/wslib/lib/hazard/CC-V/1-0-7-23.spec
2004-Aug-23 22:46:58 218 bytes prism/private/wslib/lib/hazard/CC-V/1-0-7-24.spec
2004-Aug-29 16:25:32 218 bytes prism/private/wslib/lib/hazard/CC-V/1-0-7-25.spec
2004-Oct-15 10:25:38 218 bytes prism/private/wslib/lib/hazard/CC-V/1-0-7-26.spec
2004-Oct-25 20:32:44 218 bytes prism/private/wslib/lib/hazard/CC-V/1-0-7-27.spec
2004-Nov-11 10:48:10 218 bytes prism/private/wslib/lib/hazard/CC-V/1-0-7-28.spec
2003-Jun-29 05:49:54 217 bytes prism/private/wslib/lib/hazard/CC-V/1-0-7-3.spec
2003-Jul-09 16:05:22 217 bytes prism/private/wslib/lib/hazard/CC-V/1-0-7-4.spec
2003-Jul-18 10:25:42 217 bytes prism/private/wslib/lib/hazard/CC-V/1-0-7-5.spec
2003-Aug-07 15:44:02 217 bytes prism/private/wslib/lib/hazard/CC-V/1-0-7-6.spec
2003-Aug-13 11:23:36 217 bytes prism/private/wslib/lib/hazard/CC-V/1-0-7-7.spec
2003-Oct-12 11:01:04 217 bytes prism/private/wslib/lib/hazard/CC-V/1-0-7-8.spec
2003-Oct-15 08:27:18 217 bytes prism/private/wslib/lib/hazard/CC-V/1-0-7-9.spec
2004-Dec-13 10:28:33 1088 bytes prism/private/wslib/lib/hazard/CVF-2
2003-Apr-27 14:15:54 224 bytes prism/private/wslib/lib/hazard/CVF-2/1-0-6-15.spec
2003-May-09 16:08:18 223 bytes prism/private/wslib/lib/hazard/CVF-2/1-0-7-0.spec
2003-May-28 22:58:56 223 bytes prism/private/wslib/lib/hazard/CVF-2/1-0-7-1.spec
2003-Oct-22 12:20:36 224 bytes prism/private/wslib/lib/hazard/CVF-2/1-0-7-10.spec
2003-Nov-11 18:29:52 224 bytes prism/private/wslib/lib/hazard/CVF-2/1-0-7-11.spec
2003-Dec-18 14:01:22 224 bytes prism/private/wslib/lib/hazard/CVF-2/1-0-7-12.spec
2003-Dec-30 13:42:48 224 bytes prism/private/wslib/lib/hazard/CVF-2/1-0-7-13.spec
2004-Feb-10 16:23:22 224 bytes prism/private/wslib/lib/hazard/CVF-2/1-0-7-14.spec
2004-Mar-10 19:09:42 224 bytes prism/private/wslib/lib/hazard/CVF-2/1-0-7-15.spec
2004-May-19 16:55:40 224 bytes prism/private/wslib/lib/hazard/CVF-2/1-0-7-16.spec
2004-May-20 20:35:40 224 bytes prism/private/wslib/lib/hazard/CVF-2/1-0-7-17.spec
2004-Jun-22 22:24:12 224 bytes prism/private/wslib/lib/hazard/CVF-2/1-0-7-18.spec
2004-Jul-13 21:59:22 224 bytes prism/private/wslib/lib/hazard/CVF-2/1-0-7-19.spec
2003-Jun-11 13:14:38 223 bytes prism/private/wslib/lib/hazard/CVF-2/1-0-7-2.spec
2004-Jul-16 16:44:42 224 bytes prism/private/wslib/lib/hazard/CVF-2/1-0-7-20.spec
2004-Jul-22 10:14:42 224 bytes prism/private/wslib/lib/hazard/CVF-2/1-0-7-21.spec
2004-Aug-17 15:29:48 224 bytes prism/private/wslib/lib/hazard/CVF-2/1-0-7-22.spec
2004-Aug-22 22:24:46 224 bytes prism/private/wslib/lib/hazard/CVF-2/1-0-7-23.spec
2004-Aug-23 22:46:58 224 bytes prism/private/wslib/lib/hazard/CVF-2/1-0-7-24.spec
2004-Sep-24 09:43:24 268 bytes prism/private/wslib/lib/hazard/CVF-2/1-0-7-25.spec
2004-Oct-15 10:25:38 268 bytes prism/private/wslib/lib/hazard/CVF-2/1-0-7-26.spec
2004-Oct-25 20:32:44 268 bytes prism/private/wslib/lib/hazard/CVF-2/1-0-7-27.spec
2004-Nov-11 10:48:10 268 bytes prism/private/wslib/lib/hazard/CVF-2/1-0-7-28.spec
2003-Jun-29 05:49:56 223 bytes prism/private/wslib/lib/hazard/CVF-2/1-0-7-3.spec
2003-Jul-09 16:05:22 223 bytes prism/private/wslib/lib/hazard/CVF-2/1-0-7-4.spec
2003-Jul-18 10:25:42 223 bytes prism/private/wslib/lib/hazard/CVF-2/1-0-7-5.spec
2003-Aug-07 15:44:02 223 bytes prism/private/wslib/lib/hazard/CVF-2/1-0-7-6.spec
2003-Aug-13 11:23:36 223 bytes prism/private/wslib/lib/hazard/CVF-2/1-0-7-7.spec
2003-Oct-12 11:01:04 223 bytes prism/private/wslib/lib/hazard/CVF-2/1-0-7-8.spec
2003-Oct-15 08:27:18 223 bytes prism/private/wslib/lib/hazard/CVF-2/1-0-7-9.spec
2004-Dec-13 10:28:33 1088 bytes prism/private/wslib/lib/hazard/CVF-L
2003-Apr-27 14:15:54 225 bytes prism/private/wslib/lib/hazard/CVF-L/1-0-6-15.spec
2003-May-09 16:08:18 224 bytes prism/private/wslib/lib/hazard/CVF-L/1-0-7-0.spec
2003-May-28 22:58:56 224 bytes prism/private/wslib/lib/hazard/CVF-L/1-0-7-1.spec
2003-Oct-22 12:20:36 225 bytes prism/private/wslib/lib/hazard/CVF-L/1-0-7-10.spec
2003-Nov-11 18:29:52 225 bytes prism/private/wslib/lib/hazard/CVF-L/1-0-7-11.spec
2003-Dec-18 14:01:22 225 bytes prism/private/wslib/lib/hazard/CVF-L/1-0-7-12.spec
2003-Dec-30 13:42:48 225 bytes prism/private/wslib/lib/hazard/CVF-L/1-0-7-13.spec
2004-Feb-10 16:23:22 225 bytes prism/private/wslib/lib/hazard/CVF-L/1-0-7-14.spec

| | | |
|---|---|---|
| 2004-Mar-10 19:09:42 | 225 bytes | prism/private/wslib/lib/hazard/CVF-L/1-0-7-15.spec |
| 2004-May-19 16:55:40 | 225 bytes | prism/private/wslib/lib/hazard/CVF-L/1-0-7-16.spec |
| 2004-May-20 20:35:40 | 225 bytes | prism/private/wslib/lib/hazard/CVF-L/1-0-7-17.spec |
| 2004-Jun-22 22:24:12 | 225 bytes | prism/private/wslib/lib/hazard/CVF-L/1-0-7-18.spec |
| 2004-Jul-13 21:59:22 | 225 bytes | prism/private/wslib/lib/hazard/CVF-L/1-0-7-19.spec |
| 2003-Jun-11 13:14:38 | 224 bytes | prism/private/wslib/lib/hazard/CVF-L/1-0-7-2.spec |
| 2004-Jul-16 16:44:42 | 225 bytes | prism/private/wslib/lib/hazard/CVF-L/1-0-7-20.spec |
| 2004-Jul-22 10:14:42 | 225 bytes | prism/private/wslib/lib/hazard/CVF-L/1-0-7-21.spec |
| 2004-Aug-17 15:29:48 | 225 bytes | prism/private/wslib/lib/hazard/CVF-L/1-0-7-22.spec |
| 2004-Aug-22 22:24:46 | 225 bytes | prism/private/wslib/lib/hazard/CVF-L/1-0-7-23.spec |
| 2004-Aug-23 22:46:58 | 225 bytes | prism/private/wslib/lib/hazard/CVF-L/1-0-7-24.spec |
| 2004-Aug-29 16:25:32 | 225 bytes | prism/private/wslib/lib/hazard/CVF-L/1-0-7-25.spec |
| 2004-Oct-15 10:25:38 | 225 bytes | prism/private/wslib/lib/hazard/CVF-L/1-0-7-26.spec |
| 2004-Oct-25 20:32:44 | 225 bytes | prism/private/wslib/lib/hazard/CVF-L/1-0-7-27.spec |
| 2004-Nov-11 10:48:10 | 225 bytes | prism/private/wslib/lib/hazard/CVF-L/1-0-7-28.spec |
| 2003-Jun-29 05:49:56 | 224 bytes | prism/private/wslib/lib/hazard/CVF-L/1-0-7-3.spec |
| 2003-Jul-09 16:05:22 | 224 bytes | prism/private/wslib/lib/hazard/CVF-L/1-0-7-4.spec |
| 2003-Jul-18 10:25:42 | 224 bytes | prism/private/wslib/lib/hazard/CVF-L/1-0-7-5.spec |
| 2003-Aug-07 15:44:02 | 224 bytes | prism/private/wslib/lib/hazard/CVF-L/1-0-7-6.spec |
| 2003-Aug-13 11:23:36 | 224 bytes | prism/private/wslib/lib/hazard/CVF-L/1-0-7-7.spec |
| 2003-Oct-12 11:01:04 | 224 bytes | prism/private/wslib/lib/hazard/CVF-L/1-0-7-8.spec |
| 2003-Oct-15 08:27:18 | 224 bytes | prism/private/wslib/lib/hazard/CVF-L/1-0-7-9.spec |
| 2004-Dec-13 10:28:34 | 1088 bytes | prism/private/wslib/lib/hazard/CVF-S |
| 2003-Apr-27 14:15:54 | 220 bytes | prism/private/wslib/lib/hazard/CVF-S/1-0-6-15.spec |
| 2003-May-09 16:08:18 | 219 bytes | prism/private/wslib/lib/hazard/CVF-S/1-0-7-0.spec |
| 2003-May-28 22:58:56 | 219 bytes | prism/private/wslib/lib/hazard/CVF-S/1-0-7-1.spec |
| 2003-Oct-22 12:20:36 | 220 bytes | prism/private/wslib/lib/hazard/CVF-S/1-0-7-10.spec |
| 2003-Nov-11 18:29:52 | 220 bytes | prism/private/wslib/lib/hazard/CVF-S/1-0-7-11.spec |
| 2003-Dec-18 14:01:22 | 220 bytes | prism/private/wslib/lib/hazard/CVF-S/1-0-7-12.spec |
| 2003-Dec-30 13:42:48 | 220 bytes | prism/private/wslib/lib/hazard/CVF-S/1-0-7-13.spec |
| 2004-Feb-10 16:23:22 | 220 bytes | prism/private/wslib/lib/hazard/CVF-S/1-0-7-14.spec |
| 2004-Mar-10 19:09:42 | 220 bytes | prism/private/wslib/lib/hazard/CVF-S/1-0-7-15.spec |
| 2004-May-19 16:55:40 | 220 bytes | prism/private/wslib/lib/hazard/CVF-S/1-0-7-16.spec |
| 2004-May-20 20:35:40 | 220 bytes | prism/private/wslib/lib/hazard/CVF-S/1-0-7-17.spec |
| 2004-Jun-22 22:24:12 | 220 bytes | prism/private/wslib/lib/hazard/CVF-S/1-0-7-18.spec |
| 2004-Jul-13 21:59:22 | 220 bytes | prism/private/wslib/lib/hazard/CVF-S/1-0-7-19.spec |
| 2003-Jun-11 13:14:38 | 219 bytes | prism/private/wslib/lib/hazard/CVF-S/1-0-7-2.spec |
| 2004-Jul-16 16:44:42 | 220 bytes | prism/private/wslib/lib/hazard/CVF-S/1-0-7-20.spec |
| 2004-Jul-22 10:14:42 | 220 bytes | prism/private/wslib/lib/hazard/CVF-S/1-0-7-21.spec |
| 2004-Aug-17 15:29:48 | 220 bytes | prism/private/wslib/lib/hazard/CVF-S/1-0-7-22.spec |
| 2004-Aug-22 22:24:46 | 220 bytes | prism/private/wslib/lib/hazard/CVF-S/1-0-7-23.spec |
| 2004-Aug-23 22:46:58 | 220 bytes | prism/private/wslib/lib/hazard/CVF-S/1-0-7-24.spec |
| 2004-Aug-29 16:25:32 | 220 bytes | prism/private/wslib/lib/hazard/CVF-S/1-0-7-25.spec |
| 2004-Oct-15 10:25:38 | 220 bytes | prism/private/wslib/lib/hazard/CVF-S/1-0-7-26.spec |
| 2004-Oct-25 20:32:44 | 220 bytes | prism/private/wslib/lib/hazard/CVF-S/1-0-7-27.spec |
| 2004-Nov-11 10:48:10 | 220 bytes | prism/private/wslib/lib/hazard/CVF-S/1-0-7-28.spec |
| 2003-Jun-29 05:49:56 | 219 bytes | prism/private/wslib/lib/hazard/CVF-S/1-0-7-3.spec |
| 2003-Jul-09 16:05:22 | 219 bytes | prism/private/wslib/lib/hazard/CVF-S/1-0-7-4.spec |
| 2003-Jul-18 10:25:42 | 219 bytes | prism/private/wslib/lib/hazard/CVF-S/1-0-7-5.spec |
| 2003-Aug-07 15:44:02 | 219 bytes | prism/private/wslib/lib/hazard/CVF-S/1-0-7-6.spec |
| 2003-Aug-13 11:23:36 | 219 bytes | prism/private/wslib/lib/hazard/CVF-S/1-0-7-7.spec |
| 2003-Oct-12 11:01:04 | 219 bytes | prism/private/wslib/lib/hazard/CVF-S/1-0-7-8.spec |
| 2003-Oct-15 08:27:18 | 219 bytes | prism/private/wslib/lib/hazard/CVF-S/1-0-7-9.spec |
| 2004-Dec-13 10:28:34 | 1088 bytes | prism/private/wslib/lib/hazard/CVF-V |
| 2003-Apr-27 14:15:54 | 223 bytes | prism/private/wslib/lib/hazard/CVF-V/1-0-6-15.spec |
| 2003-May-09 16:08:18 | 222 bytes | prism/private/wslib/lib/hazard/CVF-V/1-0-7-0.spec |
| 2003-May-28 22:58:56 | 222 bytes | prism/private/wslib/lib/hazard/CVF-V/1-0-7-1.spec |
| 2003-Oct-22 12:20:36 | 223 bytes | prism/private/wslib/lib/hazard/CVF-V/1-0-7-10.spec |
| 2003-Nov-11 18:29:52 | 223 bytes | prism/private/wslib/lib/hazard/CVF-V/1-0-7-11.spec |
| 2003-Dec-19 09:41:32 | 842 bytes | prism/private/wslib/lib/hazard/CVF-V/1-0-7-12.spec |
| 2003-Dec-30 13:42:48 | 842 bytes | prism/private/wslib/lib/hazard/CVF-V/1-0-7-13.spec |

2004-Feb-10 16:23:22 842 bytes prism/private/wslib/lib/hazard/CVF-V/1-0-7-14.spec
2004-Mar-10 19:09:42 842 bytes prism/private/wslib/lib/hazard/CVF-V/1-0-7-15.spec
2004-May-19 16:55:40 842 bytes prism/private/wslib/lib/hazard/CVF-V/1-0-7-16.spec
2004-May-20 20:35:40 842 bytes prism/private/wslib/lib/hazard/CVF-V/1-0-7-17.spec
2004-Jun-22 22:24:12 842 bytes prism/private/wslib/lib/hazard/CVF-V/1-0-7-18.spec
2004-Jul-13 21:59:22 842 bytes prism/private/wslib/lib/hazard/CVF-V/1-0-7-19.spec
2003-Jun-11 13:14:38 222 bytes prism/private/wslib/lib/hazard/CVF-V/1-0-7-2.spec
2004-Jul-16 16:44:42 842 bytes prism/private/wslib/lib/hazard/CVF-V/1-0-7-20.spec
2004-Jul-22 10:14:42 842 bytes prism/private/wslib/lib/hazard/CVF-V/1-0-7-21.spec
2004-Aug-17 15:29:48 842 bytes prism/private/wslib/lib/hazard/CVF-V/1-0-7-22.spec
2004-Aug-22 22:24:46 842 bytes prism/private/wslib/lib/hazard/CVF-V/1-0-7-23.spec
2004-Aug-23 22:46:58 842 bytes prism/private/wslib/lib/hazard/CVF-V/1-0-7-24.spec
2004-Aug-29 16:25:32 842 bytes prism/private/wslib/lib/hazard/CVF-V/1-0-7-25.spec
2004-Oct-15 10:25:38 842 bytes prism/private/wslib/lib/hazard/CVF-V/1-0-7-26.spec
2004-Oct-25 20:32:44 842 bytes prism/private/wslib/lib/hazard/CVF-V/1-0-7-27.spec
2004-Nov-11 10:48:10 842 bytes prism/private/wslib/lib/hazard/CVF-V/1-0-7-28.spec
2003-Jun-29 05:49:56 222 bytes prism/private/wslib/lib/hazard/CVF-V/1-0-7-3.spec
2003-Jul-09 16:05:22 222 bytes prism/private/wslib/lib/hazard/CVF-V/1-0-7-4.spec
2003-Jul-18 10:25:42 222 bytes prism/private/wslib/lib/hazard/CVF-V/1-0-7-5.spec
2003-Aug-07 15:44:02 222 bytes prism/private/wslib/lib/hazard/CVF-V/1-0-7-6.spec
2003-Aug-13 11:23:36 222 bytes prism/private/wslib/lib/hazard/CVF-V/1-0-7-7.spec
2003-Oct-12 11:01:04 222 bytes prism/private/wslib/lib/hazard/CVF-V/1-0-7-8.spec
2003-Oct-15 08:27:18 222 bytes prism/private/wslib/lib/hazard/CVF-V/1-0-7-9.spec
2004-Dec-13 10:28:34 1088 bytes prism/private/wslib/lib/hazard/FGE-V
2003-Apr-27 14:15:54 217 bytes prism/private/wslib/lib/hazard/FGE-V/1-0-6-15.spec
2003-May-09 16:08:18 216 bytes prism/private/wslib/lib/hazard/FGE-V/1-0-7-0.spec
2003-May-28 22:58:56 216 bytes prism/private/wslib/lib/hazard/FGE-V/1-0-7-1.spec
2003-Oct-22 12:20:36 217 bytes prism/private/wslib/lib/hazard/FGE-V/1-0-7-10.spec
2003-Nov-11 18:29:52 217 bytes prism/private/wslib/lib/hazard/FGE-V/1-0-7-11.spec
2003-Dec-18 14:01:22 217 bytes prism/private/wslib/lib/hazard/FGE-V/1-0-7-12.spec
2003-Dec-30 13:42:48 217 bytes prism/private/wslib/lib/hazard/FGE-V/1-0-7-13.spec
2004-Feb-10 16:23:22 217 bytes prism/private/wslib/lib/hazard/FGE-V/1-0-7-14.spec
2004-Mar-10 19:09:42 217 bytes prism/private/wslib/lib/hazard/FGE-V/1-0-7-15.spec
2004-May-19 16:55:40 217 bytes prism/private/wslib/lib/hazard/FGE-V/1-0-7-16.spec
2004-May-20 20:35:40 217 bytes prism/private/wslib/lib/hazard/FGE-V/1-0-7-17.spec
2004-Jun-23 15:55:26 219 bytes prism/private/wslib/lib/hazard/FGE-V/1-0-7-18.spec
2004-Jul-13 21:59:22 219 bytes prism/private/wslib/lib/hazard/FGE-V/1-0-7-19.spec
2003-Jun-11 13:14:38 216 bytes prism/private/wslib/lib/hazard/FGE-V/1-0-7-2.spec
2004-Jul-16 16:44:42 219 bytes prism/private/wslib/lib/hazard/FGE-V/1-0-7-20.spec
2004-Jul-22 10:14:42 219 bytes prism/private/wslib/lib/hazard/FGE-V/1-0-7-21.spec
2004-Aug-17 15:29:48 219 bytes prism/private/wslib/lib/hazard/FGE-V/1-0-7-22.spec
2004-Aug-22 22:24:46 219 bytes prism/private/wslib/lib/hazard/FGE-V/1-0-7-23.spec
2004-Aug-23 22:46:58 219 bytes prism/private/wslib/lib/hazard/FGE-V/1-0-7-24.spec
2004-Aug-29 16:25:32 219 bytes prism/private/wslib/lib/hazard/FGE-V/1-0-7-25.spec
2004-Oct-15 10:25:38 219 bytes prism/private/wslib/lib/hazard/FGE-V/1-0-7-26.spec
2004-Oct-25 20:32:44 219 bytes prism/private/wslib/lib/hazard/FGE-V/1-0-7-27.spec
2004-Nov-11 10:48:10 219 bytes prism/private/wslib/lib/hazard/FGE-V/1-0-7-28.spec
2003-Jun-29 05:49:56 216 bytes prism/private/wslib/lib/hazard/FGE-V/1-0-7-3.spec
2003-Jul-09 16:05:22 216 bytes prism/private/wslib/lib/hazard/FGE-V/1-0-7-4.spec
2003-Jul-18 10:25:42 216 bytes prism/private/wslib/lib/hazard/FGE-V/1-0-7-5.spec
2003-Aug-07 15:44:02 216 bytes prism/private/wslib/lib/hazard/FGE-V/1-0-7-6.spec
2003-Aug-13 11:23:36 216 bytes prism/private/wslib/lib/hazard/FGE-V/1-0-7-7.spec
2003-Oct-12 11:01:04 216 bytes prism/private/wslib/lib/hazard/FGE-V/1-0-7-8.spec
2003-Oct-15 08:27:18 216 bytes prism/private/wslib/lib/hazard/FGE-V/1-0-7-9.spec
2004-Dec-13 10:28:34 1088 bytes prism/private/wslib/lib/hazard/FVG-V
2003-Apr-27 14:15:54 225 bytes prism/private/wslib/lib/hazard/FVG-V/1-0-6-15.spec
2003-May-09 16:08:18 224 bytes prism/private/wslib/lib/hazard/FVG-V/1-0-7-0.spec
2003-May-28 22:58:56 224 bytes prism/private/wslib/lib/hazard/FVG-V/1-0-7-1.spec
2003-Oct-22 12:20:36 225 bytes prism/private/wslib/lib/hazard/FVG-V/1-0-7-10.spec
2003-Nov-11 18:29:52 225 bytes prism/private/wslib/lib/hazard/FVG-V/1-0-7-11.spec
2003-Dec-18 14:01:22 225 bytes prism/private/wslib/lib/hazard/FVG-V/1-0-7-12.spec 2003-Dec-30 13:42:48 225 bytes prism/private/wslib/lib/hazard/FVG-V/1-0-7-13.spec
2004-Feb-10 16:23:22 225 bytes prism/private/wslib/lib/hazard/FVG-V/1-0-7-14.spec
2004-Mar-10 19:09:42 225 bytes prism/private/wslib/lib/hazard/FVG-V/1-0-7-15.spec
2004-May-19 16:55:40 225 bytes prism/private/wslib/lib/hazard/FVG-V/1-0-7-16.spec
2004-May-20 20:35:40 225 bytes prism/private/wslib/lib/hazard/FVG-V/1-0-7-17.spec
2004-Jun-22 22:24:12 225 bytes prism/private/wslib/lib/hazard/FVG-V/1-0-7-18.spec
2004-Jul-13 21:59:22 225 bytes prism/private/wslib/lib/hazard/FVG-V/1-0-7-19.spec
2003-Jun-11 13:14:38 224 bytes prism/private/wslib/lib/hazard/FVG-V/1-0-7-2.spec
2004-Jul-16 16:44:42 225 bytes prism/private/wslib/lib/hazard/FVG-V/1-0-7-20.spec
2004-Jul-22 10:14:42 225 bytes prism/private/wslib/lib/hazard/FVG-V/1-0-7-21.spec
2004-Aug-17 15:29:48 225 bytes prism/private/wslib/lib/hazard/FVG-V/1-0-7-22.spec
2004-Aug-22 22:24:46 225 bytes prism/private/wslib/lib/hazard/FVG-V/1-0-7-23.spec
2004-Aug-23 22:46:58 225 bytes prism/private/wslib/lib/hazard/FVG-V/1-0-7-24.spec
2004-Aug-29 16:25:32 225 bytes prism/private/wslib/lib/hazard/FVG-V/1-0-7-25.spec
2004-Oct-15 10:25:40 225 bytes prism/private/wslib/lib/hazard/FVG-V/1-0-7-26.spec
2004-Oct-25 20:32:44 225 bytes prism/private/wslib/lib/hazard/FVG-V/1-0-7-27.spec
2004-Nov-11 10:48:10 225 bytes prism/private/wslib/lib/hazard/FVG-V/1-0-7-28.spec
2003-Jun-29 05:49:56 224 bytes prism/private/wslib/lib/hazard/FVG-V/1-0-7-3.spec
2003-Jul-09 16:05:22 224 bytes prism/private/wslib/lib/hazard/FVG-V/1-0-7-4.spec
2003-Jul-18 10:25:42 224 bytes prism/private/wslib/lib/hazard/FVG-V/1-0-7-5.spec
2003-Aug-07 15:44:02 224 bytes prism/private/wslib/lib/hazard/FVG-V/1-0-7-6.spec
2003-Aug-13 11:23:36 224 bytes prism/private/wslib/lib/hazard/FVG-V/1-0-7-7.spec
2003-Oct-12 11:01:04 224 bytes prism/private/wslib/lib/hazard/FVG-V/1-0-7-8.spec
2003-Oct-15 08:27:18 224 bytes prism/private/wslib/lib/hazard/FVG-V/1-0-7-9.spec
2004-Dec-13 10:28:34 1088 bytes prism/private/wslib/lib/hazard/GF-2
2003-Apr-27 14:15:54 213 bytes prism/private/wslib/lib/hazard/GF-2/1-0-6-15.spec
2003-May-09 16:08:18 212 bytes prism/private/wslib/lib/hazard/GF-2/1-0-7-0.spec
2003-May-28 22:58:56 212 bytes prism/private/wslib/lib/hazard/GF-2/1-0-7-1.spec
2003-Oct-22 12:20:36 213 bytes prism/private/wslib/lib/hazard/GF-2/1-0-7-10.spec
2003-Nov-11 18:29:52 213 bytes prism/private/wslib/lib/hazard/GF-2/1-0-7-11.spec
2003-Dec-18 14:01:22 213 bytes prism/private/wslib/lib/hazard/GF-2/1-0-7-12.spec
2003-Dec-30 13:42:48 213 bytes prism/private/wslib/lib/hazard/GF-2/1-0-7-13.spec
2004-Feb-10 16:23:22 213 bytes prism/private/wslib/lib/hazard/GF-2/1-0-7-14.spec
2004-Mar-10 19:09:42 213 bytes prism/private/wslib/lib/hazard/GF-2/1-0-7-15.spec
2004-May-19 16:55:40 213 bytes prism/private/wslib/lib/hazard/GF-2/1-0-7-16.spec
2004-May-20 20:35:40 213 bytes prism/private/wslib/lib/hazard/GF-2/1-0-7-17.spec
2004-Jun-22 22:24:12 213 bytes prism/private/wslib/lib/hazard/GF-2/1-0-7-18.spec
2004-Jul-13 21:59:22 213 bytes prism/private/wslib/lib/hazard/GF-2/1-0-7-19.spec
2003-Jun-11 13:14:38 212 bytes prism/private/wslib/lib/hazard/GF-2/1-0-7-2.spec
2004-Jul-16 16:44:42 213 bytes prism/private/wslib/lib/hazard/GF-2/1-0-7-20.spec
2004-Jul-22 10:14:42 213 bytes prism/private/wslib/lib/hazard/GF-2/1-0-7-21.spec
2004-Aug-17 15:29:48 213 bytes prism/private/wslib/lib/hazard/GF-2/1-0-7-22.spec
2004-Aug-22 22:24:46 213 bytes prism/private/wslib/lib/hazard/GF-2/1-0-7-23.spec
2004-Aug-23 22:46:58 213 bytes prism/private/wslib/lib/hazard/GF-2/1-0-7-24.spec
2004-Sep-24 09:43:56 218 bytes prism/private/wslib/lib/hazard/GF-2/1-0-7-25.spec
2004-Oct-15 10:25:40 218 bytes prism/private/wslib/lib/hazard/GF-2/1-0-7-26.spec
2004-Oct-25 20:32:44 218 bytes prism/private/wslib/lib/hazard/GF-2/1-0-7-27.spec
2004-Nov-11 10:48:10 218 bytes prism/private/wslib/lib/hazard/GF-2/1-0-7-28.spec
2003-Jun-29 05:49:56 212 bytes prism/private/wslib/lib/hazard/GF-2/1-0-7-3.spec
2003-Jul-09 16:05:22 212 bytes prism/private/wslib/lib/hazard/GF-2/1-0-7-4.spec
2003-Jul-18 10:25:42 212 bytes prism/private/wslib/lib/hazard/GF-2/1-0-7-5.spec
2003-Aug-07 15:44:02 212 bytes prism/private/wslib/lib/hazard/GF-2/1-0-7-6.spec
2003-Aug-13 11:23:36 212 bytes prism/private/wslib/lib/hazard/GF-2/1-0-7-7.spec
2003-Oct-12 11:01:04 212 bytes prism/private/wslib/lib/hazard/GF-2/1-0-7-8.spec
2003-Oct-15 08:27:18 212 bytes prism/private/wslib/lib/hazard/GF-2/1-0-7-9.spec
2004-Dec-13 10:28:34 1088 bytes prism/private/wslib/lib/hazard/GF-L
2003-Apr-27 14:15:54 210 bytes prism/private/wslib/lib/hazard/GF-L/1-0-6-15.spec
2003-May-09 16:08:18 209 bytes prism/private/wslib/lib/hazard/GF-L/1-0-7-0.spec
2003-May-28 22:58:56 209 bytes prism/private/wslib/lib/hazard/GF-L/1-0-7-1.spec
2003-Oct-22 12:20:36 210 bytes prism/private/wslib/lib/hazard/GF-L/1-0-7-10.spec
2003-Nov-11 18:29:52 210 bytes prism/private/wslib/lib/hazard/GF-L/1-0-7-11.spec 2003-Dec-18 14:01:22 210 bytes prism/private/wslib/lib/hazard/GF-L/1-0-7-12.spec
2003-Dec-30 13:42:48 210 bytes prism/private/wslib/lib/hazard/GF-L/1-0-7-13.spec
2004-Feb-10 16:23:22 210 bytes prism/private/wslib/lib/hazard/GF-L/1-0-7-14.spec
2004-Mar-10 19:09:42 210 bytes prism/private/wslib/lib/hazard/GF-L/1-0-7-15.spec
2004-May-19 16:55:40 210 bytes prism/private/wslib/lib/hazard/GF-L/1-0-7-16.spec
2004-May-20 20:35:40 210 bytes prism/private/wslib/lib/hazard/GF-L/1-0-7-17.spec
2004-Jun-22 22:24:12 210 bytes prism/private/wslib/lib/hazard/GF-L/1-0-7-18.spec
2004-Jul-13 21:59:22 210 bytes prism/private/wslib/lib/hazard/GF-L/1-0-7-19.spec
2003-Jun-11 13:14:38 209 bytes prism/private/wslib/lib/hazard/GF-L/1-0-7-2.spec
2004-Jul-16 16:44:42 210 bytes prism/private/wslib/lib/hazard/GF-L/1-0-7-20.spec
2004-Jul-22 10:14:42 210 bytes prism/private/wslib/lib/hazard/GF-L/1-0-7-21.spec
2004-Aug-17 15:29:48 210 bytes prism/private/wslib/lib/hazard/GF-L/1-0-7-22.spec
2004-Aug-22 22:24:46 210 bytes prism/private/wslib/lib/hazard/GF-L/1-0-7-23.spec
2004-Aug-23 22:46:58 210 bytes prism/private/wslib/lib/hazard/GF-L/1-0-7-24.spec
2004-Aug-29 16:25:32 210 bytes prism/private/wslib/lib/hazard/GF-L/1-0-7-25.spec
2004-Oct-15 10:25:40 210 bytes prism/private/wslib/lib/hazard/GF-L/1-0-7-26.spec
2004-Oct-25 20:32:44 210 bytes prism/private/wslib/lib/hazard/GF-L/1-0-7-27.spec
2004-Nov-11 10:48:10 210 bytes prism/private/wslib/lib/hazard/GF-L/1-0-7-28.spec
2003-Jun-29 05:49:56 209 bytes prism/private/wslib/lib/hazard/GF-L/1-0-7-3.spec
2003-Jul-09 16:05:22 209 bytes prism/private/wslib/lib/hazard/GF-L/1-0-7-4.spec
2003-Jul-18 10:25:42 209 bytes prism/private/wslib/lib/hazard/GF-L/1-0-7-5.spec
2003-Aug-07 15:44:02 209 bytes prism/private/wslib/lib/hazard/GF-L/1-0-7-6.spec
2003-Aug-13 11:23:36 209 bytes prism/private/wslib/lib/hazard/GF-L/1-0-7-7.spec
2003-Oct-12 11:01:04 209 bytes prism/private/wslib/lib/hazard/GF-L/1-0-7-8.spec
2003-Oct-15 08:27:18 209 bytes prism/private/wslib/lib/hazard/GF-L/1-0-7-9.spec
2004-Dec-13 10:28:34 1088 bytes prism/private/wslib/lib/hazard/GF-S
2003-Apr-27 14:15:54 207 bytes prism/private/wslib/lib/hazard/GF-S/1-0-6-15.spec
2003-May-09 16:08:18 206 bytes prism/private/wslib/lib/hazard/GF-S/1-0-7-0.spec
2003-May-28 22:58:56 206 bytes prism/private/wslib/lib/hazard/GF-S/1-0-7-1.spec
2003-Oct-22 12:20:36 207 bytes prism/private/wslib/lib/hazard/GF-S/1-0-7-10.spec
2003-Nov-11 18:29:52 207 bytes prism/private/wslib/lib/hazard/GF-S/1-0-7-11.spec
2003-Dec-18 14:01:22 207 bytes prism/private/wslib/lib/hazard/GF-S/1-0-7-12.spec
2003-Dec-30 13:42:48 207 bytes prism/private/wslib/lib/hazard/GF-S/1-0-7-13.spec
2004-Feb-10 16:23:22 207 bytes prism/private/wslib/lib/hazard/GF-S/1-0-7-14.spec
2004-Mar-10 19:09:42 207 bytes prism/private/wslib/lib/hazard/GF-S/1-0-7-15.spec
2004-May-19 16:55:40 207 bytes prism/private/wslib/lib/hazard/GF-S/1-0-7-16.spec
2004-May-20 20:35:40 207 bytes prism/private/wslib/lib/hazard/GF-S/1-0-7-17.spec
2004-Jun-22 22:24:12 207 bytes prism/private/wslib/lib/hazard/GF-S/1-0-7-18.spec
2004-Jul-13 21:59:22 207 bytes prism/private/wslib/lib/hazard/GF-S/1-0-7-19.spec
2003-Jun-11 13:14:38 206 bytes prism/private/wslib/lib/hazard/GF-S/1-0-7-2.spec
2004-Jul-16 16:44:42 207 bytes prism/private/wslib/lib/hazard/GF-S/1-0-7-20.spec
2004-Jul-22 10:14:42 207 bytes prism/private/wslib/lib/hazard/GF-S/1-0-7-21.spec
2004-Aug-17 15:29:48 207 bytes prism/private/wslib/lib/hazard/GF-S/1-0-7-22.spec
2004-Aug-22 22:24:46 207 bytes prism/private/wslib/lib/hazard/GF-S/1-0-7-23.spec
2004-Aug-23 22:46:58 207 bytes prism/private/wslib/lib/hazard/GF-S/1-0-7-24.spec
2004-Aug-29 16:25:32 207 bytes prism/private/wslib/lib/hazard/GF-S/1-0-7-25.spec
2004-Oct-15 10:25:40 207 bytes prism/private/wslib/lib/hazard/GF-S/1-0-7-26.spec
2004-Oct-25 20:32:44 207 bytes prism/private/wslib/lib/hazard/GF-S/1-0-7-27.spec
2004-Nov-11 10:48:10 207 bytes prism/private/wslib/lib/hazard/GF-S/1-0-7-28.spec
2003-Jun-29 05:49:56 206 bytes prism/private/wslib/lib/hazard/GF-S/1-0-7-3.spec
2003-Jul-09 16:05:22 206 bytes prism/private/wslib/lib/hazard/GF-S/1-0-7-4.spec
2003-Jul-18 10:25:42 206 bytes prism/private/wslib/lib/hazard/GF-S/1-0-7-5.spec
2003-Aug-07 15:44:02 206 bytes prism/private/wslib/lib/hazard/GF-S/1-0-7-6.spec
2003-Aug-13 11:23:36 206 bytes prism/private/wslib/lib/hazard/GF-S/1-0-7-7.spec
2003-Oct-12 11:01:04 206 bytes prism/private/wslib/lib/hazard/GF-S/1-0-7-8.spec
2003-Oct-15 08:27:18 206 bytes prism/private/wslib/lib/hazard/GF-S/1-0-7-9.spec
2004-Dec-13 10:28:34 1088 bytes prism/private/wslib/lib/hazard/GF-V
2003-Apr-27 14:15:54 208 bytes prism/private/wslib/lib/hazard/GF-V/1-0-6-15.spec
2003-May-09 16:08:18 207 bytes prism/private/wslib/lib/hazard/GF-V/1-0-7-0.spec
2003-May-28 22:58:56 207 bytes prism/private/wslib/lib/hazard/GF-V/1-0-7-1.spec
2003-Oct-22 12:20:36 208 bytes prism/private/wslib/lib/hazard/GF-V/1-0-7-10.spec 2003-Nov-11 18:29:52 208 bytes prism/private/wslib/lib/hazard/GF-V/1-0-7-11.spec
2003-Dec-18 14:01:22 208 bytes prism/private/wslib/lib/hazard/GF-V/1-0-7-12.spec
2003-Dec-30 13:42:48 208 bytes prism/private/wslib/lib/hazard/GF-V/1-0-7-13.spec
2004-Feb-10 16:23:22 208 bytes prism/private/wslib/lib/hazard/GF-V/1-0-7-14.spec
2004-Mar-10 19:09:42 208 bytes prism/private/wslib/lib/hazard/GF-V/1-0-7-15.spec
2004-May-19 16:55:40 208 bytes prism/private/wslib/lib/hazard/GF-V/1-0-7-16.spec
2004-May-20 20:35:40 208 bytes prism/private/wslib/lib/hazard/GF-V/1-0-7-17.spec
2004-Jun-22 22:24:12 208 bytes prism/private/wslib/lib/hazard/GF-V/1-0-7-18.spec
2004-Jul-13 21:59:24 208 bytes prism/private/wslib/lib/hazard/GF-V/1-0-7-19.spec
2003-Jun-11 13:14:38 207 bytes prism/private/wslib/lib/hazard/GF-V/1-0-7-2.spec
2004-Jul-16 16:44:42 208 bytes prism/private/wslib/lib/hazard/GF-V/1-0-7-20.spec
2004-Jul-22 10:14:42 208 bytes prism/private/wslib/lib/hazard/GF-V/1-0-7-21.spec
2004-Aug-17 15:29:48 208 bytes prism/private/wslib/lib/hazard/GF-V/1-0-7-22.spec
2004-Aug-22 22:24:46 208 bytes prism/private/wslib/lib/hazard/GF-V/1-0-7-23.spec
2004-Aug-23 22:46:58 208 bytes prism/private/wslib/lib/hazard/GF-V/1-0-7-24.spec
2004-Aug-29 16:25:32 208 bytes prism/private/wslib/lib/hazard/GF-V/1-0-7-25.spec
2004-Oct-15 10:25:40 208 bytes prism/private/wslib/lib/hazard/GF-V/1-0-7-26.spec
2004-Oct-25 20:32:44 208 bytes prism/private/wslib/lib/hazard/GF-V/1-0-7-27.spec
2004-Nov-11 10:48:10 208 bytes prism/private/wslib/lib/hazard/GF-V/1-0-7-28.spec
2003-Jun-29 05:49:56 207 bytes prism/private/wslib/lib/hazard/GF-V/1-0-7-3.spec
2003-Jul-09 16:05:22 207 bytes prism/private/wslib/lib/hazard/GF-V/1-0-7-4.spec
2003-Jul-18 10:25:42 207 bytes prism/private/wslib/lib/hazard/GF-V/1-0-7-5.spec
2003-Aug-07 15:44:02 207 bytes prism/private/wslib/lib/hazard/GF-V/1-0-7-6.spec
2003-Aug-13 11:23:36 207 bytes prism/private/wslib/lib/hazard/GF-V/1-0-7-7.spec
2003-Oct-12 11:01:04 207 bytes prism/private/wslib/lib/hazard/GF-V/1-0-7-8.spec
2003-Oct-15 08:27:18 207 bytes prism/private/wslib/lib/hazard/GF-V/1-0-7-9.spec
2004-Dec-13 10:28:34 238 bytes prism/private/wslib/lib/hazard/LE-2
2004-Aug-25 16:00:22 202 bytes prism/private/wslib/lib/hazard/LE-2/1-0-7-24.spec
2004-Aug-29 16:25:32 202 bytes prism/private/wslib/lib/hazard/LE-2/1-0-7-25.spec
2004-Oct-15 10:25:40 202 bytes prism/private/wslib/lib/hazard/LE-2/1-0-7-26.spec
2004-Oct-25 20:32:44 202 bytes prism/private/wslib/lib/hazard/LE-2/1-0-7-27.spec
2004-Nov-11 10:48:10 202 bytes prism/private/wslib/lib/hazard/LE-2/1-0-7-28.spec
2004-Dec-13 10:28:34 1088 bytes prism/private/wslib/lib/hazard/LE-L
2003-Apr-27 14:15:54 215 bytes prism/private/wslib/lib/hazard/LE-L/1-0-6-15.spec
2003-May-09 16:08:18 214 bytes prism/private/wslib/lib/hazard/LE-L/1-0-7-0.spec
2003-May-28 22:58:56 214 bytes prism/private/wslib/lib/hazard/LE-L/1-0-7-1.spec
2003-Oct-22 12:20:36 215 bytes prism/private/wslib/lib/hazard/LE-L/1-0-7-10.spec
2003-Nov-11 18:29:52 215 bytes prism/private/wslib/lib/hazard/LE-L/1-0-7-11.spec
2003-Dec-18 14:01:22 215 bytes prism/private/wslib/lib/hazard/LE-L/1-0-7-12.spec
2003-Dec-30 13:42:48 215 bytes prism/private/wslib/lib/hazard/LE-L/1-0-7-13.spec
2004-Feb-10 16:23:22 215 bytes prism/private/wslib/lib/hazard/LE-L/1-0-7-14.spec
2004-Mar-10 19:09:42 215 bytes prism/private/wslib/lib/hazard/LE-L/1-0-7-15.spec
2004-May-19 16:55:40 215 bytes prism/private/wslib/lib/hazard/LE-L/1-0-7-16.spec
2004-Jun-02 11:32:58 216 bytes prism/private/wslib/lib/hazard/LE-L/1-0-7-17.spec
2004-Jun-22 22:24:12 216 bytes prism/private/wslib/lib/hazard/LE-L/1-0-7-18.spec
2004-Jul-13 21:59:24 216 bytes prism/private/wslib/lib/hazard/LE-L/1-0-7-19.spec
2003-Jun-11 13:14:38 214 bytes prism/private/wslib/lib/hazard/LE-L/1-0-7-2.spec
2004-Jul-16 16:44:42 216 bytes prism/private/wslib/lib/hazard/LE-L/1-0-7-20.spec
2004-Jul-22 10:14:42 216 bytes prism/private/wslib/lib/hazard/LE-L/1-0-7-21.spec
2004-Aug-17 15:29:48 216 bytes prism/private/wslib/lib/hazard/LE-L/1-0-7-22.spec
2004-Aug-22 22:24:46 216 bytes prism/private/wslib/lib/hazard/LE-L/1-0-7-23.spec
2004-Aug-23 22:46:58 216 bytes prism/private/wslib/lib/hazard/LE-L/1-0-7-24.spec
2004-Aug-29 16:25:32 216 bytes prism/private/wslib/lib/hazard/LE-L/1-0-7-25.spec
2004-Oct-15 10:25:40 216 bytes prism/private/wslib/lib/hazard/LE-L/1-0-7-26.spec
2004-Oct-25 20:32:44 216 bytes prism/private/wslib/lib/hazard/LE-L/1-0-7-27.spec
2004-Nov-11 10:48:10 216 bytes prism/private/wslib/lib/hazard/LE-L/1-0-7-28.spec
2003-Jun-29 05:49:56 214 bytes prism/private/wslib/lib/hazard/LE-L/1-0-7-3.spec
2003-Jul-09 16:05:22 214 bytes prism/private/wslib/lib/hazard/LE-L/1-0-7-4.spec
2003-Jul-18 10:25:42 214 bytes prism/private/wslib/lib/hazard/LE-L/1-0-7-5.spec
2003-Aug-07 15:44:02 214 bytes prism/private/wslib/lib/hazard/LE-L/1-0-7-6.spec
2003-Aug-13 11:23:36 214 bytes prism/private/wslib/lib/hazard/LE-L/1-0-7-7.spec 2003-Oct-12 11:01:04 214 bytes prism/private/wslib/lib/hazard/LE-L/1-0-7-8.spec
2003-Oct-15 08:27:18 214 bytes prism/private/wslib/lib/hazard/LE-L/1-0-7-9.spec
2004-Dec-13 10:28:34 1088 bytes prism/private/wslib/lib/hazard/PF-L
2003-Apr-27 14:15:54 210 bytes prism/private/wslib/lib/hazard/PF-L/1-0-6-15.spec
2003-May-09 16:08:18 209 bytes prism/private/wslib/lib/hazard/PF-L/1-0-7-0.spec
2003-May-28 22:58:56 209 bytes prism/private/wslib/lib/hazard/PF-L/1-0-7-1.spec
2003-Oct-22 12:20:36 210 bytes prism/private/wslib/lib/hazard/PF-L/1-0-7-10.spec
2003-Nov-11 18:29:52 210 bytes prism/private/wslib/lib/hazard/PF-L/1-0-7-11.spec
2003-Dec-18 14:01:22 210 bytes prism/private/wslib/lib/hazard/PF-L/1-0-7-12.spec
2003-Dec-30 13:42:48 210 bytes prism/private/wslib/lib/hazard/PF-L/1-0-7-13.spec
2004-Feb-10 16:23:22 210 bytes prism/private/wslib/lib/hazard/PF-L/1-0-7-14.spec
2004-Mar-10 19:09:42 210 bytes prism/private/wslib/lib/hazard/PF-L/1-0-7-15.spec
2004-May-19 16:55:40 210 bytes prism/private/wslib/lib/hazard/PF-L/1-0-7-16.spec
2004-May-20 20:35:42 210 bytes prism/private/wslib/lib/hazard/PF-L/1-0-7-17.spec
2004-Jun-22 22:24:12 210 bytes prism/private/wslib/lib/hazard/PF-L/1-0-7-18.spec
2004-Jul-13 21:59:24 210 bytes prism/private/wslib/lib/hazard/PF-L/1-0-7-19.spec
2003-Jun-11 13:14:38 209 bytes prism/private/wslib/lib/hazard/PF-L/1-0-7-2.spec
2004-Jul-16 16:44:42 210 bytes prism/private/wslib/lib/hazard/PF-L/1-0-7-20.spec
2004-Jul-22 10:14:42 210 bytes prism/private/wslib/lib/hazard/PF-L/1-0-7-21.spec
2004-Aug-17 15:29:48 210 bytes prism/private/wslib/lib/hazard/PF-L/1-0-7-22.spec
2004-Aug-22 22:24:46 210 bytes prism/private/wslib/lib/hazard/PF-L/1-0-7-23.spec
2004-Aug-23 22:46:58 210 bytes prism/private/wslib/lib/hazard/PF-L/1-0-7-24.spec
2004-Aug-29 16:25:32 210 bytes prism/private/wslib/lib/hazard/PF-L/1-0-7-25.spec
2004-Oct-15 10:25:40 210 bytes prism/private/wslib/lib/hazard/PF-L/1-0-7-26.spec
2004-Oct-25 20:32:44 210 bytes prism/private/wslib/lib/hazard/PF-L/1-0-7-27.spec
2004-Nov-11 10:48:12 210 bytes prism/private/wslib/lib/hazard/PF-L/1-0-7-28.spec
2003-Jun-29 05:49:56 209 bytes prism/private/wslib/lib/hazard/PF-L/1-0-7-3.spec
2003-Jul-09 16:05:22 209 bytes prism/private/wslib/lib/hazard/PF-L/1-0-7-4.spec
2003-Jul-18 10:25:42 209 bytes prism/private/wslib/lib/hazard/PF-L/1-0-7-5.spec
2003-Aug-07 15:44:02 209 bytes prism/private/wslib/lib/hazard/PF-L/1-0-7-6.spec
2003-Aug-13 11:23:36 209 bytes prism/private/wslib/lib/hazard/PF-L/1-0-7-7.spec
2003-Oct-12 11:01:04 209 bytes prism/private/wslib/lib/hazard/PF-L/1-0-7-8.spec
2003-Oct-15 08:27:18 209 bytes prism/private/wslib/lib/hazard/PF-L/1-0-7-9.spec
2004-Dec-13 10:28:34 1088 bytes prism/private/wslib/lib/hazard/PF-V
2003-Apr-27 14:15:54 210 bytes prism/private/wslib/lib/hazard/PF-V/1-0-6-15.spec
2003-May-09 16:08:18 209 bytes prism/private/wslib/lib/hazard/PF-V/1-0-7-0.spec
2003-May-28 22:58:56 209 bytes prism/private/wslib/lib/hazard/PF-V/1-0-7-1.spec
2003-Oct-22 12:20:36 210 bytes prism/private/wslib/lib/hazard/PF-V/1-0-7-10.spec
2003-Nov-11 18:29:52 210 bytes prism/private/wslib/lib/hazard/PF-V/1-0-7-11.spec
2003-Dec-18 14:01:22 210 bytes prism/private/wslib/lib/hazard/PF-V/1-0-7-12.spec
2003-Dec-30 13:42:48 210 bytes prism/private/wslib/lib/hazard/PF-V/1-0-7-13.spec
2004-Feb-10 16:23:22 210 bytes prism/private/wslib/lib/hazard/PF-V/1-0-7-14.spec
2004-Mar-10 19:09:42 210 bytes prism/private/wslib/lib/hazard/PF-V/1-0-7-15.spec
2004-May-19 16:55:40 210 bytes prism/private/wslib/lib/hazard/PF-V/1-0-7-16.spec
2004-May-20 20:35:42 210 bytes prism/private/wslib/lib/hazard/PF-V/1-0-7-17.spec
2004-Jun-22 22:24:12 210 bytes prism/private/wslib/lib/hazard/PF-V/1-0-7-18.spec
2004-Jul-13 21:59:24 210 bytes prism/private/wslib/lib/hazard/PF-V/1-0-7-19.spec
2003-Jun-11 13:14:38 209 bytes prism/private/wslib/lib/hazard/PF-V/1-0-7-2.spec
2004-Jul-16 16:44:42 210 bytes prism/private/wslib/lib/hazard/PF-V/1-0-7-20.spec
2004-Jul-22 10:14:42 210 bytes prism/private/wslib/lib/hazard/PF-V/1-0-7-21.spec
2004-Aug-17 15:29:48 210 bytes prism/private/wslib/lib/hazard/PF-V/1-0-7-22.spec
2004-Aug-22 22:24:46 210 bytes prism/private/wslib/lib/hazard/PF-V/1-0-7-23.spec
2004-Aug-23 22:46:58 210 bytes prism/private/wslib/lib/hazard/PF-V/1-0-7-24.spec
2004-Aug-29 16:25:32 210 bytes prism/private/wslib/lib/hazard/PF-V/1-0-7-25.spec
2004-Oct-15 10:25:40 210 bytes prism/private/wslib/lib/hazard/PF-V/1-0-7-26.spec
2004-Oct-25 20:32:44 210 bytes prism/private/wslib/lib/hazard/PF-V/1-0-7-27.spec
2004-Nov-11 10:48:12 210 bytes prism/private/wslib/lib/hazard/PF-V/1-0-7-28.spec
2003-Jun-29 05:49:56 209 bytes prism/private/wslib/lib/hazard/PF-V/1-0-7-3.spec
2003-Jul-09 16:05:22 209 bytes prism/private/wslib/lib/hazard/PF-V/1-0-7-4.spec
2003-Jul-18 10:25:42 209 bytes prism/private/wslib/lib/hazard/PF-V/1-0-7-5.spec
2003-Aug-07 15:44:02 209 bytes prism/private/wslib/lib/hazard/PF-V/1-0-7-6.spec 2003-Aug-13 11:23:36 209 bytes prism/private/wslib/lib/hazard/PF-V/1-0-7-7.spec
2003-Oct-12 11:01:04 209 bytes prism/private/wslib/lib/hazard/PF-V/1-0-7-8.spec
2003-Oct-15 08:27:18 209 bytes prism/private/wslib/lib/hazard/PF-V/1-0-7-9.spec
2004-Dec-13 10:28:34 1088 bytes prism/private/wslib/lib/hazard/PP-L
2003-Apr-27 14:15:54 212 bytes prism/private/wslib/lib/hazard/PP-L/1-0-6-15.spec
2003-May-09 16:08:18 211 bytes prism/private/wslib/lib/hazard/PP-L/1-0-7-0.spec
2003-May-28 22:58:56 211 bytes prism/private/wslib/lib/hazard/PP-L/1-0-7-1.spec
2003-Oct-22 12:20:36 212 bytes prism/private/wslib/lib/hazard/PP-L/1-0-7-10.spec
2003-Nov-11 18:29:52 212 bytes prism/private/wslib/lib/hazard/PP-L/1-0-7-11.spec
2003-Dec-18 14:01:22 212 bytes prism/private/wslib/lib/hazard/PP-L/1-0-7-12.spec
2003-Dec-30 13:42:48 212 bytes prism/private/wslib/lib/hazard/PP-L/1-0-7-13.spec
2004-Feb-10 16:23:22 212 bytes prism/private/wslib/lib/hazard/PP-L/1-0-7-14.spec
2004-Mar-10 19:09:42 212 bytes prism/private/wslib/lib/hazard/PP-L/1-0-7-15.spec
2004-May-19 16:55:40 212 bytes prism/private/wslib/lib/hazard/PP-L/1-0-7-16.spec
2004-May-20 20:35:42 212 bytes prism/private/wslib/lib/hazard/PP-L/1-0-7-17.spec
2004-Jun-22 22:24:12 212 bytes prism/private/wslib/lib/hazard/PP-L/1-0-7-18.spec
2004-Jul-13 21:59:24 212 bytes prism/private/wslib/lib/hazard/PP-L/1-0-7-19.spec
2003-Jun-11 13:14:38 211 bytes prism/private/wslib/lib/hazard/PP-L/1-0-7-2.spec
2004-Jul-16 16:44:42 212 bytes prism/private/wslib/lib/hazard/PP-L/1-0-7-20.spec
2004-Jul-22 10:14:42 212 bytes prism/private/wslib/lib/hazard/PP-L/1-0-7-21.spec
2004-Aug-17 15:29:48 212 bytes prism/private/wslib/lib/hazard/PP-L/1-0-7-22.spec
2004-Aug-22 22:24:46 212 bytes prism/private/wslib/lib/hazard/PP-L/1-0-7-23.spec
2004-Aug-23 22:46:58 212 bytes prism/private/wslib/lib/hazard/PP-L/1-0-7-24.spec
2004-Aug-29 16:25:32 212 bytes prism/private/wslib/lib/hazard/PP-L/1-0-7-25.spec
2004-Oct-15 10:25:40 212 bytes prism/private/wslib/lib/hazard/PP-L/1-0-7-26.spec
2004-Oct-25 20:32:44 212 bytes prism/private/wslib/lib/hazard/PP-L/1-0-7-27.spec
2004-Nov-11 10:48:12 212 bytes prism/private/wslib/lib/hazard/PP-L/1-0-7-28.spec
2003-Jun-29 05:49:56 211 bytes prism/private/wslib/lib/hazard/PP-L/1-0-7-3.spec
2003-Jul-09 16:05:22 211 bytes prism/private/wslib/lib/hazard/PP-L/1-0-7-4.spec
2003-Jul-18 10:25:42 211 bytes prism/private/wslib/lib/hazard/PP-L/1-0-7-5.spec
2003-Aug-07 15:44:02 211 bytes prism/private/wslib/lib/hazard/PP-L/1-0-7-6.spec
2003-Aug-13 11:23:36 211 bytes prism/private/wslib/lib/hazard/PP-L/1-0-7-7.spec
2003-Oct-12 11:01:04 211 bytes prism/private/wslib/lib/hazard/PP-L/1-0-7-8.spec
2003-Oct-15 08:27:18 211 bytes prism/private/wslib/lib/hazard/PP-L/1-0-7-9.spec
2004-Dec-13 10:28:34 1088 bytes prism/private/wslib/lib/hazard/PT-V
2003-Apr-27 14:15:54 212 bytes prism/private/wslib/lib/hazard/PT-V/1-0-6-15.spec
2003-May-09 16:08:18 211 bytes prism/private/wslib/lib/hazard/PT-V/1-0-7-0.spec
2003-May-28 22:58:56 211 bytes prism/private/wslib/lib/hazard/PT-V/1-0-7-1.spec
2003-Oct-22 12:20:36 212 bytes prism/private/wslib/lib/hazard/PT-V/1-0-7-10.spec
2003-Nov-11 18:29:52 212 bytes prism/private/wslib/lib/hazard/PT-V/1-0-7-11.spec
2003-Dec-18 14:01:22 212 bytes prism/private/wslib/lib/hazard/PT-V/1-0-7-12.spec
2003-Dec-30 13:42:48 212 bytes prism/private/wslib/lib/hazard/PT-V/1-0-7-13.spec
2004-Feb-10 16:23:22 212 bytes prism/private/wslib/lib/hazard/PT-V/1-0-7-14.spec
2004-Mar-10 19:09:42 212 bytes prism/private/wslib/lib/hazard/PT-V/1-0-7-15.spec
2004-May-19 16:55:40 212 bytes prism/private/wslib/lib/hazard/PT-V/1-0-7-16.spec
2004-May-20 20:35:42 212 bytes prism/private/wslib/lib/hazard/PT-V/1-0-7-17.spec
2004-Jun-22 22:24:12 212 bytes prism/private/wslib/lib/hazard/PT-V/1-0-7-18.spec
2004-Jul-13 21:59:24 212 bytes prism/private/wslib/lib/hazard/PT-V/1-0-7-19.spec
2003-Jun-11 13:14:38 211 bytes prism/private/wslib/lib/hazard/PT-V/1-0-7-2.spec
2004-Jul-16 16:44:42 212 bytes prism/private/wslib/lib/hazard/PT-V/1-0-7-20.spec
2004-Jul-22 10:14:42 212 bytes prism/private/wslib/lib/hazard/PT-V/1-0-7-21.spec
2004-Aug-17 15:29:48 212 bytes prism/private/wslib/lib/hazard/PT-V/1-0-7-22.spec
2004-Aug-22 22:24:46 212 bytes prism/private/wslib/lib/hazard/PT-V/1-0-7-23.spec
2004-Aug-23 22:46:58 212 bytes prism/private/wslib/lib/hazard/PT-V/1-0-7-24.spec
2004-Aug-29 16:25:32 212 bytes prism/private/wslib/lib/hazard/PT-V/1-0-7-25.spec
2004-Oct-15 10:25:40 212 bytes prism/private/wslib/lib/hazard/PT-V/1-0-7-26.spec
2004-Oct-25 20:32:44 212 bytes prism/private/wslib/lib/hazard/PT-V/1-0-7-27.spec
2004-Nov-11 10:48:12 212 bytes prism/private/wslib/lib/hazard/PT-V/1-0-7-28.spec
2003-Jun-29 05:49:56 211 bytes prism/private/wslib/lib/hazard/PT-V/1-0-7-3.spec
2003-Jul-09 16:05:22 211 bytes prism/private/wslib/lib/hazard/PT-V/1-0-7-4.spec
2003-Jul-18 10:25:42 211 bytes prism/private/wslib/lib/hazard/PT-V/1-0-7-5.spec

| | | |
|---|---|---|
| 2003-Aug-07 15:44:02 | 211 bytes | prism/private/wslib/lib/hazard/PT-V/1-0-7-6.spec |
| 2003-Aug-13 11:23:36 | 211 bytes | prism/private/wslib/lib/hazard/PT-V/1-0-7-7.spec |
| 2003-Oct-12 11:01:04 | 211 bytes | prism/private/wslib/lib/hazard/PT-V/1-0-7-8.spec |
| 2003-Oct-15 08:27:18 | 211 bytes | prism/private/wslib/lib/hazard/PT-V/1-0-7-9.spec |
| 2004-Dec-13 10:28:34 | 1088 bytes | prism/private/wslib/lib/hazard/SC-S |
| 2003-Apr-27 14:15:54 | 216 bytes | prism/private/wslib/lib/hazard/SC-S/1-0-6-15.spec |
| 2003-May-09 16:08:18 | 215 bytes | prism/private/wslib/lib/hazard/SC-S/1-0-7-0.spec |
| 2003-May-28 22:58:56 | 215 bytes | prism/private/wslib/lib/hazard/SC-S/1-0-7-1.spec |
| 2003-Oct-22 12:20:36 | 216 bytes | prism/private/wslib/lib/hazard/SC-S/1-0-7-10.spec |
| 2003-Nov-11 18:29:52 | 216 bytes | prism/private/wslib/lib/hazard/SC-S/1-0-7-11.spec |
| 2003-Dec-18 14:01:22 | 216 bytes | prism/private/wslib/lib/hazard/SC-S/1-0-7-12.spec |
| 2003-Dec-30 13:42:48 | 216 bytes | prism/private/wslib/lib/hazard/SC-S/1-0-7-13.spec |
| 2004-Feb-10 16:23:22 | 216 bytes | prism/private/wslib/lib/hazard/SC-S/1-0-7-14.spec |
| 2004-Mar-10 19:09:42 | 216 bytes | prism/private/wslib/lib/hazard/SC-S/1-0-7-15.spec |
| 2004-May-19 16:55:40 | 216 bytes | prism/private/wslib/lib/hazard/SC-S/1-0-7-16.spec |
| 2004-May-20 20:35:42 | 216 bytes | prism/private/wslib/lib/hazard/SC-S/1-0-7-17.spec |
| 2004-Jun-22 22:24:12 | 216 bytes | prism/private/wslib/lib/hazard/SC-S/1-0-7-18.spec |
| 2004-Jul-13 21:59:24 | 216 bytes | prism/private/wslib/lib/hazard/SC-S/1-0-7-19.spec |
| 2003-Jun-11 13:14:38 | 215 bytes | prism/private/wslib/lib/hazard/SC-S/1-0-7-2.spec |
| 2004-Jul-16 16:44:42 | 216 bytes | prism/private/wslib/lib/hazard/SC-S/1-0-7-20.spec |
| 2004-Jul-22 10:14:42 | 216 bytes | prism/private/wslib/lib/hazard/SC-S/1-0-7-21.spec |
| 2004-Aug-17 15:29:48 | 216 bytes | prism/private/wslib/lib/hazard/SC-S/1-0-7-22.spec |
| 2004-Aug-22 22:24:46 | 216 bytes | prism/private/wslib/lib/hazard/SC-S/1-0-7-23.spec |
| 2004-Aug-23 22:46:58 | 216 bytes | prism/private/wslib/lib/hazard/SC-S/1-0-7-24.spec |
| 2004-Aug-29 16:25:32 | 216 bytes | prism/private/wslib/lib/hazard/SC-S/1-0-7-25.spec |
| 2004-Oct-15 10:25:40 | 216 bytes | prism/private/wslib/lib/hazard/SC-S/1-0-7-26.spec |
| 2004-Oct-25 20:32:44 | 216 bytes | prism/private/wslib/lib/hazard/SC-S/1-0-7-27.spec |
| 2004-Nov-11 10:48:12 | 216 bytes | prism/private/wslib/lib/hazard/SC-S/1-0-7-28.spec |
| 2003-Jun-29 05:49:56 | 215 bytes | prism/private/wslib/lib/hazard/SC-S/1-0-7-3.spec |
| 2003-Jul-09 16:05:22 | 215 bytes | prism/private/wslib/lib/hazard/SC-S/1-0-7-4.spec |
| 2003-Jul-18 10:25:42 | 215 bytes | prism/private/wslib/lib/hazard/SC-S/1-0-7-5.spec |
| 2003-Aug-07 15:44:02 | 215 bytes | prism/private/wslib/lib/hazard/SC-S/1-0-7-6.spec |
| 2003-Aug-13 11:23:36 | 215 bytes | prism/private/wslib/lib/hazard/SC-S/1-0-7-7.spec |
| 2003-Oct-12 11:01:04 | 215 bytes | prism/private/wslib/lib/hazard/SC-S/1-0-7-8.spec |
| 2003-Oct-15 08:27:18 | 215 bytes | prism/private/wslib/lib/hazard/SC-S/1-0-7-9.spec |
| 2004-Dec-13 10:28:34 | 442 bytes | prism/private/wslib/lib/hazard/TBF-V |
| 2004-Jul-16 11:12:20 | 207 bytes | prism/private/wslib/lib/hazard/TBF-V/1-0-7-18.spec |
| 2004-Jul-16 11:12:20 | 207 bytes | prism/private/wslib/lib/hazard/TBF-V/1-0-7-19.spec |
| 2004-Jul-16 16:44:42 | 207 bytes | prism/private/wslib/lib/hazard/TBF-V/1-0-7-20.spec |
| 2004-Jul-22 10:14:42 | 207 bytes | prism/private/wslib/lib/hazard/TBF-V/1-0-7-21.spec |
| 2004-Aug-17 15:29:48 | 207 bytes | prism/private/wslib/lib/hazard/TBF-V/1-0-7-22.spec |
| 2004-Aug-22 22:24:46 | 207 bytes | prism/private/wslib/lib/hazard/TBF-V/1-0-7-23.spec |
| 2004-Aug-23 22:46:58 | 207 bytes | prism/private/wslib/lib/hazard/TBF-V/1-0-7-24.spec |
| 2004-Aug-29 16:25:32 | 207 bytes | prism/private/wslib/lib/hazard/TBF-V/1-0-7-25.spec |
| 2004-Oct-15 10:25:40 | 207 bytes | prism/private/wslib/lib/hazard/TBF-V/1-0-7-26.spec |
| 2004-Oct-25 20:32:44 | 207 bytes | prism/private/wslib/lib/hazard/TBF-V/1-0-7-27.spec |
| 2004-Nov-11 10:48:12 | 207 bytes | prism/private/wslib/lib/hazard/TBF-V/1-0-7-28.spec |
| 2004-Dec-13 10:28:34 | 238 bytes | prism/private/wslib/lib/hazard/TD-V |
| 2004-Aug-25 15:56:56 | 195 bytes | prism/private/wslib/lib/hazard/TD-V/1-0-7-24.spec |
| 2004-Aug-29 16:25:32 | 195 bytes | prism/private/wslib/lib/hazard/TD-V/1-0-7-25.spec |
| 2004-Oct-15 10:25:40 | 195 bytes | prism/private/wslib/lib/hazard/TD-V/1-0-7-26.spec |
| 2004-Oct-25 20:32:44 | 195 bytes | prism/private/wslib/lib/hazard/TD-V/1-0-7-27.spec |
| 2004-Nov-11 10:48:12 | 195 bytes | prism/private/wslib/lib/hazard/TD-V/1-0-7-28.spec |
| 2004-Dec-13 10:28:34 | 816 bytes | prism/private/wslib/lib/hazard/TF-V |
| 2003-Oct-22 12:20:36 | 204 bytes | prism/private/wslib/lib/hazard/TF-V/1-0-7-10.spec |
| 2003-Nov-11 18:29:52 | 204 bytes | prism/private/wslib/lib/hazard/TF-V/1-0-7-11.spec |
| 2003-Dec-18 14:01:22 | 204 bytes | prism/private/wslib/lib/hazard/TF-V/1-0-7-12.spec |
| 2003-Dec-30 13:42:48 | 204 bytes | prism/private/wslib/lib/hazard/TF-V/1-0-7-13.spec |
| 2004-Feb-10 16:23:22 | 204 bytes | prism/private/wslib/lib/hazard/TF-V/1-0-7-14.spec |
| 2004-Mar-10 19:09:42 | 204 bytes | prism/private/wslib/lib/hazard/TF-V/1-0-7-15.spec |
| 2004-May-19 16:55:40 | 204 bytes | prism/private/wslib/lib/hazard/TF-V/1-0-7-16.spec |

2004-May-20 20:35:42 204 bytes prism/private/wslib/lib/hazard/TF-V/1-0-7-17.spec
2004-Jun-22 22:24:12 204 bytes prism/private/wslib/lib/hazard/TF-V/1-0-7-18.spec
2004-Jul-13 21:59:24 204 bytes prism/private/wslib/lib/hazard/TF-V/1-0-7-19.spec
2004-Jul-16 16:44:42 204 bytes prism/private/wslib/lib/hazard/TF-V/1-0-7-20.spec
2004-Jul-22 10:14:42 204 bytes prism/private/wslib/lib/hazard/TF-V/1-0-7-21.spec
2004-Aug-17 15:29:48 204 bytes prism/private/wslib/lib/hazard/TF-V/1-0-7-22.spec
2004-Aug-22 22:24:46 204 bytes prism/private/wslib/lib/hazard/TF-V/1-0-7-23.spec
2004-Aug-23 22:46:58 204 bytes prism/private/wslib/lib/hazard/TF-V/1-0-7-24.spec
2004-Aug-29 16:25:32 204 bytes prism/private/wslib/lib/hazard/TF-V/1-0-7-25.spec
2004-Oct-15 10:25:40 204 bytes prism/private/wslib/lib/hazard/TF-V/1-0-7-26.spec
2004-Oct-25 20:32:44 204 bytes prism/private/wslib/lib/hazard/TF-V/1-0-7-27.spec
2004-Nov-11 10:48:12 204 bytes prism/private/wslib/lib/hazard/TF-V/1-0-7-28.spec
2003-Aug-21 13:46:30 203 bytes prism/private/wslib/lib/hazard/TF-V/1-0-7-7.spec
2003-Oct-12 11:01:04 203 bytes prism/private/wslib/lib/hazard/TF-V/1-0-7-8.spec
2003-Oct-15 08:27:18 203 bytes prism/private/wslib/lib/hazard/TF-V/1-0-7-9.spec
2004-Dec-13 10:28:34 238 bytes prism/private/wslib/lib/hazard/TGIF-V
2004-Aug-25 16:06:20 198 bytes prism/private/wslib/lib/hazard/TGIF-V/1-0-7-24.spec
2004-Oct-14 09:30:48 201 bytes prism/private/wslib/lib/hazard/TGIF-V/1-0-7-25.spec
2004-Oct-15 10:25:40 201 bytes prism/private/wslib/lib/hazard/TGIF-V/1-0-7-26.spec
2004-Oct-25 20:32:44 201 bytes prism/private/wslib/lib/hazard/TGIF-V/1-0-7-27.spec
2004-Nov-11 10:48:12 201 bytes prism/private/wslib/lib/hazard/TGIF-V/1-0-7-28.spec
2004-Dec-13 10:28:34 238 bytes prism/private/wslib/lib/hazard/TGOF-V
2004-Aug-25 16:07:04 199 bytes prism/private/wslib/lib/hazard/TGOF-V/1-0-7-24.spec
2004-Oct-14 09:31:00 203 bytes prism/private/wslib/lib/hazard/TGOF-V/1-0-7-25.spec
2004-Oct-15 10:25:40 203 bytes prism/private/wslib/lib/hazard/TGOF-V/1-0-7-26.spec
2004-Oct-25 20:32:44 203 bytes prism/private/wslib/lib/hazard/TGOF-V/1-0-7-27.spec
2004-Nov-11 10:48:12 203 bytes prism/private/wslib/lib/hazard/TGOF-V/1-0-7-28.spec
2004-Dec-13 10:28:34 238 bytes prism/private/wslib/lib/hazard/TLO-L
2004-Aug-25 16:02:04 199 bytes prism/private/wslib/lib/hazard/TLO-L/1-0-7-24.spec
2004-Aug-29 16:25:32 199 bytes prism/private/wslib/lib/hazard/TLO-L/1-0-7-25.spec
2004-Oct-15 10:25:40 199 bytes prism/private/wslib/lib/hazard/TLO-L/1-0-7-26.spec
2004-Oct-25 20:32:44 199 bytes prism/private/wslib/lib/hazard/TLO-L/1-0-7-27.spec
2004-Nov-11 10:48:12 199 bytes prism/private/wslib/lib/hazard/TLO-L/1-0-7-28.spec
2004-Dec-13 10:28:35 238 bytes prism/private/wslib/lib/hazard/TPF-L
2004-Aug-25 15:57:44 195 bytes prism/private/wslib/lib/hazard/TPF-L/1-0-7-24.spec
2004-Aug-29 16:25:32 195 bytes prism/private/wslib/lib/hazard/TPF-L/1-0-7-25.spec
2004-Oct-15 10:25:40 195 bytes prism/private/wslib/lib/hazard/TPF-L/1-0-7-26.spec
2004-Oct-25 20:32:44 195 bytes prism/private/wslib/lib/hazard/TPF-L/1-0-7-27.spec
2004-Nov-11 10:48:12 195 bytes prism/private/wslib/lib/hazard/TPF-L/1-0-7-28.spec
2004-Dec-13 10:28:35 884 bytes prism/private/wslib/lib/hazard/TPIT-V
2003-Oct-22 12:20:36 216 bytes prism/private/wslib/lib/hazard/TPIT-V/1-0-7-10.spec
2003-Nov-11 18:29:52 216 bytes prism/private/wslib/lib/hazard/TPIT-V/1-0-7-11.spec
2003-Dec-18 14:01:22 216 bytes prism/private/wslib/lib/hazard/TPIT-V/1-0-7-12.spec
2003-Dec-30 13:42:48 216 bytes prism/private/wslib/lib/hazard/TPIT-V/1-0-7-13.spec
2004-Feb-10 16:23:22 216 bytes prism/private/wslib/lib/hazard/TPIT-V/1-0-7-14.spec
2004-Mar-10 19:09:42 216 bytes prism/private/wslib/lib/hazard/TPIT-V/1-0-7-15.spec
2004-May-19 16:55:40 216 bytes prism/private/wslib/lib/hazard/TPIT-V/1-0-7-16.spec
2004-May-20 20:35:42 216 bytes prism/private/wslib/lib/hazard/TPIT-V/1-0-7-17.spec
2004-Jun-22 22:24:12 216 bytes prism/private/wslib/lib/hazard/TPIT-V/1-0-7-18.spec
2004-Jul-13 21:59:24 216 bytes prism/private/wslib/lib/hazard/TPIT-V/1-0-7-19.spec
2004-Jul-16 16:44:42 216 bytes prism/private/wslib/lib/hazard/TPIT-V/1-0-7-20.spec
2004-Jul-22 10:14:42 216 bytes prism/private/wslib/lib/hazard/TPIT-V/1-0-7-21.spec
2004-Aug-17 15:29:48 216 bytes prism/private/wslib/lib/hazard/TPIT-V/1-0-7-22.spec
2004-Aug-22 22:24:46 216 bytes prism/private/wslib/lib/hazard/TPIT-V/1-0-7-23.spec
2004-Aug-23 22:46:58 216 bytes prism/private/wslib/lib/hazard/TPIT-V/1-0-7-24.spec
2004-Aug-29 16:25:32 216 bytes prism/private/wslib/lib/hazard/TPIT-V/1-0-7-25.spec
2004-Oct-15 10:25:40 216 bytes prism/private/wslib/lib/hazard/TPIT-V/1-0-7-26.spec
2004-Oct-25 20:32:44 216 bytes prism/private/wslib/lib/hazard/TPIT-V/1-0-7-27.spec
2004-Nov-11 10:48:12 216 bytes prism/private/wslib/lib/hazard/TPIT-V/1-0-7-28.spec
2003-Jul-20 16:12:36 215 bytes prism/private/wslib/lib/hazard/TPIT-V/1-0-7-5.spec
2003-Aug-07 15:44:02 215 bytes prism/private/wslib/lib/hazard/TPIT-V/1-0-7-6.spec 2003-Aug-13 11:23:36 215 bytes prism/private/wslib/lib/hazard/TPIT-V/1-0-7-7.spec
2003-Oct-12 11:01:04 215 bytes prism/private/wslib/lib/hazard/TPIT-V/1-0-7-8.spec
2003-Oct-15 08:27:18 215 bytes prism/private/wslib/lib/hazard/TPIT-V/1-0-7-9.spec
2004-Dec-13 10:28:35 816 bytes prism/private/wslib/lib/hazard/TPOT-V
2003-Oct-22 12:20:36 218 bytes prism/private/wslib/lib/hazard/TPOT-V/1-0-7-10.spec
2003-Nov-11 18:29:52 218 bytes prism/private/wslib/lib/hazard/TPOT-V/1-0-7-11.spec
2003-Dec-18 14:01:22 218 bytes prism/private/wslib/lib/hazard/TPOT-V/1-0-7-12.spec
2003-Dec-30 13:42:48 218 bytes prism/private/wslib/lib/hazard/TPOT-V/1-0-7-13.spec
2004-Feb-10 16:23:22 218 bytes prism/private/wslib/lib/hazard/TPOT-V/1-0-7-14.spec
2004-Mar-10 19:09:42 218 bytes prism/private/wslib/lib/hazard/TPOT-V/1-0-7-15.spec
2004-May-19 16:55:40 218 bytes prism/private/wslib/lib/hazard/TPOT-V/1-0-7-16.spec
2004-May-20 20:35:42 218 bytes prism/private/wslib/lib/hazard/TPOT-V/1-0-7-17.spec
2004-Jun-22 22:24:12 218 bytes prism/private/wslib/lib/hazard/TPOT-V/1-0-7-18.spec
2004-Jul-13 21:59:24 218 bytes prism/private/wslib/lib/hazard/TPOT-V/1-0-7-19.spec
2004-Jul-16 16:44:42 218 bytes prism/private/wslib/lib/hazard/TPOT-V/1-0-7-20.spec
2004-Jul-22 10:14:42 218 bytes prism/private/wslib/lib/hazard/TPOT-V/1-0-7-21.spec
2004-Aug-17 15:29:48 218 bytes prism/private/wslib/lib/hazard/TPOT-V/1-0-7-22.spec
2004-Aug-22 22:24:46 218 bytes prism/private/wslib/lib/hazard/TPOT-V/1-0-7-23.spec
2004-Aug-23 22:46:58 218 bytes prism/private/wslib/lib/hazard/TPOT-V/1-0-7-24.spec
2004-Aug-29 16:25:32 218 bytes prism/private/wslib/lib/hazard/TPOT-V/1-0-7-25.spec
2004-Oct-15 10:25:40 218 bytes prism/private/wslib/lib/hazard/TPOT-V/1-0-7-26.spec
2004-Oct-25 20:32:44 218 bytes prism/private/wslib/lib/hazard/TPOT-V/1-0-7-27.spec
2004-Nov-11 10:48:12 218 bytes prism/private/wslib/lib/hazard/TPOT-V/1-0-7-28.spec
2003-Aug-21 13:44:18 217 bytes prism/private/wslib/lib/hazard/TPOT-V/1-0-7-7.spec
2003-Oct-12 11:01:04 217 bytes prism/private/wslib/lib/hazard/TPOT-V/1-0-7-8.spec
2003-Oct-15 08:27:18 217 bytes prism/private/wslib/lib/hazard/TPOT-V/1-0-7-9.spec
2004-Dec-13 10:28:35 238 bytes prism/private/wslib/lib/hazard/TPTB-V
2004-Aug-25 16:03:50 209 bytes prism/private/wslib/lib/hazard/TPTB-V/1-0-7-24.spec
2004-Aug-29 16:25:32 209 bytes prism/private/wslib/lib/hazard/TPTB-V/1-0-7-25.spec
2004-Oct-15 10:25:40 209 bytes prism/private/wslib/lib/hazard/TPTB-V/1-0-7-26.spec
2004-Oct-25 20:32:44 209 bytes prism/private/wslib/lib/hazard/TPTB-V/1-0-7-27.spec
2004-Nov-11 10:48:12 209 bytes prism/private/wslib/lib/hazard/TPTB-V/1-0-7-28.spec
2004-Dec-13 10:28:35 1088 bytes prism/private/wslib/lib/hazard/TR-L
2003-Apr-27 14:15:54 211 bytes prism/private/wslib/lib/hazard/TR-L/1-0-6-15.spec
2003-May-09 16:08:18 210 bytes prism/private/wslib/lib/hazard/TR-L/1-0-7-0.spec
2003-May-28 22:58:56 210 bytes prism/private/wslib/lib/hazard/TR-L/1-0-7-1.spec
2003-Oct-22 12:20:36 211 bytes prism/private/wslib/lib/hazard/TR-L/1-0-7-10.spec
2003-Nov-11 18:29:52 211 bytes prism/private/wslib/lib/hazard/TR-L/1-0-7-11.spec
2003-Dec-18 14:01:22 211 bytes prism/private/wslib/lib/hazard/TR-L/1-0-7-12.spec
2003-Dec-30 13:42:48 211 bytes prism/private/wslib/lib/hazard/TR-L/1-0-7-13.spec
2004-Mar-10 18:46:04 211 bytes prism/private/wslib/lib/hazard/TR-L/1-0-7-14.spec
2004-Mar-10 19:10:28 214 bytes prism/private/wslib/lib/hazard/TR-L/1-0-7-15.spec
2004-May-19 16:55:40 214 bytes prism/private/wslib/lib/hazard/TR-L/1-0-7-16.spec
2004-May-20 20:35:42 214 bytes prism/private/wslib/lib/hazard/TR-L/1-0-7-17.spec
2004-Jun-22 22:24:12 214 bytes prism/private/wslib/lib/hazard/TR-L/1-0-7-18.spec
2004-Jul-13 21:59:24 214 bytes prism/private/wslib/lib/hazard/TR-L/1-0-7-19.spec
2003-Jun-11 13:14:38 210 bytes prism/private/wslib/lib/hazard/TR-L/1-0-7-2.spec
2004-Jul-16 16:44:42 214 bytes prism/private/wslib/lib/hazard/TR-L/1-0-7-20.spec
2004-Jul-22 10:14:42 214 bytes prism/private/wslib/lib/hazard/TR-L/1-0-7-21.spec
2004-Aug-17 15:29:48 214 bytes prism/private/wslib/lib/hazard/TR-L/1-0-7-22.spec
2004-Aug-22 22:24:46 214 bytes prism/private/wslib/lib/hazard/TR-L/1-0-7-23.spec
2004-Aug-23 22:46:58 214 bytes prism/private/wslib/lib/hazard/TR-L/1-0-7-24.spec
2004-Aug-29 16:25:32 214 bytes prism/private/wslib/lib/hazard/TR-L/1-0-7-25.spec
2004-Oct-15 10:25:40 214 bytes prism/private/wslib/lib/hazard/TR-L/1-0-7-26.spec
2004-Oct-25 20:32:44 214 bytes prism/private/wslib/lib/hazard/TR-L/1-0-7-27.spec
2004-Nov-11 10:48:12 214 bytes prism/private/wslib/lib/hazard/TR-L/1-0-7-28.spec
2003-Jun-29 05:49:56 210 bytes prism/private/wslib/lib/hazard/TR-L/1-0-7-3.spec
2003-Jul-09 16:05:22 210 bytes prism/private/wslib/lib/hazard/TR-L/1-0-7-4.spec
2003-Jul-18 10:25:42 210 bytes prism/private/wslib/lib/hazard/TR-L/1-0-7-5.spec
2003-Aug-07 15:44:02 210 bytes prism/private/wslib/lib/hazard/TR-L/1-0-7-6.spec
2003-Aug-13 11:23:36 210 bytes prism/private/wslib/lib/hazard/TR-L/1-0-7-7.spec

| | | |
|---|---|---|
| 2003-Oct-12 11:01:04 | 210 bytes | prism/private/wslib/lib/hazard/TR-L/1-0-7-8.spec |
| 2003-Oct-15 08:27:18 | 210 bytes | prism/private/wslib/lib/hazard/TR-L/1-0-7-9.spec |
| 2004-Dec-13 10:28:35 | 1088 bytes | prism/private/wslib/lib/hazard/TR-V |
| 2003-Apr-27 14:15:54 | 210 bytes | prism/private/wslib/lib/hazard/TR-V/1-0-6-15.spec |
| 2003-May-09 16:08:18 | 209 bytes | prism/private/wslib/lib/hazard/TR-V/1-0-7-0.spec |
| 2003-May-28 22:58:56 | 209 bytes | prism/private/wslib/lib/hazard/TR-V/1-0-7-1.spec |
| 2003-Oct-22 12:20:36 | 210 bytes | prism/private/wslib/lib/hazard/TR-V/1-0-7-10.spec |
| 2003-Nov-11 18:29:52 | 210 bytes | prism/private/wslib/lib/hazard/TR-V/1-0-7-11.spec |
| 2003-Dec-18 14:01:22 | 210 bytes | prism/private/wslib/lib/hazard/TR-V/1-0-7-12.spec |
| 2004-Mar-10 18:47:20 | 210 bytes | prism/private/wslib/lib/hazard/TR-V/1-0-7-13.spec |
| 2004-Mar-10 18:46:40 | 210 bytes | prism/private/wslib/lib/hazard/TR-V/1-0-7-14.spec |
| 2004-Mar-10 19:10:34 | 212 bytes | prism/private/wslib/lib/hazard/TR-V/1-0-7-15.spec |
| 2004-May-20 17:05:02 | 907 bytes | prism/private/wslib/lib/hazard/TR-V/1-0-7-16.spec |
| 2004-May-20 20:35:42 | 907 bytes | prism/private/wslib/lib/hazard/TR-V/1-0-7-17.spec |
| 2004-Jun-22 22:24:12 | 907 bytes | prism/private/wslib/lib/hazard/TR-V/1-0-7-18.spec |
| 2004-Jul-13 21:59:24 | 907 bytes | prism/private/wslib/lib/hazard/TR-V/1-0-7-19.spec |
| 2003-Jun-11 13:14:38 | 209 bytes | prism/private/wslib/lib/hazard/TR-V/1-0-7-2.spec |
| 2004-Jul-16 16:44:42 | 907 bytes | prism/private/wslib/lib/hazard/TR-V/1-0-7-20.spec |
| 2004-Jul-22 10:14:42 | 907 bytes | prism/private/wslib/lib/hazard/TR-V/1-0-7-21.spec |
| 2004-Aug-22 00:44:48 | 1484 bytes | prism/private/wslib/lib/hazard/TR-V/1-0-7-22.spec |
| 2004-Aug-22 22:24:46 | 1484 bytes | prism/private/wslib/lib/hazard/TR-V/1-0-7-23.spec |
| 2004-Aug-23 22:46:58 | 1484 bytes | prism/private/wslib/lib/hazard/TR-V/1-0-7-24.spec |
| 2004-Aug-29 16:25:32 | 1484 bytes | prism/private/wslib/lib/hazard/TR-V/1-0-7-25.spec |
| 2004-Oct-15 10:25:40 | 1484 bytes | prism/private/wslib/lib/hazard/TR-V/1-0-7-26.spec |
| 2004-Oct-25 20:32:44 | 1484 bytes | prism/private/wslib/lib/hazard/TR-V/1-0-7-27.spec |
| 2004-Nov-11 10:48:12 | 1484 bytes | prism/private/wslib/lib/hazard/TR-V/1-0-7-28.spec |
| 2003-Jun-29 05:49:56 | 209 bytes | prism/private/wslib/lib/hazard/TR-V/1-0-7-3.spec |
| 2003-Jul-09 16:05:22 | 209 bytes | prism/private/wslib/lib/hazard/TR-V/1-0-7-4.spec |
| 2003-Jul-18 10:25:42 | 209 bytes | prism/private/wslib/lib/hazard/TR-V/1-0-7-5.spec |
| 2003-Aug-07 15:44:02 | 209 bytes | prism/private/wslib/lib/hazard/TR-V/1-0-7-6.spec |
| 2003-Aug-13 11:23:36 | 209 bytes | prism/private/wslib/lib/hazard/TR-V/1-0-7-7.spec |
| 2003-Oct-12 11:01:04 | 209 bytes | prism/private/wslib/lib/hazard/TR-V/1-0-7-8.spec |
| 2003-Oct-15 08:27:18 | 209 bytes | prism/private/wslib/lib/hazard/TR-V/1-0-7-9.spec |
| 2004-Dec-13 10:28:35 | 442 bytes | prism/private/wslib/lib/hazard/TSO-V |
| 2004-Jul-16 11:14:00 | 200 bytes | prism/private/wslib/lib/hazard/TSO-V/1-0-7-18.spec |
| 2004-Jul-16 11:14:00 | 200 bytes | prism/private/wslib/lib/hazard/TSO-V/1-0-7-19.spec |
| 2004-Jul-16 16:44:42 | 200 bytes | prism/private/wslib/lib/hazard/TSO-V/1-0-7-20.spec |
| 2004-Jul-22 10:14:42 | 200 bytes | prism/private/wslib/lib/hazard/TSO-V/1-0-7-21.spec |
| 2004-Aug-17 15:29:48 | 200 bytes | prism/private/wslib/lib/hazard/TSO-V/1-0-7-22.spec |
| 2004-Aug-22 22:24:46 | 200 bytes | prism/private/wslib/lib/hazard/TSO-V/1-0-7-23.spec |
| 2004-Aug-23 22:46:58 | 200 bytes | prism/private/wslib/lib/hazard/TSO-V/1-0-7-24.spec |
| 2004-Aug-29 16:25:32 | 200 bytes | prism/private/wslib/lib/hazard/TSO-V/1-0-7-25.spec |
| 2004-Oct-15 10:25:40 | 200 bytes | prism/private/wslib/lib/hazard/TSO-V/1-0-7-26.spec |
| 2004-Oct-25 20:32:44 | 200 bytes | prism/private/wslib/lib/hazard/TSO-V/1-0-7-27.spec |
| 2004-Nov-11 10:48:12 | 200 bytes | prism/private/wslib/lib/hazard/TSO-V/1-0-7-28.spec |
| 2004-Dec-13 10:28:35 | 238 bytes | prism/private/wslib/lib/hazard/TTR-L |
| 2004-Aug-25 16:04:30 | 213 bytes | prism/private/wslib/lib/hazard/TTR-L/1-0-7-24.spec |
| 2004-Aug-29 16:25:32 | 213 bytes | prism/private/wslib/lib/hazard/TTR-L/1-0-7-25.spec |
| 2004-Oct-15 10:25:40 | 213 bytes | prism/private/wslib/lib/hazard/TTR-L/1-0-7-26.spec |
| 2004-Oct-25 20:32:44 | 213 bytes | prism/private/wslib/lib/hazard/TTR-L/1-0-7-27.spec |
| 2004-Nov-11 10:48:12 | 213 bytes | prism/private/wslib/lib/hazard/TTR-L/1-0-7-28.spec |
| 2004-Dec-13 10:28:35 | 238 bytes | prism/private/wslib/lib/hazard/TTR-V |
| 2004-Aug-25 16:05:02 | 212 bytes | prism/private/wslib/lib/hazard/TTR-V/1-0-7-24.spec |
| 2004-Aug-29 16:25:32 | 212 bytes | prism/private/wslib/lib/hazard/TTR-V/1-0-7-25.spec |
| 2004-Oct-15 10:25:40 | 212 bytes | prism/private/wslib/lib/hazard/TTR-V/1-0-7-26.spec |
| 2004-Oct-25 20:32:44 | 212 bytes | prism/private/wslib/lib/hazard/TTR-V/1-0-7-27.spec |
| 2004-Nov-11 10:48:12 | 212 bytes | prism/private/wslib/lib/hazard/TTR-V/1-0-7-28.spec |
| 2004-Dec-13 10:28:35 | 238 bytes | prism/private/wslib/lib/hazard/TTV-V |
| 2004-Aug-25 16:05:44 | 204 bytes | prism/private/wslib/lib/hazard/TTV-V/1-0-7-24.spec |
| 2004-Aug-29 16:25:32 | 204 bytes | prism/private/wslib/lib/hazard/TTV-V/1-0-7-25.spec |
| 2004-Oct-15 10:25:40 | 204 bytes | prism/private/wslib/lib/hazard/TTV-V/1-0-7-26.spec |

2004-Oct-25 20:32:44 204 bytes prism/private/wslib/lib/hazard/TTV-V/1-0-7-27.spec
2004-Nov-11 10:48:12 204 bytes prism/private/wslib/lib/hazard/TTV-V/1-0-7-28.spec
2004-Dec-13 10:28:35 238 bytes prism/private/wslib/lib/hazard/TVG-V
2004-Aug-25 16:19:32 203 bytes prism/private/wslib/lib/hazard/TVG-V/1-0-7-24.spec
2004-Aug-29 16:25:32 203 bytes prism/private/wslib/lib/hazard/TVG-V/1-0-7-25.spec
2004-Oct-15 10:25:40 203 bytes prism/private/wslib/lib/hazard/TVG-V/1-0-7-26.spec
2004-Oct-25 20:32:44 203 bytes prism/private/wslib/lib/hazard/TVG-V/1-0-7-27.spec
2004-Nov-11 10:48:12 203 bytes prism/private/wslib/lib/hazard/TVG-V/1-0-7-28.spec
2004-Dec-13 10:28:35 1088 bytes prism/private/wslib/lib/hazard/US-2
2003-Apr-27 14:15:54 217 bytes prism/private/wslib/lib/hazard/US-2/1-0-6-15.spec
2003-May-09 16:08:18 216 bytes prism/private/wslib/lib/hazard/US-2/1-0-7-0.spec
2003-May-28 22:58:56 216 bytes prism/private/wslib/lib/hazard/US-2/1-0-7-1.spec
2003-Oct-22 12:20:36 217 bytes prism/private/wslib/lib/hazard/US-2/1-0-7-10.spec
2003-Nov-11 18:29:52 217 bytes prism/private/wslib/lib/hazard/US-2/1-0-7-11.spec
2003-Dec-18 14:01:22 217 bytes prism/private/wslib/lib/hazard/US-2/1-0-7-12.spec
2003-Dec-30 13:42:48 217 bytes prism/private/wslib/lib/hazard/US-2/1-0-7-13.spec
2004-Feb-10 16:23:22 217 bytes prism/private/wslib/lib/hazard/US-2/1-0-7-14.spec
2004-Mar-10 19:09:42 217 bytes prism/private/wslib/lib/hazard/US-2/1-0-7-15.spec
2004-May-19 16:55:40 217 bytes prism/private/wslib/lib/hazard/US-2/1-0-7-16.spec
2004-May-20 20:35:42 217 bytes prism/private/wslib/lib/hazard/US-2/1-0-7-17.spec
2004-Jun-22 22:24:12 217 bytes prism/private/wslib/lib/hazard/US-2/1-0-7-18.spec
2004-Jul-13 21:59:24 217 bytes prism/private/wslib/lib/hazard/US-2/1-0-7-19.spec
2003-Jun-11 13:14:38 216 bytes prism/private/wslib/lib/hazard/US-2/1-0-7-2.spec
2004-Jul-16 16:44:42 217 bytes prism/private/wslib/lib/hazard/US-2/1-0-7-20.spec
2004-Jul-22 10:14:42 217 bytes prism/private/wslib/lib/hazard/US-2/1-0-7-21.spec
2004-Aug-17 15:29:48 217 bytes prism/private/wslib/lib/hazard/US-2/1-0-7-22.spec
2004-Aug-22 22:24:46 217 bytes prism/private/wslib/lib/hazard/US-2/1-0-7-23.spec
2004-Aug-23 22:46:58 217 bytes prism/private/wslib/lib/hazard/US-2/1-0-7-24.spec
2004-Aug-29 16:25:32 217 bytes prism/private/wslib/lib/hazard/US-2/1-0-7-25.spec
2004-Oct-15 10:25:40 217 bytes prism/private/wslib/lib/hazard/US-2/1-0-7-26.spec
2004-Oct-25 20:32:44 217 bytes prism/private/wslib/lib/hazard/US-2/1-0-7-27.spec
2004-Nov-11 10:48:12 217 bytes prism/private/wslib/lib/hazard/US-2/1-0-7-28.spec
2003-Jun-29 05:49:56 216 bytes prism/private/wslib/lib/hazard/US-2/1-0-7-3.spec
2003-Jul-09 16:05:22 216 bytes prism/private/wslib/lib/hazard/US-2/1-0-7-4.spec
2003-Jul-18 10:25:42 216 bytes prism/private/wslib/lib/hazard/US-2/1-0-7-5.spec
2003-Aug-07 15:44:02 216 bytes prism/private/wslib/lib/hazard/US-2/1-0-7-6.spec
2003-Aug-13 11:23:36 216 bytes prism/private/wslib/lib/hazard/US-2/1-0-7-7.spec
2003-Oct-12 11:01:04 216 bytes prism/private/wslib/lib/hazard/US-2/1-0-7-8.spec
2003-Oct-15 08:27:18 216 bytes prism/private/wslib/lib/hazard/US-2/1-0-7-9.spec
2004-Dec-13 10:28:35 1088 bytes prism/private/wslib/lib/hazard/US-L
2003-Apr-27 14:15:54 218 bytes prism/private/wslib/lib/hazard/US-L/1-0-6-15.spec
2003-May-09 16:08:18 217 bytes prism/private/wslib/lib/hazard/US-L/1-0-7-0.spec
2003-May-28 22:58:56 217 bytes prism/private/wslib/lib/hazard/US-L/1-0-7-1.spec
2003-Oct-22 12:20:36 218 bytes prism/private/wslib/lib/hazard/US-L/1-0-7-10.spec
2003-Nov-11 18:29:52 218 bytes prism/private/wslib/lib/hazard/US-L/1-0-7-11.spec
2003-Dec-18 14:01:22 218 bytes prism/private/wslib/lib/hazard/US-L/1-0-7-12.spec
2003-Dec-30 13:42:48 218 bytes prism/private/wslib/lib/hazard/US-L/1-0-7-13.spec
2004-Feb-10 16:23:22 218 bytes prism/private/wslib/lib/hazard/US-L/1-0-7-14.spec
2004-Mar-10 19:09:42 218 bytes prism/private/wslib/lib/hazard/US-L/1-0-7-15.spec
2004-May-19 16:55:40 218 bytes prism/private/wslib/lib/hazard/US-L/1-0-7-16.spec
2004-May-20 20:35:42 218 bytes prism/private/wslib/lib/hazard/US-L/1-0-7-17.spec
2004-Jun-22 22:24:12 218 bytes prism/private/wslib/lib/hazard/US-L/1-0-7-18.spec
2004-Jul-13 21:59:24 218 bytes prism/private/wslib/lib/hazard/US-L/1-0-7-19.spec
2003-Jun-11 13:14:38 217 bytes prism/private/wslib/lib/hazard/US-L/1-0-7-2.spec
2004-Jul-16 16:44:42 218 bytes prism/private/wslib/lib/hazard/US-L/1-0-7-20.spec
2004-Jul-22 10:14:42 218 bytes prism/private/wslib/lib/hazard/US-L/1-0-7-21.spec
2004-Aug-17 15:29:48 218 bytes prism/private/wslib/lib/hazard/US-L/1-0-7-22.spec
2004-Aug-22 22:24:46 218 bytes prism/private/wslib/lib/hazard/US-L/1-0-7-23.spec
2004-Aug-23 22:46:58 218 bytes prism/private/wslib/lib/hazard/US-L/1-0-7-24.spec
2004-Aug-29 16:25:32 218 bytes prism/private/wslib/lib/hazard/US-L/1-0-7-25.spec
2004-Oct-15 10:25:40 218 bytes prism/private/wslib/lib/hazard/US-L/1-0-7-26.spec 2004-Oct-25 20:32:44 218 bytes prism/private/wslib/lib/hazard/US-L/1-0-7-27.spec
2004-Nov-11 10:48:12 218 bytes prism/private/wslib/lib/hazard/US-L/1-0-7-28.spec
2003-Jun-29 05:49:56 217 bytes prism/private/wslib/lib/hazard/US-L/1-0-7-3.spec
2003-Jul-09 16:05:22 217 bytes prism/private/wslib/lib/hazard/US-L/1-0-7-4.spec
2003-Jul-18 10:25:42 217 bytes prism/private/wslib/lib/hazard/US-L/1-0-7-5.spec
2003-Aug-07 15:44:02 217 bytes prism/private/wslib/lib/hazard/US-L/1-0-7-6.spec
2003-Aug-13 11:23:36 217 bytes prism/private/wslib/lib/hazard/US-L/1-0-7-7.spec
2003-Oct-12 11:01:04 217 bytes prism/private/wslib/lib/hazard/US-L/1-0-7-8.spec
2003-Oct-15 08:27:18 217 bytes prism/private/wslib/lib/hazard/US-L/1-0-7-9.spec
2004-Dec-13 10:28:35 1088 bytes prism/private/wslib/lib/hazard/US-S
2003-Apr-27 14:15:54 215 bytes prism/private/wslib/lib/hazard/US-S/1-0-6-15.spec
2003-May-09 16:08:18 214 bytes prism/private/wslib/lib/hazard/US-S/1-0-7-0.spec
2003-May-28 22:58:56 214 bytes prism/private/wslib/lib/hazard/US-S/1-0-7-1.spec
2003-Oct-22 12:20:36 215 bytes prism/private/wslib/lib/hazard/US-S/1-0-7-10.spec
2003-Nov-11 18:29:52 215 bytes prism/private/wslib/lib/hazard/US-S/1-0-7-11.spec
2003-Dec-18 14:01:22 215 bytes prism/private/wslib/lib/hazard/US-S/1-0-7-12.spec
2003-Dec-30 13:42:48 215 bytes prism/private/wslib/lib/hazard/US-S/1-0-7-13.spec
2004-Feb-10 16:23:22 215 bytes prism/private/wslib/lib/hazard/US-S/1-0-7-14.spec
2004-Mar-10 19:09:42 215 bytes prism/private/wslib/lib/hazard/US-S/1-0-7-15.spec
2004-May-19 16:55:40 215 bytes prism/private/wslib/lib/hazard/US-S/1-0-7-16.spec
2004-May-20 20:35:42 215 bytes prism/private/wslib/lib/hazard/US-S/1-0-7-17.spec
2004-Jun-22 22:24:12 215 bytes prism/private/wslib/lib/hazard/US-S/1-0-7-18.spec
2004-Jul-13 21:59:24 215 bytes prism/private/wslib/lib/hazard/US-S/1-0-7-19.spec
2003-Jun-11 13:14:38 214 bytes prism/private/wslib/lib/hazard/US-S/1-0-7-2.spec
2004-Jul-16 16:44:42 215 bytes prism/private/wslib/lib/hazard/US-S/1-0-7-20.spec
2004-Jul-22 10:14:42 215 bytes prism/private/wslib/lib/hazard/US-S/1-0-7-21.spec
2004-Aug-17 15:29:48 215 bytes prism/private/wslib/lib/hazard/US-S/1-0-7-22.spec
2004-Aug-22 22:24:46 215 bytes prism/private/wslib/lib/hazard/US-S/1-0-7-23.spec
2004-Aug-23 22:46:58 215 bytes prism/private/wslib/lib/hazard/US-S/1-0-7-24.spec
2004-Aug-29 16:25:32 215 bytes prism/private/wslib/lib/hazard/US-S/1-0-7-25.spec
2004-Oct-15 10:25:40 215 bytes prism/private/wslib/lib/hazard/US-S/1-0-7-26.spec
2004-Oct-25 20:32:44 215 bytes prism/private/wslib/lib/hazard/US-S/1-0-7-27.spec
2004-Nov-11 10:48:12 215 bytes prism/private/wslib/lib/hazard/US-S/1-0-7-28.spec
2003-Jun-29 05:49:56 214 bytes prism/private/wslib/lib/hazard/US-S/1-0-7-3.spec
2003-Jul-09 16:05:22 214 bytes prism/private/wslib/lib/hazard/US-S/1-0-7-4.spec
2003-Jul-18 10:25:42 214 bytes prism/private/wslib/lib/hazard/US-S/1-0-7-5.spec
2003-Aug-07 15:44:02 214 bytes prism/private/wslib/lib/hazard/US-S/1-0-7-6.spec
2003-Aug-13 11:23:36 214 bytes prism/private/wslib/lib/hazard/US-S/1-0-7-7.spec
2003-Oct-12 11:01:04 214 bytes prism/private/wslib/lib/hazard/US-S/1-0-7-8.spec
2003-Oct-15 08:27:18 214 bytes prism/private/wslib/lib/hazard/US-S/1-0-7-9.spec
2004-Dec-13 10:28:35 1088 bytes prism/private/wslib/lib/hazard/US-V
2003-Apr-27 14:15:54 235 bytes prism/private/wslib/lib/hazard/US-V/1-0-6-15.spec
2003-May-09 16:08:18 234 bytes prism/private/wslib/lib/hazard/US-V/1-0-7-0.spec
2003-May-28 22:58:56 234 bytes prism/private/wslib/lib/hazard/US-V/1-0-7-1.spec
2003-Oct-22 12:20:36 235 bytes prism/private/wslib/lib/hazard/US-V/1-0-7-10.spec
2003-Nov-11 18:29:52 235 bytes prism/private/wslib/lib/hazard/US-V/1-0-7-11.spec
2003-Dec-18 14:01:22 235 bytes prism/private/wslib/lib/hazard/US-V/1-0-7-12.spec
2003-Dec-30 13:42:48 235 bytes prism/private/wslib/lib/hazard/US-V/1-0-7-13.spec
2004-Feb-10 16:23:22 235 bytes prism/private/wslib/lib/hazard/US-V/1-0-7-14.spec
2004-Mar-10 19:09:42 235 bytes prism/private/wslib/lib/hazard/US-V/1-0-7-15.spec
2004-May-19 16:55:40 235 bytes prism/private/wslib/lib/hazard/US-V/1-0-7-16.spec
2004-May-20 20:35:42 235 bytes prism/private/wslib/lib/hazard/US-V/1-0-7-17.spec
2004-Jun-22 22:24:12 235 bytes prism/private/wslib/lib/hazard/US-V/1-0-7-18.spec
2004-Jul-13 21:59:24 235 bytes prism/private/wslib/lib/hazard/US-V/1-0-7-19.spec
2003-Jun-11 13:14:38 234 bytes prism/private/wslib/lib/hazard/US-V/1-0-7-2.spec
2004-Jul-16 16:44:42 235 bytes prism/private/wslib/lib/hazard/US-V/1-0-7-20.spec
2004-Jul-22 10:14:42 235 bytes prism/private/wslib/lib/hazard/US-V/1-0-7-21.spec
2004-Aug-17 15:29:48 235 bytes prism/private/wslib/lib/hazard/US-V/1-0-7-22.spec
2004-Aug-22 22:24:46 235 bytes prism/private/wslib/lib/hazard/US-V/1-0-7-23.spec
2004-Aug-23 22:46:58 235 bytes prism/private/wslib/lib/hazard/US-V/1-0-7-24.spec
2004-Aug-29 16:25:32 235 bytes prism/private/wslib/lib/hazard/US-V/1-0-7-25.spec 2004-Oct-15 10:25:40 235 bytes prism/private/wslib/lib/hazard/US-V/1-0-7-26.spec
2004-Oct-25 20:32:44 235 bytes prism/private/wslib/lib/hazard/US-V/1-0-7-27.spec
2004-Nov-11 10:48:12 235 bytes prism/private/wslib/lib/hazard/US-V/1-0-7-28.spec
2003-Jun-29 05:49:56 234 bytes prism/private/wslib/lib/hazard/US-V/1-0-7-3.spec
2003-Jul-09 16:05:22 234 bytes prism/private/wslib/lib/hazard/US-V/1-0-7-4.spec
2003-Jul-18 10:25:42 234 bytes prism/private/wslib/lib/hazard/US-V/1-0-7-5.spec
2003-Aug-07 15:44:02 234 bytes prism/private/wslib/lib/hazard/US-V/1-0-7-6.spec
2003-Aug-13 11:23:36 234 bytes prism/private/wslib/lib/hazard/US-V/1-0-7-7.spec
2003-Oct-12 11:01:04 234 bytes prism/private/wslib/lib/hazard/US-V/1-0-7-8.spec
2003-Oct-15 08:27:18 234 bytes prism/private/wslib/lib/hazard/US-V/1-0-7-9.spec
2004-Dec-13 10:28:35 170 bytes prism/private/wslib/lib/phasetype
2004-Dec-13 10:28:35 170 bytes prism/private/wslib/lib/phasetype/PH
2004-Nov-01 18:27:18 6077 bytes prism/private/wslib/lib/phasetype/PH/1-0-7-26.spec
2004-Nov-06 10:02:28 6077 bytes prism/private/wslib/lib/phasetype/PH/1-0-7-27.spec
2004-Nov-11 10:48:12 6077 bytes prism/private/wslib/lib/phasetype/PH/1-0-7-28.spec
2004-Dec-13 10:28:35 170 bytes prism/private/wslib/lib/phasetype/PT
2004-Nov-01 18:26:50 6080 bytes prism/private/wslib/lib/phasetype/PT/1-0-7-26.spec
2004-Nov-06 10:02:28 6080 bytes prism/private/wslib/lib/phasetype/PT/1-0-7-27.spec
2004-Nov-11 10:48:12 6080 bytes prism/private/wslib/lib/phasetype/PT/1-0-7-28.spec
2004-Dec-13 10:28:35 204 bytes prism/private/wslib/lib/phasetype/X
2004-Oct-14 15:48:58 5520 bytes prism/private/wslib/lib/phasetype/X/1-0-7-25.spec
2004-Oct-19 15:31:26 5520 bytes prism/private/wslib/lib/phasetype/X/1-0-7-26.spec
2004-Nov-06 10:02:28 5520 bytes prism/private/wslib/lib/phasetype/X/1-0-7-27.spec
2004-Nov-11 10:48:12 5520 bytes prism/private/wslib/lib/phasetype/X/1-0-7-28.spec
2004-Dec-13 10:28:35 884 bytes prism/private/wslib/lib/pipeloss
2003-Apr-27 14:15:54 186 bytes prism/private/wslib/lib/pipeloss/1-0-6-15.spec
2003-May-27 16:54:44 524 bytes prism/private/wslib/lib/pipeloss/1-0-7-0.spec
2003-May-28 22:58:56 524 bytes prism/private/wslib/lib/pipeloss/1-0-7-1.spec
2003-Nov-26 12:12:58 724 bytes prism/private/wslib/lib/pipeloss/1-0-7-10.spec
2003-Nov-26 12:10:36 1036 bytes prism/private/wslib/lib/pipeloss/1-0-7-11.spec
2003-Dec-18 14:01:22 1036 bytes prism/private/wslib/lib/pipeloss/1-0-7-12.spec
2003-Dec-30 13:42:48 1036 bytes prism/private/wslib/lib/pipeloss/1-0-7-13.spec
2004-Feb-10 16:23:22 1036 bytes prism/private/wslib/lib/pipeloss/1-0-7-14.spec
2003-Jun-11 13:14:38 524 bytes prism/private/wslib/lib/pipeloss/1-0-7-2.spec
2003-Jul-09 16:12:40 187 bytes prism/private/wslib/lib/pipeloss/1-0-7-3.spec
2003-Nov-26 12:13:18 723 bytes prism/private/wslib/lib/pipeloss/1-0-7-4.spec
2003-Nov-26 12:13:26 723 bytes prism/private/wslib/lib/pipeloss/1-0-7-5.spec
2003-Nov-26 12:13:34 723 bytes prism/private/wslib/lib/pipeloss/1-0-7-6.spec
2003-Nov-26 12:13:42 723 bytes prism/private/wslib/lib/pipeloss/1-0-7-7.spec
2003-Nov-26 12:13:54 723 bytes prism/private/wslib/lib/pipeloss/1-0-7-8.spec
2003-Nov-26 12:14:00 723 bytes prism/private/wslib/lib/pipeloss/1-0-7-9.spec
2004-Dec-13 10:28:35 578 bytes prism/private/wslib/lib/pipeloss/PL-2
2004-Dec-13 10:28:35 204 bytes prism/private/wslib/lib/pipeloss/PL-2-RD
2004-Oct-08 14:24:50 395 bytes prism/private/wslib/lib/pipeloss/PL-2-RD/1-0-7-25.spec
2004-Oct-15 10:25:40 395 bytes prism/private/wslib/lib/pipeloss/PL-2-RD/1-0-7-26.spec
2004-Oct-25 20:32:44 395 bytes prism/private/wslib/lib/pipeloss/PL-2-RD/1-0-7-27.spec
2004-Nov-11 10:48:12 395 bytes prism/private/wslib/lib/pipeloss/PL-2-RD/1-0-7-28.spec
2004-Mar-26 10:05:32 1046 bytes prism/private/wslib/lib/pipeloss/PL-2/1-0-7-14.spec
2004-Mar-19 12:25:32 1047 bytes prism/private/wslib/lib/pipeloss/PL-2/1-0-7-15.spec
2004-May-19 17:45:08 1062 bytes prism/private/wslib/lib/pipeloss/PL-2/1-0-7-16.spec
2004-May-20 20:35:42 1062 bytes prism/private/wslib/lib/pipeloss/PL-2/1-0-7-17.spec
2004-Jun-22 22:24:12 1062 bytes prism/private/wslib/lib/pipeloss/PL-2/1-0-7-18.spec
2004-Jul-13 21:59:24 1062 bytes prism/private/wslib/lib/pipeloss/PL-2/1-0-7-19.spec
2004-Jul-16 16:44:42 1062 bytes prism/private/wslib/lib/pipeloss/PL-2/1-0-7-20.spec
2004-Jul-22 10:14:42 1062 bytes prism/private/wslib/lib/pipeloss/PL-2/1-0-7-21.spec
2004-Aug-17 15:29:48 1062 bytes prism/private/wslib/lib/pipeloss/PL-2/1-0-7-22.spec
2004-Aug-22 22:24:46 1062 bytes prism/private/wslib/lib/pipeloss/PL-2/1-0-7-23.spec
2004-Aug-23 22:46:58 1062 bytes prism/private/wslib/lib/pipeloss/PL-2/1-0-7-24.spec
2004-Aug-29 16:25:32 1062 bytes prism/private/wslib/lib/pipeloss/PL-2/1-0-7-25.spec
2004-Oct-15 10:25:40 1062 bytes prism/private/wslib/lib/pipeloss/PL-2/1-0-7-26.spec
2004-Oct-25 20:32:44 1062 bytes prism/private/wslib/lib/pipeloss/PL-2/1-0-7-27.spec 2004-Nov-11 10:48:12 1062 bytes prism/private/wslib/lib/pipeloss/PL-2/1-0-7-28.spec
2004-Dec-13 10:28:35 578 bytes prism/private/wslib/lib/pipeloss/PL-L
2004-Dec-13 10:28:35 204 bytes prism/private/wslib/lib/pipeloss/PL-L-RD
2004-Oct-08 14:25:06 438 bytes prism/private/wslib/lib/pipeloss/PL-L-RD/1-0-7-25.spec
2004-Oct-15 10:25:40 438 bytes prism/private/wslib/lib/pipeloss/PL-L-RD/1-0-7-26.spec
2004-Oct-25 20:32:44 438 bytes prism/private/wslib/lib/pipeloss/PL-L-RD/1-0-7-27.spec
2004-Nov-11 11:21:24 386 bytes prism/private/wslib/lib/pipeloss/PL-L-RD/1-0-7-28.spec
2004-Mar-26 10:05:44 1046 bytes prism/private/wslib/lib/pipeloss/PL-L/1-0-7-14.spec
2004-Mar-25 21:35:52 732 bytes prism/private/wslib/lib/pipeloss/PL-L/1-0-7-15.spec
2004-May-19 16:55:40 732 bytes prism/private/wslib/lib/pipeloss/PL-L/1-0-7-16.spec
2004-May-20 20:35:42 732 bytes prism/private/wslib/lib/pipeloss/PL-L/1-0-7-17.spec
2004-Jun-22 22:24:12 732 bytes prism/private/wslib/lib/pipeloss/PL-L/1-0-7-18.spec
2004-Jul-13 21:59:24 732 bytes prism/private/wslib/lib/pipeloss/PL-L/1-0-7-19.spec
2004-Jul-16 16:44:42 732 bytes prism/private/wslib/lib/pipeloss/PL-L/1-0-7-20.spec
2004-Jul-22 10:14:42 732 bytes prism/private/wslib/lib/pipeloss/PL-L/1-0-7-21.spec
2004-Aug-17 15:29:48 732 bytes prism/private/wslib/lib/pipeloss/PL-L/1-0-7-22.spec
2004-Aug-22 22:24:46 732 bytes prism/private/wslib/lib/pipeloss/PL-L/1-0-7-23.spec
2004-Aug-23 22:46:58 732 bytes prism/private/wslib/lib/pipeloss/PL-L/1-0-7-24.spec
2004-Aug-29 16:25:32 732 bytes prism/private/wslib/lib/pipeloss/PL-L/1-0-7-25.spec
2004-Oct-15 10:25:40 732 bytes prism/private/wslib/lib/pipeloss/PL-L/1-0-7-26.spec
2004-Oct-25 20:32:44 732 bytes prism/private/wslib/lib/pipeloss/PL-L/1-0-7-27.spec
2004-Nov-11 10:48:12 732 bytes prism/private/wslib/lib/pipeloss/PL-L/1-0-7-28.spec
2004-Dec-13 10:28:35 578 bytes prism/private/wslib/lib/pipeloss/PL-S
2004-Dec-13 10:28:35 204 bytes prism/private/wslib/lib/pipeloss/PL-S-RD
2004-Oct-08 14:25:26 436 bytes prism/private/wslib/lib/pipeloss/PL-S-RD/1-0-7-25.spec
2004-Oct-15 10:25:40 436 bytes prism/private/wslib/lib/pipeloss/PL-S-RD/1-0-7-26.spec
2004-Nov-06 19:13:48 436 bytes prism/private/wslib/lib/pipeloss/PL-S-RD/1-0-7-27.spec
2004-Nov-11 10:48:12 436 bytes prism/private/wslib/lib/pipeloss/PL-S-RD/1-0-7-28.spec
2004-Mar-26 10:05:52 1045 bytes prism/private/wslib/lib/pipeloss/PL-S/1-0-7-14.spec
2004-Mar-26 13:39:26 1085 bytes prism/private/wslib/lib/pipeloss/PL-S/1-0-7-15.spec
2004-May-19 17:51:58 1086 bytes prism/private/wslib/lib/pipeloss/PL-S/1-0-7-16.spec
2004-Jun-15 10:17:28 1085 bytes prism/private/wslib/lib/pipeloss/PL-S/1-0-7-17.spec
2004-Jun-22 22:24:12 1085 bytes prism/private/wslib/lib/pipeloss/PL-S/1-0-7-18.spec
2004-Jul-13 21:59:24 1085 bytes prism/private/wslib/lib/pipeloss/PL-S/1-0-7-19.spec
2004-Jul-16 16:44:42 1085 bytes prism/private/wslib/lib/pipeloss/PL-S/1-0-7-20.spec
2004-Jul-22 10:14:42 1085 bytes prism/private/wslib/lib/pipeloss/PL-S/1-0-7-21.spec
2004-Aug-17 15:29:48 1085 bytes prism/private/wslib/lib/pipeloss/PL-S/1-0-7-22.spec
2004-Aug-22 22:24:46 1085 bytes prism/private/wslib/lib/pipeloss/PL-S/1-0-7-23.spec
2004-Aug-23 22:46:58 1085 bytes prism/private/wslib/lib/pipeloss/PL-S/1-0-7-24.spec
2004-Aug-29 16:25:32 1085 bytes prism/private/wslib/lib/pipeloss/PL-S/1-0-7-25.spec
2004-Oct-15 10:25:40 1085 bytes prism/private/wslib/lib/pipeloss/PL-S/1-0-7-26.spec
2004-Oct-25 20:32:44 1085 bytes prism/private/wslib/lib/pipeloss/PL-S/1-0-7-27.spec
2004-Nov-11 10:48:12 1085 bytes prism/private/wslib/lib/pipeloss/PL-S/1-0-7-28.spec
2004-Dec-13 10:28:35 578 bytes prism/private/wslib/lib/pipeloss/PL-V
2004-Dec-13 10:28:35 204 bytes prism/private/wslib/lib/pipeloss/PL-V-RD
2004-Oct-08 14:22:56 384 bytes prism/private/wslib/lib/pipeloss/PL-V-RD/1-0-7-25.spec
2004-Oct-15 10:25:40 384 bytes prism/private/wslib/lib/pipeloss/PL-V-RD/1-0-7-26.spec
2004-Oct-25 20:32:44 384 bytes prism/private/wslib/lib/pipeloss/PL-V-RD/1-0-7-27.spec
2004-Nov-11 10:48:12 384 bytes prism/private/wslib/lib/pipeloss/PL-V-RD/1-0-7-28.spec
2004-Mar-26 10:06:16 1045 bytes prism/private/wslib/lib/pipeloss/PL-V/1-0-7-14.spec
2004-Mar-26 13:39:36 1086 bytes prism/private/wslib/lib/pipeloss/PL-V/1-0-7-15.spec
2004-May-20 10:03:46 1086 bytes prism/private/wslib/lib/pipeloss/PL-V/1-0-7-16.spec
2004-Jun-02 09:40:34 1086 bytes prism/private/wslib/lib/pipeloss/PL-V/1-0-7-17.spec
2004-Jun-22 22:24:12 1086 bytes prism/private/wslib/lib/pipeloss/PL-V/1-0-7-18.spec
2004-Jul-13 21:59:24 1086 bytes prism/private/wslib/lib/pipeloss/PL-V/1-0-7-19.spec
2004-Jul-16 16:44:42 1086 bytes prism/private/wslib/lib/pipeloss/PL-V/1-0-7-20.spec
2004-Jul-22 10:14:42 1086 bytes prism/private/wslib/lib/pipeloss/PL-V/1-0-7-21.spec
2004-Aug-17 15:29:48 1086 bytes prism/private/wslib/lib/pipeloss/PL-V/1-0-7-22.spec
2004-Aug-22 22:24:46 1086 bytes prism/private/wslib/lib/pipeloss/PL-V/1-0-7-23.spec
2004-Aug-23 22:46:58 1086 bytes prism/private/wslib/lib/pipeloss/PL-V/1-0-7-24.spec
2004-Aug-29 16:25:32 1086 bytes prism/private/wslib/lib/pipeloss/PL-V/1-0-7-25.spec

```
2004-Oct-15 10:25:40   1086 bytes   prism/private/wslib/lib/pipeloss/PL-V/1-0-7-26.spec
2004-Oct-25 20:32:44   1086 bytes   prism/private/wslib/lib/pipeloss/PL-V/1-0-7-27.spec
2004-Nov-11 10:48:12   1086 bytes   prism/private/wslib/lib/pipeloss/PL-V/1-0-7-28.spec
2004-Dec-13 10:28:35   1088 bytes   prism/private/wslib/lib/plant
2003-May-09 15:46:08   1193 bytes   prism/private/wslib/lib/plant/1-0-6-15.spec
2003-May-11 21:38:54   1190 bytes   prism/private/wslib/lib/plant/1-0-7-0.spec
2003-May-28 22:58:56   1190 bytes   prism/private/wslib/lib/plant/1-0-7-1.spec
2003-Oct-22 12:20:36   1461 bytes   prism/private/wslib/lib/plant/1-0-7-10.spec
2003-Nov-11 18:29:52   1461 bytes   prism/private/wslib/lib/plant/1-0-7-11.spec
2003-Dec-18 14:01:22   1461 bytes   prism/private/wslib/lib/plant/1-0-7-12.spec
2003-Dec-30 13:42:48   1461 bytes   prism/private/wslib/lib/plant/1-0-7-13.spec
2004-Feb-10 16:23:24   1461 bytes   prism/private/wslib/lib/plant/1-0-7-14.spec
2004-Mar-10 19:09:42   1461 bytes   prism/private/wslib/lib/plant/1-0-7-15.spec
2004-May-19 16:55:40   1461 bytes   prism/private/wslib/lib/plant/1-0-7-16.spec
2004-May-20 20:35:42   1461 bytes   prism/private/wslib/lib/plant/1-0-7-17.spec
2004-Jun-22 22:24:12   1461 bytes   prism/private/wslib/lib/plant/1-0-7-18.spec
2004-Jul-13 21:59:24   1461 bytes   prism/private/wslib/lib/plant/1-0-7-19.spec
2003-Jun-24 01:12:56   1460 bytes   prism/private/wslib/lib/plant/1-0-7-2.spec
2004-Jul-16 16:44:42   1461 bytes   prism/private/wslib/lib/plant/1-0-7-20.spec
2004-Aug-17 11:03:18   1700 bytes   prism/private/wslib/lib/plant/1-0-7-21.spec
2004-Aug-17 15:29:48   1700 bytes   prism/private/wslib/lib/plant/1-0-7-22.spec
2004-Aug-22 22:24:46   1700 bytes   prism/private/wslib/lib/plant/1-0-7-23.spec
2004-Aug-23 22:46:58   1700 bytes   prism/private/wslib/lib/plant/1-0-7-24.spec
2004-Aug-29 16:25:32   1700 bytes   prism/private/wslib/lib/plant/1-0-7-25.spec
2004-Oct-15 10:25:40   1700 bytes   prism/private/wslib/lib/plant/1-0-7-26.spec
2004-Oct-25 20:32:44   1700 bytes   prism/private/wslib/lib/plant/1-0-7-27.spec
2004-Nov-11 10:48:12   1700 bytes   prism/private/wslib/lib/plant/1-0-7-28.spec
2003-Jun-29 05:49:56   1460 bytes   prism/private/wslib/lib/plant/1-0-7-3.spec
2003-Jul-09 16:05:22   1460 bytes   prism/private/wslib/lib/plant/1-0-7-4.spec
2003-Jul-18 10:25:42   1460 bytes   prism/private/wslib/lib/plant/1-0-7-5.spec
2003-Aug-07 15:44:02   1460 bytes   prism/private/wslib/lib/plant/1-0-7-6.spec
2003-Aug-13 11:23:38   1460 bytes   prism/private/wslib/lib/plant/1-0-7-7.spec
2003-Oct-12 11:01:04   1460 bytes   prism/private/wslib/lib/plant/1-0-7-8.spec
2003-Oct-15 08:27:18   1460 bytes   prism/private/wslib/lib/plant/1-0-7-9.spec
2004-Dec-13 10:28:36   1088 bytes   prism/private/wslib/lib/relief
2003-Apr-27 14:15:54   1048 bytes   prism/private/wslib/lib/relief/1-0-6-15.spec
2003-May-09 16:08:18   1047 bytes   prism/private/wslib/lib/relief/1-0-7-0.spec
2003-May-28 22:58:56   1047 bytes   prism/private/wslib/lib/relief/1-0-7-1.spec
2003-Oct-22 12:20:36   1048 bytes   prism/private/wslib/lib/relief/1-0-7-10.spec
2003-Nov-11 18:29:52   1048 bytes   prism/private/wslib/lib/relief/1-0-7-11.spec
2003-Dec-18 14:01:22   1048 bytes   prism/private/wslib/lib/relief/1-0-7-12.spec
2003-Dec-30 13:42:48   1048 bytes   prism/private/wslib/lib/relief/1-0-7-13.spec
2004-Feb-10 16:23:24   1048 bytes   prism/private/wslib/lib/relief/1-0-7-14.spec
2004-Mar-10 19:09:42   1048 bytes   prism/private/wslib/lib/relief/1-0-7-15.spec
2004-May-19 16:55:40   1048 bytes   prism/private/wslib/lib/relief/1-0-7-16.spec
2004-May-20 20:35:42   1048 bytes   prism/private/wslib/lib/relief/1-0-7-17.spec
2004-Jun-22 22:24:12   1048 bytes   prism/private/wslib/lib/relief/1-0-7-18.spec
2004-Jul-13 21:59:24   1048 bytes   prism/private/wslib/lib/relief/1-0-7-19.spec
2003-Jun-11 13:14:38   1047 bytes   prism/private/wslib/lib/relief/1-0-7-2.spec
2004-Jul-16 16:44:42   1048 bytes   prism/private/wslib/lib/relief/1-0-7-20.spec
2004-Jul-22 10:14:42   1048 bytes   prism/private/wslib/lib/relief/1-0-7-21.spec
2004-Aug-17 15:29:50   1048 bytes   prism/private/wslib/lib/relief/1-0-7-22.spec
2004-Aug-22 22:24:46   1048 bytes   prism/private/wslib/lib/relief/1-0-7-23.spec
2004-Aug-23 22:46:58   1048 bytes   prism/private/wslib/lib/relief/1-0-7-24.spec
2004-Aug-29 16:25:32   1048 bytes   prism/private/wslib/lib/relief/1-0-7-25.spec
2004-Oct-15 10:25:40   1048 bytes   prism/private/wslib/lib/relief/1-0-7-26.spec
2004-Oct-25 20:32:46   1048 bytes   prism/private/wslib/lib/relief/1-0-7-27.spec
2004-Nov-11 10:48:12   1048 bytes   prism/private/wslib/lib/relief/1-0-7-28.spec
2003-Jun-29 05:49:56   1047 bytes   prism/private/wslib/lib/relief/1-0-7-3.spec
2003-Jul-09 16:05:22   1047 bytes   prism/private/wslib/lib/relief/1-0-7-4.spec
2003-Jul-18 10:25:42   1047 bytes   prism/private/wslib/lib/relief/1-0-7-5.spec
```

2003-Aug-07 15:44:02 1047 bytes prism/private/wslib/lib/relief/1-0-7-6.spec
2003-Aug-13 11:23:38 1047 bytes prism/private/wslib/lib/relief/1-0-7-7.spec
2003-Oct-12 11:01:04 1047 bytes prism/private/wslib/lib/relief/1-0-7-8.spec
2003-Oct-15 08:27:18 1047 bytes prism/private/wslib/lib/relief/1-0-7-9.spec
2004-Dec-13 10:52:15 476 bytes prism/private/wslib/tool
2004-Oct-17 16:02:24 14469 bytes prism/private/wslib/tool/AnalyseScene.pm
2004-Jul-07 12:52:58 6165 bytes prism/private/wslib/tool/dump-scenario-ids
2004-Aug-29 14:36:56 8820 bytes prism/private/wslib/tool/filter-impact-output
2004-Mar-14 11:08:32 88 bytes prism/private/wslib/tool/filter-scenario-ids
2004-Jul-22 10:42:00 11210 bytes prism/private/wslib/tool/impact-scenario
2004-Apr-02 16:20:58 4737 bytes prism/private/wslib/tool/inc-version
2004-Nov-07 14:43:56 1761 bytes prism/private/wslib/tool/list-error-nums
2004-Jun-06 09:04:30 6340 bytes prism/private/wslib/tool/query-scenario
2004-Jun-06 09:04:52 7664 bytes prism/private/wslib/tool/query-template
2004-Mar-15 09:47:06 9808 bytes prism/private/wslib/tool/ws-compile
2004-Mar-17 15:26:28 3961 bytes prism/private/wslib/tool/ws-compile-load
2004-Jul-07 09:43:24 9955 bytes prism/private/wslib/tool/ws-load
2004-Nov-11 10:48:18 9 bytes prism/private/wslib/version.txt
2004-Dec-13 10:26:51 170 bytes prism/private/wsspec
2004-Jun-10 20:08:44 3589 bytes prism/private/wsspec/reap-db.p
2004-Jul-14 15:02:30 6108 bytes prism/private/wsspec/reap-files.p
2003-Nov-25 05:55:22 3569 bytes prism/private/wsspec/view.p
2004-Dec-13 10:26:51 238 bytes prism/public
2003-Aug-24 14:55:26 1406 bytes prism/public/favicon.ico
2004-Dec-13 10:26:51 68 bytes prism/public/handbook
2004-Dec-13 10:26:51 170 bytes prism/public/image
2004-Dec-13 10:26:51 1530 bytes prism/public/image/common
2003-Apr-24 13:42:14 145 bytes prism/public/image/common/add_under.gif
2002-Dec-03 10:46:54 152 bytes prism/public/image/common/archive.gif
2004-May-12 14:16:12 888 bytes prism/public/image/common/book.gif
2002-Dec-03 10:46:54 908 bytes prism/public/image/common/bullet.gif
2002-Dec-03 10:46:54 894 bytes prism/public/image/common/calc.gif
2002-Dec-03 10:46:54 843 bytes prism/public/image/common/check.gif
2002-Dec-03 10:46:54 132 bytes prism/public/image/common/check2.gif
2002-Dec-03 10:46:54 85 bytes prism/public/image/common/clear.gif
2003-Nov-04 16:05:16 152 bytes prism/public/image/common/clock.gif
2002-Dec-03 10:46:54 857 bytes prism/public/image/common/cross.gif
2002-Dec-03 10:46:54 143 bytes prism/public/image/common/db_add.gif
2002-Dec-03 10:46:54 153 bytes prism/public/image/common/delete.gif
2003-Apr-29 15:47:20 152 bytes prism/public/image/common/doc-check.gif
2002-Dec-03 10:46:54 150 bytes prism/public/image/common/drawing.gif
2003-Mar-01 22:19:28 177 bytes prism/public/image/common/equip-red.gif
2004-Apr-01 18:40:28 176 bytes prism/public/image/common/equip.gif
2003-Feb-01 17:01:34 124 bytes prism/public/image/common/erase.gif
2003-Jan-13 17:59:10 123 bytes prism/public/image/common/info.gif
2002-Dec-03 10:46:54 920 bytes prism/public/image/common/link0.gif
2002-Dec-03 10:46:54 929 bytes prism/public/image/common/link1.gif
2003-Jan-09 08:29:16 920 bytes prism/public/image/common/link2.gif
2003-Jan-13 17:59:10 156 bytes prism/public/image/common/link3.gif
2003-Jan-13 18:05:10 156 bytes prism/public/image/common/link4.gif
2004-Jan-20 13:44:30 983 bytes prism/public/image/common/lock.gif
2002-Dec-03 10:46:54 151 bytes prism/public/image/common/locked.gif
2002-Dec-03 10:46:54 167 bytes prism/public/image/common/locked2.gif
2003-Jan-31 20:54:36 141 bytes prism/public/image/common/number.gif
2004-Mar-26 16:19:16 593 bytes prism/public/image/common/orient.gif
2002-Dec-03 10:46:54 154 bytes prism/public/image/common/pickcard.gif
2003-Apr-24 18:36:24 893 bytes prism/public/image/common/pipefits.gif
2003-Apr-24 18:36:24 907 bytes prism/public/image/common/pipeloss.gif
2004-Jan-06 16:33:34 177 bytes prism/public/image/common/post.gif
2004-Jan-06 16:29:52 153 bytes prism/public/image/common/relief.gif
2004-Jan-06 16:30:56 140 bytes prism/public/image/common/relief1.gif 2003-Apr-29 15:28:02 159 bytes prism/public/image/common/reports.gif
2004-Jan-06 16:27:48 173 bytes prism/public/image/common/search.gif
2002-Dec-03 10:46:54 152 bytes prism/public/image/common/select.gif
2002-Dec-03 10:46:54 161 bytes prism/public/image/common/sendmail.gif
2002-Dec-03 10:46:54 143 bytes prism/public/image/common/sentmail.gif
2004-Mar-10 16:07:46 845 bytes prism/public/image/common/sigma.gif
2003-Apr-29 15:40:24 172 bytes prism/public/image/common/tools.gif
2002-Dec-03 10:46:54 146 bytes prism/public/image/common/view.gif
2002-Dec-03 10:46:54 155 bytes prism/public/image/common/zoom.gif
2004-Dec-13 10:26:51 850 bytes prism/public/image/master
2002-Dec-03 10:46:54 147 bytes prism/public/image/master/ab_first.gif
2002-Dec-03 10:46:54 896 bytes prism/public/image/master/ab_first0.gif
2002-Dec-03 10:46:54 896 bytes prism/public/image/master/ab_first1.gif
2002-Dec-03 10:46:54 143 bytes prism/public/image/master/ab_last.gif
2002-Dec-03 10:46:54 890 bytes prism/public/image/master/ab_last0.gif
2002-Dec-03 10:46:54 890 bytes prism/public/image/master/ab_last1.gif
2002-Dec-03 10:46:54 123 bytes prism/public/image/master/ab_next.gif
2002-Dec-03 10:46:54 864 bytes prism/public/image/master/ab_next0.gif
2002-Dec-03 10:46:54 864 bytes prism/public/image/master/ab_next1.gif
2002-Dec-03 10:46:54 124 bytes prism/public/image/master/ab_prev.gif
2002-Dec-03 10:46:54 866 bytes prism/public/image/master/ab_prev0.gif
2002-Dec-03 10:46:54 866 bytes prism/public/image/master/ab_prev1.gif
2002-Dec-03 10:46:54 2783 bytes prism/public/image/master/backgrnd.jpg
2002-Dec-03 10:46:54 841 bytes prism/public/image/master/menu_c.gif
2002-Dec-03 10:46:54 925 bytes prism/public/image/master/menu_l.gif
2002-Dec-03 10:46:54 844 bytes prism/public/image/master/menu_lt1.gif
2002-Dec-03 10:46:54 844 bytes prism/public/image/master/menu_lt2.gif
2002-Dec-03 10:46:54 925 bytes prism/public/image/master/menu_lta.gif
2002-Dec-03 10:46:54 927 bytes prism/public/image/master/menu_r.gif
2002-Dec-03 10:46:54 845 bytes prism/public/image/master/menu_rt1.gif
2002-Dec-03 10:46:54 845 bytes prism/public/image/master/menu_rt2.gif
2002-Dec-03 10:46:54 927 bytes prism/public/image/master/menu_rta.gif
2002-Dec-03 10:46:54 844 bytes prism/public/image/master/menu_x.gif
2004-Dec-13 10:26:51 102 bytes prism/public/image/site
2004-Dec-13 10:26:51 306 bytes prism/public/image/site/logo
2003-Nov-20 17:57:22 970 bytes prism/public/image/site/logo/favicon.gif
2004-Apr-07 16:07:08 1908 bytes prism/public/image/site/logo/logo-iPRSM-blue-100.gif
2003-May-29 16:02:36 1839 bytes prism/public/image/site/logo/logo-iPRSM-gray-100.gif
2003-May-29 15:08:38 1966 bytes prism/public/image/site/logo/logo-iPRSM-red-100.gif
2004-Jun-25 16:59:56 1357 bytes prism/public/image/site/logo/logo-large.png
2004-Jan-22 00:33:36 1213 bytes prism/public/image/site/logo/logo-small.gif
2004-Jun-25 16:58:28 619 bytes prism/public/image/site/logo/logo-small.png
2003-Oct-07 19:37:14 26 bytes prism/public/robots.txt
2004-Dec-13 10:26:54 1598 bytes prism/public/worksheet
2004-Dec-13 10:26:51 816 bytes prism/public/worksheet/Class_Hazard_CC_V_1_0_7_28
2004-Nov-15 20:46:48 761 bytes prism/public/worksheet/Class_Hazard_CC_V_1_0_7_28/BP_Eqn_0.png
2004-Nov-15 20:46:48 782 bytes prism/public/worksheet/Class_Hazard_CC_V_1_0_7_28/BP_Eqn_1.png
2004-Nov-15 20:46:48 1347 bytes prism/public/worksheet/Class_Hazard_CC_V_1_0_7_28/P_Eqn_0.png
2004-Nov-15 20:46:48 1668 bytes prism/public/worksheet/Class_Hazard_CC_V_1_0_7_28/P_Eqn_1.png
2004-Nov-15 20:46:48 1042 bytes prism/public/worksheet/Class_Hazard_CC_V_1_0_7_28/P_Eqn_10.png
2004-Nov-15 20:46:48 1198 bytes prism/public/worksheet/Class_Hazard_CC_V_1_0_7_28/P_Eqn_11.png
2004-Nov-15 20:46:48 1058 bytes prism/public/worksheet/Class_Hazard_CC_V_1_0_7_28/P_Eqn_12.png
2004-Nov-15 20:46:48 758 bytes prism/public/worksheet/Class_Hazard_CC_V_1_0_7_28/P_Eqn_13.png
2004-Nov-15 20:46:48 589 bytes prism/public/worksheet/Class_Hazard_CC_V_1_0_7_28/P_Eqn_14.png
2004-Nov-15 20:46:48 1058 bytes prism/public/worksheet/Class_Hazard_CC_V_1_0_7_28/P_Eqn_15.png
2004-Nov-15 20:46:48 599 bytes prism/public/worksheet/Class_Hazard_CC_V_1_0_7_28/P_Eqn_16.png
2004-Nov-15 20:46:48 1137 bytes prism/public/worksheet/Class_Hazard_CC_V_1_0_7_28/P_Eqn_17.png
2004-Nov-15 20:46:48 799 bytes prism/public/worksheet/Class_Hazard_CC_V_1_0_7_28/P_Eqn_18.png
2004-Nov-15 20:46:48 682 bytes prism/public/worksheet/Class_Hazard_CC_V_1_0_7_28/P_Eqn_19.png
2004-Nov-15 20:46:48 1373 bytes prism/public/worksheet/Class_Hazard_CC_V_1_0_7_28/P_Eqn_2.png
2004-Nov-15 20:46:48 1399 bytes prism/public/worksheet/Class_Hazard_CC_V_1_0_7_28/P_Eqn_3.png 2004-Nov-15 20:46:48 947 bytes prism/public/worksheet/Class_Hazard_CC_V_1_0_7_28/P_Eqn_4.png
2004-Nov-15 20:46:48 812 bytes prism/public/worksheet/Class_Hazard_CC_V_1_0_7_28/P_Eqn_5.png
2004-Nov-15 20:46:48 947 bytes prism/public/worksheet/Class_Hazard_CC_V_1_0_7_28/P_Eqn_6.png
2004-Nov-15 20:46:48 953 bytes prism/public/worksheet/Class_Hazard_CC_V_1_0_7_28/P_Eqn_7.png
2004-Nov-15 20:46:48 946 bytes prism/public/worksheet/Class_Hazard_CC_V_1_0_7_28/P_Eqn_8.png
2004-Nov-15 20:46:48 712 bytes prism/public/worksheet/Class_Hazard_CC_V_1_0_7_28/P_Eqn_9.png
2004-Dec-13 10:26:51 1292 bytes prism/public/worksheet/Class_Hazard_CVF_2_1_0_7_28
2004-Nov-15 20:46:48 761 bytes prism/public/worksheet/Class_Hazard_CVF_2_1_0_7_28/BP_Eqn_0.png
2004-Nov-15 20:46:48 782 bytes prism/public/worksheet/Class_Hazard_CVF_2_1_0_7_28/BP_Eqn_1.png
2004-Nov-15 20:46:48 917 bytes prism/public/worksheet/Class_Hazard_CVF_2_1_0_7_28/CalcKbpLiquid_CalcKw_Eqn_0.png
2004-Nov-15 20:46:48 935 bytes prism/public/worksheet/Class_Hazard_CVF_2_1_0_7_28/CalcKbpLiquid_CalcKw_Eqn_1.png
2004-Nov-15 20:46:48 728 bytes prism/public/worksheet/Class_Hazard_CVF_2_1_0_7_28/CalcKbpLiquid_CalcKw_Eqn_2.png
2004-Nov-15 20:46:48 413 bytes prism/public/worksheet/Class_Hazard_CVF_2_1_0_7_28/CalcKbpLiquid_Eqn_0.png
2004-Nov-15 20:46:48 413 bytes prism/public/worksheet/Class_Hazard_CVF_2_1_0_7_28/CalcKbpLiquid_Eqn_1.png
2004-Nov-15 20:46:48 380 bytes prism/public/worksheet/Class_Hazard_CVF_2_1_0_7_28/CalcKbpLiquid_Eqn_2.png
2004-Nov-15 20:46:48 1249 bytes prism/public/worksheet/Class_Hazard_CVF_2_1_0_7_28/CalcKbpVapor_CalcKb_Eqn_0.png
2004-Nov-15 20:46:48 951 bytes prism/public/worksheet/Class_Hazard_CVF_2_1_0_7_28/CalcKbpVapor_CalcKv_Eqn_0.png
2004-Nov-15 20:46:48 728 bytes prism/public/worksheet/Class_Hazard_CVF_2_1_0_7_28/CalcKbpVapor_CalcKv_Eqn_1.png
2004-Nov-15 20:46:48 791 bytes prism/public/worksheet/Class_Hazard_CVF_2_1_0_7_28/CalcKbpVapor_CalcKv_Eqn_2.png
2004-Nov-15 20:46:48 706 bytes prism/public/worksheet/Class_Hazard_CVF_2_1_0_7_28/CalcKbpVapor_CalcKv_Eqn_3.png
2004-Nov-15 20:46:48 427 bytes prism/public/worksheet/Class_Hazard_CVF_2_1_0_7_28/CalcKbpVapor_Eqn_0.png
2004-Nov-15 20:46:48 373 bytes prism/public/worksheet/Class_Hazard_CVF_2_1_0_7_28/CalcKbpVapor_Eqn_1.png
2004-Nov-15 20:46:48 937 bytes prism/public/worksheet/Class_Hazard_CVF_2_1_0_7_28/PC_Eqn_0.png
2004-Nov-15 20:46:48 1347 bytes prism/public/worksheet/Class_Hazard_CVF_2_1_0_7_28/P_Eqn_0.png
2004-Nov-15 20:46:48 1668 bytes prism/public/worksheet/Class_Hazard_CVF_2_1_0_7_28/P_Eqn_1.png
2004-Nov-15 20:46:48 1042 bytes prism/public/worksheet/Class_Hazard_CVF_2_1_0_7_28/P_Eqn_10.png
2004-Nov-15 20:46:48 1198 bytes prism/public/worksheet/Class_Hazard_CVF_2_1_0_7_28/P_Eqn_11.png
2004-Nov-15 20:46:48 1058 bytes prism/public/worksheet/Class_Hazard_CVF_2_1_0_7_28/P_Eqn_12.png
2004-Nov-15 20:46:48 758 bytes prism/public/worksheet/Class_Hazard_CVF_2_1_0_7_28/P_Eqn_13.png
2004-Nov-15 20:46:48 589 bytes prism/public/worksheet/Class_Hazard_CVF_2_1_0_7_28/P_Eqn_14.png
2004-Nov-15 20:46:48 1058 bytes prism/public/worksheet/Class_Hazard_CVF_2_1_0_7_28/P_Eqn_15.png
2004-Nov-15 20:46:48 599 bytes prism/public/worksheet/Class_Hazard_CVF_2_1_0_7_28/P_Eqn_16.png
2004-Nov-15 20:46:48 1137 bytes prism/public/worksheet/Class_Hazard_CVF_2_1_0_7_28/P_Eqn_17.png
2004-Nov-15 20:46:48 799 bytes prism/public/worksheet/Class_Hazard_CVF_2_1_0_7_28/P_Eqn_18.png
2004-Nov-15 20:46:48 682 bytes prism/public/worksheet/Class_Hazard_CVF_2_1_0_7_28/P_Eqn_19.png
2004-Nov-15 20:46:48 1373 bytes prism/public/worksheet/Class_Hazard_CVF_2_1_0_7_28/P_Eqn_2.png
2004-Nov-15 20:46:48 1399 bytes prism/public/worksheet/Class_Hazard_CVF_2_1_0_7_28/P_Eqn_3.png
2004-Nov-15 20:46:48 947 bytes prism/public/worksheet/Class_Hazard_CVF_2_1_0_7_28/P_Eqn_4.png
2004-Nov-15 20:46:48 812 bytes prism/public/worksheet/Class_Hazard_CVF_2_1_0_7_28/P_Eqn_5.png
2004-Nov-15 20:46:48 947 bytes prism/public/worksheet/Class_Hazard_CVF_2_1_0_7_28/P_Eqn_6.png
2004-Nov-15 20:46:48 953 bytes prism/public/worksheet/Class_Hazard_CVF_2_1_0_7_28/P_Eqn_7.png
2004-Nov-15 20:46:48 946 bytes prism/public/worksheet/Class_Hazard_CVF_2_1_0_7_28/P_Eqn_8.png
2004-Nov-15 20:46:48 712 bytes prism/public/worksheet/Class_Hazard_CVF_2_1_0_7_28/P_Eqn_9.png
2004-Dec-13 10:26:51 1326 bytes prism/public/worksheet/Class_Hazard_CVF_L_1_0_7_28
2004-Nov-15 20:46:48 761 bytes prism/public/worksheet/Class_Hazard_CVF_L_1_0_7_28/BP_Eqn_0.png
2004-Nov-15 20:46:48 782 bytes prism/public/worksheet/Class_Hazard_CVF_L_1_0_7_28/BP_Eqn_1.png
2004-Nov-15 20:46:48 740 bytes prism/public/worksheet/Class_Hazard_CVF_L_1_0_7_28/CVFlow_Eqn_0.png
2004-Nov-15 20:46:48 1123 bytes prism/public/worksheet/Class_Hazard_CVF_L_1_0_7_28/CVFlow_Eqn_1.png
2004-Nov-15 20:46:48 917 bytes prism/public/worksheet/Class_Hazard_CVF_L_1_0_7_28/CalcKbp_CalcKw_Eqn_0.png
2004-Nov-15 20:46:48 935 bytes prism/public/worksheet/Class_Hazard_CVF_L_1_0_7_28/CalcKbp_CalcKw_Eqn_1.png
2004-Nov-15 20:46:48 728 bytes prism/public/worksheet/Class_Hazard_CVF_L_1_0_7_28/CalcKbp_CalcKw_Eqn_2.png
2004-Nov-15 20:46:48 413 bytes prism/public/worksheet/Class_Hazard_CVF_L_1_0_7_28/CalcKbp_Eqn_0.png
2004-Nov-15 20:46:48 413 bytes prism/public/worksheet/Class_Hazard_CVF_L_1_0_7_28/CalcKbp_Eqn_1.png
2004-Nov-15 20:46:48 380 bytes prism/public/worksheet/Class_Hazard_CVF_L_1_0_7_28/CalcKbp_Eqn_2.png
2004-Nov-15 20:46:48 1739 bytes prism/public/worksheet/Class_Hazard_CVF_L_1_0_7_28/CalcLiquidVol_Eqn_0.png
2004-Nov-15 20:46:48 576 bytes prism/public/worksheet/Class_Hazard_CVF_L_1_0_7_28/Eqn_0.png
2004-Nov-15 20:46:48 850 bytes prism/public/worksheet/Class_Hazard_CVF_L_1_0_7_28/Eqn_1.png
2004-Nov-15 20:46:48 638 bytes prism/public/worksheet/Class_Hazard_CVF_L_1_0_7_28/Eqn_2.png
2004-Nov-15 20:46:48 1178 bytes prism/public/worksheet/Class_Hazard_CVF_L_1_0_7_28/LP_Eqn_0.png
2004-Nov-15 20:46:50 937 bytes prism/public/worksheet/Class_Hazard_CVF_L_1_0_7_28/PC_Eqn_0.png
2004-Nov-15 20:46:50 765 bytes prism/public/worksheet/Class_Hazard_CVF_L_1_0_7_28/PD_Eqn_0.png

| | | |
|---|---|---|
| 2004-Nov-15 20:46:48 | 1347 bytes | prism/public/worksheet/Class_Hazard_CVF_L_1_0_7_28/P_Eqn_0.png |
| 2004-Nov-15 20:46:48 | 1668 bytes | prism/public/worksheet/Class_Hazard_CVF_L_1_0_7_28/P_Eqn_1.png |
| 2004-Nov-15 20:46:48 | 1042 bytes | prism/public/worksheet/Class_Hazard_CVF_L_1_0_7_28/P_Eqn_10.png |
| 2004-Nov-15 20:46:48 | 1198 bytes | prism/public/worksheet/Class_Hazard_CVF_L_1_0_7_28/P_Eqn_11.png |
| 2004-Nov-15 20:46:50 | 1058 bytes | prism/public/worksheet/Class_Hazard_CVF_L_1_0_7_28/P_Eqn_12.png |
| 2004-Nov-15 20:46:50 | 758 bytes | prism/public/worksheet/Class_Hazard_CVF_L_1_0_7_28/P_Eqn_13.png |
| 2004-Nov-15 20:46:50 | 589 bytes | prism/public/worksheet/Class_Hazard_CVF_L_1_0_7_28/P_Eqn_14.png |
| 2004-Nov-15 20:46:50 | 1058 bytes | prism/public/worksheet/Class_Hazard_CVF_L_1_0_7_28/P_Eqn_15.png |
| 2004-Nov-15 20:46:50 | 599 bytes | prism/public/worksheet/Class_Hazard_CVF_L_1_0_7_28/P_Eqn_16.png |
| 2004-Nov-15 20:46:50 | 1137 bytes | prism/public/worksheet/Class_Hazard_CVF_L_1_0_7_28/P_Eqn_17.png |
| 2004-Nov-15 20:46:50 | 799 bytes | prism/public/worksheet/Class_Hazard_CVF_L_1_0_7_28/P_Eqn_18.png |
| 2004-Nov-15 20:46:50 | 682 bytes | prism/public/worksheet/Class_Hazard_CVF_L_1_0_7_28/P_Eqn_19.png |
| 2004-Nov-15 20:46:50 | 1373 bytes | prism/public/worksheet/Class_Hazard_CVF_L_1_0_7_28/P_Eqn_2.png |
| 2004-Nov-15 20:46:50 | 1399 bytes | prism/public/worksheet/Class_Hazard_CVF_L_1_0_7_28/P_Eqn_3.png |
| 2004-Nov-15 20:46:50 | 947 bytes | prism/public/worksheet/Class_Hazard_CVF_L_1_0_7_28/P_Eqn_4.png |
| 2004-Nov-15 20:46:50 | 812 bytes | prism/public/worksheet/Class_Hazard_CVF_L_1_0_7_28/P_Eqn_5.png |
| 2004-Nov-15 20:46:50 | 947 bytes | prism/public/worksheet/Class_Hazard_CVF_L_1_0_7_28/P_Eqn_6.png |
| 2004-Nov-15 20:46:50 | 953 bytes | prism/public/worksheet/Class_Hazard_CVF_L_1_0_7_28/P_Eqn_7.png |
| 2004-Nov-15 20:46:50 | 946 bytes | prism/public/worksheet/Class_Hazard_CVF_L_1_0_7_28/P_Eqn_8.png |
| 2004-Nov-15 20:46:50 | 712 bytes | prism/public/worksheet/Class_Hazard_CVF_L_1_0_7_28/P_Eqn_9.png |
| 2004-Dec-13 10:26:51 | 816 bytes | prism/public/worksheet/Class_Hazard_CVF_S_1_0_7_28 |
| 2004-Nov-15 20:46:50 | 761 bytes | prism/public/worksheet/Class_Hazard_CVF_S_1_0_7_28/BP_Eqn_0.png |
| 2004-Nov-15 20:46:50 | 782 bytes | prism/public/worksheet/Class_Hazard_CVF_S_1_0_7_28/BP_Eqn_1.png |
| 2004-Nov-15 20:46:50 | 1347 bytes | prism/public/worksheet/Class_Hazard_CVF_S_1_0_7_28/P_Eqn_0.png |
| 2004-Nov-15 20:46:50 | 1668 bytes | prism/public/worksheet/Class_Hazard_CVF_S_1_0_7_28/P_Eqn_1.png |
| 2004-Nov-15 20:46:50 | 1042 bytes | prism/public/worksheet/Class_Hazard_CVF_S_1_0_7_28/P_Eqn_10.png |
| 2004-Nov-15 20:46:50 | 1198 bytes | prism/public/worksheet/Class_Hazard_CVF_S_1_0_7_28/P_Eqn_11.png |
| 2004-Nov-15 20:46:50 | 1058 bytes | prism/public/worksheet/Class_Hazard_CVF_S_1_0_7_28/P_Eqn_12.png |
| 2004-Nov-15 20:46:50 | 758 bytes | prism/public/worksheet/Class_Hazard_CVF_S_1_0_7_28/P_Eqn_13.png |
| 2004-Nov-15 20:46:50 | 589 bytes | prism/public/worksheet/Class_Hazard_CVF_S_1_0_7_28/P_Eqn_14.png |
| 2004-Nov-15 20:46:50 | 1058 bytes | prism/public/worksheet/Class_Hazard_CVF_S_1_0_7_28/P_Eqn_15.png |
| 2004-Nov-15 20:46:50 | 599 bytes | prism/public/worksheet/Class_Hazard_CVF_S_1_0_7_28/P_Eqn_16.png |
| 2004-Nov-15 20:46:50 | 1137 bytes | prism/public/worksheet/Class_Hazard_CVF_S_1_0_7_28/P_Eqn_17.png |
| 2004-Nov-15 20:46:50 | 799 bytes | prism/public/worksheet/Class_Hazard_CVF_S_1_0_7_28/P_Eqn_18.png |
| 2004-Nov-15 20:46:50 | 682 bytes | prism/public/worksheet/Class_Hazard_CVF_S_1_0_7_28/P_Eqn_19.png |
| 2004-Nov-15 20:46:50 | 1373 bytes | prism/public/worksheet/Class_Hazard_CVF_S_1_0_7_28/P_Eqn_2.png |
| 2004-Nov-15 20:46:50 | 1399 bytes | prism/public/worksheet/Class_Hazard_CVF_S_1_0_7_28/P_Eqn_3.png |
| 2004-Nov-15 20:46:50 | 947 bytes | prism/public/worksheet/Class_Hazard_CVF_S_1_0_7_28/P_Eqn_4.png |
| 2004-Nov-15 20:46:50 | 812 bytes | prism/public/worksheet/Class_Hazard_CVF_S_1_0_7_28/P_Eqn_5.png |
| 2004-Nov-15 20:46:50 | 947 bytes | prism/public/worksheet/Class_Hazard_CVF_S_1_0_7_28/P_Eqn_6.png |
| 2004-Nov-15 20:46:50 | 953 bytes | prism/public/worksheet/Class_Hazard_CVF_S_1_0_7_28/P_Eqn_7.png |
| 2004-Nov-15 20:46:50 | 946 bytes | prism/public/worksheet/Class_Hazard_CVF_S_1_0_7_28/P_Eqn_8.png |
| 2004-Nov-15 20:46:50 | 712 bytes | prism/public/worksheet/Class_Hazard_CVF_S_1_0_7_28/P_Eqn_9.png |
| 2004-Dec-13 10:26:51 | 1904 bytes | prism/public/worksheet/Class_Hazard_CVF_V_1_0_7_28 |
| 2004-Nov-15 20:46:50 | 761 bytes | prism/public/worksheet/Class_Hazard_CVF_V_1_0_7_28/BP_Eqn_0.png |
| 2004-Nov-15 20:46:50 | 782 bytes | prism/public/worksheet/Class_Hazard_CVF_V_1_0_7_28/BP_Eqn_1.png |
| 2004-Nov-15 20:46:50 | 740 bytes | prism/public/worksheet/Class_Hazard_CVF_V_1_0_7_28/CVFlow_Eqn_0.png |
| 2004-Nov-15 20:46:50 | 661 bytes | prism/public/worksheet/Class_Hazard_CVF_V_1_0_7_28/CVFlow_Eqn_1.png |
| 2004-Nov-15 20:46:50 | 1353 bytes | prism/public/worksheet/Class_Hazard_CVF_V_1_0_7_28/CVFlow_Eqn_2.png |
| 2004-Nov-15 20:46:50 | 1404 bytes | prism/public/worksheet/Class_Hazard_CVF_V_1_0_7_28/CVFlow_Eqn_3.png |
| 2004-Nov-15 20:46:50 | 575 bytes | prism/public/worksheet/Class_Hazard_CVF_V_1_0_7_28/CVFlow_Eqn_4.png |
| 2004-Nov-15 20:46:50 | 610 bytes | prism/public/worksheet/Class_Hazard_CVF_V_1_0_7_28/CVFlow_Eqn_5.png |
| 2004-Nov-15 20:46:50 | 2227 bytes | prism/public/worksheet/Class_Hazard_CVF_V_1_0_7_28/CVFlow_Eqn_6.png |
| 2004-Nov-15 20:46:50 | 1249 bytes | prism/public/worksheet/Class_Hazard_CVF_V_1_0_7_28/CalcKbp_CalcKb_Eqn_0.png |
| 2004-Nov-15 20:46:50 | 951 bytes | prism/public/worksheet/Class_Hazard_CVF_V_1_0_7_28/CalcKbp_CalcKv_Eqn_0.png |
| 2004-Nov-15 20:46:50 | 728 bytes | prism/public/worksheet/Class_Hazard_CVF_V_1_0_7_28/CalcKbp_CalcKv_Eqn_1.png |
| 2004-Nov-15 20:46:50 | 791 bytes | prism/public/worksheet/Class_Hazard_CVF_V_1_0_7_28/CalcKbp_CalcKv_Eqn_2.png |
| 2004-Nov-15 20:46:50 | 706 bytes | prism/public/worksheet/Class_Hazard_CVF_V_1_0_7_28/CalcKbp_CalcKv_Eqn_3.png |
| 2004-Nov-15 20:46:50 | 427 bytes | prism/public/worksheet/Class_Hazard_CVF_V_1_0_7_28/CalcKbp_Eqn_0.png |
| 2004-Nov-15 20:46:50 | 373 bytes | prism/public/worksheet/Class_Hazard_CVF_V_1_0_7_28/CalcKbp_Eqn_1.png |
| 2004-Nov-15 20:46:50 | 605 bytes | prism/public/worksheet/Class_Hazard_CVF_V_1_0_7_28/CalcVapMass_CF_Eqn_0.png |

2004-Nov-15 20:46:50 817 bytes prism/public/worksheet/Class_Hazard_CVF_V_1_0_7_28/CalcVapMass_CF_Eqn_1.png
2004-Nov-15 20:46:50 1153 bytes prism/public/worksheet/Class_Hazard_CVF_V_1_0_7_28/CalcVapMass_CF_Eqn_10.png
2004-Nov-15 20:46:50 238 bytes prism/public/worksheet/Class_Hazard_CVF_V_1_0_7_28/CalcVapMass_CF_Eqn_2.png
2004-Nov-15 20:46:50 826 bytes prism/public/worksheet/Class_Hazard_CVF_V_1_0_7_28/CalcVapMass_CF_Eqn_3.png
2004-Nov-15 20:46:50 433 bytes prism/public/worksheet/Class_Hazard_CVF_V_1_0_7_28/CalcVapMass_CF_Eqn_4.png
2004-Nov-15 20:46:50 700 bytes prism/public/worksheet/Class_Hazard_CVF_V_1_0_7_28/CalcVapMass_CF_Eqn_5.png
2004-Nov-15 20:46:50 453 bytes prism/public/worksheet/Class_Hazard_CVF_V_1_0_7_28/CalcVapMass_CF_Eqn_6.png
2004-Nov-15 20:46:50 208 bytes prism/public/worksheet/Class_Hazard_CVF_V_1_0_7_28/CalcVapMass_CF_Eqn_7.png
2004-Nov-15 20:46:50 912 bytes prism/public/worksheet/Class_Hazard_CVF_V_1_0_7_28/CalcVapMass_CF_Eqn_8.png
2004-Nov-15 20:46:50 238 bytes prism/public/worksheet/Class_Hazard_CVF_V_1_0_7_28/CalcVapMass_CF_Eqn_9.png
2004-Nov-15 20:46:50 1847 bytes prism/public/worksheet/Class_Hazard_CVF_V_1_0_7_28/CalcVapMass_Eqn_0.png
2004-Nov-15 20:46:50 1407 bytes prism/public/worksheet/Class_Hazard_CVF_V_1_0_7_28/CalcVapMass_Eqn_1.png
2004-Nov-15 20:46:50 832 bytes prism/public/worksheet/Class_Hazard_CVF_V_1_0_7_28/Eqn_0.png
2004-Nov-15 20:46:50 602 bytes prism/public/worksheet/Class_Hazard_CVF_V_1_0_7_28/Eqn_1.png
2004-Nov-15 20:46:52 937 bytes prism/public/worksheet/Class_Hazard_CVF_V_1_0_7_28/PC_Eqn_0.png
2004-Nov-15 20:46:52 1044 bytes prism/public/worksheet/Class_Hazard_CVF_V_1_0_7_28/PVP_Eqn_0.png
2004-Nov-15 20:46:52 395 bytes prism/public/worksheet/Class_Hazard_CVF_V_1_0_7_28/PVP_Eqn_1.png
2004-Nov-15 20:46:50 1347 bytes prism/public/worksheet/Class_Hazard_CVF_V_1_0_7_28/P_Eqn_0.png
2004-Nov-15 20:46:50 1668 bytes prism/public/worksheet/Class_Hazard_CVF_V_1_0_7_28/P_Eqn_1.png
2004-Nov-15 20:46:50 1042 bytes prism/public/worksheet/Class_Hazard_CVF_V_1_0_7_28/P_Eqn_10.png
2004-Nov-15 20:46:50 1198 bytes prism/public/worksheet/Class_Hazard_CVF_V_1_0_7_28/P_Eqn_11.png
2004-Nov-15 20:46:50 1058 bytes prism/public/worksheet/Class_Hazard_CVF_V_1_0_7_28/P_Eqn_12.png
2004-Nov-15 20:46:50 758 bytes prism/public/worksheet/Class_Hazard_CVF_V_1_0_7_28/P_Eqn_13.png
2004-Nov-15 20:46:50 589 bytes prism/public/worksheet/Class_Hazard_CVF_V_1_0_7_28/P_Eqn_14.png
2004-Nov-15 20:46:50 1058 bytes prism/public/worksheet/Class_Hazard_CVF_V_1_0_7_28/P_Eqn_15.png
2004-Nov-15 20:46:50 599 bytes prism/public/worksheet/Class_Hazard_CVF_V_1_0_7_28/P_Eqn_16.png
2004-Nov-15 20:46:50 1137 bytes prism/public/worksheet/Class_Hazard_CVF_V_1_0_7_28/P_Eqn_17.png
2004-Nov-15 20:46:50 799 bytes prism/public/worksheet/Class_Hazard_CVF_V_1_0_7_28/P_Eqn_18.png
2004-Nov-15 20:46:50 682 bytes prism/public/worksheet/Class_Hazard_CVF_V_1_0_7_28/P_Eqn_19.png
2004-Nov-15 20:46:50 1373 bytes prism/public/worksheet/Class_Hazard_CVF_V_1_0_7_28/P_Eqn_2.png
2004-Nov-15 20:46:50 1399 bytes prism/public/worksheet/Class_Hazard_CVF_V_1_0_7_28/P_Eqn_3.png
2004-Nov-15 20:46:50 947 bytes prism/public/worksheet/Class_Hazard_CVF_V_1_0_7_28/P_Eqn_4.png
2004-Nov-15 20:46:50 812 bytes prism/public/worksheet/Class_Hazard_CVF_V_1_0_7_28/P_Eqn_5.png
2004-Nov-15 20:46:52 947 bytes prism/public/worksheet/Class_Hazard_CVF_V_1_0_7_28/P_Eqn_6.png
2004-Nov-15 20:46:52 953 bytes prism/public/worksheet/Class_Hazard_CVF_V_1_0_7_28/P_Eqn_7.png
2004-Nov-15 20:46:52 946 bytes prism/public/worksheet/Class_Hazard_CVF_V_1_0_7_28/P_Eqn_8.png
2004-Nov-15 20:46:52 712 bytes prism/public/worksheet/Class_Hazard_CVF_V_1_0_7_28/P_Eqn_9.png
2004-Dec-13 10:26:51 1768 bytes prism/public/worksheet/Class_Hazard_FGE_V_1_0_7_28
2004-Nov-15 20:46:52 761 bytes prism/public/worksheet/Class_Hazard_FGE_V_1_0_7_28/BP_Eqn_0.png
2004-Nov-15 20:46:52 782 bytes prism/public/worksheet/Class_Hazard_FGE_V_1_0_7_28/BP_Eqn_1.png
2004-Nov-15 20:46:52 1249 bytes prism/public/worksheet/Class_Hazard_FGE_V_1_0_7_28/CalcKbp_CalcKb_Eqn_0.png
2004-Nov-15 20:46:52 951 bytes prism/public/worksheet/Class_Hazard_FGE_V_1_0_7_28/CalcKbp_CalcKv_Eqn_0.png
2004-Nov-15 20:46:52 728 bytes prism/public/worksheet/Class_Hazard_FGE_V_1_0_7_28/CalcKbp_CalcKv_Eqn_1.png
2004-Nov-15 20:46:52 791 bytes prism/public/worksheet/Class_Hazard_FGE_V_1_0_7_28/CalcKbp_CalcKv_Eqn_2.png
2004-Nov-15 20:46:52 706 bytes prism/public/worksheet/Class_Hazard_FGE_V_1_0_7_28/CalcKbp_CalcKv_Eqn_3.png
2004-Nov-15 20:46:52 427 bytes prism/public/worksheet/Class_Hazard_FGE_V_1_0_7_28/CalcKbp_Eqn_0.png
2004-Nov-15 20:46:52 373 bytes prism/public/worksheet/Class_Hazard_FGE_V_1_0_7_28/CalcKbp_Eqn_1.png
2004-Nov-15 20:46:52 1145 bytes prism/public/worksheet/Class_Hazard_FGE_V_1_0_7_28/CalcReqArea_Eqn_0.png
2004-Nov-15 20:46:52 510 bytes prism/public/worksheet/Class_Hazard_FGE_V_1_0_7_28/CalcReqArea_Eqn_1.png
2004-Nov-15 20:46:52 1611 bytes prism/public/worksheet/Class_Hazard_FGE_V_1_0_7_28/CalcReqArea_Eqn_2.png
2004-Nov-15 20:46:52 866 bytes prism/public/worksheet/Class_Hazard_FGE_V_1_0_7_28/CalcReqArea_Eqn_3.png
2004-Nov-15 20:46:52 1471 bytes prism/public/worksheet/Class_Hazard_FGE_V_1_0_7_28/CalcReqArea_Eqn_4.png
2004-Nov-15 20:46:52 605 bytes prism/public/worksheet/Class_Hazard_FGE_V_1_0_7_28/CalcVapMass_CF_Eqn_0.png
2004-Nov-15 20:46:52 817 bytes prism/public/worksheet/Class_Hazard_FGE_V_1_0_7_28/CalcVapMass_CF_Eqn_1.png
2004-Nov-15 20:46:52 1153 bytes prism/public/worksheet/Class_Hazard_FGE_V_1_0_7_28/CalcVapMass_CF_Eqn_10.png
2004-Nov-15 20:46:52 238 bytes prism/public/worksheet/Class_Hazard_FGE_V_1_0_7_28/CalcVapMass_CF_Eqn_2.png
2004-Nov-15 20:46:52 826 bytes prism/public/worksheet/Class_Hazard_FGE_V_1_0_7_28/CalcVapMass_CF_Eqn_3.png
2004-Nov-15 20:46:52 433 bytes prism/public/worksheet/Class_Hazard_FGE_V_1_0_7_28/CalcVapMass_CF_Eqn_4.png
2004-Nov-15 20:46:52 700 bytes prism/public/worksheet/Class_Hazard_FGE_V_1_0_7_28/CalcVapMass_CF_Eqn_5.png
2004-Nov-15 20:46:52 453 bytes prism/public/worksheet/Class_Hazard_FGE_V_1_0_7_28/CalcVapMass_CF_Eqn_6.png
2004-Nov-15 20:46:52 208 bytes prism/public/worksheet/Class_Hazard_FGE_V_1_0_7_28/CalcVapMass_CF_Eqn_7.png 2004-Nov-15 20:46:52 912 bytes prism/public/worksheet/Class_Hazard_FGE_V_1_0_7_28/CalcVapMass_CF_Eqn_8.png
2004-Nov-15 20:46:52 238 bytes prism/public/worksheet/Class_Hazard_FGE_V_1_0_7_28/CalcVapMass_CF_Eqn_9.png
2004-Nov-15 20:46:52 1803 bytes prism/public/worksheet/Class_Hazard_FGE_V_1_0_7_28/CalcVapMass_Eqn_0.png
2004-Nov-15 20:46:52 1362 bytes prism/public/worksheet/Class_Hazard_FGE_V_1_0_7_28/CalcVapMass_Eqn_1.png
2004-Nov-15 20:46:52 937 bytes prism/public/worksheet/Class_Hazard_FGE_V_1_0_7_28/PC_Eqn_0.png
2004-Nov-15 20:46:52 1044 bytes prism/public/worksheet/Class_Hazard_FGE_V_1_0_7_28/PVP_Eqn_0.png
2004-Nov-15 20:46:52 395 bytes prism/public/worksheet/Class_Hazard_FGE_V_1_0_7_28/PVP_Eqn_1.png
2004-Nov-15 20:46:52 1347 bytes prism/public/worksheet/Class_Hazard_FGE_V_1_0_7_28/P_Eqn_0.png
2004-Nov-15 20:46:52 1668 bytes prism/public/worksheet/Class_Hazard_FGE_V_1_0_7_28/P_Eqn_1.png
2004-Nov-15 20:46:52 1042 bytes prism/public/worksheet/Class_Hazard_FGE_V_1_0_7_28/P_Eqn_10.png
2004-Nov-15 20:46:52 1198 bytes prism/public/worksheet/Class_Hazard_FGE_V_1_0_7_28/P_Eqn_11.png
2004-Nov-15 20:46:52 1058 bytes prism/public/worksheet/Class_Hazard_FGE_V_1_0_7_28/P_Eqn_12.png
2004-Nov-15 20:46:52 758 bytes prism/public/worksheet/Class_Hazard_FGE_V_1_0_7_28/P_Eqn_13.png
2004-Nov-15 20:46:52 589 bytes prism/public/worksheet/Class_Hazard_FGE_V_1_0_7_28/P_Eqn_14.png
2004-Nov-15 20:46:52 1058 bytes prism/public/worksheet/Class_Hazard_FGE_V_1_0_7_28/P_Eqn_15.png
2004-Nov-15 20:46:52 599 bytes prism/public/worksheet/Class_Hazard_FGE_V_1_0_7_28/P_Eqn_16.png
2004-Nov-15 20:46:52 1137 bytes prism/public/worksheet/Class_Hazard_FGE_V_1_0_7_28/P_Eqn_17.png
2004-Nov-15 20:46:52 799 bytes prism/public/worksheet/Class_Hazard_FGE_V_1_0_7_28/P_Eqn_18.png
2004-Nov-15 20:46:52 682 bytes prism/public/worksheet/Class_Hazard_FGE_V_1_0_7_28/P_Eqn_19.png
2004-Nov-15 20:46:52 1373 bytes prism/public/worksheet/Class_Hazard_FGE_V_1_0_7_28/P_Eqn_2.png
2004-Nov-15 20:46:52 1399 bytes prism/public/worksheet/Class_Hazard_FGE_V_1_0_7_28/P_Eqn_3.png
2004-Nov-15 20:46:52 947 bytes prism/public/worksheet/Class_Hazard_FGE_V_1_0_7_28/P_Eqn_4.png
2004-Nov-15 20:46:52 812 bytes prism/public/worksheet/Class_Hazard_FGE_V_1_0_7_28/P_Eqn_5.png
2004-Nov-15 20:46:52 947 bytes prism/public/worksheet/Class_Hazard_FGE_V_1_0_7_28/P_Eqn_6.png
2004-Nov-15 20:46:52 953 bytes prism/public/worksheet/Class_Hazard_FGE_V_1_0_7_28/P_Eqn_7.png
2004-Nov-15 20:46:52 946 bytes prism/public/worksheet/Class_Hazard_FGE_V_1_0_7_28/P_Eqn_8.png
2004-Nov-15 20:46:52 712 bytes prism/public/worksheet/Class_Hazard_FGE_V_1_0_7_28/P_Eqn_9.png
2004-Dec-13 10:26:51 1972 bytes prism/public/worksheet/Class_Hazard_FVG_V_1_0_7_28
2004-Nov-15 20:46:52 761 bytes prism/public/worksheet/Class_Hazard_FVG_V_1_0_7_28/BP_Eqn_0.png
2004-Nov-15 20:46:52 782 bytes prism/public/worksheet/Class_Hazard_FVG_V_1_0_7_28/BP_Eqn_1.png
2004-Nov-15 20:46:52 1249 bytes prism/public/worksheet/Class_Hazard_FVG_V_1_0_7_28/CalcKbp_CalcKb_Eqn_0.png
2004-Nov-15 20:46:52 951 bytes prism/public/worksheet/Class_Hazard_FVG_V_1_0_7_28/CalcKbp_CalcKv_Eqn_0.png
2004-Nov-15 20:46:52 728 bytes prism/public/worksheet/Class_Hazard_FVG_V_1_0_7_28/CalcKbp_CalcKv_Eqn_1.png
2004-Nov-15 20:46:52 791 bytes prism/public/worksheet/Class_Hazard_FVG_V_1_0_7_28/CalcKbp_CalcKv_Eqn_2.png
2004-Nov-15 20:46:52 706 bytes prism/public/worksheet/Class_Hazard_FVG_V_1_0_7_28/CalcKbp_CalcKv_Eqn_3.png
2004-Nov-15 20:46:52 427 bytes prism/public/worksheet/Class_Hazard_FVG_V_1_0_7_28/CalcKbp_Eqn_0.png
2004-Nov-15 20:46:52 373 bytes prism/public/worksheet/Class_Hazard_FVG_V_1_0_7_28/CalcKbp_Eqn_1.png
2004-Nov-15 20:46:52 605 bytes prism/public/worksheet/Class_Hazard_FVG_V_1_0_7_28/CalcVapMass_CF_Eqn_0.png
2004-Nov-15 20:46:52 817 bytes prism/public/worksheet/Class_Hazard_FVG_V_1_0_7_28/CalcVapMass_CF_Eqn_1.png
2004-Nov-15 20:46:52 1153 bytes prism/public/worksheet/Class_Hazard_FVG_V_1_0_7_28/CalcVapMass_CF_Eqn_10.png
2004-Nov-15 20:46:52 238 bytes prism/public/worksheet/Class_Hazard_FVG_V_1_0_7_28/CalcVapMass_CF_Eqn_2.png
2004-Nov-15 20:46:52 826 bytes prism/public/worksheet/Class_Hazard_FVG_V_1_0_7_28/CalcVapMass_CF_Eqn_3.png
2004-Nov-15 20:46:52 433 bytes prism/public/worksheet/Class_Hazard_FVG_V_1_0_7_28/CalcVapMass_CF_Eqn_4.png
2004-Nov-15 20:46:52 700 bytes prism/public/worksheet/Class_Hazard_FVG_V_1_0_7_28/CalcVapMass_CF_Eqn_5.png
2004-Nov-15 20:46:52 453 bytes prism/public/worksheet/Class_Hazard_FVG_V_1_0_7_28/CalcVapMass_CF_Eqn_6.png
2004-Nov-15 20:46:52 208 bytes prism/public/worksheet/Class_Hazard_FVG_V_1_0_7_28/CalcVapMass_CF_Eqn_7.png
2004-Nov-15 20:46:52 912 bytes prism/public/worksheet/Class_Hazard_FVG_V_1_0_7_28/CalcVapMass_CF_Eqn_8.png
2004-Nov-15 20:46:52 238 bytes prism/public/worksheet/Class_Hazard_FVG_V_1_0_7_28/CalcVapMass_CF_Eqn_9.png
2004-Nov-15 20:46:52 1803 bytes prism/public/worksheet/Class_Hazard_FVG_V_1_0_7_28/CalcVapMass_Eqn_0.png
2004-Nov-15 20:46:52 1362 bytes prism/public/worksheet/Class_Hazard_FVG_V_1_0_7_28/CalcVapMass_Eqn_1.png
2004-Nov-15 20:46:54 937 bytes prism/public/worksheet/Class_Hazard_FVG_V_1_0_7_28/PC_Eqn_0.png
2004-Nov-15 20:46:54 1044 bytes prism/public/worksheet/Class_Hazard_FVG_V_1_0_7_28/PVP_Eqn_0.png
2004-Nov-15 20:46:54 395 bytes prism/public/worksheet/Class_Hazard_FVG_V_1_0_7_28/PVP_Eqn_1.png
2004-Nov-15 20:46:52 1347 bytes prism/public/worksheet/Class_Hazard_FVG_V_1_0_7_28/P_Eqn_0.png
2004-Nov-15 20:46:52 1668 bytes prism/public/worksheet/Class_Hazard_FVG_V_1_0_7_28/P_Eqn_1.png
2004-Nov-15 20:46:52 1042 bytes prism/public/worksheet/Class_Hazard_FVG_V_1_0_7_28/P_Eqn_10.png
2004-Nov-15 20:46:52 1198 bytes prism/public/worksheet/Class_Hazard_FVG_V_1_0_7_28/P_Eqn_11.png
2004-Nov-15 20:46:52 1058 bytes prism/public/worksheet/Class_Hazard_FVG_V_1_0_7_28/P_Eqn_12.png
2004-Nov-15 20:46:52 758 bytes prism/public/worksheet/Class_Hazard_FVG_V_1_0_7_28/P_Eqn_13.png
2004-Nov-15 20:46:54 589 bytes prism/public/worksheet/Class_Hazard_FVG_V_1_0_7_28/P_Eqn_14.png
2004-Nov-15 20:46:54 1058 bytes prism/public/worksheet/Class_Hazard_FVG_V_1_0_7_28/P_Eqn_15.png 2004-Nov-15 20:46:54 599 bytes prism/public/worksheet/Class_Hazard_FVG_V_1_0_7_28/P_Eqn_16.png
2004-Nov-15 20:46:54 1137 bytes prism/public/worksheet/Class_Hazard_FVG_V_1_0_7_28/P_Eqn_17.png
2004-Nov-15 20:46:54 799 bytes prism/public/worksheet/Class_Hazard_FVG_V_1_0_7_28/P_Eqn_18.png
2004-Nov-15 20:46:54 682 bytes prism/public/worksheet/Class_Hazard_FVG_V_1_0_7_28/P_Eqn_19.png
2004-Nov-15 20:46:54 1373 bytes prism/public/worksheet/Class_Hazard_FVG_V_1_0_7_28/P_Eqn_2.png
2004-Nov-15 20:46:54 1399 bytes prism/public/worksheet/Class_Hazard_FVG_V_1_0_7_28/P_Eqn_3.png
2004-Nov-15 20:46:54 947 bytes prism/public/worksheet/Class_Hazard_FVG_V_1_0_7_28/P_Eqn_4.png
2004-Nov-15 20:46:54 812 bytes prism/public/worksheet/Class_Hazard_FVG_V_1_0_7_28/P_Eqn_5.png
2004-Nov-15 20:46:54 947 bytes prism/public/worksheet/Class_Hazard_FVG_V_1_0_7_28/P_Eqn_6.png
2004-Nov-15 20:46:54 953 bytes prism/public/worksheet/Class_Hazard_FVG_V_1_0_7_28/P_Eqn_7.png
2004-Nov-15 20:46:54 946 bytes prism/public/worksheet/Class_Hazard_FVG_V_1_0_7_28/P_Eqn_8.png
2004-Nov-15 20:46:54 712 bytes prism/public/worksheet/Class_Hazard_FVG_V_1_0_7_28/P_Eqn_9.png
2004-Nov-15 20:46:54 596 bytes prism/public/worksheet/Class_Hazard_FVG_V_1_0_7_28/VC_Eqn_0.png
2004-Nov-15 20:46:54 599 bytes prism/public/worksheet/Class_Hazard_FVG_V_1_0_7_28/VC_Eqn_1.png
2004-Nov-15 20:46:54 673 bytes prism/public/worksheet/Class_Hazard_FVG_V_1_0_7_28/VC_Eqn_10.png
2004-Nov-15 20:46:54 520 bytes prism/public/worksheet/Class_Hazard_FVG_V_1_0_7_28/VC_Eqn_2.png
2004-Nov-15 20:46:54 449 bytes prism/public/worksheet/Class_Hazard_FVG_V_1_0_7_28/VC_Eqn_3.png
2004-Nov-15 20:46:54 403 bytes prism/public/worksheet/Class_Hazard_FVG_V_1_0_7_28/VC_Eqn_4.png
2004-Nov-15 20:46:54 739 bytes prism/public/worksheet/Class_Hazard_FVG_V_1_0_7_28/VC_Eqn_5.png
2004-Nov-15 20:46:54 812 bytes prism/public/worksheet/Class_Hazard_FVG_V_1_0_7_28/VC_Eqn_6.png
2004-Nov-15 20:46:54 438 bytes prism/public/worksheet/Class_Hazard_FVG_V_1_0_7_28/VC_Eqn_7.png
2004-Nov-15 20:46:54 688 bytes prism/public/worksheet/Class_Hazard_FVG_V_1_0_7_28/VC_Eqn_8.png
2004-Nov-15 20:46:54 917 bytes prism/public/worksheet/Class_Hazard_FVG_V_1_0_7_28/VC_Eqn_9.png
2004-Dec-13 10:26:52 1292 bytes prism/public/worksheet/Class_Hazard_GF_2_1_0_7_28
2004-Nov-15 20:46:54 761 bytes prism/public/worksheet/Class_Hazard_GF_2_1_0_7_28/BP_Eqn_0.png
2004-Nov-15 20:46:54 782 bytes prism/public/worksheet/Class_Hazard_GF_2_1_0_7_28/BP_Eqn_1.png
2004-Nov-15 20:46:54 917 bytes prism/public/worksheet/Class_Hazard_GF_2_1_0_7_28/CalcKbpLiquid_CalcKw_Eqn_0.png
2004-Nov-15 20:46:54 935 bytes prism/public/worksheet/Class_Hazard_GF_2_1_0_7_28/CalcKbpLiquid_CalcKw_Eqn_1.png
2004-Nov-15 20:46:54 728 bytes prism/public/worksheet/Class_Hazard_GF_2_1_0_7_28/CalcKbpLiquid_CalcKw_Eqn_2.png
2004-Nov-15 20:46:54 413 bytes prism/public/worksheet/Class_Hazard_GF_2_1_0_7_28/CalcKbpLiquid_Eqn_0.png
2004-Nov-15 20:46:54 413 bytes prism/public/worksheet/Class_Hazard_GF_2_1_0_7_28/CalcKbpLiquid_Eqn_1.png
2004-Nov-15 20:46:54 380 bytes prism/public/worksheet/Class_Hazard_GF_2_1_0_7_28/CalcKbpLiquid_Eqn_2.png
2004-Nov-15 20:46:54 1249 bytes prism/public/worksheet/Class_Hazard_GF_2_1_0_7_28/CalcKbpVapor_CalcKb_Eqn_0.png
2004-Nov-15 20:46:54 951 bytes prism/public/worksheet/Class_Hazard_GF_2_1_0_7_28/CalcKbpVapor_CalcKv_Eqn_0.png
2004-Nov-15 20:46:54 728 bytes prism/public/worksheet/Class_Hazard_GF_2_1_0_7_28/CalcKbpVapor_CalcKv_Eqn_1.png
2004-Nov-15 20:46:54 791 bytes prism/public/worksheet/Class_Hazard_GF_2_1_0_7_28/CalcKbpVapor_CalcKv_Eqn_2.png
2004-Nov-15 20:46:54 706 bytes prism/public/worksheet/Class_Hazard_GF_2_1_0_7_28/CalcKbpVapor_CalcKv_Eqn_3.png
2004-Nov-15 20:46:54 427 bytes prism/public/worksheet/Class_Hazard_GF_2_1_0_7_28/CalcKbpVapor_Eqn_0.png
2004-Nov-15 20:46:54 373 bytes prism/public/worksheet/Class_Hazard_GF_2_1_0_7_28/CalcKbpVapor_Eqn_1.png
2004-Nov-15 20:46:54 937 bytes prism/public/worksheet/Class_Hazard_GF_2_1_0_7_28/PC_Eqn_0.png
2004-Nov-15 20:46:54 1347 bytes prism/public/worksheet/Class_Hazard_GF_2_1_0_7_28/P_Eqn_0.png
2004-Nov-15 20:46:54 1668 bytes prism/public/worksheet/Class_Hazard_GF_2_1_0_7_28/P_Eqn_1.png
2004-Nov-15 20:46:54 1042 bytes prism/public/worksheet/Class_Hazard_GF_2_1_0_7_28/P_Eqn_10.png
2004-Nov-15 20:46:54 1198 bytes prism/public/worksheet/Class_Hazard_GF_2_1_0_7_28/P_Eqn_11.png
2004-Nov-15 20:46:54 1058 bytes prism/public/worksheet/Class_Hazard_GF_2_1_0_7_28/P_Eqn_12.png
2004-Nov-15 20:46:54 758 bytes prism/public/worksheet/Class_Hazard_GF_2_1_0_7_28/P_Eqn_13.png
2004-Nov-15 20:46:54 589 bytes prism/public/worksheet/Class_Hazard_GF_2_1_0_7_28/P_Eqn_14.png
2004-Nov-15 20:46:54 1058 bytes prism/public/worksheet/Class_Hazard_GF_2_1_0_7_28/P_Eqn_15.png
2004-Nov-15 20:46:54 599 bytes prism/public/worksheet/Class_Hazard_GF_2_1_0_7_28/P_Eqn_16.png
2004-Nov-15 20:46:54 1137 bytes prism/public/worksheet/Class_Hazard_GF_2_1_0_7_28/P_Eqn_17.png
2004-Nov-15 20:46:54 799 bytes prism/public/worksheet/Class_Hazard_GF_2_1_0_7_28/P_Eqn_18.png
2004-Nov-15 20:46:54 682 bytes prism/public/worksheet/Class_Hazard_GF_2_1_0_7_28/P_Eqn_19.png
2004-Nov-15 20:46:54 1373 bytes prism/public/worksheet/Class_Hazard_GF_2_1_0_7_28/P_Eqn_2.png
2004-Nov-15 20:46:54 1399 bytes prism/public/worksheet/Class_Hazard_GF_2_1_0_7_28/P_Eqn_3.png
2004-Nov-15 20:46:54 947 bytes prism/public/worksheet/Class_Hazard_GF_2_1_0_7_28/P_Eqn_4.png
2004-Nov-15 20:46:54 812 bytes prism/public/worksheet/Class_Hazard_GF_2_1_0_7_28/P_Eqn_5.png
2004-Nov-15 20:46:54 947 bytes prism/public/worksheet/Class_Hazard_GF_2_1_0_7_28/P_Eqn_6.png
2004-Nov-15 20:46:54 953 bytes prism/public/worksheet/Class_Hazard_GF_2_1_0_7_28/P_Eqn_7.png
2004-Nov-15 20:46:54 946 bytes prism/public/worksheet/Class_Hazard_GF_2_1_0_7_28/P_Eqn_8.png
2004-Nov-15 20:46:54 712 bytes prism/public/worksheet/Class_Hazard_GF_2_1_0_7_28/P_Eqn_9.png
2004-Dec-13 10:26:52 1156 bytes prism/public/worksheet/Class_Hazard_GF_L_1_0_7_28

2004-Nov-15 20:46:54 761 bytes prism/public/worksheet/Class_Hazard_GF_L_1_0_7_28/BP_Eqn_0.png
2004-Nov-15 20:46:54 782 bytes prism/public/worksheet/Class_Hazard_GF_L_1_0_7_28/BP_Eqn_1.png
2004-Nov-15 20:46:54 917 bytes prism/public/worksheet/Class_Hazard_GF_L_1_0_7_28/CalcKbp_CalcKw_Eqn_0.png
2004-Nov-15 20:46:54 935 bytes prism/public/worksheet/Class_Hazard_GF_L_1_0_7_28/CalcKbp_CalcKw_Eqn_1.png
2004-Nov-15 20:46:54 728 bytes prism/public/worksheet/Class_Hazard_GF_L_1_0_7_28/CalcKbp_CalcKw_Eqn_2.png
2004-Nov-15 20:46:54 413 bytes prism/public/worksheet/Class_Hazard_GF_L_1_0_7_28/CalcKbp_Eqn_0.png
2004-Nov-15 20:46:54 413 bytes prism/public/worksheet/Class_Hazard_GF_L_1_0_7_28/CalcKbp_Eqn_1.png
2004-Nov-15 20:46:54 380 bytes prism/public/worksheet/Class_Hazard_GF_L_1_0_7_28/CalcKbp_Eqn_2.png
2004-Nov-15 20:46:54 1739 bytes prism/public/worksheet/Class_Hazard_GF_L_1_0_7_28/CalcLiquidVol_Eqn_0.png
2004-Nov-15 20:46:54 1178 bytes prism/public/worksheet/Class_Hazard_GF_L_1_0_7_28/LP_Eqn_0.png
2004-Nov-15 20:46:56 937 bytes prism/public/worksheet/Class_Hazard_GF_L_1_0_7_28/PC_Eqn_0.png
2004-Nov-15 20:46:56 765 bytes prism/public/worksheet/Class_Hazard_GF_L_1_0_7_28/PD_Eqn_0.png
2004-Nov-15 20:46:54 1347 bytes prism/public/worksheet/Class_Hazard_GF_L_1_0_7_28/P_Eqn_0.png
2004-Nov-15 20:46:54 1668 bytes prism/public/worksheet/Class_Hazard_GF_L_1_0_7_28/P_Eqn_1.png
2004-Nov-15 20:46:54 1042 bytes prism/public/worksheet/Class_Hazard_GF_L_1_0_7_28/P_Eqn_10.png
2004-Nov-15 20:46:54 1198 bytes prism/public/worksheet/Class_Hazard_GF_L_1_0_7_28/P_Eqn_11.png
2004-Nov-15 20:46:54 1058 bytes prism/public/worksheet/Class_Hazard_GF_L_1_0_7_28/P_Eqn_12.png
2004-Nov-15 20:46:54 758 bytes prism/public/worksheet/Class_Hazard_GF_L_1_0_7_28/P_Eqn_13.png
2004-Nov-15 20:46:54 589 bytes prism/public/worksheet/Class_Hazard_GF_L_1_0_7_28/P_Eqn_14.png
2004-Nov-15 20:46:54 1058 bytes prism/public/worksheet/Class_Hazard_GF_L_1_0_7_28/P_Eqn_15.png
2004-Nov-15 20:46:54 599 bytes prism/public/worksheet/Class_Hazard_GF_L_1_0_7_28/P_Eqn_16.png
2004-Nov-15 20:46:54 1137 bytes prism/public/worksheet/Class_Hazard_GF_L_1_0_7_28/P_Eqn_17.png
2004-Nov-15 20:46:54 799 bytes prism/public/worksheet/Class_Hazard_GF_L_1_0_7_28/P_Eqn_18.png
2004-Nov-15 20:46:54 682 bytes prism/public/worksheet/Class_Hazard_GF_L_1_0_7_28/P_Eqn_19.png
2004-Nov-15 20:46:54 1373 bytes prism/public/worksheet/Class_Hazard_GF_L_1_0_7_28/P_Eqn_2.png
2004-Nov-15 20:46:54 1399 bytes prism/public/worksheet/Class_Hazard_GF_L_1_0_7_28/P_Eqn_3.png
2004-Nov-15 20:46:56 947 bytes prism/public/worksheet/Class_Hazard_GF_L_1_0_7_28/P_Eqn_4.png
2004-Nov-15 20:46:56 812 bytes prism/public/worksheet/Class_Hazard_GF_L_1_0_7_28/P_Eqn_5.png
2004-Nov-15 20:46:56 947 bytes prism/public/worksheet/Class_Hazard_GF_L_1_0_7_28/P_Eqn_6.png
2004-Nov-15 20:46:56 953 bytes prism/public/worksheet/Class_Hazard_GF_L_1_0_7_28/P_Eqn_7.png
2004-Nov-15 20:46:56 946 bytes prism/public/worksheet/Class_Hazard_GF_L_1_0_7_28/P_Eqn_8.png
2004-Nov-15 20:46:56 712 bytes prism/public/worksheet/Class_Hazard_GF_L_1_0_7_28/P_Eqn_9.png
2004-Dec-13 10:26:52 1700 bytes prism/public/worksheet/Class_Hazard_GF_S_1_0_7_28
2004-Nov-15 20:46:56 761 bytes prism/public/worksheet/Class_Hazard_GF_S_1_0_7_28/BP_Eqn_0.png
2004-Nov-15 20:46:56 782 bytes prism/public/worksheet/Class_Hazard_GF_S_1_0_7_28/BP_Eqn_1.png
2004-Nov-15 20:46:56 605 bytes prism/public/worksheet/Class_Hazard_GF_S_1_0_7_28/CF_Eqn_0.png
2004-Nov-15 20:46:56 817 bytes prism/public/worksheet/Class_Hazard_GF_S_1_0_7_28/CF_Eqn_1.png
2004-Nov-15 20:46:56 1153 bytes prism/public/worksheet/Class_Hazard_GF_S_1_0_7_28/CF_Eqn_10.png
2004-Nov-15 20:46:56 238 bytes prism/public/worksheet/Class_Hazard_GF_S_1_0_7_28/CF_Eqn_2.png
2004-Nov-15 20:46:56 826 bytes prism/public/worksheet/Class_Hazard_GF_S_1_0_7_28/CF_Eqn_3.png
2004-Nov-15 20:46:56 433 bytes prism/public/worksheet/Class_Hazard_GF_S_1_0_7_28/CF_Eqn_4.png
2004-Nov-15 20:46:56 700 bytes prism/public/worksheet/Class_Hazard_GF_S_1_0_7_28/CF_Eqn_5.png
2004-Nov-15 20:46:56 453 bytes prism/public/worksheet/Class_Hazard_GF_S_1_0_7_28/CF_Eqn_6.png
2004-Nov-15 20:46:56 208 bytes prism/public/worksheet/Class_Hazard_GF_S_1_0_7_28/CF_Eqn_7.png
2004-Nov-15 20:46:56 912 bytes prism/public/worksheet/Class_Hazard_GF_S_1_0_7_28/CF_Eqn_8.png
2004-Nov-15 20:46:56 238 bytes prism/public/worksheet/Class_Hazard_GF_S_1_0_7_28/CF_Eqn_9.png
2004-Nov-15 20:46:56 1249 bytes prism/public/worksheet/Class_Hazard_GF_S_1_0_7_28/CalcKbp_CalcKb_Eqn_0.png
2004-Nov-15 20:46:56 951 bytes prism/public/worksheet/Class_Hazard_GF_S_1_0_7_28/CalcKbp_CalcKv_Eqn_0.png
2004-Nov-15 20:46:56 728 bytes prism/public/worksheet/Class_Hazard_GF_S_1_0_7_28/CalcKbp_CalcKv_Eqn_1.png
2004-Nov-15 20:46:56 791 bytes prism/public/worksheet/Class_Hazard_GF_S_1_0_7_28/CalcKbp_CalcKv_Eqn_2.png
2004-Nov-15 20:46:56 706 bytes prism/public/worksheet/Class_Hazard_GF_S_1_0_7_28/CalcKbp_CalcKv_Eqn_3.png
2004-Nov-15 20:46:56 427 bytes prism/public/worksheet/Class_Hazard_GF_S_1_0_7_28/CalcKbp_Eqn_0.png
2004-Nov-15 20:46:56 373 bytes prism/public/worksheet/Class_Hazard_GF_S_1_0_7_28/CalcKbp_Eqn_1.png
2004-Nov-15 20:46:56 361 bytes prism/public/worksheet/Class_Hazard_GF_S_1_0_7_28/CalcKn_Eqn_0.png
2004-Nov-15 20:46:56 762 bytes prism/public/worksheet/Class_Hazard_GF_S_1_0_7_28/CalcKn_Eqn_1.png
2004-Nov-15 20:46:56 1378 bytes prism/public/worksheet/Class_Hazard_GF_S_1_0_7_28/CalcKn_Eqn_2.png
2004-Nov-15 20:46:56 947 bytes prism/public/worksheet/Class_Hazard_GF_S_1_0_7_28/CalcKn_Eqn_3.png
2004-Nov-15 20:46:56 1416 bytes prism/public/worksheet/Class_Hazard_GF_S_1_0_7_28/CalcSteam_Eqn_0.png
2004-Nov-15 20:46:56 937 bytes prism/public/worksheet/Class_Hazard_GF_S_1_0_7_28/PC_Eqn_0.png
2004-Nov-15 20:46:56 1044 bytes prism/public/worksheet/Class_Hazard_GF_S_1_0_7_28/PVP_Eqn_0.png
2004-Nov-15 20:46:56 395 bytes prism/public/worksheet/Class_Hazard_GF_S_1_0_7_28/PVP_Eqn_1.png 2004-Nov-15 20:46:56 1347 bytes prism/public/worksheet/Class_Hazard_GF_S_1_0_7_28/P_Eqn_0.png
2004-Nov-15 20:46:56 1668 bytes prism/public/worksheet/Class_Hazard_GF_S_1_0_7_28/P_Eqn_1.png
2004-Nov-15 20:46:56 1042 bytes prism/public/worksheet/Class_Hazard_GF_S_1_0_7_28/P_Eqn_10.png
2004-Nov-15 20:46:56 1198 bytes prism/public/worksheet/Class_Hazard_GF_S_1_0_7_28/P_Eqn_11.png
2004-Nov-15 20:46:56 1058 bytes prism/public/worksheet/Class_Hazard_GF_S_1_0_7_28/P_Eqn_12.png
2004-Nov-15 20:46:56 758 bytes prism/public/worksheet/Class_Hazard_GF_S_1_0_7_28/P_Eqn_13.png
2004-Nov-15 20:46:56 589 bytes prism/public/worksheet/Class_Hazard_GF_S_1_0_7_28/P_Eqn_14.png
2004-Nov-15 20:46:56 1058 bytes prism/public/worksheet/Class_Hazard_GF_S_1_0_7_28/P_Eqn_15.png
2004-Nov-15 20:46:56 599 bytes prism/public/worksheet/Class_Hazard_GF_S_1_0_7_28/P_Eqn_16.png
2004-Nov-15 20:46:56 1137 bytes prism/public/worksheet/Class_Hazard_GF_S_1_0_7_28/P_Eqn_17.png
2004-Nov-15 20:46:56 799 bytes prism/public/worksheet/Class_Hazard_GF_S_1_0_7_28/P_Eqn_18.png
2004-Nov-15 20:46:56 682 bytes prism/public/worksheet/Class_Hazard_GF_S_1_0_7_28/P_Eqn_19.png
2004-Nov-15 20:46:56 1373 bytes prism/public/worksheet/Class_Hazard_GF_S_1_0_7_28/P_Eqn_2.png
2004-Nov-15 20:46:56 1399 bytes prism/public/worksheet/Class_Hazard_GF_S_1_0_7_28/P_Eqn_3.png
2004-Nov-15 20:46:56 947 bytes prism/public/worksheet/Class_Hazard_GF_S_1_0_7_28/P_Eqn_4.png
2004-Nov-15 20:46:56 812 bytes prism/public/worksheet/Class_Hazard_GF_S_1_0_7_28/P_Eqn_5.png
2004-Nov-15 20:46:56 947 bytes prism/public/worksheet/Class_Hazard_GF_S_1_0_7_28/P_Eqn_6.png
2004-Nov-15 20:46:56 953 bytes prism/public/worksheet/Class_Hazard_GF_S_1_0_7_28/P_Eqn_7.png
2004-Nov-15 20:46:56 946 bytes prism/public/worksheet/Class_Hazard_GF_S_1_0_7_28/P_Eqn_8.png
2004-Nov-15 20:46:56 712 bytes prism/public/worksheet/Class_Hazard_GF_S_1_0_7_28/P_Eqn_9.png
2004-Dec-13 10:26:52 2040 bytes prism/public/worksheet/Class_Hazard_GF_V_1_0_7_28
2004-Nov-15 20:46:56 761 bytes prism/public/worksheet/Class_Hazard_GF_V_1_0_7_28/BP_Eqn_0.png
2004-Nov-15 20:46:56 782 bytes prism/public/worksheet/Class_Hazard_GF_V_1_0_7_28/BP_Eqn_1.png
2004-Nov-15 20:46:56 605 bytes prism/public/worksheet/Class_Hazard_GF_V_1_0_7_28/CalcGasVol_CF_Eqn_0.png
2004-Nov-15 20:46:56 817 bytes prism/public/worksheet/Class_Hazard_GF_V_1_0_7_28/CalcGasVol_CF_Eqn_1.png
2004-Nov-15 20:46:56 1153 bytes prism/public/worksheet/Class_Hazard_GF_V_1_0_7_28/CalcGasVol_CF_Eqn_10.png
2004-Nov-15 20:46:56 238 bytes prism/public/worksheet/Class_Hazard_GF_V_1_0_7_28/CalcGasVol_CF_Eqn_2.png
2004-Nov-15 20:46:56 826 bytes prism/public/worksheet/Class_Hazard_GF_V_1_0_7_28/CalcGasVol_CF_Eqn_3.png
2004-Nov-15 20:46:56 433 bytes prism/public/worksheet/Class_Hazard_GF_V_1_0_7_28/CalcGasVol_CF_Eqn_4.png
2004-Nov-15 20:46:56 700 bytes prism/public/worksheet/Class_Hazard_GF_V_1_0_7_28/CalcGasVol_CF_Eqn_5.png
2004-Nov-15 20:46:56 453 bytes prism/public/worksheet/Class_Hazard_GF_V_1_0_7_28/CalcGasVol_CF_Eqn_6.png
2004-Nov-15 20:46:56 208 bytes prism/public/worksheet/Class_Hazard_GF_V_1_0_7_28/CalcGasVol_CF_Eqn_7.png
2004-Nov-15 20:46:56 912 bytes prism/public/worksheet/Class_Hazard_GF_V_1_0_7_28/CalcGasVol_CF_Eqn_8.png
2004-Nov-15 20:46:56 238 bytes prism/public/worksheet/Class_Hazard_GF_V_1_0_7_28/CalcGasVol_CF_Eqn_9.png
2004-Nov-15 20:46:56 1751 bytes prism/public/worksheet/Class_Hazard_GF_V_1_0_7_28/CalcGasVol_Eqn_0.png
2004-Nov-15 20:46:56 1259 bytes prism/public/worksheet/Class_Hazard_GF_V_1_0_7_28/CalcGasVol_Eqn_1.png
2004-Nov-15 20:46:56 1249 bytes prism/public/worksheet/Class_Hazard_GF_V_1_0_7_28/CalcKbp_CalcKb_Eqn_0.png
2004-Nov-15 20:46:56 951 bytes prism/public/worksheet/Class_Hazard_GF_V_1_0_7_28/CalcKbp_CalcKv_Eqn_0.png
2004-Nov-15 20:46:56 728 bytes prism/public/worksheet/Class_Hazard_GF_V_1_0_7_28/CalcKbp_CalcKv_Eqn_1.png
2004-Nov-15 20:46:56 791 bytes prism/public/worksheet/Class_Hazard_GF_V_1_0_7_28/CalcKbp_CalcKv_Eqn_2.png
2004-Nov-15 20:46:56 706 bytes prism/public/worksheet/Class_Hazard_GF_V_1_0_7_28/CalcKbp_CalcKv_Eqn_3.png
2004-Nov-15 20:46:56 427 bytes prism/public/worksheet/Class_Hazard_GF_V_1_0_7_28/CalcKbp_Eqn_0.png
2004-Nov-15 20:46:56 373 bytes prism/public/worksheet/Class_Hazard_GF_V_1_0_7_28/CalcKbp_Eqn_1.png
2004-Nov-15 20:46:56 605 bytes prism/public/worksheet/Class_Hazard_GF_V_1_0_7_28/CalcVapMass_CF_Eqn_0.png
2004-Nov-15 20:46:56 817 bytes prism/public/worksheet/Class_Hazard_GF_V_1_0_7_28/CalcVapMass_CF_Eqn_1.png
2004-Nov-15 20:46:56 1153 bytes prism/public/worksheet/Class_Hazard_GF_V_1_0_7_28/CalcVapMass_CF_Eqn_10.png
2004-Nov-15 20:46:56 238 bytes prism/public/worksheet/Class_Hazard_GF_V_1_0_7_28/CalcVapMass_CF_Eqn_2.png
2004-Nov-15 20:46:56 826 bytes prism/public/worksheet/Class_Hazard_GF_V_1_0_7_28/CalcVapMass_CF_Eqn_3.png
2004-Nov-15 20:46:56 433 bytes prism/public/worksheet/Class_Hazard_GF_V_1_0_7_28/CalcVapMass_CF_Eqn_4.png
2004-Nov-15 20:46:56 700 bytes prism/public/worksheet/Class_Hazard_GF_V_1_0_7_28/CalcVapMass_CF_Eqn_5.png
2004-Nov-15 20:46:56 453 bytes prism/public/worksheet/Class_Hazard_GF_V_1_0_7_28/CalcVapMass_CF_Eqn_6.png
2004-Nov-15 20:46:56 208 bytes prism/public/worksheet/Class_Hazard_GF_V_1_0_7_28/CalcVapMass_CF_Eqn_7.png
2004-Nov-15 20:46:56 912 bytes prism/public/worksheet/Class_Hazard_GF_V_1_0_7_28/CalcVapMass_CF_Eqn_8.png
2004-Nov-15 20:46:56 238 bytes prism/public/worksheet/Class_Hazard_GF_V_1_0_7_28/CalcVapMass_CF_Eqn_9.png
2004-Nov-15 20:46:58 1803 bytes prism/public/worksheet/Class_Hazard_GF_V_1_0_7_28/CalcVapMass_Eqn_0.png
2004-Nov-15 20:46:58 1362 bytes prism/public/worksheet/Class_Hazard_GF_V_1_0_7_28/CalcVapMass_Eqn_1.png
2004-Nov-15 20:46:58 937 bytes prism/public/worksheet/Class_Hazard_GF_V_1_0_7_28/PC_Eqn_0.png
2004-Nov-15 20:46:58 1044 bytes prism/public/worksheet/Class_Hazard_GF_V_1_0_7_28/PVP_Eqn_0.png
2004-Nov-15 20:46:58 395 bytes prism/public/worksheet/Class_Hazard_GF_V_1_0_7_28/PVP_Eqn_1.png
2004-Nov-15 20:46:58 1347 bytes prism/public/worksheet/Class_Hazard_GF_V_1_0_7_28/P_Eqn_0.png
2004-Nov-15 20:46:58 1668 bytes prism/public/worksheet/Class_Hazard_GF_V_1_0_7_28/P_Eqn_1.png 2004-Nov-15 20:46:58 1042 bytes prism/public/worksheet/Class_Hazard_GF_V_1_0_7_28/P_Eqn_10.png
2004-Nov-15 20:46:58 1198 bytes prism/public/worksheet/Class_Hazard_GF_V_1_0_7_28/P_Eqn_11.png
2004-Nov-15 20:46:58 1058 bytes prism/public/worksheet/Class_Hazard_GF_V_1_0_7_28/P_Eqn_12.png
2004-Nov-15 20:46:58 758 bytes prism/public/worksheet/Class_Hazard_GF_V_1_0_7_28/P_Eqn_13.png
2004-Nov-15 20:46:58 589 bytes prism/public/worksheet/Class_Hazard_GF_V_1_0_7_28/P_Eqn_14.png
2004-Nov-15 20:46:58 1058 bytes prism/public/worksheet/Class_Hazard_GF_V_1_0_7_28/P_Eqn_15.png
2004-Nov-15 20:46:58 599 bytes prism/public/worksheet/Class_Hazard_GF_V_1_0_7_28/P_Eqn_16.png
2004-Nov-15 20:46:58 1137 bytes prism/public/worksheet/Class_Hazard_GF_V_1_0_7_28/P_Eqn_17.png
2004-Nov-15 20:46:58 799 bytes prism/public/worksheet/Class_Hazard_GF_V_1_0_7_28/P_Eqn_18.png
2004-Nov-15 20:46:58 682 bytes prism/public/worksheet/Class_Hazard_GF_V_1_0_7_28/P_Eqn_19.png
2004-Nov-15 20:46:58 1373 bytes prism/public/worksheet/Class_Hazard_GF_V_1_0_7_28/P_Eqn_2.png
2004-Nov-15 20:46:58 1399 bytes prism/public/worksheet/Class_Hazard_GF_V_1_0_7_28/P_Eqn_3.png
2004-Nov-15 20:46:58 947 bytes prism/public/worksheet/Class_Hazard_GF_V_1_0_7_28/P_Eqn_4.png
2004-Nov-15 20:46:58 812 bytes prism/public/worksheet/Class_Hazard_GF_V_1_0_7_28/P_Eqn_5.png
2004-Nov-15 20:46:58 947 bytes prism/public/worksheet/Class_Hazard_GF_V_1_0_7_28/P_Eqn_6.png
2004-Nov-15 20:46:58 953 bytes prism/public/worksheet/Class_Hazard_GF_V_1_0_7_28/P_Eqn_7.png
2004-Nov-15 20:46:58 946 bytes prism/public/worksheet/Class_Hazard_GF_V_1_0_7_28/P_Eqn_8.png
2004-Nov-15 20:46:58 712 bytes prism/public/worksheet/Class_Hazard_GF_V_1_0_7_28/P_Eqn_9.png
2004-Dec-13 10:26:52 816 bytes prism/public/worksheet/Class_Hazard_LE_2_1_0_7_28
2004-Nov-15 20:46:58 761 bytes prism/public/worksheet/Class_Hazard_LE_2_1_0_7_28/BP_Eqn_0.png
2004-Nov-15 20:46:58 782 bytes prism/public/worksheet/Class_Hazard_LE_2_1_0_7_28/BP_Eqn_1.png
2004-Nov-15 20:46:58 1347 bytes prism/public/worksheet/Class_Hazard_LE_2_1_0_7_28/P_Eqn_0.png
2004-Nov-15 20:46:58 1668 bytes prism/public/worksheet/Class_Hazard_LE_2_1_0_7_28/P_Eqn_1.png
2004-Nov-15 20:46:58 1042 bytes prism/public/worksheet/Class_Hazard_LE_2_1_0_7_28/P_Eqn_10.png
2004-Nov-15 20:46:58 1198 bytes prism/public/worksheet/Class_Hazard_LE_2_1_0_7_28/P_Eqn_11.png
2004-Nov-15 20:46:58 1058 bytes prism/public/worksheet/Class_Hazard_LE_2_1_0_7_28/P_Eqn_12.png
2004-Nov-15 20:46:58 758 bytes prism/public/worksheet/Class_Hazard_LE_2_1_0_7_28/P_Eqn_13.png
2004-Nov-15 20:46:58 589 bytes prism/public/worksheet/Class_Hazard_LE_2_1_0_7_28/P_Eqn_14.png
2004-Nov-15 20:46:58 1058 bytes prism/public/worksheet/Class_Hazard_LE_2_1_0_7_28/P_Eqn_15.png
2004-Nov-15 20:46:58 599 bytes prism/public/worksheet/Class_Hazard_LE_2_1_0_7_28/P_Eqn_16.png
2004-Nov-15 20:46:58 1137 bytes prism/public/worksheet/Class_Hazard_LE_2_1_0_7_28/P_Eqn_17.png
2004-Nov-15 20:46:58 799 bytes prism/public/worksheet/Class_Hazard_LE_2_1_0_7_28/P_Eqn_18.png
2004-Nov-15 20:46:58 682 bytes prism/public/worksheet/Class_Hazard_LE_2_1_0_7_28/P_Eqn_19.png
2004-Nov-15 20:46:58 1373 bytes prism/public/worksheet/Class_Hazard_LE_2_1_0_7_28/P_Eqn_2.png
2004-Nov-15 20:46:58 1399 bytes prism/public/worksheet/Class_Hazard_LE_2_1_0_7_28/P_Eqn_3.png
2004-Nov-15 20:46:58 947 bytes prism/public/worksheet/Class_Hazard_LE_2_1_0_7_28/P_Eqn_4.png
2004-Nov-15 20:46:58 812 bytes prism/public/worksheet/Class_Hazard_LE_2_1_0_7_28/P_Eqn_5.png
2004-Nov-15 20:46:58 947 bytes prism/public/worksheet/Class_Hazard_LE_2_1_0_7_28/P_Eqn_6.png
2004-Nov-15 20:46:58 953 bytes prism/public/worksheet/Class_Hazard_LE_2_1_0_7_28/P_Eqn_7.png
2004-Nov-15 20:46:58 946 bytes prism/public/worksheet/Class_Hazard_LE_2_1_0_7_28/P_Eqn_8.png
2004-Nov-15 20:46:58 712 bytes prism/public/worksheet/Class_Hazard_LE_2_1_0_7_28/P_Eqn_9.png
2004-Dec-13 10:26:52 1190 bytes prism/public/worksheet/Class_Hazard_LE_L_1_0_7_28
2004-Nov-15 20:46:58 761 bytes prism/public/worksheet/Class_Hazard_LE_L_1_0_7_28/BP_Eqn_0.png
2004-Nov-15 20:46:58 782 bytes prism/public/worksheet/Class_Hazard_LE_L_1_0_7_28/BP_Eqn_1.png
2004-Nov-15 20:46:58 917 bytes prism/public/worksheet/Class_Hazard_LE_L_1_0_7_28/CalcKbp_CalcKw_Eqn_0.png
2004-Nov-15 20:46:58 935 bytes prism/public/worksheet/Class_Hazard_LE_L_1_0_7_28/CalcKbp_CalcKw_Eqn_1.png
2004-Nov-15 20:46:58 728 bytes prism/public/worksheet/Class_Hazard_LE_L_1_0_7_28/CalcKbp_CalcKw_Eqn_2.png
2004-Nov-15 20:46:58 413 bytes prism/public/worksheet/Class_Hazard_LE_L_1_0_7_28/CalcKbp_Eqn_0.png
2004-Nov-15 20:46:58 413 bytes prism/public/worksheet/Class_Hazard_LE_L_1_0_7_28/CalcKbp_Eqn_1.png
2004-Nov-15 20:46:58 380 bytes prism/public/worksheet/Class_Hazard_LE_L_1_0_7_28/CalcKbp_Eqn_2.png
2004-Nov-15 20:46:58 1739 bytes prism/public/worksheet/Class_Hazard_LE_L_1_0_7_28/CalcLiquidVol_Eqn_0.png
2004-Nov-15 20:46:58 1146 bytes prism/public/worksheet/Class_Hazard_LE_L_1_0_7_28/CalcReqCapacity_Eqn_0.png
2004-Nov-15 20:46:58 1178 bytes prism/public/worksheet/Class_Hazard_LE_L_1_0_7_28/LP_Eqn_0.png
2004-Nov-15 20:46:58 937 bytes prism/public/worksheet/Class_Hazard_LE_L_1_0_7_28/PC_Eqn_0.png
2004-Nov-15 20:46:58 765 bytes prism/public/worksheet/Class_Hazard_LE_L_1_0_7_28/PD_Eqn_0.png
2004-Nov-15 20:46:58 1347 bytes prism/public/worksheet/Class_Hazard_LE_L_1_0_7_28/P_Eqn_0.png
2004-Nov-15 20:46:58 1668 bytes prism/public/worksheet/Class_Hazard_LE_L_1_0_7_28/P_Eqn_1.png
2004-Nov-15 20:46:58 1042 bytes prism/public/worksheet/Class_Hazard_LE_L_1_0_7_28/P_Eqn_10.png
2004-Nov-15 20:46:58 1198 bytes prism/public/worksheet/Class_Hazard_LE_L_1_0_7_28/P_Eqn_11.png
2004-Nov-15 20:46:58 1058 bytes prism/public/worksheet/Class_Hazard_LE_L_1_0_7_28/P_Eqn_12.png
2004-Nov-15 20:46:58 758 bytes prism/public/worksheet/Class_Hazard_LE_L_1_0_7_28/P_Eqn_13.png 2004-Nov-15 20:46:58 589 bytes prism/public/worksheet/Class_Hazard_LE_L_1_0_7_28/P_Eqn_14.png
2004-Nov-15 20:46:58 1058 bytes prism/public/worksheet/Class_Hazard_LE_L_1_0_7_28/P_Eqn_15.png
2004-Nov-15 20:46:58 599 bytes prism/public/worksheet/Class_Hazard_LE_L_1_0_7_28/P_Eqn_16.png
2004-Nov-15 20:46:58 1137 bytes prism/public/worksheet/Class_Hazard_LE_L_1_0_7_28/P_Eqn_17.png
2004-Nov-15 20:46:58 799 bytes prism/public/worksheet/Class_Hazard_LE_L_1_0_7_28/P_Eqn_18.png
2004-Nov-15 20:46:58 682 bytes prism/public/worksheet/Class_Hazard_LE_L_1_0_7_28/P_Eqn_19.png
2004-Nov-15 20:46:58 1373 bytes prism/public/worksheet/Class_Hazard_LE_L_1_0_7_28/P_Eqn_2.png
2004-Nov-15 20:46:58 1399 bytes prism/public/worksheet/Class_Hazard_LE_L_1_0_7_28/P_Eqn_3.png
2004-Nov-15 20:46:58 947 bytes prism/public/worksheet/Class_Hazard_LE_L_1_0_7_28/P_Eqn_4.png
2004-Nov-15 20:46:58 812 bytes prism/public/worksheet/Class_Hazard_LE_L_1_0_7_28/P_Eqn_5.png
2004-Nov-15 20:46:58 947 bytes prism/public/worksheet/Class_Hazard_LE_L_1_0_7_28/P_Eqn_6.png
2004-Nov-15 20:46:58 953 bytes prism/public/worksheet/Class_Hazard_LE_L_1_0_7_28/P_Eqn_7.png
2004-Nov-15 20:46:58 946 bytes prism/public/worksheet/Class_Hazard_LE_L_1_0_7_28/P_Eqn_8.png
2004-Nov-15 20:46:58 712 bytes prism/public/worksheet/Class_Hazard_LE_L_1_0_7_28/P_Eqn_9.png
2004-Dec-13 10:26:52 816 bytes prism/public/worksheet/Class_Hazard_PF_L_1_0_7_28
2004-Nov-15 20:46:58 761 bytes prism/public/worksheet/Class_Hazard_PF_L_1_0_7_28/BP_Eqn_0.png
2004-Nov-15 20:46:58 782 bytes prism/public/worksheet/Class_Hazard_PF_L_1_0_7_28/BP_Eqn_1.png
2004-Nov-15 20:46:58 1347 bytes prism/public/worksheet/Class_Hazard_PF_L_1_0_7_28/P_Eqn_0.png
2004-Nov-15 20:46:58 1668 bytes prism/public/worksheet/Class_Hazard_PF_L_1_0_7_28/P_Eqn_1.png
2004-Nov-15 20:47:00 1042 bytes prism/public/worksheet/Class_Hazard_PF_L_1_0_7_28/P_Eqn_10.png
2004-Nov-15 20:47:00 1198 bytes prism/public/worksheet/Class_Hazard_PF_L_1_0_7_28/P_Eqn_11.png
2004-Nov-15 20:47:00 1058 bytes prism/public/worksheet/Class_Hazard_PF_L_1_0_7_28/P_Eqn_12.png
2004-Nov-15 20:47:00 758 bytes prism/public/worksheet/Class_Hazard_PF_L_1_0_7_28/P_Eqn_13.png
2004-Nov-15 20:47:00 589 bytes prism/public/worksheet/Class_Hazard_PF_L_1_0_7_28/P_Eqn_14.png
2004-Nov-15 20:47:00 1058 bytes prism/public/worksheet/Class_Hazard_PF_L_1_0_7_28/P_Eqn_15.png
2004-Nov-15 20:47:00 599 bytes prism/public/worksheet/Class_Hazard_PF_L_1_0_7_28/P_Eqn_16.png
2004-Nov-15 20:47:00 1137 bytes prism/public/worksheet/Class_Hazard_PF_L_1_0_7_28/P_Eqn_17.png
2004-Nov-15 20:47:00 799 bytes prism/public/worksheet/Class_Hazard_PF_L_1_0_7_28/P_Eqn_18.png
2004-Nov-15 20:47:00 682 bytes prism/public/worksheet/Class_Hazard_PF_L_1_0_7_28/P_Eqn_19.png
2004-Nov-15 20:47:00 1373 bytes prism/public/worksheet/Class_Hazard_PF_L_1_0_7_28/P_Eqn_2.png
2004-Nov-15 20:47:00 1399 bytes prism/public/worksheet/Class_Hazard_PF_L_1_0_7_28/P_Eqn_3.png
2004-Nov-15 20:47:00 947 bytes prism/public/worksheet/Class_Hazard_PF_L_1_0_7_28/P_Eqn_4.png
2004-Nov-15 20:47:00 812 bytes prism/public/worksheet/Class_Hazard_PF_L_1_0_7_28/P_Eqn_5.png
2004-Nov-15 20:47:00 947 bytes prism/public/worksheet/Class_Hazard_PF_L_1_0_7_28/P_Eqn_6.png
2004-Nov-15 20:47:00 953 bytes prism/public/worksheet/Class_Hazard_PF_L_1_0_7_28/P_Eqn_7.png
2004-Nov-15 20:47:00 946 bytes prism/public/worksheet/Class_Hazard_PF_L_1_0_7_28/P_Eqn_8.png
2004-Nov-15 20:47:00 712 bytes prism/public/worksheet/Class_Hazard_PF_L_1_0_7_28/P_Eqn_9.png
2004-Dec-13 10:26:52 816 bytes prism/public/worksheet/Class_Hazard_PF_V_1_0_7_28
2004-Nov-15 20:47:00 761 bytes prism/public/worksheet/Class_Hazard_PF_V_1_0_7_28/BP_Eqn_0.png
2004-Nov-15 20:47:00 782 bytes prism/public/worksheet/Class_Hazard_PF_V_1_0_7_28/BP_Eqn_1.png
2004-Nov-15 20:47:00 1347 bytes prism/public/worksheet/Class_Hazard_PF_V_1_0_7_28/P_Eqn_0.png
2004-Nov-15 20:47:00 1668 bytes prism/public/worksheet/Class_Hazard_PF_V_1_0_7_28/P_Eqn_1.png
2004-Nov-15 20:47:00 1042 bytes prism/public/worksheet/Class_Hazard_PF_V_1_0_7_28/P_Eqn_10.png
2004-Nov-15 20:47:00 1198 bytes prism/public/worksheet/Class_Hazard_PF_V_1_0_7_28/P_Eqn_11.png
2004-Nov-15 20:47:00 1058 bytes prism/public/worksheet/Class_Hazard_PF_V_1_0_7_28/P_Eqn_12.png
2004-Nov-15 20:47:00 758 bytes prism/public/worksheet/Class_Hazard_PF_V_1_0_7_28/P_Eqn_13.png
2004-Nov-15 20:47:00 589 bytes prism/public/worksheet/Class_Hazard_PF_V_1_0_7_28/P_Eqn_14.png
2004-Nov-15 20:47:00 1058 bytes prism/public/worksheet/Class_Hazard_PF_V_1_0_7_28/P_Eqn_15.png
2004-Nov-15 20:47:00 599 bytes prism/public/worksheet/Class_Hazard_PF_V_1_0_7_28/P_Eqn_16.png
2004-Nov-15 20:47:00 1137 bytes prism/public/worksheet/Class_Hazard_PF_V_1_0_7_28/P_Eqn_17.png
2004-Nov-15 20:47:00 799 bytes prism/public/worksheet/Class_Hazard_PF_V_1_0_7_28/P_Eqn_18.png
2004-Nov-15 20:47:00 682 bytes prism/public/worksheet/Class_Hazard_PF_V_1_0_7_28/P_Eqn_19.png
2004-Nov-15 20:47:00 1373 bytes prism/public/worksheet/Class_Hazard_PF_V_1_0_7_28/P_Eqn_2.png
2004-Nov-15 20:47:00 1399 bytes prism/public/worksheet/Class_Hazard_PF_V_1_0_7_28/P_Eqn_3.png
2004-Nov-15 20:47:00 947 bytes prism/public/worksheet/Class_Hazard_PF_V_1_0_7_28/P_Eqn_4.png
2004-Nov-15 20:47:00 812 bytes prism/public/worksheet/Class_Hazard_PF_V_1_0_7_28/P_Eqn_5.png
2004-Nov-15 20:47:00 947 bytes prism/public/worksheet/Class_Hazard_PF_V_1_0_7_28/P_Eqn_6.png
2004-Nov-15 20:47:00 953 bytes prism/public/worksheet/Class_Hazard_PF_V_1_0_7_28/P_Eqn_7.png
2004-Nov-15 20:47:00 946 bytes prism/public/worksheet/Class_Hazard_PF_V_1_0_7_28/P_Eqn_8.png
2004-Nov-15 20:47:00 712 bytes prism/public/worksheet/Class_Hazard_PF_V_1_0_7_28/P_Eqn_9.png
2004-Dec-13 10:26:52 816 bytes prism/public/worksheet/Class_Hazard_PP_L_1_0_7_28

| | | |
|---|---|---|
| 2004-Nov-15 20:47:00 | 761 bytes | prism/public/worksheet/Class_Hazard_PP_L_1_0_7_28/BP_Eqn_0.png |
| 2004-Nov-15 20:47:00 | 782 bytes | prism/public/worksheet/Class_Hazard_PP_L_1_0_7_28/BP_Eqn_1.png |
| 2004-Nov-15 20:47:00 | 1347 bytes | prism/public/worksheet/Class_Hazard_PP_L_1_0_7_28/P_Eqn_0.png |
| 2004-Nov-15 20:47:00 | 1668 bytes | prism/public/worksheet/Class_Hazard_PP_L_1_0_7_28/P_Eqn_1.png |
| 2004-Nov-15 20:47:00 | 1042 bytes | prism/public/worksheet/Class_Hazard_PP_L_1_0_7_28/P_Eqn_10.png |
| 2004-Nov-15 20:47:00 | 1198 bytes | prism/public/worksheet/Class_Hazard_PP_L_1_0_7_28/P_Eqn_11.png |
| 2004-Nov-15 20:47:00 | 1058 bytes | prism/public/worksheet/Class_Hazard_PP_L_1_0_7_28/P_Eqn_12.png |
| 2004-Nov-15 20:47:00 | 758 bytes | prism/public/worksheet/Class_Hazard_PP_L_1_0_7_28/P_Eqn_13.png |
| 2004-Nov-15 20:47:00 | 589 bytes | prism/public/worksheet/Class_Hazard_PP_L_1_0_7_28/P_Eqn_14.png |
| 2004-Nov-15 20:47:00 | 1058 bytes | prism/public/worksheet/Class_Hazard_PP_L_1_0_7_28/P_Eqn_15.png |
| 2004-Nov-15 20:47:00 | 599 bytes | prism/public/worksheet/Class_Hazard_PP_L_1_0_7_28/P_Eqn_16.png |
| 2004-Nov-15 20:47:00 | 1137 bytes | prism/public/worksheet/Class_Hazard_PP_L_1_0_7_28/P_Eqn_17.png |
| 2004-Nov-15 20:47:00 | 799 bytes | prism/public/worksheet/Class_Hazard_PP_L_1_0_7_28/P_Eqn_18.png |
| 2004-Nov-15 20:47:00 | 682 bytes | prism/public/worksheet/Class_Hazard_PP_L_1_0_7_28/P_Eqn_19.png |
| 2004-Nov-15 20:47:00 | 1373 bytes | prism/public/worksheet/Class_Hazard_PP_L_1_0_7_28/P_Eqn_2.png |
| 2004-Nov-15 20:47:00 | 1399 bytes | prism/public/worksheet/Class_Hazard_PP_L_1_0_7_28/P_Eqn_3.png |
| 2004-Nov-15 20:47:00 | 947 bytes | prism/public/worksheet/Class_Hazard_PP_L_1_0_7_28/P_Eqn_4.png |
| 2004-Nov-15 20:47:00 | 812 bytes | prism/public/worksheet/Class_Hazard_PP_L_1_0_7_28/P_Eqn_5.png |
| 2004-Nov-15 20:47:00 | 947 bytes | prism/public/worksheet/Class_Hazard_PP_L_1_0_7_28/P_Eqn_6.png |
| 2004-Nov-15 20:47:00 | 953 bytes | prism/public/worksheet/Class_Hazard_PP_L_1_0_7_28/P_Eqn_7.png |
| 2004-Nov-15 20:47:00 | 946 bytes | prism/public/worksheet/Class_Hazard_PP_L_1_0_7_28/P_Eqn_8.png |
| 2004-Nov-15 20:47:00 | 712 bytes | prism/public/worksheet/Class_Hazard_PP_L_1_0_7_28/P_Eqn_9.png |
| 2004-Dec-13 10:26:52 | 816 bytes | prism/public/worksheet/Class_Hazard_PT_V_1_0_7_28 |
| 2004-Nov-15 20:47:00 | 761 bytes | prism/public/worksheet/Class_Hazard_PT_V_1_0_7_28/BP_Eqn_0.png |
| 2004-Nov-15 20:47:00 | 782 bytes | prism/public/worksheet/Class_Hazard_PT_V_1_0_7_28/BP_Eqn_1.png |
| 2004-Nov-15 20:47:00 | 1347 bytes | prism/public/worksheet/Class_Hazard_PT_V_1_0_7_28/P_Eqn_0.png |
| 2004-Nov-15 20:47:00 | 1668 bytes | prism/public/worksheet/Class_Hazard_PT_V_1_0_7_28/P_Eqn_1.png |
| 2004-Nov-15 20:47:00 | 1042 bytes | prism/public/worksheet/Class_Hazard_PT_V_1_0_7_28/P_Eqn_10.png |
| 2004-Nov-15 20:47:00 | 1198 bytes | prism/public/worksheet/Class_Hazard_PT_V_1_0_7_28/P_Eqn_11.png |
| 2004-Nov-15 20:47:00 | 1058 bytes | prism/public/worksheet/Class_Hazard_PT_V_1_0_7_28/P_Eqn_12.png |
| 2004-Nov-15 20:47:00 | 758 bytes | prism/public/worksheet/Class_Hazard_PT_V_1_0_7_28/P_Eqn_13.png |
| 2004-Nov-15 20:47:00 | 589 bytes | prism/public/worksheet/Class_Hazard_PT_V_1_0_7_28/P_Eqn_14.png |
| 2004-Nov-15 20:47:00 | 1058 bytes | prism/public/worksheet/Class_Hazard_PT_V_1_0_7_28/P_Eqn_15.png |
| 2004-Nov-15 20:47:00 | 599 bytes | prism/public/worksheet/Class_Hazard_PT_V_1_0_7_28/P_Eqn_16.png |
| 2004-Nov-15 20:47:00 | 1137 bytes | prism/public/worksheet/Class_Hazard_PT_V_1_0_7_28/P_Eqn_17.png |
| 2004-Nov-15 20:47:00 | 799 bytes | prism/public/worksheet/Class_Hazard_PT_V_1_0_7_28/P_Eqn_18.png |
| 2004-Nov-15 20:47:00 | 682 bytes | prism/public/worksheet/Class_Hazard_PT_V_1_0_7_28/P_Eqn_19.png |
| 2004-Nov-15 20:47:00 | 1373 bytes | prism/public/worksheet/Class_Hazard_PT_V_1_0_7_28/P_Eqn_2.png |
| 2004-Nov-15 20:47:00 | 1399 bytes | prism/public/worksheet/Class_Hazard_PT_V_1_0_7_28/P_Eqn_3.png |
| 2004-Nov-15 20:47:00 | 947 bytes | prism/public/worksheet/Class_Hazard_PT_V_1_0_7_28/P_Eqn_4.png |
| 2004-Nov-15 20:47:00 | 812 bytes | prism/public/worksheet/Class_Hazard_PT_V_1_0_7_28/P_Eqn_5.png |
| 2004-Nov-15 20:47:00 | 947 bytes | prism/public/worksheet/Class_Hazard_PT_V_1_0_7_28/P_Eqn_6.png |
| 2004-Nov-15 20:47:00 | 953 bytes | prism/public/worksheet/Class_Hazard_PT_V_1_0_7_28/P_Eqn_7.png |
| 2004-Nov-15 20:47:00 | 946 bytes | prism/public/worksheet/Class_Hazard_PT_V_1_0_7_28/P_Eqn_8.png |
| 2004-Nov-15 20:47:00 | 712 bytes | prism/public/worksheet/Class_Hazard_PT_V_1_0_7_28/P_Eqn_9.png |
| 2004-Dec-13 10:26:52 | 816 bytes | prism/public/worksheet/Class_Hazard_SC_S_1_0_7_28 |
| 2004-Nov-15 20:47:00 | 761 bytes | prism/public/worksheet/Class_Hazard_SC_S_1_0_7_28/BP_Eqn_0.png |
| 2004-Nov-15 20:47:02 | 782 bytes | prism/public/worksheet/Class_Hazard_SC_S_1_0_7_28/BP_Eqn_1.png |
| 2004-Nov-15 20:47:02 | 1347 bytes | prism/public/worksheet/Class_Hazard_SC_S_1_0_7_28/P_Eqn_0.png |
| 2004-Nov-15 20:47:02 | 1668 bytes | prism/public/worksheet/Class_Hazard_SC_S_1_0_7_28/P_Eqn_1.png |
| 2004-Nov-15 20:47:02 | 1042 bytes | prism/public/worksheet/Class_Hazard_SC_S_1_0_7_28/P_Eqn_10.png |
| 2004-Nov-15 20:47:02 | 1198 bytes | prism/public/worksheet/Class_Hazard_SC_S_1_0_7_28/P_Eqn_11.png |
| 2004-Nov-15 20:47:02 | 1058 bytes | prism/public/worksheet/Class_Hazard_SC_S_1_0_7_28/P_Eqn_12.png |
| 2004-Nov-15 20:47:02 | 758 bytes | prism/public/worksheet/Class_Hazard_SC_S_1_0_7_28/P_Eqn_13.png |
| 2004-Nov-15 20:47:02 | 589 bytes | prism/public/worksheet/Class_Hazard_SC_S_1_0_7_28/P_Eqn_14.png |
| 2004-Nov-15 20:47:02 | 1058 bytes | prism/public/worksheet/Class_Hazard_SC_S_1_0_7_28/P_Eqn_15.png |
| 2004-Nov-15 20:47:02 | 599 bytes | prism/public/worksheet/Class_Hazard_SC_S_1_0_7_28/P_Eqn_16.png |
| 2004-Nov-15 20:47:02 | 1137 bytes | prism/public/worksheet/Class_Hazard_SC_S_1_0_7_28/P_Eqn_17.png |
| 2004-Nov-15 20:47:02 | 799 bytes | prism/public/worksheet/Class_Hazard_SC_S_1_0_7_28/P_Eqn_18.png |
| 2004-Nov-15 20:47:02 | 682 bytes | prism/public/worksheet/Class_Hazard_SC_S_1_0_7_28/P_Eqn_19.png |
| 2004-Nov-15 20:47:02 | 1373 bytes | prism/public/worksheet/Class_Hazard_SC_S_1_0_7_28/P_Eqn_2.png |

2004-Nov-15 20:47:02 1399 bytes prism/public/worksheet/Class_Hazard_SC_S_1_0_7_28/P_Eqn_3.png
2004-Nov-15 20:47:02 947 bytes prism/public/worksheet/Class_Hazard_SC_S_1_0_7_28/P_Eqn_4.png
2004-Nov-15 20:47:02 812 bytes prism/public/worksheet/Class_Hazard_SC_S_1_0_7_28/P_Eqn_5.png
2004-Nov-15 20:47:02 947 bytes prism/public/worksheet/Class_Hazard_SC_S_1_0_7_28/P_Eqn_6.png
2004-Nov-15 20:47:02 953 bytes prism/public/worksheet/Class_Hazard_SC_S_1_0_7_28/P_Eqn_7.png
2004-Nov-15 20:47:02 946 bytes prism/public/worksheet/Class_Hazard_SC_S_1_0_7_28/P_Eqn_8.png
2004-Nov-15 20:47:02 712 bytes prism/public/worksheet/Class_Hazard_SC_S_1_0_7_28/P_Eqn_9.png
2004-Dec-13 10:26:52 408 bytes prism/public/worksheet/Class_Hazard_TBF_V_1_0_7_28
2004-Nov-15 20:47:02 740 bytes prism/public/worksheet/Class_Hazard_TBF_V_1_0_7_28/CVFlow_Eqn_0.png
2004-Nov-15 20:47:02 661 bytes prism/public/worksheet/Class_Hazard_TBF_V_1_0_7_28/CVFlow_Eqn_1.png
2004-Nov-15 20:47:02 1353 bytes prism/public/worksheet/Class_Hazard_TBF_V_1_0_7_28/CVFlow_Eqn_2.png
2004-Nov-15 20:47:02 1404 bytes prism/public/worksheet/Class_Hazard_TBF_V_1_0_7_28/CVFlow_Eqn_3.png
2004-Nov-15 20:47:02 575 bytes prism/public/worksheet/Class_Hazard_TBF_V_1_0_7_28/CVFlow_Eqn_4.png
2004-Nov-15 20:47:02 610 bytes prism/public/worksheet/Class_Hazard_TBF_V_1_0_7_28/CVFlow_Eqn_5.png
2004-Nov-15 20:47:02 2227 bytes prism/public/worksheet/Class_Hazard_TBF_V_1_0_7_28/CVFlow_Eqn_6.png
2004-Nov-15 20:47:02 871 bytes prism/public/worksheet/Class_Hazard_TBF_V_1_0_7_28/Eqn_0.png
2004-Nov-15 20:47:02 1044 bytes prism/public/worksheet/Class_Hazard_TBF_V_1_0_7_28/PVP_Eqn_0.png
2004-Nov-15 20:47:02 395 bytes prism/public/worksheet/Class_Hazard_TBF_V_1_0_7_28/PVP_Eqn_1.png
2004-Dec-13 10:26:52 136 bytes prism/public/worksheet/Class_Hazard_TD_V_1_0_7_28
2004-Nov-15 20:47:02 862 bytes prism/public/worksheet/Class_Hazard_TD_V_1_0_7_28/Eqn_0.png
2004-Nov-15 20:47:02 717 bytes prism/public/worksheet/Class_Hazard_TD_V_1_0_7_28/Eqn_1.png
2004-Dec-13 10:26:52 442 bytes prism/public/worksheet/Class_Hazard_TF_V_1_0_7_28
2004-Nov-15 20:47:02 602 bytes prism/public/worksheet/Class_Hazard_TF_V_1_0_7_28/Eqn_0.png
2004-Nov-15 20:47:02 799 bytes prism/public/worksheet/Class_Hazard_TF_V_1_0_7_28/Eqn_1.png
2004-Nov-15 20:47:02 813 bytes prism/public/worksheet/Class_Hazard_TF_V_1_0_7_28/Eqn_2.png
2004-Nov-15 20:47:02 532 bytes prism/public/worksheet/Class_Hazard_TF_V_1_0_7_28/Eqn_3.png
2004-Nov-15 20:47:02 689 bytes prism/public/worksheet/Class_Hazard_TF_V_1_0_7_28/Eqn_4.png
2004-Nov-15 20:47:02 1568 bytes prism/public/worksheet/Class_Hazard_TF_V_1_0_7_28/Eqn_5.png
2004-Nov-15 20:47:02 545 bytes prism/public/worksheet/Class_Hazard_TF_V_1_0_7_28/ProtectedData_Eqn_0.png
2004-Nov-15 20:47:02 520 bytes prism/public/worksheet/Class_Hazard_TF_V_1_0_7_28/ProtectedData_Eqn_1.png
2004-Nov-15 20:47:02 550 bytes prism/public/worksheet/Class_Hazard_TF_V_1_0_7_28/ProtectedData_Eqn_2.png
2004-Nov-15 20:47:02 520 bytes prism/public/worksheet/Class_Hazard_TF_V_1_0_7_28/ProtectedData_Eqn_3.png
2004-Nov-15 20:47:02 449 bytes prism/public/worksheet/Class_Hazard_TF_V_1_0_7_28/ProtectedData_Eqn_4.png
2004-Dec-13 10:26:52 136 bytes prism/public/worksheet/Class_Hazard_TGIF_V_1_0_7_28
2004-Nov-15 20:47:02 601 bytes prism/public/worksheet/Class_Hazard_TGIF_V_1_0_7_28/Eqn_0.png
2004-Nov-15 20:47:02 1328 bytes prism/public/worksheet/Class_Hazard_TGIF_V_1_0_7_28/GasAirConvert_Eqn_0.png
2004-Dec-13 10:26:52 136 bytes prism/public/worksheet/Class_Hazard_TGOF_V_1_0_7_28
2004-Nov-15 20:47:02 555 bytes prism/public/worksheet/Class_Hazard_TGOF_V_1_0_7_28/Eqn_0.png
2004-Nov-15 20:47:02 1358 bytes prism/public/worksheet/Class_Hazard_TGOF_V_1_0_7_28/GasAirConvert_Eqn_0.png
2004-Dec-13 10:26:53 816 bytes prism/public/worksheet/Class_Hazard_TLO_L_1_0_7_28
2004-Nov-15 20:47:02 761 bytes prism/public/worksheet/Class_Hazard_TLO_L_1_0_7_28/BP_Eqn_0.png
2004-Nov-15 20:47:02 782 bytes prism/public/worksheet/Class_Hazard_TLO_L_1_0_7_28/BP_Eqn_1.png
2004-Nov-15 20:47:02 1347 bytes prism/public/worksheet/Class_Hazard_TLO_L_1_0_7_28/P_Eqn_0.png
2004-Nov-15 20:47:02 1668 bytes prism/public/worksheet/Class_Hazard_TLO_L_1_0_7_28/P_Eqn_1.png
2004-Nov-15 20:47:02 1042 bytes prism/public/worksheet/Class_Hazard_TLO_L_1_0_7_28/P_Eqn_10.png
2004-Nov-15 20:47:02 1198 bytes prism/public/worksheet/Class_Hazard_TLO_L_1_0_7_28/P_Eqn_11.png
2004-Nov-15 20:47:02 1058 bytes prism/public/worksheet/Class_Hazard_TLO_L_1_0_7_28/P_Eqn_12.png
2004-Nov-15 20:47:02 758 bytes prism/public/worksheet/Class_Hazard_TLO_L_1_0_7_28/P_Eqn_13.png
2004-Nov-15 20:47:02 589 bytes prism/public/worksheet/Class_Hazard_TLO_L_1_0_7_28/P_Eqn_14.png
2004-Nov-15 20:47:02 1058 bytes prism/public/worksheet/Class_Hazard_TLO_L_1_0_7_28/P_Eqn_15.png
2004-Nov-15 20:47:02 599 bytes prism/public/worksheet/Class_Hazard_TLO_L_1_0_7_28/P_Eqn_16.png
2004-Nov-15 20:47:02 1137 bytes prism/public/worksheet/Class_Hazard_TLO_L_1_0_7_28/P_Eqn_17.png
2004-Nov-15 20:47:02 799 bytes prism/public/worksheet/Class_Hazard_TLO_L_1_0_7_28/P_Eqn_18.png
2004-Nov-15 20:47:02 682 bytes prism/public/worksheet/Class_Hazard_TLO_L_1_0_7_28/P_Eqn_19.png
2004-Nov-15 20:47:02 1373 bytes prism/public/worksheet/Class_Hazard_TLO_L_1_0_7_28/P_Eqn_2.png
2004-Nov-15 20:47:02 1399 bytes prism/public/worksheet/Class_Hazard_TLO_L_1_0_7_28/P_Eqn_3.png
2004-Nov-15 20:47:02 947 bytes prism/public/worksheet/Class_Hazard_TLO_L_1_0_7_28/P_Eqn_4.png
2004-Nov-15 20:47:02 812 bytes prism/public/worksheet/Class_Hazard_TLO_L_1_0_7_28/P_Eqn_5.png
2004-Nov-15 20:47:02 947 bytes prism/public/worksheet/Class_Hazard_TLO_L_1_0_7_28/P_Eqn_6.png
2004-Nov-15 20:47:02 953 bytes prism/public/worksheet/Class_Hazard_TLO_L_1_0_7_28/P_Eqn_7.png
2004-Nov-15 20:47:02 946 bytes prism/public/worksheet/Class_Hazard_TLO_L_1_0_7_28/P_Eqn_8.png 2004-Nov-15 20:47:02 712 bytes prism/public/worksheet/Class_Hazard_TLO_L_1_0_7_28/P_Eqn_9.png
2004-Dec-13 10:26:53 816 bytes prism/public/worksheet/Class_Hazard_TPF_L_1_0_7_28
2004-Nov-15 20:47:02 761 bytes prism/public/worksheet/Class_Hazard_TPF_L_1_0_7_28/BP_Eqn_0.png
2004-Nov-15 20:47:02 782 bytes prism/public/worksheet/Class_Hazard_TPF_L_1_0_7_28/BP_Eqn_1.png
2004-Nov-15 20:47:02 1347 bytes prism/public/worksheet/Class_Hazard_TPF_L_1_0_7_28/P_Eqn_0.png
2004-Nov-15 20:47:02 1668 bytes prism/public/worksheet/Class_Hazard_TPF_L_1_0_7_28/P_Eqn_1.png
2004-Nov-15 20:47:02 1042 bytes prism/public/worksheet/Class_Hazard_TPF_L_1_0_7_28/P_Eqn_10.png
2004-Nov-15 20:47:02 1198 bytes prism/public/worksheet/Class_Hazard_TPF_L_1_0_7_28/P_Eqn_11.png
2004-Nov-15 20:47:02 1058 bytes prism/public/worksheet/Class_Hazard_TPF_L_1_0_7_28/P_Eqn_12.png
2004-Nov-15 20:47:02 758 bytes prism/public/worksheet/Class_Hazard_TPF_L_1_0_7_28/P_Eqn_13.png
2004-Nov-15 20:47:02 589 bytes prism/public/worksheet/Class_Hazard_TPF_L_1_0_7_28/P_Eqn_14.png
2004-Nov-15 20:47:02 1058 bytes prism/public/worksheet/Class_Hazard_TPF_L_1_0_7_28/P_Eqn_15.png
2004-Nov-15 20:47:02 599 bytes prism/public/worksheet/Class_Hazard_TPF_L_1_0_7_28/P_Eqn_16.png
2004-Nov-15 20:47:02 1137 bytes prism/public/worksheet/Class_Hazard_TPF_L_1_0_7_28/P_Eqn_17.png
2004-Nov-15 20:47:02 799 bytes prism/public/worksheet/Class_Hazard_TPF_L_1_0_7_28/P_Eqn_18.png
2004-Nov-15 20:47:02 682 bytes prism/public/worksheet/Class_Hazard_TPF_L_1_0_7_28/P_Eqn_19.png
2004-Nov-15 20:47:04 1373 bytes prism/public/worksheet/Class_Hazard_TPF_L_1_0_7_28/P_Eqn_2.png
2004-Nov-15 20:47:04 1399 bytes prism/public/worksheet/Class_Hazard_TPF_L_1_0_7_28/P_Eqn_3.png
2004-Nov-15 20:47:04 947 bytes prism/public/worksheet/Class_Hazard_TPF_L_1_0_7_28/P_Eqn_4.png
2004-Nov-15 20:47:04 812 bytes prism/public/worksheet/Class_Hazard_TPF_L_1_0_7_28/P_Eqn_5.png
2004-Nov-15 20:47:04 947 bytes prism/public/worksheet/Class_Hazard_TPF_L_1_0_7_28/P_Eqn_6.png
2004-Nov-15 20:47:04 953 bytes prism/public/worksheet/Class_Hazard_TPF_L_1_0_7_28/P_Eqn_7.png
2004-Nov-15 20:47:04 946 bytes prism/public/worksheet/Class_Hazard_TPF_L_1_0_7_28/P_Eqn_8.png
2004-Nov-15 20:47:04 712 bytes prism/public/worksheet/Class_Hazard_TPF_L_1_0_7_28/P_Eqn_9.png
2004-Dec-13 10:26:53 272 bytes prism/public/worksheet/Class_Hazard_TPIT_V_1_0_7_28
2004-Nov-15 20:47:04 1106 bytes prism/public/worksheet/Class_Hazard_TPIT_V_1_0_7_28/Eqn_0.png
2004-Nov-15 20:47:04 1047 bytes prism/public/worksheet/Class_Hazard_TPIT_V_1_0_7_28/Eqn_1.png
2004-Nov-15 20:47:04 1106 bytes prism/public/worksheet/Class_Hazard_TPIT_V_1_0_7_28/Eqn_2.png
2004-Nov-15 20:47:04 1047 bytes prism/public/worksheet/Class_Hazard_TPIT_V_1_0_7_28/Eqn_3.png
2004-Nov-15 20:47:04 927 bytes prism/public/worksheet/Class_Hazard_TPIT_V_1_0_7_28/Eqn_4.png
2004-Nov-15 20:47:04 562 bytes prism/public/worksheet/Class_Hazard_TPIT_V_1_0_7_28/ProtectedData_Eqn_0.png
2004-Dec-13 10:26:53 170 bytes prism/public/worksheet/Class_Hazard_TPOT_V_1_0_7_28
2004-Nov-15 20:47:04 1100 bytes prism/public/worksheet/Class_Hazard_TPOT_V_1_0_7_28/Eqn_0.png
2004-Nov-15 20:47:04 859 bytes prism/public/worksheet/Class_Hazard_TPOT_V_1_0_7_28/Eqn_1.png
2004-Nov-15 20:47:04 562 bytes prism/public/worksheet/Class_Hazard_TPOT_V_1_0_7_28/ProtectedData_Eqn_0.png
2004-Dec-13 10:26:53 816 bytes prism/public/worksheet/Class_Hazard_TPTB_V_1_0_7_28
2004-Nov-15 20:47:04 761 bytes prism/public/worksheet/Class_Hazard_TPTB_V_1_0_7_28/BP_Eqn_0.png
2004-Nov-15 20:47:04 782 bytes prism/public/worksheet/Class_Hazard_TPTB_V_1_0_7_28/BP_Eqn_1.png
2004-Nov-15 20:47:04 1347 bytes prism/public/worksheet/Class_Hazard_TPTB_V_1_0_7_28/P_Eqn_0.png
2004-Nov-15 20:47:04 1668 bytes prism/public/worksheet/Class_Hazard_TPTB_V_1_0_7_28/P_Eqn_1.png
2004-Nov-15 20:47:04 1042 bytes prism/public/worksheet/Class_Hazard_TPTB_V_1_0_7_28/P_Eqn_10.png
2004-Nov-15 20:47:04 1198 bytes prism/public/worksheet/Class_Hazard_TPTB_V_1_0_7_28/P_Eqn_11.png
2004-Nov-15 20:47:04 1058 bytes prism/public/worksheet/Class_Hazard_TPTB_V_1_0_7_28/P_Eqn_12.png
2004-Nov-15 20:47:04 758 bytes prism/public/worksheet/Class_Hazard_TPTB_V_1_0_7_28/P_Eqn_13.png
2004-Nov-15 20:47:04 589 bytes prism/public/worksheet/Class_Hazard_TPTB_V_1_0_7_28/P_Eqn_14.png
2004-Nov-15 20:47:04 1058 bytes prism/public/worksheet/Class_Hazard_TPTB_V_1_0_7_28/P_Eqn_15.png
2004-Nov-15 20:47:04 599 bytes prism/public/worksheet/Class_Hazard_TPTB_V_1_0_7_28/P_Eqn_16.png
2004-Nov-15 20:47:04 1137 bytes prism/public/worksheet/Class_Hazard_TPTB_V_1_0_7_28/P_Eqn_17.png
2004-Nov-15 20:47:04 799 bytes prism/public/worksheet/Class_Hazard_TPTB_V_1_0_7_28/P_Eqn_18.png
2004-Nov-15 20:47:04 682 bytes prism/public/worksheet/Class_Hazard_TPTB_V_1_0_7_28/P_Eqn_19.png
2004-Nov-15 20:47:04 1373 bytes prism/public/worksheet/Class_Hazard_TPTB_V_1_0_7_28/P_Eqn_2.png
2004-Nov-15 20:47:04 1399 bytes prism/public/worksheet/Class_Hazard_TPTB_V_1_0_7_28/P_Eqn_3.png
2004-Nov-15 20:47:04 947 bytes prism/public/worksheet/Class_Hazard_TPTB_V_1_0_7_28/P_Eqn_4.png
2004-Nov-15 20:47:04 812 bytes prism/public/worksheet/Class_Hazard_TPTB_V_1_0_7_28/P_Eqn_5.png
2004-Nov-15 20:47:04 947 bytes prism/public/worksheet/Class_Hazard_TPTB_V_1_0_7_28/P_Eqn_6.png
2004-Nov-15 20:47:04 953 bytes prism/public/worksheet/Class_Hazard_TPTB_V_1_0_7_28/P_Eqn_7.png
2004-Nov-15 20:47:04 946 bytes prism/public/worksheet/Class_Hazard_TPTB_V_1_0_7_28/P_Eqn_8.png
2004-Nov-15 20:47:04 712 bytes prism/public/worksheet/Class_Hazard_TPTB_V_1_0_7_28/P_Eqn_9.png
2004-Dec-13 10:26:53 1394 bytes prism/public/worksheet/Class_Hazard_TR_L_1_0_7_28
2004-Nov-15 20:47:04 761 bytes prism/public/worksheet/Class_Hazard_TR_L_1_0_7_28/BP_Eqn_0.png
2004-Nov-15 20:47:04 782 bytes prism/public/worksheet/Class_Hazard_TR_L_1_0_7_28/BP_Eqn_1.png 2004-Nov-15 20:47:04 917 bytes prism/public/worksheet/Class_Hazard_TR_L_1_0_7_28/CalcKbp_CalcKw_Eqn_0.png
2004-Nov-15 20:47:04 935 bytes prism/public/worksheet/Class_Hazard_TR_L_1_0_7_28/CalcKbp_CalcKw_Eqn_1.png
2004-Nov-15 20:47:04 728 bytes prism/public/worksheet/Class_Hazard_TR_L_1_0_7_28/CalcKbp_CalcKw_Eqn_2.png
2004-Nov-15 20:47:04 413 bytes prism/public/worksheet/Class_Hazard_TR_L_1_0_7_28/CalcKbp_Eqn_0.png
2004-Nov-15 20:47:04 413 bytes prism/public/worksheet/Class_Hazard_TR_L_1_0_7_28/CalcKbp_Eqn_1.png
2004-Nov-15 20:47:04 380 bytes prism/public/worksheet/Class_Hazard_TR_L_1_0_7_28/CalcKbp_Eqn_2.png
2004-Nov-15 20:47:04 1739 bytes prism/public/worksheet/Class_Hazard_TR_L_1_0_7_28/CalcLiquidVol_Eqn_0.png
2004-Nov-15 20:47:04 966 bytes prism/public/worksheet/Class_Hazard_TR_L_1_0_7_28/Eqn_0.png
2004-Nov-15 20:47:04 687 bytes prism/public/worksheet/Class_Hazard_TR_L_1_0_7_28/Eqn_1.png
2004-Nov-15 20:47:04 1035 bytes prism/public/worksheet/Class_Hazard_TR_L_1_0_7_28/Eqn_2.png
2004-Nov-15 20:47:04 732 bytes prism/public/worksheet/Class_Hazard_TR_L_1_0_7_28/Eqn_3.png
2004-Nov-15 20:47:04 1026 bytes prism/public/worksheet/Class_Hazard_TR_L_1_0_7_28/Eqn_4.png
2004-Nov-15 20:47:04 1178 bytes prism/public/worksheet/Class_Hazard_TR_L_1_0_7_28/LP_Eqn_0.png
2004-Nov-15 20:47:04 937 bytes prism/public/worksheet/Class_Hazard_TR_L_1_0_7_28/PC_Eqn_0.png
2004-Nov-15 20:47:04 765 bytes prism/public/worksheet/Class_Hazard_TR_L_1_0_7_28/PD_Eqn_0.png
2004-Nov-15 20:47:04 1347 bytes prism/public/worksheet/Class_Hazard_TR_L_1_0_7_28/P_Eqn_0.png
2004-Nov-15 20:47:04 1668 bytes prism/public/worksheet/Class_Hazard_TR_L_1_0_7_28/P_Eqn_1.png
2004-Nov-15 20:47:04 1042 bytes prism/public/worksheet/Class_Hazard_TR_L_1_0_7_28/P_Eqn_10.png
2004-Nov-15 20:47:04 1198 bytes prism/public/worksheet/Class_Hazard_TR_L_1_0_7_28/P_Eqn_11.png
2004-Nov-15 20:47:04 1058 bytes prism/public/worksheet/Class_Hazard_TR_L_1_0_7_28/P_Eqn_12.png
2004-Nov-15 20:47:04 758 bytes prism/public/worksheet/Class_Hazard_TR_L_1_0_7_28/P_Eqn_13.png
2004-Nov-15 20:47:04 589 bytes prism/public/worksheet/Class_Hazard_TR_L_1_0_7_28/P_Eqn_14.png
2004-Nov-15 20:47:04 1058 bytes prism/public/worksheet/Class_Hazard_TR_L_1_0_7_28/P_Eqn_15.png
2004-Nov-15 20:47:04 599 bytes prism/public/worksheet/Class_Hazard_TR_L_1_0_7_28/P_Eqn_16.png
2004-Nov-15 20:47:04 1137 bytes prism/public/worksheet/Class_Hazard_TR_L_1_0_7_28/P_Eqn_17.png
2004-Nov-15 20:47:04 799 bytes prism/public/worksheet/Class_Hazard_TR_L_1_0_7_28/P_Eqn_18.png
2004-Nov-15 20:47:04 682 bytes prism/public/worksheet/Class_Hazard_TR_L_1_0_7_28/P_Eqn_19.png
2004-Nov-15 20:47:04 1373 bytes prism/public/worksheet/Class_Hazard_TR_L_1_0_7_28/P_Eqn_2.png
2004-Nov-15 20:47:04 1399 bytes prism/public/worksheet/Class_Hazard_TR_L_1_0_7_28/P_Eqn_3.png
2004-Nov-15 20:47:04 947 bytes prism/public/worksheet/Class_Hazard_TR_L_1_0_7_28/P_Eqn_4.png
2004-Nov-15 20:47:04 812 bytes prism/public/worksheet/Class_Hazard_TR_L_1_0_7_28/P_Eqn_5.png
2004-Nov-15 20:47:04 947 bytes prism/public/worksheet/Class_Hazard_TR_L_1_0_7_28/P_Eqn_6.png
2004-Nov-15 20:47:04 953 bytes prism/public/worksheet/Class_Hazard_TR_L_1_0_7_28/P_Eqn_7.png
2004-Nov-15 20:47:04 946 bytes prism/public/worksheet/Class_Hazard_TR_L_1_0_7_28/P_Eqn_8.png
2004-Nov-15 20:47:04 712 bytes prism/public/worksheet/Class_Hazard_TR_L_1_0_7_28/P_Eqn_9.png
2004-Nov-15 20:47:04 1660 bytes prism/public/worksheet/Class_Hazard_TR_L_1_0_7_28/TRMassFlow_Eqn_0.png
2004-Nov-15 20:47:04 1653 bytes prism/public/worksheet/Class_Hazard_TR_L_1_0_7_28/TRVolFlow_Eqn_0.png
2004-Dec-13 10:26:53 1904 bytes prism/public/worksheet/Class_Hazard_TR_V_1_0_7_28
2004-Nov-15 20:47:04 761 bytes prism/public/worksheet/Class_Hazard_TR_V_1_0_7_28/BP_Eqn_0.png
2004-Nov-15 20:47:04 782 bytes prism/public/worksheet/Class_Hazard_TR_V_1_0_7_28/BP_Eqn_1.png
2004-Nov-15 20:47:06 846 bytes prism/public/worksheet/Class_Hazard_TR_V_1_0_7_28/CTF_Eqn_0.png
2004-Nov-15 20:47:06 621 bytes prism/public/worksheet/Class_Hazard_TR_V_1_0_7_28/CTF_Eqn_1.png
2004-Nov-15 20:47:04 1249 bytes prism/public/worksheet/Class_Hazard_TR_V_1_0_7_28/CalcKbp_CalcKb_Eqn_0.png
2004-Nov-15 20:47:04 951 bytes prism/public/worksheet/Class_Hazard_TR_V_1_0_7_28/CalcKbp_CalcKv_Eqn_0.png
2004-Nov-15 20:47:04 728 bytes prism/public/worksheet/Class_Hazard_TR_V_1_0_7_28/CalcKbp_CalcKv_Eqn_1.png
2004-Nov-15 20:47:04 791 bytes prism/public/worksheet/Class_Hazard_TR_V_1_0_7_28/CalcKbp_CalcKv_Eqn_2.png
2004-Nov-15 20:47:04 706 bytes prism/public/worksheet/Class_Hazard_TR_V_1_0_7_28/CalcKbp_CalcKv_Eqn_3.png
2004-Nov-15 20:47:06 427 bytes prism/public/worksheet/Class_Hazard_TR_V_1_0_7_28/CalcKbp_Eqn_0.png
2004-Nov-15 20:47:06 373 bytes prism/public/worksheet/Class_Hazard_TR_V_1_0_7_28/CalcKbp_Eqn_1.png
2004-Nov-15 20:47:06 605 bytes prism/public/worksheet/Class_Hazard_TR_V_1_0_7_28/CalcVapMass_CF_Eqn_0.png
2004-Nov-15 20:47:06 817 bytes prism/public/worksheet/Class_Hazard_TR_V_1_0_7_28/CalcVapMass_CF_Eqn_1.png
2004-Nov-15 20:47:06 1153 bytes prism/public/worksheet/Class_Hazard_TR_V_1_0_7_28/CalcVapMass_CF_Eqn_10.png
2004-Nov-15 20:47:06 238 bytes prism/public/worksheet/Class_Hazard_TR_V_1_0_7_28/CalcVapMass_CF_Eqn_2.png
2004-Nov-15 20:47:06 826 bytes prism/public/worksheet/Class_Hazard_TR_V_1_0_7_28/CalcVapMass_CF_Eqn_3.png
2004-Nov-15 20:47:06 433 bytes prism/public/worksheet/Class_Hazard_TR_V_1_0_7_28/CalcVapMass_CF_Eqn_4.png
2004-Nov-15 20:47:06 700 bytes prism/public/worksheet/Class_Hazard_TR_V_1_0_7_28/CalcVapMass_CF_Eqn_5.png
2004-Nov-15 20:47:06 453 bytes prism/public/worksheet/Class_Hazard_TR_V_1_0_7_28/CalcVapMass_CF_Eqn_6.png
2004-Nov-15 20:47:06 208 bytes prism/public/worksheet/Class_Hazard_TR_V_1_0_7_28/CalcVapMass_CF_Eqn_7.png
2004-Nov-15 20:47:06 912 bytes prism/public/worksheet/Class_Hazard_TR_V_1_0_7_28/CalcVapMass_CF_Eqn_8.png
2004-Nov-15 20:47:06 238 bytes prism/public/worksheet/Class_Hazard_TR_V_1_0_7_28/CalcVapMass_CF_Eqn_9.png
2004-Nov-15 20:47:06 1847 bytes prism/public/worksheet/Class_Hazard_TR_V_1_0_7_28/CalcVapMass_Eqn_0.png 2004-Nov-15 20:47:06 1407 bytes prism/public/worksheet/Class_Hazard_TR_V_1_0_7_28/CalcVapMass_Eqn_1.png
2004-Nov-15 20:47:06 668 bytes prism/public/worksheet/Class_Hazard_TR_V_1_0_7_28/Eqn_0.png
2004-Nov-15 20:47:06 681 bytes prism/public/worksheet/Class_Hazard_TR_V_1_0_7_28/Eqn_1.png
2004-Nov-15 20:47:06 937 bytes prism/public/worksheet/Class_Hazard_TR_V_1_0_7_28/PC_Eqn_0.png
2004-Nov-15 20:47:06 1044 bytes prism/public/worksheet/Class_Hazard_TR_V_1_0_7_28/PVP_Eqn_0.png
2004-Nov-15 20:47:06 395 bytes prism/public/worksheet/Class_Hazard_TR_V_1_0_7_28/PVP_Eqn_1.png
2004-Nov-15 20:47:06 1347 bytes prism/public/worksheet/Class_Hazard_TR_V_1_0_7_28/P_Eqn_0.png
2004-Nov-15 20:47:06 1668 bytes prism/public/worksheet/Class_Hazard_TR_V_1_0_7_28/P_Eqn_1.png
2004-Nov-15 20:47:06 1042 bytes prism/public/worksheet/Class_Hazard_TR_V_1_0_7_28/P_Eqn_10.png
2004-Nov-15 20:47:06 1198 bytes prism/public/worksheet/Class_Hazard_TR_V_1_0_7_28/P_Eqn_11.png
2004-Nov-15 20:47:06 1058 bytes prism/public/worksheet/Class_Hazard_TR_V_1_0_7_28/P_Eqn_12.png
2004-Nov-15 20:47:06 758 bytes prism/public/worksheet/Class_Hazard_TR_V_1_0_7_28/P_Eqn_13.png
2004-Nov-15 20:47:06 589 bytes prism/public/worksheet/Class_Hazard_TR_V_1_0_7_28/P_Eqn_14.png
2004-Nov-15 20:47:06 1058 bytes prism/public/worksheet/Class_Hazard_TR_V_1_0_7_28/P_Eqn_15.png
2004-Nov-15 20:47:06 599 bytes prism/public/worksheet/Class_Hazard_TR_V_1_0_7_28/P_Eqn_16.png
2004-Nov-15 20:47:06 1137 bytes prism/public/worksheet/Class_Hazard_TR_V_1_0_7_28/P_Eqn_17.png
2004-Nov-15 20:47:06 799 bytes prism/public/worksheet/Class_Hazard_TR_V_1_0_7_28/P_Eqn_18.png
2004-Nov-15 20:47:06 682 bytes prism/public/worksheet/Class_Hazard_TR_V_1_0_7_28/P_Eqn_19.png
2004-Nov-15 20:47:06 1373 bytes prism/public/worksheet/Class_Hazard_TR_V_1_0_7_28/P_Eqn_2.png
2004-Nov-15 20:47:06 1399 bytes prism/public/worksheet/Class_Hazard_TR_V_1_0_7_28/P_Eqn_3.png
2004-Nov-15 20:47:06 947 bytes prism/public/worksheet/Class_Hazard_TR_V_1_0_7_28/P_Eqn_4.png
2004-Nov-15 20:47:06 812 bytes prism/public/worksheet/Class_Hazard_TR_V_1_0_7_28/P_Eqn_5.png
2004-Nov-15 20:47:06 947 bytes prism/public/worksheet/Class_Hazard_TR_V_1_0_7_28/P_Eqn_6.png
2004-Nov-15 20:47:06 953 bytes prism/public/worksheet/Class_Hazard_TR_V_1_0_7_28/P_Eqn_7.png
2004-Nov-15 20:47:06 946 bytes prism/public/worksheet/Class_Hazard_TR_V_1_0_7_28/P_Eqn_8.png
2004-Nov-15 20:47:06 712 bytes prism/public/worksheet/Class_Hazard_TR_V_1_0_7_28/P_Eqn_9.png
2004-Nov-15 20:47:06 1797 bytes prism/public/worksheet/Class_Hazard_TR_V_1_0_7_28/TRFlowCrit_Eqn_0.png
2004-Nov-15 20:47:06 1708 bytes prism/public/worksheet/Class_Hazard_TR_V_1_0_7_28/TRFlowSub_Eqn_0.png
2004-Nov-15 20:47:06 669 bytes prism/public/worksheet/Class_Hazard_TR_V_1_0_7_28/VCC_Eqn_0.png
2004-Nov-15 20:47:06 1863 bytes prism/public/worksheet/Class_Hazard_TR_V_1_0_7_28/VCC_Eqn_1.png
2004-Nov-15 20:47:06 1458 bytes prism/public/worksheet/Class_Hazard_TR_V_1_0_7_28/VCC_Eqn_2.png
2004-Dec-13 10:26:53 136 bytes prism/public/worksheet/Class_Hazard_TSO_V_1_0_7_28
2004-Nov-15 20:47:06 1458 bytes prism/public/worksheet/Class_Hazard_TSO_V_1_0_7_28/Eqn_0.png
2004-Nov-15 20:47:06 736 bytes prism/public/worksheet/Class_Hazard_TSO_V_1_0_7_28/ProtectedData_Eqn_0.png
2004-Dec-13 10:26:53 816 bytes prism/public/worksheet/Class_Hazard_TTR_L_1_0_7_28
2004-Nov-15 20:47:06 761 bytes prism/public/worksheet/Class_Hazard_TTR_L_1_0_7_28/BP_Eqn_0.png
2004-Nov-15 20:47:06 782 bytes prism/public/worksheet/Class_Hazard_TTR_L_1_0_7_28/BP_Eqn_1.png
2004-Nov-15 20:47:06 1347 bytes prism/public/worksheet/Class_Hazard_TTR_L_1_0_7_28/P_Eqn_0.png
2004-Nov-15 20:47:06 1668 bytes prism/public/worksheet/Class_Hazard_TTR_L_1_0_7_28/P_Eqn_1.png
2004-Nov-15 20:47:06 1042 bytes prism/public/worksheet/Class_Hazard_TTR_L_1_0_7_28/P_Eqn_10.png
2004-Nov-15 20:47:06 1198 bytes prism/public/worksheet/Class_Hazard_TTR_L_1_0_7_28/P_Eqn_11.png
2004-Nov-15 20:47:06 1058 bytes prism/public/worksheet/Class_Hazard_TTR_L_1_0_7_28/P_Eqn_12.png
2004-Nov-15 20:47:06 758 bytes prism/public/worksheet/Class_Hazard_TTR_L_1_0_7_28/P_Eqn_13.png
2004-Nov-15 20:47:06 589 bytes prism/public/worksheet/Class_Hazard_TTR_L_1_0_7_28/P_Eqn_14.png
2004-Nov-15 20:47:06 1058 bytes prism/public/worksheet/Class_Hazard_TTR_L_1_0_7_28/P_Eqn_15.png
2004-Nov-15 20:47:06 599 bytes prism/public/worksheet/Class_Hazard_TTR_L_1_0_7_28/P_Eqn_16.png
2004-Nov-15 20:47:06 1137 bytes prism/public/worksheet/Class_Hazard_TTR_L_1_0_7_28/P_Eqn_17.png
2004-Nov-15 20:47:06 799 bytes prism/public/worksheet/Class_Hazard_TTR_L_1_0_7_28/P_Eqn_18.png
2004-Nov-15 20:47:06 682 bytes prism/public/worksheet/Class_Hazard_TTR_L_1_0_7_28/P_Eqn_19.png
2004-Nov-15 20:47:06 1373 bytes prism/public/worksheet/Class_Hazard_TTR_L_1_0_7_28/P_Eqn_2.png
2004-Nov-15 20:47:06 1399 bytes prism/public/worksheet/Class_Hazard_TTR_L_1_0_7_28/P_Eqn_3.png
2004-Nov-15 20:47:06 947 bytes prism/public/worksheet/Class_Hazard_TTR_L_1_0_7_28/P_Eqn_4.png
2004-Nov-15 20:47:06 812 bytes prism/public/worksheet/Class_Hazard_TTR_L_1_0_7_28/P_Eqn_5.png
2004-Nov-15 20:47:06 947 bytes prism/public/worksheet/Class_Hazard_TTR_L_1_0_7_28/P_Eqn_6.png
2004-Nov-15 20:47:06 953 bytes prism/public/worksheet/Class_Hazard_TTR_L_1_0_7_28/P_Eqn_7.png
2004-Nov-15 20:47:06 946 bytes prism/public/worksheet/Class_Hazard_TTR_L_1_0_7_28/P_Eqn_8.png
2004-Nov-15 20:47:06 712 bytes prism/public/worksheet/Class_Hazard_TTR_L_1_0_7_28/P_Eqn_9.png
2004-Dec-13 10:26:53 816 bytes prism/public/worksheet/Class_Hazard_TTR_V_1_0_7_28
2004-Nov-15 20:47:06 761 bytes prism/public/worksheet/Class_Hazard_TTR_V_1_0_7_28/BP_Eqn_0.png
2004-Nov-15 20:47:06 782 bytes prism/public/worksheet/Class_Hazard_TTR_V_1_0_7_28/BP_Eqn_1.png
2004-Nov-15 20:47:06 1347 bytes prism/public/worksheet/Class_Hazard_TTR_V_1_0_7_28/P_Eqn_0.png

| | | |
|---|---|---|
| 2004-Nov-15 20:47:06 | 1668 bytes | prism/public/worksheet/Class_Hazard_TTR_V_1_0_7_28/P_Eqn_1.png |
| 2004-Nov-15 20:47:06 | 1042 bytes | prism/public/worksheet/Class_Hazard_TTR_V_1_0_7_28/P_Eqn_10.png |
| 2004-Nov-15 20:47:06 | 1198 bytes | prism/public/worksheet/Class_Hazard_TTR_V_1_0_7_28/P_Eqn_11.png |
| 2004-Nov-15 20:47:06 | 1058 bytes | prism/public/worksheet/Class_Hazard_TTR_V_1_0_7_28/P_Eqn_12.png |
| 2004-Nov-15 20:47:06 | 758 bytes | prism/public/worksheet/Class_Hazard_TTR_V_1_0_7_28/P_Eqn_13.png |
| 2004-Nov-15 20:47:06 | 589 bytes | prism/public/worksheet/Class_Hazard_TTR_V_1_0_7_28/P_Eqn_14.png |
| 2004-Nov-15 20:47:06 | 1058 bytes | prism/public/worksheet/Class_Hazard_TTR_V_1_0_7_28/P_Eqn_15.png |
| 2004-Nov-15 20:47:06 | 599 bytes | prism/public/worksheet/Class_Hazard_TTR_V_1_0_7_28/P_Eqn_16.png |
| 2004-Nov-15 20:47:06 | 1137 bytes | prism/public/worksheet/Class_Hazard_TTR_V_1_0_7_28/P_Eqn_17.png |
| 2004-Nov-15 20:47:06 | 799 bytes | prism/public/worksheet/Class_Hazard_TTR_V_1_0_7_28/P_Eqn_18.png |
| 2004-Nov-15 20:47:08 | 682 bytes | prism/public/worksheet/Class_Hazard_TTR_V_1_0_7_28/P_Eqn_19.png |
| 2004-Nov-15 20:47:08 | 1373 bytes | prism/public/worksheet/Class_Hazard_TTR_V_1_0_7_28/P_Eqn_2.png |
| 2004-Nov-15 20:47:08 | 1399 bytes | prism/public/worksheet/Class_Hazard_TTR_V_1_0_7_28/P_Eqn_3.png |
| 2004-Nov-15 20:47:08 | 947 bytes | prism/public/worksheet/Class_Hazard_TTR_V_1_0_7_28/P_Eqn_4.png |
| 2004-Nov-15 20:47:08 | 812 bytes | prism/public/worksheet/Class_Hazard_TTR_V_1_0_7_28/P_Eqn_5.png |
| 2004-Nov-15 20:47:08 | 947 bytes | prism/public/worksheet/Class_Hazard_TTR_V_1_0_7_28/P_Eqn_6.png |
| 2004-Nov-15 20:47:08 | 953 bytes | prism/public/worksheet/Class_Hazard_TTR_V_1_0_7_28/P_Eqn_7.png |
| 2004-Nov-15 20:47:08 | 946 bytes | prism/public/worksheet/Class_Hazard_TTR_V_1_0_7_28/P_Eqn_8.png |
| 2004-Nov-15 20:47:08 | 712 bytes | prism/public/worksheet/Class_Hazard_TTR_V_1_0_7_28/P_Eqn_9.png |
| 2004-Dec-13 10:26:53 | 816 bytes | prism/public/worksheet/Class_Hazard_TTV_V_1_0_7_28 |
| 2004-Nov-15 20:47:08 | 761 bytes | prism/public/worksheet/Class_Hazard_TTV_V_1_0_7_28/BP_Eqn_0.png |
| 2004-Nov-15 20:47:08 | 782 bytes | prism/public/worksheet/Class_Hazard_TTV_V_1_0_7_28/BP_Eqn_1.png |
| 2004-Nov-15 20:47:08 | 1347 bytes | prism/public/worksheet/Class_Hazard_TTV_V_1_0_7_28/P_Eqn_0.png |
| 2004-Nov-15 20:47:08 | 1668 bytes | prism/public/worksheet/Class_Hazard_TTV_V_1_0_7_28/P_Eqn_1.png |
| 2004-Nov-15 20:47:08 | 1042 bytes | prism/public/worksheet/Class_Hazard_TTV_V_1_0_7_28/P_Eqn_10.png |
| 2004-Nov-15 20:47:08 | 1198 bytes | prism/public/worksheet/Class_Hazard_TTV_V_1_0_7_28/P_Eqn_11.png |
| 2004-Nov-15 20:47:08 | 1058 bytes | prism/public/worksheet/Class_Hazard_TTV_V_1_0_7_28/P_Eqn_12.png |
| 2004-Nov-15 20:47:08 | 758 bytes | prism/public/worksheet/Class_Hazard_TTV_V_1_0_7_28/P_Eqn_13.png |
| 2004-Nov-15 20:47:08 | 589 bytes | prism/public/worksheet/Class_Hazard_TTV_V_1_0_7_28/P_Eqn_14.png |
| 2004-Nov-15 20:47:08 | 1058 bytes | prism/public/worksheet/Class_Hazard_TTV_V_1_0_7_28/P_Eqn_15.png |
| 2004-Nov-15 20:47:08 | 599 bytes | prism/public/worksheet/Class_Hazard_TTV_V_1_0_7_28/P_Eqn_16.png |
| 2004-Nov-15 20:47:08 | 1137 bytes | prism/public/worksheet/Class_Hazard_TTV_V_1_0_7_28/P_Eqn_17.png |
| 2004-Nov-15 20:47:08 | 799 bytes | prism/public/worksheet/Class_Hazard_TTV_V_1_0_7_28/P_Eqn_18.png |
| 2004-Nov-15 20:47:08 | 682 bytes | prism/public/worksheet/Class_Hazard_TTV_V_1_0_7_28/P_Eqn_19.png |
| 2004-Nov-15 20:47:08 | 1373 bytes | prism/public/worksheet/Class_Hazard_TTV_V_1_0_7_28/P_Eqn_2.png |
| 2004-Nov-15 20:47:08 | 1399 bytes | prism/public/worksheet/Class_Hazard_TTV_V_1_0_7_28/P_Eqn_3.png |
| 2004-Nov-15 20:47:08 | 947 bytes | prism/public/worksheet/Class_Hazard_TTV_V_1_0_7_28/P_Eqn_4.png |
| 2004-Nov-15 20:47:08 | 812 bytes | prism/public/worksheet/Class_Hazard_TTV_V_1_0_7_28/P_Eqn_5.png |
| 2004-Nov-15 20:47:08 | 947 bytes | prism/public/worksheet/Class_Hazard_TTV_V_1_0_7_28/P_Eqn_6.png |
| 2004-Nov-15 20:47:08 | 953 bytes | prism/public/worksheet/Class_Hazard_TTV_V_1_0_7_28/P_Eqn_7.png |
| 2004-Nov-15 20:47:08 | 946 bytes | prism/public/worksheet/Class_Hazard_TTV_V_1_0_7_28/P_Eqn_8.png |
| 2004-Nov-15 20:47:08 | 712 bytes | prism/public/worksheet/Class_Hazard_TTV_V_1_0_7_28/P_Eqn_9.png |
| 2004-Dec-13 10:26:53 | 816 bytes | prism/public/worksheet/Class_Hazard_TVG_V_1_0_7_28 |
| 2004-Nov-15 20:47:08 | 761 bytes | prism/public/worksheet/Class_Hazard_TVG_V_1_0_7_28/BP_Eqn_0.png |
| 2004-Nov-15 20:47:08 | 782 bytes | prism/public/worksheet/Class_Hazard_TVG_V_1_0_7_28/BP_Eqn_1.png |
| 2004-Nov-15 20:47:08 | 1347 bytes | prism/public/worksheet/Class_Hazard_TVG_V_1_0_7_28/P_Eqn_0.png |
| 2004-Nov-15 20:47:08 | 1668 bytes | prism/public/worksheet/Class_Hazard_TVG_V_1_0_7_28/P_Eqn_1.png |
| 2004-Nov-15 20:47:08 | 1042 bytes | prism/public/worksheet/Class_Hazard_TVG_V_1_0_7_28/P_Eqn_10.png |
| 2004-Nov-15 20:47:08 | 1198 bytes | prism/public/worksheet/Class_Hazard_TVG_V_1_0_7_28/P_Eqn_11.png |
| 2004-Nov-15 20:47:08 | 1058 bytes | prism/public/worksheet/Class_Hazard_TVG_V_1_0_7_28/P_Eqn_12.png |
| 2004-Nov-15 20:47:08 | 758 bytes | prism/public/worksheet/Class_Hazard_TVG_V_1_0_7_28/P_Eqn_13.png |
| 2004-Nov-15 20:47:08 | 589 bytes | prism/public/worksheet/Class_Hazard_TVG_V_1_0_7_28/P_Eqn_14.png |
| 2004-Nov-15 20:47:08 | 1058 bytes | prism/public/worksheet/Class_Hazard_TVG_V_1_0_7_28/P_Eqn_15.png |
| 2004-Nov-15 20:47:08 | 599 bytes | prism/public/worksheet/Class_Hazard_TVG_V_1_0_7_28/P_Eqn_16.png |
| 2004-Nov-15 20:47:08 | 1137 bytes | prism/public/worksheet/Class_Hazard_TVG_V_1_0_7_28/P_Eqn_17.png |
| 2004-Nov-15 20:47:08 | 799 bytes | prism/public/worksheet/Class_Hazard_TVG_V_1_0_7_28/P_Eqn_18.png |
| 2004-Nov-15 20:47:08 | 682 bytes | prism/public/worksheet/Class_Hazard_TVG_V_1_0_7_28/P_Eqn_19.png |
| 2004-Nov-15 20:47:08 | 1373 bytes | prism/public/worksheet/Class_Hazard_TVG_V_1_0_7_28/P_Eqn_2.png |
| 2004-Nov-15 20:47:08 | 1399 bytes | prism/public/worksheet/Class_Hazard_TVG_V_1_0_7_28/P_Eqn_3.png |
| 2004-Nov-15 20:47:08 | 947 bytes | prism/public/worksheet/Class_Hazard_TVG_V_1_0_7_28/P_Eqn_4.png |
| 2004-Nov-15 20:47:08 | 812 bytes | prism/public/worksheet/Class_Hazard_TVG_V_1_0_7_28/P_Eqn_5.png |

| | | |
|---|---|---|
| 2004-Nov-15 20:47:08 | 947 bytes | prism/public/worksheet/Class_Hazard_TVG_V_1_0_7_28/P_Eqn_6.png |
| 2004-Nov-15 20:47:08 | 953 bytes | prism/public/worksheet/Class_Hazard_TVG_V_1_0_7_28/P_Eqn_7.png |
| 2004-Nov-15 20:47:08 | 946 bytes | prism/public/worksheet/Class_Hazard_TVG_V_1_0_7_28/P_Eqn_8.png |
| 2004-Nov-15 20:47:08 | 712 bytes | prism/public/worksheet/Class_Hazard_TVG_V_1_0_7_28/P_Eqn_9.png |
| 2004-Dec-13 10:26:53 | 816 bytes | prism/public/worksheet/Class_Hazard_US_2_1_0_7_28 |
| 2004-Nov-15 20:47:08 | 761 bytes | prism/public/worksheet/Class_Hazard_US_2_1_0_7_28/BP_Eqn_0.png |
| 2004-Nov-15 20:47:08 | 782 bytes | prism/public/worksheet/Class_Hazard_US_2_1_0_7_28/BP_Eqn_1.png |
| 2004-Nov-15 20:47:08 | 1347 bytes | prism/public/worksheet/Class_Hazard_US_2_1_0_7_28/P_Eqn_0.png |
| 2004-Nov-15 20:47:08 | 1668 bytes | prism/public/worksheet/Class_Hazard_US_2_1_0_7_28/P_Eqn_1.png |
| 2004-Nov-15 20:47:08 | 1042 bytes | prism/public/worksheet/Class_Hazard_US_2_1_0_7_28/P_Eqn_10.png |
| 2004-Nov-15 20:47:08 | 1198 bytes | prism/public/worksheet/Class_Hazard_US_2_1_0_7_28/P_Eqn_11.png |
| 2004-Nov-15 20:47:08 | 1058 bytes | prism/public/worksheet/Class_Hazard_US_2_1_0_7_28/P_Eqn_12.png |
| 2004-Nov-15 20:47:08 | 758 bytes | prism/public/worksheet/Class_Hazard_US_2_1_0_7_28/P_Eqn_13.png |
| 2004-Nov-15 20:47:08 | 589 bytes | prism/public/worksheet/Class_Hazard_US_2_1_0_7_28/P_Eqn_14.png |
| 2004-Nov-15 20:47:08 | 1058 bytes | prism/public/worksheet/Class_Hazard_US_2_1_0_7_28/P_Eqn_15.png |
| 2004-Nov-15 20:47:08 | 599 bytes | prism/public/worksheet/Class_Hazard_US_2_1_0_7_28/P_Eqn_16.png |
| 2004-Nov-15 20:47:08 | 1137 bytes | prism/public/worksheet/Class_Hazard_US_2_1_0_7_28/P_Eqn_17.png |
| 2004-Nov-15 20:47:08 | 799 bytes | prism/public/worksheet/Class_Hazard_US_2_1_0_7_28/P_Eqn_18.png |
| 2004-Nov-15 20:47:08 | 682 bytes | prism/public/worksheet/Class_Hazard_US_2_1_0_7_28/P_Eqn_19.png |
| 2004-Nov-15 20:47:08 | 1373 bytes | prism/public/worksheet/Class_Hazard_US_2_1_0_7_28/P_Eqn_2.png |
| 2004-Nov-15 20:47:08 | 1399 bytes | prism/public/worksheet/Class_Hazard_US_2_1_0_7_28/P_Eqn_3.png |
| 2004-Nov-15 20:47:08 | 947 bytes | prism/public/worksheet/Class_Hazard_US_2_1_0_7_28/P_Eqn_4.png |
| 2004-Nov-15 20:47:08 | 812 bytes | prism/public/worksheet/Class_Hazard_US_2_1_0_7_28/P_Eqn_5.png |
| 2004-Nov-15 20:47:08 | 947 bytes | prism/public/worksheet/Class_Hazard_US_2_1_0_7_28/P_Eqn_6.png |
| 2004-Nov-15 20:47:08 | 953 bytes | prism/public/worksheet/Class_Hazard_US_2_1_0_7_28/P_Eqn_7.png |
| 2004-Nov-15 20:47:08 | 946 bytes | prism/public/worksheet/Class_Hazard_US_2_1_0_7_28/P_Eqn_8.png |
| 2004-Nov-15 20:47:08 | 712 bytes | prism/public/worksheet/Class_Hazard_US_2_1_0_7_28/P_Eqn_9.png |
| 2004-Dec-13 10:26:53 | 1190 bytes | prism/public/worksheet/Class_Hazard_US_L_1_0_7_28 |
| 2004-Nov-15 20:47:08 | 761 bytes | prism/public/worksheet/Class_Hazard_US_L_1_0_7_28/BP_Eqn_0.png |
| 2004-Nov-15 20:47:08 | 782 bytes | prism/public/worksheet/Class_Hazard_US_L_1_0_7_28/BP_Eqn_1.png |
| 2004-Nov-15 20:47:08 | 917 bytes | prism/public/worksheet/Class_Hazard_US_L_1_0_7_28/CalcKbp_CalcKw_Eqn_0.png |
| 2004-Nov-15 20:47:08 | 935 bytes | prism/public/worksheet/Class_Hazard_US_L_1_0_7_28/CalcKbp_CalcKw_Eqn_1.png |
| 2004-Nov-15 20:47:08 | 728 bytes | prism/public/worksheet/Class_Hazard_US_L_1_0_7_28/CalcKbp_CalcKw_Eqn_2.png |
| 2004-Nov-15 20:47:08 | 413 bytes | prism/public/worksheet/Class_Hazard_US_L_1_0_7_28/CalcKbp_Eqn_0.png |
| 2004-Nov-15 20:47:08 | 413 bytes | prism/public/worksheet/Class_Hazard_US_L_1_0_7_28/CalcKbp_Eqn_1.png |
| 2004-Nov-15 20:47:08 | 380 bytes | prism/public/worksheet/Class_Hazard_US_L_1_0_7_28/CalcKbp_Eqn_2.png |
| 2004-Nov-15 20:47:08 | 609 bytes | prism/public/worksheet/Class_Hazard_US_L_1_0_7_28/Eqn_0.png |
| 2004-Nov-15 20:47:08 | 1554 bytes | prism/public/worksheet/Class_Hazard_US_L_1_0_7_28/Eqn_1.png |
| 2004-Nov-15 20:47:10 | 1178 bytes | prism/public/worksheet/Class_Hazard_US_L_1_0_7_28/LP_Eqn_0.png |
| 2004-Nov-15 20:47:10 | 937 bytes | prism/public/worksheet/Class_Hazard_US_L_1_0_7_28/PC_Eqn_0.png |
| 2004-Nov-15 20:47:10 | 765 bytes | prism/public/worksheet/Class_Hazard_US_L_1_0_7_28/PD_Eqn_0.png |
| 2004-Nov-15 20:47:10 | 1347 bytes | prism/public/worksheet/Class_Hazard_US_L_1_0_7_28/P_Eqn_0.png |
| 2004-Nov-15 20:47:10 | 1668 bytes | prism/public/worksheet/Class_Hazard_US_L_1_0_7_28/P_Eqn_1.png |
| 2004-Nov-15 20:47:10 | 1042 bytes | prism/public/worksheet/Class_Hazard_US_L_1_0_7_28/P_Eqn_10.png |
| 2004-Nov-15 20:47:10 | 1198 bytes | prism/public/worksheet/Class_Hazard_US_L_1_0_7_28/P_Eqn_11.png |
| 2004-Nov-15 20:47:10 | 1058 bytes | prism/public/worksheet/Class_Hazard_US_L_1_0_7_28/P_Eqn_12.png |
| 2004-Nov-15 20:47:10 | 758 bytes | prism/public/worksheet/Class_Hazard_US_L_1_0_7_28/P_Eqn_13.png |
| 2004-Nov-15 20:47:10 | 589 bytes | prism/public/worksheet/Class_Hazard_US_L_1_0_7_28/P_Eqn_14.png |
| 2004-Nov-15 20:47:10 | 1058 bytes | prism/public/worksheet/Class_Hazard_US_L_1_0_7_28/P_Eqn_15.png |
| 2004-Nov-15 20:47:10 | 599 bytes | prism/public/worksheet/Class_Hazard_US_L_1_0_7_28/P_Eqn_16.png |
| 2004-Nov-15 20:47:10 | 1137 bytes | prism/public/worksheet/Class_Hazard_US_L_1_0_7_28/P_Eqn_17.png |
| 2004-Nov-15 20:47:10 | 799 bytes | prism/public/worksheet/Class_Hazard_US_L_1_0_7_28/P_Eqn_18.png |
| 2004-Nov-15 20:47:10 | 682 bytes | prism/public/worksheet/Class_Hazard_US_L_1_0_7_28/P_Eqn_19.png |
| 2004-Nov-15 20:47:10 | 1373 bytes | prism/public/worksheet/Class_Hazard_US_L_1_0_7_28/P_Eqn_2.png |
| 2004-Nov-15 20:47:10 | 1399 bytes | prism/public/worksheet/Class_Hazard_US_L_1_0_7_28/P_Eqn_3.png |
| 2004-Nov-15 20:47:10 | 947 bytes | prism/public/worksheet/Class_Hazard_US_L_1_0_7_28/P_Eqn_4.png |
| 2004-Nov-15 20:47:10 | 812 bytes | prism/public/worksheet/Class_Hazard_US_L_1_0_7_28/P_Eqn_5.png |
| 2004-Nov-15 20:47:10 | 947 bytes | prism/public/worksheet/Class_Hazard_US_L_1_0_7_28/P_Eqn_6.png |
| 2004-Nov-15 20:47:10 | 953 bytes | prism/public/worksheet/Class_Hazard_US_L_1_0_7_28/P_Eqn_7.png |
| 2004-Nov-15 20:47:10 | 946 bytes | prism/public/worksheet/Class_Hazard_US_L_1_0_7_28/P_Eqn_8.png |
| 2004-Nov-15 20:47:10 | 712 bytes | prism/public/worksheet/Class_Hazard_US_L_1_0_7_28/P_Eqn_9.png |

2004-Dec-13 10:26:53 1258 bytes prism/public/worksheet/Class_Hazard_US_S_1_0_7_28
2004-Nov-15 20:47:10 761 bytes prism/public/worksheet/Class_Hazard_US_S_1_0_7_28/BP_Eqn_0.png
2004-Nov-15 20:47:10 782 bytes prism/public/worksheet/Class_Hazard_US_S_1_0_7_28/BP_Eqn_1.png
2004-Nov-15 20:47:10 1249 bytes prism/public/worksheet/Class_Hazard_US_S_1_0_7_28/CalcKbp_CalcKb_Eqn_0.png
2004-Nov-15 20:47:10 951 bytes prism/public/worksheet/Class_Hazard_US_S_1_0_7_28/CalcKbp_CalcKv_Eqn_0.png
2004-Nov-15 20:47:10 728 bytes prism/public/worksheet/Class_Hazard_US_S_1_0_7_28/CalcKbp_CalcKv_Eqn_1.png
2004-Nov-15 20:47:10 791 bytes prism/public/worksheet/Class_Hazard_US_S_1_0_7_28/CalcKbp_CalcKv_Eqn_2.png
2004-Nov-15 20:47:10 706 bytes prism/public/worksheet/Class_Hazard_US_S_1_0_7_28/CalcKbp_CalcKv_Eqn_3.png
2004-Nov-15 20:47:10 427 bytes prism/public/worksheet/Class_Hazard_US_S_1_0_7_28/CalcKbp_Eqn_0.png
2004-Nov-15 20:47:10 373 bytes prism/public/worksheet/Class_Hazard_US_S_1_0_7_28/CalcKbp_Eqn_1.png
2004-Nov-15 20:47:10 361 bytes prism/public/worksheet/Class_Hazard_US_S_1_0_7_28/CalcKn_Eqn_0.png
2004-Nov-15 20:47:10 762 bytes prism/public/worksheet/Class_Hazard_US_S_1_0_7_28/CalcKn_Eqn_1.png
2004-Nov-15 20:47:10 1378 bytes prism/public/worksheet/Class_Hazard_US_S_1_0_7_28/CalcKn_Eqn_2.png
2004-Nov-15 20:47:10 947 bytes prism/public/worksheet/Class_Hazard_US_S_1_0_7_28/CalcKn_Eqn_3.png
2004-Nov-15 20:47:10 525 bytes prism/public/worksheet/Class_Hazard_US_S_1_0_7_28/Eqn_0.png
2004-Nov-15 20:47:10 937 bytes prism/public/worksheet/Class_Hazard_US_S_1_0_7_28/PC_Eqn_0.png
2004-Nov-15 20:47:10 1347 bytes prism/public/worksheet/Class_Hazard_US_S_1_0_7_28/P_Eqn_0.png
2004-Nov-15 20:47:10 1668 bytes prism/public/worksheet/Class_Hazard_US_S_1_0_7_28/P_Eqn_1.png
2004-Nov-15 20:47:10 1042 bytes prism/public/worksheet/Class_Hazard_US_S_1_0_7_28/P_Eqn_10.png
2004-Nov-15 20:47:10 1198 bytes prism/public/worksheet/Class_Hazard_US_S_1_0_7_28/P_Eqn_11.png
2004-Nov-15 20:47:10 1058 bytes prism/public/worksheet/Class_Hazard_US_S_1_0_7_28/P_Eqn_12.png
2004-Nov-15 20:47:10 758 bytes prism/public/worksheet/Class_Hazard_US_S_1_0_7_28/P_Eqn_13.png
2004-Nov-15 20:47:10 589 bytes prism/public/worksheet/Class_Hazard_US_S_1_0_7_28/P_Eqn_14.png
2004-Nov-15 20:47:10 1058 bytes prism/public/worksheet/Class_Hazard_US_S_1_0_7_28/P_Eqn_15.png
2004-Nov-15 20:47:10 599 bytes prism/public/worksheet/Class_Hazard_US_S_1_0_7_28/P_Eqn_16.png
2004-Nov-15 20:47:10 1137 bytes prism/public/worksheet/Class_Hazard_US_S_1_0_7_28/P_Eqn_17.png
2004-Nov-15 20:47:10 799 bytes prism/public/worksheet/Class_Hazard_US_S_1_0_7_28/P_Eqn_18.png
2004-Nov-15 20:47:10 682 bytes prism/public/worksheet/Class_Hazard_US_S_1_0_7_28/P_Eqn_19.png
2004-Nov-15 20:47:10 1373 bytes prism/public/worksheet/Class_Hazard_US_S_1_0_7_28/P_Eqn_2.png
2004-Nov-15 20:47:10 1399 bytes prism/public/worksheet/Class_Hazard_US_S_1_0_7_28/P_Eqn_3.png
2004-Nov-15 20:47:10 947 bytes prism/public/worksheet/Class_Hazard_US_S_1_0_7_28/P_Eqn_4.png
2004-Nov-15 20:47:10 812 bytes prism/public/worksheet/Class_Hazard_US_S_1_0_7_28/P_Eqn_5.png
2004-Nov-15 20:47:10 947 bytes prism/public/worksheet/Class_Hazard_US_S_1_0_7_28/P_Eqn_6.png
2004-Nov-15 20:47:10 953 bytes prism/public/worksheet/Class_Hazard_US_S_1_0_7_28/P_Eqn_7.png
2004-Nov-15 20:47:10 946 bytes prism/public/worksheet/Class_Hazard_US_S_1_0_7_28/P_Eqn_8.png
2004-Nov-15 20:47:10 712 bytes prism/public/worksheet/Class_Hazard_US_S_1_0_7_28/P_Eqn_9.png
2004-Dec-13 10:26:53 1190 bytes prism/public/worksheet/Class_Hazard_US_V_1_0_7_28
2004-Nov-15 20:47:10 761 bytes prism/public/worksheet/Class_Hazard_US_V_1_0_7_28/BP_Eqn_0.png
2004-Nov-15 20:47:10 782 bytes prism/public/worksheet/Class_Hazard_US_V_1_0_7_28/BP_Eqn_1.png
2004-Nov-15 20:47:10 1249 bytes prism/public/worksheet/Class_Hazard_US_V_1_0_7_28/CalcKbp_CalcKb_Eqn_0.png
2004-Nov-15 20:47:10 951 bytes prism/public/worksheet/Class_Hazard_US_V_1_0_7_28/CalcKbp_CalcKv_Eqn_0.png
2004-Nov-15 20:47:10 728 bytes prism/public/worksheet/Class_Hazard_US_V_1_0_7_28/CalcKbp_CalcKv_Eqn_1.png
2004-Nov-15 20:47:10 791 bytes prism/public/worksheet/Class_Hazard_US_V_1_0_7_28/CalcKbp_CalcKv_Eqn_2.png
2004-Nov-15 20:47:10 706 bytes prism/public/worksheet/Class_Hazard_US_V_1_0_7_28/CalcKbp_CalcKv_Eqn_3.png
2004-Nov-15 20:47:10 427 bytes prism/public/worksheet/Class_Hazard_US_V_1_0_7_28/CalcKbp_Eqn_0.png
2004-Nov-15 20:47:10 373 bytes prism/public/worksheet/Class_Hazard_US_V_1_0_7_28/CalcKbp_Eqn_1.png
2004-Nov-15 20:47:10 525 bytes prism/public/worksheet/Class_Hazard_US_V_1_0_7_28/Eqn_0.png
2004-Nov-15 20:47:12 937 bytes prism/public/worksheet/Class_Hazard_US_V_1_0_7_28/PC_Eqn_0.png
2004-Nov-15 20:47:12 1044 bytes prism/public/worksheet/Class_Hazard_US_V_1_0_7_28/PVP_Eqn_0.png
2004-Nov-15 20:47:12 395 bytes prism/public/worksheet/Class_Hazard_US_V_1_0_7_28/PVP_Eqn_1.png
2004-Nov-15 20:47:10 1347 bytes prism/public/worksheet/Class_Hazard_US_V_1_0_7_28/P_Eqn_0.png
2004-Nov-15 20:47:10 1668 bytes prism/public/worksheet/Class_Hazard_US_V_1_0_7_28/P_Eqn_1.png
2004-Nov-15 20:47:10 1042 bytes prism/public/worksheet/Class_Hazard_US_V_1_0_7_28/P_Eqn_10.png
2004-Nov-15 20:47:10 1198 bytes prism/public/worksheet/Class_Hazard_US_V_1_0_7_28/P_Eqn_11.png
2004-Nov-15 20:47:10 1058 bytes prism/public/worksheet/Class_Hazard_US_V_1_0_7_28/P_Eqn_12.png
2004-Nov-15 20:47:10 758 bytes prism/public/worksheet/Class_Hazard_US_V_1_0_7_28/P_Eqn_13.png
2004-Nov-15 20:47:10 589 bytes prism/public/worksheet/Class_Hazard_US_V_1_0_7_28/P_Eqn_14.png
2004-Nov-15 20:47:10 1058 bytes prism/public/worksheet/Class_Hazard_US_V_1_0_7_28/P_Eqn_15.png
2004-Nov-15 20:47:10 599 bytes prism/public/worksheet/Class_Hazard_US_V_1_0_7_28/P_Eqn_16.png
2004-Nov-15 20:47:10 1137 bytes prism/public/worksheet/Class_Hazard_US_V_1_0_7_28/P_Eqn_17.png
2004-Nov-15 20:47:10 799 bytes prism/public/worksheet/Class_Hazard_US_V_1_0_7_28/P_Eqn_18.png

| | | |
|---|---|---|
| 2004-Nov-15 20:47:10 | 682 bytes | prism/public/worksheet/Class_Hazard_US_V_1_0_7_28/P_Eqn_19.png |
| 2004-Nov-15 20:47:12 | 1373 bytes | prism/public/worksheet/Class_Hazard_US_V_1_0_7_28/P_Eqn_2.png |
| 2004-Nov-15 20:47:12 | 1399 bytes | prism/public/worksheet/Class_Hazard_US_V_1_0_7_28/P_Eqn_3.png |
| 2004-Nov-15 20:47:12 | 947 bytes | prism/public/worksheet/Class_Hazard_US_V_1_0_7_28/P_Eqn_4.png |
| 2004-Nov-15 20:47:12 | 812 bytes | prism/public/worksheet/Class_Hazard_US_V_1_0_7_28/P_Eqn_5.png |
| 2004-Nov-15 20:47:12 | 947 bytes | prism/public/worksheet/Class_Hazard_US_V_1_0_7_28/P_Eqn_6.png |
| 2004-Nov-15 20:47:12 | 953 bytes | prism/public/worksheet/Class_Hazard_US_V_1_0_7_28/P_Eqn_7.png |
| 2004-Nov-15 20:47:12 | 946 bytes | prism/public/worksheet/Class_Hazard_US_V_1_0_7_28/P_Eqn_8.png |
| 2004-Nov-15 20:47:12 | 712 bytes | prism/public/worksheet/Class_Hazard_US_V_1_0_7_28/P_Eqn_9.png |
| 2004-Dec-13 10:26:54 | 952 bytes | prism/public/worksheet/Class_PipeLoss_1_0_7_15 |
| 2004-Jun-22 22:49:22 | 940 bytes | prism/public/worksheet/Class_PipeLoss_1_0_7_15/MRCI_BP_Eqn_0.png |
| 2004-Jun-22 22:49:22 | 782 bytes | prism/public/worksheet/Class_PipeLoss_1_0_7_15/MRCI_BP_Eqn_1.png |
| 2004-Jun-22 22:49:22 | 605 bytes | prism/public/worksheet/Class_PipeLoss_1_0_7_15/MRCI_CF_Eqn_0.png |
| 2004-Jun-22 22:49:22 | 817 bytes | prism/public/worksheet/Class_PipeLoss_1_0_7_15/MRCI_CF_Eqn_1.png |
| 2004-Jun-22 22:49:22 | 1153 bytes | prism/public/worksheet/Class_PipeLoss_1_0_7_15/MRCI_CF_Eqn_10.png |
| 2004-Jun-22 22:49:22 | 238 bytes | prism/public/worksheet/Class_PipeLoss_1_0_7_15/MRCI_CF_Eqn_2.png |
| 2004-Jun-22 22:49:22 | 826 bytes | prism/public/worksheet/Class_PipeLoss_1_0_7_15/MRCI_CF_Eqn_3.png |
| 2004-Jun-22 22:49:22 | 433 bytes | prism/public/worksheet/Class_PipeLoss_1_0_7_15/MRCI_CF_Eqn_4.png |
| 2004-Jun-22 22:49:22 | 700 bytes | prism/public/worksheet/Class_PipeLoss_1_0_7_15/MRCI_CF_Eqn_5.png |
| 2004-Jun-22 22:49:22 | 453 bytes | prism/public/worksheet/Class_PipeLoss_1_0_7_15/MRCI_CF_Eqn_6.png |
| 2004-Jun-22 22:49:22 | 208 bytes | prism/public/worksheet/Class_PipeLoss_1_0_7_15/MRCI_CF_Eqn_7.png |
| 2004-Jun-22 22:49:22 | 912 bytes | prism/public/worksheet/Class_PipeLoss_1_0_7_15/MRCI_CF_Eqn_8.png |
| 2004-Jun-22 22:49:22 | 238 bytes | prism/public/worksheet/Class_PipeLoss_1_0_7_15/MRCI_CF_Eqn_9.png |
| 2004-Jun-22 22:49:22 | 765 bytes | prism/public/worksheet/Class_PipeLoss_1_0_7_15/MRCI_PD_Eqn_0.png |
| 2004-Jun-22 22:49:22 | 951 bytes | prism/public/worksheet/Class_PipeLoss_1_0_7_15/MRCI_VaporKbp_CalcKv_Eqn_0.png |
| 2004-Jun-22 22:49:22 | 728 bytes | prism/public/worksheet/Class_PipeLoss_1_0_7_15/MRCI_VaporKbp_CalcKv_Eqn_1.png |
| 2004-Jun-22 22:49:22 | 791 bytes | prism/public/worksheet/Class_PipeLoss_1_0_7_15/MRCI_VaporKbp_CalcKv_Eqn_2.png |
| 2004-Jun-22 22:49:22 | 706 bytes | prism/public/worksheet/Class_PipeLoss_1_0_7_15/MRCI_VaporKbp_CalcKv_Eqn_3.png |
| 2004-Jun-22 22:49:22 | 427 bytes | prism/public/worksheet/Class_PipeLoss_1_0_7_15/MRCI_VaporKbp_Eqn_0.png |
| 2004-Jun-22 22:49:22 | 373 bytes | prism/public/worksheet/Class_PipeLoss_1_0_7_15/MRCI_VaporKbp_Eqn_1.png |
| 2004-Jun-22 22:49:22 | 574 bytes | prism/public/worksheet/Class_PipeLoss_1_0_7_15/MRC_P_Eqn_0.png |
| 2004-Jun-22 22:49:22 | 797 bytes | prism/public/worksheet/Class_PipeLoss_1_0_7_15/MRC_P_Eqn_1.png |
| 2004-Jun-22 22:49:22 | 1141 bytes | prism/public/worksheet/Class_PipeLoss_1_0_7_15/MRC_P_Eqn_2.png |
| 2004-Jun-22 22:49:22 | 1201 bytes | prism/public/worksheet/Class_PipeLoss_1_0_7_15/MRC_P_Eqn_3.png |
| 2004-Jun-22 22:49:22 | 899 bytes | prism/public/worksheet/Class_PipeLoss_1_0_7_15/MRC_P_Eqn_4.png |
| 2004-Jun-22 22:49:22 | 682 bytes | prism/public/worksheet/Class_PipeLoss_1_0_7_15/MRC_P_Eqn_5.png |
| 2004-Dec-13 10:26:54 | 986 bytes | prism/public/worksheet/Class_PipeLoss_PL_L_1_0_7_28 |
| 2004-Nov-15 20:47:12 | 815 bytes | prism/public/worksheet/Class_PipeLoss_PL_L_1_0_7_28/LiquidKbp_CalcKw_Eqn_0.png |
| 2004-Nov-15 20:47:12 | 935 bytes | prism/public/worksheet/Class_PipeLoss_PL_L_1_0_7_28/LiquidKbp_CalcKw_Eqn_1.png |
| 2004-Nov-15 20:47:12 | 728 bytes | prism/public/worksheet/Class_PipeLoss_PL_L_1_0_7_28/LiquidKbp_CalcKw_Eqn_2.png |
| 2004-Nov-15 20:47:12 | 413 bytes | prism/public/worksheet/Class_PipeLoss_PL_L_1_0_7_28/LiquidKbp_Eqn_0.png |
| 2004-Nov-15 20:47:12 | 413 bytes | prism/public/worksheet/Class_PipeLoss_PL_L_1_0_7_28/LiquidKbp_Eqn_1.png |
| 2004-Nov-15 20:47:12 | 380 bytes | prism/public/worksheet/Class_PipeLoss_PL_L_1_0_7_28/LiquidKbp_Eqn_2.png |
| 2004-Nov-15 20:47:12 | 833 bytes | prism/public/worksheet/Class_PipeLoss_PL_L_1_0_7_28/MRC_BP_Eqn_0.png |
| 2004-Nov-15 20:47:12 | 782 bytes | prism/public/worksheet/Class_PipeLoss_PL_L_1_0_7_28/MRC_BP_Eqn_1.png |
| 2004-Nov-15 20:47:12 | 917 bytes | prism/public/worksheet/Class_PipeLoss_PL_L_1_0_7_28/MRC_LiquidKbp_CalcKw_Eqn_0.png |
| 2004-Nov-15 20:47:12 | 935 bytes | prism/public/worksheet/Class_PipeLoss_PL_L_1_0_7_28/MRC_LiquidKbp_CalcKw_Eqn_1.png |
| 2004-Nov-15 20:47:12 | 728 bytes | prism/public/worksheet/Class_PipeLoss_PL_L_1_0_7_28/MRC_LiquidKbp_CalcKw_Eqn_2.png |
| 2004-Nov-15 20:47:12 | 413 bytes | prism/public/worksheet/Class_PipeLoss_PL_L_1_0_7_28/MRC_LiquidKbp_Eqn_0.png |
| 2004-Nov-15 20:47:12 | 413 bytes | prism/public/worksheet/Class_PipeLoss_PL_L_1_0_7_28/MRC_LiquidKbp_Eqn_1.png |
| 2004-Nov-15 20:47:12 | 380 bytes | prism/public/worksheet/Class_PipeLoss_PL_L_1_0_7_28/MRC_LiquidKbp_Eqn_2.png |
| 2004-Nov-15 20:47:12 | 765 bytes | prism/public/worksheet/Class_PipeLoss_PL_L_1_0_7_28/MRC_PD_Eqn_0.png |
| 2004-Nov-15 20:47:12 | 700 bytes | prism/public/worksheet/Class_PipeLoss_PL_L_1_0_7_28/PD_Eqn_0.png |
| 2004-Nov-15 20:47:12 | 574 bytes | prism/public/worksheet/Class_PipeLoss_PL_L_1_0_7_28/PLInit_P_Eqn_0.png |
| 2004-Nov-15 20:47:12 | 797 bytes | prism/public/worksheet/Class_PipeLoss_PL_L_1_0_7_28/PLInit_P_Eqn_1.png |
| 2004-Nov-15 20:47:12 | 682 bytes | prism/public/worksheet/Class_PipeLoss_PL_L_1_0_7_28/PLInit_P_Eqn_10.png |
| 2004-Nov-15 20:47:12 | 1042 bytes | prism/public/worksheet/Class_PipeLoss_PL_L_1_0_7_28/PLInit_P_Eqn_2.png |
| 2004-Nov-15 20:47:12 | 1198 bytes | prism/public/worksheet/Class_PipeLoss_PL_L_1_0_7_28/PLInit_P_Eqn_3.png |
| 2004-Nov-15 20:47:12 | 1141 bytes | prism/public/worksheet/Class_PipeLoss_PL_L_1_0_7_28/PLInit_P_Eqn_4.png |
| 2004-Nov-15 20:47:12 | 758 bytes | prism/public/worksheet/Class_PipeLoss_PL_L_1_0_7_28/PLInit_P_Eqn_5.png |
| 2004-Nov-15 20:47:12 | 589 bytes | prism/public/worksheet/Class_PipeLoss_PL_L_1_0_7_28/PLInit_P_Eqn_6.png |

2004-Nov-15 20:47:12 1281 bytes prism/public/worksheet/Class_PipeLoss_PL_L_1_0_7_28/PLInit_P_Eqn_7.png
2004-Nov-15 20:47:12 591 bytes prism/public/worksheet/Class_PipeLoss_PL_L_1_0_7_28/PLInit_P_Eqn_8.png
2004-Nov-15 20:47:12 899 bytes prism/public/worksheet/Class_PipeLoss_PL_L_1_0_7_28/PLInit_P_Eqn_9.png
2004-Dec-13 10:26:54 408 bytes prism/public/worksheet/Class_PipeLoss_PL_L_RD_1_0_7_28
2004-Nov-15 20:47:12 574 bytes prism/public/worksheet/Class_PipeLoss_PL_L_RD_1_0_7_28/PLInit_P_Eqn_0.png
2004-Nov-15 20:47:12 1042 bytes prism/public/worksheet/Class_PipeLoss_PL_L_RD_1_0_7_28/PLInit_P_Eqn_1.png
2004-Nov-15 20:47:12 1198 bytes prism/public/worksheet/Class_PipeLoss_PL_L_RD_1_0_7_28/PLInit_P_Eqn_2.png
2004-Nov-15 20:47:12 1141 bytes prism/public/worksheet/Class_PipeLoss_PL_L_RD_1_0_7_28/PLInit_P_Eqn_3.png
2004-Nov-15 20:47:12 758 bytes prism/public/worksheet/Class_PipeLoss_PL_L_RD_1_0_7_28/PLInit_P_Eqn_4.png
2004-Nov-15 20:47:12 589 bytes prism/public/worksheet/Class_PipeLoss_PL_L_RD_1_0_7_28/PLInit_P_Eqn_5.png
2004-Nov-15 20:47:12 1281 bytes prism/public/worksheet/Class_PipeLoss_PL_L_RD_1_0_7_28/PLInit_P_Eqn_6.png
2004-Nov-15 20:47:12 591 bytes prism/public/worksheet/Class_PipeLoss_PL_L_RD_1_0_7_28/PLInit_P_Eqn_7.png
2004-Nov-15 20:47:12 899 bytes prism/public/worksheet/Class_PipeLoss_PL_L_RD_1_0_7_28/PLInit_P_Eqn_8.png
2004-Nov-15 20:47:12 682 bytes prism/public/worksheet/Class_PipeLoss_PL_L_RD_1_0_7_28/PLInit_P_Eqn_9.png
2004-Dec-13 10:26:54 1190 bytes prism/public/worksheet/Class_PipeLoss_PL_S_1_0_7_28
2004-Nov-15 20:47:12 586 bytes prism/public/worksheet/Class_PipeLoss_PL_S_1_0_7_28/MRC_CF_Eqn_0.png
2004-Nov-15 20:47:12 817 bytes prism/public/worksheet/Class_PipeLoss_PL_S_1_0_7_28/MRC_CF_Eqn_1.png
2004-Nov-15 20:47:12 1153 bytes prism/public/worksheet/Class_PipeLoss_PL_S_1_0_7_28/MRC_CF_Eqn_10.png
2004-Nov-15 20:47:12 238 bytes prism/public/worksheet/Class_PipeLoss_PL_S_1_0_7_28/MRC_CF_Eqn_2.png
2004-Nov-15 20:47:12 826 bytes prism/public/worksheet/Class_PipeLoss_PL_S_1_0_7_28/MRC_CF_Eqn_3.png
2004-Nov-15 20:47:12 433 bytes prism/public/worksheet/Class_PipeLoss_PL_S_1_0_7_28/MRC_CF_Eqn_4.png
2004-Nov-15 20:47:12 669 bytes prism/public/worksheet/Class_PipeLoss_PL_S_1_0_7_28/MRC_CF_Eqn_5.png
2004-Nov-15 20:47:12 453 bytes prism/public/worksheet/Class_PipeLoss_PL_S_1_0_7_28/MRC_CF_Eqn_6.png
2004-Nov-15 20:47:12 208 bytes prism/public/worksheet/Class_PipeLoss_PL_S_1_0_7_28/MRC_CF_Eqn_7.png
2004-Nov-15 20:47:12 912 bytes prism/public/worksheet/Class_PipeLoss_PL_S_1_0_7_28/MRC_CF_Eqn_8.png
2004-Nov-15 20:47:12 238 bytes prism/public/worksheet/Class_PipeLoss_PL_S_1_0_7_28/MRC_CF_Eqn_9.png
2004-Nov-15 20:47:12 361 bytes prism/public/worksheet/Class_PipeLoss_PL_S_1_0_7_28/MRC_CalcKn_Eqn_0.png
2004-Nov-15 20:47:12 762 bytes prism/public/worksheet/Class_PipeLoss_PL_S_1_0_7_28/MRC_CalcKn_Eqn_1.png
2004-Nov-15 20:47:12 1378 bytes prism/public/worksheet/Class_PipeLoss_PL_S_1_0_7_28/MRC_CalcKn_Eqn_2.png
2004-Nov-15 20:47:12 947 bytes prism/public/worksheet/Class_PipeLoss_PL_S_1_0_7_28/MRC_CalcKn_Eqn_3.png
2004-Nov-15 20:47:12 1416 bytes prism/public/worksheet/Class_PipeLoss_PL_S_1_0_7_28/MRC_VaporKbp_CalcKb_Eqn_0.png
2004-Nov-15 20:47:12 951 bytes prism/public/worksheet/Class_PipeLoss_PL_S_1_0_7_28/MRC_VaporKbp_CalcKv_Eqn_0.png
2004-Nov-15 20:47:12 728 bytes prism/public/worksheet/Class_PipeLoss_PL_S_1_0_7_28/MRC_VaporKbp_CalcKv_Eqn_1.png
2004-Nov-15 20:47:12 765 bytes prism/public/worksheet/Class_PipeLoss_PL_S_1_0_7_28/MRC_VaporKbp_CalcKv_Eqn_2.png
2004-Nov-15 20:47:12 706 bytes prism/public/worksheet/Class_PipeLoss_PL_S_1_0_7_28/MRC_VaporKbp_CalcKv_Eqn_3.png
2004-Nov-15 20:47:12 427 bytes prism/public/worksheet/Class_PipeLoss_PL_S_1_0_7_28/MRC_VaporKbp_Eqn_0.png
2004-Nov-15 20:47:12 373 bytes prism/public/worksheet/Class_PipeLoss_PL_S_1_0_7_28/MRC_VaporKbp_Eqn_1.png
2004-Nov-15 20:47:12 574 bytes prism/public/worksheet/Class_PipeLoss_PL_S_1_0_7_28/PLInit_P_Eqn_0.png
2004-Nov-15 20:47:12 797 bytes prism/public/worksheet/Class_PipeLoss_PL_S_1_0_7_28/PLInit_P_Eqn_1.png
2004-Nov-15 20:47:12 682 bytes prism/public/worksheet/Class_PipeLoss_PL_S_1_0_7_28/PLInit_P_Eqn_10.png
2004-Nov-15 20:47:12 1042 bytes prism/public/worksheet/Class_PipeLoss_PL_S_1_0_7_28/PLInit_P_Eqn_2.png
2004-Nov-15 20:47:12 1198 bytes prism/public/worksheet/Class_PipeLoss_PL_S_1_0_7_28/PLInit_P_Eqn_3.png
2004-Nov-15 20:47:12 1141 bytes prism/public/worksheet/Class_PipeLoss_PL_S_1_0_7_28/PLInit_P_Eqn_4.png
2004-Nov-15 20:47:12 758 bytes prism/public/worksheet/Class_PipeLoss_PL_S_1_0_7_28/PLInit_P_Eqn_5.png
2004-Nov-15 20:47:12 589 bytes prism/public/worksheet/Class_PipeLoss_PL_S_1_0_7_28/PLInit_P_Eqn_6.png
2004-Nov-15 20:47:12 1281 bytes prism/public/worksheet/Class_PipeLoss_PL_S_1_0_7_28/PLInit_P_Eqn_7.png
2004-Nov-15 20:47:12 591 bytes prism/public/worksheet/Class_PipeLoss_PL_S_1_0_7_28/PLInit_P_Eqn_8.png
2004-Nov-15 20:47:12 899 bytes prism/public/worksheet/Class_PipeLoss_PL_S_1_0_7_28/PLInit_P_Eqn_9.png
2004-Dec-13 10:26:54 1054 bytes prism/public/worksheet/Class_PipeLoss_PL_V_1_0_7_28
2004-Nov-15 20:47:12 586 bytes prism/public/worksheet/Class_PipeLoss_PL_V_1_0_7_28/MRC_CF_Eqn_0.png
2004-Nov-15 20:47:12 817 bytes prism/public/worksheet/Class_PipeLoss_PL_V_1_0_7_28/MRC_CF_Eqn_1.png
2004-Nov-15 20:47:12 1153 bytes prism/public/worksheet/Class_PipeLoss_PL_V_1_0_7_28/MRC_CF_Eqn_10.png
2004-Nov-15 20:47:12 238 bytes prism/public/worksheet/Class_PipeLoss_PL_V_1_0_7_28/MRC_CF_Eqn_2.png
2004-Nov-15 20:47:12 826 bytes prism/public/worksheet/Class_PipeLoss_PL_V_1_0_7_28/MRC_CF_Eqn_3.png
2004-Nov-15 20:47:12 433 bytes prism/public/worksheet/Class_PipeLoss_PL_V_1_0_7_28/MRC_CF_Eqn_4.png
2004-Nov-15 20:47:12 669 bytes prism/public/worksheet/Class_PipeLoss_PL_V_1_0_7_28/MRC_CF_Eqn_5.png
2004-Nov-15 20:47:12 453 bytes prism/public/worksheet/Class_PipeLoss_PL_V_1_0_7_28/MRC_CF_Eqn_6.png
2004-Nov-15 20:47:12 208 bytes prism/public/worksheet/Class_PipeLoss_PL_V_1_0_7_28/MRC_CF_Eqn_7.png
2004-Nov-15 20:47:12 912 bytes prism/public/worksheet/Class_PipeLoss_PL_V_1_0_7_28/MRC_CF_Eqn_8.png
2004-Nov-15 20:47:12 238 bytes prism/public/worksheet/Class_PipeLoss_PL_V_1_0_7_28/MRC_CF_Eqn_9.png
2004-Nov-15 20:47:14 1416 bytes prism/public/worksheet/Class_PipeLoss_PL_V_1_0_7_28/MRC_VaporKbp_CalcKb_Eqn_0.png

| | | |
|---|---|---|
| 2004-Nov-15 20:47:14 | 951 bytes | prism/public/worksheet/Class_PipeLoss_PL_V_1_0_7_28/MRC_VaporKbp_CalcKv_Eqn_0.png |
| 2004-Nov-15 20:47:14 | 728 bytes | prism/public/worksheet/Class_PipeLoss_PL_V_1_0_7_28/MRC_VaporKbp_CalcKv_Eqn_1.png |
| 2004-Nov-15 20:47:14 | 765 bytes | prism/public/worksheet/Class_PipeLoss_PL_V_1_0_7_28/MRC_VaporKbp_CalcKv_Eqn_2.png |
| 2004-Nov-15 20:47:14 | 706 bytes | prism/public/worksheet/Class_PipeLoss_PL_V_1_0_7_28/MRC_VaporKbp_CalcKv_Eqn_3.png |
| 2004-Nov-15 20:47:14 | 427 bytes | prism/public/worksheet/Class_PipeLoss_PL_V_1_0_7_28/MRC_VaporKbp_Eqn_0.png |
| 2004-Nov-15 20:47:14 | 373 bytes | prism/public/worksheet/Class_PipeLoss_PL_V_1_0_7_28/MRC_VaporKbp_Eqn_1.png |
| 2004-Nov-15 20:47:14 | 574 bytes | prism/public/worksheet/Class_PipeLoss_PL_V_1_0_7_28/PLInit_P_Eqn_0.png |
| 2004-Nov-15 20:47:14 | 797 bytes | prism/public/worksheet/Class_PipeLoss_PL_V_1_0_7_28/PLInit_P_Eqn_1.png |
| 2004-Nov-15 20:47:14 | 682 bytes | prism/public/worksheet/Class_PipeLoss_PL_V_1_0_7_28/PLInit_P_Eqn_10.png |
| 2004-Nov-15 20:47:14 | 1042 bytes | prism/public/worksheet/Class_PipeLoss_PL_V_1_0_7_28/PLInit_P_Eqn_2.png |
| 2004-Nov-15 20:47:14 | 1198 bytes | prism/public/worksheet/Class_PipeLoss_PL_V_1_0_7_28/PLInit_P_Eqn_3.png |
| 2004-Nov-15 20:47:14 | 1141 bytes | prism/public/worksheet/Class_PipeLoss_PL_V_1_0_7_28/PLInit_P_Eqn_4.png |
| 2004-Nov-15 20:47:14 | 758 bytes | prism/public/worksheet/Class_PipeLoss_PL_V_1_0_7_28/PLInit_P_Eqn_5.png |
| 2004-Nov-15 20:47:14 | 589 bytes | prism/public/worksheet/Class_PipeLoss_PL_V_1_0_7_28/PLInit_P_Eqn_6.png |
| 2004-Nov-15 20:47:14 | 1281 bytes | prism/public/worksheet/Class_PipeLoss_PL_V_1_0_7_28/PLInit_P_Eqn_7.png |
| 2004-Nov-15 20:47:14 | 591 bytes | prism/public/worksheet/Class_PipeLoss_PL_V_1_0_7_28/PLInit_P_Eqn_8.png |
| 2004-Nov-15 20:47:14 | 899 bytes | prism/public/worksheet/Class_PipeLoss_PL_V_1_0_7_28/PLInit_P_Eqn_9.png |
| 2004-Dec-13 10:26:54 | 408 bytes | prism/public/worksheet/Class_PipeLoss_PL_V_RD_1_0_7_28 |
| 2004-Nov-15 20:47:14 | 574 bytes | prism/public/worksheet/Class_PipeLoss_PL_V_RD_1_0_7_28/PLInit_P_Eqn_0.png |
| 2004-Nov-15 20:47:14 | 1042 bytes | prism/public/worksheet/Class_PipeLoss_PL_V_RD_1_0_7_28/PLInit_P_Eqn_1.png |
| 2004-Nov-15 20:47:14 | 1198 bytes | prism/public/worksheet/Class_PipeLoss_PL_V_RD_1_0_7_28/PLInit_P_Eqn_2.png |
| 2004-Nov-15 20:47:14 | 1141 bytes | prism/public/worksheet/Class_PipeLoss_PL_V_RD_1_0_7_28/PLInit_P_Eqn_3.png |
| 2004-Nov-15 20:47:14 | 758 bytes | prism/public/worksheet/Class_PipeLoss_PL_V_RD_1_0_7_28/PLInit_P_Eqn_4.png |
| 2004-Nov-15 20:47:14 | 589 bytes | prism/public/worksheet/Class_PipeLoss_PL_V_RD_1_0_7_28/PLInit_P_Eqn_5.png |
| 2004-Nov-15 20:47:14 | 1281 bytes | prism/public/worksheet/Class_PipeLoss_PL_V_RD_1_0_7_28/PLInit_P_Eqn_6.png |
| 2004-Nov-15 20:47:14 | 591 bytes | prism/public/worksheet/Class_PipeLoss_PL_V_RD_1_0_7_28/PLInit_P_Eqn_7.png |
| 2004-Nov-15 20:47:14 | 899 bytes | prism/public/worksheet/Class_PipeLoss_PL_V_RD_1_0_7_28/PLInit_P_Eqn_8.png |
| 2004-Nov-15 20:47:14 | 682 bytes | prism/public/worksheet/Class_PipeLoss_PL_V_RD_1_0_7_28/PLInit_P_Eqn_9.png |

What is claimed is:

1. A web-based evaluation system for evaluating a process system in support of a plurality of concurrent users, said process system comprising a plurality of pressure equipment including a protection device for protecting the process system, said evaluation system comprising:

a storage subsystem for electronically storing an equipment database including equipment information representing each of said plurality of equipment;

a server for serving content including some portion of said equipment information, via a public communication network, to web browsers executing on a remotely located user computers; and an assessment subsystem for automatically determining, by utilizing some portion of said equipment information, an adequacy of the protection device for protecting the process system, and generating protection assessment information therefrom, said protection assessment information also being stored in said equipment database or in another database by said storage subsystem, wherein said assessment subsystem is located remotely from said users, and wherein said server is adapted for concurrently serving at least a portion of said protection assessment information and/or at least a portion of said equipment information to at least one of the said web browsers while also serving additional information to at least one other of said users, and further wherein said evaluation system is adapted, when one of said users is currently editing information in said equipment database, to prevent others of said users concurrently accessing said evaluation system from concurrently editing said information in said equipment database.

2. The evaluation system of claim 1, wherein said server and said assessment subsystem utilize a computer in common.

3. The evaluation system of claim 1, wherein said content is formatted according to the http protocol for serving by said server, and wherein the communication network supports the TCP/IP communication protocol.

4. The evaluation system of claim 3, wherein the communication network is the Internet, and wherein the application executing on a remotely located user computer is a web browser application capable of displaying html formatted documents.

5. The evaluation system of claim 4, wherein the web browser application is a commercially available general purpose web browser application for running on a general purpose computer, and wherein said content is displayed by the user computer using the web browser application.

6. The evaluation system of claim 1, wherein the communication network is the Internet or a derivative thereof.

7. The evaluation system of claim 1, wherein said protection device is an overpressure device, and wherein said determining an adequacy includes an overpressure assessment based on an overpressure scenario.

8. The evaluation system of claim 1, further comprising a report generation subsystem for generating an assessment report utilizing some portion of said protection assessment information and some portion of said equipment information.

9. The system of claim 8, wherein said assessment report includes an assessment based on one or more failure scenarios; and wherein said assessment report is used for supporting a PSM assessment, wherein said assessment report is utilized for one or both of:

certifying and/or verifying that the process system is adequately designed or identifying inadequacies of the process system design.

10. The evaluation system of claim 1, further comprising:

means for supporting process engineering functions including one or more of:

means for uploading P&ID and/or system sketches;

means for uploading equipment parameters;

means for uploading ISO drawings;

means for defining a protected system model;

means for defining potential overpressure scenarios for said system;

means for determining how physical properties are input into said evaluation system;

means for defining mitigation;

and wherein said automatically determining an adequacy of the protection device includes one or more of:

automatically generating internal protected system links between any combination of associated pieces of equipment, associated defined overpressure contingencies, and associated documentation;

generating interactive P&TD/system sketch models;

calculating defined overpressure contingencies;

calculating piping losses accessing physical properties through a linked VMG database; and assigning mitigation procedures.

11. The evaluation system of claim 1, wherein said content further includes some portion of said protection assessment information.

12. An evaluation system for evaluating a process system, said process system comprising a plurality of pressure equipment including a protection device for protecting the process system, said evaluation system comprising:

a storage subsystem for storing an equipment database including equipment information representing each of said plurality of equipment, said storage subsystem also for updating said equipment information with updated equipment information such that only one user can provide said updated equipment information at any given time;

a server for serving content, via a public communication network, to a web browser executing on a user computer, said server further for concurrently serving additional content, including at least a portion of said content, via the communication network, to the application or another application executing on another user computer, wherein said user and said another user use respective computers attached to different computer networks located geographically distant from each other;

a reception subsystem for receiving said updated equipment information for providing to said storage subsystem, said receiving from one or both of the user computer and the another user computer via the communication network; and an assessment subsystem for automatically determining, by utilizing said equipment information, an adequacy of the protection device for protecting the process system, and for generating protection assessment information therefrom, said protection assessment information also being stored in said equipment database, or in another database, by said storage subsystem, wherein said assessment subsystem is located remotely from said user, and wherein said content includes some portion of said equipment information and further includes some portion of said protection assessment information, and wherein said assessment subsystem is further for updating said protection assessment information by utilizing said updated equipment information, and further wherein said server is further for serving updated content including some portion of said updated protection information to the user computer and/or the another user computer via the communication network.

13. The evaluation system of claim 12, wherein said server and said assessment subsystem utilize a computer in common.

14. The evaluation system of claim 12, wherein said content is formatted according to the http protocol for serving by said server, and wherein the application is a web browser application, and further wherein the communication network supports the TCP/IP communication protocol.

15. The evaluation system of claim 14, wherein the communication network is the Internet.

16. The evaluation system of claim 15, wherein the web browser application is a commercially available general purpose web browser application supporting the http protocol for running on a general purpose computer utilizing a commercially available operating system, and wherein said content and said updated content are displayed by the user computer using the browser application.

17. The evaluation system of claim 12, wherein the public communication network is the Internet or a derivative thereof.

18. The evaluation system of claim 12, wherein said protection device is an overpressure device, and wherein said determining an adequacy includes an overpressure assessment based on various overpressure scenarios.

19. The evaluation system of claim 12, further comprising a report generation subsystem for generating an assessment report utilizing some portion of said protection assessment information and some portion of said equipment information.

20. The system of claim 12, wherein said assessment report includes an assessment based on one or more failure scenarios; and wherein said assessment report is used for supporting a PSM assessment, wherein said assessment report is utilized for one or both of:

certifying and/or verifying that the process system is adequately designed or identifying inadequacies of the process system design.

21. The evaluation system of claim 12, wherein further comprising:

means for supporting process engineering functions including one or more of:

means for uploading P&ID and/or system sketches;

means for uploading equipment parameters;

means for uploading ISO drawings;

means for defining a protected system model;

means for defining potential overpressure scenarios for said system;

means for determining how physical properties are input into said evaluation system;

means for defining mitigation;

and wherein said automatically determining an adequacy of the protection device includes one or more of:

automatically generating internal protected system links between any combination of associated pieces of equipment, associated defined overpressure contingencies, and associated documentation;

generating interactive P&ID/system sketch models;

calculating defined overpressure contingencies;

calculating piping losses accessing physical properties through a linked VMG database; and assigning mitigation procedures.

22. An evaluation system for evaluating a process system, said process system comprising a plurality of pressure equipment including a protection device for protecting the process system, said evaluation system comprising:

a storage subsystem located remotely from a plurality of user computers for storing an equipment database including equipment information representing each of said plurality of equipment, said storage subsystem also for updating said equipment information with updated equipment information such that only one of said user computers can provide said updated equipment information at any given time;

a server located remotely from the user computers for serving content, via a public communication network, to a browser application executing on at least one or more of said user computers, said server further for serving additional content, including at least a portion of said content, via the communication network, to the browser application or to another browser application executing on another one or more of said user computers;

a reception subsystem located remotely from the user computers for receiving said updated equipment information for providing to said storage subsystem, said receiving from one or both of the user computer and the another user computer via the communication network;

an assessment subsystem located remotely from the user computers for automatically determining, by utilizing said equipment information, an adequacy of the protection device for protecting the process system, and for generating protection assessment information therefrom, said protection assessment information also being stored in said equipment database, or in another database, by said storage subsystem, wherein said automatically determining an adequacy of the protection device includes one or more of:

automatically generating internal protected system links between any combination of associated pieces of equipment, associated defined overpressure contingencies, and associated documentation;

generating interactive P&ID/system sketch models;

calculating defined overpressure contingencies;

calculating piping losses accessing physical properties through a linked VMG database; and assigning mitigation procedures;

a report generation subsystem for generating an assessment report utilizing some portion of said protection assessment information and some portion of said equipment information; and means for supporting a plurality of process engineering functions including one or more of:

means for uploading P&ID and/or system sketches, means for uploading equipment parameters, means for uploading ISO drawings, means for defining a protected system model, means for defining potential overpressure scenarios for said system, means for determining how physical properties are input into said evaluation system, and means for defining mitigation; wherein said content includes some portion of said equipment information and further includes some portion of said protection assessment information, and wherein said assessment subsystem is further for updating said protection assessment information by utilizing said updated equipment information, and further wherein said server is further for serving updated content including some portion of said updated protection information to at least one of the user computers and/or at least one of the another user computers via the communication network.

23. The system of claim 22, wherein said assessment report includes an assessment based on one or more failure scenarios; and wherein said assessment report is used for supporting a PSM assessment, wherein said assessment report is utilized for one or both of:

certifying and/or verifying that the process system is adequately designed or identifying inadequacies of the process system design.

24. A web-based evaluation system for evaluating a process system, said process system comprising a plurality of pressure equipment including a protection device for protecting the process system, said evaluation system comprising:

a storage subsystem for electronically storing an equipment database including equipment information representing each of said plurality of equipment;

a server for serving content including some portion of said equipment information, via a public communication network, to a web browser executing on a remotely located user computer; and an assessment subsystem for automatically determining, by utilizing some portion of said equipment information, an adequacy of the protection device for protecting the process system, and generating protection assessment information therefrom, said protection assessment information also being stored in said equipment database or in another database by said storage subsystem, wherein said assessment subsystem is located on a different computer network than the user computer, both of which are connected to the Internet, and wherein said server is for serving at least a portion of said protection assessment information and/or at least a portion of said equipment information to the said web browser, and wherein said evaluation system is adapted to receive editing information from the user computer during an editing mode for editing a portion of said equipment information such that said portion of equipment information is locked from additional editing during said editing mode, and wherein said evaluation system updates at least a portion of said protection assessment information in response to said editing.

25. The evaluation system of claim 24, wherein said editing includes one or both of changing a piece of equipment of said process system or changing one or more parameters associated with a piece of equipment of said process system.

26. The evaluation system of claim 24, wherein said editing includes changing information about said protection device.

27. An evaluation system for evaluating a process system in support of a plurality of concurrent users located remotely from each other, said process system comprising a plurality of pressure equipment including a protection device for protecting the process system, said evaluation system comprising:

a storage subsystem for electronically storing an equipment database including equipment information representing each of said plurality of equipment and also for storing revision control information;

a server for serving content including some portion of said equipment information, via a public communication network, to web browsers executing on a remotely located user computers; and an assessment subsystem for automatically determining, by utilizing some portion of said equipment information, an adequacy of the protection device for protecting the process system, and generating protection assessment information therefrom, said protection assessment information also being stored in said equipment database or in another database by said storage subsystem, and wherein said server is adapted for concurrently serving at least a portion of said protection assessment information and/or at least a portion of said equipment information to at least one of the said web browsers while also serving at least a portion of said protection assessment and/or least a portion of said equipment information to at least one other of said users, and further wherein said evaluation system is adapted for allowing one of said users to edit a portion of said equipment information for updating said portion of said equipment information, and in response to updating said portion of said equipment information, said evaluation system automatically updates said revision control information to record information about the update associated with information about the user making the edit.

28. The evaluation system of claim 27, wherein said editing includes one or both of changing a piece of equipment of said process system or changing one or more parameters associated with a piece of equipment of said process system.

29. The evaluation system of claim 27, wherein said editing includes changing information about said protection device.

30. The evaluation system of claim 27, said evaluation system is adapted, when one of said users is currently editing information in said equipment database, to prevent others of said users concurrently accessing said evaluation system from concurrently editing said information in said equipment database.

31. A web-based evaluation system for evaluating a process system in support of a plurality of concurrent users located remotely from each other, said process system comprising a plurality of pressure equipment including a protection device for protecting the process system, said evaluation system comprising:

a storage subsystem for electronically storing an equipment database including equipment information representing each of said plurality of equipment and also for storing revision control information;

a server for serving content including some portion of said equipment information, via a public communication network, to web browsers executing on a remotely located user computers; and an assessment subsystem for automatically determining, by utilizing some portion of said equipment information, an adequacy of the protection device for protecting the process system, and generating protection assessment information therefrom, said protection assessment information also being stored in said equipment database or in another database by said storage subsystem, and wherein said server is adapted for concurrently serving at least a portion of said protection assessment information and/or at least a portion of said equipment information to at least one of the said web browsers while also serving at least a portion of said protection assessment and/or least a portion of said equipment information to at least one other of said users, and further wherein said evaluation system is adapted for allowing one of said users to edit a portion of said equipment information for updating said portion of said equipment information, and in response to updating said portion of said equipment information, said evaluation system automatically determines an updated adequacy of the protection device for protecting the updated system and displays a result of said updated determination to the user.

* * * * *

UNITED STATES PATENT AND TRADEMARK OFFICE

CERTIFICATE OF CORRECTION

PATENT NO. : 7,617,013 B2
APPLICATION NO. : 11/016001
DATED : November 10, 2009
INVENTOR(S) : Kolenc et al.

It is certified that error appears in the above-identified patent and that said Letters Patent is hereby corrected as shown below:

On the Title page, Item [75], "Anthony G. Olekshy" should be replaced with --Antony G. Olekshy--, In column 31, line 41, please replace the word "xis" with the word --xls--, In column 33, line 8, please delete the letter "a" before the word --Pipe--.

Signed and Sealed this

Twenty-second Day of June, 2010

David J. Kappos
*Director of the United States Patent and Trademark Office*

UNITED STATES PATENT AND TRADEMARK OFFICE

CERTIFICATE OF CORRECTION

PATENT NO. : 7,617,013 B2
APPLICATION NO. : 11/016001
DATED : November 10, 2009
INVENTOR(S) : Kolenc et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 604 days.

Signed and Sealed this

Fourteenth Day of December, 2010

David J. Kappos
*Director of the United States Patent and Trademark Office*